US012412120B2

(12) United States Patent
Cella et al.

(10) Patent No.: US 12,412,120 B2
(45) Date of Patent: Sep. 9, 2025

(54) SYSTEMS AND METHODS FOR CONTROLLING RIGHTS RELATED TO DIGITAL KNOWLEDGE

(71) Applicant: Strong Force TX Portfolio 2018, LLC, Fort Lauderdale, FL (US)

(72) Inventors: Charles Howard Cella, Pembroke, MA (US); Andrew Cardno, San Diego, CA (US); Taylor D. Charon, Troy, MI (US); Teymour S. El-Tahry, Detroit, MI (US)

(73) Assignee: Strong Force TX Portfolio 2018, LLC, Fort Lauderdale, FL (US)

( * ) Notice: Subject to any disclaimer, the term of this patent is extended or adjusted under 35 U.S.C. 154(b) by 352 days.

(21) Appl. No.: 17/378,393

(22) Filed: Jul. 16, 2021

(65) Prior Publication Data

US 2021/0342836 A1 Nov. 4, 2021

Related U.S. Application Data

(63) Continuation-in-part of application No. 17/332,700, filed on May 27, 2021, now Pat. No. 11,550,299, and (Continued)

(51) Int. Cl.

*G06N 20/00* (2019.01)
*G06Q 20/38* (2012.01)

(Continued)

(52) U.S. Cl.

CPC ........... *G06N 20/00* (2019.01); *G06Q 20/389* (2013.01); *G06Q 20/401* (2013.01);

(Continued)

(58) Field of Classification Search

CPC . H04L 9/50; H04L 67/10; H04L 67/12; H04L 9/3231; H04L 67/566;

(Continued)

(56) References Cited

U.S. PATENT DOCUMENTS 5,126,028 A 6/1992 Hurwitt et al.
5,561,741 A 10/1996 Wasserman (Continued)

FOREIGN PATENT DOCUMENTS

AU 2017352545 A1 8/2018
CA 3064604 A1 12/2018

(Continued)

OTHER PUBLICATIONS

S. Wong and B. Obermeier, "Blockchain & the Hollywood Supply Chain," SMPTE 2017 Annual Technical Conference and Exhibition, Hollywood & Highland, Los Angeles, CA, USA, 2017, pp. 1-5. (Year: 2017).*

(Continued)

*Primary Examiner* — Mohammad Z Shaikh

(74) *Attorney, Agent, or Firm* — GTC Law Group PC & Affiliates

(57) ABSTRACT

Systems and methods for controlling rights related to digital knowledge are disclosed. A sample system may include an input system to receive digital knowledge from a user, a tokenization system to tokenize the digital knowledge and a ledger management system to create, manage, and store things on a distributed ledger and provide provable access to the digital knowledge. A smart contract system may create a smart contract including triggering action is and respond with a defined smart contract action on an occurrence of the triggering event. The smart contract system may also process commitments to the smart contract.

25 Claims, 171 Drawing Sheets

Related U.S. Application Data a continuation-in-part of application No. 17/243,145, filed on Apr. 28, 2021, and a continuation-in-part of application No. 16/998,668, filed on Aug. 20, 2020, now Pat. No. 11,715,164, and a continuation-in-part of application No. 16/803,387, filed on Feb. 27, 2020, now Pat. No. 11,610,261, and a continuation-in-part of application No. 16/780,519, filed on Feb. 3, 2020, now Pat. No. 11,669,914, said application No. 16/998,668 is a continuation of application No. PCT/US2019/058671, filed on Oct. 29, 2019, and a continuation-in-part of application No. 16/457,890, filed on Jun. 28, 2019, now abandoned, which is a continuation of application No. PCT/US2019/030934, filed on May 6, 2019.

(60) Provisional application No. 63/127,980, filed on Dec. 18, 2020, provisional application No. 63/069,542, filed on Aug. 24, 2020, provisional application No. 63/054,603, filed on Jul. 21, 2020, provisional application No. 63/052,475, filed on Jul. 16, 2020, provisional application No. 63/016,975, filed on Apr. 28, 2020, provisional application No. 62/843,992, filed on May 6, 2019, provisional application No. 62/843,456, filed on May 5, 2019, provisional application No. 62/843,455, filed on May 5, 2019, provisional application No. 62/818,100, filed on Mar. 13, 2019, provisional application No. 62/787,206, filed on Dec. 31, 2018, provisional application No. 62/751,713, filed on Oct. 29, 2018, provisional application No. 62/667,550, filed on May 6, 2018.

(51) Int. Cl.

*G06Q 20/40* (2012.01)
*G06Q 50/18* (2012.01)
*H04L 9/00* (2022.01)
*H04L 9/08* (2006.01)
*H04L 9/32* (2006.01)

(52) U.S. Cl.

CPC ......... *G06Q 50/184* (2013.01); *H04L 9/0819* (2013.01); *H04L 9/3213* (2013.01); *H04L 9/3236* (2013.01); *G06Q 2220/00* (2013.01); *H04L 9/50* (2022.05)

(58) Field of Classification Search

CPC ..... H04L 67/562; H04L 67/104; H04L 67/52; H04L 2209/56; G06N 3/049; G06N 3/045; G06N 3/006; G06N 3/088; G06N 7/01; G06N 3/047; G06N 5/01; G06N 3/044; G06N 10/60; G06Q 20/401; G06Q 30/0208; G06Q 30/0201; G06Q 40/03; G06Q 10/10; G06Q 50/01; G06Q 40/04; G06Q 20/389; G06Q 40/06; G06Q 50/184; G06Q 30/0601; G06Q 30/0278; G06Q 30/0215; G06Q 2220/00; G06F 18/23; G16Y 10/45; Y02P 90/90

See application file for complete search history.

(56) References Cited

U.S. PATENT DOCUMENTS 5,717,834 A 2/1998 Werblin et al.
5,764,905 A 6/1998 Catozzi et al.
5,812,422 A 9/1998 Lyons
6,289,488 B1 9/2001 Dave et al.
6,519,574 B1 2/2003 Wilton et al.
6,589,447 B1 7/2003 Ishizaki et al.
6,785,592 B1 8/2004 Smith et al.
6,810,817 B1 11/2004 James
7,162,444 B1 1/2007 Machado, Jr. et al.
7,272,572 B1 9/2007 Pienkos
7,289,965 B1 10/2007 Bradley et al.
7,343,360 B1 3/2008 Ristanovic et al.
7,447,659 B2 11/2008 Parthasarathy
7,653,551 B2 1/2010 Poltorak
7,752,124 B2 7/2010 Green et al.
7,797,217 B2 9/2010 Rosen et al.
7,856,141 B2 12/2010 Li
7,856,414 B2 12/2010 Zee
7,860,767 B1 12/2010 Vinci et al.
7,904,381 B1 3/2011 Tatang et al.
7,970,640 B2 6/2011 Eder
8,024,262 B2 9/2011 Tai et al.
8,156,022 B2 4/2012 Fell et al.
8,160,952 B1 4/2012 Fell et al.
8,199,768 B1 6/2012 Gossett et al.
8,412,613 B2 4/2013 Prager et al.
8,472,447 B2 6/2013 Humphries
8,489,499 B2 7/2013 Yan et al.
8,504,463 B2 8/2013 Johnson et al.
8,538,848 B1 9/2013 Jung et al.
8,600,571 B2 12/2013 Dillon et al.
8,639,392 B2 1/2014 Chassin
8,660,943 B1 2/2014 Chirehdast
8,762,246 B2 6/2014 Blank et al.
8,775,300 B2 7/2014 Showalter
8,788,439 B2 7/2014 Martinez et al.
8,848,640 B2 9/2014 Reznik et al.
9,240,026 B2 1/2016 Chassin et al.
9,367,825 B2 6/2016 Steven et al.
9,425,620 B2 8/2016 Chassin et al.
9,454,646 B2 9/2016 Siefert
9,465,398 B2 10/2016 Forbes, Jr.
9,589,297 B2 3/2017 Fuller et al.
9,595,070 B2 3/2017 Matsuoka et al.
9,697,544 B1 7/2017 Bayer et al.
9,762,060 B2 9/2017 Kalsi et al.
9,800,052 B2 10/2017 Li et al.
9,811,847 B2 11/2017 Berger et al.
9,983,670 B2 5/2018 Coleman et al.
10,013,654 B1 7/2018 Levy et al.
10,025,941 B1 7/2018 Griffin et al.
10,063,529 B2 * 8/2018 Milazzo .................. B29C 64/00
10,075,987 B2 9/2018 Teyeb et al.
10,157,407 B2 12/2018 Jung et al.
10,168,675 B2 1/2019 Hashimoto et al.
10,234,835 B2 3/2019 Liu et al.
10,243,743 B1 3/2019 Madisetti et al.
10,311,371 B1 6/2019 Hotchkies et al.
10,318,896 B1 6/2019 Sarkar et al.
10,320,569 B1 6/2019 Wentz et al.
10,324,457 B2 6/2019 Neelakandan et al.
10,353,745 B1 7/2019 Sait
10,396,919 B1 8/2019 O'Shea et al.
10,503,627 B2 12/2019 Radhakrishnan et al.
10,521,780 B1 * 12/2019 Hopkins, III .......... G06Q 20/12
10,545,491 B2 1/2020 Kingston et al.
10,606,687 B2 3/2020 Purushothaman
10,642,967 B2 5/2020 Balaraman et al.
10,657,457 B1 5/2020 Jeffery et al.
10,719,586 B2 * 7/2020 Lenchner ................ G06F 21/64
10,762,506 B1 9/2020 Cash et al.
10,783,579 B1 9/2020 Blackwell et al.
10,824,759 B1 * 11/2020 Magerkurth ........... G06Q 20/10
10,824,959 B1 11/2020 Chatterjee et al.
10,841,236 B1 11/2020 Jin et al.
10,861,112 B2 12/2020 Forbes, Jr. et al.
10,880,313 B2 12/2020 Manna et al.
10,884,810 B1 1/2021 Verma et al.
10,915,874 B2 * 2/2021 Code .................. H04L 63/0861
10,937,004 B2 3/2021 Comerford et al.
10,938,674 B1 3/2021 Natanzon et al.
10,949,777 B2 3/2021 Elbsat et al.
10,958,436 B2 * 3/2021 Zhou ..................... H04L 9/0637
10,963,231 B1 3/2021 Singh
10,970,742 B1 4/2021 Knijnik et al.

(56) References Cited

U.S. PATENT DOCUMENTS 11,042,410 B2 6/2021 Jin et al.
11,068,978 B1 7/2021 Ferreira
11,074,648 B1 7/2021 Duccini et al.
11,080,665 B1 8/2021 Poelstra et al.
11,164,165 B1 * 11/2021 Andreev ................ G06Q 20/02
11,320,796 B1 5/2022 Eltayeb et al.
11,327,826 B1 5/2022 Shama et al.
11,348,120 B2 5/2022 Berti et al.
11,397,919 B1 7/2022 Thiagrajan et al.
11,410,073 B1 8/2022 Narsky et al.
11,501,365 B1 11/2022 Awasthy
11,514,448 B1 11/2022 Liberman
11,550,299 B2 1/2023 Cella et al.
11,574,268 B2 2/2023 Irazabal et al.
11,610,261 B2 3/2023 Cella
11,669,914 B2 6/2023 Cella
11,676,098 B2 6/2023 Berti et al.
11,715,164 B2 8/2023 Cella
2001/0027949 A1 10/2001 Safir et al.
2001/0034701 A1 10/2001 Fox et al.
2001/0044766 A1 11/2001 Keyes
2002/0019758 A1 2/2002 Scarpelli
2002/0019802 A1 2/2002 Malme et al.
2002/0038279 A1 3/2002 Samuelson et al.
2002/0087234 A1 7/2002 Lof et al.
2002/0103745 A1 8/2002 Lof et al.
2002/0144255 A1 10/2002 Anderson
2002/0147670 A1 10/2002 Lange
2002/0161624 A1 10/2002 Bradlee
2002/0198805 A1 12/2002 Burkhardt
2003/0033242 A1 2/2003 Lynch et al.
2003/0055677 A1 3/2003 Brown et al.
2003/0055776 A1 3/2003 Samuelson
2003/0061133 A1 3/2003 Nutter et al.
2003/0069830 A1 4/2003 Morano et al.
2003/0101123 A1 5/2003 Alvarado et al.
2003/0182250 A1 9/2003 Shihidehpour et al.
2003/0212572 A1 11/2003 Poltorak
2003/0212643 A1 11/2003 Steele et al.
2003/0225653 A1 12/2003 Pullman
2003/0229582 A1 12/2003 Sherman et al.
2003/0233278 A1 12/2003 Marshall
2004/0044442 A1 3/2004 Bayoumi et al.
2004/0230512 A1 11/2004 Gulati
2005/0004858 A1 1/2005 Foster et al.
2005/0004862 A1 1/2005 Kirkland et al.
2005/0065871 A1 3/2005 Gerhart et al.
2005/0125329 A1 6/2005 Gerhart et al.
2005/0125701 A1 6/2005 Hensbergen et al.
2005/0149401 A1 7/2005 Ratcliffe et al.
2005/0149420 A1 7/2005 Hagelin
2005/0192826 A1 9/2005 Kanefsky
2005/0246220 A1 11/2005 Thomson et al.
2005/0257079 A1 11/2005 Arcangeli
2005/0267837 A1 12/2005 White
2006/0020526 A1 1/2006 Viner
2006/0036530 A1 2/2006 Shkedy
2006/0069640 A1 3/2006 Fitzgerald et al.
2006/0069786 A1 3/2006 Mogul et al.
2006/0143111 A1 6/2006 Mylet
2006/0155423 A1 7/2006 Budike
2006/0178918 A1 8/2006 Mikurak
2006/0195715 A1 8/2006 Herington
2006/0235788 A1 10/2006 Guyton
2006/0250959 A1 11/2006 Porat
2006/0293985 A1 12/2006 Lederman et al.
2007/0011080 A1 1/2007 Jain et al.
2007/0011083 A1 1/2007 Bird et al.
2007/0016518 A1 1/2007 Atkinson et al.
2007/0022044 A1 1/2007 Takeshita
2007/0050286 A1 3/2007 Abrahams et al.
2007/0055579 A1 3/2007 Ha
2007/0073625 A1 3/2007 Shelton
2007/0179855 A1 8/2007 Rueda et al.
2007/0226139 A1 9/2007 Crumbach et al.
2007/0299683 A1 12/2007 Elliott
2008/0046378 A1 2/2008 Harrison et al.
2008/0075406 A1 3/2008 Kadomi et al.
2008/0103895 A1 5/2008 Burdick et al.
2008/0121690 A1 5/2008 Carani et al.
2008/0133402 A1 6/2008 Kurian et al.
2008/0154784 A1 6/2008 Veeraraghavan
2008/0177423 A1 7/2008 Brickfield et al.
2008/0221951 A1 9/2008 Stanforth et al.
2008/0222021 A1 9/2008 Stanforth et al.
2008/0228518 A1 9/2008 Braziel et al.
2008/0262892 A1 10/2008 Prager et al.
2008/0275746 A1 11/2008 Musier et al.
2008/0319893 A1 12/2008 Mashinsky et al.
2009/0048901 A1 2/2009 Richard et al.
2009/0049443 A1 2/2009 Powers et al.
2009/0055270 A1 2/2009 Magdon-ismail et al.
2009/0070273 A1 3/2009 Moryto
2009/0106070 A1 4/2009 Konar
2009/0119172 A1 5/2009 Soloff
2009/0171842 A1 7/2009 Blythe
2009/0240380 A1 9/2009 Shah et al.
2009/0254410 A1 10/2009 Chang et al.
2010/0042534 A1 2/2010 Moran
2010/0050172 A1 2/2010 Ferris
2010/0057582 A1 3/2010 Arfin et al.
2010/0063644 A1 3/2010 Kansal et al.
2010/0076615 A1 3/2010 Daniel et al.
2010/0106332 A1 4/2010 Chassin et al.
2010/0114387 A1 5/2010 Chassin
2010/0153960 A1 6/2010 Youn et al.
2010/0179704 A1 7/2010 Ozog
2010/0179911 A1 7/2010 Gorina et al.
2010/0198743 A1 8/2010 Plunket
2010/0217550 A1 8/2010 Crabtree et al.
2010/0217642 A1 8/2010 Crubtree et al.
2010/0217651 A1 8/2010 Crabtree et al.
2010/0218108 A1 8/2010 Crabtree et al.
2010/0228598 A1 9/2010 Seuken et al.
2010/0262530 A1 10/2010 Malackowski et al.
2010/0332262 A1 12/2010 Horvitz et al.
2010/0332373 A1 12/2010 Crabtree et al.
2011/0004575 A1 1/2011 Yang et al.
2011/0022548 A1 1/2011 Shahaf et al.
2011/0040632 A1 2/2011 Margasahayam et al.
2011/0040666 A1 2/2011 Crabtree et al.
2011/0047056 A1 2/2011 Overman et al.
2011/0071882 A1 3/2011 Jakagnanam et al.
2011/0071934 A1 3/2011 Brown et al.
2011/0087531 A1 4/2011 Winters et al.
2011/0093382 A1 4/2011 Coltrell et al.
2011/0106277 A1 5/2011 Sayyar-rodsari et al.
2011/0125671 A1 5/2011 Zhang et al.
2011/0178915 A1 7/2011 Vinokour et al.
2011/0191216 A1 8/2011 Foster
2011/0231028 A1 9/2011 Ozog
2011/0270779 A1 11/2011 Showalter
2011/0313578 A1 12/2011 Jones et al.
2011/0320342 A1 12/2011 Kremen
2012/0010757 A1 1/2012 Francino et al.
2012/0016721 A1 1/2012 Weinman
2012/0023007 A1 1/2012 Bachann
2012/0130556 A1 5/2012 Marhoefer
2012/0131591 A1 5/2012 Moorthi et al.
2012/0150679 A1 6/2012 Lazaris
2012/0158568 A1 6/2012 Ford et al.
2012/0173020 A1 7/2012 Seth et al.
2012/0191594 A1 7/2012 Welch et al.
2012/0245752 A1 9/2012 Borrett et al.
2012/0246037 A1 9/2012 Wilmes et al.
2012/0250938 A1 10/2012 Dehart
2012/0278220 A1 11/2012 Chassin et al.
2012/0283005 A1 11/2012 Van Luchene
2012/0284207 A1 11/2012 Eder
2012/0296845 A1 11/2012 Andrews et al.
2012/0303558 A1 11/2012 Jaiswal
2012/0310847 A1 12/2012 Tadayon et al.
2012/0316688 A1 12/2012 Boardman et al.
2012/0322387 A1 12/2012 Nicoara et al.

(56) References Cited

U.S. PATENT DOCUMENTS

| | | | |
|---|---|---|---|
| 2012/0323758 | A1 | 12/2012 | Henning |
| 2012/0323760 | A1 | 12/2012 | Lee et al. |
| 2013/0006844 | A1 | 1/2013 | Kremen |
| 2013/0006845 | A1 | 1/2013 | Kremen |
| 2013/0013520 | A1 | 1/2013 | Lee |
| 2013/0035992 | A1 | 2/2013 | Silverman |
| 2013/0054036 | A1 | 2/2013 | Cherian |
| 2013/0054863 | A1 | 2/2013 | Imes et al. |
| 2013/0067074 | A1 | 3/2013 | Allen et al. |
| 2013/0072775 | A1 | 3/2013 | Rogers et al. |
| 2013/0085614 | A1 | 4/2013 | Wenzel et al. |
| 2013/0117156 | A1 | 5/2013 | Azmi et al. |
| 2013/0151383 | A1 | 6/2013 | Gancarz et al. |
| 2013/0159163 | A1 | 6/2013 | Kayanuma et al. |
| 2013/0159165 | A1 | 6/2013 | Marlowe-Noren |
| 2013/0159832 | A1 | 6/2013 | Ingargiola et al. |
| 2013/0185722 | A1 | 7/2013 | Kruglick |
| 2013/0211946 | A1 | 8/2013 | Montgomery |
| 2013/0218743 | A1 | 8/2013 | Chassin et al. |
| 2013/0297489 | A1 | 11/2013 | Showalter |
| 2013/0304758 | A1 | 11/2013 | Gruber et al. |
| 2013/0311925 | A1 | 11/2013 | Denker et al. |
| 2013/0325878 | A1 | 12/2013 | De Lichana |
| 2013/0332327 | A1 | 12/2013 | Sgouridis et al. |
| 2013/0345884 | A1 | 12/2013 | Forbes, Jr. |
| 2013/0345888 | A1 | 12/2013 | Forbes, Jr. |
| 2013/0346139 | A1 | 12/2013 | Steven et al. |
| 2013/0346284 | A1 | 12/2013 | Stubbs et al. |
| 2013/0346285 | A1 | 12/2013 | Louis |
| 2014/0006329 | A1 | 1/2014 | Hu et al. |
| 2014/0012650 | A1 | 1/2014 | Patro |
| 2014/0018969 | A1 | 1/2014 | Forbes, Jr. |
| 2014/0039710 | A1 | 2/2014 | Carter et al. |
| 2014/0046819 | A1 | 2/2014 | Hendrix |
| 2014/0067650 | A1 | 3/2014 | Gardiner et al. |
| 2014/0067740 | A1 | 3/2014 | Solari |
| 2014/0089163 | A1 | 3/2014 | Parsons et al. |
| 2014/0136264 | A1 | 5/2014 | Kinsey, II |
| 2014/0156577 | A1 | 6/2014 | Eliasmith et al. |
| 2014/0164262 | A1 | 6/2014 | Graham |
| 2014/0171018 | A1 | 6/2014 | Elrefaey et al. |
| 2014/0171136 | A1 | 6/2014 | Elrefaey et al. |
| 2014/0172679 | A1 | 6/2014 | Shimko |
| 2014/0180907 | A1 | 6/2014 | Blank et al. |
| 2014/0201118 | A1 | 7/2014 | Cleve et al. |
| 2014/0229394 | A1 | 8/2014 | Slutsker et al. |
| 2014/0266669 | A1 | 9/2014 | Fadell et al. |
| 2014/0270494 | A1 | 9/2014 | Sawhney et al. |
| 2014/0277797 | A1 | 9/2014 | Mokhtari et al. |
| 2014/0297515 | A1 | 10/2014 | Fish et al. |
| 2014/0304025 | A1 | 10/2014 | Steven et al. |
| 2014/0310072 | A1 | 10/2014 | Wojciechowski |
| 2014/0310155 | A1 | 10/2014 | Postrel |
| 2014/0310199 | A1 | 10/2014 | Hardman et al. |
| 2014/0315560 | A1 | 10/2014 | Smith et al. |
| 2014/0316838 | A1 | 10/2014 | Zhou et al. |
| 2014/0331235 | A1 | 11/2014 | Lee |
| 2014/0336960 | A1 | 11/2014 | Haghighat-kashani et al. |
| 2014/0344018 | A1 | 11/2014 | Thalken |
| 2014/0344019 | A1 | 11/2014 | Thalken |
| 2014/0344189 | A1 | 11/2014 | Ienaga et al. |
| 2014/0372150 | A1 | 12/2014 | Karle et al. |
| 2015/0019342 | A1 | 1/2015 | Gupta |
| 2015/0026035 | A1 | 1/2015 | Showalter |
| 2015/0045688 | A1 | 2/2015 | Nardi |
| 2015/0079578 | A1 | 3/2015 | Nardi |
| 2015/0094968 | A1 | 4/2015 | Jia et al. |
| 2015/0127515 | A1 | 5/2015 | Studnitzer et al. |
| 2015/0149249 | A1 | 5/2015 | Mansfield |
| 2015/0156030 | A1 | 6/2015 | Fadell et al. |
| 2015/0161736 | A1 | 6/2015 | Thomas |
| 2015/0170080 | A1 | 6/2015 | Kaushik |
| 2015/0186904 | A1 | 7/2015 | Guha et al. |
| 2015/0199774 | A1 | 7/2015 | Gottesman et al. |
| 2015/0221053 | A1 | 8/2015 | Tapley et al. |

| | | | |
|---|---|---|---|
| 2015/0242747 | A1 | 8/2015 | Packes et al. |
| 2015/0242946 | A1 | 8/2015 | Powell et al. |
| 2015/0248510 | A1 | 9/2015 | Meagher et al. |
| 2015/0254566 | A1 | 9/2015 | Chandramouli et al. |
| 2015/0269669 | A1 | 9/2015 | Gil et al. |
| 2015/0276238 | A1 | 10/2015 | Matsuoka et al. |
| 2015/0302303 | A1 | 10/2015 | Hakim |
| 2015/0310470 | A1 | 10/2015 | Mathew et al. |
| 2015/0317558 | A1 | 11/2015 | Adachi et al. |
| 2015/0339765 | A1 | 11/2015 | Dubey et al. |
| 2015/0339769 | A1 | 11/2015 | Deoliveira et al. |
| 2015/0348166 | A1 | 12/2015 | Trivedi et al. |
| 2015/0363851 | A1 | 12/2015 | Stella et al. |
| 2015/0373554 | A1 | 12/2015 | Freda et al. |
| 2015/0379439 | A1 | 12/2015 | Klein et al. |
| 2016/0033986 | A1 | 2/2016 | Kamel et al. |
| 2016/0050168 | A1 | 2/2016 | Zutphen |
| 2016/0055455 | A1 | 2/2016 | Hill et al. |
| 2016/0055507 | A1 | 2/2016 | Patil et al. |
| 2016/0055553 | A1 | 2/2016 | Hill et al. |
| 2016/0063626 | A1 | 3/2016 | Axelrod et al. |
| 2016/0092208 | A1 | 3/2016 | Nicol et al. |
| 2016/0098723 | A1* | 4/2016 | Feeney ................ G06Q 20/065 705/75 |
| 2016/0098770 | A1 | 4/2016 | Chang et al. |
| 2016/0109916 | A1 | 4/2016 | Li et al. |
| 2016/0117657 | A1 | 4/2016 | Forbes, Jr. et al. |
| 2016/0140521 | A1 | 5/2016 | Trivedi et al. |
| 2016/0180907 | A1 | 6/2016 | Friedman et al. |
| 2016/0247129 | A1 | 8/2016 | Song et al. |
| 2016/0253677 | A1 | 9/2016 | Azmi et al. |
| 2016/0256690 | A1 | 9/2016 | Cecchi et al. |
| 2016/0267587 | A1 | 9/2016 | Woltsovitch et al. |
| 2016/0283933 | A1 | 9/2016 | Orlando et al. |
| 2016/0292680 | A1* | 10/2016 | Wilson, Jr. ............. G06Q 40/06 |
| 2016/0300135 | A1 | 10/2016 | Moudy et al. |
| 2016/0300234 | A1 | 10/2016 | Moss-Pultz et al. |
| 2016/0307272 | A1 | 10/2016 | Thalken |
| 2016/0308783 | A1 | 10/2016 | Bookman et al. |
| 2016/0314545 | A1 | 10/2016 | Jessen |
| 2016/0321115 | A1 | 11/2016 | Thorpe et al. |
| 2016/0322835 | A1 | 11/2016 | Carlson et al. |
| 2016/0330027 | A1 | 11/2016 | Ebrahimi |
| 2016/0350671 | A1 | 12/2016 | Morris, II et al. |
| 2016/0358099 | A1 | 12/2016 | Sturlaugson et al. |
| 2016/0364767 | A1 | 12/2016 | Maugans, III |
| 2016/0364796 | A1 | 12/2016 | Rosen et al. |
| 2016/0379165 | A1 | 12/2016 | Moakley |
| 2016/0380886 | A1 | 12/2016 | Blair et al. |
| 2016/0380911 | A1 | 12/2016 | Bhandaru et al. |
| 2017/0004407 | A1 | 1/2017 | Benson et al. |
| 2017/0005515 | A1 | 1/2017 | Sanders et al. |
| 2017/0019496 | A1 | 1/2017 | Orbach |
| 2017/0019817 | A1 | 1/2017 | Senarath et al. |
| 2017/0048216 | A1 | 2/2017 | Chow et al. |
| 2017/0053552 | A1 | 2/2017 | Zhong et al. |
| 2017/0054608 | A1 | 2/2017 | Caputo et al. |
| 2017/0061535 | A1 | 3/2017 | Williams |
| 2017/0085545 | A1 | 3/2017 | Lohe et al. |
| 2017/0091791 | A1 | 3/2017 | Srinivasan et al. |
| 2017/0098291 | A1 | 4/2017 | Code et al. |
| 2017/0103385 | A1 | 4/2017 | Wilson, Jr. et al. |
| 2017/0103456 | A1 | 4/2017 | Parsells et al. |
| 2017/0111233 | A1 | 4/2017 | Kokkula et al. |
| 2017/0124668 | A1 | 5/2017 | Okamoto et al. |
| 2017/0132615 | A1 | 5/2017 | Castinado et al. |
| 2017/0132625 | A1 | 5/2017 | Kennedy |
| 2017/0140405 | A1 | 5/2017 | Gottemukkala et al. |
| 2017/0154374 | A1 | 6/2017 | Iglesias et al. |
| 2017/0169331 | A1 | 6/2017 | Garner |
| 2017/0193619 | A1* | 7/2017 | Rollins ................ G06Q 50/184 |
| 2017/0200260 | A1 | 7/2017 | Bhaskar et al. |
| 2017/0206604 | A1 | 7/2017 | Al-Masoud |
| 2017/0214522 | A1 | 7/2017 | Code et al. |
| 2017/0221029 | A1* | 8/2017 | Lund ................. G06Q 20/1235 |
| 2017/0232300 | A1 | 8/2017 | Tran et al. |
| 2017/0236094 | A1 | 8/2017 | Shah |
| 2017/0236136 | A1 | 8/2017 | He et al. |
| 2017/0236143 | A1 | 8/2017 | Code et al. |

(56) References Cited

U.S. PATENT DOCUMENTS

2017/0236222 A1 8/2017 Chen et al.
2017/0243025 A1 8/2017 Kurian et al.
2017/0243209 A1 8/2017 Johnsrud et al.
2017/0243290 A1 8/2017 Brown
2017/0250751 A1 8/2017 Kargieman et al.
2017/0262614 A1 9/2017 Vishnubhatla et al.
2017/0262761 A1 9/2017 Yan et al.
2017/0272441 A1 9/2017 Mcclintock et al.
2017/0284691 A1 10/2017 Sinha et al.
2017/0286086 A1 10/2017 Narasimhan et al.
2017/0286572 A1 10/2017 Hershey et al.
2017/0287090 A1 10/2017 Hunn et al.
2017/0288399 A1 10/2017 Fife
2017/0289111 A1 10/2017 Voell et al.
2017/0308802 A1 10/2017 Ramsøy et al.
2017/0308976 A1 10/2017 Eidelman et al.
2017/0322579 A1 11/2017 Goparaju et al.
2017/0325041 A1 11/2017 Kulavik
2017/0330058 A1 11/2017 Silberman et al.
2017/0333058 A1 11/2017 Cabot
2017/0338967 A1 11/2017 Lewison et al.
2017/0352041 A1 12/2017 Ramamurthy et al.
2017/0357984 A1 12/2017 Takamatsu et al.
2017/0358041 A1 12/2017 Forbes, Jr. et al.
2017/0372472 A1 12/2017 Takahashi et al.
2018/0004948 A1 1/2018 Martin et al.
2018/0012311 A1* 1/2018 Small .................. G06Q 20/389
2018/0018196 A1 1/2018 Dean et al.
2018/0018582 A1 1/2018 Unsal et al.
2018/0018723 A1 1/2018 Nagla et al.
2018/0025442 A1 1/2018 Isaacson et al.
2018/0032944 A1 2/2018 Sarvana et al.
2018/0039249 A1 2/2018 Johnson et al.
2018/0039962 A1 2/2018 Ren et al.
2018/0040007 A1 2/2018 Lane et al.
2018/0047111 A1 2/2018 Vieira et al.
2018/0063021 A1 3/2018 Beveridge et al.
2018/0063235 A1 3/2018 Beveridge et al.
2018/0068130 A1 3/2018 Chan et al.
2018/0075371 A1 3/2018 Lobachev et al.
2018/0075385 A1 3/2018 Condon et al.
2018/0075421 A1 3/2018 Serrano et al.
2018/0075527 A1 3/2018 Nagla et al.
2018/0089758 A1 3/2018 Stradling et al.
2018/0089760 A1 3/2018 Stradling et al.
2018/0091524 A1 3/2018 Setty et al.
2018/0096175 A1 4/2018 Schmeling et al.
2018/0096362 A1 4/2018 Kwan
2018/0101448 A1 4/2018 Ventura et al.
2018/0101842 A1 4/2018 Ventura et al.
2018/0113742 A1 4/2018 Chung et al.
2018/0114167 A1 4/2018 Bharti et al.
2018/0114205 A1 4/2018 Thomas et al.
2018/0114267 A1 4/2018 Khatami
2018/0120813 A1 5/2018 Coffman et al.
2018/0121829 A1 5/2018 Chowdhary et al.
2018/0123391 A1 5/2018 Lakamp et al.
2018/0129961 A1 5/2018 Kailas et al.
2018/0136633 A1 5/2018 Small et al.
2018/0137503 A1 5/2018 High et al.
2018/0139042 A1 5/2018 Binning et al.
2018/0144355 A1 5/2018 Holman et al.
2018/0144403 A1 5/2018 Heimowitz
2018/0165585 A1 6/2018 Saxena et al.
2018/0165611 A1 6/2018 Saxena et al.
2018/0167198 A1 6/2018 Muller et al.
2018/0173203 A1 6/2018 Freer et al.
2018/0174231 A1 6/2018 Chenard et al.
2018/0174255 A1 6/2018 Hunn et al.
2018/0176229 A1 6/2018 Bathen et al.
2018/0181979 A1* 6/2018 Frank .................... G06Q 50/02
2018/0182052 A1 6/2018 Panagos
2018/0183606 A1 6/2018 High et al.
2018/0189753 A1 7/2018 Konda et al.
2018/0204111 A1 7/2018 Zadeh et al.
2018/0204213 A1 7/2018 Zappier et al.
2018/0205555 A1* 7/2018 Watanabe ............ H04L 9/3226
2018/0211115 A1 7/2018 Klein
2018/0211313 A1 7/2018 Narahari
2018/0216946 A1 8/2018 Gueye
2018/0218027 A1 8/2018 Cronie et al.
2018/0218069 A1 8/2018 Rege et al.
2018/0218176 A1 8/2018 Voorhees et al.
2018/0225653 A1 8/2018 Vokes et al.
2018/0225660 A1* 8/2018 Chapman .............. G06Q 20/10
2018/0232804 A1 8/2018 Mack
2018/0240187 A1 8/2018 Lee et al.
2018/0241573 A1* 8/2018 Ramathal .............. G06Q 20/02
2018/0246883 A1 8/2018 Wang
2018/0247191 A1 8/2018 Katz et al.
2018/0247320 A1 8/2018 Gauld
2018/0253451 A1 9/2018 Callan et al.
2018/0257306 A1* 9/2018 Mattingly ............. B33Y 50/00
2018/0260872 A1 9/2018 Ali
2018/0267832 A1 9/2018 Biener et al.
2018/0268152 A1 9/2018 Cuomo et al.
2018/0268337 A1 9/2018 Miller et al.
2018/0276625 A1 9/2018 Saye et al.
2018/0284741 A1 10/2018 Cella et al.
2018/0285810 A1 10/2018 Ramachandran et al.
2018/0285839 A1 10/2018 Yang et al.
2018/0285971 A1 10/2018 Rosenoer
2018/0285996 A1* 10/2018 Ma ....................... H04L 9/0637
2018/0288637 A1 10/2018 Laselva et al.
2018/0308184 A1 10/2018 Pankanti et al.
2018/0313798 A1 11/2018 Chokshi et al.
2018/0314809 A1 11/2018 Mintz et al.
2018/0315056 A1 11/2018 Klavins
2018/0322587 A1 11/2018 Linne
2018/0322588 A1 11/2018 Linne
2018/0322597 A1 11/2018 Sher
2018/0325482 A1 11/2018 Williams
2018/0329399 A1 11/2018 Neelakandan et al.
2018/0337820 A1 11/2018 Chen et al.
2018/0342171 A1 11/2018 Darnell et al.
2018/0356800 A1 12/2018 Chao et al.
2018/0357162 A1 12/2018 Khandka et al.
2018/0365764 A1 12/2018 Nelson
2019/0005469 A1 1/2019 Dhupkar et al.
2019/0005595 A1* 1/2019 Tautenhan ........... H04L 9/3236
2019/0012660 A1 1/2019 Masters
2019/0013932 A1 1/2019 Maino et al.
2019/0018399 A1 1/2019 Shah et al.
2019/0019249 A1 1/2019 Bhattacharjee et al.
2019/0028278 A1 1/2019 Gilson
2019/0036932 A1 1/2019 Bathen et al.
2019/0057362 A1 2/2019 Wright et al.
2019/0080404 A1* 3/2019 Molinari ............. G06Q 20/065
2019/0081789 A1 3/2019 Madisetti et al.
2019/0086891 A1 3/2019 Kawamoto et al.
2019/0087893 A1 3/2019 Pellew
2019/0096001 A1 3/2019 Kamrava
2019/0096210 A1 3/2019 Jarvis et al.
2019/0101896 A1 4/2019 Cantrell et al.
2019/0101985 A1 4/2019 Sajda et al.
2019/0102511 A1 4/2019 Murray et al.
2019/0102835 A1 4/2019 Bjonerud et al.
2019/0108227 A1 4/2019 Ikezoye et al.
2019/0114706 A1 4/2019 Bell et al.
2019/0122364 A1 4/2019 Zhang et al.
2019/0123561 A1 4/2019 Kudo
2019/0124100 A1 4/2019 Shannon et al.
2019/0129824 A1 5/2019 Radhakrishnan et al.
2019/0130094 A1 5/2019 Votaw et al.
2019/0130399 A1 5/2019 Wright et al.
2019/0138333 A1 5/2019 Deutsch et al.
2019/0138662 A1 5/2019 Deutsch et al.
2019/0139159 A1 5/2019 Sarker et al.
2019/0141596 A1 5/2019 Gay et al.
2019/0147174 A1 5/2019 Narasimhan et al.
2019/0147551 A1 5/2019 Sun et al.
2019/0155225 A1 5/2019 Kothandaraman et al.
2019/0155997 A1 5/2019 Vos et al.
2019/0156304 A1 5/2019 Hudson et al.

(56) References Cited

U.S. PATENT DOCUMENTS

2019/0156336 A1 5/2019 Kasthuri
2019/0163896 A1 5/2019 Balaraman et al.
2019/0164136 A1 5/2019 Gray
2019/0164221 A1 5/2019 Hill et al.
2019/0165577 A1 5/2019 Carr et al.
2019/0165931 A1 5/2019 Bharti et al.
2019/0171438 A1 6/2019 Franchitti
2019/0173884 A1 6/2019 Vincent
2019/0175763 A1 6/2019 Shapiro et al.
2019/0180266 A1* 6/2019 Sidhu .................... H04L 63/102
2019/0180358 A1 6/2019 Nandan et al.
2019/0188046 A1 6/2019 Florissi et al.
2019/0188697 A1 6/2019 Wu et al.
2019/0197180 A1 6/2019 Jersin et al.
2019/0197404 A1 6/2019 Wang et al.
2019/0197551 A1 6/2019 Dickinson et al.
2019/0197635 A1 6/2019 Kim
2019/0220836 A1* 7/2019 Caldwell .................. H04L 9/50
2019/0228351 A1 7/2019 Simpson et al.
2019/0228409 A1 7/2019 Madisetti et al.
2019/0228495 A1 7/2019 Tremblay et al.
2019/0229890 A1 7/2019 Brehmer et al.
2019/0230046 A1 7/2019 Djukic et al.
2019/0236489 A1 8/2019 Koudal et al.
2019/0237169 A1 8/2019 Culver et al.
2019/0238486 A1 8/2019 Zizka
2019/0238525 A1 8/2019 Padmanabhan et al.
2019/0243631 A1 8/2019 Sharma et al.
2019/0244227 A1* 8/2019 Inoue .................. H04L 67/1093
2019/0244287 A1 8/2019 Prasad Datta et al.
2019/0247662 A1 8/2019 Poltroak
2019/0251199 A1 8/2019 Klianev
2019/0251295 A1 8/2019 Vieyra
2019/0251489 A1 8/2019 Berti et al.
2019/0251575 A1 8/2019 Berti et al.
2019/0252880 A1 8/2019 Watanabe et al.
2019/0272591 A1 9/2019 Leonard et al.
2019/0278950 A1 9/2019 Iuzifovich et al.
2019/0287079 A1 9/2019 Shiraishi et al.
2019/0287168 A1 9/2019 Williams et al.
2019/0287195 A1 9/2019 Lee et al.
2019/0287283 A1 9/2019 Lin et al.
2019/0289454 A1 9/2019 Inoue
2019/0295163 A1 9/2019 Zurick et al.
2019/0303893 A1 10/2019 Ramasamy et al.
2019/0303926 A1 10/2019 Yantis et al.
2019/0304595 A1 10/2019 Bergman et al.
2019/0305957 A1 10/2019 Reddy et al.
2019/0311428 A1 10/2019 Adjaoute
2019/0317935 A1 10/2019 Berti et al.
2019/0319968 A1 10/2019 Mehta
2019/0324781 A1 10/2019 Ramamurthy et al.
2019/0325044 A1 10/2019 Gray
2019/0332508 A1 10/2019 Goyal et al.
2019/0333142 A1 10/2019 Thomas
2019/0340586 A1 11/2019 Sheng et al.
2019/0340685 A1* 11/2019 Wade ................. G06Q 20/4014
2019/0340715 A1 11/2019 Cella
2019/0342078 A1* 11/2019 Li ........................... G06F 21/64
2019/0342182 A1 11/2019 Dhanabalan et al.
2019/0354922 A1 11/2019 Berti et al.
2019/0356473 A1 11/2019 Rosenoer et al.
2019/0370601 A1 12/2019 Anil Kumar et al.
2019/0372345 A1 12/2019 Bain et al.
2019/0378051 A1 12/2019 Widmann et al.
2019/0384408 A1 12/2019 Iyer et al.
2019/0384870 A1 12/2019 Shiraishi et al.
2020/0026560 A1 1/2020 Singh et al.
2020/0027016 A1 1/2020 Rouhani et al.
2020/0027157 A1 1/2020 Xu et al.
2020/0027159 A1 1/2020 Blank et al.
2020/0029884 A1 1/2020 Arai et al.
2020/0030608 A1 1/2020 Halpern
2020/0034197 A1 1/2020 Nagpal et al.
2020/0058081 A1 2/2020 Saneyoshi et al.
2020/0059097 A1 2/2020 Bangalore et al.
2020/0059510 A1 2/2020 Russom et al.
2020/0082735 A1 3/2020 Nel et al.
2020/0086127 A1 3/2020 Intrator
2020/0111158 A1 4/2020 Collins et al.
2020/0145210 A1 5/2020 Thekadath et al.
2020/0160465 A1 5/2020 Spangenberg et al.
2020/0179810 A1* 6/2020 Cunningham ........ A63F 13/352
2020/0184556 A1 6/2020 Cella
2020/0186355 A1 6/2020 Davies
2020/0202038 A1 6/2020 Zhang et al.
2020/0211104 A1 7/2020 Mack
2020/0211109 A1 7/2020 Bean et al.
2020/0218767 A1 7/2020 Ritchey et al.
2020/0219093 A1 7/2020 Malhotra et al.
2020/0234605 A1 7/2020 Shuart
2020/0250683 A1 8/2020 Padmanabhan et al.
2020/0250776 A1 8/2020 Spangenberg et al.
2020/0265329 A1 8/2020 Thomsen et al.
2020/0302523 A1 9/2020 Cella
2020/0320057 A1 10/2020 Yan
2020/0379537 A1 12/2020 Henson et al.
2020/0380889 A1 12/2020 Fitzpatrick et al.
2020/0394708 A1 12/2020 Cella
2020/0412731 A1 12/2020 Gulbrandsen
2021/0004720 A1 1/2021 Henri et al.
2021/0004923 A1 1/2021 Mackenzie et al.
2021/0082033 A1 3/2021 Yao
2021/0103984 A1 4/2021 Leonard et al.
2021/0118067 A1 4/2021 Muenz et al.
2021/0176638 A1 6/2021 Heldt-sheller et al.
2021/0192412 A1 6/2021 Krishnaswamy
2021/0224903 A1 7/2021 Mathiesen-ohman et al.
2021/0248514 A1 8/2021 Cella et al.
2021/0272179 A1 9/2021 Sanjeevaiah Krishnaiah
2021/0294791 A1 9/2021 Narayanaswamy et al.
2021/0312291 A1 10/2021 Katz et al.
2021/0358032 A1 11/2021 Cella et al.
2022/0137585 A1 5/2022 Turan et al.
2022/0366494 A1 11/2022 Cella et al.
2024/0070236 A1 2/2024 Cella

FOREIGN PATENT DOCUMENTS

CN 107609848 A 1/2018
CN 108667618 A 10/2018
JP 2002233053 A 8/2002
JP 2018007311 A 1/2018
JP 6363254 B1 7/2018
JP 2018525729 A 9/2018
JP 2019516274 A 6/2019
WO 9746929 A2 12/1997
WO 2001061579 8/2001
WO 02103879 A1 12/2002
WO 03012573 A2 2/2003
WO 2008109641 A2 9/2008
WO 2009039500 A1 3/2009
WO 2010081165 A2 7/2010
WO 2010083334 A1 7/2010
WO 2011057173 A2 5/2011
WO 2012027478 A1 3/2012
WO 2013001392 A1 1/2013
WO 2013126800 A1 8/2013
WO 2014098796 A1 6/2014
WO 2015178609 A1 11/2015
WO 2017007692 A1 1/2017
WO 2017059866 A2 4/2017
WO 2017115141 A1 7/2017
WO 2017163090 A1 9/2017
WO 2017187397 A1 11/2017
WO 2018014123 A1 1/2018
WO 2018039722 A1 3/2018
WO 2018148732 A2 8/2018
WO 2018152519 A1 8/2018
WO 2018165155 A1 9/2018
WO 2018213630 A1 11/2018
WO 2019021311 A1 1/2019
WO 2019067801 A1 4/2019
WO 2019083974 A1 5/2019

(56) References Cited

FOREIGN PATENT DOCUMENTS

| | | | |
|---|---|---|---|
| WO | 2019122977 | A1 | 6/2019 |
| WO | 2019175837 | A1 | 9/2019 |
| WO | 2019217323 | A1 | 11/2019 |
| WO | 2019223373 | A1 | 11/2019 |
| WO | 2020006639 | A1 | 1/2020 |
| WO | 2020091746 | A1 | 5/2020 |
| WO | 2020092426 | A2 | 5/2020 |
| WO | 2020092446 | A2 | 5/2020 |
| WO | 2020092426 | A3 | 8/2020 |
| WO | 2020092446 | A3 | 8/2020 |
| WO | 2020178752 | A1 | 9/2020 |
| WO | 2021158702 | A1 | 8/2021 |
| WO | 2022016102 | A1 | 1/2022 |
| WO | 2022133210 | A2 | 6/2022 |
| WO | 2022133210 | A3 | 8/2022 |
| WO | 2022204425 | A1 | 9/2022 |

OTHER PUBLICATIONS

R. Xu, L. Zhang, H. Zhao and Y. Peng, "Design of Network Media's Digital Rights Management Scheme Based on Blockchain Technology," 2017 IEEE 13th International Symposium on Autonomous Decentralized System (ISADS), Bangkok, Thailand, 2017, pp. 128-133. (Year: 2017).*

Angrish, Atin et al, "A Case Study for Blockchain in Manufacturing: "FabRec": A Prototype for Peer-to-Peer Network of Manufacturing Nodes", 46th SME North American Manufacturing Research Conference, NAMRC 46, Texas, USA, Apr. 3, 2018, https://doi.org/10.48550/arXiv.1804.01083, pp. 1-13 (Year: 2018).*

Neural Networks for Data Processing, Ecole Superieure de Physique et Chimie Industrielles de la Ville, https://cordis.europa.eu/project/id/ST2*0422 (accessed on Feb. 1, 2021), Oct. 2, 1990, 3 pages.

"Scikit-learn: machine learning in Python", from Wayback Machine, http://web.archive.org/web/20190228205841/https://scikit-learn.org/stable/, retrieved from the internet on Aug. 11, 2021, Feb. 28, 2019, 3 pages.

"Scikit-Learn: Machine Learning in Python", from Wayback Machine, http://web.archive.org/web/20210525051513/https://scikit-learn.org/stable/, retrieved from the internet on Jun. 1, 2021, May 25, 2021, 2 pages.

Cant, Bart , et al., "Smart Contracts in Financial Services: Getting from Hype to Reality", Capgemini Consulting, 2016, 25 pages.

Capgemini Report , "Smart Contracts in Financial Services: getting from Hype to Reality", 2016, pp. 1-25.

Chance, C. , "Are Smart Contracts Contracts? Talking Tech looks at the Concepts and Realities of Smart Contracts", 2017, 9 pages.

Clark, Birgit , "Blockchain and IP Law: A Match Made in Crypto Heaven", [online], WIPO Magazine, published Feb. 2018, available at: < https://www.wipo.int/wipo_magazine/en/2018/01/article_0005.html >, 2018, 6 pages.

Infosys Whitepaper , "Robotic Process Automation (RPA) to Accelerate Mortgage Processing", 2018, pp. 1-8.

Krishnamurthy, Dheepak , et al., "Energy Storage Arbitrage Under Day-Ahead and Real-Time Price Uncertainty", IEEE Transactions on Power Systems, vol. 33, No. 1, Jan. 2008, 10 pages.

PCT/US19/58647 , "International Application Serial No. PCT/US19/58647, International Preliminary Report on Patentability mailed May 14, 2021", Strong Force TX Portfolio 2018, LLC, 21 pages.

PCT/US19/58647 , "International Application Serial No. PCT/US19/58647, International Search Report and Written Opinion mailed Jul. 7, 2020", Strong Force TX Portfolio 2018, LLC, 27 pages.

PCT/US19/58647 , "International Application Serial No. PCT/US19/58647, Invitation to Pay Additional Fees and, Where Applicable, Protest Fee mailed Apr. 24, 2020", Strong Force TX Portfolio 2018, LLC, 7 pages.

PCT/US19/58671 , "International Application Serial No. PCT/US19/58671, International Preliminary Report on Patentability mailed May 14, 2021", Strong Force TX Portfolio 2018, LLC, 15 pages.

PCT/US19/58671 , "International Application Serial No. PCT/US19/58671, International Search Report and Written Opinion mailed Jul. 7, 2020", Strong Force TX Portfolio 2018, LLC, 21 pages.

PCT/US19/58671 , "International Application Serial No. PCT/US19/58671, Invitation to Pay Additional Fees and, Where Applicable, Protest Fee mailed Apr. 24, 2020", 7 pages.

PCT/US2019/030934 , "International Application Serial No. PCT/US2019/030934, International Preliminary Report on Patentability mailed Nov. 10, 2020", Strong Force TX Portfolio 2018, LLC, 77 pages.

PCT/US2019/030934 , "International Application Serial No. PCT/US2019/030934, International Search Report and Written Opinion mailed Oct. 11, 2019", Strong Force TX Portfolio 2018, LLC, 89 pages.

PCT/US2019/030934 , "International Application Serial No. PCT/US2019/030934, Invitation to Pay Additional Fees mailed Jul. 30, 2019", Strong Force TX Portfolio 2018, LLC, 8 pages.

PCT/US2021/016473 , "International Application Serial No. PCT/US2021/016473, International Search Report and Written Opinion mailed May 24, 2021", Strong Force TX Portfolio 2018, LLC, 18 pages.

PCT/US2021/016473 , "International Application Serial No. PCT/US2021/016473, Invitation to Pay Additional Fees mailed Mar. 18, 2021", Strong Force TX Portfolio 2018, LLC, 3 pages.

PCT/US2021/042050 , "International Application Serial No. PCT/US2021/042050, International Search Report and Written Opinion mailed Sep. 24, 2021", Strong Force TX Portfolio 2018, LLC, 18 pages.

Puri, Vikram , et al., "A hybrid artificial intelligence and internet of things model for generation of renewable resource of energy", IEEE Access 7 (2019), 2019, pp. 111181-111191.

Raza, Muhammad Qamar, et al., "A review on artificial intelligence based load demand forecasting techniques for smart grid and buildings", Renewable and Sustainable Energy Reviews 50 (2015), 2015, pp. 1352-1372.

Riady, Yos , "Smart Contract Extensibilty with Wrapped Tokens", Jul. 13, 2019, 13 pages.

Shields, Ronan , "Media futures trading is one step closer as NIYIAX raises $5.6M", The Drum, Oct. 19, 2017, 6 pages.

spencepc.com , "Four Types of Intellectual Property for Business", viewed at https:// www.spencepc.com/intellectual-property-basics/four-types-of-intellectual property-for-businesses/, Apr. 4, 2016, 3 pages.

Szabo, Nick , et al., "Smart Contracts: 12 Use Cases for Business & Beyond", Chamber of Digital Commerce, Dec. 2016, 56 pages.

Taylor, Patrick , "The Robots are coming to Corporate Finance", Forbes Technology Council, May 1, 2018, pp. 1-5.

Ullah, Qazi Zia, et al., "Adaptive resource utilization prediction system for infrastructure as a service cloud", Computational intelligence and neuroscience 2017, 2017, 13 pages.

Zeng, Yaxiong , et al., "Distributed solar renewable generation: Option contracts with renewable energy credit uncertainty", Energy Economics, vol. 48, 2015, pp. 295-305.

"Making sense of IoT", (Internet of Things)—the IoT business guide, May 27, 2015, 61 pages.

19799943.6 , "European Application Serial No. 19799943.6, Partial Supplementary Search Report, Communication Pursuant to Rule 164(1) EPC mailed Jan. 21, 2022", Strong Force TX Portfolio 2018, LLC, 13 pages.

Bashir, Imran , "Mastering Blockchain", Packt Publishing, XP055872144JSBN: 978-1-78712-544-5pages ToC, 16-29,358-368, Mar. 17, 2017, 51 pages.

Berka, P. , "Using The LISp-Miner System For Credit Risk Assessment", Neural Network World 26.5: Czech Technical University, Prague., 2016, 22 pages.

BIS , "What is distributed ledger technology", available at: < https://www.bis.org/publ/qtrpdf/r_qt1709y.htm, Sep. 2017, 3 pages.

Dineshreddy, Vemula , et al., "Towards on "Internet of Things" Framework for Financial Services Sector", IEEE Xplore, 3rd International Conference on Recent Advances in Information Technology(RAIT-2016)., Jul. 9, 2016, 5 pages.

(56) References Cited

OTHER PUBLICATIONS

Dineshreddy, Vemula , et al., "Towards on "Internet of Things" Framework for Financial Services Sector", IEEE Xplore, 3rd International Conference on Recent Advances in Information Technology, 2016, 5 pages.
Eckenrode, Jim , "The derivative effect: How financial services can make IoT technology pay off", Deloitte Insights, Oct. 2015, 12 pages.
Fang, Xuewei , et al., "Study on Metal Deposit in the Fused-coating Based Additive Manufacturing", Procedia Cirp, vol. 55, XP055872287,NL ISSN: 2212-8271, DOI: 10.1016/j.procir.2016.08.034Retrieved from the Internets RL:https://www.sciencedirect.com/science/article/pii/S2212827116309234, Oct. 6, 2016, pp. 115-121.
Gupta, Yachna , et al., "A software for insurance consultancy", 2013 International Conference on Advances in Computing, Communications and Informatics (ICACCI), 2013, pp. 1288-1292.
Holliday, Joanne , et al., "Epidemic algorithms for replicated databases", IEEE Transactions on Knowledge and Data Engineering (vol. 15 Issue 5), 2003, pp. 1218-1238.
Isaja, Mauro , et al., "Distributed ledger technology for decentralization of manufacturing processes", IEEE Industrial Cyber-Physical Systems (ICPS), 2018, pp. 696-701.
Kumar, S.F.P. , et al., "Robotic Process Automation (RPA) to Accelerate Mortgage Processing", Infosys Limited, Bengaluru, India, 2018, 8 pages.
Leber, Jessica , "Can a Credit Score be Crowdsourced ?", MIT Technology Review, Jun. 7, 2012, 4 pages.
Lu, Yuan , et al., "ZebraLancer: Private and Anonymous Crowdsourcing System atop Open Blockchain", New Jersey Institute of Technology, arXiv:1803.01256v1, Mar. 3, 2018, 16 pages.
Memos, Dimitris , "Shaking up the Maritime Industry through Open Data and Crowdsourcing", International Journal of Digital Business, vol. 2017, Issue 1, Apr. 2017, pp. 1-16.
Namvar, Anahita , et al., "Credit risk prediction in an imbalanced social lending environment", retrieved from the Internet, https://doi.org/10.48550/arXiv.1805.00801, 2018, pp. 1-11.
O'donovan, Caroline , "What If You Could Crowdsource A Loan", BuzzFeed News, Apr. 17, 2015, 5 pages.
PCT/US2021/064029 , "International Application Serial No. PCT/US2021/064029, Invitation to Pay Additional Fees and, Where Applicable, Protest Fee mailed Mar. 16, 2022", Strong Force TX Portfolio 2018, LLC, 3 pages.
Sandner, Philipp , et al., "Application of Blockchain Technology in the Manufacturing Industry", Frankfurt School Blockchain Center Internet Article, XP055872401 .Retrieved from the Internet:URL:http://explore-ip.com/2017_Blockchain-Technology-in-Manufacturing.pdf [retrieved on Dec. 13, 2021], Nov. 18, 2017, 23 pages.
Shah, Agam , "The Chain Gang", XP055872061 Retrieved from the Internets RL:https://asmedigitalcollection.asme.org/memagazineselect/article/140/05/30/369470/The-Chain-GangManufacturing-supply-chains-aremore [retrieved on Decc. 13, 2021], May 1, 2018, 13 pages.
Stocker, Carsten , et al., "Erfahrungsbericht Genesis of Things Project Ansätze und Herausforderungen bei der Integration von Blockchain in der additiven Fertigung und Geschäftsmodelle", www.digitaletechnologien.deINTERNET Article, XP055872377, Retrieved from the InterneLU RL:https://www.digitaletechnologien.de/DT/Redaktion/DE/Downloads/2018-paice-hmiworkshop-vortrag-Blechschmidt-St%C3%B6ckert.pdf? blob=publicationFile&v=2, Apr. 24, 2018, 11 pages.
Trouton, Stuart , et al., "3D opportunity for blockchain", DeloitteINTERNET Article, XP055539847, Retrieved from the InternetsRL:https://www2.deloitte.com/content/dam/insights/us/articles/3255_3Dopportunity_blockchain/DUP_3D-opportunity_blockchain.pdf [retrieved on Jan. 9, 2019], Nov. 17, 2016, 20 pages.
Wang, Qing , et al., "Dynamic Spectrum Allocation under Cognitive Cell Network for M2M Applications", 2012 Conference Record of the Forty Sixth Asilomar Conference on Signals, Systems and Computers (Asilomar), 2012, pp. 596-600.
U.S. Appl. No. 17/332,700, filed May 27, 2021, Pending, Charles Howard Cella et al.
PCT/US2021/042050, Jul. 16, 2021, Pending, Charles Howard Cella et al.
U.S. Appl. No. 17/554,663, filed Dec. 17, 2021, Pending, Charles Howard Cella et al.
PCT/US2021/064029, Dec. 17, 2021, Pending, Charles Howard Cella et al.
"Amazon EMR pricing [online]", available at: < https://web.archive.Org/web/20170717162329/https:// aws.amazon.com/emr/pricing/ >, Jul. 17, 2017, 5 pages.
11202010731V, , "Singapore Application Serial No. 11202010731V, Written Opinion mailed Aug. 11, 2022", Strong Force TX Portfolio 2018, LLC, 8 pages.
11202104329S, , "Singapore Application No. 11202104329S, Search Report mailed Mar. 6, 2023", Strong Force TX Portfolio 2018, LLC, 9 page.
11202104330X, , "Singapore Application No. 11202104330X, Written Opinion mailed Apr. 4, 2023", Strong Force TX Portfolio 2018, LLC, 12 pages.
19799943.6, , "European Application Serial No. 19799943.6, Extended European Search Report mailed Apr. 25, 2022", Strong Force TX Portfolio 2018, LLC, 13 pages.
19878940.6, , "European Application Serial No. 19878940.6, Extended European Search Report mailed Jun. 14, 2022", Strong Force TX Portfolio 2018, LLC, 7 pages.
19880153.2, , "European Application Serial No. 19880153.2, Extended European Search Report mailed May 17, 2022", 10 pages.
Abji, N. et al., "An auction-based approach to spectrum allocation using multi-agent reinforcement learning", 21st Annual IEEE International Symposium on Personal, Indoor and Mobile Radio Communications, Istanbul, Turkey, https://ieeexplore.ieee.org/document/5671682., 2010, pp. 2233-2238.
Anagnoste, Sorin , "The road to intelligent automation in the energy sector", Management Dynamics in the Knowledge Economy 6.3, 2018, pp. 489-502.
Ausubel, Lawrence M. et al., "Using forward markets to improve electricity market design", Utilities Policy 18.4, 6 pages.
Baltaoglu, Sevi et al., "Algorithmic Bidding for Virtual Trading in Electricity Markets", IEEE Journal of Latex Class Files vol. 14 No. 8, Aug. 2015, 12 pages.
Bashir, Imran , "Mastering Blockchain", Packt Publishing, XP055393678, ISBN: 978-1-78712-544-5, Mar. 17, 2017, 531 pages.
Batra, Gaurav et al., "Improving the semiconductor industry through advanced analytics", [online] Mckinsey and Company, available at: < https://www.mckinsey.com/industries/semiconductors/our-insights/improving-the-semiconductor-industry-through-advanced-analytics, Mar. 11, 2016, 18 pages.
Bernard, Marr , "What is Digital Twin Technology, and why is it so important?", Forbes.com [online], available at: < https://www.forbes.com/sites/bernardmarr/2017/03/06/what-is-digital-twin-technology-and-why-is-it-so-important/?sh=54de02dd2e2a >, Mar. 6, 2017, 5 pages.
Berry, David , "The market for tradable renewable energy credits", Ecological Economics, vol. 42, Issue 3 ISSN 0921-8009, (https://www.sciencedirect.com/science/article/pii/S0921800902001283), 2002, pp. 369-379.
Bessembinder, Hendrik et al., "Equilibrium Pricing and Optimal Hedging in Electricity Forward Markets", The Journal of Finance, vol. LVII, No. 3,, Jun. 2002, 37 pages.
Bird, et al., "Distributed (green) data centers: A new concept for energy, computing, and telecommunications", 2013 International Energy Initiative published by Elsevier Inc., 2013, pp. 83-91.
Bitcointaxesapi, , "Integrate BitcoinTaxes into wallets or exchanges", available at: < https://web.archive.Org/web/20170618155341/https://bitcoin.tax/api >, Jun. 18, 2017, 8 pages.
Cain, Collin et al., "A Common Sense Guide to Wholesale Electric Markets", [online] Published Apr. 2007, available at: < https://www.bateswhite.com/media/publication/55_media.741 .pdf >, 2017, 42 pages.

(56) References Cited

OTHER PUBLICATIONS

Cheng, Meng et al., "Benefits of using virtual energy storage system for power system frequency response", Applied Energy 194, May 15, 2017, pp. 376-385.
Chinthalapati, V.L. Raju et al., "A Simultaneous Deterministic Pertubation Actor-Critic Algorithm with an Application to Optimal Mortgage Refinancing,", 45th IEEE Conference on Decision & Control, Dec. 2006, pp. 4151-4156.
CME Group, , "Trading the Curve in Energies", [online] CME Group, published on Jul. 10, 2017, available at: < https:// www.cmegroup.com/education/whitepapers/trading-the-curve-in-energies.html >, Jul. 10, 2017, 4 pages.
Crozter, Daniel V. , "Energy Storage Myths", Fractal [online], available at: < https://www.energystorageconsultants.com/energy-storage-arbitrage/, Jun. 17, 2016, 6 pages.
Dieterich, Vincent et al., "Application of Blockchain Technology in the Manufacturing Industry", Frankfurt School Blockchain Center, Germany, Nov. 30, 2017, pp. 1-23.
Fagan, Mark et al., "The Use of Petroleum Futures Markets as a Hedge Tool in Procurement of Railroad Fuel", Transportation Research Forum, 24th Annual Meeting, vol. 24, No. 1, 1983, 12 pages.
Fan, Sizheng et al., "Hybrid blockchain-based resource trading system for federated learning in edge computing", IEEE Internet of Things Journal, 8(4), 2020, 2252-2264.
Forbes, Alex , "Time to Befriend the Digital Twins", available at: <https://www.ge.com/power/transform/article.transform.articles.2017.oct.time-to-befriend-the-digital-t >, Oct. 30, 2017, 5 pages.
Fujiwara, Ikki et al., "Applying double-sided combinational auctions to resource allocation in cloud computing", 10th IEEE/IPSJ International Symposium on Applications and the Internet. IEEE,, 2010, 8 pages.
Gupta, Prashant , "Regularization in Machine Learning", available at: < https://towardsdatascience.com/regularization-in-machine-learning-76441ddcf99a >, 2017, 12 pages.
Heap, Imogen , "Blockchain could help musicians make money again", https://hbr.org/2017/06/blockchain-could-help-musicians-make-money-again, 2017, 7 pages.
Janiesch, Christian et al., "The Internet-of-Things Meets Business Process Management: Mutual Benefits and Challenges", retrieved from internet, https://arxiv.org/abs/1709.03628., Sep. 11, 2017, 9 pages.
Javed, Barkha et al., "Cloud Market Maker: An automated dynamic pricing marketplace for cloud users", Future Generation Computer Systems, vol. 54 https://www.sciencedirect.com/science/article/pii/S0167739X15002058., 2016, 16 pages.
Jin, Yu et al., "A Data-Driven Approach to Predict Default Risk of Loan for Online Peer-to-Peer (P2P) Lending", 2015 Fifth International Conference on Communication Systems and Network Technologies, Apr. 4-6, 2015, pp. 609-613.
Kelly-Detwiler, Peter , "Stem Adding Artifical Intelligence to Storage and Branching out to New Markets", Forbes.com [online], available at: < https://www.forbes.com/sites/peterdetwiler/2018/01/08/stem-adding-artificial-intelligence-to-storage-and-branching-out-to-new-markets/ (Year: 2018), Jan. 8, 2018, 7 pages.
Kuo, Ping-Huan et al., "An electricity price forecasting model by hybrid structured deep neural networks", Sustainability 10.4, Apr. 21, 2018, 17 pages.
Lacity, Mary et al., "Robotic process automation: mature capabilities in the energy sector", 2015, 19 Pages.
Lee, et al., "Blockchain-based secure firmware update for embedded devices in an Internet of Things environment", 2017, pp. 1152-1167.
Leonhard, Robert D. et al., "Developing Renewable Energy Credits as Cryptocurrencies on Ethereum's Blockchain", Social Science Research Network, 2016, pp. 1-15.
Luo, Liang et al., "A resource scheduling algorithm of cloud computing based on energy efficient optimization methods", 2012 International Green Computing Conference (IGCC). IEEE, 2012, 6 pages.
Malini, A. et al., "Technological innovations in the banking sector in India: An analysis", 2017 International Conference on Technological Advancements in Power and Energy (TAP Energy), 2017, pp. 1-5.
Min, Zaw et al., "Facilities management added value in closing the energy performance gap", International Journal of Sustainable Built Environment, 2016, 23 pages.
Ogiela, Marek R. et al., "Security of Distributed Ledger Solutions Based on Blockchain Technologies", IEEE 32nd International Conference on Advanced Information Networking and Applications (AINA), May 2018, pp. 1089-1095.
Oustry, Francois , "Blockchain based Solutions for Intellectual Property Management", medium.com [online] available at: <https://medium.com/@foustry/blockchain-based-solutions-for-intellectual-property-management-2ba14b51d5f6 >, May 21, 2017.
PCT/US2021/016473, , "International Application Serial No. PCT/US2021/016473, International Preliminary Report on Patentability mailed Aug. 18, 2022", Strong Force TX Portfolio 2018, LLC, 13 pages.
PCT/US2021/042050, , "International Application Serial No. PCT/US2021/042050, International Preliminary Report on Patentability mailed Jan. 26, 2023", Strong Force TX Portfolio 2018, LLC, 12 pages.
PCT/US2021/064029, , "International Application Serial No. PCT/US2021/064029, International Preliminary Report on Patentability mailed Jun. 13, 2023", Strong Force TX Portfolio 2018, LLC, 23 pages.
PCT/US2021/064029, , "International Application Serial No. PCT/US2021/064029, International Search Report and Written Opinion mailed Jul. 1, 2022", Strong Force TX Portfolio 2018, LLC, 36 pages.
PCT/US2022/021783, , "International Application Serial No. PCT/US2022/021783, International Preliminary Report on Patentability mailed Oct. 5, 2023", Strong Force TX Portfolio 2018, LLC, 9 pages.
PCT/US2022/021783, , "International Application Serial No. PCT/US2022/021783, International Search Report and Written Opinion mailed Jul. 7, 2022", Strong Force TX Portfolio 2018, LLC, 13 pages.
Pon, Bruce , "Blockchain will usher in the era of decentralised computing", LSE Business Review, 2016, pp. 1-5.
Reddy, Y.B et al., "Hybrid Approach for Spectrum Bidding in Wireless Communications for Maximizing the Profit", Fifth International Conference on Information Technology: New Generations, https://ieeexplore.ieee.org/document/4492503., 2008, pp. 341-341.
Ren, et al., "Carbon-Aware Energy Capacity Planning for Datacenters", IEEE; (Ren_2012.pdf;, 2012, pp. 391-400.
Ren, Qilei et al., "Intelligent design and implementation of blockchain and Internet of things-based traffic system", International Journal of Distributed Sensor Networks, 15(8), 1550147719870653., 2019, 12 pages.
Rooney, Kate , "Your Guide to Cryptocurrency Regulations Around the World and Where They are Headed", CNBC.com, Mar. 27, 2018, pp. 1-13.
Saraf, Chinmay et al., "Blockchain platforms: A compendium", IEEE International Conference on Innovative Research and Development (ICIRD), 2018, pp. 1-6.
Shakhatreh, Hazim et al., "Unmanned Aerial Vehicles: A Survey on Civil Applications and Key Research Challenges", arxiv.org, Cornell University Library, 201 Olin Library Cornell University Ithaca, NY 14853, Apr. 19, 2018, 58 pages.
Spector, Julian , "Selling Energy Storage when the Economics Don't Work", [online], available at: < https://www.greentechmedia.com/articles/read/how-to-sell-energystorage-when-the-economics-dont-work >, Sep. 14, 2016, 4 pages.
Subramanian, A et al., "Real-Time Scheduling of Deferrable Electric Loads", 2012 American Control Conference.Jun. 27-29, 2012, 2012, 8 pages.
Tatsubori, Michiaki et al., "Opportunistic Adversaries: On Imminent Threats to Learning-Based Business Automation", 2012 Annual SRII Global Conference, San Jose, CA, USA,, 2012, pp. 120-129.
Tso, Fung P. et al., "Network and server resource management strategies for data centre infrastructures", A survey, Computer

(56) References Cited

OTHER PUBLICATIONS

Networks, vol. 106, https://www.sciencedirect.com/science/article/pii/S1389128616302298., 2019, pp. 209-222.
Vagropoulos, Stylianos et al., “Optimal Bidding Strategy for Electric Vehicle Aggregators in Electricity Markets”, IEEE Transactions on Power Systems. vol. 28, No. 4, Nov. 4, 2013, 11 pages.
Valk, , “A Taxonomy of Digital Twins”, May 8, 2020, pp. 1-10.
Wang, Yibai et al., “Loan Chain: A Blockchain-Based Framework for Smart Credit Lending.”, In Proceedings of the 2022 4th Blockchain and Internet of Things Conference, 2022, pp. 11-15.
Will, Christian et al., “Defining a day-ahead spot market for unbundled time-specific renewable energy certificates”, 14th International Conference on the European Energy Market (EEM), Dresden, Germany, 2017, pp. 1-6.
Zhao, D. et al., “Pricing-based energy storage sharing and virtual capacity allocation”, IEEE International Conference on Communications (ICC), Paris, France, https://ieeexplore.ieee.org/document/7997120., 2017, pp. 1-6.
“Wikipedia definition Cryptographic Splitting”, https://en.wikipedia.Org/wiki/Cryptographic_splitting#cite_note-patent-1, 2023, 2 pages.
11202010731V , “Singapore Application Serial No. 11202010731V, Written Opinion; date mailed Jan. 23, 2024”, Strong Force TX Portfolio 2018, LLC, 7 pages.
11202104329S , “Singapore Application Serial No. 11202104329S, Second Written Opinion; date mailed Jun. 24, 2024”, Strong Force TX Portfolio 2018, LLC, 7 pages.
21750846.4 , “European Application Serial No. 21750846.4, Extended European Search Report mailed Feb. 21, 2024”, Strong Force TX Portfolio 2018, LLC, 7 pages.
Freshfields Bruckhaus Deringer , “What’s in a Smart Contract”, Lexology, URL: <https://www.lexology.com/library/detail.aspx?g=bac0889f-b321-444b-8227-7d3a904a83d2>, Feb. 5, 2018, 3 pages.
Liang, Chengwu , et al., “Multi-Modal Human Action Recognition With Sub-Action Exploiting and Class-Privacy Preserved Collaborative Representation Learning”, IEEE Access, vol. 8, 2020, pp. 39920-39933.
Malaty, Elsa “3D Printing and IP law”, WIPO Magazine [online], available at: < https://www.wipo.int/wipo_magazine/en/2017/01/article_0006.html > (Year: 2017), Jan. 2017, 6 pages.
“European Application Serial No. 21841333.4, Extended European Search Report mailed Aug. 30, 2024”, Strong Force TX Portfolio 2018, LLC, 12 pages.
“European Application Serial No. 21907893.8, Partial Supplementary Search Report, Communication pursuant to Rule 164(1) EPC; mailed Jan. 2, 2025”, Strong Force TX Portfolio 2018, LLC, 13 pages.
“European Application Serial No. 22776669.8, Extended European Search Report mailed Aug. 8, 2024”, Strong Force TX Portfolio 2018, LLC, 9 pages.
Oliveira, Hugo Miguel Lopes, “Development, Programming and Start-Up of an Interchangeable 3D-Printing Module”, ProQuest Dissertations & Theses, 2017, 75 pages.

* cited by examiner

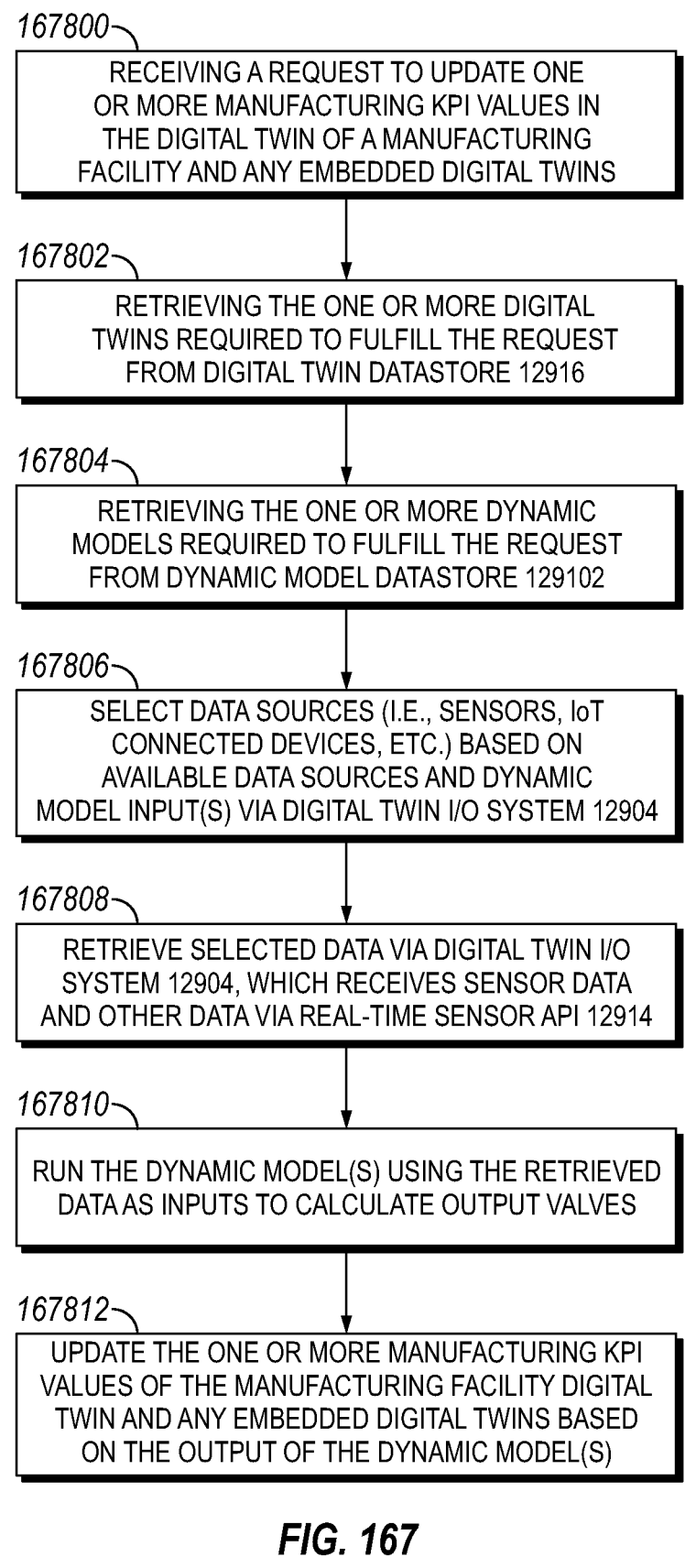

167800
RECEIVING A REQUEST TO UPDATE ONE OR MORE MANUFACTURING KPI VALUES IN THE DIGITAL TWIN OF A MANUFACTURING FACILITY AND ANY EMBEDDED DIGITAL TWINS

167802
RETRIEVING THE ONE OR MORE DIGITAL TWINS REQUIRED TO FULFILL THE REQUEST FROM DIGITAL TWIN DATASTORE 12916

167804
RETRIEVING THE ONE OR MORE DYNAMIC MODELS REQUIRED TO FULFILL THE REQUEST FROM DYNAMIC MODEL DATASTORE 129102

167806
SELECT DATA SOURCES (I.E., SENSORS, IoT CONNECTED DEVICES, ETC.) BASED ON AVAILABLE DATA SOURCES AND DYNAMIC MODEL INPUT(S) VIA DIGITAL TWIN I/O SYSTEM 12904

167808
RETRIEVE SELECTED DATA VIA DIGITAL TWIN I/O SYSTEM 12904, WHICH RECEIVES SENSOR DATA AND OTHER DATA VIA REAL-TIME SENSOR API 12914

167810
RUN THE DYNAMIC MODEL(S) USING THE RETRIEVED DATA AS INPUTS TO CALCULATE OUTPUT VALVES

167812
UPDATE THE ONE OR MORE MANUFACTURING KPI VALUES OF THE MANUFACTURING FACILITY DIGITAL TWIN AND ANY EMBEDDED DIGITAL TWINS BASED ON THE OUTPUT OF THE DYNAMIC MODEL(S)

*FIG. 167*

SYSTEMS AND METHODS FOR CONTROLLING RIGHTS RELATED TO DIGITAL KNOWLEDGE

CROSS REFERENCE TO RELATED APPLICATIONS

The present application claims the benefit of priority to and is a continuation-in-part of U.S. patent application Ser. No. 17/243,145, filed Apr. 28, 2021, entitled "ARTIFICIAL INTELLIGENCE SELECTION AND CONFIGURATION", published as U.S. Published Application No. 2021-0248514 A1.

U.S. patent application Ser. No. 17/243,145 claims the benefit of priority to U.S. Provisional Applications No. 63/016,975, filed on Apr. 28, 2020, entitled "DIGITAL TWIN SYSTEMS FOR FINANCIAL SYSTEMS"; and 63/054,603, filed on Jul. 21, 2020, entitled "DIGITAL TWIN SYSTEMS AND METHODS FOR FINANCIAL SYSTEMS."

The present application claims the benefit of priority to and is a continuation-in-part of U.S. patent application Ser. No. 17/332,700, filed May 27, 2021, entitled "AUTOMATED ROBOTIC PROCESS SELECTION AND CONFIGURATION", now issued as U.S. Pat. No. 11,550,299.

The present application claims the benefit of priority to and is a continuation-in-part of U.S. patent application Ser. No. 16/780,519, filed Feb. 3, 2020, entitled "ADAPTIVE INTELLIGENCE AND SHARED INFRASTRUCTURE LENDING TRANSACTION ENABLEMENT PLATFORM RESPONSIVE TO CROWD SOURCED INFORMATION", now issued as U.S. Pat. No. 11,669,914.

The present application claims the benefit of priority to and is a continuation-in-part of U.S. patent application Ser. No. 16/998,668, filed Aug. 20, 2020, entitled "ROBOTIC PROCESS AUTOMATION SYSTEM FOR NEGOTIATION", now issued as U.S. Pat. No. 11,715,164.

U.S. patent application Ser. No. 16/998,668 claims the benefit of priority to and is a continuation of PCT Application PCT/US19/58671, filed Oct. 29, 2019, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES", published as PCT Publication No. WO 2020/092446.

PCT Application PCT/US19/58671 claims the benefit of priority to the following U.S. Provisional Patent Applications: Ser. No. 62/751,713, filed Oct. 29, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES", Ser. No. 62/843,992, filed May 6, 2019, entitled "ADAPTIVE INTELLIGENCE AND SHARED INFRASTRUCTURE LENDING TRANSACTION ENABLEMENT PLATFORM WITH ROBOTIC PROCESS ARCHITECTURE"; Ser. No. 62/818,100, filed Mar. 13, 2019, entitled "ROBOTIC PROCESS AUTOMATION ARCHITECTURE, SYSTEMS AND METHODS IN TRANSACTION ENVIRONMENTS"; Ser. No. 62/843,455, filed May 5, 2019, entitled "ADAPTIVE INTELLIGENCE AND SHARED INFRASTRUCTURE LENDING TRANSACTION ENABLEMENT PLATFORM WITH ROBOTIC PROCESS ARCHITECTURE"; and Ser. No. 62/843,456, filed May 5, 2019, entitled ADAPTIVE INTELLIGENCE AND SHARED INFRASTRUCTURE LENDING TRANSACTION ENABLEMENT PLATFORM WITH ROBOTIC PROCESS ARCHITECTURE."

The present application claims the benefit of priority to and is a continuation-in-part of U.S. patent application Ser. No. 16/803,387, filed Feb. 27, 2020, entitled "SYSTEM THAT VARIES THE TERMS AND CONDITIONS OF A SUBSIDIZED LOAN," now issued as U.S. Pat. No. 11,610,261.

The present application claims the benefit of priority to and is a continuation-in-part of U.S. patent application Ser. No. 16/457,890, filed Jun. 28, 2019, entitled "TRANSACTION-ENABLING SYSTEMS AND METHODS FOR USING A SMART CONTRACT WRAPPER TO ACCESS EMBEDDED CONTRACT TERMS", published as U.S. Published Application No. 2019-0340715 A1.

U.S. patent application Ser. No. 16/457,890 is a bypass continuation of International Application Serial No. PCT/US2019/030934, filed May 6, 2019, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES", published as PCT Publication No. WO 2019/217323.

International Application Serial No. PCT/US2019/030934 claims the benefit of priority to the following U.S. Provisional Patent Applications: Ser. No. 62/787,206, filed Dec. 31, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES"; Ser. No. 62/667,550, filed May 6, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES"; and Ser. No. 62/751,713, filed Oct. 29, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES."

This application claims the benefit of priority to the following U.S. Provisional Patent Applications: Ser. No. 63/052,475, filed Jul. 16, 2020, entitled "METHODS AND SYSTEMS FOR MANAGEMENT OF DIGITAL KNOWLEDGE", Ser. No. 63/054,603, filed Jul. 21, 2020, entitled "DIGITAL TWIN SYSTEMS AND METHODS FOR FINANCIAL SYSTEMS"; Ser. No. 63/069,542, filed Aug. 24, 2020, entitled "INFORMATION TECHNOLOGY SYSTEMS AND METHODS FOR TRANSACTION ARTIFICIAL INTELLIGENCE LEVERAGING DIGITAL TWINS"; and Ser. No. 63/127,980, filed Dec. 18, 2020, entitled "MARKET ORCHESTRATION SYSTEM FOR FACILITATING ELECTRONIC MARKETPLACE TRANSACTIONS".

Each of the foregoing applications is incorporated herein by reference in its entirety.

BACKGROUND

An incredible amount of information is digitally exchanged on a regular basis, and the amount is increasing each day. This information can include valuable and sensitive information, such as trade secrets, know how, patented material, and works of authorship. Some of the information is subject to access and control restrictions, such as restrictions on who can view, edit, change, use, transmit, sell, buy, rent, review, license, and source the digital information (e.g., vis-à-vis patent licenses, trademark licenses, contract agreements, copyright licenses, and the like). Setting and enforcing access and control restrictions is difficult, as any computer-based system for doing so has potential flaws, such as risks of impropriety or unreliability of an owner or maintainer of the system, or risks of other parties gaining unauthorized access and illegitimately accessing, copying, editing, or otherwise tampering with the digital knowledge.

Lending transactions provide financing for a wide variety of needs, ranging from housing and education to corporate and government projects, among many others, while enabling lenders to earn financial returns. However, lending transactions are plagued by a number of problems, including opacity and asymmetry of information, moral hazard induced by shifting of the consequences of risky or inappropriate behavior, complexity of application and negotiation processes, burdensome regulatory and policy regimes, difficulty in determining the value of property that is used as collateral or backing for obligations, difficulty in determining the reliability or financial health of entities, and others.

Machines and automated agents are increasingly involved in market activities, including for data collection, forecasting, planning, transaction execution, and other activities. This includes increasingly high-performance systems, such as used in high-speed trading. A need exists for methods and systems that improve the machines that enable markets, including for increased efficiency, speed, reliability, and the like for participants in such markets.

Many markets are increasingly distributed, rather than centralized, with distributed ledgers like Blockchain, peer-to-peer interaction models, and micro-transactions replacing or complementing traditional models that involve centralized authorities or intermediaries. A need exists for improved machines that enable distributed transactions to occur at scale among large numbers of participants, including human participants and automated agents.

Operations on blockchains, such as ones using cryptocurrency, increasingly require energy-intensive computing operations, such as calculating very large hash functions on growing chains of blocks. Systems using proof-of-work, proof-of-stake, and the like have led to "mining" operations by which computer processing power is applied at a large scale in order to perform calculations that support collective trust in transactions that are recorded in blockchains.

Many applications of artificial intelligence also require energy-intensive computing operations, such as where very large neural networks, with very large numbers of interconnections, perform operations on large numbers of inputs to produce one or more outputs, such as a prediction, classification, optimization, control output, or the like.

The growth of the Internet of Things and cloud computing platforms have also led to the proliferation of devices, applications, and connections among them, such that data centers, housing servers and other IT components, consume a significant fraction of the energy consumption of the United States and other developed countries.

As a result of these and other trends, energy consumption has become a major factor in utilization of computing resources, such that energy resources and computing resources (or simply "energy and compute") have begun to converge from various standpoints, such as requisitioning, purchasing, provisioning, configuration, and management of inputs, activities, outputs and the like. Projects have been undertaken, for example, to place large scale computing resource facilities, such as Bitcoin™ or other cryptocurrency mining operations, in close proximity to large-scale hydropower sources, such as Niagara Falls.

A major challenge for facility owners and operators is the uncertainty involved in optimizing a facility, such as resulting from volatility in the cost and availability of inputs (in particular where less stable renewable resources are involved), variability in the cost and availability of computing and networking resources (such as where network performance varies), and volatility and uncertainty in various end markets to which energy and compute resources can be applied (such as volatility in cryptocurrencies, volatility in energy markets, volatility in pricing in various other markets, and uncertainty in the utility of artificial intelligence in a wide range of applications), among other factors.

SUMMARY

Example embodiments herein disclose systems, procedures, and aspects that provide cryptographically secure blockchains for knowledge systems capable of storing digital knowledge for providing convenient and secure control of the same. Example methods and systems herein provide for improvements in determining property valuation, reliability of financial health of entities, transparency, symmetry of information, and application and negotiation processes in the lending environment. Example methods and systems herein provide for improvements to the machines that enable markets, providing for increased efficiency, speed, and/or reliability for participants in such markets. Example methods and systems herein provide for improvements to data collection, storage and processing, automated configuration of inputs, resource, and outputs, and means for facility optimization for an energy and compute facility.

In one or more example embodiments, a knowledge distribution system for controlling rights related to digital knowledge is disclosed. The knowledge distribution system may be a blockchain for knowledge system that allows for storage of digital knowledge, buying and selling of digital knowledge, tokenization of digital knowledge, and/or reviewing/auditing of the digital knowledge via a cryptographically secure distributed ledger. Smart contracts may be implemented on the distributed ledger and controlling of rights to digital knowledge, transferring digital knowledge, and adherence of parties to agreements related to the digital knowledge. The blockchain for knowledge system can also facilitate third parties reviewing, auditing, or verifying information related to digital knowledge.

There can be a number of practical obstacles to the sharing of knowledge such as the absence of trust between parties that could potentially benefit from sharing of the knowledge. A platform exists for a digital knowledge distribution system that facilitates orchestration of the sharing of knowledge by providing a high degree of control over the extent to which counterparties can access shared knowledge. Even where knowledge is secure and well-controlled, some types of knowledge are so sensitive that an owner may be unwilling to share the entire set of knowledge with a single counterparty. In embodiments, a platform is disclosed for a digital knowledge distribution system that facilitates handling and control of subsets of knowledge, including automated handling of aggregation of knowledge, or related outputs, that result from division of knowledge subsets.

The knowledge distribution system may include a ledger management system configured to create and manage a distributed ledger where the distributed ledger may be distributed over nodes of a network and may include blocks linked via cryptography. A smart contract system may be communication with the distributed ledger and may be configured to implement and manage a smart contract via the distributed ledger. The smart contract may be stored in the distributed ledger and may include a triggering event. The smart contract may be configured to perform a smart contract action with respect to the digital knowledge in response to an occurrence of the triggering event. The knowledge distribution system may be configured to receive from a user an instance of the digital knowledge. The digital knowledge may be tokenized such that the instance of the digital knowledge can be manipulated as a token on the distributed ledger. The tokenized digital knowledge may be stored via the distributed ledger. Commitments of parties to the smart contract may be processed. The knowledge distribution system may be configured to manage rights of control of and access to the tokenized digital knowledge according to the smart contract and manage the smart contract action in response to the triggering event.

One or more of the following example features may be included. The digital knowledge may include intellectual property where the smart contract embeds intellectual property licensing terms for intellectual property embedded in the distributed ledger, and where executing an operation on the distributed ledger may provide access to the intellectual property and may process a commitment of a party to the smart contract to the intellectual property licensing terms. A smart contract wrapper on the distributed ledger may allow an operation on the ledger to add intellectual property to an aggregate stack of intellectual property, may allow an operation on the ledger to add intellectual property to agree to an apportionment of royalties among the parties in the ledger, may allow an operation on the ledger to add intellectual property to an aggregate stack of intellectual property, and/or may allow an operation on the ledger to process a commitment of a party to a contract term. The tokenized digital knowledge may include an instruction set. The distributed ledger may be configured to provide provable access to the instruction set and execute the instruction set on a system resulting in recording a transaction in the distributed ledger. The tokenized digital knowledge may include executable algorithmic logic, a three-dimensional (3D) printer instruction set, an instruction set for a coating process, an instruction set for a semiconductor fabrication process, a firmware program, an instruction set for a field-programmable gate array, serverless code logic, an instruction set for a crystal fabrication system, an instruction set for a food preparation process, an instruction set for a polymer production process, an instruction set for a chemical synthesis process, an instruction set for a biological production process, a data set for a digital twin, and/or a trade secret with an expert wrapper. The system may be configured to aggregate views of a trade secret into a chain that proves which knowledge recipients of the parties have viewed the trade secret. The knowledge distribution system may include a reporting system configured to report an analytic result based on operations performed on the distributed ledger or the digital knowledge. The distributed ledger may be configured to aggregate a set of instructions where an operation on the distributed ledger may add at least one instruction to a pre-existing set of instructions to provide a modified set of instructions. The smart contract may be configured to manage allocation of instruction sub-sets to the distributed ledger and access to the instruction sub-sets. The distributed ledger may be configured to log parties who have contributed to an instance of the digital knowledge by storing data related to the parties in at least one of the blocks. The knowledge distribution system may be configured to log a source of an instance of the digital knowledge by storing data related to the source in at least one of the blocks. The distributed ledger may be configured such that a private network of authorized participants may establish cryptography-based consensus required for verification of new blocks to be added to the blocks. The ledger management system may be configured to facilitate crowdsourcing of information added to a block of the blocks of the distributed ledger. The distributed ledger may be configured such to store a review of an instance of the digital knowledge by a crowdsourcer in a block of the blocks. The distributed ledger may be configured such to store a signature of an instance of the digital knowledge by a crowdsourcer in a block of the blocks. The distributed ledger may be configured such to store a verification of an instance of the digital knowledge by a crowdsourcer in a block of the blocks. The ledger management system may be configured to establish cryptographic currency tokens that may be tradeable among users of the distributed ledger. The knowledge distribution system may include an account management system in communication with the distributed ledger that may be configured to facilitate creation and management of user accounts related to users of the knowledge distribution system. The knowledge distribution system may include a user interface system in communication with the distributed ledger and may be configured to present a user interface to a user of the knowledge distribution system where the user interface allows the user to view data related to an instance of the digital knowledge. The knowledge distribution system may include a marketplace system in communication with the distributed ledger and may be configured to establish and maintain a digital marketplace that may be configured to visually present data related to an instance of the digital knowledge to a user of the knowledge distribution system. The knowledge distribution system may include a knowledge datastore in communication with the distributed ledger and may be configured to store data related to the digital knowledge. The knowledge distribution system may include a client datastore in communication with the distributed ledger and may be configured to store data related to users of the knowledge distribution system. The knowledge distribution system may include a smart contract datastore in communication with the distributed ledger and may be configured to store data related to the smart contract. The knowledge distribution system may include a reporting system in communication with the distributed ledger and may be configured to analyze said tokenized digital knowledge and report an analytic result based on the analysis of the tokenized digital knowledge. The smart contract may be generated using a parameterizable smart contract template. The smart contract may include parameters based on type of digital knowledge to be tokenized. The parameters may include financial parameters, royalty parameters, usage parameters, output produced parameters, allocation of consideration parameters, identity parameters, and/or access condition parameters.

In other example embodiments, a knowledge distribution system may use a distributed ledger and smart contracts to facilitate management and exchange of access, licensing, and ownership rights of digital knowledge.

In other example embodiments, a computer-implemented method for controlling rights related to digital knowledge is disclosed. The method may include creating and managing a distributed ledger that is distributed over nodes of a network and includes blocks linked via cryptography. A smart contract may be implemented and managed via the distributed ledger where the smart contract may be stored in the distributed ledger and may include a triggering event. A smart contract action may be performed with respect to the digital knowledge in response to an occurrence of the triggering event. An instance of the digital knowledge may be received. The digital knowledge may be tokenized such that the instance of the digital knowledge can be manipulated as a token on the distributed ledger. The tokenized digital knowledge may be stored via the distributed ledger. Commitments of parties to the smart contract may be processed. The method may include management of rights over control of and access to the tokenized digital knowledge according to the smart contract and management of the smart contract action in response to the triggering event.

One or more of the following example features may be included. A knowledge exchange for the exchange of the tokenized digital knowledge based on the smart contract may be orchestrated. The knowledge exchange of the tokenized digital knowledge may be integrated with another exchange where the knowledge exchange facilitates exchange of valuable and/or sensitive knowledge related to a subject matter of the other exchange.

In other example embodiments, a knowledge distribution system for controlling rights related to digital knowledge is disclosed. The knowledge distribution system may include a ledger management system configured to create and manage a distributed ledger. The distributed ledger may be distributed over nodes of a network and may include blocks linked via cryptography. A smart contract system may be in communication with the distributed ledger and may be configured to implement and manage a smart contract via the distributed ledger. The smart contract may be stored in the distributed ledger and may include a triggering event. The smart contract may be configured to perform a smart contract action with respect to the digital knowledge in response to an occurrence of the triggering event. The knowledge distribution system may be configured to receive from a knowledge provider device an instance of the digital knowledge including a three-dimensional (3D) printer instruction set for 3D printing an object. The digital knowledge may be tokenized such that the instance of the digital knowledge may be manipulated as a token on the distributed ledger. The tokenized digital knowledge may be stored via the distributed ledger. Commitments of the knowledge provider and a knowledge recipient of the 3D printer instruction set to the smart contract may be processed. The knowledge distribution system may be configured to manage rights of control of and access to the tokenized digital knowledge according to the smart contract and may manage the smart contract action according to a condition and the triggering event.

One or more of the following example features may be included. The 3D printer instruction set may include a 3D printing schematic. The object may be at least one of a custom part, a custom product, a manufacturing part, a replacement part, a toy, a medical device, and a tool. The knowledge recipient may use a knowledge recipient device to download and use the 3D printer instruction set. The knowledge recipient device may be at least one of a computing device, a server, a 3D printer, and a manufacturing device. The knowledge recipient may use a knowledge recipient device to purchase the tokenized digital knowledge corresponding to the 3D printer instruction set. The knowledge distribution system may include an event listener configured to listen to an application programming interface (API) that may provide a connection between the knowledge distribution system and a knowledge recipient device of the knowledge recipient. The smart contract may be configured to trigger the condition of the knowledge recipient to make a payment when the 3D printer instruction set may be transferred or used based on the rights of control of and access to the tokenized digital knowledge. The rights of control of and access to the tokenized digital knowledge may include a permission for a user to 3D print using multiple instances of the 3D printer instruction set. The rights of control of and access to the tokenized digital knowledge may include at least one of 3D printer requirements, a time period during which the object can be 3D printed, whether the tokenized digital knowledge is transferred to a downstream knowledge recipient, warranties, disclaimers, indemnifications, and certifications with respect to the object. Information related to the 3D printer instruction set of the tokenized digital knowledge may be modified on the distributed ledger when the 3D printer instruction set is at least one of purchased, downloaded, and used. In examples, information related to the 3D printer instruction set may include at least one of origin, date of creation, names of one or more contributing individuals, groups, and/or companies, pricing, market trends for related schematics, serial numbers, and part identifiers. The smart contract action may be one of an assignment of a serial number to the object that is 3D printed, monitoring for the triggering event, verifying fulfillment of an obligation based on the condition, verifying payment and/or transfer of the tokenized digital knowledge, transferring the tokenized digital knowledge, logging one or more transactions in the distributed ledger, performing one or more operations with respect to the distributed ledger, and creating one or more new blocks in the distributed ledger. The smart contract action may include verifying that the condition is met as defined in the smart contract where the condition may be one of printer requirements, payment received or currency transferred from a knowledge recipient device of the knowledge recipient, and transfer of the tokenized digital knowledge to the knowledge recipient device. When the tokenized digital knowledge may be transferred to a knowledge recipient device of a knowledge recipient, a 3D printer may be configured to print the object according to the 3D printer instruction set. The knowledge distribution system may include a smart contract generator that may be configured to parametrize a smart contract template based on at least one of information provided by the knowledge provider, the condition, and the triggering event.

In other example embodiments, a computer-implemented method for controlling rights related to digital knowledge is disclosed. The method may include creating and managing a distributed ledger that is distributed over nodes of a network and includes blocks linked via cryptography. A smart contract may be implemented and managed via the distributed ledger where the smart contract may be stored in the distributed ledger and may include a triggering event. A smart contract action may be performed with respect to the digital knowledge in response to an occurrence of the triggering event. The method may include receiving from a knowledge provider device an instance of the digital knowledge that includes a three-dimensional (3D) printer instruction set for 3D printing an object. The digital knowledge may be tokenized such that the instance of the digital knowledge can be manipulated as a token on the distributed ledger. The tokenized digital knowledge may be stored via the distributed ledger. Commitments of the knowledge provider and a knowledge recipient of the 3D printer instruction set to the smart contract may be processed. The method may include management of rights of control of and access to the tokenized digital knowledge according to the smart contract, and management of the smart contract action according to a condition and the triggering event.

One or more of the following example features may be included. An element of the instance of the digital knowledge via the smart contract may be crowdsourced. The element of the instance of the digital knowledge may be managed by a smart contract system according to the smart contract.

Provided herein is a lending transaction enablement platform having a set of data-integrated microservices including data collection and monitoring services, blockchain services, and smart contract services for handling lending entities and transactions. The platform is capable of enabling a wide range of dedicated solutions, which may share data collection and storage infrastructure, and which may share or exchange inputs, events, activities, and outputs, such as to reinforce learning, enable automation, and enable adaptive intelligence across the various solutions.

Aspects of the present disclosure relate to a method for electronically facilitating licensing of one or more personality rights of a licensor. The method may include receiving an access request from a licensee to obtain approval to license personality rights from a set of available licensors. The method may include selectively granting access to the licensee based on the access request. The method may include receiving confirmation of a deposit of an amount of funds from the licensee. The method may include issuing an amount of cryptocurrency corresponding to the amount of funds deposited by the licensee to an account of the licensee. The method may include receiving a smart contract request to create a smart contract governing the licensing of the one or more personality rights of the licensor by the licensee. The smart contract request may indicate one or more terms including a consideration amount of cryptocurrency to be paid to the licensor in exchange for one or more obligations on the licensor. The method may include generating the smart contract based on the smart contract request. The method may include escrowing the consideration amount of cryptocurrency from the account of the licensee. The method may include deploying the smart contract to a distributed ledger. The method may include verifying, by the smart contract, that the licensor has performed the one or more obligations. The method may include, in response to receiving verification that the licensor has performed the one or more obligations, releasing at least a portion of the consideration amount of cryptocurrency into a licensor account of the licensor. The method may include outputting a record indicating a completion of a licensing transaction defined by the smart contract to the distributed ledger.

Other aspects of the present disclosure relate to a system configured for electronically facilitating licensing of one or more personality rights of a licensor. The system may include one or more hardware processors configured by machine-readable instructions. The processor(s) may be configured to receive an access request from a licensee to obtain approval to license personality rights from a set of available licensors. The processor(s) may be configured to selectively grant access to the licensee based on the access request. The processor(s) may be configured to receive confirmation of a deposit of an amount of funds from the licensee. The processor(s) may be configured to issue an amount of cryptocurrency corresponding to the amount of funds deposited by the licensee to an account of the licensee. The processor(s) may be configured to receive a smart contract request to create a smart contract governing the licensing of the one or more personality rights of the licensor by the licensee. The smart contract request may indicate one or more terms including a consideration amount of cryptocurrency to be paid to the licensor in exchange for one or more obligations on the licensor. The processor(s) may be configured to generate the smart contract based on the smart contract request. The processor(s) may be configured to escrow the consideration amount of cryptocurrency from the account of the licensee. The processor(s) may be configured to deploy the smart contract to a distributed ledger. The processor(s) may be configured to verify, by the smart contract, that the licensor has performed the one or more obligations. The processor(s) may be configured to, in response to receiving verification that the licensor has performed the one or more obligations, release at least a portion of the consideration amount of cryptocurrency into a licensor account of the licensor. The processor(s) may be configured to output a record indicating a completion of a licensing transaction defined by the smart contract to the distributed ledger.

BRIEF DESCRIPTION OF THE FIGURES

The disclosure and the following detailed description of certain embodiments thereof may be understood by reference to the following figures:

FIG. 146 depicts a method for selecting an AI solution.

FIG. 147 depicts a method for selecting an AI solution.

FIG. 148 depicts an AI solution selection and configuration system.

FIG. 149 depicts an AI solution selection and configuration system.

FIG. 150 depicts an AI solution selection and configuration system.

FIG. 151 depicts a component configuration circuit.

FIG. 152 depicts an AI solution selection and configuration system.

FIG. 153 depicts a system for selecting and configuring an artificial intelligence model.

FIG. 154 depicts a method of selecting and configuring an artificial intelligence model.

FIG. 155 is a schematic illustrating examples of architecture of a digital twin system according to embodiments of the present disclosure.

FIG. 156 is a schematic illustrating exemplary components of a digital twin management system according to embodiments of the present disclosure.

FIG. 157 is a schematic illustrating examples of a digital twin I/O system that interfaces with an environment, the digital twin system, and/or components thereof to provide bi-directional transfer of data between coupled components according to embodiments of the present disclosure.

Figure 158:
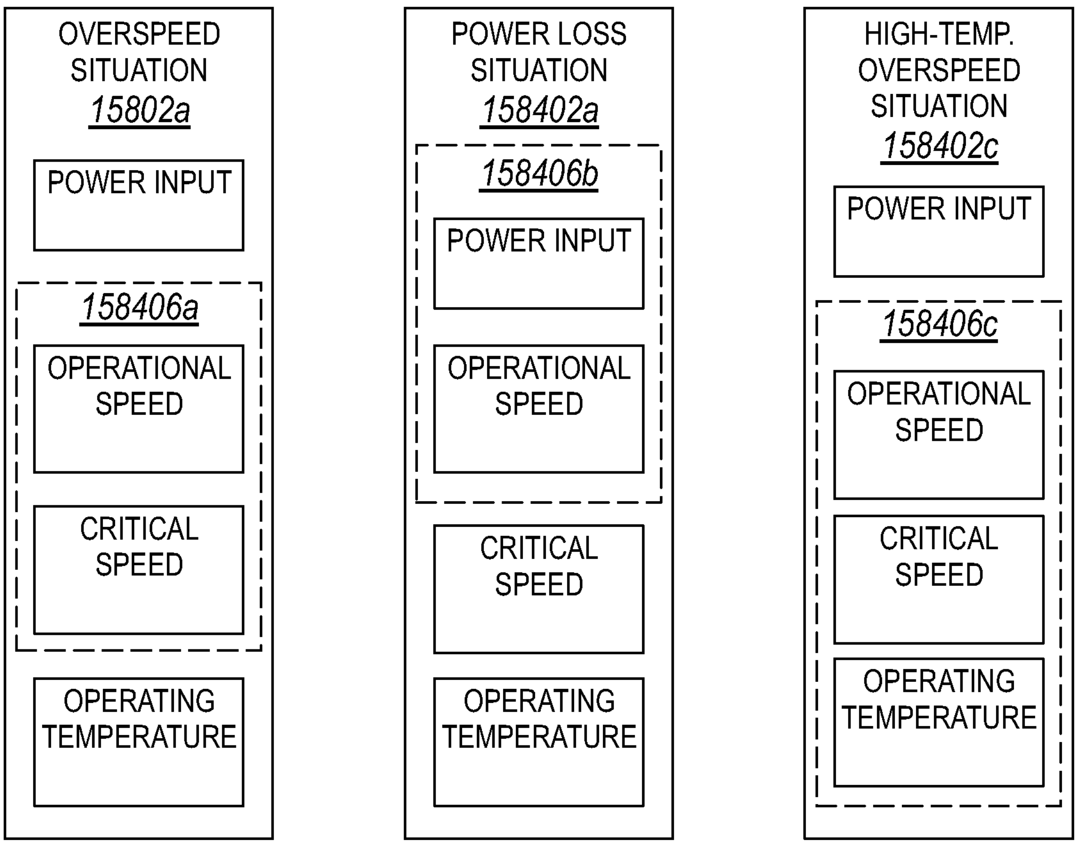

FIG. 158 is a schematic illustrating an example set of identified states related to industrial environments that the digital twin system may identify and/or store for access by intelligent systems (e.g., a cognitive intelligence system) or users of the digital twin system according to embodiments of the present disclosure.

Figure 159:
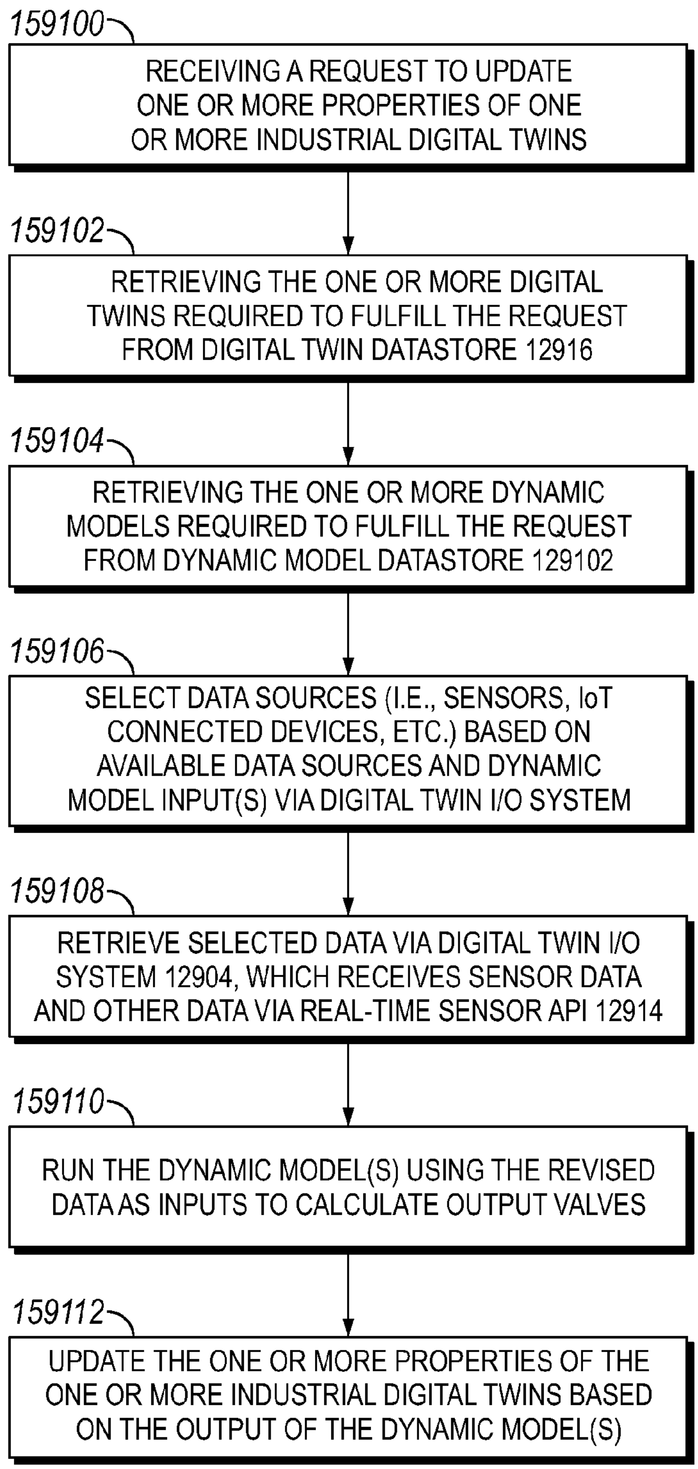

FIG. 159 is a schematic illustrating example embodiments of methods for updating a set of properties of a digital twin of the present disclosure on behalf of a client application and/or one or more embedded digital twins.

Figure 160:
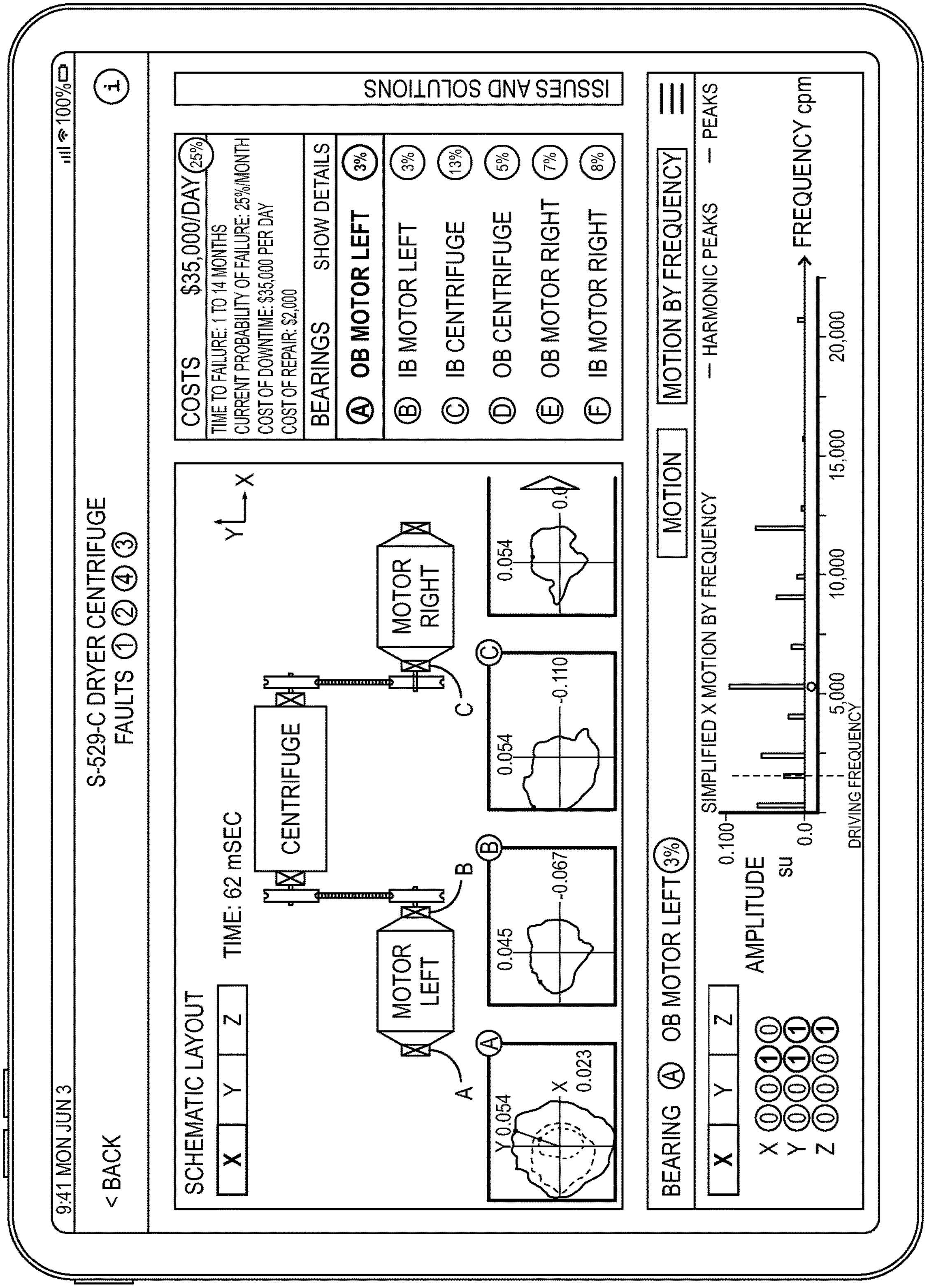

FIG. 160 illustrates example embodiments of a display interface of the present disclosure that renders a digital twin of a dryer centrifuge with information relating to the dryer centrifuge.

Figure 161:
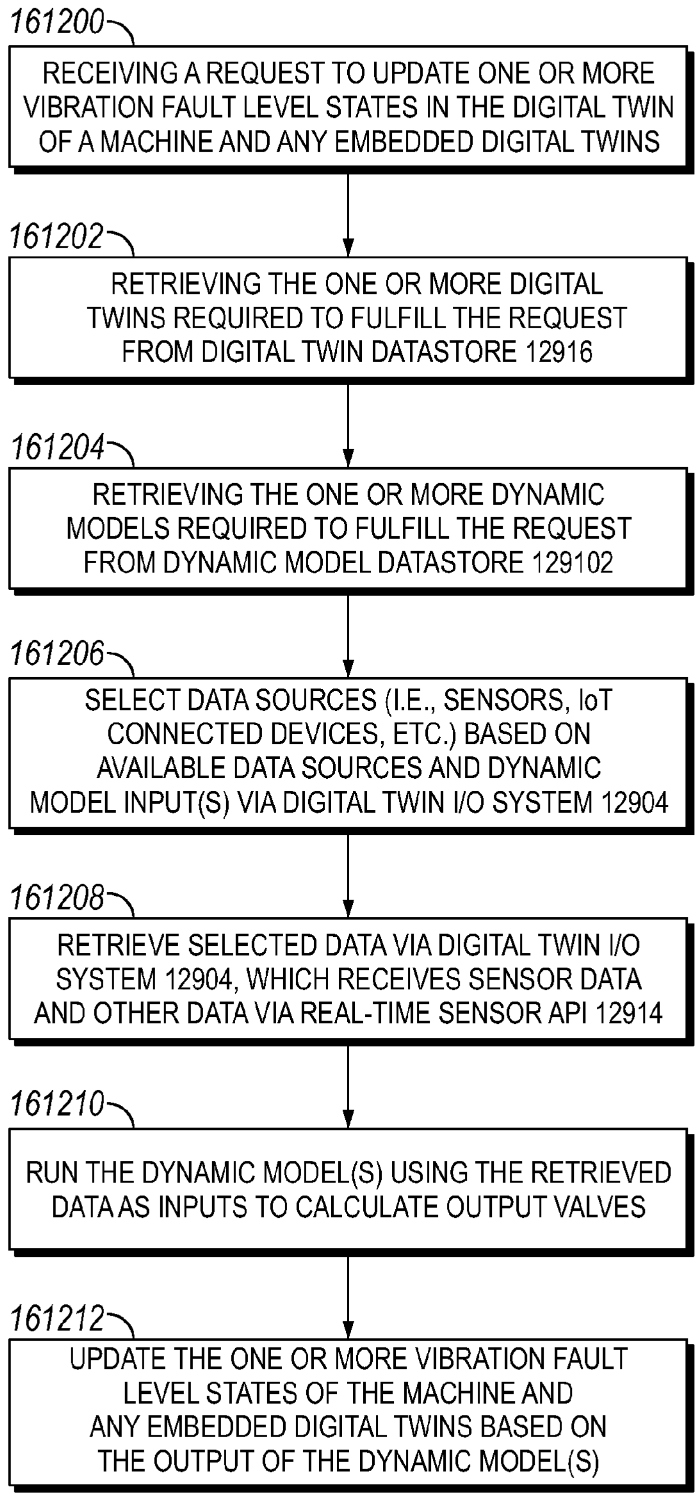

FIG. 161 is a schematic illustrating an example embodiment of a method for updating a set of vibration fault level states of machine components such as bearings in the digital twin of an industrial machine, on behalf of a client application.

Figure 162:
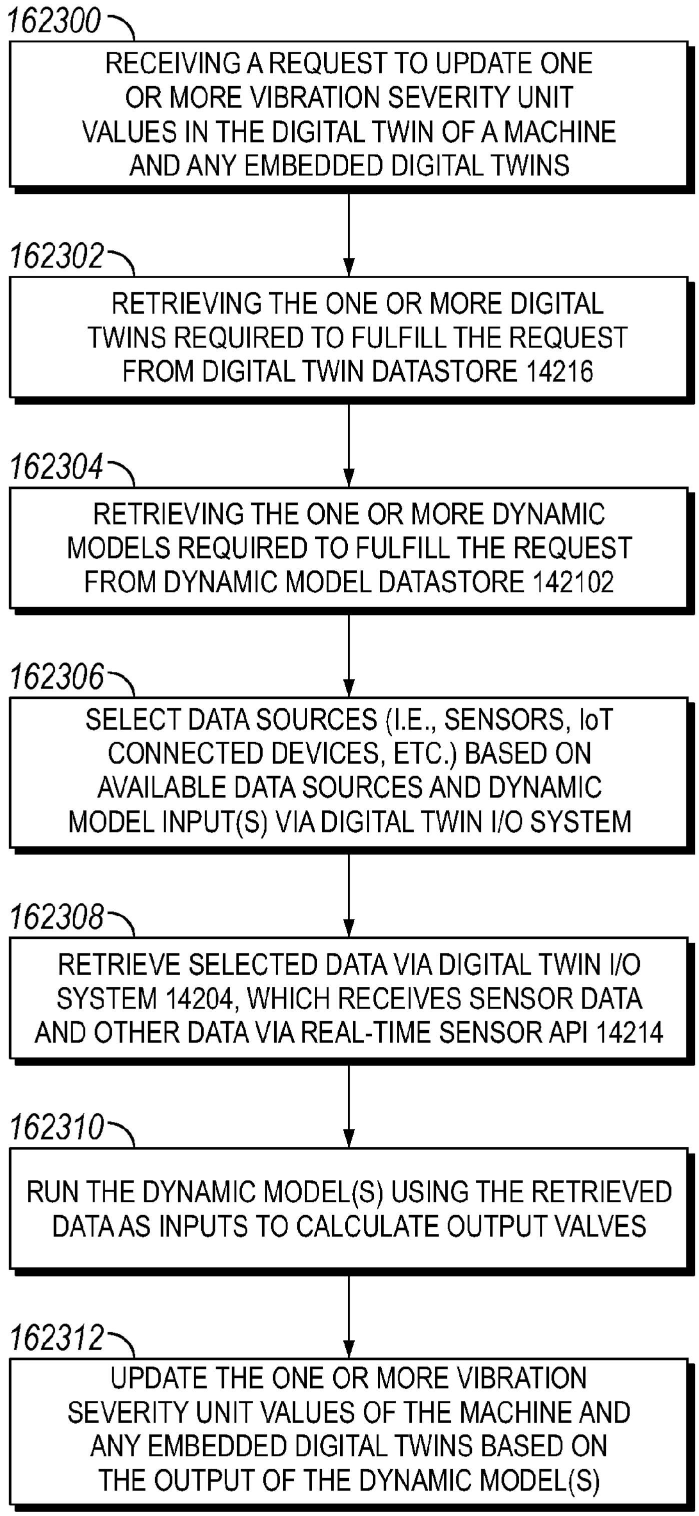

FIG. 162 is a schematic illustrating an example embodiment of a method for updating a set of vibration severity unit values of machine components such as bearings in the digital twin of a machine on behalf of a client application.

Figure 163:
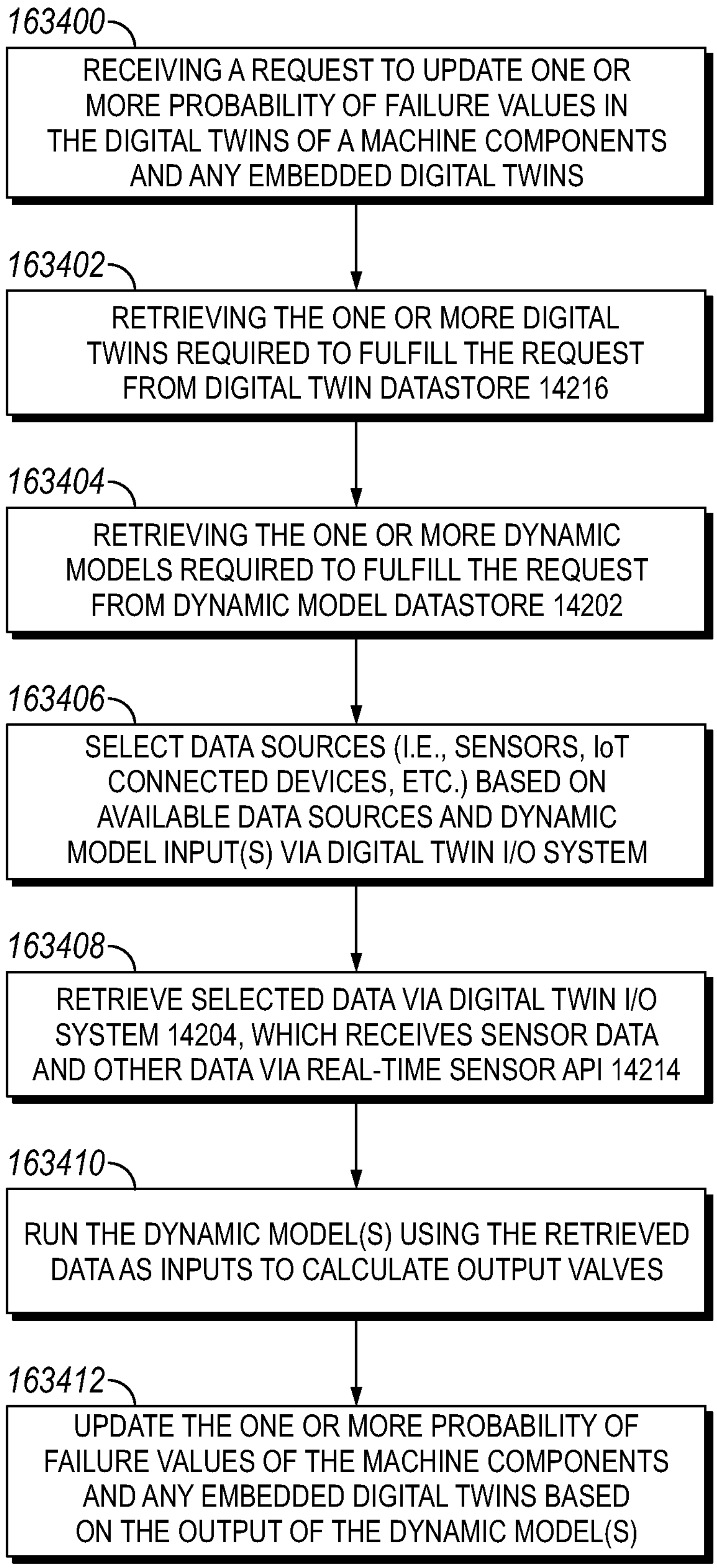

FIG. 163 is a schematic illustrating an example embodiment of a method for updating a set of probability of failure values in the digital twins of machine components on behalf of a client application.

Figure 164:
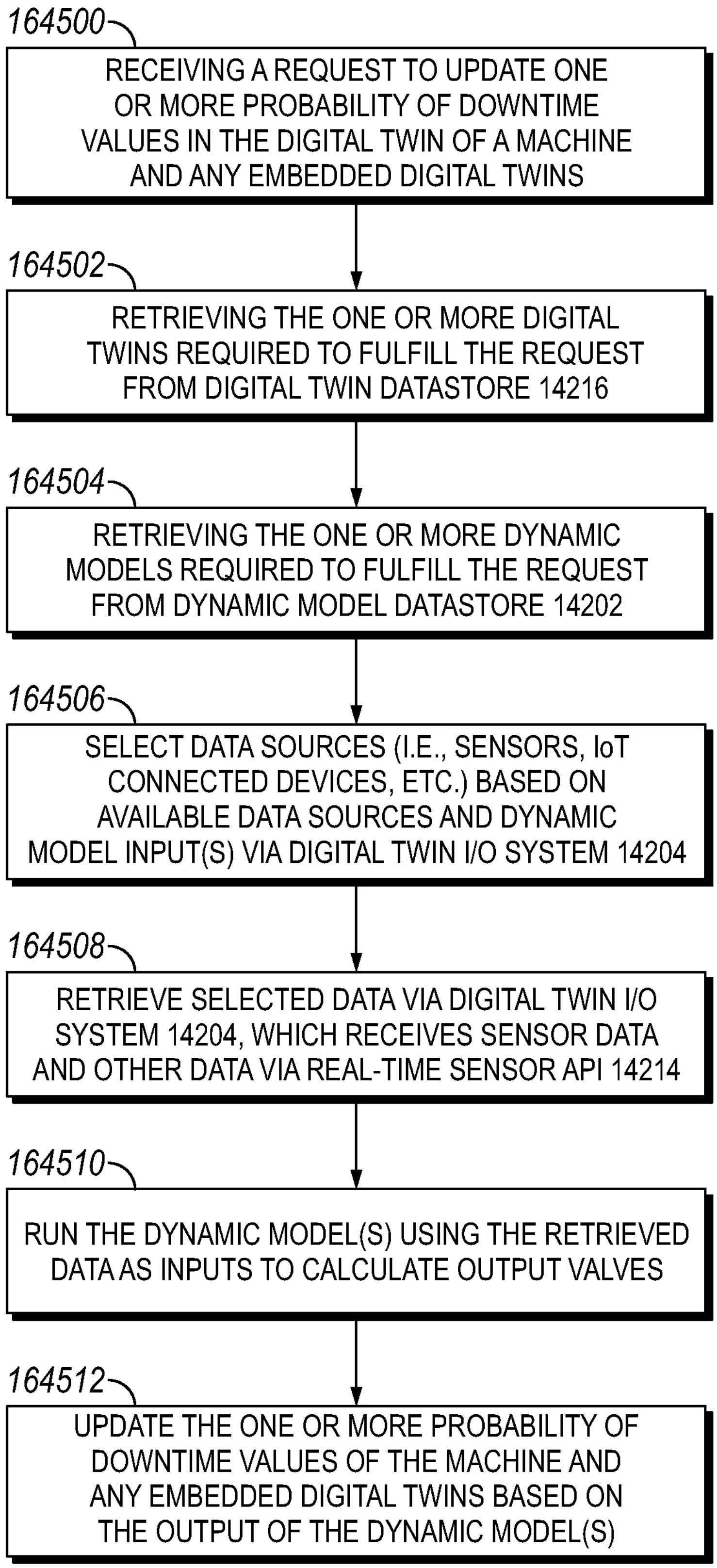

FIG. 164 is a schematic illustrating an example embodiment of a method for updating a set of probability of downtime values of machines in the digital twin of a manufacturing facility on behalf of a client application.

Figure 165:
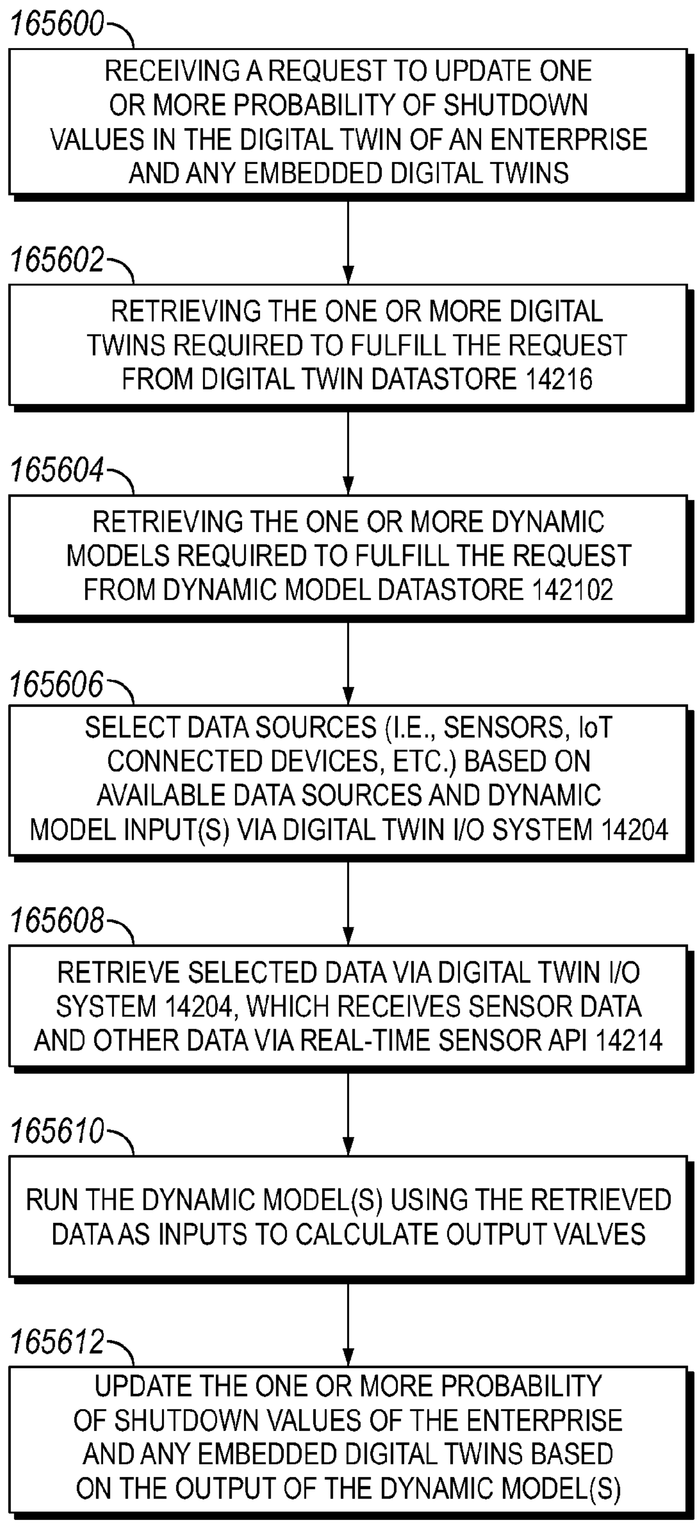

FIG. 165 is a schematic illustrating an example embodiment of a method for updating a set of probability of shutdown values of manufacturing facilities in the digital twin of an enterprise on behalf of a client application.

Figure 166:
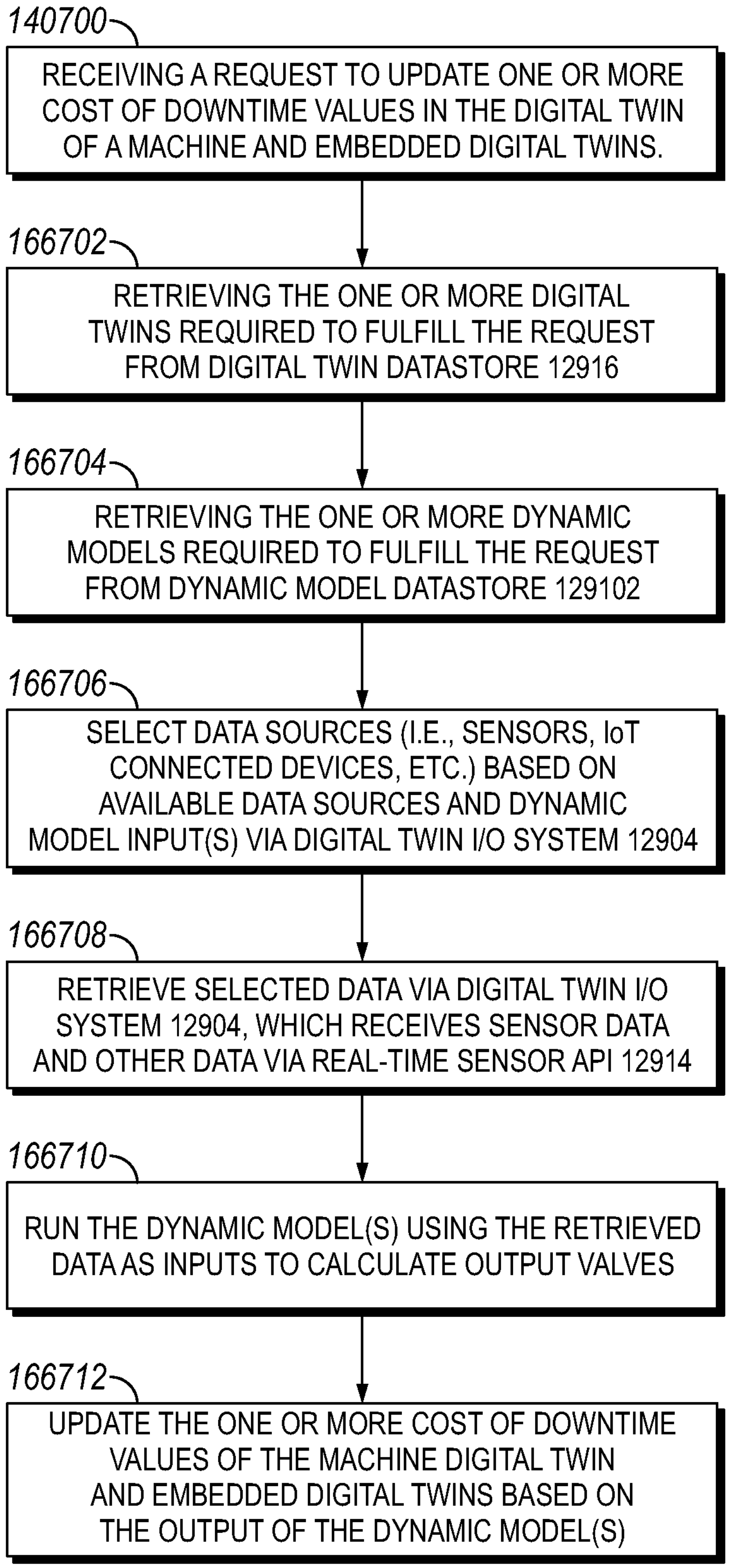

FIG. 166 is a schematic illustrating an example embodiment of a method for updating a set of cost of downtime values of machines in the digital twin of a manufacturing facility.

FIG. 167 is a schematic illustrating an example embodiment of a method for updating one or more manufacturing KPI values in a digital twin of a manufacturing facility, on behalf of a client application.

Figure 168:
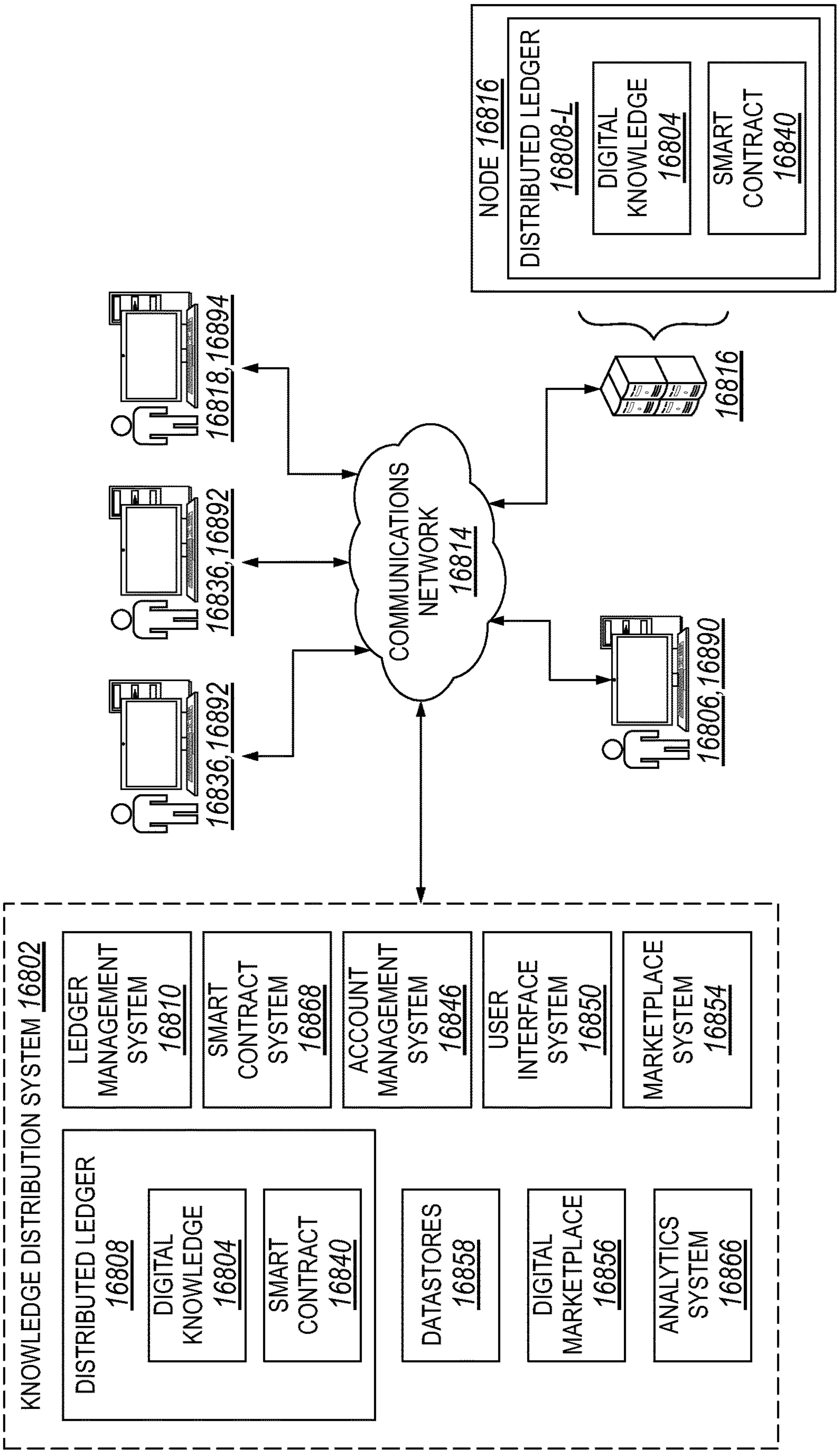

FIG. 168 is a schematic diagram of components of a knowledge distribution system and a communication network for facilitating management of digital knowledge in accordance with embodiments of the present disclosure.

Figure 169:
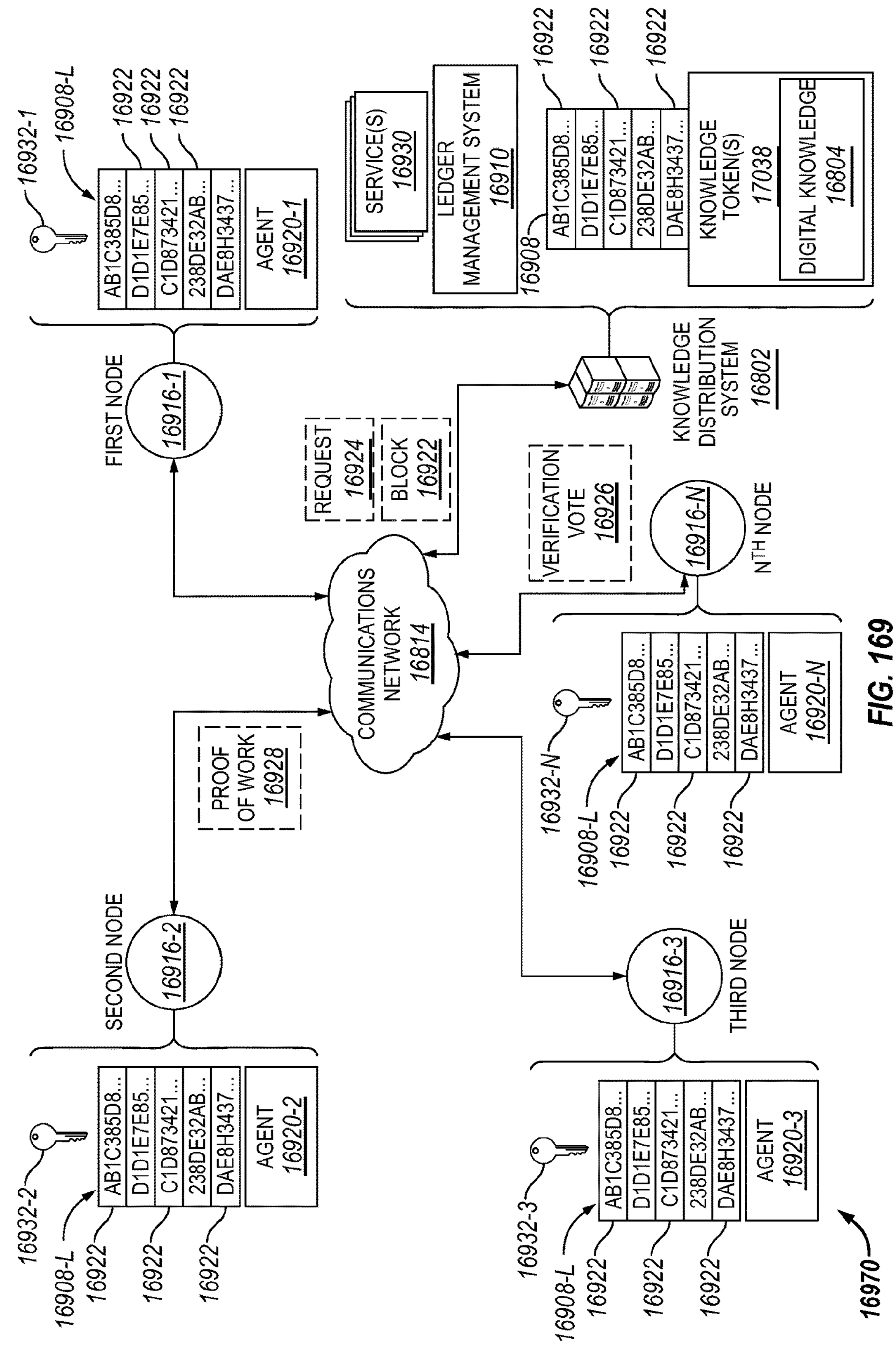

FIG. 169 is a schematic diagram of a ledger network of the knowledge distribution system in accordance with embodiments of the present disclosure.

Figure 170:
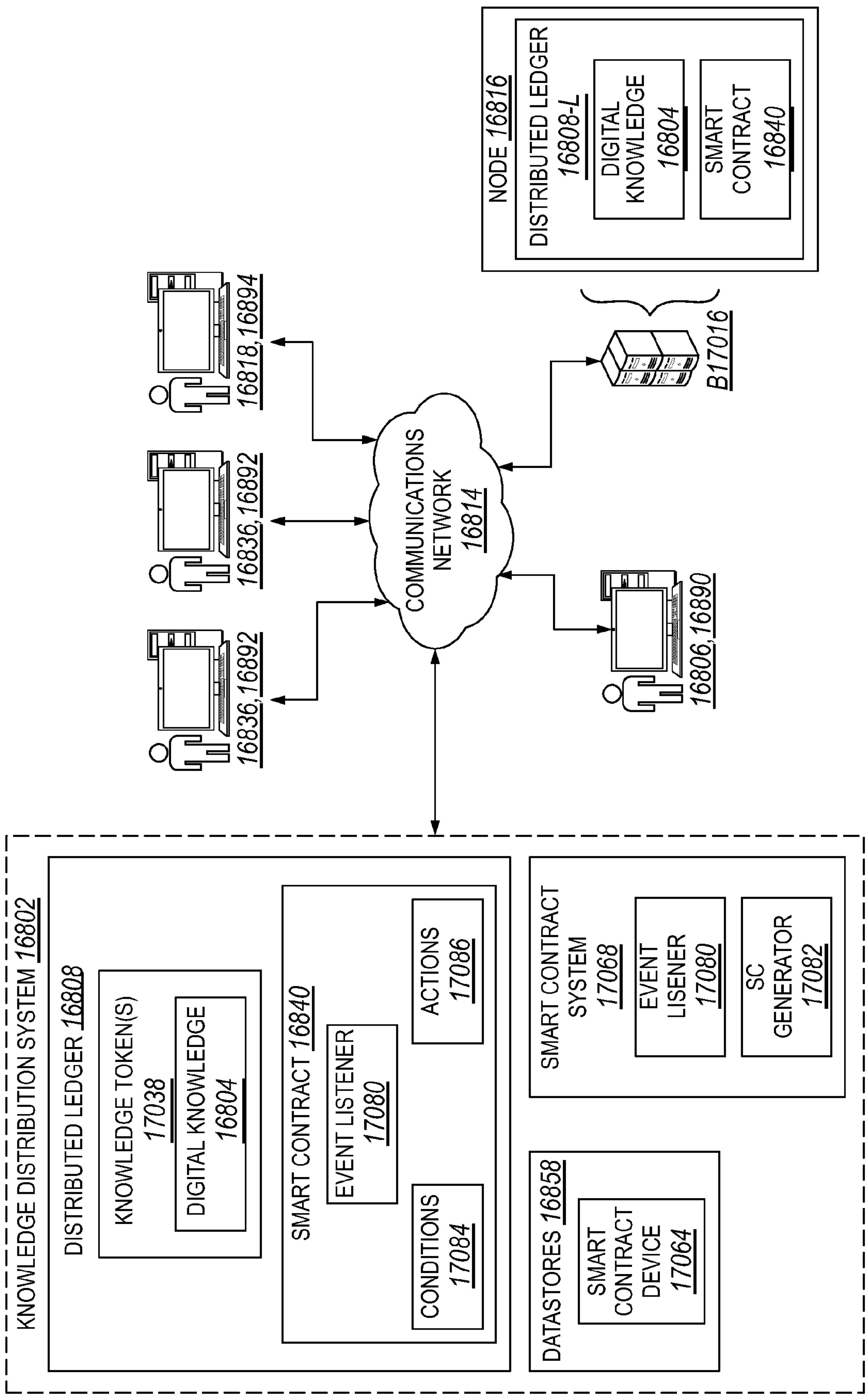

FIG. 170 is a schematic diagram of the knowledge distribution system of FIG. 168 including details of a smart contract and a smart contract system of the knowledge distribution system in accordance with embodiments of the present disclosure.

Figure 171:
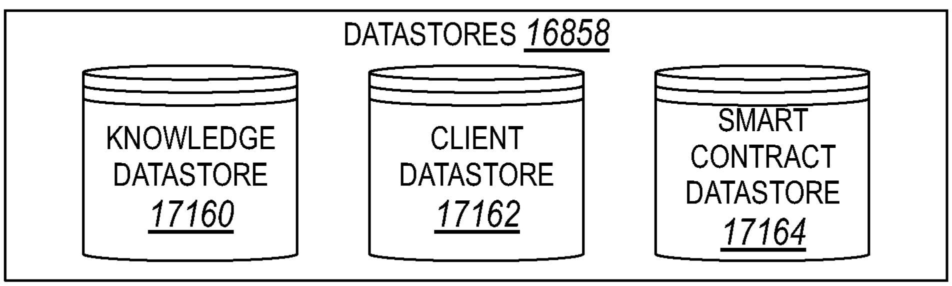

FIG. 171 is a schematic diagram of a plurality of datastores of the knowledge distribution system in accordance with embodiments of the present disclosure.

Figure 172:
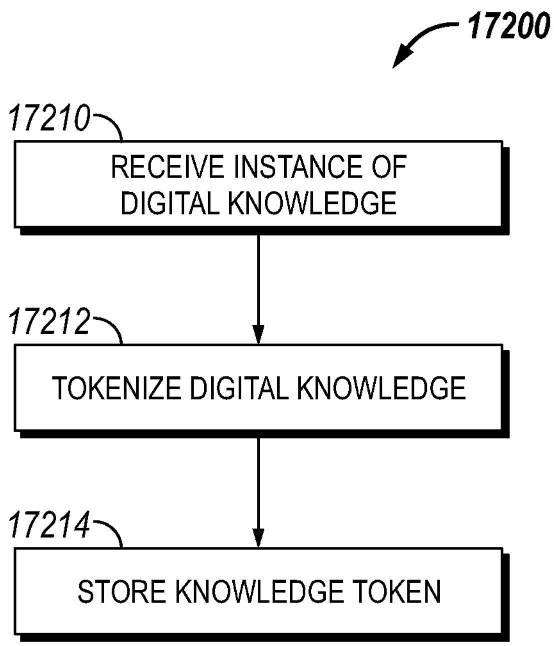

FIG. 172 illustrates a method of deploying a knowledge token and related smart contract via the knowledge distribution system in accordance with embodiments of the present disclosure.

Figure 173:
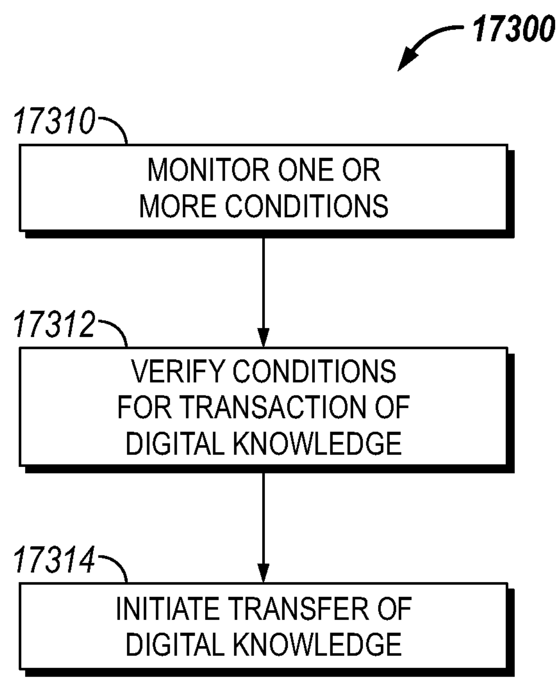

FIG. 173 illustrates a method of performing high level process flow of a smart contract that distributes digital knowledge via the knowledge distribution system in accordance with embodiments of the present disclosure.

Figure 174:
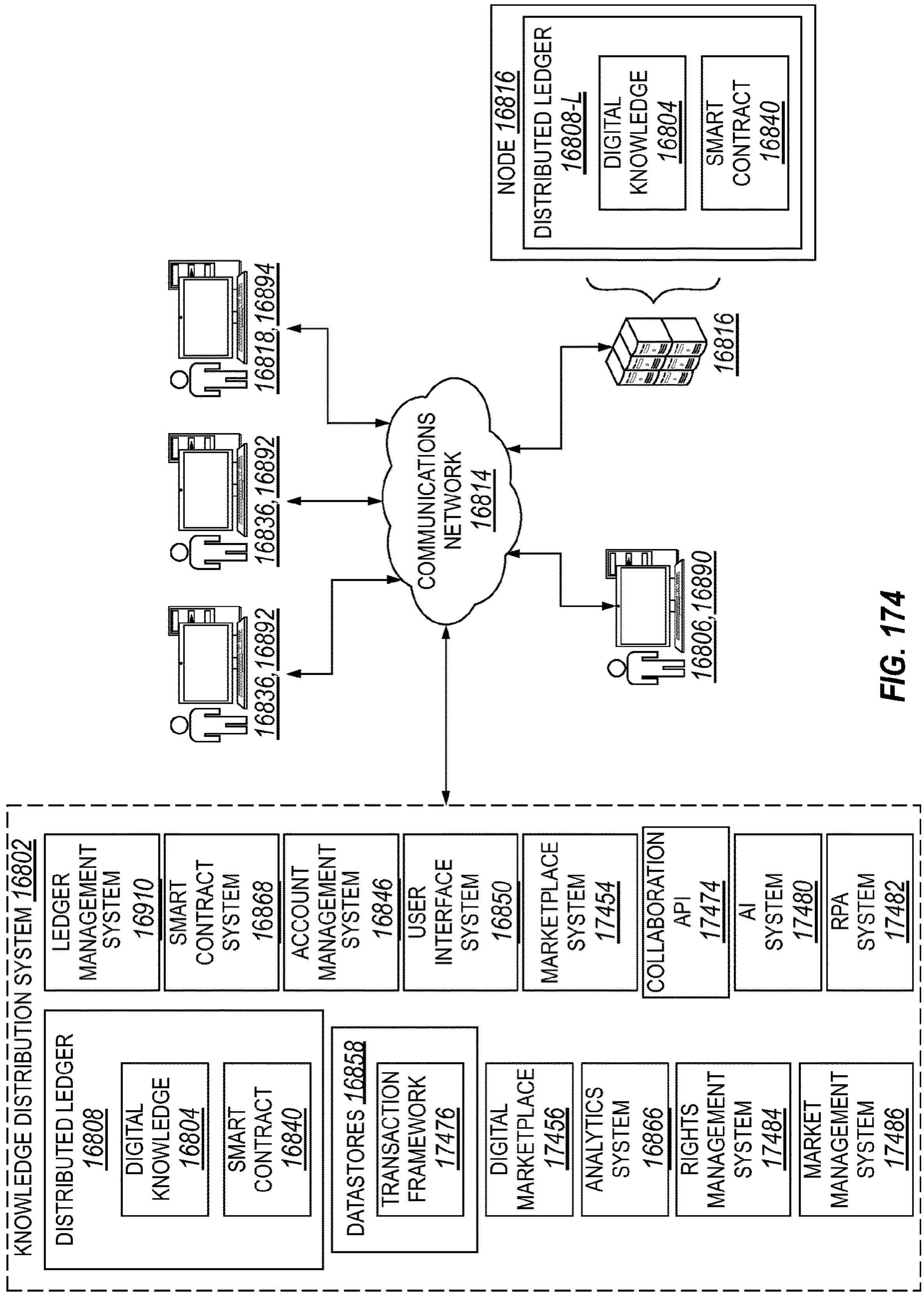

FIG. 174 is a schematic diagram of another embodiment of components of the knowledge distribution system and a communication network for facilitating management of digital knowledge in accordance with embodiments of the present disclosure.

Figure 175:
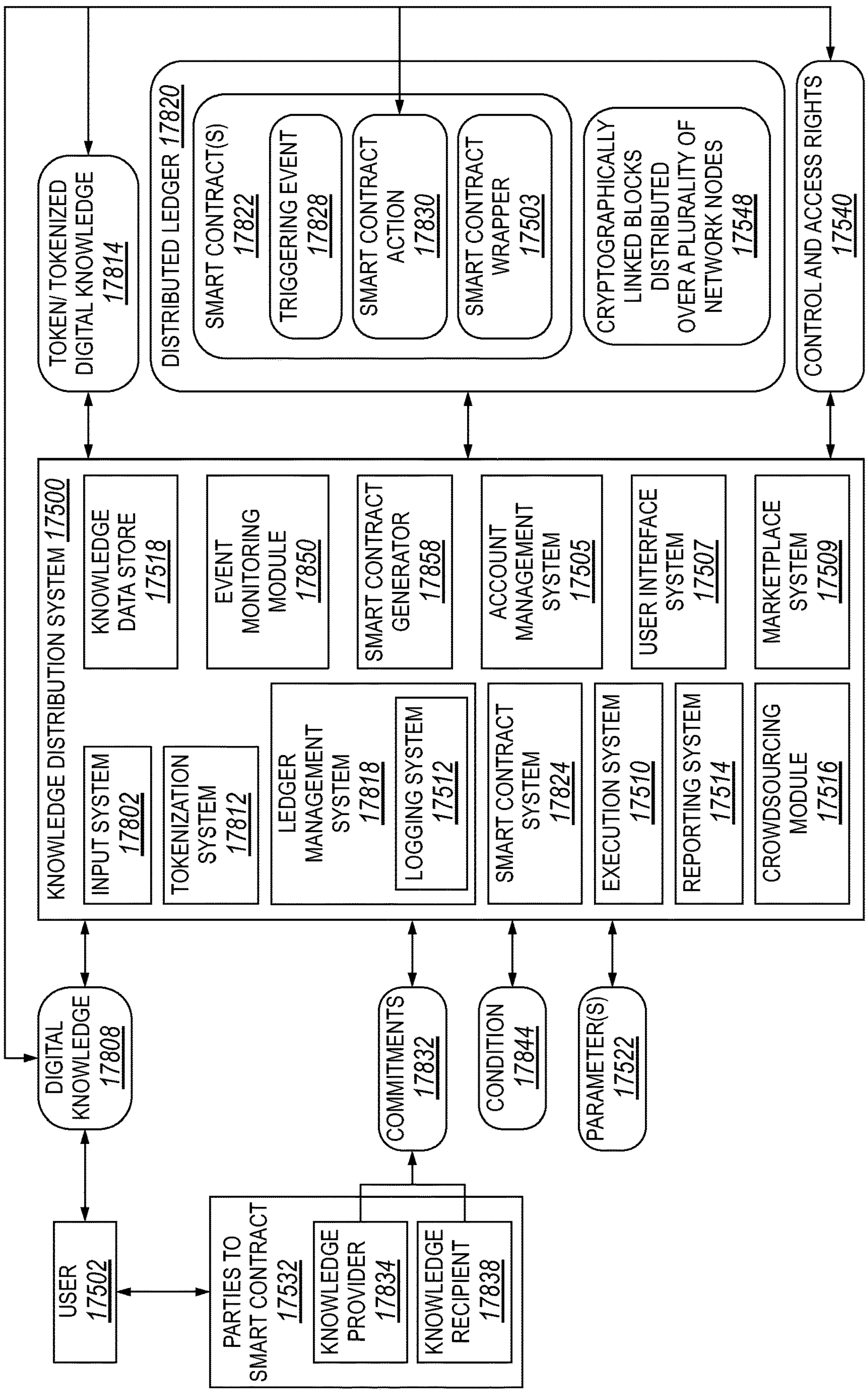

FIG. 175 depicts a knowledge distribution system for controlling rights related to digital knowledge.

Figure 176:
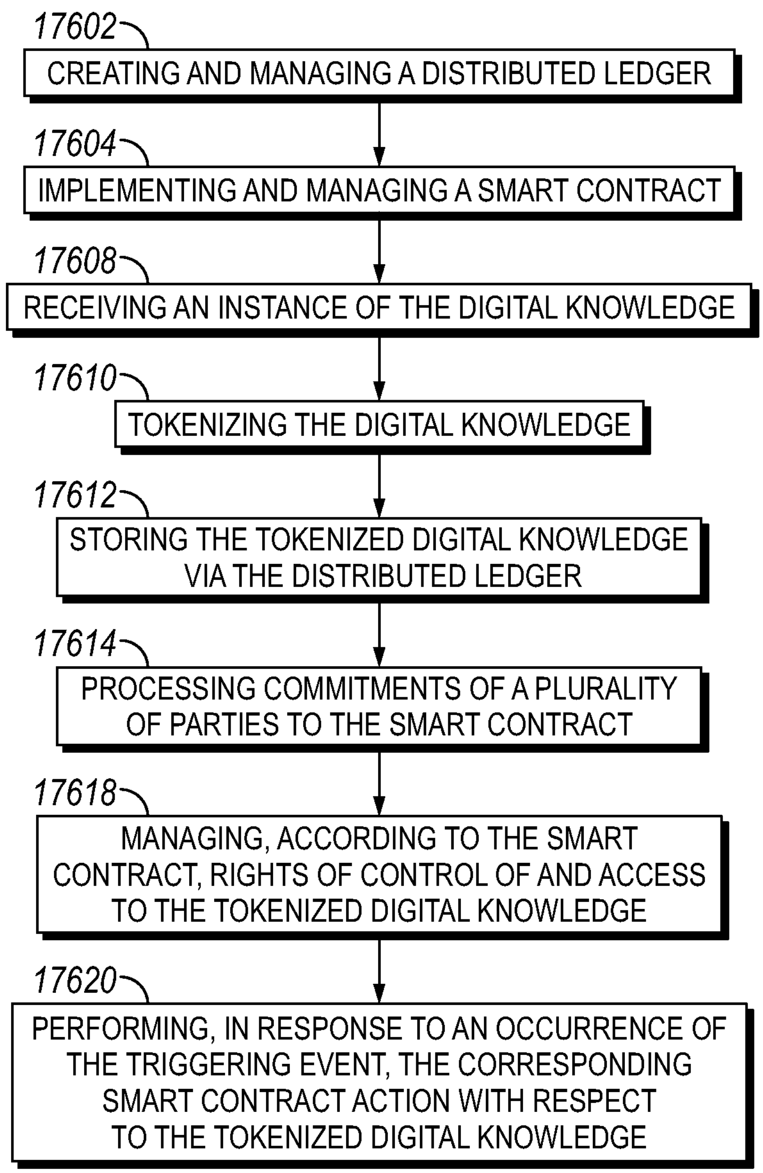

FIG. 176 depicts a computer-implemented method for controlling rights related to digital knowledge.

Figure 177:
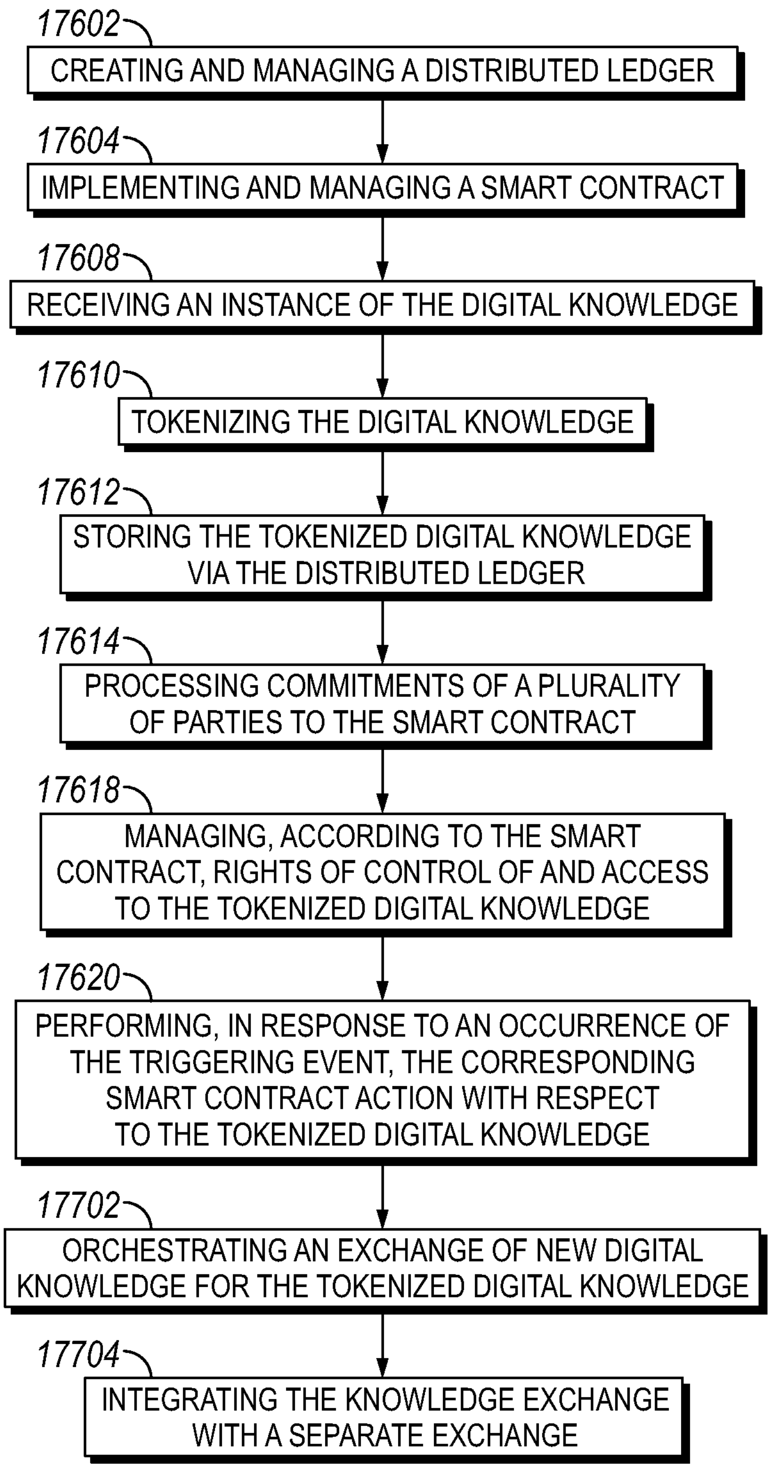

FIG. 177 depicts a computer-implemented method for controlling rights related to digital knowledge.

Figure 178:
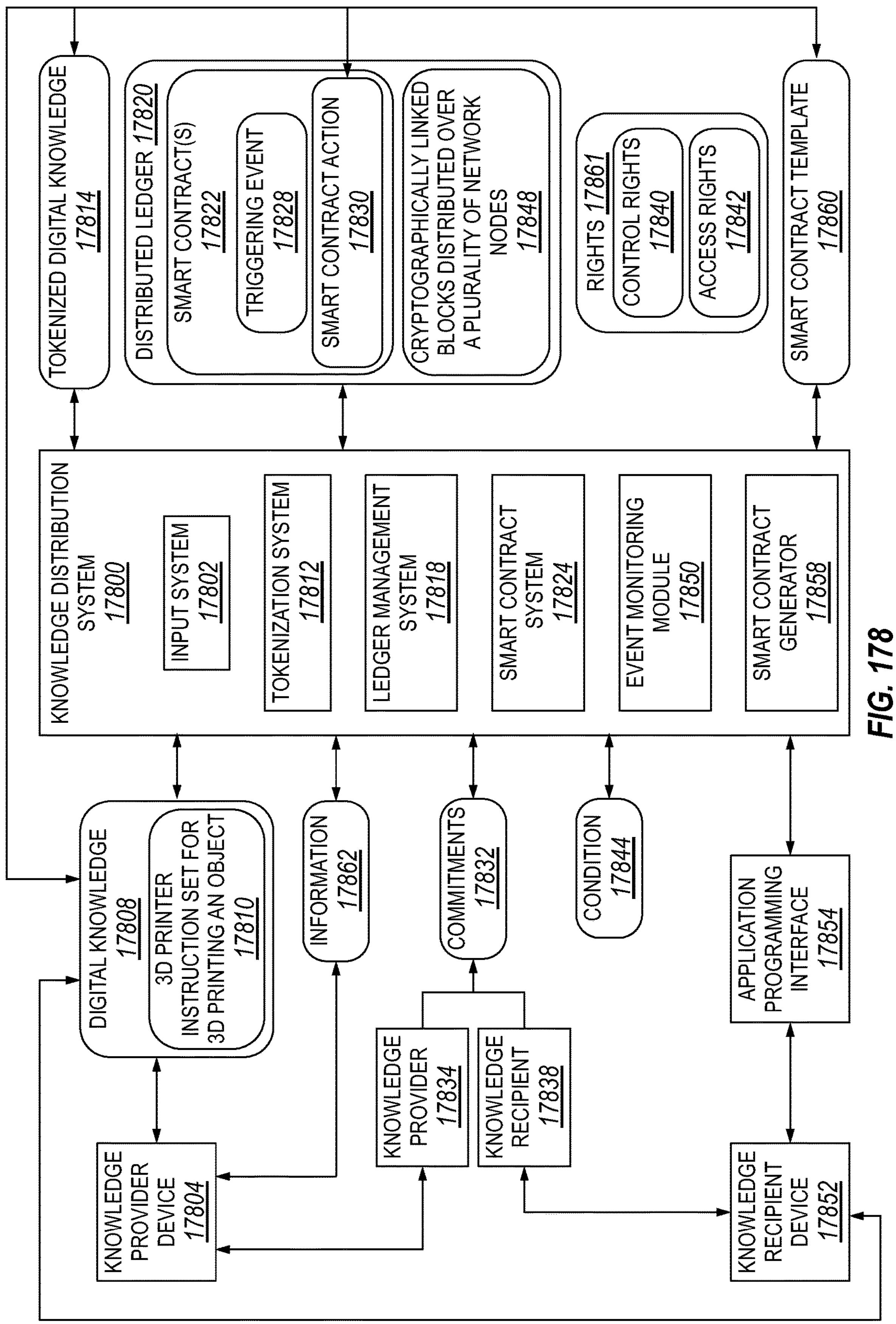

FIG. 178 depicts a knowledge distribution system for controlling rights related to digital knowledge.

Figure 179:
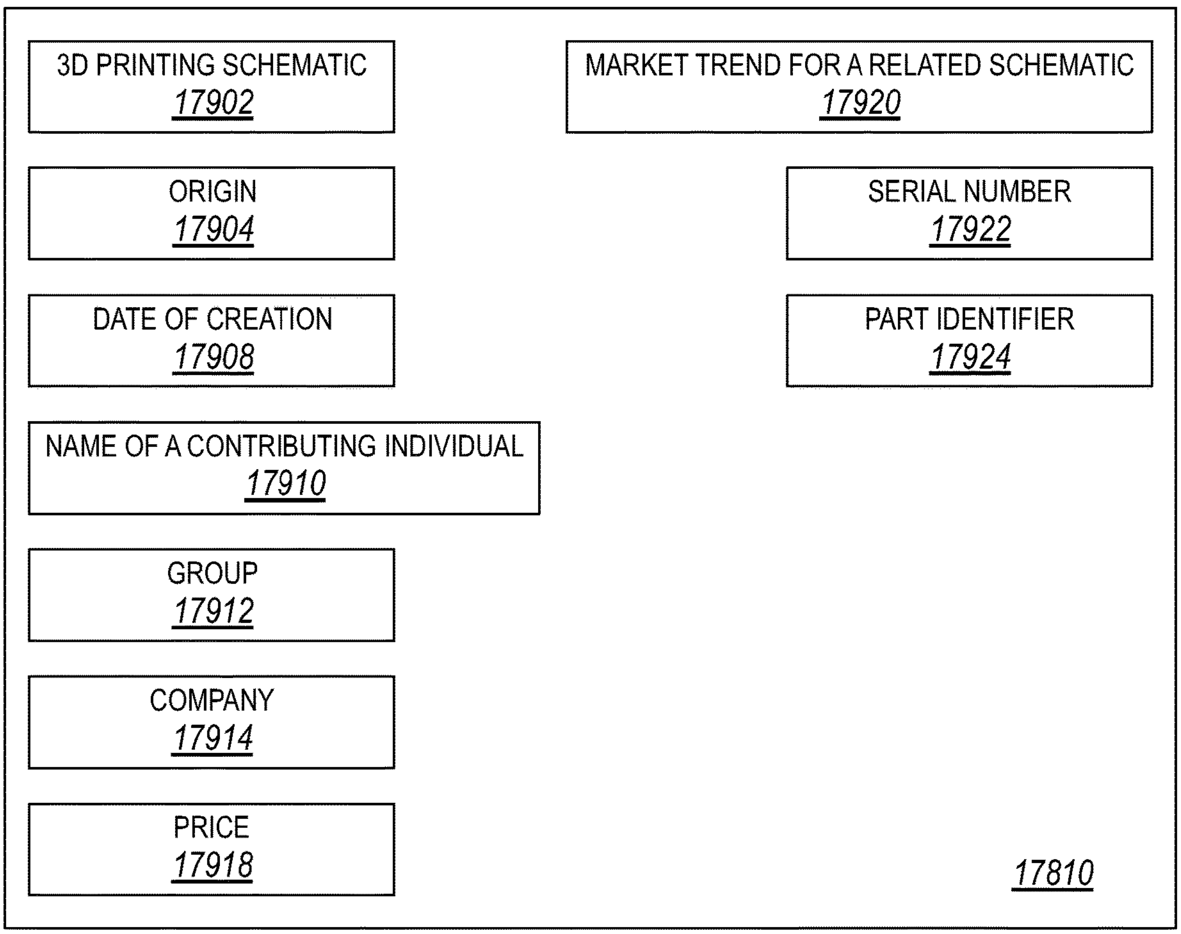

FIG. 179 depicts possible components of a 3D printer instruction set.

Figure 180:
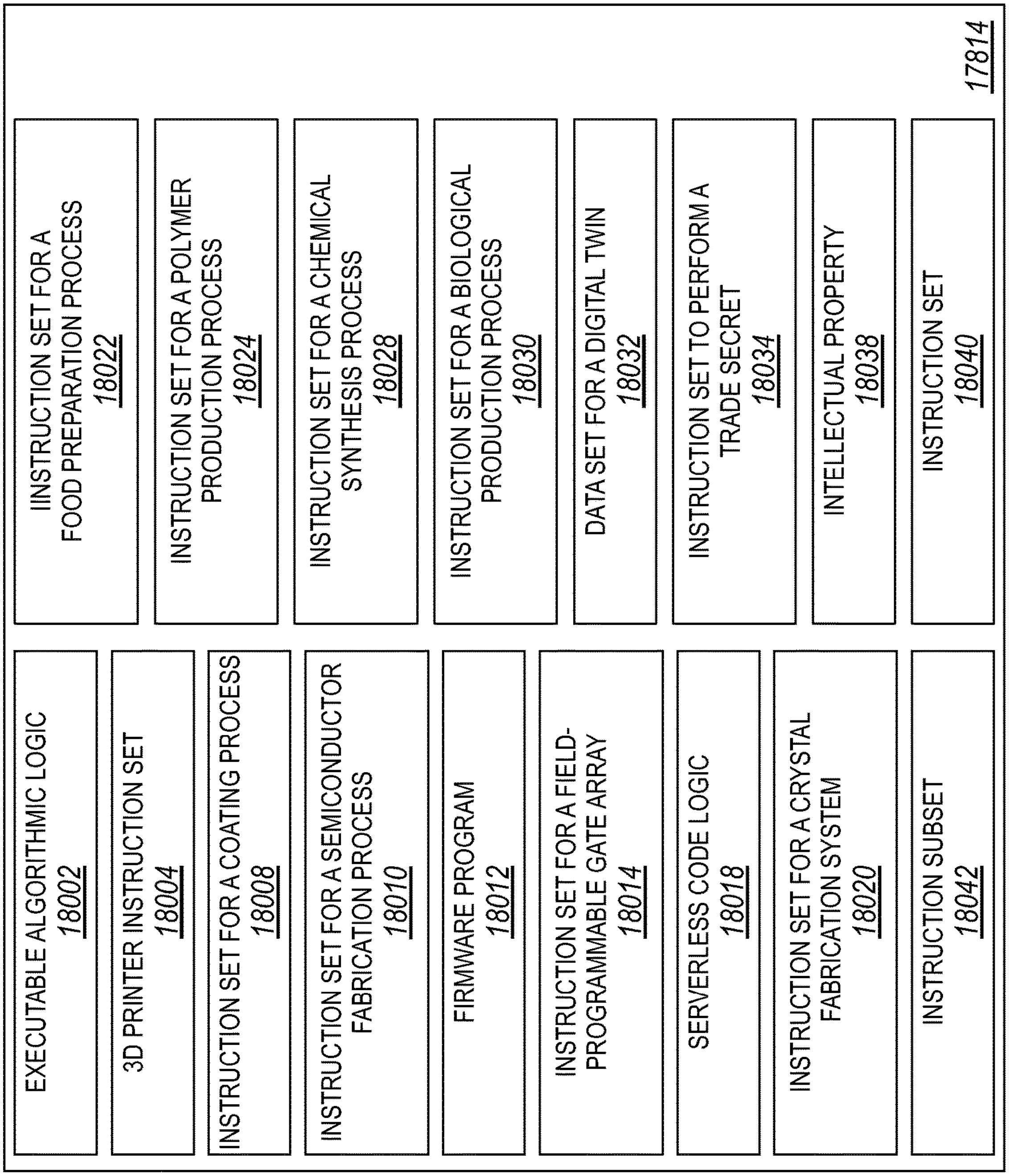

FIG. 180 depicts possible content of tokenized digital knowledge.

Figure 181:
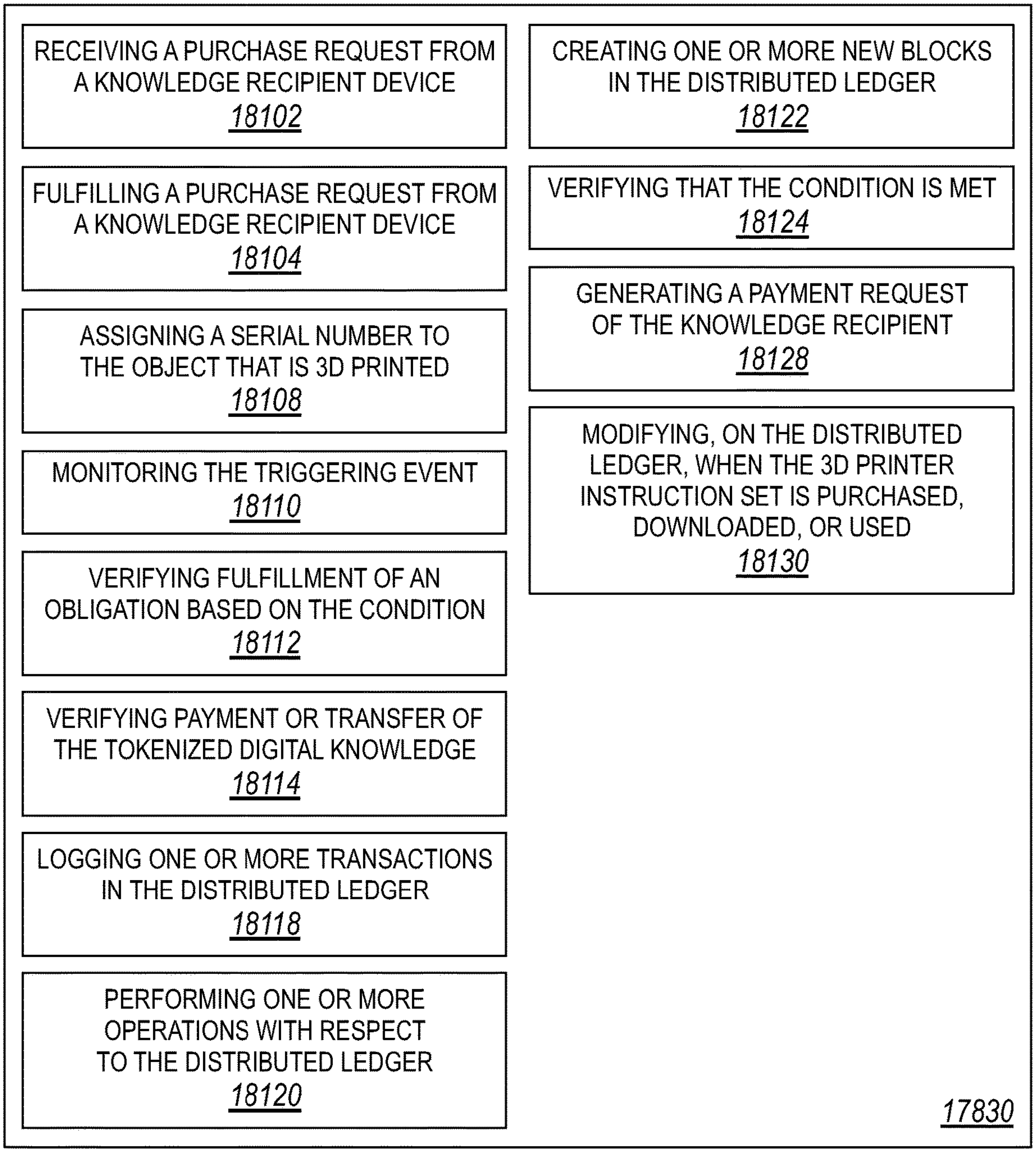

FIG. 181 depicts possible smart contract actions.

Figure 182:
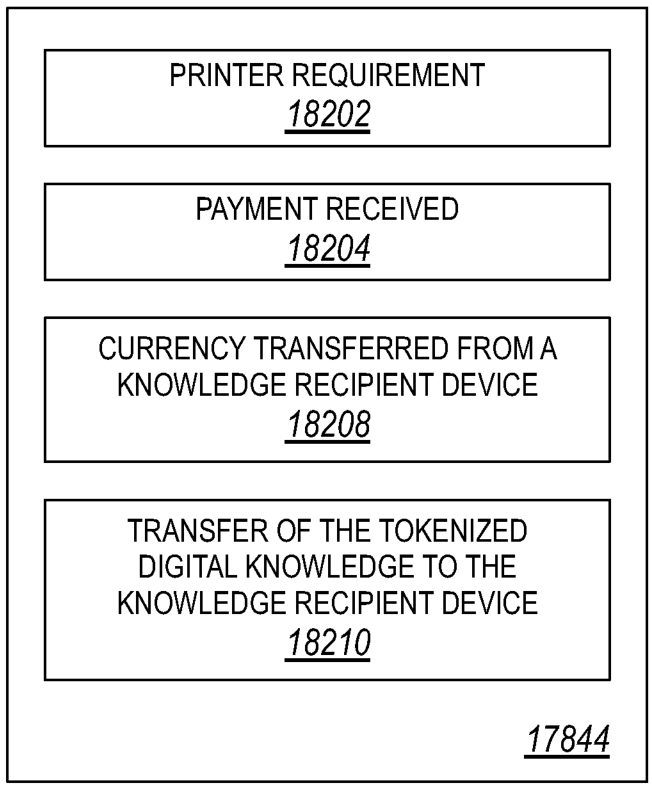

FIG. 182 depicts possible conditions relating to triggering events.

Figure 183:
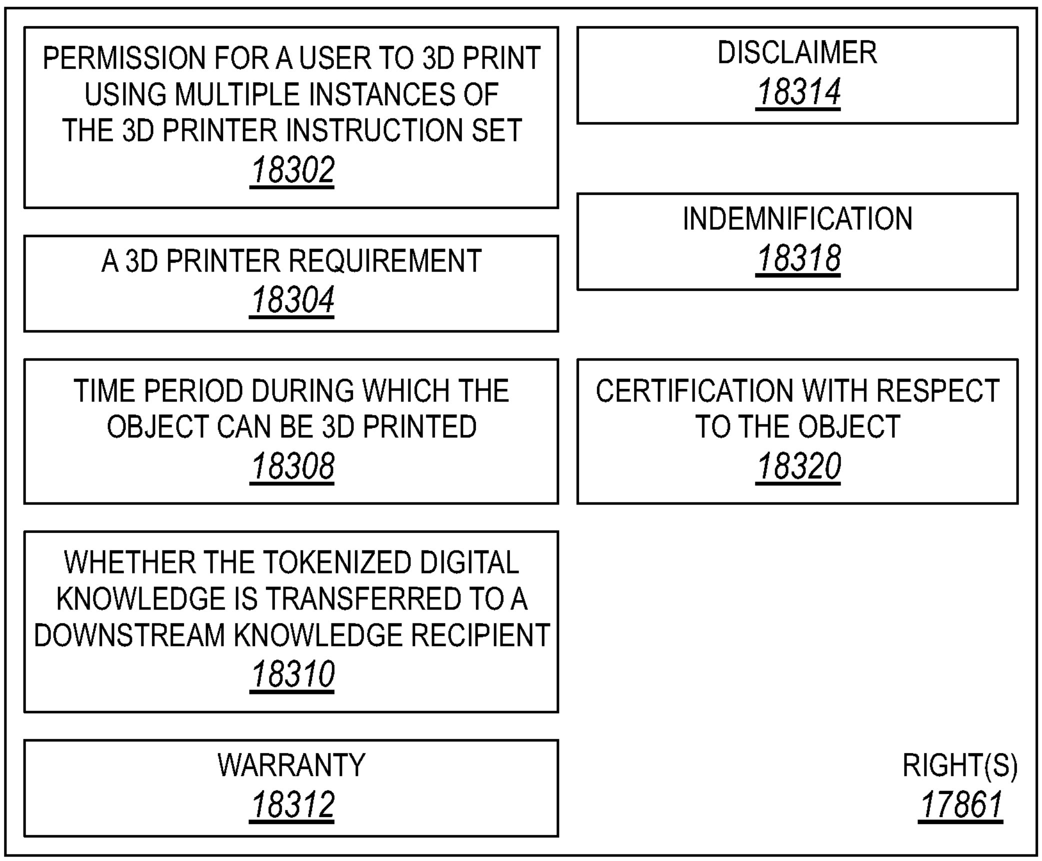

FIG. 183 depicts possible control and access rights.

Figure 184:
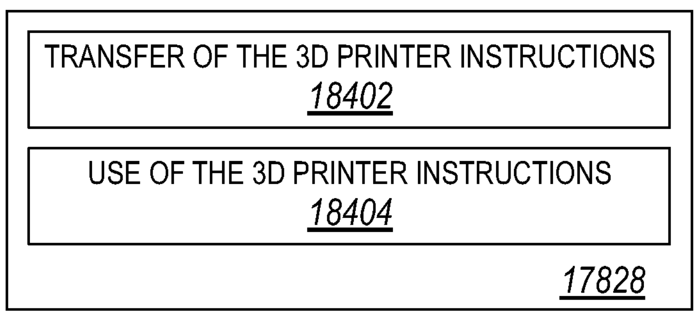

FIG. 184 depicts possible triggering events.

Figure 185:
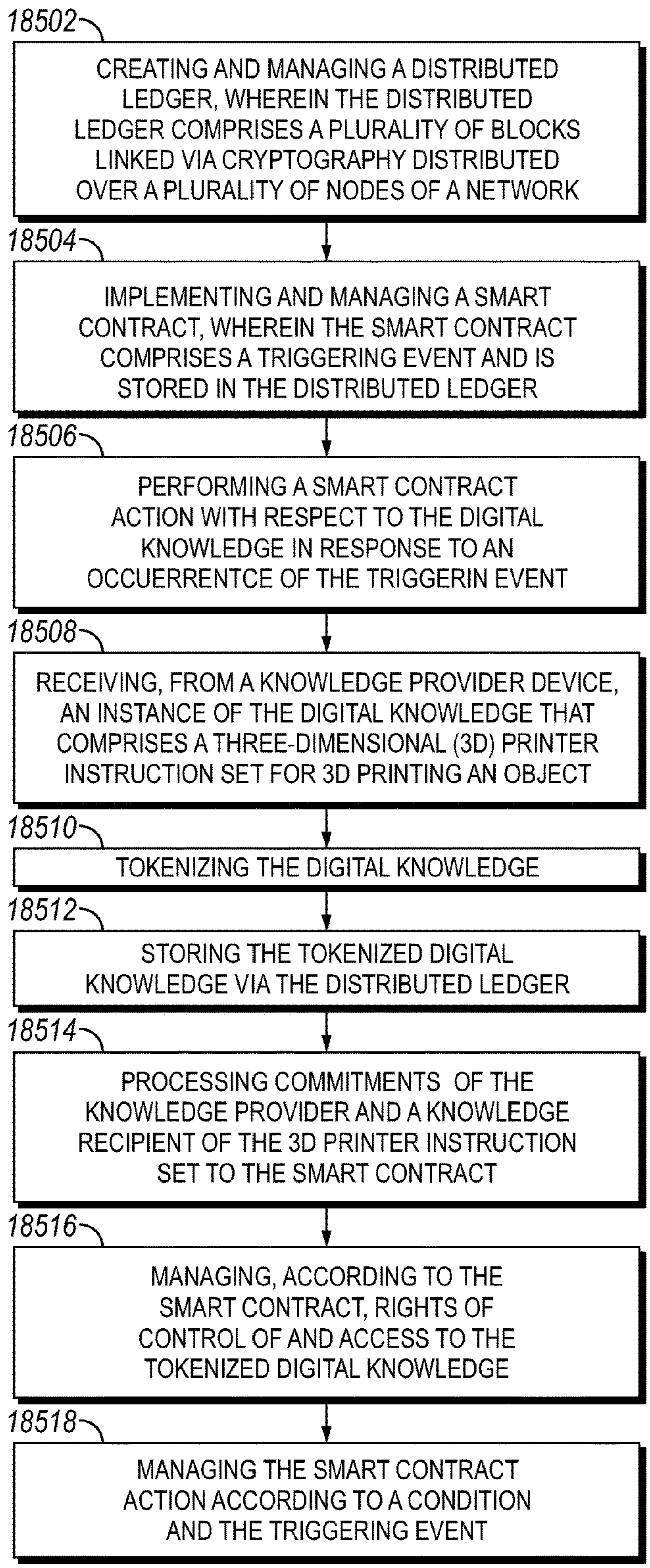

FIG. 185 depicts a computer-implemented method for controlling rights related to digital knowledge.

Figure 186:
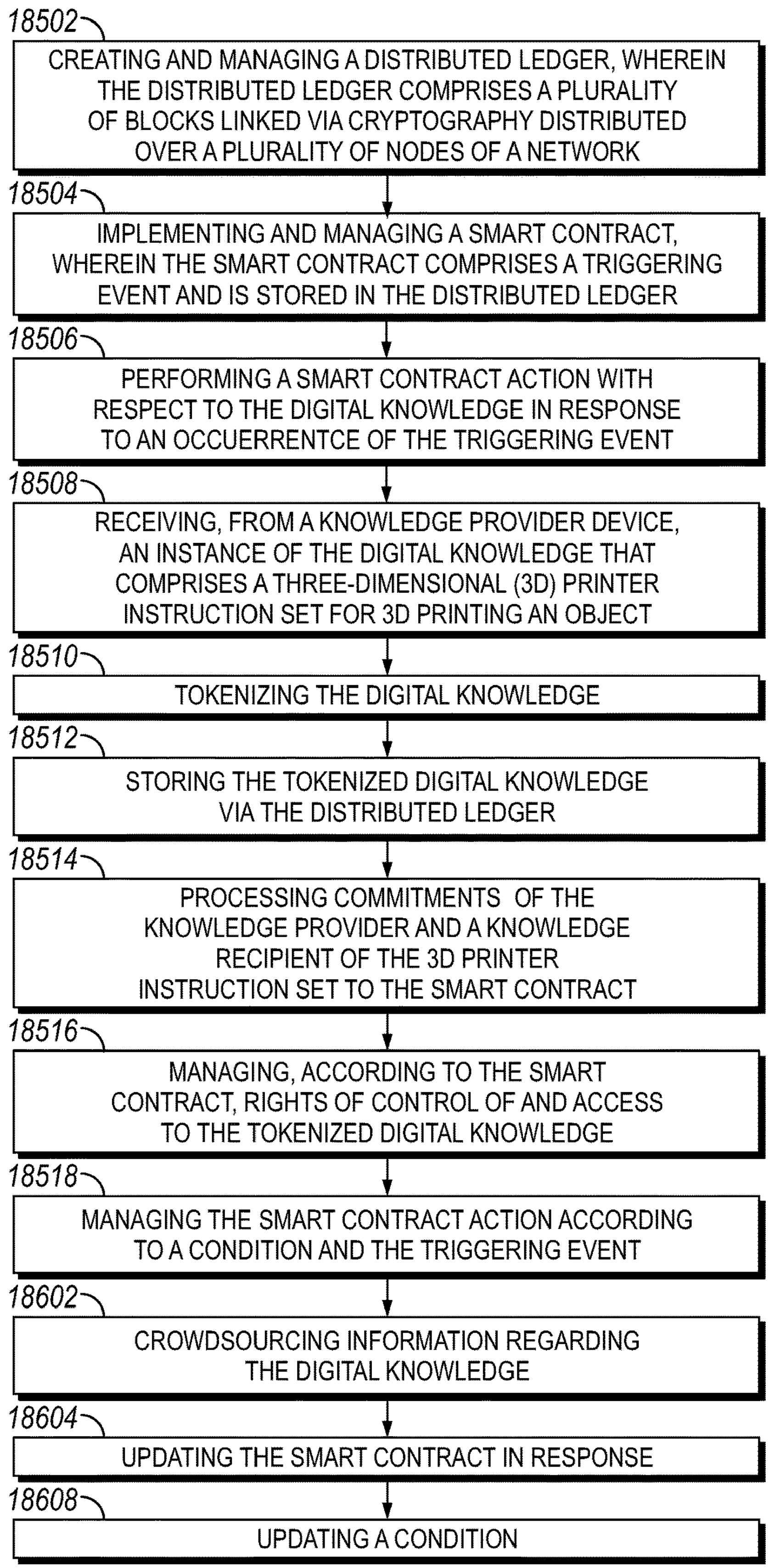

FIG. 186 depicts a computer-implemented method for controlling rights related to digital knowledge.

Figure 187:
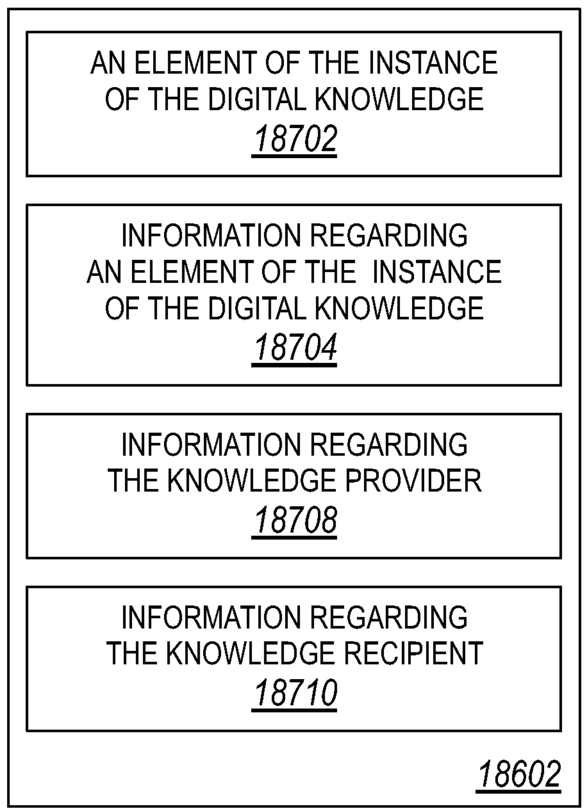

FIG. 187 depicts possible crowdsourced information.

Figure 188:
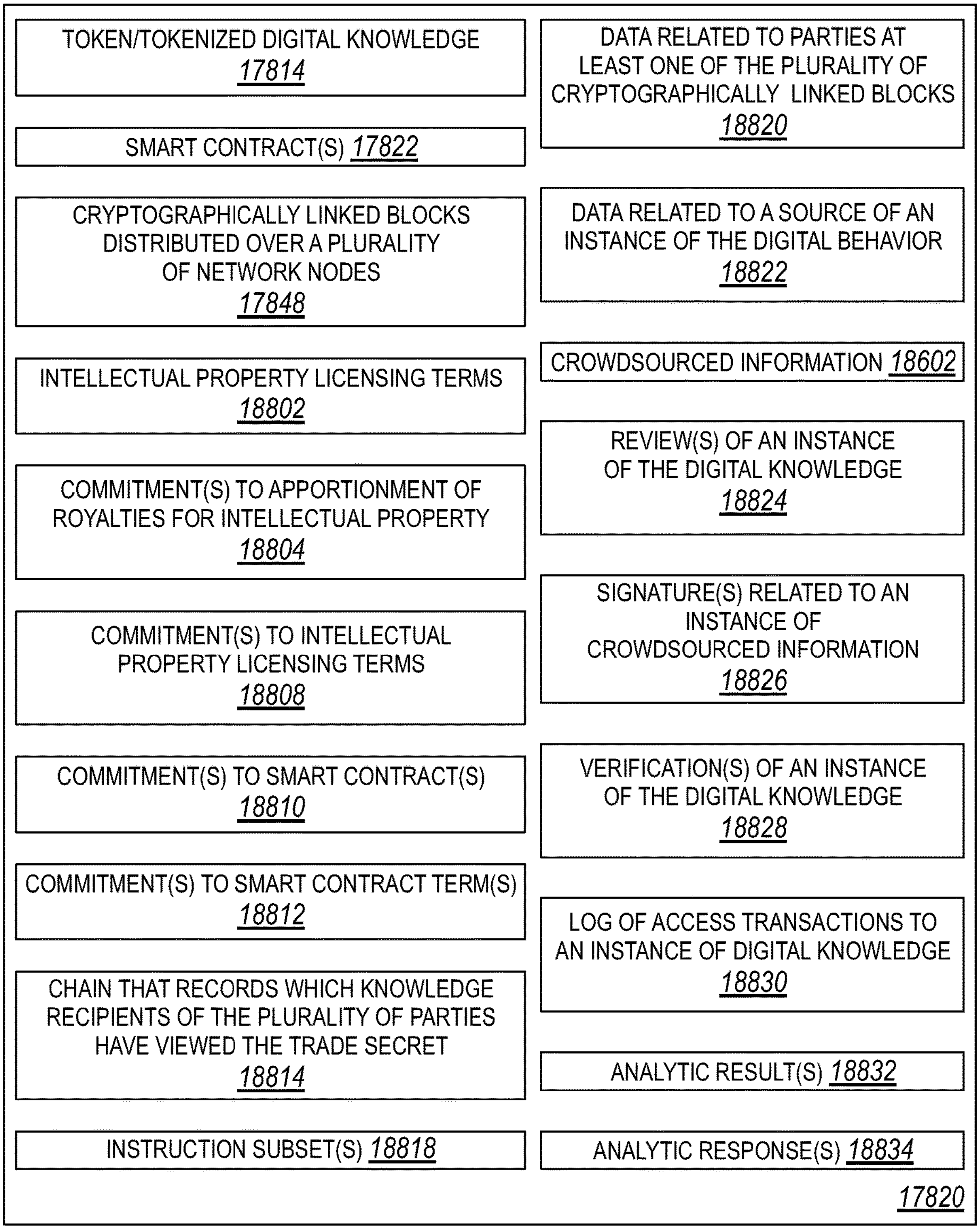

FIG. 188 depicts possible contents of a distributed ledger.

Figure 189:
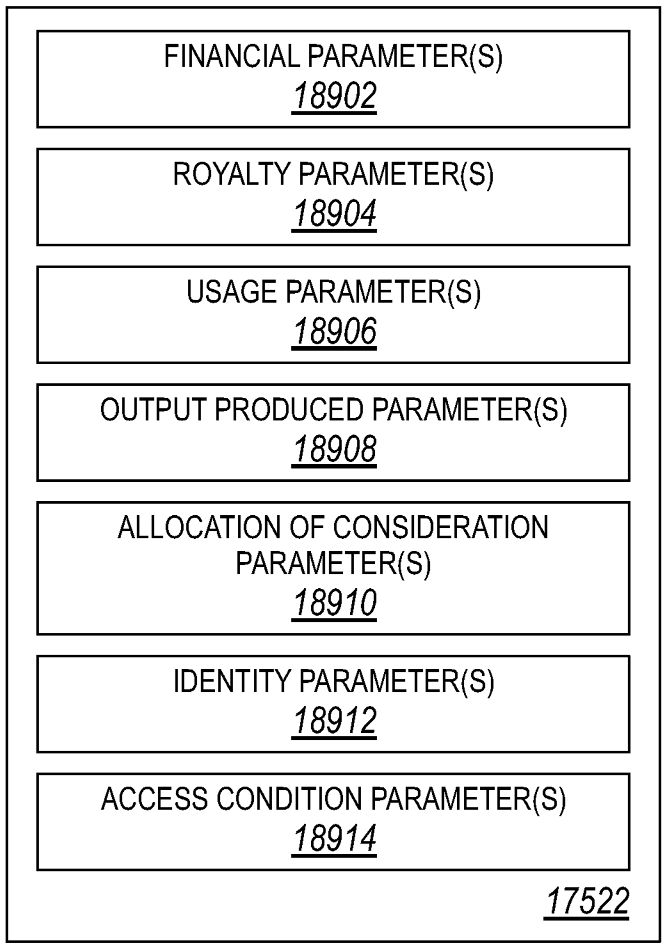

FIG. 189 depicts possible parameters.

Figure 190:
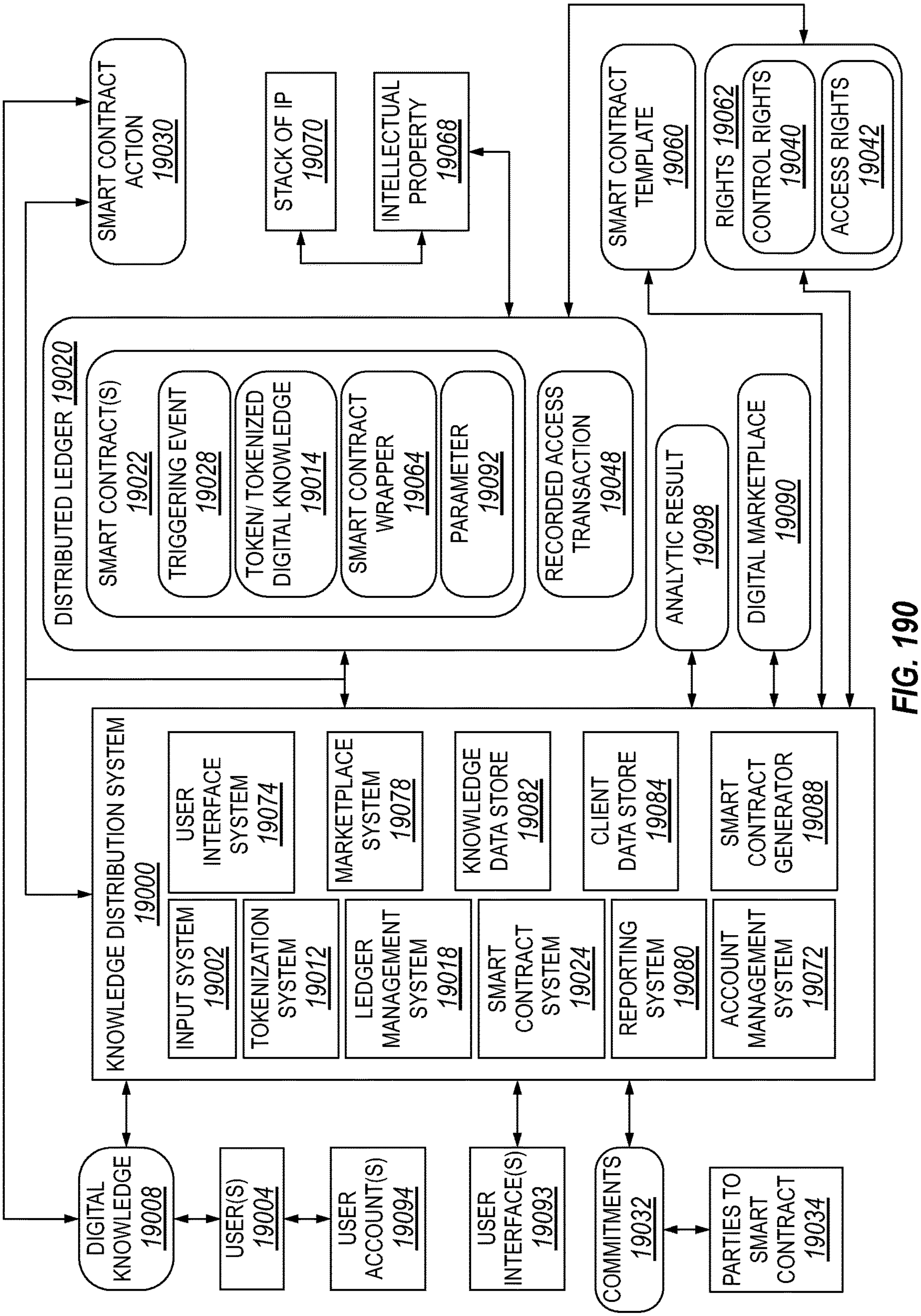
Figure 191:
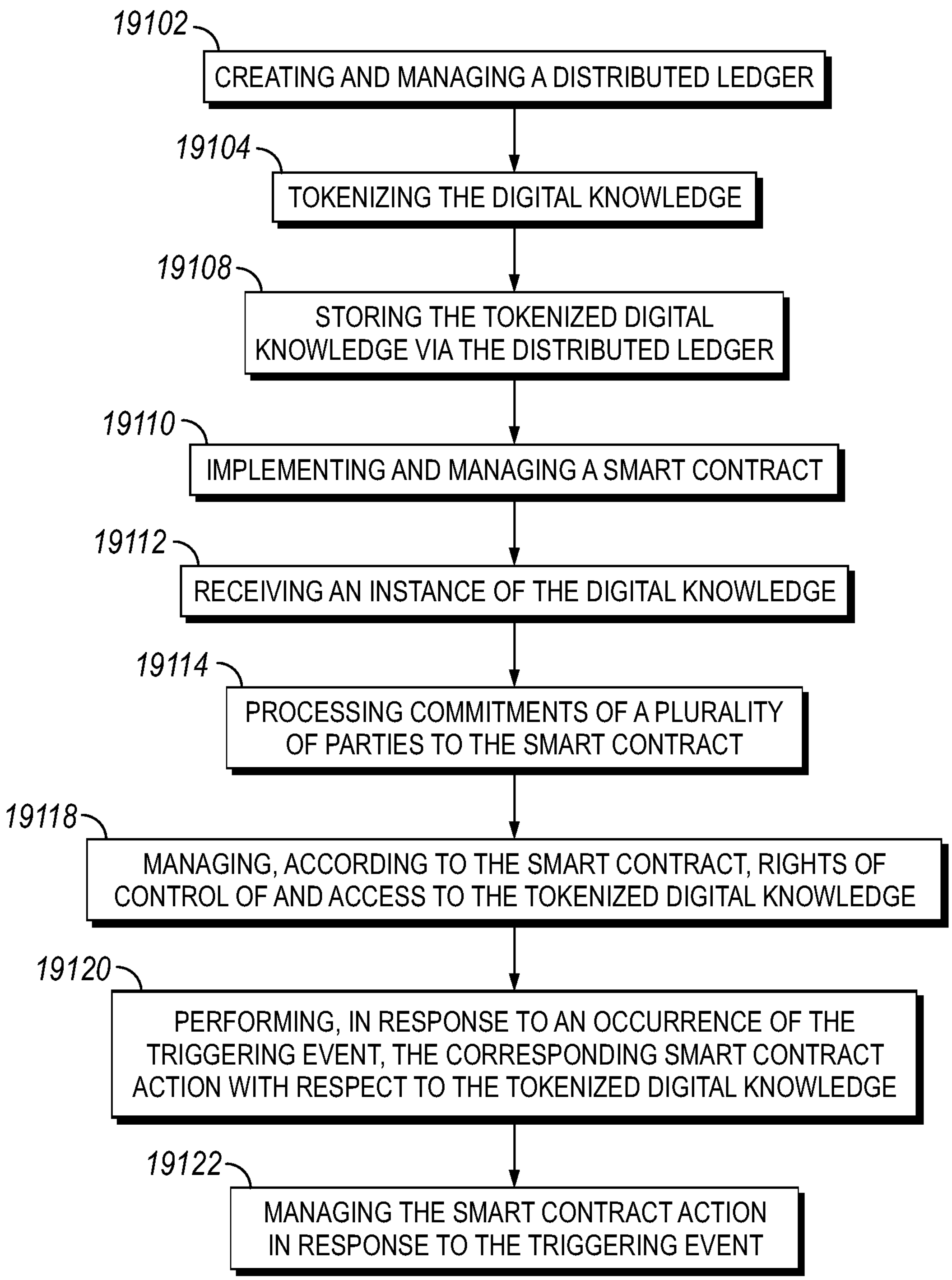
Figure 192:
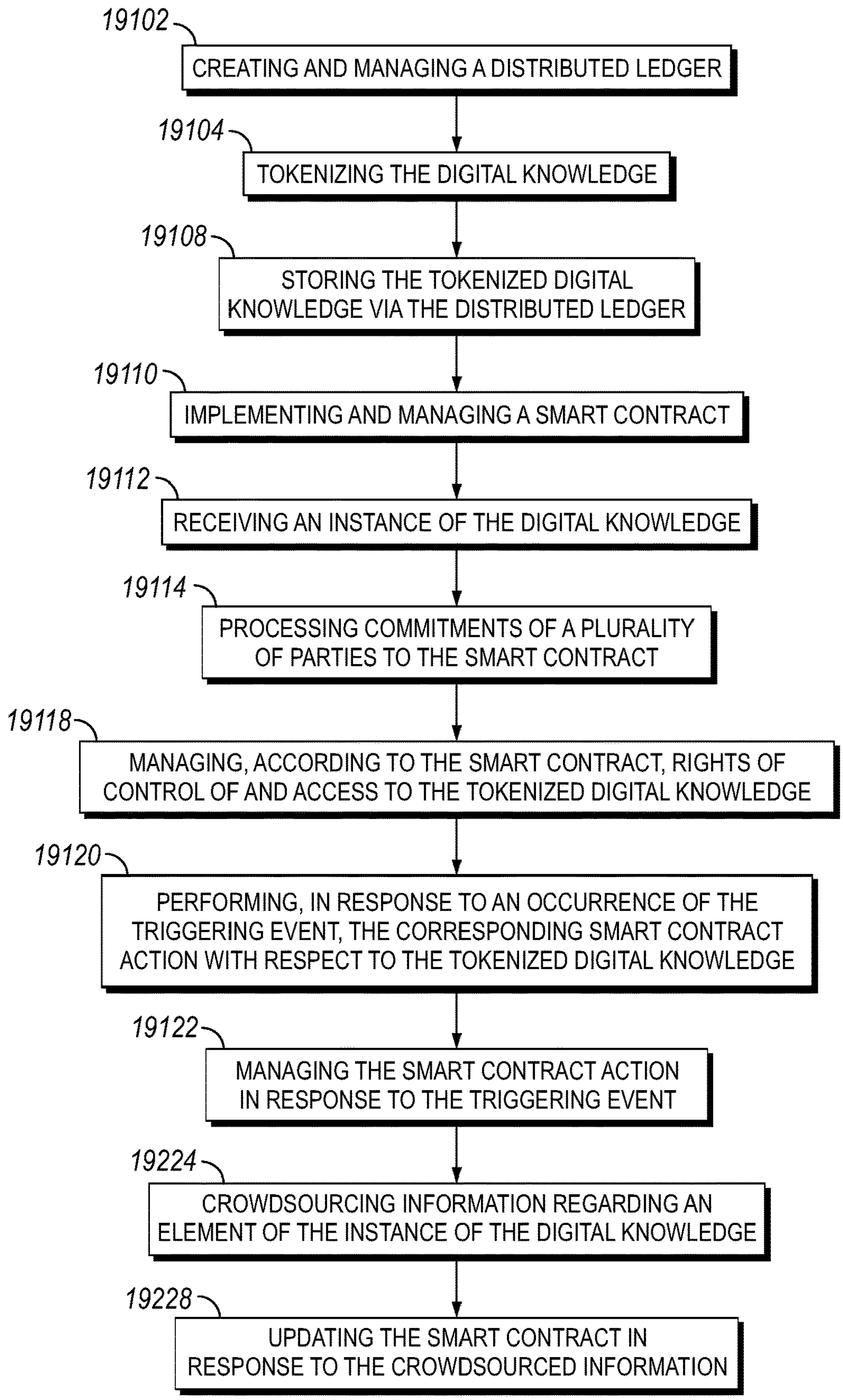
Figure 193:
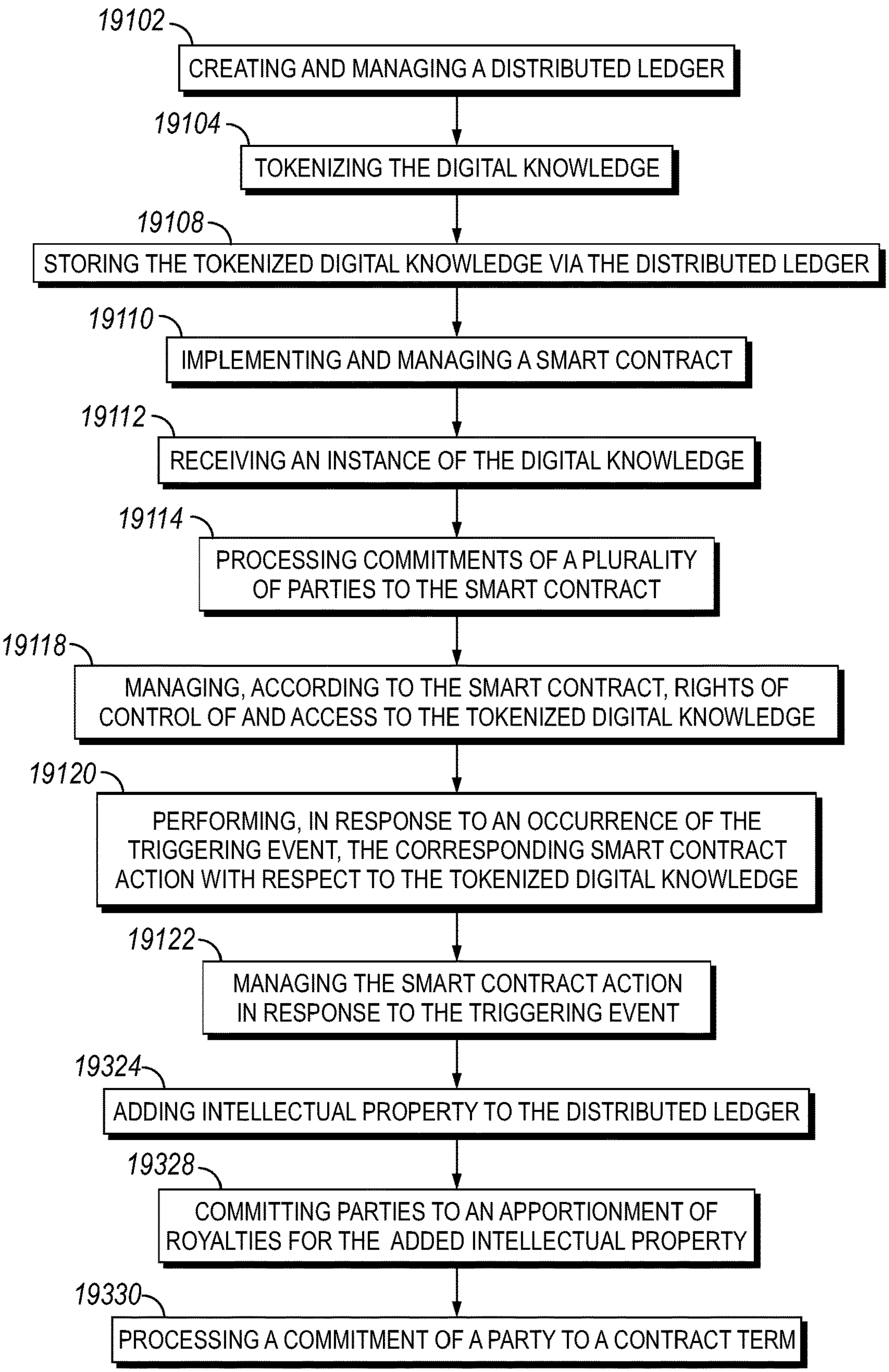
Figure 194:
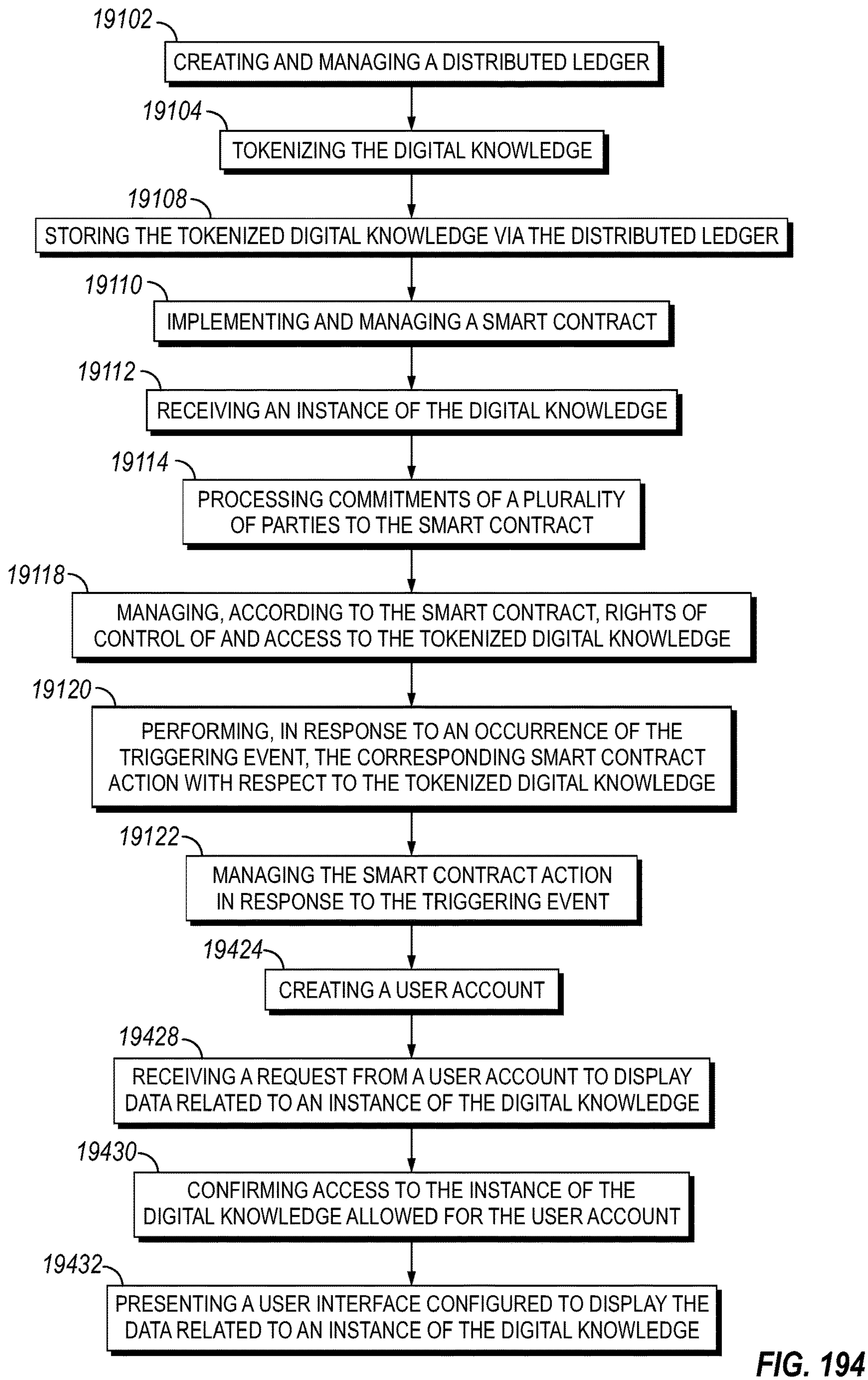
Figure 195:
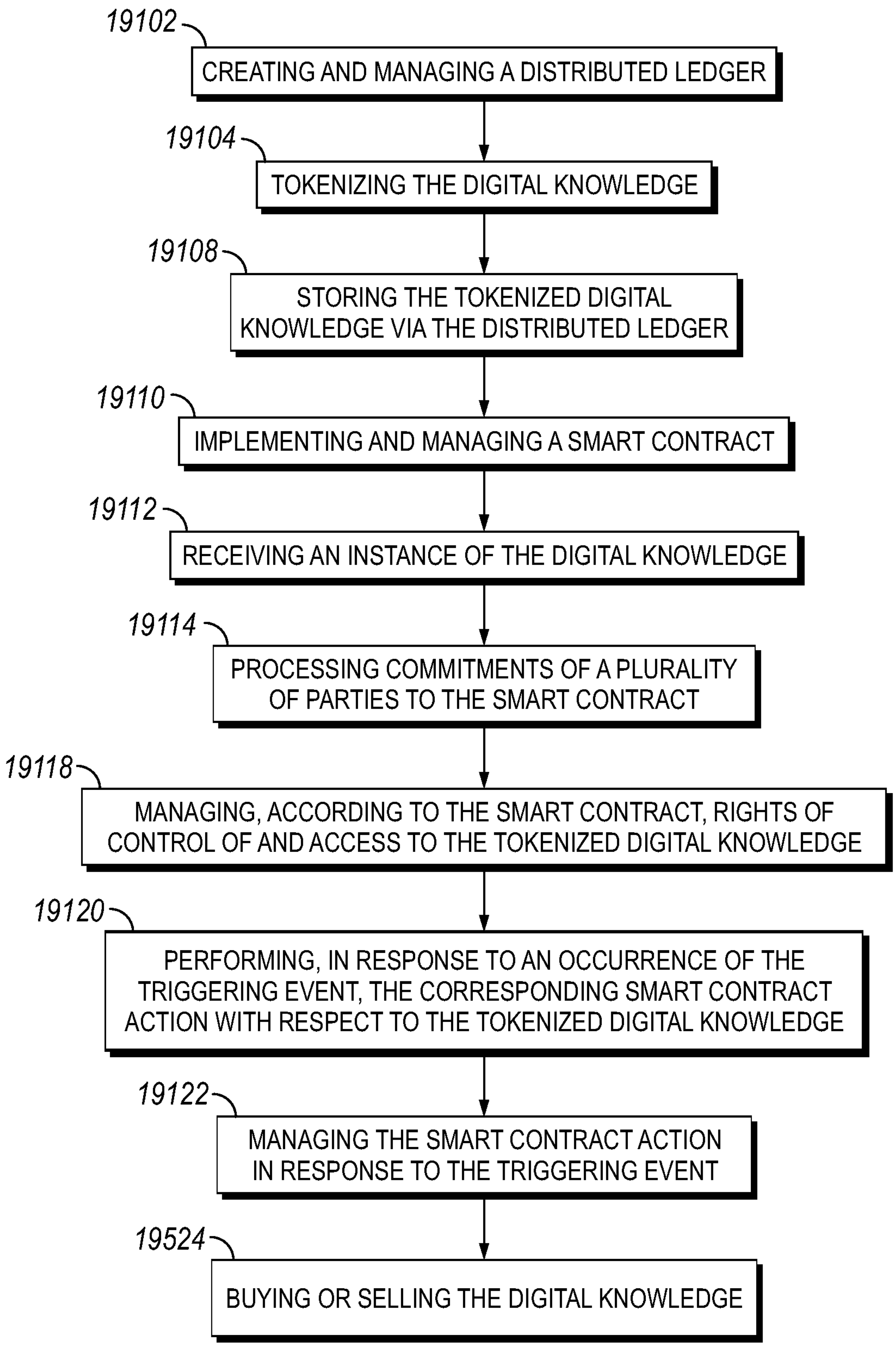
Figure 196:
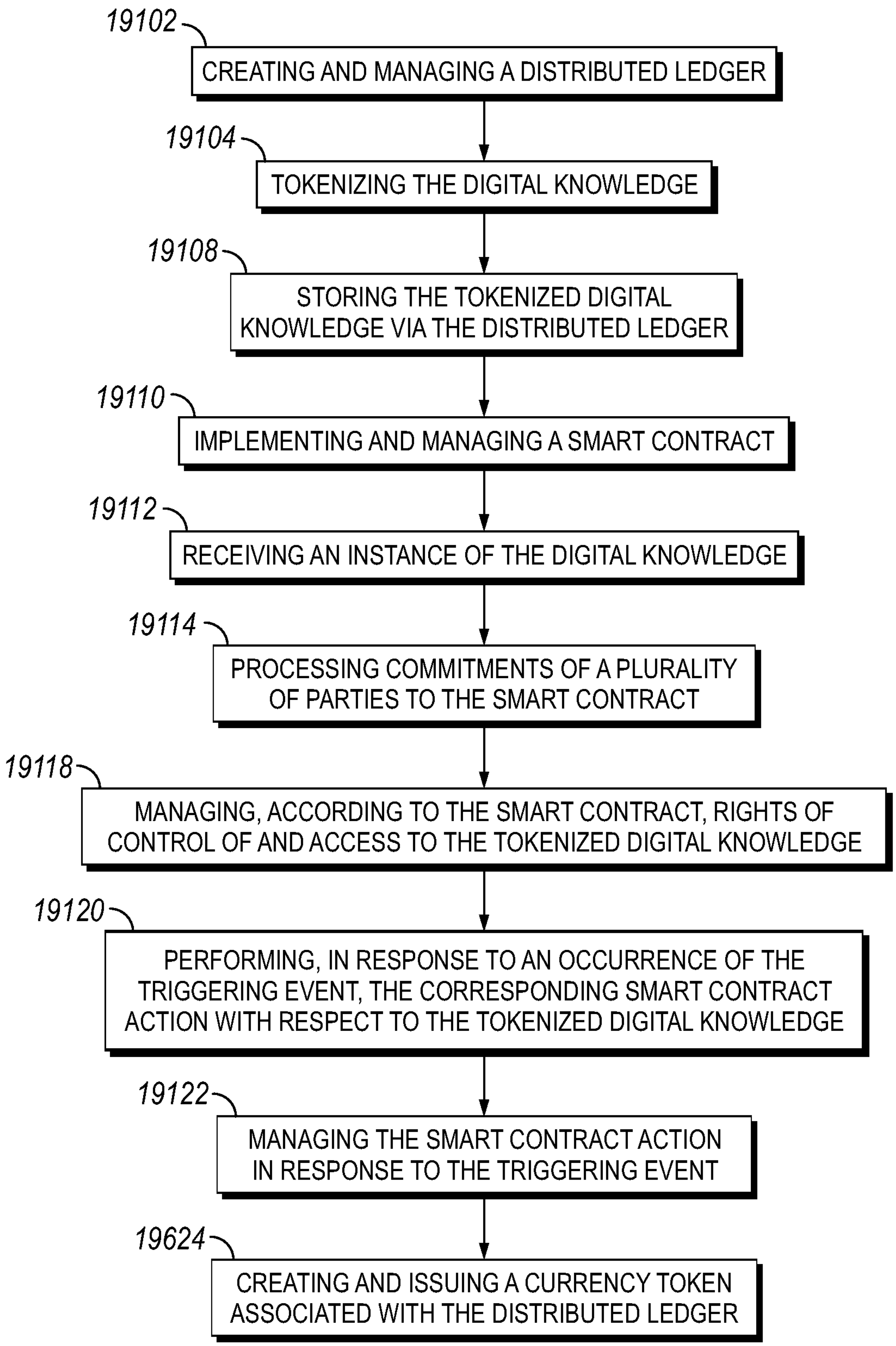

FIG. 190 depicts an embodiment of a knowledge distribution system for controlling rights related to digital knowledge.

FIGS. 191-196 depict embodiments of operations for controlling rights related to digital knowledge.

DETAILED DESCRIPTION

The term services/microservices (and similar terms) as utilized herein should be understood broadly. Without limitation to any other aspect or description of the present disclosure, a service/microservice includes any system (or platform) configured to functionally perform the operations of the service, where the system may be data-integrated, including data collection circuits, blockchain circuits, artificial intelligence circuits, and/or smart contract circuits for handling lending entities and transactions. Services/microservices may facilitate data handling and may include facilities for data extraction, transformation and loading; data cleansing and deduplication facilities; data normalization facilities; data synchronization facilities; data security facilities; computational facilities (e.g., for performing pre-defined calculation operations on data streams and providing an output stream); compression and de-compression facilities; analytic facilities (such as providing automated production of data visualizations), data processing facilities, and/or data storage facilities (including storage retention, formatting, compression, migration, etc.), and others.

Services/microservices may include controllers, processors, network infrastructure, input/output devices, servers, client devices (e.g., laptops, desktops, terminals, mobile devices, and/or dedicated devices), sensors (e.g., IoT sensors associated with one or more entities, equipment, and/or collateral), actuators (e.g., automated locks, notification devices, lights, camera controls, etc.), virtualized versions of any one or more of the foregoing (e.g., outsourced computing resources such as a cloud storage, computing operations; virtual sensors; subscribed data to be gathered such as stock or commodity prices, recordal logs, etc.), and/or include components configured as computer readable instructions that, when performed by a processor, cause the processor to perform one or more functions of the service, etc. Services may be distributed across a number of devices, and/or functions of a service may be performed by one or more devices cooperating to perform the given function of the service.

Services/microservices may include application programming interfaces that facilitate connection among the components of the system performing the service (e.g., microservices) and between the system to entities (e.g., programs, web sites, user devices, etc.) that are external to the system. Without limitation to any other aspect of the present disclosure, example microservices that may be present in certain embodiments include (a) a multi-modal set of data collection circuits that collect information about and monitor entities related to a lending transaction; (b) blockchain circuits for maintaining a secure historical ledger of events related to a loan, the blockchain circuits having access control features that govern access by a set of parties involved in a loan; (c) a set of application programming interfaces, data integration services, data processing workflows and user interfaces for handling loan-related events and loan-related activities; and (d) smart contract circuits for specifying terms and conditions of smart contracts that govern at least one of loan terms and conditions, loan-related events and loan-related activities. Any of the services/microservices may be controlled by or have control over a controller. Certain systems may not be considered to be a service/microservice. For example, a point of sale device that simply charges a set cost for a good or service may not be a service. In another example, a service that tracks the cost of a good or service and triggers notifications when the value changes may not be a valuation service itself, but may rely on valuation services, and/or may form a portion of a valuation service in certain embodiments. It can be seen that a given circuit, controller, or device may be a service or a part of a service in certain embodiments, such as when the functions or capabilities of the circuit, controller, or device are configured to support a service or microservice as described herein, but may not be a service or part of a service for other embodiments (e.g., where the functions or capabilities of the circuit, controller, or device are not relevant to a service or microservice as described herein). In another example, a mobile device being operated by a user may form a portion of a service as described herein at a first point in time (e.g., when the user accesses a feature of the service through an application or other communication from the mobile device, and/or when a monitoring function is being performed via the mobile device), but may not form a portion of the service at a second point in time (e.g., after a transaction is completed, after the user un-installs an application, and/or when a monitoring function is stopped and/or passed to another device). Accordingly, the benefits of the present disclosure may be applied in a wide variety of processes or systems, and any such processes or systems may be considered a service (or a part of a service) herein.

One of skill in the art, having the benefit of the disclosure herein and knowledge about a contemplated system ordinarily available to that person, can readily determine which aspects of the present disclosure will benefit a particular system, how to combine processes and systems from the present disclosure to construct, provide performance characteristics (e.g., bandwidth, computing power, time response, etc.), and/or provide operational capabilities (e.g., time between checks, up-time requirements including longitudinal (e.g., continuous operating time) and/or sequential (e.g., time-of-day, calendar time, etc.), resolution and/or accuracy of sensing, data determinations (e.g., accuracy, timing, amount of data), and/or actuator confirmation capability) of components of the service that are sufficient to provide a given embodiment of a service, platform, and/or microservice as described herein. Certain considerations for the person of skill in the art, in determining the configuration of components, circuits, controllers, and/or devices to implement a service, platform, and/or microservice ("service" in the listing following) as described herein include, without limitation: the balance of capital costs versus operating costs in implementing and operating the service; the availability, speed, and/or bandwidth of network services available for system components, service users, and/or other entities that interact with the service; the response time of considerations for the service (e.g., how quickly decisions within the service must be implemented to support the commercial function of the service, the operating time for various artificial intelligence or other high computation operations) and/or the capital or operating cost to support a given response time; the location of interacting components of the service, and the effects of such locations on operations of the service (e.g., data storage locations and relevant regulatory schemes, network communication limitations and/or costs, power costs as a function of the location, support availability for time zones relevant to the service, etc.); the availability of certain sensor types, the related support for those sensors, and the availability of sufficient substitutes (e.g., a camera may require supportive lighting, and/or high network bandwidth or local storage) for the sensing purpose; an aspect of the underlying value of an aspect of the service (e.g., a principal amount of a loan, a value of collateral, a volatility of the collateral value, a net worth or relative net worth of a lender, guarantor, and/or borrower, etc.) including the time sensitivity of the underlying value (e.g., if it changes quickly or slowly relative to the operations of the service or the term of the loan); a trust indicator between parties of a transaction (e.g., history of performance between the parties, a credit rating, social rating, or other external indicator, conformance of activity related to the transaction to an industry standard or other normalized transaction type, etc.); and/or the availability of cost recovery options (e.g., subscriptions, fees, payment for services, etc.) for given configurations and/or capabilities of the service, platform, and/or microservice. Without limitation to any other aspect of the present disclosure, certain operations performed by services herein include: performing real-time alterations to a loan based on tracked data; utilizing data to execute a collateral-backed smart contract; re-evaluating debt transactions in response to a tracked condition or data, and the like. While specific examples of services/microservices and considerations are described herein for purposes of illustration, any system benefitting from the disclosures herein, and any considerations understood to one of skill in the art having the benefit of the disclosures herein, are specifically contemplated within the scope of the present disclosure.

Without limitation, services include a financial service (e.g., a loan transaction service), a data collection service (e.g., a data collection service for collecting and monitoring data), a blockchain service (e.g., a blockchain service to maintain secure data), data integration services (e.g., a data integration service to aggregate data), smart contract services (e.g., a smart contract service to determine aspects of smart contracts), software services (e.g., a software service to extract data related to the entities from publicly available information sites), crowdsourcing services (e.g., a crowdsourcing service to solicit and report information), Internet of Things services (e.g., an Internet of Things service to monitor an environment), publishing services (e.g., a publishing services to publish data), microservices (e.g., having a set of application programming interfaces that facilitate connection among the microservices), valuation services (e.g., that use a valuation model to set a value for collateral based on information), artificial intelligence services, market value data collection services (e.g., that monitor and report on marketplace information), clustering services (e.g., for grouping the collateral items based on similarity of attributes), social networking services (e.g., that enables configuration with respect to parameters of a social network), asset identification services (e.g., for identifying a set of assets for which a financial institution is responsible for taking custody), identity management services (e.g., by which a financial institution verifies identities and credentials), and the like, and/or similar functional terminology. Example services to perform one or more functions herein include computing devices; servers; networked devices; user interfaces; inter-device interfaces such as communication protocols, shared information and/or information storage, and/or application programming interfaces (APIs); sensors (e.g., IoT sensors operationally coupled to monitored components, equipment, locations, or the like); distributed ledgers; circuits; and/or computer readable code configured to cause a processor to execute one or more functions of the service. One or more aspects or components of services herein may be distributed across a number of devices, and/or may consolidated, in whole or part, on a given device. In embodiments, aspects or components of services herein may be implemented at least in part through circuits, such as, in non-limiting examples, a data collection service implemented at least in part as a data collection circuit structed to collect and monitor data, a blockchain service implemented at least in part as a blockchain circuit structured to maintain secure data, data integration services implemented at least in part as a data integration circuit structured to aggregate data, smart contract services implemented at least in part as a smart contract circuit structed to determine aspects of smart contracts, software services implemented at least in part as a software service circuit structured to extract data related to the entities from publicly available information sites, crowdsourcing services implemented at least in part as a crowdsourcing circuit structured to solicit and report information, Internet of Things services implemented at least in part as an Internet of Things circuit structured to monitor an environment, publishing services implemented at least in part as a publishing services circuit structured to publish data, microservice service implemented at least in part as a microservice circuit structured to interconnect a plurality of service circuits, valuation service implemented at least in part as valuation services circuit structured to access a valuation model to set a value for collateral based on data, artificial intelligence service implemented at least in part as an artificial intelligence services circuit, market value data collection service implemented at least in part as market value data collection service circuit structured to monitor and report on marketplace information, clustering service implemented at least in part as a clustering services circuit structured to group collateral items based on similarity of attributes, a social networking service implemented at least in part as a social networking analytic services circuit structured to configure parameters with respect to a social network, asset identification services implemented at least in part as an asset identification service circuit for identifying a set of assets for which a financial institution is responsible for taking custody, identity management services implemented at least in part as an identity management service circuit enabling a financial institution to verify identities and credentials, and the like. Accordingly, the benefits of the present disclosure may be applied in a wide variety of systems, and any such systems may be considered with respect to items and services herein, while in certain embodiments a given system may not be considered with respect to items and services herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Among the considerations that one of skill in the art may contemplate to determine a configuration for a particular service include: the distribution and access devices available to one or more parties to a particular transaction; jurisdictional limitations on the storage, type, and communication of certain types of information; requirements or desired aspects of security and verification of information communication for the service; the response time of information gathering, inter-party communications, and determinations to be made by algorithms, machine learning components, and/or artificial intelligence components of the service; cost considerations of the service, including capital expenses and operating costs, as well as which party or entity will bear the costs and availability to recover costs such as through subscriptions, service fees, or the like; the amount of information to be stored and/or communicated to support the service; and/or the processing or computing power to be utilized to support the service.

The terms items and services (and similar terms) as utilized herein should be understood broadly. Without limitation to any other aspect or description of the present disclosure, items and service include any items and service, including, without limitation, items and services used as a reward, used as collateral, become the subject of a negotiation, and the like, such as, without limitation, an application for a warranty or guarantee with respect to an item that is the subject of a loan, collateral for a loan, or the like, such as a product, a service, an offering, a solution, a physical product, software, a level of service, quality of service, a financial instrument, a debt, an item of collateral, performance of a service, or other items. Without limitation to any other aspect or description of the present disclosure, items and service include any items and service, including, without limitation, items and services as applied to physical items (e.g., a vehicle, a ship, a plane, a building, a home, real estate property, undeveloped land, a farm, a crop, a municipal facility, a warehouse, a set of inventory, an antique, a fixture, an item of furniture, an item of equipment, a tool, an item of machinery, and an item of personal property), a financial item (e.g., a commodity, a security, a currency, a token of value, a ticket, a cryptocurrency), a consumable item (e.g., an edible item, a beverage), a highly valued item (e.g., a precious metal, an item of jewelry, a gemstone), an intellectual item (e.g., an item of intellectual property, an intellectual property right, a contractual right), and the like. Accordingly, the benefits of the present disclosure may be applied in a wide variety of systems, and any such systems may be considered with respect to items and services herein, while in certain embodiments a given system may not be considered with respect to items and services herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system.

The terms agent, automated agent, and similar terms as utilized herein should be understood broadly. Without limitation to any other aspect or description of the present disclosure, an agent or automated agent may process events relevant to at least one of the value, the condition, and the ownership of items of collateral or assets. The agent or automated agent may also undertake an action related to a loan, debt transaction, bond transaction, subsidized loan, or the like to which the collateral or asset is subject, such as in response to the processed events. The agent or automated agent may interact with a marketplace for purposes of collecting data, testing spot market transactions, executing transactions, and the like, where dynamic system behavior involves complex interactions that a user may desire to understand, predict, control, and/or optimize. Certain systems may not be considered an agent or an automated agent. For example, if events are merely collected but not processed, the system may not be an agent or automated agent. In some embodiments, if a loan-related action is undertaken not in response to a processed event, it may not have been undertaken by an agent or automated agent. One of skill in the art, having the benefit of the disclosure herein and knowledge about a contemplated system ordinarily available to that person, can readily determine which aspects of the present disclosure include and/or benefit from agents or automated agent. Certain considerations for the person of skill in the art, or embodiments of the present disclosure with respect to an agent or automated agent include, without limitation: rules that determine when there is a change in a value, condition or ownership of an asset or collateral, and/or rules to determine if a change warrants a further action on a loan or other transaction, and other considerations. While specific examples of market values and marketplace information are described herein for purposes of illustration, any embodiment benefitting from the disclosures herein, and any considerations understood to one of skill in the art having the benefit of the disclosures herein are specifically contemplated within the scope of the present disclosure.

The term marketplace information, market value and similar terms as utilized herein should be understood broadly. Without limitation to any other aspect or description of the present disclosure, marketplace information and market value describe a status or value of an asset, collateral, food, or service at a defined point or period in time. Market value may refer to the expected value placed on an item in a marketplace or auction setting, or pricing or financial data for items that are similar to the item, asset, or collateral in at least one public marketplace. For a company, market value may be the number of its outstanding shares multiplied by the current share price. Valuation services may include market value data collection services that monitor and report on marketplace information relevant to the value (e.g., market value) of collateral, the issuer, a set of bonds, and a set of assets. a set of subsidized loans, a party, and the like. Market values may be dynamic in nature because they depend on an assortment of factors, from physical operating conditions to economic climate to the dynamics of demand and supply. Market value may be affected by, and marketplace information may include, proximity to other assets, inventory or supply of assets, demand for assets, origin of items, history of items, underlying current value of item components, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity. In certain embodiments, a market value may include information such as a volatility of a value, a sensitivity of a value (e.g., relative to other parameters having an uncertainty associated therewith), and/or a specific value of the valuated object to a particular party (e.g., an object may have more value as possessed by a first party than as possessed by a second party).

Certain information may not be marketplace information or a market value. For example, where variables related to a value are not market-derived, they may be a value-in-use or an investment value. In certain embodiments, an investment value may be considered a market value (e.g., when the valuating party intends to utilize the asset as an investment if acquired), and not a market value in other embodiments (e.g., when the valuating party intends to immediately liquidate the investment if acquired). One of skill in the art, having the benefit of the disclosure herein and knowledge about a contemplated system ordinarily available to that person, can readily determine which aspects of the present disclosure will benefit from marketplace information or a market value. Certain considerations for the person of skill in the art, in determining whether the term market value is referring to an asset, item, collateral, good, or service include: the presence of other similar assets in a marketplace, the change in value depending on location, an opening bid of an item exceeding a list price, and other considerations. While specific examples of market values and marketplace information are described herein for purposes of illustration, any embodiment benefitting from the disclosures herein, and any considerations understood to one of skill in the art having the benefit of the disclosures herein are specifically contemplated within the scope of the present disclosure.

The term apportion value or apportioned value and similar terms as utilized herein should be understood broadly. Without limitation to any other aspect or description of the present disclosure, apportion value describes a proportional distribution or allocation of value proportionally, or a process to divide and assign value according to a rule of proportional distribution. Apportionment of the value may be to several parties (e.g., each of the several parties is a beneficiary of a portion of the value), to several transactions (e.g., each of the transactions utilizes a portion of the value), and/or in a many-to-many relationship (e.g., a group of objects has an aggregate value that is apportioned between a number of parties and/or transactions). In some embodiments, the value may be a net loss and the apportioned value is the allocation of a liability to each entity. In other embodiments, apportioned value may refer to the distribution or allocation of an economic benefit, real estate, collateral or the like. In certain embodiments, apportionment may include a consideration of the value relative to the parties—for example, a $10 million asset apportioned 50/50 between two parties, where the parties have distinct value considerations for the asset, may result in one party crediting the apportionment differing resulting values from the apportionment. In certain embodiments, apportionment may include a consideration of the value relative to given transactions—for example a first type of transaction (e.g., a long-term loan) may have a different valuation of a given asset than a second type of transaction (e.g., a short-term line of credit).

Certain conditions or processes may not relate to apportioned value. For example, the total value of an item may provide its inherent worth, but not how much of the value is held by each identified entity. One of skill in the art, having the benefit of the disclosure herein and knowledge about apportioned value, can readily determine which aspects of the present disclosure will benefit a particular application for apportioned value. Certain considerations for the person of skill in the art, or embodiments of the present disclosure with respect to an apportioned value include, without limitation: the currency of the principal sum, the anticipated transaction type (loan, bond or debt), the specific type of collateral, the ratio of the loan to value, the ratio of the collateral to the loan, the gross transaction/loan amount, the amount of the principal sum, the number of entities owed, the value of the collateral, and the like. While specific examples of apportioned values are described herein for purposes of illustration, any embodiment benefitting from the disclosures herein, and any considerations understood to one of skill in the art having the benefit of the disclosures herein are specifically contemplated within the scope of the present disclosure.

The term financial condition and similar terms as utilized herein should be understood broadly. Without limitation to any other aspect or description of the present disclosure, financial condition describes a current status of an entity's assets, liabilities, and equity positions at a defined point or period in time. The financial condition may be memorialized in financial statement. The financial condition may further include an assessment of the ability of the entity to survive future risk scenarios or meet future or maturing obligations. Financial condition may be based on a set of attributes of the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity. A financial condition may also describe a requirement or threshold for an agreement or loan. For example, conditions for allowing a developer to proceed may be various certifications and their agreement to a financial payout. That is, the developer's ability to proceed is conditioned upon a financial element, among others. Certain conditions may not be a financial condition. For example, a credit card balance alone may be a clue as to the financial condition, but may not be the financial condition on its own. In another example, a payment schedule may determine how long a debt may be on an entity's balance sheet, but in a silo may not accurately provide a financial condition. One of skill in the art, having the benefit of the disclosure herein and knowledge about a contemplated system ordinarily available to that person, can readily determine which aspects of the present disclosure include and/or will benefit from a financial condition. Certain considerations for the person of skill in the art, in determining whether the term financial condition is referring to a current status of an entity's assets, liabilities, and equity positions at a defined point or period in time and/or for a given purpose include: the reporting of more than one financial data point, the ratio of a loan to value of collateral, the ratio of the collateral to the loan, the gross transaction/loan amount, the credit scores of the borrower and the lender, and other considerations. While specific examples of financial conditions are described herein for purposes of illustration, any embodiment benefitting from the disclosures herein, and any considerations understood to one of skill in the art having the benefit of the disclosures herein are specifically contemplated within the scope of the present disclosure.

The term interest rate and similar terms, as utilized herein should be understood broadly. Without limitation to any other aspect or description of the present disclosure, interest rate includes an amount of interest due per period, as a proportion of an amount lent, deposited or borrowed. The total interest on an amount lent or borrowed may depend on the principal sum, the interest rate, the compounding frequency, and the length of time over which it is lent, deposited or borrowed. Typically, interest rate is expressed as an annual percentage but can be defined for any time period. The interest rate relates to the amount a bank or other lender charges to borrow its money, or the rate a bank or other entity pays its savers for keeping money in an account. Interest rate may be variable or fixed. For example, an interest rate may vary in accordance with a government or other stakeholder directive, the currency of the principal sum lent or borrowed, the term to maturity of the investment, the perceived default probability of the borrower, supply and demand in the market, the amount of collateral, the status of an economy, or special features like call provisions. In certain embodiments, an interest rate may be a relative rate (e.g., relative to a prime rate, an inflation index, etc.). In certain embodiments, an interest rate may further consider costs or fees applied (e.g., "points") to adjust the interest rate. A nominal interest rate may not be adjusted for inflation while a real interest rate takes inflation into account. Certain examples may not be an interest rate for purposes of particular embodiments. For example, a bank account growing by a fixed dollar amount each year, and/or a fixed fee amount, may not be an example of an interest rate for certain embodiments. One of skill in the art, having the benefit of the disclosure herein and knowledge about interest rates, can readily determine the characteristics of an interest rate for a particular embodiment. Certain considerations for the person of skill in the art, or embodiments of the present disclosure with respect to an interest rate include, without limitation: the currency of the principal sum, variables for setting an interest rate, criteria for modifying an interest rate, the anticipated transaction type (loan, bond or debt), the specific type of collateral, the ratio of the loan to value, the ratio of the collateral to the loan, the gross transaction/loan amount, the amount of the principal sum, the appropriate lifespans of transactions and/or collateral for a particular industry, the likelihood that a lender will sell and/or consolidate a loan before the term, and the like. While specific examples of interest rates are described herein for purposes of illustration, any embodiment benefitting from the disclosures herein, and any considerations understood to one of skill in the art having the benefit of the disclosures herein are specifically contemplated within the scope of the present disclosure.

The term valuation services (and similar terms) as utilized herein should be understood broadly. Without limitation to any other aspect or description of the present disclosure, a valuation service includes any service that sets a value for a good or service. Valuation services may use a valuation model to set a value for collateral based on information from data collection and monitoring services. Smart contract services may process output from the set of valuation services and assign items of collateral sufficient to provide security for a loan and/or apportion value for an item of collateral among a set of lenders and/or transactions. Valuation services may include artificial intelligence services that may iteratively improve the valuation model based on outcome data relating to transactions in collateral. Valuation services may include market value data collection services that may monitor and report on marketplace information relevant to the value of collateral. Certain processes may not be considered to be a valuation service. For example, a point of sale device that simply charges a set cost for a good or service may not be a valuation service. In another example, a service that tracks the cost of a good or service and triggers notifications when the value changes may not be a valuation service itself, but may rely on valuation services and/or form a part of a valuation service. Accordingly, the benefits of the present disclosure may be applied in a wide variety of processes systems, and any such processes or systems may be considered a valuation service herein, while in certain embodiments a given service may not be considered a valuation service herein. One of skill in the art, having the benefit of the disclosure herein and knowledge about a contemplated system ordinarily available to that person, can readily determine which aspects of the present disclosure will benefit a particular system and how to combine processes and systems from the present disclosure to enhance operations of the contemplated system and/or to provide a valuation service. Certain considerations for the person of skill in the art, in determining whether a contemplated system is a valuation service and/or whether aspects of the present disclosure can benefit or enhance the contemplated system include, without limitation: perform real-time alterations to a loan based on a value of a collateral; utilize marketplace data to execute a collateral-backed smart contract; re-evaluate collateral based on a storage condition or geolocation; the tendency of the collateral to have a volatile value, be utilized, and/or be moved; and the like. While specific examples of valuation services and considerations are described herein for purposes of illustration, any system benefitting from the disclosures herein, and any considerations understood to one of skill in the art having the benefit of the disclosures herein, are specifically contemplated within the scope of the present disclosure.

The term collateral attributes (and similar terms) as utilized herein should be understood broadly. Without limitation to any other aspect or description of the present disclosure, collateral attributes include any identification of the durability (ability of the collateral to withstand wear or the useful life of the collateral), value, identification (does the collateral have definite characteristics that make it easy to identify or market), stability of value (does the collateral maintain value over time), standardization, grade, quality, marketability, liquidity, transferability, desirability, trackability, deliverability (ability of the collateral be delivered or transfer without a deterioration in value), market transparency (is the collateral value easily verifiable or widely agreed upon), physical or virtual. Collateral attributes may be measured in absolute or relative terms, and/or may include qualitative (e.g., categorical descriptions) or quantitative descriptions. Collateral attributes may be different for different industries, products, elements, uses, and the like. Collateral attributes may be assigned quantitative or qualitative values. Values associated with collateral attributes may be based on a scale (such as 1-10) or a relative designation (high, low, better, etc.). Collateral may include various components; each component may have collateral attributes. Collateral may, therefore, have multiple values for the same collateral attribute. In some embodiments, multiple values of collateral attributes may be combined to generate one value for each attribute. Some collateral attributes may apply only to specific portions of collateral. Some collateral attributes, even for a given component of the collateral, may have distinct values depending upon the party of interest (e.g., a party that values an aspect of the collateral more highly than another party) and/or depending upon the type of transaction (e.g., the collateral may be more valuable or appropriate for a first type of loan than for a second type of loan). Certain attributes associated with collateral may not be collateral attributes as described herein depending upon the purpose of the collateral attributes herein. For example, a product may be rated as durable relative to similar products; however, if the life of the product is much lower than the term of a particular loan in consideration, the durability of the product may be rated differently (e.g., not durable) or irrelevant (e.g., where the current inventory of the product is attached as the collateral, and is expected to change out during the term of the loan). Accordingly, the benefits of the present disclosure may be applied to a variety of attributes, and any such attributes may be considered collateral attributes herein, while in certain embodiments a given attribute may not be considered a collateral attribute herein. One of skill in the art, having the benefit of the disclosure herein and knowledge about contemplated collateral attributes ordinarily available to that person, can readily determine which aspects of the present disclosure will benefit a particular collateral attribute. Certain considerations for the person of skill in the art, in determining whether a contemplated attribute is a collateral attribute and/or whether aspects of the present disclosure can benefit or enhance the contemplated system include, without limitation: the source of the attribute and the source of the value of the attribute (e.g. does the attribute and attribute value comes from a reputable source), the volatility of the attribute (e.g. does the attribute values for the collateral fluctuate, is the attribute a new attribute for the collateral), relative differences in attribute values for similar collateral, exceptional values for attributes (e.g., some attribute values may be high, such as, in the 98th percentile or very low, such as in the 2nd percentile, compared to similar class of collateral), the fungibility of the collateral, the type of transaction related to the collateral, and/or the purpose of the utilization of collateral for a particular party or transaction. While specific examples of collateral attributes and considerations are described herein for purposes of illustration, any system benefitting from the disclosures herein, and any considerations understood to one of skill in the art having the benefit of the disclosures herein, are specifically contemplated within the scope of the present disclosure.

The term blockchain services (and similar terms) as utilized herein should be understood broadly. Without limitation to any other aspect or description of the present disclosure, blockchain services include any service related to the processing, recordation, and/or updating of a blockchain, and may include services for processing blocks, computing hash values, generating new blocks in a blockchain, appending a block to the blockchain, creating a fork in the blockchain, merging of forks in the blockchain, verifying previous computations, updating a shared ledger, updating a distributed ledger, generating cryptographic keys, verifying transactions, maintaining a blockchain, updating a blockchain, verifying a blockchain, generating random numbers. The services may be performed by execution of computer readable instructions on local computers and/or by remote servers and computers. Certain services may not be considered blockchain services individually but may be considered blockchain services based on the final use of the service and/or in a particular embodiment—for example, a computing a hash value may be performed in a context outside of a blockchain such in the context of secure communication. Some initial services may be invoked without first being applied to blockchains, but further actions or services in conjunction with the initial services may associate the initial service with aspects of blockchains. For example, a random number may be periodically generated and stored in memory; the random numbers may initially not be generated for blockchain purposes but may be utilized for blockchains. Accordingly, the benefits of the present disclosure may be applied in a wide variety of services, and any such services may be considered blockchain services herein, while in certain embodiments a given service may not be considered a blockchain service herein. One of skill in the art, having the benefit of the disclosure herein and knowledge about a contemplated blockchain service ordinarily available to that person, can readily determine which aspects of the present disclosure can be configured to implement, and/or will benefit, a particular blockchain service. Certain considerations for the person of skill in the art, in determining whether a contemplated service is a blockchain service and/or whether aspects of the present disclosure can benefit or enhance the contemplated system include, without limitation: the application of the service, the source of the service (e.g., if the service is associated with a known or verifiable blockchain service provider), responsiveness of the service (e.g., some blockchain services may have an expected completion time, and/or may be determined through utilization), cost of the service, the amount of data requested for the service, and/or the amount of data generated by the service (blocks of blockchain or keys associated with blockchains may be a specific size or a specific range of sizes). While specific examples of blockchain services and considerations are described herein for purposes of illustration, any system benefitting from the disclosures herein, and any considerations understood to one of skill in the art having the benefit of the disclosures herein, are specifically contemplated within the scope of the present disclosure.

The term blockchain (and variations such as cryptocurrency ledger, and the like) as utilized herein may be understood broadly to describe a cryptocurrency ledger that records, administrates or otherwise processes online transactions. A blockchain may be public, private, or a combination thereof, without limitation. A blockchain may also be used to represent a set of digital transactions, agreement, terms or other digital value. Without limitation to any other aspect or description of the present disclosure, in the former case, a blockchain may also be used in conjunction with investment applications, token-trading applications, and/or digital/cryptocurrency based marketplaces. A blockchain can also be associated with rendering consideration, such as providing goods, services, items, fees, access to a restricted area or event, data or other valuable benefit. Blockchains in various forms may be included where discussing a unit of consideration, collateral, currency, cryptocurrency or any other form of value. One of skill in the art, having the benefit of the disclosure herein and knowledge ordinarily available about a contemplated system, can readily determine the value symbolized or represented by a blockchain. While specific examples of blockchains are described herein for purposes of illustration, any embodiment benefitting from the disclosures herein, and any considerations understood to one of skill in the art having the benefit of the disclosures herein, are specifically contemplated within the scope of the present disclosure.

The terms ledger and distributed ledger (and similar terms) as utilized herein should be understood broadly. Without limitation to any other aspect or description of the present disclosure, a ledger may be a document, file, computer file, database, book, and the like which maintains a record of transactions. Ledgers may be physical or digital. Ledgers may include records related to sales, accounts, purchases, transactions, assets, liabilities, incomes, expenses, capital, and the like. Ledgers may provide a history of transactions that may be associated with time. Ledgers may be centralized or decentralized/distributed. A centralized ledger may be a document that is controlled, updated, or viewable by one or more selected entities or a clearinghouse and wherein changes or updates to the ledger are governed or controlled by the entity or clearinghouse. A distributed ledger may be a ledger that is distributed across a plurality of entities, participants or regions which may independently, concurrently, or consensually, update, or modify their copies of the ledger. Ledgers and distributed ledgers may include security measures and cryptographic functions for signing, concealing, or verifying content. In the case of distributed ledgers, blockchain technology may be used. In the case of distributed ledgers implemented using blockchain, the ledger may be Merkle trees comprising a linked list of nodes in which each node contains hashed or encrypted transactional data of the previous nodes. Certain records of transactions may not be considered ledgers. A file, computer file, database, or book may or may not be a ledger depending on what data it stores, how the data is organized, maintained, or secured. For example, a list of transactions may not be considered a ledger if it cannot be trusted or verified, and/or if it is based on inconsistent, fraudulent, or incomplete data. Data in ledgers may be organized in any format such as tables, lists, binary streams of data, or the like which may depend on convenience, source of data, type of data, environment, applications, and the like. A ledger that is shared among various entities may not be a distributed ledger, but the distinction of distributed may be based on which entities are authorized to make changes to the ledger and/or how the changes are shared and processed among the different entities. Accordingly, the benefits of the present disclosure may be applied in a wide variety of data, and any such data may be considered ledgers herein, while in certain embodiments a given data may not be considered a ledger herein. One of skill in the art, having the benefit of the disclosure herein and knowledge about contemplated ledgers and distributed ledger ordinarily available to that person, can readily determine which aspects of the present disclosure can be utilized to implement, and/or will benefit a particular ledger. Certain considerations for the person of skill in the art, in determining whether a contemplated data is a ledger and/or whether aspects of the present disclosure can benefit or enhance the contemplated ledger include, without limitation: the security of the data in the ledger (can the data be tampered or modified), the time associated with making changes to the data in the ledger, cost of making changes (computationally and monetarily), detail of data, organization of data (does the data need to be processed for use in an application), who controls the ledger (can the party be trusted or relied to manage the ledger), confidentiality of the data (who can see or track the data in the ledger), size of the infrastructure, communication requirements (distributed ledgers may require a communication interface or specific infrastructure), resiliency. While specific examples of blockchain services and considerations are described herein for purposes of illustration, any system benefitting from the disclosures herein, and any considerations understood to one of skill in the art having the benefit of the disclosures herein, are specifically contemplated within the scope of the present disclosure.

The term loan (and similar terms) as utilized herein should be understood broadly. Without limitation to any other aspect or description of the present disclosure, a loan may be an agreement related to an asset that is borrowed, and that is expected to be returned in kind (e.g., money borrowed and money returned) or as an agreed transaction (e.g., a first good or service is borrowed, and money, a second good or service, or a combination, is returned). Assets may be money, property, time, physical objects, virtual objects, services, a right (e.g., a ticket, a license, or other rights), a depreciation amount, a credit (e.g., a tax credit, an emissions credit, etc.), an agreed assumption of a risk or liability, and/or any combination thereof. A loan may be based on a formal or informal agreement between a borrower and a lender wherein a lender may provide an asset to the borrower for a predefined amount of time, a variable period of time, or indefinitely. Lenders and borrowers may be individuals, entities, corporations, governments, groups of people, organizations, and the like. Loan types may include mortgage loans, personal loans, secured loans, unsecured loans, concessional loans, commercial loans, microloans, and the like. The agreement between the borrower and the lender may specify terms of the loan. The borrower may be required to return an asset or repay with a different asset than was borrowed. In some cases, a loan may require interest to be repaid on the borrowed asset. Borrowers and lenders may be intermediaries between other entities and may never possess or use the asset. In some embodiments, a loan may not be associated with direct transfer of goods but may be associated with usage rights or shared usage rights. In certain embodiments, the agreement between the borrower and the lender may be executed between the borrower and the lender, and/or executed between an intermediary (e.g., a beneficiary of a loan right such as through a sale of the loan). In certain embodiment, the agreement between the borrower and the lender may be executed through services herein, such as through a smart contract service that determines at least a portion of the terms and conditions of the loans, and in certain embodiments may commit the borrower and/or the lender to the terms of the agreement, which may be a smart contract. In certain embodiments, the smart contract service may populate the terms of the agreement, and present them to the borrower and/or lender for execution. In certain embodiments, the smart contract service may automatically commit one of the borrower or the lender to the terms (at least as an offer) and may present the offer to the other one of the borrower or the lender for execution. In certain embodiments, a loan agreement may include multiple borrowers and/or multiple lenders, for example where a set of loans includes a number of beneficiaries of payment on the set of loans, and/or a number of borrowers on the set of loans. In certain embodiments, the risks and/or obligations of the set of loans may be individualized (e.g., each borrower and/or lender is related to specific loans of the set of loans), apportioned (e.g., a default on a particular loan has an associated loss apportioned between the lenders), and/or combinations of these (e.g., one or more subsets of the set of loans is treated individually and/or apportioned).

Certain agreements may not be considered a loan. An agreement to transfer or borrow assets may not be a loan depending on what assets are transferred, how the assets were transferred, or the parties involved. For example, in some cases, the transfer of assets may be for an indefinite time and may be considered a sale of the asset or a permanent transfer. Likewise, if an asset is borrowed or transferred without clear or definite terms or lack of consensus between the lender and the borrower it may, in some cases, not be considered a loan. An agreement may be considered a loan even if a formal agreement is not directly codified in a written agreement as long as the parties willingly and knowingly agreed to the arrangement, and/or ordinary practices (e.g., in a particular industry) may treat the transaction as a loan. Accordingly, the benefits of the present disclosure may be applied in a wide variety of agreements, and any such agreement may be considered a loan herein, while in certain embodiments a given agreement may not be considered a loan herein. One of skill in the art, having the benefit of the disclosure herein and knowledge about contemplated loans ordinarily available to that person, can readily determine which aspects of the present disclosure implement a loan, utilize a loan, or benefit a particular loan transaction. Certain considerations for the person of skill in the art, in determining whether a contemplated data is a loan and/or whether aspects of the present disclosure can benefit or enhance the contemplated loan include, without limitation: the value of the assets involved, the ability of the borrower to return or repay the loan, the types of assets involved (e.g., whether the asset is consumed through utilization), the repayment time frame associated with the loan, the interest on the loan, how the agreement of the loan was arranged, formality of the agreement, detail of the agreement, the detail of the agreements of the loan, the collateral attributes associated with the loan, and/or the ordinary business expectations of any of the foregoing in a particular context. While specific examples of loans and considerations are described herein for purposes of illustration, any system benefitting from the disclosures herein, and any considerations understood to one of skill in the art having the benefit of the disclosures herein, are specifically contemplated within the scope of the present disclosure.

The term loan related event(s) (and similar terms, including loan-related events) as utilized herein should be understood broadly. Without limitation to any other aspect or description of the present disclosure, a loan related events may include any event related to terms of the loan or events triggered by the agreement associated with the loan. Loan-related events may include default on loan, breach of contract, fulfillment, repayment, payment, change in interest, late fee assessment, refund assessment, distribution, and the like. Loan-related events may be triggered by explicit agreement terms; for example—an agreement may specify a rise in interest rate after a time period has elapsed from the beginning of the loan; the rise in interest rate triggered by the agreement may be a loan related event. Loan-related events may be triggered implicitly by related loan agreement terms. In certain embodiments, any occurrence that may be considered relevant to assumptions of the loan agreement, and/or expectations of the parties to the loan agreement, may be considered an occurrence of an event. For example, if collateral for a loan is expected to be replaceable (e.g., an inventory as collateral), then a change in inventory levels may be considered an occurrence of a loan related event. In another example, if review and/or confirmation of the collateral is expected, then a lack of access to the collateral, the disablement or failure of a monitoring sensor, etc. may be considered an occurrence of a loan related event. In certain embodiments, circuits, controllers, or other devices described herein may automatically trigger the determination of a loan-related events. In some embodiments, loan-related events may be triggered by entities that manage loans or loan-related contracts. Loan-related events may be conditionally triggered based on one or more conditions in the loan agreement. Loan related events may be related to tasks or requirements that need to be completed by the lender, borrower, or a third party. Certain events may be considered loan-related events in certain embodiments and/or in certain contexts, but may not be considered a loan-related event in another embodiment or context. Many events may be associated with loans but may be caused by external triggers not associated with a loan. However, in certain embodiments, an externally triggered event (e.g., a commodity price change related to a collateral item) may be loan-related events. For example, renegotiation of loan terms initiated by a lender may not be considered a loan related event if the terms and/or performance of the existing loan agreement did not trigger the renegotiation. Accordingly, the benefits of the present disclosure may be applied in a wide variety of events, and any such event may be considered a loan related event herein, while in certain embodiments given events may not be considered a loan related event herein. One of skill in the art, having the benefit of the disclosure herein and knowledge about a contemplated system ordinarily available to that person, can readily determine which aspects of the present disclosure may be considered a loan-related event for the contemplated system and/or for particular transactions supported by the system. Certain considerations for the person of skill in the art, in determining whether a contemplated data is a loan related event and/or whether aspects of the present disclosure can benefit or enhance the contemplated transaction system include, without limitation: the impact of the related event on the loan (events that cause default or termination of the loan may have higher impact), the cost (capital and/or operating) associated with the event, the cost (capital and/or operating) associated with monitoring for an occurrence of the event, the entities responsible for responding to the event, a time period and/or response time associated with the event (e.g., time required to complete the event and time that is allotted from the time the event is triggered to when processing or detection of the event is desired to occur), the entity responsible for the event, the data required for processing the event (e.g., confidential information may have different safeguards or restrictions), the availability of mitigating actions if an undetected event occurs, and/or the remedies available to an at-risk party if the event occurs without detection. While specific examples of loan-related events and considerations are described herein for purposes of illustration, any system benefitting from the disclosures herein, and any considerations understood to one of skill in the art having the benefit of the disclosures herein, are specifically contemplated within the scope of the present disclosure.

The term loan-related activities (and similar terms) as utilized herein should be understood broadly. Without limitation to any other aspect or description of the present disclosure, a loan related activity may include activities related to the generation, maintenance, termination, collection, enforcement, servicing, billing, marketing, ability to perform, or negotiation of a loan. Loan-related activity may include activities related to the signing of a loan agreement or a promissory note, review of loan documents, processing of payments, evaluation of collateral, evaluation of compliance of the borrower or lender to the loan terms, renegotiation of terms, perfection of security or collateral for the loan, and/or a negation of terms. Loan-related activities may relate to events associated with a loan before formal agreement on the terms, such as activities associated with initial negotiations. Loan-related activities may relate to events during the life of the loan and after the termination of a loan. Loan-related activities may be performed by a lender, borrower, or a third party. Certain activities may not be considered loan related activities services individually but may be considered loan related activities based on the specificity of the activity to the loan lifecycle—for example, billing or invoicing related to outstanding loans may be considered a loan related activity, however when the invoicing or billing of loans is combined with billing or invoicing for non loan-related elements the invoicing may not be considered a loan related activity. Some activities may be performed in relation to an asset regardless if a loan is associated with the asset; in these cases, the activity may not be considered a loan related activity. For example, regular audits related to an asset may occur regardless if the asset is associated with a loan and may not be considered a loan related activity. In another example, a regular audit related to an asset may be required by a loan agreement and would not typically occur but for the association with a loan, in this case, the activity may be considered a loan related activity. In some embodiments, activities may be considered loan-related activities if the activity would otherwise not occur if the loan is not active or present, but may still be considered a loan-related activity in some instances (e.g., if auditing occurs normally, but the lender does not have the ability to enforce or review the audit, then the audit may be considered a loan-related activity even though it already occurs otherwise). Accordingly, the benefits of the present disclosure may be applied in a wide variety of events, and any such event may be considered a loan related event herein, while in certain embodiments given events may not be considered a loan related events herein. One of skill in the art, having the benefit of the disclosure herein and knowledge about a contemplated system ordinarily available to that person, can readily determine a loan related activity for the purposes of the contemplated system. Certain considerations for the person of skill in the art, in determining whether a contemplated data is a loan related activity and/or whether aspects of the present disclosure can benefit or enhance the contemplated loan include, without limitation: the necessity of the activity for the loan (can the loan agreement or terms be satisfied without the activity), the cost of the activity, the specificity of the activity to the loan (is the activity similar or identical to other industries), time involved in the activity, the impact of the activity on a loan life cycle, entity performing the activity, amount of data required for the activity (does the activity require confidential information related to the loan, or personal information related to the entities), and/or the ability of parties to enforce and/or review the activity. While specific examples of loan-related events and considerations are described herein for purposes of illustration, any system benefitting from the disclosures herein, and any considerations understood to one of skill in the art having the benefit of the disclosures herein, are specifically contemplated within the scope of the present disclosure.

The terms loan-terms, loan terms, terms for a loan, terms and conditions, and the like as utilized herein should be understood broadly ("loan terms"). Without limitation to any other aspect or description of the present disclosure, loan terms may relate to conditions, rules, limitations, contract obligations, and the like related to the timing, repayment, origination, and other enforceable conditions agreed to by the borrower and the lender of the loan. Loan terms may be specified in a formal contract between a borrower and the lender. Loan terms may specify aspects of an interest rate, collateral, foreclose conditions, consequence of debt, payment options, payment schedule, a covenant, and the like. Loan terms may be negotiable or may change during the life of a loan. Loan terms may be change or be affected by outside parameters such as market prices, bond prices, conditions associated with a lender or borrower, and the like. Certain aspects of a loan may not be considered loan terms. In certain embodiments, aspects of loan that have not been formally agreed upon between a lender and a borrower, and/or that are not ordinarily understood in the course of business (and/or the particular industry) may not be considered loan terms. Certain aspects of a loan may be preliminary or informal until they have been formally agreed or confirmed in a contract or a formal agreement. Certain aspects of a loan may not be considered loan terms individually but may not be considered loan terms based on the specificity of the aspect to a specific loan. Certain aspects of a loan may not be considered loan terms at a particular time during the loan, but may be considered loan terms at another time during the loan (e.g., obligations and/or waivers that may occur through the performance of the parties, and/or expiration of a loan term). For example, an interest rate may generally not be considered a loan term until it is defined in relation of a loan and defined as to how the interest compounded (annual, monthly), calculated, and the like. An aspect of a loan may not be considered a term if it is indefinite or unenforceable. Some aspects may be manifestations or related to terms of a loan but may themselves not be the terms. For example, a loan term may be the repayment period of a loan, such as one year. The term may not specify how the loan is to be repaid in the year. The loan may be repaid with 12 monthly payments or one annual payment. A monthly payment plan in this case may not be considered a loan term as it can be just one or many options for repayment not directly specified by a loan. Accordingly, the benefits of the present disclosure may be applied in a wide variety of loan aspects, and any such aspect may be considered a loan term herein, while in certain embodiments given aspects may not be considered loan terms herein. One of skill in the art, having the benefit of the disclosure herein and knowledge about a contemplated system ordinarily available to that person, can readily determine which aspects of the present disclosure are loan terms for the contemplated system.

Certain considerations for the person of skill in the art, in determining whether a contemplated data is a loan term and/or whether aspects of the present disclosure can benefit or enhance the contemplated loan include, without limitation: the enforceability of the terms (can the conditions be enforced by the lender or the lender or the borrower), the cost of enforcing the terms (amount of time, or effort required ensure the conditions are being followed), the complexity of the terms (how easily can they be followed or understood by the parties involved, are the terms error prone or easily misunderstood), entities responsible for the terms, fairness of the terms, stability of the terms (how often do they change), observability of the terms (can the terms be verified by a another party), favorability of the terms to one party (do the terms favor the borrower or the lender), risk associated with the loan (terms may depend on the probability that the loan may not be repaid), characteristics of the borrower or lender (their ability to meet the terms), and/or ordinary expectations for the loan and/or related industry.

While specific examples of loan terms are described herein for purposes of illustration, any system benefitting from the disclosures herein, and any considerations understood to one of skill in the art having the benefit of the disclosures herein, are specifically contemplated within the scope of the present disclosure.

The term loan conditions, loan-conditions, conditions for a loan, terms and conditions, and the like as utilized herein should be understood broadly ("loan conditions"). Without limitation to any other aspect or description of the present disclosure, loan conditions may relate to rules, limits, and/or obligations related to a loan. Loan conditions may relate to rules or necessary obligations for obtaining a loan, for maintaining a loan, for applying for a loan, for transferring a loan, and the like. Loan conditions may include principal amount of debt, a balance of debt, a fixed interest rate, a variable interest rate, a payment amount, a payment schedule, a balloon payment schedule, a specification of collateral, a specification of substitutability of collateral, treatment of collateral, access to collateral, a party, a guarantee, a guarantor, a security, a personal guarantee, a lien, a duration, a covenant, a foreclose condition, a default condition, conditions related to other debts of the borrower, and a consequence of default.

Certain aspects of a loan may not be considered loan conditions. Aspects of loan that have not been formally agreed upon between a lender and a borrower, and/or that are not ordinarily understood in the course of business (and/or the particular industry), may not be considered loan conditions. Certain aspects of a loan may be preliminary or informal until they have been formally agreed or confirmed in a contract or a formal agreement. Certain aspects of a loan may not be considered loan conditions individually but may be considered loan conditions based on the specificity of the aspect to a specific loan. Certain aspects of a loan may not be considered loan conditions at a particular time during the loan, but may be considered loan conditions at another time during the loan (e.g., obligations and/or waivers that may occur through the performance of the parties, and/or expiration of a loan condition). Accordingly, the benefits of the present disclosure may be applied in a wide variety of loan aspects, and any such aspect may be considered loan conditions herein, while in certain embodiments given aspects may not be considered loan conditions herein. One of skill in the art, having the benefit of the disclosure herein and knowledge about a contemplated system ordinarily available to that person, can readily determine which aspects of the present disclosure are loan conditions for the contemplated system. Certain considerations for the person of skill in the art, in determining whether a contemplated data is a loan condition and/or whether aspects of the present disclosure can benefit or enhance the contemplated loan include, without limitation: the enforceability of the condition (can the conditions be enforced by the lender or the lender or the borrower), the cost of enforcing the condition (amount of time, or effort required ensure the conditions are being followed), the complexity of the condition (how easily can they be followed or understood by the parties involved, are the conditions error prone or easily misunderstood), entities responsible for the conditions, fairness of the conditions, observability of the conditions (can the conditions be verified by a another party), favorability of the conditions to one party (do the conditions favor the borrower or the lender), risk associated with the loan (conditions may depend on the probability that the loan may not be repaid), and/or ordinary expectations for the loan and/or related industry.

While specific examples of loan conditions are described herein for purposes of illustration, any system benefitting from the disclosures herein, and any considerations understood to one of skill in the art having the benefit of the disclosures herein, are specifically contemplated within the scope of the present disclosure.

The term loan collateral, collateral, item of collateral, collateral item, and the like as utilized herein should be understood broadly. Without limitation to any other aspect or description of the present disclosure, a loan collateral may relate to any asset or property that a borrower promises to a lender as backup in exchange for a loan, and/or as security for the loan. Collateral may be any item of value that is accepted as an alternate form of repayment in case of default on a loan. Collateral may include any number of physical or virtual items such as a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Collateral may include more than one item or types of items.

A collateral item may describe an asset, a property, a value or other item defined as a security for a loan or a transaction. A set of collateral items may be defined, and within that set substitution, removal or addition of collateral items may be affected. For example, a collateral item may be, without limitation: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, or an item of personal property, or the like. If a set or plurality of collateral items is defined, substitution, removal or addition of collateral items may be affected, such as substituting, removing or adding a collateral item to or from a set of collateral items. Without limitation to any other aspect or description of the present disclosure, a collateral item or set of collateral items may also be used in conjunction with other terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, a security, a personal guarantee, a lien, a duration, a foreclose condition, a default condition, and a consequence of default. In certain embodiments, a smart contract may calculate whether a borrower has satisfied conditions or covenants and in cases where the borrower has not satisfied such conditions or covenants, may enable automated action or trigger another conditions or terms that may affect the status, ownership or transfer of a collateral item, or initiate the substitution, removal or addition of collateral items to a set of collateral for a loan. One of skill in the art, having the benefit of the disclosure herein and knowledge about collateral items, can readily determine the purposes and use of collateral items in various embodiments and contexts disclosed herein, including the substitution, removal and addition thereof.

While specific examples of loan collateral are described herein for purposes of illustration, any system benefitting from the disclosures herein, and any considerations understood to one of skill in the art having the benefit of the disclosures herein, are specifically contemplated within the scope of the present disclosure.

The term smart contract services (and similar terms) as utilized herein should be understood broadly. Without limitation to any other aspect or description of the present disclosure, a smart contract service includes any service or application that manages a smart contract or a smart lending contract. For example, the smart contract service may specify terms and conditions of a smart contract, such as in a rules database, or process output from a set of valuation services and assign items of collateral sufficient to provide security for a loan. Smart contract services may automatically execute a set of rules or conditions that embody the smart contract, wherein the execution may be based on or take advantage of collected data. Smart contract services may automatically initiate a demand for payment of a loan, automatically initiate a foreclosure process, automatically initiate an action to claim substitute or backup collateral or transfer ownership of collateral, automatically initiate an inspection process, automatically change a payment or interest rate term that is based on the collateral, and may also configure smart contracts to automatically undertake a loan-related action. Smart contracts may govern at least one of loan terms and conditions, loan-related events and loan-related activities. Smart contracts may be agreements that are encoded as computer protocols and may facilitate, verify, or enforce the negotiation or performance of a smart contract. Smart contracts may or may not be one or more of partially or fully self-executing, or partially or fully self-enforcing.

Certain processes may not be considered to be smart-contract related individually, but may be considered smart-contract related in an aggregated system—for example automatically undertaking a loan-related action may not be smart contract-related in one instance, but in another instance, may be governed by terms of a smart contract. Accordingly, the benefits of the present disclosure may be applied in a wide variety of processes systems, and any such processes or systems may be considered a smart contract or smart contract service herein, while in certain embodiments a given service may not be considered a smart contract service herein.

One of skill in the art, having the benefit of the disclosure herein and knowledge about a contemplated system ordinarily available to that person, can readily determine which aspects of the present disclosure will benefit a particular system and how to combine processes and systems from the present disclosure to implement a smart contract service and/or enhance operations of the contemplated system. Certain considerations for the person of skill in the art, in determining whether a contemplated system includes a smart contract service or smart contract and/or whether aspects of the present disclosure can benefit or enhance the contemplated system include, without limitation: ability to transfer ownership of collateral automatically in response to an event; automated actions available upon a finding of covenant compliance (or lack of compliance); the amenity of the collateral to clustering, re-balancing, distribution, addition, substitution, and removal of items from collateral; the modification parameters of an aspect of a loan in response to an event (e.g., timing, complexity, suitability for the loan type, etc.); the complexity of terms and conditions of loans for the system, including benefits from rapid determination and/or predictions of changes to entities (e.g., in the collateral, a financial condition of a party, offset collateral, and/or in an industry related to a party) related to the loan; the suitability of automated generation of terms and conditions and/or execution of terms and conditions for the types of loans, parties, and/or industries contemplated for the system; and the like. While specific examples of smart contract services and considerations are described herein for purposes of illustration, any system benefitting from the disclosures herein, and any considerations understood to one of skill in the art having the benefit of the disclosures herein, are specifically contemplated within the scope of the present disclosure.

The term IoT system (and similar terms) as utilized herein should be understood broadly. Without limitation to any other aspect or description of the present disclosure, an IoT system includes any system of uniquely identified and interrelated computing devices, mechanical and digital machines, sensors and objects that are able to transfer data over a network without intervention. Certain components may not be considered an IoT system individually, but may be considered an IoT system in an aggregated system—for example a single networked.

The sensor, smart speaker, and/or medical device may be not an IoT system, but may be a part of a larger system and/or be accumulated with a number of other similar components to be considered an IoT system and/or a part of an IoT system. In certain embodiments, a system may be considered an IoT system for some purposes but not for other purposes—for example a smart speaker may be considered part of an IoT system for certain operations, such as for providing surround sound, or the like, but not part of an IoT system for other operations such as directly streaming content from a single, locally networked source. Additionally, in certain embodiments, otherwise similar looking systems may be differentiated in determining whether such systems are IoT systems, and/or which type of IoT system. For example, one group of medical devices may not, at a given time, be sharing to an aggregated HER database, while another group of medical devices may be sharing data to an aggregate HER for the purposes of a clinical study, and accordingly one group of medical devices may be an IoT system, while the other is not. Accordingly, the benefits of the present disclosure may be applied in a wide variety of systems, and any such systems may be considered an IoT system herein, while in certain embodiments a given system may not be considered an IoT system herein. One of skill in the art, having the benefit of the disclosure herein and knowledge about a contemplated system ordinarily available to that person, can readily determine which aspects of the present disclosure will benefit a particular system, how to combine processes and systems from the present disclosure to enhance operations of the contemplated system, and which circuits, controllers, and/or devices include an IoT system for the contemplated system. Certain considerations for the person of skill in the art, in determining whether a contemplated system is an IoT system and/or whether aspects of the present disclosure can benefit or enhance the contemplated system include, without limitation: the transmission environment of the system (e.g., availability of low power, inter-device networking); the shared data storage of a group of devices; establishment of a geofence by a group of devices; service as blockchain nodes; the performance of asset, collateral, or entity monitoring; the relay of data between devices; ability to aggregate data from a plurality of sensors or monitoring devices, and the like. While specific examples of IoT systems and considerations are described herein for purposes of illustration, any system benefitting from the disclosures herein, and any considerations understood to one of skill in the art having the benefit of the disclosures herein, are specifically contemplated within the scope of the present disclosure.

The term data collection services (and similar terms) as utilized herein should be understood broadly. Without limitation to any other aspect or description of the present disclosure, a data collection service includes any service that collects data or information, including any circuit, controller, device, or application that may store, transmit, transfer, share, process, organize, compare, report on and/or aggregate data. The data collection service may include data collection devices (e.g., sensors) and/or may be in communication with data collection devices. The data collection service may monitor entities, such as to identify data or information for collection. The data collection service may be event-driven, run on a periodic basis, or retrieve data from an application at particular points in the application's execution. Certain processes may not be considered to be a data collection service individually, but may be considered a data collection service in an aggregated system—for example a networked storage device may be a component of a data collection service in one instance, but in another instance, may have stand-alone functionality. Accordingly, the benefits of the present disclosure may be applied in a wide variety of processes systems, and any such processes or systems may be considered a data collection service herein, while in certain embodiments a given service may not be considered a data collection service herein. One of skill in the art, having the benefit of the disclosure herein and knowledge about a contemplated system ordinarily available to that person, can readily determine which aspects of the present disclosure will benefit a particular system and how to combine processes and systems from the present disclosure implement a data collection service and/or to enhance operations of the contemplated system. Certain considerations for the person of skill in the art, in determining whether a contemplated system is a data collection service and/or whether aspects of the present disclosure can benefit or enhance the contemplated system include, without limitation: ability to modify a business rule on the fly and alter a data collection protocol; perform real-time monitoring of events; connection of a device for data collection to a monitoring infrastructure, execution of computer readable instructions that cause a processor to log or track events; use of an automated inspection system; occurrence of sales at a networked point-of-sale; need for data from one or more distributed sensors or cameras; and the like. While specific examples of data collection services and considerations are described herein for purposes of illustration, any system benefitting from the disclosures herein, and any considerations understood to one of skill in the art having the benefit of the disclosures herein, are specifically contemplated within the scope of the present disclosure.

The term data integration services (and similar terms) as utilized herein should be understood broadly. Without limitation to any other aspect or description of the present disclosure, a data integration service includes any service that integrates data or information, including any device or application that may extract, transform, load, normalize, compress, decompress, encode, decode, and otherwise process data packets, signals, and other information. The data integration service may monitor entities, such as to identify data or information for integration. The data integration service may integrate data regardless of required frequency, communication protocol, or business rules needed for intricate integration patterns. Accordingly, the benefits of the present disclosure may be applied in a wide variety of processes systems, and any such processes or systems may be considered a data integration service herein, while in certain embodiments a given service may not be considered a data integration service herein. One of skill in the art, having the benefit of the disclosure herein and knowledge about a contemplated system ordinarily available to that person, can readily determine which aspects of the present disclosure will benefit a particular system and how to combine processes and systems from the present disclosure to implement a data integration service and/or enhance operations of the contemplated system. Certain considerations for the person of skill in the art, in determining whether a contemplated system is a data integration service and/or whether aspects of the present disclosure can benefit or enhance the contemplated system include, without limitation: ability to modify a business rule on the fly and alter a data integration protocol; communication with third party databases to pull in data to integrate with; synchronization of data across disparate platforms; connection to a central data warehouse; data storage capacity, processing capacity, and/or communication capacity distributed throughout the system; the connection of separate, automated workflows; and the like. While specific examples of data integration services and considerations are described herein for purposes of illustration, any system benefitting from the disclosures herein, and any considerations understood to one of skill in the art having the benefit of the disclosures herein, are specifically contemplated within the scope of the present disclosure.

The term computational services (and similar terms) as utilized herein should be understood broadly. Without limitation to any other aspect or description of the present disclosure, computational services may be included as a part of one or more services, platforms, or microservices, such as blockchain services, data collection services, data integration services, valuation services, smart contract services, data monitoring services, data mining, and/or any service that facilitates collection, access, processing, transformation, analysis, storage, visualization, or sharing of data. Certain processes may not be considered to be a computational service. For example, a process may not be considered a computational service depending on the sorts of rules governing the service, an end product of the service, or the intent of the service. Accordingly, the benefits of the present disclosure may be applied in a wide variety of processes systems, and any such processes or systems may be considered a computational service herein, while in certain embodiments a given service may not be considered a computational service herein. One of skill in the art, having the benefit of the disclosure herein and knowledge about a contemplated system ordinarily available to that person, can readily determine which aspects of the present disclosure will benefit a particular system and how to combine processes and systems from the present disclosure to implement one or more computational service, and/or to enhance operations of the contemplated system. Certain considerations for the person of skill in the art, in determining whether a contemplated system is a computational service and/or whether aspects of the present disclosure can benefit or enhance the contemplated system include, without limitation: agreement-based access to the service; mediate an exchange between different services; provides on demand computational power to a web service; accomplishes one or more of monitoring, collection, access, processing, transformation, analysis, storage, integration, visualization, mining, or sharing of data. While specific examples of computational services and considerations are described herein for purposes of illustration, any system benefitting from the disclosures herein, and any considerations understood to one of skill in the art having the benefit of the disclosures herein, are specifically contemplated within the scope of the present disclosure.

The term sensor as utilized herein should be understood broadly. Without limitation to any other aspect or description of the present disclosure, a sensor may be a device, module, machine, or subsystem that detects or measures a physical quality, event or change. In embodiments, may record, indicate, transmit, or otherwise respond to the detection or measurement. Examples of sensors may be sensors for sensing movement of entities, for sensing temperatures, pressures or other attributes about entities or their environments, cameras that capture still or video images of entities, sensors that collect data about collateral or assets, such as, for example, regarding the location, condition (health, physical, or otherwise), quality, security, possession, or the like. In embodiments, sensors may be sensitive to, but not influential on, the property to be measured but insensitive to other properties. Sensors may be analog or digital. Sensors may include processors, transmitters, transceivers, memory, power, sensing circuit, electrochemical fluid reservoirs, light sources, and the like. Further examples of sensors contemplated for use in the system include biosensors, chemical sensors, black silicon sensor, IR sensor, acoustic sensor, induction sensor, motion sensor, optical sensor, opacity sensor, proximity sensor, inductive sensor, Eddy-current sensor, passive infrared proximity sensor, radar, capacitance sensor, capacitive displacement sensor, hall-effect sensor, magnetic sensor, GPS sensor, thermal imaging sensor, thermocouple, thermistor, photoelectric sensor, ultrasonic sensor, infrared laser sensor, inertial motion sensor, MEMS internal motion sensor, ultrasonic 3D motion sensor, accelerometer, inclinometer, force sensor, piezoelectric sensor, rotary encoders, linear encoders, ozone sensor, smoke sensor, heat sensor, magnetometer, carbon dioxide detector, carbon monoxide detector, oxygen sensor, glucose sensor, smoke detector, metal detector, rain sensor, altimeter, GPS, detection of being outside, detection of context, detection of activity, object detector (e.g. collateral), marker detector (e.g. geo-location marker), laser rangefinder, sonar, capacitance, optical response, heart rate sensor, or an RF/micropower impulse radio (MIR) sensor. In certain embodiments, a sensor may be a virtual sensor—for example determining a parameter of interest as a calculation based on other sensed parameters in the system. In certain embodiments, a sensor may be a smart sensor—for example reporting a sensed value as an abstracted communication (e.g., as a network communication) of the sensed value. In certain embodiments, a sensor may provide a sensed value directly (e.g., as a voltage level, frequency parameter, etc.) to a circuit, controller, or other device in the system. One of skill in the art, having the benefit of the disclosure herein and knowledge about a contemplated system ordinarily available to that person, can readily determine which aspects of the present disclosure will benefit from a sensor. Certain considerations for the person of skill in the art, in determining whether a contemplated device is a sensor and/or whether aspects of the present disclosure can benefit from or be enhanced by the contemplated sensor include, without limitation: the conditioning of an activation/deactivation of a system to an environmental quality; the conversion of electrical output into measured quantities; the ability to enforce a geofence; the automatic modification of a loan in response to change in collateral; and the like. While specific examples of sensors and considerations are described herein for purposes of illustration, any system benefitting from the disclosures herein, and any considerations understood to one of skill in the art having the benefit of the disclosures herein, are specifically contemplated within the scope of the present disclosure.

The term storage condition and similar terms, as utilized herein should be understood broadly. Without limitation to any other aspect or description of the present disclosure, storage condition includes an environment, physical location, environmental quality, level of exposure, security measures, maintenance description, accessibility description, and the like related to the storage of an asset, collateral, or an entity specified and monitored in a contract, loan, or agreement or backing the contract, loan or other agreement, and the like. Based on a storage condition of a collateral, an asset, or entity, actions may be taken to, maintain, improve, and/or confirm a condition of the asset or the use of that asset as collateral. Based on a storage condition, actions may be taken to alter the terms or conditions of a loan or bond. Storage condition may be classified in accordance with various rules, thresholds, conditional procedures, workflows, model parameters, and the like and may be based on self-reporting or on data from Internet of Things devices, data from a set of environmental condition sensors, data from a set of social network analytic services and a set of algorithms for querying network domains, social media data, crowdsourced data, and the like. The storage condition may be tied to a geographic location relating to the collateral, the issuer, the borrower, the distribution of the funds or other geographic locations. Examples of IoT data may include images, sensor data, location data, and the like. Examples of social media data or crowdsourced data may include behavior of parties to the loan, financial condition of parties, adherence to a party's a term or condition of the loan, or bond, or the like. Parties to the loan may include issuers of a bond, related entities, lender, borrower, 3rd parties with an interest in the debt. Storage condition may relate to an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. The storage condition may include an environment where environment may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the storage condition of a collateral, an asset or an entity may include managing, reporting on, altering, syndicating, consolidating, terminating, maintaining, modifying terms and/or conditions, foreclosing an asset, or otherwise handling a loan, contract, or agreement. One of skill in the art, having the benefit of the disclosure herein and knowledge about a contemplated storage condition, can readily determine which aspects of the present disclosure will benefit a particular application for a storage condition. Certain considerations for the person of skill in the art, or embodiments of the present disclosure in choosing an appropriate storage condition to manage and/or monitor, include, without limitation: the legality of the condition given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the credit scores of the borrower and the lender, ordinary practices in the industry, and other considerations. While specific examples of storage conditions are described herein for purposes of illustration, any embodiment benefitting from the disclosures herein, and any considerations understood to one of skill in the art having the benefit of the disclosures herein are specifically contemplated within the scope of the present disclosure.

The term geolocation and similar terms, as utilized herein should be understood broadly. Without limitation to any other aspect or description of the present disclosure, geolocation includes the identification or estimation of the real-world geographic location of an object, including the generation of a set of geographic coordinates (e.g. latitude and longitude) and/or street address. Based on a geolocation of a collateral, an asset, or entity, actions may be taken to maintain or improve a condition of the asset or the use of that asset as collateral. Based on a geolocation, actions may be taken to alter the terms or conditions of a loan or bond. Based on a geolocation, determinations or predictions related to a transaction may be performed—for example based upon the weather, civil unrest in a particular area, and/or local disasters (e.g., an earthquake, flood, tornado, hurricane, industrial accident, etc.). Geolocations may be determined in accordance with various rules, thresholds, conditional procedures, workflows, model parameters, and the like and may be based on self-reporting or on data from Internet of Things devices, data from a set of environmental condition sensors, data from a set of social network analytic services and a set of algorithms for querying network domains, social media data, crowdsourced data, and the like. Examples of geolocation data may include GPS coordinates, images, sensor data, street address, and the like. Geolocation data may be quantitative (e.g., longitude/latitude, relative to a plat map, etc.) and/or qualitative (e.g., categorical such as "coastal", "rural", etc.; "within New York City", etc.). Geolocation data may be absolute (e.g., GPS location) or relative (e.g., within 100 yards of an expected location). Examples of social media data or crowdsourced data may include behavior of parties to the loan as inferred by their geolocation, financial condition of parties inferred by geolocation, adherence of parties to a term or condition of the loan, or bond, or the like. Geolocation may be determined for an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a consumable item, an edible item, a beverage, a precious metal, an item of jewelry, a gemstone, an antique, a fixture, an item of furniture, an item of equipment, a tool, an item of machinery, and an item of personal property. Geolocation may be determined for an entity such as one of the parties, a third-party (e.g., an inspection service, maintenance service, cleaning service, etc. relevant to a transaction), or any other entity related to a transaction. The geolocation may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the geolocation of a collateral, an asset or an entity may include managing, reporting on, altering, syndicating, consolidating, terminating, maintaining, modifying terms and/or conditions, foreclosing an asset, or otherwise handling a loan, contract, or agreement. One of skill in the art, having the benefit of the disclosure herein and knowledge about a contemplated system, can readily determine which aspects of the present disclosure will benefit a particular application for a geolocation, and which location aspect of an item is a geolocation for the contemplated system. Certain considerations for the person of skill in the art, or embodiments of the present disclosure in choosing an appropriate geolocation to manage, include, without limitation: the legality of the geolocation given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the frequency of travel of the borrower to certain jurisdictions and other considerations, the mobility of the collateral, and/or a likelihood of location-specific event occurrence relevant to the transaction (e.g., weather, location of a relevant industrial facility, availability of relevant services, etc.). While specific examples of geolocation are described herein for purposes of illustration, any embodiment benefitting from the disclosures herein, and any considerations understood to one of skill in the art having the benefit of the disclosures herein are specifically contemplated within the scope of the present disclosure.

The term jurisdictional location and similar terms, as utilized herein should be understood broadly. Without limitation to any other aspect or description of the present disclosure, jurisdictional location refers to the laws and legal authority governing a loan entity. The jurisdictional location may be based on a geolocation of an entity, a registration location of an entity (e.g. a ship's flag state, a state of incorporation for a business, and the like), a granting state for certain rights such as intellectual priority, and the like. In certain embodiments, a jurisdictional location may be one or more of the geolocations for an entity in the system. In certain embodiments, a jurisdictional location may not be the same as the geolocation of any entity in the system (e.g., where an agreement specifies some other jurisdiction). In certain embodiments, a jurisdictional location may vary for entities in the system (e.g., borrower at A, lender at B, collateral positioned at C, agreement enforced at D, etc.). In certain embodiments, a jurisdictional location for a given entity may vary during the operations of the system (e.g., due to movement of collateral, related data, changes in terms and conditions, etc.). In certain embodiments, a given entity of the system may have more than one jurisdictional location (e.g., due to operations of the relevant law, and/or options available to one or more parties), and/or may have distinct jurisdictional locations for different purposes. A jurisdictional location of an item of collateral, an asset, or entity, actions may dictate certain terms or conditions of a loan or bond, and/or may indicate different obligations for notices to parties, foreclosure and/or default execution, treatment of collateral and/or debt security, and/or treatment of various data within the system. While specific examples of jurisdictional location are described herein for purposes of illustration, any embodiment benefitting from the disclosures herein, and any considerations understood to one of skill in the art having the benefit of the disclosures herein are specifically contemplated within the scope of the present disclosure.

The terms token of value, token, and variations such as cryptocurrency token, and the like, as utilized herein, in the context of increments of value, may be understood broadly to describe either: (a) a unit of currency or cryptocurrency (e.g. a cryptocurrency token), and (b) may also be used to represent a credential that can be exchanged for a good, service, data or other valuable consideration (e.g. a token of value). Without limitation to any other aspect or description of the present disclosure, in the former case, a token may also be used in conjunction with investment applications, token-trading applications, and token-based marketplaces. In the latter case, a token can also be associated with rendering consideration, such as providing goods, services, fees, access to a restricted area or event, data or other valuable benefit. Tokens can be contingent (e.g. contingent access token) or not contingent. For example, a token of value may be exchanged for accommodations, (e.g. hotel rooms), dining/food goods and services, space (e.g. shared space, workspace, convention space, etc.), fitness/wellness goods or services, event tickets or event admissions, travel, flights or other transportation, digital content, virtual goods, license keys, or other valuable goods, services, data or consideration. Tokens in various forms may be included where discussing a unit of consideration, collateral, or value, whether currency, cryptocurrency or any other form of value such as goods, services, data or other benefits. One of skill in the art, having the benefit of the disclosure herein and knowledge about a token, can readily determine the value symbolized or represented by a token, whether currency, cryptocurrency, good, service, data or other value. While specific examples of tokens are described herein for purposes of illustration, any embodiment benefitting from the disclosures herein, and any considerations understood to one of skill in the art having the benefit of the disclosures herein, are specifically contemplated within the scope of the present disclosure.

The term pricing data as utilized herein may be understood broadly to describe a quantity of information such as a price or cost, of one or more items in a marketplace. Without limitation to any other aspect or description of the present disclosure, pricing data may also be used in conjunction with spot market pricing, forward market pricing, pricing discount information, promotional pricing, and other information relating to the cost or price of items. Pricing data may satisfy one or more conditions, or may trigger application of one or more rules of a smart contract. Pricing data may be used in conjunction with other forms of data such as market value data, accounting data, access data, asset and facility data, worker data, event data, underwriting data, claims data or other forms of data. Pricing data may be adjusted for the context of the valued item (e.g., condition, liquidity, location, etc.) and/or for the context of a particular party. One of skill in the art, having the benefit of the disclosure herein and knowledge about pricing data, can readily determine the purposes and use of pricing data in various embodiments and contexts disclosed herein.

Without limitation to any other aspect or description of the present disclosure, a token includes any token including, without limitation, a token of value, such as collateral, an asset, a reward, such as in a token serving as representation of value, such as a value holding voucher that can be exchanged for goods or services. Certain components may not be considered tokens individually, but may be considered tokens in an aggregated system—for example, a value placed on an asset may not be in itself be a token, but the value of an asset may be placed in a token of value, such as to be stored, exchanged, traded, and the like. For instance, in a non-limiting example, a blockchain circuit may be structured to provide lenders a mechanism to store the value of assets, where the value attributed to the token is stored in a distributed ledger of the blockchain circuit, but the token itself, assigned the value, may be exchanged or traded such as through a token marketplace. In certain embodiments, a token may be considered a token for some purposes but not for other purposes—for example a token may be used as an indication of ownership of an asset, but this use of a token would not be traded as a value where a token including the value of the asset might. Accordingly, the benefits of the present disclosure may be applied in a wide variety of systems, and any such systems may be considered a token herein, while in certain embodiments a given system may not be considered a token herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a token and/or whether aspects of the present disclosure can benefit or enhance the contemplated system include, without limitation, access data such as relating to rights of access, tickets, and tokens; use in an investment application such as for investment in shares, interests, and tokens; a token-trading application; a token-based marketplace; forms of consideration such as monetary rewards and tokens; translating the value of a resources in tokens; a cryptocurrency token; indications of ownership such as identity information, event information, and token information; a blockchain-based access token traded in a marketplace application; pricing application such as for setting and monitoring pricing for contingent access rights, underlying access rights, tokens, and fees; trading applications such as for trading or exchanging contingent access rights or underlying access rights or tokens; tokens created and stored on a blockchain for contingent access rights resulting in an ownership (e.g., a ticket); and the like.

The term financial data as utilized herein may be understood broadly to describe a collection of financial information about an asset, collateral or other item or items. Financial data may include revenues, expenses, assets, liabilities, equity, bond ratings, default, return on assets (ROA), return on investment (ROI), past performance, expected future performance, earnings per share (EPS), internal rate of return (IRR), earnings announcements, ratios, statistical analysis of any of the foregoing (e.g. moving averages), and the like. Without limitation to any other aspect or description of the present disclosure, financial data may also be used in conjunction with pricing data and market value data. Financial data may satisfy one or more conditions, or may trigger application of one or more rules of a smart contract. Financial data may be used in conjunction with other forms of data such as market value data, pricing data, accounting data, access data, asset and facility data, worker data, event data, underwriting data, claims data or other forms of data. One of skill in the art, having the benefit of the disclosure herein and knowledge about financial data, can readily determine the purposes and use of pricing data in various embodiments and contexts disclosed herein.

The term covenant as utilized herein may be understood broadly to describe a term, agreement or promise, such as performance of some action or inaction. For example, a covenant may relate to behavior of a party or legal status of a party. Without limitation to any other aspect or description of the present disclosure, a covenant may also be used in conjunction with other related terms to an agreement or loan, such as a representation, a warranty, an indemnity, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a foreclose condition, a default condition, and a consequence of default. A covenant or lack of performance of a covenant may satisfy one or more conditions, or may trigger collection, breach or other terms and conditions. In certain embodiments, a smart contract may calculate whether a covenant is satisfied and in cases where the covenant is not satisfied, may enable automated action or trigger other conditions or terms. One of skill in the art, having the benefit of the disclosure herein and knowledge about covenants, can readily determine the purposes and use of covenants in various embodiments and contexts disclosed herein.

The term entity as utilized herein may be understood broadly to describe a party, a third-party (e.g., an auditor, regulator, service provider, etc.), and/or an identifiable related object such as an item of collateral related to a transaction. Example entities include an individual, partnership, corporation, limited liability company or other legal organization. Other example entities include an identifiable item of collateral, offset collateral, potential collateral, or the like. For example, an entity may be a given party, such as an individual, to an agreement or loan. Data or other terms herein may be characterized as having a context relating to an entity, such as entity-oriented data. An entity may be characterized with a specific context or application, such as a human entity, physical entity, transactional entity or a financial entity, without limitation. An entity may have representatives that represent or act on its behalf. Without limitation to any other aspect or description of the present disclosure, an entity may also be used in conjunction with other related entities or terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a foreclose condition, a default condition, and a consequence of default. An entity may have a set of attributes such as: a publicly stated valuation, a set of property owned by the entity as indicated by public records, a valuation of a set of property owned by the entity, a bankruptcy condition, a foreclosure status, a contractual default status, a regulatory violation status, a criminal status, an export controls status, an embargo status, a tariff status, a tax status, a credit report, a credit rating, a website rating, a set of customer reviews for a product of an entity, a social network rating, a set of credentials, a set of referrals, a set of testimonials, a set of behavior, a location, and a geolocation, without limitation. In certain embodiments, a smart contract may calculate whether an entity has satisfied conditions or covenants and in cases where the entity has not satisfied such conditions or covenants, may enable automated action or trigger other conditions or terms. One of skill in the art, having the benefit of the disclosure herein and knowledge about entities, can readily determine the purposes and use of entities in various embodiments and contexts disclosed herein.

The term party as utilized herein may be understood broadly to describe a member of an agreement, such as an individual, partnership, corporation, limited liability company or other legal organization. For example, a party may be a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, an accountant or other entities having rights or obligations to an agreement, transaction or loan. A party may characterize a different term, such as transaction as in the term multi-party transaction, where multiple parties are involved in a transaction, or the like, without limitation. A party may have representatives that represent or act on its behalf. In certain embodiments, the term party may reference a potential party or a prospective party—for example an intended lender or borrower interacting with a system, that may not yet be committed to an actual agreement during the interactions with the system. Without limitation to any other aspect or description of the present disclosure, an party may also be used in conjunction with other related parties or terms to an agreement or loan, such as a representation, a warranty, an indemnity, a covenant, a balance of debt, a fixed interest rate, a variable interest rate, a payment amount, a payment schedule, a balloon payment schedule, a specification of collateral, a specification of substitutability of collateral, an entity, a guarantee, a guarantor, a security, a personal guarantee, a lien, a duration, a foreclose condition, a default condition, and a consequence of default. A party may have a set of attributes such as: an identity, a creditworthiness, an activity, a behavior, a business practice, a status of performance of a contract, information about accounts receivable, information about accounts payable, information about the value of collateral, and other types of information, without limitation. In certain embodiments, a smart contract may calculate whether a party has satisfied conditions or covenants and in cases where the party has not satisfied such conditions or covenants, may enable automated action or trigger other conditions or terms. One of skill in the art, having the benefit of the disclosure herein and knowledge about parties, can readily determine the purposes and use of parties in various embodiments and contexts disclosed herein.

The term party attribute, entity attribute, or party/entity attribute as utilized herein may be understood broadly to describe a value, characteristic, or status of a party or entity. For example, attributes of a party or entity may be, without limitation: value, quality, location, net worth, price, physical condition, health condition, security, safety, ownership, identity, creditworthiness, activity, behavior, business practice, status of performance of a contract, information about accounts receivable, information about accounts payable, information about the value of collateral, and other types of information, and the like. In certain embodiments, a smart contract may calculate values, status or conditions associated with attributes of a party or entity, and in cases where the party or entity has not satisfied such conditions or covenants, may enable automated action or trigger other conditions or terms. One of skill in the art, having the benefit of the disclosure herein and knowledge about attributes of a party or entity, can readily determine the purposes and use of these attributes in various embodiments and contexts disclosed herein.

The term lender as utilized herein may be understood broadly to describe a party to an agreement offering an asset for lending, proceeds of a loan, and may include an individual, partnership, corporation, limited liability company, or other legal organization. For example, a lender may be a primary lender, a secondary lender, a lending syndicate, a corporate lender, a government lender, a bank lender, a secured lender, an unsecured lender, or other party having rights or obligations to an agreement, transaction or loan offering a loan to a borrower, without limitation. A lender may have representatives that represent or act on its behalf. Without limitation to any other aspect or description of the present disclosure, an party may also be used in conjunction with other related parties or terms to an agreement or loan, such as a borrower, a guarantor, a representation, a warranty, an indemnity, a covenant, a balance of debt, a fixed interest rate, a variable interest rate, a payment amount, a payment schedule, a balloon payment schedule, a specification of collateral, a specification of substitutability of collateral, a security, a personal guarantee, a lien, a duration, a foreclose condition, a default condition, and a consequence of default. In certain embodiments, a smart contract may calculate whether a lender has satisfied conditions or covenants and in cases where the lender has not satisfied such conditions or covenants, may enable automated action, a notification or alert, or trigger other conditions or terms. One of skill in the art, having the benefit of the disclosure herein and knowledge about a lender, can readily determine the purposes and use of a lender in various embodiments and contexts disclosed herein.

The term crowdsourcing services as utilized herein may be understood broadly to describe services offered or rendered in conjunction with a crowdsourcing model or transaction, wherein a large group of people or entities supply contributions to fulfill a need, such as a loan, for the transaction. Crowdsourcing services may be provided by a platform or system, without limitation. A crowdsourcing request may be communicated to a group of information suppliers and by which responses to the request may be collected and processed to provide a reward to at least one successful information supplier. The request and parameters may be configured to obtain information related to the condition of a set of collateral for a loan. The crowdsourcing request may be published. In certain embodiments, without limitation, crowdsourcing services may be performed by a smart contract, wherein the reward is managed by a smart contract that processes responses to the crowdsourcing request and automatically allocates a reward to information that satisfies a set of parameter configured for the crowdsourcing request. One of skill in the art, having the benefit of the disclosure herein and knowledge about crowdsourcing services, can readily determine the purposes and use of crowdsourcing services in various embodiments and contexts disclosed herein.

The term publishing services as utilized herein may be understood to describe a set of services to publish a crowdsourcing request. Publishing services may be provided by a platform or system, without limitation. In certain embodiments, without limitation, publishing services may be performed by a smart contract, wherein the crowdsourcing request is published or publication is initiated by the smart contract. One of skill in the art, having the benefit of the disclosure herein and knowledge about publishing services, can readily determine the purposes and use of publishing services in various embodiments and contexts disclosed herein.

The term interface as utilized herein may be understood broadly to describe a component by which interaction or communication is achieved, such as a component of a computer, which may be embodied in software, hardware or a combination thereof. For example, an interface may serve a number of different purposes or be configured for different applications or contexts, such as, without limitation: an application programming interface, a graphic user interface, user interface, software interface, marketplace interface, demand aggregation interface, crowdsourcing interface, secure access control interface, network interface, data integration interface or a cloud computing interface, or combinations thereof. An interface may serve to act as a way to enter, receive or display data, within the scope of lending, refinancing, collection, consolidation, factoring, brokering or foreclosure, without limitation. An interface may serve as an interface for another interface. Without limitation to any other aspect or description of the present disclosure, an interface may be used in conjunction with applications, processes, modules, services, layers, devices, components, machines, products, sub-systems, interfaces, connections, or as part of a system. In certain embodiments, an interface may be embodied in software, hardware or a combination thereof, as well as stored on a medium or in memory. One of skill in the art, having the benefit of the disclosure herein and knowledge about an interface, can readily determine the purposes and use of an interface in various embodiments and contexts disclosed herein.

The term graphical user interface as utilized herein may be understood as a type of interface to allow a user to interact with a system, computer or other interfaces, in which interaction or communication is achieved through graphical devices or representations. A graphical user interface may be a component of a computer, which may be embodied in computer readable instructions, hardware, or a combination thereof. A graphical user interface may serve a number of different purposes or be configured for different applications or contexts. Such an interface may serve to act as a way to receive or display data using visual representation, stimulus or interactive data, without limitation. A graphical user interface may serve as an interface for another graphical user interface or other interfaces. Without limitation to any other aspect or description of the present disclosure, a graphical user interface may be used in conjunction with applications, processes, modules, services, layers, devices, components, machines, products, sub-systems, interfaces, connections, or as part of a system. In certain embodiments, a graphical user interface may be embodied in computer readable instructions, hardware or a combination thereof, as well as stored on a medium or in memory. Graphical user interfaces may be configured for any input types, including keyboards, a mouse, a touch screen, and the like. Graphical user interfaces may be configured for any desired user interaction environments, including for example a dedicated application, a web page interface, or combinations of these. One of skill in the art, having the benefit of the disclosure herein and knowledge about a graphical user interface, can readily determine the purposes and use of a graphical user interface in various embodiments and contexts disclosed herein.

The term user interface as utilized herein may be understood as a type of interface to allow a user to interact with a system, computer or other apparatus, in which interaction or communication is achieved through graphical devices or representations. A user interface may be a component of a computer, which may be embodied in software, hardware or a combination thereof. The user interface may be stored on a medium or in memory. User interfaces may include drop-down menus, tables, forms, or the like with default, templated, recommended, or pre-configured conditions. In certain embodiments, a user interface may include voice interaction. Without limitation to any other aspect or description of the present disclosure, a user interface may be used in conjunction with applications, circuits, controllers, processes, modules, services, layers, devices, components, machines, products, sub-systems, interfaces, connections, or as part of a system. User interfaces may serve a number of different purposes or be configured for different applications or contexts. For example, a lender-side user interface may include features to view a plurality of customer profiles, but may be restricted from making certain changes. A debtor-side user interface may include features to view details and make changes to a user account. A 3rd party neutral-side interface (e.g. a 3rd party not having an interest in an underlying transaction, such as a regulator, auditor, etc.) may have features that enable a view of company oversight and anonymized user data without the ability to manipulate any data, and may have scheduled access depending upon the 3rd party and the purpose for the access. A 3rd party interested-side interface (e.g. a 3rd party that may have an interest in an underlying transaction, such as a collector, debtor advocate, investigator, partial owner, etc.) may include features enabling a view of particular user data with restrictions on making changes. Many more features of these user interfaces may be available to implements embodiments of the systems and/or procedures described throughout the present disclosure. Accordingly, the benefits of the present disclosure may be applied in a wide variety of processes and systems, and any such processes or systems may be considered a service herein. One of skill in the art, having the benefit of the disclosure herein and knowledge about a user interface, can readily determine the purposes and use of a user interface in various embodiments and contexts disclosed herein. Certain considerations for the person of skill in the art, in determining whether a contemplated interface is a user interface and/or whether aspects of the present disclosure can benefit or enhance the contemplated system include, without limitation: configurable views, ability to restrict manipulation or views, report functions, ability to manipulate user profile and data, implement regulatory requirements, provide the desired user features for borrowers, lenders, and 3rd parties, and the like.

Interfaces and dashboards as utilized herein may further be understood broadly to describe a component by which interaction or communication is achieved, such as a component of a computer, which may be embodied in software, hardware or a combination thereof. Interfaces and dashboards may acquire, receive, present or otherwise administrate an item, service, offering or other aspects of a transaction or loan. For example, interfaces and dashboards may serve a number of different purposes or be configured for different applications or contexts, such as, without limitation: an application programming interface, a graphic user interface, user interface, software interface, marketplace interface, demand aggregation interface, crowdsourcing interface, secure access control interface, network interface, data integration interface or a cloud computing interface, or combinations thereof. An interface or dashboard may serve to act as a way to receive or display data, within the context of lending, refinancing, collection, consolidation, factoring, brokering or foreclosure, without limitation. An interface or dashboard may serve as an interface or dashboard for another interface or dashboard. Without limitation to any other aspect or description of the present disclosure, an interface may be used in conjunction with applications, circuits, controllers, processes, modules, services, layers, devices, components, machines, products, sub-systems, interfaces, connections, or as part of a system. In certain embodiments, an interface or dashboard may be embodied in computer readable instructions, hardware or a combination thereof, as well as stored on a medium or in memory. One of skill in the art, having the benefit of the disclosure herein and knowledge ordinarily available about a contemplated system, can readily determine the purposes and use of interfaces and/or dashboards in various embodiments and contexts disclosed herein.

The term domain as utilized herein may be understood broadly to describe a scope or context of a transaction and/or communications related to a transaction. For example, a domain may serve a number of different purposes or be configured for different applications or contexts, such as, without limitation: a domain for execution, a domain for a digital asset, domains to which a request will be published, domains to which social network data collection and monitoring services will be applied, domains to which Internet of Things data collection and monitoring services will be applied, network domains, geolocation domains, jurisdictional location domains, and time domains. Without limitation to any other aspect or description of the present disclosure, one or more domains may be utilized relative to any applications, circuits, controllers, processes, modules, services, layers, devices, components, machines, products, subsystems, interfaces, connections, or as part of a system. In certain embodiments, a domain may be embodied in computer readable instructions, hardware, or a combination thereof, as well as stored on a medium or in memory. One of skill in the art, having the benefit of the disclosure herein and knowledge about a domain, can readily determine the purposes and use of a domain in various embodiments and contexts disclosed herein.

The term request (and variations) as utilized herein may be understood broadly to describe the action or instance of initiating or asking for a thing (e.g. information, a response, an object, and the like) to be provided. A specific type of request may also serve a number of different purposes or be configured for different applications or contexts, such as, without limitation: a formal legal request (e.g. a subpoena), a request to refinance (e.g. a loan), or a crowdsourcing request. Systems may be utilized to perform requests as well as fulfill requests. Requests in various forms may be included where discussing a legal action, a refinancing of a loan, or a crowdsourcing service, without limitation. One of skill in the art, having the benefit of the disclosure herein and knowledge about a contemplated system, can readily determine the value of a request implemented in an embodiment. While specific examples of requests are described herein for purposes of illustration, any embodiment benefitting from the disclosures herein, and any considerations understood to one of skill in the art having the benefit of the disclosures herein, are specifically contemplated within the scope of the present disclosure.

The term reward (and variations) as utilized herein may be understood broadly to describe a thing or consideration received or provided in response to an action or stimulus. Rewards can be of a financial type, or non-financial type, without limitation. A specific type of reward may also serve a number of different purposes or be configured for different applications or contexts, such as, without limitation: a reward event, claims for rewards, monetary rewards, rewards captured as a data set, rewards points, and other forms of rewards. Rewards may be triggered, allocated, generated for innovation, provided for the submission of evidence, requested, offered, selected, administrated, managed, configured, allocated, conveyed, identified, without limitation, as well as other actions. Systems may be utilized to perform the aforementioned actions. Rewards in various forms may be included where discussing a particular behavior, or encouragement of a particular behavior, without limitation. In certain embodiments herein, a reward may be utilized as a specific incentive (e.g., rewarding a particular person that responds to a crowdsourcing request) or as a general incentive (e.g., providing a reward responsive to a successful crowdsourcing request, in addition to or alternatively to a reward to the particular person that responded). One of skill in the art, having the benefit of the disclosure herein and knowledge about a reward, can readily determine the value of a reward implemented in an embodiment. While specific examples of rewards are described herein for purposes of illustration, any embodiment benefitting from the disclosures herein, and any considerations understood to one of skill in the art having the benefit of the disclosures herein, are specifically contemplated within the scope of the present disclosure.

The term robotic process automation system as utilized herein may be understood broadly to describe a system capable of performing tasks or providing needs for a system of the present disclosure. For example, a robotic process automation system, without limitation, can be configured for: negotiation of a set of terms and conditions for a loan, negotiation of refinancing of a loan, loan collection, consolidating a set of loans, managing a factoring loan, brokering a mortgage loan, training for foreclosure negotiations, configuring a crowdsourcing request based on a set of attributes for a loan, setting a reward, determining a set of domains to which a request will be published, configuring the content of a request, configuring a data collection and monitoring action based on a set of attributes of a loan, determining a set of domains to which the Internet of Things data collection and monitoring services will be applied, and iteratively training and improving based on a set of outcomes. A robotic process automation system may include: a set of data collection and monitoring services, an artificial intelligence system, and another robotic process automation system which is a component of the higher level robotic process automation system. The robotic process automation system may include: at least one of the set of mortgage loan activities and the set of mortgage loan interactions includes activities among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien and closing of mortgage agreement. Example and non-limiting robotic process automation systems may include one or more user interfaces, interfaces with circuits and/or controllers throughout the system to provide, request, and/or share data, and/or one or more artificial intelligence circuits configured to iteratively improve one or more operations of the robotic process automation system. One of skill in the art, having the benefit of the disclosure herein and knowledge ordinarily available about a contemplated robotic process automation system, can readily determine the circuits, controllers, and/or devices to include to implement a robotic process automation system performing the selected functions for the contemplated system. While specific examples of robotic process automation systems are described herein for purposes of illustration, any embodiment benefitting from the disclosures herein, and any considerations understood.

The term loan-related action (and other related terms such as loan-related event and loan-related activity) are utilized herein and may be understood broadly to describe one or multiple actions, events or activities relating to a transaction that includes a loan within the transaction. The action, event or activity may occur in many different contexts of loans, such as lending, refinancing, consolidation, factoring, brokering, foreclosure, administration, negotiating, collecting, procuring, enforcing and data processing (e.g. data collection), or combinations thereof, without limitation. A loan-related action may be used in the form of a noun (e.g. a notice of default has been communicated to the borrower with formal notice, which could be considered a loan-related action). A loan-related action, event, or activity may refer to a single instance, or may characterize a group of actions, events or activities. For example, a single action such as providing a specific notice to a borrower of an overdue payment may be considered a loan-related action. Similarly, a group of actions from start to finish relating to a default may also be considered a single loan-related action. Appraisal, inspection, funding and recording, without limitation, may all also be considered loan-related actions that have occurred, as well as events relating to the loan, and may also be loan-related events. Similarly, these activities of completing these actions may also be considered loan-related activities (e.g. appraising, inspecting, funding, recording, etc.), without limitation. In certain embodiments, a smart contract or robotic process automation system may perform loan-related actions, loan-related events, or loan-related activities for one or more of the parties, and process appropriate tasks for completion of the same. In some cases the smart contract or robotic process automation system may not complete a loan-related action, and depending upon such outcome this may enable an automated action or may trigger other conditions or terms. One of skill in the art, having the benefit of the disclosure herein and knowledge about loan-related actions, events, and activities can readily determine the purposes and use of this term in various forms and embodiments as described throughout the present disclosure.

The term loan-related action, events, and activities, as noted herein, may also more specifically be utilized to describe a context for calling of a loan. A calling of a loan is an action wherein the lender can demand the loan be repaid, usually triggered by some other condition or term, such as delinquent payment(s). For example, a loan-related action for calling of the loan may occur when a borrower misses three payments in a row, such that there is a severe delinquency in the loan payment schedule, and the loan goes into default. In such a scenario, a lender may be initiating loan-related actions for calling of the loan to protect its rights. In such a scenario, perhaps the borrower pays a sum to cure the delinquency and penalties, which may also be considered as a loan-related action for calling of the loan. In some circumstances, a smart contract or robotic process automation system may initiate, administrate or process loan-related actions for calling of the loan, which without limitation, may including providing notice, researching and collecting payment history, or other tasks performed as a part of the calling of the loan. One of skill in the art, having the benefit of the disclosure herein and knowledge about loan-related actions for calling of the loan, or other forms of the term and its various forms, can readily determine the purposes and use of this term in the context of an event or other various embodiments and contexts disclosed herein.

The term loan-related action, events, and activities, as noted herein, may also more specifically be utilized to describe a context for payment of a loan. Typically in transactions involving loans, without limitation, a loan is repaid on a payment schedule. Various actions may be taken to provide a borrower with information to pay back the loan, as well as actions for a lender to receive payment for the loan. For example, if a borrower makes a payment on the loan, a loan-related action for payment of the loan may occur. Without limitation, such a payment may comprise several actions that may occur with respect to the payment on the loan, such as: the payment being tendered to the lender, the loan ledger or accounting reflecting that a payment has been made, a receipt provided to the borrower of the payment made, and the next payment being requested of the borrower. In some circumstances, a smart contract or robotic process automation system may initiate, administrate or process such loan-related actions for payment of the loan, which without limitation, may including providing notice to the lender, researching and collecting payment history, providing a receipt to the borrower, providing notice of the next payment due to the borrower, or other actions associated with payment of the loan. One of skill in the art, having the benefit of the disclosure herein and knowledge about loan-related actions for payment of a loan, or other forms of the term and its various forms, can readily determine the purposes and use of this term in the context of an event or other various embodiments and contexts disclosed herein.

The term loan-related action, events, and activities, as noted herein, may also more specifically be utilized to describe a context for a payment schedule or alternative payment schedule. Typically in transactions involving loans, without limitation, a loan is repaid on a payment schedule, which may be modified over time. Or, such a payment schedule may be developed and agreed in the alternative, with an alternative payment schedule. Various actions may be taken in the context of a payment schedule or alternate payment schedule for the lender or the borrower, such as: the amount of such payments, when such payments are due, what penalties or fees may attach to late payments, or other terms. For example, if a borrower makes an early payment on the loan, a loan-related action for payment schedule and alternative payment schedule of the loan may occur; in such case, perhaps the payment is applied as principal, with the regular payment still being due. Without limitation, loan-related actions for a payment schedule and alternative payment schedule may comprise several actions that may occur with respect to the payment on the loan, such as: the payment being tendered to the lender, the loan ledger or accounting reflecting that a payment has been made, a receipt provided to the borrower of the payment made, a calculation if any fees are attached or due, and the next payment being requested of the borrower. In certain embodiments, an activity to determine a payment schedule or alternative payment schedule may be a loan-related action, event, or activity. In certain embodiments, an activity to communicate the payment schedule or alternative payment schedule (e.g., to the borrower, the lender, or a 3rd party) may be a loan-related action, event, or activity. In some circumstances, a smart contract circuit or robotic process automation system may initiate, administrate, or process such loan-related actions for payment schedule and alternative payment schedule, which without limitation, may include providing notice to the lender, researching and collecting payment history, providing a receipt to the borrower, calculating the next due date, calculating the final payment amount and date, providing notice of the next payment due to the borrower, determining the payment schedule or an alternate payment schedule, communicating the payment scheduler or an alternate payment schedule, or other actions associated with payment of the loan. One of skill in the art, having the benefit of the disclosure herein and knowledge about loan-related actions for payment schedule and alternative payment schedule, or other forms of the term and its various forms, can readily determine the purposes and use of this term in the context of an event or other various embodiments and contexts disclosed herein.

The term regulatory notice requirement (and any derivatives) as utilized herein may be understood broadly to describe an obligation or condition to communicate a notification or message to another party or entity. The regulatory notice requirement may be required under one or more conditions that are triggered, or generally required. For example, a lender may have a regulatory notice requirement to provide notice to a borrower of a default of a loan, or change of an interest rate of a loan, or other notifications relating to a transaction or loan. The regulatory aspect of the term may be attributed to jurisdiction-specific laws, rules, or codes that require certain obligations of communication. In certain embodiments, a policy directive may be treated as a regulatory notice requirement—for example where a lender has an internal notice policy that may exceed the regulatory requirements of one or more of the jurisdictional locations related to a transaction. The notice aspect generally relates to formal communications, which may take many different forms, but may specifically be specified as a particular form of notice, such as a certified mail, facsimile, email transmission, or other physical or electronic form, a content for the notice, and/or a timing requirement related to the notice. The requirement aspect relates to the necessity of a party to complete its obligation to be in compliance with laws, rules, codes, policies, standard practices, or terms of an agreement or loan. In certain embodiments, a smart contract may process or trigger regulatory notice requirements and provide appropriate notice to a borrower. This may be based on location of at least one of: the lender, the borrower, the funds provided via the loan, the repayment of the loan, and the collateral of the loan, or other locations as designated by the terms of the loan, transaction, or agreement. In cases where a party or entity has not satisfied such regulatory notice requirements, certain changes in the rights or obligations between the parties may be triggered—for example where a lender provides a non-compliant notice to the borrower, an automated action or trigger based on the terms and conditions of the loan, and/or based on external information (e.g., a regulatory prescription, internal policy of the lender, etc.) may be affected by a smart contract circuit and/or robotic process automation system may be implemented. One of skill in the art, having the benefit of the disclosure herein and knowledge ordinarily available about a contemplated system, can readily determine the purposes and use of regulatory notice requirements in various embodiments and contexts disclosed herein.

The term regulatory notice requirement may also be utilized herein to describe an obligation or condition to communicate a notification or message to another party or entity based upon a general or specific policy, rather than based on a particular jurisdiction, or laws, rules, or codes of a particular location (as in regulatory notice requirement that may be jurisdiction-specific). The regulatory notice requirement may be prudent or suggested, rather than obligatory or required, under one or more conditions that are triggered, or generally required. For example, a lender may have a regulatory notice requirement that is policy based to provide notice to a borrower of a new informational website, or will experience a change of an interest rate of a loan in the future, or other notifications relating to a transaction or loan that are advisory or helpful, rather than mandatory (although mandatory notices may also fall under a policy basis). Thus, in policy based uses of the regulatory notice requirement term, a smart contract circuit may process or trigger regulatory notice requirements and provide appropriate notice to a borrower which may or may not necessarily be required by a law, rule or code. The basis of the notice or communication may be out of prudence, courtesy, custom, or obligation.

The term regulatory notice may also be utilized herein to describe an obligation or condition to communicate a notification or message to another party or entity specifically, such as a lender or borrower. The regulatory notice may be specifically directed toward any party or entity, or a group of parties or entities. For example, a particular notice or communication may be advisable or required to be provided to a borrower, such as on circumstances of a borrower's failure to provide scheduled payments on a loan resulting in a default. As such, such a regulatory notice directed to a particular user, such as a lender or borrower, may be as a result of a regulatory notice requirement that is jurisdiction-specific or policy-based, or otherwise. Thus, in some circumstances a smart contract may process or trigger a regulatory notice and provide appropriate notice to a specific party such as a borrower, which may or may not necessarily be required by a law, rule or code, but may otherwise be provided out of prudence, courtesy or custom. In cases where a party or entity has not satisfied such regulatory notice requirements to a specific party or parties, it may create circumstances where certain rights may be forgiven by one or more parties or entities, or may enable automated action or trigger other conditions or terms. One of skill in the art, having the benefit of the disclosure herein and knowledge ordinarily available about a contemplated system, can readily determine the purposes and use of regulatory notice requirements based in various embodiments and contexts disclosed herein.

The term regulatory foreclosure requirement (and any derivatives) as utilized herein may be understood broadly to describe an obligation or condition in order to trigger, process or complete default of a loan, foreclosure or recapture of collateral, or other related foreclosure actions. The regulatory foreclosure requirement may be required under one or more conditions that are triggered, or generally required. For example, a lender may have a regulatory foreclosure requirement to provide notice to a borrower of a default of a loan, or other notifications relating to the default of a loan prior to foreclosure. The regulatory aspect of the term may be attributed to jurisdiction-specific laws, rules, or codes that require certain obligations of communication. The foreclosure aspect generally relates to the specific remedy of foreclosure, or a recapture of collateral property and default of a loan, which may take many different forms, but may be specified in the terms of the loan. The requirement aspect relates to the necessity of a party to complete its obligation in order to be in compliance or performance of laws, rules, codes or terms of an agreement or loan. In certain embodiments, a smart contract circuit may process or trigger regulatory foreclosure requirements and process appropriate tasks relating to such a foreclosure action. This may be based on a jurisdictional location of at least one of the lender, the borrower, the fund provided via the loan, the repayment of the loan, and the collateral of the loan, or other locations as designated by the terms of the loan, transaction, or agreement. In cases where a party or entity has not satisfied such regulatory foreclosure requirements, certain rights may be forgiven by the party or entity (e.g. a lender), or such a failure to comply with the regulatory notice requirement may enable automated action or trigger other conditions or terms. One of skill in the art, having the benefit of the disclosure herein and knowledge ordinarily available about a contemplated system, can readily determine the purposes and use of regulatory foreclosure requirements in various embodiments and contexts disclosed herein.

The term regulatory foreclosure requirement may also be utilized herein to describe an obligation or in order to trigger, process or complete default of a loan, foreclosure or recapture of collateral, or other related foreclosure actions. based upon a general or specific policy rather than based on a particular jurisdiction, or laws, rules, or codes of a particular location (as in regulatory foreclosure requirement that may be jurisdiction-specific). The regulatory foreclosure requirement may be prudent or suggested, rather than obligatory or required, under one or more conditions that are triggered, or generally required. For example, a lender may have a regulatory foreclosure requirement that is policy based to provide notice to a borrower of a default of a loan, or other notifications relating to a transaction or loan that are advisory or helpful, rather than mandatory (although mandatory notices may also fall under a policy basis). Thus, in policy based uses of the regulatory foreclosure requirement term, a smart contract may process or trigger regulatory foreclosure requirements and provide appropriate notice to a borrower which may or may not necessarily be required by a law, rule or code. The basis of the notice or communication may be out of prudence, courtesy, custom, industry practice, or obligation.

The term regulatory foreclosure requirements may also be utilized herein to describe an obligation or condition that is to be performed with regard to a specific user, such as a lender or a borrower. The regulatory notice may be specifically directed toward any party or entity, or a group of parties or entities. For example, a particular notice or communication may be advisable or required to be provided to a borrower, such as on circumstances of a borrower's failure to provide scheduled payments on a loan resulting in a default. As such, such a regulatory foreclosure requirement is directed to a particular user, such as a lender or borrower, and may be a result of a regulatory foreclosure requirement that is jurisdiction-specific or policy-based, or otherwise. For example, the foreclosure requirement may be related to a specific entity involved with a transaction (e.g., the current borrower has been a customer for 30 years, so s/he receives unique treatment), or to a class of entities (e.g., "preferred" borrowers, or "first time default" borrowers). Thus, in some circumstances a smart contract circuit may process or trigger an obligation or action that must be taken pursuant to a foreclosure, where the action is directed or from a specific party such as a lender or a borrower, which may or may not necessarily be required by a law, rule or code, but may otherwise be provided out of prudence, courtesy, or custom. In certain embodiments, the obligation or condition that is to be performed with regard to the specific user may form a part of the terms and conditions or otherwise be known to the specific user to which it applies (e.g., an insurance company or bank that advertises a specific practice with regard to a specific class of customers, such as first-time default customers, first-time accident customers, etc.), and in certain embodiments the obligation or condition that is to be performed with regard to the specific user may be unknown to the specific user to which it applies (e.g., a bank has a policy relating to a class of users to which the specific user belongs, but the specific user is not aware of the classification).

The terms value, valuation, valuation model (and similar terms) as utilized herein should be understood broadly to describe an approach to evaluate and determine the estimated value for collateral. Without limitation to any other aspect or description of the present disclosure, a valuation model may be used in conjunction with: collateral (e.g. a secured property), artificial intelligence services (e.g. to improve a valuation model), data collection and monitoring services (e.g. to set a valuation amount), valuation services (e.g. the process of informing, using, and/or improving a valuation model), and/or outcomes relating to transactions in collateral (e.g. as a basis of improving the valuation model). "Jurisdiction-specific valuation model" is also used as a valuation model used in a specific geographic/jurisdictional area or region; wherein, the jurisdiction can be specific to jurisdiction of the lender, the borrower, the delivery of funds, the payment of the loan or the collateral of the loan, or combinations thereof. In certain embodiments, a jurisdiction-specific valuation model considers jurisdictional effects on a valuation of collateral, including at least: rights and obligations for borrowers and lenders in the relevant jurisdiction(s); jurisdictional effects on the ability to move, import, export, substitute, and/or liquidate the collateral; jurisdictional effects on the timing between default and foreclosure or collection of collateral; and/or jurisdictional effects on the volatility and/or sensitivity of collateral value determinations. In certain embodiments, a geolocation-specific valuation model considers geolocation effects on a valuation of the collateral, which may include a similar list of considerations relative jurisdictional effects (although the jurisdictional location(s) may be distinct from the geolocation(s)), but may also include additional effects, such as: weather-related effects; distance of the collateral from monitoring, maintenance, or seizure services; and/or proximity of risk phenomenon (e.g., fault lines, industrial locations, a nuclear plant, etc.). A valuation model may utilize a valuation of offset collateral (e.g., a similar item of collateral, a generic value such as a market value of similar or fungible collateral, and/or a value of an item that correlates with a value of the collateral) as a part of the valuation of the collateral. In certain embodiments, an artificial intelligence circuit includes one or more machine learning and/or artificial intelligence algorithms, to improve a valuation model, including, for example, utilizing information over time between multiple transactions involving similar or offset collateral, and/or utilizing outcome information (e.g., where loan transactions are completed successfully or unsuccessfully, and/or in response to collateral seizure or liquidation events that demonstrate real-world collateral valuation determinations) from the same or other transactions to iteratively improve the valuation model. In certain embodiments, an artificial intelligence circuit is trained on a collateral valuation data set, for example previously determined valuations and/or through interactions with a trainer (e.g., a human, accounting valuations, and/or other valuation data). In certain embodiments, the valuation model and/or parameters of the valuation model (e.g., assumptions, calibration values, etc.) may be determined and/or negotiated as a part of the terms and conditions of the transaction (e.g., a loan, a set of loans, and/or a subset of the set of loans). One of skill in the art, having the benefit of the disclosure herein and knowledge ordinarily available about a contemplated system, can readily determine which aspects of the present disclosure will benefit a particular application for a valuation model, and how to choose or combine valuation models to implement an embodiment of a valuation model. Certain considerations for the person of skill in the art, or embodiments of the present disclosure in choosing an appropriate valuation model, include, without limitation: the legal considerations of a valuation model given the jurisdiction of the collateral; the data available for a given collateral; the anticipated transaction/loan type(s); the specific type of collateral; the ratio of the loan to value; the ratio of the collateral to the loan; the gross transaction/loan amount; the credit scores of the borrower; accounting practices for the loan type and/or related industry; uncertainties related to any of the foregoing; and/or sensitivities related to any of the foregoing. While specific examples of valuation models and considerations are described herein for purposes of illustration, any embodiment benefitting from the disclosures herein, and any considerations understood to one of skill in the art having the benefit of the disclosures herein, are specifically contemplated within the scope of the present disclosure The term market value data, or marketplace information, (and other forms or variations) as utilized herein may be understood broadly to describe data or information relating to the valuation of a property, asset, collateral or other valuable items which may be used as the subject of a loan, collateral or transaction. Market value data or marketplace information may change from time to time, and may be estimated, calculated, or objectively or subjectively determined from various sources of information. Market value data or marketplace information may be related directly to an item of collateral or to an off-set item of collateral. Market value data or marketplace information may include financial data, market ratings, product ratings, customer data, market research to understand customer needs or preferences, competitive intelligence re. competitors, suppliers, and the like, entities sales, transactions, customer acquisition cost, customer lifetime value, brand awareness, churn rate, and the like. The term may occur in many different contexts of contracts or loans, such as lending, refinancing, consolidation, factoring, brokering, foreclosure, and data processing (e.g. data collection), or combinations thereof, without limitation. Market value data or marketplace information may be used as a noun to identify a single figure or a plurality of figures or data. For example, market value data or marketplace information may be utilized by a lender to determine if a property or asset will serve as collateral for a secured loan, or may alternatively be utilized in the determination of foreclosure if a loan is in default, without limitation to these circumstances in use of the term. Marketplace value data or marketplace information may also be used to determine loan-to-value figures or calculations. In certain embodiments, a collection service, smart contract circuit, and/or robotic process automation system may estimate or calculate market value data or marketplace information from one or more sources of data or information. In some cases market data value or marketplace information, depending upon the data/information contained therein, may enable automated action or trigger other conditions or terms. One of skill in the art, having the benefit of the disclosure herein and knowledge ordinarily available about a contemplated system and available relevant marketplace information, can readily determine the purposes and use of this term in various forms, embodiments and contexts disclosed herein.

The terms similar collateral, similar to collateral, off-set collateral, and other forms or variations as utilized herein may be understood broadly to describe a property, asset or valuable item that may be like in nature to a collateral (e.g. an article of value held in security) regarding a loan or other transaction. Similar collateral may refer to a property, asset, collateral or other valuable item which may be aggregated, substituted, or otherwise referred to in conjunction with other collateral, whether the similarity comes in the form of a common attribute such as type of item of collateral, category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, and a jurisdictional location of the item of collateral, and the like. In certain embodiments, an offset collateral references an item that has a value correlation with an item of collateral— for example an offset collateral may exhibit similar price movements, volatility, storage requirements, or the like for an item of collateral. In certain embodiments, similar collateral may be aggregated to form a larger security interest or collateral for an additional loan or distribution, or transaction. In certain embodiments, offset collateral may be utilized to inform a valuation of the collateral. In certain embodiments, a smart contract circuit or robotic process automation system may estimate or calculate figures, data or information relating to similar collateral, or may perform a function with respect to aggregating similar collateral. One of skill in the art, having the benefit of the disclosure herein and knowledge ordinarily available about a contemplated system can readily determine the purposes and use of similar collateral, offset collateral, or related terms as they relate to collateral in various forms, embodiments, and contexts disclosed herein.

The term restructure (and other forms such as restructuring) as utilized herein may be understood broadly to describe a modification of terms or conditions, properties, collateral, or other considerations affecting a loan or transaction. Restructuring may result in a successful outcome where amended terms or conditions are adopted between parties, or an unsuccessful outcome where no modification or restructure occurs, without limitation. Restructuring can occur in many contexts of contracts or loans, such as application, lending, refinancing, collection, consolidation, factoring, brokering, foreclosure, and combinations thereof, without limitation. Debt may also be restructured, which may indicate that debts owed to a party are modified as to timing, amounts, collateral, or other terms. For example, a borrower may restructure debt of a loan to accommodate a change of financial conditions, or a lender may offer to a borrower the restructuring of a debt for its own needs or prudence. In certain embodiments, a smart contract circuit or robotic process automation system may automatically or manually restructure debt based on a monitored condition, or create options for restructuring a debt, administrate the process of negotiating or effecting the restructuring of a debt, or other actions in connection with restructuring or modifying terms of a loan or transaction. One of skill in the art, having the benefit of the disclosure herein and knowledge ordinarily available about a contemplated system, can readily determine the purposes and use of this term, whether in the context of debt or otherwise, in various embodiments and contexts disclosed herein.

The term social network data collection, social network monitoring services, and social network data collection and monitoring services (and its various forms or derivatives) as utilized herein may be understood broadly to describe services relating to the acquisition, organizing, observing, or otherwise acting upon data or information derived from one or more social networks. The social network data collection and monitoring services may be a part of a related system of services or a standalone set of services. Social network data collection and monitoring services may be provided by a platform or system, without limitation. Social network data collection and monitoring services may be used in a variety of contexts such as lending, refinancing, negotiation, collection, consolidation, factoring, brokering, foreclosure, and combinations thereof, without limitation. Requests of social network data collection and monitoring, with configuration parameters, may be requested by other services, automatically initiated or triggered to occur based on conditions or circumstances that occur. An interface may be provided to configure, initiate, display or otherwise interact with social network data collection and monitoring services. Social networks, as utilized herein, reference any mass platform where data and communications occur between individuals and/or entities, where the data and communications are at least partially accessible to an embodiment system. In certain embodiments, the social network data includes publicly available (e.g., accessible without any authorization) information. In certain embodiments, the social network data includes information that is properly accessible to an embodiment system, but may include subscription access or other access to information that is not freely available to the public, but may be accessible (e.g., consistent with a privacy policy of the social network with its users). A social network may be primarily social in nature, but may additionally or alternatively include professional networks, alumni networks, industry related networks, academically oriented networks, or the like. In certain embodiments, a social network may be a crowdsourcing platform, such as a platform configured to accept queries or requests directed to users (and/or a subset of users, potentially meeting specified criteria), where users may be aware that certain communications will be shared and accessible to requestors, at least a portion of users of the platform, and/or publicly available. In certain embodiments, without limitation, social network data collection and monitoring services may be performed by a smart contract circuit or a robotic process automation system. One of skill in the art, having the benefit of the disclosure herein and knowledge ordinarily available about a contemplated system, can readily determine the purposes and use of social network data collection and monitoring services in various embodiments and contexts disclosed herein.

The term crowdsource and social network information as utilized herein may further be understood broadly to describe information acquired or provided in conjunction with a crowdsourcing model or transaction, or information acquired or provided on or in conjunction with a social network. Crowdsource and social network information may be provided by a platform or system, without limitation. Crowdsource and social network information may be acquired, provided or communicated to or from a group of information suppliers and by which responses to the request may be collected and processed. Crowdsource and social network information may provide information, conditions or factors relating to a loan or agreement. Crowdsource and social network information may be private or published, or combinations thereof, without limitation. In certain embodiments, without limitation, crowdsource and social network information may be acquired, provided, organized or processed, without limitation, by a smart contract circuit, wherein the crowdsource and social network information may be managed by a smart contract circuit that processes the information to satisfy a set of configured parameters. One of skill in the art, having the benefit of the disclosure herein and knowledge ordinarily available about a contemplated system can readily determine the purposes and use of this term in various embodiments and contexts disclosed herein.

The term negotiate (and other forms such as negotiating or negotiation) as utilized herein may be understood broadly to describe discussions or communications to bring about or obtain a compromise, outcome, or agreement between parties or entities. Negotiation may result in a successful outcome where terms are agreed between parties, or an unsuccessful outcome where the parties do not agree to specific terms, or combinations thereof, without limitation. A negotiation may be successful in one aspect or for a particular purpose, and unsuccessful in another aspect or for another purpose. Negotiation can occur in many contexts of contracts or loans, such as lending, refinancing, collection, consolidation, factoring, brokering, foreclosure, and combinations thereof, without limitation. For example, a borrower may negotiate an interest rate or loan terms with a lender. In another example, a borrower in default may negotiate an alternative resolution to avoid foreclosure with a lender. In certain embodiments, a smart contract circuit or robotic process automation system may negotiate for one or more of the parties, and process appropriate tasks for completing or attempting to complete a negotiation of terms. In some cases negotiation by the smart contract or robotic process automation system may not complete or be successful. Successful negotiation may enable automated action or trigger other conditions or terms to be implemented by the smart contract circuit or robotic process automation system. One of skill in the art, having the benefit of the disclosure herein and knowledge ordinarily available about a contemplated system, can readily determine the purposes and use of negotiation in various embodiments and contexts disclosed herein.

The term negotiate in various forms may more specifically be utilized herein in verb form (e.g. to negotiate) or in noun forms (e.g. a negotiation), or other forms to describe a context of mutual discussion leading to an outcome. For example, a robotic process automation system may negotiate terms and conditions on behalf of a party, which would be a use as a verb clause. In another example, a robotic process automation system may be negotiating terms and conditions for modification of a loan, or negotiating a consolidation offer, or other terms. As a noun clause, a negotiation (e.g. an event) may be performed by a robotic process automation system. Thus, in some circumstances a smart contract circuit or robotic process automation system may negotiate (e.g. as a verb clause) terms and conditions, or the description of doing so may be considered a negotiation (e.g. as a noun clause). One of skill in the art, having the benefit of the disclosure herein and knowledge about negotiating and negotiation, or other forms of the word negotiate, can readily determine the purposes and use of this term in various embodiments and contexts disclosed herein.

The term negotiate in various forms may also specifically be utilized to describe an outcome, such as a mutual compromise or completion of negotiation leading to an outcome. For example, a loan may, by robotic process automation system or otherwise, be considered negotiated as a successful outcome that has resulted in an agreement between parties, where the negotiation has reached completion. Thus, in some circumstances a smart contract circuit or robotic process automation system may have negotiated to completion a set of terms and conditions, or a negotiated loan. One of skill in the art, having the benefit of the disclosure herein and knowledge ordinarily available for a contemplated system, can readily determine the purposes and use of this term as it relates to a mutually agreed outcome through completion of negotiation in various embodiments and contexts disclosed herein.

The term negotiate in various forms may also specifically be utilized to characterize an event such as a negotiating event, or an event negotiation, including reaching a set of agreeable terms between parties. An event requiring mutual agreement or compromise between parties may be considered a negotiating event, without limitation. For example, during the procurement of a loan, the process of reaching a mutually acceptable set of terms and conditions between parties could be considered a negotiating event. Thus, in some circumstances a smart contract circuit or robotic process automation system may accommodate the communications, actions, or behaviors of the parties for a negotiated event.

The term collection (and other forms such as collect or collecting) as utilized herein may be understood broadly to describe the acquisition of a tangible (e.g. physical item), intangible (e.g. data, a license, or a right), or monetary (e.g. payment) item, or other obligation or asset from a source. The term generally may relate to the entire prospective acquisition of such an item from related tasks in early stages to related tasks in late stages or full completion of the acquisition of the item. Collection may result in a successful outcome where the item is tendered to a party, or may or an unsuccessful outcome where the item is not tendered or acquired to a party, or combinations thereof (e.g., a late or otherwise deficient tender of the item), without limitation. Collection may occur in many different contexts of contracts or loans, such as lending, refinancing, consolidation, factoring, brokering, foreclosure, and data processing (e.g. data collection), or combinations thereof, without limitation. Collection may be used in the form of a noun (e.g. data collection or the collection of an overdue payment where it refers to an event or characterizes an event), may refer as a noun to an assortment of items (e.g. a collection of collateral for a loan where it refers to a number of items in a transaction), or may be used in the form of a verb (e.g. collecting a payment from the borrower). For example, a lender may collect an overdue payment from a borrower through an online payment, or may have a successful collection of overdue payments acquired through a customer service telephone call. In certain embodiments, a smart contract circuit or robotic process automation system may perform collection for one or more of the parties, and process appropriate tasks for completing or attempting collection for one or more items (e.g., an overdue payment). In some cases negotiation by the smart contract or robotic process automation system may not complete or be successful, and depending upon such outcomes this may enable automated action or trigger other conditions or terms. One of skill in the art, having the benefit of the disclosure herein and knowledge ordinarily available about a contemplated system, can readily determine the purposes and use of collection in various forms, embodiments, and contexts disclosed herein.

The term collection in various forms may also more specifically be utilized herein in noun form to describe a context for an event or thing, such as a collection event, or a collection payment. For example, a collection event may refer to a communication to a party or other activity that relates to acquisition of an item in such an activity, without limitation. A collection payment, for example, may relate to a payment made by a borrower that has been acquired through the process of collection, or through a collection department with a lender. Although not limited to an overdue, delinquent or defaulted loan, collection may characterize an event, payment or department, or other noun associated with a transaction or loan, as being a remedy for something that has become overdue. Thus, in some circumstances a smart contract circuit or robotic process automation system may collect a payment or installment from a borrower, and the activity of doing so may be considered a collection event, without limitation.

The term collection in various forms may also more specifically be utilized herein as an adjective or other forms to describe a context relating to litigation, such as the outcome of a collection litigation (e.g. litigation regarding overdue or default payments on a loan). For example, the outcome of a collection litigation may be related to delinquent payments which are owed by a borrower or other party, and collection efforts relating to those delinquent payments may be litigated by parties. Thus, in some circumstances a smart contract circuit or robotic process automation system may receive, determine or otherwise administrate the outcome of collection litigation.

The term collection in various forms may also more specifically be utilized herein as an adjective or other forms to describe a context relating to an action of acquisition, such as a collection action (e.g. actions to induce tendering or acquisition of overdue or default payments on a loan or other obligation). The terms collection yield, financial yield of collection, and/or collection financial yield may be used. The result of such a collection action may or may not have a financial yield. For example, a collection action may result in the payment of one or more outstanding payments on a loan, which may render a financial yield to another party such as the lender. Thus, in some circumstances a smart contract circuit or robotic process automation system may render a financial yield from a collection action, or otherwise administrate or in some manner assist in a financial yield of a collection action. In embodiments, a collection action may include the need for collection litigation.

The term collection in various forms (collection ROI, ROI on collection, ROI on collection activity, collection activity ROI, and the like) may also more specifically be utilized herein to describe a context relating to an action of receiving value, such as a collection action (e.g. actions to induce tendering or acquisition of overdue or default payments on a loan or other obligation), wherein there is a return on investment (ROI). The result of such a collection action may or may not have an ROI, either with respect to the collection action itself (as an ROI on the collection action) or as an ROI on the broader loan or transaction that is the subject of the collection action. For example, an ROI on a collection action may be prudent or not with respect to a default loan, without limitation, depending upon whether the ROI will be provided to a party such as the lender. A projected ROI on collection may be estimated, or may also be calculated given real events that transpire. In some circumstances, a smart contract circuit or robotic process automation system may render an estimated ROI for a collection action or collection event, or may calculate an ROI for actual events transpiring in a collection action or collection event, without limitation. In embodiments, such a ROI may be a positive or negative figure, whether estimated or actual.

The term reputation, measure of reputation, lender reputation, borrower reputation, entity reputation, and the like may include general, widely held beliefs, opinions, and/or perceptions that are generally held about an individual, entity, collateral, and the like. A measure for reputation may be determined based on social data including likes/dislikes, review of entity or products and services provided by the entity, rankings of the company or product, current and historic market and financial data include price, forecast, buy/sell recommendations, financial news regarding entity, competitors, and partners. Reputations may be cumulative in that a product reputation and the reputation of a company leader or lead scientist may influence the overall reputation of the entity. Reputation of an institute associated with an entity (e.g. a school being attended by a student) may influence the reputation of the entity. In some circumstances, a smart contract circuit or robotic process automation system may collect or initiate collection of data related to the above and determine a measure or ranking of reputation. A measure or ranking of an entity's reputation may be used by a smart contract circuit or robotic process automation system in determining whether to enter into an agreement with the entity, determination of terms and conditions of a loan, interest rates, and the like. In certain embodiments, indicia of a reputation determination may be related to outcomes of one or more transactions (e.g., a comparison of "likes" on a particular social media data set to an outcome index, such as successful payments, successful negotiation outcomes, ability to liquidate a particular type of collateral, etc.) to determine the measure or ranking of an entity's reputation. One of skill in the art, having the benefit of the disclosure herein and knowledge ordinarily available about a contemplated system, can readily determine the purposes and use of the reputation, a measure or ranking of the reputation, and/or utilization of the reputation in negotiations, determination of terms and conditions, determination of whether to proceed with a transaction, and other various embodiments and contexts disclosed herein.

The term collection in various forms (e.g. collector) may also more specifically be utilized herein to describe a party or entity that induces, administrates, or facilitates a collection action, collection event, or other collection related context. The measure of reputation of a party involved, such as a collector, or during the context of a collection, may be estimated or calculated using objective, subjective, or historical metrics or data. For example, a collector may be involved in a collection action, and the reputation of that collector may be used to determine decisions, actions or conditions. Similarly, a collection may be also used to describe objective, subjective or historical metrics or data to measure the reputation of a party involved, such as a lender, borrower or debtor. In some circumstances, a smart contract circuit or robotic process automation system may render a collection or measures, or implement a collector, within the context of a transaction or loan.

The term collection and data collection in various forms, including data collection systems, may also more specifically be utilized herein to describe a context relating to the acquisition, organization, or processing of data, or combinations thereof, without limitation. The result of such a data collection may be related or wholly unrelated to a collection of items (e.g., grouping of the items, either physically or logically), or actions taken for delinquent payments (e.g., collection of collateral, a debt, or the like), without limitation. For example, a data collection may be performed by a data collection system, wherein data is acquired, organized or processed for decision-making, monitoring, or other purposes of prospective or actual transaction or loan. In some circumstances, a smart contract or robotic process automation system may incorporate data collection or a data collection system, to perform portions or entire tasks of data collection, without limitation. One of skill in the art, having the benefit of the disclosure herein and knowledge ordinarily available for a contemplated system, can readily determine and distinguish the purposes and use of collection in the context of data or information as used herein.

The terms refinance, refinancing activity(ies), refinancing interactions, refinancing outcomes, and similar terms, as utilized herein should be understood broadly. Without limitation to any other aspect or description of the present disclosure refinance and refinancing activities include replacing an existing mortgage, loan, bond, debt transaction, or the like with a new mortgage, loan, bond, or debt transaction that pays off or ends the previous financial arrangement. In certain embodiments, any change to terms and conditions of a loan, and/or any material change to terms and conditions of a loan, may be considered a refinancing activity. In certain embodiments, a refinancing activity is considered only those changes to a loan agreement that result in a different financial outcome for the loan agreement. Typically, the new loan should be advantageous to the borrower or issuer, and/or mutually agreeable (e.g., improving a raw financial outcome of one, and a security or other outcome for the other). Refinancing may be done to reduce interest rates, lower regular payments, change the loan term, change the collateral associated with the loan, consolidate debt into a single loan, restructure debt, change a type of loan (e.g. variable rate to fixed rate), pay off a loan that is due, in response to an improved credit score, to enlarge the loan, and/or in response to a change in market conditions (e.g. interest rates, value of collateral, and the like).

Refinancing activity may include initiating an offer to refinance, initiating a request to refinance, configuring a refinancing interest rate, configuring a refinancing payment schedule, configuring a refinancing balance in a response to the amount or terms of the refinanced loan, configuring collateral for a refinancing including changes in collateral used, changes in terms and conditions for the collateral, a change in the amount of collateral and the like, managing use of proceeds of a refinancing, removing or placing a lien on different items of collateral as appropriate given changes in terms and conditions as part of a refinancing, verifying title for a new or existing item of collateral to be used to secure the refinanced loan, managing an inspection process title for a new or existing item of collateral to be used to secure the refinanced loan, populating an application to refinance a loan, negotiating terms and conditions for a refinanced loan and closing a refinancing. Refinance and refinancing activities may be disclosed in the context of data collection and monitoring services that collect a training set of interactions between entities for a set of loan refinancing activities. Refinance and refinancing activities may be disclosed in the context of an artificial intelligence system that is trained using the collected training set of interactions that includes both refinancing activities and outcomes. The trained artificial intelligence may then be used to recommend a refinance activity, evaluate a refinance activity, make a prediction around an expected outcome of refinancing activity, and the like. Refinance and refinancing activities may be disclosed in the context of smart contract systems which may automate a subset of the interactions and activities of refinancing. In an example, a smart contract system may automatically adjust an interest rate for a loan based on information collected via at least one of an Internet of Things system, a crowdsourcing system, a set of social network analytic services and a set of data collection and monitoring services. The interest rate may be adjusted based on rules, thresholds, model parameters that determine, or recommend, an interest rate for refinancing a loan based on interest rates available to the lender from secondary lenders, risk factors of the borrower (including predicted risk based on one or more predictive models using artificial intelligence), marketing factors (such as competing interest rates offered by other lenders), and the like. Outcomes and events of a refinancing activity may be recorded in a distributed ledger. Based on the outcome of a refinance activity, a smart contract for the refinance loan may be automatically reconfigured to define the terms and conditions for the new loan such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

One of skill in the art, having the benefit of the disclosure herein and knowledge ordinarily available about a contemplated system can readily determine which aspects of the present disclosure will benefit from a particular application of a refinance activity, how to choose or combine refinance activities, how to implement systems, services, or circuits to automatically perform of one or more (or all) aspects of a refinance activity, and the like. Certain considerations for the person of skill in the art, or embodiments of the present disclosure in choosing an appropriate training sets of interactions with which to train an artificial intelligence to take action, recommend or predict the outcome of certain refinance activities. While specific examples of refinance and refinancing activities are described herein for purposes of illustration, any embodiment benefitting from the disclosures herein, and any considerations understood to one of skill in the art having the benefit of the disclosures herein, are specifically contemplated within the scope of the present disclosure.

The terms consolidate, consolidation activity(ies), loan consolidation, debt consolidation, consolidation plan, and similar terms, as utilized herein should be understood broadly. Without limitation to any other aspect or description of the present disclosure consolidate, consolidation activity (ies), loan consolidation, debt consolidation, or consolidation plan are related to the use of a single large loan to pay off several smaller loans, and/or the use of one or more of a set of loans to pay off at least a portion of one or more of a second set of loans. In embodiments, loan consolidation may be secured (i.e., backed by collateral) or unsecured. Loans may be consolidated to obtain a lower interest rate than one or more of the current loans, to reduce total monthly loan payments, and/or to bring a debtor into compliance on the consolidated loans or other debt obligations of the debtor. Loans that may be classified as candidates for consolidation may be determined based on a model that processes attributes of entities involved in the set of loans including identity of a party, interest rate, payment balance, payment terms, payment schedule, type of loan, type of collateral, financial condition of party, payment status, condition of collateral, and value of collateral. Consolidation activities may include managing at least one of identification of loans from a set of candidate loans, preparation of a consolidation offer, preparation of a consolidation plan, preparation of content communicating a consolidation offer, scheduling a consolidation offer, communicating a consolidation offer, negotiating a modification of a consolidation offer, preparing a consolidation agreement, executing a consolidation agreement, modifying collateral for a set of loans, handling an application workflow for consolidation, managing an inspection, managing an assessment, setting an interest rate, deferring a payment requirement, setting a payment schedule, and closing a consolidation agreement. In embodiments, there may be systems, circuits, and/or services configured to create, configure (such as using one or more templates or libraries), modify, set, or otherwise handle (such as in a user interface) various rules, thresholds, conditional procedures, workflows, model parameters, and the like to determine, or recommend, a consolidation action or plan for a lending transaction or a set of loans based on one or more events, conditions, states, actions, or the like. In embodiments, a consolidation plan may be based on various factors, such as the status of payments, interest rates of the set of loans, prevailing interest rates in a platform marketplace or external marketplace, the status of the borrowers of a set of loans, the status of collateral or assets, risk factors of the borrower, the lender, one or more guarantors, market risk factors and the like. Consolidation and consolidation activities may be disclosed in the context of data collection and monitoring services that collect a training set of interactions between entities for a set of loan consolidation activities. consolidation and consolidation activities may be disclosed in the context of an artificial intelligence system that is trained using the collected training set of interactions that includes both consolidation activities and outcomes associated with those activities. The trained artificial intelligence may then be used to recommend a consolidation activity, evaluate a consolidation activity, make a prediction around an expected outcome of consolidation activity, and the like based models including status of debt, condition of collateral or assets used to secure or back a set of loans, the state of a business or business operation (e.g., receivables, payables, or the like), conditions of parties (such as net worth, wealth, debt, location, and other conditions), behaviors of parties (such as behaviors indicating preferences, behaviors indicating debt preferences), and others. Debt consolidation, loan consolidation and associated consolidation activities may be disclosed in the context of smart contract systems which may automate a subset of the interactions and activities of consolidation. In embodiments, consolidation may include consolidation with respect to terms and conditions of sets of loans, selection of appropriate loans, configuration of payment terms for consolidated loans, configuration of payoff plans for pre-existing loans, communications to encourage consolidation, and the like. In embodiments, the artificial intelligence of a smart contract may automatically recommend or set rules, thresholds, actions, parameters and the like (optionally by learning to do so based on a training set of outcomes over time), resulting in a recommended consolidation plan, which may specify a series of actions required to accomplish a recommended or desired outcome of consolidation (such as within a range of acceptable outcomes), which may be automated and may involve conditional execution of steps based on monitored conditions and/or smart contract terms, which may be created, configured, and/or accounted for by the consolidation plan. Consolidation plans may be determined and executed based at least one part on market factors (such as competing interest rates offered by other lenders, values of collateral, and the like) as well as regulatory and/or compliance factors. Consolidation plans may be generated and/or executed for creation of new consolidated loans, for secondary loans related to consolidated loans, for modifications of existing loans related to consolidation, for refinancing terms of a consolidated loan, for foreclosure situations (e.g., changing from secured loan rates to unsecured loan rates), for bankruptcy or insolvency situations, for situations involving market changes (e.g., changes in prevailing interest rates) and others. consolidation.

Certain of the activities related to loans, collateral, entities and the like may apply to a wide variety of loans and may not apply explicitly to consolidation activities. The categorization of the activities as consolidation activities may be based on the context of the loan for which the activities are taking place. However, one of skill in the art, having the benefit of the disclosure herein and knowledge ordinarily available about a contemplated system can readily determine which aspects of the present disclosure will benefit from a particular application of a consolidation activity, how to choose or combine consolidation activities, how to implement selected services, circuits, and/or systems described herein to perform certain loan consolidation operations, and the like. While specific examples of consolidation and consolidation activities are described herein for purposes of illustration, any embodiment benefitting from the disclosures herein, and any considerations understood to one of skill in the art having the benefit of the disclosures herein, are specifically contemplated within the scope of the present disclosure.

The terms factoring a loan, factoring a loan transaction, factors, factoring a loan interaction, factoring assets or sets of assets used for factoring and similar terms, as utilized herein should be understood broadly. Without limitation to any other aspect or description of the present disclosure factoring may be applied to factoring assets such as invoices, inventory, accounts receivable, and the like, where the realized value of the item is in the future. For example, the accounts receivable is worth more when it has been paid and there is less risk of default. Inventory and Work in Progress (WIP) may be worth more as final product rather than components. References to accounts receivable should be understood to encompass these terms and not be limiting. Factoring may include a sale of accounts receivable at a discounted rate for value in the present (often cash). Factoring may also include the use of accounts receivable as collateral for a short term loan. In both cases the value of the accounts receivable or invoices may be discounted for multiple reasons including the future value of money, a term of the accounts receivable (e.g., 30 day net payment vs. 90 day net payment), a degree of default risk on the accounts receivable, a status of receivables, a status of work-in-progress (WIP), a status of inventory, a status of delivery and/or shipment, financial condition(s) of parties owing against the accounts receivable, a status of shipped and/or billed, a status of payments, a status of the borrower, a status of inventory, a risk factor of a borrower, a lender, one or more guarantors, market risk factors, a status of debt (are there other liens present on the accounts receivable or payment owed on the inventory, a condition of collateral assets (e.g. the condition of the inventory—is it current or out of date, are invoices in arrears), a state of a business or business operation, a condition of a party to the transaction (such as net worth, wealth, debt, location, and other conditions), a behavior of a party to the transaction (such as behaviors indicating preferences, behaviors indicating negotiation styles, and the like), current interest rates, any current regulatory and compliance issues associated with the inventory or accounts receivable (e.g. if inventory is being factored, has the intended product received appropriate approvals), and there legal actions against the borrower, and many others, including predicted risk based on one or more predictive models using artificial intelligence). A factor is an individual, business, entity, or groups thereof which agree to provide value in exchange for either the outright acquisition of the invoices in a sale or the use of the invoices as collateral for a loan for the value. Factoring a loan may include the identification of candidates (both lenders and borrowers) for factoring, a plan for factoring specifying the proposed receivables (e.g. all, some, only those meeting certain criteria), and a proposed discount factor, communication of the plan to potential parties, proffering an offer and receiving an offer, verification of quality of receivables, conditions regarding treatment of the receivables for the term of the loan. While specific examples of factoring and factoring activities are described herein for purposes of illustration, any embodiment benefitting from the disclosures herein, and any considerations understood to one of skill in the art having the benefit of the disclosures herein, are specifically contemplated within the scope of the present disclosure.

The terms mortgage, brokering a mortgage, mortgage collateral, mortgage loan activities, and/or mortgage related activities as utilized herein should be understood broadly. Without limitation to any other aspect or description of the present disclosure, a mortgage is an interaction where a borrower provides the title or a lien on the title of an item of value, typically property, to a lender as security in exchange for money or another item of value, to be repaid, typically with interest, to the lender. The exchange includes the condition that, upon repayment of the loan, the title reverts to the borrower and/or the lien on the property is removed. The brokering of a mortgage may include the identification of potential properties, lenders, and other parties to the loan, and arranging or negotiating the terms of the mortgage. Certain components or activities may not be considered mortgage related individually, but may be considered mortgage related when used in conjunction with a mortgage, act upon a mortgage, are related to an entity or party to a mortgage, and the like. For example, brokering may apply to the offering of a variety of loans including unsecured loans, outright sale of property and the like. Mortgage activities and mortgage interactions may include mortgage marketing activity, identification of a set of prospective borrowers, identification of property to mortgage, identification of collateral property to mortgage, qualification of borrower, title search and/or title verification for prospective mortgage property, property assessment, property inspection, or property valuation for prospective mortgage property, income verification, borrower demographic analysis, identification of capital providers, determination of available interest rates, determination of available payment terms and conditions, analysis of existing mortgage(s), comparative analysis of existing and new mortgage terms, completion of application workflow (e.g. keep the application moving forward by initiating next steps in the process as appropriate), population of fields of application, preparation of mortgage agreement, completion of schedule for mortgage agreement, negotiation of mortgage terms and conditions with capital provider, negotiation of mortgage terms and conditions with borrower, transfer of title, placement of lien on mortgaged property and closing of mortgage agreement, and similar terms, as utilized herein should be understood broadly. While specific examples of mortgages and mortgage brokering are described herein for purposes of illustration, any embodiment benefitting from the disclosures herein, and any considerations understood to one of skill in the art having the benefit of the disclosures herein, are specifically contemplated within the scope of the present disclosure.

The terms debt management, debt transactions, debt actions, debt terms and conditions, syndicating debt, consolidating debt, and/or debt portfolios, as utilized herein should be understood broadly. Without limitation to any other aspect or description of the present disclosure a debt includes something of monetary value that is owed to another. A loan typically results in the borrower holding the debt (e.g. the money that must be paid back according to the terms of the loan, which may include interest). Consolidation of debt includes the use of a new, single loan to pay back multiple loans (or various other configurations of debt structuring as described herein, and as understood to one of skill in the art). Often the new loan may have better terms or lower interest rates. Debt portfolios include a number of pieces or groups of debt, often having different characteristics including term, risk, and the like. Debt portfolio management may involve decisions regarding the quantity and quality of the debt being held and how best to balance the various debts to achieve a desired risk/reward position based on: investment policy, return on risk determinations for individual pieces of debt, or groups of debt. Debt may be syndicated where multiple lenders fund a single loan (or set of loans) to a borrower. Debt portfolios may be sold to a third party (e.g., at a discounted rate). Debt compliance includes the various measures taken to ensure that debt is repaid. Demonstrating compliance may include documentation of the actions taken to repay the debt.

Transactions related to a debt (debt transactions) and actions related to the debt (debt actions) may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, and/or consolidating debt. Debt terms and conditions may include a balance of debt, a principal amount of debt, a fixed interest rate, a variable interest rate, a payment amount, a payment schedule, a balloon payment schedule, a specification of assets that back the bond, a specification of substitutability of assets, a party, an issuer, a purchaser, a guarantee, a guarantor, a security, a personal guarantee, a lien, a duration, a covenant, a foreclose condition, a default condition, and a consequence of default. While specific examples of debt management and debt management activities are described herein for purposes of illustration, any embodiment benefitting from the disclosures herein, and any considerations understood to one of skill in the art having the benefit of the disclosures herein, are specifically contemplated within the scope of the present disclosure.

The terms condition, condition classification, classification models, condition management, and similar terms, as utilized herein should be understood broadly. Without limitation to any other aspect or description of the present disclosure condition, condition classification, classification models, condition management, include classifying or determining a condition of an asset, issuer, borrower, loan, debt, bond, regulatory status, term or condition for a bond, loan or debt transaction that is specified and monitored in the contract, and the like. Based on a classified condition of an asset, condition management may include actions to maintain or improve a condition of the asset or the use of that asset as collateral. Based on a classified condition of an issuer, borrower, party regulatory status, and the like, condition management may include actions to alter the terms or conditions of a loan or bond. Condition classification may include various rules, thresholds, conditional procedures, workflows, model parameters, and the like to classify a condition of an asset, issuer, borrower, loan, debt, bond, regulatory status, term or condition for a bond, loan or debt transaction, and the like based on data from Internet of Things devices, data from a set of environmental condition sensors, data from a set of social network analytic services and a set of algorithms for querying network domains, social media data, crowdsourced data, and the like. Condition classification may include grouping or labeling entities, or clustering the entities, as similarly positioned with regard to some aspect of the classified condition (e.g., a risk, quality, ROI, likelihood for recovery, likelihood to default, or some other aspect of the related debt).

Various classification models are disclosed where the classification and classification model may be tied to a geographic location relating to the collateral, the issuer, the borrower, the distribution of the funds or other geographic locations. Classification and classification models are disclosed where artificial intelligence is used to improve a classification model (e.g. refine a model by making refinements using artificial intelligence data). Thus artificial intelligence may be considered, in some instances, as a part of a classification model and vice versa. Classification and classification models are disclosed where social media data, crowdsourced data, or IoT data is used as input for refining a model, or as input to a classification model. Examples of IoT data may include images, sensor data, location data, and the like. Examples of social media data or crowdsourced data may include behavior of parties to the loan, financial condition of parties, adherence to a parties to a term or condition of the loan, or bond, or the like. Parties to the loan may include issuers of a bond, related entities, lender, borrower, 3rd parties with an interest in the debt. Condition management may be discussed in connection with smart contract services which may include condition classification, data collection and monitoring, and bond, loan and debt transaction management. Data collection and monitoring services are also discussed in conjunction with classification and classification models which are related when classifying an issuer of a bond issuer, an asset or collateral asset related to the bond, collateral assets backing the bond, parties to the bond, and sets of the same. In some embodiments a classification model may be included when discussing bond types. Specific steps, factors or refinements may be considered a part of a classification model. In various embodiments, the classification model may change both in an embodiment, or in the same embodiment which is tied to a specific jurisdiction. Different classification models may use different data sets (e.g. based on the issuer, the borrower, the collateral assets, the bond type, the loan type, and the like) and multiple classification models may be used in a single classification. For example, one type of bond, such as a municipal bond, may allow a classification model that is based on bond data from municipalities of similar size and economic prosperity, whereas another classification model may emphasize data from IoT sensors associated with a collateral asset. Accordingly, different classification models will offer benefits or risks over other classification models, depending upon the embodiment and the specifics of the bond, loan or debt transaction. A classification model includes an approach or concept for classification. Conditions classified for a bond, loan, or debt transaction may include a principal amount of debt, a balance of debt, a fixed interest rate, a variable interest rate, a payment amount, a payment schedule, a balloon payment schedule, a specification of assets that back the bond, loan or debt transaction, a specification of substitutability of assets, a party, an issuer, a purchaser, a guarantee, a guarantor, a security, a personal guarantee, a lien, a duration, a covenant, a foreclose condition, a default condition, and/or a consequence of default. Conditions classified may include type of bond issuer such as a municipality, a corporation, a contractor, a government entity, a non-governmental entity, and a non-profit entity. Entities may include a set of issuers, a set of bonds, a set of parties, and/or a set of assets. Conditions classified may include an entity condition such as net worth, wealth, debt, location, and other conditions), behaviors of parties (such as behaviors indicating preferences, behaviors indicating debt preferences), and the like. Conditions classified may include an asset or type of collateral such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Conditions classified may include a bond type where bond type may include a municipal bond, a government bond, a treasury bond, an asset-backed bond, and a corporate bond. Conditions classified may include a default condition, a foreclosure condition, a condition indicating violation of a covenant, a financial risk condition, a behavioral risk condition, a policy risk condition, a financial health condition, a physical defect condition, a physical health condition, an entity risk condition and an entity health condition. Conditions classified may include an environment where environment may include an environment selected from among a municipal environment, a corporate environment, a securities trading environment, a real property environment, a commercial facility, a warehousing facility, a transportation environment, a manufacturing environment, a storage environment, a home, and a vehicle. Actions based on the condition of an asset, issuer, borrower, loan, debt, bond, regulatory status and the like, may include managing, reporting on, syndicating, consolidating, or otherwise handling a set of bonds (such as municipal bonds, corporate bonds, performance bonds, and others), a set of loans (subsidized and unsubsidized, debt transactions and the like, monitoring, classifying, predicting, or otherwise handling the reliability, quality, status, health condition, financial condition, physical condition or other information about a guarantee, a guarantor, a set of collateral supporting a guarantee, a set of assets backing a guarantee, or the like. Bond transaction activities in response to a condition of the bond may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, and/or consolidating debt.

One of skill in the art, having the benefit of the disclosure herein and knowledge ordinarily available about a contemplated system, can readily determine which aspects of the present disclosure will benefit a particular application for a classification model, how to choose or combine classification models to arrive at a condition, and/or calculate a value of collateral given the required data. Certain considerations for the person of skill in the art, or embodiments of the present disclosure in choosing an appropriate condition to manage, include, without limitation: the legality of the condition given the jurisdiction of the transaction, the data available for a given collateral, the anticipated transaction type (loan, bond or debt), the specific type of collateral, the ratio of the loan to value, the ratio of the collateral to the loan, the gross transaction/loan amount, the credit scores of the borrower and the lender, and other considerations. While specific examples of conditions, condition classification, classification models, and condition management are described herein for purposes of illustration, any embodiment benefitting from the disclosures herein, and any considerations understood to one of skill in the art having the benefit of the disclosures herein, are specifically contemplated within the scope of the present disclosure.

The terms classify, classifying, classification, categorization, categorizing, categorize (and similar terms) as utilized herein should be understood broadly. Without limitation to any other aspect or description of the present disclosure, classifying a condition or item may include actions to sort the condition or item into a group or category based on some aspect, attribute, or characteristic of the condition or item where the condition or item is common or similar for all the items placed in that classification, despite divergent classifications or categories based on other aspects or conditions at the time. Classification may include recognition of one or more parameters, features, characteristics, or phenomena associated with a condition or parameter of an item, entity, person, process, item, financial construct, or the like. Conditions classified by a condition classifying system may include a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, and/or an entity health condition. A classification model may automatically classify or categorize items, entities, process, items, financial constructs or the like based on data received from a variety of sources. The classification model may classify items based on a single attribute or a combination of attributes, and/or may utilize data regarding the items to be classified and a model. The classification model may classify individual items, entities, financial constructs or groups of the same. A bond may be classified based on the type of bond ((e.g. municipal bonds, corporate bonds, performance bonds, and the like), rate of return, bond rating (3rd party indicator of bond quality with respect to bond issuer's financial strength, and/or ability to bap bond's principal and interest, and the like. Lenders or bond issuers may be classified based on the type of lender or issuer, permitted attributes (e.g. based on income, wealth, location (domestic or foreign), various risk factors, status of issuers, and the like. Borrowers may be classified based on permitted attributes (e.g. income, wealth, total assets, location, credit history), risk factors, current status (e.g. employed, a student), behaviors of parties (such as behaviors indicating preferences, reliability, and the like), and the like. A condition classifying system may classify a student recipient of a loan based on progress of the student toward a degree, the student's grades or standing in their classes, students' status at the school (matriculated, on probation and the like), the participation of a student in a non-profit activity, a deferment status of the student, and the participation of the student in a public interest activity. Conditions classified by a condition classifying system may include a state of a set of collateral for a loan or a state of an entity relevant to a guarantee for a loan. Conditions classified by a condition classifying system may include a medical condition of a borrower, guarantor, subsidizer or the like. Conditions classified by a condition classifying system may include compliance with at least one of a law, a regulation, or a policy related to a lending transaction or lending institute. Conditions classified by a condition classifying system may include a condition of an issuer for a bond, a condition of a bond, a rating of a loan-related entity, and the like. Conditions classified by a condition classifying system may include an identify of a machine, a component, or an operational mode. Conditions classified by a condition classifying system may include a state or context (such as a state of a machine, a process, a workflow, a marketplace, a storage system, a network, a data collector, or the like). A condition classifying system may classify a process involving a state or context (e.g., a data storage process, a network coding process, a network selection process, a data marketplace process, a power generation process, a manufacturing process, a refining process, a digging process, a boring process, and/or other process described herein. A condition classifying system may classify a set of loan refinancing actions based on a predicted outcome of the set of loan refinancing actions. A condition classifying system may classify a set of loans as candidates for consolidation based on attributes such as identity of a party, an interest rate, a payment balance, payment terms, payment schedule, a type of loan, a type of collateral, a financial condition of party, a payment status, a condition of collateral, a value of collateral, and the like. A condition classifying system may classify the entities involved in a set of factoring loans, bond issuance activities, mortgage loans, and the like. A condition classifying system may classify a set of entities based on projected outcomes from various loan management activities. A condition classifying system may classify a condition of a set of issuers based on information from Internet of Things data collection and monitoring services, a set of parameters associated with an issuer, a set of social network monitoring and analytic services, and the like. A condition classifying system may classify a set of loan collection actions, loan consolidation actions, loan negotiation actions, loan refinancing actions and the like based on a set of projected outcomes for those activities and entities.

The term subsidized loan, subsidizing a loan, (and similar terms) as utilized herein should be understood broadly. Without limitation to any other aspect or description of the present disclosure, a subsidized loan is the loan of money or an item of value wherein payment of interest on the value of the loan may be deferred, postponed or delayed, with or without accrual, such as while the borrower is in school, is unemployed, is ill, and the like. In embodiments, a loan may be subsidized when the payment of interest on a portion or subset of the loan is borne or guaranteed by someone other than the borrower. Examples of subsidized loans may include a municipal subsidized loan, a government subsidized loan, a student loan, an asset-backed subsidized loan, and a corporate subsidized loan. An example of a subsidized student loan may include student loans which may be subsidized by the government and on which interest may be deferred or not accrue based on progress of the student toward a degree, the participation of a student in a non-profit activity, a deferment status of the student, and the participation of the student in a public interest activity. An example of a government subsidized housing loan may include governmental subsidies which may exempt the borrower from paying closing costs, first mortgage payment and the like. Conditions for such subsidized loans may include location of the property (rural or urban), income of the borrower, military status of the borrower, ability of the purchased home to meet health and safety standards, a limit on the profits you can earn on the sale of your home, and the like. Certain usages of the word loan may not apply to a subsidized loan but rather to a regular loan. One of skill in the art, having the benefit of the disclosure herein and knowledge about a contemplated system ordinarily available to that person, can readily determine which aspects of the present disclosure will benefit from consideration of a subsidized loan (e.g., in determining the value of the loan, negotiations related to the loan, terms and conditions related to the loan, etc.) wherein the borrower may be relieved of some of the loan obligations common for non-subsidized loans, where the subsidy may include forgiveness, delay or deferment of interest on a loan, or the payment of the interest by a third party. The subsidy may include the payment of closing costs including points, first payment and the like by a person or entity other than the borrower, and/or how to combine processes and systems from the present disclosure to enhance or benefit from title validation.

The term subsidized loan management (and similar terms) as utilized herein should be understood broadly. Without limitation to any other aspect or description of the present disclosure, subsidized loan management may include a plurality of activities and solutions for managing or responding to one or more events related to a subsidized loan wherein such events may include requests for a subsidized loan, offering a subsidized loan, accepting a subsidized loan, providing underwriting information for a subsidized loan, providing a credit report on a borrower seeking a subsidized loan, deferring a required payment as part of the loan subsidy, setting an interest rate for a subsidized loan where a lower interest rate may be part of the subsidy, deferring a payment requirement as part of the loan subsidy, identifying collateral for a loan, validating title for collateral or security for a loan, recording a change in title of property, assessing the value of collateral or security for a loan, inspecting property that is involved in a loan, identifying a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, modifying terms and conditions for a loan, for setting terms and conditions for a loan (such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default), or managing loan-related activities (such as, without limitation, finding parties interested in participating in a loan transaction, handling an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, collecting on a loan, consolidating a set of loans, analyzing performance of a loan, handling a default of a loan, transferring title of assets or collateral, and closing a loan transaction), and the like. In embodiments, a system for handling a subsidized loan may include classifying a set of parameters of a set of subsidized loans on the basis of data relating to those parameters obtained from an Internet of Things data collection and monitoring service. Classifying the set of parameters of the set of subsidized loans may also be on the bases of data obtained from one or more configurable data collection and monitoring services that leverage social network analytic services, crowd sourcing services, and the like for obtaining parameter data (e.g., determination that a person or entity is qualified for the subsidized loan, determining a social value of providing the subsidized loan or removing a subsidization from a loan, determining that a subsidizing entity is legitimate, determining appropriate subsidization terms based on characteristics of the buyer and/or subsidizer, etc.).

The term foreclose, foreclosure, foreclose or foreclosure condition, default foreclosure collateral, default collateral, (and similar terms) as utilized herein should be understood broadly. Without limitation to any other aspect or description of the present disclosure, foreclose condition, default and the like describe the failure of a borrower to meet the terms of a loan. Without limitation to any other aspect or description of the present disclosure foreclose and foreclosure include processes by which a lender attempts to recover, from a borrower in a foreclose or default condition, the balance of a loan or take away in lieu, the right of a borrower to redeem a mortgage held in security for the loan. Failure to meet the terms of the loan may include failure to make specified payments, failure to adhere to a payment schedule, failure to make a balloon payment, failure to appropriately secure the collateral, failure to sustain collateral in a specified condition (e.g. in good repair), acquisition of a second loan, and the like. Foreclosure may include a notification to the borrower, the public, jurisdictional authorities of the forced sale of an item collateral such as through a foreclosure auction. Upon foreclosure, an item of collateral may be placed on a public auction site (such as eBay, N̅¢ or an auction site appropriate for a particular type of property. The minimum opening bid for the item of collateral may be set by the lender and may cover the balance of the loan, interest on the loan, fees associated with the foreclosure and the like. Attempts to recover the balance of the loan may include the transfer of the deed for an item of collateral in lieu of foreclosure (e.g. a real-estate mortgage where the borrower holds the deed for a property which acts as collateral for the mortgage loan). Foreclosure may include taking possession of or repossessing the collateral (e.g. a car, a sports vehicle such as a boat, ATV, ski-mobile, jewelry). Foreclosure may include securing an item of collateral associated with the loan (such as by locking a connected device, such as a smart lock, smart container, or the like that contains or secures collateral). Foreclosure may include arranging for the shipping of an item of collateral by a carrier, freight forwarder of the like. Foreclosure may include arranging for the transport of an item of collateral by a drone, a robot, or the like for transporting collateral. In embodiments, a loan may allow for the substitution of collateral or the shifting of the lien from an item of collateral initially used to secure the loan to a substitute collateral where the substitute collateral is of higher value (to the lender) than the initial collateral or is an item in which the borrower has a greater equity. The result of the substitution of collateral is that when the loan goes into foreclosure, it is the substitute collateral that may be the subject of a forced sale or seizure. Certain usages of the word default may not apply to such as to foreclose but rather to a regular or default condition of an item. One of skill in the art, having the benefit of the disclosure herein and knowledge about a contemplated system ordinarily available to that person, can readily determine which aspects of the present disclosure will benefit from foreclosure, and/or how to combine processes and systems from the present disclosure to enhance or benefit from foreclosure. Certain considerations for the person of skill in the art, in determining whether the term foreclosure, foreclose condition, default and the like is referring to failure of a borrower to meet the terms of a loan and the related attempts by the lender to recover the balance of the loan or obtain ownership of the collateral.

The terms validation of tile, title validation, validating title, and similar terms, as utilized herein should be understood broadly. Without limitation to any other aspect or description of the present disclosure validation of title and title validation include any efforts to verify or confirm the ownership or interest by an individual or entity in an item of property such as a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property. Efforts to verify ownership may include reference to bills of sale, government documentation of transfer of ownership, a legal will transferring ownership, documentation of retirement of liens on the item of property, verification of assignment of Intellectual Property to the proposed borrower in the appropriate jurisdiction, and the like. For real-estate property validation may include a review of deeds and records at a courthouse of a country, a state, a county or a district in which a building, a home, real estate property, undeveloped land, a farm, a crop, a municipal facility, a vehicle, a ship, a plane, or a warehouse is located or registered. Certain usages of the word validation may not apply to validation of a title or title validation but rather to confirmation that a process is operating correctly, that an individual has been correctly identified using biometric data, that intellectual property rights are in effect, that data is correct and meaningful, and the like. One of skill in the art, having the benefit of the disclosure herein and knowledge about a contemplated system ordinarily available to that person, can readily determine which aspects of the present disclosure will benefit from title validation, and/or how to combine processes and systems from the present disclosure to enhance or benefit from title validation. Certain considerations for the person of skill in the art, in determining whether the term validation is referring to title validation, are specifically contemplated within the scope of the present disclosure.

Without limitation to any other aspect or description of the present disclosure, validation includes any validating system including, without limitation, validating title for collateral or security for a loan, validating conditions of collateral for security or a loan, validating conditions of a guarantee for a loan, and the like. For instance, a validation service may provide lenders a mechanism to deliver loans with more certainty, such as through validating loan or security information components (e.g., income, employment, title, conditions for a loan, conditions of collateral, and conditions of an asset). In a non-limiting example, a validation service circuit may be structured to validate a plurality of loan information components with respect to a financial entity configured to determine a loan condition for an asset. Certain components may not be considered a validating system individually, but may be considered validating in an aggregated system—for example, an Internet of Things component may not be considered a validating component on its own, however an Internet of Things component utilized for asset data collection and monitoring may be considered a validating component when applied to validating a reliability parameter of a personal guarantee for a load when the Internet of Things component is associated with a collateralized asset. In certain embodiments, otherwise similar looking systems may be differentiated in determining whether such systems are for validation. For example, a blockchain-based ledger may be used to validate identities in one instance and to maintain confidential information in another instance. Accordingly, the benefits of the present disclosure may be applied in a wide variety of systems, and any such systems may be considered a system for validation herein, while in certain embodiments a given system may not be considered a validating system herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a validating system and/or whether aspects of the present disclosure can benefit or enhance the contemplated system include, without limitation: a lending platform having a social network monitoring system for validating the reliability of a guarantee for a loan; a lending platform having an Internet of Things data collection and monitoring system for validating reliability of a guarantee for a loan; a lending platform having a crowdsourcing and automated classification system for validating conditions of an issuer for a bond; a crowdsourcing system for validating quality, title, or other conditions of collateral for a loan; a biometric identify validation application such as utilizing DNA or fingerprints; IoT devices utilized to collectively validate location and identity of a fixed asset that is tagged by a virtual asset tag; validation systems utilizing voting or consensus protocols; artificial intelligence systems trained to recognize and validate events; validating information such as title records, video footage, photographs, or witnessed statements; validation representations related to behavior, such as to validate occurrence of conditions of compliance, to validate occurrence of conditions of default, to deter improper behavior or misrepresentations, to reduce uncertainty, or to reduce asymmetries of information; and the like.

The term underwriting (and similar terms) as utilized herein should be understood broadly. Without limitation to any other aspect or description of the present disclosure, underwriting includes any underwriting, including, without limitation, relating to underwriters, providing underwriting information for a loan, underwriting a debt transaction, underwriting a bond transaction, underwriting a subsidized loan transaction, underwriting a securities transaction, and the like. Underwriting services may be provided by financial entities, such as banks, insurance or investment houses, and the like, whereby the financial entity guarantees payment in case of a determination of a loss condition (e.g., damage or financial loss) and accept the financial risk for liability arising from the guarantee. For instance, a bank may underwrite a loan through a mechanism to perform a credit analysis that may lead to a determination of a loan to be granted, such as through analysis of personal information components related to an individual borrower requesting a consumer loan (e.g., employment history, salary and financial statements publicly available information such as the borrower's credit history), analysis of business financial information components from a company requesting a commercial load (e.g., tangible net worth, ratio of debt to worth (leverage), and available liquidity (current ratio)), and the like. In a non-limiting example, an underwriting services circuit may be structured to underwrite a financial transaction including a plurality of financial information components with respect to a financial entity configured to determine a financial condition for an asset. In certain embodiments, underwriting components may be considered underwriting for some purposes but not for other purposes—for example, an artificial intelligence system to collect and analyze transaction data may be utilized in conjunction with a smart contract platform to monitor loan transactions, but alternately used to collect and analyze underwriting data, such as utilizing a model trained by human expert underwriters. Accordingly, the benefits of the present disclosure may be applied in a wide variety of systems, and any such systems may be considered underwriting herein, while in certain embodiments a given system may not be considered underwriting herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is underwriting and/or whether aspects of the present disclosure can benefit or enhance the contemplated system include, without limitation: a lending platform having an underwriting system for a loan with a set of data-integrated microservices such as including data collection and monitoring services, blockchain services, artificial intelligence services, and smart contract services for underwriting lending entities and transactions; underwriting processes, operations, and services; underwriting data, such as data relating to identities of prospective and actual parties involved insurance and other transactions, actuarial data, data relating to probability of occurrence and/or extent of risk associated with activities, data relating to observed activities and other data used to underwrite or estimate risk; an underwriting application, such as, without limitation, for underwriting any insurance offering, any loan, or any other transaction, including any application for detecting, characterizing or predicting the likelihood and/or scope of a risk, an underwriting or inspection flow about an entity serving a lending solution, an analytics solution, or an asset management solution; underwriting of insurance policies, loans, warranties, or guarantees; a blockchain and smart contract platform for aggregating identity and behavior information for insurance underwriting, such as with an optional distributed ledger to record a set of events, transactions, activities, identities, facts, and other information associated with an underwriting process; a crowdsourcing platform such as for underwriting of various types of loans, and guarantees; an underwriting system for a loan with a set of data-integrated microservices including data collection and monitoring services, blockchain services, artificial intelligence services, and smart contract services for underwriting lending entities and transactions; an underwriting solution to create, configure, modify, set or otherwise handle various rules, thresholds, conditional procedures, workflows, or model parameters; an underwriting action or plan for management a set of loans of a given type or types based on one or more events, conditions, states, actions, secondary loans or transactions to back loans, for collection, consolidation, foreclosure, situations of bankruptcy of insolvency, modifications of existing loans, situations involving market changes, foreclosure activities; adaptive intelligent systems including artificial intelligent models trained on a training set of underwriting activities by experts and/or on outcomes of underwriting actions to generate a set of predictions, classifications, control instructions, plans, models; underwriting system for a loan with a set of data-integrated microservices including data collection and monitoring services, blockchain services, artificial intelligence services, and smart contract services for underwriting lending entities and transactions; and the like.

The term insuring (and similar terms) as utilized herein should be understood broadly. Without limitation to any other aspect or description of the present disclosure, insuring includes any insuring, including, without limitation, providing insurance for a loan, providing evidence of insurance for an asset related to a loan, a first entity accepting a risk or liability for another entity, and the like. Insuring, or insurance, may be a mechanism through which a holder of the insurance is provided protection from a financial loss, such as in a form of risk management against the risk of a contingent or uncertain loss. The insuring mechanism may provide for an insurance, determine the need for an insurance, determine evidence of insurance, and the like, such as related to an asset, transaction for an asset, loan for an asset, security, and the like. An entity which provides insurance may be known as an insurer, insurance company, insurance carrier, underwriter, and the like. For instance, a mechanism for insuring may provide a financial entity with a mechanism to determine evidence of insurance for an asset related to a loan. In a non-limiting example, an insurance service circuit may be structured to determine an evidence condition of insurance for an asset based on a plurality of insurance information components with respect to a financial entity configured to determine a loan condition for an asset. In certain embodiments, components may be considered insuring for some purposes but not for other purposes—for example a blockchain and smart contract platform may be utilized to manage aspects of a loan transaction such as for identity and confidentiality, but may alternately be utilized to aggregate identity and behavior information for insurance underwriting. Accordingly, the benefits of the present disclosure may be applied in a wide variety of systems, and any such systems may be considered insuring herein, while in certain embodiments a given system may not be considered insuring herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is insuring and/or whether aspects of the present disclosure can benefit or enhance the contemplated system include, without limitation: insurance facilities such as branches, offices, storage facilities, data centers, underwriting operations and others; insurance claims, such as for business interruption insurance, product liability insurance, insurance on goods, facilities, or equipment, flood insurance, insurance for contract-related risks, and many others, as well as claims data relating to product liability, general liability, workers compensation, injury and other liability claims and claims data relating to contracts, such as supply contract performance claims, product delivery requirements, contract claims, claims for damages, claims to redeem points or rewards, claims of access rights, warranty claims, indemnification claims, energy production requirements, delivery requirements, timing requirements, milestones, key performance indicators and others; insurance-related lending; an insurance service, an insurance brokerage service, a life insurance service, a health insurance service, a retirement insurance service, a property insurance service, a casualty insurance service, a finance and insurance service, a reinsurance service; a blockchain and smart contract platform for aggregating identity and behavior information for insurance underwriting; identities of applicants for insurance, identities of parties that may be willing to offer insurance, information regarding risks that may be insured (of any type, without limitation, such as property, life, travel, infringement, health, home, commercial liability, product liability, auto, fire, flood, casualty, retirement, unemployment; distributed ledger may be utilized to facilitate offering and underwriting of microinsurance, such as for defined risks related to defined activities for defined time periods that are narrower than for typical insurance policies; providing insurance for a loan, providing evidence of insurance for property related to a loan; and the like.

The term aggregation (and similar terms) as utilized herein should be understood broadly. Without limitation to any other aspect or description of the present disclosure, an aggregation or to aggregate includes any aggregation including, without limitation, aggregating items together, such as aggregating or linking similar items together (e.g., collateral to provide collateral for a set of loans, collateral items for a set of loans is aggregated in real time based on a similarity in status of the set of items, and the like), collecting data together (e.g., for storage, for communication, for analysis, as training data for a model, and the like), summarizing aggregated items or data into a simpler description, or any other method for creating a whole formed by combining several (e.g., disparate) elements. Further, an aggregator may be any system or platform for aggregating, such as described. Certain components may not be considered aggregation individually but may be considered aggregation in an aggregated system—for example a collection of loans may not be considered an aggregation of loans of itself but may be an aggregation if collected as such. In a non-limiting example, an aggregation circuit may be structured to provide lenders a mechanism to aggregate loans together from a plurality of loans, such as based on a loan attribute, parameter, term or condition, financial entity, and the like, to become an aggregation of loans. In certain embodiments, an aggregation may be considered an aggregation for some purposes but not for other purposes—for example for example, an aggregation of asset collateral conditions may be collected for the purpose of aggregating loans together in one instance and for the purpose of determining a default action in another instance. Additionally, in certain embodiments, otherwise similar looking systems may be differentiated in determining whether such systems are aggregators, and/or which type of aggregating systems. For example, a first and second aggregator may both aggregate financial entity data, where the first aggregator aggregates for the sake of building a training set for an analysis model circuit and where the second aggregator aggregates financial entity data for storage in a blockchain-based distributed ledger. Accordingly, the benefits of the present disclosure may be applied in a wide variety of systems, and any such systems may be considered as aggregation herein, while in certain embodiments a given system may not be considered aggregation herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is aggregation and/or whether aspects of the present disclosure can benefit or enhance the contemplated system include, without limitation forward market demand aggregation (e.g., blockchain and smart contract platform for forward market demand aggregation, interest expressed or committed in a demand aggregation interface, blockchain used to aggregate future demand in a forward market with respect to a variety of products and services, process a set of potential configurations having different parameters for a subset of configurations that are consistent with each other and the subset of configurations used to aggregate committed future demand for the offering that satisfies a sufficiently large subset at a profitable price, and the like); correlated aggregated data (including trend information) on worker ages, credentials, experience (including by process type) with data on the processes in which those workers are involved; demand for accommodations aggregated in advance and conveniently fulfilled by automatic recognition of conditions that satisfy pre-configured commitments represented on a blockchain (e.g., distributed ledger); transportation offerings aggregated and fulfilled (e.g., with a wide range of pre-defined contingencies); aggregation of goods and services on the blockchain (e.g., a distributed ledger used for demand planning); with respect to a demand aggregation interface (e.g., presented to one or more consumers); aggregation of multiple submissions; aggregating identity and behavior information (e.g., insurance underwriting); accumulation and aggregation of multiple parties; aggregation of data for a set of collateral; aggregated value of collateral or assets (e.g., based on real time condition monitoring, rea-time market data collection and integration, and the like); aggregated tranches of loans; collateral for smart contract aggregated with other similar collateral; and the like.

The term linking (and similar terms) as utilized herein should be understood broadly. Without limitation to any other aspect or description of the present disclosure, linking includes any linking, including, without limitation, linking as a relationship between two things or situations (e.g., where one thing affects the other). For instance, linking a subset of similar items such as collateral to provide collateral for a set of loans. Certain components may not be considered linked individually, but may be considered in a process of linking in an aggregated system—for example, a smart contracts circuit may be structured to operate in conjunction with a blockchain circuit as part of a loan processing platform but where the smart contracts circuit processes contracts without storing information through the blockchain circuit, however the two circuits could be linked through the smart contracts circuit linking financial entity information through a distributed ledger on the blockchain circuit. In certain embodiments, linking may be considered linking for some purposes but not for other purposes—for example, linking goods and services for users and radio frequency linking between access points are different forms of linking, where the linking of goods and services for users links thinks together while an RF link is a communications link between transceivers. Additionally, in certain embodiments, otherwise similar looking systems may be differentiated in determining whether such system are linking, and/or which type of linking. For example, linking similar data together for analysis is different from linking similar data together for graphing. Accordingly, the benefits of the present disclosure may be applied in a wide variety of systems, and any such systems may be considered linking herein, while in certain embodiments a given system may not be considered a linking herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is linking and/or whether aspects of the present disclosure can benefit or enhance the contemplated system include, without limitation linking marketplaces or external marketplaces with a system or platform; linking data (e.g., data cluster including links and nodes); storage and retrieval of data linked to local processes; links (e.g. with respect to nodes) in a common knowledge graph; data linked to proximity or location (e.g., of the asset); linking to an environment (e.g., goods, services, assets, and the like); linking events (e.g., for storage such as in a blockchain, for communication or analysis); linking ownership or access rights; linking to access tokens (e.g., travel offerings linked to access tokens); links to one or more resources (e.g., secured by cryptographic or other techniques); linking a message to a smart contract; and the like.

The term indicator of interest (and similar terms) as utilized herein should be understood broadly. Without limitation to any other aspect or description of the present disclosure, an indicator of interest includes any indicator of interest including, without limitation, an indicator of interest from a user or plurality of users or parties related to a transaction and the like (e.g., parties interested in participating in a loan transaction), the recording or storing of such an interest (e.g., a circuit for recording an interest input from a user, entity, circuit, system, and the like), a circuit analyzing interest related data and setting an indicator of interest (e.g., a circuit setting or communicating an indicator based on inputs to the circuit, such as from users, parties, entities, systems, circuits, and the like), a model trained to determine an indicator of interest from input data related to an interest by one of a plurality of inputs from users, parties, or financial entities, and the like. Certain components may not be considered indicators of interest individually, but may be considered an indicator of interest in an aggregated system—for example, a party may seek information relating to a transaction such as though a translation marketplace where the party is interested in seeking information, but that may not be considered an indicator of interest in a transaction. However, when the party asserts a specific interest (e.g., through a user interface with control inputs for indicating interest) the party's interest may be recorded (e.g., in a storage circuit, in a blockchain circuit), analyzed (e.g., through an analysis circuit, a data collection circuit), monitored (e.g., through a monitoring circuit), and the like. In a non-limiting example, indicators of interest may be recorded (e.g., in a blockchain through a distributed ledger) from a set of parties with respect to the product, service, or the like, such as ones that define parameters under which a party is willing to commit to purchase a product or service. In certain embodiments, an indicator of interest may be considered an indicator of interest for some purposes but not for other purposes—for example, a user may indicate an interest for a loan transaction but that does not necessarily mean the user is indicating an interest in providing a type of collateral related to the loan transaction. For instance, a data collection circuit may record an indicator of interest for the transaction but may have a separate circuit structure for determining an indication of interest for collateral. Additionally, in certain embodiments, otherwise similar looking systems may be differentiated in determining whether such system are determining an indication of interest, and/or which type of indicator of interest exists. For example, one circuit or system may collect data from a plurality of parties to determine an indicator of interest in securing a loan and a second circuit or system may collect data from a plurality of parties to determine an indicator of interest in determining ownership rights related to a loan. Accordingly, the benefits of the present disclosure may be applied in a wide variety of systems, and any such systems may be considered an indicator of interest herein, while in certain embodiments a given system may not be considered an indicator of interest herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is an indicator of interest and/or whether aspects of the present disclosure can benefit or enhance the contemplated system include, without limitation parties indicating an interest in participating in a transaction (e.g., a loan transaction), parties indicating an interest in securing in a product or service, recording or storing an indication of interest (e.g., through a storage circuit or blockchain circuit), analyzing an indication of interest (e.g., through a data collection and/or monitoring circuit), and the like.

The term accommodations (and similar terms) as utilized herein should be understood broadly. Without limitation to any other aspect or description of the present disclosure, an accommodation includes any service, activity, event, and the like such as including, without limitation, a room, group of rooms, table, seating, building, event, shared spaces offered by individuals (e.g., Airbnb spaces), bed-and-breakfasts, workspaces, conference rooms, convention spaces, fitness accommodations, health and wellness accommodations, dining accommodations, and the like, in which someone may live, stay, sit, reside, participate, and the like. As such, an accommodation may be purchased (e.g., a ticket through a sports ticketing application), reserved or booked (e.g., a reservation through a hotel reservation application), provided as a reward or gift, traded or exchanged (e.g., through a marketplace), provided as an access right (e.g., offering by way of an aggregation demand), provided based on a contingency (e.g., a reservation for a room being contingent on the availability of a nearby event), and the like. Certain components may not be considered an accommodation individually but may be considered an accommodation in an aggregated system—for example, a resource such as a room in a hotel may not in itself be considered an accommodation but a reservation for the room may be. For instance, a blockchain and smart contract platform for forward market rights for accommodations may provide a mechanism to provide access rights with respect to accommodations. In a non-limiting example, a blockchain circuit may be structured to store access rights in a forward demand market, where the access rights may be stored in a distributed ledger with related shared access to a plurality of actionable entities. In certain embodiments, an accommodation may be considered an accommodation for some purposes but not for other purposes—for example, a reservation for a room may be an accommodation on its own, but may not be accommodation that is satisfied if a related contingency is not met as agreed upon at the time of the e.g. reservation. Additionally, in certain embodiments, otherwise similar looking systems may be differentiated in determining whether such systems are related to an accommodation, and/or which type of accommodation. For example, an accommodation offering may be made based on different systems, such as one where the accommodation offering is determined by a system collecting data related to forward demand and a second one where the accommodation offering is provided as a reward based on a system processing a performance parameter. Accordingly, the benefits of the present disclosure may be applied in a wide variety of systems, and any such systems may be considered as related to an accommodation herein, while in certain embodiments a given system may not be considered related to an accommodation herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is related to accommodation and/or whether aspects of the present disclosure can benefit or enhance the contemplated system include, without limitation accommodations provided as determined through a service circuit, trading or exchanging services (e.g., through an application and/or user interface), as an accommodation offering such as with respect to a combination of products, services, and access rights, processed (e.g., aggregation demand for the offering in a forward market), accommodation through booking in advance, accommodation through booking in advance upon meeting a certain condition (e.g., relating to a price within a given time window), and the like.

The term contingencies (and similar terms) as utilized herein should be understood broadly. Without limitation to any other aspect or description of the present disclosure, a contingency includes any contingency including, without limitation, any action that is dependent upon a second action. For instance, a service may be provided as contingent on a certain parameter value, such as collecting data as condition upon an asset tag indication from an Internet of Things circuit. In another instance, an accommodation such as a hotel reservation may be contingent upon a concert (local to the hotel and at the same time as the reservation) proceeding as scheduled. Certain components may not be considered as relating to a contingency individually, but may be considered related to a contingency in an aggregated system—for example, a data input collected from a data collection service circuit may be stored, analyzed, processed, and the like, and not be considered with respect to a contingency, however a smart contracts service circuit may apply a contract term as being contingent upon the collected data. For instance, the data may indicate a collateral status with respect to a loan transaction, and the smart contracts service circuit may apply that data to a term of contract that depends upon the collateral. In certain embodiments, a contingency may be considered contingency for some purposes but not for other purposes—for example, a delivery of contingent access rights for a future event may be contingent upon a loan condition being satisfied, but the loan condition on its own may not be considered a contingency in the absence of the contingency linkage between the condition and the access rights. Additionally, in certain embodiments, otherwise similar looking systems may be differentiated in determining whether such systems are related to a contingency, and/or which type of contingency. For example, two algorithms may both create a forward market event access right token, but where the first algorithm creates the token free of contingencies and the second algorithm creates a token with a contingency for delivery of the token. Accordingly, the benefits of the present disclosure may be applied in a wide variety of systems, and any such systems may be considered a contingency herein, while in certain embodiments a given system may not be considered a contingency herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a contingency and/or whether aspects of the present disclosure can benefit or enhance the contemplated system include, without limitation a forward market operated within or by the platform may be a contingent forward market, such as one where a future right is vested, is triggered, or emerges based on the occurrence of an event, satisfaction of a condition, or the like; a blockchain used to make a contingent market in any form of event or access token by securely storing access rights on a distributed ledger; setting and monitoring pricing for contingent access rights, underlying access rights, tokens, fees and the like; optimizing offerings, timing, pricing, or the like, to recognize and predict patterns, to establish rules and contingencies; exchanging contingent access rights or underlying access rights or tokens access tokens and/or contingent access tokens; creating a contingent forward market event access right token where a token may be created and stored on a blockchain for contingent access right that could result in the ownership of a ticket; discovery and delivery of contingent access rights to future events; contingencies that influence or represent future demand for an offering, such as including a set of products, services, or the like; pre-defined contingencies; optimized offerings, timing, pricing, or the like, to recognize and predict patterns, to establish rules and contingencies; creation of a contingent future offering within the dashboard; contingent access rights that may result in the ownership of the virtual good or each smart contract to purchase the virtual good if and when it becomes available under defined conditions; and the like.

The term level of service (and similar terms) as utilized herein should be understood broadly. Without limitation to any other aspect or description of the present disclosure, a level of service includes any level of service including, without limitation, any qualitative or quantitative measure of the extent to which a service is provided, such as, and without limitation, a first class vs. business class service (e.g., travel reservation or postal delivery), the degree to which a resource is available (e.g., service level A indicating that the resource is highly available vs. service level C indicating that the resource is constrained, such as in terms of traffic flow restrictions on a roadway), the degree to which an operational parameter is performing (e.g., a system is operating at a high state of service vs a low state of service, and the like. In embodiments, level of service may be multi-modal such that the level of service is variable where a system or circuit provides a service rating (e.g., where the service rating is used as an input to an analytical circuit for determining an outcome based on the service rating). Certain components may not be considered relative to a level of service individually, but may be considered relative to a level of service in an aggregated system—for example a system for monitoring a traffic flow rate may provide data on a current rate but not indicate a level of service, but when the determined traffic flow rate is provided to a monitoring circuit the monitoring circuit may compare the determined traffic flow rate to past traffic flow rates and determine a level of service based on the comparison. In certain embodiments, a level of service may be considered a level of service for some purposes but not for other purposes—for example, the availability of first class travel accommodation may be considered a level of service for determining whether a ticket will be purchased but not to project a future demand for the flight. Additionally, in certain embodiments, otherwise similar looking systems may be differentiated in determining whether such system utilizes a level of service, and/or which type of level of service. For example, an artificial intelligence circuit may be trained on past level of service with respect to traffic flow patterns on a certain freeway and used to predict future traffic flow patterns based on current flow rates, but a similar artificial intelligence circuit may predict future traffic flow patterns based on the time of day. Accordingly, the benefits of the present disclosure may be applied in a wide variety of systems, and any such systems may be considered with respect to levels of service herein, while in certain embodiments a given system may not be considered with respect to levels of service herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a level of service and/or whether aspects of the present disclosure can benefit or enhance the contemplated system include, without limitation transportation or accommodation offerings with predefined contingencies and parameters such as with respect to price, mode of service, and level of service; warranty or guarantee application, transportation marketplace, and the like.

The term payment (and similar terms) as utilized herein should be understood broadly. Without limitation to any other aspect or description of the present disclosure, a payment includes any payment including, without limitation, an action or process of paying (e.g., a payment to a loan) or of being paid (e.g., a payment from insurance), an amount paid or payable (e.g., a payment of $1000 being made), a repayment (e.g., to pay back a loan), a mode of payment (e.g., use of loyalty programs, rewards points, or particular currencies, including cryptocurrencies) and the like. Certain components may not be considered payments individually, but may be considered payments in an aggregated system—for example, submitting an amount of money may not be considered a payment as such, but when applied to a payment to satisfy the requirement of a loan may be considered a payment (or repayment). For instance, a data collection circuit may provide lenders a mechanism to monitor repayments of a loan. In a non-limiting example, the data collection circuit may be structured to monitor the payments of a plurality of loan components with respect to a financial loan contract configured to determine a loan condition for an asset. In certain embodiments, a payment may be considered a payment for some purposes but not for other purposes—for example a payment to a financial entity may be for a repayment amount to pay back the loan, or it may be to satisfy a collateral obligation in a loan default condition. Additionally, in certain embodiments, otherwise similar looking systems may be differentiated in determining whether such system are related to a payment, and/or which type of payment. For example, funds may be applied to reserve an accommodation or to satisfy the delivery of services after the accommodation has been satisfied. Accordingly, the benefits of the present disclosure may be applied in a wide variety of systems, and any such systems may be considered a payment herein, while in certain embodiments a given system may not be considered a payment herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is a payment and/or whether aspects of the present disclosure can benefit or enhance the contemplated system include, without limitation, deferring a required payment; deferring a payment requirement; payment of a loan; a payment amount; a payment schedule; a balloon payment schedule; payment performance and satisfaction; modes of payment; and the like.

The term location (and similar terms) as utilized herein should be understood broadly. Without limitation to any other aspect or description of the present disclosure, a location includes any location including, without limitation, a particular place or position of a person, place, or item, or location information regarding the position of a person, place, or item, such as a geolocation (e.g., geolocation of a collateral), a storage location (e.g., the storage location of an asset), a location of a person (e.g., lender, borrower, worker), location information with respect to the same, and the like. Certain components may not be considered with respect to location individually, but may be considered with respect to location in an aggregated system—for example, a smart contract circuit may be structured to specify a requirement for a collateral to be stored at a fixed location but not specify the specific location for a specific collateral. In certain embodiments, a location may be considered a location for some purposes but not for other purposes—for example, the address location of a borrower may be required for processing a loan in one instance, and a specific location for processing a default condition in another instance. Additionally, in certain embodiments, otherwise similar looking systems may be differentiated in determining whether such system are a location, and/or which type of location. For example, the location of a music concert may be required to be in a concert hall seating 10,000 people in one instance but specify the location of an actual concert hall in another. Accordingly, the benefits of the present disclosure may be applied in a wide variety of systems, and any such systems may be considered with respect to a location herein, while in certain embodiments a given system may not be considered with respect to a location herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is considered with respect to a location and/or whether aspects of the present disclosure can benefit or enhance the contemplated system include, without limitation a geolocation of an item or collateral; a storage location of item or asset; location information; location of a lender or a borrower; location-based product or service targeting application; a location-based fraud detection application; indoor location monitoring systems (e.g., cameras, IR systems, motion-detection systems); locations of workers (including routes taken through a location); location parameters; event location; specific location of an event; and the like.

The term route (and similar terms) as utilized herein should be understood broadly. Without limitation to any other aspect or description of the present disclosure, a route includes any route including, without limitation, a way or course taken in getting from a starting point to a destination, to send or direct along a specified course, and the like. Certain components may not be considered with respect to a route individually, but may be considered a route in an aggregated system—for example a mobile data collector may specify a requirement for a route for collecting data based on an input from a monitoring circuit, but only in receiving that input does the mobile data collector determine what route to take and begin traveling along the route. In certain embodiments, a route may be considered a route for some purposes but not for other purposes—for example possible routes through a road system may be considered differently than specific routes taken through from one location to another location. Additionally, in certain embodiments, otherwise similar looking systems may be differentiated in determining whether such systems are specified with respect to a location, and/or which types of locations. For example, routes depicted on a map may indicate possible routes or actual routes taken by individuals. Accordingly, the benefits of the present disclosure may be applied in a wide variety of systems, and any such systems may be considered with respect to a route herein, while in certain embodiments a given system may not be considered with respect to a route herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is utilizing a route and/or whether aspects of the present disclosure can benefit or enhance the contemplated system include, without limitation delivery routes; routes taken through a location; heat map showing routes traveled by customers or workers within an environment; determining what resources are deployed to what routes or types of travel; direct route or multi-stop route, such as from the destination of the consumer to a specific location or to wherever an event takes place; a route for a mobile data collector; and the like.

The term future offering (and similar terms) as utilized herein should be understood broadly. Without limitation to any other aspect or description of the present disclosure, a future offing includes any offer of an item or service in the future including, without limitation, a future offer to provide an item or service, a future offer with respect to a proposed purchase, a future offering made through a forward market platform, a future offering determined by a smart contract circuit, and the like. Further, a future offering may be a contingent future offer or an offer based on conditions resulting on the offer being a future offering, such as where the future offer is contingent upon or with the conditions imposed by a predetermined condition (e.g., a security may be purchased for $1000 at a set future date contingent upon a predetermined state of a market indicator). Certain components may not be considered a future offering individually, but may be considered a future offering in an aggregated system—for example, an offer for a loan may not be considered a future offering if the offer is not authorized through a collective agreement amongst a plurality of parties related to the offer, but may be considered a future offer once a vote has been collected and stored through a distributed ledger, such as through a blockchain circuit. In certain embodiments, a future offering may be considered a future offering for some purposes but not for other purposes—for example, a future offering may be contingent upon a condition being met in the future, and so the future offering may not be considered a future offer until the condition is met. Additionally, in certain embodiments, otherwise similar looking systems may be differentiated in determining whether such systems are future offerings, and/or which type of future offerings. For example, two security offerings may be determined to be offerings to be made at a future time, however, one may have immediate contingences to be met and thus may not be considered to be a future offering but rather an immediate offering with future declarations. Accordingly, the benefits of the present disclosure may be applied in a wide variety of systems, and any such systems may be considered in association with a future offering herein, while in certain embodiments a given system may not be considered in association with a future offering herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is in association with a future offering and/or whether aspects of the present disclosure can benefit or enhance the contemplated system include, without limitation a forward offering, a contingent forward offering, a forward offing in a forward market platform (e.g., for creating a future offering or contingent future offering associated with identifying offering data from a platform-operated marketplace or external marketplace); a future offering with respect to entering into a smart contract (e.g., by executing an indication of a commitment to purchase, attend, or otherwise consume a future offering), and the like.

The term access right (and derivatives or variations) as utilized herein may be understood broadly to describe an entitlement to acquire or possess a property, article, or other thing of value. A contingent access right may be conditioned upon a trigger or condition being met before such an access right becomes entitled, vested or otherwise defensible. An access right or contingent access right may also serve specific purposes or be configured for different applications or contexts, such as, without limitation, loan-related actions or any service or offering. Without limitation, notices may be required to be provided to the owner of a property, article or item of value before such access rights or contingent access rights are exercised. Access rights and contingent access rights in various forms may be included where discussing a legal action, a delinquent or defaulted loan or agreement, or other circumstances where a lender may be seeking remedy, without limitation. One of skill in the art, having the benefit of the disclosure herein and knowledge ordinarily available about a contemplated system, can readily determine the value of such rights implemented in an embodiment. While specific examples of access rights and contingent access rights are described herein for purposes of illustration, any embodiment benefitting from the disclosures herein, and any considerations understood to one of skill in the art having the benefit of the disclosures herein, are specifically contemplated within the scope of the present disclosure.

The term smart contract (and other forms or variations) as utilized herein may be understood broadly to describe a method, system, connected resource or wide area network offering one or more resources useful to assist or perform actions, tasks or things by embodiments disclosed herein. A smart contract may be a set of steps or a process to negotiate, administrate, restructure or implement an agreement or loan between parties. A smart contract may also be implemented as an application, website, FTP site, server, appliance or other connected component or Internet related system that renders resources to negotiate, administrate, restructure or implement an agreement or loan between parties. A smart contract may be a self-contained system, or may be part of a larger system or component that may also be a smart contract. For example, a smart contract may refer to a loan or an agreement itself, conditions or terms, or may refer to a system to implement such a loan or agreement. In certain embodiments, a smart contract circuit or robotic process automation system may incorporate or be incorporated into automatic robotic process automation system to perform one or more purposes or tasks, whether part of a loan or transaction process, or otherwise. One of skill in the art, having the benefit of the disclosure herein and knowledge ordinarily available about a contemplated system can readily determine the purposes and use of this term as it relates to a smart contract in various forms, embodiments and contexts disclosed herein.

The term allocation of reward (and variations) as utilized herein may be understood broadly to describe a thing or consideration allocated or provided as consideration, or provided for a purpose. The allocation of rewards can be of a financial type, or non-financial type, without limitation. A specific type of allocation of reward may also serve a number of different purposes or be configured for different applications or contexts, such as, without limitation: a reward event, claims for rewards, monetary rewards, rewards captured as a data set, rewards points, and other forms of rewards. Thus an allocation of rewards may be provided as a consideration within the context of a loan or agreement. Systems may be utilized to allocate rewards. The allocation of rewards in various forms may be included where discussing a particular behavior, or encouragement of a particular behavior, without limitation. An allocation of a reward may include an actual dispensation of the award, and/or a recordation of the reward. The allocation of rewards may be performed by a smart contract circuit or a robotic processing automation system. One of skill in the art, having the benefit of the disclosure herein and knowledge ordinarily available about a contemplated system, can readily determine the value of the allocation of rewards in an embodiment. While specific examples of the allocation of rewards are described herein for purposes of illustration, any embodiment benefitting from the disclosures herein, and any considerations understood to one of skill in the art having the benefit of the disclosures herein, are specifically contemplated within the scope of the present disclosure.

The term satisfaction of parameters or conditions (and other derivatives, forms or variations) as utilized herein may be understood broadly to describe completion, presence or proof of parameters or conditions that have been met. The term generally may relate to a process of determining such satisfaction of parameters or conditions, or may relate to the completion of such a process with a result, without limitation. Satisfaction may result in a successful outcome of other triggers or conditions or terms that may come into execution, without limitation. Satisfaction of parameters or conditions may occur in many different contexts of contracts or loans, such as lending, refinancing, consolidation, factoring, brokering, foreclosure, and data processing (e.g. data collection), or combinations thereof, without limitation. Satisfaction of parameters or conditions may be used in the form of a noun (e.g. the satisfaction of the debt repayment), or may be used in a verb form to describe the process of determining a result to parameters or conditions. For example, a borrower may have satisfaction of parameters by making a certain number of payments on time, or may cause satisfaction of a condition allowing access rights to an owner if a loan defaults, without limitation. In certain embodiments, a smart contract or robotic process automation system may perform or determine satisfaction of parameters or conditions for one or more of the parties and process appropriate tasks for satisfaction of parameters or conditions. In some cases satisfaction of parameters or conditions by the smart contract or robotic process automation system may not complete or be successful, and depending upon such outcomes, this may enable automated action or trigger other conditions or terms. One of skill in the art, having the benefit of the disclosure herein and knowledge ordinarily available about a contemplated system can readily determine the purposes and use of this term in various forms, embodiments and contexts disclosed herein.

The term information (and other forms such as info or informational, without limitation) as utilized herein may be understood broadly in a variety of contexts with respect to an agreement or a loan. The term generally may relate to a large context, such as information regarding an agreement or loan, or may specifically relate to a finite piece of information (e.g. a specific detail of an event that happened on a specific date). Thus, information may occur in many different contexts of contracts or loans, and may be used in the contexts, without limitation of evidence, transactions, access, and the like. Or, without limitation, information may be used in conjunction with stages of an agreement or transaction, such as lending, refinancing, consolidation, factoring, brokering, foreclosure, and information processing (e.g. data or information collection), or combinations thereof. For example, information as evidence, transaction, access, etc. may be used in the form of a noun (e.g. the information was acquired from the borrower), or may refer as a noun to an assortment of informational items (e.g. the information about the loan may be found in the smart contract), or may be used in the form of characterizing as an adjective (e.g. the borrower was providing an information submission). For example, a lender may collect an overdue payment from a borrower through an online payment, or may have a successful collection of overdue payments acquired through a customer service telephone call. In certain embodiments, a smart contract circuit or robotic process automation system may perform collection, administration, calculating, providing, or other tasks for one or more of the parties and process appropriate tasks relating to information (e.g. providing notice of an overdue payment). In some cases information by the smart contract circuit or robotic process automation system may be incomplete, and depending upon such outcomes this may enable automated action or trigger other conditions or terms. One of skill in the art, having the benefit of the disclosure herein and knowledge ordinarily available about a contemplated system can readily determine the purposes and use of information as evidence, transaction, access, etc. in various forms, embodiments and contexts disclosed herein.

Information may be linked to external information (e.g. external sources). The term more specifically may relate to the acquisition, parsing, receiving, or other relation to an external origin or source, without limitation. Thus, information linked to external information or sources may be used in conjunction with stages of an agreement or transaction, such as lending, refinancing, consolidation, factoring, brokering, foreclosure, and information processing (e.g. data or information collection), or combinations thereof. For example, information linked to external information may change as the external information changes, such as a borrower's credit score, which is based on an external source. In certain embodiments, a smart contract circuit or robotic process automation system may perform acquisition, administration, calculating, receiving, updating, providing or other tasks for one or more of the parties and process appropriate tasks relating to information that is linked to external information. In some cases information that is linked to external information by the smart contract or robotic process automation system may be incomplete, and depending upon such outcomes this may enable automated action or trigger other conditions or terms. One of skill in the art, having the benefit of the disclosure herein and knowledge ordinarily available about a contemplated system can readily determine the purposes and use of this term in various forms, embodiments and contexts disclosed herein.

Information that is a part of a loan or agreement may be separated from information presented in an access location. The term more specifically may relate to the characterization that information can be apportioned, split, restricted, or otherwise separated from other information within the context of a loan or agreement. Thus, information presented or received on an access location may not necessarily be the whole information available for a given context. For example, information provided to a borrower may be different information received by a lender from an external source, and may be different than information received or presented from an access location. In certain embodiments, a smart contract circuit or robotic process automation system may perform separation of information or other tasks for one or more of the parties and process appropriate tasks. One of skill in the art, having the benefit of the disclosure herein and knowledge ordinarily available about a contemplated system, can readily determine the purposes and use of this term in various forms, embodiments and contexts disclosed herein.

The term encryption of information and control of access (and other related terms) as utilized herein may be understood broadly to describe generally whether a party or parties may observe or possess certain information, actions, events or activities relating to a transaction or loan. Encryption of information may be utilized to prevent a party from accessing, observing or receiving information, or may alternatively be used to prevent parties outside the transaction or loan from being able to access, observe or receive confidential (or other) information. Control of access to information relates to the determination of whether a party is entitled to such access of information. Encryption of information or control of access may occur in many different contexts of loans, such as lending, refinancing, consolidation, factoring, brokering, foreclosure, administration, negotiating, collecting, procuring, enforcing, and data processing (e.g., data collection), or combinations thereof, without limitation. An encryption of information or control of access to information may refer to a single instance, or may characterize a larger amount of information, actions, events or activities, without limitation. For example, a borrower or lender may have access to information about a loan, but other parties outside the loan or agreement may not be able to access the loan information due to encryption of the information, or a control of access to the loan details. In certain embodiments, a smart contract circuit or robotic process automation system may perform encryption of information or control of access to information for one or more of the parties and process appropriate tasks for encryption or control of access of information. One of skill in the art, having the benefit of the disclosure herein and knowledge ordinarily available about a contemplated system can readily determine the purposes and use of this term in various forms, embodiments and contexts disclosed herein.

The term potential access party list (and other related terms) as utilized herein may be understood broadly to describe generally whether a party or parties may observe or possess certain information, actions, events or activities relating to a transaction or loan. A potential access party list may be utilized to authorize one or more parties to access, observe or receive information, or may alternatively be used to prevent parties from being able to do so. A potential access party list information relates to the determination of whether a party (either on the potential access party list or not on the list) is entitled to such access of information. A potential access party list may occur in many different contexts of loans, such as lending, refinancing, consolidation, factoring, brokering, foreclosure, administration, negotiating, collecting, procuring, enforcing and data processing (e.g. data collection), or combinations thereof, without limitation. A potential access party list may refer to a single instance, or may characterize a larger amount of parties or information, actions, events or activities, without limitation. For example, a potential access party list may grant (or deny) access to information about a loan, but other parties outside potential access party list may not be able to (or may be granted) access the loan information. In certain embodiments, a smart contract circuit or robotic process automation system may perform administration or enforcement of a potential access party list for one or more of the parties and process appropriate tasks for encryption or control of access of information. One of skill in the art, having the benefit of the disclosure herein and knowledge ordinarily available about a contemplated system can readily determine the purposes and use of this term in various forms, embodiments and contexts disclosed herein.

The term offering, making an offer, and similar terms as utilized herein should be understood broadly. Without limitation to any other aspect or description of the present disclosure, an offering includes any offer of an item or service including, without limitation, an insurance offering, a security offering, an offer to provide an item or service, an offer with respect to a proposed purchase, an offering made through a forward market platform, a future offering, a contingent offering, offers related to lending (e.g. lending, refinancing, collection, consolidation, factoring, brokering, foreclosure), an offering determined by a smart contract circuit, an offer directed to a customer/debtor, an offering directed to a provider/lender, a 3rd party offer (e.g. regulator, auditor, partial owner, tiered provider) and the like. Offerings may include physical goods, virtual goods, software, physical services, access rights, entertainment content, accommodations, or many other items, services, solutions, or considerations. In an example, a third party offer may be to schedule a band instead of just an offer of tickets for sale. Further, an offer may be based on pre-determined conditions or contingencies. Certain components may not be considered an offering individually, but may be considered an offering in an aggregated system—for example, an offer for insurance may not be considered an offering if the offer is not approved by one or more parties related to the offer, however once approval has been granted, it may be considered an offer. Accordingly, the benefits of the present disclosure may be applied in a wide variety of systems, and any such systems may be considered in association with an offering herein, while in certain embodiments a given system may not be considered in association with an offering herein. One of skill in the art, having the benefit of the disclosure herein and knowledge about a contemplated system ordinarily available to that person, can readily determine which aspects of the present disclosure will benefit a particular system, and/or how to combine processes and systems from the present disclosure to enhance operations of the contemplated system. Certain considerations for the person of skill in the art, in determining whether a contemplated system is in association with an offering and/or whether aspects of the present disclosure can benefit or enhance the contemplated system include, without limitation the item or service being offered, a contingency related to the offer, a way of tracking if a contingency or condition has been met, an approval of the offering, an execution of an exchange of consideration for the offering, and the like.

The term artificial intelligence (AI) solution should be understood broadly. Without limitation to any other aspect of the present disclosure, an AI solution includes a coordinated group of AI related aspects to perform one or more tasks or operations as set forth throughout the present disclosure. An example AI solution includes one or more AI components, including any AI components set forth herein, including at least a neural network, an expert system, and/or a machine learning component. The example AI solution may include as an aspect the types of components of the solution, such as a heuristic AI component, a model based AI component, a neural network of a selected type (e.g., recursive, convolutional, perceptron, etc.), and/or an AI component of any type having a selected processing capability (e.g., signal processing, frequency component analysis, auditory processing, visual processing, speech processing, text recognition, etc.). Without limitation to any other aspect of the present disclosure, a given AI solution may be formed from the number and type of AI components of the AI solution, the connectivity of the AI components (e.g., to each other, to inputs from a system including or interacting with the AI solution, and/or to outputs to the system including or interacting with the AI solution). The given AI solution may additionally be formed from the connection of the AI components to each other within the AI solution, and to boundary elements (e.g., inputs, outputs, stored intermediary data, etc.) in communication with the AI solution. The given AI solution may additionally be formed from a configuration of each of the AI components of the AI solution, where the configuration may include aspects such as: model calibrations for an AI component; connectivity and/or flow between AI components (e.g., serial and/or parallel coupling, feedback loops, logic junctions, etc.); the number, selected input data, and/or input data processing of inputs to an AI component; a depth and/or complexity of a neural network or other components; a training data description of an AI component (e.g., training data parameters such as content, amount of training data, statistical description of valid training data, etc.); and/or a selection and/or hybrid description of a type for an AI component. An AI solution includes a selection of AI elements, flow connectivity of those AI elements, and/or configuration of those AI elements.

One of skill in the art, having the benefit of the present disclosure, can readily determine an AI solution for a given system, and/or configure operations to perform a selection and/or configuration operation for an AI solution for a given system. Certain considerations to determining an AI solution, and/or configuring operations to perform a selection and/or configuration operation for an AI solution include, without limitation: an availability of AI components and/or component types for a given implementation; an availability of supporting infrastructure to implement given AI components (e.g., data input values available, including data quality, level of service, resolution, sampling rate, etc.; availability of suitable training data for a given AI solution; availability of expert inputs, such as for an expert system and/or to develop a model training data set; regulatory and/or policy based considerations including permitted action by the AI solution, requirements for acquisition and/or retention of sensitive data, difficult to obtain data, and/or expensive data); operational considerations for a system including or interacting with the AI solution, including response time specifications, safety considerations, liability considerations, etc.; available computing resources such as processing capability, network communication capability, and/or memory storage capability (e.g., to support initial data, training data, input data such as cached, buffered, or stored input data, iterative improvement state data, output data such as cached, buffered, or stored output data, and/or intermediate data storage, such as data to support ongoing calculations, historical data, and/or accumulation data); the types of tasks to be performed by the AI solution, and the suitability of AI components for those tasks, sensitivity of AI components performing the tasks (e.g., variability of the output space relative to a disturbance size of the input space); the interactions of AI components within the entire AI solution (e.g., a low capability rationality AI component may be coupled with a higher capability AI component that may provide high sensitivity and/or unbounded response to inputs); and/or model implementation considerations (e.g., requirements to re-calibrate, aging constraints of a model, etc.).

A selected and/or configured AI solution may be utilized with any of the systems, procedures, and/or aspects of embodiments as set forth throughout the present disclosure. For example, a system utilizing an expert system may include the expert system as all or a part of a selected, configured AI solution. In another example, a system utilizing a neural network, and/or a combination of neural networks, may include the neural network(s) as all or a part of a selected, configured AI solution. The described aspects of an AI solution, including the selection and configuration of the AI solution, are non-limiting illustrations.

Figure 1:
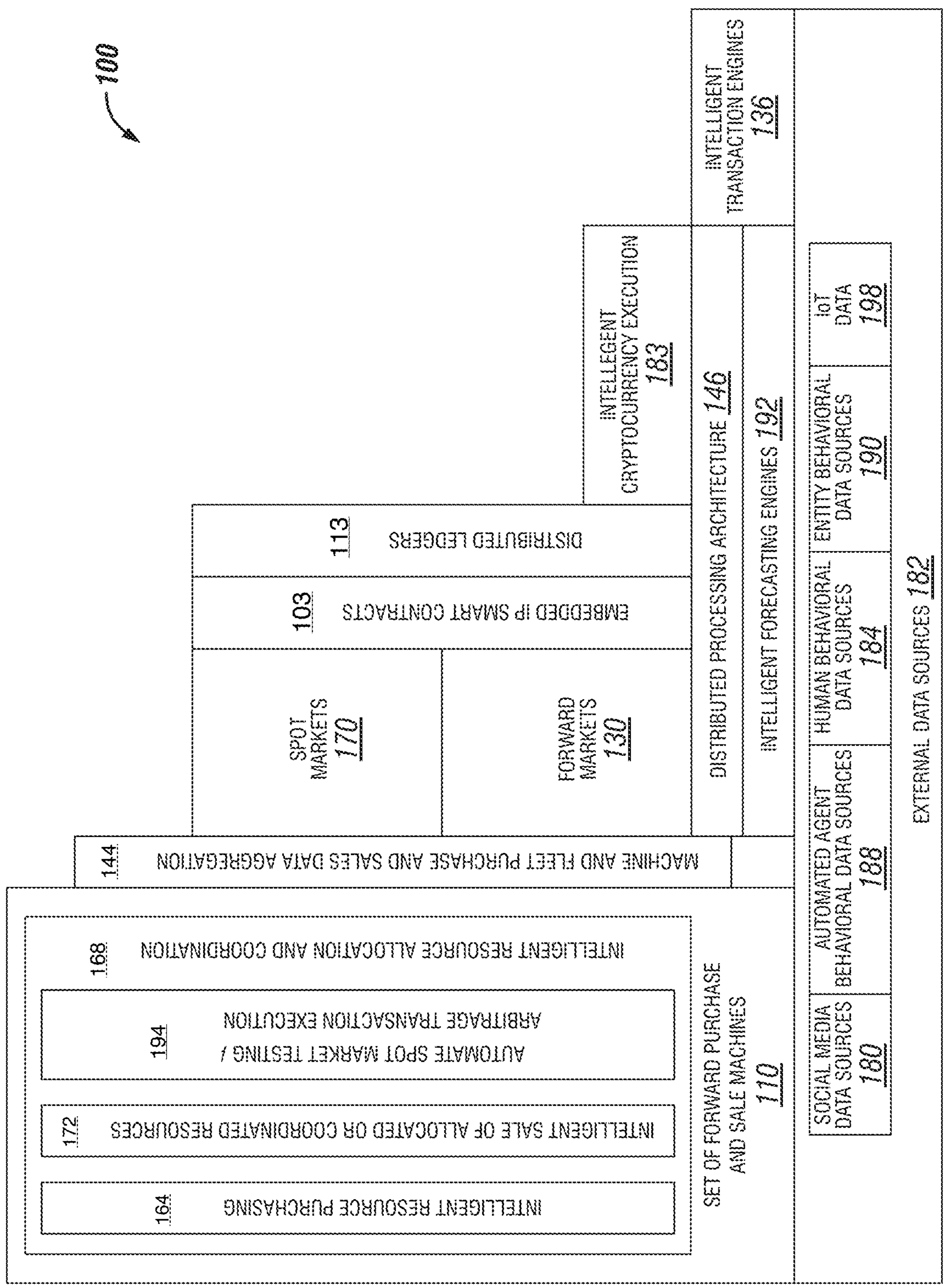
FIG. 1 is a schematic diagram of components of a platform for enabling intelligent transactions in accordance with embodiments of the present disclosure.

Referring to FIG. 1, a set of systems, methods, components, modules, machines, articles, blocks, circuits, services, programs, applications, hardware, software and other elements are provided, collectively referred to herein interchangeably as the system 100 or the platform 100, The platform 100 enables a wide range of improvements of and for various machines, systems, and other components that enable transactions involving the exchange of value (such as using currency, cryptocurrency, tokens, rewards or the like, as well as a wide range of in-kind and other resources) in various markets, including current or spot markets 170, forward markets 130 and the like, for various goods, services, and resources. As used herein, "currency" should be understood to encompass fiat currency issued or regulated by governments, cryptocurrencies, tokens of value, tickets, loyalty points, rewards points, coupons, and other elements that represent or may be exchanged for value. Resources, such as ones that may be exchanged for value in a marketplace, should be understood to encompass goods, services, natural resources, energy resources, computing resources, energy storage resources, data storage resources, network bandwidth resources, processing resources and the like, including resources for which value is exchanged and resources that enable a transaction to occur (such as necessary computing and processing resources, storage resources, network resources, and energy resources that enable a transaction). The platform 100 may include a set of forward purchase and sale machines 110, each of which may be configured as an expert system or automated intelligent agent for interaction with one or more of the set of spot markets 170 and forward markets 130. Enabling the set of forward purchase and sale machines 110 are an intelligent resource purchasing system 164 having a set of intelligent agents for purchasing resources in spot and forward markets; an intelligent resource allocation and coordination system 168 for the intelligent sale of allocated or coordinated resources, such as compute resources, energy resources, and other resources involved in or enabling a transaction; an intelligent sale engine 172 for intelligent coordination of a sale of allocated resources in spot and futures markets; and an automated spot market testing and arbitrage transaction execution engine 194 for performing spot testing of spot and forward markets, such as with micro-transactions and, where conditions indicate favorable arbitrage conditions, automatically executing transactions in resources that take advantage of the favorable conditions. Each of the engines may use model-based or rule-based expert systems, such as based on rules or heuristics, as well as deep learning systems by which rules or heuristics may be learned over trials involving a large set of inputs. The engines may use any of the expert systems and artificial intelligence capabilities described throughout this disclosure. Interactions within the platform 100, including of all platform components, and of interactions among them and with various markets, may be tracked and collected, such as by a data aggregation system 144, such as for aggregating data on purchases and sales in various marketplaces by the set of machines described herein. Aggregated data may include tracking and outcome data that may be fed to artificial intelligence and machine learning systems, such as to train or supervise the same. The various engines may operate on a range of data sources, including aggregated data from marketplace transactions, tracking data regarding the behavior of each of the engines, and a set of external data sources 182, which may include social media data sources 180 (such as social networking sites like Facebook™ and Twitter™), Internet of Things (IoT) data sources (including from sensors, cameras, data collectors, and instrumented machines and systems), such as IoT sources that provide information about machines and systems that enable transactions and machines and systems that are involved in production and consumption of resources. External data sources 182 may include behavioral data sources, such as automated agent behavioral data sources 188 (such as tracking and reporting on behavior of automated agents that are used for conversation and dialog management, agents used for control functions for machines and systems, agents used for purchasing and sales, agents used for data collection, agents used for advertising, and others), human behavioral data sources (such as data sources tracking online behavior, mobility behavior, energy consumption behavior, energy production behavior, network utilization behavior, compute and processing behavior, resource consumption behavior, resource production behavior, purchasing behavior, attention behavior, social behavior, and others), and entity behavioral data sources 190 (such as behavior of business organizations and other entities, such as purchasing behavior, consumption behavior, production behavior, market activity, merger and acquisition behavior, transaction behavior, location behavior, and others). The IoT, social and behavioral data from and about sensors, machines, humans, entities, and automated agents may collectively be used to populate expert systems, machine learning systems, and other intelligent systems and engines described throughout this disclosure, such as being provided as inputs to deep learning systems and being provided as feedback or outcomes for purposes of training, supervision, and iterative improvement of systems for prediction, forecasting, classification, automation and control. The data may be organized as a stream of events. The data may be stored in a distributed ledger or other distributed system. The data may be stored in a knowledge graph where nodes represent entities and links represent relationships. The external data sources may be queried via various database query functions. The data sources 182 may be accessed via APIs, brokers, connectors, protocols like REST and SOAP, and other data ingestion and extraction techniques. Data may be enriched with metadata and may be subject to transformation and loading into suitable forms for consumption by the engines, such as by cleansing, normalization, de-duplication and the like.

The platform 100 may include a set of intelligent forecasting engines 192 for forecasting events, activities, variables, and parameters of spot markets 170, forward markets 130, resources that are traded in such markets, resources that enable such markets, behaviors (such as any of those tracked in the external data sources 182), transactions, and the like. The forecasting engines 192 may operate on data from the data aggregation system 144 about elements of the platform 100 and on data from the external data sources 182. The platform may include a set of intelligent transaction engines 136 for automatically executing transactions in spot markets 170 and forward markets 130. This may include executing intelligent cryptocurrency transactions with an intelligent cryptocurrency execution engine 183 as described in more detail below. The platform 100 may make use of asset of improved distributed ledgers 113 and improved smart contracts 103, including ones that embed and operate on proprietary information, instruction sets and the like that enable complex transactions to occur among individuals with reduced (or without) reliance on intermediaries. These and other components are described in more detail throughout this disclosure.

Figure 2A:
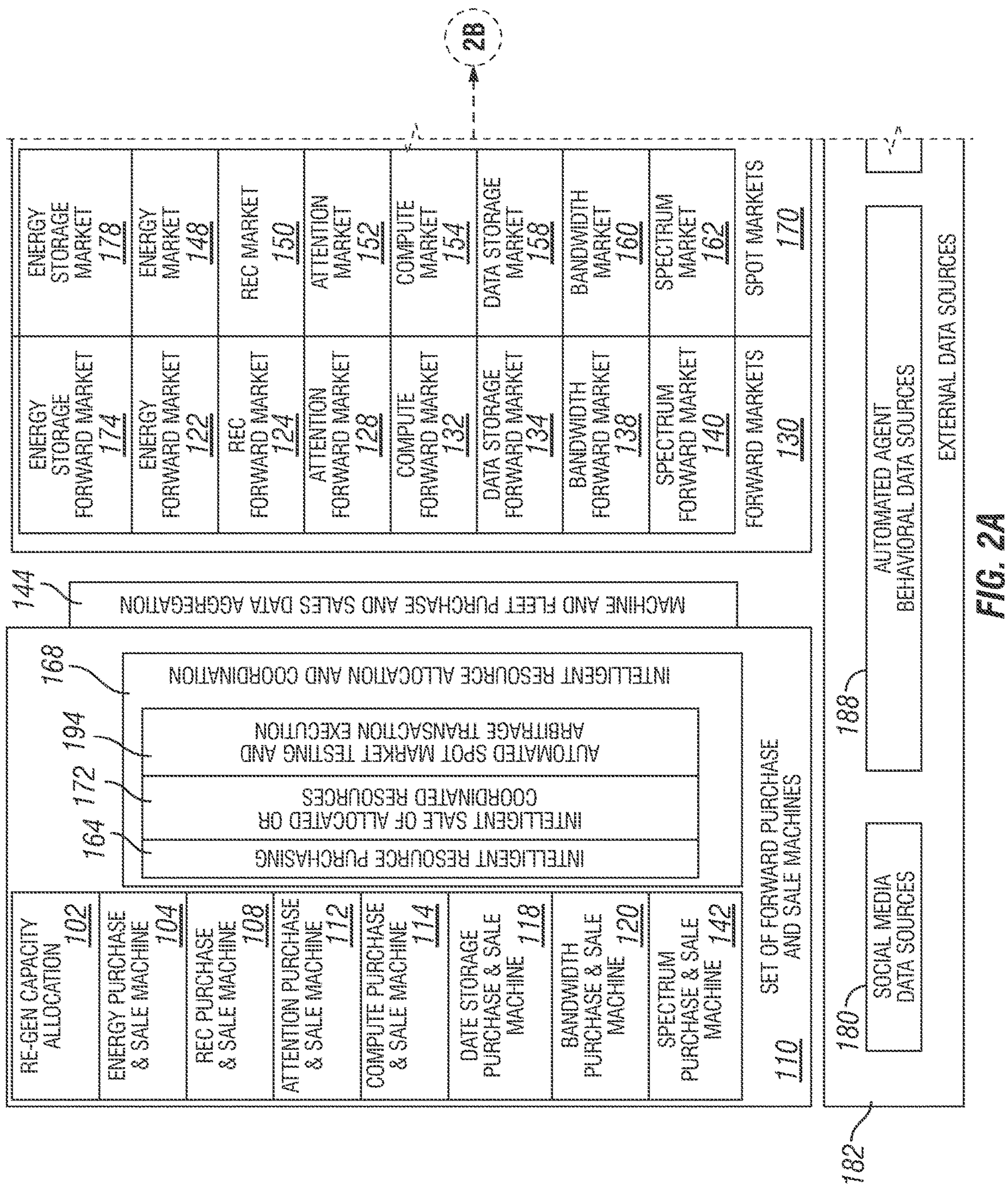
FIGS. 2A and 2B are schematic diagrams of additional components of a platform for enabling intelligent transactions in accordance with embodiments of the present disclosure.
Figure 2B:
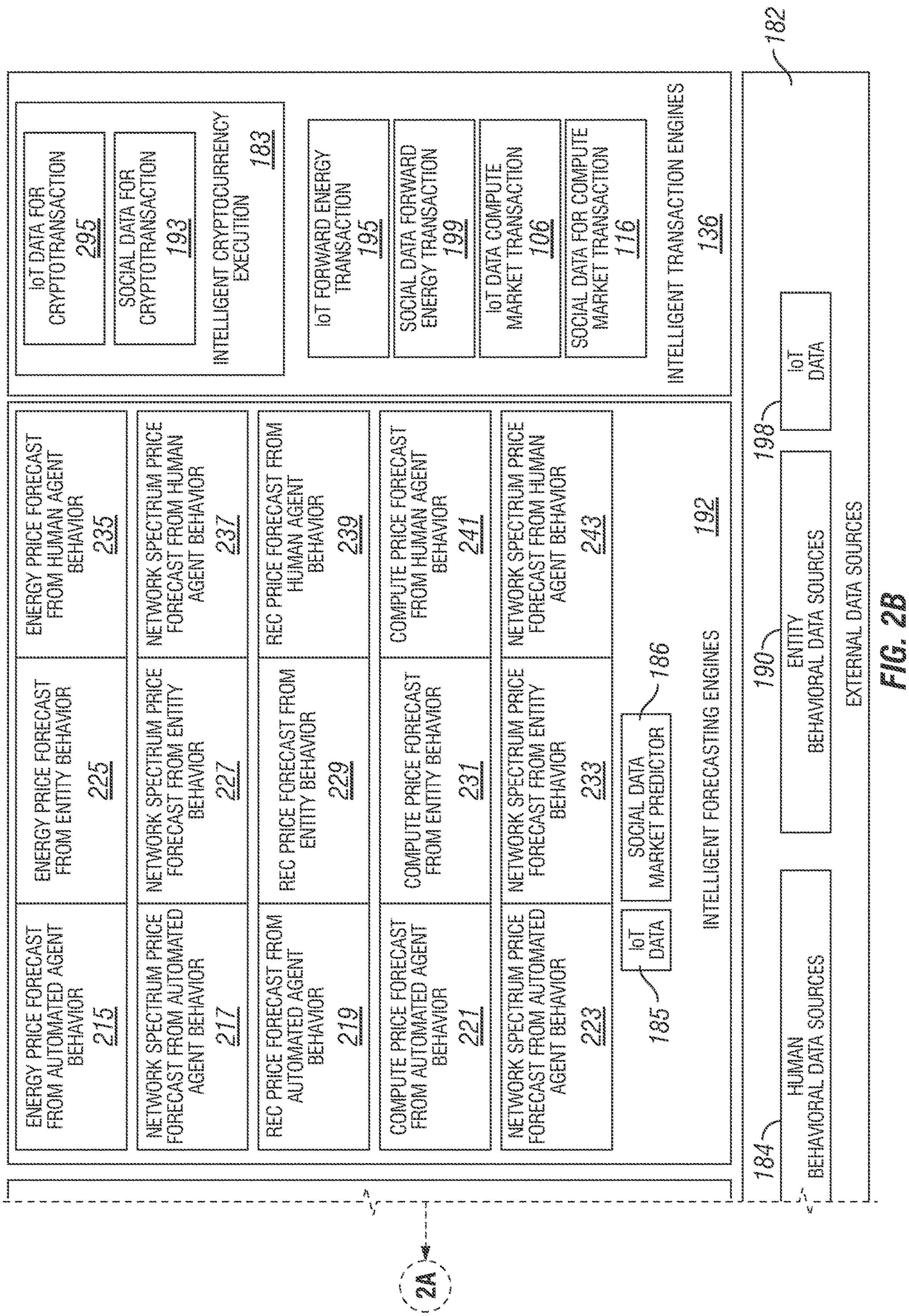

Referring to the block diagram of FIG. 2, further details and additional components of the platform 100 and interactions among them are depicted. The set of forward purchase and sale machines 110 may include a regeneration capacity allocation engine 102 (such as for allocating energy generation or regeneration capacity, such as within a hybrid vehicle or system that includes energy generation or regeneration capacity, a renewable energy system that has energy storage, or other energy storage system, where energy is allocated for one or more of sale on a forward market 130, sale in a spot market 170, use in completing a transaction (e.g., mining for cryptocurrency), or other purposes. For example, the regeneration capacity allocation engine 102 may explore available options for use of stored energy, such as sale in current and forward energy markets that accept energy from producers, keeping the energy in storage for future use, or using the energy for work (which may include processing work, such as processing activities of the platform like data collection or processing, or processing work for executing transactions, including mining activities for cryptocurrencies).

The set of forward purchase and sale machines 110 may include an energy purchase and sale machine 104 for purchasing or selling energy, such as in an energy spot market 148 or an energy forward market 122. The energy purchase and sale machine 104 may use an expert system, neural network or other intelligence to determine timing of purchases, such as based on current and anticipated state information with respect to pricing and availability of energy and based on current and anticipated state information with respect to needs for energy, including needs for energy to perform computing tasks, cryptocurrency mining, data collection actions, and other work, such as work done by automated agents and systems and work required for humans or entities based on their behavior. For example, the energy purchase machine may recognize, by machine learning, that a business is likely to require a block of energy in order to perform an increased level of manufacturing based on an increase in orders or market demand and may purchase the energy at a favorable price on a futures market, based on a combination of energy market data and entity behavioral data. Continuing the example, market demand may be understood by machine learning, such as by processing human behavioral data sources 184, such as social media posts, e-commerce data and the like that indicate increasing demand. The energy purchase and sale machine 104 may sell energy in the energy spot market 148 or the energy forward market 122. Sale may also be conducted by an expert system operating on the various data sources described herein, including with training on outcomes and human supervision.

The set of forward purchase and sale machines 110 may include a renewable energy credit (REC) purchase and sale machine 108, which may purchase renewable energy credits, pollution credits, and other environmental or regulatory credits in a spot market 150 or forward market 124 for such credits. Purchasing may be configured and managed by an expert system operating on any of the external data sources 182 or on data aggregated by the set of data aggregations systems 144 for the platform. Renewable energy credits and other credits may be purchased by an automated system using an expert system, including machine learning or other artificial intelligence, such as where credits are purchased with favorable timing based on an understanding of supply and demand that is determined by processing inputs from the data sources. The expert system may be trained on a data set of outcomes from purchases under historical input conditions. The expert system may be trained on a data set of human purchase decisions and/or may be supervised by one or more human operators. The renewable energy credit (REC) purchase and sale machine 108 may also sell renewable energy credits, pollution credits, and other environmental or regulatory credits in a spot market 150 or forward market 124 for such credits. Sale may also be conducted by an expert system operating on the various data sources described herein, including with training on outcomes and human supervision.

The set of forward purchase and sale machines 110 may include an attention purchase and sale machine 112, which may purchase one or more attention-related resources, such as advertising space, search listing, keyword listing, banner advertisements, participation in a panel or survey activity, participation in a trial or pilot, or the like in a spot market for attention 152 or a forward market for attention 128. Attention resources may include the attention of automated agents, such as bots, crawlers, dialog managers, and the like that are used for searching, shopping and purchasing. Purchasing of attention resources may be configured and managed by an expert system operating on any of the external data sources 182 or on data aggregated by the set of data aggregations systems 144 for the platform. Attention resources may be purchased by an automated system using an expert system, including machine learning or other artificial intelligence, such as where resources are purchased with favorable timing, such as based on an understanding of supply and demand, that is determined by processing inputs from the various data sources. For example, the attention purchase machine 112 may purchase advertising space in a forward market for advertising based on learning from a wide range of inputs about market conditions, behavior data, and data regarding activities of agent and systems within the platform 100. The expert system may be trained on a data set of outcomes from purchases under historical input conditions. The expert system may be trained on a data set of human purchase decisions and/or may be supervised by one or more human operators. The attention purchase and sale machine 112 may also sell one or more attention-related resources, such as advertising space, search listing, keyword listing, banner advertisements, participation in a panel or survey activity, participation in a trial or pilot, or the like in a spot market for attention 152 or a forward market for attention 128, which may include offering or selling access to, or attention or, one or more automated agents of the platform 100. Sale may also be conducted by an expert system operating on the various data sources described herein, including with training on outcomes and human supervision.

The set of forward purchase and sale machines 110 may include a compute purchase and sale machine 114, which may purchase one or more computation-related resources, such as processing resources, database resources, computation resources, server resources, disk resources, input/output resources, temporary storage resources, memory resources, virtual machine resources, container resources, and others in a spot market for compute 154 or a forward market for compute 132. Purchasing of compute resources may be configured and managed by an expert system operating on any of the external data sources 182 or on data aggregated by the set of data aggregations systems 144 for the platform. Compute resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase machine 114 may purchase or reserve compute resources on a cloud platform in a forward market for compute resources based on learning from a wide range of inputs about market conditions, behavior data, and data regarding activities of agent and systems within the platform 100, such as to obtain such resources at favorable prices during surge periods of demand for computing. The expert system may be trained on a data set of outcomes from purchases under historical input conditions. The expert system may be trained on a data set of human purchase decisions and/or may be supervised by one or more human operators. The compute purchase and sale machine 114 may also sell one or more computation-related resources that are connected to, part of, or managed by the platform 100, such as processing resources, database resources, computation resources, server resources, disk resources, input/output resources, temporary storage resources, memory resources, virtual machine resources, container resources, and others in a spot market for compute 154 or a forward market for compute 132. Sale may also be conducted by an expert system operating on the various data sources described herein, including with training on outcomes and human supervision.

The set of forward purchase and sale machines 110 may include a data storage purchase and sale machine 118, which may purchase one or more data-related resources, such as database resources, disk resources, server resources, memory resources, RAM resources, network attached storage resources, storage attached network (SAN) resources, tape resources, time-based data access resources, virtual machine resources, container resources, and others in a spot market for storage 158 or a forward market for data storage 134. Purchasing of data storage resources may be configured and managed by an expert system operating on any of the external data sources 182 or on data aggregated by the set of data aggregations systems 144 for the platform. Data storage resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase machine 114 may purchase or reserve compute resources on a cloud platform in a forward market for compute resources based on learning from a wide range of inputs about market conditions, behavior data, and data regarding activities of agent and systems within the platform 100, such as to obtain such resources at favorable prices during surge periods of demand for storage. The expert system may be trained on a data set of outcomes from purchases under historical input conditions. The expert system may be trained on a data set of human purchase decisions and/or may be supervised by one or more human operators. The data storage purchase and sale machine 118 may also sell one or more data storage-related resources that are connected to, part of, or managed by the platform 100 in a spot market for storage resources 158 or a forward market for storage 134. Sale may also be conducted by an expert system operating on the various data sources described herein, including with training on outcomes and human supervision.

The set of forward purchase and sale machines 110 may include a bandwidth purchase and sale machine 120, which may purchase one or more bandwidth-related resources, such as cellular bandwidth, Wi-Fi bandwidth, radio bandwidth, access point bandwidth, beacon bandwidth, local area network bandwidth, wide area network bandwidth, enterprise network bandwidth, server bandwidth, storage input/output bandwidth, advertising network bandwidth, market bandwidth, or other bandwidth, in a spot market for bandwidth 160 or a forward market for bandwidth 138. Purchasing of bandwidth resources may be configured and managed by an expert system operating on any of the external data sources 182 or on data aggregated by the set of data aggregations systems 144 for the platform. Bandwidth resources may be purchased by an automated system using an expert system, including machine learning or other artificial intelligence, such as where resources are purchased with favorable timing, such as based on an understanding of supply and demand, that is determined by processing inputs from the various data sources. For example, the bandwidth purchase and sale machine 120 may purchase or reserve bandwidth on a network resource for a future networking activity managed by the platform based on learning from a wide range of inputs about market conditions, behavior data, and data regarding activities of agent and systems within the platform 100, such as to obtain such resources at favorable prices during surge periods of demand for bandwidth. The expert system may be trained on a data set of outcomes from purchases under historical input conditions. The expert system may be trained on a data set of human purchase decisions and/or may be supervised by one or more human operators. The bandwidth purchase and sale machine 120 may also sell one or more bandwidth-related resources that are connected to, part of, or managed by the platform 100 in a spot market for bandwidth resources 160 or a forward market for bandwidth 138. Sale may also be conducted by an expert system operating on the various data sources described herein, including with training on outcomes and human supervision.

The set of forward purchase and sale machines 110 may include a spectrum purchase and sale machine 142, which may purchase one or more spectrum-related resources, such as cellular spectrum, 3G spectrum, 4G spectrum, LTE spectrum, 5G spectrum, cognitive radio spectrum, peer-to-peer network spectrum, emergency responder spectrum and the like in a spot market for spectrum 162 or a forward market for spectrum 140. Purchasing of spectrum resources may be configured and managed by an expert system operating on any of the external data sources 182 or on data aggregated by the set of data aggregations systems 144 for the platform. Spectrum resources may be purchased by an automated system using an expert system, including machine learning or other artificial intelligence, such as where resources are purchased with favorable timing, such as based on an understanding of supply and demand, that is determined by processing inputs from the various data sources. For example, the spectrum purchase and sale machine 142 may purchase or reserve spectrum on a network resource for a future networking activity managed by the platform based on learning from a wide range of inputs about market conditions, behavior data, and data regarding activities of agent and systems within the platform 100, such as to obtain such resources at favorable prices during surge periods of demand for spectrum. The expert system may be trained on a data set of outcomes from purchases under historical input conditions. The expert system may be trained on a data set of human purchase decisions and/or may be supervised by one or more human operators. The spectrum purchase and sale machine 142 may also sell one or more spectrum-related resources that are connected to, part of, or managed by the platform 100 in a spot market for spectrum resources 162 or a forward market for bandwidth 140. Sale may also be conducted by an expert system operating on the various data sources described herein, including with training on outcomes and human supervision.

In embodiments, the intelligent resource coordination and allocation engine 168, including the resource purchasing engine 164, the sale engine 172 and the testing and arbitrate engine 194, may provide coordinated and automated allocation of resources and coordinated execution of transactions across the various forward markets 130 and spot markets 170 by coordinating the various purchase and sale machines, such as by an expert system, such as a machine learning system (which may model-based or a deep learning system, and which may be trained on outcomes and/or supervised by humans). For example, the coordination and allocation engine 168 may coordinate purchasing of resources for a set of assets and coordinated sale of resources available from a set of assets, such as a fleet of vehicles, a data center of processing and data storage resources, an information technology network (on premises, cloud, or hybrids), a fleet of energy production systems (renewable or non-renewable), a smart home or building (including appliances, machines, infrastructure components and systems, and the like thereof that consume or produce resources), and the like. The platform 100 may optimize allocation of resource purchasing, sale and utilization based on data aggregated in the platform, such as by tracking activities of various engines and agents, as well as by taking inputs from external data sources 182. In embodiments, outcomes may be provided as feedback for training the intelligent resource coordination and allocation engine 168, such as outcomes based on yield, profitability, optimization of resources, optimization of business objectives, satisfaction of goals, satisfaction of users or operators, or the like. For example, as the energy for computational tasks becomes a significant fraction of an enterprise's energy usage, the platform 100 may learn to optimize how a set of machines that have energy storage capacity allocate that capacity among computing tasks (such as for cryptocurrency mining, application of neural networks, computation on data and the like), other useful tasks (that may yield profits or other benefits), storage for future use, or sale to the provider of an energy grid. The platform 100 may be used by fleet operators, enterprises, governments, municipalities, military units, first responder units, manufacturers, energy producers, cloud platform providers, and other enterprises and operators that own or operate resources that consume or provide energy, computation, data storage, bandwidth, or spectrum. The platform 100 may also be used in connection with markets for attention, such as to use available capacity of resources to support attention-based exchanges of value, such as in advertising markets, micro-transaction markets, and others.

Referring still to FIG. 2, the platform 100 may include a set of intelligent forecasting engines 192 that forecast one or more attributes, parameters, variables, or other factors, such as for use as inputs by the set of forward purchase and sale machines, the intelligent transaction engines 126 (such as for intelligent cryptocurrency execution) or for other purposes. Each of the set of intelligent forecasting engines 192 may use data that is tracked, aggregated, processed, or handled within the platform 100, such as by the data aggregation system 144, as well as input data from external data sources 182, such as social media data sources 180, automated agent behavioral data sources 188, human behavioral data sources 184, entity behavioral data sources 190 and IoT data sources 198. These collective inputs may be used to forecast attributes, such as using a model (e.g., Bayesian, regression, or other statistical model), a rule, or an expert system, such as a machine learning system that has one or more classifiers, pattern recognizers, and predictors, such as any of the expert systems described throughout this disclosure. In embodiments, the set of intelligent forecasting engines 192 may include one or more specialized engines that forecast market attributes, such as capacity, demand, supply, and prices, using particular data sources for particular markets. These may include an energy price forecasting engine 215 that bases its forecast on behavior of an automated agent, a network spectrum price forecasting engine 217 that bases its forecast on behavior of an automated agent, a REC price forecasting engine 219 that bases its forecast on behavior of an automated agent, a compute price forecasting engine 221 that bases its forecast on behavior of an automated agent, a network spectrum price forecasting engine 223 that bases its forecast on behavior of an automated agent. In each case, observations regarding the behavior of automated agents, such as ones used for conversation, for dialog management, for managing electronic commerce, for managing advertising and others may be provided as inputs for forecasting to the engines. The intelligent forecasting engines 192 may also include a range of engines that provide forecasts at least in part based on entity behavior, such as behavior of business and other organizations, such as marketing behavior, sales behavior, product offering behavior, advertising behavior, purchasing behavior, transactional behavior, merger and acquisition behavior, and other entity behavior. These may include an energy price forecasting engine 225 using entity behavior, a network spectrum price forecasting engine 227 using entity behavior, a REC price forecasting engine 229 using entity behavior, a compute price forecasting engine 231 using entity behavior, and a network spectrum price forecasting engine 233 using entity behavior.

The intelligent forecasting engines 192 may also include a range of engines that provide forecasts at least in part based on human behavior, such as behavior of consumers and users, such as purchasing behavior, shopping behavior, sales behavior, product interaction behavior, energy utilization behavior, mobility behavior, activity level behavior, activity type behavior, transactional behavior, and other human behavior. These may include an energy price forecasting engine 235 using human behavior, a network spectrum price forecasting engine 237 using human behavior, a REC price forecasting engine 239 using human behavior, a compute price forecasting engine 241 using human behavior, and a network spectrum price forecasting engine 243 using human behavior.

Referring still to FIG. 2, the platform 100 may include a set of intelligent transaction engines 136 that automate execution of transactions in forward markets 130 and/or spot markets 170 based on determination that favorable conditions exist, such as by the intelligent resource allocation and coordination engine 168 and/or with use of forecasts form the intelligent forecasting engines 192. The intelligent transaction engines 136 may be configured to automatically execute transactions, using available market interfaces, such as APIs, connectors, ports, network interfaces, and the like, in each of the markets noted above. In embodiments, the intelligent transaction engines may execute transactions based on event streams that come from external data sources, such as IoT data sources 198 and social media data sources 180. The engines may include, for example, an IoT forward energy transaction engine 195 and/or an IoT compute market transaction engine 106, either or both of which may use data from the Internet of Things to determine timing and other attributes for market transaction in a market for one or more of the resources described herein, such as an energy market transaction, a compute resource transaction or other resource transaction. IoT data may include instrumentation and controls data for one or more machines (optionally coordinated as a fleet) that use or produce energy or that use or have compute resources, weather data that influences energy prices or consumption (such as wind data influencing production of wind energy), sensor data from energy production environments, sensor data from points of use for energy or compute resources (such as vehicle traffic data, network traffic data, IT network utilization data, Internet utilization and traffic data, camera data from work sites, smart building data, smart home data, and the like), and other data collected by or transferred within the Internet of Things, including data stored in IoT platforms and of cloud services providers like Amazon, IBM, and others. The engines 136 may include engines that use social data to determine timing of other attributes for a market transaction in one or more of the resources described herein, such as a social data forward energy transaction engine 199 and/or a social data compute market transaction engine 116. Social data may include data from social networking sites (e.g., Facebook™, YouTube™, Twitter™, Snapchat™, Instagram™, and others, data from websites, data from e-commerce sites, and data from other sites that contain information that may be relevant to determining or forecasting behavior of users or entities, such as data indicating interest or attention to particular topics, goods or services, data indicating activity types and levels (such as may be observed by machine processing of image data showing individuals engaged in activities, including travel, work activities, leisure activities, and the like. Social data may be supplied to machine learning, such as for learning user behavior or entity behavior, and/or as an input to an expert system, a model, or the like, such as one for determining, based on the social data, the parameters for a transaction. For example, an event or set of events in a social data stream may indicate the likelihood of a surge of interest in an online resource, a product, or a service, and compute resources, bandwidth, storage, or like may be purchased in advance (avoiding surge pricing) to accommodate the increased interest reflected by the social data stream.

Figure 3:
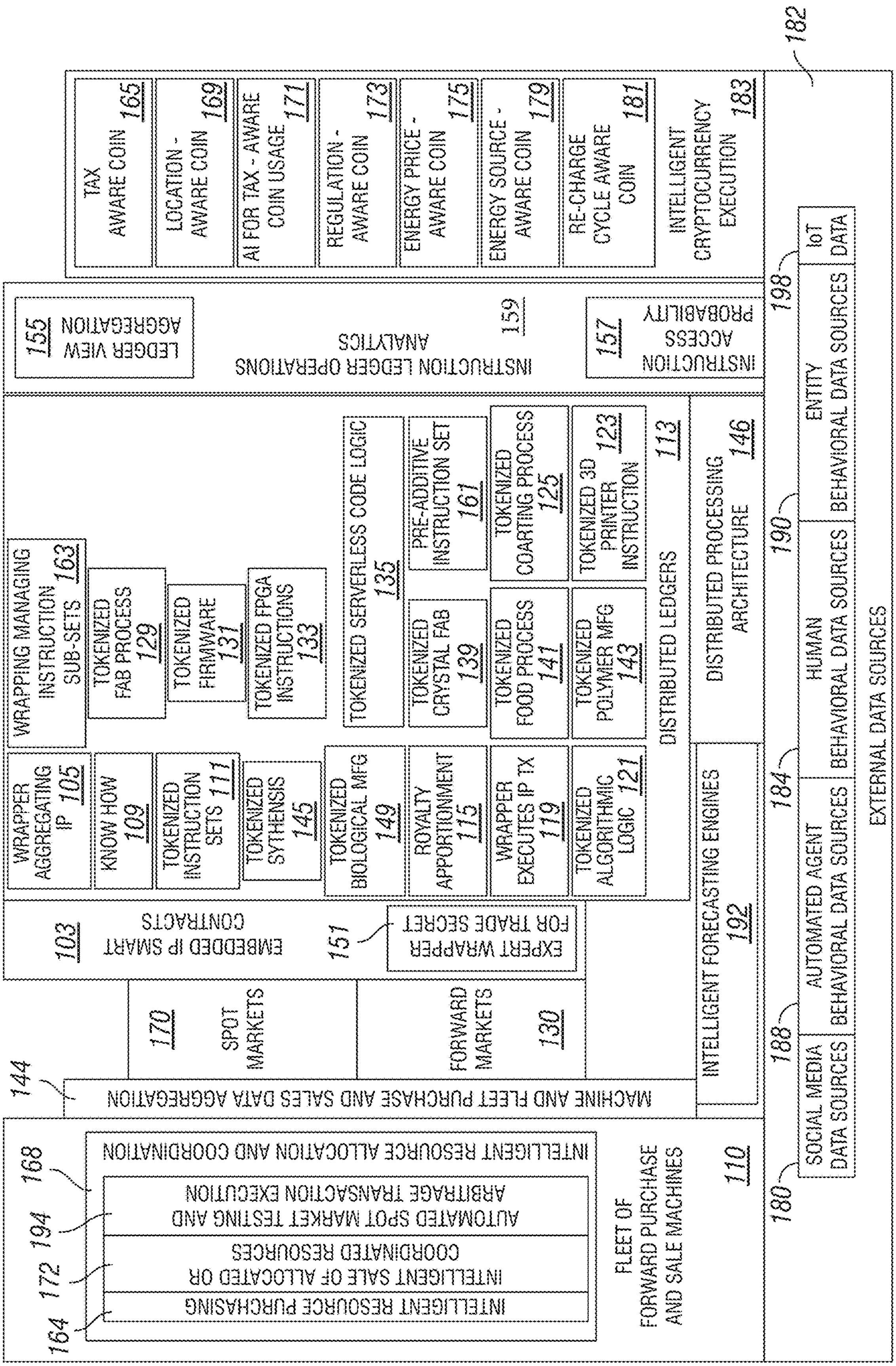
FIG. 3 is a schematic diagram of additional components of a platform for enabling intelligent transactions in accordance with embodiments of the present disclosure.

Referring to FIG. 3, the platform 100 may include capabilities for transaction execution that involve one or more distributed ledgers 113 and one or more smart contracts 103, where the distributed ledgers 113 and smart contracts 103 are configured to enable specialized transaction features for specific transaction domains. One such domain is intellectual property, which transactions are highly complex, involving licensing terms and conditions that are somewhat difficult to manage, as compared to more straightforward sales of goods or services. In embodiments, a smart contract wrapper 105, such as wrapper aggregating intellectual property, is provided, using a distributed ledger, wherein the smart contract embeds IP licensing terms for intellectual property that is embedded in the distributed ledger and wherein executing an operation on the distributed ledger provides access to the intellectual property and commits the executing party to the IP licensing terms. Licensing terms for a wide range of goods and services, including digital goods like video, audio, video game, video game element, music, electronic book and other digital goods may be managed by tracking transactions involving them on a distributed ledger, whereby publishers may verify a chain of licensing and sublicensing. The distributed ledger may be configured to add each licensee to the ledger, and the ledger may be retrieved at the point of use of a digital item, such as in a streaming platform, to validate that licensing has occurred.

In embodiments, an improved distributed ledger is provided with the smart contract wrapper 105, such as an IP wrapper, container, smart contract or similar mechanism for aggregating intellectual property licensing terms, wherein a smart contract wrapper on the distributed ledger allows an operation on the ledger to add intellectual property to an aggregate stack of intellectual property. In many cases, intellectual property builds on other intellectual property, such as where software code is derived from other code, where trade secrets or know-how for elements of a process are combined to enable a larger process, where patents covering sub-components of a system or steps in a process are pooled, where elements of a video game include sub-component assets from different creators, where a book contains contributions from multiple authors, and the like. In embodiments, a smart IP wrapper aggregates licensing terms for different intellectual property items (including digital goods, including ones embodying different types of intellectual property rights, and transaction data involving the item, as well as optionally one or more portions of the item corresponding to the transaction data, are stored in a distributed ledger that is configured to enable validation of agreement to the licensing terms (such as at appoint of use) and/or access control to the item. In embodiments, a royalty apportionment wrapper 115 may be provided in a system having a distributed ledger for aggregating intellectual property licensing terms, wherein a smart contract wrapper on the distributed ledger allows an operation on the ledger to add intellectual property and to agree to an apportionment of royalties among the parties in the ledger. Thus, a ledger may accumulate contributions to the ledger along with evidence of agreement to the apportionment of any royalties among the contributors of the IP that is embedded in and/or controlled by the ledger. The ledger may record licensing terms and automatically vary them as new contributions are made, such as by one or more rules. For example, contributors may be given a share of a royalty stack according to a rule, such as based on a fractional contribution, such as based on lines of code contributed, lines of authorship, contribution to components of a system, and the like. In embodiments, a distributed ledger may be forked into versions that represent varying combinations of sub-components of IP, such as to allow users to select combinations that are of most use, thereby allowing contributors who have contributed the most value to be rewarded. Variation and outcome tracking may be iteratively improved, such as by machine learning.

In embodiments, a distributed ledger is provided for aggregating intellectual property licensing terms, wherein a smart contract wrapper on the distributed ledger allows an operation on the ledger to add intellectual property to an aggregate stack of intellectual property.

In embodiments, the platform 100 may have an improved distributed ledger for aggregating intellectual property licensing terms, wherein a smart contract wrapper on the distributed ledger allows an operation on the ledger to commit a party to a contract term via an IP transaction wrapper 119 of the ledger. This may include operations involving cryptocurrencies, tokens, or other operations, as well as conventional payments and in-kind transfers, such as of various resources described herein. The ledger may accumulate evidence of commitments to IP transactions by parties, such as entering into royalty terms, revenue sharing terms, IP ownership terms, warranty and liability terms, license permissions and restrictions, field of use terms, and many others.

In embodiments, improved distributed ledgers may include ones having a tokenized instruction set, such that operation on the distributed ledger provides provable access to the instruction set. A party wishing to share permission to know how, a trade secret or other valuable instructions may thus share the instruction set via a distributed ledger that captures and stores evidence of an action on the ledger by a third party, thereby evidencing access and agreement to terms and conditions of access. In embodiments, the platform 100 may have a distributed ledger that tokenizes executable algorithmic logic 121, such that operation on the distributed ledger provides provable access to the executable algorithmic logic. A variety of instruction sets may be stored by a distributed ledger, such as to verify access and verify agreement to terms (such as smart contract terms). In embodiments, instruction sets that embody trade secrets may be separated into sub-components, so that operations must occur on multiple ledgers to get (provable) access to a trade secret. This may permit parties wishing to share secrets, such as with multiple sub-contractors or vendors, to main provable access control, while separating components among different vendors to avoid sharing an entire set with a single party. Various kinds of executable instruction sets may be stored on specialized distributed ledgers that may include smart wrappers for specific types of instruction sets, such that provable access control, validation of terms, and tracking of utilization may be performed by operations on the distributed ledger (which may include triggering access controls within a content management system or other systems upon validation of actions taken in a smart contract on the ledger. In embodiments, the platform 100 may have a distributed ledger that tokenizes a 3D printer instruction set 123, such that operation on the distributed ledger provides provable access to the instruction set.

In embodiments, the platform 100 may have a distributed ledger that tokenizes an instruction set for a coating process 125, such that operation on the distributed ledger provides provable access to the instruction set.

In embodiments, the platform 100 may have a distributed ledger that tokenizes an instruction set for a semiconductor fabrication process 129, such that operation on the distributed ledger provides provable access to the fabrication process.

In embodiments, the platform 100 may have a distributed ledger that tokenizes a firmware program 131, such that operation on the distributed ledger provides provable access to the firmware program.

In embodiments, the platform 100 may have a distributed ledger that tokenizes an instruction set for an FPGA 133, such that operation on the distributed ledger provides provable access to the FPGA.

In embodiments, the platform 100 may have a distributed ledger that tokenizes serverless code logic 135, such that operation on the distributed ledger provides provable access to the serverless code logic.

In embodiments, the platform 100 may have a distributed ledger that tokenizes an instruction set for a crystal fabrication system 139, such that operation on the distributed ledger provides provable access to the instruction set.

In embodiments, the platform 100 may have a distributed ledger that tokenizes an instruction set for a food preparation process 141, such that operation on the distributed ledger provides provable access to the instruction set.

In embodiments, the platform 100 may have a distributed ledger that tokenizes an instruction set for a polymer production process 143, such that operation on the distributed ledger provides provable access to the instruction set.

In embodiments, the platform 100 may have a distributed ledger that tokenizes an instruction set for chemical synthesis process 145, such that operation on the distributed ledger provides provable access to the instruction set.

In embodiments, the platform 100 may have a distributed ledger that tokenizes an instruction set for a biological production process 149, such that operation on the distributed ledger provides provable access to the instruction set.

In embodiments, the platform 100 may have a distributed ledger that tokenizes a trade secret with an expert wrapper 151, such that operation on the distributed ledger provides provable access to the trade secret and the wrapper provides validation of the trade secret by the expert. An interface may be provided by which an expert accesses the trade secret on the ledger and verifies that the information is accurate and sufficient to allow a third party to use the secret.

In embodiments, the platform 100 may have a distributed ledger that aggregates views of a trade secret into a chain that proves which and how many parties have viewed the trade secret. Views may be used to allocate value to creators of the trade secret, to operators of the platform 100, or the like.

In embodiments, the platform 100 may have a distributed ledger that tokenizes an instruction set 111, such that operation on the distributed ledger provides provable access 155 to the instruction set and execution of the instruction set on a system results in recording a transaction in the distributed ledger.

In embodiments, the platform 100 may have a distributed ledger that tokenizes an item of intellectual property and a reporting system that reports an analytic result based on the operations performed on the distributed ledger or the intellectual property.

In embodiments, the platform 100 may have a distributed ledger that aggregates a set of instructions, where an operation on the distributed ledger adds at least one instruction to a pre-existing set of instructions 161 to provide a modified set of instructions.

Referring still to FIG. 3, an intelligent cryptocurrency execution engine 183 may provide intelligence for the timing, location and other attributes of a cryptocurrency transaction, such as a mining transaction, an exchange transaction, a storage transaction, a retrieval transaction, or the like. Cryptocurrencies like Bitcoin™ are increasingly widespread, with specialized coins having emerged for a wide variety of purposes, such as exchanging value in various specialized market domains. Initial offerings of such coins, or ICOs, are increasingly subject to regulations, such as securities regulations, and in some cases to taxation. Thus, while cryptocurrency transactions typically occur within computer networks, jurisdictional factors may be important in determining where, when and how to execute a transaction, store a cryptocurrency, exchange it for value. In embodiments, intelligent cryptocurrency execution engine 183 may use features embedded in or wrapped around the digital object representing a coin, such as features that cause the execution of transactions in the coin to be undertaken with awareness of various conditions, including geographic conditions, regulatory conditions, tax conditions, market conditions, and the like.

In embodiments, the platform 100 may include a tax aware coin 165 or smart wrapper for a cryptocurrency coin that directs execution of a transaction involving the coin to a geographic location based on tax treatment of at least one of the coin and the transaction in the geographic location.

In embodiments, the platform 100 may include a location-aware coin 169 or smart wrapper that enables a self-executing cryptocurrency coin that commits a transaction upon recognizing a location-based parameter that provides favorable tax treatment.

In embodiments, the platform 100 may include an expert system or AI agent 171 that uses machine learning to optimize the execution of cryptocurrency transactions based on tax status. Machine learning may use one or more models or heuristics, such as populated with relevant jurisdictional tax data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include regulation aware coin 173 having a coin, a smart wrapper, and/or an expert system that aggregates regulatory information covering cryptocurrency transactions and automatically selects a jurisdiction for an operation based on the regulatory information. Machine learning may use one or more models or heuristics, such as populated with relevant jurisdictional regulatory data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include an energy price-aware coin 175, wrapper, or expert system that uses machine learning to optimize the execution of a cryptocurrency transaction based on real time energy price information for an available energy source. Cryptocurrency transactions, such as coin mining and blockchain operations, may be highly energy intensive. An energy price-aware coin may be configured to time such operations based on energy price forecasts, such as with one or more of the forecasting engines 192 described throughout this disclosure.

In embodiments, the platform 100 may include an energy source aware coin 179, wrapper, or expert system that uses machine learning to optimize the execution of a cryptocurrency transaction based on an understanding of available energy sources to power computing resources to execute the transaction. For example, coin mining may be performed only when renewable energy sources are available. Machine learning for optimization of a transaction may use one or more models or heuristics, such as populated with relevant energy source data (such as may be captured in a knowledge graph, which may contain energy source information by type, location and operating parameters), may be trained on a training set of input-output data for human-initiated transactions, may be supervised by human supervisors, and/or may use a deep learning technique based on outcomes over time, such as when operating on a wide range of internal system data and external data sources 182 as described throughout this disclosure.

In embodiments, the platform 100 may include a charging cycle aware coin 181, wrapper, or an expert system that uses machine learning to optimize charging and recharging cycle of a rechargeable battery system to provide energy for execution of a cryptocurrency transaction. For example, a battery may be discharged for a cryptocurrency transaction only if a minimum threshold of battery charge is maintained for other operational use, if re-charging resources are known to be readily available, or the like. Machine learning for optimization of charging and recharging may use one or more models or heuristics, such as populated with relevant battery data (such as may be captured in a knowledge graph, which may contain energy source information by type, location and operating parameters), may be trained on a training set of human operations, may be supervised by human supervisors, and/or may use a deep learning technique based on outcomes over time, such as when operating on a wide range of internal system data and external data sources 182 as described throughout this disclosure.

Optimization of various intelligent coin operations may occur with machine learning that is trained on outcomes, such as financial profitability. Any of the machine learning systems described throughout this disclosure may be used for optimization of intelligent cryptocurrency transaction management.

In embodiments, compute resources, such as those mentioned throughout this disclosure, may be allocated to perform a range of computing tasks, both for operations that occur within the platform 100, ones that are managed by the platform, and ones that involve the activities, workflows and processes of various assets that may be owned, operated or managed in conjunction with the platform, such as sets or fleets of assets that have or use computing resources. Examples of compute tasks include, without limitation, cryptocurrency mining, distributed ledger calculations and storage, forecasting tasks, transaction execution tasks, spot market testing tasks, internal data collection tasks, external data collection, machine learning tasks, and others. As noted above, energy, compute resources, bandwidth, spectrum, and other resources may be coordinated, such as by machine learning, for these tasks. Outcome and feedback information may be provided for the machine learning, such as outcomes for any of the individual tasks and overall outcomes, such as yield and profitability for business or other operations involving the tasks.

In embodiments, networking resources, such as those mentioned throughout this disclosure, may be allocated to perform a range of networking tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of networking tasks include cognitive network coordination, network coding, peer bandwidth sharing (including, for example cost-based routing, value-based routing, outcome-based routing and the like), distributed transaction execution, spot market testing, randomization (e.g., using genetic programming with outcome feedback to vary network configurations and transmission paths), internal data collection and external data collection. As noted above, energy, compute resources, bandwidth, spectrum, and other resources may be coordinated, such as by machine learning, for these networking tasks. Outcome and feedback information may be provided for the machine learning, such as outcomes for any of the individual tasks and overall outcomes, such as yield and profitability for business or other operations involving the tasks.

In embodiments, data storage resources, such as those mentioned throughout this disclosure, may be allocated to perform a range of data storage tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of data storage tasks include distributed ledger storage, storage of internal data (such as operational data with the platform), cryptocurrency storage, smart wrapper storage, storage of external data, storage of feedback and outcome data, and others. As noted above, data storage, energy, compute resources, bandwidth, spectrum, and other resources may be coordinated, such as by machine learning, for these data storage tasks. Outcome and feedback information may be provided for the machine learning, such as outcomes for any of the individual tasks and overall outcomes, such as yield and profitability for business or other operations involving the tasks.

In embodiments, smart contracts, such as ones embodying terms relating to intellectual property, trade secrets, know how, instruction sets, algorithmic logic, and the like may embody or include contract terms, which may include terms and conditions for options, royalty stacking terms, field exclusivity, partial exclusivity, pooling of intellectual property, standards terms (such as relating to essential and non-essential patent usage), technology transfer terms, consulting service terms, update terms, support terms, maintenance terms, derivative works terms, copying terms, and performance-related rights or metrics, among many others.

In embodiments where an instruction set is embodied in digital form, such as contained in or managed by a distributed ledger transactions system, various systems may be configured with interfaces that allow them to access and use the instruction sets. In embodiments, such systems may include access control features that validate proper licensing by inspection of a distributed ledger, a key, a token, or the like that indicates the presence of access rights to an instruction set. Such systems that execute distributed instruction sets may include systems for 3D printing, crystal fabrication, semiconductor fabrication, coating items, producing polymers, chemical synthesis and biological production, among others.

Networking capabilities and network resources should be understood to include a wide range of networking systems, components and capabilities, including infrastructure elements for 3G, 4G, LTE, 5G and other cellular network types, access points, routers, and other Wi-Fi elements, cognitive networking systems and components, mobile networking systems and components, physical layer, MAC layer and application layer systems and components, cognitive networking components and capabilities, peer-to-peer networking components and capabilities, optical networking components and capabilities, and others.

Building Blocks on Expert Systems and AI

Neural Net Systems

Referring to FIG. 4 through FIG. 31, embodiments of the present disclosure, including ones involving expert systems, self-organization, machine learning, artificial intelligence, and the like, may benefit from the use of a neural net, such as a neural net trained for pattern recognition, for classification of one or more parameters, characteristics, or phenomena, for support of autonomous control, and other purposes. References to a neural net throughout this disclosure should be understood to encompass a wide range of different types of neural networks, machine learning systems, artificial intelligence systems, and the like, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic—neural network systems), Autoencoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neocognitron neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GCU) neural networks, auto encoder neural networks, variational auto encoder neural networks, denoising auto encoder neural networks, sparse auto-encoder neural networks, Markov chain neural networks, restricted Boltzmann machine neural networks, deep belief neural networks, deep convolutional neural networks, de-convolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

Figure 4:
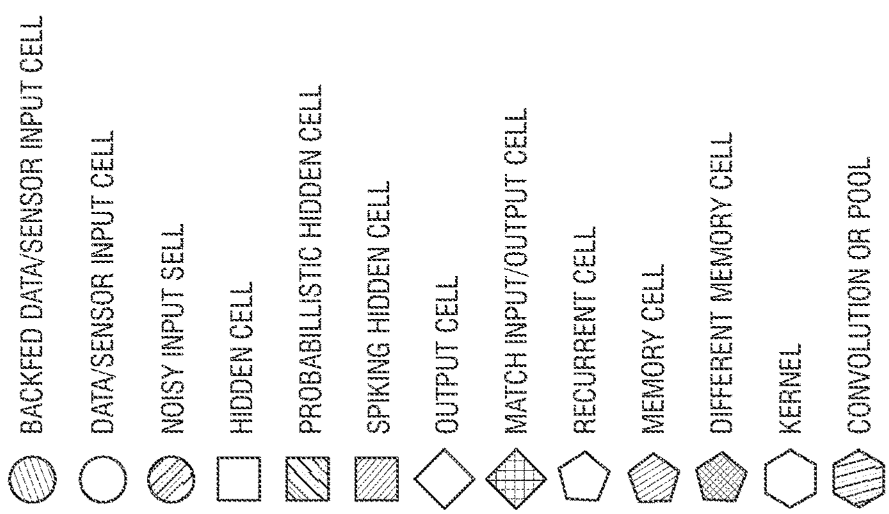
FIG. 4 to FIG. 31 are schematic diagrams of embodiments of neural net systems that may connect to, be integrated in, and be accessible by the platform for enabling intelligent transactions including ones involving expert systems, self-organization, machine learning, artificial intelligence and including neural net systems trained for pattern recognition, for classification of one or more parameters, characteristics, or phenomena, for support of autonomous control, and other purposes in accordance with embodiments of the present disclosure.

In embodiments, FIGS. 5 through 31 depict exemplary neural networks and FIG. 4 depicts a legend showing the various components of the neural networks depicted throughout FIGS. 5 to 31. FIG. 4 depicts various neural net components depicted in cells that are assigned functions and requirements. In embodiments, the various neural net examples may include back fed data/sensor cells, data/sensor cells, noisy input cells, and hidden cells. The neural net components also include probabilistic hidden cells, spiking hidden cells, output cells, match input/output cells, recurrent cells, memory cells, different memory cells, kernels, and convolution or pool cells.

Figure 5:
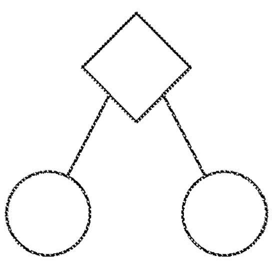
Figure 6:
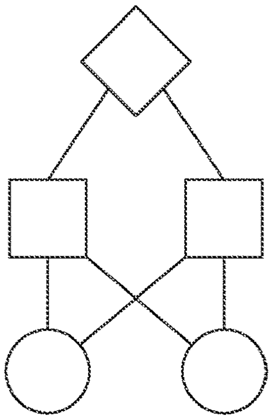
Figure 7:
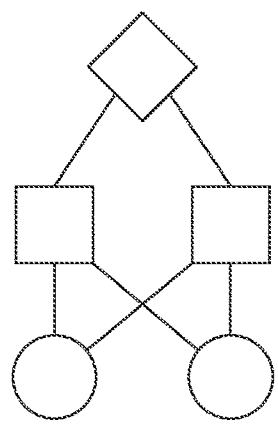
Figure 8:
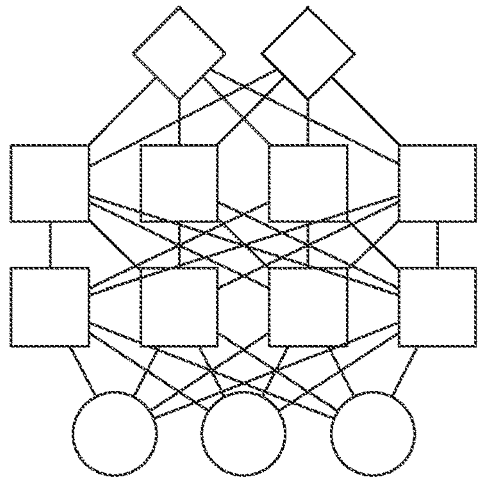
Figure 11:
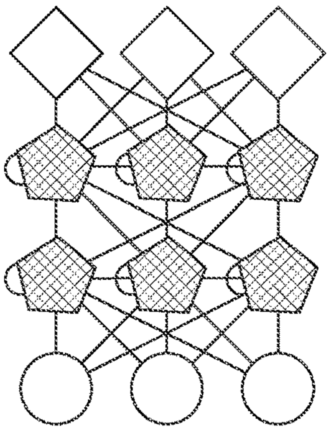
Figure 10:
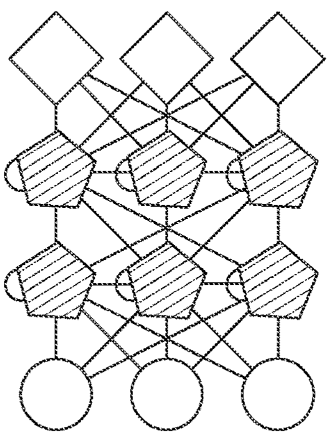
Figure 9:
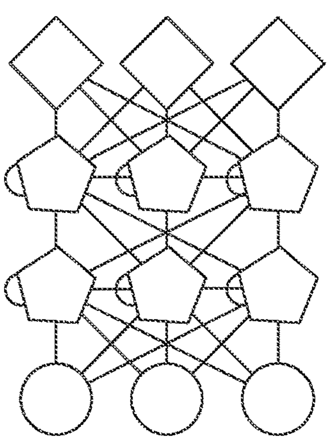
Figure 15:
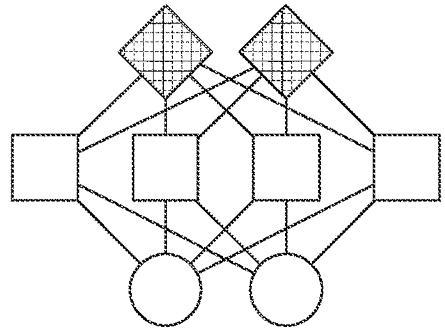
Figure 14:
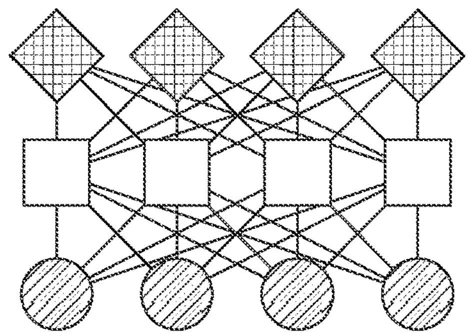
Figure 13:
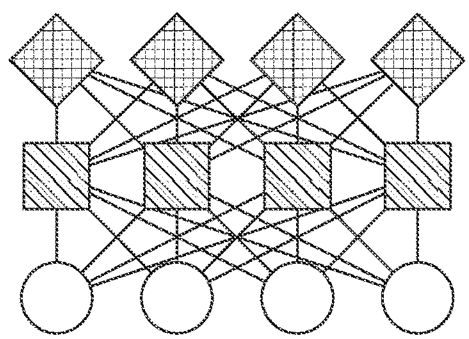
Figure 12:
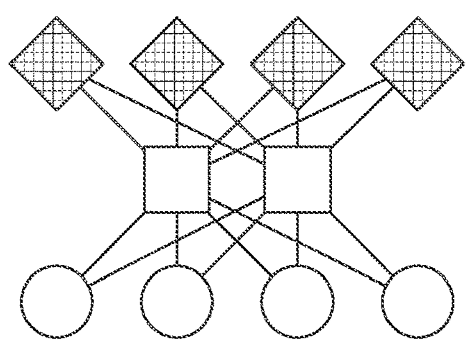
Figure 16:
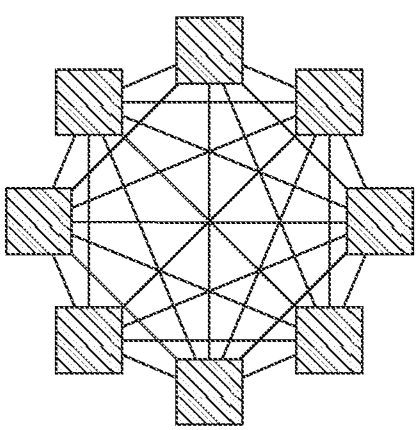
Figure 17:
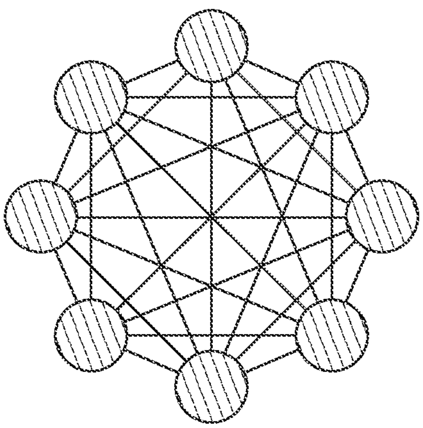
Figure 18:
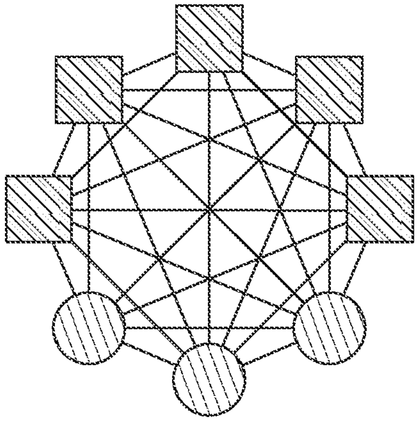
Figure 19:
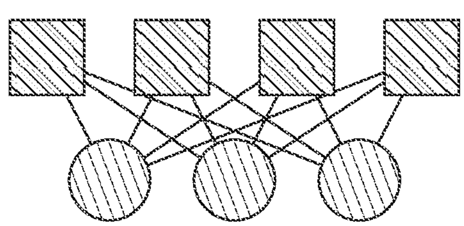
Figure 20:
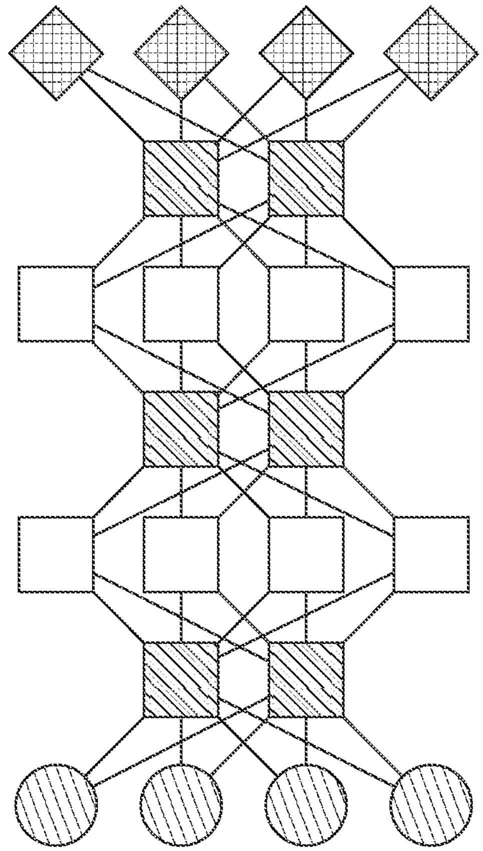
Figure 22:
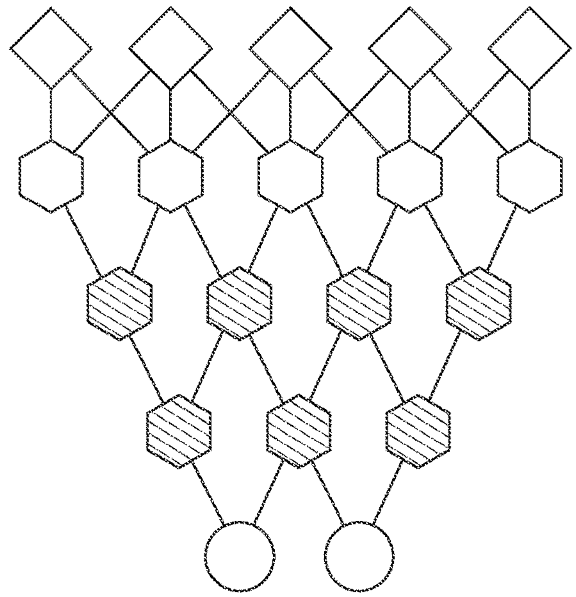
Figure 21:
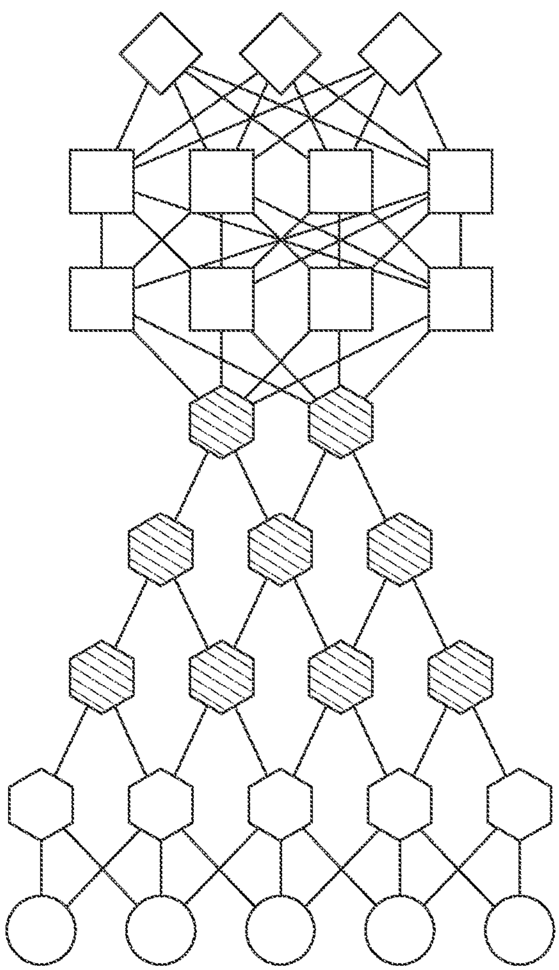
Figure 23:
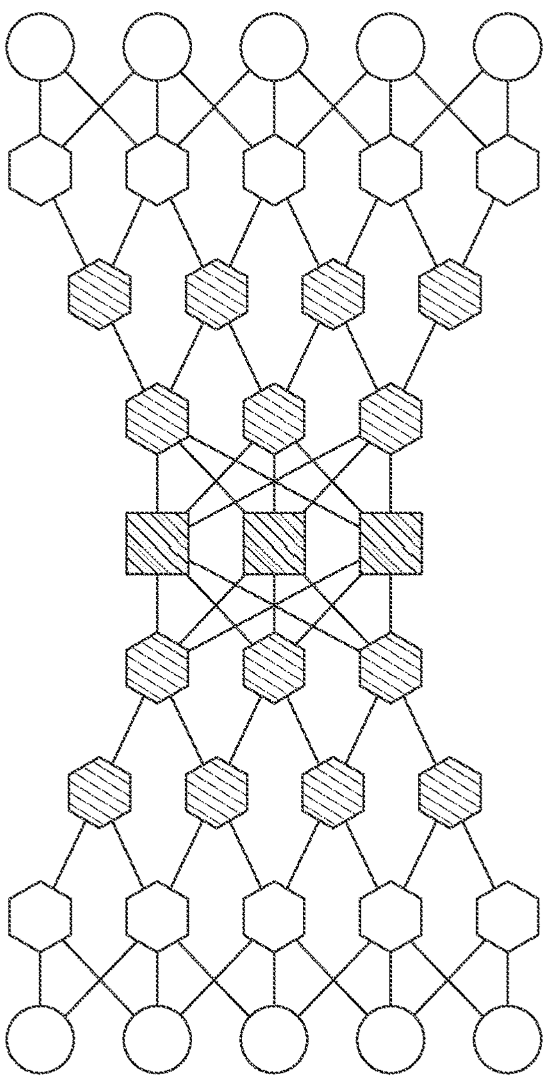
Figure 24:
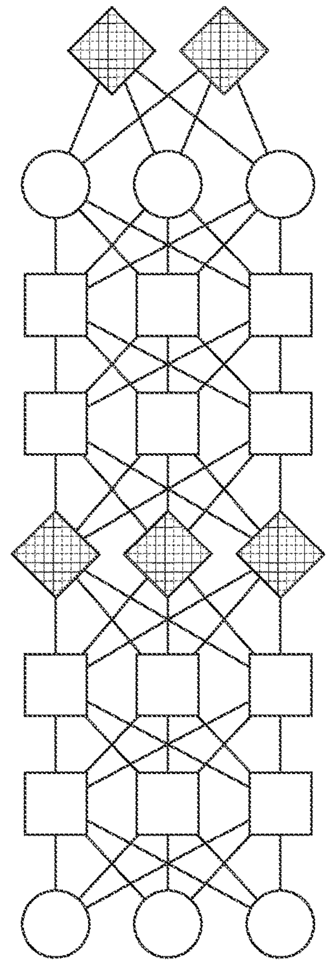
Figure 26:
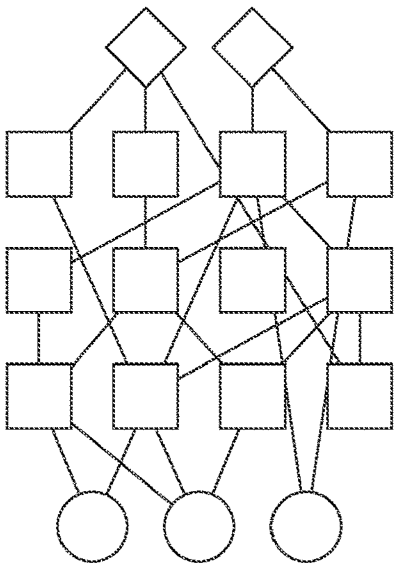
Figure 28:
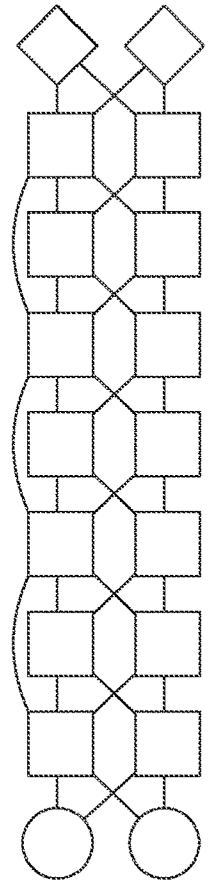
Figure 25:
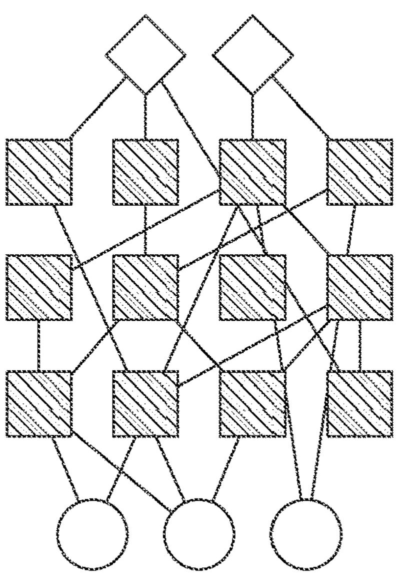
Figure 27:
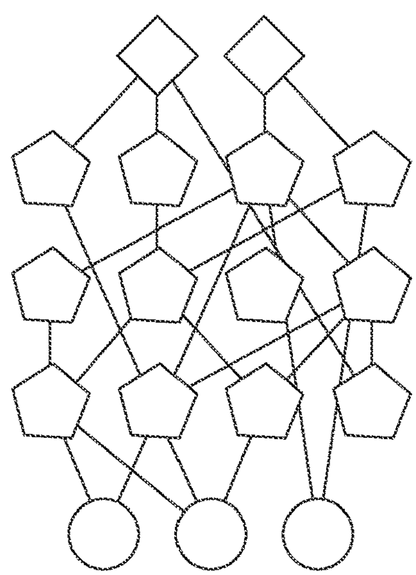
Figure 29:
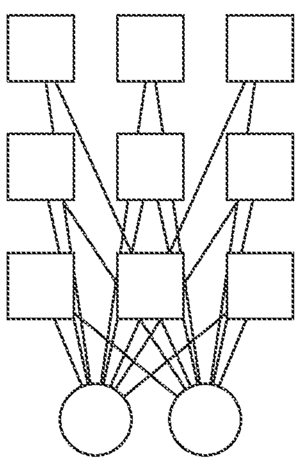
Figure 30:
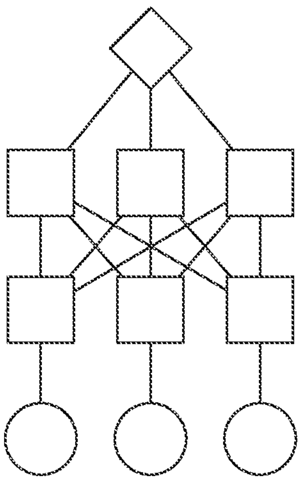
Figure 31:
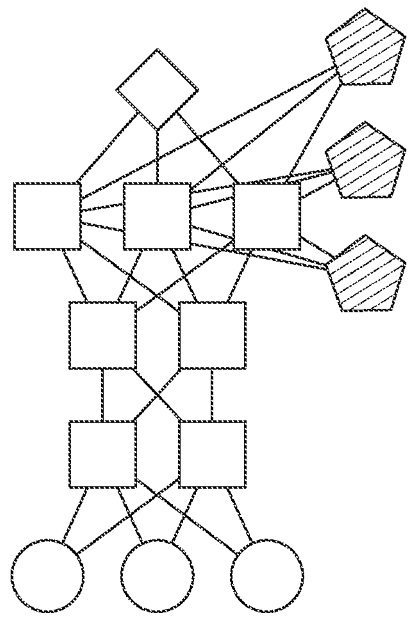

In embodiments, FIG. 5 depicts an exemplary perceptron neural network that may connect to, integrate with, or interface with the platform 100. The platform may also be associated with further neural net systems such as a feed forward neural network (FIG. 6), a radial basis neural network (FIG. 7), a deep feed forward neural network (FIG. 8), a recurrent neural network (FIG. 9), a long/short term neural network (FIG. 10), and a gated recurrent neural network (FIG. 11). The platform may also be associated with further neural net systems such as an auto encoder neural network (FIG. 12), a variational neural network (FIG. 13), a denoising neural network (FIG. 14), a sparse neural network (FIG. 15), a Markov chain neural network (FIG. 16), and a Hopfield network neural network (FIG. 17). The platform may further be associated with additional neural net systems such as a Boltzmann machine neural network (FIG. 18), a restricted BM neural network (FIG. 19), a deep belief neural network (FIG. 20), a deep convolutional neural network (FIG. 21), a deconvolutional neural network (FIG. 22), and a deep convolutional inverse graphics neural network (FIG. 23). The platform may also be associated with further neural net systems such as a generative adversarial neural network (FIG. 24), a liquid state machine neural network (FIG. 25), an extreme learning machine neural network (FIG. 26), an echo state neural network (FIG. 27), a deep residual neural network (FIG. 28), a Kohonen neural network (FIG. 29), a support vector machine neural network (FIG. 30), and a neural Turing machine neural network (FIG. 31).

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptrons, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values, such as sensor data, event data, parameter data, and other types of data (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more transactional environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like a data source related to at least one resource or parameter related to a transactional environment, such as any of the data sources mentioned throughout this disclosure, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, methods and systems described herein that involve an expert system or self-organization capability may use a capsule neural network, such as for prediction, classification, or control functions with respect to a transactional environment, such as relating to one or more of the machines and automated systems described throughout this disclosure.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions. In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer, such as a sigmoidal hidden layer transfer, in a multi-layer perceptron. An RBF network may have two layers, such as where an input is mapped onto each RBF in a hidden layer. In embodiments, an output layer may comprise a linear combination of hidden layer values representing, for example, a mean predicted output. The output layer value may provide an output that is the same as or similar to that of a regression model in statistics. In classification problems, the output layer may be a sigmoid function of a linear combination of hidden layer values, representing a posterior probability. Performance in both cases is often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface is quadratic and therefore has a single minimum. In regression problems, this may be found in one matrix operation. In classification problems, the fixed non-linearity introduced by the sigmoid output function may be handled using an iteratively re-weighted least squares function or the like. RBF networks may use kernel methods such as support vector machines (SVM) and Gaussian processes (where the RBF is the kernel function). A non-linear kernel function may be used to project the input data into a space where the learning problem may be solved using a linear model.

In embodiments, an RBF neural network may include an input layer, a hidden layer, and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that is centered on a point with as many dimensions as a number of predictor variables. The spread (e.g., radius) of the RBF function may be different for each dimension. The centers and spreads may be determined by training. When presented with the vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output is produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and others hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system may explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with a transactional environment, including any machine or component that relates to the transactional environment. In embodiments, the self-organizing neural network may be used to identify structures in data, such as unlabeled data, such as in data sensed from a range of data sources about or sensors in or about in a transactional environment, where sources of the data are unknown (such as where events may be coming from any of a range of unknown sources). The self-organizing neural network may organize structures or patterns in the data, such that they may be recognized, analyzed, and labeled, such as identifying market behavior structures as corresponding to other events and signals.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the automation systems, machines and devices described throughout this disclosure, such as an automated agent interacting with a marketplace for purposes of collecting data, testing spot market transactions, execution transactions, and the like, where dynamic system behavior involves complex interactions that a user may desire to understand, predict, control and/or optimize. For example, the recurrent neural network may be used to anticipate the state of a market, such as one involving a dynamic process or action, such as a change in state of a resource that is traded in or that enables a marketplace of transactional environment. In embodiments, the recurrent neural network may use internal memory to process a sequence of inputs, such as from other nodes and/or from sensors and other data inputs from or about the transactional environment, of the various types described herein. In embodiments, the recurrent neural network may also be used for pattern recognition, such as for recognizing a machine, component, agent, or other item based on a behavioral signature, a profile, a set of feature vectors (such as in an audio file or image), or the like. In a non-limiting example, a recurrent neural network may recognize a shift in an operational mode of a marketplace or machine by learning to classify the shift from a training data set consisting of a stream of data from one or more data sources of sensors applied to or about one or more resources.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as whole is intended to perform. For example, a modular neural network may comprise a recurrent neural network for pattern recognition, such as to recognize what type of machine or system is being sensed by one or more sensors that are provided as input channels to the modular network and an RBF neural network for optimizing the behavior of the machine or system once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or work flow based on the recognized pattern (such as providing an output governing autonomous control of a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, or the like). Modular neural networks may also include situations where an expert system uses one neural network for determining a state or context (such as a state of a machine, a process, a work flow, a marketplace, a storage system, a network, a data collector, or the like) and a different neural network for self-organizing a process involving the state or context (e.g., a data storage process, a network coding process, a network selection process, a data marketplace process, a power generation process, a manufacturing process, a refining process, a digging process, a boring process, or other process described herein).

In embodiments, methods and systems described herein that involve an expert system or self-organization capability may use a physical neural network where one or more hardware elements is used to perform or simulate neural behavior. In embodiments, one or more hardware neurons may be configured to stream voltage values, current values, or the like that represent sensor data, such as to calculate information from analog sensor inputs representing energy consumption, energy production, or the like, such as by one or more machines providing energy or consuming energy for one or more transactions. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the machine that is producing or consuming energy, or to optimize another parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, thermal images, heat maps, or the like), and the like. A physical neural network may be embodied in a data collector, including one that may be reconfigured by switching or routing inputs in varying configurations, such as to provide different neural net configurations within the data collector for handling different types of inputs (with the switching and configuration optionally under control of an expert system, which may include a software-based neural net located on the data collector or remotely). A physical, or at least partially physical, neural network may include physical hardware nodes located in a storage system, such as for storing data within a machine, a data storage system, a distributed ledger, a mobile device, a server, a cloud resource, or in a transactional environment, such as for accelerating input/output functions to one or more storage elements that supply data to or take data from the neural net. A physical, or at least partially physical, neural network may include physical hardware nodes located in a network, such as for transmitting data within, to or from an industrial environment, such as for accelerating input/output functions to one or more network nodes in the net, accelerating relay functions, or the like. In embodiments, of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They are versatile and may be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feed forward neural network may be trained by an optimization technique, such as a genetic algorithm, such as to explore a large and complex space of options to find an optimum, or near-optimum, global solution. For example, one or more genetic algorithms may be used to train a multilayered feed forward neural network to classify complex phenomena, such as to recognize complex operational modes of machines, such as modes involving complex interactions among machines (including interference effects, resonance effects, and the like), modes involving non-linear phenomena, modes involving critical faults, such as where multiple, simultaneous faults occur, making root cause analysis difficult, and others. In embodiments, a multilayered feed forward neural network may be used to classify results from monitoring of a marketplace, such as monitoring systems, such as automated agents, that operate within the marketplace, as well as monitoring resources that enable the marketplace, such as computing, networking, energy, data storage, energy storage, and other resources.

In embodiments, methods and systems described herein that involve an expert system or self-organization capability may use a feed-forward, back-propagation multi-layer perceptron (MLP) neural network, such as for handling one or more remote sensing applications, such as for taking inputs from sensors distributed throughout various transactional environments. In embodiments, the MLP neural network may be used for classification of transactional environments and resource environments, such as spot markets, forward markets, energy markets, renewable energy credit (REC) markets, networking markets, advertising markets, spectrum markets, ticketing markets, rewards markets, compute markets, and others mentioned throughout this disclosure, as well as physical resources and environments that produce them, such as energy resources (including renewable energy environments, mining environments, exploration environments, drilling environments, and the like, including classification of geological structures (including underground features and above ground features), classification of materials (including fluids, minerals, metals, and the like), and other problems. This may include fuzzy classification.

In embodiments, methods and systems described herein that involve an expert system or self-organization capability may use a structure-adaptive neural network, where the structure of a neural network is adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feed forward neural network to a recurrent neural network, such as by switching data paths between some subset of nodes from unidirectional to bi-directional data paths. The structure adaptation may occur under control of an expert system, such as to trigger adaptation upon occurrence of a trigger, rule or event, such as recognizing occurrence of a threshold (such as an absence of a convergence to a solution within a given amount of time) or recognizing a phenomenon as requiring different or additional structure (such as recognizing that a system is varying dynamically or in a non-linear fashion). In one non-limiting example, an expert system may switch from a simple neural network structure like a feed forward neural network to a more complex neural network structure like a recurrent neural network, a convolutional neural network, or the like upon receiving an indication that a continuously variable transmission is being used to drive a generator, turbine, or the like in a system being analyzed.

In embodiments, methods and systems described herein that involve an expert system or self-organization capability may use an autoencoder, autoassociator or Diabolo neural network, which may be similar to a multilayer perceptron (MLP) neural network, such as where there may be an input layer, an output layer and one or more hidden layers connecting them. However, the output layer in the auto-encoder may have the same number of units as the input layer, where the purpose of the MLP neural network is to reconstruct its own inputs (rather than just emitting a target value). Therefore, the auto encoders may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of analog sensor data from a machine over one or more networks or of digital data from one or more data sources. In embodiments, an auto-encoding neural network may be used to self-learn an efficient storage approach for storage of streams of data.

In embodiments, methods and systems described herein that involve an expert system or self-organization capability may use a probabilistic neural network (PNN), which, in embodiments, may comprise a multi-layer (e.g., four-layer) feed forward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input is estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of an engine based on collection of data inputs from sensors and instruments for the engine.

In embodiments, methods and systems described herein that involve an expert system or self-organization capability may use a time delay neural network (TDNN), which may comprise a feed forward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, such as a stream of velocity data, a stream of acceleration data, a stream of temperature data, a stream of pressure data, and the like, where time delays are used to align the data streams in time, such as to help understand patterns that involve understanding of the various streams (e.g., changes in price patterns in spot or forward markets).

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses may be calculated mathematically, such as by a convolution operation, such as using multilayer perceptrons that use minimal preprocessing. A convolutional neural network may be used for recognition within images and video streams, such as for recognizing a type of machine in a large environment using a camera system disposed on a mobile data collector, such as on a drone or mobile robot. In embodiments, a convolutional neural network may be used to provide a recommendation based on data inputs, including sensor inputs and other contextual information, such as recommending a route for a mobile data collector. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) of parameters. A convolutional neural net may use one or more convolutional nets.

In embodiments, methods and systems described herein that involve an expert system or self-organization capability may use a regulatory feedback network, such as for recognizing emergent phenomena (such as new types of behavior not previously understood in a transactional environment).

In embodiments, methods and systems described herein that involve an expert system or self-organization capability may use a self-organizing map (SOM), involving unsupervised learning. A set of neurons may learn to map points in an input space to coordinates in an output space. The input space may have different dimensions and topology from the output space, and the SOM may preserve these while mapping phenomena into groups.

In embodiments, methods and systems described herein that involve an expert system or self-organization capability may use a learning vector quantization neural net (LVQ). Prototypical representatives of the classes may parameterize, together with an appropriate distance measure, in a distance-based classification scheme.

In embodiments, methods and systems described herein that involve an expert system or self-organization capability may use an echo state network (ESN), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of events associated with a market, such as the pattern of price changes in response to stimuli.

In embodiments, methods and systems described herein that involve an expert system or self-organization capability may use a Bi-directional, recurrent neural network (BRNN), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as ones provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in a transactional environment.

In embodiments, methods and systems described herein that involve an expert system or self-organization capability may use a stochastic neural network, which may introduce random variations into the network. Such random variations may be viewed as a form of statistical sampling, such as Monte Carlo sampling.

In embodiments, methods and systems described herein that involve an expert system or self-organization capability may use a genetic scale recurrent neural network. In such embodiments, an RNN (often an LSTM) is used where a series is decomposed into a number of scales where every scale informs the primary length between two consecutive points. A first order scale consists of a normal RNN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines (CoM), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network (ASNN), such as involving an extension of a committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that may coincide with a training set. If new data become available, the network instantly improves its predictive ability and provides data approximation (self-learns) without retraining. Another important feature of ASNN is the possibility to interpret neural network results by analysis of correlations between data cases in the space of models.

In embodiments, methods and systems described herein that involve an expert system or self-organization capability may use an instantaneously trained neural network (ITNN), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs may process information in the time domain (e.g., signals that vary over time, such as signals involving dynamic behavior of markets or transactional environments). They are often implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of shifting market variables, such as prices, available quantities, available counterparties, and the like.

In embodiments, cascade correlation may be used as an architecture and supervised learning algorithm, supplementing adjustment of the weights in a network of fixed topology. Cascade-correlation may begin with a minimal network, then automatically trains and add new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy inference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network (CPPN), such as a variation of an associative neural network (ANN) that differs the set of activation functions and how they are applied. While typical ANNs often contain only sigmoid functions (and sometimes Gaussian functions), CPPNs may include both types of functions and many others. Furthermore, CPPNs may be applied across the entire space of possible inputs, so that they may represent a complete image. Since they are compositions of functions, CPPNs in effect encode images at infinite resolution and may be sampled for a particular display at whatever resolution is optimal.

This type of network may add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory (HTM) neural network, such as involving the structural and algorithmic properties of the neocortex. HTM may use a biomimetic model based on memory-prediction theory. HTM may be used to discover and infer the high-level causes of observed input patterns and sequences.

Holographic Associative Memory

In embodiments, methods and systems described herein that involve an expert system or self-organization capability may use a holographic associative memory (HAM) neural network, which may comprise an analog, correlation-based, associative, stimulus-response system. Information may be mapped onto the phase orientation of complex numbers. The memory is effective for associative memory tasks, generalization and pattern recognition with changeable attention.

In embodiments, various embodiments involving network coding may be used to code transmission data among network nodes in a neural net, such as where nodes are located in one or more data collectors or machines in a transactional environment.

Integrated Circuit Building Blocks

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuits, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit, such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

Figure 32:
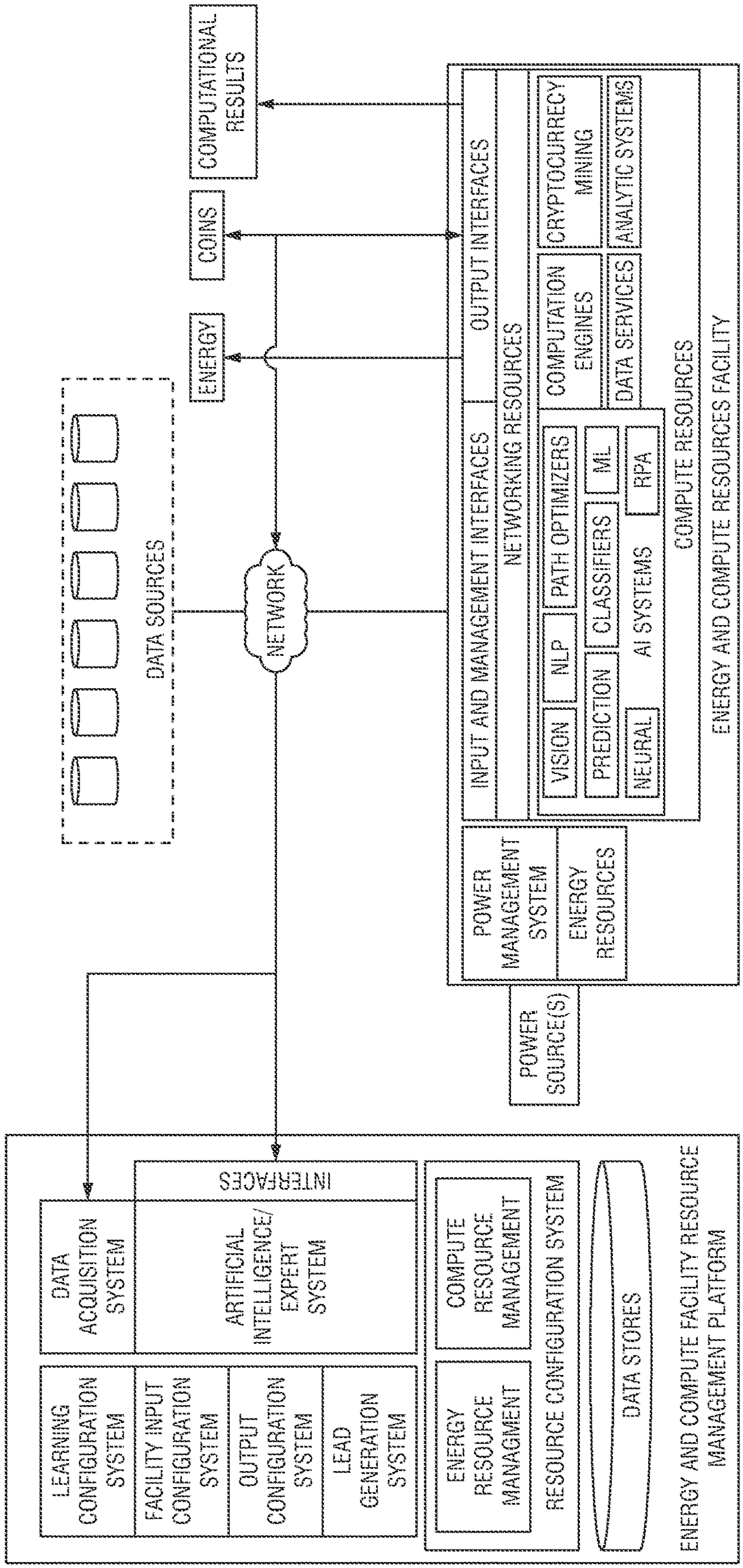
FIG. 32 is a schematic diagram of components of an environment including an intelligent energy and compute facility, a host intelligent energy and compute facility resource management platform, a set of data sources, a set of expert systems, interfaces to a set of market platforms and external resources, and a set of user or client systems and devices in accordance with embodiments of the present disclosure.

With reference to FIG. 32, the environment includes an intelligent energy and compute facility (such as a large scale facility hosting many compute resources and having access to a large energy source, such as a hydropower source), as well as a host intelligent energy and compute facility resource management platform, referred to in some cases for convenience as the energy and information technology platform (with networking, data storage, data processing and other resources as described herein), a set of data sources, a set of expert systems, interfaces to a set of market platforms and external resources, and a set of user (or client) systems and devices.

Intelligent Energy and Compute Facility

A facility may be configured to access an inexpensive (at least during some time periods) power source (such as a hydropower dam, a wind farm, a solar array, a nuclear power plant, or a grid), to contain a large set of networked information technology resources, including processing units, servers, and the like that are capable of flexible utilization (such as by switching inputs, switching configurations, switching programming and the like), and to provide a range of outputs that can also be flexibly configured (such as passing through power to a smart grid, providing computational results (such as for cryptocurrency mining, artificial intelligence, or analytics). A facility may include a power storage system, such as for large scale storage of available power.

Intelligent Energy and Compute Facility Resource Management Platform

In operation, a user can access the energy and information technology platform to initiate and manage a set of activities that involve optimizing energy and computing resources among a diverse set of available tasks. Energy resources may include hydropower, nuclear power, wind power, solar power, grid power and the like, as well as energy storage resources, such as batteries, gravity power, and storage using thermal materials, such as molten salts. Computing resources may include GPUs, FPGAs, servers, chips, Asics, processors, data storage media, networking resources, and many others. Available tasks may include cryptocurrency hash processing, expert system processing, computer vision processing, NLP, path optimization, applications of models such as for analytics, etc.

In embodiments, the platform may include various subsystems that may be implemented as micro services, such that other subsystems of the system access the functionality of a subsystem providing a micro service via application programming interface API. In some embodiments, the various services that are provided by the subsystems may be deployed in bundles that are integrated, such as by a set of APIs. Each of the subsystems is described in greater detail with respect to FIG. 130.

The External Data Sources can include any system or device that can provide data to the platform. Examples of data sources can include market data sources (e.g., for financial markets, commercial markets (including e-commerce), advertising markets, energy markets, telecommunication markets, and many others). The energy and computing resource platform accesses external data sources via a network (e.g., the Internet) in any suitable manner (e.g., crawlers, extract-transform-load (ETL) systems, gateways, brokers, application programming interfaces (APIs), spiders, distributed database queries, and the like).

A facility is a facility that has an energy resource (e.g., a hydro power resource) and a set of compute resource (e.g., a set of flexible computing resources that can be provisioned and managed to perform computing tasks, such as GPUs, FPGAs and many others, a set of flexible networking resources that can similarly be provisioned and managed, such as by adjusting network coding protocols and parameters), and the like.

User and client systems and devices can include any system or device that may consume one or more computing or energy resource made available by the energy and computing resource platform. Examples include cryptocurrency systems (e.g., for Bitcoin and other cryptocurrency mining operations), expert and artificial intelligence systems (such as neural networks and other systems, such as for computer vision, natural language processing, path determination and optimization, pattern recognition, deep learning, supervised learning, decision support, and many others), energy management systems (such as smart grid systems), and many others. User and client systems may include user devices, such as smartphones, tablet computer devices, laptop computing devices, personal computing devices, smart televisions, gaming consoles, and the like.

Figure 130:
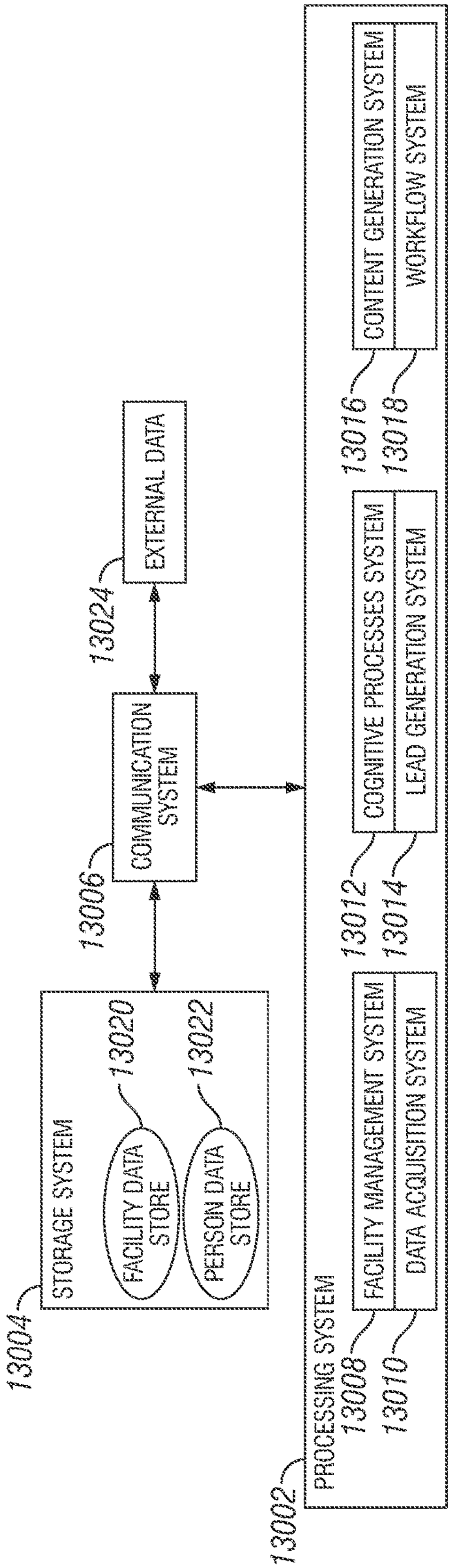
FIG. 130 depicts an example energy and computing resource platform.

Energy and computing resource platform Components in FIG. 130.

FIG. 130 illustrates an example energy and computing resource platform according to some embodiments of the present disclosure. In embodiments, the energy and computing resource platform may include a processing system 13002, a storage system 13004, and a communication system 13006.

The processing device 13002 may include one or more processors and memory. The processors may operate in an individual or distributed manner. The processors may be in the same physical device or in separate devices, which may or may not be located in the same facility. The memory may store computer-executable instructions that are executed by the one or more processors. In embodiments, the processing device 13002 may execute the facility management system 13008, the data acquisition system 13010, the cognitive processes system 13012, the lead generation system 13014, the content generation system 13016, and the workflow system 13018.

The storage device 13004 may include one or more computer-readable storage mediums. The computer-readable storage mediums may be located in the same physical device or in separate devices, which may or may not be located in the same facility, which may or may not be located in the same facility. The computer-readable storage mediums may include flash devices, solid-state memory devices, hard disk drives, and the like. In embodiments, the storage device 13004 stores one or more of a facility data store 13020, a person data store 13022, and an external data store 13024.

The communication system 13006 may include one or more transceivers that are configured to effectuate wireless or wired communication with one or more external devices, including user devices and/or servers, via a network (e.g., the Internet and/or a cellular network). The communication system 13006 may implement any suitable communication protocol. For example, the communication system xxx may implement an IEEE 801.11 wireless communication protocol and/or any suitable cellular communication protocol to effectuate wireless communication with external devices and external data 13024 via a wireless network.

Energy and Computing Resource Management Platform

Discovers, provisions, manages and optimizes energy and compute resources using artificial intelligence and expert systems with sensitivity to market and other conditions by learning on a set of outcomes. Discovers and facilitates cataloging of resources, optionally by user entry and/or automated detection (including peer detection). May implement a graphical user interface to receive relevant information regarding the energy and compute resources that are available. This may include a "digital twin" of an energy and compute facility that allows modeling, prediction and the like. May generate a set of data record that define the facility or a set of facilities under common ownership or operation by a host. The data record may have any suitable schema. In some embodiments (e.g., FIG. 131), the facility data records may include a facility identifier (e.g., a unique identifier that corresponds to the facility), a facility type (e.g., energy system and capabilities, compute systems and capabilities, networking systems and capabilities), facility attributes (e.g., name of the facility, name of the facility initiator, description of the facility, keywords of the facility, goals of the facility, timing elements, schedules, and the like), participants/potential participants in the facility (e.g., identifiers of owners, operators, hosts, service providers, consumers, clients, users, workers, and others), and any suitable metadata (e.g., creation date, launch date, scheduled requirements and the like). May generate content, such as a document, message, alert, report, webpage and/or application page based on the contents of the data record. For example, may obtain the data record of the facility and may populate a webpage template with the data contained therein. In addition, there can be management of existing facilities, updates the data record of a facility, determinations of outcomes (e.g., energy produced, compute tasks completed, processing outcomes achieved, financial outcomes achieved, service levels met and many others), and sending of information (e.g., updates, alerts, requests, instructions, and the like) to individuals and systems.

Data Acquisition Systems can acquire various types of data from different data sources and organizes that data into one or more data structures. In embodiments, the data acquisition system receives data from users via a user interface (e.g., user types in profile information). In embodiments, the data acquisition system can retrieve data from passive electronic sources. In embodiments, the data acquisition system can implement crawlers to crawl different websites or applications. In embodiments, the data acquisition system can implement an API to retrieve data from external data sources or user devices (e.g., various contact lists from user's phone or email account). In embodiments, the data acquisition system can structure the obtained data into appropriate data structures. In embodiments, the data acquisition system generates and maintains person records based on data collected regarding individuals. In embodiments, a person datastore stores person records. In some of these embodiments, the person datastore may include one or more databases, indexes, tables, and the like. Each person record may correspond to a respective individual and may be organized according to any suitable schema.

Figure 132:
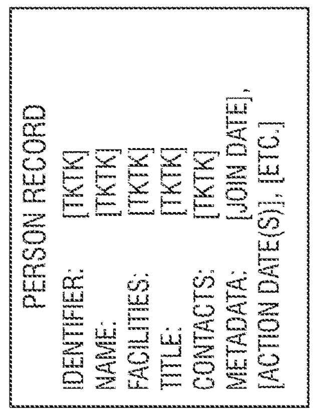
FIG. 132 depicts an example schema of a person data record.

FIG. 132 illustrates an example schema of a person record. In the example, each person record may include a unique person identifier (e.g., username or value), and may define all data relating to a person, including a person's name, facilities they are a part of or associated with (e.g., a list of facility identifiers), attributes of the person (age, location, job, company, role, skills, competencies, capabilities, education history, job history, and the like), a list of contacts or relationships of the person (e.g., in a role hierarchy or graph), and any suitable metadata (e.g., date joined, dates actions were taken, dates input was received, and the like).

In embodiments, the data acquisition system generates and maintains one or more graphs based on the retrieved data. In some embodiments, a graph datastore may store the one or more graphs. The graph may be specific to a facility or may be a global graph. The graph may be used in many different applications (e.g., identifying a set of roles, such as for authentication, for approvals, and the like for persons, or identifying system configurations, capabilities, or the like, such as hierarchies of energy producing, computing, networking, or other systems, subsystems and/or resources).

In embodiments, a graph may be stored in a graph database, where data is stored in a collection of nodes and edges. In some embodiments, a graph has nodes representing entities and edges representing relationships, each node may have a node type (also referred to as an entity type) and an entity value, each edge may have a relationship type and may define a relationship between two entities. For example, a person node may include a person ID that identifies the individual represented by the node and a company node may include a company identifier that identifies a company. A "works for" edge that is directed from a person node to a company node may denote that the person represented by the edge node works for the company represented by the company node. In another example, a person node may include a person ID that identifies the individual represented by the node and a facility node may include a facility identifier that identifies a facility. A "manages" edge that is directed from a person node to a facility node may denote that the person represented by the person node is a manager of the facility represented by the facility node. Furthermore in embodiments, an edge or node may contain or reference additional data. For example, a "manages" edge may include a function that indicates a specific function within a facility that is managed by a person. The graph(s) can be used in a number of different applications, which are discussed with respect to the cognitive processing system.

In embodiments, validated Identity information may be imported from one or more identity information providers, as well as data from LinkedIn™ and other social network sources regarding data acquisition and structuring data. In embodiments, the data acquisition system may include an identity management system (not shown in Figs) of the platform may manage identity stitching, identity resolution, identity normalization, and the like, such as determining where an individual represented across different social networking sites and email contacts is in fact the same person. In embodiments, the data acquisition system may include a profile aggregation system (not shown in Figs) that finds and aggregates disparate pieces of information to generate a comprehensive profile for a person. The profile aggregation system may also deduplicate individuals.

Cognitive Processing Systems

Figure 133:
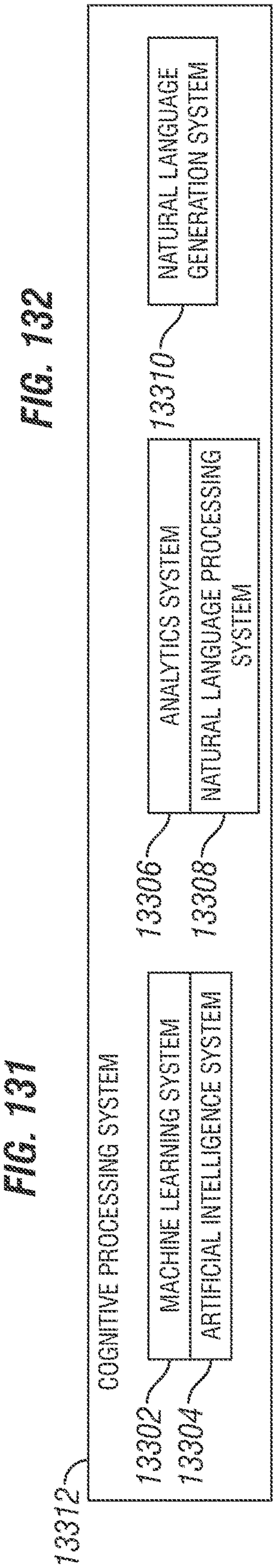
FIG. 133 depicts a cognitive processing system.

The cognitive processing system 13312 may implement one or more of machine learning processes, artificial intelligence processes, analytics processes, natural language processing processes, and natural language generation processes. FIG. 133 illustrates an example cognitive processing system according to some embodiments of the present disclosure. In this example, the cognitive processing system may include a machine learning system 13302, an artificial intelligence (AI) system 13304, an analytics system 13306, a natural language processing system 13308, and a natural language generation system 13310.

Machine Learning System

In embodiments, the machine learning system may train models, such as predictive models (e.g., various types of neural networks, regression based models, and other machine-learned models). In embodiments, training can be supervised, semi-supervised, or unsupervised. In embodiments, training can be done using training data, which may be collected or generated for training purposes.

A facility output model (or prediction model) may be a model that receive facility attributes and outputs one or more predictions regarding the production or other output of a facility. Examples of predictions may be the amount of energy a facility will produce, the amount of processing the facility will undertake, the amount of data a network will be able to transfer, the amount of data that can be stored, the price of a component, service or the like (such as supplied to or provided by a facility), a profit generated by accomplishing a given tasks, the cost entailed in performing an action, and the like. In each case, the machine learning system optionally trains a model based on training data. In embodiments, the machine learning system may receive vectors containing facility attributes (e.g., facility type, facility capability, objectives sought, constraints or rules that apply to utilization of resources or the facility, or the like), person attributes (e.g., role, components managed, and the like), and outcomes (e.g., energy produced, computing tasks completed, and financial results, among many others). Each vector corresponds to a respective outcome and the attributes of the respective facility and respective actions that led to the outcome. The machine learning system takes in the vectors and generates predictive model based thereon. In embodiments, the machine learning system may store the predictive models in the model datastore.

In embodiments, training can also be done based on feedback received by the system, which is also referred to as "reinforcement learning." In embodiments, the machine learning system may receive a set of circumstances that led to a prediction (e.g., attributes of facility, attributes of a model, and the like) and an outcome related to the facility and may update the model according to the feedback.

In embodiments, training may be provided from a training data set that is created by observing actions of a set of humans, such as facility managers managing facilities that have various capabilities and that are involved in various contexts and situations. This may include use of robotic process automation to learn on a training data set of interactions of humans with interfaces, such as graphical user interfaces, of one or more computer programs, such as dashboards, control systems, and other systems that are used to manage an energy and compute management facility.

Artificial Intelligence (AI) Systems

In embodiments, the AI system leverages the predictive models to make predictions regarding facilities. Examples of predictions include ones related to inputs to a facility (e.g., available energy, cost of energy, cost of compute resources, networking capacity and the like, as well as various market information, such as pricing information for end use markets), ones related to components or systems of a facility (including performance predictions, maintenance predictions, uptime/downtime predictions, capacity predictions and the like), ones related to functions or workflows of the facility (such as ones that involved conditions or states that may result in following one or more distinct possible paths within a workflow, a process, or the like), ones related to outputs of the facility, and others. In embodiments, the AI system receives a facility identifier. In response to the facility identifier, the AI system may retrieve attributes corresponding to the facility. In some embodiments, the AI system may obtain the facility attributes from a graph. Additionally or alternatively, the AI system may obtain the facility attributes from a facility record corresponding to the facility identifier, and the person attributes from a person record corresponding to the person identifier.

Examples of additional attributes that can be used to make predictions about a facility or a related process of system include: related facility information; owner goals (including financial goals); client goals; and many more additional or alternative attributes. In embodiments, the AI system may output scores for each possible prediction, where each prediction corresponds to a possible outcome. For example, in using a prediction model used to determine a likelihood that a hydroelectric source for a facility will produce 5 MW of power, the prediction model can output a score for a "will produce" outcome and a score for a "will not produce" outcome. The AI system may then select the outcome with the highest score as the prediction. Alternatively, the AI system may output the respective scores to a requesting system.

Clustering Systems

In embodiments, a clustering system clusters records or entities based on attributes contained herein. For example, similar facilities, resources, people, clients, or the like may be clustered. The clustering system may implement any suitable clustering algorithm. For example, when clustering people records to identify a list of customer leads corresponding to resources that can be sold by a facility, the clustering system may implement k-nearest neighbors clustering, whereby the clustering system identifies k people records that most closely relate to the attributes defined for the facility. In another example, the clustering system may implement k-means clustering, such that the clustering system identifies k different clusters of people records, whereby the clustering system or another system selects items from the cluster.

Analytics System

In embodiments, an analytics system may perform analytics relating to various aspects of the energy and computing resource platform. The analytics system may analyze certain communications to determine which configurations of a facility produce the greatest yield, what conditions tend to indicate potential faults or problems, and the like.

Lead Generation System

Figure 134:
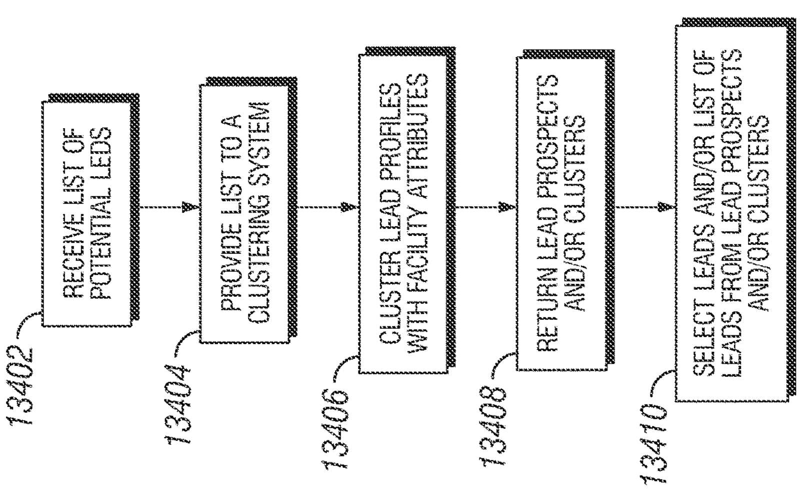
FIG. 134 depicts a process for a lead generation system to generate a lead list.

FIG. 134 shows the manner by which the lead generation system generates a lead list. Lead generation system receives a list of potential leads 13402 (such as for consumers of available products or resources). The lead generation system may provide the list of leads to the clustering system 13404.

The clustering system clusters the profile of the lead with the clusters of facility attributes 13406 to identify one or more clusters. In embodiments, the clustering system returns a list of leads 13410. In other embodiments, the clustering system returns the clusters 13408, and the lead generation system selects the list of leads 13410 from the cluster to which a prospect belongs.

Figure 135:
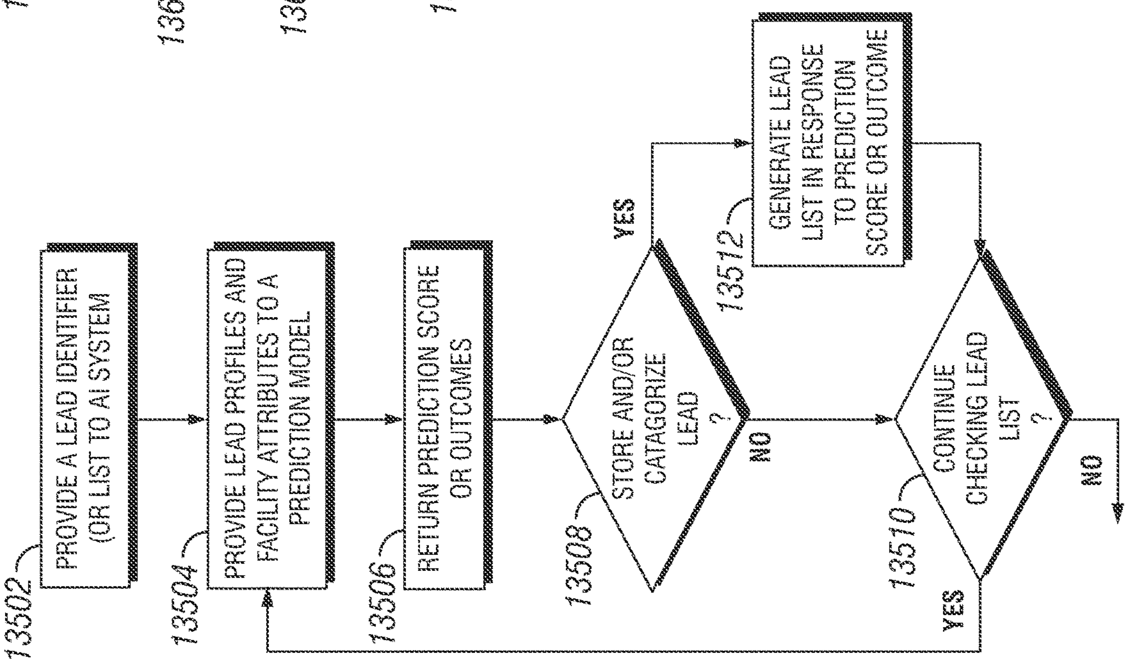
FIG. 135 depicts a process for a lead generation system to determine facility outputs for identified leads.

FIG. 135 illustrates the manner by which the lead generation system determines facility outputs for leads identified in the list of leads. In embodiments, the lead generation system provides a lead identifier of a respective lead to the AI system (step 13502). The AI system may then obtain the lead attributes of the lead and facility attributes of the facility and may feed the respective attributes into a prediction model (step 13504). The prediction model outputs a prediction, which may be scores associated with each possible outcome, or a single predicted outcome that was selected based on its respective score (e.g., the outcome having the highest score) (step 13506). The lead generation system may iterate in this manner for each lead in the lead list. For example, the lead generation system may generate leads that are consumers of compute capabilities, energy capabilities, predictions and forecasts, optimization results, and others.

In embodiments, the lead generation system categorizes the lead (step 13508) and generates a lead list (step 13512) which it provides to the facility operator or host of the systems, including an indicator of the reason why a lead may be willing to engage the facility, such as, for example, that the lead is an intensive user of computing resources, such as to forecast behavior of a complex, multi-variable market, or to mine for cryptocurrency. In embodiments, where more leads are stored and/or categorized, the lead generation system continues checking the lead list (step 13510).

Content Generation Systems

In embodiments, a content generation system of the platform generates content for a contact event, such as an email, text message, or a post to a network, or a machine-to-machine message, such as communicating via an API or a peer-to-peer system. In embodiments, the content is customized using artificial intelligence based on the attributes of the facility, attributes of a recipient (e.g., based on the profile of a person, the role of a person, or the like), and/or relating to the project or activity to which the facility relates. The content generation system may be seeded with a set of templates, which may be customized, such as by training the content generation system on a training set of data created by human writers, and which may be further trained by feedback based on outcomes tracked by the platform, such as outcomes indicating success of particular forms of communication in generating donations to a facility, as well as other indicators as noted throughout this disclosure. The content generation system may customize content based on attributes of the facility, a project, and/or one or more people, and the like. For example, a facility manager may receive short messages about events related to facility operations, including codes, acronyms and jargon, while an outside consumer of outputs from the facility may receive a more formal report relating to the same event.

Figure 136:
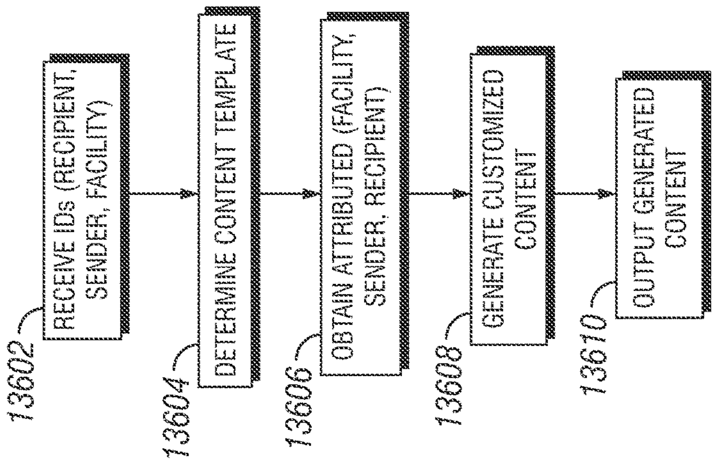
FIG. 136 depicts a process to generate and output personalized content.

FIG. 136 illustrates a manner by which the content generation system may generate personalized content. The content generation system receives a recipient id, a sender id (which may be a person or a system, among others), and a facility id (step 13602). The content generation system may determine the appropriate template (step 13604) to use based on the relationships among the recipient, sender and facility and/or based on other considerations (e.g., a recipient who is a busy manager is more likely to respond to less formal messages or more formal messages). The content generation system may provide the template (or an identifier thereof) to the natural language generation system, along with the recipient id, the sender id, and the facility id. The natural language generation system may obtain facility attributes based on the facility id, and person attributes corresponding to the recipient or sender based on their identities (step 13606). The natural language generation system may then generate the personalized or customized content (step 13608) based on the selected template, the facility parameters, and/or other attributes of the various types described herein. The natural language generation system may output the generated content (step 13610) to the content generation system.

In embodiments, a person, such as a facility manager, may approve the generated content provided by the content generation system and/or make edits to the generated content, then send the content, such as via email and/or other channels. In embodiments, the platform tracks the contact event.

Figure 137:
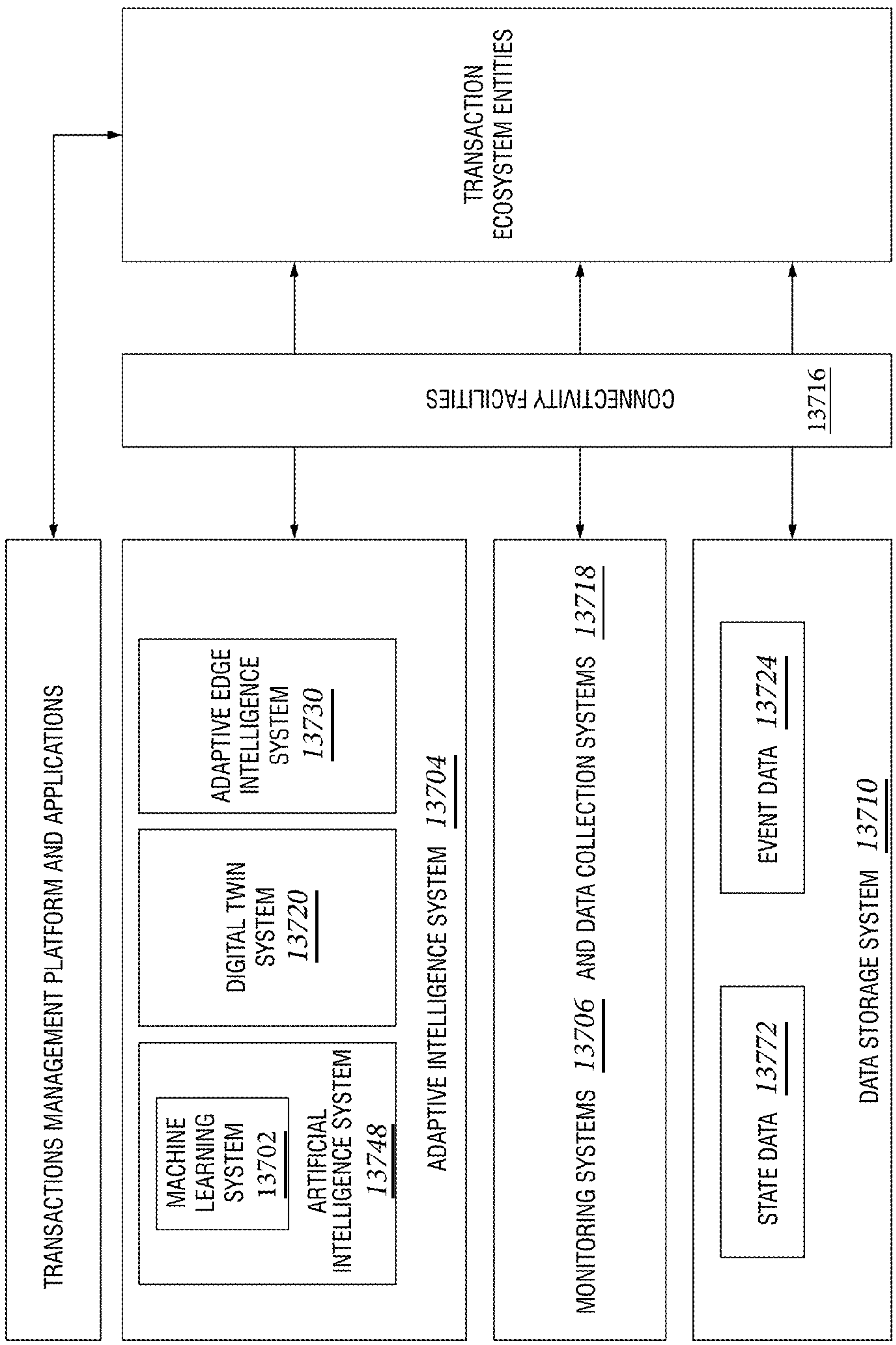
FIG. 137 depicts a schematic illustrating an example of a portion of an information technology system for transaction artificial intelligence leveraging digital twins according to some embodiments of the present disclosure.

Referring to FIG. 137, an adaptive intelligence system 13704 may include an artificial intelligence system 13748, a digital twin system 13720, and an adaptive device (or edge) intelligence system 13730. The artificial intelligence system 13748 may define a machine learning model 13702 for performing analytics, simulation, decision making, and prediction making related to data processing, data analysis, simulation creation, and simulation analysis of one or more of the transaction entities. The machine learning model 13702 is an algorithm and/or statistical model that performs specific tasks without using explicit instructions, relying instead on patterns and inference. The machine learning model 13702 builds one or more mathematical models based on training data to make predictions and/or decisions without being explicitly programmed to perform the specific tasks. The machine learning model 13702 may receive inputs of sensor data as training data, including event data 13724 and state data 13772 related to one or more of the transaction entities through data collection systems 13718 and monitoring systems 13706 and connectivity facilities 13716. The event data 13724 and state data 13772 may be stored in a data storage system 13710 The sensor data input to the machine learning model 13702 may be used to train the machine learning model 13702 to perform the analytics, simulation, decision making, and prediction making relating to the data processing, data analysis, simulation creation, and simulation analysis of the one or more of the transaction entities. The machine learning model 13702 may also use input data from a user or users of the information technology system. The machine learning model 13702 may include an artificial neural network, a decision tree, a support vector machine, a Bayesian network, a genetic algorithm, any other suitable form of machine learning model, or a combination thereof. The machine learning model 13702 may be configured to learn through supervised learning, unsupervised learning, reinforcement learning, self-learning, feature learning, sparse dictionary learning, anomaly detection, association rules, a combination thereof, or any other suitable algorithm for learning.

The artificial intelligence system 13748 may also define the digital twin system 13720 to create a digital replica of one or more of the transaction entities. The digital replica of the one or more of the transaction entities may use substantially real-time sensor data to provide for substantially real-time virtual representation of the transaction entity and provides for simulation of one or more possible future states of the one or more transaction entities. The digital replica exists simultaneously with the one or more transaction entities being replicated. The digital replica provides one or more simulations of both physical elements and properties of the one or more transaction entities being replicated and the dynamics thereof, in embodiments, throughout the lifestyle of the one or more transaction entities being replicated. The digital replica may provide a hypothetical simulation of the one or more transaction entities, for example during a design phase before the one or more transaction entities are constructed or fabricated, or during or after construction or fabrication of the one or more transaction entities by allowing for hypothetical extrapolation of sensor data to simulate a state of the one or more transaction entities, such as during high stress, after a period of time has passed during which component wear may be an issue, during maximum throughput operation, after one or more hypothetical or planned improvements have been made to the one or more transaction entities, or any other suitable hypothetical situation. In some embodiments, the machine learning model 13702 may automatically predict hypothetical situations for simulation with the digital replica, such as by predicting possible improvements to the one or more transaction entities, predicting when one or more components of the one or more transaction entities may fail, and/or suggesting possible improvements to the one or more transaction entities, such as changes to timing settings, arrangement, components, or any other suitable change to the transaction entities. The digital replica allows for simulation of the one or more transaction entities during both design and operation phases of the one or more transaction entities, as well as simulation of hypothetical operation conditions and configurations of the one or more transaction entities. The digital replica allows for invaluable analysis and simulation of the one or more transaction entities, by facilitating observation and measurement of nearly any type of metric, including temperature, wear, light, vibration, etc. not only in, on, and around each component of the one or more transaction entities, but in some embodiments within the one or more transaction entities. In some embodiments, the machine learning model 13702 may process the sensor data including the event data 13724 and the state data 13772 to define simulation data for use by the digital twin system 13720. The machine learning model 13702 may, for example, receive state data 13772 and event data 13724 related to a particular transaction entity of the plurality of transaction entities and perform a series of operations on the state data 13772 and the event data 13724 to format the state data 13772 and the event data 13724 into a format suitable for use by the digital twin system 13720 in creation of a digital replica of the transaction entity. For example, one or more transaction entities may include a robot configured to augment products on an adjacent assembly line. The machine learning model 13702 may collect data from one or more sensors positioned on, near, in, and/or around the robot. The machine learning model 13702 may perform operations on the sensor data to process the sensor data into simulation data and output the simulation data to the digital twin system 13720. The digital twin system 13720 simulation may use the simulation data to create one or more digital replicas of the robot, the simulation including for example metrics including temperature, wear, speed, rotation, and vibration of the robot and components thereof. The simulation may be a substantially real-time simulation, allowing for a human user of the information technology to view the simulation of the robot, metrics related thereto, and metrics related to components thereof, in substantially real time. The simulation may be a predictive or hypothetical situation, allowing for a human user of the information technology to view a predictive or hypothetical simulation of the robot, metrics related thereto, and metrics related to components thereof.

In some embodiments, the machine learning model 13702 and the digital twin system 13720 may process sensor data and create a digital replica of a set of transaction entities of the plurality of transaction entities to facilitate design, real-time simulation, predictive simulation, and/or hypothetical simulation of a related group of transaction entities. The digital replica of the set of transaction entities may use substantially real-time sensor data to provide for substantially real-time virtual representation of the set of transaction entities and provide for simulation of one or more possible future states of the set of transaction entities. The digital replica exists simultaneously with the set of transaction entities being replicated. The digital replica provides one or more simulations of both physical elements and properties of the set of transaction entities being replicated and the dynamics thereof, in embodiments throughout the lifestyle of the set of transaction entities being replicated. The one or more simulations may include a visual simulation, such as a wire-frame virtual representation of the one or more transaction entities that may be viewable on a monitor, using an augmented reality (AR) apparatus, or using a virtual reality (VR) apparatus. The visual simulation may be able to be manipulated by a human user of the information technology system, such as zooming or highlighting components of the simulation and/or providing an exploded view of the one or more transaction entities. The digital replica may provide a hypothetical simulation of the set of transaction entities, for example during a design phase before the one or more transaction entities are constructed or fabricated, or during or after construction or fabrication of the one or more transaction entities by allowing for hypothetical extrapolation of sensor data to simulate a state of the set of transaction entities, such as during high stress, after a period of time has passed during which component wear may be an issue, during maximum throughput operation, after one or more hypothetical or planned improvements have been made to the set of transaction entities, or any other suitable hypothetical situation. In some embodiments, the machine learning model 13702 may automatically predict hypothetical situations for simulation with the digital replica, such as by predicting possible improvements to the set of transaction entities, predicting when one or more components of the set of transaction entities may fail, and/or suggesting possible improvements to the set of transaction entities, such as changes to timing settings, arrangement, components, or any other suitable change to the transaction entities. The digital replica allows for simulation of the set of transaction entities during both design and operation phases of the set of transaction entities, as well as simulation of hypothetical operation conditions and configurations of the set of transaction entities. The digital replica allows for invaluable analysis and simulation of the one or more transaction entities, by facilitating observation and measurement of nearly any type of metric, including temperature, wear, light, vibration, etc. not only in, on, and around each component of the set of transaction entities, but in some embodiments within the set of transaction entities. In some embodiments, the machine learning model 13702 may process the sensor data including the event data 13724 and the state data 13772 to define simulation data for use by the digital twin system 13720. The machine learning model 13702 may, for example, receive state data 13772 and event data 13724 related to a particular transaction entity of the plurality of transaction entities and perform a series of operations on the state data 13772 and the event data 13724 to format the state data 13772 and the event data 13724 into a format suitable for use by the digital twin system 13720 in the creation of a digital replica of the set of transaction entities. For example, a set of transaction entities may include a die machine configured to place products on a conveyor belt, the conveyor belt on which the die machine is configured to place the products, and a plurality of robots configured to add parts to the products as they move along the assembly line. The machine learning model 13702 may collect data from one or more sensors positioned on, near, in, and/or around each of the die machines, the conveyor belt, and the plurality of robots. The machine learning model 13702 may perform operations on the sensor data to process the sensor data into simulation data and output the simulation data to the digital twin system 13720. The digital twin system 13720 simulation may use the simulation data to create one or more digital replicas of the die machine, the conveyor belt, and the plurality of robots, the simulation including for example metrics including temperature, wear, speed, rotation, and vibration of the die machine, the conveyor belt, and the plurality of robots and components thereof. The simulation may be a substantially real-time simulation, allowing for a human user of the information technology to view the simulation of the die machine, the conveyor belt, and the plurality of robots, metrics related thereto, and metrics related to components thereof, in substantially real time. The simulation may be a predictive or hypothetical situation, allowing for a human user of the information technology to view a predictive or hypothetical simulation of the die machine, the conveyor belt, and the plurality of robots, metrics related thereto, and metrics related to components thereof.

In some embodiments, the machine learning model 13702 may prioritize collection of sensor data for use in digital replica simulations of one or more of the transaction entities. The machine learning model 13702 may use sensor data and user inputs to train, thereby learning which types of sensor data are most effective for creation of digital replicate simulations of one or more of the transaction entities. For example, the machine learning model 13702 may find that a particular transaction entity has dynamic properties such as component wear and throughput affected by temperature, humidity, and load. The machine learning model 13702 may, through machine learning, prioritize collection of sensor data related to temperature, humidity, and load, and may prioritize processing sensor data of the prioritized type into simulation data for output to the digital twin system 13720. In some embodiments, the machine learning model 13702 may suggest to a user of the information technology system that more and/or different sensors of the prioritized type be implemented in the information technology near and around the transaction entity being simulation such that more and/or better data of the prioritized type may be used in simulation of the transaction entity via the digital replica thereof.

In some embodiments, the machine learning model 13702 may be configured to learn to determine which types of sensor data are to be processed into simulation data for transmission to the digital twin system 13720 based on one or both of a modeling goal and a quality or type of sensor data. A modeling goal may be an objective set by a user of the information technology system or may be predicted or learned by the machine learning model 13702. Examples of modeling goals include creating a digital replica capable of showing dynamics of throughput on an assembly line, which may include collection, simulation, and modeling of, e.g., thermal, electrical power, component wear, and other metrics of a conveyor belt, an assembly machine, one or more products, and other components of the transaction ecosystem. The machine learning model 13702 may be configured to learn to determine which types of sensor data are necessary to be processed into simulation data for transmission to the digital twin system 13720 to achieve such a model. In some embodiments, the machine learning model 13702 may analyze which types of sensor data are being collected, the quality and quantity of the sensor data being collected, and what the sensor data being collected represents, and may make decisions, predictions, analyses, and/or determinations related to which types of sensor data are and/or are not relevant to achieving the modeling goal and may make decisions, predictions, analyses, and/or determinations to prioritize, improve, and/or achieve the quality and quantity of sensor data being processed into simulation data for use by the digital twin system 13720 in achieving the modeling goal.

In some embodiments, a user of the information technology system may input a modeling goal into the machine learning model 13702. The machine learning model 13702 may learn to analyze training data to output suggestions to the user of the information technology system regarding which types of sensor data are most relevant to achieving the modeling goal, such as one or more types of sensors positioned in, on, or near a transaction entity or a plurality of transaction entities that is relevant to the achievement of the modeling goal is and/or are not sufficient for achieving the modeling goal, and how a different configuration of the types of sensors, such as by adding, removing, or repositioning sensors, may better facilitate achievement of the modeling goal by the machine learning model 13702 and the digital twin system 13720. In some embodiments, the machine learning model 13702 may automatically increase or decrease collection rates, processing, storage, sampling rates, bandwidth allocation, bitrates, and other attributes of sensor data collection to achieve or better achieve the modeling goal. In some embodiments, the machine learning model 13702 may make suggestions or predictions to a user of the information technology system related to increasing or decreasing collection rates, processing, storage, sampling rates, bandwidth allocation, bitrates, and other attributes of sensor data collection to achieve or better achieve the modeling goal. In some embodiments, the machine learning model 13702 may use sensor data, simulation data, previous, current, and/or future digital replica simulations of one or more transaction entities of the plurality of transaction entities to automatically create and/or propose modeling goals. In some embodiments, modeling goals automatically created by the machine learning model 13702 may be automatically implemented by the machine learning model 13702. In some embodiments, modeling goals automatically created by the machine learning model 13702 may be proposed to a user of the information technology system, and implemented only after acceptance and/or partial acceptance by the user, such as after modifications are made to the proposed modeling goal by the user.

In some embodiments, the user may input the one or more modeling goals, for example, by inputting one or more modeling commands to the information technology system. The one or more modeling commands may include, for example, a command for the machine learning model 13702 and the digital twin system 13720 to create a digital replica simulation of one transaction entity or a set of transaction entities, may include a command for the digital replica simulation to be one or more of a real-time simulation, and a hypothetical simulation. The modeling command may also include, for example, parameters for what types of sensor data should be used, sampling rates for the sensor data, and other parameters for the sensor data used in the one or more digital replica simulations. In some embodiments, the machine learning model 13702 may be configured to predict modeling commands, such as by using previous modeling commands as training data. The machine learning model 13702 may propose predicted modeling commands to a user of the information technology system, for example, to facilitate simulation of one or more of the transaction entities that may be useful for the management of the transaction entities and/or to allow the user to easily identify potential issues with or possible improvements to the transaction entities. The system of FIG. 137 may include a transactions management platform and applications.

In some embodiments, the machine learning model 13702 may be configured to evaluate a set of hypothetical simulations of one or more of the transaction entities. The set of hypothetical simulations may be created by the machine learning model 13702 and the digital twin system 13720 as a result of one or more modeling commands, as a result of one or more modeling goals, one or more modeling commands, by prediction by the machine learning model 13702, or a combination thereof. The machine learning model 13702 may evaluate the set of hypothetical simulations based on one or more metrics defined by the user, one or more metrics defined by the machine learning model 13702, or a combination thereof. In some embodiments, the machine learning model 13702 may evaluate each of the hypothetical simulations of the set of hypothetical simulations independently of one another. In some embodiments, the machine learning model 13702 may evaluate one or more of the hypothetical simulations of the set of hypothetical simulations in relation to one another, for example by ranking the hypothetical simulations or creating tiers of the hypothetical simulations based on one or more metrics.

In some embodiments, the machine learning model 13702 may include one or more model interpretability systems to facilitate human understanding of outputs of the machine learning model 13702, as well as information and insight related to cognition and processes of the machine learning model 13702, i.e., the one or more model interpretability systems allow for human understanding of not only "what" the machine learning model 13702 is outputting, but also "why" the machine learning model 13702 is outputting the outputs thereof, and what process led to the machine learning models 13702 formulating the outputs. The one or more model interpretability systems may also be used by a human user to improve and guide training of the machine learning model 13702, to help debug the machine learning model 13702, to help recognize bias in the machine learning model 13702. The one or more model interpretability systems may include one or more of linear regression, logistic regression, a generalized linear model (GLM), a generalized additive model (GAM), a decision tree, a decision rule, RuleFit, Naive Bayes Classifier, a K-nearest neighbors algorithm, a partial dependence plot, individual conditional expectation (ICE), an accumulated local effects (ALE) plot, feature interaction, permutation feature importance, a global surrogate model, a local surrogate (LIME) model, scoped rules, i.e., anchors, Shapley values, Shapley additive explanations (SHAP), feature visualization, network dissection, or any other suitable machine learning interpretability implementation. In some embodiments, the one or more model interpretability systems may include a model dataset visualization system. The model dataset visualization system is configured to automatically provide to a human user of the information technology system visual analysis related to distribution of values of the sensor data, the simulation data, and data nodes of the machine learning model 13702.

In some embodiments, the machine learning model 13702 may include and/or implement an embedded model interpretability system, such as a Bayesian case model (BCM) or glass box. The Bayesian case model uses Bayesian case-based reasoning, prototype classification, and clustering to facilitate human understanding of data such as the sensor data, the simulation data, and data nodes of the machine learning model 13702. In some embodiments, the model interpretability system may include and/or implement a glass box interpretability method, such as a Gaussian process, to facilitate human understanding of data such as the sensor data, the simulation data, and data nodes of the machine learning model 13702.

In some embodiments, the machine learning model 13702 may include and/or implement testing with concept activation vectors (TCAV). The TCAV allows the machine learning model 13702 to learn human-interpretable concepts, such as "running," "not running," "powered," "not powered," "robot," "human," "truck," or "ship" from examples by a process including defining the concept, determining concept activation vectors, and calculating directional derivatives. By learning human-interpretable concepts, objects, states, etc., TCAV may allow the machine learning model 13702 to output useful information related to the transaction entities and data collected therefrom in a format that is readily understood by a human user of the information technology system.

In some embodiments, the machine learning model 13702 may be and/or include an artificial neural network, e.g. a connectionist system configured to "learn" to perform tasks by considering examples and without being explicitly programmed with task-specific rules. The machine learning model 13702 may be based on a collection of connected units and/or nodes that may act like artificial neurons that may in some ways emulate neurons in a biological brain. The units and/or nodes may each have one or more connections to other units and/or nodes. The units and/or nodes may be configured to transmit information, e.g. one or more signals, to other units and/or nodes, process signals received from other units and/or nodes, and forward processed signals to other units and/or nodes. One or more of the units and/or nodes and connections therebetween may have one or more numerical "weights" assigned. The assigned weights may be configured to facilitate learning, i.e., training, of the machine learning model 13702. The weights assigned weights may increase and/or decrease one or more signals between one or more units and/or nodes, and in some embodiments may have one or more thresholds associated with one or more of the weights. The one or more thresholds may be configured such that a signal is only sent between one or more units and/or nodes if a signal and/or aggregate signal crosses the threshold. In some embodiments, the units and/or nodes may be assigned to a plurality of layers, each of the layers having one or both of inputs and outputs. A first layer may be configured to receive training data, transform at least a portion of the training data, and transmit signals related to the training data and transformation thereof to a second layer. A final layer may be configured to output an estimate, conclusion, product, or other consequence of processing of one or more inputs by the machine learning model 13702. Each of the layers may perform one or more types of transformations, and one or more signals may pass through one or more of the layers one or more times. In some embodiments, the machine learning model 13702 may employ deep learning and being at least partially modeled and/or configured as a deep neural network, a deep belief network, a recurrent neural network, and/or a convolutional neural network, such as by being configured to include one or more hidden layers.

In some embodiments, the machine learning model 13702 may be and/or include a decision tree, e.g. a tree-based predictive model configured to identify one or more observations and determine one or more conclusions based on an input. The observations may be modeled as one or more "branches" of the decision tree, and the conclusions may be modeled as one or more "leaves" of the decision tree. In some embodiments, the decision tree may be a classification tree. the classification tree may include one or more leaves representing one or more class labels, and one or more branches representing one or more conjunctions of features configured to lead to the class labels. In some embodiments, the decision tree may be a regression tree. The regression tree may be configured such that one or more target variables may take continuous values.

In some embodiments, the machine learning model 13702 may be and/or include a support vector machine, e.g. a set of related supervised learning methods configured for use in one or both of classification and regression-based modeling of data. The support vector machine may be configured to predict whether a new example falls into one or more categories, the one or more categories being configured during training of the support vector machine.

In some embodiments, the machine learning model 13702 may be configured to perform regression analysis to determine and/or estimate a relationship between one or more inputs and one or more features of the one or more inputs. Regression analysis may include linear regression, wherein the machine learning model 13702 may calculate a single line to best fit input data according to one or more mathematical criteria.

In embodiments, inputs to the machine learning model 13702 (such as a regression model, Bayesian network, supervised model, or other type of model) may be tested, such as by using a set of testing data that is independent from the data set used for the creation and/or training of the machine learning model, such as to test the impact of various inputs to the accuracy of the model 13702. For example, inputs to the regression model may be removed, including single inputs, pairs of inputs, triplets, and the like, to determine whether the absence of inputs creates a material degradation of the success of the model 13702. This may assist with recognition of inputs that are in fact correlated (e.g., are linear combinations of the same underlying data), that are overlapping, or the like. Comparison of model success may help select among alternative input data sets that provide similar information, such as to identify the inputs (among several similar ones) that generate the least "noise" in the model, that provide the most impact on model effectiveness for the lowest cost, or the like. Thus, input variation and testing of the impact of input variation on model effectiveness may be used to prune or enhance model performance for any of the machine learning systems described throughout this disclosure.

In some embodiments, the machine learning model 13702 may be and/or include a Bayesian network. The Bayesian network may be a probabilistic graphical model configured to represent a set of random variables and conditional independence of the set of random variables. The Bayesian network may be configured to represent the random variables and conditional independence via a directed acyclic graph. The Bayesian network may include one or both of a dynamic Bayesian network and an influence diagram.

In some embodiments, the machine learning model 13702 may be defined via supervised learning, i.e., one or more algorithms configured to build a mathematical model of a set of training data containing one or more inputs and desired outputs. The training data may consist of a set of training examples, each of the training examples having one or more inputs and desired outputs, i.e., a supervisory signal. Each of the training examples may be represented in the machine learning model 13702 by an array and/or a vector, i.e., a feature vector. The training data may be represented in the machine learning model 13702 by a matrix. The machine learning model 13702 may learn one or more functions via iterative optimization of an objective function, thereby learning to predict an output associated with new inputs. Once optimized, the objective function may provide the machine learning model 13702 with the ability to accurately determine an output for inputs other than inputs included in the training data. In some embodiments, the machine learning model 13702 may be defined via one or more supervised learning algorithms such as active learning, statistical classification, regression analysis, and similarity learning. Active learning may include interactively querying, by the machine learning model 13702, a user and/or an information source to label new data points with desired outputs. Statistical classification may include identifying, by the machine learning model 13702, to which a set of subcategories, i.e., subpopulations, a new observation belongs based on a training set of data containing observations having known categories. Regression analysis may include estimating, by the machine learning model 13702 relationships between a dependent variable, i.e., an outcome variable, and one or more independent variables, i.e., predictors, covariates, and/or features. Similarity learning may include learning, by the machine learning model 13702, from examples using a similarity function, the similarity function being designed to measure how similar or related two objects are.

In some embodiments, the machine learning model 13702 may be defined via unsupervised learning, i.e., one or more algorithms configured to build a mathematical model of a set of data containing only inputs by finding structure in the data such as grouping or clustering of data points. In some embodiments, the machine learning model 13702 may learn from test data, i.e., training data, that has not been labeled, classified, or categorized. The unsupervised learning algorithm may include identifying, by the machine learning model 13702, commonalities in the training data and learning by reacting based on the presence or absence of the identified commonalities in new pieces of data. In some embodiments, the machine learning model 13702 may generate one or more probability density functions. In some embodiments, the machine learning model 13702 may learn by performing cluster analysis, such as by assigning a set of observations into subsets, i.e., clusters, according to one or more predesignated criteria, such as according to a similarity metric of which internal compactness, separation, estimated density, and/or graph connectivity are factors.

In some embodiments, the machine learning model 13702 may be defined via semi-supervised learning, i.e., one or more algorithms using training data wherein some training examples may be missing training labels. The semi-supervised learning may be weakly supervised learning, wherein the training labels may be noisy, limited, and/or imprecise. The noisy, limited, and/or imprecise training labels may be cheaper and/or less labor intensive to produce, thus allowing the machine learning model 13702 to train on a larger set of training data for less cost and/or labor.

In some embodiments, the machine learning model 13702 may be defined via reinforcement learning, such as one or more algorithms using dynamic programming techniques such that the machine learning model 13702 may train by taking actions in an environment in order to maximize a cumulative reward. In some embodiments, the training data is represented as a Markov Decision Process.

In some embodiments, the machine learning model 13702 may be defined via self-learning, wherein the machine learning model 13702 is configured to train using training data with no external rewards and no external teaching, such as by employing a Crossbar Adaptive Array (CAA). The CAA may compute decisions about actions and/or emotions about consequence situations in a crossbar fashion, thereby driving teaching of the machine learning model 13702 by interactions between cognition and emotion.

In some embodiments, the machine learning model 13702 may be defined via feature learning, i.e., one or more algorithms designed to discover increasingly accurate and/or apt representations of one or more inputs provided during training, e.g. training data. Feature learning may include training via principal component analysis and/or cluster analysis. Feature learning algorithms may include attempting, by the machine learning model 13702, to preserve input training data while also transforming the input training data such that the transformed input training data is useful. In some embodiments, the machine learning model 13702 may be configured to transform the input training data prior to performing one or more classifications and/or predictions of the input training data. Thus, the machine learning model 13702 may be configured to reconstruct input training data from one or more unknown data-generating distributions without necessarily conforming to implausible configurations of the input training data according to the distributions. In some embodiments, the feature learning algorithm may be performed by the machine learning model 13702 in a supervised, unsupervised, or semi-supervised manner.

In some embodiments, the machine learning model 13702 may be defined via anomaly detection, i.e., by identifying rare and/or outlier instances of one or more items, events and/or observations. The rare and/or outlier instances may be identified by the instances differing significantly from patterns and/or properties of a majority of the training data. Unsupervised anomaly detection may include detecting of anomalies, by the machine learning model 13702, in an unlabeled training data set under an assumption that a majority of the training data is "normal." Supervised anomaly detection may include training on a data set wherein at least a portion of the training data has been labeled as "normal" and/or "abnormal."

In some embodiments, the machine learning model 13702 may be defined via robot learning. Robot learning may include generation, by the machine learning model 13702, of one or more curricula, the curricula being sequences of learning experiences, and cumulatively acquiring new skills via exploration guided by the machine learning model 13702 and social interaction with humans by the machine learning model 13702. Acquisition of new skills may be facilitated by one or more guidance mechanisms such as active learning, maturation, motor synergies, and/or imitation.

In some embodiments, the machine learning model 13702 can be defined via association rule learning. Association rule learning may include discovering relationships, by the machine learning model 13702, between variables in databases, in order to identify strong rules using some measure of "interestingness." Association rule learning may include identifying, learning, and/or evolving rules to store, manipulate and/or apply knowledge. The machine learning model 13702 may be configured to learn by identifying and/or utilizing a set of relational rules, the relational rules collectively representing knowledge captured by the machine learning model 13702. Association rule learning may include one or more of learning classifier systems, inductive logic programming, and artificial immune systems. Learning classifier systems are algorithms that may combine a discovery component, such as one or more genetic algorithms, with a learning component, such as one or more algorithms for supervised learning, reinforcement learning, or unsupervised learning. Inductive logic programming may include rule-learning, by the machine learning model 13702, using logic programming to represent one or more of input examples, background knowledge, and hypothesis determined by the machine learning model 13702 during training. The machine learning model 13702 may be configured to derive a hypothesized logic program entailing all positive examples given an encoding of known background knowledge and a set of examples represented as a logical database of facts.

Figure 138:
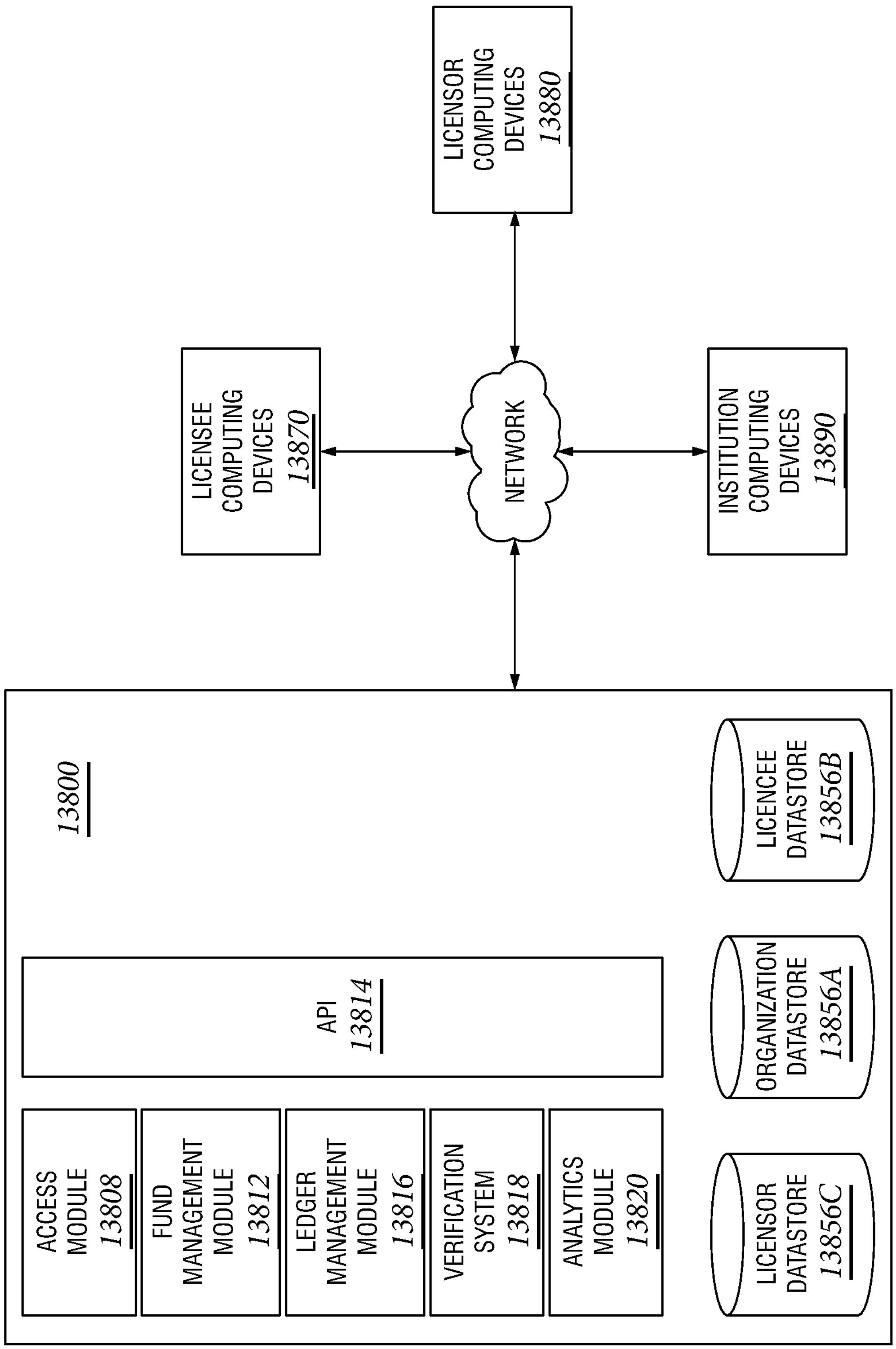
FIG. 138 depicts a schematic illustrating a compliance system that facilitates the licensing of personality rights according to some embodiments of the present disclosure.

Referring to FIG. 138, a compliance system 13800 that facilitates the licensing of personality rights using a distributed ledger and cryptocurrency is depicted. As used herein, personality rights may refer to an entity's ability to control the use of his, her, or its identity for commercial purposes. The term entity, as used herein, may refer to an individual or an organization (e.g., a university, a school, a team, a corporation, or the like) that agrees to license its personality rights, unless context suggests otherwise. This may include an entity's ability to control the use of its name, image, likeness, voice, or the like. For example, an individual exercising their personality rights for commercial purposes may include appearing in a commercial, television show, or movie, making a sponsored social media post (e.g., Instagram post, Facebook post, Twitter tweet, or the like), having their name appear on clothing (e.g., a jersey, t-shirts, sweatshirts, or the like) or other goods, appearing in a video game, or the like. In embodiments, individuals may refer to student athletes or professional athletes, but may include other classes of individuals as well. While the current description makes reference to the NCAA, the system may be used to monitor and facilitate transactions relating to other individuals and organizations. For example, the system may be used in the context of professional sports, where organizations may use sponsorships and other licensing deals to circumvent salary caps or other league rules (e.g., FIFA fair play rules).

In embodiments, the compliance system 13800 maintains one or more digital ledgers that record transactions relating to the licensing of personality rights of entities. In embodiments, a digital ledger may be a distributed ledger that is distributed amongst a set of computing devices 13870, 13880, 13890 (also referred to as nodes) and/or may be encrypted. Put another way, each participating node may store a copy of the distributed ledger. An example of the digital ledger is a Blockchain ledger. In some embodiments, a distributed ledger is stored across a set of public nodes. In other embodiments, a distributed ledger is stored across a set of whitelisted participant nodes (e.g., on the servers of participating universities or teams). In some embodiments, the digital ledger is privately maintained by the compliance system 13800. The latter configuration provides a more energy efficient means of maintaining a digital ledger; while the former configurations (e.g., distributed ledgers) provide a more secure/verifiable means of maintaining a digital ledger.

In embodiments, a distributed ledger may store tokens. The tokens may be cryptocurrency tokens that are transferrable to licensors and licensees. In some embodiments, a distributed ledger may store the ownership data of each token. A token (or a portion thereof) may be owned by the compliance system, the governing organization (e.g., the NCAA), a licensor, a licensee, a team, an institution, an individual or the like. In embodiments, the distributed ledger may store event records. Event records may store information relating to events associated with the entities involved with the compliance system. For example, an event record may record an agreement entered into by two parties, the completion of an obligation by a licensor, the distribution of funds to a licensor from a license, the non-completion of an obligation by a licensor, the distribution of funds to entities associated with the licensee (e.g., teammates, institution, team, etc.), and the like.

In embodiments, the digital ledger may store smart contracts that govern agreements between licensors and licensees. As used herein, a licensee may be an organization or person that wishes to enter an agreement to license a licensor's personality rights. Examples of licensees may include, but are not limited to, a car dealership that wants a star student athlete to appear in a print ad, a company that wants the likeness of a licensor (e.g., an athlete and/or a team) to appear in a commercial, a video game maker that wants to use team names, team apparel, player names and/or numbers in a video game, a shoe maker that wants an athlete to endorse a sneaker, a television show producer that wants an athlete to appear in the television show, or the like. In embodiments, the compliance system 13800 generates a smart contract that memorializes an agreement between the individual and a licensee and facilitates the transfer of consideration (e.g., money) when the parties agree that the individual has performed his or her requirements as put forth in the agreement. For example, an athlete may agree to appear in a commercial on behalf of a local car dealership. The smart contract in this example may include an identifier of the athlete (e.g., an individual ID and/or an individual account ID), an identifier of the organization (e.g., an organization ID and/or an organization account ID), the requirements of the individual (e.g., to appear in a commercial, to make a sponsored social media post, to appear at an autograph signing, or the like), and the consideration (e.g., a monetary amount). In embodiments, the smart contract may include additional terms. In embodiments, the additional terms may include an allocation rule that defines a manner by which the consideration is allocated to the athlete and one or more other parties (e.g., agent, manager, university, team, teammates, or the like). For example, in the context of a student athlete, a smart contract may define a split between the licensing athlete, the athletic department of the student athlete's university, and the student athlete's teammates. In a specific example, a university may have a policy that requires a player appearing in any advertisement to split the funds according to a 60/20/20 split, whereby 60% of the funds are allocated to the student athlete appearing in the commercial, 20% of the funds are allocated to the athletic department, and 20% of the funds are allocated to the student athlete's teammates. When a smart contract verifies that the athlete has performed his or her duties with respect to the smart contract (e.g., appeared for the commercial), the smart contract can transfer the agreed upon amount from an account of the licensee to an account of the athlete and accounts of any other entities that may be allocated a percentage of the funds in the smart contract (e.g., athletic department and teammates).

In embodiments, the compliance system 13800 utilizes cryptocurrency to facilitate the transfer of funds. In embodiments, the cryptocurrency is mined by participant nodes and/or generated by the compliance system. The cryptocurrency can be an established type of cryptocurrency (e.g., Bitcoin, Ethereum, Litecoin, or the like) or may be a proprietary cryptocurrency. In some embodiments, the cryptocurrency is a pegged cryptocurrency that is pegged to a particular fiat currency (e.g., pegged to the US dollar. British Pound, Euro, or the like). For example, a single unit of cryptocurrency (also referred to as a "coin") may be pegged to a single unit of fiat currency (e.g., a US dollar). In embodiments, a licensee may exchange fiat currency for a corresponding amount of cryptocurrency. For example, if the cryptocurrency is pegged to the dollar, the licensee may exchange an amount of US dollars for a corresponding amount of cryptocurrency. In embodiments, the compliance system 13800 may keep a percentage of the real-world currency as a transaction fee (e.g., 5%). For example, in exchanging $10,000, the compliance system 13800 may distribute $9,500 dollars' worth of cryptocurrency to an account of the licensee and may keep the $5,000 dollars as a transaction fee. Once the cryptocurrency is deposited in an account of a licensee, the licensee may enter into transactions with individuals.

In embodiments, the compliance system 13800 may allow organizations to create smart contract templates that define one or more conditions/restrictions on the contract. For example, an organization may predefine the allocation between the licensee, the organization, and any other individuals (e.g., coaches, teammates, representatives). Additionally or alternatively, the organization may place minimum and/or maximum amounts of agreements. Additionally or alternatively, the organization may place restrictions on when an agreement can be entered into and/or performed. For example, players may be restricted from appearing in commercials or advertisements during the season and/or during exam periods. These details may be stored in an organization datastore 13856A Organizations may place other conditions/restrictions in a smart contract. In these embodiments, an individual and licensee wishing to enter to an agreement must use a smart contract template provided by the organization to which the individual belongs. In other words, the compliance system 13800 may only allow an individual that has an active relationship with an organization (e.g., plays on a team of a university) to participate in a smart contract if the smart contract is defined by or otherwise approved by the organization.

In embodiments, the compliance system 13800 manages a clearinghouse process that approves potential licensees. Before a licensee can participate in agreements facilitated by the compliance system 13800, the licensee can provide information relating to the licensee. This may include a tax ID number, an entity name, incorporation information (e.g., state and type), a list of key personnel (e.g., directors, executives, board members, approved decision makers, and/or the like), and any other suitable information. In embodiments, the potential licensee may be required to sign (e.g., eSign or wet ink signature) a document indicating that the organization will not willingly use the compliance system 13800 to circumvent any rules, laws, or regulations (e.g., they will not circumvent NCAA regulations). In embodiments, the compliance system 13800 or another entity (e.g., the NCAA) may verify the licensee. Once verified, the information is stored in a licensee datastore 13856B and the licensee may participate in transactions.

In embodiments, the compliance system 13800 may create accounts for licensors once they have joined an organization (e.g., signed an athletic scholarship with a university). Once a licensor is verified as being affiliated with the organization, the compliance system 13800 may create an account for the licensor and may create a relationship between the individual and the organization, whereby the licensor may be required to use smart contracts that are approved or provided by the organization. Should the licensor join another organization (e.g., transfers to another school), the compliance system 13800 may sever the relationship with the previous organization and may create a new relationship with the other organization. Similarly, once a licensor is no longer affiliated with any organization (e.g., the player graduates, enters a professional league, retires, or the like), the compliance system 13800 may prevent the licensor from participating in transactions on the compliance system 13800.

In embodiments, the compliance system 13800 may provide a graphical user interface that allows users to create smart contracts governing personality rights licenses. In these embodiments, the compliance system allows a user (e.g., a licensor) to select a smart contract template. In some embodiments, the compliance system 13800 may restrict the user to only select a smart contract template that is associated with an institution of the licensor. In embodiments, the graphical user interface allows a user to define certain terms (e.g., the type or types of obligations placed on the licensor, an amount of funds to paid, a date by which the obligations of the licensor must be completed by, a location at which the obligation is completed, and/or other suitable terms). Upon a user providing input for parameterizing a smart contract template, the compliance system 13800 may generate a smart contract by parameterizing one or more variables in the smart contract with the provided input. Upon parameterizing an instance of a smart contract, the compliance system 13800 may deploy the smart contract. In some embodiments, the compliance system 13800 may deploy the smart contract by broadcasting the parameterized smart contract to the participant nodes, which in turn may update each respective instance of the distributed ledger with the new smart contract. In some embodiments, an institution of the licensor must approve the parameterized smart contract before the parameterized smart contract may be deployed to the distributed ledger.

In embodiments, the compliance system 13800 may provide a graphical user interface to verify performance of an obligation by a licensor. In some of these embodiments, the compliance system 13800 may include an application that is accessed by licensors, that allows a licensor to prove that he or she performed an obligation. In some of these embodiments, the application may allow a user to record locations that the licensor went to (e.g., locations of film or photo shoots), to upload records (e.g., screen shots of social media posts) or to provide other corroborating evidence that the licensor has performed his or her obligations with respect to a licensing transaction. In this way, the licensor can prove that he or she performed the tasks required by the licensing deal. In some embodiments, the application may interact with a wearable device or may capture other digital exhaust, such as social media posts of the user (e.g., licensor) to collect evidence that supports or disproves a licensor's claim that he or she performed the obligations under the transaction agreement. In embodiments, the corroborating evidence collected by the application may be recorded by the application and stored on the distributed ledger as a licensor datastore 13856C.

In embodiments, the compliance system 13800 (or a smart contract issued in connection with the compliance system 13800) may complete transactions pertaining to a smart contract governing the licensing of the personality rights of a licensor upon verification that licensor has performed his or her obligations defined in the agreement. As mentioned, the licensor may use an application to provide evidence of satisfaction of the obligations of the agreement. Additionally or alternatively, the licensee may provide verification that the licensor has performed his or her obligations (e.g., using an application). In embodiments, the smart contract governing the agreement may receive verification that the licensor has performed his or her obligations defined by the agreement. In response the smart contract may release (or initiate the release of) the cryptocurrency amount defined in the smart contract. The cryptocurrency amount may be distributed to the accounts of the licensor and any other parties defined in the agreement (e.g., teammates of the licensor, the program of the licensor, the regulating body, or the like).

In embodiments, the compliance system 13800 is configured to perform analytics and provide reports to a regulatory body and/or other entities (e.g., the other organizations). In these embodiments, the analytics may be used to identify individuals that are potentially circumventing the rules and regulations of the regulatory body. Furthermore, in some embodiments, transaction records may be maintained on a distributed ledger, whereby different organizations may be able to view agreements entered into by individuals affiliated with other organizations such that added levels of transparency and oversight may disincentivize individuals, organizations, and/or licensees from circumventing rules and regulations.

In embodiments, the compliance system 13800 may train and/or leverage machine-learned models to identify potential instances of circumvention of rules or regulations. In these embodiments, the compliance system 13800 may train machine-learned models using outcome data. Examples of outcome data may include data relating to a set of transactions where an organization (e.g., a team or university), licensee (e.g., a company), and/or licensor (e.g., an athlete) were determined to be circumventing rules or regulations and data relating to a set of transactions where an organization, licensee, and/or licensor were found to be in compliance with the rules and regulations. Examples of machine-learned models include neural networks, regression-based models, decisions trees, random forests, Hidden Markov Models, Bayesian Models, and the like. In embodiments, the compliance system 13800 may leverage a machine-learned model by obtaining a set of records relating to transactions a licensee, a licensor, and/or an organization (e.g., a team or university) from the distributed ledger. The compliance system may extract relevant features, such as the amount paid to a particular licensor by a licensee, amounts paid to other licensors on other teams, affiliations of the licensor, amounts paid to a licensor by other licensees, and the like, and may feed the features to the machine-learned model. The machine-learned model may issue a score that indicates a likelihood that the transaction was legitimate (or illegitimate) based on the extracted features. In embodiments, the compliance system 13800 may provide notifications to relevant parties (e.g., regulators) when the output of a machine-learned model indicates that a transaction was likely illegitimate.

Figure 139:
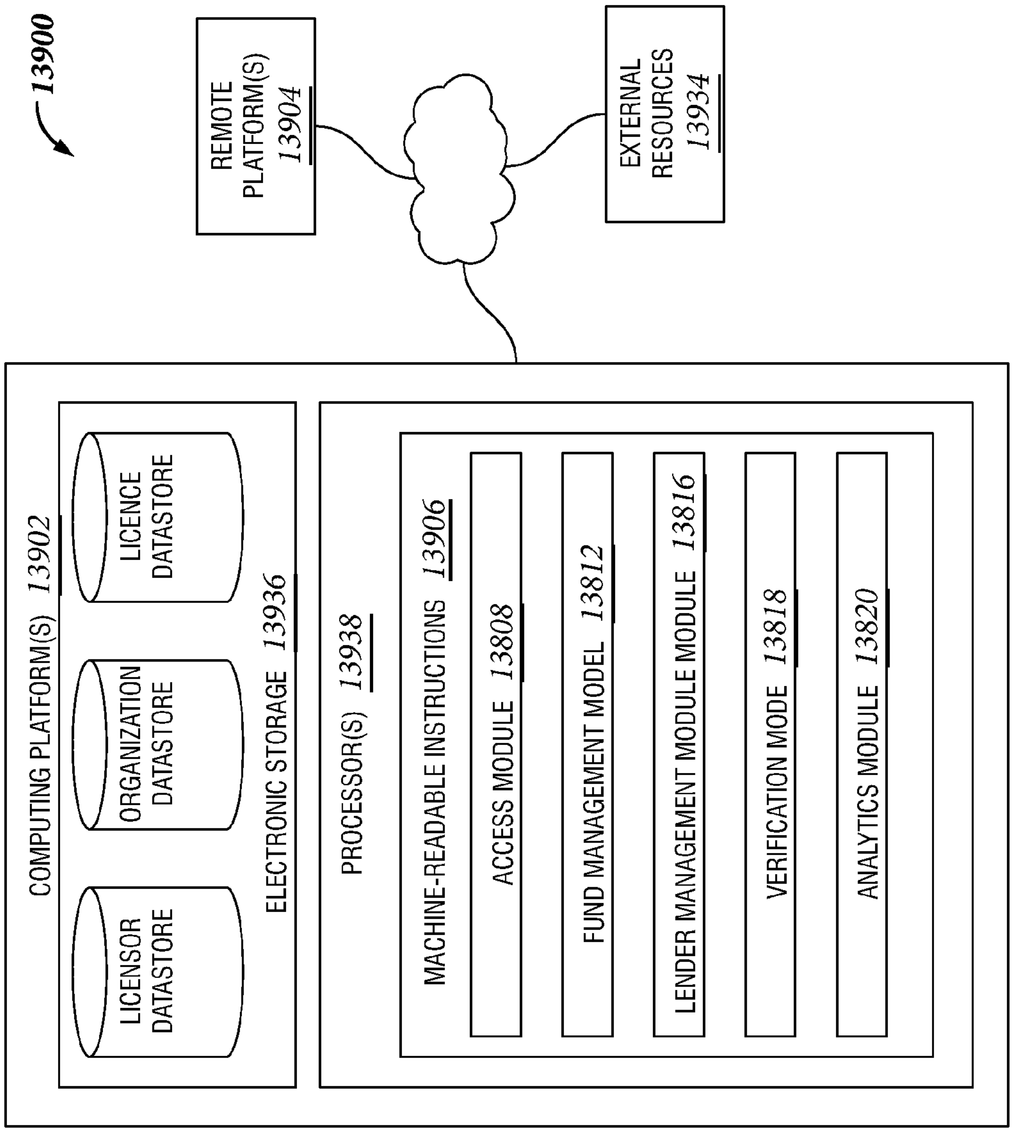
FIG. 139 depicts a schematic illustrating an example set of components of a compliance system according to some embodiments of the present disclosure.

FIG. 139 illustrates an example system 13900 configured for electronically facilitating licensing of one or more personality rights of a licensor, in accordance with some embodiments of the present disclosure. In some embodiments, the system 13900 may include one or more computing platforms 13902. Computing platform(s) 13902 may be configured to communicate with one or more remote platforms 13904 according to a client/server architecture, a peer-to-peer architecture, and/or other architectures. Remote platform(s) 13904 may be configured to communicate with other remote platforms via computing platform(s) 13902 and/or according to a client/server architecture, a peer-to-peer architecture, and/or other architectures. Users may access system 13900 via remote platform(s) 13904.

In embodiments, computing platform(s) 13902 may be configured by machine-readable instructions 13906. Machine-readable instructions 13906 may include one or more instruction modules. The instruction modules may include computer program modules. The instruction modules may include one or more of an access module 13808, a fund management module 13812, a ledger management module 13816, a verification module 13818, an analytics module 13820, and/or other instruction modules.

In embodiments, the access module 13808 may be configured to receive an access request from a licensee to obtain approval to license personality rights from a set of available licensors. In embodiments, the access module 13808 may be configured to selectively grant access to the licensee based on the access request. For example, the access module 13808 may receive a name of a potential licensee (e.g., corporate name), a list of principals (e.g., executives and/or owners) of the potential licensee, a location of the licensee, affiliations of the licensee and the principals thereof, and the like. In embodiments, the access module 13808 may provide this information to a human that grants access and/or may feed this information into an artificial intelligence system that vets potential licensees. In embodiments, the access module 13808 is configured to selectively grant access to a licensor by verifying that the licensee is permitted to engage with a set of licensors including the licensor based on the set of affiliations. Selectively granting access to the licensor may include, in response to verifying that the licensee is permitted to engage with the set of licensors, granting the licensee approval to engage with the set of licensees. The set of affiliations of the licensee may include organizations to which the licensee or a principal associated with the licensee donates to or owns.

In embodiments, the fund management module 13812 may be configured to receive confirmation of a deposit of an amount of funds from the licensee. In some embodiments, the fund management module 13812 may be configured to issue an amount of cryptocurrency corresponding to the amount of funds deposited by the licensee to an account of the licensee. In embodiments, the fund management system 13812 may be configured to escrow the consideration amount of cryptocurrency from the account of the licensee until the funds are released by a smart contract.

In embodiments, the ledger management module 13816 may be configured to receive a smart contract request to create a smart contract governing the licensing of the one or more personality rights of the licensor by the licensee. In embodiments, the ledger management module 13816 may be configured to generate the smart contract based on the smart contract request. The smart contract may be generated using a smart contract template provided by an interested third party (e.g., a university, a governing body, or the like) and by one or more parameters provided by a user (e.g., the licensor, the team of the licensor, an institution, and/or licensee) By way of non-limiting example, the interested third party may be one of a university, a sports team, or a collegiate athletics governance organization. The smart contract request may indicate one or more terms including a consideration amount of cryptocurrency to be paid to the licensor in exchange for one or more obligations on the licensor. In embodiments, the ledger management module 13816 may be configured to deploy the smart contract to a distributed ledger. The distributed ledger may be auditable by a set of third parties, including the interested third party. The distributed ledger may be a public ledger. The distributed ledger may be a private ledger that is only hosted on computing devices associated with interested third parties. In embodiments, the distributed ledger may be a blockchain.

In embodiments, the verification module 13818 may be configured to verify that the licensor has performed the one or more obligation. In some embodiments, verifying that a licensor has performed the one or more obligations may include receiving location data from a wearable device associated with the licensor and verifying that the licensor has performed the one or more obligations based on the location data, whereby the location may be used to show that the licensor was at a particular location at a particular time (e.g., a photoshoot or a filming). In embodiments, verifying that the licensor may have performed the one or more obligations includes receiving social media data from a social media website and verifying that the licensor has performed the one or more obligations based on the social media data, whereby the social media data may be used to show that the licensor has made a required social media posting. In embodiments, verifying that the licensor may have performed the one or more obligations includes receiving media content from an external data source and verifying that the licensor has performed the one or more obligations based on the media content, whereby a licensor and/or licensee may upload the media content to prove that the licensor has appeared in the media content. By way of non-limiting example, the media content may be one of a video, a photograph, or an audio recording. In embodiments, the verification module 13818 may generate and output an event record to the participating nodes upon verifying that a licensor has performed its obligations. In embodiments, the verification module 13818 may generate and output an event record to the participating nodes that indicates that the compliance system 13100 has received corroborating evidence (e.g., social media data, location data, and/or media contents) that show that the licensor has performed his or her obligations. In embodiments, the verification module 13818 may be configured to output an event record indicating completion of a licensing transaction defined by the smart contract to the distributed ledger.

In embodiments, the verification module 13818 may be configured to verify, by the smart contract, that the licensor has performed the one or more obligations. In embodiments, the verification module 13818 and/or a smart contract may be configured to, in response to receiving verification that the licensor has performed the one or more obligations, release at least a portion of the consideration amount of cryptocurrency into a licensor account of the licensor. Releasing the at least a portion of the consideration amount of cryptocurrency into a licensee account of the licensee may include identifying an allocation smart contract associated with the licensee and distributing the consideration amount of the cryptocurrency in accordance with the allocation rules. By way of non-limiting example, the additional entities may include one or more of teammates of the licensor, coaches of the licensor, a team of the licensor, a university of the licensee, and a governing body (e.g., the NCAA).

In embodiments, an analytics module 13820 may be configured to obtain a set of records indicating completion of a set of respective transactions from the distributed ledger. The set of records may include the record indicating the completion of the transaction defined by the smart contract. In embodiments, the analytics module 13820 may be configured to determine whether an organization associated with the licensor is likely in violation of one or more regulations based on the set of records and a fraud detection model. The fraud detection model may be trained using training data that indicates permissible transactions and fraudulent transactions.

In some implementations, the allocation smart contract may define allocation rules governing a manner by which funds resulting from licensing the one or more personality rights are to be distributed amongst the licensor and one or more additional entities.

In some implementations, by way of non-limiting example, the regulations may be provided by one of NCAA, FIFA, NBA, MLB, NFL, MLS, NHL, and the like.

In some implementations, computing platform(s) 13902, remote platform(s) 13904, and/or external resources 13934 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 13902, remote platform(s) 13904, and/or external resources 13934 may be operatively linked via some other communication media.

A given remote platform 13904 may include one or more processors configured to execute computer program modules. The computer program modules may be configured to enable an expert or user associated with the given remote platform 13904 to interface with compliance system 13100 and/or external resources 13934, and/or provide other functionality attributed herein to remote platform(s). 13904. By way of non-limiting example, a given remote platform 13904 and/or a given computing platform 13902 may include one or more of a server, a desktop computer, a laptop computer, a handheld computer, a tablet computing platform, a Netbook, a Smartphone, a gaming console, and/or other computing platforms.

External resources 13934 may include sources of information outside of compliance system 13100, external entities participating with compliance system 13100, and/or other resources. In some implementations, some or all of the functionality attributed herein to external resources 13934 may be provided by resources included in compliance system 13100.

Computing platform(s) 13902 may include electronic storage 13936, one or more processors 13938, and/or other components. Computing platform(s) 13902 may include communication lines, or ports to enable the exchange of information with a network and/or other computing platforms. Illustration of computing platform(s) 13902 in FIG. 139 is not intended to be limiting. Computing platform(s) 13902 may include a plurality of hardware, software, and/or firmware components operating together to provide the functionality attributed herein to computing platform(s) 13902. For example, computing platform(s) 13902 may be implemented by a cloud of computing platforms operating together as computing platform(s) 13902.

Electronic storage 13936 may comprise non-transitory storage media that electronically stores information. The electronic storage media of electronic storage 13936 may include one or both of system storage that is provided integrally (i.e., substantially non-removable) with computing platform(s) 13902 and/or removable storage that is removably connectable to computing platform(s) 13902 via, for example, a port (e.g., a USB port, a firewire port, etc.) or a drive (e.g., a disk drive, etc.). Electronic storage 13936 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 13936 may include one or more virtual storage resources (e.g., cloud storage, a virtual private network, and/or other virtual storage resources). Electronic storage 13936 may store software algorithms, information determined by processor(s) 13938, information received from computing platform(s) 13902, information received from remote platform(s) 13904, and/or other information that enables computing platform(s) 13902 to function as described herein.

Processor(s) 13938 may be configured to provide information processing capabilities in computing platform(s) 13902. As such, processor(s) 13938 may include one or more of a digital processor, an analog processor, a digital circuit designed to process information, an analog circuit designed to process information, a state machine, and/or other mechanisms for electronically processing information. Although processor(s) 13938 is shown in FIG. 139 as a single entity, this is for illustrative purposes only. In some implementations, processor(s) 13938 may include a plurality of processing units. These processing units may be physically located within the same device, or processor(s) 13938 may represent processing functionality of a plurality of devices operating in coordination. Processor(s) 13938 may be configured to execute modules 13808, 13812, 13816, 13818, 13820, and/or other modules. Processor(s) 13938 may be configured to execute modules 13808, 13812, 13816, 13818, 13820, and/or other modules by software; hardware; firmware; some combination of software, hardware, and/or firmware; and/or other mechanisms for configuring processing capabilities on processor(s) 13938. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 13808, 13812, 13816, 13818, and 13820 are illustrated in FIG. 139 as being implemented within a single processing unit, in implementations in which processor(s) 13938 includes multiple processing units, one or more of modules 13808, 13812, 13816, 13818, and 13820 may be implemented remotely from the other modules. The description of the functionality provided by the different modules 13808, 13812, 13816, 13818, and 13820 described below is for illustrative purposes, and is not intended to be limiting, as any of modules 13808, 13812, 13816, 13818, and/or 13820 may provide more or less functionality than is described. For example, one or more of modules 13808, 13812, 13816, 13818, and/or 13820 may be eliminated, and some or all of its functionality may be provided by other ones of modules 13808, 13812, 13816, 13818, and/or 13820. As another example, processor(s) 13938 may be configured to execute one or more additional modules that may perform some or all of the functionality attributed below to one of modules 13808, 13812, 13816, 13818, and/or 13820.

Figure 140:
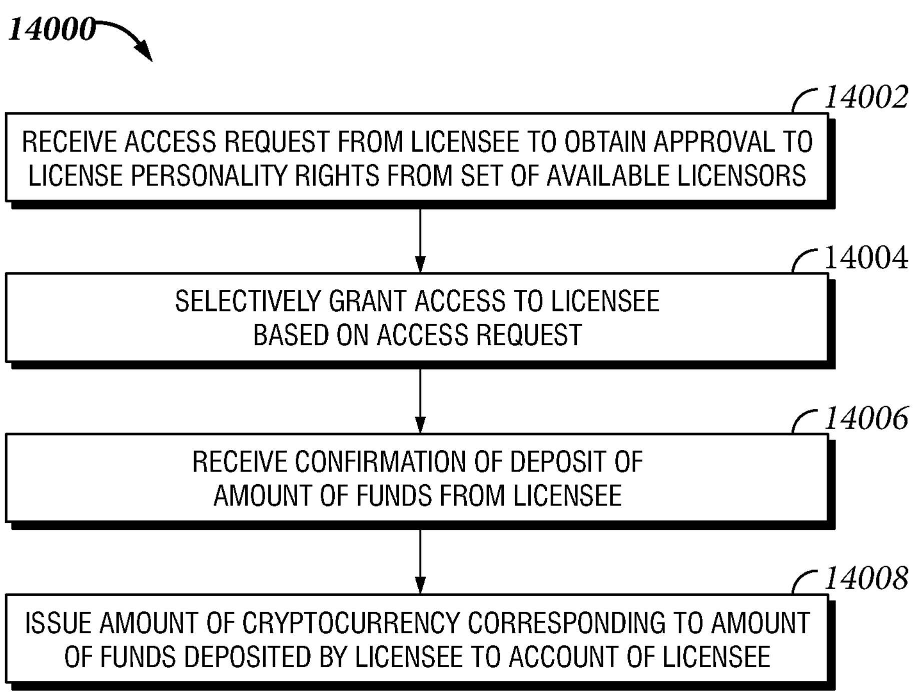
FIG. 140 depicts a set of operations of a method for vetting a potential licensee for purposes of licensing personality rights of a licensor according to some embodiments of the present disclosure.

FIGS. 140 and/or 141 illustrates an example method 14000 for electronically facilitating licensing of one or more personality rights of a licensor, in accordance with some embodiments of the present disclosure. The operations of method 14000 presented below are intended to be illustrative. In some embodiments, method 14000 may be accomplished with one or more additional operations not described, and/or without one or more of the operations discussed. Additionally, the order in which the operations of method 14000 are illustrated in FIGS. 140 and/or 141 and described below is not intended to be limiting.

In some implementations, method 14000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 14000 in response to instructions stored electronically on an electronic storage medium. The one or more processing devices may include one or more devices configured through hardware, firmware, and/or software to be specifically designed for execution of one or more of the operations of method 14000.

FIG. 140 illustrates method 14000, in accordance with one or more implementations of the present disclosure.

At 14002, the method includes receiving an access request from a licensee to obtain approval to license personality rights from a set of available licensors. Operation 14002 may be performed by one or more hardware processors configured by machine-readable instructions including a module that is the same as or similar to access module 13108, in accordance with one or more implementations.

At 14004, the method includes selectively granting access to the licensee based on the access request. Operation 14004 may be performed by one or more hardware processors configured by machine-readable instructions including a module that is the same as or similar to access module 13108, in accordance with one or more implementations.

At 14006, the method includes receiving confirmation of a deposit of an amount of funds from the licensee. Operation 14006 may be performed by one or more hardware processors configured by machine-readable instructions including a module that is the same as or similar to fund management module 13112, in accordance with one or more implementations.

At 14008, the method includes issuing an amount of cryptocurrency corresponding to the amount of funds deposited by the licensee to an account of the licensee. Operation 14008 may be performed by one or more hardware processors configured by machine-readable instructions including a module that is the same as or similar to fund management module 13112, in accordance with one or more implementations.

Figure 141:
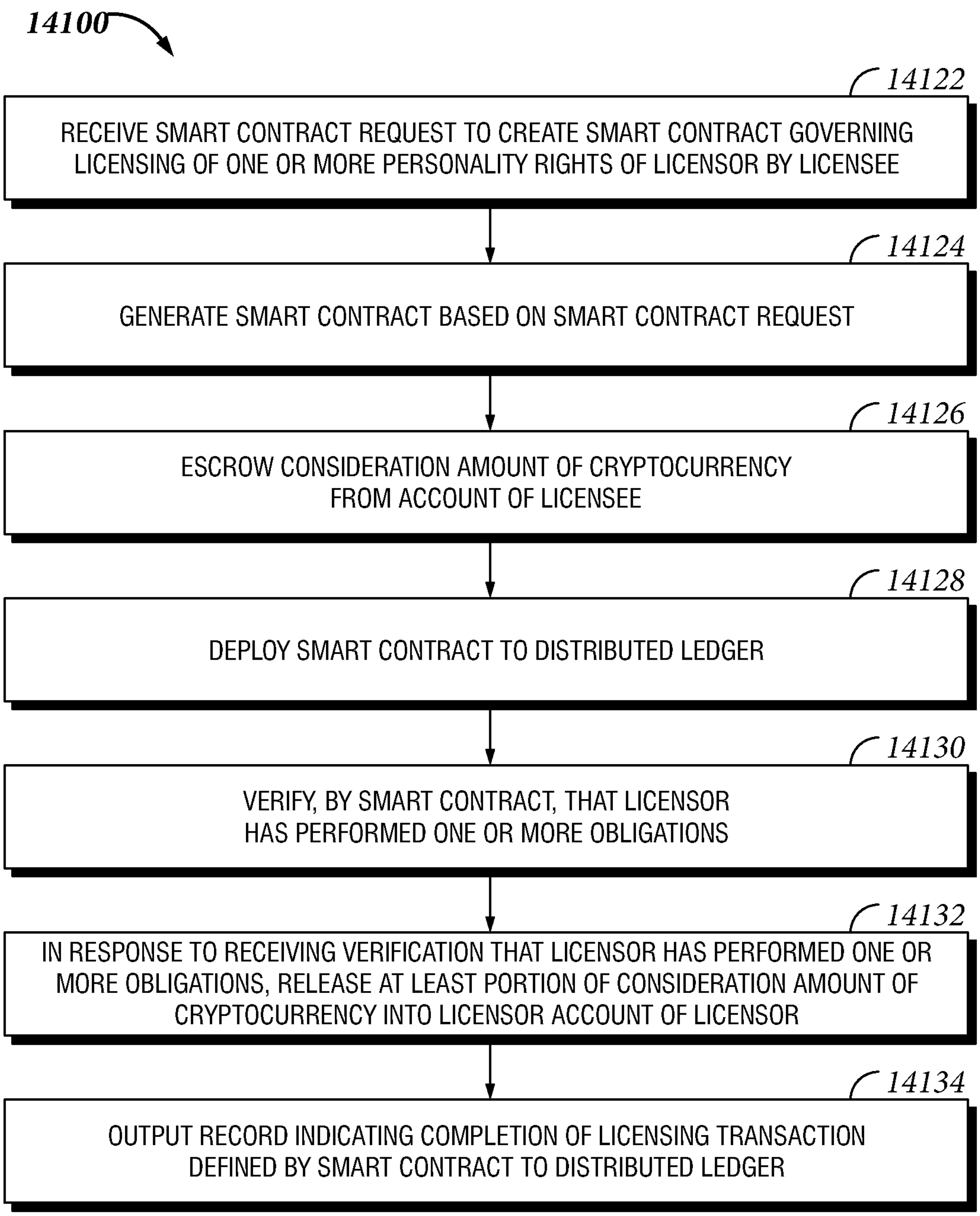
FIG. 141 depicts a set of operations of a method for facilitating the licensing of personality rights of a licensor by a licensee according to some embodiments of the present disclosure.

FIG. 141 illustrates method 14100, in accordance with one or more implementations of the present disclosure.

At 14122, the method includes receiving a smart contract request to create a smart contract governing the licensing of the one or more personality rights of the licensor by the licensee. The smart contract request may indicate one or more terms including a consideration amount of cryptocurrency to be paid to the licensor in exchange for one or more obligations on the licensor. Operation 14122 may be performed by one or more hardware processors configured by machine-readable instructions including a module that is the same as or similar to the ledger management module 13116, in accordance with one or more implementations.

At 14124, the method includes generating the smart contract based on the smart contract request. Operation 14124 may be performed by one or more hardware processors configured by machine-readable instructions including a module that is the same as or similar to ledger management module 13116, in accordance with one or more implementations.

At 14126, the method includes escrowing the consideration amount of cryptocurrency from the account of the licensee. Operation 14126 may be performed by one or more hardware processors configured by machine-readable instructions including a module that is the same as or similar to fund management module 13112, in accordance with one or more implementations.

At 14128, the method includes deploying the smart contract to a distributed ledger. Operation 14128 may be performed by one or more hardware processors configured by machine-readable instructions including a module that is the same as or similar to ledger management module 13116, in accordance with one or more implementations.

At 14130, the method includes verifying, by the smart contract, that the licensor has performed the one or more obligations. Operation 14130 may be performed by one or more hardware processors configured by machine-readable instructions including a module that is the same as or similar to verification module 13118, in accordance with one or more implementations.

At 14132, the method includes in response to receiving verification that the licensor has performed the one or more obligations, releasing at least a portion of the consideration amount of cryptocurrency into a licensor account of the licensor. Operation 14132 may be performed by one or more hardware processors configured by machine-readable instructions including a module that is the same as or similar to the verification module 13118, in accordance with one or more implementations.

At 14134, the method includes outputting a record indicating a completion of a licensing transaction defined by the smart contract to the distributed ledger. Operation 14134 may be performed by one or more hardware processors configured by machine-readable instructions including a module that is the same as or similar to the verification module 13118 and/or the ledger management module 13116, in accordance with one or more implementations.

Figure 142:
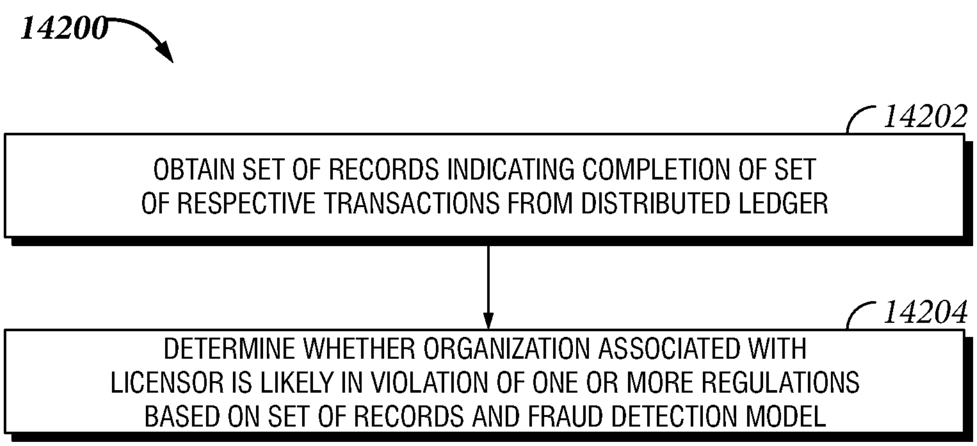
FIG. 142 depicts a set of operations of a method for detecting potential circumvention of rules or regulations by a licensor and/or licensee according to some embodiments of the present disclosure.

FIG. 142 illustrates method 14200, in accordance with one or more implementations.

At 14202, the method includes obtaining a set of records indicating completion of a set of respective transactions from the distributed ledger. The set of records may include the record indicating the completion of the transaction defined by the smart contract. Operation 14202 may be performed by one or more hardware processors configured by machine-readable instructions including a module that is the same as or similar to the analytics module 13120, in accordance with one or more implementations.

At 14204, the method includes determining whether an organization associated with the licensor is likely in violation of one or more regulations based on the set of records and a fraud detection model. Operation 14204 may be performed by one or more hardware processors configured by machine-readable instructions including a module that is the same as or similar to the analytics module 13120, in accordance with one or more implementations.

Figure 143:
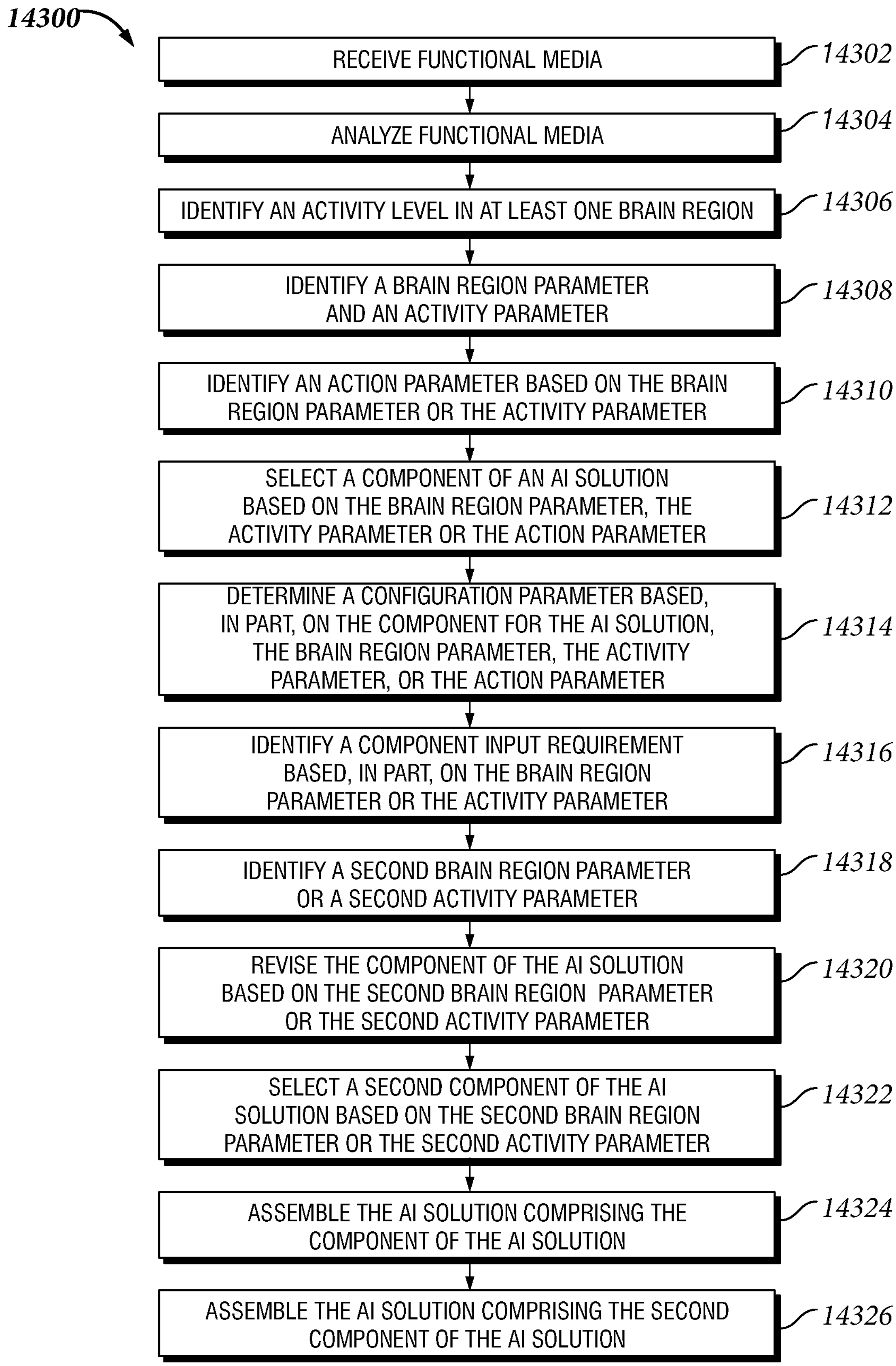
FIG. 143 depicts a method for selecting an AI solution.

Referring to FIG. 143, a computer-implemented method 14300 for selecting an AI solution for use in a robotic or automated process is depicted. The computer-implemented method may include receiving one or more functional media 14302. The functional media may include information indicative of brain activity of a worker engaged in a task to be automated. The functional media may be functional imaging, such an MRI, an FMRI, and the like from which an area of neocortex activity may be identified. The functional media may be an image, a video stream, an audio stream, and the like, from which a type of brain activity may be inferred. The functional media may be acquired while the worker is performing the work or while performing a simulation of the work, for example in an augmented reality, a virtual reality environment, or on a model of the equipment and/or environment. After being received, the functional media(s) are analyzed 14304 to identify an activity level in at least one brain region 14306. Based on the activity level, a brain region parameter and/or an activity parameter are identified 14308. The brain region parameter may represent a specific region of the neocortex such as frontal, parietal, occipital, and temporal lobes of the neocortex, including primary visual cortex and the primary auditory cortex, or subdivisions of the neocortex, including ventrolateral pre-frontal cortex (Broca's area), and orbitofrontal cortex. The activity parameter may represent functional areas of the brain, such as visual processing, inductive reasoning, audio processing, olfactory processing, muscle control, and the like. An activity parameter may be representative of a type of activity in which the worker is engaged such as visual processing (looking) audio processing (listening), olfactory processing (smelling), motion activity, listening to the sound of the equipment, watching another negotiator, and the like. An activity level may be representative of a strength or level of activity, such as an extent of the brain region involved, a signal strength, whether a brain region is engaged or unengaged, and the like.

Based on one or more of the brain region parameter, the activity parameter, or the activity level, an action parameter may be identified 14310. An action parameter may provide additional information regarding the activity parameter. For example, activity parameter is indicative of motion, an action parameter may describe a range of motion, a speed of motion, a repetition of motion, a use of muscle memory, a smoothness of motion, a flow of motion, a timing of motion, and the like. Based on one or more of the brain region parameter, the activity parameter, or the activity level, a component to be incorporated in the final AI solution may be selected 14312. The component may include one or more of a model, an expert system, a neural network, and the like. After the component for the AI solution has been selected, configuration parameters may be determined 14314. The configuration parameters may be based, in part, on the type of component selected, the brain region parameter, the activity parameter, the activity level, or the action parameter. Configuring and configuration parameters may include selecting an input for a machine learning process, identifying an output to be provided by the machine learning process, identifying an input for an operational solution process 14316, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, or setting a parameter threshold. Additionally, analysis of the functional media 14304 may include identifying a second brain region parameter or a second activity parameter 14318. The component of the AI solution may be revised 14320 based on the second brain region parameter or the second activity parameter. A second component of the AI solution may be selected 14322 based on the second brain region parameter or the second activity parameter. The final AI solution may be assembled from the component 14324 or the second component 14326. In embodiments, the final AI solution may be assembled from the component and the second components, optionally along with any standard or mandatory components that enable operation.

Figure 144:
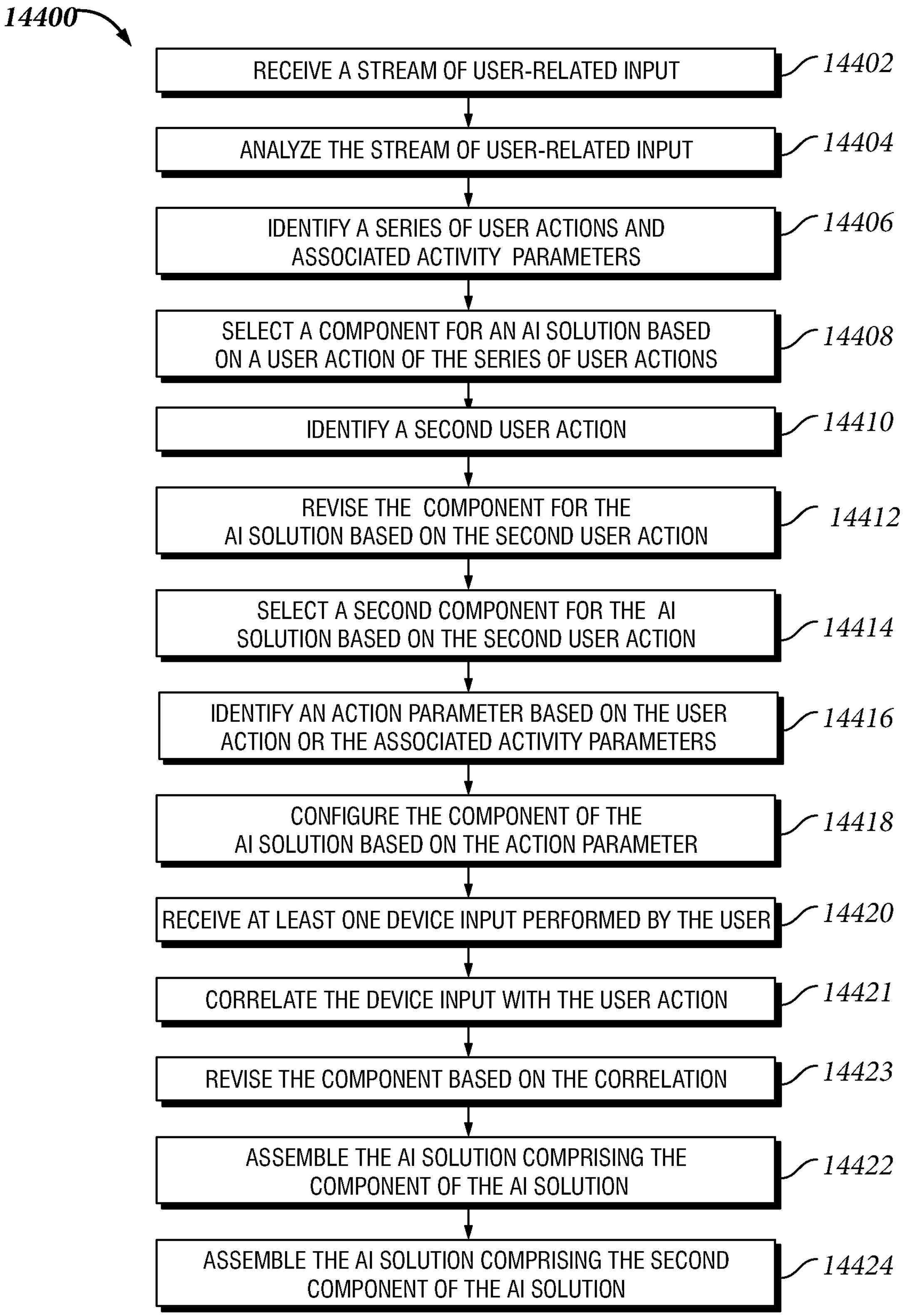
FIG. 144 depicts a method for selecting an AI solution.

Referring to FIG. 144, a computer-implemented method 14400 for selecting an AI solution for use in a robotic or automated process is depicted. The method may include receiving a user-related input 14402 comprising a timestamp and analyzing the user-related input 14404. The user-related input may include an audio feed, a motion sensor, a video feed, a heartbeat monitor, an eye tracker, a biosensor (e.g., galvanic skin response), and the like. The analysis may enable the identification of a series of user actions and associated activity parameters 14406. A component for an AI solution may be selected based on a user action of the series of user actions 14408. The analysis may enable the identification of a second user action of the series of user actions 14410. Based on the second user action, the selected component for the AI solution may be revised 14412. A second component for the AI solution may be selected 14414 based on the second user action. An action parameter may be identified 14416 based on the user action and/or the associated activity parameters. For example, if the user action is motion, an action parameter may include a range of motion, a speed of motion, a repetition of motion, a use of muscle memory, a smoothness of motion, a flow of motion, a timing of motion, and the like. The selected component of the AI solution may be configured 14418 based on the action parameter. In embodiments, at least one device input performed by the user may be received (14420). The device input may be synchronized with the user actions based on the timestamp and a correlation between the device input and the user action determined 14419. The component may be revised 14423 based on the correlation. The selection of the component of the AI solution may be partially based on the correlation between the device input and the user-related input 14421. The AI solution may be assembled 14422 from the component. The AI solution may be assembled from the second component 14424. In embodiments, the AI may be assembled from both the component and the second component, optionally along with any standard or mandatory components that enable operation.

Figure 145:
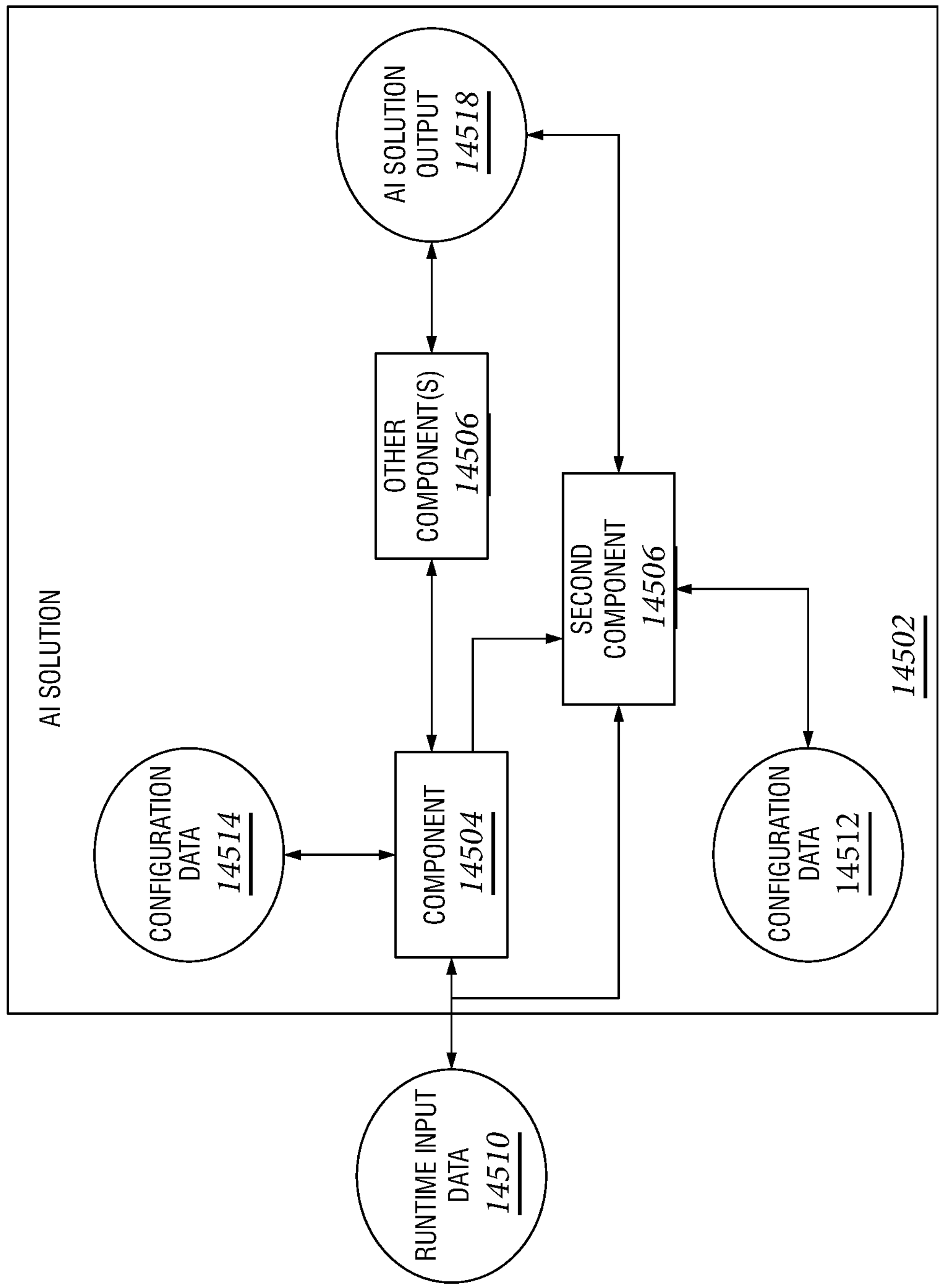
FIG. 145 depicts an example of an assembled AI solution.

Referring to FIG. 145, an illustrative and non-limiting example of an assembled AI solution 14502 is shown. The assembled AI solution 14502 may include the selected component 14504 and a second selected component 14506, as well as other components 14508. Configuration data 14514 for the first selected component and configuration data 14512 for the second selected component may be provided. Runtime input data 14510 may be specified as part of the component configuration process. Components may be structured to run serially (such as the selected component 14504 and the second selected component 14506 which received input from the selected component 14504) or in parallel (such as the second component 14506 and the other component(s) 14508). Some of the components may provide input for other components (such as the selected component 14504 providing input to the second selected component 14506). Multiple components may provide various portions of the overall AI solution output 14518 (such as the second selected component 14506 and the other components 14508). This depiction is not meant to be limiting and the final solution may include a varying number of components, configuration data and input, as well as other components (e.g., sensors, voice modulators, and the like) and may be interconnected in a variety of configurations.

Figure 146:
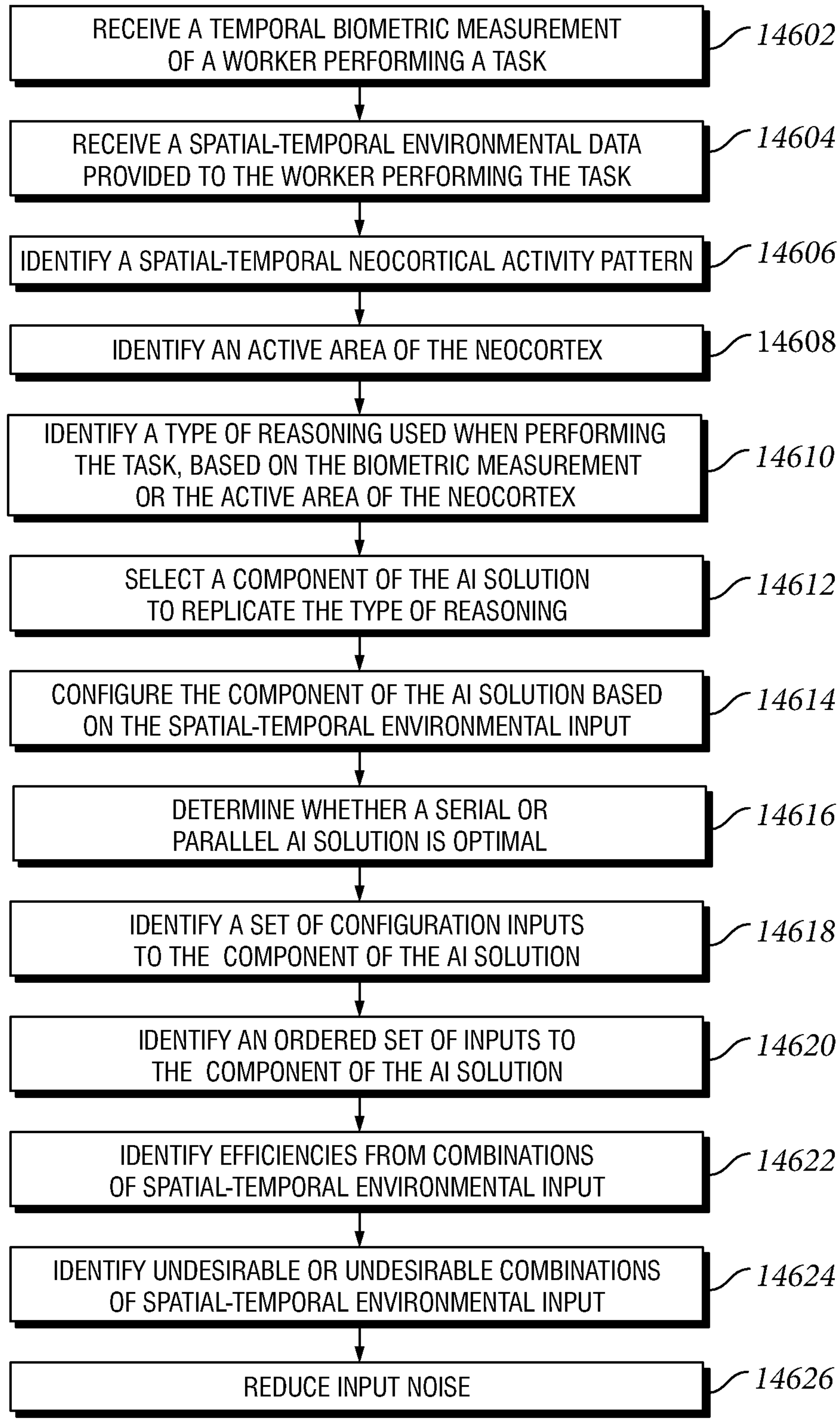
Figure 147:
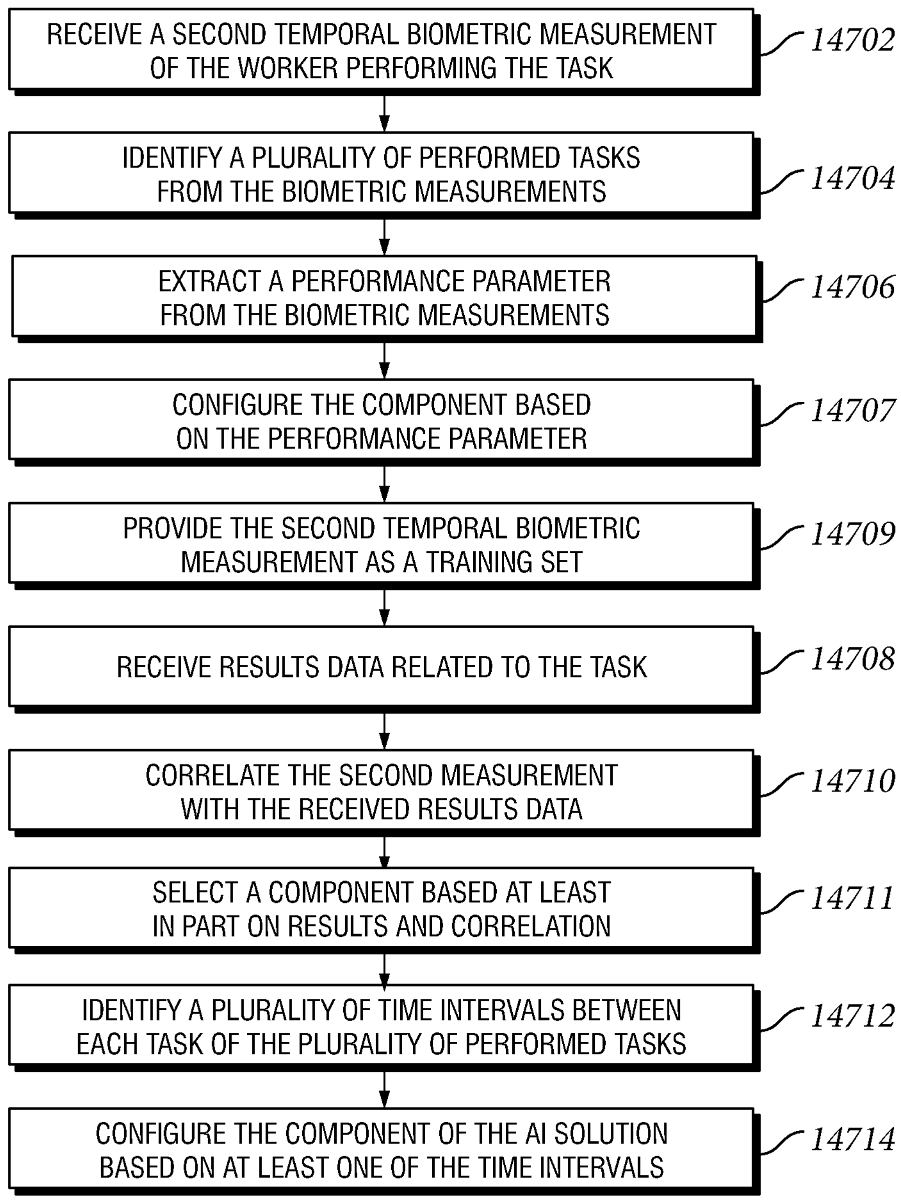
Figure 148:
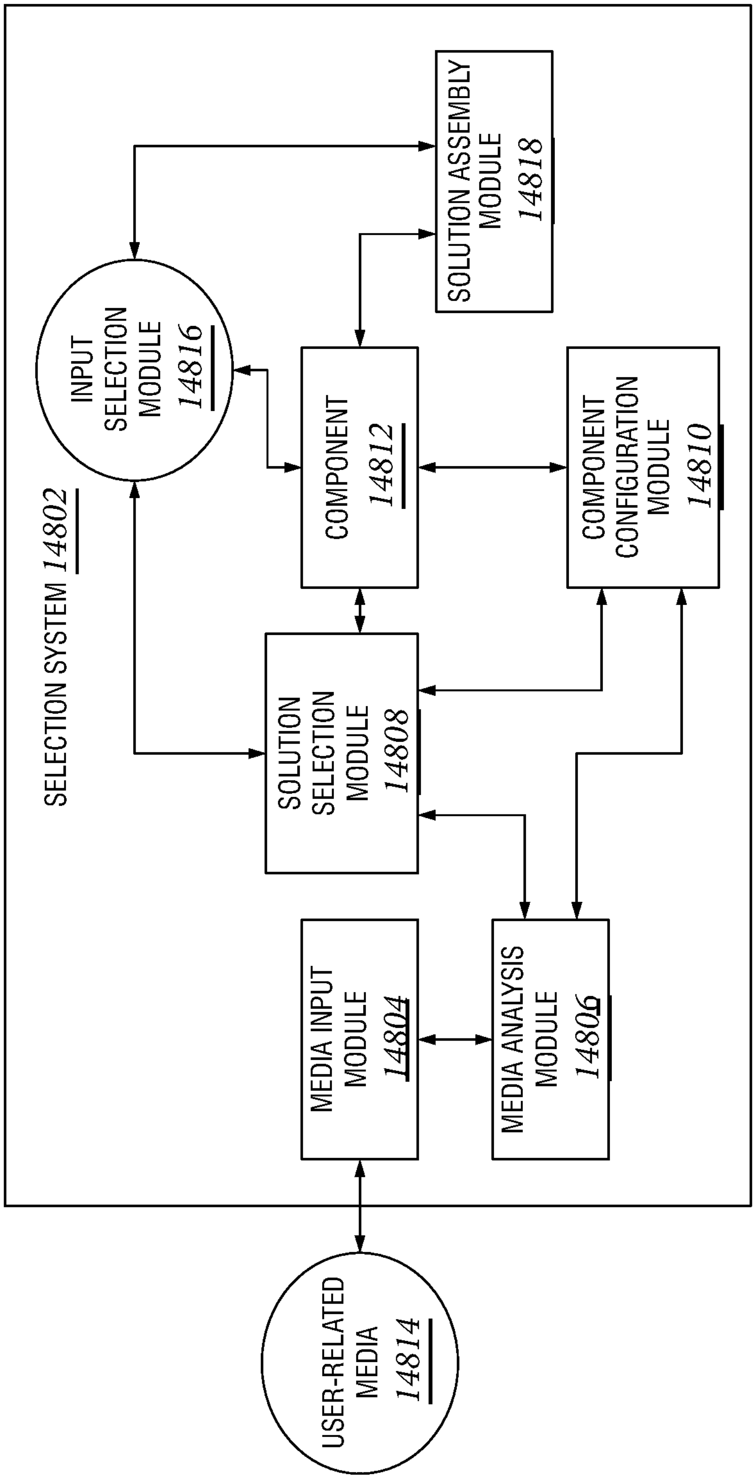

Referring to FIGS. 146-147, a computer-implemented method for selecting an AI solution for use in a robotic or automated process is depicted. The method may include receiving temporal biometric measurement data 14602 of a worker performing a task and receiving spatial-temporal environmental data 14604 experienced by the worker performing the task. Using the received data, a spatial-temporal activity pattern may be identified 14606. Based on the spatial-temporal activity pattern, an active area of the worker's neocortex may be identified 14608. A type of reasoning used when performing the task may be identified 14610 based on the active area of the neocortex and/or the biometric measurement data, or the spatial-temporal environmental data. A component may be selected 14612 for use in the AI solution to replicate the type of reasoning. The component of the AI solution may be configured 14614 based on the spatial-temporal environmental input. A determination may be made as to whether a serial or parallel AI solution is optimal 14616. A set of configuration inputs to the component may be identified 14618 and an ordered set of inputs to the component of the AI solution may be identified 14620. Training the machine may include providing various subsets of the spatial-temporal environmental input to determine appropriate input weightings and identify efficiencies from combinations of spatial-temporal environmental input 14622. Desirable or undesirable combinations of the spatial-temporal environmental data may also be identified 14624. Based on the identified required input, input environmental data may be processed to reduce input noise 14626 (e.g. improve signal to noise for a signal of interest), filtered to provide the appropriate input signals to the component, and the like.

Continuing with reference to FIG. 147, a second temporal biometric measurement data of the same worker performing the task may be received 14702 and a plurality of performed tasks identified from the biometric measurements 14704. A performance parameter may be extracted from the biometric measurements 14706 (e.g. worker heartrate, galvanic skin response, and the like). In some embodiments, the component may be configured based on the performance parameter 14707. In some embodiments, the second temporal biometric measurements may be provided to the configuration module as a training set 14709. Results data related to the task may be received 14708 and the second temporal biometric measurement data may be correlated with the received results data 14710. In some embodiments, the component may be selected based, at least in part, on the correlation 14711. A series of time intervals between each of the plurality of performed tasks may be identified 14712 and the component of the AI solution configured based on at least one of the time intervals 14714. For example, if the worker inspects an object for a long period of time before moving on to the next action, this may indicate complex visual processing as well as mental processing and may indicate that the corresponding component for the task be configured for in-depth, fine detail processing and the like.

Referring to FIG. 141, an AI solution selection and configuration system 14102 is depicted. An example selection and configuration system 14102 may include a media input module 14104 structured to receive user-related functional media 14114. The user-related functional media 14114 may include images of a person engaged in a task to be automated, audio recordings, video feeds, biometric data (e.g., heartbeat data, galvanic skin response data, and the like), motion data, and the like. A media analysis module 14106 may analyze the received media and identify an action parameter. The action parameter may be representative of a type of activity in which the person appears to be engaged such as watching, listening, moving, thinking, and the like. In some embodiments, the functional media is indicative of a type of brain activity of a human engaged in the task to be automated and the media analysis module 14126 identifies an activity level in at least one brain region and provide a brain region parameter corresponding with the activity level in the identified brain region. The media analysis module may also identify an activity parameter indicative of a level of engagement such as engaged, unengaged, level of activity, type of activity, and the like. A solution selection module 14108 may be structured to select at least one component of the AI solution for use in the automated process based, at least in part, on the action parameter, the brain region parameter, or the activity parameter. The brain region parameter or the action parameter may suggest a type of component to select and the activity parameter may suggest a level of processing required for that component. For example, an action parameter of watching would suggest selecting a component suited to visual processing. If the activity parameter was representative of olfactory procession, the input specification module may identify at least one chemical sensor as an input. If the activity parameter is representative of visual processing the input specification module 13116 may identify at least one visual sensor as a robotic input. In some embodiments, the visual sensor may be selected to be sensitive to a portion of the visible spectrum with wavelengths between about 380 to 700 nanometers. If the activity parameter is representative of auditory processing, the input specification module 13116 may identify at least one microphone as a robotic input. If the activity parameter was representative of a very high level of concentration, the solution selection module 14108 may suggest a level of processing that will be required, where the processing might occur, and the like. A component configuration module 14110 may configure the component 14112. Configuring the component may include: selecting an input for a machine learning process for the selected component, identifying an output to be provided by the machine learning process, identifying an input for an operational solution process, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, setting a parameter threshold, and the like. A solution assembly module 14118 may assemble the final AI solution based on one or more selected components, configuration components, and required runtime. An input specification module 14116 may suggest input sources based on the selected component, the action parameter, brain region parameter, activity parameter, or the like.

Figure 149:
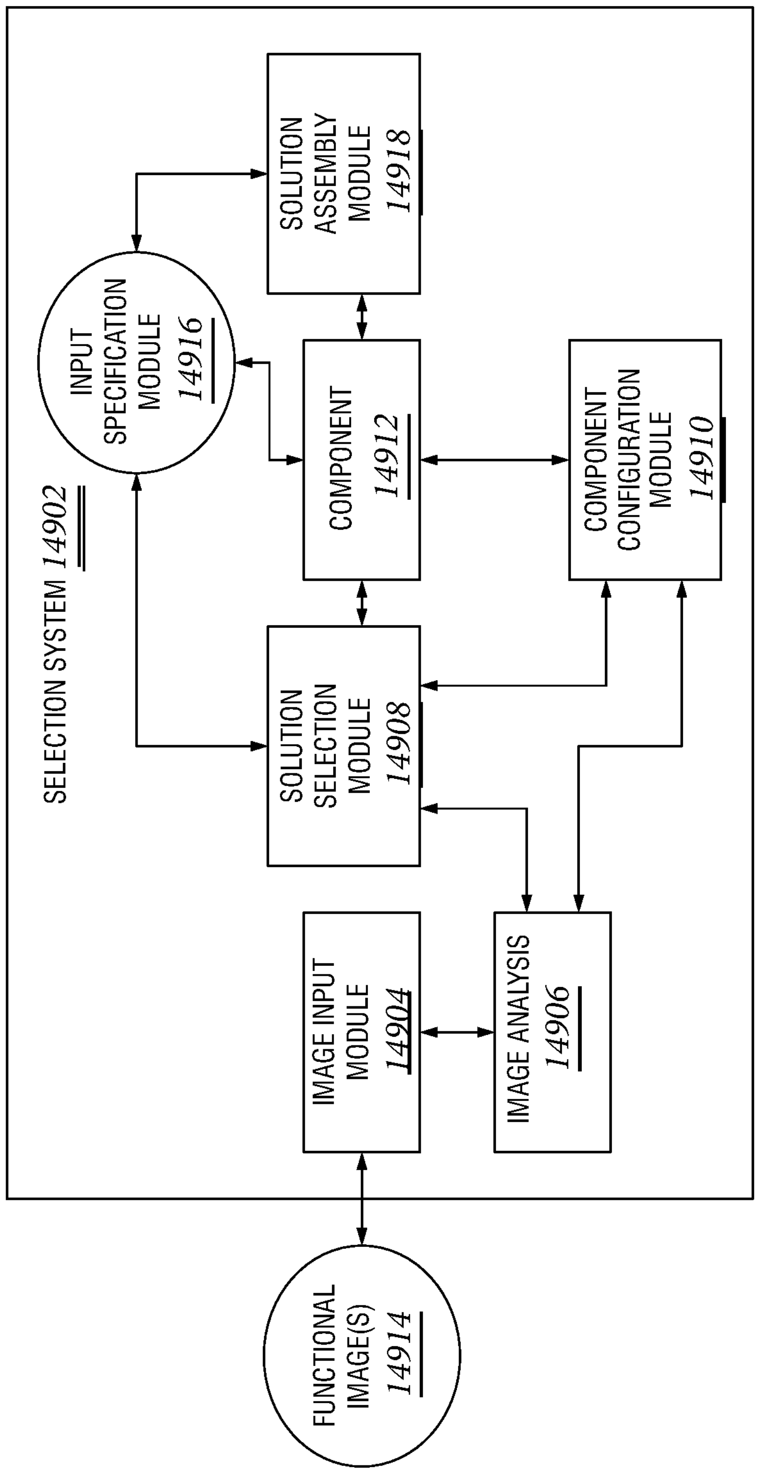
Figure 150:
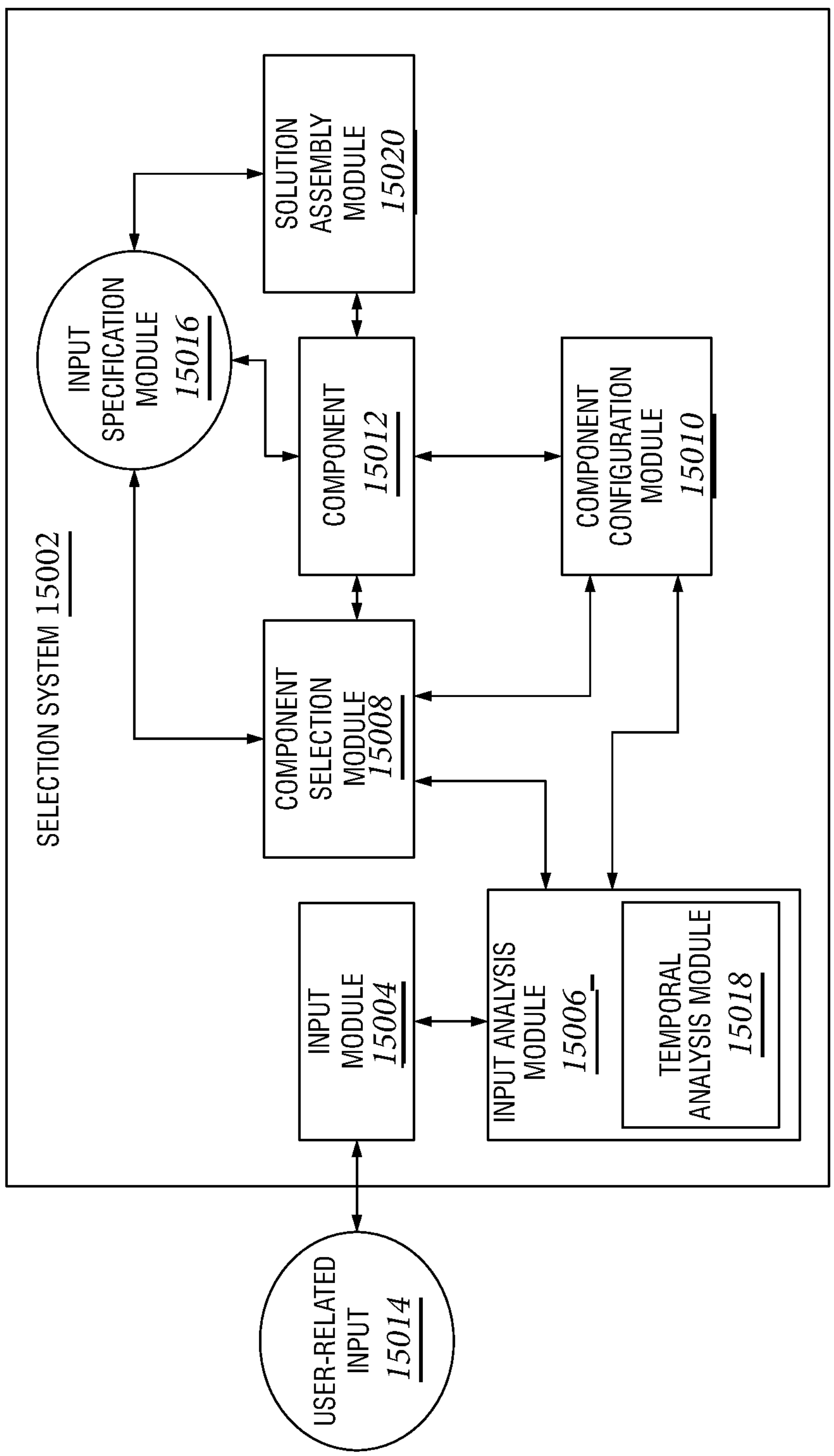

Referring to FIG. 149, an AI solution selection and configuration system 14902 is depicted. An example selection system 14902 may include an image input module 14904 structured to receive functional images 14914 of the brain such as, such as functional MRI or other magnetic imaging, electroencephalogram (EEG), or other imaging, such as by identifying broad brain activity (e.g., wave bands of activity, such as delta, theta, alpha and gamma waves), by identifying a set of brain regions that are activated and/or inactive while the worker is performing one of the tasks to be automated. The image input module 14904 may provide a subset of the functional images 14914 to the image analysis module 14906. In some embodiments, the image input module 14904 may perform some preprocessing for the subset of functional images 14914, such as noise reduction, histogram adjustment, filtering, and the like, prior to providing the subset of functional images 14914 to the image analysis module 14906. The image analysis module 14906, may identify an activity level in at least one brain region and provide a brain region parameter based on the subset of functional images. The brain region parameter may represent a specific region of the neocortex such as frontal, parietal, occipital, and temporal lobes of the neocortex, including primary visual cortex and the primary auditory cortex, or subdivisions of the neocortex, including ventrolateral prefrontal cortex (Broca's area), and orbitofrontal cortex. The brain region parameter may represent functional areas of the brain, such as visual processing, inductive reasoning, audio processing, olfactory processing, muscle control, and the like. A solution selection module 14908 may select a component for use in an AI solution based on the brain region parameter, and provide input into a component configuration module (such as selecting an input for a machine learning process, identifying an output to be provided by the machine learning process, identifying an input for an operational solution process, identifying an output an operational solution process, tuning a learning parameter, identifying a change rates, identifying a weighting factor, identifying a parameter for inclusion, identifying a parameter for exclusion of a parameter, setting a threshold for input data, setting an output threshold for the operational robotic process, and setting a parameter threshold, and the like. The component configuration module 14910, may use the input to configure the component 14912. The solution selection module 14908 may also supply data to the input specification module 14916. A solution assembly module 14918 may combine the component, and other components, to create the AI solution. The AI solution may be set up to receive inputs as specified by the input specification module 14916. Although one iteration of selecting a component is shown in this figure, it is envisioned, that multiple components may be selected, configured and assembled as part of the AI solution Referring to FIGS. 150-151, an AI solution selection and configuration system 15002 is depicted. An example AI solution selection and configuration system 15002 may include an input module 15004 structured to receive a variety of user-related input such as videos, audio recording, heartbeat monitors, galvanic skin response data, motion data, and the like. There may be temporal data associated with the user-related input. The input module 15004 may provide a subset of the user-related input data 15014 to the input analysis module 15006. The analysis module 15006 may include a temporal analysis module 15018 to identify timing of user-related actions. The temporal analysis module 15018 may enable identification of timing of user actions. In some embodiments the input module 15004 may perform some preprocessing for the subset of the user-related input data 15014, such as noise reduction, correlation between types of input data, and the like, prior to providing the subset of user-related input data 15014 to the input analysis module 15006. The input analysis module 15006, may identify a type of brain activity being engaged in (e.g. visual processing, auditory processing, olfactory processing, motion control, and the like) and a level of intensity of activity based on data such as heartbeat data, galvanic skin response data and the like. A component selection module 15008 may select a component for use in an AI solution based on the type of brain activity and provide input into a component configuration module 15010 which may include an ML input selection module 15102 for selecting an input for a machine learning process, an MP output identification module 15104 for identifying an output to be provided by the machine learning process, a runtime input selection module 15106 for identifying an input for an operational solution process, a runtime output identification module 15108 for identifying an output of the component, a settings module 15110 for identifying a change rate, identifying a weighting factor, setting a threshold for input data, setting an output threshold for the operational robotic process, and the like, a parameter settings module 15112 for tuning a learning parameter, identifying a parameter for inclusion, identifying a parameter for exclusion, setting a parameter threshold, and the like. The component configuration module 15010 may configure the selected component 15012. The component selection module 15008 may also supply data to the input specification module 15016. An AI solution assembly module 15020 may combine the configured component with other components, along with any standard or mandatory components, as necessary, to create the AI solution. The AI solution may be set up to receive inputs as specified by the input specification module 15016. Although one iteration of selecting a component is shown in this figure, it is envisioned, that multiple components may be selected, configured and assembled as part of the AI solution.

Figure 152:
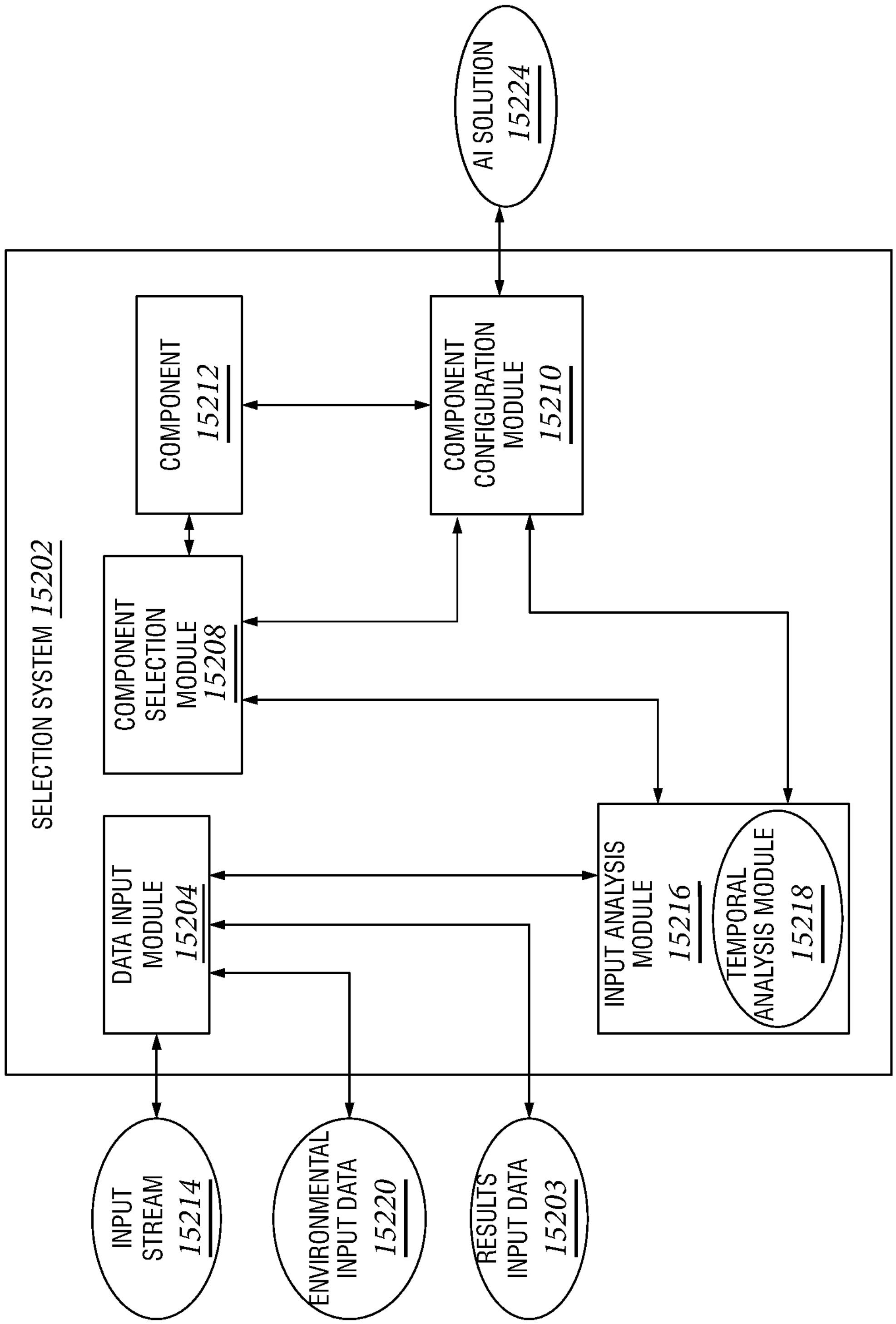

In embodiments, referring to FIG. 152, an AI solution selection and configuration system 15202 is depicted. An example AI solution selection and configuration system 15202 may include a data input module 15204 to receive an input stream including temporal user-related data 15214 which may include video streams, audio streams, equipment interactions (e.g. mouse clicks, mouse motion, physical input to a machine) user biometrics such as heartbeat, galvanic skin response, eye tracking, and the like. The data input module 15204 may also receive temporal environmental input data 15220 representative of environmental input the user is receiving such as a visual environment, an auditory environment, olfactory environment, equipment displays, a device user interface, and the like. The data input module 15204 may also receive temporal results input data 15203. The data input module 15204 may provide a subset of the received data 15214, 15220, 15203 to an input analysis module 15216. The data input module 15204 may process the received data 15214, 15220 15203 to reduce noise, compress the data, correlate some of the data, and the like. The analysis module 15216 may identify a plurality of user actions to provide to the component selection module 15208. The image analysis module 15216 may include a temporal analysis module 15218 to identify timing of user actions. The temporal analysis module 15218 may allow for the correlation between temporal user-related data 15214, environmental data 15220, and results data 15203. Based on the user actions, the component selection module 15208 may select a component that would simulate one or more mental processes of the user needed to perform at least one of the plurality of user actions. Factors in identifying the selected component may include the level of computational intensity needed, time sensitivity, and the like. This may dictate a type of component, a location of component (on-board, in the cloud, edge-computing, and the like. The input analysis module 15216 may also provide information regarding the user's actions and environmental data to the component configuration module 15210. This data may be used by the component configuration module as input to a machine learning algorithm, in conjunction with the results data to identify which inputs are beneficial and which are detrimental to enabling the component to reach desired results, and identify appropriate weighting of inputs, parameter settings, and the like. The component configuration module 15210 configures the component 15212 which is provided to the overall AI solution 15224 together with configuration information.

As described elsewhere herein, this disclosure concerns systems and methods for the discovery of opportunities for increased automation and intelligence, including solutions to domain-specific problems. Further, this disclosure also concerns selection and configuration of an artificial intelligence solution (e.g. neural networks, machine learning systems, expert systems, etc.) once opportunities are discovered.

Figure 153:
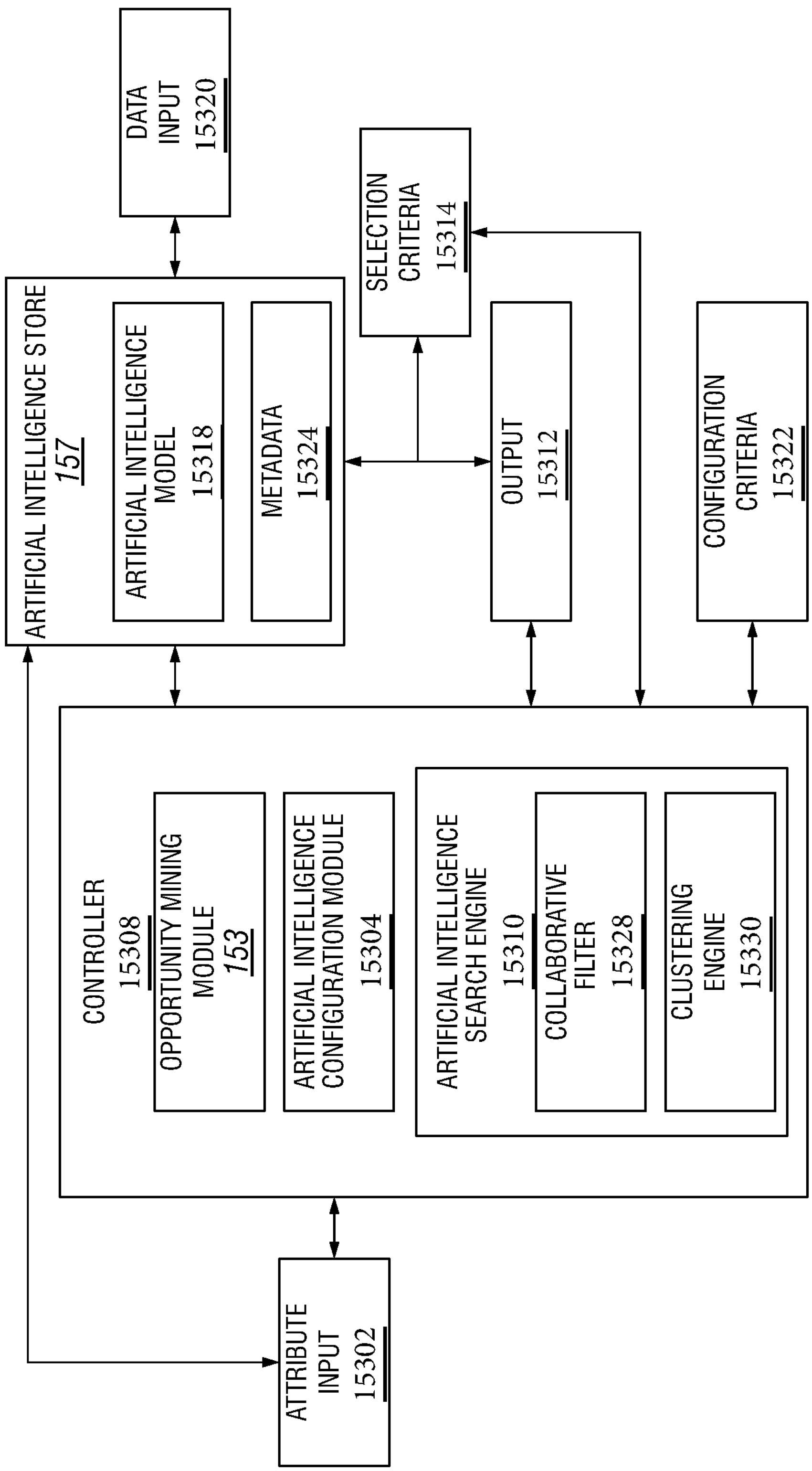

Referring now to FIG. 153, a controller 15308 includes an opportunity mining module 153, an artificial intelligence configuration module 15304, and an artificial intelligence search engine 15310, optionally having a collaborative filter 15328 and a clustering engine 15330. The opportunity mining module 153 receives input 15302, such as attribute input regarding an attribute of a task, a domain, or a domain-related problem.

The input 15302 may be processed by the opportunity mining module 153 to determine whether an artificial intelligence system can be applied to the task or the domain. For example, the attribute input 15302 may include an attribute of a task, domain or problem, such as a negotiating task, a drafting task, a data entry task, an email response task, a data analysis task, a document review task, an equipment operation task, a forecasting task, an NLP task, an image recognition task, a pattern recognition task, a motion detection task, a route optimization task, and the like. The opportunity mining module 153 may determine if one or more attributes of the task are similar to other tasks that have been automated or to which an intelligence has been applied, or based on the attribute of the task, if the task is potentially automatable or suitable to have an intelligence applied to it regardless of whether it has been done previously. For example, attributes of a drafting task may include articulating a first idea, articulating a second idea, articulating a plurality of ideas, combining the plurality of ideas in a pairwise fashion, and combining the ideas in a triplicate fashion. Articulating ideas may not be suitable for automation, but the task of combining ideas pairwise or in triplicate form may be suitable for automation or to have an intelligence applied to the task.

If a determination is made that an artificial intelligence system can be applied to the task or the domain, the output 15312 regarding that determination may be used to trigger an artificial intelligence search engine 15310 to perform a search of an artificial intelligence store 157. The artificial intelligence store 157 may include a plurality of domain-specific and general artificial intelligence models 15318, and components of domain-specific and general artificial intelligence models 15318. The artificial intelligence store 157 may be organized by a category. The category may be at least one of an artificial intelligence model component type, a domain, an input type, a processing type, an output type, a computational requirement, a computational capability, a cost, a training status, or an energy usage. The artificial intelligence store may include at least one e-commerce feature. The at least one e-commerce feature may include at least one of a rating, a review, a link to relevant content, a mechanism for provisioning, a mechanism for licensing, a mechanism for delivery, or a mechanism for payment. Models 15318 may be pre-trained, or may be available for training. Components of domain-specific and general artificial intelligence models 15318 may include artificial intelligence building blocks, such as a component that detects and translates between languages, or a component that delivers highly personalized customer recommendations. One or more models 15318 and/or components of a model 15318 may be identified in a search of the artificial intelligence store 157. Components of a model 15318 may be identified either as a stand-alone element to be used in the assembly of a custom AI model 15318 or as a component of a complete, optionally pre-trained, model 15318.

The artificial intelligence store 157 may include metadata 15324 or other descriptive material indicating a suitability of an artificial intelligence system for at least one of solving a particular type of problem or operating on domain-specific inputs, data, or other entities. The metadata 15324, or other descriptive material, category, or e-commerce feature may be searched using the attribute input 15302 and/or other selection criteria 15314. For example, attributes of a task involving 2D object classification may be searched in the artificial intelligence store 157 and its metadata 15324 to reveal that an artificial intelligence model 15318 suitable for a task involving 2D object classification may be a convolutional neural network. Continuing with the example, there may be model diversity even within the class of convolutional neural networks (CNN) in the artificial intelligence store 157, such as a CNN calibrated to a certain type of 2D object recognition (e.g., straight edges) and another CNN calibrated to another kind of 2D object recognition (e.g., combo of curved and straight edges). In this example, if the further edge vs. curved attribute of the type of 2D object is searched, the artificial intelligence store 157 would present the CNN best suited to the 2D object to be classified.

In embodiments, in addition to the input 15302, at least one selection criteria 15314 may be used by the artificial intelligence search engine 15310 to search the artificial intelligence store 157 for artificial intelligence models 15318 and/or components thereof. Selection criteria used in the recommendation of an artificial intelligence model 15318 or model component may include at least one of if the model is pre-trained or not, an availability of the at least one artificial intelligence model 15318 or component thereof to execute in a user environment, an availability of the at least one artificial intelligence model 15318 or component thereof to a user, a governance principle, a governance policy, a computational factor, a network factor, a data availability, a task-specific factor, a performance factor, a quality of service factor, a model deployment consideration, a security consideration, or a human interface, which may be elsewhere described herein. For example, a governance principle, such as a requirement for an anti-bias review of pedestrian accident-avoidance systems, may be used to search an artificial intelligence store 157 for artificial intelligence models to apply to an autonomous driving task. In another example, a selection criteria for an artificial intelligence solution to be used with air traffic control system may be a requirement for having been trained on adversarial attacks and deceptive input. In yet another example, a selection criteria for an artificial intelligence solution to be used with an equities trading task may be the requirement for human oversight, and particularly, human-based final decisions.

The artificial intelligence search engine 15310 may rank one or more results of the search according to a strength or a weakness of the at least one artificial intelligence model 15318 or model component relative to the at least one selection criteria 15314. The ranked search results may be presented to a user for evaluation and consideration, and ultimately, selection. In embodiments, the artificial intelligence search engine 15310 may further include a collaborative filter 15328 that receives an indication of an element of the at least one artificial intelligence model 15318 or model component from a user that is used to filter the search results. In embodiments, the artificial intelligence search engine 15310 may further include a clustering engine 15330 structured to cluster search results comprising the at least one artificial intelligence model 15318 or model component. The clustering engine 15330 may be at least one of a similarity matrix or a k-means clustering. The clustering engine 15330 may associate at least one of similar developers, similar domain-specific problems, or similar artificial intelligence solutions in the search results.

Once an artificial intelligence model 15318 or components thereof are identified by the artificial intelligence search engine 15310, either by searching with the input 15302 alone or with both the input 15302 and a selection criteria 15314, an artificial intelligence configuration module 15304 may configure one or more data inputs 15320 to use with the at least one artificial intelligence model 15318 or model component. The artificial intelligence configuration module 15304 may, in certain embodiments, be operative in discovering and selecting what inputs 15320 may enable effective and efficient use of artificial intelligence for a given problem. In embodiments, the artificial intelligence configuration module 15304 may further configure the at least one artificial intelligence model 15318 or model component(s) in accordance with at least one configuration criteria 15322. In embodiments, individual data inputs and model components may be configured via one or more configuration criteria, while in other embodiments, a single configuration criteria governs configuration of data input, AI component assembly, and the like.

In embodiments, the at least one configuration criteria 15322 may include at least one of an availability of the at least one artificial intelligence model 15318 or model component to execute in a user environment, an availability of the at least one artificial intelligence model 15318 or model component to a user, a governance principle, a governance policy, a computational factor, a network factor, a data availability, a task-specific factor, a performance factor, a quality of service factor, a model deployment consideration, a security consideration, or a human interface. In embodiments, the at least one configuration criteria may include at least one of identifying a desired output, identifying training data, identifying parameters for exclusion or inclusion in training or operation of the model, an input data threshold, an output data threshold, a selection of a neural network type, a selection of an input model type, a setting of initial model weights, a setting of model size, a selection of computational deployment environment, a selection of input data sources for training, a selection of input data sources for operation, a selection of feedback function/outcome measures, a selection of data integration language(s) for inputs and outputs, a configuration of APIs for model training, a configuration of APIs 13114 for model inputs, a configuration of APIs 13114 for outputs, a configuration of access controls, a configuration of security parameters, a configuration of network protocols, a configuration of storage parameters, a configuration of economic factors, a configuration of data flows, a configuration of high availability, one or more fault tolerance environments, a price-based data acquisition strategy, a heuristic method, a decision to make a decision model, or a coordination of massively parallel decision making environments. In embodiments, the at least one configuration criteria may include parameters for assembly of an AI solution from a plurality of identified model components, optionally along with other standard or mandatory model components. For example, the model components may be configured to run in parallel, to run serially, or in a combination of serial and parallel.

For example, the artificial intelligence configuration module 15304 may configure an artificial intelligence model 15318 to weight one data input 15320 more heavily than another. For example, in the rain, an autonomous driving solution may weight input from a traction control system and a forward radar system more heavily than sensors targeted to increasing fuel efficiency, such as sensors measuring road slope and vehicle speed. After the rain, the weighting may be reversed.

In another example, the artificial intelligence configuration module 15304 may configure an artificial intelligence model 15318 to operate within certain thresholds of data input 15320. For example, an artificial intelligence model 15318 may be used in a combinatorial drafting task. When only two articulated ideas are provided to the model 15318, the model 15318 may not be triggered to operate. However, once the model 15318 receives a third articulated idea, its combinatorial processing of articulated ideas may commence.

The artificial intelligence configuration module 15304 may configure which sensors to use as data input 15320, how frequently to sample data, how frequently to transmit output, the weighting of various data inputs 15320, thresholds to apply to data from data inputs 15320, whether an output of one component of the model 15318 is used as input to another component of the model 15318, an order of operation of the components of the model 15318, a positioning of a model component within a workflow of a model, and the like.

The artificial intelligence configuration module 15304 may configure an artificial intelligence model 15318 from one or more model components identified by the artificial intelligence search engine 15310. For example, if the search result consisted solely of model components, the AI configuration module 15304 may configure where to place the identified 127 components in relation to one another, such as in a workflow or data flow, as well as in relation to other components that may be required for the model 15318 to function.

In embodiments, an artificial intelligence store 157 may include a set of interfaces to artificial intelligence systems, such as enabling the download of relevant artificial intelligence applications, establishment of links or other connections to artificial intelligence systems (such as links to cloud-deployed artificial intelligence systems via APIs, ports, connectors, or other interfaces) and the like.

Figure 154:
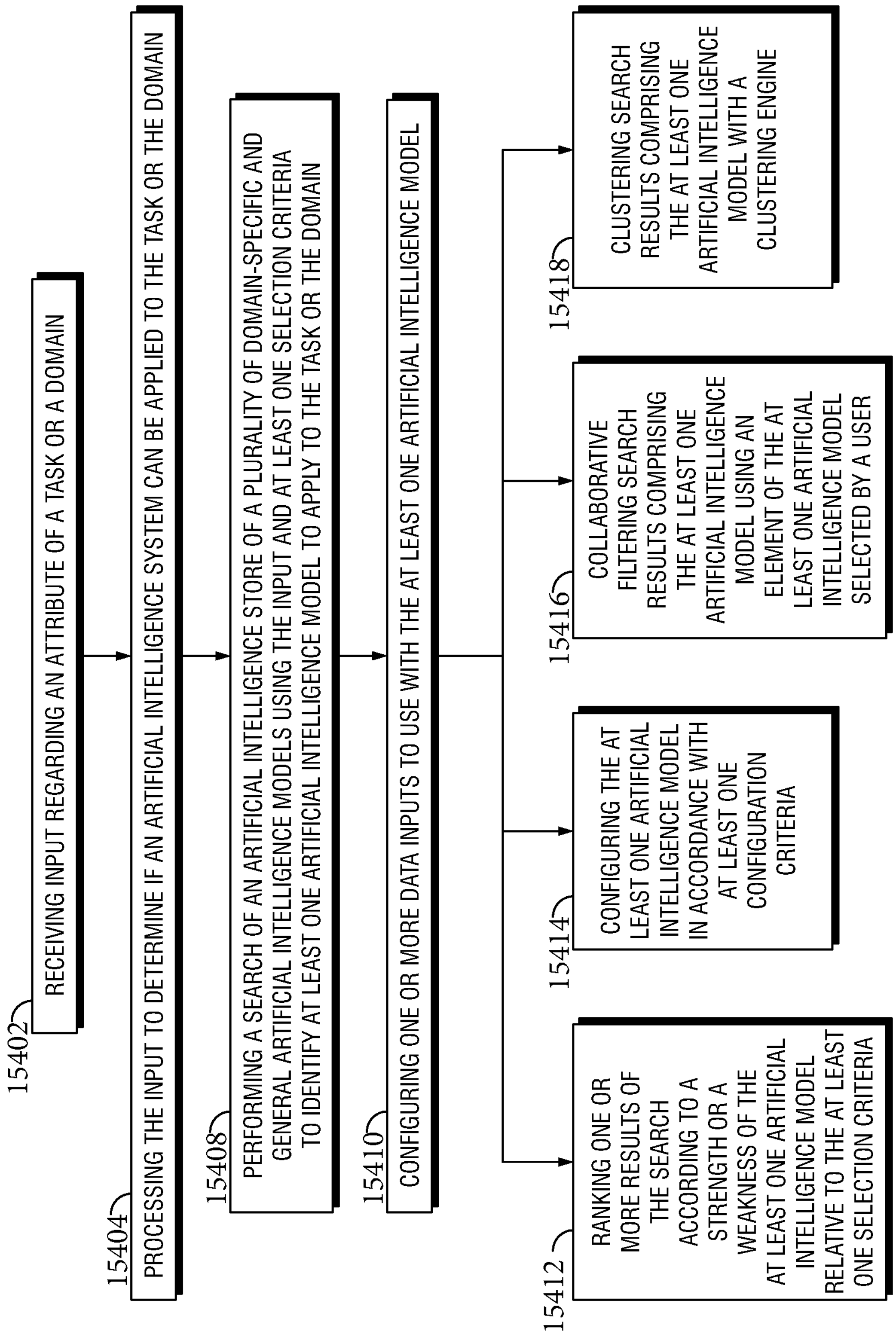

Referring now to FIG. 154, a method of artificial intelligence model identification and selection may include receiving input regarding an attribute of a task or a domain 15402, and processing the input to determine whether an artificial intelligence system can be applied to the task or the domain 15404, performing a search of an artificial intelligence store of a plurality of domain-specific and general artificial intelligence models and model components using the input and/or at least one selection criteria to identify at least one artificial intelligence model or model component to apply to the task or the domain 15408, and configuring one or more data inputs to use with the at least one artificial intelligence model 15410 or model component. The artificial intelligence store may include metadata or other descriptive material indicating a suitability of an artificial intelligence system for at least one of solving a particular type of problem or operating on domain-specific inputs, data, or other entities.

The method may further include ranking one or more results of the search according to a strength or a weakness of the at least one artificial intelligence model relative to the at least one selection criteria 15412. The method may further include configuring the at least one artificial intelligence model or model component in accordance with at least one configuration criteria 15414. The method may further include collaborative filtering search results comprising the at least one artificial intelligence model using an element of the at least one artificial intelligence model selected or model component by a user 15416. The method may further include clustering search results comprising the at least one artificial intelligence model or model component with a clustering engine 15418.

Figure 155:
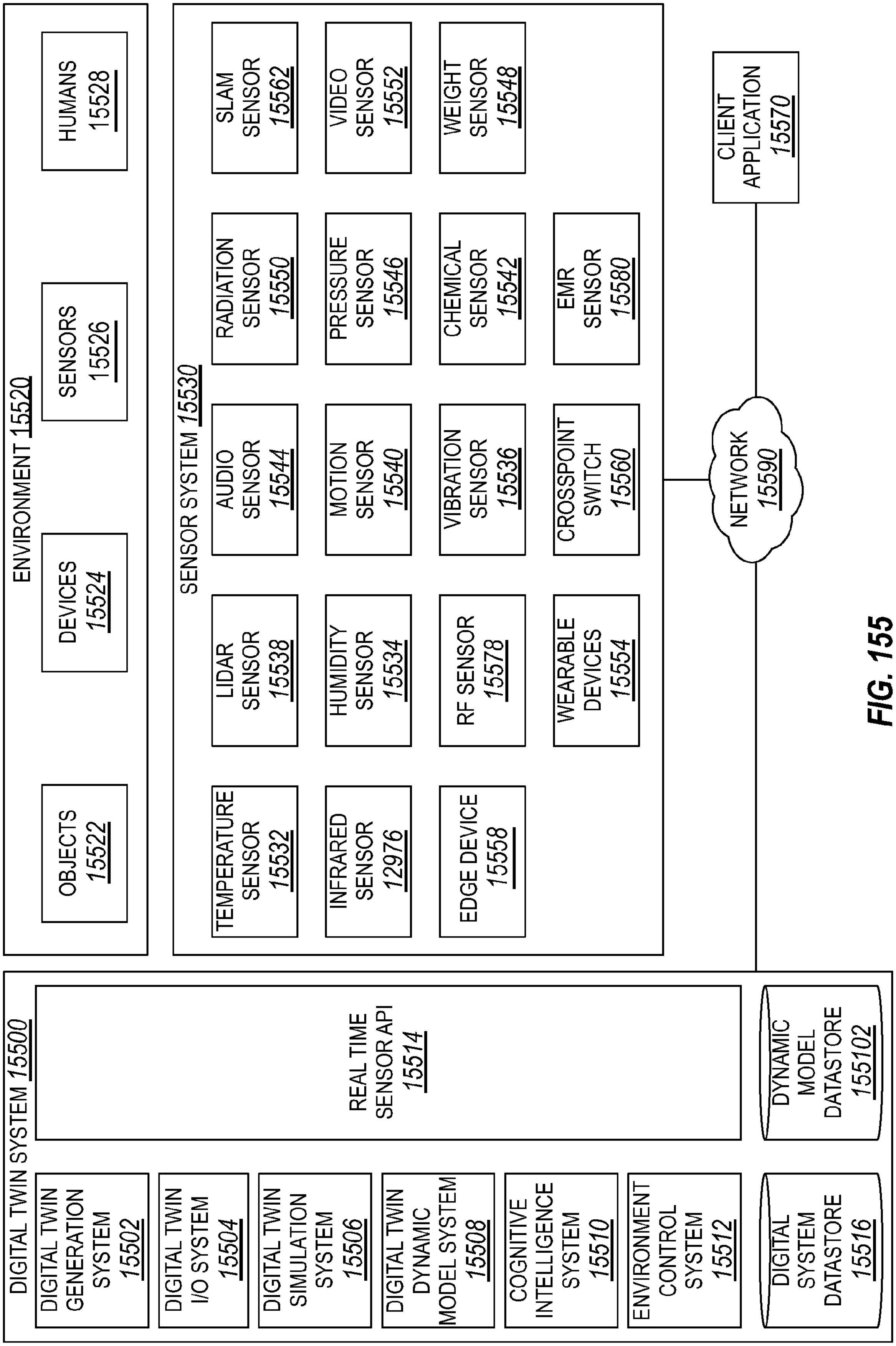

FIG. 155 illustrates an example environment of a digital twin system 15500. In embodiments, the digital twin system 15500 generates a set of digital twins of a set of industrial environments 15520 and/or industrial entities within the set of industrial environments. In embodiments, the digital twin system 15500 maintains a set of states of the respective industrial environments 15520, such as using sensor data obtained from respective sensor systems 15530 that monitor the industrial environments 15520. In embodiments, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512. In embodiments, the digital twin system 15500 may provide a real time sensor API that provides a set of capabilities for enabling a set of interfaces for the sensors of the respective sensor systems 15530. In embodiments, the digital twin system 15500 may include and/or employ other suitable APIs, brokers, connectors, bridges, gateways, hubs, ports, routers, switches, data integration systems, peer-to-peer systems, and the like to facilitate the transferring of data to and from the digital twin system 15500. In these embodiments, these connective components may allow an IoT sensor or an intermediary device (e.g., a relay, an edge device, a switch, or the like) within a sensor system 15530 to communicate data to the digital twin system 15500 and/or to receive data (e.g., configuration data, control data, or the like) from the digital twin system 15500 or another external system. In embodiments, the digital twin system 15500 may further include a digital twin datastore 15516 that stores digital twins 15518 of various industrial environments 15520 and the objects 15522, devices 15524, sensors 15526, and/or humans 15528 in the environment 15520.

A digital twin may refer to a digital representation of one or more industrial entities, such as an industrial environment 15520, a physical object 15522, a device 15524, a sensor 15526, a human 15528, or any combination thereof. Examples of industrial environments 15520 include, but are not limited to, a factory, a power plant, a food production facility (which may include an inspection facility), a commercial kitchen, an indoor growing facility, a natural resources excavation site (e.g., a mine, an oil field, etc.), and the like. Depending on the type of environment, the types of objects, devices, and sensors that are found in the environments will differ. Non-limiting examples of physical objects 15522 include raw materials, manufactured products, excavated materials, containers (e.g., boxes, dumpsters, cooling towers, vats, pallets, barrels, palates, bins, and the like), furniture (e.g., tables, counters, workstations, shelving, etc.), and the like. Non-limiting examples of devices 15524 include robots, computers, vehicles (e.g., cars, trucks, tankers, trains, forklifts, cranes, etc.), machinery/equipment (e.g., tractors, tillers, drills, presses, assembly lines, conveyor belts, etc.), and the like. The sensors 15526 may be any sensor devices and/or sensor aggregation devices that are found in a sensor system 15530 within an environment. Non-limiting examples of sensors 15526 that may be implemented in a sensor system 15530 may include temperature sensors 15532, humidity sensors 15534, vibration sensors 15536, LIDAR sensors 15538, motion sensors 15540, chemical sensors 15542, audio sensors 15544, pressure sensors 15546, weight sensors 15548, radiation sensors 15550, video sensors 15552, wearable devices 15554, relays 15556, edge devices 15558, crosspoint switches 15560, and/or any other suitable sensors. Examples of different types of physical objects 15522, devices 15524, sensors 15526, and environments 15520 are referenced throughout the disclosure.

In some embodiments, on-device sensor fusion and data storage for industrial IoT devices is supported, including on-device sensor fusion and data storage for an industrial IoT device, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the device. Any of the sensor data types described throughout this disclosure, including vibration data, can be fused in this manner and stored in a local data pool, in storage, or on an IoT device, such as a data collector, a component of a machine, or the like.

In some embodiments, a set of digital twins may represent an entire organization, such as energy production organizations, oil and gas organizations, renewable energy production organizations, aerospace manufacturers, vehicle manufacturers, heavy equipment manufacturers, mining organizations, drilling organizations, offshore platform organizations, and the like. In these examples, the digital twins may include digital twins of one or more industrial facilities of the organization.

In embodiments, the digital twin management system 15502 generates digital twins. A digital twin may be comprised of (e.g., via reference) other digital twins. In this way, a discrete digital twin may be comprised of a set of other discrete digital twins. For example, a digital twin of a machine may include digital twins of sensors on the machine, digital twins of components that make up the machine, digital twins of other devices that are incorporated in or integrated with the machine (such as systems that provide inputs to the machine or take outputs from it), and/or digital twins of products or other items that are made by the machine. Taking this example one step further, a digital twin of an industrial facility (e.g., a factory) may include a digital twin representing the layout of the industrial facility, including the arrangement of physical assets and systems in or around the facility, as well as digital assets of the assets within the facility (e.g., the digital twin of the machine), as well as digital twins of storage areas in the facility, digital twins of humans collecting vibration measurements from machines throughout the facility, and the like. In this second example, the digital twin of the industrial facility may reference the embedded digital twins, which may then reference other digital twins embedded within those digital twins.

In some embodiments, a digital twin may represent abstract entities, such as workflows and/or processes, including inputs, outputs, sequences of steps, decision points, processing loops, and the like that make up such workflows and processes. For example, a digital twin may be a digital representation of a manufacturing process, a logistics workflow, an agricultural process, a mineral extraction process, or the like. In these embodiments, the digital twin may include references to the industrial entities that are included in the workflow or process. The digital twin of the manufacturing process may reflect the various stages of the process. In some of these embodiments, the digital twin system 15500 receives real-time data from the industrial facility (e.g., from a sensor system 15530 of the environment 15520) in which the manufacturing process takes place and reflects a current (or substantially current) state of the process in real-time.

In embodiments, the digital representation may include a set of data structures (e.g., classes) that collectively define a set of properties of a represented physical object 15522, device 15524, sensor 15526, or environment 15520 and/or possible behaviors thereof. For example, the set of properties of a physical object 15522 may include a type of the physical object, the dimensions of the object, the mass of the object, the density of the object, the material(s) of the object, the physical properties of the material(s), the surface of the physical object, the status of the physical object, a location of the physical object, identifiers of other digital twins contained within the object, and/or other suitable properties. Examples of behavior of a physical object may include a state of the physical object (e.g., a solid, liquid, or gas), a melting point of the physical object, a density of the physical object when in a liquid state, a viscosity of the physical object when in a liquid state, a freezing point of the physical object, a density of the physical object when in a solid state, a hardness of the physical object when in a solid state, the malleability of the physical object, the buoyancy of the physical object, the conductivity of the physical object, a burning point of the physical object, the manner by which humidity affects the physical object, the manner by which water or other liquids affect the physical object, a terminal velocity of the physical object, and the like. In another example, the set of properties of a device may include a type of the device, the dimensions of the device, the mass of the device, the density of the density of the device, the material(s) of the device, the physical properties of the material(s), the surface of the device, the output of the device, the status of the device, a location of the device, a trajectory of the device, vibration characteristics of the device, identifiers of other digital twins that the device is connected to and/or contains, and the like. Examples of the behaviors of a device may include a maximum acceleration of a device, a maximum speed of a device, ranges of motion of a device, a heating profile of a device, a cooling profile of a device, processes that are performed by the device, operations that are performed by the device, and the like. Example properties of an environment may include the dimensions of the environment, the boundaries of the environment, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, a humidity of a digital twin, the shape of a digital twin, the material of a digital twin, the dimensions of a digital twin, or any other suitable parameters may be adjusted. As the properties of the digital twin are adjusted, other properties may be affected as well. For example, if the temperature of an environment 15520 is increased, the pressure within the environment may increase as well, such as a pressure of a gas in accordance with the ideal gas law. In another example, if a digital twin of a subzero environment is increased to above freezing temperatures, the properties of an embedded twin of water in a solid state (i.e., ice) may change into a liquid state over time.

Digital twins may be represented in a number of different forms. In embodiments, a digital twin may be a visual digital twin that is rendered by a computing device, such that a human user can view digital representations of an environment 15520 and/or the physical objects 15522, devices 15524, and/or the sensors 15526 within an environment. In embodiments, the digital twin may be rendered and output to a display device. In some of these embodiments, the digital twin may be rendered in a graphical user interface, such that a user may interact with the digital twin. For example, a user may "drill down" on a particular element (e.g., a physical object or device) to view additional information regarding the element (e.g., a state of a physical object or device, properties of the physical object or device, or the like). In some embodiments, the digital twin may be rendered and output in a virtual reality display. For example, a user may view a 3D rendering of an environment (e.g., using monitor or a virtual reality headset). While doing so, the user may view/inspect digital twins of physical assets or devices in the environment.

In some embodiments, a data structure of the visual digital twins (i.e., digital twins that are configured to be displayed in a 2D or 3D manner) may include surfaces (e.g., splines, meshes, polygons meshes, or the like). In some embodiments, the surfaces may include texture data, shading information, and/or reflection data. In this way, a surface may be displayed in a more realistic manner. In some embodiments, such surfaces may be rendered by a visualization engine (not shown) when the digital twin is within a field of view and/or when existing in a larger digital twin (e.g., a digital twin of an industrial environment). In these embodiments, the digital twin system 15500 may render the surfaces of digital objects, whereby a rendered digital twin may be depicted as a set of adjoined surfaces.

In embodiments, a user may provide input that controls one or more properties of a digital twin via a graphical user interface. For example, a user may provide input that changes a property of a digital twin. In response, the digital twin system 15500 can calculate the effects of the changed property and may update the digital twin and any other digital twins affected by the change of the property.

In embodiments, a user may view processes being performed with respect to one or more digital twins (e.g., manufacturing of a product, extracting minerals from a mine or well, a livestock inspection line, and the like). In these embodiments, a user may view the entire process or specific steps within a process.

In some embodiments, a digital twin (and any digital twins embedded therein) may be represented in a non-visual representation (or "data representation"). In these embodiments, a digital twin and any embedded digital twins exist in a binary representation but the relationships between the digital twins are maintained. For example, in embodiments, each digital twin and/or the components thereof may be represented by a set of physical dimensions that define a shape of the digital twin (or component thereof). Furthermore, the data structure embodying the digital twin may include a location of the digital twin. In some embodiments, the location of the digital twin may be provided in a set of coordinates. For example, a digital twin of an industrial environment may be defined with respect to a coordinate space (e.g., a Cartesian coordinate space, a polar coordinate space, or the like). In embodiments, embedded digital twins may be represented as a set of one or more ordered triples (e.g., [x coordinate, y coordinate, z coordinates] or other vector-based representations). In some of these embodiments, each ordered triple may represent a location of a specific point (e.g., center point, top point, bottom point, or the like) on the industrial entity (e.g., object, device, or sensor) in relation to the environment in which the industrial entity resides. In some embodiments, a data structure of a digital twin may include a vector that indicates a motion of the digital twin with respect to the environment. For example, fluids (e.g., liquids or gasses) or solids may be represented by a vector that indicates a velocity (e.g., direction and magnitude of speed) of the entity represented by the digital twin. In embodiments, a vector within a twin may represent a microscopic subcomponent, such as a particle within a fluid, and a digital twin may represent physical properties, such as displacement, velocity, acceleration, momentum, kinetic energy, vibrational characteristics, thermal properties, electromagnetic properties, and the like.

In some embodiments, a set of two or more digital twins may be represented by a graph database that includes nodes and edges that connect the nodes. In some implementations, an edge may represent a spatial relationship (e.g., "abuts", "rests upon", "contains", and the like). In these embodiments, each node in the graph database represents a digital twin of an entity (e.g., an industrial entity) and may include the data structure defining the digital twin. In these embodiments, each edge in the graph database may represent a relationship between two entities represented by connected nodes. In some implementations, an edge may represent a spatial relationship (e.g., "abuts", "rests upon", "interlocks with", "bears", "contains", and the like). In embodiments, various types of data may be stored in a node or an edge. In embodiments, a node may store property data, state data, and/or metadata relating to a facility, system, subsystem, and/or component. Types of property data and state data will differ based on the entity represented by a node. For example, a node representing a robot may include property data that indicates a material of the robot, the dimensions of the robot (or components thereof), a mass of the robot, and the like. In this example, the state data of the robot may include a current pose of the robot, a location of the robot, and the like. In embodiments, an edge may store relationship data and metadata data relating to a relationship between two nodes. Examples of relationship data may include the nature of the relationship, whether the relationship is permanent (e.g., a fixed component would have a permanent relationship with the structure to which it is attached or resting on), and the like. In embodiments, an edge may include metadata concerning the relationship between two entities. For example, if a product was produced on an assembly line, one relationship that may be documented between a digital twin of the product and the assembly line may be "created by". In these embodiments, an example edge representing the "created by" relationship may include a timestamp indicating a date and time that the product was created. In another example, a sensor may take measurements relating to a state of a device, whereby one relationship between the sensor and the device may include "measured" and may define a measurement type that is measured by the sensor. In this example, the metadata stored in an edge may include a list of N measurements taken and a timestamp of each respective measurement. In this way, temporal data relating to the nature of the relationship between two entities may be maintained, thereby allowing for an analytics engine, machine-learning engine, and/or visualization engine to leverage such temporal relationship data, such as by aligning disparate data sets with a series of points in time, such as to facilitate cause-and-effect analysis used for prediction systems.

In some embodiments, a graph database may be implemented in a hierarchical manner, such that the graph database relates a set of facilities, systems, and components. For example, a digital twin of a manufacturing environment may include a node representing the manufacturing environment. The graph database may further include nodes representing various systems within the manufacturing environment, such as nodes representing an HVAC system, a lighting system, a manufacturing system, and the like, all of which may connect to the node representing the manufacturing system. In this example, each of the systems may further connect to various subsystems and/or components of the system. For example, within the HVAC system, the HVAC system may connect to a subsystem node representing a cooling system of the facility, a second subsystem node representing a heating system of the facility, a third subsystem node representing the fan system of the facility, and one or more nodes representing a thermostat of the facility (or multiple thermostats). Carrying this example further, the subsystem nodes and/or component nodes may connect to lower level nodes, which may include subsystem nodes and/or component nodes. For example, the subsystem node representing the cooling subsystem may be connected to a component node representing an air conditioner unit. Similarly, a component node representing a thermostat device may connect to one or more component nodes representing various sensors (e.g., temperature sensors, humidity sensors, and the like).

In embodiments where a graph database is implemented, a graph database may relate to a single environment or may represent a larger enterprise. In the latter scenario, a company may have various manufacturing and distribution facilities. In these embodiments, an enterprise node representing the enterprise may connect to environment nodes of each respective facility. In this way, the digital twin system 15500 may maintain digital twins for multiple industrial facilities of an enterprise.

In embodiments, the digital twin system 15500 may use a graph database to generate a digital twin that may be rendered and displayed and/or may be represented in a data representation. In the former scenario, the digital twin system 15500 may receive a request to render a digital twin, whereby the request includes one or more parameters that are indicative of a view that will be depicted. For example, the one or more parameters may indicate an industrial environment to be depicted and the type of rendering (e.g., "real-world view" that depicts the environment as a human would see it, an "infrared view" that depicts objects as a function of their respective temperature, an "airflow view" that depicts the airflow in a digital twin, or the like). In response, the digital twin system 15500 may traverse a graph database and may determine a configuration of the environment to be depicted based on the nodes in the graph database that are related (either directly or through a lower level node) to the environment node of the environment and the edges that define the relationships between the related nodes. Upon determining a configuration, the digital twin system 15500 may identify the surfaces that are to be depicted and may render those surfaces. The digital twin system 15500 may then render the requested digital twin by connecting the surfaces in accordance with the configuration. The rendered digital twin may then be output to a viewing device (e.g., VR headset, monitor, or the like). In some scenarios, the digital twin system 15500 may receive real-time sensor data from a sensor system 15530 of an environment 15520 and may update the visual digital twin based on the sensor data. For example, the digital twin system 15500 may receive sensor data (e.g., vibration data from a vibration sensor 15536) relating to a motor and its set of bearings. Based on the sensor data, the digital twin system 15500 may update the visual digital twin to indicate the approximate vibrational characteristics of the set of bearings within a digital twin of the motor.

In scenarios where the digital twin system 15500 is providing data representations of digital twins (e.g., for dynamic modeling, simulations, machine learning), the digital twin system 15500 may traverse a graph database and may determine a configuration of the environment to be depicted based on the nodes in the graph database that are related (either directly or through a lower level node) to the environment node of the environment and the edges that define the relationships between the related nodes. In some scenarios, the digital twin system 15500 may receive real-time sensor data from a sensor system 15530 of an environment 15520 and may apply one or more dynamic models to the digital twin based on the sensor data. In other scenarios, a data representation of a digital twin may be used to perform simulations, as is discussed in greater detail throughout the specification.

In some embodiments, the digital twin system 15500 may execute a digital ghost that is executed with respect to a digital twin of an industrial environment. In these embodiments, the digital ghost may monitor one or more sensors of a sensor system 15530 of an industrial environment to detect anomalies that may indicate a malicious virus or other security issues.

As discussed, the digital twin system 15500 may include a digital twin management system 15502, a digital twin I/O system 15504, a digital twin simulation system 15506, a digital twin dynamic model system 15508, a cognitive intelligence system 15510, and/or an environment control system 15512.

In embodiments, the digital twin management system 15502 creates new digital twins, maintains/updates existing digital twins, and/or renders digital twins. The digital twin management system 15502 may receive user input, uploaded data, and/or sensor data to create and maintain existing digital twins. Upon creating a new digital twin, the digital twin management system 15502 may store the digital twin in the digital twin datastore 15516. Creating, updating, and rendering digital twins are discussed in greater detail throughout the disclosure.

In embodiments, the digital twin I/O system 15504 receives input from various sources and outputs data to various recipients. In embodiments, the digital twin I/O system receives sensor data from one or more sensor systems 15530. In these embodiments, each sensor system 15530 may include one or more IoT sensors that output respective sensor data. Each sensor may be assigned an IP address or may have another suitable identifier. Each sensor may output sensor packets that include an identifier of the sensor and the sensor data. In some embodiments, the sensor packets may further include a timestamp indicating a time at which the sensor data was collected. In some embodiments, the digital twin I/O system 15504 may interface with a sensor system 15530 via the real-time sensor API 15514. In these embodiments, one or more devices (e.g., sensors, aggregators, edge devices) in the sensor system 15530 may transmit the sensor packets containing sensor data to the digital twin I/O system 15504 via the API. The digital twin I/O system may determine the sensor system 15530 that transmitted the sensor packets and the contents thereof, and may provide the sensor data and any other relevant data (e.g., time stamp, environment identifier/sensor system identifier, and the like) to the digital twin management system 15502.

In embodiments, the digital twin I/O system 15504 may receive imported data from one or more sources. For example, the digital twin system 15500 may provide a portal for users to create and manage their digital twins. In these embodiments, a user may upload one or more files (e.g., image files, LIDAR scans, blueprints, and the like) in connection with a new digital twin that is being created. In response, the digital twin I/O system 15504 may provide the imported data to the digital twin management system 15502. The digital twin I/O system 15504 may receive other suitable types of data without departing from the scope of the disclosure.

In some embodiments, the digital twin simulation system 15506 is configured to execute simulations using the digital twin. For example, the digital twin simulation system 15506 may iteratively adjust one or more parameters of a digital twin and/or one or more embedded digital twins. In embodiments, the digital twin simulation system 15506, for each set of parameters, executes a simulation based on the set of parameters and may collect the simulation outcome data resulting from the simulation. Put another way, the digital twin simulation system 15506 may collect the properties of the digital twin and the digital twins within or containing the digital twin used during the simulation as well as any outcomes stemming from the simulation. For example, in running a simulation on a digital twin of an indoor agricultural facility, the digital twin simulation system 15506 can vary the temperature, humidity, airflow, carbon dioxide and/or other relevant parameters and can execute simulations that output outcomes resulting from different combinations of the parameters. In another example, the digital twin simulation system 15506 may simulate the operation of a specific machine within an industrial facility that produces an output given a set of inputs. In some embodiments, the inputs may be varied to determine an effect of the inputs on the machine and the output thereof. In another example, the digital twin simulation system 15506 may simulate the vibration of a machine and/or machine components. In this example, the digital twin of the machine may include a set of operating parameters, interfaces, and capabilities of the machine. In some embodiments, the operating parameters may be varied to evaluate the effectiveness of the machine. The digital twin simulation system 15506 is discussed in further detail throughout the disclosure.

In embodiments, the digital twin dynamic model system 15508 is configured to model one or more behaviors with respect to a digital twin of an environment. In embodiments, the digital twin dynamic model system 15508 may receive a request to model a certain type of behavior regarding an environment or a process and may model that behavior using a dynamic model, the digital twin of the environment or process, and sensor data collected from one or more sensors that are monitoring the environment or process. For example, an operator of a machine having bearings may wish to model the vibration of the machine and bearings to determine whether the machine and/or bearings can withstand an increase in output. In this example, the digital twin dynamic model system 15508 may execute a dynamic model that is configured to determine whether an increase in output would result in adverse consequences (e.g., failures, downtime, or the like). The digital twin dynamic model system 15508 is discussed in further detail throughout the disclosure.

In embodiments, the cognitive processes system 15510 performs machine learning and artificial intelligence related tasks on behalf of the digital twin system. In embodiments, the cognitive processes system 15510 may train any suitable type of model, including but not limited to various types of neural networks, regression models, random forests, decision trees, Hidden Markov models, Bayesian models, and the like. In embodiments, the cognitive processes system 15510 trains machine learned models using the output of simulations executed by the digital twin simulation system 15506. In some of these embodiments, the outcomes of the simulations may be used to supplement training data collected from real-world environments and/or processes. In embodiments, the cognitive processes system 15510 leverages machine learned models to make predictions, identifications, classifications and provide decision support relating to the real-world environments and/or processes represented by respective digital twins.

For example, a machine-learned prediction model may be used to predict the cause of irregular vibrational patterns (e.g., a suboptimal, critical, or alarm vibration fault state) for a bearing of an engine in an industrial facility. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination simulation data and real-world data of causes of irregular vibration patterns) to predict the cause of the irregular vibration patterns. In this example, the causes of the irregular vibrational patterns could be a loose bearing, a lack of bearing lubrication, a bearing that is out of alignment, a worn bearing, the phase of the bearing may be aligned with the phase of the engine, loose housing, loose bolt, and the like.

In another example, a machine-learned model may be used to provide decision support to bring a bearing of an engine in an industrial facility operating at a suboptimal vibration fault level state to a normal operation vibration fault level state. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination simulation data and real-world data of solutions to irregular vibration patterns) to provide decision support in achieving a normal operation fault level state of the bearing. In this example, the decision support could be a recommendation to tighten the bearing, lubricate the bearing, re-align the bearing, order a new bearing, order a new part, collect additional vibration measurements, change operating speed of the engine, tighten housings, tighten bolts, and the like.

In another example, a machine-learned model may be used to provide decision support relating to vibration measurement collection by a worker. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination simulation data and real-world vibration measurement history data) to provide decision support in selecting vibration measurement locations.

In yet another example, a machine-learned model may be used to identify vibration signatures associated with machine and/or machine component problems. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination simulation data and real-world vibration measurement history data) to identify vibration signatures associated with a machine and/or machine component. The foregoing examples are non-limiting examples and the cognitive processes system 15510 may be used for any other suitable AI/machine-learning related tasks that are performed with respect to industrial facilities.

In embodiments, the environment control system 15512 controls one or more aspects of industrial facilities. In some of these embodiments, the environment control system 15512 may control one or more devices within an industrial environment. For example, the environment control system 15512 may control one or more machines within an environment, robots within an environment, an HVAC system of the environment, an alarm system of the environment, an assembly line in an environment, or the like. In embodiments, the environment control system 15512 may leverage the digital twin simulation system 15506, the digital twin dynamic model system 15508, and/or the cognitive processes system 15510 to determine one or more control instructions. In embodiments, the environment control system 15512 may implement a rules-based and/or a machine-learning approach to determine the control instructions. In response to determining a control instruction, the environment control system 15512 may output the control instruction to the intended device within a specific environment via the digital twin I/O system 15504.

Figure 156:
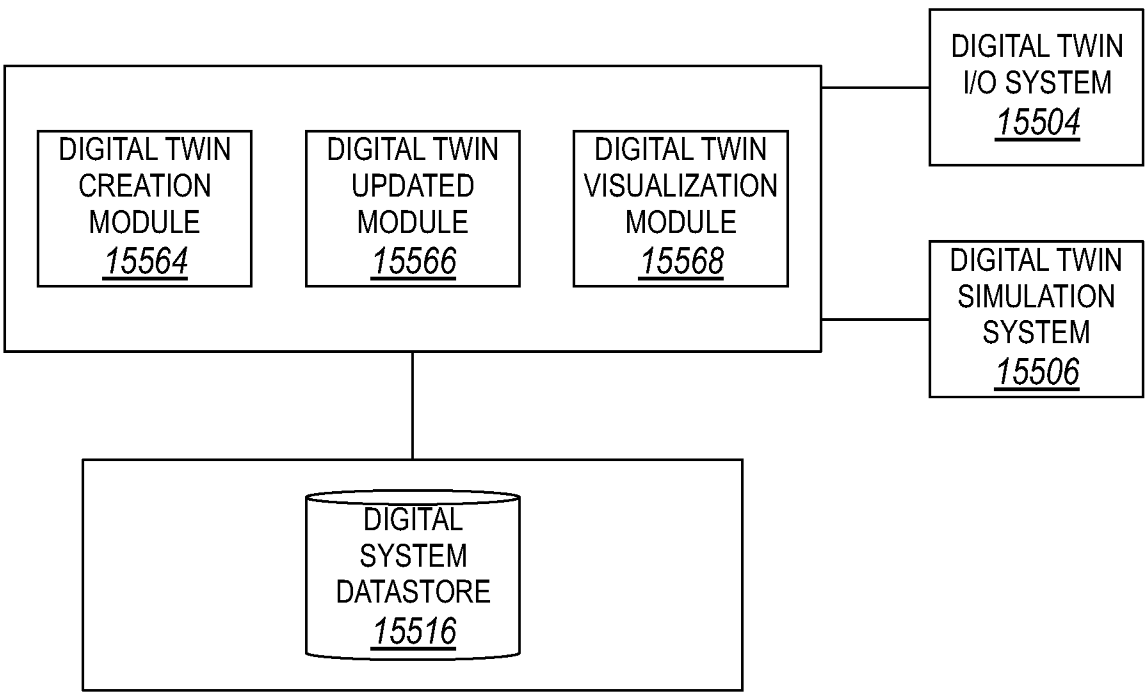
Figure 157:
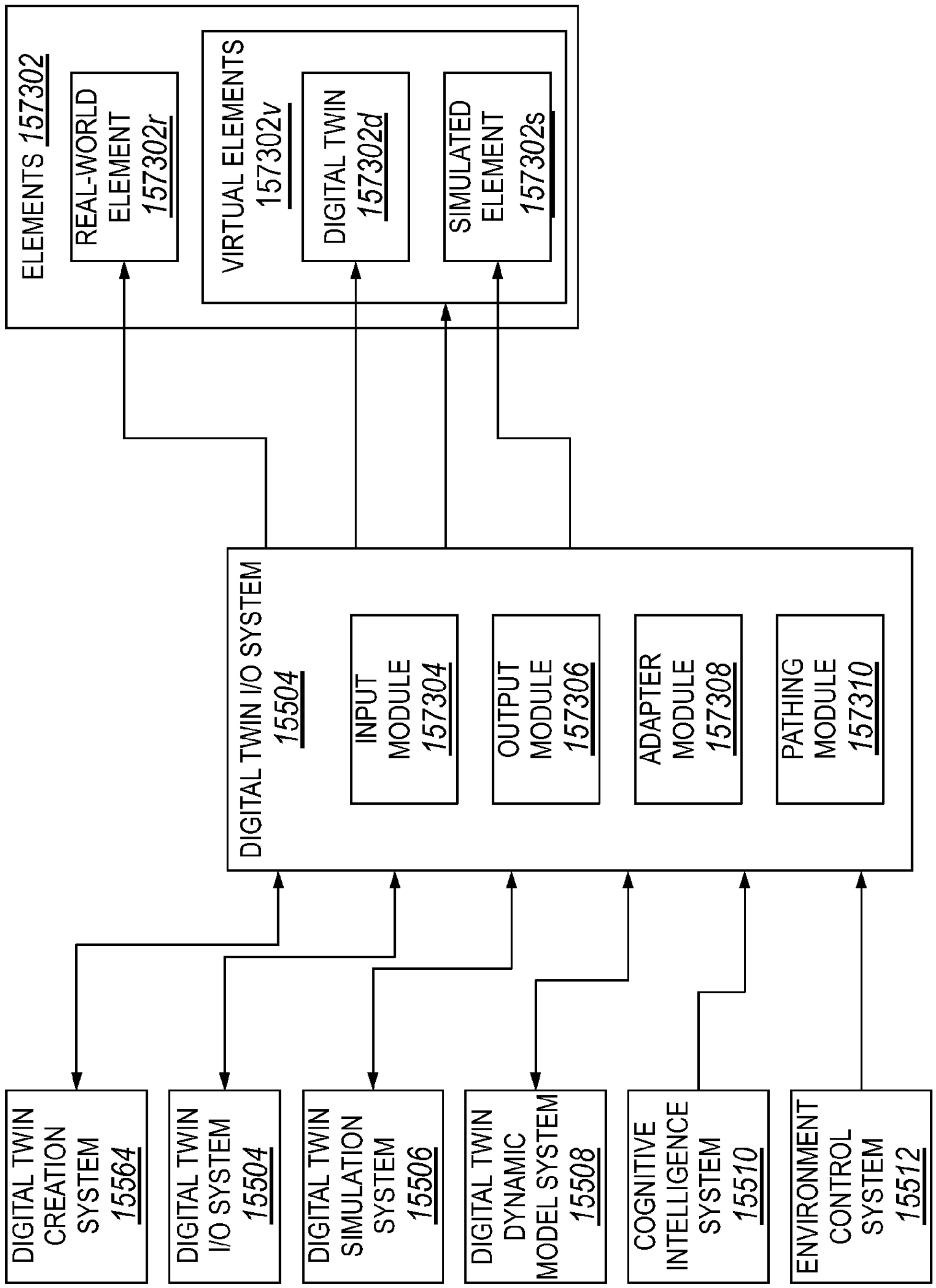

FIG. 156 illustrates an example digital twin management system 15502 according to some embodiments of the present disclosure. In embodiments, the digital twin management system 15502 may include, but is not limited to, a digital twin creation module 15564, a digital twin update module 15566, and a digital twin visualization module 15568.

In embodiments, the digital twin creation module 15564 may create a set of new digital twins of a set of environments using input from users, imported data (e.g., blueprints, specifications, and the like), image scans of the environment, 3D data from a LIDAR device and/or SLAM sensor, and other suitable data sources. For example, a user (e.g., a user affiliated with an organization/customer account) may, via a client application 15570, provide input to create a new digital twin of an environment. In doing so, the user may upload 2D or 3D image scans of the environment and/or a blueprint of the environment. The user may also upload 3D data, such as taken by a camera, a LIDAR device, an IR scanner, a set of SLAM sensors, a radar device, an EMF scanner, or the like. In response to the provided data, the digital twin creation module 15564 may create a 3D representation of the environment, which may include any objects that were captured in the image data/detected in the 3D data. In embodiments, the cognitive processes system 15572 may analyze input data (e.g., blueprints, image scans, 3D data) to classify rooms, pathways, equipment, and the like to assist in the generation of the 3D representation. In some embodiments, the digital twin creation module 15564 may map the digital twin to a 3D coordinate space (e.g., a Cartesian space having x, y, and z axes).

In some embodiments, the digital twin creation module 15564 may output the 3D representation of the environment to a graphical user interface (GUI). In some of these embodiments, a user may identify certain areas and/or objects and may provide input relating to the identified areas and/or objects. For example, a user may label specific rooms, equipment, machines, and the like. Additionally or alternatively, the user may provide data relating to the identified objects and/or areas. For example, in identifying a piece of equipment, the user may provide a make/model number of the equipment. In some embodiments, the digital twin creation module 15564 may obtain information from a manufacturer of a device, a piece of equipment, or machinery. This information may include one or more properties and/or behaviors of the device, equipment, or machinery. In some embodiments, the user may, via the GUI, identify locations of sensors throughout the environment. For each sensor, the user may provide a type of sensor and related data (e.g., make, model, IP address, and the like). The digital twin creation module 15564 may record the locations (e.g., the x, y, z coordinates of the sensors) in the digital twin of the environment. In embodiments, the digital twin system 15500 may employ one or more systems that automate the population of digital twins. For example, the digital twin system 15500 may employ a machine vision-based classifier that classifies makes and models of devices, equipment, or sensors. Additionally or alternatively, the digital twin system 15500 may iteratively ping different types of known sensors to identify the presence of specific types of sensors that are in an environment. Each time a sensor responds to a ping, the digital twin system 15500 may extrapolate the make and model of the sensor.

In some embodiments, the manufacturer may provide or make available digital twins of their products (e.g., sensors, devices, machinery, equipment, raw materials, and the like). In these embodiments, the digital twin creation module 15564 may import the digital twins of one or more products that are identified in the environment and may embed those digital twins in the digital twin of the environment. In embodiments, embedding a digital twin within another digital twin may include creating a relationship between the embedded digital twin with the other digital twin. In these embodiments, the manufacturer of the digital twin may define the behaviors and/or properties of the respective products. For example, a digital twin of a machine may define the manner by which the machine operates, the inputs/outputs of the machine, and the like. In this way, the digital twin of the machine may reflect the operation of the machine given a set of inputs.

In embodiments, a user may define one or more processes that occur in an environment. In these embodiments, the user may define the steps in the process, the machines/devices that perform each step in the process, the inputs to the process, and the outputs of the process.

In embodiments, the digital twin creation module 15564 may create a graph database that defines the relationships between a set of digital twins. In these embodiments, the digital twin creation module 15564 may create nodes for the environment, systems and subsystems of the environment, devices in the environment, sensors in the environment, workers that work in the environment, processes that are performed in the environment, and the like. In embodiments, the digital twin creation module 15564 may write the graph database representing a set of digital twins to the digital twin datastore 15516.

In embodiments, the digital twin creation module 15564 may, for each node, include any data relating to the entity in the node representing the entity. For example, in defining a node representing an environment, the digital twin creation module 15564 may include the dimensions, boundaries, layout, pathways, and other relevant spatial data in the node. Furthermore, the digital twin creation module 15564 may define a coordinate space with respect to the environment. In the case that the digital twin may be rendered, the digital twin creation module 15564 may include a reference in the node to any shapes, meshes, splines, surfaces, and the like that may be used to render the environment. In representing a system, subsystem, device, or sensor, the digital twin creation module 15564 may create a node for the respective entity and may include any relevant data. For example, the digital twin creation module 15564 may create a node representing a machine in the environment. In this example, the digital twin creation module 15564 may include the dimensions, behaviors, properties, location, and/or any other suitable data relating to the machine in the node representing the machine. The digital twin creation module 15564 may connect nodes of related entities with an edge, thereby creating a relationship between the entities. In doing so, the created relationship between the entities may define the type of relationship characterized by the edge. In representing a process, the digital twin creation module 15564 may create a node for the entire process or may create a node for each step in the process. In some of these embodiments, the digital twin creation module 15564 may relate the process nodes to the nodes that represent the machinery/devices that perform the steps in the process. In embodiments, where an edge connects the process step nodes to the machinery/device that performs the process step, the edge or one of the nodes may contain information that indicates the input to the step, the output of the step, the amount of time the step takes, the nature of processing of inputs to produce outputs, a set of states or modes the process can undergo, and the like.

In embodiments, the digital twin update module 15566 updates sets of digital twins based on a current status of one or more industrial entities. In some embodiments, the digital twin update module 15566 receives sensor data from a sensor system 15530 of an industrial environment and updates the status of the digital twin of the industrial environment and/or digital twins of any affected systems, subsystems, devices, workers, processes, or the like. As discussed, the digital twin I/O system 15504 may receive the sensor data in one or more sensor packets. The digital twin I/O system 15504 may provide the sensor data to the digital twin update module 15566 and may identify the environment from which the sensor packets were received and the sensor that provided the sensor packet. In response to the sensor data, the digital twin update module 15566 may update a state of one or more digital twins based on the sensor data. In some of these embodiments, the digital twin update module 15566 may update a record (e.g., a node in a graph database) corresponding to the sensor that provided the sensor data to reflect the current sensor data. In some scenarios, the digital twin update module 15566 may identify certain areas within the environment that are monitored by the sensor and may update a record (e.g., a node in a graph database) to reflect the current sensor data. For example, the digital twin update module 15566 may receive sensor data reflecting different vibrational characteristics of a machine and/or machine components. In this example, the digital twin update module 15566 may update the records representing the vibration sensors that provided the vibration sensor data and/or the records representing the machine and/or the machine components to reflect the vibration sensor data. In another example, in some scenarios, workers in an industrial environment (e.g., manufacturing facility, industrial storage facility, a mine, a drilling operation, or the like) may be required to wear wearable devices (e.g., smart watches, smart helmets, smart shoes, or the like). In these embodiments, the wearable devices may collect sensor data relating to the worker (e.g., location, movement, heartrate, respiration rate, body temperature, or the like) and/or the environment surrounding the worker and may communicate the collected sensor data to the digital twin system 15500 (e.g., via the real-time sensor API 15514) either directly or via an aggregation device of the sensor system. In response to receiving the sensor data from the wearable device of a worker, the digital twin update module 15566 may update a digital twin of a worker to reflect, for example, a location of the worker, a trajectory of the worker, a health status of the worker, or the like. In some of these embodiments, the digital twin update module 15566 may update a node representing a worker and/or an edge that connects the node representing the environment with the collected sensor data to reflect the current status of the worker.

In some embodiments, the digital twin update module 15566 may provide the sensor data from one or more sensors to the digital twin dynamic model system 15508, which may model a behavior of the environment and/or one or more industrial entities to extrapolate additional state data.

In embodiments, the digital twin visualization module 15568 receives requests to view a visual digital twin or a portion thereof. In embodiments, the request may indicate the digital twin to be viewed (e.g., an environment identifier) . In response, the digital twin visualization module 15568 may determine the requested digital twin and any other digital twins implicated by the request. For example, in requesting to view a digital twin of an environment, the digital twin visualization module 15568 may further identify the digital twins of any industrial entities within the environment. In embodiments, the digital twin visualization module 15568 may identify the spatial relationships between the industrial entities and the environment based on, for example, the relationships defined in a graph database. In these embodiments, the digital twin visualization module 15568 can determine the relative location of embedded digital twins within the containing digital twin, relative locations of adjoining digital twins, and/or the transience of the relationship (e.g., is an object fixed to a point or does the object move). The digital twin visualization module 15568 may render the requested digital twins and any other implicated digital twin based on the identified relationships. In some embodiments, the digital twin visualization module 15568 may, for each digital twin, determine the surfaces of the digital twin. In some embodiments, the surfaces of a digital may be defined or referenced in a record corresponding to the digital twin, which may be provided by a user, determined from imported images, or defined by a manufacturer of an industrial entity. In the scenario that an object can take different poses or shapes (e.g., an industrial robot), the digital twin visualization module 15568 may determine a pose or shape of the object for the digital twin. The digital twin visualization module 15568 may embed the digital twins into the requested digital twin and may output the requested digital twin to a client application.

In some of these embodiments, the request to view a digital twin may further indicate the type of view. As discussed, in some embodiments, digital twins may be depicted in a number of different view types. For example, an environment or device may be viewed in a "real-world" view that depicts the environment or device as they typically appear, in a "heat" view that depicts the environment or device in a manner that is indicative of a temperature of the environment or device, in a "vibration" view that depicts the machines and/or machine components in an industrial environment in a manner that is indicative of vibrational characteristics of the machines and/or machine components, in a "filtered" view that only displays certain types of objects within an environment or components of a device (such as objects that require attention resulting from, for example, recognition of a fault condition, an alert, an updated report, or other factor), an augmented view that overlays data on the digital twin, and/or any other suitable view types. In embodiments, digital twins may be depicted in a number of different role-based view types. For example, a manufacturing facility device may be viewed in an "operator" view that depicts the facility in a manner that is suitable for a facility operator, a "C-Suite" view that depicts the facility in a manner that is suitable for executive-level managers, a "marketing" view that depicts the facility in a manner that is suitable for workers in sales and/or marketing roles, a "board" view that depicts the facility in a manner that is suitable for members of a corporate board, a "regulatory" view that depicts the facility in a manner that is suitable for regulatory managers, and a "human resources" view that depicts the facility in a manner that is suitable for human resources personnel. In response to a request that indicates a view type, the digital twin visualization module 15568 may retrieve the data for each digital twin that corresponds to the view type. For example, if a user has requested a vibration view of a factory floor, the digital twin visualization module 15568 may retrieve vibration data for the factory floor (which may include vibration measurements taken from different machines and/or machine components and/or vibration measurements that were extrapolated by the digital twin dynamic model system 15508 and/or simulated vibration data from digital twin simulation system 15506) as well as available vibration data for any industrial entities appearing on the factory floor. In this example, the digital twin visualization module 15568 may determine colors corresponding to each machine component on a factory floor that represent a vibration fault level state (e.g., red for alarm, orange for critical, yellow for suboptimal, and green for normal operation). The digital twin visualization module 15568 may then render the digital twins of the machine components within the environment based on the determined colors. Additionally or alternatively, the digital twin visualization module 15568 may render the digital twins of the machine components within the environment with indicators having the determined colors. For instance, if the vibration fault level state of an inbound bearing of a motor is suboptimal and the outbound bearing of the motor is critical, the digital twin visualization module 15568 may render the digital twin of the inbound bearing having an indicator in a shade of yellow (e.g., suboptimal) and the outbound bearing having an indicator in a shade of orange (e.g., critical). It is noted that in some embodiments, the digital twin system 15500 may include an analytics system (not shown) that determine the manner by which the digital twin visualization system 15500 presents information to a human user. For example, the analytics system may track outcomes relating to human interactions with real-world environments or objects in response to information presented in a visual digital twin. In some embodiments, the analytics system may apply cognitive models to determine the most effective manner to display visualized information (e.g., what colors to use to denote an alarm condition, what kind of movements or animations bring attention to an alarm condition, or the like) or audio information (what sounds to use to denote an alarm condition) based on the outcome data. In some embodiments, the analytics system may apply cognitive models to determine the most suitable manner to display visualized information based on the role of the user. In embodiments, the visualization may include display of information related to the visualized digital twins, including graphical information, graphical information depicting vibration characteristics, graphical information depicting harmonic peaks, graphical information depicting peaks, vibration severity units data, vibration fault level state data, recommendations from cognitive intelligence system 15510, predictions from cognitive intelligence system 15510, probability of failure data, maintenance history data, time to failure data, cost of downtime data, probability of downtime data, cost of repair data, cost of machine replace data, probability of shutdown data, manufacturing KPIs, and the like.

In another example, a user may request a filtered view of a digital twin of a process, whereby the digital twin of the process only shows components (e.g., machine or equipment) that are involved in the process. In this example, the digital twin visualization module 15568 may retrieve a digital twin of the process, as well as any related digital twins (e.g., a digital twin of the environment and digital twins of any machinery or devices that impact the process). The digital twin visualization module 15568 may then render each of the digital twins (e.g., the environment and the relevant industrial entities) and then may perform the process on the rendered digital twins. It is noted that as a process may be performed over a period of time and may include moving items and/or parts, the digital twin visualization module 15568 may generate a series of sequential frames that demonstrate the process. In this scenario, the movements of the machines and/or devices implicated by the process may be determined according to the behaviors defined in the respective digital twins of the machines and/or devices.

As discussed, the digital twin visualization module 15568 may output the requested digital twin to a client application 15570. In some embodiments, the client application 15570 is a virtual reality application, whereby the requested digital twin is displayed on a virtual reality headset. In some embodiments, the client application 15570 is an augmented reality application, whereby the requested digital twin is depicted in an AR-enabled device. In these embodiments, the requested digital twin may be filtered such that visual elements and/or text are overlaid on the display of the AR-enabled device.

It is noted that while a graph database is discussed, the digital twin system 15500 may employ other suitable data structures to store information relating to a set of digital twins. In these embodiments, the data structures, and any related storage system, may be implemented such that the data structures provide for some degree of feedback loops and/or recursion when representing iteration of flows.

Figure 131:
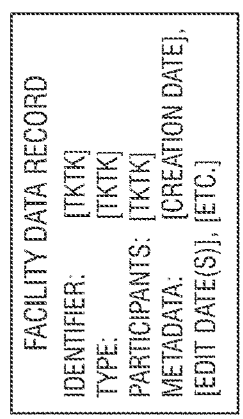
FIG. 131 depicts an example facility data record.

FIG. 131 illustrates an example of a digital twin I/O system 15504 that interfaces with the environment 15520, the digital twin system 15500, and/or components thereof to provide bi-directional transfer of data between coupled components according to some embodiments of the present disclosure.

In embodiments, the transferred data includes signals (e.g., request signals, command signals, response signals, etc.) between connected components, which may include software components, hardware components, physical devices, virtualized devices, simulated devices, combinations thereof, and the like. The signals may define material properties (e.g., physical quantities of temperature, pressure, humidity, density, viscosity, etc.), measured values (e.g., contemporaneous or stored values acquired by the device or system), device properties (e.g., device ID or properties of the device's design specifications, materials, measurement capabilities, dimensions, absolute position, relative position, combinations thereof, and the like), set points (e.g., targets for material properties, device properties, system properties, combinations thereof, and the like), and/or critical points (e.g., threshold values such as minimum or maximum values for material properties, device properties, system properties, etc.). The signals may be received from systems or devices that acquire (e.g., directly measure or generate) or otherwise obtain (e.g., receive, calculate, look-up, filter, etc.) the data, and may be communicated to or from the digital twin I/O system 15504 at predetermined times or in response to a request (e.g., polling) from the digital twin I/O system 15504. The communications may occur through direct or indirect connections (e.g., via intermediate modules within a circuit and/or intermediate devices between the connected components). The values may correspond to real-world elements **157302*r* (e.g., an input or output for a tangible vibration sensor) or virtual elements 157302*v* (e.g., an input or output for a digital twin 157302*d* and/or a simulated element 157302*s*** that provide vibration data).

In embodiments, the real-world elements **157302*r* may be elements within the industrial environment 15520. The real-world elements 157302*r* may include, for example, non-networked objects 15522, the devices 15524 (smart or non-smart), sensors 15526, and humans 15528. The real-world elements 151302*r* may be process or non-process equipment within the industrial environments 15520. For example, process equipment may include motors, pumps, mills, fans, painters, welders, smelters, etc., and non-process equipment may include personal protective equipment, safety equipment, emergency stations or devices (e.g., safety showers, eyewash stations, fire extinguishers, sprinkler systems, etc.), warehouse features (e.g., walls, floor layout, etc.), obstacles (e.g., persons or other items within the environment 15520**, etc.), etc.

In embodiments, the virtual elements **157302*v* may be digital representations of or that correspond to contemporaneously existing real-world elements 157302*r*. Additionally or alternatively, the virtual elements 157302*v*** may be digital representations of or that correspond to real-world elements

157302*r* that may be available for later addition and implementation into the environment 15520. The virtual elements may include, for example, simulated elements 175302*s* and/or digital twins 157302*d*. In embodiments, the simulated elements 157302*s* may be digital representations of real-world elements 157302*s* that are not present within the industrial environment 15520. The simulated elements 157302*s* may mimic desired physical properties which may be later integrated within the environment 15520 as real-world elements 157302*r* (e.g., a "black box" that mimics the dimensions of a real-world elements 157302*r*). The simulated elements 157302*s* may include digital twins of existing objects (e.g., a single simulated element 151302*s* may include one or more digital twins 151302*d* for existing sensors). Information related to the simulated elements 157302*s* may be obtained, for example, by evaluating behavior of corresponding real-world elements 157302*r* using mathematical models or algorithms, from libraries that define information and behavior of the simulated elements 131302*s* (e.g., physics libraries, chemistry libraries, or the like).

In embodiments, the digital twin 157302*d* may be a digital representation of one or more real-world elements 157302*r*. The digital twins 157302*d* are configured to mimic, copy, and/or model behaviors and responses of the real-world elements 157302*r* in response to inputs, outputs, and/or conditions of the surrounding or ambient environment. Data related to physical properties and responses of the real-world elements 157302*r* may be obtained, for example, via user input, sensor input, and/or physical modeling (e.g., thermodynamic models, electrodynamic models, mechanodynamic models, etc.). Information for the digital twin 157302*d* may correspond to and be obtained from the one or more real-world elements 157302*r* corresponding to the digital twin 157302*d*. For example, in some embodiments, the digital twin 131302*d* may correspond to one real-world element 157302*r* that is a fixed digital vibration sensor 15536 on a machine component, and vibration data for the digital twin 131302*d* may be obtained by polling or fetching vibration data measured by the fixed digital vibration sensor on the machine component. In a further example, the digital twin 157302*d* may correspond to a plurality of real-world elements 157302*r* such that each of the elements can be a fixed digital vibration sensor on a machine component, and vibration data for the digital twin 157302*d* may be obtained by polling or fetching vibration data measured by each of the fixed digital vibration sensors on the plurality of real-world elements 157302*r*. Additionally or alternatively, vibration data of a first digital twin 157302*d* may be obtained by fetching vibration data of a second digital twin 157302*d* that is embedded within the first digital twin 157302*d*, and vibration data for the first digital twin 157302*d* may include or be derived from vibration data for the second digital twin 157302*d*. For example, the first digital twin may be a digital twin 157302*d* of an environment 15520 (alternatively referred to as an "environmental digital twin") and the second digital twin 157302*d* may be a digital twin 157302*d* corresponding to a vibration sensor disposed within the environment 15520 such that the vibration data for the first digital twin 157302*d* is obtained from or calculated based on data including the vibration data for the second digital twin 157302*d*.

In embodiments, the digital twin system 15500 monitors properties of the real-world elements 157302*r* using the sensors 15526 within a respective environment 15520 that is or may be represented by a digital twin 157302*d* and/or outputs of models for one or more simulated elements 157302*s*. In embodiments, the digital twin system 15500 may minimize network congestion while maintaining effective monitoring of processes by extending polling intervals and/or minimizing data transfer for sensors corresponding that correspond to affected real-world elements 157302*r* and performing simulations (e.g., via the digital-twin simulation system 15506) during the extended interval using data that was obtained from other sources (e.g., sensors that are physically proximate to or have an effect on the affected real-world elements 157302*r*). Additionally or alternatively, error checking may be performed by comparing the collected sensor data with data obtained from the digital-twin simulation system 15506. For example, consistent deviations or fluctuations between sensor data obtained from the real-world element 157302*r* and the simulated element 157302*s* may indicate malfunction of the respective sensor or another fault condition.

In embodiments, the digital twin system 15500 may optimize features of the environment through use of one or more simulated elements 157302*s*. For example, the digital twin system 15500 may evaluate effects of the simulated elements 157302*s* within a digital twin of an environment to quickly and efficiently determine costs and/or benefits flowing from inclusion, exclusion, or substitution of real-world elements 157302*r* within the environment 15520. The costs and benefits may include, for example, increased machinery costs (e.g., capital investment and maintenance), increased efficiency (e.g., process optimization to reduce waste or increase throughput), decreased or altered footprint within the environment 15520, extension or optimization of useful lifespans, minimization of component faults, minimization of component downtime, etc.

In embodiments, the digital twin I/O system 15504 may include one or more software modules that are executed by one or more controllers of one or more devices (e.g., server devices, user devices, and/or distributed devices) to affect the described functions. The digital twin I/O system 15504 may include, for example, an input module 157304, an output module 157306, and an adapter module 157308.

In embodiments, the input module 157304 may obtain or import data from data sources in communication with the digital twin I/O system 15504, such as the sensor system 15530 and the digital twin simulation system 15506. The data may be immediately used by or stored within the digital twin system 15500. The imported data may be ingested from data streams, data batches, in response to a triggering event, combinations thereof, and the like. The input module 157304 may receive data in a format that is suitable to transfer, read, and/or write information within the digital twin system 15500.

In embodiments, the output module 157306 may output or export data to other system components (e.g., the digital twin datastore 15516, the digital twin simulation system 15506, the cognitive intelligence system 15510, etc.), devices 15524, and/or the client application 15570. The data may be output in data streams, data batches, in response to a triggering event (e.g., a request), combinations thereof, and the like. The output module 157306 may output data in a format that is suitable to be used or stored by the target element (e.g., one protocol for output to the client application and another protocol for the digital twin datastore 15516).

In embodiments, the adapter module 157308 may process and/or convert data between the input module 157304 and the output module 157306. In embodiments, the adapter module 157308 may convert and/or route data automatically (e.g., based on data type) or in response to a received request (e.g., in response to information within the data).

In embodiments, the digital twin system 15500 may represent a set of industrial workpiece elements in a digital twin, and the digital twin simulation system 15506 simulates a set of physical interactions of a worker with the workpiece elements.

In embodiments, the digital twin simulation system 15506 may determine process outcomes for the simulated physical interactions accounting for simulated human factors. For example, variations in workpiece throughput may be modeled by the digital twin system 15500 including, for example, worker response times to events, worker fatigue, discontinuity within worker actions (e.g., natural variations in human-movement speed, differing positioning times, etc.), effects of discontinuities on downstream processes, and the like. In embodiments, individualized worker interactions may be modeled using historical data that is collected, acquired, and/or stored by the digital twin system 15500. The simulation may begin based on estimated amounts (e.g., worker age, industry averages, workplace expectations, etc.). The simulation may also individualize data for each worker (e.g., comparing estimated amounts to collected worker-specific outcomes).

In embodiments, information relating to workers (e.g., fatigue rates, efficiency rates, and the like) may be determined by analyzing performance of specific workers over time and modeling said performance.

In embodiments, the digital twin system 15500 includes a plurality of proximity sensors within the sensor system 15530. The proximity sensors are or may be configured to detect elements of the environment 15520 that are within a predetermined area. For example, proximity sensors may include electromagnetic sensors, light sensors, and/or acoustic sensors.

The electromagnetic sensors are or may be configured to sense objects or interactions via one or more electromagnetic fields (e.g., emitted electromagnetic radiation or received electromagnetic radiation). In embodiments, the electromagnetic sensors include inductive sensors (e.g., radio-frequency identification sensors), capacitive sensors (e.g., contact and contactless capacitive sensors), combinations thereof, and the like.

The light sensors are or may be configured to sense objects or interactions via electromagnetic radiation in, for example, the far-infrared, near-infrared, optical, and/or ultraviolet spectra. In embodiments, the light sensors may include image sensors (e.g., charge-coupled devices and CMOS active-pixel sensors), photoelectric sensors (e.g., through-beam sensors, retroreflective sensors, and diffuse sensors), combinations thereof, and the like. Further, the light sensors may be implemented as part of a system or subsystem, such as a light detection and ranging ("LIDAR") sensor.

The acoustic sensors are or may be configured to sense objects or interactions via sound waves that are emitted and/or received by the acoustic sensors. In embodiments, the acoustic sensors may include infrasonic, sonic, and/or ultrasonic sensors. Further, the acoustic sensors may be grouped as part of a system or subsystem, such as a sound navigation and ranging ("SONAR") sensor.

In embodiments, the digital twin system 15500 stores and collects data from a set of proximity sensors within the environment 15520 or portions thereof. The collected data may be stored, for example, in the digital twin datastore 15516 for use by components the digital twin system 15500 and/or visualization by a user. Such use and/or visualization may occur contemporaneously with or after collection of the data (e.g., during later analysis and/or optimization of processes).

In embodiments, data collection may occur in response to a triggering condition. These triggering conditions may include, for example, expiration of a static or a dynamic predetermined interval, obtaining a value short of or in excess of a static or dynamic value, receiving an automatically generated request or instruction from the digital twin system 15500 or components thereof, interaction of an element with the respective sensor or sensors (e.g., in response to a worker or machine breaking a beam or coming within a predetermined distance from the proximity sensor), interaction of a user with a digital twin (e.g., selection of an environmental digital twin, a sensor array digital twin, or a sensor digital twin), combinations thereof, and the like.

In some embodiments, the digital twin system 15500 collects and/or stores RFID data in response to interaction of a worker with a real-world element **157302*r*. For example, in response to a worker interaction with a real-world environment, the digital twin will collect and/or store RFID data from RFID sensors within or associated with the corresponding environment 15520**. Additionally or alternatively, worker interaction with a sensor-array digital twin will collect and/or store RFID data from RFID sensors within or associated with the corresponding sensor array. Similarly, worker interaction with a sensor digital twin will collect and/or store RFID data from the corresponding sensor. The RFID data may include suitable data attainable by RFID sensors such as proximate RFID tags, RFID tag position, authorized RFID tags, unauthorized RFID tags, unrecognized RFID tags, RFID type (e.g., active or passive), error codes, combinations thereof, and the like.

In embodiments, the digital twin system 15500 may further embed outputs from one or more devices within a corresponding digital twin. In embodiments, the digital twin system 15500 embeds output from a set of individual-associated devices into an industrial digital twin. For example, the digital twin I/O system 15504 may receive information output from one or more wearable devices 15554 or mobile devices (not shown) associated with an individual within an industrial environment. The wearable devices may include image capture devices (e.g., body cameras or augmented-reality headwear), navigation devices (e.g., GPS devices, inertial guidance systems), motion trackers, acoustic capture devices (e.g., microphones), radiation detectors, combinations thereof, and the like.

In embodiments, upon receiving the output information, the digital twin I/O system 15504 routes the information to the digital twin creation module 15564 to check and/or update the environment digital twin and/or associated digital twins within the environment (e.g., a digital twin of a worker, machine, or robot position at a given time). Further, the digital twin system 15500 may use the embedded output to determine characteristics of the environment 15520.

In embodiments, the digital twin system 15500 embeds output from a LIDAR point cloud system into an industrial digital twin. For example, the digital twin I/O system 15504 may receive information output from one or more Lidar devices 15538 within an industrial environment. The Lidar devices 15538 is configured to provide a plurality of points having associated position data (e.g., coordinates in absolute or relative x, y, and z values). Each of the plurality of points may include further LIDAR attributes, such as intensity, return number, total returns, laser color data, return color data, scan angle, scan direction, etc. The Lidar devices 15538 may provide a point cloud that includes the plurality of points to the digital twin system 15500 via, for example, the digital twin I/O system 15504. Additionally or alternatively, the digital twin system 15500 may receive a stream of points and assemble the stream into a point cloud, or may receive a point cloud and assemble the received point cloud with existing point cloud data, map data, or three dimensional (3D)-model data.

In embodiments, upon receiving the output information, the digital twin I/O system 15504 routes the point cloud information to the digital twin creation module 15564 to check and/or update the environment digital twin and/or associated digital twins within the environment (e.g., a digital twin of a worker, machine, or robot position at a given time). In some embodiments, the digital twin system 15500 is further configured to determine closed-shape objects within the received LIDAR data. For example, the digital twin system 15500 may group a plurality of points within the point cloud as an object and, if necessary, estimate obstructed faces of objects (e.g., a face of the object contacting or adjacent a floor or a face of the object contacting or adjacent another object such as another piece of equipment). The system may use such closed-shape objects to narrow search space for digital twins and thereby increase efficiency of matching algorithms (e.g., a shape-matching algorithm).

In embodiments, the digital twin system 15500 embeds output from a simultaneous location and mapping ("SLAM") system in an environmental digital twin. For example, the digital twin I/O system 15504 may receive information output from the SLAM system, such as Slam sensor 15562, and embed the received information within an environment digital twin corresponding to the location determined by the SLAM system. In embodiments, upon receiving the output information from the SLAM system, the digital twin I/O system 15504 routes the information to the digital twin creation module 15564 to check and/or update the environment digital twin and/or associated digital twins within the environment (e.g., a digital twin of a workpiece, furniture, movable object, or autonomous object). Such updating provides digital twins of non-connected elements (e.g., furnishings or persons) automatically and without need of user interaction with the digital twin system 15500.

In embodiments, the digital twin system 15500 can leverage known digital twins to reduce computational requirements for the Slam sensor 15562 by using suboptimal map-building algorithms. For example, the suboptimal map-building algorithms may allow for a higher uncertainty tolerance using simple bounded-region representations and identifying possible digital twins. Additionally or alternatively, the digital twin system 15500 may use a bounded-region representation to limit the number of digital twins, analyze the group of potential twins for distinguishing features, then perform higher precision analysis for the distinguishing features to identify and/or eliminate categories of, groups of, or individual digital twins and, in the event that no matching digital twin is found, perform a precision scan of only the remaining areas to be scanned.

In embodiments, the digital twin system 15500 may further reduce compute required to build a location map by leveraging data captured from other sensors within the environment (e.g., captured images or video, radio images, etc.) to perform an initial map-building process (e.g., a simple bounded-region map or other suitable photogrammetry methods), associate digital twins of known environmental objects with features of the simple bounded-region map to refine the simple bounded-region map, and perform more precise scans of the remaining simple bounded regions to further refine the map. In some embodiments, the digital twin system 15500 may detect objects within received mapping information and, for each detected object, determine whether the detected object corresponds to an existing digital twin of a real-world-element. In response to determining that the detected object does not correspond to an existing real-world-element digital twin, the digital twin system 15500 may use, for example, the digital twin creation module 15564 to generate a new digital twin corresponding to the detected object (e.g., a detected-object digital twin) and add the detected-object digital twin to the real-world-element digital twins within the digital twin datastore. Additionally or alternatively, in response to determining that the detected object corresponds to an existing real-world-element digital twin, the digital twin system 15500 may update the real-world-element digital twin to include new information detected by the simultaneous location and mapping sensor, if any.

In embodiments, the digital twin system 15500 represents locations of autonomously or remotely moveable elements and attributes thereof within an industrial digital twin. Such movable elements may include, for example, workers, persons, vehicles, autonomous vehicles, robots, etc. The locations of the moveable elements may be updated in response to a triggering condition. Such triggering conditions may include, for example, expiration of a static or a dynamic predetermined interval, receiving an automatically generated request or instruction from the digital twin system 15500 or components thereof, interaction of an element with a respective sensor or sensors (e.g., in response to a worker or machine breaking a beam or coming within a predetermined distance from a proximity sensor), interaction of a user with a digital twin (e.g., selection of an environmental digital twin, a sensor array digital twin, or a sensor digital twin), combinations thereof, and the like.

In embodiments, the time intervals may be based on probability of the respective movable element having moved within a time period. For example, the time interval for updating a worker location may be relatively shorter for workers expected to move frequently (e.g., a worker tasked with lifting and carrying objects within and through the environment 15520) and relatively longer for workers expected to move infrequently (e.g., a worker tasked with monitoring a process stream). Additionally or alternatively, the time interval may be dynamically adjusted based on applicable conditions, such as increasing the time interval when no movable elements are detected, decreasing the time interval as or when the number of moveable elements within an environment increases (e.g., increasing number of workers and worker interactions), increasing the time interval during periods of reduced environmental activity (e.g., breaks such as lunch), decreasing the time interval during periods of abnormal environmental activity (e.g., tours, inspections, or maintenance), decreasing the time interval when unexpected or uncharacteristic movement is detected (e.g., frequent movement by a typically sedentary element or coordinated movement, for example, of workers approaching an exit or moving cooperatively to carry a large object), combinations thereof, and the like. Further, the time interval may also include additional, semi-random acquisitions. For example, occasional mid-interval locations may be acquired by the digital twin system 15500 to reinforce or evaluate the efficacy of the particular time interval.

In embodiments, the digital twin system 15500 may analyze data received from the digital twin I/O system

15504 to refine, remove, or add conditions. For example, the digital twin system 15500 may optimize data collection times for movable elements that are updated more frequently than needed (e.g., multiple consecutive received positions being identical or within a predetermined margin of error).

In embodiments, the digital twin system 15500 may receive, identify, and/or store a set of states 15840*a-n* related to the environment 15520. The states 15840*a-n* may be, for example, data structures that include a plurality of attributes 158404*a-n* and a set of identifying criteria 158406*a-n* to uniquely identify each respective state 15840*a-n*. In embodiments, the states 15840*a-n* may correspond to states where it is desirable for the digital twin system 15500 to set or alter conditions of real-world elements 157302*r* and/or the environment 15520 (e.g., increase/decrease monitoring intervals, alter operating conditions, etc.).

In embodiments, the set of states 15840*a-n* may further include, for example, minimum monitored attributes for each state 15840*a-n*, the set of identifying criteria 158406*a-n* for each state 15840*a-n*, and/or actions available to be taken or recommended to be taken in response to each state 15840*a-n*. Such information may be stored by, for example, the digital twin datastore 15516 or another datastore. The states 15840*a-n* or portions thereof may be provided to, determined by, or altered by the digital twin system 15500. Further, the set of states 15840*a-n* may include data from disparate sources. For example, details to identify and/or respond to occurrence of a first state may be provided to the digital twin system 15500 via user input, details to identify and/or respond to occurrence of a second state may be provided to the digital twin system 15500 via an external system, details to identify and/or respond to occurrence of a third state may be determined by the digital twin system 15500 (e.g., via simulations or analysis of process data), and details to identify and/or respond to occurrence of a fourth state may be stored by the digital twin system 15500 and altered as desired (e.g., in response to simulated occurrence of the state or analysis of data collected during an occurrence of and response to the state).

In embodiments, the plurality of attributes 158404*a-n* includes at least the attributes 158404*a-n* needed to identify the respective state 15840*a-n*. The plurality of attributes 158404*a-n* may further include additional attributes that are or may be monitored in determining the respective state 15840*a-n*, but are not needed to identify the respective state 15840*a-n*. For example, the plurality of attributes 158404*a-n* for a first state may include relevant information such as rotational speed, fuel level, energy input, linear speed, acceleration, temperature, strain, torque, volume, weight, etc.

The set of identifying criteria 158406*a-n* may include information for each of the set of attributes 158404*a-n* to uniquely identify the respective state. The identifying criteria 158406*a-n* may include, for example, rules, thresholds, limits, ranges, logical values, conditions, comparisons, combinations thereof, and the like.

The change in operating conditions or monitoring may be any suitable change. For example, after identifying occurrence of a respective state 158406*a-n*, the digital twin system 15500 may increase or decrease monitoring intervals for a device (e.g., decreasing monitoring intervals in response to a measured parameter differing from nominal operation) without altering operation of the device. Additionally or alternatively, the digital twin system 15500 may alter operation of the device (e.g., reduce speed or power input) without altering monitoring of the device. In further embodiments, the digital twin system 15500 may alter operation of the device (e.g., reduce speed or power input) and alter monitoring intervals for the device (e.g., decreasing monitoring intervals).

FIG. 158 illustrates an example set of identified states 15840*a-n* related to industrial environments that the digital twin system 15500 may identify and/or store for access by intelligent systems (e.g., the cognitive intelligence system 15510) or users of the digital twin system 15500, according to some embodiments of the present disclosure. The states 15840*a-n* may include operational states (e.g., suboptimal, normal, optimal, critical, or alarm operation of one or more components), excess or shortage states (e.g., supply-side or output-side quantities), combinations thereof, and the like.

In embodiments, the digital twin system 15500 may monitor attributes 158404*a-n* of real-world elements 157302*r* and/or digital twins 157302*d* to determine the respective state 15840*a-n*. The attributes 158404*a-n* may be, for example, operating conditions, set points, critical points, status indicators, other sensed information, combinations thereof, and the like. For example, the attributes 158404*a-n* may include power input 158404*a*, operational speed 158404*b*, critical speed 158404*c*, and operational temperature 158404*d* of the monitored elements. While the illustrated example illustrates uniform monitored attributes, the monitored attributes may differ by target device (e.g., the digital twin system 15500 would not monitor rotational speed for an object with no rotatable components).

Each of the states 15840*a-n* includes a set of identifying criteria 158406*a-n* meeting particular criteria that are unique among the group of monitored states 13240*a-n*. The digital twin system 15500 may identify the overspeed state 15540*a*, for example, in response to the monitored attributes 158404*a-n* meeting a first set of identifying criteria 158406*a* (e.g., operational speed 158404*b* being higher than the critical speed 158404*c*, while the operational temperature 158404*d* is nominal).

In response to determining that one or more states 15840*a-n* exists or has occurred, the digital twin system 15500 may update triggering conditions for one or more monitoring protocols, issue an alert or notification, or trigger actions of subcomponents of the digital twin system 15500. For example, subcomponents of the digital twin system 15500 may take actions to mitigate and/or evaluate impacts of the detected states 15540*a-n*. When attempting to take actions to mitigate impacts of the detected states 15540*a-n* on real-world elements 157302*r*, the digital twin system 15500 may determine whether instructions exist (e.g., are stored in the digital twin datastore 15516) or should be developed (e.g., developed via simulation and cognitive intelligence or via user or worker input). Further, the digital twin system 15500 may evaluate impacts of the detected states 15540*a-n*, for example, concurrently with the mitigation actions or in response to determining that the digital twin system 15500 has no stored mitigation instructions for the detected states 15540*a-n*.

In embodiments, the digital twin system 15500 employs the digital twin simulation system 15506 to simulate one or more impacts, such as immediate, upstream, downstream, and/or continuing effects, of recognized states. The digital twin simulation system 15506 may collect and/or be provided with values relevant to the evaluated states 15540*a-n*. In simulating the impact of the one or more states 15540*a-n*, the digital twin simulation system 15506 may recursively evaluate performance characteristics of affected digital twins 157302*d* until convergence is achieved. The digital twin simulation system 15506 may work, for example, in tandem with the cognitive intelligence system 15510 to determine response actions to alleviate, mitigate, inhibit, and/or prevent occurrence of the one or more states 15540*a-n*. For example, the digital twin simulation system 15506 may recursively simulate impacts of the one or more states 15540*a-n* until achieving a desired fit (e.g., convergence is achieved), provide the simulated values to the cognitive intelligence system 15510 for evaluation and determination of potential actions, receive the potential actions, evaluate impacts of each of the potential actions for a respective desired fit (e.g., cost functions for minimizing production disturbance, preserving critical components, minimizing maintenance and/or downtime, optimizing system, worker, user, or personal safety, etc.).

In embodiments, the digital twin simulation system 15506 and the cognitive intelligence system 15510 may repeatedly share and update the simulated values and response actions for each desired outcome until desired conditions are met (e.g., convergence for each evaluated cost function for each evaluated action). The digital twin system 15500 may store the results in the digital twin datastore 15516 for use in response to determining that one or more states 15540*a-n* has occurred. Additionally, simulations and evaluations by the digital twin simulation system 15506 and/or the cognitive intelligence system 15510 may occur in response to occurrence or detection of the event.

In embodiments, simulations and evaluations are triggered only when associated actions are not present within the digital twin system 15500. In further embodiments, simulations and evaluations are performed concurrently with use of stored actions to evaluate the efficacy or effectiveness of the actions in real time and/or evaluate whether further actions should be employed or whether unrecognized states may have occurred. In embodiments, the cognitive intelligence system 15510 may also be provided with notifications of instances of undesired actions with or without data on the undesired aspects or results of such actions to optimize later evaluations.

In embodiments, the digital twin system 15500 evaluates and/or represents the impact of machine downtime within a digital twin of a manufacturing facility. For example, the digital twin system 15500 may employ the digital twin simulation system 15506 to simulate the immediate, upstream, downstream, and/or continuing effects of a machine downtime state 15540*b*. The digital twin simulation system 15506 may collect or be provided with performance-related values such as optimal, suboptimal, and minimum performance requirements for elements (e.g., real-world elements 157302*r* and/or nested digital twins 157302*d*) within the affected digital twins 157302*d*, and/or characteristics thereof that are available to the affected digital twins 157302*d*, nested digital twins 157302*d*, redundant systems within the affected digital twins 157302*d*, combinations thereof, and the like.

In embodiments, the digital twin system 15500 is configured to: simulate one or more operating parameters for the real-world elements in response to the industrial environment being supplied with given characteristics using the real-world-element digital twins; calculate a mitigating action to be taken by one or more of the real-world elements in response to being supplied with the contemporaneous characteristics; and actuate, in response to detecting the contemporaneous characteristics, the mitigating action. The calculation may be performed in response to detecting contemporaneous characteristics or operating parameters falling outside of respective design parameters or may be determined via a simulation prior to detection of such characteristics.

Additionally or alternatively, the digital twin system 15500 may provide alerts to one or more users or system elements in response to detecting states.

In embodiments, the digital twin I/O system 15504 includes a pathing module 157310. The pathing module 157310 may ingest navigational data from the elements 157302, provide and/or request navigational data to components of the digital twin system 15500 (e.g., the digital twin simulation system 15506, the digital twin behavior system, and/or the cognitive intelligence system 15510), and/or output navigational data to elements 157302 (e.g., to the wearable devices 15554). The navigational data may be collected or estimated using, for example, historical data, guidance data provided to the elements 157302, combinations thereof, and the like.

For example, the navigational data may be collected or estimated using historical data stored by the digital twin system 15500. The historical data may include or be processed to provide information such as acquisition time, associated elements 157302, polling intervals, task performed, laden or unladen conditions, whether prior guidance data was provided and/or followed, conditions of the environment 15520, other elements 157302 within the environment 15520, combinations thereof, and the like. The estimated data may be determined using one or more suitable pathing algorithms. For example, the estimated data may be calculated using suitable order-picking algorithms, suitable path-search algorithms, combinations thereof, and the like. The order-picking algorithm may be, for example, a largest gap algorithm, an s-shape algorithm, an aisle-by-aisle algorithm, a combined algorithm, combinations thereof, and the like. The path-search algorithms may be, for example, Dijkstra's algorithm, the A* algorithm, hierarchical path-finding algorithms, incremental path-finding algorithms, any angle path-finding algorithms, flow field algorithms, combinations thereof, and the like.

Additionally or alternatively, the navigational data may be collected or estimated using guidance data of the worker. The guidance data may include, for example, a calculated route provided to a device of the worker (e.g., a mobile device or the wearable device 15554). In another example, the guidance data may include a calculated route provided to a device of the worker that instructs the worker to collect vibration measurements from one or more locations on one or more machines along the route. The collected and/or estimated navigational data may be provided to a user of the digital twin system 15500 for visualization, used by other components of the digital twin system 15500 for analysis, optimization, and/or alteration, provided to one or more elements 157302, combinations thereof, and the like.

In embodiments, the digital twin system 15500 ingests navigational data for a set of workers for representation in a digital twin. Additionally or alternatively, the digital twin system 15500 ingests navigational data for a set of mobile equipment assets of an industrial environment into a digital twin.

In embodiments, the digital twin system 15500 ingests a system for modeling traffic of mobile elements in an industrial digital twin. For example, the digital twin system 15500 may model traffic patterns for workers or persons within the environment 15520, mobile equipment assets, combinations thereof, and the like. The traffic patterns may be estimated based on modeling traffic patterns from and historical data and contemporaneous ingested data. Further, the traffic patterns may be continuously or intermittently updated depending on conditions within the environment 15520 (e.g., a plurality of autonomous mobile equipment assets may provide information to the digital twin system 15500 at a slower update interval than the environment 15520 including both workers and mobile equipment assets).

The digital twin system 15500 may alter traffic patterns (e.g., by providing updated navigational data to one or more of the mobile elements) to achieve one or more predetermined criteria. The predetermined criteria may include, for example, increasing process efficiency, decreasing interactions between laden workers and mobile equipment assets, minimizing worker path length, routing mobile equipment around paths or potential paths of persons, combinations thereof, and the like.

In embodiments, the digital twin system 15500 may provide traffic data and/or navigational information to mobile elements in an industrial digital twin. The navigational information may be provided as instructions or rule sets, displayed path data, or selective actuation of devices. For example, the digital twin system 15500 may provide a set of instructions to a robot to direct the robot to and/or along a desired route for collecting vibration data from one or more specified locations on one or more specified machines along the route using a vibration sensor. The robot may communicate updates to the system including obstructions, reroutes, unexpected interactions with other assets within the environment 15520, etc.

In some embodiments, an ant-based system 15574 enables industrial entities, including robots, to lay a trail with one or more messages for other industrial entities, including themselves, to follow in later journeys. In embodiments, the messages include information related to vibration measurement collection. In embodiments, the messages include information related to vibration sensor measurement locations. In some embodiments, the trails may be configured to fade over time. In some embodiments, the ant-based trails may be experienced via an augmented reality system. In some embodiments, the ant-based trails may be experienced via a virtual reality system. In some embodiments, the ant-based trails may be experienced via a mixed reality system. In some embodiments, ant-based tagging of areas can trigger a pain-response and/or accumulate into a warning signal. In embodiments, the ant-based trails may be configured to generate an information filtering response. In some embodiments, the ant-based trails may be configured to generate an information filtering response wherein the information filtering response is a heightened sense of visual awareness. In some embodiments, the ant-based trails may be configured to generate an information filtering response wherein the information filtering response is a heightened sense of acoustic awareness. In some embodiments, the messages include vectorized data.

In embodiments, the digital twin system 15500 includes design specification information for representing a real-world element 157302*r* using a digital twin 157302*d*. The digital may correspond to an existing real-world element 157302*r* or a potential real-world element 157302*r*. The design specification information may be received from one or more sources. For example, the design specification information may include design parameters set by user input, determined by the digital twin system 15500 (e.g., the via digital twin simulation system 15506), optimized by users or the digital twin simulation system 15506, combinations thereof, and the like. The digital twin simulation system 15506 may represent the design specification information for the component to users, for example, via a display device or a wearable device. The design specification information may be displayed schematically (e.g., as part of a process diagram or table of information) or as part of an augmented reality or virtual reality display. The design specification information may be displayed, for example, in response to a user interaction with the digital twin system 15500 (e.g., via user selection of the element or user selection to generally include design specification information within displays). Additionally or alternatively, the design specification information may be displayed automatically, for example, upon the element coming within view of an augmented reality or virtual reality device. In embodiments, the displayed design specification information may further include indicia of information source (e.g., different displayed colors indicate user input versus digital twin system 15500 determination), indicia of mismatches (e.g., between design specification information and operational information), combinations thereof, and the like.

In embodiments, the digital twin system 15500 embeds a set of control instructions for a wearable device within an industrial digital twin, such that the control instructions are provided to the wearable device to induce an experience for a wearer of the wearable device upon interaction with an element of the industrial digital twin. The induced experience may be, for example, an augmented reality experience or a virtual reality experience. The wearable device, such as a headset, may be configured to output video, audio, and/or haptic feedback to the wearer to induce the experience. For example, the wearable device may include a display device and the experience may include display of information related to the respective digital twin. The information displayed may include maintenance data associated with the digital twin, vibration data associated with the digital twin, vibration measurement location data associated with the digital twin, financial data associated with the digital twin, such as a profit or loss associated with operation of the digital twin, manufacturing KPIs associated with the digital twin, information related to an occluded element (e.g., a sub-assembly) that is at least partially occluded by a foreground element (e.g., a housing), a virtual model of the occluded element overlaid on the occluded element and visible with the foreground element, operating parameters for the occluded element, a comparison to a design parameter corresponding to the operating parameter displayed, combinations thereof, and the like. Comparisons may include, for example, altering display of the operating parameter to change a color, size, and/or display period for the operating parameter.

In some embodiments, the displayed information may include indicia for removable elements that are or may be configured to provide access to the occluded element with each indicium being displayed proximate to or overlying the respective removable element. Further, the indicia may be sequentially displayed such that a first indicium corresponding to a first removable element (e.g., a housing) is displayed, and a second indicium corresponding to a second removable element (e.g., an access panel within the housing) is displayed in response to the worker removing the first removable element. In some embodiments, the induced experience allows the wearer to see one or more locations on a machine for optimal vibration measurement collection. In an example, the digital twin system 15500 may provide an augmented reality view that includes highlighted vibration measurement collection locations on a machine and/or instructions related to collecting vibration measurements. Furthering the example, the digital twin system 15500 may provide an augmented reality view that includes instructions related to timing of vibration measurement collection. Information utilized in displaying the highlighted placement locations may be obtained using information stored by the digital twin system 15500. In some embodiments, mobile elements may be tracked by the digital twin system 15500 (e.g., via observational elements within the environment 15520 and/or via pathing information communicated to the digital twin system 15500) and continually displayed by the wearable device within the occluded view of the worker. This optimizes movement of elements within the environment 15520, increases worker safety, and minimizes down time of elements resulting from damage.

In some embodiments, the digital twin system 15500 may provide an augmented reality view that displays mismatches between design parameters or expected parameters of real-world elements 157302*r* to the wearer. The displayed information may correspond to real-world elements 157302*r* that are not within the view of the wearer (e.g., elements within another room or obscured by machinery). This allows the worker to quickly and accurately troubleshoot mismatches to determine one or more sources for the mismatch. The cause of the mismatch may then be determined, for example, by the digital twin system 15500 and corrective actions ordered. In example embodiments, a wearer may be able to view malfunctioning subcomponents of machines without removing occluding elements (e.g., housings or shields). Additionally or alternatively, the wearer may be provided with instructions to repair the device, for example, including display of the removal process (e.g., location of fasteners to be removed), assemblies or subassemblies that should be transported to other areas for repair (e.g., dust-sensitive components), assemblies or subassemblies that need lubrication, and locations of objects for reassembly (e.g., storing location that the wearer has placed removed objects and directing the wearer or another wearer to the stored locations to expedite reassembly and minimize further disassembly or missing parts in the reassembled element). This can expedite repair work, minimize process impact, allow workers to disassemble and reassemble equipment (e.g., by coordinating disassembly without direct communication between the workers), increase equipment longevity and reliability (e.g., by assuring that all components are properly replaced prior to placing back in service), combinations thereof, and the like.

In some embodiments, the induced experience includes a virtual reality view or an augmented reality view that allows the wearer to see information related to existing or planned elements. The information may be unrelated to physical performance of the element (e.g., financial performance such as asset value, energy cost, input material cost, output material value, legal compliance, and corporate operations). One or more wearers may perform a virtual walkthrough or an augmented walkthrough of the industrial environment 15520.

In examples, the wearable device displays compliance information that expedites inspections or performance of work.

In further examples, the wearable device displays financial information that is used to identify targets for alteration or optimization. For example, a manager or officer may inspect the environment 15520 for compliance with updated regulations, including information regarding compliance with former regulations, "grandfathered," and/or excepted elements. This can be used to reduce unnecessary downtime (e.g., scheduling upgrades for the least impactful times, such as during planned maintenance cycles), prevent unnecessary upgrades (e.g., replacing grandfathered or excepted equipment), and reduce capital investment.

Referring back to FIG. 155, in embodiments, the digital twin system 15500 may include, integrate, integrate with, manage, handle, link to, take input from, provide output to, control, coordinate with, or otherwise interact with a digital twin dynamic model system 15508. The digital twin dynamic model system 15508 can update the properties of a set of digital twins of a set of industrial entities and/or environments, including properties of physical industrial assets, workers, processes, manufacturing facilities, warehouses, and the like (or any of the other types of entities or environments described in this disclosure or in the documents incorporated by reference herein) in such a manner that the digital twins may represent those industrial entities and environments, and properties or attributes thereof, in real-time or very near real-time. In some embodiments, the digital twin dynamic model system 15508 may obtain sensor data received from a sensor system 15530 and may determine one or more properties of an industrial environment or an industrial entity within an environment based on the sensor data and based on one or more dynamic models.

In embodiments, the digital twin dynamic model system 15508 may update/assign values of various properties in a digital twin and/or one or more embedded digital twins, including, but not limited to, vibration values, vibration fault level states, probability of failure values, probability of downtime values, cost of downtime values, probability of shutdown values, financial values, KPI values, temperature values, humidity values, heat flow values, fluid flow values, radiation values, substance concentration values, velocity values, acceleration values, location values, pressure values, stress values, strain values, light intensity values, sound level values, volume values, shape characteristics, material characteristics, and dimensions.

In embodiments, a digital twin may be comprised of (e.g., via reference) of other embedded digital twins. For example, a digital twin of a manufacturing facility may include an embedded digital twin of a machine and one or more embedded digital twins of one or more respective motors enclosed within the machine. A digital twin may be embedded, for example, in the memory of an industrial machine that has an onboard IT system (e.g., the memory of an Onboard Diagnostic System, control system (e.g., SCADA system) or the like). Other non-limiting examples of where a digital twin may be embedded include the following: on a wearable device of a worker; in memory on a local network asset, such as a switch, router, access point, or the like; in a cloud computing resource that is provisioned for an environment or entity; and on an asset tag or other memory structure that is dedicated to an entity.

In one example, the digital twin dynamic model system 15508 can update vibration characteristics throughout an industrial environment digital twin based on captured vibration sensor data measured at one or more locations in the industrial environment and one or more dynamic models that model vibration within the industrial environment digital twin. The industrial digital twin may, before updating, already contain information about properties of the industrial entities and/or environment that can be used to feed a dynamic model, such as information about materials, shapes/volumes (e.g., of conduits), positions, connections/interfaces, and the like, such that vibration characteristics can be represented for the entities and/or environment in the digital twin. Alternatively, the dynamic models may be configured using such information.

In embodiments, the digital twin dynamic model system 15508 can update the properties of a digital twin and/or one or more embedded digital twins on behalf of a client application 15570. In embodiments, a client application 15570 may be an application relating to an industrial component or environment (e.g., monitoring an industrial facility or a component within, simulating an industrial environment, or the like). In embodiments, the client application 15570 may be used in connection with both fixed and mobile data collection systems. In embodiments, the client application 15570 may be used in connection with Industrial Internet of Things sensor system 15530.

In embodiments, the digital twin dynamic model system 15508 leverages digital twin dynamic models 155100 to model the behavior of an industrial entity and/or environment. Dynamic models 155100 may enable digital twins to represent physical reality, including the interactions of industrial entities, by using a limited number of measurements to enrich the digital representation of an industrial entity and/or environment, such as based on scientific principles. In embodiments, the dynamic models 155100 are formulaic or mathematical models. In embodiments, the dynamic models 155100 adhere to scientific laws, laws of nature, and formulas (e.g., Newton's laws of motion, second law of thermodynamics, Bernoulli's principle, ideal gas law, Dalton's law of partial pressures, Hooke's law of elasticity, Fourier's law of heat conduction, Archimedes' principle of buoyancy, and the like). In embodiments, the dynamic models are machine-learned models.

In embodiments, the digital twin system 15500 may have a digital twin dynamic model datastore 155102 for storing dynamic models 155100 that may be represented in digital twins. In embodiments, digital twin dynamic model datastore can be searchable and/or discoverable. In embodiments, digital twin dynamic model datastore can contain metadata that allows a user to understand what characteristics a given dynamic model can handle, what inputs are required, what outputs are provided, and the like. In some embodiments, digital twin dynamic model datastore 155102 can be hierarchical (such as where a model can be deepened or made more simple based on the extent of available data and/or inputs, the granularity of the inputs, and/or situational factors (such as where something becomes of high interest and a higher fidelity model is accessed for a period of time).

In embodiments, a digital twin or digital representation of an industrial entity or facility may include a set of data structures that collectively define a set of properties of a represented physical industrial asset, device, worker, process, facility, and/or environment, and/or possible behaviors thereof. In embodiments, the digital twin dynamic model system 15508 may leverage the dynamic models 155100 to inform the set of data structures that collectively define a digital twin with real-time data values. The digital twin dynamic models 155100 may receive one or more sensor measurements, Industrial Internet of Things device data, and/or other suitable data as inputs and calculate one or more outputs based on the received data and one or more dynamic models 155100. The digital twin dynamic model system 15508 then uses the one or more outputs to update the digital twin data structures.

In one example, the set of properties of a digital twin of an industrial asset that may be updated by the digital twin dynamic model system 15508 using dynamic models 155100 may include the vibration characteristics of the asset, temperature(s) of the asset, the state of the asset (e.g., a solid, liquid, or gas), the location of the asset, the displacement of the asset, the velocity of the asset, the acceleration of the asset, probability of downtime values associated with the asset, cost of downtime values associated with the asset, probability of shutdown values associated with the asset, manufacturing KPIs associated with the asset, financial information associated with the asset, heat flow characteristics associated with the asset, fluid flow rates associated with the asset (e.g., fluid flow rates of a fluid flowing through a pipe), identifiers of other digital twins embedded within the digital twin of the asset and/or identifiers of digital twins embedding the digital twin of the asset, and/or other suitable properties. Dynamic models 155100 associated with a digital twin of an asset can be configured to calculate, interpolate, extrapolate, and/or output values for such asset digital twin properties based on input data collected from sensors and/or devices disposed in the industrial setting and/or other suitable data and subsequently populate the asset digital twin with the calculated values.

In some embodiments, the set of properties of a digital twin of an industrial device that may be updated by the digital twin dynamic model system 15508 using dynamic models 155100 may include the status of the device, a location of the device, the temperature(s) of a device, a trajectory of the device, identifiers of other digital twins that the digital twin of the device is embedded within, embeds, is linked to, includes, integrates with, takes input from, provides output to, and/or interacts with and the like. Dynamic models 155100 associated with a digital twin of a device can be configured to calculate or output values for these device digital twin properties based on input data and subsequently update the device digital twin with the calculated values.

In some embodiments, the set of properties of a digital twin of an industrial worker that may be updated by the digital twin dynamic model system 15508 using dynamic models 155100 may include the status of the worker, the location of the worker, a stress measure for the worker, a task being performed by the worker, a performance measure for the worker, and the like. Dynamic models associated with a digital twin of an industrial worker can be configured to calculate or output values for such properties based on input data, which then may be used to populate industrial worker digital twin. In embodiments, industrial worker dynamic models (e.g., psychometric models) can be configured to predict reactions to stimuli, such as cues that are given to workers to direct them to undertake tasks and/or alerts or warnings that are intended to induce safe behavior. In embodiments, industrial worker dynamic models may be workflow models (Gantt charts and the like), failure mode effects analysis models (FMEA), biophysical models (such as to model worker fatigue, energy utilization, hunger), and the like.

Example properties of a digital twin of an industrial environment that may be updated by the digital twin dynamic model system 15508 using dynamic models 155100 may include the dimensions of the industrial environment, the temperature(s) of the industrial environment, the humidity value(s) of the industrial environment, the fluid flow characteristics in the industrial environment, the heat flow characteristics of the industrial environment, the lighting characteristics of the industrial environment, the acoustic characteristics of the industrial environment the physical objects in the environment, processes occurring in the industrial environment, currents of the industrial environment (if a body of water), and the like. Dynamic models associated with a digital twin of an industrial environment can be configured to calculate or output these properties based on input data collected from sensors and/or devices disposed in the industrial environment and/or other suitable data and subsequently populate the industrial environment digital twin with the calculated values.

In embodiments, dynamic models 155100 may adhere to physical limitations that define boundary conditions, constants or variables for digital twin modeling. For example, the physical characterization of a digital twin of an industrial entity or industrial environment may include a gravity constant (e.g., 9.8 m/s2), friction coefficients of surfaces, thermal coefficients of materials, maximum temperatures of assets, maximum flow capacities, and the like. Additionally or alternatively, the dynamic models may adhere to the laws of nature. For example, dynamic models may adhere to the laws of thermodynamics, laws of motion, laws of fluid dynamics, laws of buoyancy, laws of heat transfer, laws or radiation, laws of quantum dynamics, and the like. In some embodiments, dynamic models may adhere to biological aging theories or mechanical aging principles. Thus, when the digital twin dynamic model system 15508 facilitates a real-time digital representation, the digital representation may conform to dynamic models, such that the digital representations mimic real world conditions. In some embodiments, the output(s) from a dynamic model can be presented to a human user and/or compared against real-world data to ensure convergence of the dynamic models with the real world. Furthermore, as dynamic models are based partly on assumptions, the properties of a digital twin may be improved and/or corrected when a real-world behavior differs from that of the digital twin. In embodiments, additional data collection and/or instrumentation can be recommended based on the recognition that an input is missing from a desired dynamic model, that a model in operation isn't working as expected (perhaps due to missing and/or faulty sensor information), that a different result is needed (such as due to situational factors that make something of high interest), and the like.

Dynamic models may be obtained from a number of different sources. In some embodiments, a user can upload a model created by the user or a third party. Additionally or alternatively, the models may be created on the digital twin system using a graphical user interface. The dynamic models may include bespoke models that are configured for a particular environment and/or set of industrial entities and/or agnostic models that are applicable to similar types of digital twins. The dynamic models may be machine-learned models.

FIG. 159 illustrates example embodiments of a method for updating a set of properties of a digital twin and/or one or more embedded digital twins on behalf of client applications 15570. In embodiments, digital twin dynamic model system 15508 leverages one or more dynamic models 155100 to update a set of properties of a digital twin and/or one or more embedded digital twins on behalf of client application 15570 based on the impact of collected sensor data from sensor system 15530, data collected from Internet of Things connected devices 15524, and/or other suitable data in the set of dynamic models 155100 that are used to enable the industrial digital twins. In embodiments, the digital twin dynamic model system 15508 may be instructed to run specific dynamic models using one or more digital twins that represent physical industrial assets, devices, workers, processes, and/or industrial environments that are managed, maintained, and/or monitored by the client applications 15570.

In embodiments, the digital twin dynamic model system 15508 may obtain data from other types of external data sources that are not necessarily industrial-related data sources, but may provide data that can be used as input data for the dynamic models. For example, weather data, news events, social media data, and the like may be collected, crawled, subscribed to, and the like to supplement sensor data, Industrial Internet of Things device data, and/or other data that is used by the dynamic models. In embodiments, the digital twin dynamic model system 15508 may obtain data from a machine vision system. The machine vision system may use video and/or still images to provide measurements (e.g., locations, statuses, and the like) that may be used as inputs by the dynamic models.

In embodiments, the digital twin dynamic model system 15508 may feed this data into one or more of the dynamic models discussed above to obtain one or more outputs. These outputs may include calculated vibration fault level states, vibration severity unit values, vibration characteristics, probability of failure values, probability of downtime values, probability of shutdown values, cost of downtime values, cost of shutdown values, time to failure values, temperature values, pressure values, humidity values, precipitation values, visibility values, air quality values, strain values, stress values, displacement values, velocity values, acceleration values, location values, performance values, financial values, manufacturing KPI values, electrodynamic values, thermodynamic values, fluid flow rate values, and the like. The client application 15570 may then initiate a digital twin visualization event using the results obtained by the digital twin dynamic model system 15508. In embodiments, the visualization may be a heat map visualization.

In embodiments, the digital twin dynamic model system 15508 may receive requests to update one or more properties of digital twins of industrial entities and/or environments such that the digital twins represent the industrial entities and/or environments in real-time. At 159100, the digital twin dynamic model system 15508 receives a request to update one or more properties of one or more of the digital twins of industrial entities and/or environments. For example, the digital twin dynamic model system 15508 may receive the request from a client application 15570 or from another process executed by the digital twin system 15500 (e.g., a predictive maintenance process). The request may indicate the one or more properties and the digital twin or digital twins implicated by the request. In step 159102, the digital twin dynamic model system 15508 determines the one or more digital twins required to fulfill the request and retrieves the one or more required digital twins, including any embedded digital twins, from digital twin datastore 15516. At 159104, digital twin dynamic model system 15508 determines one or more dynamic models required to fulfill the request and retrieves the one or more required dynamic models from digital twin dynamic model datastore 155102. At 159106, the digital twin dynamic model system 15508 selects one or more sensors from sensor system 15530, data collected from Internet of Things connected devices 15524, and/or other data sources from digital twin I/O system 15504 based on available data sources and the one or more required inputs of the dynamic model(s). In embodiments, the data sources may be defined in the inputs required by the one or more dynamic models or may be selected using a lookup table. At 159108, the digital twin dynamic model system 15508 retrieves the selected data from digital twin I/O system 15504. At 159110, digital twin dynamic model system 15508 runs the dynamic model(s) using the retrieved input data (e.g., vibration sensor data, Industrial Internet of Things device data, and the like) as inputs and determines one or more output values based on the dynamic model(s) and the input data. At 159112, the digital twin dynamic model system 15508 updates the values of one or more properties of the one or more digital twins based on the one or more outputs of the dynamic model(s).

In example embodiments, client application 15570 may be configured to provide a digital representation and/or visualization of the digital twin of an industrial entity. In embodiments, the client application 15570 may include one or more software modules that are executed by one or more server devices. These software modules may be configured to quantify properties of the digital twin, model properties of a digital twin, and/or to visualize digital twin behaviors. In embodiments, these software modules may enable a user to select a particular digital twin behavior visualization for viewing. In embodiments, these software modules may enable a user to select to view a digital twin behavior visualization playback. In some embodiments, the client application 15570 may provide a selected behavior visualization to digital twin dynamic model system 15508.

In embodiments, the digital twin dynamic model system 15508 may receive requests from client application 15570 to update properties of a digital twin in order to enable a digital representation of an industrial entity and/or environment wherein the real-time digital representation is a visualization of the digital twin. In embodiments, a digital twin may be rendered by a computing device, such that a human user can view the digital representations of real-world industrial assets, devices, workers, processes and/or environments. For example, the digital twin may be rendered and outcome to a display device. In embodiments, dynamic model outputs and/or related data may be overlaid on the rendering of the digital twin. In embodiments, dynamic model outputs and/or related information may appear with the rendering of the digital twin in a display interface. In embodiments, the related information may include real-time video footage associated with the real-world entity represented by the digital twin. In embodiments, the related information may include a sum of each of the vibration fault level states in the machine. In embodiments, the related information may be graphical information. In embodiments, the graphical information may depict motion and/or motion as a function of frequency for individual machine components. In embodiments, graphical information may depict motion and/or motion as a function of frequency for individual machine components, wherein a user is enabled to select a view of the graphical information in the x, y, and z dimensions. In embodiments, graphical information may depict motion and/or motion as a function of frequency for individual machine components, wherein the graphical information includes harmonic peaks and peaks. In embodiments, the related information may be cost data, including the cost of downtime per day data, cost of repair data, cost of new part data, cost of new machine data, and the like. In embodiments, related information may be a probability of downtime data, probability of failure data, and the like. In embodiments, related information may be time to failure data.

In embodiments, the related information may be recommendations and/or insights. For example, recommendations or insights received from the cognitive intelligence system related to a machine may appear with the rendering of the digital twin of a machine in a display interface.

In embodiments, clicking, touching, or otherwise interacting with the digital twin rendered in the display interface can allow a user to "drill down" and see underlying subsystems or processes and/or embedded digital twins. For example, in response to a user clicking on a machine bearing rendered in the digital twin of a machine, the display interface can allow a user to drill down and see information related to the bearing, view a 3D visualization of the bearing's vibration, and/or view a digital twin of the bearing.

In embodiments, clicking, touching, or otherwise interacting with information related to the digital twin rendered in the display interface can allow a user to "drill down" and see underlying information.

FIG. 160 illustrates example embodiments of a display interface that renders the digital twin of a dryer centrifuge and other information related to the dryer centrifuge.

In some embodiments, the digital twin may be rendered and output in a virtual reality display. For example, a user may view a 3D rendering of an environment (e.g., using a monitor or a virtual reality headset). The user may also inspect and/or interact with digital twins of industrial entities. In embodiments, a user may view processes being performed with respect to one or more digital twins (e.g., collecting measurements, movements, interactions, inventorying, loading, packing, shipping, and the like). In embodiments, a user may provide input that controls one or more properties of a digital twin via a graphical user interface.

In some embodiments, the digital twin dynamic model system 15508 may receive requests from client application 15570 to update properties of a digital twin in order to enable a digital representation of industrial entities and/or environments wherein the digital representation is a heat map visualization of the digital twin. In embodiments, a platform is provided having heat maps displaying collected data from the sensor system 15530, Internet of Things connected devices 15524, and data outputs from dynamic models 155100 for providing input to a display interface. In embodiments, the heat map interface is provided as an output for digital twin data, such as for handling and providing information for visualization of various sensor data, dynamic model output data, and other data (such as map data, analog sensor data, and other data), such as to another system, such as a mobile device, tablet, dashboard, computer, AR/VR device, or the like. A digital twin representation may be provided in a form factor (e.g., user device, VR-enabled device, AR-enabled device, or the like) suitable for delivering visual input to a user, such as the presentation of a map that includes indicators of levels of analog sensor data, digital sensor data, and output values from the dynamic models (such as data indicating vibration fault level states, vibration severity unit values, probability of downtime values, cost of downtime values, probability of shutdown values, time to failure values, probability of failure values, manufacturing KPIs, temperatures, levels of rotation, vibration characteristics, fluid flow, heating or cooling, pressure, substance concentrations, and many other output values). In embodiments, signals from various sensors or input sources (or selective combinations, permutations, mixes, and the like) as well as data determined by the digital twin dynamic model system 15508 may provide input data to a heat map. Coordinates may include real world location coordinates (such as geo-location or location on a map of an environment), as well as other coordinates, such as time-based coordinates, frequency-based coordinates, or other coordinates that allow for representation of analog sensor signals, digital signals, dynamic model outputs, input source information, and various combinations, in a map-based visualization, such that colors may represent varying levels of input along the relevant dimensions. For example, among many other possibilities, if an industrial machine component is at a critical vibration fault level state, the heat map interface may alert a user by showing the machine component in orange. In the example of a heat map, clicking, touching, or otherwise interacting with the heat map can allow a user to drill down and see underlying sensor, dynamic model outputs, or other input data that is used as an input to the heat map display. In other examples, such as ones where a digital twin is displayed in a VR or AR environment, if an industrial machine component is vibrating outside of normal operation (e.g., at a suboptimal, critical, or alarm vibration fault level), a haptic interface may induce vibration when a user touches a representation of the machine component, or if a machine component is operating in an unsafe manner, a directional sound signal may direct a user's attention toward the machine in digital twin, such as by playing in a particular speaker of a headset or other sound system.

In embodiments, the digital twin dynamic model system 15508 may take a set of ambient environmental data and/or other data and automatically update a set of properties of a digital twin of an industrial entity or facility based on the impact of the environmental data and/or other data in the set of dynamic models 155100 that are used to enable the digital twin. Ambient environmental data may include temperature data, pressure data, humidity data, wind data, rainfall data, tide data, storm surge data, cloud cover data, snowfall data, visibility data, water level data, and the like. Additionally or alternatively, the digital twin dynamic model system 15508 may use a set of environmental data measurements collected by a set of Internet of Things connected devices 15524 disposed in an industrial setting as inputs for the set of dynamic models 155100 that are used to enable the digital twin. For example, digital twin dynamic model system 15508 may feed the dynamic models 155100 data collected, handled or exchanged by Internet of Things connected devices 15524, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of industrial environments. Other examples of Internet of Things connected devices include smart fire alarms, smart security systems, smart air quality monitors, smart/learning thermostats, and smart lighting systems.

FIG. 161 illustrates example embodiments of a method for updating a set of vibration fault level states for a set of bearings in a digital twin of a machine. In this example, a client application 15570, which interfaces with digital twin dynamic model system 15508, may be configured to provide a visualization of the fault level states of the bearings in the digital twin of the machine.

In this example, the digital twin dynamic model system 15508 may receive requests from client application 15570 to update the vibration fault level states of the machine digital twin. At 161200, digital twin dynamic model system 15508 receives a request from client application 15570 to update one or more vibration fault level states of the machine digital twin. Next, in step 161202, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins, such as any embedded motor digital twins and bearing digital twins, and any digital twins that embed the machine digital twin, such as the manufacturing facility digital twin. At 161204, digital twin dynamic model system 15508 determines one or more dynamic models required to fulfill the request and retrieves the one or more required dynamic models from the digital twin dynamic model datastore 155102. At 161206, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the and the one or more required inputs of the dynamic model(s). In the present example, the retrieved dynamic model(s) 155100 may take one or more vibration sensor measurements from vibration sensors 15536 as inputs to the dynamic models. In embodiments, vibration sensors 15536 may be optical vibration sensors, single axis vibration sensors, tri-axial vibration sensors, and the like. At 161208, digital twin dynamic model system 15508 retrieves one or more measurements from each of the selected data sources from the digital twin I/O system 15504. Next, At 161210, digital twin dynamic model system 15508 runs the dynamic model(s), using the retrieved vibration sensor measurements as inputs, and calculates one or more outputs that represent bearing vibration fault level states. Next, At 161212, the digital twin dynamic model system 15508 updates one or more bearing fault level states of the manufacturing facility digital twin, machine digital twin, motor digital twin, and/or bearing digital twins based on the one or more outputs of the dynamic model(s). The client application 15570 may obtain vibration fault level states of the bearings and may display the obtained vibration fault level state associated with each bearing and/or display colors associated with fault level severity (e.g., red for alarm, orange for critical, yellow for suboptimal, green for normal operation) in the rendering of one or more of the digital twins on a display interface.

In another example, a client application 15570 may be an augmented reality application. In some embodiments of this example, the client application 15570 may obtain vibration fault level states of bearings in a field of view of an AR-enabled device (e.g., smart glasses) hosting the client application from the digital twin of the industrial environment (e.g., via an API of the digital twin system 15500) and may display the obtained vibration fault level states on the display of the AR-enabled device, such that the vibration fault level state displayed corresponds to the location in the field of view of the AR-enabled device. In this way, a vibration fault level state may be displayed even if there are no vibration sensors located within the field of view of the AR-enabled device.

FIG. 162 illustrates example embodiments of a method for updating a set of vibration severity unit values of bearings in a digital twin of a machine. Vibration severity units may be measured as displacement, velocity, and acceleration.

In this example, client application 15570 that interfaces with the digital twin dynamic model system 15508 may be configured to provide a visualization of the three-dimensional vibration characteristics of bearings in a digital twin of a machine.

In this example, the digital twin dynamic model system 15508 may receive requests from client application 15570 to update the vibration severity unit values for bearings in the digital twin of a machine. At 162300, digital twin dynamic model system 15508 receives a request from client application 15570 to update one or more vibration severity unit value(s) of the manufacturing facility digital twin. Next, in step 162302, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins (e.g., digital twins of bearings and other components). At 162304, digital twin dynamic model system 15508 determines one or more dynamic models required to fulfill the request and retrieves the one or more required dynamic models from dynamic model datastore 155102. At 162306, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the one or more required inputs of the dynamic model(s). In the present example, the retrieved dynamic models may be configured to take one or more vibration sensor measurements as inputs and provide severity unit values for bearings in the machine. At 162308, digital twin dynamic model system 15508 retrieves one or more measurements from each of the selected sensors. In the present example, the digital twin dynamic model system 15508 retrieves measurements from vibration sensors 15536 via digital twin I/O system 15504. At 162310, digital twin dynamic model system 15508 runs the dynamic model(s) using the retrieved vibration measurements as inputs and calculates one or more output values that represent vibration severity unit values for bearings in the machine. Next, at 162312, the digital twin dynamic model system 15508 updates one or more vibration severity unit values of the bearings in the machine digital twin and all other embedded digital twins or digital twins that embed the machine digital twin based on the one or more values output by the dynamic model(s).

FIG. 163 illustrates example embodiments of a method for updating a set of probability of failure values for machine components in the digital twin of a machine.

In this example, the digital twin dynamic model system 15508 may receive requests from client application 15570 to update the probability of failure values for components in a machine digital twin. At 163400, digital twin dynamic model system 15508 receives a request from client application 15570 to update one or more probability of failure value(s) of the machine digital twin, any embedded component digital twins, and any digital twins that embed the machine digital twin such as a manufacturing facility digital twin. Next, in step 163402, digital twin dynamic model system 15508 determines the one or more digital twins required to fulfill the request and retrieves the one or more required digital twins. In this example, the digital twin dynamic model system 15508 may retrieve the digital twin of the manufacturing facility, the digital twin of the machine, and the digital twins of machine components from digital twin datastore 15516. At 163404, digital twin dynamic model system 15508 determines one or more dynamic models required to fulfill the request and retrieves the one or more required dynamic models from dynamic model datastore 155102. At 163406, the digital twin dynamic model system 15508 selects, via digital twin I/O system 15504, dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s). In the present example, the retrieved dynamic models may take one or more vibration measurements from vibration sensors 15536 and historical failure data as dynamic model inputs and output probability of failure values for the machine components in the digital twin of the machine. At 163408, digital twin dynamic model system 15508 retrieves data from each of the selected sensors and/or Internet of Things connected devices via digital twin I/O system 15504. At 163410, digital twin dynamic model system 15508 runs the dynamic model(s) using the retrieved vibration data and historical failure data as inputs and calculates one or more outputs that represent probability of failure values for bearings in the machine digital twin. Next, At 163412, the digital twin dynamic model system 15508 updates one or more probability of failure values of the bearings in the machine digital twin, all embedded digital twins, and all digital twins that embed the machine digital twin based on the output of the dynamic model(s).

FIG. 164 illustrates example embodiments of a method for updating a set of probability of downtime for machines in the digital twin of a manufacturing facility.

In this example, client application 15570, which interfaces with the digital twin dynamic model system 15508, may be configured to provide a visualization of the probability of downtime values of a manufacturing facility in the digital twin of the manufacturing facility.

In this example, the digital twin dynamic model system 15508 may receive requests from client application 15570 to assign probability of downtime values to machines in a manufacturing facility digital twin. At 164500, digital twin dynamic model system 16208 receives a request from client application 15570 to update one or more probability of downtime values of machines in the manufacturing facility digital twin and any embedded digital twins such as the individual machine digital twins. Next, in step 164502, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the manufacturing facility and any embedded digital twins from digital twin datastore 15516. At 164504, digital twin dynamic model system 15508 determines one or more dynamic models required to fulfill the request and retrieves the one or more required dynamic models from dynamic model datastore 155102. At 164506, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the dynamic model(s) may be configured to take vibration measurements from vibration sensors and historical downtime data as inputs and output probability of downtime values for different machines throughout the manufacturing facility. At 164508, digital twin dynamic model system 15508 retrieves one or more measurements from each of the selected sensors via digital twin I/O system 15504. At 164510, digital twin dynamic model system 15508 runs the dynamic model(s) using the retrieved vibration measurements and historical downtime data as inputs and calculates one or more outputs that represent probability of downtime values for machines in the manufacturing facility. Next, At 164512, the digital twin dynamic model system 15508 updates one or more probability of downtime values for machines in the manufacturing facility digital twins and all embedded digital twins based on the one or more outputs of the dynamic models.

FIG. 165 illustrates example embodiments of a method for updating one or more probability of shutdown values in the digital twin of an enterprise having a set of manufacturing facilities.

In the present example, the digital twin dynamic model system 15508 may receive requests from client application 15570 to update the probability of shutdown values for the set of manufacturing facilities within an enterprise digital twin. At 165600, digital twin dynamic model system 15508 receives a request from client application 15570 to update one or more probability of shutdown values of the enterprise digital twin and any embedded digital twins. Next, in step 165602, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the enterprise and any embedded digital twins. At 165604, digital twin dynamic model system 15508 determines one or more dynamic models required to fulfill the request and retrieves the one or more required dynamic models from dynamic model datastore 155102. At 165606, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic models may be configured to take one or more vibration measurements from vibration sensors 15536 and/or other suitable data as inputs and output probability of shutdown values for each manufacturing entity in the enterprise digital twin. At 165608, digital twin dynamic model system 15508 retrieves one or more vibration measurements from each of the selected vibration sensors 15536 from digital twin I/O system 15504. At 165610, digital twin dynamic model system 15508 runs the dynamic model(s) using the retrieved vibration measurements and historical shut down data as inputs and calculates one or more outputs that represent probability of shutdown values for manufacturing facilities within the enterprise digital twin. Next, at 165612, the digital twin dynamic model system 15508 updates one or more probability of shutdown values of the enterprise digital twin and all embedded digital twins based on the one or more outputs of the dynamic model(s).

FIG. 159 illustrates example embodiments of a method for updating a set of cost of downtime values in machines in the digital twin of a manufacturing facility.

In the present example, the digital twin dynamic model system 15508 may receive requests from a client application 15570 to populate real-time cost of downtime values associated with machines in a manufacturing facility digital twin. At 159700, digital twin dynamic model system 15508 receives a request from the client application 15570 to update one or more cost of downtime values of the manufacturing facility digital twin and any embedded digital twins (e.g., machines, machine parts, and the like) from the client application 15570. Next, in step 159702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 159704, digital twin dynamic model system 15508 determines one or more dynamic models required to fulfill the request and retrieves the one or more required dynamic models from dynamic model datastore 155102. At 159706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take historical downtime data and operational data as inputs and output data representing cost of downtime per day for machines in the manufacturing facility. At 159708, digital twin dynamic model system 15508 retrieves historical downtime data and operational data from digital twin I/O system 15504. At 159710, digital twin dynamic model system 15508 runs the dynamic model(s) using the retrieved data as input and calculates one or more outputs that represent cost of downtime per day for machines in the manufacturing facility. Next, at 159712, the digital twin dynamic model system 15508 updates one or more cost of downtime values of the manufacturing facility digital twins and machine digital twins based on the one or more outputs of the dynamic model(s).

FIG. 167 illustrates example embodiments of a method for updating a set of manufacturing KPI values in the digital twin of a manufacturing facility. In embodiments, the manufacturing KPI is selected from the set of uptime, capacity utilization, on standard operating efficiency, overall operating efficiency, overall equipment effectiveness, machine downtime, unscheduled downtime, machine set up time, inventory turns, inventory accuracy, quality (e.g., percent defective), first pass yield, rework, scrap, failed audits, on-time delivery, customer returns, training hours, employee turnover, reportable health & safety incidents, revenue per employee, and profit per employee, schedule attainment, total cycle time, throughput, changeover time, yield, planned maintenance percentage, availability, and customer return rate.

In the present example, the digital twin dynamic model system 15508 may receive requests from a client application 15570 to populate real-time manufacturing KPI values in a manufacturing facility digital twin. At 167800, digital twin dynamic model system 15508 receives a request from the client application 15570 to update one or more KPI values of the manufacturing facility digital twin and any embedded digital twins (e.g., machines, machine parts, and the like) from the client application 15570. Next, in step 167802, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 167804, digital twin dynamic model system 15508 determines one or more dynamic models required to fulfill the request and retrieves the one or more required dynamic models from dynamic model datastore 155102. At 167806, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take one or more vibration measurements obtained from vibration sensors 15536 and other operational data as inputs and output one or more manufacturing KPIs for the facility. At 167808, digital twin dynamic model system 15508 retrieves one or more vibration measurements from each of the selected vibration sensors 15536 and operational data from digital twin I/O system 15504. At 167810, digital twin dynamic model system 15508 runs the dynamic model(s) using the retrieved vibration measurements and operational data as inputs and calculates one or more outputs that represent manufacturing KPIs for the manufacturing facility. Next, At 167812, the digital twin dynamic model system 15508 updates one or more KPI values of the manufacturing facility digital twins, machine digital twins, machine part digital twins, and all other embedded digital twins based on the one or more outputs of the dynamic model(s).

Further embodiments may include the following examples. FIG. 155 illustrates an example environment of a digital twin system 15500. In embodiments, the digital twin system 15500 generates a set of digital twins of a set of industrial environments 15520 and/or industrial entities within the set of industrial environments. In embodiments, the digital twin system 15500 maintains a set of states of the respective industrial environments 15520, such as using sensor data obtained from respective sensor systems 15530 that monitor the industrial environments 15520. In embodiments, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512. In embodiments, the digital twin system 15500 may provide a real time sensor API that provides a set of capabilities for enabling a set of interfaces for the sensors of the respective sensor systems 15530. In embodiments, the digital twin system 15500 may include and/or employ other suitable APIs, brokers, connectors, bridges, gateways, hubs, ports, routers, switches, data integration systems, peer-to-peer systems, and the like to facilitate the transferring of data to and from the digital twin system 15500. In these embodiments, these connective components may allow an IoT sensor or an intermediary device (e.g., a relay, an edge device, a switch, or the like) within a sensor system 15530 to communicate data to the digital twin system 155300 and/or to receive data (e.g., configuration data, control data, or the like) from the digital twin system 15500 or another external system. In embodiments, the digital twin system 15500 may further include a digital twin datastore 15516 that stores digital twins 15518 of various industrial environments 15520 and the objects 15522, devices 15524, sensors 15526, and/or humans 15528 in the environment 15520.

A digital twin may refer to a digital representation of one or more industrial entities, such as an industrial environment 15520, a physical object 15522, a device 15524, a sensor 15526, a human 15528, or any combination thereof. Examples of industrial environments 15520 include, but are not limited to, a factory, a power plant, a food production facility (which may include an inspection facility), a commercial kitchen, an indoor growing facility, a natural resources excavation site (e.g., a mine, an oil field, etc.), and the like. Depending on the type of environment, the types of objects, devices, and sensors that are found in the environments will differ. Non-limiting examples of physical objects 15522 include raw materials, manufactured products, excavated materials, containers (e.g., boxes, dumpsters, cooling towers, vats, pallets, barrels, palates, bins, and the like), furniture (e.g., tables, counters, workstations, shelving, etc.), and the like. Non-limiting examples of devices 15524 include robots, computers, vehicles (e.g., cars, trucks, tankers, trains, forklifts, cranes, etc.), machinery/equipment (e.g., tractors, tillers, drills, presses, assembly lines, conveyor belts, etc.), and the like. The sensors 15526 may be any sensor devices and/or sensor aggregation devices that are found in a sensor system 15530 within an environment. Non-limiting examples of sensors 15526 that may be implemented in a sensor system 15530 may include temperature sensors 15532, humidity sensors 15534, vibration sensors 15536, LIDAR sensors 15538, motion sensors 15540, chemical sensors 15542, audio sensors 15544, pressure sensors 15546, weight sensors 15548, radiation sensors 15550, video sensors 15552, wearable devices 15554, relays 15556, edge devices 15558, crosspoint switches 15560, and/or any other suitable sensors. Examples of different types of physical objects 15522, devices 15524, sensors 15526, and environments 15520 are referenced throughout the disclosure.

In some embodiments, on-device sensor fusion and data storage for industrial IoT devices is supported, including on-device sensor fusion and data storage for an industrial IoT device, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the device. Any of the sensor data types described throughout this disclosure, including vibration data, can be fused in this manner and stored in a local data pool, in storage, or on an IoT device, such as a data collector, a component of a machine, or the like.

In some embodiments, a set of digital twins may represent an entire organization, such as energy production organizations, oil and gas organizations, renewable energy production organizations, aerospace manufacturers, vehicle manufacturers, heavy equipment manufacturers, mining organizations, drilling organizations, offshore platform organizations, and the like. In these examples, the digital twins may include digital twins of one or more industrial facilities of the organization.

In embodiments, the digital twin management system 15502 generates digital twins. A digital twin may be comprised of (e.g., via reference) other digital twins. In this way, a discrete digital twin may be comprised of a set of other discrete digital twins. For example, a digital twin of a machine may include digital twins of sensors on the machine, digital twins of components that make up the machine, digital twins of other devices that are incorporated in or integrated with the machine (such as systems that provide inputs to the machine or take outputs from it), and/or digital twins of products or other items that are made by the machine. Taking this example one step further, a digital twin of an industrial facility (e.g., a factory) may include a digital twin representing the layout of the industrial facility, including the arrangement of physical assets and systems in or around the facility, as well as digital assets of the assets within the facility (e.g., the digital twin of the machine), as well as digital twins of storage areas in the facility, digital twins of humans collecting vibration measurements from machines throughout the facility, and the like. In this second example, the digital twin of the industrial facility may reference the embedded digital twins, which may then reference other digital twins embedded within those digital twins.

In some embodiments, a digital twin may represent abstract entities, such as workflows and/or processes, including inputs, outputs, sequences of steps, decision points, processing loops, and the like that make up such workflows and processes. For example, a digital twin may be a digital representation of a manufacturing process, a logistics workflow, an agricultural process, a mineral extraction process, or the like. In these embodiments, the digital twin may include references to the industrial entities that are included in the workflow or process. The digital twin of the manufacturing process may reflect the various stages of the process. In some of these embodiments, the digital twin system 15500 receives real-time data from the industrial facility (e.g., from a sensor system 15530 of the environment 15520) in which the manufacturing process takes place and reflects a current (or substantially current) state of the process in real-time.

In embodiments, the digital representation may include a set of data structures (e.g., classes) that collectively define a set of properties of a represented physical object 15522, device 15524, sensor 15526, or environment 15520 and/or possible behaviors thereof. For example, the set of properties of a physical object 15522 may include a type of the physical object, the dimensions of the object, the mass of the object, the density of the object, the material(s) of the object, the physical properties of the material(s), the surface of the physical object, the status of the physical object, a location of the physical object, identifiers of other digital twins contained within the object, and/or other suitable properties. Examples of behavior of a physical object may include a state of the physical object (e.g., a solid, liquid, or gas), a melting point of the physical object, a density of the physical object when in a liquid state, a viscosity of the physical object when in a liquid state, a freezing point of the physical object, a density of the physical object when in a solid state, a hardness of the physical object when in a solid state, the malleability of the physical object, the buoyancy of the physical object, the conductivity of the physical object, a burning point of the physical object, the manner by which humidity affects the physical object, the manner by which water or other liquids affect the physical object, a terminal velocity of the physical object, and the like. In another example, the set of properties of a device may include a type of the device, the dimensions of the device, the mass of the device, the density of the density of the device, the material(s) of the device, the physical properties of the material(s), the surface of the device, the output of the device, the status of the device, a location of the device, a trajectory of the device, vibration characteristics of the device, identifiers of other digital twins that the device is connected to and/or contains, and the like. Examples of the behaviors of a device may include a maximum acceleration of a device, a maximum speed of a device, ranges of motion of a device, a heating profile of a device, a cooling profile of a device, processes that are performed by the device, operations that are performed by the device, and the like. Example properties of an environment may include the dimensions of the environment, the boundaries of the environment, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, a humidity of a digital twin, the shape of a digital twin, the material of a digital twin, the dimensions of a digital twin, or any other suitable parameters may be adjusted. As the properties of the digital twin are adjusted, other properties may be affected as well. For example, if the temperature of an environment 15520 is increased, the pressure within the environment may increase as well, such as a pressure of a gas in accordance with the ideal gas law. In another example, if a digital twin of a subzero environment is increased to above freezing temperatures, the properties of an embedded twin of water in a solid state (i.e., ice) may change into a liquid state over time.

Digital twins may be represented in a number of different forms. In embodiments, a digital twin may be a visual digital twin that is rendered by a computing device, such that a human user can view digital representations of an environment 15520 and/or the physical objects 15522, devices 15524, and/or the sensors 15526 within an environment. In embodiments, the digital twin may be rendered and output to a display device. In some of these embodiments, the digital twin may be rendered in a graphical user interface, such that a user may interact with the digital twin. For example, a user may "drill down" on a particular element (e.g., a physical object or device) to view additional information regarding the element (e.g., a state of a physical object or device, properties of the physical object or device, or the like). In some embodiments, the digital twin may be rendered and output in a virtual reality display. For example, a user may view a 3D rendering of an environment (e.g., using monitor or a virtual reality headset). While doing so, the user may view/inspect digital twins of physical assets or devices in the environment.

In some embodiments, a data structure of the visual digital twins (i.e., digital twins that are configured to be displayed in a 2D or 3D manner) may include surfaces (e.g., splines, meshes, polygons meshes, or the like). In some embodiments, the surfaces may include texture data, shading information, and/or reflection data. In this way, a surface may be displayed in a more realistic manner. In some embodiments, such surfaces may be rendered by a visualization engine (not shown) when the digital twin is within a field of view and/or when existing in a larger digital twin (e.g., a digital twin of an industrial environment). In these embodiments, the digital twin system 15500 may render the surfaces of digital objects, whereby a rendered digital twin may be depicted as a set of adjoined surfaces.

In embodiments, a user may provide input that controls one or more properties of a digital twin via a graphical user interface. For example, a user may provide input that changes a property of a digital twin. In response, the digital twin system 15500 can calculate the effects of the changed property and may update the digital twin and any other digital twins affected by the change of the property.

In embodiments, a user may view processes being performed with respect to one or more digital twins (e.g., manufacturing of a product, extracting minerals from a mine or well, a livestock inspection line, and the like). In these embodiments, a user may view the entire process or specific steps within a process.

In some embodiments, a digital twin (and any digital twins embedded therein) may be represented in a non-visual representation (or "data representation"). In these embodiments, a digital twin and any embedded digital twins exist in a binary representation but the relationships between the digital twins are maintained. For example, in embodiments, each digital twin and/or the components thereof may be represented by a set of physical dimensions that define a shape of the digital twin (or component thereof). Furthermore, the data structure embodying the digital twin may include a location of the digital twin. In some embodiments, the location of the digital twin may be provided in a set of coordinates. For example, a digital twin of an industrial environment may be defined with respect to a coordinate space (e.g., a Cartesian coordinate space, a polar coordinate space, or the like). In embodiments, embedded digital twins may be represented as a set of one or more ordered triples (e.g., [x coordinate, y coordinate, z coordinates] or other vector-based representations). In some of these embodiments, each ordered triple may represent a location of a specific point (e.g., center point, top point, bottom point, or the like) on the industrial entity (e.g., object, device, or sensor) in relation to the environment in which the industrial entity resides. In some embodiments, a data structure of a digital twin may include a vector that indicates a motion of the digital twin with respect to the environment. For example, fluids (e.g., liquids or gasses) or solids may be represented by a vector that indicates a velocity (e.g., direction and magnitude of speed) of the entity represented by the digital twin. In embodiments, a vector within a twin may represent a microscopic subcomponent, such as a particle within a fluid, and a digital twin may represent physical properties, such as displacement, velocity, acceleration, momentum, kinetic energy, vibrational characteristics, thermal properties, electromagnetic properties, and the like.

In some embodiments, a set of two or more digital twins may be represented by a graph database that includes nodes and edges that connect the nodes. In some implementations, an edge may represent a spatial relationship (e.g., "abuts", "rests upon", "contains", and the like). In these embodiments, each node in the graph database represents a digital twin of an entity (e.g., an industrial entity) and may include the data structure defining the digital twin. In these embodiments, each edge in the graph database may represent a relationship between two entities represented by connected nodes. In some implementations, an edge may represent a spatial relationship (e.g., "abuts", "rests upon", "interlocks with", "bears", "contains", and the like). In embodiments, various types of data may be stored in a node or an edge. In embodiments, a node may store property data, state data, and/or metadata relating to a facility, system, subsystem, and/or component. Types of property data and state data will differ based on the entity represented by a node. For example, a node representing a robot may include property data that indicates a material of the robot, the dimensions of the robot (or components thereof), a mass of the robot, and the like. In this example, the state data of the robot may include a current pose of the robot, a location of the robot, and the like. In embodiments, an edge may store relationship data and metadata data relating to a relationship between two nodes. Examples of relationship data may include the nature of the relationship, whether the relationship is permanent (e.g., a fixed component would have a permanent relationship with the structure to which it is attached or resting on), and the like. In embodiments, an edge may include metadata concerning the relationship between two entities. For example, if a product was produced on an assembly line, one relationship that may be documented between a digital twin of the product and the assembly line may be "created by". In these embodiments, an example edge representing the "created by" relationship may include a timestamp indicating a date and time that the product was created. In another example, a sensor may take measurements relating to a state of a device, whereby one relationship between the sensor and the device may include "measured" and may define a measurement type that is measured by the sensor. In this example, the metadata stored in an edge may include a list of N measurements taken and a timestamp of each respective measurement. In this way, temporal data relating to the nature of the relationship between two entities may be maintained, thereby allowing for an analytics engine, machine-learning engine, and/or visualization engine to leverage such temporal relationship data, such as by aligning disparate data sets with a series of points in time, such as to facilitate cause-and-effect analysis used for prediction systems.

In some embodiments, a graph database may be implemented in a hierarchical manner, such that the graph database relates a set of facilities, systems, and components. For example, a digital twin of a manufacturing environment may include a node representing the manufacturing environment. The graph database may further include nodes representing various systems within the manufacturing environment, such as nodes representing an HVAC system, a lighting system, a manufacturing system, and the like, all of which may connect to the node representing the manufacturing system. In this example, each of the systems may further connect to various subsystems and/or components of the system. For example, within the HVAC system, the HVAC system may connect to a subsystem node representing a cooling system of the facility, a second subsystem node representing a heating system of the facility, a third subsystem node representing the fan system of the facility, and one or more nodes representing a thermostat of the facility (or multiple thermostats). Carrying this example further, the subsystem nodes and/or component nodes may connect to lower level nodes, which may include subsystem nodes and/or component nodes. For example, the subsystem node representing the cooling subsystem may be connected to a component node representing an air conditioner unit. Similarly, a component node representing a thermostat device may connect to one or more component nodes representing various sensors (e.g., temperature sensors, humidity sensors, and the like).

In embodiments where a graph database is implemented, a graph database may relate to a single environment or may represent a larger enterprise. In the latter scenario, a company may have various manufacturing and distribution facilities. In these embodiments, an enterprise node representing the enterprise may connect to environment nodes of each respective facility. In this way, the digital twin system 15500 may maintain digital twins for multiple industrial facilities of an enterprise.

In embodiments, the digital twin system 15500 may use a graph database to generate a digital twin that may be rendered and displayed and/or may be represented in a data representation. In the former scenario, the digital twin system 15500 may receive a request to render a digital twin, whereby the request includes one or more parameters that are indicative of a view that will be depicted. For example, the one or more parameters may indicate an industrial environment to be depicted and the type of rendering (e.g., "real-world view" that depicts the environment as a human would see it, an "infrared view" that depicts objects as a function of their respective temperature, an "airflow view"

that depicts the airflow in a digital twin, or the like). In response, the digital twin system 15500 may traverse a graph database and may determine a configuration of the environment to be depicted based on the nodes in the graph database that are related (either directly or through a lower level node) to the environment node of the environment and the edges that define the relationships between the related nodes. Upon determining a configuration, the digital twin system 15500 may identify the surfaces that are to be depicted and may render those surfaces. The digital twin system 15500 may then render the requested digital twin by connecting the surfaces in accordance with the configuration. The rendered digital twin may then be output to a viewing device (e.g., VR headset, monitor, or the like). In some scenarios, the digital twin system 15500 may receive real-time sensor data from a sensor system 15530 of an environment 15520 and may update the visual digital twin based on the sensor data. For example, the digital twin system 15500 may receive sensor data (e.g., vibration data from a vibration sensor 15536) relating to a motor and its set of bearings. Based on the sensor data, the digital twin system 15500 may update the visual digital twin to indicate the approximate vibrational characteristics of the set of bearings within a digital twin of the motor.

In scenarios where the digital twin system 15500 is providing data representations of digital twins (e.g., for dynamic modeling, simulations, machine learning), the digital twin system 15500 may traverse a graph database and may determine a configuration of the environment to be depicted based on the nodes in the graph database that are related (either directly or through a lower level node) to the environment node of the environment and the edges that define the relationships between the related nodes. In some scenarios, the digital twin system 15500 may receive real-time sensor data from a sensor system 15530 of an environment 15520 and may apply one or more dynamic models to the digital twin based on the sensor data. In other scenarios, a data representation of a digital twin may be used to perform simulations, as is discussed in greater detail throughout the specification.

In some embodiments, the digital twin system 15500 may execute a digital ghost that is executed with respect to a digital twin of an industrial environment. In these embodiments, the digital ghost may monitor one or more sensors of a sensor system 15530 of an industrial environment to detect anomalies that may indicate a malicious virus or other security issues.

As discussed, the digital twin system 15500 may include a digital twin management system 15502, a digital twin I/O system 15504, a digital twin simulation system 15506, a digital twin dynamic model system 15508, a cognitive intelligence system 15510, and/or an environment control module 15512.

In embodiments, the digital twin management system 15502 creates new digital twins, maintains/updates existing digital twins, and/or renders digital twins. The digital twin management system 15502 may receive user input, uploaded data, and/or sensor data to create and maintain existing digital twins. Upon creating a new digital twin, the digital twin management system 15502 may store the digital twin in the digital twin datastore 15516. Creating, updating, and rendering digital twins are discussed in greater detail throughout the disclosure.

In embodiments, the digital twin I/O system 15504 receives input from various sources and outputs data to various recipients. In embodiments, the digital twin I/O system receives sensor data from one or more sensor systems 15530. In these embodiments, each sensor system 15530 may include one or more IoT sensors that output respective sensor data. Each sensor may be assigned an IP address or may have another suitable identifier. Each sensor may output sensor packets that include an identifier of the sensor and the sensor data. In some embodiments, the sensor packets may further include a timestamp indicating a time at which the sensor data was collected. In some embodiments, the digital twin I/O system 15504 may interface with a sensor system 15530 via the real-time sensor API 15514. In these embodiments, one or more devices (e.g., sensors, aggregators, edge devices) in the sensor system 15530 may transmit the sensor packets containing sensor data to the digital twin I/O system 15504 via the API. The digital twin I/O system may determine the sensor system 15530 that transmitted the sensor packets and the contents thereof, and may provide the sensor data and any other relevant data (e.g., time stamp, environment identifier/sensor system identifier, and the like) to the digital twin management system 15502.

In embodiments, the digital twin I/O system 15504 may receive imported data from one or more sources. For example, the digital twin system 15500 may provide a portal for users to create and manage their digital twins. In these embodiments, a user may upload one or more files (e.g., image files, LIDAR scans, blueprints, and the like) in connection with a new digital twin that is being created. In response, the digital twin I/O system 15504 may provide the imported data to the digital twin management system 15502. The digital twin I/O system 15504 may receive other suitable types of data without departing from the scope of the disclosure.

In some embodiments, the digital twin simulation system 15506 is configured to execute simulations using the digital twin. For example, the digital twin simulation system 15506 may iteratively adjust one or more parameters of a digital twin and/or one or more embedded digital twins. In embodiments, the digital twin simulation system 15506, for each set of parameters, executes a simulation based on the set of parameters and may collect the simulation outcome data resulting from the simulation. Put another way, the digital twin simulation system 15506 may collect the properties of the digital twin and the digital twins within or containing the digital twin used during the simulation as well as any outcomes stemming from the simulation. For example, in running a simulation on a digital twin of an indoor agricultural facility, the digital twin simulation system 15506 can vary the temperature, humidity, airflow, carbon dioxide and/or other relevant parameters and can execute simulations that output outcomes resulting from different combinations of the parameters. In another example, the digital twin simulation system 15506 may simulate the operation of a specific machine within an industrial facility that produces an output given a set of inputs. In some embodiments, the inputs may be varied to determine an effect of the inputs on the machine and the output thereof. In another example, the digital twin simulation system 15506 may simulate the vibration of a machine and/or machine components. In this example, the digital twin of the machine may include a set of operating parameters, interfaces, and capabilities of the machine. In some embodiments, the operating parameters may be varied to evaluate the effectiveness of the machine. The digital twin simulation system 15506 is discussed in further detail throughout the disclosure.

In embodiments, the digital twin dynamic model system 15508 is configured to model one or more behaviors with respect to a digital twin of an environment. In embodiments, the digital twin dynamic model system 15508 may receive a request to model a certain type of behavior regarding an environment or a process and may model that behavior using a dynamic model, the digital twin of the environment or process, and sensor data collected from one or more sensors that are monitoring the environment or process. For example, an operator of a machine having bearings may wish to model the vibration of the machine and bearings to determine whether the machine and/or bearings can withstand an increase in output. In this example, the digital twin dynamic model system 15508 may execute a dynamic model that is configured to determine whether an increase in output would result in adverse consequences (e.g., failures, downtime, or the like). The digital twin dynamic model system 15508 is discussed in further detail throughout the disclosure.

In embodiments, the cognitive processes system 15510 performs machine learning and artificial intelligence related tasks on behalf of the digital twin system. In embodiments, the cognitive processes system 15510 may train any suitable type of model, including but not limited to various types of neural networks, regression models, random forests, decision trees, Hidden Markov models, Bayesian models, and the like. In embodiments, the cognitive processes system 15510 trains machine learned models using the output of simulations executed by the digital twin simulation system 15506. In some of these embodiments, the outcomes of the simulations may be used to supplement training data collected from real-world environments and/or processes. In embodiments, the cognitive processes system 15510 leverages machine learned models to make predictions, identifications, classifications and provide decision support relating to the real-world environments and/or processes represented by respective digital twins.

For example, a machine-learned prediction model may be used to predict the cause of irregular vibrational patterns (e.g., a suboptimal, critical, or alarm vibration fault state) for a bearing of an engine in an industrial facility. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination simulation data and real-world data of causes of irregular vibration patterns) to predict the cause of the irregular vibration patterns. In this example, the causes of the irregular vibrational patterns could be a loose bearing, a lack of bearing lubrication, a bearing that is out of alignment, a worn bearing, the phase of the bearing may be aligned with the phase of the engine, loose housing, loose bolt, and the like.

In another example, a machine-learned model may be used to provide decision support to bring a bearing of an engine in an industrial facility operating at a suboptimal vibration fault level state to a normal operation vibration fault level state. In this example, the cognitive processes system 15510 may receive vibration sensor data from one or more vibration sensors disposed on or near the engine and may receive maintenance data from the industrial facility and may generate a feature vector based on the vibration sensor data and the maintenance data. The cognitive processes system 15510 may input the feature vector into a machine-learned model trained specifically for the engine (e.g., using a combination simulation data and real-world data of solutions to irregular vibration patterns) to provide decision support in achieving a normal operation fault level state of the bearing. In this example, the decision support could be a recommendation to tighten the bearing, lubricate the bearing, re-align the bearing, order a new bearing, order a new part, collect additional vibration measurements, change operating speed of the engine, tighten housings, tighten bolts, and the like.

In another example, a machine-learned model may be used to provide decision support relating to vibration measurement collection by a worker. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination simulation data and real-world vibration measurement history data) to provide decision support in selecting vibration measurement locations.

In yet another example, a machine-learned model may be used to identify vibration signatures associated with machine and/or machine component problems. In this example, the cognitive processes system 15510 may receive vibration measurement history data from the industrial facility and may generate a feature vector based on the vibration measurement history data. The cognitive processes system 15510 may input the feature vector into a machine-learned model trained specifically for the engine (e.g., using a combination simulation data and real-world vibration measurement history data) to identify vibration signatures associated with a machine and/or machine component. The foregoing examples are non-limiting examples and the cognitive processes system 15510 may be used for any other suitable AI/machine-learning related tasks that are performed with respect to industrial facilities.

In embodiments, the environment control system 15512 controls one or more aspects of industrial facilities. In some of these embodiments, the environment control system 15512 may control one or more devices within an industrial environment. For example, the environment control system 15512 may control one or more machines within an environment, robots within an environment, an HVAC system of the environment, an alarm system of the environment, an assembly line in an environment, or the like. In embodiments, the environment control system 15512 may leverage the digital twin simulation system 15506, the digital twin dynamic model system 15508, and/or the cognitive processes system 15510 to determine one or more control instructions. In embodiments, the environment control system 15512 may implement a rules-based and/or a machine-learning approach to determine the control instructions. In response to determining a control instruction, the environment control system 15512 may output the control instruction to the intended device within a specific environment via the digital twin I/O system 15504.

FIG. 156 illustrates an example digital twin management system 15502 according to some embodiments of the present disclosure. In embodiments, the digital twin management system 15502 may include, but is not limited to, a digital twin creation module 15564, a digital twin update module 15566, and a digital twin visualization module 15568.

In embodiments, the digital twin creation module 15564 may create a set of new digital twins of a set of environments using input from users, imported data (e.g., blueprints, specifications, and the like), image scans of the environment, 3D data from a LIDAR device and/or SLAM sensor, and other suitable data sources. For example, a user (e.g., a user affiliated with an organization/customer account) may, via a client application 15570, provide input to create a new digital twin of an environment. In doing so, the user may upload 2D or 3D image scans of the environment and/or a blueprint of the environment. The user may also upload 3D data, such as taken by a camera, a LIDAR device, an IR scanner, a set of SLAM sensors, a radar device, an EMF scanner, or the like. In response to the provided data, the digital twin creation module 15564 may create a 3D representation of the environment, which may include any objects that were captured in the image data/detected in the 3D data. In embodiments, the cognitive processes system 15572 may analyze input data (e.g., blueprints, image scans, 3D data) to classify rooms, pathways, equipment, and the like to assist in the generation of the 3D representation. In some embodiments, the digital twin creation module 15564 may map the digital twin to a 3D coordinate space (e.g., a Cartesian space having x, y, and z axes).

In some embodiments, the digital twin creation module 15564 may output the 3D representation of the environment to a graphical user interface (GUI). In some of these embodiments, a user may identify certain areas and/or objects and may provide input relating to the identified areas and/or objects. For example, a user may label specific rooms, equipment, machines, and the like. Additionally or alternatively, the user may provide data relating to the identified objects and/or areas. For example, in identifying a piece of equipment, the user may provide a make/model number of the equipment. In some embodiments, the digital twin creation module 15564 may obtain information from a manufacturer of a device, a piece of equipment, or machinery. This information may include one or more properties and/or behaviors of the device, equipment, or machinery. In some embodiments, the user may, via the GUI, identify locations of sensors throughout the environment. For each sensor, the user may provide a type of sensor and related data (e.g., make, model, IP address, and the like). The digital twin creation module 15564 may record the locations (e.g., the x, y, z coordinates of the sensors) in the digital twin of the environment. In embodiments, the digital twin system 15500 may employ one or more systems that automate the population of digital twins. For example, the digital twin system 15500 may employ a machine vision-based classifier that classifies makes and models of devices, equipment, or sensors. Additionally or alternatively, the digital twin system 15500 may iteratively ping different types of known sensors to identify the presence of specific types of sensors that are in an environment. Each time a sensor responds to a ping, the digital twin system 15500 may extrapolate the make and model of the sensor.

In some embodiments, the manufacturer may provide or make available digital twins of their products (e.g., sensors, devices, machinery, equipment, raw materials, and the like). In these embodiments, the digital twin creation module 15564 may import the digital twins of one or more products that are identified in the environment and may embed those digital twins in the digital twin of the environment. In embodiments, embedding a digital twin within another digital twin may include creating a relationship between the embedded digital twin with the other digital twin. In these embodiments, the manufacturer of the digital twin may define the behaviors and/or properties of the respective products. For example, a digital twin of a machine may define the manner by which the machine operates, the inputs/outputs of the machine, and the like. In this way, the digital twin of the machine may reflect the operation of the machine given a set of inputs.

In embodiments, a user may define one or more processes that occur in an environment. In these embodiments, the user may define the steps in the process, the machines/devices that perform each step in the process, the inputs to the process, and the outputs of the process.

In embodiments, the digital twin creation module 15564 may create a graph database that defines the relationships between a set of digital twins. In these embodiments, the digital twin creation module 15564 may create nodes for the environment, systems and subsystems of the environment, devices in the environment, sensors in the environment, workers that work in the environment, processes that are performed in the environment, and the like. In embodiments, the digital twin creation module 15564 may write the graph database representing a set of digital twins to the digital twin datastore 15516.

In embodiments, the digital twin creation module 15564 may, for each node, include any data relating to the entity in the node representing the entity. For example, in defining a node representing an environment, the digital twin creation module 15564 may include the dimensions, boundaries, layout, pathways, and other relevant spatial data in the node. Furthermore, the digital twin creation module 15564 may define a coordinate space with respect to the environment. In the case that the digital twin may be rendered, the digital twin creation module 15564 may include a reference in the node to any shapes, meshes, splines, surfaces, and the like that may be used to render the environment. In representing a system, subsystem, device, or sensor, the digital twin creation module 15564 may create a node for the respective entity and may include any relevant data. For example, the digital twin creation module 15564 may create a node representing a machine in the environment. In this example, the digital twin creation module 15564 may include the dimensions, behaviors, properties, location, and/or any other suitable data relating to the machine in the node representing the machine. The digital twin creation module 15564 may connect nodes of related entities with an edge, thereby creating a relationship between the entities. In doing so, the created relationship between the entities may define the type of relationship characterized by the edge. In representing a process, the digital twin creation module 15564 may create a node for the entire process or may create a node for each step in the process. In some of these embodiments, the digital twin creation module 15564 may relate the process nodes to the nodes that represent the machinery/devices that perform the steps in the process. In embodiments, where an edge connects the process step nodes to the machinery/device that performs the process step, the edge or one of the nodes may contain information that indicates the input to the step, the output of the step, the amount of time the step takes, the nature of processing of inputs to produce outputs, a set of states or modes the process can undergo, and the like.

In embodiments, the digital twin update module 15566 updates sets of digital twins based on a current status of one or more industrial entities. In some embodiments, the digital twin update module 15566 receives sensor data from a sensor system 15530 of an industrial environment and updates the status of the digital twin of the industrial environment and/or digital twins of any affected systems, subsystems, devices, workers, processes, or the like. As discussed, the digital twin I/O system 15504 may receive the sensor data in one or more sensor packets. The digital twin I/O system 15504 may provide the sensor data to the digital twin update module 15566 and may identify the environment from which the sensor packets were received and the sensor that provided the sensor packet. In response to the sensor data, the digital twin update module 15566 may update a state of one or more digital twins based on the sensor data. In some of these embodiments, the digital twin update module 15566 may update a record (e.g., a node in a graph database) corresponding to the sensor that provided the sensor data to reflect the current sensor data. In some scenarios, the digital twin update module 15566 may identify certain areas within the environment that are monitored by the sensor and may update a record (e.g., a node in a graph database) to reflect the current sensor data. For example, the digital twin update module 15566 may receive sensor data reflecting different vibrational characteristics of a machine and/or machine components. In this example, the digital twin update module 15566 may update the records representing the vibration sensors that provided the vibration sensor data and/or the records representing the machine and/or the machine components to reflect the vibration sensor data. In another example, in some scenarios, workers in an industrial environment (e.g., manufacturing facility, industrial storage facility, a mine, a drilling operation, or the like) may be required to wear wearable devices (e.g., smart watches, smart helmets, smart shoes, or the like). In these embodiments, the wearable devices may collect sensor data relating to the worker (e.g., location, movement, heartrate, respiration rate, body temperature, or the like) and/or the environment surrounding the worker and may communicate the collected sensor data to the digital twin system 15500 (e.g., via the real-time sensor API 15514) either directly or via an aggregation device of the sensor system. In response to receiving the sensor data from the wearable device of a worker, the digital twin update module 15566 may update a digital twin of a worker to reflect, for example, a location of the worker, a trajectory of the worker, a health status of the worker, or the like. In some of these embodiments, the digital twin update module 15566 may update a node representing a worker and/or an edge that connects the node representing the environment with the collected sensor data to reflect the current status of the worker.

In some embodiments, the digital twin update module 15566 may provide the sensor data from one or more sensors to the digital twin dynamic model system 15508, which may model a behavior of the environment and/or one or more industrial entities to extrapolate additional state data.

In embodiments, the digital twin visualization module 15568 receives requests to view a visual digital twin or a portion thereof. In embodiments, the request may indicate the digital twin to be viewed (e.g., an environment identifier) . In response, the digital twin visualization module 15568 may determine the requested digital twin and any other digital twins implicated by the request. For example, in requesting to view a digital twin of an environment, the digital twin visualization module 15568 may further identify the digital twins of any industrial entities within the environment. In embodiments, the digital twin visualization module 15568 may identify the spatial relationships between the industrial entities and the environment based on, for example, the relationships defined in a graph database. In these embodiments, the digital twin visualization module 15568 can determine the relative location of embedded digital twins within the containing digital twin, relative locations of adjoining digital twins, and/or the transience of the relationship (e.g., is an object fixed to a point or does the object move). The digital twin visualization module 15568 may render the requested digital twins and any other implicated digital twin based on the identified relationships. In some embodiments, the digital twin visualization module 15568 may, for each digital twin, determine the surfaces of the digital twin. In some embodiments, the surfaces of a digital may be defined or referenced in a record corresponding to the digital twin, which may be provided by a user, determined from imported images, or defined by a manufacturer of an industrial entity. In the scenario that an object can take different poses or shapes (e.g., an industrial robot), the digital twin visualization module 15568 may determine a pose or shape of the object for the digital twin. The digital twin visualization module 15568 may embed the digital twins into the requested digital twin and may output the requested digital twin to a client application.

In some of these embodiments, the request to view a digital twin may further indicate the type of view. As discussed, in some embodiments, digital twins may be depicted in a number of different view types. For example, an environment or device may be viewed in a "real-world" view that depicts the environment or device as they typically appear, in a "heat" view that depicts the environment or device in a manner that is indicative of a temperature of the environment or device, in a "vibration" view that depicts the machines and/or machine components in an industrial environment in a manner that is indicative of vibrational characteristics of the machines and/or machine components, in a "filtered" view that only displays certain types of objects within an environment or components of a device (such as objects that require attention resulting from, for example, recognition of a fault condition, an alert, an updated report, or other factors), an augmented view that overlays data on the digital twin, and/or any other suitable view types. In embodiments, digital twins may be depicted in a number of different role-based view types. For example, a manufacturing facility device may be viewed in an "operator" view that depicts the facility in a manner that is suitable for a facility operator, a "C-Suite" view that depicts the facility in a manner that is suitable for executive-level managers, a "marketing" view that depicts the facility in a manner that is suitable for workers in sales and/or marketing roles, a "board" view that depicts the facility in a manner that is suitable for members of a corporate board, a "regulatory" view that depicts the facility in a manner that is suitable for regulatory managers, and a "human resources" view that depicts the facility in a manner that is suitable for human resources personnel. In response to a request that indicates a view type, the digital twin visualization module 15568 may retrieve the data for each digital twin that corresponds to the view type. For example, if a user has requested a vibration view of a factory floor, the digital twin visualization module 15568 may retrieve vibration data for the factory floor (which may include vibration measurements taken from different machines and/or machine components and/or vibration measurements that were extrapolated by the digital twin dynamic model system 15508 and/or simulated vibration data from digital twin simulation system 15506) as well as available vibration data for any industrial entities appearing on the factory floor. In this example, the digital twin visualization module 15568 may determine colors corresponding to each machine component on a factory floor that represent a vibration fault level state (e.g., red for alarm, orange for critical, yellow for suboptimal, and green for normal operation). The digital twin visualization module 15568 may then render the digital twins of the machine components within the environment based on the determined colors. Additionally or alternatively, the digital twin visualization module 15568 may render the digital twins of the machine components within the environment with indicators having the determined colors. For instance, if the vibration fault level state of an inbound bearing of a motor is suboptimal and the outbound bearing of the motor is critical, the digital twin visualization module 15568 may render the digital twin of the inbound bearing having an indicator in a shade of yellow (e.g., suboptimal) and the outbound bearing having an indicator in a shade of orange (e.g., critical). It is noted that in some embodiments, the digital twin system 15500 may include an analytics system (not shown) that determine the manner by which the digital twin visualization system 15568 presents information to a human user. For example, the analytics system may track outcomes relating to human interactions with real-world environments or objects in response to information presented in a visual digital twin. In some embodiments, the analytics system may apply cognitive models to determine the most effective manner to display visualized information (e.g., what colors to use to denote an alarm condition, what kind of movements or animations bring attention to an alarm condition, or the like) or audio information (what sounds to use to denote an alarm condition) based on the outcome data. In some embodiments, the analytics system may apply cognitive models to determine the most suitable manner to display visualized information based on the role of the user. In embodiments, the visualization may include display of information related to the visualized digital twins, including graphical information, graphical information depicting vibration characteristics, graphical information depicting harmonic peaks, graphical information depicting peaks, vibration severity units data, vibration fault level state data, recommendations from cognitive intelligence system 15510, predictions from cognitive intelligence system 15510, probability of failure data, maintenance history data, time to failure data, cost of downtime data, probability of downtime data, cost of repair data, cost of machine replace data, probability of shutdown data, manufacturing KPIs, and the like.

In another example, a user may request a filtered view of a digital twin of a process, whereby the digital twin of the process only shows components (e.g., machine or equipment) that are involved in the process. In this example, the digital twin visualization module 15568 may retrieve a digital twin of the process, as well as any related digital twins (e.g., a digital twin of the environment and digital twins of any machinery or devices that impact the process). The digital twin visualization module 15568 may then render each of the digital twins (e.g., the environment and the relevant industrial entities) and then may perform the process on the rendered digital twins. It is noted that as a process may be performed over a period of time and may include moving items and/or parts, the digital twin visualization module 15568 may generate a series of sequential frames that demonstrate the process. In this scenario, the movements of the machines and/or devices implicated by the process may be determined according to the behaviors defined in the respective digital twins of the machines and/or devices.

As discussed, the digital twin visualization module 15568 may output the requested digital twin to a client application 15570. In some embodiments, the client application 15570 is a virtual reality application, whereby the requested digital twin is displayed on a virtual reality headset. In some embodiments, the client application 15570 is an augmented reality application, whereby the requested digital twin is depicted in an AR-enabled device. In these embodiments, the requested digital twin may be filtered such that visual elements and/or text are overlaid on the display of the AR-enabled device.

It is noted that while a graph database is discussed, the digital twin system 15500 may employ other suitable data structures to store information relating to a set of digital twins. In these embodiments, the data structures, and any related storage system, may be implemented such that the data structures provide for some degree of feedback loops and/or recursion when representing iteration of flows.

FIG. 131 illustrates an example of a digital twin I/O system 15504 that interfaces with the environment 15520, the digital twin system 15500, and/or components thereof to provide bi-directional transfer of data between coupled components according to some embodiments of the present disclosure.

In embodiments, the transferred data includes signals (e.g., request signals, command signals, response signals, etc.) between connected components, which may include software components, hardware components, physical devices, virtualized devices, simulated devices, combinations thereof, and the like. The signals may define material properties (e.g., physical quantities of temperature, pressure, humidity, density, viscosity, etc.), measured values (e.g., contemporaneous or stored values acquired by the device or system), device properties (e.g., device ID or properties of the device's design specifications, materials, measurement capabilities, dimensions, absolute position, relative position, combinations thereof, and the like), set points (e.g., targets for material properties, device properties, system properties, combinations thereof, and the like), and/or critical points (e.g., threshold values such as minimum or maximum values for material properties, device properties, system properties, etc.). The signals may be received from systems or devices that acquire (e.g., directly measure or generate) or otherwise obtain (e.g., receive, calculate, look-up, filter, etc.) the data, and may be communicated to or from the digital twin I/O system 15504 at predetermined times or in response to a request (e.g., polling) from the digital twin I/O system 15504. The communications may occur through direct or indirect connections (e.g., via intermediate modules within a circuit and/or intermediate devices between the connected components). The values may correspond to real-world elements **131302*r* (e.g., an input or output for a tangible vibration sensor) or virtual elements 131302*v* (e.g., an input or output for a digital twin 131302*d* and/or a simulated element 131302*s*** that provide vibration data).

In embodiments, the real-world elements **131302*r* may be elements within the industrial environment 15520. The real-world elements 131302*r* may include, for example, non-networked objects 15522, the devices 15524 (smart or non-smart), sensors 15526, and humans 15528. The real-world elements 131302*r* may be process or non-process equipment within the industrial environments 15520. For example, process equipment may include motors, pumps, mills, fans, painters, welders, smelters, etc., and non-process equipment may include personal protective equipment, safety equipment, emergency stations or devices (e.g., safety showers, eyewash stations, fire extinguishers, sprinkler systems, etc.), warehouse features (e.g., walls, floor layout, etc.), obstacles (e.g., persons or other items within the environment 15520**, etc.), etc.

In embodiments, the virtual elements **131302*v* may be digital representations of or that correspond to contemporaneously existing real-world elements 131302*r*. Additionally or alternatively, the virtual elements 131302*v*** may be digital representations of or that correspond to real-world elements

131302*r* that may be available for later addition and implementation into the environment 15520. The virtual elements may include, for example, simulated elements 131302*s* and/or digital twins 131302*d*. In embodiments, the simulated elements 131302*s* may be digital representations of real-world elements 131302*s* that are not present within the industrial environment 15520. The simulated elements 131302*s* may mimic desired physical properties which may be later integrated within the environment 15520 as real-world elements 131302*r* (e.g., a "black box" that mimics the dimensions of a real-world elements 131302*r*). The simulated elements 131302*s* may include digital twins of existing objects (e.g., a single simulated element 131302*s* may include one or more digital twins 131302*d* for existing sensors). Information related to the simulated elements 131302*s* may be obtained, for example, by evaluating behavior of corresponding real-world elements 131302*r* using mathematical models or algorithms, from libraries that define information and behavior of the simulated elements 131302*s* (e.g., physics libraries, chemistry libraries, or the like).

In embodiments, the digital twin 131302*d* may be a digital representation of one or more real-world elements 131302*r*. The digital twins 131302*d* are configured to mimic, copy, and/or model behaviors and responses of the real-world elements 131302*r* in response to inputs, outputs, and/or conditions of the surrounding or ambient environment. Data related to physical properties and responses of the real-world elements 131302*r* may be obtained, for example, via user input, sensor input, and/or physical modeling (e.g., thermodynamic models, electrodynamic models, mechanodynamic models, etc.). Information for the digital twin 131302*d* may correspond to and be obtained from the one or more real-world elements 131302*r* corresponding to the digital twin 131302*d*. For example, in some embodiments, the digital twin 131302*d* may correspond to one real-world element 131302*r* that is a fixed digital vibration sensor 15536 on a machine component, and vibration data for the digital twin 131302*d* may be obtained by polling or fetching vibration data measured by the fixed digital vibration sensor on the machine component. In a further example, the digital twin 131302*d* may correspond to a plurality of real-world elements 131302*r* such that each of the elements can be a fixed digital vibration sensor on a machine component, and vibration data for the digital twin 131302*d* may be obtained by polling or fetching vibration data measured by each of the fixed digital vibration sensors on the plurality of real-world elements 131302*r*. Additionally or alternatively, vibration data of a first digital twin 131302*d* may be obtained by fetching vibration data of a second digital twin 157302*d* that is embedded within the first digital twin 157302*d*, and vibration data for the first digital twin 157302*d* may include or be derived from vibration data for the second digital twin 157302*d*. For example, the first digital twin may be a digital twin 157302*d* of an environment 15520 (alternatively referred to as an "environmental digital twin") and the second digital twin 157302*d* may be a digital twin 157302*d* corresponding to a vibration sensor disposed within the environment 15520 such that the vibration data for the first digital twin 157302*d* is obtained from or calculated based on data including the vibration data for the second digital twin 157302*d*.

In embodiments, the digital twin system 15500 monitors properties of the real-world elements 157302*r* using the sensors 15526 within a respective environment 15520 that is or may be represented by a digital twin 157302*d* and/or outputs of models for one or more simulated elements 157302*s*. In embodiments, the digital twin system 15500 may minimize network congestion while maintaining effective monitoring of processes by extending polling intervals and/or minimizing data transfer for sensors corresponding that correspond to affected real-world elements 157302*r* and performing simulations (e.g., via the digital-twin simulation system 15506) during the extended interval using data that was obtained from other sources (e.g., sensors that are physically proximate to or have an effect on the affected real-world elements 157302*r*). Additionally or alternatively, error checking may be performed by comparing the collected sensor data with data obtained from the digital-twin simulation system 15506. For example, consistent deviations or fluctuations between sensor data obtained from the real-world element 157302*r* and the simulated element 157302*s* may indicate malfunction of the respective sensor or another fault condition.

In embodiments, the digital twin system 15500 may optimize features of the environment through use of one or more simulated elements 157302*s*. For example, the digital twin system 15500 may evaluate effects of the simulated elements 157302*s* within a digital twin of an environment to quickly and efficiently determine costs and/or benefits flowing from inclusion, exclusion, or substitution of real-world elements 157302*r* within the environment 15520. The costs and benefits may include, for example, increased machinery costs (e.g., capital investment and maintenance), increased efficiency (e.g., process optimization to reduce waste or increase throughput), decreased or altered footprint within the environment 15520, extension or optimization of useful lifespans, minimization of component faults, minimization of component downtime, etc.

In embodiments, the digital twin I/O system 15504 may include one or more software modules that are executed by one or more controllers of one or more devices (e.g., server devices, user devices, and/or distributed devices) to affect the described functions. The digital twin I/O system 15504 may include, for example, an input module 157304, an output module 157306, and an adapter module 157308.

In embodiments, the input module 157304 may obtain or import data from data sources in communication with the digital twin I/O system 15504, such as the sensor system 15530 and the digital twin simulation system 15506. The data may be immediately used by or stored within the digital twin system 15500. The imported data may be ingested from data streams, data batches, in response to a triggering event, combinations thereof, and the like. The input module 157304 may receive data in a format that is suitable to transfer, read, and/or write information within the digital twin system 15500.

In embodiments, the output module 157306 may output or export data to other system components (e.g., the digital twin datastore 15516, the digital twin simulation system 15506, the cognitive intelligence system 15510, etc.), devices 15524, and/or the client application 15570. The data may be output in data streams, data batches, in response to a triggering event (e.g., a request), combinations thereof, and the like. The output module 157306 may output data in a format that is suitable to be used or stored by the target element (e.g., one protocol for output to the client application and another protocol for the digital twin datastore 15516).

In embodiments, the adapter module 157308 may process and/or convert data between the input module 157304 and the output module 157306. In embodiments, the adapter module 157308 may convert and/or route data automatically (e.g., based on data type) or in response to a received request (e.g., in response to information within the data).

In embodiments, the digital twin system 15500 may represent a set of industrial workpiece elements in a digital twin, and the digital twin simulation system 15506 simulates a set of physical interactions of a worker with the workpiece elements.

In embodiments, the digital twin simulation system 15506 may determine process outcomes for the simulated physical interactions accounting for simulated human factors. For example, variations in workpiece throughput may be modeled by the digital twin system 15500 including, for example, worker response times to events, worker fatigue, discontinuity within worker actions (e.g., natural variations in human-movement speed, differing positioning times, etc.), effects of discontinuities on downstream processes, and the like. In embodiments, individualized worker interactions may be modeled using historical data that is collected, acquired, and/or stored by the digital twin system 15500. The simulation may begin based on estimated amounts (e.g., worker age, industry averages, workplace expectations, etc.). The simulation may also individualize data for each worker (e.g., comparing estimated amounts to collected worker-specific outcomes).

In embodiments, information relating to workers (e.g., fatigue rates, efficiency rates, and the like) may be determined by analyzing performance of specific workers over time and modeling said performance.

In embodiments, the digital twin system 15500 includes a plurality of proximity sensors within the sensor system 15530. The proximity sensors are or may be configured to detect elements of the environment 15520 that are within a predetermined area. For example, proximity sensors may include electromagnetic sensors, light sensors, and/or acoustic sensors.

The electromagnetic sensors are or may be configured to sense objects or interactions via one or more electromagnetic fields (e.g., emitted electromagnetic radiation or received electromagnetic radiation). In embodiments, the electromagnetic sensors include inductive sensors (e.g., radio-frequency identification sensors), capacitive sensors (e.g., contact and contactless capacitive sensors), combinations thereof, and the like.

The light sensors are or may be configured to sense objects or interactions via electromagnetic radiation in, for example, the far-infrared, near-infrared, optical, and/or ultraviolet spectra. In embodiments, the light sensors may include image sensors (e.g., charge-coupled devices and CMOS active-pixel sensors), photoelectric sensors (e.g., through-beam sensors, retroreflective sensors, and diffuse sensors), combinations thereof, and the like. Further, the light sensors may be implemented as part of a system or subsystem, such as a light detection and ranging ("LIDAR") sensor.

The acoustic sensors are or may be configured to sense objects or interactions via sound waves that are emitted and/or received by the acoustic sensors. In embodiments, the acoustic sensors may include infrasonic, sonic, and/or ultrasonic sensors. Further, the acoustic sensors may be grouped as part of a system or subsystem, such as a sound navigation and ranging ("SONAR") sensor.

In embodiments, the digital twin system 15500 stores and collects data from a set of proximity sensors within the environment 15520 or portions thereof. The collected data may be stored, for example, in the digital twin datastore 15516 for use by components the digital twin system 15500 and/or visualization by a user. Such use and/or visualization may occur contemporaneously with or after collection of the data (e.g., during later analysis and/or optimization of processes).

In embodiments, data collection may occur in response to a triggering condition. These triggering conditions may include, for example, expiration of a static or a dynamic predetermined interval, obtaining a value short of or in excess of a static or dynamic value, receiving an automatically generated request or instruction from the digital twin system 15500 or components thereof, interaction of an element with the respective sensor or sensors (e.g., in response to a worker or machine breaking a beam or coming within a predetermined distance from the proximity sensor), interaction of a user with a digital twin (e.g., selection of an environmental digital twin, a sensor array digital twin, or a sensor digital twin), combinations thereof, and the like.

In some embodiments, the digital twin system 15500 collects and/or stores RFID data in response to interaction of a worker with a real-world element **157302*r*. For example, in response to a worker interaction with a real-world environment, the digital twin will collect and/or store RFID data from RFID sensors within or associated with the corresponding environment 15520**. Additionally or alternatively, worker interaction with a sensor-array digital twin will collect and/or store RFID data from RFID sensors within or associated with the corresponding sensor array. Similarly, worker interaction with a sensor digital twin will collect and/or store RFID data from the corresponding sensor. The RFID data may include suitable data attainable by RFID sensors such as proximate RFID tags, RFID tag position, authorized RFID tags, unauthorized RFID tags, unrecognized RFID tags, RFID type (e.g., active or passive), error codes, combinations thereof, and the like.

In embodiments, the digital twin system 15500 may further embed outputs from one or more devices within a corresponding digital twin. In embodiments, the digital twin system 15500 embeds output from a set of individual-associated devices into an industrial digital twin. For example, the digital twin I/O system 15504 may receive information output from one or more wearable devices 15554 or mobile devices (not shown) associated with an individual within an industrial environment. The wearable devices may include image capture devices (e.g., body cameras or augmented-reality headwear), navigation devices (e.g., GPS devices, inertial guidance systems), motion trackers, acoustic capture devices (e.g., microphones), radiation detectors, combinations thereof, and the like.

In embodiments, upon receiving the output information, the digital twin I/O system 15504 routes the information to the digital twin creation module 15564 to check and/or update the environment digital twin and/or associated digital twins within the environment (e.g., a digital twin of a worker, machine, or robot position at a given time). Further, the digital twin system 15500 may use the embedded output to determine characteristics of the environment 15520.

In embodiments, the digital twin system 15500 embeds output from a LIDAR point cloud system into an industrial digital twin. For example, the digital twin I/O system 15504 may receive information output from one or more Lidar devices 15538 within an industrial environment. The Lidar devices 15538 are configured to provide a plurality of points having associated position data (e.g., coordinates in absolute or relative x, y, and z values). Each of the plurality of points may include further LIDAR attributes, such as intensity, return number, total returns, laser color data, return color data, scan angle, scan direction, etc. The Lidar devices 15538 may provide a point cloud that includes the plurality of points to the digital twin system 15500 via, for example, the digital twin I/O system 15504. Additionally or alternatively, the digital twin system 15500 may receive a stream of points and assemble the stream into a point cloud, or may receive a point cloud and assemble the received point cloud with existing point cloud data, map data, or three dimensional (3D)-model data.

In embodiments, upon receiving the output information, the digital twin I/O system 15504 routes the point cloud information to the digital twin creation module 15564 to check and/or update the environment digital twin and/or associated digital twins within the environment (e.g., a digital twin of a worker, machine, or robot position at a given time). In some embodiments, the digital twin system 15500 is further configured to determine closed-shape objects within the received LIDAR data. For example, the digital twin system 15500 may group a plurality of points within the point cloud as an object and, if necessary, estimate obstructed faces of objects (e.g., a face of the object contacting or adjacent a floor or a face of the object contacting or adjacent another object such as another piece of equipment). The system may use such closed-shape objects to narrow search space for digital twins and thereby increase efficiency of matching algorithms (e.g., a shape-matching algorithm).

In embodiments, the digital twin system 15500 embeds output from a simultaneous location and mapping ("SLAM") system in an environmental digital twin. For example, the digital twin I/O system 15504 may receive information output from the SLAM system, such as Slam sensor 15562, and embed the received information within an environment digital twin corresponding to the location determined by the SLAM system. In embodiments, upon receiving the output information from the SLAM system, the digital twin I/O system 15504 routes the information to the digital twin creation module 15564 to check and/or update the environment digital twin and/or associated digital twins within the environment (e.g., a digital twin of a workpiece, furniture, movable object, or autonomous object). Such updating provides digital twins of non-connected elements (e.g., furnishings or persons) automatically and without need of user interaction with the digital twin system 15500.

In embodiments, the digital twin system 15500 can leverage known digital twins to reduce computational requirements for the Slam sensor 15562 by using suboptimal map-building algorithms. For example, the suboptimal map-building algorithms may allow for a higher uncertainty tolerance using simple bounded-region representations and identifying possible digital twins. Additionally or alternatively, the digital twin system 15500 may use a bounded-region representation to limit the number of digital twins, analyze the group of potential twins for distinguishing features, then perform higher precision analysis for the distinguishing features to identify and/or eliminate categories of, groups of, or individual digital twins and, in the event that no matching digital twin is found, perform a precision scan of only the remaining areas to be scanned.

In embodiments, the digital twin system 15500 may further reduce compute required to build a location map by leveraging data captured from other sensors within the environment (e.g., captured images or video, radio images, etc.) to perform an initial map-building process (e.g., a simple bounded-region map or other suitable photogrammetry methods), associate digital twins of known environmental objects with features of the simple bounded-region map to refine the simple bounded-region map, and perform more precise scans of the remaining simple bounded regions to further refine the map. In some embodiments, the digital twin system 15500 may detect objects within received mapping information and, for each detected object, determine whether the detected object corresponds to an existing digital twin of a real-world-element. In response to determining that the detected object does not correspond to an existing real-world-element digital twin, the digital twin system 15500 may use, for example, the digital twin creation module 15564 to generate a new digital twin corresponding to the detected object (e.g., a detected-object digital twin) and add the detected-object digital twin to the real-world-element digital twins within the digital twin datastore. Additionally or alternatively, in response to determining that the detected object corresponds to an existing real-world-element digital twin, the digital twin system 15500 may update the real-world-element digital twin to include new information detected by the simultaneous location and mapping sensor, if any.

In embodiments, the digital twin system 15500 represents locations of autonomously or remotely moveable elements and attributes thereof within an industrial digital twin. Such movable elements may include, for example, workers, persons, vehicles, autonomous vehicles, robots, etc. The locations of the moveable elements may be updated in response to a triggering condition. Such triggering conditions may include, for example, expiration of a static or a dynamic predetermined interval, receiving an automatically generated request or instruction from the digital twin system 15500 or components thereof, interaction of an element with a respective sensor or sensors (e.g., in response to a worker or machine breaking a beam or coming within a predetermined distance from a proximity sensor), interaction of a user with a digital twin (e.g., selection of an environmental digital twin, a sensor array digital twin, or a sensor digital twin), combinations thereof, and the like.

In embodiments, the time intervals may be based on probability of the respective movable element having moved within a time period. For example, the time interval for updating a worker location may be relatively shorter for workers expected to move frequently (e.g., a worker tasked with lifting and carrying objects within and through the environment 15520) and relatively longer for workers expected to move infrequently (e.g., a worker tasked with monitoring a process stream). Additionally or alternatively, the time interval may be dynamically adjusted based on applicable conditions, such as increasing the time interval when no movable elements are detected, decreasing the time interval as or when the number of moveable elements within an environment increases (e.g., increasing number of workers and worker interactions), increasing the time interval during periods of reduced environmental activity (e.g., breaks such as lunch), decreasing the time interval during periods of abnormal environmental activity (e.g., tours, inspections, or maintenance), decreasing the time interval when unexpected or uncharacteristic movement is detected (e.g., frequent movement by a typically sedentary element or coordinated movement, for example, of workers approaching an exit or moving cooperatively to carry a large object), combinations thereof, and the like. Further, the time interval may also include additional, semi-random acquisitions. For example, occasional mid-interval locations may be acquired by the digital twin system 15500 to reinforce or evaluate the efficacy of the particular time interval.

In embodiments, the digital twin system 15500 may analyze data received from the digital twin I/O system 15504 to refine, remove, or add conditions. For example, the digital twin system 15500 may optimize data collection times for movable elements that are updated more frequently than needed (e.g., multiple consecutive received positions being identical or within a predetermined margin of error).

In embodiments, the digital twin system 15500 may receive, identify, and/or store a set of states 15540*a-n* related to the environment 15520. The states 15540*a-n* may be, for example, data structures that include a plurality of attributes 158404*a-n* and a set of identifying criteria 158406*a-n* to uniquely identify each respective state 15540*a-n*. In embodiments, the states 15540*a-n* may correspond to states where it is desirable for the digital twin system 15500 to set or alter conditions of real-world elements 157302*r* and/or the environment 15520 (e.g., increase/decrease monitoring intervals, alter operating conditions, etc.).

In embodiments, the set of states 15540*a-n* may further include, for example, minimum monitored attributes for each state 15540*a-n*, the set of identifying criteria 158406*a-n* for each state 15540*a-n*, and/or actions available to be taken or recommended to be taken in response to each state 15540*a-n*. Such information may be stored by, for example, the digital twin datastore 15516 or another datastore. The states 15540*a-n* or portions thereof may be provided to, determined by, or altered by the digital twin system 15500. Further, the set of states 15540*a-n* may include data from disparate sources. For example, details to identify and/or respond to occurrence of a first state may be provided to the digital twin system 15500 via user input, details to identify and/or respond to occurrence of a second state may be provided to the digital twin system 15500 via an external system, details to identify and/or respond to occurrence of a third state may be determined by the digital twin system 15500 (e.g., via simulations or analysis of process data), and details to identify and/or respond to occurrence of a fourth state may be stored by the digital twin system 15500 and altered as desired (e.g., in response to simulated occurrence of the state or analysis of data collected during an occurrence of and response to the state).

In embodiments, the plurality of attributes 158404*a-n* includes at least the attributes 158404*a-n* needed to identify the respective state 15540*a-n*. The plurality of attributes 158404*a-n* may further include additional attributes that are or may be monitored in determining the respective state 15540*a-n*, but are not needed to identify the respective state 15540*a-n*. For example, the plurality of attributes 158404*a-n* for a first state may include relevant information such as rotational speed, fuel level, energy input, linear speed, acceleration, temperature, strain, torque, volume, weight, etc.

The set of identifying criteria 158406*a-n* may include information for each of the set of attributes 158404*a-n* to uniquely identify the respective state. The identifying criteria 158406*a-n* may include, for example, rules, thresholds, limits, ranges, logical values, conditions, comparisons, combinations thereof, and the like.

The change in operating conditions or monitoring may be any suitable change. For example, after identifying occurrence of a respective state 158406*a-n*, the digital twin system 15500 may increase or decrease monitoring intervals for a device (e.g., decreasing monitoring intervals in response to a measured parameter differing from nominal operation) without altering operation of the device. Additionally or alternatively, the digital twin system 15500 may alter operation of the device (e.g., reduce speed or power input) without altering monitoring of the device. In further embodiments, the digital twin system 15500 may alter operation of the device (e.g., reduce speed or power input) and alter monitoring intervals for the device (e.g., decreasing monitoring intervals).

Figure 151:
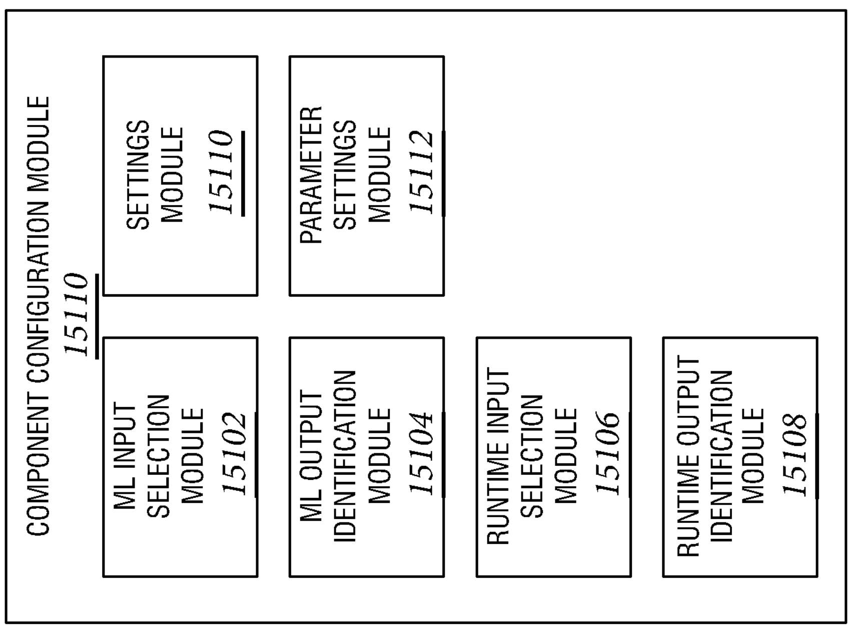

FIG. 151 illustrates an example set of identified states 15540*a-n* related to industrial environments that the digital twin system 15500 may identify and/or store for access by intelligent systems (e.g., the cognitive intelligence system 15510) or users of the digital twin system 15500, according to some embodiments of the present disclosure. The states 15540*a-n* may include operational states (e.g., suboptimal, normal, optimal, critical, or alarm operation of one or more components), excess or shortage states (e.g., supply-side or output-side quantities), combinations thereof, and the like.

In embodiments, the digital twin system 15500 may monitor attributes 151404*a-n* of real-world elements 157302*r* and/or digital twins 157302*d* to determine the respective state 15540*a-n*. The attributes 151404*a-n* may be, for example, operating conditions, set points, critical points, status indicators, other sensed information, combinations thereof, and the like. For example, the attributes 151404*a-n* may include power input 151404*a*, operational speed 151404*b*, critical speed 151404*c*, and operational temperature 151404*d* of the monitored elements. While the illustrated example illustrates uniform monitored attributes, the monitored attributes may differ by target device (e.g., the digital twin system 15500 would not monitor rotational speed for an object with no rotatable components).

Each of the states 15540*a-n* includes a set of identifying criteria 151406*a-n* meeting particular criteria that are unique among the group of monitored states 15540*a-n*. The digital twin system 15500 may identify the overspeed state 15540*a*, for example, in response to the monitored attributes 151404*a-n* meeting a first set of identifying criteria 151406*a* (e.g., operational speed 151404*b* being higher than the critical speed 151404*c*, while the operational temperature 151404*d* is nominal).

In response to determining that one or more states 15540*a-n* exists or has occurred, the digital twin system 15500 may update triggering conditions for one or more monitoring protocols, issue an alert or notification, or trigger actions of subcomponents of the digital twin system 15500. For example, subcomponents of the digital twin system 15500 may take actions to mitigate and/or evaluate impacts of the detected states 15540*a-n*. When attempting to take actions to mitigate impacts of the detected states 15540*a-n* on real-world elements 157302*r*, the digital twin system 15500 may determine whether instructions exist (e.g., are stored in the digital twin datastore 15516) or should be developed (e.g., developed via simulation and cognitive intelligence or via user or worker input). Further, the digital twin system 15500 may evaluate impacts of the detected states 15540*a-n*, for example, concurrently with the mitigation actions or in response to determining that the digital twin system 15500 has no stored mitigation instructions for the detected states 15540*a-n*.

In embodiments, the digital twin system 15500 employs the digital twin simulation system 15506 to simulate one or more impacts, such as immediate, upstream, downstream, and/or continuing effects, of recognized states. The digital twin simulation system 15506 may collect and/or be provided with values relevant to the evaluated states 15540*a-n*. In simulating the impact of the one or more states 15540*a-n*, the digital twin simulation system 15506 may recursively evaluate performance characteristics of affected digital twins 157302*d* until convergence is achieved. The digital twin simulation system 15506 may work, for example, in tandem with the cognitive intelligence system 15510 to determine response actions to alleviate, mitigate, inhibit, and/or prevent occurrence of the one or more states 15540*a-n*. For example, the digital twin simulation system 15506 may recursively simulate impacts of the one or more states 15540*a-n* until achieving a desired fit (e.g., convergence is achieved), provide the simulated values to the cognitive intelligence system 15510 for evaluation and determination of potential actions, receive the potential actions, evaluate impacts of each of the potential actions for a respective desired fit (e.g., cost functions for minimizing production disturbance, preserving critical components, minimizing maintenance and/or downtime, optimizing system, worker, user, or personal safety, etc.).

In embodiments, the digital twin simulation system 15506 and the cognitive intelligence system 15510 may repeatedly share and update the simulated values and response actions for each desired outcome until desired conditions are met (e.g., convergence for each evaluated cost function for each evaluated action). The digital twin system 15500 may store the results in the digital twin datastore 15516 for use in response to determining that one or more states 15540*a-n* has occurred. Additionally, simulations and evaluations by the digital twin simulation system 15506 and/or the cognitive intelligence system 15510 may occur in response to occurrence or detection of the event.

In embodiments, simulations and evaluations are triggered only when associated actions are not present within the digital twin system 15500. In further embodiments, simulations and evaluations are performed concurrently with use of stored actions to evaluate the efficacy or effectiveness of the actions in real time and/or evaluate whether further actions should be employed or whether unrecognized states may have occurred. In embodiments, the cognitive intelligence system 15510 may also be provided with notifications of instances of undesired actions with or without data on the undesired aspects or results of such actions to optimize later evaluations.

In embodiments, the digital twin system 15500 evaluates and/or represents the impact of machine downtime within a digital twin of a manufacturing facility. For example, the digital twin system 15500 may employ the digital twin simulation system 15506 to simulate the immediate, upstream, downstream, and/or continuing effects of a machine downtime state 15540*b*. The digital twin simulation system 15506 may collect or be provided with performance-related values such as optimal, suboptimal, and minimum performance requirements for elements (e.g., real-world elements 157302*r* and/or nested digital twins 157302*d*) within the affected digital twins 157302*d*, and/or characteristics thereof that are available to the affected digital twins 157302*d*, nested digital twins 157302*d*, redundant systems within the affected digital twins 157302*d*, combinations thereof, and the like.

In embodiments, the digital twin system 15500 is configured to: simulate one or more operating parameters for the real-world elements in response to the industrial environment being supplied with given characteristics using the real-world-element digital twins; calculate a mitigating action to be taken by one or more of the real-world elements in response to being supplied with the contemporaneous characteristics; and actuate, in response to detecting the contemporaneous characteristics, the mitigating action. The calculation may be performed in response to detecting contemporaneous characteristics or operating parameters falling outside of respective design parameters or may be determined via a simulation prior to detection of such characteristics.

Additionally or alternatively, the digital twin system 15500 may provide alerts to one or more users or system elements in response to detecting states.

In embodiments, the digital twin I/O system 15504 includes a pathing module 157310. The pathing module 157310 may ingest navigational data from the elements 157302, provide and/or request navigational data to components of the digital twin system 15500 (e.g., the digital twin simulation system 15506, the digital twin behavior system, and/or the cognitive intelligence system 15510), and/or output navigational data to elements 157302 (e.g., to the wearable devices 15554). The navigational data may be collected or estimated using, for example, historical data, guidance data provided to the elements 157302, combinations thereof, and the like.

For example, the navigational data may be collected or estimated using historical data stored by the digital twin system 15500. The historical data may include or be processed to provide information such as acquisition time, associated elements 157302, polling intervals, task performed, laden or unladen conditions, whether prior guidance data was provided and/or followed, conditions of the environment 15520, other elements 157302 within the environment 15520, combinations thereof, and the like. The estimated data may be determined using one or more suitable pathing algorithms. For example, the estimated data may be calculated using suitable order-picking algorithms, suitable path-search algorithms, combinations thereof, and the like. The order-picking algorithm may be, for example, a largest gap algorithm, an s-shape algorithm, an aisle-by-aisle algorithm, a combined algorithm, combinations thereof, and the like. The path-search algorithms may be, for example, Dijkstra's algorithm, the A* algorithm, hierarchical path-finding algorithms, incremental path-finding algorithms, any angle path-finding algorithms, flow field algorithms, combinations thereof, and the like.

Additionally or alternatively, the navigational data may be collected or estimated using guidance data of the worker. The guidance data may include, for example, a calculated route provided to a device of the worker (e.g., a mobile device or the wearable device 15554). In another example, the guidance data may include a calculated route provided to a device of the worker that instructs the worker to collect vibration measurements from one or more locations on one or more machines along the route. The collected and/or estimated navigational data may be provided to a user of the digital twin system 15500 for visualization, used by other components of the digital twin system 15500 for analysis, optimization, and/or alteration, provided to one or more elements 157302, combinations thereof, and the like.

In embodiments, the digital twin system 15500 ingests navigational data for a set of workers for representation in a digital twin. Additionally or alternatively, the digital twin system 15500 ingests navigational data for a set of mobile equipment assets of an industrial environment into a digital twin.

In embodiments, the digital twin system 15500 ingests a system for modeling traffic of mobile elements in an industrial digital twin. For example, the digital twin system 15500 may model traffic patterns for workers or persons within the environment 15520, mobile equipment assets, combinations thereof, and the like. The traffic patterns may be estimated based on modeling traffic patterns from and historical data and contemporaneous ingested data. Further, the traffic patterns may be continuously or intermittently updated depending on conditions within the environment 15520 (e.g., a plurality of autonomous mobile equipment assets may provide information to the digital twin system 15500 at a slower update interval than the environment 15520 including both workers and mobile equipment assets).

The digital twin system 15500 may alter traffic patterns (e.g., by providing updated navigational data to one or more of the mobile elements) to achieve one or more predetermined criteria. The predetermined criteria may include, for example, increasing process efficiency, decreasing interactions between laden workers and mobile equipment assets, minimizing worker path length, routing mobile equipment around paths or potential paths of persons, combinations thereof, and the like.

In embodiments, the digital twin system 15500 may provide traffic data and/or navigational information to mobile elements in an industrial digital twin. The navigational information may be provided as instructions or rule sets, displayed path data, or selective actuation of devices. For example, the digital twin system 15500 may provide a set of instructions to a robot to direct the robot to and/or along a desired route for collecting vibration data from one or more specified locations on one or more specified machines along the route using a vibration sensor. The robot may communicate updates to the system including obstructions, reroutes, unexpected interactions with other assets within the environment 15520, etc.

In some embodiments, an ant-based system 15574 enables industrial entities, including robots, to lay a trail with one or more messages for other industrial entities, including themselves, to follow in later journeys. In embodiments, the messages include information related to vibration measurement collection. In embodiments, the messages include information related to vibration sensor measurement locations. In some embodiments, the trails may be configured to fade over time. In some embodiments, the ant-based trails may be experienced via an augmented reality system. In some embodiments, the ant-based trails may be experienced via a virtual reality system. In some embodiments, the ant-based trails may be experienced via a mixed reality system. In some embodiments, ant-based tagging of areas can trigger a pain-response and/or accumulate into a warning signal. In embodiments, the ant-based trails may be configured to generate an information filtering response. In some embodiments, the ant-based trails may be configured to generate an information filtering response wherein the information filtering response is a heightened sense of visual awareness. In some embodiments, the ant-based trails may be configured to generate an information filtering response wherein the information filtering response is a heightened sense of acoustic awareness. In some embodiments, the messages include vectorized data.

In embodiments, the digital twin system 15500 includes design specification information for representing a real-world element 157302*r* using a digital twin 157302*d*. The digital may correspond to an existing real-world element 157302*r* or a potential real-world element 157302*r*. The design specification information may be received from one or more sources. For example, the design specification information may include design parameters set by user input, determined by the digital twin system 15500 (e.g., the via digital twin simulation system 15506), optimized by users or the digital twin simulation system 15506, combinations thereof, and the like. The digital twin simulation system 15506 may represent the design specification information for the component to users, for example, via a display device or a wearable device. The design specification information may be displayed schematically (e.g., as part of a process diagram or table of information) or as part of an augmented reality or virtual reality display. The design specification information may be displayed, for example, in response to a user interaction with the digital twin system 15500 (e.g., via user selection of the element or user selection to generally include design specification information within displays). Additionally or alternatively, the design specification information may be displayed automatically, for example, upon the element coming within view of an augmented reality or virtual reality device. In embodiments, the displayed design specification information may further include indicia of information source (e.g., different displayed colors indicate user input versus digital twin system 15500 determination), indicia of mismatches (e.g., between design specification information and operational information), combinations thereof, and the like.

In embodiments, the digital twin system 15500 embeds a set of control instructions for a wearable device within an industrial digital twin, such that the control instructions are provided to the wearable device to induce an experience for a wearer of the wearable device upon interaction with an element of the industrial digital twin. The induced experience may be, for example, an augmented reality experience or a virtual reality experience. The wearable device, such as a headset, may be configured to output video, audio, and/or haptic feedback to the wearer to induce the experience. For example, the wearable device may include a display device and the experience may include display of information related to the respective digital twin. The information displayed may include maintenance data associated with the digital twin, vibration data associated with the digital twin, vibration measurement location data associated with the digital twin, financial data associated with the digital twin, such as a profit or loss associated with operation of the digital twin, manufacturing KPIs associated with the digital twin, information related to an occluded element (e.g., a sub-assembly) that is at least partially occluded by a foreground element (e.g., a housing), a virtual model of the occluded element overlaid on the occluded element and visible with the foreground element, operating parameters for the occluded element, a comparison to a design parameter corresponding to the operating parameter displayed, combinations thereof, and the like. Comparisons may include, for example, altering display of the operating parameter to change a color, size, and/or display period for the operating parameter.

In some embodiments, the displayed information may include indicia for removable elements that are or may be configured to provide access to the occluded element with each indicium being displayed proximate to or overlying the respective removable element. Further, the indicia may be sequentially displayed such that a first indicium corresponding to a first removable element (e.g., a housing) is displayed, and a second indicium corresponding to a second removable element (e.g., an access panel within the housing) is displayed in response to the worker removing the first removable element. In some embodiments, the induced experience allows the wearer to see one or more locations on a machine for optimal vibration measurement collection. In an example, the digital twin system 15500 may provide an augmented reality view that includes highlighted vibration measurement collection locations on a machine and/or instructions related to collecting vibration measurements. Furthering the example, the digital twin system 15500 may provide an augmented reality view that includes instructions related to timing of vibration measurement collection. Information utilized in displaying the highlighted placement locations may be obtained using information stored by the digital twin system 15500. In some embodiments, mobile elements may be tracked by the digital twin system 15500 (e.g., via observational elements within the environment 15520 and/or via pathing information communicated to the digital twin system 15500) and continually displayed by the wearable device within the occluded view of the worker. This optimizes movement of elements within the environment 15520, increases worker safety, and minimizes down time of elements resulting from damage.

In some embodiments, the digital twin system 15500 may provide an augmented reality view that displays mismatches between design parameters or expected parameters of real-world elements 157302*r* to the wearer. The displayed information may correspond to real-world elements 157302*r* that are not within the view of the wearer (e.g., elements within another room or obscured by machinery). This allows the worker to quickly and accurately troubleshoot mismatches to determine one or more sources for the mismatch. The cause of the mismatch may then be determined, for example, by the digital twin system 15500 and corrective actions ordered. In example embodiments, a wearer may be able to view malfunctioning subcomponents of machines without removing occluding elements (e.g., housings or shields). Additionally or alternatively, the wearer may be provided with instructions to repair the device, for example, including display of the removal process (e.g., location of fasteners to be removed), assemblies or subassemblies that should be transported to other areas for repair (e.g., dust-sensitive components), assemblies or subassemblies that need lubrication, and locations of objects for reassembly (e.g., storing location that the wearer has placed removed objects and directing the wearer or another wearer to the stored locations to expedite reassembly and minimize further disassembly or missing parts in the reassembled element). This can expedite repair work, minimize process impact, allow workers to disassemble and reassemble equipment (e.g., by coordinating disassembly without direct communication between the workers), increase equipment longevity and reliability (e.g., by assuring that all components are properly replaced prior to placing back in service), combinations thereof, and the like.

In some embodiments, the induced experience includes a virtual reality view or an augmented reality view that allows the wearer to see information related to existing or planned elements. The information may be unrelated to physical performance of the element (e.g., financial performance such as asset value, energy cost, input material cost, output material value, legal compliance, and corporate operations). One or more wearers may perform a virtual walkthrough or an augmented walkthrough of the industrial environment 15520.

In examples, the wearable device displays compliance information that expedites inspections or performance of work.

In further examples, the wearable device displays financial information that is used to identify targets for alteration or optimization. For example, a manager or officer may inspect the environment 15520 for compliance with updated regulations, including information regarding compliance with former regulations, "grandfathered," and/or excepted elements. This can be used to reduce unnecessary downtime (e.g., scheduling upgrades for the least impactful times, such as during planned maintenance cycles), prevent unnecessary upgrades (e.g., replacing grandfathered or excepted equipment), and reduce capital investment.

Referring back to FIG. 155, in embodiments, the digital twin system 15500 may include, integrate, integrate with, manage, handle, link to, take input from, provide output to, control, coordinate with, or otherwise interact with a digital twin dynamic model system 15508. The digital twin dynamic model system 15508 can update the properties of a set of digital twins of a set of industrial entities and/or environments, including properties of physical industrial assets, workers, processes, manufacturing facilities, warehouses, and the like (or any of the other types of entities or environments described in this disclosure or in the documents incorporated by reference herein) in such a manner that the digital twins may represent those industrial entities and environments, and properties or attributes thereof, in real-time or very near real-time. In some embodiments, the digital twin dynamic model system 15508 may obtain sensor data received from a sensor system 15530 and may determine one or more properties of an industrial environment or an industrial entity within an environment based on the sensor data and based on one or more dynamic models.

In embodiments, the digital twin dynamic model system 15508 may update/assign values of various properties in a digital twin and/or one or more embedded digital twins, including, but not limited to, vibration values, vibration fault level states, probability of failure values, probability of downtime values, cost of downtime values, probability of shutdown values, financial values, KPI values, temperature values, humidity values, heat flow values, fluid flow values, radiation values, substance concentration values, velocity values, acceleration values, location values, pressure values, stress values, strain values, light intensity values, sound level values, volume values, shape characteristics, material characteristics, and dimensions.

In embodiments, a digital twin may be comprised of (e.g., via reference) of other embedded digital twins. For example, a digital twin of a manufacturing facility may include an embedded digital twin of a machine and one or more embedded digital twins of one or more respective motors enclosed within the machine. A digital twin may be embedded, for example, in the memory of an industrial machine that has an onboard IT system (e.g., the memory of an Onboard Diagnostic System, control system (e.g., SCADA system) or the like). Other non-limiting examples of where a digital twin may be embedded include the following: on a wearable device of a worker; in memory on a local network asset, such as a switch, router, access point, or the like; in a cloud computing resource that is provisioned for an environment or entity; and on an asset tag or other memory structure that is dedicated to an entity.

In one example, the digital twin dynamic model system 15508 can update vibration characteristics throughout an industrial environment digital twin based on captured vibration sensor data measured at one or more locations in the industrial environment and one or more dynamic models that model vibration within the industrial environment digital twin. The industrial digital twin may, before updating, already contain information about properties of the industrial entities and/or environment that can be used to feed a dynamic model, such as information about materials, shapes/volumes (e.g., of conduits), positions, connections/interfaces, and the like, such that vibration characteristics can be represented for the entities and/or environment in the digital twin. Alternatively, the dynamic models may be configured using such information.

In embodiments, the digital twin dynamic model system 15508 can update the properties of a digital twin and/or one or more embedded digital twins on behalf of a client application 15570. In embodiments, a client application 15570 may be an application relating to an industrial component or environment (e.g., monitoring an industrial facility or a component within, simulating an industrial environment, or the like). In embodiments, the client application 15570 may be used in connection with both fixed and mobile data collection systems. In embodiments, the client application 15570 may be used in connection with Industrial Internet of Things sensor system 15530.

In embodiments, the digital twin dynamic model system 15508 leverages digital twin dynamic models 155100 to model the behavior of an industrial entity and/or environment. Dynamic models 155100 may enable digital twins to represent physical reality, including the interactions of industrial entities, by using a limited number of measurements to enrich the digital representation of an industrial entity and/or environment, such as based on scientific principles. In embodiments, the dynamic models 155100 are formulaic or mathematical models. In embodiments, the dynamic models 155100 adhere to scientific laws, laws of nature, and formulas (e.g., Newton's laws of motion, second law of thermodynamics, Bernoulli's principle, ideal gas law, Dalton's law of partial pressures, Hooke's law of elasticity, Fourier's law of heat conduction, Archimedes' principle of buoyancy, and the like). In embodiments, the dynamic models are machine-learned models.

In embodiments, the digital twin system 15500 may have a digital twin dynamic model datastore 155102 for storing dynamic models 155100 that may be represented in digital twins. In embodiments, digital twin dynamic model datastore can be searchable and/or discoverable. In embodiments, digital twin dynamic model datastore can contain metadata that allows a user to understand what characteristics a given dynamic model can handle, what inputs are required, what outputs are provided, and the like. In some embodiments, digital twin dynamic model datastore 155102 can be hierarchical (such as where a model can be deepened or made more simple based on the extent of available data and/or inputs, the granularity of the inputs, and/or situational factors (such as where something becomes of high interest and a higher fidelity model is accessed for a period of time).

In embodiments, a digital twin or digital representation of an industrial entity or facility may include a set of data structures that collectively define a set of properties of a represented physical industrial asset, device, worker, process, facility, and/or environment, and/or possible behaviors thereof. In embodiments, the digital twin dynamic model system 15508 may leverage the dynamic models 155100 to inform the set of data structures that collectively define a digital twin with real-time data values. The digital twin dynamic models 155100 may receive one or more sensor measurements, Industrial Internet of Things device data, and/or other suitable data as inputs and calculate one or more outputs based on the received data and one or more dynamic models 155100. The digital twin dynamic model system 15508 then uses the one or more outputs to update the digital twin data structures.

In one example, the set of properties of a digital twin of an industrial asset that may be updated by the digital twin dynamic model system 15508 using dynamic models 155100 may include the vibration characteristics of the asset, temperature(s) of the asset, the state of the asset (e.g., a solid, liquid, or gas), the location of the asset, the displacement of the asset, the velocity of the asset, the acceleration of the asset, probability of downtime values associated with the asset, cost of downtime values associated with the asset, probability of shutdown values associated with the asset, manufacturing KPIs associated with the asset, financial information associated with the asset, heat flow characteristics associated with the asset, fluid flow rates associated with the asset (e.g., fluid flow rates of a fluid flowing through a pipe), identifiers of other digital twins embedded within the digital twin of the asset and/or identifiers of digital twins embedding the digital twin of the asset, and/or other suitable properties. Dynamic models 155100 associated with a digital twin of an asset can be configured to calculate, interpolate, extrapolate, and/or output values for such asset digital twin properties based on input data collected from sensors and/or devices disposed in the industrial setting and/or other suitable data and subsequently populate the asset digital twin with the calculated values.

In some embodiments, the set of properties of a digital twin of an industrial device that may be updated by the digital twin dynamic model system 15508 using dynamic models 155100 may include the status of the device, a location of the device, the temperature(s) of a device, a trajectory of the device, identifiers of other digital twins that the digital twin of the device is embedded within, embeds, is linked to, includes, integrates with, takes input from, provides output to, and/or interacts with and the like. Dynamic models 155100 associated with a digital twin of a device can be configured to calculate or output values for these device digital twin properties based on input data and subsequently update the device digital twin with the calculated values.

In some embodiments, the set of properties of a digital twin of an industrial worker that may be updated by the digital twin dynamic model system 15508 using dynamic models 155100 may include the status of the worker, the location of the worker, a stress measure for the worker, a task being performed by the worker, a performance measure for the worker, and the like. Dynamic models associated with a digital twin of an industrial worker can be configured to calculate or output values for such properties based on input data, which then may be used to populate industrial worker digital twin. In embodiments, industrial worker dynamic models (e.g., psychometric models) can be configured to predict reactions to stimuli, such as cues that are given to workers to direct them to undertake tasks and/or alerts or warnings that are intended to induce safe behavior. In embodiments, industrial worker dynamic models may be workflow models (Gantt charts and the like), failure mode effects analysis models (FMEA), biophysical models (such as to model worker fatigue, energy utilization, hunger), and the like.

Example properties of a digital twin of an industrial environment that may be updated by the digital twin dynamic model system 15508 using dynamic models 155100 may include the dimensions of the industrial environment, the temperature(s) of the industrial environment, the humidity value(s) of the industrial environment, the fluid flow characteristics in the industrial environment, the heat flow characteristics of the industrial environment, the lighting characteristics of the industrial environment, the acoustic characteristics of the industrial environment the physical objects in the environment, processes occurring in the industrial environment, currents of the industrial environment (if a body of water), and the like. Dynamic models associated with a digital twin of an industrial environment can be configured to calculate or output these properties based on input data collected from sensors and/or devices disposed in the industrial environment and/or other suitable data and subsequently populate the industrial environment digital twin with the calculated values.

In embodiments, dynamic models 155100 may adhere to physical limitations that define boundary conditions, constants or variables for digital twin modeling. For example, the physical characterization of a digital twin of an industrial entity or industrial environment may include a gravity constant (e.g., 9.8 m/s2), friction coefficients of surfaces, thermal coefficients of materials, maximum temperatures of assets, maximum flow capacities, and the like. Additionally or alternatively, the dynamic models may adhere to the laws of nature. For example, dynamic models may adhere to the laws of thermodynamics, laws of motion, laws of fluid dynamics, laws of buoyancy, laws of heat transfer, laws of radiation, laws of quantum dynamics, and the like. In some embodiments, dynamic models may adhere to biological aging theories or mechanical aging principles. Thus, when the digital twin dynamic model system 15508 facilitates a real-time digital representation, the digital representation may conform to dynamic models, such that the digital representations mimic real world conditions. In some embodiments, the output(s) from a dynamic model can be presented to a human user and/or compared against real-world data to ensure convergence of the dynamic models with the real world. Furthermore, as dynamic models are based partly on assumptions, the properties of a digital twin may be improved and/or corrected when a real-world behavior differs from that of the digital twin. In embodiments, additional data collection and/or instrumentation can be recommended based on the recognition that an input is missing from a desired dynamic model, that a model in operation isn't working as expected (perhaps due to missing and/or faulty sensor information), that a different result is needed (such as due to situational factors that make something of high interest), and the like.

Dynamic models may be obtained from a number of different sources. In some embodiments, a user can upload a model created by the user or a third party. Additionally or alternatively, the models may be created on the digital twin system using a graphical user interface. The dynamic models may include bespoke models that are configured for a particular environment and/or set of industrial entities and/or agnostic models that are applicable to similar types of digital twins. The dynamic models may be machine-learned models.

FIG. 159 illustrates example embodiments of a method for updating a set of properties of a digital twin and/or one or more embedded digital twins on behalf of client applications 15570. In embodiments, digital twin dynamic model system 15508 leverages one or more dynamic models 155100 to update a set of properties of a digital twin and/or one or more embedded digital twins on behalf of client application 15570 based on the impact of collected sensor data from sensor system 15530, data collected from Internet of Things connected devices 15524, and/or other suitable data in the set of dynamic models 155100 that are used to enable the industrial digital twins. In embodiments, the digital twin dynamic model system 15508 may be instructed to run specific dynamic models using one or more digital twins that represent physical industrial assets, devices, workers, processes, and/or industrial environments that are managed, maintained, and/or monitored by the client applications 15570.

In embodiments, the digital twin dynamic model system 15508 may obtain data from other types of external data sources that are not necessarily industrial-related data sources, but may provide data that can be used as input data for the dynamic models. For example, weather data, news events, social media data, and the like may be collected, crawled, subscribed to, and the like to supplement sensor data, Industrial Internet of Things device data, and/or other data that is used by the dynamic models. In embodiments, the digital twin dynamic model system 15508 may obtain data from a machine vision system. The machine vision system may use video and/or still images to provide measurements (e.g., locations, statuses, and the like) that may be used as inputs by the dynamic models.

In embodiments, the digital twin dynamic model system 15508 may feed this data into one or more of the dynamic models discussed above to obtain one or more outputs. These outputs may include calculated vibration fault level states, vibration severity unit values, vibration characteristics, probability of failure values, probability of downtime values, probability of shutdown values, cost of downtime values, cost of shutdown values, time to failure values, temperature values, pressure values, humidity values, precipitation values, visibility values, air quality values, strain values, stress values, displacement values, velocity values, acceleration values, location values, performance values, financial values, manufacturing KPI values, electrodynamic values, thermodynamic values, fluid flow rate values, and the like. The client application 15570 may then initiate a digital twin visualization event using the results obtained by the digital twin dynamic model system 15508. In embodiments, the visualization may be a heat map visualization.

In embodiments, the digital twin dynamic model system 15508 may receive requests to update one or more properties of digital twins of industrial entities and/or environments such that the digital twins represent the industrial entities and/or environments in real-time. At 159100, the digital twin dynamic model system 15508 receives a request to update one or more properties of one or more of the digital twins of industrial entities and/or environments. For example, the digital twin dynamic model system 15508 may receive the request from a client application 15570 or from another process executed by the digital twin system 15500 (e.g., a predictive maintenance process). The request may indicate the one or more properties and the digital twin or digital twins implicated by the request. In step 159102, the digital twin dynamic model system 15508 determines the one or more digital twins required to fulfill the request and retrieves the one or more required digital twins, including any embedded digital twins, from digital twin datastore 15516. At 159104, digital twin dynamic model system 15508 determines one or more dynamic models required to fulfill the request and retrieves the one or more required dynamic models from digital twin dynamic model store 155102. At 159106, the digital twin dynamic model system 15508 selects one or more sensors from sensor system 15530, data collected from Internet of Things connected devices 15524, and/or other data sources from digital twin I/O system 15504 based on available data sources and the one or more required inputs of the dynamic model(s). In embodiments, the data sources may be defined in the inputs required by the one or more dynamic models or may be selected using a lookup table. At 159108, the digital twin dynamic model system 15508 retrieves the selected data from digital twin I/O system 15504. At 159110, digital twin dynamic model system 15508 runs the dynamic model(s) using the retrieved input data (e.g., vibration sensor data, Industrial Internet of Things device data, and the like) as inputs and determines one or more output values based on the dynamic model(s) and the input data. At 159112, the digital twin dynamic model system 15508 updates the values of one or more properties of the one or more digital twins based on the one or more outputs of the dynamic model(s).

In example embodiments, client application 15570 may be configured to provide a digital representation and/or visualization of the digital twin of an industrial entity. In embodiments, the client application 15570 may include one or more software modules that are executed by one or more server devices. These software modules may be configured to quantify properties of the digital twin, model properties of a digital twin, and/or to visualize digital twin behaviors. In embodiments, these software modules may enable a user to select a particular digital twin behavior visualization for viewing. In embodiments, these software modules may enable a user to select to view a digital twin behavior visualization playback. In some embodiments, the client application 15570 may provide a selected behavior visualization to digital twin dynamic model system 15508.

In embodiments, the digital twin dynamic model system 15508 may receive requests from client application 15570 to update properties of a digital twin in order to enable a digital representation of an industrial entity and/or environment wherein the real-time digital representation is a visualization of the digital twin. In embodiments, a digital twin may be rendered by a computing device, such that a human user can view the digital representations of real-world industrial assets, devices, workers, processes and/or environments. For example, the digital twin may be rendered and outcome to a display device. In embodiments, dynamic model outputs and/or related data may be overlaid on the rendering of the digital twin. In embodiments, dynamic model outputs and/or related information may appear with the rendering of the digital twin in a display interface. In embodiments, the related information may include real-time video footage associated with the real-world entity represented by the digital twin. In embodiments, the related information may include a sum of each of the vibration fault level states in the machine. In embodiments, the related information may be graphical information. In embodiments, the graphical information may depict motion and/or motion as a function of frequency for individual machine components. In embodiments, graphical information may depict motion and/or motion as a function of frequency for individual machine components, wherein a user is enabled to select a view of the graphical information in the x, y, and z dimensions. In embodiments, graphical information may depict motion and/or motion as a function of frequency for individual machine components, wherein the graphical information includes harmonic peaks and peaks. In embodiments, the related information may be cost data, including the cost of downtime per day data, cost of repair data, cost of new part data, cost of new machine data, and the like. In embodiments, related information may be a probability of downtime data, probability of failure data, and the like. In embodiments, related information may be time to failure data.

In embodiments, the related information may be recommendations and/or insights. For example, recommendations or insights received from the cognitive intelligence system related to a machine may appear with the rendering of the digital twin of a machine in a display interface.

In embodiments, clicking, touching, or otherwise interacting with the digital twin rendered in the display interface can allow a user to "drill down" and see underlying subsystems or processes and/or embedded digital twins. For example, in response to a user clicking on a machine bearing rendered in the digital twin of a machine, the display interface can allow a user to drill down and see information related to the bearing, view a 3D visualization of the bearing's vibration, and/or view a digital twin of the bearing.

In embodiments, clicking, touching, or otherwise interacting with information related to the digital twin rendered in the display interface can allow a user to "drill down" and see underlying information.

FIG. 160 illustrates example embodiments of a display interface that renders the digital twin of a dryer centrifuge and other information related to the dryer centrifuge.

In some embodiments, the digital twin may be rendered and output in a virtual reality display. For example, a user may view a 3D rendering of an environment (e.g., using a monitor or a virtual reality headset). The user may also inspect and/or interact with digital twins of industrial entities. In embodiments, a user may view processes being performed with respect to one or more digital twins (e.g., collecting measurements, movements, interactions, inventorying, loading, packing, shipping, and the like). In embodiments, a user may provide input that controls one or more properties of a digital twin via a graphical user interface.

In some embodiments, the digital twin dynamic model system 15508 may receive requests from client application 15570 to update properties of a digital twin in order to enable a digital representation of industrial entities and/or environments wherein the digital representation is a heat map visualization of the digital twin. In embodiments, a platform is provided having heat maps displaying collected data from the sensor system 15530, Internet of Things connected devices 15524, and data outputs from dynamic models 155100 for providing input to a display interface. In embodiments, the heat map interface is provided as an output for digital twin data, such as for handling and providing information for visualization of various sensor data, dynamic model output data, and other data (such as map data, analog sensor data, and other data), such as to another system, such as a mobile device, tablet, dashboard, computer, AR/VR device, or the like. A digital twin representation may be provided in a form factor (e.g., user device, VR-enabled device, AR-enabled device, or the like) suitable for delivering visual input to a user, such as the presentation of a map that includes indicators of levels of analog sensor data, digital sensor data, and output values from the dynamic models (such as data indicating vibration fault level states, vibration severity unit values, probability of downtime values, cost of downtime values, probability of shutdown values, time to failure values, probability of failure values, manufacturing KPIs, temperatures, levels of rotation, vibration characteristics, fluid flow, heating or cooling, pressure, substance concentrations, and many other output values). In embodiments, signals from various sensors or input sources (or selective combinations, permutations, mixes, and the like) as well as data determined by the digital twin dynamic model system 15508 may provide input data to a heat map. Coordinates may include real world location coordinates (such as geo-location or location on a map of an environment), as well as other coordinates, such as time-based coordinates, frequency-based coordinates, or other coordinates that allow for representation of analog sensor signals, digital signals, dynamic model outputs, input source information, and various combinations, in a map-based visualization, such that colors may represent varying levels of input along the relevant dimensions. For example, among many other possibilities, if an industrial machine component is at a critical vibration fault level state, the heat map interface may alert a user by showing the machine component in orange. In the example of a heat map, clicking, touching, or otherwise interacting with the heat map can allow a user to drill down and see underlying sensor, dynamic model outputs, or other input data that is used as an input to the heat map display. In other examples, such as ones where a digital twin is displayed in a VR or AR environment, if an industrial machine component is vibrating outside of normal operation (e.g., at a suboptimal, critical, or alarm vibration fault level), a haptic interface may induce vibration when a user touches a representation of the machine component, or if a machine component is operating in an unsafe manner, a directional sound signal may direct a user's attention toward the machine in digital twin, such as by playing in a particular speaker of a headset or other sound system.

In embodiments, the digital twin dynamic model system 15508 may take a set of ambient environmental data and/or other data and automatically update a set of properties of a digital twin of an industrial entity or facility based on the impact of the environmental data and/or other data in the set of dynamic models 155100 that are used to enable the digital twin. Ambient environmental data may include temperature data, pressure data, humidity data, wind data, rainfall data, tide data, storm surge data, cloud cover data, snowfall data, visibility data, water level data, and the like. Additionally or alternatively, the digital twin dynamic model system 15508 may use a set of environmental data measurements collected by a set of Internet of Things connected devices 15524 disposed in an industrial setting as inputs for the set of dynamic models 155100 that are used to enable the digital twin. For example, digital twin dynamic model system 15508 may feed the dynamic models 155100 data collected, handled or exchanged by Internet of Things connected devices 15524, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of industrial environments. Other examples of Internet of Things connected devices include smart fire alarms, smart security systems, smart air quality monitors, smart/learning thermostats, and smart lighting systems.

FIG. 161 illustrates example embodiments of a method for updating a set of vibration fault level states for a set of bearings in a digital twin of a machine. In this example, a client application 15570, which interfaces with digital twin dynamic model system 15508, may be configured to provide a visualization of the fault level states of the bearings in the digital twin of the machine.

In this example, the digital twin dynamic model system 15508 may receive requests from client application 15570 to update the vibration fault level states of the machine digital twin. At 161200, digital twin dynamic model system 15508 receives a request from client application 15570 to update one or more vibration fault level states of the machine digital twin. Next, in step 161202, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins, such as any embedded motor digital twins and bearing digital twins, and any digital twins that embed the machine digital twin, such as the manufacturing facility digital twin. At 161204, digital twin dynamic model system 15508 determines one or more dynamic models required to fulfill the request and retrieves the one or more required dynamic models from the digital twin dynamic model datastore 155102. At 161206, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the and the one or more required inputs of the dynamic model(s). In the present example, the retrieved dynamic model(s) 155100 may take one or more vibration sensor measurements from vibration sensors 15536 as inputs to the dynamic models. In embodiments, vibration sensors 15536 may be optical vibration sensors, single axis vibration sensors, tri-axial vibration sensors, and the like. At 161208, digital twin dynamic model system 15508 retrieves one or more measurements from each of the selected data sources from the digital twin I/O system 15504. Next, At 161210, digital twin dynamic model system 15508 runs the dynamic model(s), using the retrieved vibration sensor measurements as inputs, and calculates one or more outputs that represent bearing vibration fault level states. Next, At 161212, the digital twin dynamic model system 15508 updates one or more bearing fault level states of the manufacturing facility digital twin, machine digital twin, motor digital twin, and/or bearing digital twins based on the one or more outputs of the dynamic model(s). The client application 15570 may obtain vibration fault level states of the bearings and may display the obtained vibration fault level state associated with each bearing and/or display colors associated with fault level severity (e.g., red for alarm, orange for critical, yellow for suboptimal, green for normal operation) in the rendering of one or more of the digital twins on a display interface.

In another example, a client application 15570 may be an augmented reality application. In some embodiments of this example, the client application 15570 may obtain vibration fault level states of bearings in a field of view of an AR-enabled device (e.g., smart glasses) hosting the client application from the digital twin of the industrial environment (e.g., via an API of the digital twin system 15500) and may display the obtained vibration fault level states on the display of the AR-enabled device, such that the vibration fault level state displayed corresponds to the location in the field of view of the AR-enabled device. In this way, a vibration fault level state may be displayed even if there are no vibration sensors located within the field of view of the AR-enabled device.

FIG. 155 illustrates example embodiments of a method for updating a set of vibration severity unit values of bearings in a digital twin of a machine. Vibration severity units may be measured as displacement, velocity, and acceleration.

In this example, client application 15570 that interfaces with the digital twin dynamic model system 15508 may be configured to provide a visualization of the three-dimensional vibration characteristics of bearings in a digital twin of a machine.

In this example, the digital twin dynamic model system 15508 may receive requests from client application 15570 to update the vibration severity unit values for bearings in the digital twin of a machine. At 155300, digital twin dynamic model system 15508 receives a request from client application 15570 to update one or more vibration severity unit value(s) of the manufacturing facility digital twin. Next, in step 155302, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the machine and any embedded digital twins (e.g., digital twins of bearings and other components). At 155304, digital twin dynamic model system 15508 determines one or more dynamic models required to fulfill the request and retrieves the one or more required dynamic models from dynamic model datastore 155102. At 155306, the digital twin dynamic model system 15508 selects dynamic model input data sources (e.g., one or more sensors from sensor system 15530, data from Internet of Things connected devices 15524, and any other suitable data) via digital twin I/O system 15504 based on available data sources (e.g., available sensors from a set of sensors in sensor system 15530) and the one or more required inputs of the dynamic model(s). In the present example, the retrieved dynamic models may be configured to take one or more vibration sensor measurements as inputs and provide severity unit values for bearings in the machine. At 155308, digital twin dynamic model system 15508 retrieves one or more measurements from each of the selected sensors. In the present example, the digital twin dynamic model system 15508 retrieves measurements from vibration sensors 15536 via digital twin I/O system 15504. At 155310, digital twin dynamic model system 15508 runs the dynamic model(s) using the retrieved vibration measurements as inputs and calculates one or more output values that represent vibration severity unit values for bearings in the machine. Next, At 155312, the digital twin dynamic model system 15508 updates one or more vibration severity unit values of the bearings in the machine digital twin and all other embedded digital twins or digital twins that embed the machine digital twin based on the one or more values output by the dynamic model(s).

FIG. 163 illustrates example embodiments of a method for updating a set of probability of failure values for machine components in the digital twin of a machine.

In this example, the digital twin dynamic model system 15508 may receive requests from client application 15570 to update the probability of failure values for components in a machine digital twin. At 163400, digital twin dynamic model system 15508 receives a request from client application 15570 to update one or more probability of failure value(s) of the machine digital twin, any embedded component digital twins, and any digital twins that embed the machine digital twin such as a manufacturing facility digital twin. Next, in step 163402, digital twin dynamic model system 15508 determines the one or more digital twins required to fulfill the request and retrieves the one or more required digital twins. In this example, the digital twin dynamic model system 15508 may retrieve the digital twin of the manufacturing facility, the digital twin of the machine, and the digital twins of machine components from digital twin datastore 15516. At 163404, digital twin dynamic model system 15508 determines one or more dynamic models required to fulfill the request and retrieves the one or more required dynamic models from dynamic model datastore 155102. At 163406, the digital twin dynamic model system 15508 selects, via digital twin I/O system 15504, dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s). In the present example, the retrieved dynamic models may take one or more vibration measurements from vibration sensors 15536 and historical failure data as dynamic model inputs and output probability of failure values for the machine components in the digital twin of the machine. At 163408, digital twin dynamic model system 15508 retrieves data from each of the selected sensors and/or Internet of Things connected devices via digital twin I/O system 15504. At 163410, digital twin dynamic model system 15508 runs the dynamic model(s) using the retrieved vibration data and historical failure data as inputs and calculates one or more outputs that represent probability of failure values for bearings in the machine digital twin. Next, At 163412, the digital twin dynamic model system 15508 updates one or more probability of failure values of the bearings in the machine digital twin, all embedded digital twins, and all digital twins that embed the machine digital twin based on the output of the dynamic model(s).

FIG. 164 illustrates example embodiments of a method for updating a set of probability of downtime for machines in the digital twin of a manufacturing facility.

In this example, client application 15570, which interfaces with the digital twin dynamic model system 15508, may be configured to provide a visualization of the probability of downtime values of a manufacturing facility in the digital twin of the manufacturing facility.

In this example, the digital twin dynamic model system 15508 may receive requests from client application 15570 to assign probability of downtime values to machines in a manufacturing facility digital twin. At 164500, digital twin dynamic model system 15508 receives a request from client application 15570 to update one or more probability of downtime values of machines in the manufacturing facility digital twin and any embedded digital twins such as the individual machine digital twins. Next, in step 164502, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the manufacturing facility and any embedded digital twins from digital twin datastore 15516. At 164504, digital twin dynamic model system 15508 determines one or more dynamic models required to fulfill the request and retrieves the one or more required dynamic models from dynamic model datastore 155102. At 164506, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the dynamic model(s) may be configured to take vibration measurements from vibration sensors and historical downtime data as inputs and output probability of downtime values for different machines throughout the manufacturing facility. At 164508, digital twin dynamic model system 15508 retrieves one or more measurements from each of the selected sensors via digital twin I/O system 15504. At 164510, digital twin dynamic model system 15508 runs the dynamic model(s) using the retrieved vibration measurements and historical downtime data as inputs and calculates one or more outputs that represent probability of downtime values for machines in the manufacturing facility. Next, At 164512, the digital twin dynamic model system 15508 updates one or more probability of downtime values for machines in the manufacturing facility digital twins and all embedded digital twins based on the one or more outputs of the dynamic models.

FIG. 165 illustrates example embodiments of a method for updating one or more probability of shutdown values in the digital twin of an enterprise having a set of manufacturing facilities.

In the present example, the digital twin dynamic model system 15508 may receive requests from client application 15570 to update the probability of shutdown values for the set of manufacturing facilities within an enterprise digital twin. At 165600, digital twin dynamic model system 15508 receives a request from client application 15570 to update one or more probability of shutdown values of the enterprise digital twin and any embedded digital twins. Next, in step 165602, digital twin dynamic model system 15508 determines the one or more digital twins required to fulfill the request and retrieves the one or more required digital twins from digital twin datastore 15516. In this example, the digital twin dynamic model system 15508 may retrieve the digital twin of the enterprise and any embedded digital twins. At 165604, digital twin dynamic model system 15508 determines one or more dynamic models required to fulfill the request and retrieves the one or more required dynamic models from dynamic model datastore 155102. At 165606, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic models may be configured to take one or more vibration measurements from vibration sensors 15536 and/or other suitable data as inputs and output probability of shutdown values for each manufacturing entity in the enterprise digital twin. At 165608, digital twin dynamic model system 15508 retrieves one or more vibration measurements from each of the selected vibration sensors 15536 from digital twin I/O system 15504. At 165610, digital twin dynamic model system 15508 runs the dynamic model(s) using the retrieved vibration measurements and historical shut down data as inputs and calculates one or more outputs that represent probability of shutdown values for manufacturing facilities within the enterprise digital twin. Next, At 165612, the digital twin dynamic model system 15508 updates one or more probability of shutdown values of the enterprise digital twin and all embedded digital twins based on the one or more outputs of the dynamic model(s).

FIG. 159 illustrates example embodiments of a method for updating a set of cost of downtime values in machines in the digital twin of a manufacturing facility.

In the present example, the digital twin dynamic model system 15508 may receive requests from a client application 15570 to populate real-time cost of downtime values associated with machines in a manufacturing facility digital twin. At 159700, digital twin dynamic model system 15508 receives a request from the client application 15570 to update one or more cost of downtime values of the manufacturing facility digital twin and any embedded digital twins (e.g., machines, machine parts, and the like) from the client application 15570. Next, in step 159702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 159704, digital twin dynamic model system 15508 determines one or more dynamic models required to fulfill the request and retrieves the one or more required dynamic models from dynamic model datastore 155102. At 159706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take historical downtime data and operational data as inputs and output data representing cost of downtime per day for machines in the manufacturing facility. At 159708, digital twin dynamic model system 15508 retrieves historical downtime data and operational data from digital twin I/O system 15504. At 159710, digital twin dynamic model system 15508 runs the dynamic model(s) using the retrieved data as input and calculates one or more outputs that represent cost of downtime per day for machines in the manufacturing facility. Next, At 159712, the digital twin dynamic model system 15508 updates one or more cost of downtime values of the manufacturing facility digital twins and machine digital twins based on the one or more outputs of the dynamic model(s).

FIG. 160 illustrates example embodiments of a method for updating a set of manufacturing KPI values in the digital twin of a manufacturing facility. In embodiments, the manufacturing KPI is selected from the set of uptime, capacity utilization, on standard operating efficiency, overall operating efficiency, overall equipment effectiveness, machine downtime, unscheduled downtime, machine set up time, inventory turns, inventory accuracy, quality (e.g., percent defective), first pass yield, rework, scrap, failed audits, on-time delivery, customer returns, training hours, employee turnover, reportable health & safety incidents, revenue per employee, and profit per employee, schedule attainment, total cycle time, throughput, changeover time, yield, planned maintenance percentage, availability, and customer return rate.

In the present example, the digital twin dynamic model system 15508 may receive requests from a client application 15570 to populate real-time manufacturing KPI values in a manufacturing facility digital twin. At 159700, digital twin dynamic model system 15508 receives a request from the client application 15570 to update one or more KPI values of the manufacturing facility digital twin and any embedded digital twins (e.g., machines, machine parts, and the like) from the client application 15570. Next, in step 159702, the digital twin dynamic model system 15508 determines the one or more digital twins required to fulfill the request and retrieves the one or more required digital twins. In this example, the digital twin dynamic model system 15508 may retrieve the digital twins of the manufacturing facility, the machines, the machine parts, and any other embedded digital twins from digital twin datastore 15516. At 159704, digital twin dynamic model system 15508 determines one or more dynamic models required to fulfill the request and retrieves the one or more required dynamic models from dynamic model datastore 155102. At 159706, the digital twin dynamic model system 15508 selects dynamic model input data sources (e.g., one or more sensors from sensor system 15530, data from Internet of Things connected devices 15524, and any other suitable data) based on available data sources (e.g., available sensors from a set of sensors in sensor system 15530) and the and the one or more required inputs of the dynamic model(s) via digital twin I/O system 15504. In the present example, the retrieved dynamic model(s) may be configured to take one or more vibration measurements obtained from vibration sensors 15536 and other operational data as inputs and output one or more manufacturing KPIs for the facility. At 167708, digital twin dynamic model system 15508 retrieves one or more vibration measurements from each of the selected vibration sensors 15536 and operational data from digital twin I/O system 15504. At 159710, digital twin dynamic model system 15508 runs the dynamic model(s) using the retrieved vibration measurements and operational data as inputs and calculates one or more outputs that represent manufacturing KPIs for the manufacturing facility. Next, At 159712, the digital twin dynamic model system 15508 updates one or more KPI values of the manufacturing facility digital twins, machine digital twins, machine part digital twins, and all other embedded digital twins based on the one or more outputs of the dynamic model(s).

With the proliferation of vibration sensors and other Industrial Internet of Things (IIoT) sensors, there are vast amounts of data available relating to industrial environments. This data is useful in predicting the need for maintenance and for classifying potential issues in the industrial environments. There are, however, many unexplored uses for vibration sensor data and other IIoT sensor data that can improve the operation and uptime of the industrial environments and provide industrial entities with agility in responding to problems before the problems become catastrophic.

Industrial enterprises that rely on industrial experts struggle to capture the knowledge of these experts when they move on to another enterprise or leave the workforce. There exists a need in the art to capture industrial expertise and to use the captured industrial expertise in guiding newer workers or mobile electronic industrial entities to perform industrial-related tasks.

A knowledge distribution process and related technologies now will be described more fully hereinafter with reference to the accompanying drawings, in which illustrative embodiments are shown. The knowledge distribution process and technologies may, however, be embodied in many different forms and should not be construed as limited to the embodiments set forth herein; rather, these embodiments are provided so that this disclosure will be thorough and complete, and will fully convey the scope of the disclosure and inventions to those skilled in the art. The knowledge distribution process may use a knowledge distribution platform or system that utilizes blockchain technology for storing digital knowledge and providing convenient and secure control of the digital knowledge.

Where digital knowledge may be cryptographically secured, there can be a number of practical obstacles to the sharing of knowledge, such as the absence of trust between parties that could potentially benefit from sharing of the knowledge. For example, a manufacturer might benefit from having a supplier access trade secrets of the manufacturer in order to make components or materials on behalf of the manufacturer, but sharing the trade secrets creates a risk that the supplier may use the trade secrets on its own behalf or on behalf of competitors. Similarly, an engineer may be willing to share valuable code or instruction sets with others but be fearful of the misuse of that code. A need exists for a digital knowledge distribution system that facilitates orchestration of the sharing of knowledge by providing a high degree of control over the extent to which counterparties can access shared knowledge.

Even where knowledge is secure and well-controlled, some types of knowledge are so sensitive that an owner may be unwilling to share the entire set of knowledge with a single counterparty. For example, a proprietary process may be divided among different suppliers in order to keep any one supplier from deducing or reverse engineering the entire process. However, dividing knowledge presents operational challenges, as the owner may orchestrate a series of secure interactions with all involved parties in order to assure that the full set of knowledge may be maintained and accurately implemented. A need exists for a digital knowledge distribution system that facilitates handling and control of subsets of knowledge, including automated handling of aggregation of knowledge, or related outputs, that result from division of knowledge subsets.

Referring to FIG. 168, a knowledge distribution system 16802 is configured to facilitate management of digital knowledge 16804 by one or more users via a distributed ledger 16808. The digital knowledge 16804 may include any suitable knowledge that is conveyable from one party to another, such as in a digital format. Users and/or parties may include one or more knowledge providers 16806 and/or one or more knowledge recipients 16818. The knowledge providers 16806 are parties that provide knowledge to be managed via the knowledge distribution system 16802, such as by uploading one or more instances of the digital knowledge 16804 to the knowledge distribution system 16802 and/or the distributed ledger 16808. Uploading one or more instances of the digital knowledge 16804 and/or hosting one or more instances of the digital knowledge 16804 on the distributed ledger 16808 may include uploading an instance of the digital knowledge 16804 itself to the distributed ledger 16808 (e.g., which may be tokenized, contained in the smart contract, and/or stored in an associated database) and/or providing a reference to an accessible location of the instance of the digital knowledge 16804 and any other information required to retrieve the digital knowledge from the accessible location. When reference is made to receiving digital knowledge 16804, the digital knowledge 16804 itself or a reference thereto may be received. The term knowledge recipients 16818 may refer to parties that receive knowledge from the knowledge providers 16806 via the knowledge distribution system 16802 (including via reference or link to digital knowledge 16804) and/or via a distributed ledger 16808 that stores digital knowledge 16804. In some embodiments, the knowledge distribution system 16802 may facilitate management of digital knowledge 16804 by facilitating establishment of a chain of work, possession, and/or title of one or more instances of digital knowledge, such as by serving as a log of ownership of an instance of knowledge. The log of ownership may include a chain of log entries including an indication of a set of owners and/or contributors. For example, in some embodiments the knowledge distribution system 16802 may facilitate establishment of a chain of work, a chain of possession, and/or a chain of title corresponding to a 3D-printing instruction set for 3D printing an object (e.g., a custom-designed part, a replacement part, a toy, a medical device, a tool, or the like). In some embodiments, the knowledge distribution system 16802 may facilitate establishment of a seller database where the schematic may be stored prior to one or more of sale, transfer of the schematic to a buyer database, entry of a serial number of the custom part into a clause of a smart contract 16840, and printing of the custom part by a 3D printer owned by a buyer.

In some embodiments the knowledge distribution system 16802 may facilitate management of digital knowledge 16804 by managing aggregation of instances of digital knowledge 16804, such as where component instances of digital knowledge 16804 are aggregated to form larger instances of digital knowledge (e.g., where chapter instances are concatenated to form book instances, where component instances are linked schematically to form a system, where element instances are linked diagrammatically to generate a workflow, where partial instances are coupled to form a whole instance (e.g., the necessary parts of a formula), where related instances are topically linked to form a cluster, and via many other forms of aggregation).

In some embodiments, the knowledge distribution system 16802 may facilitate management of digital knowledge 16804 by facilitating verification of one or more sources of the digital knowledge and/or providing a chain of origination for a digital or physical item by virtue of related knowledge. For example, in embodiments, the knowledge distribution system 16802 may log a digital signature of a steel manufacturer in a distributed ledger that certifies a quality grade of steel provided by the steel manufacturer to a factory owner and may link the digital signature to serial numbers of each part produced by a factory owned by the factory owner that used the steel provided by the steel manufacturer.

In some embodiments, the knowledge distribution system 16802 may facilitate control of digital knowledge 16804 by facilitating collaboration of a plurality of knowledge providers 16806 such that information related to one or more instances of digital knowledge from one or more of disparate parties, disparate knowledge providers 16806, and disparate distributed ledgers 16808 may be tracked and/or combined into one or more consolidated distributed ledgers.

In some embodiments, instances of the digital knowledge 16804 may include, for example, instruction sets such as process steps and other methodologies in food production, transportation, executable algorithmic logic such as computer programs, a firmware program, an instructions set for a field-programmable gate array (FPGA), serverless code logic, a crystal fabrication system/process, a polymer production process, a chemical synthesis process, a biological production process, part schematics, and/or production records (e.g., production records of aircraft parts, spaceship parts, nuclear engine parts, etc.), a process and/or instruction set for semiconductor fabrication such as silicon etching and/or doping, an instruction set for a 3D printer such as for printing a medical device, an automobile part, an airplane part, a piece of furniture or component thereof, a replacement part for an industrial robot or machine, algorithmic logic such as an instruction set for use in an application, AI logic and/or definitions, machine learning logic and/or definitions, cryptography logic, serverless code logic, trade secrets and/or other intellectual property such as know-how, patented material, and works of authorship, food preparation instructions (e.g., for industrial food preparation), coating process instructions, biological production process instructions, chemical synthesis instructions, polymer production instructions, smart contract instructions, data sets and/or sensor information defining and/or populating a set of digital twins (such as digital twins that embody digital knowledge about one or more physical entities, including knowledge about configurations, operating modes, instruction sets, capabilities, defects, performance parameters, and many others), and/or any other suitable type of digitally transmittable knowledge. In these embodiments, the instruction sets may be consumed/leveraged by a computing device, a special purpose device, or a combination of devices (e.g., factory equipment). In some embodiments, instances of the digital knowledge 16804 may include personal and/or professional knowledge relating to one or more organizations and/or individuals, such as a professional resume and/or professional history tracking information. In some embodiments, the personal and/or professional knowledge may include one or more records of professional credentials such as academic degrees and/or certificates. In some embodiments, the personal and/or professional knowledge may include one or more verifications of professional positions held by the one or more individuals. In some embodiments, the personal and/or professional knowledge may include professional feedback for and/or verification of work performed for and/or by one or more third parties. The personal and/or professional knowledge may include personal and/or business financial history, personal life achievements as verified by one or more third parties. The knowledge provider 16806 may be any party that at least partially provides one or more instances of the digital knowledge 16804, such as a manufacturer, a seller, a customer, a wholesaler, a user, a manager, a notary, a factory owner, a maintenance worker, or any other suitable provider of the digital knowledge 16804.

In embodiments, the distributed ledger 16808 may be any suitable type of electronic ledger 16808, such as a blockchain (e.g., Hyperledger, Solidity, Ethereum, and the like). The distributed ledger 16808 may be centralized, decentralized, or a hybrid configuration where the knowledge distribution system 16802 stores a copy of a distributed ledger 16808 in addition to any number of participant nodes 16916 that store copies of the distributed ledger 16808. When referring to the distributed ledger 16808, the term "distributed ledger" (and/or any logs, records, smart contracts, blocks, tokens, and/or data stored thereon) may refer to a specific instance of a copy of the distributed ledger 16808 (and/or any logs, records, smart contracts, blocks, tokens, and/or data stored thereon) and/or the collection of local copies of the distributed ledger 16808-L stored across any number of nodes (which may include the knowledge distribution system 16802), unless specifically indicated otherwise.

In some embodiments, a private network of authorized participants, such as one or more of the knowledge providers and/or nodes, may establish cryptography-based consensus on one or more items, such that the knowledge distribution system 16802 may provide security, transparency, auditability, immutability, and non-repudiation to transactions for digital knowledge. In some embodiments, a trusted authority (e.g., the knowledge distribution system 16802 or another suitable authority) may issue private key and public key pairs to each registered user of the knowledge distribution system 16802. The private key and public key pairs may be used to encrypt and decrypt data (e.g., messages, files, documents, etc.) and/or to perform operations with respect to the distributed ledger 16808. In some embodiments, the knowledge distribution system 16802 (or another trusted authority) may provide two or more levels of access to users. In some embodiments, the knowledge distribution system 16802 may define one or more classes of users, where each of the classes of users is granted a respective level of access. In some of these embodiments, the knowledge distribution system 16802 may issue one or more access keys to one or more classes of users, where the one or more access keys each correspond to a respective level of access, thereby providing users of different levels of access via their respective issued access keys. In embodiments, possession of certain access keys may be used to determine a level of access to the distributed ledger 16808. For example, in some embodiments, a first class of users may be granted full viewing access of a block, while a second class of users may be granted both viewing access of blocks and an ability to verify and/or certify one or more instances of digital knowledge contained within a block, and while a third class of users may be granted viewing access of blocks, an ability to verify and/or certify one or more instances of digital knowledge contained within a block, and an ability to modify the one or more instances of digital knowledge contained within the block. In some embodiments, a class of users may be verified as being a legitimate user of the distributed ledger 16808 in one or more roles and allowed related permissions with respect to the distributed ledger and content stored therein. A user may be verified, for example, as a bona fide knowledge provider 16806 that uses a knowledge provider device 16890, knowledge recipient 16818 that uses a knowledge recipient device 16894, and/or crowdsourcer 16836 that uses a crowdsourcer device 16892. There may be any number of each device 16890, 16892, 16894. As shown in FIG. 168, there is one knowledge provider device 16890, two crowdsourcer devices 16892, and one knowledge recipient device 16894. In other examples, as it is understood, there may be one, two, three, or more of any device type 16890, 16892, 16894, in any combination. In other examples, there may be one of each device type (e.g., one knowledge provider device 16890, one crowdsourcer device 16892, and one knowledge recipient device 16894). In other embodiments, these devices 16890, 16892, 16894 may be implemented as one or more computing devices and/or server devices (e.g., as part of a server farm).

In some embodiments, the knowledge distribution system 16802 may include a ledger management system 16910. In some embodiments, the ledger management system 16910 manages one or more distributed ledgers (also referred to as "ledgers"). In some embodiments, the ledger management system 16910 may instantiate a distributed ledger for a particular knowledge provider 16806 or group of knowledge providers 16806, such as by instantiating a distributed ledger 16808 that stores instances of digital knowledge 16804 provided by the knowledge provider 16806 or group of knowledge providers 16806. The knowledge distribution system 16802 may allow only the particular knowledge provider 16806 or particular group of knowledge providers 16806 to host instances of digital knowledge 16804 (e.g., by using knowledge provider device 16890) on the related distributed ledger 16808 and/or for each instance of digital knowledge 16804, such that each distributed ledger 16808 is specific to a respective knowledge provider 16806 and/or an instance of digital knowledge 16804. In some embodiments, the ledger management system 16910 may instantiate a plurality of distributed ledgers 16808, one or more of the distributed ledgers 16808 being configured to facilitate hosting, sharing, buying, selling, licensing, or otherwise managing a category of digital knowledge 16804. Categories of digital knowledge may be related to, for example, one or more industries such as automotive and/or financial, or one or more types of digital knowledge, such as 3D printing schematics. In some embodiments, the ledger management system 16910 may maintain a distributed ledger that facilitates management of some or all of the instances of digital knowledge 16804 and/or the knowledge providers 16806 for which related data is stored by the knowledge distribution system 16802.

In some embodiments, a distributed ledger 16808 is any suitable type of blockchain. Any other suitable types of distributed ledgers may be used, however, without departing from the scope of the disclosure. The distributed ledger may be public or private. In embodiments, where the distributed ledger is private, reading from the ledger and/or validation privileges by a user such as the knowledge provider 16806 (e.g., using knowledge provider device 16890) may be restricted to invitees, users with one or more accounts/passwords, or by any other suitable method of restricting access to the distributed ledger 16808. In some embodiments, the distributed ledger 16808 may be at least partially centralized, such that a plurality of nodes of the distributed ledger is stored by the knowledge distribution system 16802. In some embodiments, the distributed ledgers are federated distributed ledgers, as the distributed ledgers may be stored on pre-selected or pre-approved nodes that are associated with the parties to a management of digital knowledge 16804 via the knowledge distribution system 16802. The techniques described herein may be applied, however, to publicly distributed ledgers as well. In a publicly distributed ledger, any suitably configured computing device (personal computers, user devices, servers) or set of devices (e.g., a server farm) may act as a node 16916 and may store a local copy of a distributed ledger 16808-L, whether the owner of the node otherwise participates in the transactions facilitated by the knowledge distribution system 16802. In these embodiments, such nodes 16916 may add validate/deny new blocks, save new blocks to the distributed ledger 16808 (if validated) to maintain a full copy (or nearly full copy) of the transaction history relating to the distributed ledger 16808, and broadcast the transaction history to other participating nodes 16916.

In some embodiments, the ledger management system 16910 (and/or the collection of participant nodes 16916) may be configured to leverage a distributed ledger 16808 to create an immutable log establishing of a chain of work, possession, and/or title of one or more instances of digital knowledge 16804, establishing verification of 16810 may utilize a distributed ledger to manage a set of permission keys that provide access to one or more instances of the digital knowledge 16804 and/or services associated with the knowledge distribution system 16802. In some embodiments, the distributed ledger 16808 provides provable access to the digital knowledge 16804, such as by one or more cryptographic proofs and/or techniques. In some embodiments, the distributed ledger 16808 may provide provable access to the digital knowledge 16804 by one or more zero-knowledge proof techniques. In some embodiments, the ledger management system 16910 may manage the distributed ledger to facilitate cooperation and/or collaboration between two or more knowledge providers 16806 with regard to one or more instances of digital knowledge 16804.

FIG. 169 illustrates an exemplary embodiment of the distributed ledger 16808, the distributed ledger 16808 being distributed over a ledger network 16970. The ledger network 16970 may include the distributed ledger 16808 and a set of node computing devices 16916-1, 16916-2, 16916-3, 16916-N that communicate via one or more communication networks 16814. In some embodiments, the communication network 16814 may include the Internet, private networks, cellular networks, and/or the like. In embodiments, the nodes 16916 may all host a copy of the distributed ledger 16808 (or a portion thereof). For example, the ledger network 16970 may include a first node 16916-1, a second node 16916-2, a third node 16916-3 . . . and an Nth node 16916-N that communicate with the knowledge distribution system 16802 and with other nodes 16916 in the ledger network 16970. In some embodiments, the knowledge distribution system 16802 is configured to execute the ledger management system 16910 and may store and manage a local copy of a distributed ledger 16808 that is used in connection with facilitating management of one or more instances of the digital knowledge 16804 via the knowledge distribution system 16802. In some embodiments, the knowledge distribution system 16802 (or the ledger management system 16910 executed thereon) may also be thought of and referred to as a node of the ledger network 16970. In some embodiments, the ledger management system 16910 may also generate and assign private key and public key pairs to users such as one or more of the knowledge providers 16806 and/or one or more knowledge recipients 16818 of the digital knowledge 16804 (also referred to as "knowledge recipients") and/or to each node 16916 in the ledger network 16970, such that the private key and public key pairs are used to encrypt data transmitted between nodes 16916 in the ledger network 16970.

In some embodiments, each of the nodes 16916 of the ledger network 16970 (other than the knowledge distribution system 16802) may be a computing device or a set of connected computing devices that are associated with the knowledge providers 16806 and/or knowledge recipients 16818. In some embodiments, the nodes 16916 may include computing devices of parties that are not involved in the providing or receipt of knowledge (e.g., parties that are associated with neither the knowledge providers 16806 nor any of the knowledge recipients 16818). In some embodiments, each of the nodes 16916 may store a respective local copy 16808-L of the distributed ledger 16808. In some embodiments, one or more nodes may store a partial copy of the distributed ledger 16808. In some embodiments, each of the nodes 16916, 16916-1, 16916-2, 16916-3, 16916-N may execute a respective agent 16920, 16920-1, 16920-2, 16920-3, 16920-N. An agent 16920 may be configured to perform one or more of managing the local copy 16808-L of the distributed ledger 16808 associated with the node 16916 that executed the agent 16920, helping verify blocks that were previously stored on the ledger 16808, helping verify requests from other nodes 16916 to store new blocks on the ledger 16808, requesting permission to perform operations relating to the digital knowledge or management thereof on behalf of a user associated with the node 16916 on which the agent resides, and/or facilitating collaboration between one or more of the knowledge providers 16806 and/or one or more of the knowledge recipients 16818 (e.g., using knowledge provider device(s) 16890 and/or knowledge recipient device(s) 16894, respectively), such as by assisting with validation and/or transfer of one or more instances of the digital knowledge 16804 and/or executing one or more clauses of one or more smart contracts 16840. It is understood that nodes may perform additional or alternative tasks without departing from the scope of the disclosure.

In some embodiments, a knowledge recipient 16818 may receive one or more in 16894 may be any device that is configured to receive and/or use the digital knowledge 16804 from the distributed ledger 16808, such as a computing device, and/or may be devices for using the digital knowledge 16804, such as a 3D printer, a manufacturing device or system, and the like. In some scenarios, knowledge recipient 16818 may employ a plurality of knowledge recipient devices 16894, such as a server or computing device configured to download one or more instances of digital knowledge 16804 from the distributed ledger 16808 and transmit the one or more instances of digital knowledge to a 3D printer, a factory machine, a manufacturing system, or some other suitable device for using the one or more instances of the digital knowledge 16804. For example, a knowledge provider 16806 may upload a link (e.g., using a knowledge provider device 16890) of a computer-aided design (CAD) file of a 3D printable airplane part to the distributed ledger 16808. In embodiments, the knowledge provider 16806 may use e.g., the knowledge provider device 16890 to define or otherwise provide a smart contract that governs the use of the digital knowledge (e.g., the design file for the airplane part), including a cost of a use of the CAD file of the airplane part. A knowledge recipient 16818 may transfer funds (e.g., using knowledge recipient device 16894) to the knowledge provider 16806 (e.g., knowledge provider device 16890) (e.g., via the smart contract) in exchange for access to the CAD file via the distributed ledger 16808. A knowledge recipient device 16894 may then download the CAD file, which may then be used to 3D print the part. For example, the knowledge recipient device 16894 may be a business computer in communication with a 3D printer or a smart 3D printer itself. In the former scenario, the business computer may transfer the CAD file to the 3D printer. Upon receiving the CAD file, the 3D printer may 3D print the airplane part. In some embodiments, the digital knowledge itself (e.g., the CAD file) may be contained in the smart contract, such that the smart contract provides the digital knowledge to the knowledge recipient device 16894 upon verifying that the knowledge recipient 16818 has satisfied the conditions of release of the digital knowledge 16804 (e.g., deposited a requisite amount of currency). In some embodiments, each time that an instance of knowledge is used by a knowledge recipient 16818, a smart contract, the knowledge distribution system 16802, an agent 16920, and/or the knowledge recipient device 16894 may update the distributed ledger 16808 with a block indicating that the knowledge recipient used the instance of digital knowledge 16804.

In some embodiments, the knowledge distribution system 16802 may be configured to facilitate participation in management of digital knowledge 16804 by one or more crowdsourcers 16836, such as by allowing a crowdsourcer 16836 to verify one or more aspects of an instance of digital knowledge 16804 (e.g., using crowdsourcer device 16892). In embodiments, a crowdsourcer 16836 may be granted crowdsourcing permissions, thereby allowing the crowdsourcer 16836 to view/inspect the digital knowledge and to provide a verification vote 16926 and/or opinion. In embodiments, non-limiting examples of crowdsourcing permissions may include one or more of reviewing an instance of digital knowledge 16804, signing an instance of digital knowledge 16804, verifying an instance of digital knowledge 16804, and the like. Examples of crowdsourcers 16836 include certifying entities, domain experts, customers, manufacturers, wholesalers, and any other suitable party capable of verifying an instance of digital knowledge. In embodiments, certifying entities or domain experts may certify an instance of digital knowledge 16804 as being authentic, accurate, and/or reliable, and/or as coming from an authentic, accurate, and/or reliable source. In embodiments, customers may review an instance of digital knowledge 16804, such as to indicate that the digital knowledge 16804 is in working order and/or of expected quality. In embodiments, manufacturers and/or wholesalers may sign an instance of digital knowledge 16804, such as by applying a serial number to a piece of digital knowledge 16804 before the piece of digital knowledge is transmittable to a knowledge recipient 16818 (e.g., via knowledge recipient device 16894). Certifications, reviews, signatures, and/or any other validation indicia made by crowdsourcers 16836 may be recorded in the distributed ledger 16808, such as by adding one or more new blocks

16922 to the distributed ledger 16808 that indicate the certification, review, signature, or other validation indicia. In some embodiments, the new blocks 16922 may include data related to the certifications, reviews, signatures, and/or other validation indicia made by the one or more crowdsourcers 16836 (e.g., an identifier of the crowdsources, a timestamp, a location, and/or the like), e.g., using crowdsourcer devices 16892. In some examples, the knowledge distribution system 16802 may be paired with a crowdsourcing system (e.g., crowdsource devices 16892). Specifically, in examples, the crowdsourcing system (e.g., crowdsource devices 16892) may communicate with and engage with the smart contract 16840 such that upon crowdsourcing an element of the digital knowledge 16804 via the smart contract 16840, the digital knowledge 16804 may be embodied (e.g., recorded) in the distributed ledger 16808. The knowledge distribution system 16802 may use the smart contract 16840 to facilitate management of the digital knowledge 16804, such as by allowing the smart contract 16840 and crowdsourcers 16836 to verify (and/or contribute to) one or more aspects of an instance of digital knowledge 16804. For example, a software developer may provide a crowdsource request for a module or function in the smart contract 16840. This crowdsource request may be embedded in open source code as a request for a code element (e.g., where a first supplier of working code may get a share of proceeds (or a credit, or a token, etc.)) of a product. For this example, crowdsourcers 16836 may use the crowdsourcing system (e.g., crowdsource devices 16892) to respond to the crowdsource request by viewing/inspecting the digital knowledge (e.g., open source code) and may provide collaboration in the form of verifications, opinions, corrections, and/or contributions to the open source code which may relate to improvements to the open source code (e.g., improve accuracy and/or reliability of software). These verifications, opinions, corrections, and/or contributions indicia provided by the crowdsourcers 16836 may be recorded in the distributed ledger 16808 by adding one or more new blocks 16922 to the distributed ledger 16808 that indicate the indicia. The crowdsourcers 16836 may be compensated (e.g., via the smart contract 16840) based on their percentage of contribution to the open source code such that the original software developer may share the proceeds (or credits, or tokens, etc.) of the software product with the crowdsources. The percentage contribution may be based on the amount of code written and/or the impact of each crowdsourcer's contribution on the resulting open source code's functionality.

In some embodiments, the digital knowledge 16804 may be tokenized (e.g., at least partially converted to/wrapped in a knowledge token 17038). In embodiments, tokenizing the digital knowledge 16804 may include wrapping the digital knowledge into a knowledge token 17038 and/or wrapping access, licensing, ownership, and/or other suitable rights related to the digital knowledge 16804 such that the access, licensing, ownership and/or other suitable rights managed by one or more of the knowledge tokens 17038. By tokenizing digital knowledge 16804, the digital knowledge 16804 may reside in and be distributed via a distributed ledger 16808 and smart contracts 16840. In some embodiments, the knowledge distribution system 16802 may define permissions and/or operations associated with the knowledge tokens 17038. For example, the knowledge token 17038 may allow the tokenized digital knowledge 16804 to be viewed, edited, copied, bought, sold, and/or licensed based on permissions set at a time of tokenization by the knowledge distribution system 16802. In embodiments, the knowledge distribution system 16802 may provide for orchestration of a marketplace or exchange for digital knowledge 16804, such as where bodies or instances of digital knowledge 16804 may be exchanged, such as, without limitation, through sets of knowledge tokens 17038 that are optionally governed by smart contracts that may be configured by a host of a knowledge exchange or marketplace and/or by knowledge providers 16806 (e.g., using knowledge provider devices 16890) or knowledge recipients 16818 (e.g., using knowledge recipient devices 16894). For example, an exchange or marketplace may host exchanges for specific categories of know-how, expertise, instruction sets, trade secrets, insight, or other elements of knowledge described or referenced herein, where knowledge is categorized by subject matter of interest, where transaction terms are predefined and/or configurable (such as with configurable smart contracts that enable various transaction models, including bid/ask models, auction models, donation models, reverse auction models, fixed price models, variable price models, contingent pricing models and others), where metadata is collected and/or represented about categories of knowledge exchange, and where relevant content is presented, including market pricing data, substantive content about knowledge areas, content about providers, and the like. Such an exchange may facilitate monetization of tokenized knowledge represented in knowledge tokens 17038. In embodiments, a knowledge exchange, as described herein, may be integrated with or within another exchange, such as a domain-specific exchange, a geography-specific exchange, or the like, where the knowledge exchange may facilitate exchange of valuable or sensitive knowledge related to the subject matter of the other exchange. The other exchange may be a stock exchange, a commodities exchange, a derivatives exchange, a futures exchange, an advertising exchange, an energy exchange, a renewable energy credits exchange, a cryptocurrency exchange, a bonds exchange, a currency exchange, a precious metals exchange, a petroleum exchange, an exchange for goods, an exchange for services, or any of a wide variety of others. This may include integration by APIs, connectors, ports, brokers, and other interfaces, as well as integration by extraction, transformation and loading (ETL) technologies, smart contracts, wrappers, containers, or other capabilities.

In some embodiments, the knowledge distribution system 16802 may be configured to create and issue one or more currency tokens associated with the distributed ledger 16808. The currency tokens may be digital objects such as cryptographic tokens, cryptographic currency, and the like, that may be purchased, mined, assigned, and/or distributed to users of the distributed ledger 16808. In some embodiments, the currency tokens may represent fiat currency (e.g., US Dollars, British Pounds, Euros, or the like), such that the value of the token is pegged to the fiat currency. In embodiments, the currency tokens may be used to transact digital knowledge. For example, in embodiments, smart contracts may be used to receive and verify that a knowledge recipient 16818 has paid the requisite amount of funds before releasing the digital knowledge 16804 to a knowledge recipient device 16894. Additionally or alternatively, knowledge recipients 16818 may use traditional payment methods (e.g., credit card payments) to transact for instances of knowledge. In some embodiments, the currency tokens may function as digital currency. For example, the currency tokens may be paid by knowledge recipients to knowledge providers in exchange for digital knowledge 16804 and/or paid to crowdsources (e.g., certifiers or experts) for verifying one or more aspects of digital knowledge 16804. In some embodiments, one or more users may be awarded currency tokens as a reward for discovering, or "mining", one or more new blocks 16922 of the distributed ledger 16808. In some embodiments, currency tokens may be asset-backed tokens, such as tokens backed by one or more other currencies (e.g., fiat currencies), securities, ownership rights of property, ownership rights of intellectual property, licensing rights of property and/or intellectual property, and the like. In some embodiments, the knowledge distribution system 16802 may be configured to track access rights and/or ownership rights of one or more of the currency tokens, such as by logging contents and/or balances of digital wallets of users. In some embodiments, the knowledge distribution system 16802 may be configured to issue a wallet passcode to a user, the wallet passcode being necessary to access, view, transfer, and otherwise manage the currency tokens owned (or at least partially owned) by the user to which the wallet passcode has been issued.

In some embodiments, the knowledge distribution system 16802 may include a smart contract system 16868 configured to generate smart contracts 16840 and deploy the smart contracts 16840 to the distributed ledger 16808. In embodiments, a smart contract 16840 may refer to a piece of software stored on the distributed ledger 16808 and configured to manage one or more rights associated with one or more instances of the digital knowledge 16804 and/or one or more knowledge tokens 17038. In embodiments, the smart contract may be a computer protocol that assists with negotiation and/or performance of terms in an agreement (e.g., distributed on blockchain such as Ethereum blockchain). The smart contract may be used in banking, government, management, supply chain, automobiles, real estate, health care, insurance, etc. In some embodiments, the smart contract 16840 may be contained and/or executed in a virtual machine or a container (e.g., a Docker container). In some embodiments, one or more of the nodes 16916 of the ledger network 16970 may provide an execution environment for the smart contract 16840. In embodiments, a smart contract 16840 may include information, data, and/or logic related to an instance of digital knowledge 16804, one or more triggering events, one or more smart contract actions to be executed in response to detection of one or more of the triggering events, and the like. In embodiments, the triggering events may define conditions that may be satisfied by events performable by one or more users, such as the knowledge provider 16806, the knowledge recipient 16818, and/or the crowdsourcer 16836, or by one or more third parties. Examples of the triggering events include payment of one party by another party, adherence or lack of adherence to one or more terms of a sales, licensing, insurance, or other agreement made by one or more parties, meeting of one or more thresholds or ranges of properties of one or more pieces of the digital knowledge 16804, such as value, user rating, production amount, or any other suitable property, passage of time, or any other suitable triggering event. Additionally or alternatively, the triggering events defined in a smart contract 16840 may include conditions that may be satisfied independently of action or inaction of a human. For example, a triggering event may be when a certain date is reached, when a stock price reaches a certain threshold, when patent rights expire, when a copyright expires, when a natural event occurs (e.g., a hurricane, a tornado, a drought, or the like), etc. Triggering events may be defined as different types of triggers. For example, triggers or triggering events may refer to changing states (e.g., state change event) such as where the smart contract is active upon a set of data states (e.g., state change events). In other examples, triggers or triggering events may refer to events that occur such that users may need to passively wait for the events to occur and the knowledge distribution system 16802 may need to monitor for these events.

Referring to FIG. 170, the knowledge distribution system 16802 includes details of the smart contract 16840 and the smart contract system 17068. In embodiments, smart contract actions 17086 may include, for example, monitoring events from a defined data source, verifying fulfillment of obligations of one or more users and/or third parties according to one or more conditions 17084 defined in the smart contract 16840, verifying payment and/or transfer of tokens, property, other goods, or services, between one or more users and/or third parties, transferring the digital knowledge 16804 between parties or to one or more users, logging one or more transactions in the digital ledger 16808, performing one or more operations with respect to the digital ledger 16808, creating one or more new blocks 16922 in the digital ledger 16808, and the like. In some embodiments, a smart contract 16840 may include an event listener 17080 that is configured to monitor one or more data sources (e.g., databases, data feeds, data lakes, public data sources, or the like) for detecting events to determine whether one or more conditions 17084 are met. For example, an event listener 17080 may listen to an application programming interface (API) that provides a connection between the knowledge distribution system 16802 and a printer, such that a smart contract may trigger an obligation of a user to make a payment when a printing instruction set governed by the knowledge distribution set (such as a tokenized instruction set in a knowledge token 17038) is used to print an item using the instruction set. Thus, when a predefined set of conditions 17084 is met, then a smart contract action 17086 may be triggered. This may include triggering a payment process (such as initiating an authorization of a payment on a credit card), closing out a contract (such as when a prepaid number of uses of a knowledge set has been reached), determining a price (such as by initiating a reference to current pricing data in a marketplace or exchange), reporting on an outcome (such as reporting a workflow or event), or the like. In response to being triggered, the smart contract may automatically execute the smart contract action 17086. In some embodiments, the smart contracts are Ethereum smart contracts and may be defined in accordance with the Ethereum specification, which may be accessed at https://github.com/ethereum, the contents of which are incorporated by reference. In other embodiments, the smart contract system 17068 may include the event listener 17080.

In some embodiments, the smart contract 16840 may be configured to "wrap" one or more instances of the digital knowledge 16804 in a smart contract wrapper (e.g., a "smart wrapper"). Once wrapped, an instance of digital knowledge may be handled and/or accessed differently than when unwrapped, such as by only being readable, editable, and/or transferrable according to terms, conditions, and/or operations of the smart contract 16840. The smart contract 16840 may wrap the digital knowledge 16804 such that in order to be accessed by the knowledge recipient 16818, the digital knowledge 16804 must first be "unwrapped," (e.g., reverted to a pre-wrapped form). In some embodiments, the pre-wrapped form may be the tokenized form. The smart contract 16840, the distributed ledger 16808, and/or the knowledge distribution system 16802 may unwrap one or more tokens and/or instances of the digital knowledge 16804 in response to one or more triggering events. In some embodiments, the knowledge distribution system 16802, or another suitable system, may store a plurality of smart contract templates from which the smart contract 16840 may be generated. In some embodiments, the smart contract system 17068 may include a smart contract (SC) generator 17082 that may parameterize at least one smart contract template (from the plurality of smart contract templates) based on the information provided by a user and any conditions 17084 and/or actions 17086 defined by the user. For example, the smart contract template may correspond to a type of digital knowledge that is to be tokenized. The contract template may include parameters based on the type of the digital knowledge. These parameters may include: financial parameters for use of the tokenized digital knowledge (e.g., financial parameters), royalty rate parameters for intellectual property (e.g., royalty parameters), number of times an instruction set can be used parameters (e.g., usage parameters), output amount parameters that may be produced using an instruction set (e.g., output produced parameters), allocation of consideration among parties parameters to the smart contract and designated beneficiaries of the smart contract (e.g., allocation of consideration parameters), identity parameters that may have permission to access the distributed ledger 16808 and/or the digital knowledge (e.g., identity parameters), and/or access condition parameters for the distributed ledger 16808 and/or the digital knowledge (e.g., access condition parameters). In some embodiments, the smart contract 16840 may be configured to manage a wrapped token based on an aggregated set of instructions defined in the smart contract 16840.

In some embodiments, the distributed ledger 16808 may store smart contracts 16840 configured to facilitate licensing of one or more intellectual property rights corresponding to an instance of digital knowledge, such as know-how, patented material, trademarks, works of authorship (e.g., copyrights), and/or trade secrets. In embodiments, the knowledge distribution system 16802 may be configured to allow one or more of the knowledge providers 16806 to engage in a licensing agreement with one or more of the knowledge recipients 16818 via a smart contract 16840 (e.g., using one or more knowledge provider devices 16890 and/or one or more knowledge recipient devices 16894). In embodiments, a smart contract 16840 may be configured to embed licensing terms for the intellectual property in one or more of the blocks 16922 of the distributed ledger 16808, including scopes of use, waivers, indemnifications, limitations of use, geographical limitations, and/or the like. In embodiments, one or more copies of and/or references to the one or more pieces of intellectual property may be stored on the distributed ledger 16808, and access to the one or more pieces of intellectual property may be governed by terms of the smart contract 16840. Upon execution of the smart contract 16840, the knowledge distribution system 16802 may automatically transfer access and licensing rights to the intellectual property to the knowledge recipient 16818 (e.g., knowledge recipient device 16894 of knowledge recipient 16818) according to terms and/or operations set forth in the smart contract 16840. In some embodiments, the knowledge distribution system may be configured to verify assignee rights with resources such as public patent assignee logs prior to transferring access and/or licensing rights. In embodiments, the smart contract 16840 may contain one or more operations to be performed with respect to the distributed ledger 16808 to facilitate an execution defined by the smart contract 16840. In some embodiments, the smart contract 16840 may be configured to automatically allocate royalties in transfers between one or more knowledge providers 16806 and knowledge recipients 16818 (e.g., using knowledge provider devices 16890 and knowledge recipient devices 16894) involving transfer of access to, ownership of, and/or licensing rights to intellectual property. For example, if the owner of the digital knowledge pays licensing fees to a third-party patent owner of one or more aspects of the digital knowledge (e.g., the inventor of a particular product design), the smart contract may allocate a set percentage or amount of the transaction price of the digital knowledge 16804 to the licensor, such that the license to make, sell, use, and/or otherwise transact for is transferred to the recipient of the digital knowledge 16804. In embodiments, the operations for allocating royalties may be performed according to one or more terms of one or more of the smart contracts 16840 and may have related smart contract actions 17086.

In some embodiments, the knowledge distribution system 16802 may be configured to aggregate intellectual property licensing terms. The distributed ledger 16808 may be configured to store an aggregate stack of instances of the digital knowledge 16804, where one or more aspects of the digital knowledge 16804 are restricted in accordance with an intellectual property right of a party (e.g., a patent, copyright, trademark, or trade secret of the knowledge provider or any other party). In embodiments, the ledger management system 16910 may facilitate adding one or more instances of the intellectual property to the aggregate stack, thereby associating the added instance of intellectual property to the stack of intellectual property to which the instance of intellectual property is added. Operations such as transfer of control, edit, viewing, ownership, and/or licensing rights may be performed on an entire stack of intellectual property by the knowledge distribution system 16802, such as according to terms of one or more smart contracts 16840. Access to, ownership of, and/or sublicensing rights to the aggregate stack of intellectual property may be transferred from one or more of the knowledge providers 16806 to one or more of the knowledge recipients 16818 via the knowledge distribution system 16802 (e.g., using knowledge provider devices 16890 and knowledge recipient devices 16894). In some embodiments, a smart contract may be configured to transfer rights to the aggregate stack of intellectual property associated with an instance of digital knowledge (e.g., the right to use, sell, offer for sale, export, import, a product or process associated with the intellectual property stack) or to transfer the intellectual property stack in its entirety to the digital knowledge recipient. In the latter scenario, the smart contract may be configured to facilitate the assignment of the intellectual property stack to the digital knowledge recipient (e.g., populating assignment forms that are submitted to patent, trademark, or copyright offices of one or more jurisdictions and to electronically file the assignment documents). In some embodiments, the assignment of intellectual property rights may be recorded in the distributed ledger 16808 as well.

In some embodiments, the ledger management system 16910 may define one or more operations that may handle or process commitments of one or more parties to the smart contract 16840 and/or terms thereof. When a set of parties (e.g., knowledge providers 16806, knowledge recipients 16818, crowdsourcers 16836 and/or third parties) commit to the terms of a smart contract 16840 to a term of a smart contract governing the transfer of digital knowledge 16804, the knowledge distribution system 16802 (and/or the smart contract 16840 itself) may handle or process commitments of the parties and/or identifiers of the parties to one or more portions (e.g., terms) of the smart contracts 16840. In embodiments, upon a set of parties committing to a smart contract 16840, the smart contract 16840 and/or the knowledge distribution system 16802 may link one or more of the parties to one or more of the triggering events defined in the smart contract 16840, begin monitoring one or more data sources to determine whether any conditions 17084 defined trigger events are met, and/or automatically perform operations/actions defined in the smart contract (e.g., in response to the occurrence of a triggering event). For example, a knowledge provider 16806 may upload a smart contract 16840 (e.g., using knowledge provider device 16890) to the distributed ledger 16808 and/or customize a smart contract 16840 using a smart contract template in connection with uploading an instance of the digital knowledge 16804. In embodiments, the knowledge provider 16806, a knowledge recipient 16818, or some other party may indicate (e.g., via the knowledge distribution system 16802, the distributed ledger 16808, and/or the smart contract 16840) terms of an agreement between the knowledge provider 16806 and the knowledge recipient 16818 upon an agreement being formed between the knowledge provider 16806 and the knowledge recipient 16818. In some embodiments, the smart contract 16840 may include one or more rights, terms, and/or obligations provided by the knowledge provider 16806 and/or a third party prior to identification of and/or dealing with the knowledge recipient 16818. The knowledge recipient 16818 may agree to be bound by rights, terms, and/or obligations defined via the smart contract 16840 upon agreeing to receive the digital knowledge 16804 (e.g., using knowledge recipient device 16894). The knowledge recipient 16818 may be a user who is willing to transact (e.g., buy, license, or otherwise make a deal with the knowledge provider 16806) for the digital knowledge 16804. The smart contract 16840 may commit or otherwise bind (or process commitments) the knowledge provider 16806, the knowledge recipient 16818, and/or other parties to the agreement to terms and/or conditions 17084 of the smart contract 16840 in response to receiving indication via the knowledge distribution system 16802 and/or the distributed ledger 16808.

In some embodiments, the knowledge distribution system 16802 may include an account management system. In embodiments, the account management system 16846 may facilitate creation and/or storage of user accounts related to users of the knowledge distribution system 16802, the knowledge distribution system 16802, and/or the distributed ledger 16808. For example, the account management system 16846 may be configured to facilitate registration of one or more of the knowledge providers 16806, the knowledge recipients 16818, the crowdsourcers 16836, and/or other third parties that may be associated with the knowledge distribution system 16802, the knowledge distribution system 16802, and/or the distributed ledger 16808. In some embodiments, the account management system 16846 may be configured to, together with the ledger management system 16910, facilitate intake of data from registered users of the distributed ledger 16808, such as name, address, company affiliation, financial account information (e.g., bank account numbers and/or routing numbers), digital identifiers (e.g., IP addresses, MAC addresses, and the like), and any other suitable information related to the registered users.

The account management system 16846 may update the user account of the registered user with data taken in and related to the registered user. In some embodiments, the account management system may facilitate generation and/or distribution of one or more of the permission keys 16932 to one or more of the registered users. The permission keys 16932, 16932-1, 16932-2, 16932-3, 16932-N may provide the registered user with access to one or more instances of the digital knowledge 16804 and/or services associated with the knowledge distribution system 16802.

In some embodiments, the knowledge distribution system 16802 may include a user interface system 16850 configured to present a user interface. The user interface may be configured to facilitate uploading of digital knowledge 16804, generation and/or uploading of a smart contract 16840, and viewing of the digital knowledge 16804 and/or the smart contract 16840 (and statuses thereof). The user interface may be a graphical user interface. Information presented to users of the knowledge distribution system 16802 via the user interface may include descriptions of one or more instances of the digital knowledge 16804, ownership and/or licensing information related to the one or more instances of the digital knowledge 16804, information related to the user viewing the user interface and/or other users of the knowledge distribution system 16802, price information related to one or more instances of the digital knowledge 16804, statistics and/or metrics related to the distributed ledger 16808 and/or contents thereof, such as node count, payouts for generation of additional nodes, and any other suitable information. In some embodiments, users may view contents of their digital wallets via the user interface, such as a balance of one or more types of currency tokens.

In some embodiments, the user interface may be configured to allow one or more users to perform one or more of the operations related to the digital knowledge 16804 and/or the distributed ledger 16808, such as buying, selling, verifying, and/or reviewing the digital knowledge 16804 and/or performing other operations related to the distributed ledger 16808 discussed herein. For example, the knowledge provider 16806 may select a computer file (such as a 3D printer schematic file) to upload to the distributed ledger 16808 via the user interface (e.g., using knowledge provider device 16890). The user interface may present the knowledge provider 16806 with one or more options related to uploading the digital knowledge 16804, such as an ability to configure a smart contract 16840 and related terms for wrapping and/or tokenizing the digital knowledge 16804. Other options may include privacy options, such as options pertaining to one or more users or classes of users who may and/or may not view, buy, sell, license, rate, verify, review, or otherwise manage or interact with the digital knowledge 16804.

In some embodiments, the user interface system 16850 may include a marketplace system 16854 configured to establish and maintain a digital marketplace 16856. In embodiments, the digital marketplace 16856 provides an environment that allows knowledge providers and potential recipients to engage in commerce relating to the transfer of digital knowledge 16804. For example, the digital marketplace may be configured to allow one or more users and/or third parties to search for one or more pieces of digital knowledge 16804 similar to a digital storefront, transact for one or more pieces of the digital knowledge 16804 (e.g., buy, sell, license, lease, bid on, and/or give away the digital knowledge), receive recommendations for digital knowledge 16804, review one or more pieces of the digital knowledge 16804, verify source information and/or other information related to one or more pieces of the digital knowledge 16804, transact for one or more pieces of the digital knowledge 16804 (e.g., buy, license, bid on one or more pieces of the digital knowledge, or the like), and/or perform any other suitable marketplace interaction with the digital knowledge 16804, one or more of the knowledge providers 16806, the digital ledger 16808, one or more of the knowledge recipients 16818, one or more crowdsourcers 16836, or any other user or third party. In some embodiments, the digital marketplace 16856 may be configured to allow users to edit user accounts associated with themselves and view user accounts associated with other users. In some embodiments, the digital marketplace 16856 user interface may allow users to make reviews and/or ratings of other users.

In embodiments, the knowledge distribution system 16802 may include one or more datastores 16858. FIG. 171 illustrates an example set of datastores 16858 of the knowledge distribution system 16802. In some embodiments, the knowledge distribution system 16802 may include one or more datastores 16858 configured to store data related to the digital knowledge 16804, the distributed ledger 16808, the knowledge providers 16806, the knowledge recipients 16818, the crowdsourcers 16836, the knowledge tokens 17038, the smart contracts 16840, the account management system 16846, the marketplace system 16854, or any other suitable type of data. A datastore may store folders, files, documents, databases, data lakes, structured data, unstructured data, or any other suitable data.

In some embodiments, the datastores 16858 may include a knowledge datastore 17160 configured to store data. The knowledge datastore 17160 may be in communication with the user interface system 16850. The user interface system 16850 may be configured to populate the user interface with data stored in the knowledge datastore 17160. In some embodiments, data stored in the knowledge datastore 17160 may include knowledge related to the digital knowledge 16804 such as source, reviews, price, ownership, licensing, related knowledge providers 16806, related knowledge recipients 16818, serial numbers, related crowdsourcers 16836, or any other suitable information. For example, the knowledge datastore 17160 may contain information related to a 3D printer schematic such as origin, date of creation, names of one or more contributing individuals, groups, and/or companies, pricing, market trends for related schematics, serial numbers and/or part identifiers, and any other suitable type of data related to the 3D printer schematic.

In some embodiments, the datastores 16858 may include a client datastore 17162 (e.g., may include user datastore), the client datastore 17162 being configured to store data relating to users of the knowledge distribution system 16802. The client datastore 17162 may be in communication with the account management system 16846 and may be populated with user accounts related to one or more of the user accounts, data contained in one or more of the user accounts, data related to the one or more user accounts, and/or a combination thereof.

In some embodiments, as shown in FIGS. 170 and 171, the datastores 16858 may include a smart contract datastore 17064. In embodiments, the smart contract datastore 17064 is configured to store data related to one or more of the smart contracts 16840 and/or smart contract templates (from which smart contracts 16840 may be parameterized and instantiated). In embodiments, the smart contract datastore 17064 may be in communication with the ledger management system 16910. Data stored in the smart contract datastore may include, for example, smart contract templates, one or more smart contracts 16840, data related to instances of the digital knowledge 16804 related to one or more of the smart contracts 16840, data related to parties to one or more of the smart contracts 16840, and any other suitable data. The smart contract datastore 17064 may be configured to store completed smart contracts that have already been executed. The smart contract datastore 17064 may be configured to store smart contracts that have not yet been uploaded to the distributed ledger 16808.

Referring to FIG. 168, in some embodiments, the knowledge distribution system 16802 may include an analytics system 16866 configured to analyze one or more tokenized instances of the digital knowledge 16804, such as the knowledge token 17038, and report an analytic result. The analytics system may analyze the tokenized instance of the digital knowledge 16804 in order to determine one or more properties and/or metrics of the tokenized instance of the digital knowledge 16804. Properties of tokenized digital knowledge 16804 may include, for example, source, reviews, price, ownership, licensing, related knowledge providers 16806, related knowledge recipients 16818, serial numbers, related crowdsourcers 16836, or any other suitable information. The analytics system 16866 may be configured to determine one or more trends, metrics, and/or predictions related to the properties. In some embodiments, the analytics system 16866 may include a machine learning module configured to perform predictions and/or analyses of the properties related to the digital knowledge 16804 via one or more machine learning techniques.

In some embodiments, properties of tokenized intellectual property may be analyzed by the analytics system 16866. For example, the analytics system 16866 may be configured to analyze tokenized digital knowledge 16804 including intellectual property. Analyzed properties of tokenized intellectual property may include, for example, transaction history including changes and/or assignments in ownership and/or licensing rights of the intellectual property, litigation history including lawsuits involving the intellectual property and data related to the lawsuits, information pulled from one or more databases of intellectual property related to the intellectual property, and any other suitable property of the tokenized intellectual property or any other token or suitable instance of the digital knowledge 16804. Metrics related to tokenized intellectual property may include, for example, value, age, strength, efficacy, or any other suitable metric related to the tokenized intellectual property or any other knowledge token 17038 or suitable instance of the digital knowledge 16804.

In some embodiments, the knowledge distribution system 16802 may be configured to perform an aggregation operation that aggregates a set of operations and/or instructions included in one or more instances of the digital knowledge 16804. Aggregation may be employed where component instances of digital knowledge 16804 are aggregated to form larger instances of digital knowledge. In embodiments, aggregation occurs where component instances are concatenated to form larger instances, such as by adding component instances as additional (optionally tokenized) blocks to a chain, or by adding references or links to component knowledge blocks. Examples of concatenation aggregation include where chapter instances are concatenated to form book instances, where sentence instances are concatenated to form paragraphs, where word instances are concatenated to form sentence instances, and the like. In embodiments, aggregation occurs where component instances are linked schematically to form a system, such as where knowledge representing physical component parts of a machine are linked to form the machine, where component steps in a process are linked to form the complete process, or the like. In embodiments, aggregation of knowledge involves linking elements in a flow, such as where instances are linked diagrammatically to generate a workflow, such as where ingredients and process steps are linked to generate a recipe or formulation process, where workflow steps and materials are linked to describe a work process (such as one involving expertise or know how) or the like. In embodiments, aggregation of knowledge involves coupling of partial instances to form a whole instance, such as where two or more sub-parts of a formula are joined to form a complete formula (e.g., a chemical, pharmaceutical, biological, materials science, physical, or other formula), where two or more sub-parts of an instruction set (e.g., computer code) are joined to form the entire instruction set, or the like. In embodiments, aggregation may involve linking related instances of knowledge in a cluster, such as where instances of knowledge are topically linked to form a cluster, such as a cluster of related subjects in a knowledge domain (such as a scientific domain, a domain of the humanities, a social science domain, a commercial domain, a business domain, or many others). In embodiments, aggregation may involve hierarchical aggregation of knowledge, such as by representing knowledge according to one or more defined hierarchies, such as an organizational hierarchy (such as an organizational chart or reporting structure), an industry hierarchy, a topical hierarchy, a physical hierarchy, or the like. Many other examples of aggregation may be envisioned. The ledger management system 16910 may be configured to perform the aggregation operation. The aggregation operation adds at least one instruction to a preexisting set of instructions, thereby yielding a modified set of instructions. The modified set of instructions may then be stored in the distributed ledger 16808 and may be tokenized, manipulated, and/or managed similarly to any instance of the digital knowledge 16804. In some embodiments, the aggregation operation may be performed by the smart contract 16840, according to one or more terms of the smart contract 16840, and/or in reaction to triggering of one or more triggering events of the smart contract 16840. In some embodiments, the aggregation operation may be performed at request of a user of the knowledge distribution system 16802.

In some embodiments, the ledger network 16970 is a federated network, such that the ledger management system 16910 of the knowledge distribution system 16802 may act as an arbiter to simplify the consensus mechanism. Some or all of the nodes 16916 may be preselected or preapproved to act as nodes 16916 with respect to the management of blocks of the distributed ledger 16808 and/or data contained therein, such as one or more instances of the digital knowledge 16804. The ledger management system 16910 may ease computational burdens on the other nodes 16916 in the ledger network 16970. In some embodiments, the distributed ledger 16808 is distributed, such that the participating nodes 16916 may each store a respective local copy 16808-L of the distributed ledger 16808, where each local copy 16808-L may include the entire distributed ledger 16808 or a portion thereof.

In the illustrated example, the knowledge distribution system 16802 stores a copy of the distributed ledger 16808, the copy of the distributed ledger 16808 being local to the knowledge distribution system 16802, and each node 16916 stores a distributed local copy 16808-L of the distributed ledger 16808. In some embodiments, however, the knowledge distribution system 16802 does not store a local copy of the distributed ledger 16808 such that the distributed ledger 16808 is maintained wholly by participant nodes 16916. A distributed copy (e.g., copy 16808-L) of the distributed ledger 16808 may contain the entire ledger 16808 or only a portion of the ledger 16808. In general, each copy of the ledger 16808 stores a set of blocks 16922. In some embodiments, each respective block may store information relating to a respective state change event as a hash value and may further store a block identifier of a "parent" block that was added to the ledger 16808 prior to the respective block. In some embodiments, the ledger management system 16910 may select the block that was most recently added to the ledger to act as the parent block, whereby the ledger management system 16910 includes the block identifier of the most recently added block to the state change event record.

A state change event may refer to any change of state relating to the digital knowledge 16804 and/or management of one or more instances of the digital knowledge 16804. Non-exhaustive examples of state change events may include creating a new instance of the digital knowledge 16804, registering a new user of the knowledge distribution system 16802, such as a new knowledge provider 16806 (and/or registering a new knowledge provider device 16890) or a new knowledge recipient 16818 (and/or registering a new knowledge recipient device 16894), granting the new user permission to perform a specific operation, modifying certification and/or validation of one or more instances of the digital knowledge 16804 at the request of a user, transmitting one or more instances of the digital knowledge 16804 to one or more knowledge recipients 16818 (e.g., knowledge recipient devices 16894), recordation of a use of an instance of digital knowledge 16804 by a knowledge recipient, and the like. In some embodiments, the ledger management system 16910 may create a state change event record that indicates the state change event, e.g., the operation that was performed, for each state change event that occurs. A state change event record may further be information/metadata relating to the event, such as one or more user identifiers of one or more respective users associated with the state change event, a timestamp corresponding to the state change event, a device identifier of the device that requested or performed an operation, an IP address corresponding to the device that requested or performed the operation, and/or any other relevant data. In some embodiments, the ledger management system 16910 may include a block identifier of a previous block that was previously stored on the ledger 16808 in the state change event record, such that the previous block may be a "parent" to a new block that will be generated based on the state change event record, as the state change event record references the previously stored block, but the previously stored block will not reference the new block. In some embodiments, the block identifier may be the hash value of a previously generated block.

In some embodiments, the ledger management system 16910 and/or one or more of the nodes 16916 may be configured to generate a state change event record for each event occurring with respect to management of digital knowledge 16804 via the knowledge distribution system 16802. In embodiments, the ledger management system 16910 and/or one or more of the nodes 16916 may generate a new block 16922 corresponding to the state change event record by generating a cryptographic hash (or "hash value") of the state change event record by inputting the state change event record into a hashing function to obtain the cryptographic hash. The resultant hash value is a unique value (or substantially unique value with a very low likelihood of collisions) that represents the contents of the state change event record, such that the resultant hash value is a unique identifier that identifies the new block and that also encodes the contents thereof, including a block identifier of the parent block. Thus, when the new block is "solved" (solving a block in this context may refer to the process of determining the original contents of the state change event record encoded in the hash value), the solution of the new block indicates the contents of the state change event record, including the block identifier of the parent block. As such, the hash value of the preceding state change event record may be used to verify the authenticity of the current state change event record by way of verification. While the above description describes blocks that store only one state change event record, in some embodiments, the ledger management system 16910 and/or one or more of the nodes 16916 may encode two or more state change event records in a single block. The ledger management system 16910 and/or one or more of the nodes 16916 may include the two or more state change event records in the body of a new block data structure and may include the block identifier of the previous block in a block header of the new block data structure. The ledger management system 16910 and/or one or more of the nodes 16916 may then input the new block data structure into the hashing function, which outputs the new block 16922. In these embodiments, the new block 16922 may be a cryptographic hash that represents the two or more state change event records and the block identifier of the previous block (i.e., the parent block to the new block). In this way, when the new block is solved, the solution to the block is the two or more state change event records and the block identifier of the parent block, where the block identifier of the parent block can be used to validate the authenticity and accuracy of the new block.

In embodiments, the ledger management system 16910 and/or one or more of the nodes 16916 may request verification of a block 16922. In some embodiments, verification of a block 16922 may include broadcasting a request 16924 to verify a block 16922 (referred to as "the block 16922 to be verified") to the other nodes 16916 in the ledger network 16970 (which may include the ledger management system 16910 if the ledger management system 16910 is not issuing the request 16924). In some embodiments, the request 16924 may include or be broadcasted with the block 16922 to be verified. Verification may further include one of the other nodes 16916 that received the request 16924 (or potentially the ledger management system 16910) solving the block 16922 to be verified. A node 16916 may determine it has solved the block 16922, when the solution to the block contains a valid block identifier—that is, a block identifier that references one of the other blocks 16922 stored on the ledger 16808. Once the solver has determined the solution to the block 16922, the solver broadcasts a "proof of work" 16928 to the other nodes 16916. In some embodiments, the proof of work 16928 may be the block identifier of the previous block 16922. In some embodiments, each of the non-solving nodes 16916 (potentially including the ledger management system 16910), may receive the proof of work and may validate the proof of work based on the copy of the distributed ledger 16808 that is stored at the node 16916. In these embodiments, each node 16916 may determine whether the block identifier contained in the proof of work corresponds to (e.g., matches) a block identifier of a block stored on the local copy of the ledger 16808.

In some embodiments, the ledger management system 16910, in conjunction with the other nodes 16916 in the ledger network 16970, maintains an immutable record of any operations performed with respect to a management of digital knowledge 16804 via the knowledge distribution system 16802 using the knowledge distribution system 16802. In these embodiments, any time a user performs an operation with respect to management of digital knowledge 16804 via the knowledge distribution system 16802 hosted on the knowledge distribution system 16802, the ledger management system 16910 may: generate a new event state record corresponding to the operation; encode the new event state record into a new block data structure and a block identifier of a previous block (e.g., the most recently added block) into a block header of the new block data structure; and hash the new block data structure using a hashing function to obtain the new block. Furthermore, in some embodiments, the ledger management system 16910 may transmit a request 16924 to verify the new block 16922 to the other nodes 16922 in the network 16814. In some embodiments, one of the nodes 16916 may attempt to determine a solution to the new block 16922. If a valid solution is determined, the solver node 16916 may transmit a proof of work 16928 to the other nodes 16916 in the ledger network 16970, and the other nodes 16916 may attempt to validate the proof of work 16928.

In some embodiments, the ledger management system 16910 utilizes a distributed ledger 16808 to manage permissions of different users of the knowledge distribution system 16802, such as one or more of the knowledge providers 16806 (and/or one or more knowledge provider devices 16890) and/or one or more of the knowledge recipients 16818 (and/or one or more knowledge recipient devices 16894). In some embodiments, permissions may be granted with respect to an instance of the digital knowledge 16804 or set of instances of the digital knowledge 16804. For example, permissions may include permission for a user to upload an instance of the digital knowledge 16804 or set of instances of the digital knowledge 16804, permission for a user to view an instance of the digital knowledge 16804 or set of instances of the digital knowledge 16804, permission for a user to edit an instance of the digital knowledge 16804 or set of instances of the digital knowledge 16804, permission for a user to delete an instance of the digital knowledge 16804 or set of instances of the digital knowledge 16804, permission for a user to download an instance of the digital knowledge 16804 or set of instances of the digital knowledge 16804, permission for a user to print (e.g., print-to-paper or 3D print) an instance of the digital knowledge 16804 or set of instances of the digital knowledge 16804, and the like. Permissions may additionally or alternatively relate to services 16930 that are offered by the knowledge distribution system 16802. For example, permissions may include permission for a user to access a full-text search functionality on the knowledge distribution system 16802, permission for the user to use a virus scanner offered by the knowledge distribution system 16802, permission for the user to have the knowledge distribution system 16802 generate a machine-generated instance of the digital knowledge 16804 or set of instances of the digital knowledge 16804, and the like. Permissions may also include the permission to perform an operation granted to one or more other users. Permissions may be applied to one or more users by default, applied to one or more classes of users, such as users holding one or more of the permission keys 16932, automatically be applied to one or more categories of users such as knowledge provider 16806, knowledge recipient 16818, and/or crowdsourcer 16836, and/or may be manually given to one or more users by administrators and/or managers of the knowledge distribution system.

In some embodiments, the ledger management system 16910 may manage individual participant's access to respective services 16930 by generating one or more unique service-specific permission keys 16932 for a respective service 16930 and issuing each respective unique service-specific permission key 16932 to a respective participant that has been granted access to the respective service 16930.

In some of these embodiments, the ledger management system 16910 may utilize the distributed ledger 16808 to store proof of the service-specific permission keys 16932 and to manage permissions to the services 16930. In these embodiments, the ledger management system 16910 may: receive an instruction to grant a user permission to access a particular service; generate a service-specific permission key 16932 corresponding to the particular service and assign the key 16932 to the user; encode a user ID of the user and the service-specific permission key 16932 in a state change event record; generate a new block based on the state change event record and a block identifier of a previously stored block; store the new block on its local copy of the distributed ledger 16808, and broadcast the new block to other nodes 16916 in the network for storage on the respective copies of the ledger 16808 stored at the nodes. In some embodiments, the ledger management system 16910 may validate the new block prior to storing and transmitting the block for storage at the other nodes 16916. The ledger management system 16910 may further transmit the new block to a computing device associated with the user (which may or may not be a participating node), whereby an agent 16920 on the computing device may store the new block. In this way, the agent 16920 may use the new block to obtain access to the particular service, when the user attempts to access the particular service 16930 from the computing device. When the user attempts to access the particular service 16930, the agent may communicate the block containing the permission key 16932 corresponding to the particular service 16930 to the ledger management system 16910. The ledger management system 16910 may solve the received block and/or validate the received block, in the manner described above. If the ledger management system 16910 is able to validate the received block, the ledger management system 16910 grants the computing device of the user access to the service 16930, whereby the user may begin using the service 16930. In some embodiments, permissions and access to an instance of the digital knowledge 16804 or set of instances of the digital knowledge 16804 that are stored in an organizational structure may be managed in a similar way, where users are granted permission keys 16932, where these permission keys 16932 correspond to specific operations that a user may perform on the instance of the digital knowledge 16804 or set of instances of the digital knowledge 16804 with which the permission keys 16932 are associated.

In some embodiments, the ledger management system 16910 and/or one or more computing node computing devices 16916 having requisite processing resources may generate an immutable log of a transaction based on the distributed ledger 16808. In these embodiments, the ledger management system 16910 and/or the nodes 16916 (referred collectively as the solving nodes 16916) may begin solving the most recent blocks 16922 in the distributed ledger 16808. Each time a block is solved, the solving node 16916 may transmit the proof of work 16928 to other nodes 16916, which may then verify the accuracy of the solution. The solving nodes 16916 may iteratively solve each of the blocks 16922 in the distributed ledger 16808 in this manner until the entire ledger 16808 is solved, thereby resulting in an operation log of the management of digital knowledge 16804 via the knowledge distribution system 16802. The operational log may define the actions or operations that were performed using the knowledge distribution system 16802. By creating, validating, and solving the blocks 16922 of the distributed ledger 16808 in the manners described above, the ledger 16808 is generated in a transparent and secure manner. The resultant operational log is stored in an encrypted manner until it is solved, and once solved, the operational log is auditable and immutable. The operational log may indicate each time a user was allowed to access the distributed ledger 16808 and/or management of digital knowledge 16804 via the knowledge distribution system 16802, the permissions that each user was granted, the requests to perform operations or use services 16930 that each user initiated, the operations that were performed, the user that performed the operation, and the like.

In some embodiments, the solving nodes 16916 may optimize the solving of the ledger 16808 by solving different blocks 16922 in a distributed manner. For example, if the distributed ledger 16808 includes one or more forks (e.g., when more than one child block points 16922 to the same parent block 16922), the distributed ledger 16808 may be said to fork at the parent block 16922. In this example, each chain originating at the fork may have a final block 16922 (or leaf block 16922). In this scenario, different solving nodes 16916 may begin solving the ledger 16808 at different leaf blocks 16922 in a breadth-first or depth-first manner, thereby increasing the speed at which the ledger 16808 is solved.

In some embodiments, the ledger management system 16910 may be configured to facilitate collaboration between one or more of the knowledge providers 16806, one or more of the knowledge recipients 16818, or a combination thereof, by assisting in the execution of management of digital knowledge 16804 via the knowledge distribution system 16802 using, for example, smart contracts. In these embodiments, the ledger management system 16910 may provide management of digital knowledge 16804 via the knowledge distribution system 16802 that is defined to facilitate a respective type of management of digital knowledge 16804. For example, for a transfer of one or more instances of digital knowledge to a knowledge recipient 16818 (e.g., using knowledge recipient device 16894) in exchange for funds transmitted to a knowledge provider 16806 (e.g., knowledge provider device 16890) in accordance with a sale, license, or rental agreement and/or a smart contract, the ledger management system 16910 define various tasks that must be completed before a next step can be performed in sale, license, or rental of the digital knowledge 16804. In this example, the knowledge distribution system 16802 may require that an instance of the digital knowledge 16804 or a link and/or reference thereto must be uploaded to the distributed ledger 16808 prior to a transfer of funds from the knowledge recipient 16818 to the knowledge provider 16806. Another condition may be that one or more parties having adequate permission to sign a document must electronically execute a document before engaging in a transfer of one or more instances of the digital knowledge 16804. The knowledge distribution system 16802, the ledger management system 16910, and/or the distributed ledger 16808 may be preconfigured based on the type of management of digital knowledge 16804 to be executed via the knowledge distribution system 16802 and/or may be customized by one or more parties associated with the management of digital knowledge 16804 via the knowledge distribution system 16802. In some embodiments, each operation and/or management of digital knowledge 16804 via the knowledge distribution system 16802 may be encoded in a smart contract, whereby the smart contract may manage the phases of the workflow when the smart contract determines that one or more required conditions are met. In some embodiments, copies of a smart contract are stored and executed by the agents 16920 of one or more respective nodes 16916. The agent 16920 may facilitate the performance of operations that are defined in the smart contract (including validating permissions to perform the operations using the distributed ledger 16808), the reporting and recording of the performance of the operations (e.g., by generating blocks or requesting generation of blocks from the ledger management system 16910), and/or verifying that one or more conditions defined in the smart contract are met. Once a consensus is achieved with respect to one or more required conditions, the management of digital knowledge 16804 via the knowledge distribution system 16802 may progress to a next phase in the workflow. In this way, the ledger network 16970 (e.g., the ledger management system 16910 and the participating nodes 16916) may facilitate collaboration between parties in the management of digital knowledge 16804 via the knowledge distribution system 16802 by assisting in the execution of the workflow associated with the management of digital knowledge 16804 via the knowledge distribution system 16802 by validating pre-closing and closing work and/or providing a framework for the management of digital knowledge 16804 via the knowledge distribution system 16802 by way of smart contracts.

FIG. 172 illustrates a method 17200 of deploying a knowledge token 17038 and related smart contract 16840 via the knowledge distribution system 16802.

At 17210, the knowledge distribution system 16802 receives an instance of the digital knowledge 16804, such as from a user. In embodiments, the user may be affiliated with an organization (e.g., an organization that owns the digital knowledge) or an unaffiliated individual (e.g., a person who created the digital knowledge on their own or in collaboration with other unaffiliated individuals). The user may provide the instance of the digital knowledge 16804 via a graphical user interface. For example, the user may upload the digital knowledge via the graphical user interface. In embodiments, the digital knowledge may be an instruction set that may be performed by a device or set of devices. The user may upload the digital knowledge by providing the knowledge itself or a reference to the digital knowledge (e.g., an address from which the digital knowledge may be accessed/retrieved electronically).

In embodiments, the user may provide additional information, such as a type of the digital knowledge, a description of the digital knowledge, a price to be charged to access the digital knowledge, and the like. In some embodiments, the user may provide licensing data, such as any patent, trademark, copyright rights that are licensed or otherwise conveyed to a knowledge recipient, a length of the license(s) (e.g., when each license expires), a scope of the license(s) (e.g., limitations on use/sale/transferability or geographical limitations), and the like. In embodiments, the user may define validation information, such as certifications/validations of the digital knowledge. In embodiments, the user may also define limitations on the distribution of the digital knowledge (e.g., a total number of knowledge tokens that may be generated).

In embodiments, the user may define a set of conditions and/or actions that are used to generate a smart contract governing transactions for the digital knowledge. Examples of conditions may include a time period when the smart contract is valid, requirements for a recipient device (e.g., certain specifications on a device, such as a type of 3D printer, a minimum amount of processing power, required machinery to perform certain processes, or the like) that must be verified before release of the digital knowledge, requirements for a knowledge recipient (e.g., definitions of certain types of data that must be provided to ensure the knowledge recipient is eligible to receive the digital knowledge), or any other suitable conditions. In some embodiments, the user may define a set of actions that may be performed in response to certain conditions being triggered. Some of the actions that are performed by a smart contract may be default conditions, such as writing a record of the transaction to the distributed ledger or releasing the digital knowledge. In some embodiments, a user may define custom actions, such as defining allocations of funds to third-party rights holders, generating a serial number for a product that is produced by the digital knowledge, digitally signing a product that is produced by the digital knowledge, exposing an API to a knowledge recipient, or the like.

At 17212, the knowledge distribution system tokenizes the digital knowledge 16804, thereby creating a knowledge token 17038. In embodiments, the ledger management system may tokenize the digital knowledge by wrapping a smart contract around the digital knowledge to obtain the knowledge token. In some embodiments, the ledger management system may retrieve a smart contract template from the smart contract datastore, such that the smart contract template corresponds to a type of the digital knowledge that is to be tokenized. In some of these embodiments, the ledger management system may parameterize the smart contract template based on the information provided by the user and any conditions and/or actions defined by the user. For example, the smart contract may be parameterized for the instance of digital knowledge (or a reference thereto), any licenses that are granted, the price to be paid, any conditions that are to be met, and any actions to be performed. In some embodiments, the ledger management system may include any libraries in the smart contract that are needed to support any of the functions defined in the smart contract. In some embodiments, the ledger management system may configure one or more event listeners that allow the smart contract to monitor one or more data sources. In these embodiments, the ledger management system may define the data source(s) to be monitored, whereby the event listener obtains and/or processes the data from the data source(s) which is then used to determine whether a certain condition or set of conditions is met. Additional examples of tokenization may be found in the Ethereum specification, which may be accessed at https://github.com/ethereum. In embodiments, the knowledge distribution system may generate a set number of knowledge tokens, whereby each knowledge token may be used to facilitate a different transaction for the instance of digital knowledge.

At 17214, the knowledge distribution system stores the knowledge token(s) 17038. In embodiments, the ledger management system may store the knowledge token(s) by deploying the knowledge token(s) to a distributed ledger 16808. In embodiments, the ledger management system may initially assign the ownership of the knowledge token(s) to the knowledge provider. In embodiments, the knowledge distribution system may also store information relating to the instance of digital knowledge in the knowledge datastore, which may be used to populate a marketplace site where potential knowledge recipients can view information relating to the digital knowledge.

FIG. 173 illustrates a method 17300 of performing high level process flow of a smart contract that distributes digital knowledge. In embodiments, the smart contract may be a knowledge token that is stored on the distributed ledger and that is executed by one or more nodes that host the distributed ledger. In some of these embodiments, the smart contract may be executed on a virtual machine or in a container.

At 17310, the smart contract monitors one or more of the conditions defined in the smart contract. In some embodiments, an event listener obtains data (either passively or actively) from one or more data sources defined in the smart contract 16840. As the event listener obtains data from the one or more data sources, the smart contract may determine whether certain conditions are met, and if so, may perform an action that is triggered by the met conditions.

At 17312, the smart contract verifies conditions for transaction of digital knowledge and at 17314, the smart contract initiates transfer of the digital knowledge 16804. In embodiments, the smart contract may include an event listener that determines whether a requisite amount of funds have been deposited to the smart contract. Once a party has deposited the requisite amount of funds (e.g., a predefined amount of cryptocurrency or fiat currency), the smart contract may initiate the transfer of the digital knowledge to the knowledge recipient (e.g., the party that deposited the requisite amount of funds). In embodiments, this may include updating the distributed ledger with a block that indicates the change in ownership of the token to the knowledge recipient and providing any required keys to the knowledge recipient. Once the ownership of the knowledge token has been changed, the knowledge recipient may access the digital knowledge contained therein (and in accordance with any restrictions defined in the smart contract, such as using a particular type of device).

As discussed, the techniques described herein may be applied to facilitate transactions for different types of instruction sets. In some embodiments, the knowledge distribution system may be used to distribute instruction sets for 3D-printing specific products (e.g., replacement parts, medical devices, custom products, manufacturing parts, and the like). In operation, the knowledge distribution system 16802 may present a graphical user interface to a user, whereby the user may provide an instance of digital knowledge, as well as a user provider (e.g., a knowledge provider) may upload an instruction set for printing a 3D item to the knowledge distribution system 16802. In embodiments, the 3D printing instruction set may include a file (e.g., a CAD file and/or an STL file) and any accompanying instructions for printing the product defined in the file. In some embodiments, the user may also define a transaction price that defines an amount of currency (fiat currency and/or cryptocurrency) that must be paid to purchase a knowledge token containing the 3D printing instruction set. Additionally, the user may provide a description of the product and any requirements for printing (e.g., required materials and/or device types or minimum specifications needed to 3D print the product). The user may also provide additional information, such as photographs of a printed product, certifications made with respect to the product, and the like.

In embodiments, the user may define any intellectual property rights that are being licensed or otherwise conveyed to a knowledge recipient with the digital knowledge (also referred to as an intellectual property stack) with the transaction for the 3D printing instruction set. In some embodiments, the user may define an allocation schedule that defines how royalties are divided amongst one or more licensors. For example, if the product that is printed from the instance of digital knowledge is licensed under one or more patents, design patents, copyrights, and/or trademarks, a portion of the transaction price for each printed product may be allocated to the licensors as royalty payments. In this example, the user may identify the licensor(s) that collect the royalties and may assign a percentage or amount of the royalties that go to each respective licensor. In embodiments, the user may define any geographical limitations on the digital knowledge. For example, the user may define countries, regions, jurisdictions, or other geographical areas to which the digital knowledge may or may not be distributed. In embodiments, the user may further define other types of permissions or restrictions, including 3D printer requirements (e.g., a set of 3D printer types, makes and models that can print the product, serial numbers of 3D printers that can print the product, material types that must be used to print the 3D product, and the like), a time period during which the item can be 3D printed, whether the digital token may be transferred to a downstream recipient, or the like. In embodiments, the user may define actions that are performed in connection with 3D printing an object, such as assigning a serial number to the product (which may or may not be printed to the object), and/or the like. In embodiments, the user may further define any warranties, disclaimers, indemnifications, and/or the like associated with the 3D-printed product.

In embodiments, the smart contract system 17068 may generate knowledge tokens 17038 that contain the digital knowledge (or a reference thereto). In some embodiments, the smart contract system 17068 may tokenize the digital knowledge by wrapping the digital knowledge (e.g., the 3D printing instruction set or a reference to the instruction set) with a smart contract wrapper. In some embodiments, the smart contract system 17068 may obtain a smart contract template and may parameterize the smart contract using some of the information entered in by the user, such as price, license fee allocations, geographic restrictions, other restrictions, custom actions (e.g., assigning serial numbers), if/when the token expires, 3D printer requirements, and the like. In some embodiments, each knowledge token that is generated for the 3D printer instruction set may be assigned a different serial number, such that each 3D-printed product may be identified by its serial number and associated with the token from which it was printed. In this way, the product may be verified and tied to a particular record in the distributed ledger. In embodiments, the smart contract system 17068 may output the generated knowledge tokens to the ledger management system 16910.

In embodiments, the ledger management system 16910 may upload the knowledge tokens on the distributed ledger. In some embodiments, the ledger management system 16910 may generate a block containing the knowledge tokens and may broadcast the block to the distributed ledger 16808, whereby a knowledge recipient may then transact for one or more of the knowledge tokens (e.g., to print one or more respective products using the 3D printing instruction set). In some embodiments, one or more of the recipient nodes may execute the smart contracts that wrap the digital tokens, whereby the smart contract listens for one or more triggering conditions (e.g., receiving an amount of currency equal to the transaction price of the knowledge token). Additionally or alternatively, the ledger management system 16910 may execute the smart contracts (e.g., in containers) and may record the transaction for the knowledge token to the distributed ledger.

In embodiments, the knowledge distribution system 16802 may provide or connect to a digital knowledge marketplace, whereby potential recipients may purchase knowledge tokens corresponding to respective 3D-printing instruction sets. For example, the marketplace may display items that may be 3D printed, such as airplane parts, car parts, machinery parts, other types of replacement parts, toys, medical devices, and/or the like. A potential recipient may enter into a transaction for a particular 3D printing instruction set. In embodiments, the potential recipient may select one of the items. In response, the knowledge distribution system may present the price of each token, the restrictions associated with the knowledge token (e.g., any device requirements, geographical restrictions, use limitations, and/or the like), warranties, disclaimers, indemnifications, certifications, and/or the like to the potential recipient. The potential recipient may then choose to accept the terms of the transaction (e.g., agree to buy the token). The potential recipient may then commit a defined amount of currency to the transaction. In response, the smart contract may listen for additional conditions (if so defined) before completing the transaction and/or releasing the digital knowledge. For example, the smart contract may request the potential recipient to verify that the printer requirements are met or may connect to the 3D printer to verify the requirements. If all the conditions required to complete the transaction are met, the smart contract may provide the currency to the knowledge provider (and any other licensors) and may perform any other actions, such as releasing the digital knowledge to the 3D printer (or another device), broadcasting a block to the distributed ledger verifying the transaction and/or recording the serial number in the distributed ledger. The 3D printer may receive the 3D printing instructions and may print the product in accordance with the 3D printing instruction set.

In embodiments, the knowledge distribution system 16802 may be deployed on or integrated with or within a set of infrastructure capabilities, such as cloud computing infrastructure, platform-as-a-service infrastructure, Internet of Things platform capabilities, distributed database capabilities, data management platform infrastructure, enterprise database resources (including cloud and on premises resources), and the like. In embodiments, the knowledge distribution system 16802 may use or integrate with or within various services, such as identity management services, information management services, digital rights management services, information rights management services, cryptographic services, key management services, distributed database services, and many others.

Referring to FIG. 174, in embodiments, the knowledge distribution system 16802 may provide one or more collaboration APIs 17474 for facilitating collaboration between users. The collaboration APIs may be configured to allow users to provide and share information to establish a shared set of data resources for collaboration, such as to provide a shared "ground truth" as to underlying facts, to establish a set of alternative views regarding the underlying facts (e.g., to identify where there may be disagreement as to the ground truth or the absence of information that is needed to establish shared understanding), to facilitate management of a set of scenarios with respect to which collaboration is desired, to facilitate a set of simulations relating to topics of interest for collaborators, to facilitate controlled access to shared and non-shared knowledge elements, and/or to allow users to provide, verify, and/or share information outside of enterprise firewalls. The collaboration API 17474 may be configured to allow users and/or parties to provide, receive, share, and/or verify information, such as the digital knowledge 16804, information related to the digital knowledge 16804, information related to transactions performed via the distributed ledger 16808, via one or more smart contracts 16840, via the marketplace system 17454, and the like. The APIs may be configured to allow for sharing of information privately, publicly, or a combination thereof. Information shared via the APIs, or events or transactions relating thereto, may be stored on the distributed ledger 16808 and thereby be distributed across the nodes 16916 of the distributed ledger. The users may include the knowledge providers 16806, the knowledge recipients 16818, the crowdsources 16836, the users and/or parties to the distributed ledger 16808 and/or the digital marketplace 17456, and the like.

In some embodiments, the collaboration API 17474 may include operational and/or situational knowledge that may be captured by the knowledge distribution system 16802. The collaboration API 17474 may be configured to process the situational knowledge and transmit the situational knowledge and/or interpretations of the situational knowledge to the ledger management system 16910. The ledger management system 16910 may be configured to store the situational knowledge and/or interpretations of the situational knowledge on the distributed ledger 16808. An example of situational knowledge is data regarding current condition, state, and/or location of a piece of collateral related to an instance of the digital knowledge 16804 and/or related to a smart contract 16840. Another example of situational knowledge is a state of completion of a work-in-progress that is subject to a transaction, a term of payment and/or lending triggered by completion of an item (e.g., an instance of the digital knowledge 16804) to a certain stage of completion.

In embodiments, the smart contract system 16868 may include one or more transaction frameworks 17476 configured to facilitate managing transactions via the smart contracts 16840. The transaction frameworks 17476 may include one or more data structures, routines, subroutines, and the like configured to assist in management of transactions, such as by automatically importing, exporting, sorting, configuring, handling, or otherwise processing data related to transactions handled via the knowledge distribution system 16802. The smart contract system 17068 may be configured to include one or more transaction frameworks 17476 related to billing, payments, reporting, auditing, reconciliation, and/or the like.

In embodiments, each of the transaction frameworks 17476 may be configured to facilitate management of one or more particular types of transactions. Examples of types of transactions and related data of which one or more of the transaction frameworks 17476 may be configured to facilitate management include purchase/sale, lending/leasing, rental, licensing, resource/time sharing, service contracts, maintenance/repair, warranty, guaranty, insurance, profit/revenue sharing, manufacturing (optionally tiered), resale/distribution (optionally tiered), demand aggregation, forward market/futures transactions, and conditional/contingent contracts, among others, including any of the many types describe in this disclosure and the documents incorporated herein by reference. For example, in a tiered distribution contract framework, the transaction framework 17476 may be configured to use the distributed ledger 16808 and the smart contract 16840 to allocate one or more of payments, commissions, and costs in a granular manner. In another example, in a contingent contract framework, the transaction framework 17476 may be configured to use the distributed ledger 16808 and the smart contract 16840 to manage one or more of options, futures, emergent events, and the like. Other examples of smart contract frameworks 17476 include those configured to manage commissions, incentive payments, payments for milestones (e.g., partial work, delivery partway through a supply chain, etc.), and escrows.

In embodiments, one or more of the transaction frameworks 17476 may be configured to facilitate management of the smart contracts 16840 in situations in which there are issues with performance by one or more parties to an agreement. Issues with performance may include, for example, breach of contract, failure to pay, late payment, poor performance, poor quality goods, failure to perform services, and the like. Remedies for issues that may be encoded in the transactional frameworks 17476 may include pulling functionality, loss of license, ramping down of performance, financial penalties (e.g., loss of tokens or currency) and the like.

In embodiments, the transaction framework 17476 may facilitate using the distributed ledger 16808 and the smart contract 16840 to allocate risk and liability in a granular manner. The knowledge distribution system 16802 may be configured to import sensor data from one or more sensors, such as IoT sensors. The sensor data may include single sensor data, multiple sensor data, fused sensor data (e.g., where results from two or more sensors are joined, such as by multiplexing, by computation, or the like), raw sensor data, normalized sensor data (such as to allow comparison to a scale, such as a quality scale, a condition scale, or the like), calibrated sensor data (such as to allow comparison to other sensors on an accurate basis), and others. In embodiments, the sensor data may indicate the state or condition of a physical item or its environment at a point in time or over a period of time, such as its temperature, the ambient temperature of the environment in which it is located, environmental humidity, movements of the item (such as resulting from impacts, vibration, transport, or the like), exposure to heat, exposure to radiation, exposure to chemicals (including particulates, toxins, and the like), bearing of loads, bearing of weight, exposure to stress, exposure to strain, exposure to impacts, damage (such as dents, deformations, deflections, disconnects, breaks, cracks, shatters, tears and many others), exposure to biological factors (including pathogens), extent of progressive damage (such as rust), and other factors. In embodiments, the sensor data may indicate the presence or absence of activities or workflows related to an item, such as where sensor data indicates fluid levels (e.g., oil or other lubrication, fuels, antifreeze, and other fluids, which indicate whether required maintenance, such as an oil change, has been timely performed), levels of particulates or other matter (such as dirt, grime, sand particles, and many others, which may indicate whether required cleaning has occurred), levels of rust, and many others. In various embodiments, the imported sensor data may allow the smart contract system 17068 to allocate related to performance, lack of performance, utilization, deterioration, wear-and-tear, damage, maintenance activity, or other relevant factors that may be attributed to individual parts of a tiered manufacturing system (including individual machines, equipment items, devices, component parts, or the like) to particular related parties via the transaction framework 17476. As one example among many, a series of parties in possession of an item may be allocated responsibility for depreciation, deterioration, or other reduction in its value based on their measured activities with respect to its caretaking, such as the environmental conditions in which it was stored and the presence or absence of required maintenance activities, such as fluid changes, cleaning, and the like. For example, a party that stored the item in pristine conditions at specified temperatures and replaced fluids according to a defined schedule might be assigned a moderate number of points (or other metrics), while a party that stored the item outdoors in poor conditions might be assigned a much higher number of points, in automatically allocating responsibility for the replacement of the item by a smart contract. Similarly, a party whose actions or lack of actions can be directly measured as causing damage (e.g., the item was dropped and dented while in the party's possession), may be automatically allocated responsibility for the damage. Thus, a sensor-enabled smart contract may track and allocate responsibility for conditions and activities involving a physical item across its lifetime, including among parties that share or transfer possession of the item, share use of the item, or the like. Shared use or possession over the lifetime may include situations of tiered manufacturing, such as where component parts are progressively configured into an overall system by a set of parties. In such a situation, a smart contract may use sensor data collected throughout manufacturing to determine responsibility for a failure of an item (e.g., a manufacturing defect) based on what part of the item failed and/or why an item failed (such as due to a problem in the manufacturing chain). Shared use of possession may also include "shared economy" situations, such as shared use of property (including rooms, office space, homes, apartments, real estate, vehicles, electronic devices, and many others), where a smart contract may allocate responsibility for damage, maintenance (or lack thereof), cleaning, and other factors based on sensor data collected over the lifetime of the shared item. In embodiments, the smart contract framework 17476 may also provide for inclusion of indemnity clauses and more complex causes allocating liability and/or limitation thereof (including exceptions to the same) which may include factors related to the sensor data collected over time as noted above. For example, a smart contract may limit a manufacturer's liability for defects to a period (e.g., ninety days, one year, or the like) but the smart contract may embody an exception for hidden defects (e.g., ones that were present but did not manifest during the warranty period). Sensor data may indicate whether a defect was manifested or not during the base warranty period and automatically determine whether a warranty claim asserted after the period is valid. In embodiments, such a smart contract may further allocate, and optionally execute a transfer of value, such as currency, upon determination of the ultimate responsibilities among parties, such as where one party has indemnified another for a type of liability. In embodiments, a smart contract may be configured to perform a computation and allocation of net liability among multiple parties to a contract that involves indemnification by one or more parties of another. In embodiments, such a smart contract may consume sensor data that is used to determine the extent of liability to be allocated to each party (e.g., where a party's actions or inactions may result in sensed changes of the condition of an item that may trigger greater responsibility for indemnification of others). In embodiments, such a smart contract may automatically credit or debit an account, trigger a transfer of value, or the like.

In embodiments, the transaction framework 17476 may facilitate using the distributed ledger 16808 and the smart contract 16840 to allocate payments, commissions, costs, and the like in a granular manner. The transaction framework 17476 may facilitate inclusion in the smart contract 16840 and management by the smart contract 16840 of one or more parties to a set of distribution agreements, value added reseller agreements, manufacturer agreements, sub-distributor agreements, sub-licensee agreements, payment agreements, servicing agreements, maintenance agreements, update agreements, upgrade agreements, rental agreements, resource sharing agreements, item-sharing agreements, warranty agreements, insurance agreements, lending agreements, indemnification agreements, guarantee agreements, and the like.

In embodiments, the transaction framework 17476 may facilitate management and/or execution of contingent contracts via the distributed ledger 16808 and the smart contract 16840. The contingent contracts may include clauses whereby a provision of a good, service, payment, and the like is contingent on one or more triggering events taking place. For example, admission tickets for a sporting event may be sold to a fans of a plurality of sports teams, with validity of the ticket and/or the related transaction being contingent on the team of which the fan is a fan of being eligible to participate in the sporting event. In embodiments, the transaction framework 17476 may have one or more data collection facilities, such as web crawlers, spiders, clustering systems, sensor data collection systems, services, APIs, or the like that collect data indicating the presence or absence of a triggering condition for the contingent contract, such as, in the example of an event-triggered contract, a system that searches for the existence of an event involving a particular performer, player, or team (among others) in an event, and the smart contract may automatically handle the allocation of rights that are triggered by the occurrence of the event. For example, where the right to attend the Super Bowl (or other game) is triggered by a particular team's presence in the game (or in similar examples where an attendance right is triggered by emergence or realization of a desired instance of a type of event), the smart contract transaction framework 17476 may automatically determine (such as via a search engine or other capability operating on news data sources) the triggering event (e.g., that a given team won a conference championship game resulting in becoming a participant in the league championship, or other similar example, or the a particular performer or group has announced a date and place for a concert tour or other performance). Further, the smart contract transaction framework 17476 may trigger a set of actions upon the automatic determination of the instance of the triggering event, such as transferring ticket rights to parties for whom the rights vest upon the event, informing other parties that their contracts are closed (i.e., that there remains no possibility of the event occurring under the defined conditions for those parties, such as holders of rights related to teams that did not make it to the championship games), allocating consolation prizes to losing parties, triggering other smart contracts (such as smart contracts that allocate provision of related goods and services, such as travel and transportation services (e.g., automatically securing airline tickets based on the location of the ticket holder and the location of the game, automatically securing a rental car, and the like), hospitality services (e.g., automatically securing a hotel reservation in the city of the game for a fan that does not live in the city, automatically securing reservations for meals, and the like).

In embodiments a smart contract for an event embodying automatic detection of triggers for contingencies related to the emergence or realization of an instance of an event, and embodying automatic allocation of rights (such as attendance rights, travel and hospitality rights, and the like) based on the triggers may include, take input from, use, connect with, link to, and/or integrate with a set of intelligent agents, such as using any of the artificial intelligence, machine learning, deep learning, and other techniques described herein or in the documents incorporated by reference herein, including robotic process automation trained and/or supervised by human experts. The set of intelligent agents may include ones that are trained, for example, (a) to determine and manage a set of possible events (such as what teams could be involved in what games at what locations and what points in time across a set of leagues, sports, locations and the like), including expanding or pruning the list based on game results and other factors (e.g., where teams fall out of contention for playoff spots, rendering previously possible games impossible); (b) to forecast probabilities of likelihood of instances of event based on current and historical data (e.g., the likelihood that a game will occur between two particular teams, the likelihood that a performer will hold a concert at a given location (or within a geofence) during a date range, or the like); (c) to generate and configure a smart contract that governs allocation of rights subject to contingencies, including setting parameters for the launch (e.g., by auction, by lottery, by "drop" or the like) of a marketplace or other venue by which parties may enter into the smart contract for the contingent event; (d) to forecast demand for an instance of a contract (e.g., demand for Final Four tickets in New Orleans if University of Kentucky is playing; or demand for Elton John tickets in Paris during Q3 of a given year; among many others) based on a given type of contingent event, such as based on historical demand for similar events (optionally using various clustering and similarity techniques operating on historical attendance data, secondary market ticket data and other data sets), expressed demand (including demand expressed in demand aggregation contracts, such as where some users have purchased options for the event or similar events), historical data on contingent smart contracts for similar items or services, secondary indicators of demand (such as search engine metrics, social media metrics and the like) and many others; (e) to set initial pricing for events, including based on the forecast demand and historical pricing data for underlying events (e.g., ticket prices, secondary market prices and activity levels, time required to sell out tickets and the like) and for other contingent event contracts; (f) to manage allocation of smart contracts, such as in tranches of release; (g) to collect and manage party-specific factors and user profiles, such as understanding location factors (e.g., place of residence, place of work), affinity and loyalty factors (favorite teams, favorite restaurants, favorite airlines, favorite hotel chains, favorite types of food, and others), and others; (h) to manage matching of party-specific factors and user profiles to contingent events (such as to find and present smart contract opportunities that fit a user's profile, such as ones involving possibilities of attending events with a favorite team, player or performer involved); and (i) to manage discovery and presentation of, and configuration of parameters for, smart contracts that embody other goods and services that may be paired with a contingent event smart contract (such as automatically finding and matching an appropriate airline flight, train reservation, bus ticket or the like and configuring a contingent smart contract for the same between the transportation provider and the prospective event ticket holder; automatically finding and matching an appropriate hotel reservation and configuration a smart contract hotel reservation between the prospective ticket holder and the hotel provider, or creating similar contingent smart contracts among providers and prospective ticket holders for other travel, accommodations and hospitality packages, such as restaurant reservations, rental cars, and many others); among others. Thus, the set of AI-enabled intelligent agents may provide automation of various capabilities for enabling the creation, hosting, provisioning and resolution of a marketplace for contingent event smart contracts.

In embodiments, the transaction framework 17476 may facilitate demand aggregation via the distributed ledger 16808 and the smart contract 16840. The transaction framework 17476 may aggregate demand for one or more products and/or services accumulated via analytics, commitments, options, or any other suitable source. Upon accumulation of demand, such as by a demand metric meeting a demand threshold, the smart contract 16840 may trigger to begin design, manufacturing, distribution, and/or the like of the related product and/or service. In embodiments, a set of intelligent agents, using various AI capabilities noted above, may be configured facilitate demand aggregation, including agents that may (a) forecast demand for an instance or type of product, such as based on various secondary indicators of demand, such as search engine metrics, chat activity (e.g., in relevant forums), event information (such as attendance at relevant industry events), social media information (such as numbers of posts), product sales, historical selling times (e.g., time from product launch to selling out of a product), and many others; (b) aggregate demand, such as by configuring a set of smart contracts by which parties commit to purchasing an item upon its instantiation, such as during a given time window within a given price range and determining a total aggregate demand; (c) projects the cost a demand-aggregated offering, such as based on a model (optionally itself managed and/or created by an intelligent agent) that indicates the projected cost of an item at various volumes of production, optionally based on a projection or model of the likely component parts and cost thereof, as well as other costs, such as assembly, transportation, financing, warranty and the like; (d) projects the price of the demand-aggregated item at various volumes of offering, such as based on the forecast demand and historical pricing; (e) forecasts the profit likely to be associated with offering the demand-aggregated item at various volumes of production and/or at various points in time, such as using the forecasted demand, cost and pricing information; and the others. Thus a demand aggregation marketplace may be enabled and/or supported by automation capabilities provided by the set of intelligent agents.

In embodiments, the smart contract system 16868 may be configured to import patterns of implementation and/or systems building knowledge into one or more of the transaction frameworks 17476. The patterns of implementation and/or systems building knowledge may include, for example, knowledge systems, workflow, product management, support calls, human interaction, social media, redundant systems, data storage, and implementation patterns at scale. The smart contract system 16868 may automatically configure the smart contracts 16840 to implement the imported patterns of implementation and/or systems building knowledge. The imported patterns of implementation and/or systems building knowledge may be stored in the datastore 16858.

In some embodiments, the knowledge distribution system 16802 may include an artificial intelligence (AI) system 17480 in communication with the ledger management system 16910 and/or the smart contract system 17468 and configured to perform AI-related tasks according to a machine learned model. The AI system 17480 may be configured to perform actions with respect to the knowledge distribution system 16802 to manage the digital knowledge 16804. The AI system 17480 may have permission and access rights to manage, use, and interact with systems of the knowledge distribution system 16802 similarly to a user.

In embodiments, the AI system 17480 may be trained by one or more transaction experts to develop the machine learned model by which the AI system 17480 operates to perform AI-related functions. Examples of transaction experts that may at least partially train the AI system 17480 include agents, brokers, traders, attorneys, financial advisors, auditors, accountants, bankers, marketers, advertisers, exchange operators, buyers, sellers, distributors, and manufacturers/developers. The AI system 17480 may be trained by any suitable machine learning algorithm, and by any suitable training data set. Examples of machine learning algorithms include supervised learning, unsupervised learning, semi-supervised learning, reinforcement learning, self-learning, feature learning, sparse dictionary learning, anomaly detection, robot learning, and association rules. The machine learned model may be any suitable type of model, such as an artificial neural network, a decision tree, a support vector machine, a regression analysis model, a Bayesian network, or a genetic algorithm.

In embodiments, the AI system 17480 may be trained to identify opportunities for smart contracts. Examples of opportunities include exchange opportunities and arbitrage opportunities.

In embodiments, the AI system 17480 may be trained to configure market contract terms and conditions.

In embodiments, the AI system 17480 may be trained to monitor market conditions.

In embodiments, the AI system 17480 may be trained to monitor and manage contract terms and conditions. Monitoring and managing contract terms and conditions may include monitoring goods and/or observing services.

In embodiments, the AI system 17480 may be trained to monitor and manage transaction processes. For example, the AI system 17480 may be trained to recognize release of funds from an escrow account.

In embodiments, the AI system 17480 may be trained to monitor counter-party information. Examples of counter-party information include solvency, and status of performance, and quality of performance.

In embodiments, the AI system 17480 may be trained to identify transaction opportunities. Examples of transaction opportunities include instances of exchange and arbitration opportunities.

In embodiments, the AI system 17480 may be trained to negotiate on behalf of parties to transactions involving digital knowledge.

In embodiments, the AI system 17480 may be configured to configure and execute auctions. The AI system 17480 may perform auction-related actions such as selecting a type of auction suitable for a transaction and/or settings rules and parameters for an auction to be at least partially carried out on the distributed ledger 16808. The auctions selected may be any suitable type of auction for being at least partially carried out on the distributed ledger 16808, such as a Dutch auction or a reverse auction.

In embodiments, the AI system 17480 may be configured to distribute currency tokens and/or tokenized digital knowledge 16804.

In embodiments, the AI system 17480 may be configured to configure and manage exchange of the digital knowledge 16804 across different marketplaces and exchanges. The AI system 17480 may set exchange rates between native currencies of exchanges and/or may tokenize the digital knowledge 16804 and set exchange rates between instances of the tokenized digital knowledge 16804.

In embodiments, the AI system 17480 may be configured to establish, monitor, and/or negotiate payment, leasing, and/or lending options related to management of the digital knowledge 16804. The lending options may include payment plans, trust-less scenarios, and/or non-trust-less scenarios.

In embodiments, the knowledge distribution system 16802 may include a robotic process automation (RPA)

system 17482 in communication with the AI system 17480 and configured to improve one or more functions of the AI system 17480. The RPA system 17482 may use robotic process automation techniques to allow the AI system 17480 to interface with one or more of systems of the knowledge distribution system 16802, the distributed ledger 16808, and systems, marketplaces, and/or exchanges and the like external to the knowledge distribution system 16802 by performing actions in one or more graphical user interfaces of the knowledge distribution system 16802, the distributed ledger 16808, and systems, marketplaces, and/or exchanges and the like external to the knowledge distribution system 16802.

In embodiments, the knowledge distribution system 16802 may include a rights management system 17484 configured to manage rights of users apart from an exchange or marketplace.

In embodiments, the knowledge distribution system 16802 may include a market management system 17486 configured to establish a market for selling and/or reselling currency tokens and/or instances of the digital knowledge 16804. The market may be configured such that wrapped and/or tokenized instances of the digital knowledge 16804 may be resold without being unwrapped. The market may be established and configured as a spot market, a secondary market, and/or a futures/derivatives market. Futures and derivatives resold on the futures/derivatives market may include options, futures, and other derivatives. The knowledge distribution system 16802 may establish and/or monitor secondary markets, ancillary markets, forward markets, and the like in addition to resale markets for digital currency and instances of the digital knowledge 16804.

In embodiments, the market management system 17486 may be configured to monitor metrics of users, buyers, and/or sellers participating in one or more markets established by the market management system 17486. The metrics may include, for example, metrics indicating how, where, or how often an instance of the digital knowledge 16804 is used. The metrics may alternatively or additionally include metrics regarding creation of the digital knowledge 16804, duration during which a given type of digital knowledge 16804 remains relevant or valuable, and/or metrics regarding transaction patterns. Examples of transaction patterns include size of transaction, transaction pricing and trends thereof, profile information of buyers, sellers, consumers, users, and/or creators of the digital knowledge 16804, and the like. Another metric additionally or alternatively monitored by the markets system may include metrics indicative of gaming and/or misconduct by users of the market.

In embodiments, the digital knowledge 16804 may include instruction sets such as: process steps in food production or food preparation instructions (e.g., for industrial food preparation), additive manufacturing/3D printing instructions, instruction sets for surgical robots and human/robot interfaces generally, crystal fabrication system instructions, crystal fabrication process instructions, polymer production process instructions, chemical synthesis process instructions, coating process instructions, semiconductor fabrication process instructions, silicon etching instructions, doping instructions, chemical vapor deposition instructions, biological production process instructions, smart contract instructions, and/or instructions for establishing, updating, and/or verifying a chain of work, possession, title, and the like.

In embodiments, the digital knowledge 16804 may include code, software, and/or logic, such as: algorithmic logic, instruction sets for use in an application, executable algorithmic logic, computer programs, firmware programs, instruction sets for field-programmable gate arrays, instruction sets for complex programmable logic devices, serverless code logic, cryptography logic, AI logic, AI definitions, machine learning logic and/or definitions, and/or quantum algorithms.

In embodiments, the digital knowledge 16804 may include digital documents, such as digital documents relating to: part schematics, production records (e.g., for aircraft parts, spaceship parts, nuclear engine parts, and the any/or any other suitable part), automobile parts, airplane parts, pieces of furniture or components thereof, replacement parts for industrial robots or machines, trade secrets, and/or other intellectual property such as know-how, patented material, and/or works of authorship.

In embodiments, the digital knowledge 16804 may include 3D printing schematics, such as schematics for printing medical devices, automobile parts, airplane parts, furniture, furniture components, and/or replacement parts for industrial robots or machines.

In embodiments, the digital knowledge 16804 may include personal and/or professional knowledge relating to one or more organizations and/or individuals. The personal and/or professional knowledge may include: professions resumes, professional history tracking information, records of professional credentials, academic degrees, professional certificates, verifications of professional positions held by one or more individuals, professional feedback, verification of work performed by one or more individuals and/or parties, personal financial history, business financial history, and/or personal life achievements as verified by one or more third parties.

In some embodiments, the digital knowledge 16804 may include data sets and/or sensor information defining and/or population a set of digital twins. The digital twins may embody one or more instances of the digital knowledge 16804 relating to one or more physical entities. The one or more instances of the digital knowledge 16804 may include knowledge related to one or more of configurations, operating modes, instructions sets, capabilities, defects, performance parameters, and the like.

In embodiments, the knowledge distribution system 16802 may be configured to transmit instances of the digital knowledge 16804 to and/or receive instances of the digital knowledge 16804 from one or more external knowledge exchanges and/or knowledge databases. The external knowledge exchanges and/or knowledge databases include domain-specific exchanges, geography-specific exchanges, and the like. The knowledge distribution system 16802 may be configured to facilitate exchange of valuable or sensitive instances of the digital knowledge 16804 related to the subject matter of the external knowledge exchange and/or knowledge database. Additional or alternative examples of external knowledge exchanges and/or databases may include stock exchanges, commodities exchanges, derivative exchanges, futures exchanges, advertising exchanges, energy exchanges, renewable energy credits exchanges, cryptocurrency exchanges, bonds exchanges, currency exchanges, precious metals exchanges, petroleum exchanges, goods exchanges, services exchanges, or any other suitable type of exchange and/or database. The knowledge distribution system 16802 may integrate and/or communicate with interfaces of external knowledge exchanges and/or databases, such as APIs connectors, ports, brokers. The integration and/or communication may be facilitated via one or more of extraction, transformation, and loading (ETL) technologies, smart contracts, wrappers, tokens, containers, and the like.

In embodiments, the knowledge distribution system 16802 may be deployed on and/or integrated with or within a set of infrastructure capabilities. Examples of infrastructure capabilities include cloud computing infrastructure, platform-as-a-service infrastructure, Internet of Things platform capabilities, distributed database capabilities, data management platform infrastructure, enterprise database resources (including cloud and on premises resources), and the like.

In embodiments, the knowledge distribution system 16802 may use and/or integrate with or within various services. Examples of services with which or within which the knowledge distribution system 16802 may integrate include identify management services, information management services, digital rights management services, information rights management services, cryptographic services, key management services, distributed databased services, and the like.

Referring to FIG. 175, knowledge distribution system 17500 for controlling rights related to digital knowledge is depicted. The knowledge distribution system 17500 may include an input system 17802, a tokenization system 17812, a ledger management system 17818, and a smart contract system 17824. In some embodiments the knowledge distribution system 17500 may further include a smart contract generator 17858, an execution system 17510, a reporting system 17514, and a crowdsourcing module 17516.

The input system 17802 receives digital knowledge 17808 from a user 17502 and the tokenization system 17812 may tokenize the received digital knowledge 17808 resulting in a token/tokenized digital knowledge 17814 that is manipulable as a token.

The ledger management system 17818 creates and manages one or more distributed ledgers 17820, where a distributed ledger may include a plurality of cryptographically linked blocks distributed over a plurality of nodes of a network 17848 as described elsewhere herein. The ledger management system 17818 may then store a smart contract(s) 17822 and the tokenized digital knowledge 17814 in a distributed ledger 17820.

A smart contract system 17824 may implement and manage a smart contract 17822 which may include the tokenized digital knowledge 17814, a triggering event 17828, and a smart contract action 17830. Upon occurrence of a triggering event 17828, the smart contract system 17824 may perform the smart contract action 17830. The smart contract system 17824 may process commitment(s) 17832 of parties 17532 to the smart contract 17822. The smart contract system 17824 may manage rights 17540 including control rights 17840 over the tokenized digital knowledge 17814 and access rights 17842 regarding who can view, edit, access, or use the tokenized digital knowledge 17814. The smart contract 17822 further comprises a smart contract wrapper 17503. The knowledge distribution system 17500 further comprises an account management system 17505, a user interface system 17507, and a marketplace system 17509.

As depicted in FIG. 180, the tokenized digital knowledge 17814 may include executable algorithmic logic 18002, a 3D printer instruction set 18004, an instruction set for a coating process 18008, an instructions set for a semiconductor fabrication process 18010, a firmware program 18012, an instruction set for a field-programmable gate array (FPGA) 18014, serverless code logic 18018, an instructions set for a crystal fabrication system 18020, an instruction set for a food preparation process 18022, an instruction set for a polymer production process 18024, an instruction set for a biological production process 18030, a data set for a digital twin 18032, an instruction set to perform a trade secret 18034, intellectual property 18038, an instruction set 18040, or the like. In embodiments, where the tokenized digital knowledge 17814 includes intellectual property 18038, the smart contract system 17824 may embed intellectual property licensing term(s) 18802 for the intellectual property 18038 in the distributed ledger and, in response to a triggering event 17828, update the access rights 17842 to provide access to the intellectual property 18038 or process a commitment 17832 of a party 17532 to the smart contract 17822 and the corresponding intellectual property licensing term(s) 18802.

In embodiments, the smart contract 17822 may include a smart contract wrapper 17503 which may add intellectual property 18038 to a stack of intellectual property which may be on the distributed ledger 17820 and commitment 17832 by one or more parties 17532 to: an apportionment of royalties for the added intellectual property 18804. The smart contract wrapper 17503 may record, in a distributed ledger, a commitment 17832 by one or more parties 17532 to: an apportionment of royalties for the aggregate stack of intellectual property 18804, or a contract term 18810.

In embodiments the ledger management system 17818 may include a logging system 17512 to store logged data in the distributed ledger 17820. In embodiments, the digital knowledge 17808 may be an instruction set and the ledger management system 17818 may provide provable access to the instruction set and execute the instruction set on a system. Providing provable access may include logging or recording data in at least one of the plurality of cryptographically linked blocks. Provable access may include: aggregating views of a trade secret into a chain that records which knowledge recipients have viewed the trade secret 18814 on the distributed ledger; recording a party who has contributed to the digital knowledge, by logging data related to the party, logging access transactions to an instance of digital knowledge 18830; recording, a source of an instance of the digital information by storing data related to the source, The knowledge distribution system 17500 may include a reporting system 17514 to report analytic data or an analytic response(s) 18834 based on a plurality of operations performed on the distributed ledger, or on the tokenized digital knowledge. The reporting system 17514 may also analyzed the tokenized digital knowledge 17814 and report the analytic result 18832.

In an embodiment, the smart contract system 17824 may aggregate a set of instructions into an instructions set 18040, add an instruction to pre-existing instructions set to provide a modified instruction set 18040, manage allocation of instruction subsets 18042 to the distributed ledger, manage access to the instruction to the instruction sets based on access rights 17842, or the like.

In embodiments the ledger management system 17818 may include a crowdsourcing module 17516 to obtain crowdsourced information 18602 which may then be stored in the distributed ledger. crowdsourced information 18602 may include: a review of an instance of the digital knowledge 18824, a signature related to an instance of crowdsourced information 18826, a verification of an instance of the digital knowledge 18828, and the like.

In embodiments, the knowledge distribution system 17500 may include a private network system to enable a private network and allow authorized parties to establish a cryptography-based consensus requirement for verification of new cryptographically linked blocks to be added to the plurality of cryptographically linked block. In embodiments, the ledger management may establish cryptocurrency tokens designed to be tradeable among users of the distributed ledger.

In embodiments, the knowledge distribution system 17500 may include an account management system 17505 to facilitate creation and management of a plurality of user accounts 19094 corresponding to a plurality of users 17502, 19004 of a knowledge distribution system 17500. The user account data may be stored on the distributed ledger.

In embodiments, the knowledge distribution system may include a user interface system 17507, 19074 to present a user interface 19093 to a user(s) 17502, 19004 which enables the user to view data related to an instance of the digital knowledge.

In embodiments, the knowledge distribution system may include a marketplace system 17509 to establish and maintain a digital marketplace 19090 and visually present data corresponding to an instance of the digital knowledge to a user of the knowledge distribution system.

In embodiments, the knowledge distribution system may include a datastore in communication with the distributed ledger where the datastore may include a knowledge datastore configured to store data related to the digital knowledge, client datastore is configured to store data related to a plurality of users of the knowledge distribution system, smart contract datastore is configured to store data related to the smart contract, and the like.

In embodiments, the knowledge distribution system 17500 may include a smart contract generator 17858 to generate a smart contract using a parameterizable smart contract template. Smart contract parameters may be based on a type of digital knowledge to be tokenized and may include a financial parameter, a royalty parameter, a usage parameter, an output produced parameter, an allocation of consideration parameter, an identity parameter, an access condition parameter, or the like.

Referring to FIG. 176, a computer-implemented method for controlling rights related to digital knowledge is depicted. In embodiments, a distributed ledger is created and managed (Step 17602) where the distributed ledger may include a plurality of blocks linked via cryptography distributed over a plurality of nodes of a network as shown elsewhere herein. A smart contact may be implemented and managed (step 17604). A smart contract may include a triggering event, a corresponding smart contract action, and the like. The smart contract may be stored on the distributed ledger. An instance of digital knowledge may be received (step 17608) The digital knowledge may be tokenized (step 17610) and the resulting tokenized digital knowledge stored via the distributed ledger (step 17612). Commitments of a plurality of parties to the smart contract may be processed (step 17614) and rights of control or and access to the tokenized digital knowledge may be managed according to the smart contract (step 17618). In response to an occurrence of the triggering event, the corresponding smart contract action may be performed with respect to the tokenized digital knowledge (step 17620).

Referring to FIG. 177, an embodiment of a computer-implemented method for controlling rights related to digital knowledge is depicted. The computer-implemented method may further include orchestrating, based on the smart contract, an exchange of new digital knowledge for the tokenized digital knowledge (step 17702). The method may also include integrating the knowledge exchange with a separate exchange, wherein the knowledge exchange facilitates an exchange of at least one of valuable and sensitive knowledge related to a subject matter of the separate exchange (step 17704).

Referring to FIG. 178, a knowledge distribution system 17800 for controlling rights related to digital knowledge is depicted. In embodiments, the knowledge distribution system 17800 may include an input system 17802, a tokenization system 17812, a ledger management system 17818, a smart contract system 17824, an event monitoring module 17850, and a smart contract generator 17858. The input system 17802 receives information 17862 and digital knowledge 17808 from a knowledge provider device 17804 and the tokenization system 17812 may tokenize the digital knowledge 17808 resulting in a token/tokenized digital knowledge 17814 that is manipulable as a token.

As depicted in FIG. 180, the tokenized digital knowledge 17814 may include executable algorithmic logic 18002, a 3D printer instruction set 18004, an instruction set for a coating process 18008, an instructions set for a semiconductor fabrication process 18010, a firmware program 18012, an instruction set for a field-programmable gate array (FPGA) 18014, serverless code logic 18018, an instructions set for a crystal fabrication system 18020, an instruction set for a food preparation process 18022, an instruction set for a polymer production process 18024, an instruction set for a biological production process 18030, a data set for a digital twin 18032, an instruction set to perform a trade secret 18034, intellectual property 18038, an instruction set 18040, and the like.

In some embodiments, the digital knowledge may include a 3D printer instruction set for 3D printing an object such as a custom part, a custom product, a manufacturing part, a replacement part, a toy, a medical device, a tool, or the like. As depicted in FIG. 179, the 3D printer instruction set for 3D printing an object 17810 may include a 3D printing schematic 17902, an origin 17904, a date of creation 17908, a name of a contributing individual 17910, name of a contributing group 17912, name of a contributing company 17914, a price 17918, a market trend for a related schematic 17920, a serial number 17922, a part identifier 17924, or the like.

The ledger management system 17818 creates and manages one or more distributed ledgers 17820, where a distributed ledger may include a plurality of a series of cryptographically linked blocks distributed over a plurality of nodes of a network 17848 as described elsewhere herein. The ledger management system 17818 may then store smart contracts 17822 and the tokenized digital knowledge 17814 in a distributed ledger 17820.

The smart contract system 17824 may implement and manage a smart contract 17822 where the smart contract 17822 may include one or more triggering events 17828 and corresponding smart contract actions 17830. The smart contract system may manage rights 17861, such as control rights 17840 and access rights 17842, to the tokenized digital knowledge 17814 according to the smart contract 17822. The smart contract system may process commitments of the knowledge provider 17834 and a knowledge recipient 17838 of the 3D printer instruction set for 3D printing an object 17810.

In response to an occurrence of a triggering event 17828, the smart contract system 17824 may perform the corresponding smart contract action 17830 and manage the smart contract action 17830 according to a condition 17844 and the triggering event 17828. The triggering event may be a transfer of the 3D printer instructions or use of the 3D printer instructions and the smart contract action may, based on the rights of control 17840 and access rights 17842, modify on the distributed ledger, when the 3D printer instruction set is purchased, downloaded, or used. As depicted in FIG. 181, a smart contract action 17830 may include: assigning a serial number to the object that is 3D printed 18108, monitoring for the triggering event 18110, verifying fulfillment of an obligation based on the condition 18112, verifying payment or transfer of the tokenized digital knowledge 18114, logging one or more transactions in the distributed ledger 18118, transferring the tokenized digital knowledge, performing one or more operations with respect to the distributed ledger 18120, creating new or more new blocks in the distributed ledger 18112, verifying that the condition is met 18124, generating a payment request of the knowledge recipient 18128, modifying on the distributed ledger when the 3D printer instruction set is purchased, downloaded, or used 18130, or the like. A smart contract action 17830 may include: receiving a purchase request from a knowledge recipient device 18102, fulfilling a purchase request from a knowledge recipient device 18104, verifying that the conditions is met when the condition is a printer requirement, a payment received, a currency transferred from a knowledge recipient device or the knowledge recipient, a transfer of the tokenized digital knowledge to the knowledge recipient device, and the like. As depicted in FIG. 182, a condition 17844 may include a printer requirement 18202, a payment received 18204, a currency transferred from a knowledge recipient or knowledge recipient device 18208, a transfer of the tokenized digital knowledge to the knowledge recipient or knowledge recipient device 18210, or the like.

Referring to FIG. 183, possible rights 17861 of control of and access to the tokenized digital knowledge may include at least one of permission for a user to 3D print using multiple instances of the 3D printer instruction set 18302, a 3D printer requirement 18304, a time period during which the object can be 3D printed 18308, whether the tokenized digital knowledge is transferred to a downstream knowledge recipient 18310, warranty 18312, disclaimer 18314, indemnification 18318, or certification with respect to the object 18320.

Referring to FIG. 184, possible triggering events 17828 may include transfer of the 3D printer instructions 18402 or us of the 3D printer instructions 18404.

Referring to FIG. 185, a computer-implemented method 18500 for controlling rights related to digital knowledge is depicted. In embodiments, the method may include creating and managing a distributed ledger, wherein the distributed ledger comprises a plurality of blocks linked via cryptography distributed over a plurality of nodes of a network (step 18502). A smart contract may be implemented and subsequently managed (step 18504). The smart contract may include a triggering event and be stored in the distributed ledger. In response to an occurrence of the triggering event, a smart contract action may be performed with respect to the digital knowledge (step 18506). The method 18500 may further include receiving, from a knowledge provider device, an instance of the digital knowledge that comprises a three-dimensional (3D) printer instruction set for 3D printing an object (step 18508), tokenizing the digital knowledge (step 18510), and storing the tokenized digital knowledge via the distributed ledger (step 18512). The method 18500 may further include processing commitments of the knowledge provider and a knowledge recipient of the 3D printer instruction set to the smart contract (step 18514), managing, according to the smart contract, rights of control of and access to the tokenized digital knowledge (step 18516), and managing the smart contract action according to a condition and the triggering event (step 18518).

In embodiments, and with reference to FIG. 186 and FIG. 187, a computer-implemented method 18600 for controlling rights related to digital knowledge is depicted. The computer-implemented method 18600 may include crowdsourcing information regarding the digital knowledge (step 18602) where the crowdsourced information may include: an element of the instance of the digital knowledge 18702, information regarding an element of the instance of the digital knowledge 18704, information regarding the knowledge provider 18708, information regarding the knowledge recipient 18710, and the like. The computer-implemented method 18600 may further include updating the smart contract in response to the crowdsourced information (step 18604) or updating a condition (step 18608).

With reference to FIG. 190, a knowledge distribution system 19000 for controlling rights related to digital knowledge is depicted. In embodiments, the knowledge distribution system 19000 may include an input system 19002, a tokenization system 19012, a ledger management system 19018, and a smart contract system 19024. The input system 19020 receives digital knowledge 19008 and the tokenization system 19012 may tokenize the digital knowledge 19008 resulting in a tokenized digital knowledge 19014 that is manipulable as a token.

The ledger management system 19018 may create and manage a distributed ledgers 19020, where the distributed ledger may include a plurality of cryptographically linked blocks distributed over a plurality of nodes of a network as described elsewhere herein. The ledger management system 19018 may store a smart contract(s) 19002 and the tokenized digital knowledge 19014 in a distributed ledger 19020. The ledger management system 19018 may provide provable access to the digital knowledge 19008 by recording and storing access transactions 19048 in the distributed ledger. Other methods of providing provable access are described elsewhere herein.

A smart contract system 19024 may implement and manage a smart contract 19022 which may include the tokenized digital knowledge 19014, and a triggering event 19028. Upon occurrence of a triggering event 19028, the smart contract system 19024 may perform a smart 19062 including rights of control 19040 over the tokenized digital knowledge 19014 and rights of access 19042 regarding who can view, edit, access, or use the digital knowledge 19008. The smart contract 19024 may process commitments 19032 of parties to the smart contract 19034.

In embodiments, the smart contract 19022 may include a smart contract wrapper 19064 which may perform an operation on the distributed ledger to: add intellectual property 18038, add intellectual property 18038 to a stack of intellectual property, add commitment 17832 by one or more parties 17532 to: an apportionment of royalties for the added intellectual property 18804.

In embodiments, the knowledge distribution system 19000 may include an account management system 19072, in communication with a distributed ledger, to facilitate creation and management of a plurality of user accounts 19094 corresponding to a plurality of users 19004 of a knowledge distribution system 19500. The knowledge distribution system 19000 may include a user interface system 19074 to present a user interface 19093 to a user(s) 19004 which enables the user to view data related to an instance of the digital knowledge 19008.

In embodiments, the knowledge distribution system 19000 may include a marketplace system 19078 to establish and maintain a digital marketplace 19090 and visually present data corresponding to an instance of the digital knowledge 19008 to a user 19004 of the knowledge distribution system 19000.

In embodiments, the knowledge distribution system 19000 may include a datastore in communication with the distributed ledger where the datastore may include a knowledge datastore 19082 configured to store data related to the digital knowledge 19008, client datastore 19084 configured to store data related to a plurality of users 19004 of the knowledge distribution system, smart contract datastore 19088 configured to store data related to the smart contract 19022, and the like.

The knowledge distribution system 19002 may include a reporting system 19080 analyze the tokenized digital knowledge 19014 and report the analytic result 19098.

In embodiments, the knowledge distribution system 19000 may include a smart contract generator 19088 to generate a smart contract 19022 using a parameterizable smart contract template 19060. Smart contract parameters may be based on a type of digital knowledge to be tokenized and may include a financial parameter, a royalty parameter, a usage parameter, and output produced parameter, and allocation of consideration parameter, an identity parameter, an access condition parameter, or the like With reference to FIG. 191, an illustrative and non-limiting example method for controlling rights related to digital knowledge is depicted. The method may include creating and managing a distributed ledger 19102, wherein the distributed ledger comprises a plurality of blocks linked via cryptography distributed over a plurality of nodes of a network; tokenizing the digital knowledge 19104; storing the tokenized digital knowledge via the distributed ledger 19108; implementing and managing a smart contract 19110, wherein the smart contract comprises a triggering event, the tokenized knowledge, and a corresponding smart contract action and is stored in the distributed ledger; receiving an instance of the digital knowledge 19112; processing commitments of a plurality of parties to the smart contract 19114; managing, according to the smart contract, rights of control of and access to the tokenized digital knowledge 19118; performing, in response to an occurrence of the triggering event, the corresponding smart contract action with respect to the tokenized digital knowledge 19120; and managing the smart contract action in response to the triggering event 19122. In some embodiments, and with reference to FIG. 192, the method may further include crowdsourcing information regarding an element of the instance of the digital knowledge 19224 and updating the smart contract in response to the crowdsourced information 19228. In some embodiments, and with reference to FIG. 193, the method may further include adding intellectual property to the distributed ledger 19324, committing parties to an apportionment of royalties for the added intellectual property 19328, and processing a commitment of a party to a contract term 19330. In some embodiments, and with reference to FIG. 194, the method may further include creating a user account 19424, receiving a request from a user account to display data related to an instance of the digital knowledge 19428, confirming access to the instance of the digital knowledge allowed for the user account 19430, and presenting a user interface configured to display the data related to an instance of the digital knowledge 19432. In some embodiments, and with reference to FIG. 195, the method may further include buying or selling the digital knowledge 19524. In some embodiments, and with reference to FIG. 196, the method may further include creating and issuing a currency token associated with the distributed ledger 19624.

With reference to FIG. 190, a knowledge distribution system 19000 for controlling rights related to digital knowledge is depicted. In embodiments, the knowledge distribution system 19000 may include an input system 19002, a tokenization system 19012, a ledger management system 19018, and a smart contract system 19024. The input system 19020 receives digital knowledge 19008 and the tokenization system 19012 may tokenize the digital knowledge 19008 resulting in a tokenized digital knowledge 19014 that is manipulable as a token.

The ledger management system 19018 may create and manage a distributed ledgers 19020, where the distributed ledger may include a plurality of cryptographically linked blocks distributed over a plurality of nodes of a network as described elsewhere herein. The ledger management system 19018 may store a smart contract(s) 19002 and the tokenized digital knowledge 19014 in a distributed ledger 19020. The ledger management system 19018 may provide provable access to the digital knowledge 19008 by recording and storing access transactions 19048 in the distributed ledger. Other methods of providing provable access are described elsewhere herein.

A smart contract system 19024 may implement and manage a smart contract 19022 which may include the tokenized digital knowledge 19014, and a triggering event 19028. Upon occurrence of a triggering event 19028, the smart contract system 19024 may perform a smart 19062 including rights of control 19040 over the tokenized digital knowledge 19014 and rights of access 19042 regarding who can view, edit, access, or use the digital knowledge 19008. The smart contract 19024 may process commitments 19032 of parties to the smart contract 19034.

In embodiments, the smart contract 19022 may include a smart contract wrapper 19064 which may perform an operation on the distributed ledger to: add intellectual property 18038, add intellectual property 18038 to a stack of intellectual property, add commitment 17832 by one or more parties 17532 to: an apportionment of royalties for the added intellectual property 18804.

In embodiments, the knowledge distribution system 19000 may include an account management system 19072, in communication with a distributed ledger, to facilitate creation and management of a plurality of user accounts 19094 corresponding to a plurality of users 19004 of a knowledge distribution system 19500. The knowledge distribution system 19000 may include a user interface system 19074 to present a user interface 19093 to a user(s) 19004 which enables the user to view data related to an instance of the digital knowledge 19008.

In embodiments, the knowledge distribution system 19000 may include a marketplace system 19078 to establish and maintain a digital marketplace 19090 and visually present data corresponding to an instance of the digital knowledge 19008 to a user 19004 of the knowledge distribution system 19000.

In embodiments, the knowledge distribution system 19000 may include a datastore in communication with the distributed ledger where the datastore may include a knowledge datastore 19082 configured to store data related to the digital knowledge 19008, client datastore 19084 configured to store data related to a plurality of users 19004 of the knowledge distribution system, smart contract datastore 19088 configured to store data related to the smart contract 19022, and the like.

The knowledge distribution system 19002 may include a reporting system 19080 analyze the tokenized digital knowledge 19014 and report the analytic result 19098.

In embodiments, the knowledge distribution system 19000 may include a smart contract generator 19088 to generate a smart contract 19022 using a parameterizable smart contract template 19060. Smart contract parameters may be based on a type of digital knowledge to be tokenized and may include a financial parameter, a royalty parameter, a usage parameter, and output produced parameter, and allocation of consideration parameter, an identity parameter, an access condition parameter, or the like Workflow Management Systems In embodiments, the workflow management system may support various workflows associated with a facility, such as including interfaces of the platform by which a facility manager may review various analytic results, status information, and the like. In embodiments, the workflow management system tracks the operation of a post-action follow-up module to ensure that the correct follow-up messages are automatically, or under control of a facility agent using the platform, sent to appropriate individuals, systems and/or services.

In the various embodiments, various elements are included for a workflow for each of an energy project, a compute project (e.g., cryptocurrency and/or AI) and hybrids. In embodiments, provided herein is an information technology system for providing data to an intelligent energy and compute facility resource management system having a system for learning on a training set of facility outcomes, facility parameters, and data collected from data sources to train an artificial intelligence/machine learning system to at least one of predict a likelihood of a facility production outcome, predict a facility production outcome, optimize provisioning and allocation of energy and compute resources to produce a favorable facility resource utilization profile among a set of available profiles, optimize provisioning and allocation of energy and compute resources to produce a favorable facility resource output selection among a set of available outputs, optimize requisition and provisioning of available energy and compute resources to produce a favorable facility input resource profile among a set of available profiles, optimize configuration of available energy and compute resources to produce a favorable facility resource configuration profile among a set of available profiles, optimize selection and configuration of an artificial intelligence system to produce a favorable facility output profile among a set of available artificial intelligence systems and configurations, or generate an indication that a current or prospective customer should be contacted about an output that can be provided by the facility.

Management Application Platform

Figure 33:
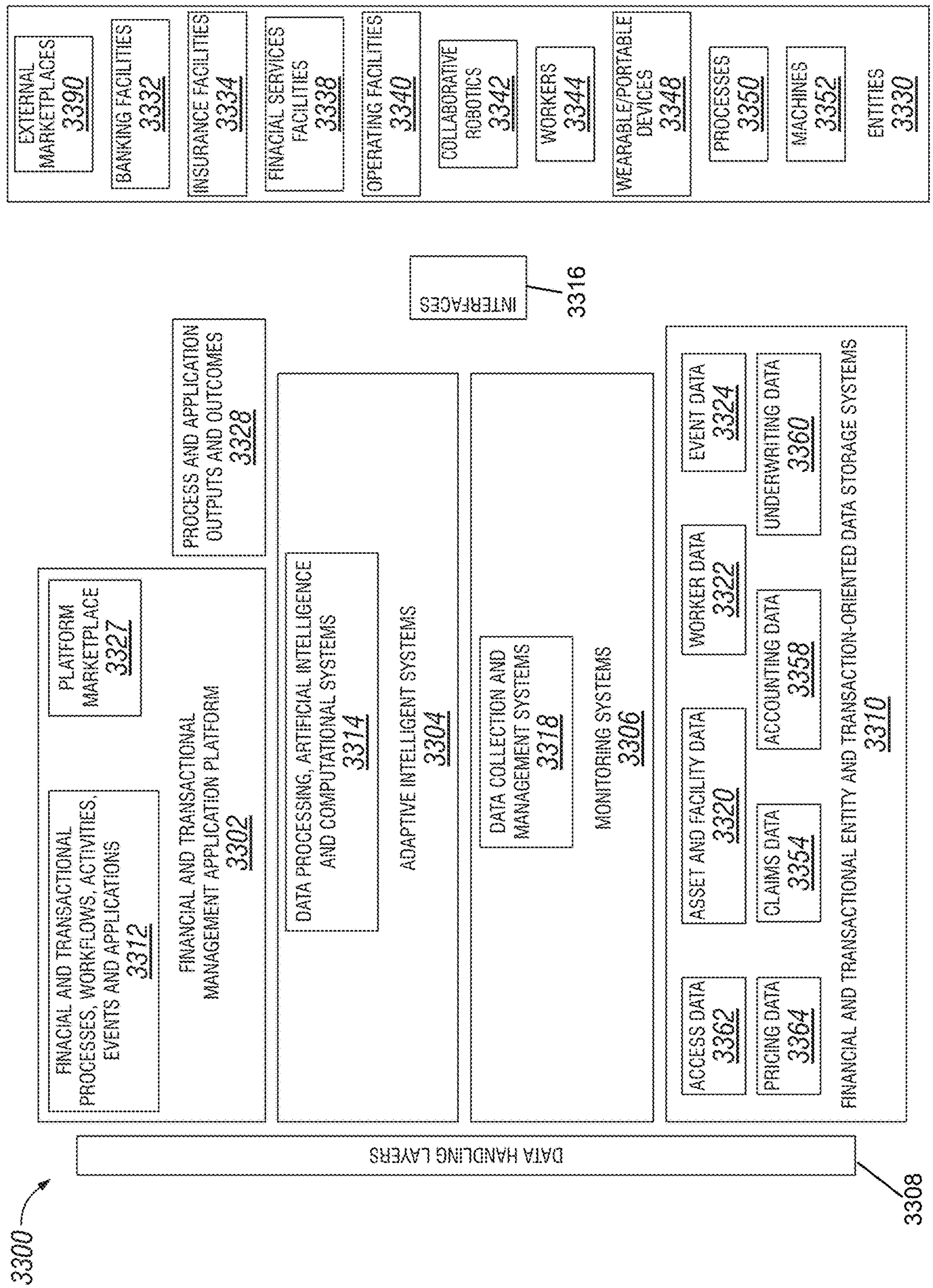
FIG. 33 depicts components and interactions of a transactional, financial and marketplace enablement system.

Referring to FIG. 33, a transactional, financial and marketplace enablement system 3300 is illustrated, including a set of systems, applications, processes, modules, services, layers, devices, components, machines, products, sub-systems, interfaces, connections, and other elements working in coordination to enable intelligent management of a set of financial and transactional entities 3330 that may occur, operate, transact or the like within, or own, operate, support or enable, one or more platform-operated marketplaces 3327 or external marketplaces 3390 or that may otherwise be part of, integrated with, linked to, or operated on by the platform 3300. Platform marketplaces 3327 and external marketplaces 3390 may include a wide variety of marketplaces and exchanges for physical goods, services, virtual goods, digital content, advertising, credits (such as renewable energy credits, pollution abatement credits and the like), currencies, commodities, cryptocurrencies, loyalty points, physical resources, human resources, attention resources, information technology resources, storage resources, energy resources, options, futures, derivatives, securities, rights of access, tickets, licenses (including seat licenses, private or government-issued licenses or permissions to undertake regulated activities, medallions, badges and others), and many others. Financial and transactional entities 3330 may include any of the wide variety of assets, systems, devices, machines, facilities, individuals or other entities mentioned throughout this disclosure or in the documents incorporated herein by reference, such as, without limitation: financial machines 3352 and their components (e.g., automated teller machines, point of sale machines, vending machines, kiosks, smart-card-enabled machines, and many others); financial and transactional processes 3350 (such as lending processes, software processes (including applications, programs, services, and others), production processes, banking processes (e.g., lending processes, underwriting processes, investing processes, and many others), financial service processes, diagnostic processes, security processes, safety processes and many others); wearable and portable devices 3348 (such as mobile phones, tablets, dedicated portable devices for financial applications, data collectors (including mobile data collectors), sensor-based devices, watches, glasses, hearables, head-worn devices, clothing-integrated devices, arm bands, bracelets, neck-worn devices, AR/VR devices, headphones, and many others); workers 3344 (such as banking workers, financial service personnel, managers, engineers, floor managers, vault workers, inspectors, delivery personnel, currency handling workers, process supervisors, security personnel, safety personnel and many others); robotic systems 3342 (e.g., physical robots, collaborative robots (e.g., "cobots"), software bots and others); and operating facilities 3340 (such as currency production facilities, storage facilities, vaults, bank branches, office buildings, banking facilities, financial services facilities, cryptocurrency mining facilities, data centers, trading floors, high frequency trading operations, and many others), which may include, without limitation, among many others, storage and financial services facilities 3338 (such as for financial services inventory, components, packaging materials, goods, products, machinery, equipment, and other items); insurance facilities 3334 (such as branches, offices, storage facilities, data centers, underwriting operations and others); and banking facilities 3332 (such as for commercial banking, investing, consumer banking, lending and many other banking activities).

In embodiments, the platform 3300 may include a set of data handling layers 3308 each of which is configured to provide a set of capabilities that facilitate development and deployment of intelligence, such as for facilitating automation, machine learning, applications of artificial intelligence, intelligent transactions, state management, event management, process management, and many others, for a wide variety of financial and transactional applications and end uses. In embodiments, the data handling layers 3308 include a financial and transactional monitoring systems layer 3306, a financial and transactional entity-oriented data storage systems layer 3310 (referred to in some cases herein for convenience simply as a data storage layer 3310), an adaptive intelligent systems layer 3304 and a financial and transactional management application platform layer 3302.

Each of the data handling layers 3308 may include a variety of services, programs, applications, workflows, systems, components and modules, as further described herein and in the documents incorporated herein by reference. In embodiments, each of the data handling layers 3308 (and optionally the platform 3300 as a whole) is configured such that one or more of its elements can be accessed as a service by other layers 3308 or by other systems (e.g., being configured as a platform-as-a-service deployed on a set of cloud infrastructure components in a microservices architecture). For example, a data handling layer 3308 may have a set of interfaces 3316, such as application programming interfaces (APIs), brokers, services, connectors, wired or wireless communication links, ports, human-accessible interfaces, software interfaces or the like by which data may be exchanged between the data handling layer 3308 and other layers, systems or sub-systems of the platform 3300, as well as with other systems, such as financial entities 3330 or external systems, such as cloud-based or on-premises enterprise systems (e.g., accounting systems, resource management systems, CRM systems, supply chain management systems and many others. Each of the data handling layers 3308 may include a set of services (e.g., microservices), for data handling, including facilities for data extraction, transformation and loading; data cleansing and deduplication facilities; data normalization facilities; data synchronization facilities; data security facilities; computational facilities (e.g., for performing pre-defined calculation operations on data streams and providing an output stream); compression and de-compression facilities; analytic facilities (such as providing automated production of data visualizations) and others.

In embodiments, each data handling layer 3308 has a set of application programming interfaces 3316 for automating data exchange with each of the other data handling layers 3308. These may include data integration capabilities, such as for extracting, transforming, loading, normalizing, compression, decompressing, encoding, decoding, and otherwise processing data packets, signals, and other information as it exchanged among the layers and/or the applications 3312, such as transforming data from one format or protocol to another as needed in order for one layer to consume output from another. In embodiments, the data handling layers 3308 are configured in a topology that facilitates shared data collection and distribution across multiple applications and uses within the platform 3300 by the financial monitoring systems layer 3306. The financial monitoring systems layer 3306 may include, integrate with, and/or cooperate with various data collection and management systems 3318, referred to for convenience in some cases as data collection systems 3318, for collecting and organizing data collected from or about financial and transactional entities 3330, as well as data collected from or about the various data layers 3308 or services or components thereof. For example, a stream of physiological data from a wearable device worn by a worker undertaking a task or a consumer engaged in an activity can be distributed via the monitoring systems layer 3306 to multiple distinct applications in the management application platform layer 3302, such as one that facilitates monitoring the physiological, psychological, performance level, attention, or other state of a worker and another that facilitates operational efficiency and/or effectiveness. In embodiments, the monitoring systems layer 3306 facilitates alignment, such as time-synchronization, normalization, or the like of data that is collected with respect to one or more entities 3330. For example, one or more video streams or other sensor data collected of or with respect to a worker 3344 or other entity in a transactional or financial environment, such as from a set of camera-enabled IoT devices, may be aligned with a common clock, so that the relative timing of a set of videos or other data can be understood by systems that may process the videos, such as machine learning systems that operate on images in the videos, on changes between images in different frames of the video, or the like. In such an example, the monitoring systems layer 3306 may further align a set of videos, camera images, sensor data, or the like, with other data, such as a stream of data from wearable devices, a stream of data produced by financial or transactional systems (such as point-of-sale systems, ATMs, kiosks, handheld transaction systems, card readers, and the like), a stream of data collected by mobile data collectors, and the like. Configuration of the monitoring systems layer 3306 as a common platform, or set of microservices, that are accessed across many applications, may dramatically reduce the number of interconnections required by an enterprise in order to have a growing set of applications monitoring a growing set of IoT devices and other systems and devices that are under its control.

In embodiments, the data handling layers 3308 are configured in a topology that facilitates shared or common data storage across multiple applications and uses of the platform 3300 by the financial and transactional entity and transaction-oriented data storage systems layer 3310, referred to herein for convenience in some cases simply as the data storage layer 3310 or storage layer 3310. For example, various data collected about the financial entities 3330, as well as data produced by the other data handling layers 3308, may be stored in the data storage layer 3310, such that any of the services, applications, programs, or the like of the various data handling layers 3308 can access a common data source (which may comprise a single logical data source that is distributed across disparate physical and/or virtual storage locations). This may facilitate a dramatic reduction in the amount of data storage required to handle the enormous amount of data produced by or about entities 3330 as applications of the financial and transactional IoT proliferate. For example, a supply chain or inventory management application in the management application platform layer 3302, such as one for ordering replacement parts for a financial or transactional machine or item of equipment, or for reordering currency or other inventory, may access the same data set about what parts have been replaced for a set of machines as a predictive maintenance application that is used to predict whether a machine is likely to require replacement parts. Similarly, prediction may be used with respect to resupply of currency or other items. In embodiments, the data storage systems layer 3310 may provide an extremely rich environment for collection of data that can be used for extraction of features or inputs for intelligence systems, such as expert systems, artificial intelligence systems, robotic process automation systems, machine learning systems, deep learning systems, supervised learning systems, or other intelligent systems as disclosed throughout this disclosure and the documents incorporated herein by reference. As a result, each application in the management application platform layer 3302 and each adaptive intelligent system in the adaptive intelligent systems layer 3304 can benefit from the data collected or produced by or for each of the others. A wide range of data types may be stored in the storage layer 3310 using various storage media and data storage types and formats, including, without limitation: asset and facility data 3320 (such as asset identity data, operational data, transactional data, event data, state data, workflow data, maintenance data, pricing data, ownership data, transferability data, and many other types of data relating to an asset (which may be a physical asset, digital asset, virtual asset, financial asset, securities asset, or other asset); worker data 3322 (including identity data, role data, task data, workflow data, health data, attention data, mood data, stress data, physiological data, performance data, quality data and many other types); event data 3324 (including process events, transaction events, exchange events, pricing events, promotion events, discount events, rebate events, reward events, point utilization events, financial events, output events, input events, state-change events, operating events, repair events, maintenance events, service events, damage events, injury events, replacement events, refueling events, recharging events, supply events, and many others); claims data 3354 (such as relating to insurance claims, such as for business interruption insurance, product liability insurance, insurance on goods, facilities, or equipment, flood insurance, insurance for contract-related risks, and many others, as well as claims data relating to product liability, general liability, workers compensation, injury and other liability claims and claims data relating to contracts, such as supply contract performance claims, product delivery requirements, contract claims, claims for damages, claims to redeem points or rewards, claims of access rights, warranty claims, indemnification claims, energy production requirements, delivery requirements, timing requirements, milestones, key performance indicators and others); accounting data 3358 (such as data relating to debits, credits, costs, prices, profits, margins, rates of return, valuation, write-offs, and many others); underwriting data 3360 (such as data relating to identities of prospective and actual parties involved insurance and other transactions, actuarial data, data relating to probability of occurrence and/or extent of risk associated with activities, data relating to observed activities and other data used to underwrite or estimate risk); access data 3362 (such as data relating to rights of access, tickets, tokens, licenses and other access rights described throughout this disclosure, including data structures representing access rights; pricing data 3364 (including spot market pricing, forward market pricing, pricing discount information, promotional pricing, and other information relating to the cost or price of items in any of the platform operated marketplaces 3327 and/or external marketplaces 3390); as well as other types of data not shown, such as production data (such as data relating to production of physical or digital goods, services, events, content, and the like, as well as data relating to energy production found in databases of public utilities or independent services organizations that maintain energy infrastructure, data relating to outputs of banking, data related to outputs of mining and energy extraction facilities, outputs of drilling and pipeline facilities and many others); and supply chain data (such as relating to items supplied, amounts, pricing, delivery, sources, routes, customs information and many others).

In embodiments, the data handling layers 3308 are configured in a topology that facilitates shared adaptation capabilities, which may be provided, managed, mediated and the like by one or more of a set of services, components, programs, systems, or capabilities of the adaptive intelligent systems layer 3304, referred to in some cases herein for convenience as the adaptive intelligence layer 3304. The adaptive intelligence systems layer 3304 may include a set of data processing, artificial intelligence and computational systems 3314 that are described in more detail elsewhere throughout this disclosure. Thus, use of various resources, such as computing resources (such as available processing cores, available servers, available edge computing resources, available on-device resources (for single devices or peered networks), and available cloud infrastructure, among others), data storage resources (including local storage on devices, storage resources in or on financial entities or environments (including on-device storage, storage on asset tags, local area network storage and the like), network storage resources, cloud-based storage resources, database resources and others), networking resources (including cellular network spectrum, wireless network resources, fixed network resources and others), energy resources (such as available battery power, available renewable energy, fuel, grid-based power, and many others) and others may be optimized in a coordinated or shared way on behalf of an operator, enterprise, or the like, such as for the benefit of multiple applications, programs, workflows, or the like. For example, the adaptive intelligence layer 3304 may manage and provision available network resources for both a financial analytics application and for a financial remote control application (among many other possibilities), such that low latency resources are used for remote control and longer latency resources are used for the analytics application. As described in more detail throughout this disclosure and the documents incorporated herein by reference, a wide variety of adaptations may be provided on behalf of the various services and capabilities across the various layers 3308, including ones based on application requirements, quality of service, budgets, costs, pricing, risk factors, operational objectives, efficiency objectives, optimization parameters, returns on investment, profitability, uptime/downtime, worker utilization, and many others.

The management application platform layer 3302, referred to in some cases herein for convenience as the platform layer 3302, may include a set of financial and transactional processes, workflows, activities, events and applications 3312 (referred to collectively, except where context indicates otherwise, as applications 3312) that enable an operator to manage more than one aspect of an financial or transactional environment or entity 3330 in a common application environment, such as one that takes advantage of common data storage in the data storage layer 3310, common data collection or monitoring in the monitoring systems layer 3306 and/or common adaptive intelligence of the adaptive intelligence layer 3304. Outputs from the applications 3312 in the platform layer 3302 may be provided to the other data handing layers 3308. These may include, without limitation, state and status information for various objects, entities, processes, flows and the like; object information, such as identity, attribute and parameter information for various classes of objects of various data types; event and change information, such as for workflows, dynamic systems, processes, procedures, protocols, algorithms, and other flows, including timing information; outcome information, such as indications of success and failure, indications of process or milestone completion, indications of correct or incorrect predictions, indications of correct or incorrect labeling or classification, and success metrics (including relating to yield, engagement, return on investment, profitability, efficiency, timeliness, quality of service, quality of product, customer satisfaction, and others) among others. Outputs from each application 3312 can be stored in the data storage layer 3310, distributed for processing by the data collection layer 3306, and used by the adaptive intelligence layer 3304. The cross-application nature of the platform layer 3302 thus facilitates convenient organization of all of the necessary infrastructure elements for adding intelligence to any given application, such as by supplying machine learning on outcomes across applications, providing enrichment of automation of a given application via machine learning based on outcomes from other applications (or other elements of the platform 3300, and allowing application developers to focus on application-native processes while benefiting from other capabilities of the platform 3300.

Figure 34:
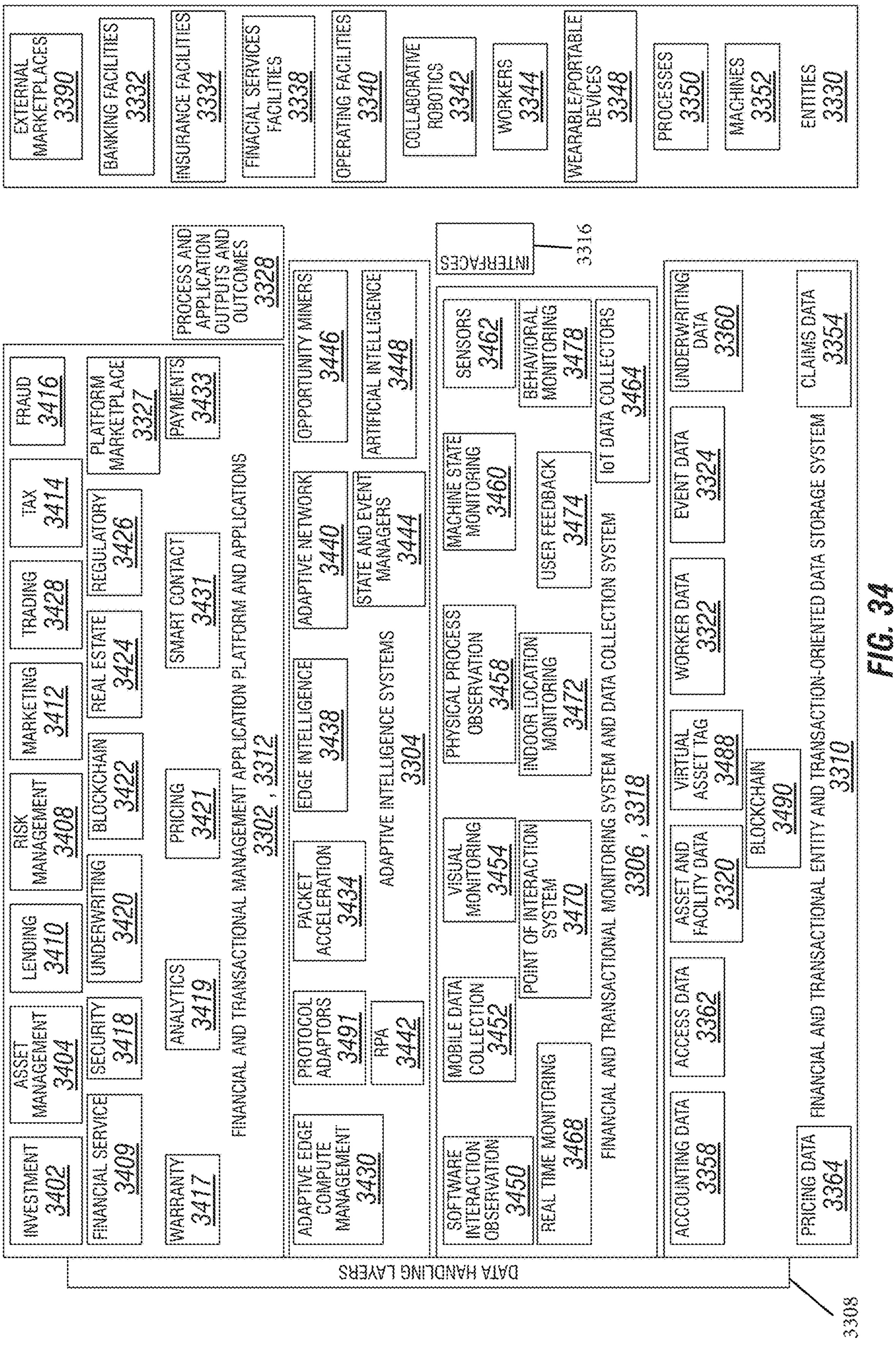
FIG. 34 depicts components and interactions of a set of data handling layers of a transactional, financial and marketplace enablement system.

Referring to FIG. 34, additional details, components, sub-systems, and other elements of an optional embodiment of the platform 3300 of FIG. 33 are illustrated. The management application layer 3302 may, in various optional embodiments, include a set of applications, systems, solutions, interfaces, or the like, collectively referred to for convenience as applications 3312, by which an operator or owner of a transactional or financial entity, or other users, may manage, monitor, control, analyze, or otherwise interact with one or more elements of the entity 3330, such as any of the elements noted in connection above in connection FIG. 33. The set of applications 3312 may include, without limitation, one or more of any of a wide range of types of applications, such as an investment application 3402 (such as, without limitation, for investment in shares, interests, currencies, commodities, options, futures, derivatives, real property, trusts, cryptocurrencies, tokens, and other asset classes); an asset management application 3404 (such as, without limitation, for managing investment assets, real property, fixtures, personal property, real estate, equipment, intellectual property, vehicles, human resources, software, information technology resources, data processing resources, data storage resources, power generation and/or storage resources, computational resources and other assets); a lending application 3410 (such as, without limitation, for personal lending, commercial lending, collateralized lending, microlending, peer-to-peer lending, insurance-related lending, asset-backed lending, secured debt lending, corporate debt lending, student loans, mortgage lending, automotive lending, and others); a risk management application 3408 (such as, without limitation, for managing risk or liability with respect to a product, an asset, a person, a home, a vehicle, an item of equipment, a component, an information technology system, a security system, a security event, a cybersecurity system, an item of property, a health condition, mortality, fire, flood, weather, disability, malpractice, business interruption, infringement, advertising injury, slander, libel, violation of privacy or publicity rights, injury, damage to property, damage to a business, breach of a contract, and others); a payments application 3433 (such as for enabling various payments within and across marketplaces, including credit card, debit card, wire transfer, ACH, checking, currency and other payments); a marketing application 3412 (such as, without limitation, an application for marketing a financial or transactional product or service, an advertising application, a marketplace platform or system for goods, services or other items, a marketing analytics application, a customer relationship management application, a search engine optimization application, a sales management application, an advertising network application, a behavioral tracking application, a marketing analytics application, a location-based product or service targeting application, a collaborative filtering application, a recommendation engine for a product or service, and others); a trading application 3428 (such as, without limitation, a buying application, a selling application, a bidding application, an auction application, a reverse auction application, a bid/ask matching application, a securities trading application, a commodities trading application, an option trading application, a futures trading application, a derivatives trading application, a cryptocurrency trading application, a token-trading application, an analytic application for analyzing financial or transactional performance, yield, return on investment, or other metrics, a book-building application, or others); a tax application 3414 (such as, without limitation, for managing, calculating, reporting, optimizing, or otherwise handling data, events, workflows, or other factors relating to a tax, a levy, a tariff, a duty, a credit, a fee or other government-imposed charge, such as, without limitation, sales tax, income tax, property tax, municipal fees, pollution tax, renewal energy credit, pollution abatement credit, value added tax, import duties, export duties, and others); a fraud prevention application 3416 (such as, without limitation, one or more of an identity verification application, a biometric identify validation application, a transactional pattern-based fraud detection application, a location-based fraud detection application, a user behavior-based fraud detection application, a network address-based fraud detection application, a black list application, a white list application, a content inspection-based fraud detection application, or other fraud detection application, a financial service, application or solution 3409 (referred to collectively as a "financial service", such as, without limitation, a financial planning service, a tax planning service, a portfolio management service, a transaction service, a lending service, a banking service, a currency conversion service, a currency exchange service, a remittance service, a money transfer service, a wealth management service, an estate planning service, an investment banking service, a commercial banking service, a foreign exchange service, an insurance service, an investment service, an investment management service, a hedge fund service, a mutual fund service, a custody service, a credit card service, a safekeeping service, a checking service, a debit card service, a lending service, an ATM service, an ETF service, a wire transfer service, an overdraft service, a reporting service, a certified checking service, a notary service, a capital markets service, a brokerage service, a broker-dealer service, a private banking service, an insurance service, an insurance brokerage service, an underwriting service, an annuity service, a life insurance service, a health insurance service, a retirement insurance service, a property insurance service, a casualty insurance service, a finance and insurance service, a reinsurance service, an intermediation service, a trade clearinghouse service, a private equity service, a venture capital service, an angel investment service, a family office investment service, an exchange service, a payments service, a settlement service, an interbank networking service, a debt resolution service, or other financial service); a security application, solution or service 3418 (referred to herein as a security application, such as, without limitation, any of the fraud prevention applications 3416 noted above, as well as a physical security system (such as for an access control system (such as using biometric access controls, fingerprinting, retinal scanning, passwords, and other access controls), a safe, a vault, a cage, a safe room, or the like), a monitoring system (such as using cameras, motion sensors, infrared sensors and other sensors), a cyber security system (such as for virus detection and remediation, intrusion detection and remediation, spam detection and remediation, phishing detection and remediation, social engineering detection and remediation, cyber attack detection and remediation, packet inspection, traffic inspection, DNS attack remediation and detection, and others) or other security application); an underwriting application 3420 (such as, without limitation, for underwriting any insurance offering, any loan, or any other transaction, including any application for detecting, characterizing or predicting the likelihood and/or scope of a risk, including underwriting based on any of the data sources, events or entities noted throughout this disclosure or the documents incorporated herein by reference); a blockchain application 3422 (such as, without limitation, a distributed ledger capturing a series of transactions, such as debits or credits, purchases or sales, exchanges of in kind consideration, smart contract events, or the like, a cryptocurrency application, or other blockchain-based application); a real estate application 3424 (such as, without limitation, a real estate brokerage application, a real estate valuation application, a real estate investment trust application, a real estate mortgage or lending application, a real estate assessment application, a real estate marketing application, or other); a regulatory application 3426 (such as, without limitation, an application for regulating any of the applications, services, transactions, activities, workflows, events, entities, or other items noted herein and in the documents incorporated by reference herein, such as regulation of pricing, marketing, offering of securities, offering of insurance, undertaking of broker or dealer activities, use of data (including data privacy regulations, regulations relating to storage of data and others), banking, marketing, sales, financial planning, and many others); a platform-operated marketplace application, solution or service 3327 (referred to in some cases simply as a marketplace application (which term may also, as context permits include various types of external marketplaces 3390), such as, without limitation an e-commerce marketplace, an auction marketplace, a physical goods marketplace, a virtual goods marketplace, an advertising marketplace, a reverse-auction marketplace, an advertising network, a marketplace for attention resources, an energy trading marketplace, a marketplace for computing resources, a marketplace for networking resources, a spectrum allocation marketplace, an Internet advertising marketplace, a television advertising marketplace, a print advertising marketplace, a radio advertising marketplace, an in-game advertising marketplace, an in-virtual reality advertising marketplace, an in-augmented reality marketplace, a real estate marketplace, a hospitality marketplace, a travel services marketplace, a financial services marketplace, a blockchain-based marketplace, a cryptocurrency marketplace, a token-based marketplace, a loyalty program marketplace, a time share marketplace, a rideshare marketplace, a mobility marketplace, a transportation marketplace, a space-sharing marketplace, or other marketplace); a warranty application 3417 (such as, without limitation, an application for a warranty or guarantee with respect to a product, a service, an offering, a solution, a physical product, software, a level of service, quality of service, a financial instrument, a debt, an item of collateral, performance of a service, or other item); an analyst application 3419 (such as, without limitation, an analytic application with respect to any of the data types, applications, events, workflows, or entities mentioned throughout this disclosure or the documents incorporated by reference herein, such as a big data application, a user behavior application, a prediction application, a classification application, a dashboard, a pattern recognition application, an econometric application, a financial yield application, a return on investment application, a scenario planning application, a decision support application, and many others); a pricing application 3421 (such as, without limitation, for pricing of goods, services (including any mentioned throughout this disclosure and the documents incorporated by reference herein), applications (including any mentioned throughout this disclosure and the documents incorporated by reference herein), software, data services, insurance, virtual goods, advertising placements, search engine and keyword placements, and many others; and a smart contract application, solution, or service (referred to collectively herein as a smart contract application, such as, without limitation, any of the smart contract types referred to in this disclosure or in the documents incorporated herein by reference, such as a smart contract using a token or cryptocurrency for consideration, a smart contract that vests a right, an option, a future, or an interest based on a future condition, a smart contract for a security, commodity, future, option, derivative, or the like, a smart contract for current or future resources, a smart contract that is configured to account for or accommodate a tax, regulatory or compliance parameter, a smart contract that is configured to execute an arbitrage transaction, or many others). Thus, the manage application platform 3302 may host an enable interaction among a wide range of disparate applications 3312 (such term including the above-referenced and other financial or transactional applications, services, solutions, and the like), such that by virtue of shared microservices, shared data infrastructure, and shared intelligence, any pair or larger combination or permutation of such services may be improved relative to an isolated application of the same type.

In embodiments, the adaptive intelligent systems layer 3304 may include a set of systems, components, services and other capabilities that collectively facilitate the coordinated development and deployment of intelligent systems, such as ones that can enhance one or more of the applications 3312 at the application platform layer 3302. These adaptive intelligence systems 3304 may include an adaptive edge compute management solution 3430, a robotic process automation system 3442, a set of protocol adaptors 3491, a packet acceleration system 3434, an edge intelligence system 3438, an adaptive networking system 3440, a set of state and event managers 3444, a set of opportunity miners 3446, a set of artificial intelligence systems 3448 and other systems.

In embodiments, the financial monitoring systems layer 3306 and its data collection systems 3318 may include a wide range of systems for collection of data. This layer may include, without limitation, real time monitoring systems 3468 (such as onboard monitoring systems like event and status reporting systems on ATMs, POS systems, kiosks, vending machines and the like; OBD and telematics systems on vehicle and equipment; systems providing diagnostic codes and events via an event bus, communication port, or other communication system; monitoring infrastructure (such as cameras, motion sensors, beacons, RFID systems, smart lighting systems, asset tracking systems, person tracking systems, and ambient sensing systems located in various environments where transactions and other events take place), as well as removable and replaceable monitoring systems, such as portable and mobile data collectors, RFID and other tag readers, smart phones, tablets and other mobile device that are capable of data collection and the like); software interaction observation systems 3450 (such as for logging and tracking events involved in interactions of users with software user interfaces, such as mouse movements, touchpad interactions, mouse clicks, cursor movements, keyboard interactions, navigation actions, eye movements, finger movements, gestures, menu selections, and many others, as well as software interactions that occur as a result of other programs, such as over APIs, among many others); mobile data collectors 3452 (such as described extensively herein and in documents incorporated by reference), visual monitoring systems 3454 (such as using video and still imaging systems, LIDAR, IR and other systems that allow visualization of items, people, materials, components, machines, equipment, personnel, gestures, expressions, positions, locations, configurations, and other factors or parameters of entities 3330, as well as inspection systems that monitor processes, activities of workers and the like); point of interaction systems 3470 (such as point of sale systems, kiosks, ATMs, vending machines, touch pads, camera-based interaction tracking systems, smart shopping carts, user interfaces of online and in-store vending and commerce systems, tablets, and other systems at the point of sale or other interaction by a customer or worker involved in shopping and/or a transaction); physical process observation systems 3458 (such as for tracking physical activities of customers, physical activities of transaction parties (such as traders, vendors, merchants, customers, negotiators, brokers, and the like), physical interactions of workers with other workers, interactions of workers with physical entities like machines and equipment, and interactions of physical entities with other physical entities, including, without limitation, by use of video and still image cameras, motion sensing systems (such as including optical sensors, LIDAR, IR and other sensor sets), robotic motion tracking systems (such as tracking movements of systems attached to a human or a physical entity) and many others; machine state monitoring systems 3460 (including onboard monitors and external monitors of conditions, states, operating parameters, or other measures of the condition of a machine, such as a client, a server, a cloud resource, an ATM, a kiosk, a vending machine, a POS system, a sensor, a camera, a smart shopping cart, a smart shelf, a vehicle, a robot, or other machine); sensors and cameras 3462 and other IoT data collection systems 3464 (including onboard sensors, sensors or other data collectors (including click tracking sensors) in or about a financial or transactional environment (such as, without limitation, an office, a back office, a store, a mall, a virtual store, an online environment, a web site, a bank, or many others), cameras for monitoring an entire environment, dedicated cameras for a particular machine, process, worker, or the like, wearable cameras, portable cameras, cameras disposed on mobile robots, cameras of portable devices like smart phones and tablets, and many others, including any of the many sensor types disclosed throughout this disclosure or in the documents incorporated herein by reference); indoor location monitoring systems 3472 (including cameras, IR systems, motion-detection systems, beacons, RFID readers, smart lighting systems, triangulation systems, RF and other spectrum detection systems, time-of-flight systems, chemical noses and other chemical sensor sets, as well as other sensors); user feedback systems 3474 (including survey systems, touch pads, voice-based feedback systems, rating system, expression monitoring systems, affect monitoring systems, gesture monitoring systems, and others); behavioral monitoring systems 3478 (such as for monitoring movements, shopping behavior, buying behavior, clicking behavior, behavior indicating fraud or deception, user interface interactions, product return behavior, behavior indicative of interest, attention, boredom or the like, mood-indicating behavior (such as fidgeting, staying still, moving closer, or changing posture) and many others); and any of a wide variety of Internet of Things (IoT) data collectors 3464, such as those described throughout this disclosure and in the documents incorporated by reference herein.

In embodiments, the financial entity-oriented data storage systems layer 3310 may include a range of systems for storage of data, such as the accounting data 3358, access data 3362, pricing data 3364, asset and facility data 3320, worker data 3322, event data 3324, underwriting data 3360 and claims data 3354. These may include, without limitation, physical storage systems, virtual storage systems, local storage systems, distributed storage systems, databases, memory, network-based storage, network-attached storage systems (such as using NVME, storage attached networks, and other network storage systems), and many others. In embodiments, the storage layer 3310 may store data in one or more knowledge graphs (such as a directed acyclic graph, a data map, a data hierarchy, a data cluster including links and nodes, a self-organizing map, or the like). In embodiments, the data storage layer 3310 may store data in a digital thread, ledger, or the like, such as for maintaining a longitudinal record of an entity 3330 over time, including any of the entities described herein. In embodiments, the data storage layer 3310 may use and enable a virtual asset tag 3488, which may include a data structure that is associated with an asset and accessible and managed as if the tag were physically located on the asset, such as by use of access controls, so that storage and retrieval of data is optionally linked to local processes, but also optionally open to remote retrieval and storage options. In embodiments, the storage layer 3310 may include one or more blockchains 3490, such as ones that store identity data, transaction data, entity data for the entities 3330, pricing data, ownership transfer data, data for operation by smart contracts 3431, historical interaction data, and the like, such as with access control that may be role-based or may be based on credentials associated with an entity 3330, a service, or one or more applications 3312.

Figure 35:
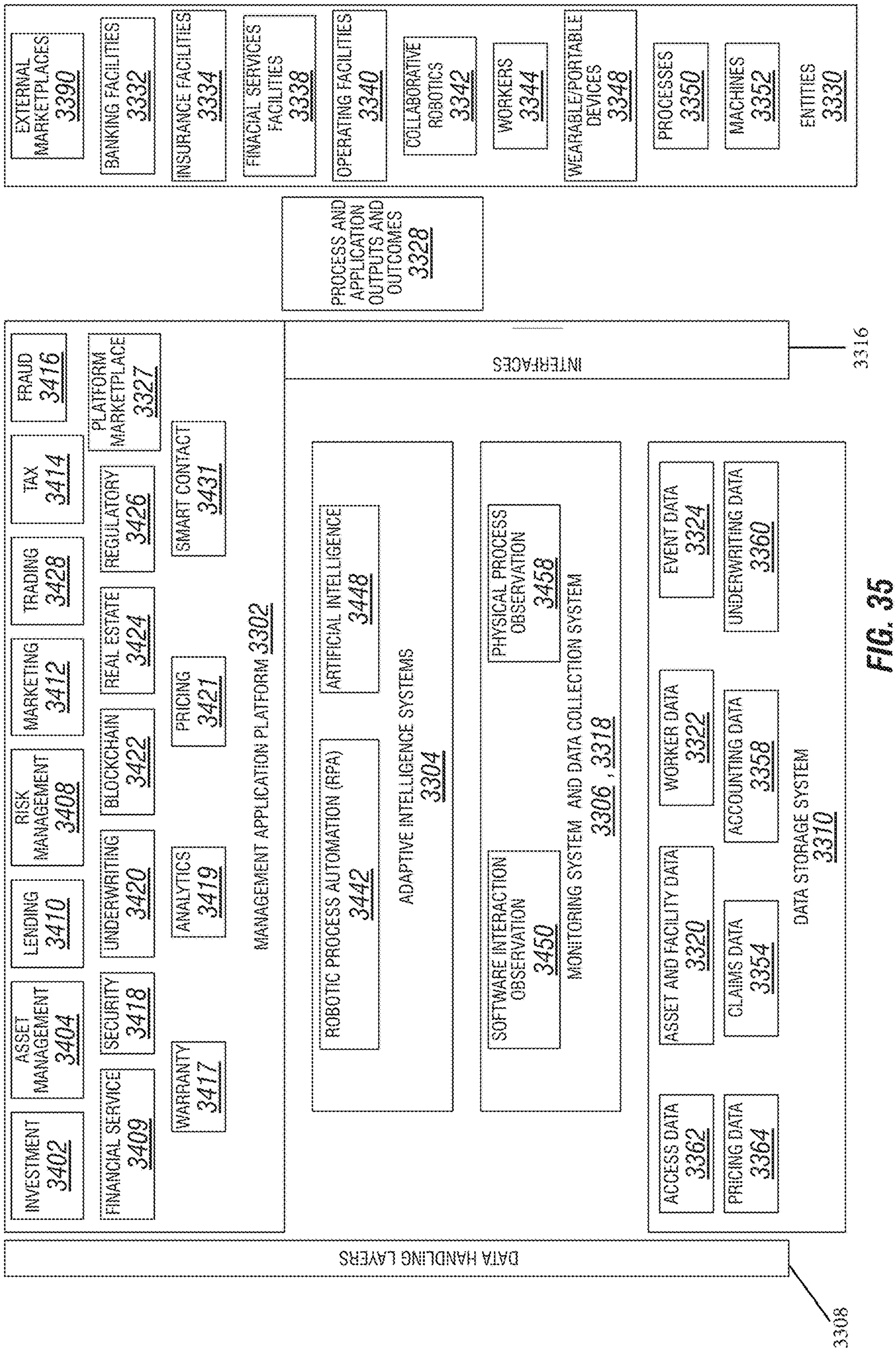
FIG. 35 depicts adaptive intelligence and robotic process automation capabilities of a transactional, financial and marketplace enablement system.

Referring to FIG. 35, the adaptive intelligence layer 3304 may include a robotic process automation (RPA) system 3442, which may include a set of components, processes, services, interfaces and other elements for development and deployment of automation capabilities for various financial entities 3330, environments, and applications 3312. Without limitation, robotic process automation 3442 may be applied to each of the processes that is managed, controlled, or mediated by each of the set of applications 3312 of the platform application layer.

In embodiments, robotic process automation 3442 may take advantage of the presence of multiple applications 3312 within the management application platform layer 3302, such that a pair of applications may share data sources (such as in the data storage layer 3310) and other inputs (such as from the monitoring layer 3306) that are collected with respect to financial entities 3330, as well sharing outputs, events, state information and outputs, which collectively may provide a much richer environment for process automation, including through use of artificial intelligence 3448 (including any of the various expert systems, artificial intelligence systems, neural networks, supervised learning systems, machine learning systems, deep learning systems, and other systems described throughout this disclosure and in the documents incorporated by reference). For example, a real estate application 3424 may use robotic process automation 3442 for automation of a real estate inspection process that is normally performed or supervised by a human (such as by automating a process involving visual inspection using video or still images from a camera or other that displays images of an entity 3330, such as where the robotic process automation 3442 system is trained to automate the inspection by observing interactions of a set of human inspectors or supervisors with an interface that is used to identify, diagnose, measure, parameterize, or otherwise characterize possible defects or favorable characteristics of a house, a building, or other real estate property or item. In embodiments, interactions of the human inspectors or supervisors may include a labeled data set where labels or tags indicate types of defects, favorable properties, or other characteristics, such that a machine learning system can learn, using the training data set, to identify the same characteristics, which in turn can be used to automate the inspection process such that defects or favorable properties are automatically classified and detected in a set of video or still images, which in turn can be used within the real estate solution 3424 to flag items that require further inspection, that should be rejected, that should be disclosed to a prospective buyer, that should be remediated, or the like. In embodiments, robotic process automation 3442 may involve multi-application or cross-application sharing of inputs, data structures, data sources, events, states, outputs or outcomes. For example, the real estate application 3424 may receive information from a marketplace application 3327 that may enrich the robotic process automation 3442 of the real estate application 3424, such as information about the current pricing of an item from a particular vendor that is located at a real estate property (such as a pool, spa, kitchen appliance, TV or other items), which may assist in populating the characteristics about the real estate for purpose of facilitating an inspection process, a valuation process, a disclosure process, or the like. These and many other examples of multi-application or cross-application sharing for robotic process automation 3442 across the applications 3312 are encompassed by the present disclosure.

In embodiments, robotic process automation may be applied to shared or converged processes among the various pairs of the applications 3312 of the application layer 3302, such as, without limitation, of a converged process involving a security application 3418 and a lending application 3410, integrated automation of blockchain-based applications 3422 with marketplace applications 3327, and many others. In embodiments, converged processes may include shared data structures for multiple applications 3312 (including ones that track the same transactions on a blockchain but may consume different subsets of available attributes of the data objects maintained in the blockchain or ones that use a set of nodes and links in a common knowledge graph). For example, a transaction indicating a change of ownership of an entity 3330 may be stored in a blockchain and used by multiple applications 3312, such as to enable role-based access control, role-based permissions for remote control, identity-based event reporting, and the like. In embodiments, converged processes may include shared process flows across applications 3312, including subsets of larger flows that are involved in one or more of a set of applications 3312. For example, an underwriting or inspection flow about an entity 3330 may serve a lending solution 3410, an analytics solution 3419, an asset management solution 3404, and others.

In embodiments, robotic process automation 3442 may be provided for the wide range of financial and transactional processes mentioned throughout this disclosure and the documents incorporated herein by reference, including without limitation energy trading, banking, transportation, storage, energy storage, maintenance processes, service processes, repair processes, supply chain processes, inspection processes, purchase and sale processes, underwriting processes, compliance processes, regulatory processes, fraud detection processes, fault detection processes, power utilization optimization processes, and many others. An environment for development of robotic process automation may include a set of interfaces for developers in which a developer may configure an artificial intelligence system 3448 to take inputs from selected data sources of the data storage layer 3310 and events or other data from the monitoring systems layer 3306 and supply them, such as to a neural network, either as inputs for classification or prediction, or as outcomes. The RPA development environment 3442 may be configured to take outputs and outcomes 3328 from various applications 3312, again to facilitate automated learning and improvement of classification, prediction, or the like that is involved in a step of a process that is intended to be automated. In embodiments, the development environment, and the resulting robotic process automation 3442 may involve monitoring a combination of both software program interaction observations 3450 (e.g., by workers interacting with various software interfaces of applications 3312 involving entities 3330) and physical process interaction observations 3458 (e.g., by watching workers interacting with or using machines, equipment, tools or the like). In embodiments, observation of software interactions 3450 may include interactions among software components with other software components, such as how one application 3312 interacts via APIs with another application 3312. In embodiments, observation of physical process interactions 3458 may include observation (such as by video cameras, motion detectors, or other sensors, as well as detection of positions, movements, or the like of hardware, such as robotic hardware) of how human workers interact with financial entities 3330 (such as locations of workers (including routes taken through a location, where workers of a given type are located during a given set of events, processes or the like, how workers manipulate pieces of equipment or other items using various tools and physical interfaces, the timing of worker responses with respect to various events (such as responses to alerts and warnings), procedures by which workers undertake scheduled maintenance, updates, repairs and service processes, procedures by which workers tune or adjust items involved in workflows, and many others). Physical process observation 3458 may include tracking positions, angles, forces, velocities, acceleration, pressures, torque, and the like of a worker as the worker operates on hardware, such as with a tool. Such observations may be obtained by any combination of video data, data detected within a machine (such as of positions of elements of the machine detected and reported by position detectors), data collected by a wearable device (such as an exoskeleton that contains position detectors, force detectors, torque detectors and the like that is configured to detect the physical characteristics of interactions of a human worker with a hardware item for purposes of developing a training data set). By collecting both software interaction observations 3450 and physical process interaction observations 3458 the RPA system 3442 can more comprehensively automate processes involving financial entities 3330, such as by using software automation in combination with physical robots.

In embodiments, robotic process automation 3442 is configured to train a set of physical robots that have hardware elements that facilitate undertaking tasks that are conventionally performed by humans. These may include robots that walk (including walking up and down stairs), climb (such as climbing ladders), move about a facility, attach to items, grip items (such as using robotic arms, hands, pincers, or the like), lift items, carry items, remove and replace items, use tools and many others.

With reference to FIG. 35, in embodiments provided herein is a transactional, financial and marketplace enablement system. An example system may include a robotic process automation circuit structured to interpret information from a plurality of data sources, and to interface with a plurality of management applications; wherein the plurality of management applications are each associated with a separate one of a plurality of financial entities; and wherein the robotic process automation circuit further comprises an artificial intelligence circuit structured to improve a process of at least one of the plurality of management applications in response to the information from the plurality of data sources.

Certain further aspects of an example system are described following, any one or more of which may be present in certain embodiments. An example system may include wherein the artificial intelligence circuit further comprises at least one circuit selected from the circuits consisting of: a smart contract services circuit, a valuation circuit, and an automated agent circuit.

An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the plurality of management applications includes a real estate application, and wherein the robotic process automation circuit is further structured to automate a real estate inspection process.

An example system may include wherein the robotic process automation circuit is further structured to automate the real estate inspection process by performing at least one operation selected from the operations consisting of: providing one of a video inspection command or a camera inspection command; utilizing data from the plurality of data sources to schedule an inspection event; and determining inspection criteria in response to a plurality of inspection data and inspection outcomes, and providing an inspection command in response to the plurality of inspection data and inspection outcomes.

An example system may include wherein the robotic process automation circuit is further structured to automate the real estate inspection process in response to at least one of the plurality of data sources that is not accessible to the real estate application.

An example system may include wherein at least one of the plurality of data sources is not accessible to each of the at least one of the plurality of management applications having an improved process by the robotic automation circuit.

An example system may include wherein the at least one of the plurality of management applications having an improved process by the robotic automation circuit comprises a real estate application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic automation circuit comprises a lending management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic automation circuit comprises a trading management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises an analytics management application, and wherein the at least one of the plurality of data sources comprises at least one data source selected from the data sources consisting of: an access data source, a claims data source, a worker data source, and an event data source.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the artificial intelligence circuit is further structured to iteratively improve the process in response to the outcome from the at least one entity.

Figure 36:
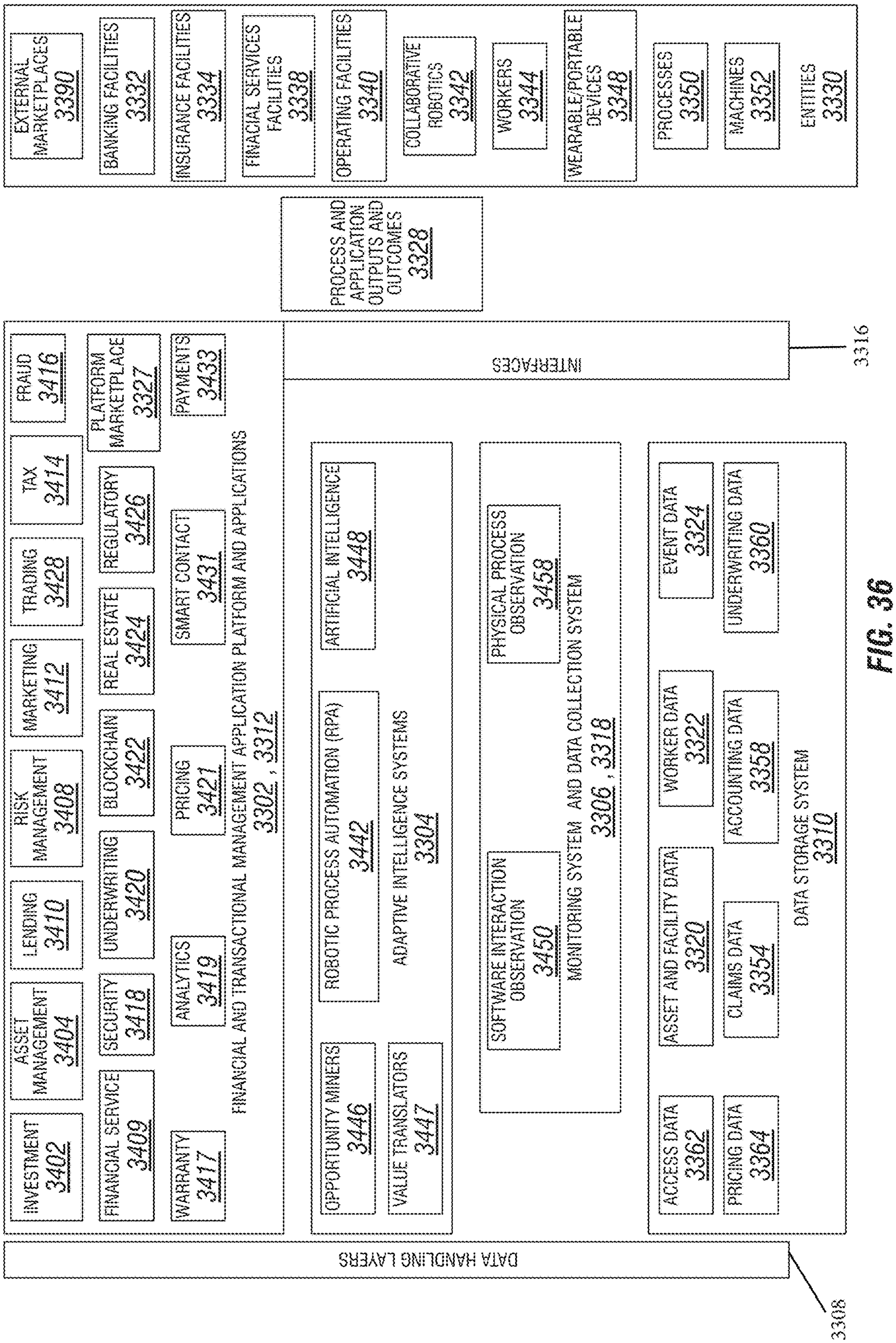
FIG. 36 depicts opportunity mining capabilities of a transactional, financial and marketplace enablement system.

Referring to FIG. 36, a set of opportunity miners 3446 may be provided as part of the adaptive intelligence layer 3304, which may be configured to seek and recommend opportunities to improve one or more of the elements of the platform 3300, such as via addition of artificial intelligence 3448, automation (including robotic process automation 3442), or the like to one or more of the systems, subsystems, components, applications or the like of the platform 100 or with which the platform 100 interacts. In embodiments, the opportunity miners 3446 may be configured or used by developers of AI or RPA solutions to find opportunities for better solutions and to optimize existing solutions. In embodiments, the opportunity miners 3446 may include a set of systems that collect information within the platform 100 and collect information within, about and for a set of environments and entities 3330, where the collected information has the potential to help identify and prioritize opportunities for increased automation and/or intelligence. For example, the opportunity miners 3446 may include systems that observe clusters of workers by time, by type, and by location, such as using cameras, wearables, or other sensors, such as to identify labor-intensive areas and processes in set of financial environments. These may be presented, such as in a ranked or prioritized list, or in a visualization (such as a heat map showing dwell times of customers, workers or other individuals on a map of an environment or a heat map showing routes traveled by customers or workers within an environment) to show places with high labor activity. In embodiments, analytics 3419 may be used to identify which environments or activities would most benefit from automation for purposes of labor saving, profit optimization, yield optimization, increased up time, increased throughput, increased transaction flow, improved security, improved reliability, or other factors.

In embodiments, opportunity miners 3446 may include systems to characterize the extent of domain-specific or entity-specific knowledge or expertise required to undertake an action, use a program, use a machine, or the like, such as observing the identity, credentials and experience of workers involved in given processes. This may be of particular benefit in situations where very experienced workers are involved (such as in complex transactions that require significant experience (such as multi-party transactions); in complex back-office processes involving significant expertise or training (such as risk management, actuarial and underwriting processes, asset allocation processes, investment decision processes, or the like); in update, maintenance, porting, backup, or re-build processes on large or complex machines; or in fine-tuning of complex processes where accumulated experience is required for effective work), especially where the population of those workers may be scarce (such as due to retirement or a dwindling supply of new workers having the same credentials). Thus, a set of opportunity miners 3446 may collect and supply to an analytics solution 3419, such as for prioritizing the development of automation 3442, data indicating what processes of or about an entity 3330 are most intensively dependent on workers that have particular sets of experience or credentials, such as ones that have experience or credentials that are scarce or diminishing. The opportunity miners 3446 may, for example, correlate aggregated data (including trend information) on worker ages, credentials, experience (including by process type) with data on the processes in which those workers are involved (such as by tracking locations of workers by type, by tracking time spent on processes by worker type, and the like). A set of high value automation opportunities may be automatically recommended based on a ranking set, such as one that weights opportunities at least in part based on the relative dependence of a set of processes on workers who are scarce or are expected to become scarcer.

In embodiments, the set of opportunity miners 3446 may use information relating to the cost of the workers involved in a set of processes, such as by accessing worker data 3322, including human resource database information indicating the salaries of various workers (either as individuals or by type), information about the rates charged by service workers or other contractors, or the like. An opportunity miner 3446 may provide such cost information for correlation with process tracking information, such as to enable an analytics solution 3419 to identify what processes are occupying the most time of the most expensive workers. This may include visualization of such processes, such as by heat maps that show what locations, routes, or processes are involving the most expensive time of workers in financial environments or with respect to entities 3330. The opportunity miners 3446 may supply a ranked list, weighted list, or other data set indicating to developers what areas are most likely to benefit from further automation or artificial intelligence deployment.

In embodiments, mining an environment for robotic process automation opportunities may include searching an HR database and/or other labor-tracking database for areas that involve labor-intensive processes; searching a system for areas where credentials of workers indicating potential for automation; tracking clusters of workers by a wearable to find labor-intensive machines or processes; tracking clusters of workers by a wearable by type of worker to find labor-intensive processes, and the like.

In embodiments, opportunity mining may include facilities for solicitation of appropriate training data sets that may be used to facilitate process automation. For example, certain kinds of inputs, if available, would provide very high value for automation, such as video data sets that capture very experienced and/or highly expert workers performing complex tasks. Opportunity miners 3446 may search for such video data sets as described herein; however, in the absence of success (or to supplement available data), the platform may include systems by which a user, such as a developer, may specify a desired type of data, such as software interaction data (such as of an expert working with a program to perform a particular task), video data (such as video showing a set of experts performing a certain kind of repair, an expert rebuilding a machine, an expert optimizing a certain kind of complex process, or the like), physical process observation data (such as video, sensor data, or the like). The specification may be used to solicit such data, such as by offering some form of consideration (e.g., monetary reward, tokens, cryptocurrency, licenses or rights, revenue share, or other consideration) to parties that provide data of the requested type. Rewards may be provided to parties for supplying pre-existing data and/or for undertaking steps to capture expert interactions, such as by taking video of a process. The resulting library of interactions captured in response to specification, solicitation and rewards may be captured as a data set in the data storage layer 3310, such as for consumption by various applications 3312, adaptive intelligence systems 3304, and other processes and systems. In embodiments, the library may include videos that are specifically developed as instructional videos, such as to facilitate developing an automation map that can follow instructions in the video, such as providing a sequence of steps according to a procedure or protocol, breaking down the procedure or protocol into sub-steps that are candidates for automation, and the like. In embodiments, such videos may be processed by natural language processing, such as to automatically develop a sequence of labeled instructions that can be used by a developer to facilitate a map, a graph, or other model of a process that assists with development of automation for the process. In embodiments, a specified set of training data sets may be configured to operate as inputs to learning. In such cases the training data may be time-synchronized with other data within the platform 3300, such as outputs and outcomes from applications 3312, outputs and outcomes of financial entities 3330, or the like, so that a given video of a process can be associated with those outputs and outcomes, thereby enabling feedback on learning that is sensitive to the outcomes that occurred when a given process that was captured (such as on video, or through observation of software interactions or physical process interactions).

In embodiments, opportunity miners 3446 may include methods, systems, processes, components, services and other elements for mining for opportunities for smart contract definition, formation, configuration and execution. Data collected within the platform 3300, such as any data handled by the data handling layers 3308, stored by the data storage layer 3310, collected by the monitoring layer 3306 and collection systems 3318, collected about or from entities 3330 or obtained from external sources may be used to recognize beneficial opportunities for application or configuration of smart contracts. For example, pricing information about an entity 3330, handled by a pricing application 3421, or otherwise collected, may be used to recognize situations in which the same item or items is disparately priced (in a spot market, futures market, or the like), and the opportunity miner 3446 may provide an alert indicating an opportunity for smart contract formation, such as a contract to buy in one environment at a price below a given threshold and sell in another environment at a price above a given threshold, or vice versa. In embodiments, robotic process automation 3442 may be used to automate smart contract creation, configuration, and/or execution, such as by training on a training set of data relating to experts who form such contract or based on feedback on outcomes from past contracts. Smart contract opportunities may also be recognized based on patterns, such as where predictions are used to indicate opportunities for options, futures, derivatives, forward market contracts, and other forward-looking contracts, such as where a smart contract is created based on a prediction that a future condition will arise that creates an opportunity for a favorable exchange, such as an arbitrage transaction, a hedging transaction, an "in-the-money" option, a tax-favored transaction, or the like. In embodiments, at a first step an opportunity miner 3446 seeks a price level for an item, service, good, or the like in a set of current or future markets. At a second step the opportunity miner 3446 determines a favorable condition for a smart contract (such as an arbitrage opportunity, tax saving opportunity, favorable option, favorable hedge, or the like). At a next step the opportunity miner 3446 may initiate a smart contract process in which a smart contract is pre-configured with a description of an item, a description of a price or other term or condition, a domain for execution (such as a set of markets in which the contract will be formed) and a time. At a next step an automation process may form the smart contract and execute it within the applicable domains. At a final step the platform may settle the contract, such as when conditions are met. In embodiments, the opportunity miners 3446 may be configured to maintain a set of value translators 3447 that may be developed to calculate exchange values of different items between and across disparate domains, such as by translating the value of various resources (e.g., computational, bandwidth, energy, attention, currency, tokens, credits (e.g., tax credits, renewable energy credits, pollution credits), cryptocurrency, goods, licenses (e.g., government-issued licenses, such as for spectrum, for the right to perform services or the like, as well as intellectual property licenses, software licenses and others), services and other items) with respect to other such resources, including accounting for any costs of transacting across domains to convert one resource to the other in a contract or series of contracts, such as ones executed via smart contracts. Value translators 3447 may translate between and among current (e.g., spot market) value, value in defined futures markets (such as day-ahead energy prices) and predicted future value outside defined futures markets. In embodiments, opportunity miners 3446 may operate across pairs or other combinations of value translators (such as across, two, three, four, five or more domains) to define a series of transaction amounts, configurations, domains and timing that will result in generation of value by virtue of undertaking transactions that result in favorable translation of value. For example, a cryptocurrency token may be exchanged for a pollution credit, which may be used to permit generation of energy, which may be sold for a price that exceeds the value of the cryptocurrency token by more than the cost of creating the smart contract and undertaking the series of exchanges.

With reference to FIG. 36, in embodiments provided herein is a transactional, financial and marketplace enablement system. An example system may include a robotic process automation circuit structured in interpret information from a plurality of data sources, and to interface with a plurality of management applications; wherein the plurality of management applications are each associated with a separate one of a plurality of financial entities; and wherein the robotic process automation circuit further comprises an opportunity miner component structured to determine a process improvement opportunity for at least one of the plurality of management applications in response to the information from the plurality of data sources; and to provide an output to at least one entity associated with the process improvement opportunity in response to the determined process improvement opportunity.

Certain further aspects of an example system are described following, any one or more of which may be present in certain embodiments. An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the opportunity miner component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the opportunity miner component is further structured to determine the process improvement opportunity in response to at least one parameter selected from the parameters consisting of: a time saving value, a cost saving value, and an improved outcome value.

An example system may include wherein the opportunity miner component is further structured to determine the process improvement opportunity in response to a value translation from a value translation application.

An example system may include wherein the plurality of management applications includes a trading application, and wherein the robotic process automation circuit is further structured to automate a trading service process.

An example system may include wherein the robotic process automation circuit is further structured to automate the trading service process by performing at least one operation selected from the operations consisting of: utilizing data from the plurality of data sources to schedule a trading event; and determining trading criteria in response to a plurality of asset data and trading outcomes, and providing a trading command in response to the plurality of asset data and trading outcomes.

An example system may include wherein the robotic process automation circuit is further structured to automate the trading service process in response to at least one of the plurality of data sources that is not accessible to the trading application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the opportunity miner component is further structured to iteratively improve the process in response to the outcome from the at least one entity.

An example system may include wherein at least one of the plurality of data sources is not accessible to each of the at least one of the plurality of management applications having an improved process by the robotic automation circuit.

An example system may include wherein the at least one of the plurality of management applications having an improved process by the robotic automation circuit comprises a tax application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic automation circuit comprises a lending management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic automation circuit comprises an investment management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic automation circuit comprises an underwriting management application, and wherein the at least one of the plurality of data sources comprises at least one data source selected from the data sources consisting of: an access data source, a claims data source, a worker data source, and an event data source.

Figure 37:
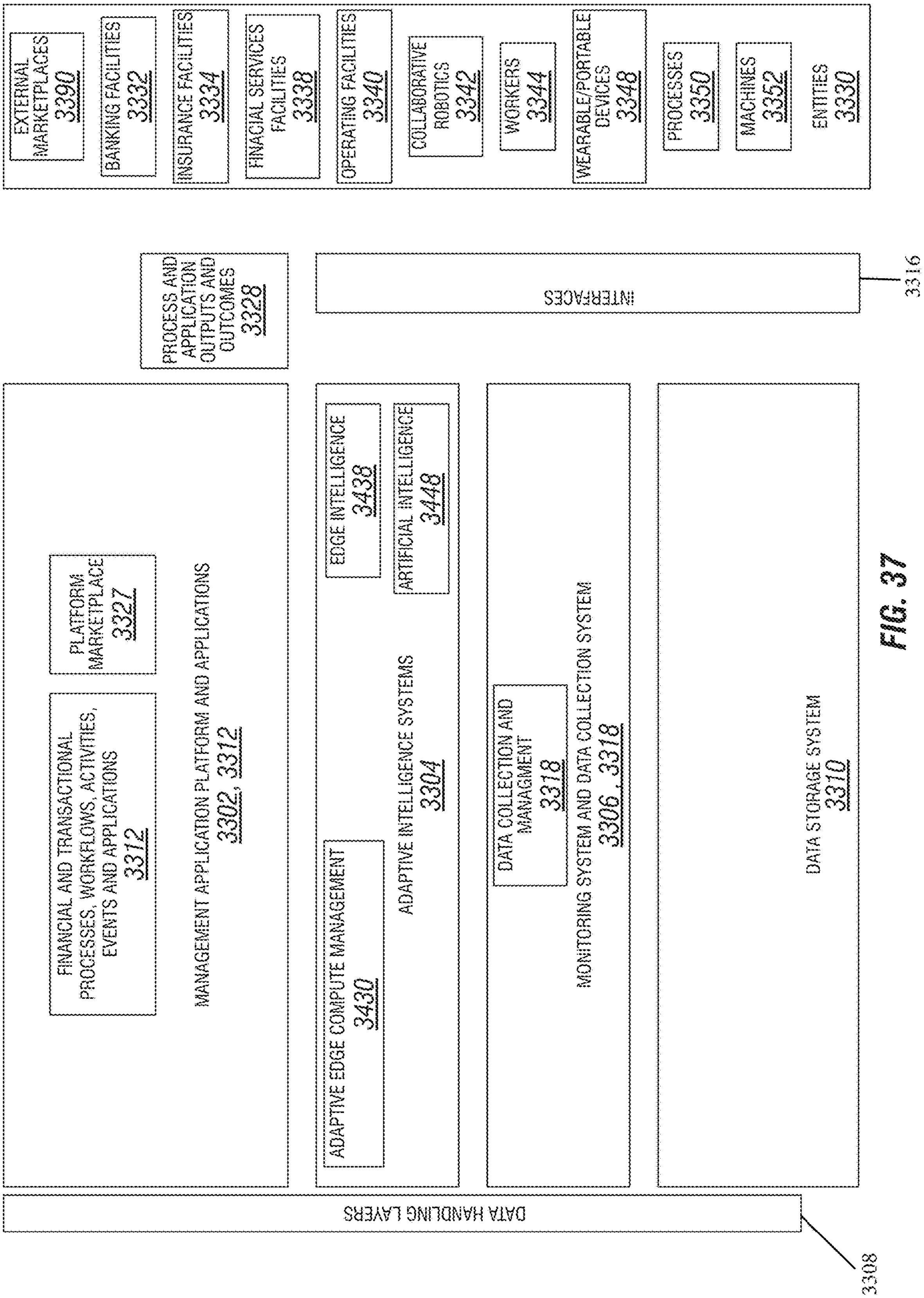
FIG. 37 depicts adaptive edge computation management and edge intelligence capabilities of a transactional, financial and marketplace enablement system.

Referring to FIG. 37, additional details of an embodiment of the platform 3300 are provided, in particular relating to elements of the adaptive intelligence layer 3304 that facilitate improved edge intelligence, including the adaptive edge compute management system 3430 and the edge intelligence system 3438. These elements provide a set of systems that adaptively manage "edge" computation, storage and processing, such as by varying storage locations for data and processing locations (e.g., optimized by AI) between on-device storage, local systems, in the network and in the cloud. These elements 3430, 3438 enable facilitation of a dynamic definition by a user, such as a developer, operator, or host of the platform 100, of what constitutes the "edge" for purposes of a given application. For example, for environments where data connections are slow or unreliable (such as where a facility does not have good access to cellular networks (such as due to remoteness of some environments (such as in geographies with poor cellular network infrastructure), shielding or interference (such as where density of network-using systems, thick walls, underground location, or presence of large metal objects (such as vaults) interferes with networking performance), and/or congestion (such as where there are many devices seeking access to limited networking facilities), edge computing capabilities can be defined and deployed to operate on the local area network of an environment, in peer-to-peer networks of devices, or on computing capabilities of local financial entities 3330. Where strong data connections are available (such as where good back-haul facilities exist), edge computing capabilities can be disposed in the network, such as for caching frequently used data at locations that improve input/output performance, reduce latency, or the like. Thus, adaptive definition and specification of where edge computing operations is enabled, under control of a developer or operator, or optionally determined automatically, such as by an expert system or automation system, such as based on detected network conditions for an environment, for an entity 3330, or for a network as a whole. In embodiments, edge intelligence 3438 enables adaptation of edge computation (including where computation occurs within various available networking resources, how networking occurs (such as by protocol selection), where data storage occurs, and the like) that is multi-application aware, such as accounting for QoS, latency requirements, congestion, and cost as understood and prioritized based on awareness of the requirements, the prioritization, and the value (including ROI, yield, and cost information, such as costs of failure) of edge computation capabilities across more than one application, including any combinations and subsets of the applications 3312 described herein or in the documents incorporated herein by reference.

With reference to FIG. 37, in embodiments provided herein is a transactional, financial and marketplace enablement system. An example system may include an adaptive edge computing circuit structured to interpret information from a plurality of data sources, and to interface with a plurality of management applications; wherein the plurality of management applications are each associated with a separate one of a plurality of financial entities; and wherein the adaptive edge computing circuit further comprises an edge intelligence component structured to determine an edge intelligence process improvement for at least one of the plurality of management applications in response to the information from the plurality of data sources.

Certain further aspects of an example system are described following, any one or more of which may be present in certain embodiments. An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the edge intelligence component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the edge intelligence component is further structured to determine a process improvement opportunity in response to at least one parameter selected from the parameters consisting of: a time saving value, a cost saving value, and an improved outcome value.

An example system may include wherein the plurality of management applications includes a security application, and wherein the adaptive edge computing circuit is further structured to automate a security service process.

An example system may include wherein the adaptive edge computing circuit is further structured to automate the security service process by performing at least one operation selected from the operations consisting of: utilizing data from the plurality of data sources to schedule a security event; and determining security criteria in response to a plurality of asset data and security outcomes, and providing a security command in response to the plurality of asset data and security outcomes.

An example system may include wherein the adaptive edge computing circuit is further structured to automate the security service process in response to at least one of the plurality of data sources that is not accessible to the security application.

An example system may include wherein the adaptive edge computing circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the adaptive edge computing circuit is further structured to interpret an outcome from the at least one entity, and wherein the edge intelligence component is further structured to iteratively improve the process in response to the outcome from the at least one entity.

An example system may include wherein at least one of the plurality of data sources is not accessible to each of the at least one of the plurality of management applications having an improved process by the adaptive edge computing circuit.

An example system may include wherein the at least one of the plurality of management applications having an improved process by the adaptive edge computing circuit comprises a risk application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the adaptive edge computing circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the adaptive edge computing circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive edge computing circuit comprises a platform marketplace application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the adaptive edge computing circuit comprises a platform marketplace application, and wherein the adaptive edge computing circuit is further structured to operate an interface to interpret an edge definition, and wherein an edge intelligence component is further structured to determine the edge intelligence process improvement in response to the edge definition.

An example system may include wherein the edge definition comprises an identification of at least one of the following parameters: a slow data connection, an unreliable data connection, a network interference description, a network caching description, a quality of service requirement, or a latency requirement.

Figure 38:
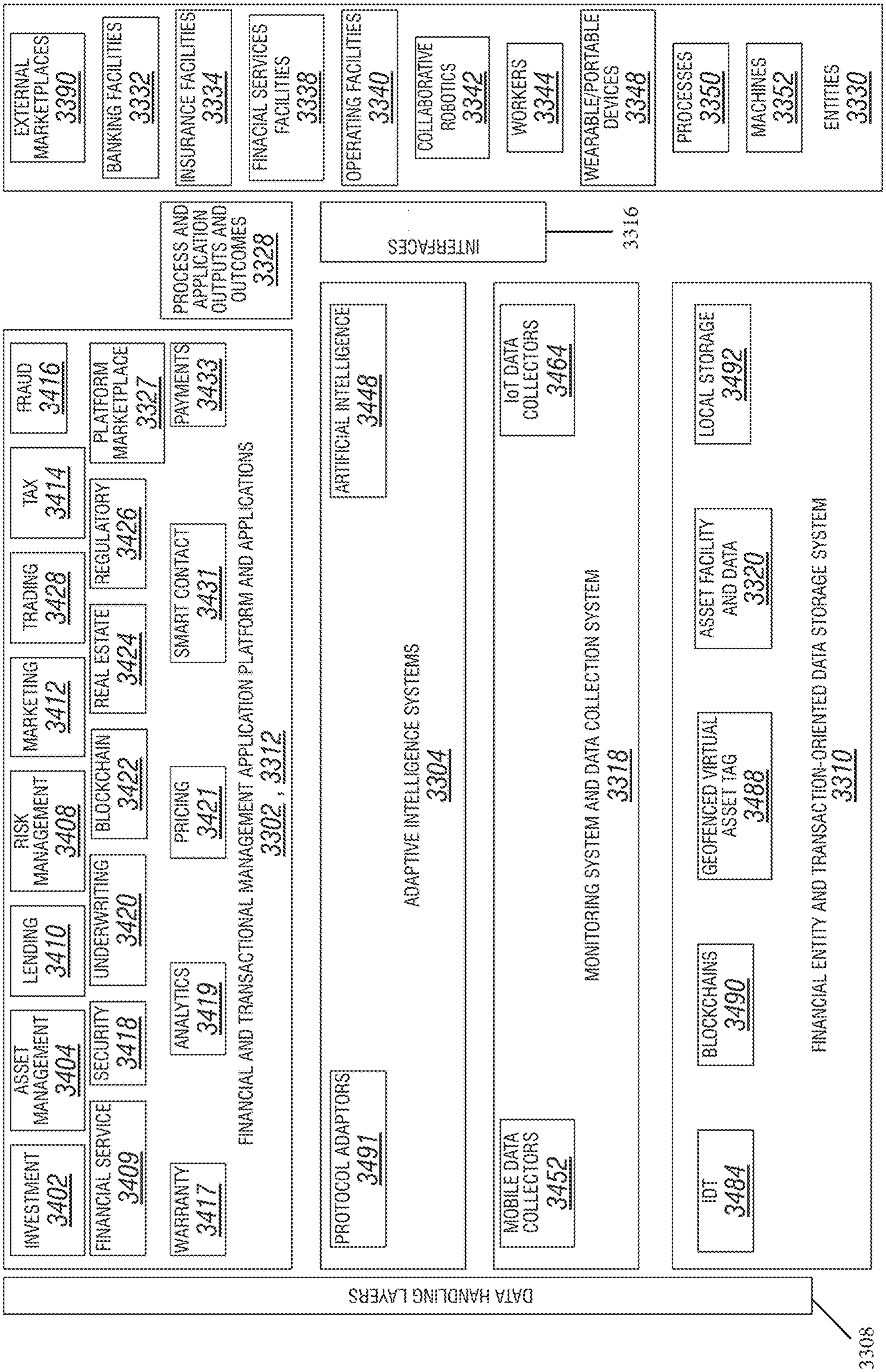
FIG. 38 depicts protocol adaptation and adaptive data storage capabilities of a transactional, financial and marketplace enablement system.

Referring to FIG. 38, additional details, components, sub-systems, and other elements of an optional embodiment of the storage layer 3310 of the platform 3300 are illustrated, relating in particular to embodiments that may include a geofenced virtual asset tag 3488, such as for one or more assets within the asset and facility data 3320 described throughout this disclosure and the document incorporated by reference herein. In embodiments, the virtual asset tag is a data structure that contains data about an entity 3330, such as an asset (which may be physical or virtual), machine, item of equipment, item of inventory, manufactured article, certificate (such as a stock certificate), deed, component, tool, device, or worker (among others), where the data is intended to be tagged to the asset, such as where the data relates uniquely to the particular asset (e.g., to a unique identifier for the individual asset) and is linked to proximity or location of the asset (such as being geofenced to an area or location of or near the asset, or being associated with a geo-located digital storage location or defined domain for a digital asset). The virtual asset tag is thus functionally equivalent to a physical asset tag, such as an RFID tag, in that it provides a local reader or similar device to access the data structure (as a reader would access an RFID tag), and in embodiments access control is managed as if the tag were physical located on an asset; for example, certain data may be encrypted with keys that only permit it to be read, written to, modified, or the like by an operator who is verified to be in the proximity of a tagged financial entity 3330, thereby allowing partitioning of local-only data processing from remote data processing. In embodiments, the virtual asset tag may be configured to recognize the presence of an RF reader or other reader (such as by recognition of an interrogation signal) and communicate to the reader, such as with help of protocol adaptors, such as over an RF communication link with the reader, notwithstanding the absence of a conventional RFID tag. This may occur by communications from IoT devices, telematics systems, and by other devices residing on a local area network. In embodiments, a set of IoT devices in a marketplace or financial or transactional environment can act as distributed blockchain nodes, such as for storage of virtual asset tag data, for tracking of transactions, and for validation (such as by various consensus protocols) of enchained data, including transaction history for maintenance, repair and service. In embodiments, the IoT devices in a geofence can collectively validate location and identity of a fixed asset that is tagged by a virtual asset tag, such as where peers or neighbors validate other peers or neighbors as being in a given location, thereby validating the unique identity and location of the asset. Validation can use voting protocols, consensus protocols, or the like. In embodiments, identity of the financial entities that are tagged can be maintained in a blockchain. In embodiments, an asset tag may include information that is related to a digital thread 3484, such as historical information about an asset, its components, its history, and the like.

With reference to FIG. 38, In embodiments provided herein is a transactional, financial and marketplace enablement system. An example system may include an adaptive intelligence circuit structured in interpret information from a plurality of data sources, and to interface with a plurality of management applications, wherein the adaptive intelligence circuit comprises a protocol adapter component; wherein the plurality of management applications are each associated with a separate one of a plurality of financial entities; and wherein the adaptive intelligence circuit further comprises an artificial intelligence component structured to determine an artificial intelligence process improvement for at least one of the plurality of management applications in response to the information from the plurality of data sources.

Certain further aspects of an example system are described following, any one or more of which may be present in certain embodiments. An example system may include wherein at least one of the plurality of data sources is a mobile data collector.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the mobile data collector that the operator is in a proximity of a tagged financial entity.

An example system may include wherein the mobile data collector collects data from at least one geofenced virtual asset tag.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the at least one geofenced virtual asset tag that the operator is in a proximity of a tagged financial entity.

An example system may include wherein at least one of the plurality of data sources is an Internet of Things data collector.

An example system may include wherein the adaptive intelligence circuit further comprises a protocol adapter component structured to determine a communication protocol facilitating communication between an entity accessing the at least one of the plurality of management applications having an improved process.

An example system may include wherein the entity accessing the at least one of the plurality of management applications comprises an operator related to the at least one of the plurality of management applications, and wherein the protocol adapter component is further structured to determine the communication protocol as a protocol enabling encrypted communications in response to a determination from the Internet of Things data collector that the operator is in a proximity of a tagged financial entity.

An example system may include wherein at least one of the plurality of data sources is a blockchain circuit, and wherein the adaptive intelligence circuit interprets the information from the blockchain circuit utilizing the adaptive intelligence circuit.

An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the artificial intelligence component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the artificial intelligence component is further structured to determine a process improvement opportunity in response to at least one parameter selected from the parameters consisting of: a time saving value, a cost saving value, and an improved outcome value.

An example system may include wherein the plurality of management applications includes a risk management application, and wherein the adaptive intelligence circuit is further structured to automate a risk management process.

An example system may include wherein the adaptive intelligence circuit is further structured to automate the risk management process by performing at least one operation selected from the operations consisting of: utilizing data from the plurality of data sources to schedule a risk event; determining risk criteria in response to a plurality of asset data and risk outcomes, and providing a risk command in response to the plurality of asset data and risk management outcomes; and adjusting a geofencing location to provide at least one of an improved access for an operator related to at least one of the plurality of management applications or improve a security of communications to at least one of the plurality of management applications.

An example system may include wherein the adaptive intelligence circuit is further structured to automate the risk management process in response to at least one of the plurality of data sources that is not accessible to the risk management application.

An example system may include wherein the adaptive intelligence circuit is further structured to improve the process of at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the adaptive intelligence circuit is further structured to interpret an outcome from the at least one entity, and wherein the artificial intelligence component is further structured to iteratively improve the process in response to the outcome from the at least one entity.

An example system may include wherein at least one of the plurality of data sources is not accessible to each of the at least one of the plurality of management applications having an improved process by the adaptive intelligence circuit.

An example system may include wherein the at least one of the plurality of management applications having an improved process by the adaptive intelligence circuit comprises a smart contract application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the adaptive intelligence circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the adaptive intelligence circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive intelligence circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the adaptive intelligence circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the adaptive intelligence circuit comprises a warranty management application, and wherein the at least one of the plurality of data sources comprises at least one data source selected from the data sources consisting of: an access data source, a claims data source, a worker data source, and an event data source.

Figure 39:
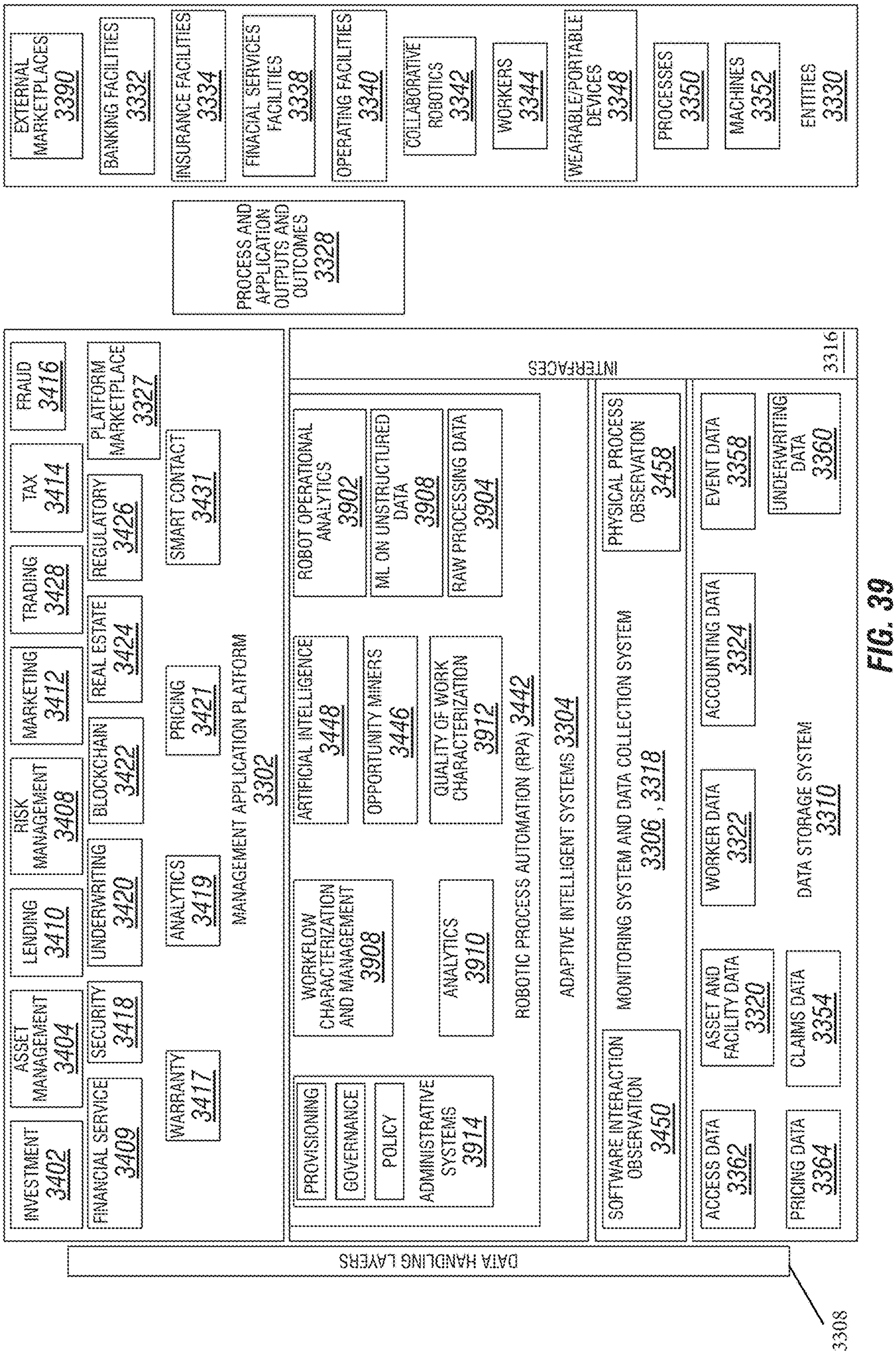
FIG. 39 depicts robotic operational analytic capabilities of a transactional, financial and marketplace enablement system.

Referring to FIG. 39, in embodiments, a unified RPA system 3442, such as for developing and deploying one or more automation capabilities may include or enable capabilities for robot operational analytics 3902, such as for analyzing operational actions of a set of robots, including with respect to location, mobility and routing of mobile robots, as well as with respect to motions of robot components, such as where robotic components are used within a wide range of protocols or procedures, such as banking processes, underwriting processes, insurance processes, risk assessment processes, risk mitigation processes, inspection processes, exchange processes, sale processes, purchase processes, delivery processes, warehousing processes, assembly processes, transport processes, maintenance and repair processes, data collection processes, and many others.

In embodiments, the RPA system 3442 may include or enable capabilities for machine learning on unstructured data 3908, such as learning on a training set of human labels, tags, or other activities that allow characterization of the unstructured data, extraction of content from unstructured data, generation of diagnostic codes or similar summaries from content of unstructured data, or the like. For example, the RPA system 3442 may include sub-systems or capabilities for processing PDFs (such as technical data sheets, functional specifications, repair instructions, user manuals and other documentation about financial entities 3330, such as machines and systems), for processing human-entered notes (such as notes involved in diagnosis of problems, notes involved in prescribing or recommending actions, notes involved in characterizing operational activities, notes involved in maintenance and repair operations, and many others), for processing information unstructured content contained on websites, social media feeds and the like (such as information about products or systems in an financial environment that can be obtained from vendor websites), and many others.

In embodiments, the RPA system 3442 may comprise a unified platform with a set of RPA capabilities, as well as systems for monitoring (such as the systems of the monitoring layer 3306 and data collection systems 3318), systems for raw data processing 3904 (such as by optical character recognition (OCR), natural language processing (NPL), computer vision processing, sound processing, sensor processing and the like); systems for workflow characterization and management 3908; analytics capabilities 3910; artificial intelligence capabilities 3448; and administrative systems 3914, such as for policy, governance, provisioning (such as of services, roles, access controls, and the like) among others. The RPA system 3442 may include such capabilities as a set of microservices in a microservices architecture. The RPA system 3442 may have a set of interfaces to other platform layers 3308, as well as to external systems, for data exchange, such that the RPA system 3442 can be accessed as an RPA platform-as-a-service by external systems that can benefit from one or more automation capabilities.

In embodiments, the RPA system 3442 may include a quality-of-work characterization capability 3912, such as one that identifies high quality work as compared to other work. This may include recognizing human work as different from work performed by machines, recognizing which human work is likely to be of highest quality (such as work involving the most experienced or expensive personnel), recognizing which machine-performed work is likely to be of the highest quality (such as work that is performed by machines that have extensively learned on feedback from many outcomes, as compared to machines that are newly deployed, and recognizing which work has historically provided favorable outcomes (such as based on analytics or correlation to past outcomes). A set of thresholds may be applied, which may be varied under control of a developer or other user of the RPA system 3442, such as to indicate by type, by quality-level, or the like, which data sets indicating past work will be used for training within machine learning systems that facilitate automation.

With reference to FIG. 39, in embodiments provided herein is a transactional, financial and marketplace enablement system. An example system may include an robotic process automation circuit structured in interpret information from a plurality of data sources, and to interface with a plurality of management applications; wherein the plurality of management applications are each associated with a separate one of a plurality of financial entities; and wherein the robotic process automation circuit further comprises a robot operational analytics component structured to determine a robot operational process improvement for at least one of the plurality of management applications in response to the information from the plurality of data sources.

Certain further aspects of an example system are described following, any one or more of which may be present in certain embodiments. An example system may further include an administrative system circuit structured to adapt the robot operational process improvement through at least one of governance of robotic operations, provisioning robotic operations, or robotic operations policies.

An example system may include wherein the robot operational process improvement comprises a robotic workflow characterization and improvement.

An example system may further include an opportunity mining circuit structured to adapt the operational process improvement to one of the plurality of management applications.

An example system may include wherein the robot operational process improvement comprises a robotic quality of work characterization and improvement.

An example system may include wherein the robot operational analytics component comprises a robotics machine learning component for processing the information from a plurality of data sources to determine the robot operational process improvement.

An example system may include wherein the robot operational analytics component comprises a raw data processing component for processing the information from a plurality of data sources to determine the robot operational process improvement.

An example system may include wherein the plurality of management applications comprise at least two applications selected from the applications consisting of: an investment application, as asset management application, a lending application, a risk management application, a marketing application, a trading application, a tax application, a fraud application, a financial service application, a security application, an underwriting application, a blockchain application, a real estate application, a regulatory application, a platform marketplace application, a warranty application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the robot operational analytics component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the robot operational analytics component is further structured to determine a process improvement opportunity in response to at least one parameter selected from the parameters consisting of: a time saving value, a cost saving value, and an improved outcome value.

An example system may include wherein the plurality of management applications includes a regulatory management application, and wherein the robotic process automation circuit is further structured to automate a regulatory management process.

An example system may include wherein the robotic process automation circuit is further structured to automate the regulatory management process by performing at least one operation selected from the operations consisting of: utilizing data from the plurality of data sources to schedule a regulatory event; and determining regulatory criteria in response to a plurality of asset data and regulatory outcomes, and providing a regulatory command in response to the plurality of asset data and regulatory management outcomes.

An example system may include wherein the robotic process automation circuit is further structured to automate the regulatory management process in response to at least one of the plurality of data sources that is not accessible to the regulatory management application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the robot operational analytics component is further structured to iteratively improve the process in response to the outcome from the at least one entity.

An example system may include wherein at least one of the plurality of data sources is not accessible to each of the at least one of the plurality of management applications having an improved process by the robotic process automation circuit.

An example system may include wherein the at least one of the plurality of management applications having an improved process by the robotic process automation circuit comprises an investment application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic process automation circuit comprises an asset management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic process automation circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a marketing management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic process automation circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a warranty management application, and wherein the at least one of the plurality of data sources comprises at least one data source selected from the data sources consisting of: an access data source, a claims data source, a worker data source, and an event data source.

Figure 40:
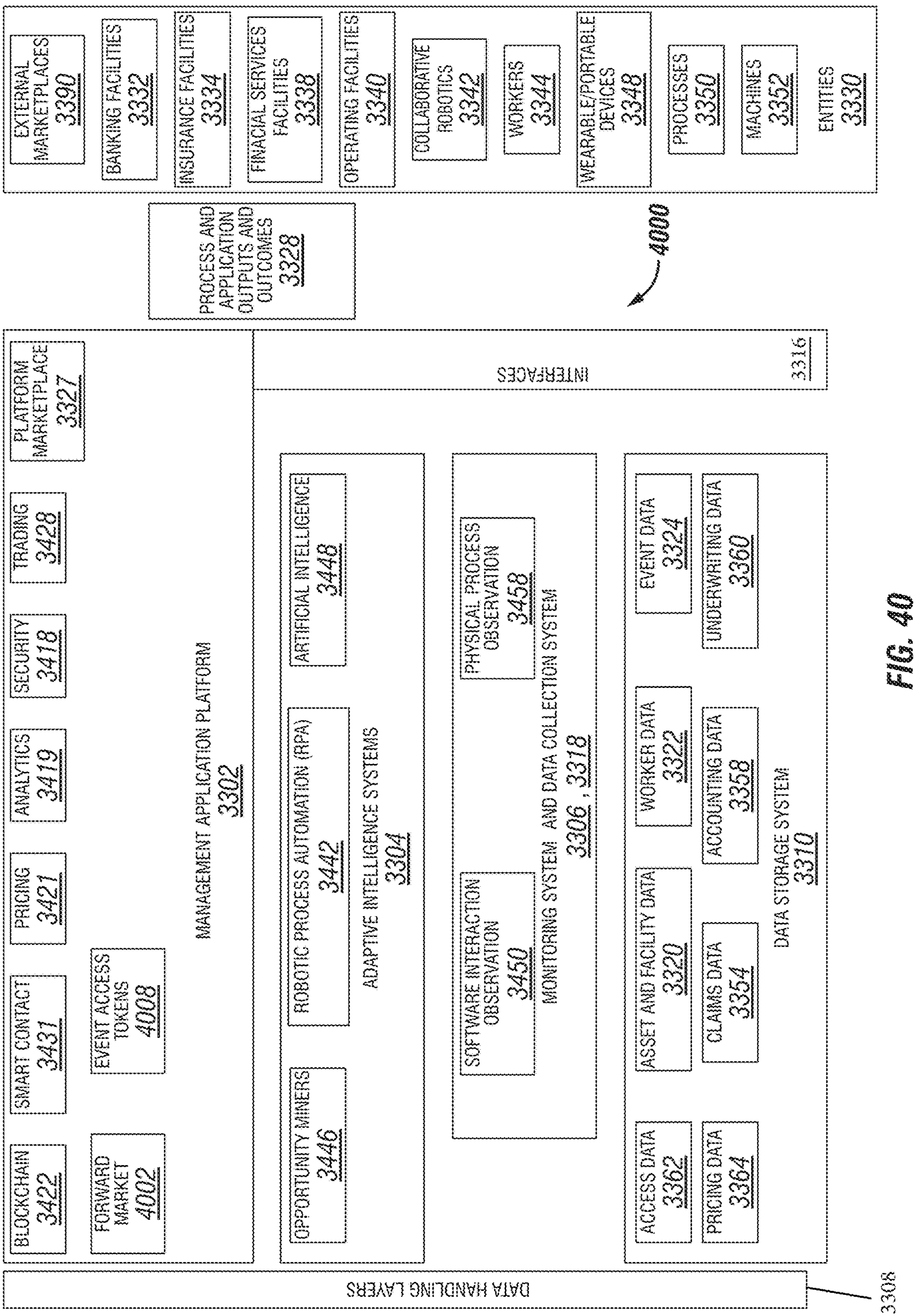
FIG. 40 depicts a blockchain and smart contract platform for a forward market for access rights to events.

Referring to FIG. 40, in embodiments, various systems, methods, processes, services, components and other elements for enabling a blockchain and smart contract platform for a forward market 4002 for access rights to events. Within a transactional enablement system such as described in connection with various embodiments of the platform 3300, a blockchain application 3422 and associated smart contract 3431 may be used to enable a forward market 4002 for access rights to events, such as where one or more event tickets, seat licenses, access rights, rights of entry, passes (e.g., backstage passes) or other items representing, comprising or embodying an access token for the right to attend, enter, view, consume, or otherwise participate in an event (which may be a live event, a recorded event, an event at a physical venue, a digital content event, or other event to which access is controlled)(all of which are encompassed by the term access token 4008 as used herein, except where context indicates otherwise) is securely stored on a blockchain that is configured by a blockchain application 3422, such as one in which the blockchain 3422 comprises a ledger of transactions in access tokens 4008 (such term comprising tickets and other evidence of the right to access the event), such as with indications of ownership (including identity information, event information, token information, information about terms and conditions, and the like) and a record of transfer of ownership (including terms, condition and policies regarding transferability). In embodiments, such a blockchain-based access token may be traded in a marketplace application 3327, such as one configured to operate with or for a spot market or forward market 4002. In embodiments, the forward market 4002 operated within or by the platform may be a contingent forward market, such as one where a future right vests, is triggered, or emerges based on the occurrence of an event, satisfaction of a condition, or the like, such as enabled by a smart contract 3431 that operates on one or more data structures in or associated with a platform-operated marketplace 3327 or an external marketplace 3390 to execute or apply a rule, term, condition or the like, optionally resulting in a transaction that is recorded in the blockchain (such as on a distributed ledger on the blockchain), which may, in turn, initiate other processes and result in other smart contract operations. In such embodiments, a condition triggering an event may include an event promotor or other party scheduling an event having a defined set of parameters, an event arising having such parameters, or the like, and the blockchain-based access token 4008 may be configured (optionally in conjunction with a smart contract 3431 and with one or more monitoring systems 3306) to recognize the presence or existence, such as in an external marketplace 3390 of an event, or an access token to an event, that satisfies the defined set of parameters and to initiate an operation with respect to the access token, such as reporting the existence of availability of the access token, transferring access to the access token, transferring ownership, setting a price, or the like. In embodiments, monitoring systems 3306 may monitor external marketplaces 3390 for relevant events, tokens and the like, as well as for information indicating the emergence of conditions that satisfy one or more conditions that result in triggering, vesting, or emergence of a condition that impacts an access token or event. As an illustrative example, a sporting event access token 4008 to a playoff game may be configured to vest upon the presence of a specific team in a specific game (e.g., the Super Bowl), at which point the right to a ticket to a specific seat may be automatically allocated on a distributed ledger, enabled by a blockchain, to the individual listed on the ledger as having the right to the ticket for that team. Thus, a distributed ledger or other blockchains 3422 may securely maintain multiple prospective owners for an event token 4008 for the same event, provided access rights can be divided such that they are mutually exclusive but can be designated to a specific owner upon the emergence of a condition (e.g., a particular seat at a game, concert, or the like) and allocate ownership to a specific owner based on upon the emergence of a condition that determines which prospective owner has the right to become the actual owner (e.g., that owner's team makes it to the game). In the example of a sports league, the blockchain can thus maintain as many owners as there are mutually exclusive conditions for a seat (e.g., by allocating seats across all teams in a conference for the Super Bowl, or all teams in a division for a college football conference final). The defined set of parameters may include location (where an as-yet-unscheduled event takes place), participants (teams, individuals and many others), prices (such as the access token is priced below a defined threshold), timing (such as a span of hours, days, months, years, or other periods), type of event (sports, concerts, comedy performances, theatrical performances, political events, and many others) and others. In embodiments, one or more monitoring systems 3306 or other data collection systems may be configured to monitor one or more external marketplaces 3390 or platform-operated marketplaces (such as on e-commerce websites and applications, auction sites and applications, social media sites and applications, exchange sites and applications, ticketing sites and applications, travel sites and applications, hospitality sites and applications, concert promotional sites and applications, or other sites or applications) or other entities for indicators of available events, for prospective conditions that can be used to define potentially divisible or mutually exclusive access right conditions (such as for identifying events that can be configured on a multiparty distributed ledger with conditional access distributed across different prospective owners, optionally conducted via one or more opportunity miners 3446) and for actual conditions that may trigger distribution of rights to a specific owner based on the conditions. Thus, the blockchain may be used to make a contingent market in any form of event or access token by securely storing access rights on a distributed ledger, and the contingent market may be automated by configuring data collection and a set of business rules that operate upon collected data to determine when ownership rights should be vested, transferred, or the like. Post-vesting of a contingency (or set of contingencies), the access token may continue to be traded, with the blockchain providing a secure method of validating access. Security may be provided by encryption of the chain as with cryptocurrency tokens (and a cryptocurrency token may itself comprise a forward-market cryptocurrency token for event access), with proof of work, proof of stake, or other methods for validation in the case of disputes.

In embodiments, the platform 4000 may include or interact with various applications, services, solutions or the like, such as those described in connection with the platform 3300, such as pricing applications 3421 (such as for setting and monitoring pricing for contingent access rights, underlying access rights, tokens, fees and the like), analytics applications 3419 (such as for monitoring, reporting, predicting, and otherwise analyzing all aspects of the platform 4000, such as to optimize offerings, timing, pricing, or the like, to recognize and predict patterns, to establish rules and contingencies, to establish models or understanding for use by humans or by machine learning system, and for many other purposes), trading applications 3428 (such as for trading or exchanging contingent access rights or underlying access rights or tokens), security applications 3418, or the like.

With reference to FIG. 40, in embodiments provided herein is a transactional, financial and marketplace enablement system. An example system may include an robotic process automation circuit structured in interpret information from a plurality of data sources, and to interface with a plurality of management applications; wherein the plurality of management applications are each associated with a separate one of a plurality of financial entities; and wherein the robotic process automation circuit further comprises an opportunity mining component structured to determine a robot operational process improvement for at least one of the plurality of management applications in response to the information from the plurality of data sources.

Certain further aspects of an example system are described following, any one or more of which may be present in certain embodiments. An example system may further include a data collection circuit structured to collect and record physical process observation data, wherein the physical process observation data is one of the plurality of data sources.

An example system may further include a data collection circuit structured to collect and record software interaction observation data, wherein the software interaction observation data is one of the plurality of data sources.

An example system may include wherein the plurality of management applications comprise at least two applications selected from the applications consisting of: a forward market application, an event access tokens application, a security application, a blockchain application, a platform marketplace application, an analytics application, a pricing application, and a smart contract application.

An example system may include wherein the plurality of data sources comprise at least two applications selected from the applications consisting of: an access data source, an asset and facility data source, a worker data source, a claims data source, an accounting data source, an event data source, and an underwriting data source.

An example system may include wherein the at least one entity each comprise an entity selected from the entities consisting of: an external marketplace, a banking facility, an insurance facility, a financial service facility, an operating facility, a collaborative robotics facility, a worker, a wearable device, an external process, and a machine.

An example system may include wherein the opportunity mining component is further structured to determine a plurality of process improvement opportunities for one of the plurality of management applications in response to the information from the plurality of data sources, and to provide one of a prioritized list or a visualization of the plurality of process improvement opportunities to the one of the plurality of management applications.

An example system may include wherein the opportunity mining component is further structured to determine a process improvement opportunity in response to at least one parameter selected from the parameters consisting of: a time saving value, a cost saving value, and an improved outcome value.

An example system may include wherein the plurality of management applications includes a trading management application, and wherein the robotic process automation circuit is further structured to automate a trading management process.

An example system may include wherein the robotic process automation circuit is further structured to automate the trading management process by performing at least one operation selected from the operations consisting of: utilizing data from the plurality of data sources to schedule a trading event; and determining trading criteria in response to a plurality of asset data and trading outcomes, and providing a trading command in response to the plurality of asset data and trading management outcomes.

An example system may include wherein the robotic process automation circuit is further structured to automate the trading management process in response to at least one of the plurality of data sources that is not accessible to the trading management application.

An example system may include wherein the robotic process automation circuit is further structured to improve the process at least one of the plurality of management applications by providing an output to at least one entity selected from the entities consisting of: an external marketplace, a banking facility, an insurance facility, a financial service facility, an operating facility, a collaborative robotics facility, a worker, a wearable device, an external process, and a machine.

An example system may include wherein the robotic process automation circuit is further structured to interpret an outcome from the at least one entity, and wherein the opportunity mining component is further structured to iteratively improve the process in response to the outcome from the at least one entity.

An example system may include wherein at least one of the plurality of data sources is not accessible to each of the at least one of the plurality of management applications having an improved process by the robotic process automation circuit.

An example system may include wherein the at least one of the plurality of management applications having an improved process by the robotic process automation circuit comprises a forward market application, and wherein the at least one of the plurality of data sources comprises at least one data source selected from the data sources consisting of: a claims data source, a pricing data source, an asset and facility data source, a worker data source, and an event data source.

An example system may include wherein the at least one of the plurality of management applications having an improved process by the robotic process automation circuit comprises an event access tokens management application, and wherein the at least one of the plurality of data sources comprises at least one data source selected from the data sources consisting of: an access data source, a pricing data source, an accounting data source, a worker data source, and an event data source.

An example system may include wherein the at least one of the plurality of management applications having an improved process by the robotic process automation circuit comprises a security management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises a blockchain management application, and wherein the at least one of the plurality of data sources comprises at least one data source selected from the data sources consisting of: an asset and facility data source, a claims data source, a worker data source, an event data source, and an underwriting data source.

An example system may include wherein the at least one of the plurality of management applications having an improved process by the robotic process automation circuit comprises a pricing management application, and wherein the at least one of the plurality of data sources comprises at least one data source selected from the data sources consisting of: an asset and facility data source, a claims data source, a worker data source, and an event data source.

An example system may include wherein the at least one of the plurality of management applications having an improved process by the robotic process automation circuit comprises an analytics management application, and wherein the at least one of the plurality of data sources comprises at least one data source selected from the data sources consisting of: an access data source, a claims data source, a worker data source, and an event data source.

Figure 41:
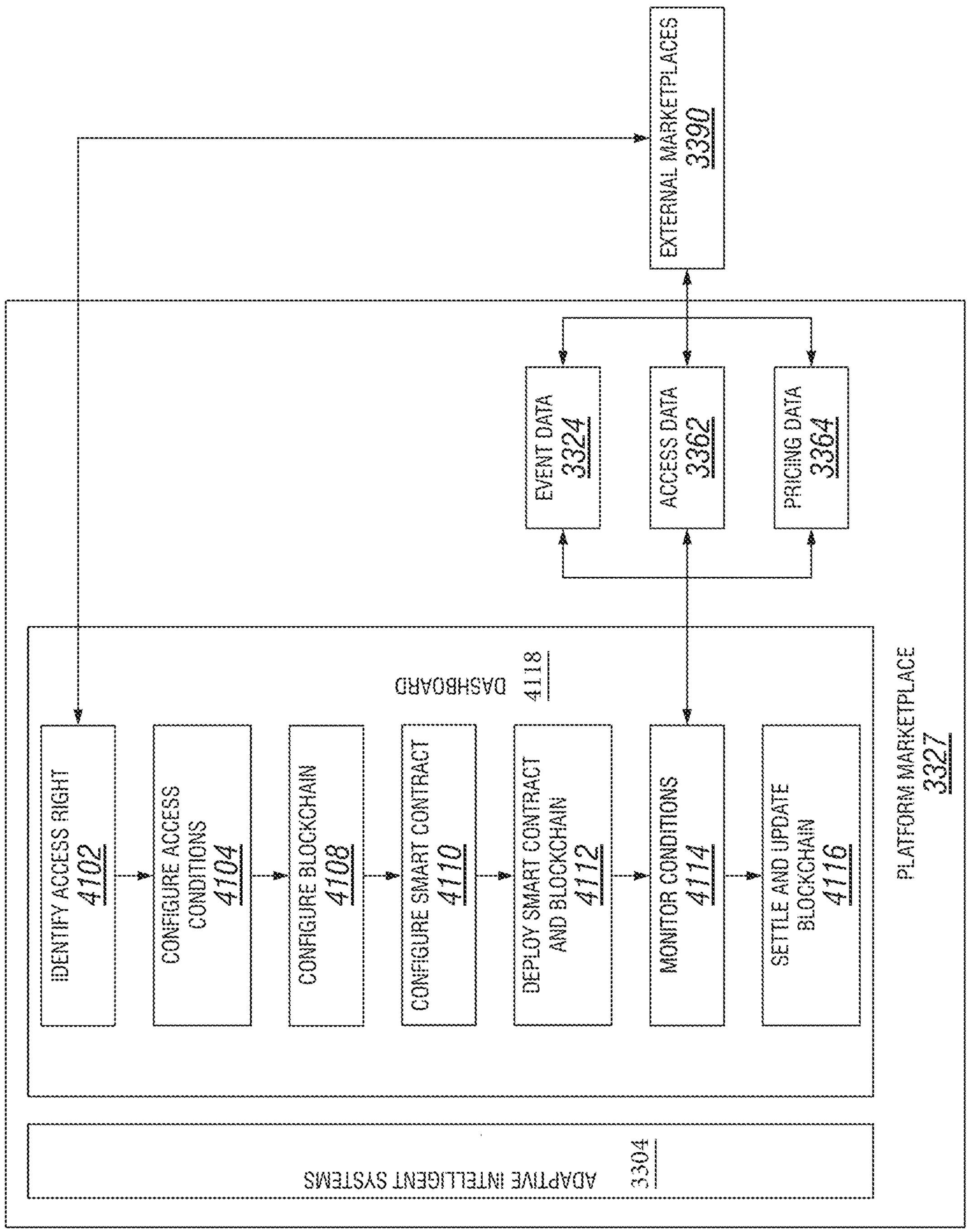
FIG. 41 depicts an algorithm and a dashboard of a blockchain and smart contract platform for a forward market for access rights to events.

Referring to FIG. 41, a platform-operated marketplace 3327 for a forward market to access rights to one or more events may be configured, such as in a dashboard 4118 or other user interface for an operator of the platform-operated marketplace 3327, using the various enabling capabilities of the data handling platform 3300 described throughout this disclosure. The operator may use the user interface or dashboard 4118 to undertake a series of steps to perform or undertake an algorithm to create a contingent forward market event access right token as described in connection with FIG. 40. In embodiments, one or more of the steps of the algorithm to create a contingent forward market event access right token within the dashboard 4118 may include identifying one or more access rights for one or more events at a component 4102 to identify access rights, such as by monitoring one or more platform-operated marketplaces 3327 or external marketplaces 3390 for messages, announcements, or other data indicative of the event or access right. The dashboard 4118 may be configured with interface elements (including application programming elements) that allow the event to be imported into the platform marketplace 3327, such as by linking to the environment where the access right is offered or maintained, which may include using APIs for backend ticketing systems and the like. In the dashboard 4118, at a component 4104, one or more conditions (of the type described herein) for the access right may be configured (e.g., by interfacing with a user), such as by defining a set of mutually exclusive conditions that, upon triggering, allocate the access right to different individuals or entities. The user interface of the dashboard 4118 may include a set of drop-down menus, tables, forms, or the like with default, templated, recommended, or pre-configured conditions, such as ones that are appropriate for various types of access rights. For example, access rights to a playoff game for a sporting event can be preconfigured to set an access condition as the presence of a specific team in the playoff game, where the team is a member of the set of teams that could be in the game, and access rights are allocated to a given seat across mutually exclusive possible teams that could make it to the game (e.g., the teams in one conference for the Super Bowl). As another example, access rights to an as-yet-unplanned entertainment event could be preconfigured to set conditions such as a venue, a span of dates and a selected entertainer or group. Once the conditions and other parameters of the access rights are configured, at a component 4108 a blockchain may be configured to maintain, such as via a ledger, the data required to provision, allocate, and exchange ownership of the contingent access rights (and optionally the underlying access tokens to which the contingent access rights relate). For example, a ticket to a game may be stored as a cryptographically secure token on the ledger, and another token may be created and stored on the blockchain for each contingent access right that could result in the ownership of the ticket. The blockchain may be configured to store tokens, identity information, transaction information (such as for exchanges of contingent rights and/or underlying tokens) and other data. At a component 4110 a smart contract 3431 may be configured to embody the conditions that were configured at the component 4104, and to operate on the blockchain that was created at the component 4108 as well as to operate on other data, such as data indicating facts, conditions, events, or the like in the platform-operated marketplace 3327 and/or an external marketplace 3390. The smart contract may be configured at a component 4110 to apply one or more rules, execute one or more conditional operations, or the like upon data that may include event data 3324, access data 3362, pricing data 3364 or other data about or relevant to access rights. Once configuration of one or more blockchains and one or more smart contracts is complete, at a component 4112 the blockchain and smart contract may be deployed in the platform-operated marketplace, such as for interaction by one or more consumers or other users, who may, such as in a marketplace interface, such as a website, application, or the like, enter into the smart contract, such as by purchasing a contingent right to a future event, at which point the platform, such as using the adaptive intelligent systems 3304 or other capabilities, may store relevant data, such as pricing data and identity data for the party or parties entering the smart contract on the blockchain or otherwise on the platform 3300. At a component 4114, once the smart contract is executed, the component 4114 may monitor, such as by the monitoring systems layer 3306, the platform-operated marketplace 3327 and/or one or more external marketplaces 3390 for event data 3324, access data 3362, pricing data 3364 or other data, such as events, that may satisfy one or more conditions or trigger application of one or more rules of the smart contract. For example, results of games or announcements of future entertainment events may be monitored, and smart contract conditions may be satisfied. At a component 4116, upon satisfaction of conditions, smart contracts may be settled, executed, or the like, resulting updates or other operations on the blockchain, such as by transferring ownership of underlying access tokens and/or contingent access tokens. Thus, via operation of the above-referenced components, an operator of the platform-operated marketplace 3327 may discover, configure, deploy and have executed a set of smart contracts that offer and deliver contingent access to future events that are cryptographically secured and transferred on a blockchain to consumers or others. In embodiments, the adaptive intelligent systems layer 3304 may be used to monitor the steps of the algorithm described above, and one or more artificial intelligence systems may be used to automated, such as by robotic process automation, the entire process or one or more sub-steps or sub-algorithms. This may occur as described above, such as by having an artificial intelligence system learn on a training set of data resulting from observations, such as monitoring software interactions, of human users as they undertake the above-referenced steps. Once trained, the adaptive intelligence layer 3304 may thus enable the platform 3300 to provide a fully automated platform for discovery and delivery of contingent access rights to future events.

Figure 42:
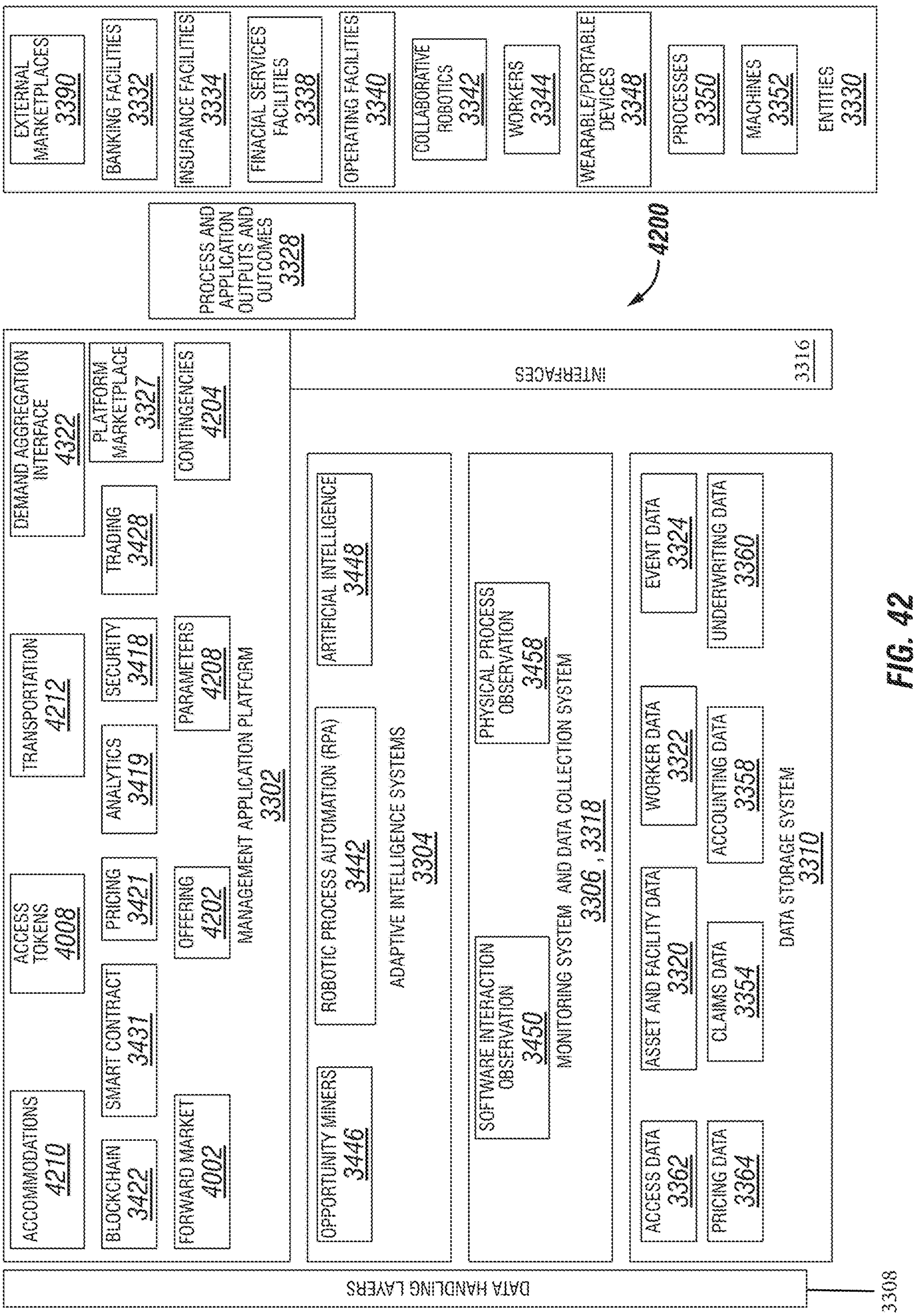
FIG. 42 depicts a blockchain and smart contract platform for forward market demand aggregation.

Referencing FIG. 42, in embodiments, a platform is provided herein, with systems, methods, processes, services, components and other elements for enabling a blockchain and smart contract platform for forward market demand aggregation 4200. In this case, a demand aggregation blockchain and smart contract platform 4200, having various features and enabled by capabilities similar to those described in connection with the platform 3300 and the platform 4000 as described above may be based on a set of contingencies 4204 that influence or represent future demand for an offering 4202, which may comprise a set of products, services, or the like (which may include physical goods, virtual goods, software, physical services, software, access rights, entertainment content, or many other items). A blockchain 3422, such as enabling distributed ledger, may record indicators of interest from a set of parties with respect to the product, service, or the like, such as ones that define parameters under which the party is willing to commit to purchase the product or service. Interest may be expressed or committed in a demand aggregation interface 4322, which may be included in or associated with one or more sites, applications, communications systems, or the like, which may be independently operated or may comprise aspects of a platform-operated marketplace 3327 or an external marketplace 3390. Commitments may be taken and administered via a smart contract 3431 or other transaction mechanisms. These commitments may include various parameters 4208, such as parameters of price, technical specification (e.g., shoe size, dress size, or the like for clothing, or performance characteristics for information technology, such as bandwidth, storage capacity, pixel density, or the like), timing, and many others for one or more desired offerings 4202. The blockchain 3422 may thus be used to aggregate future demand in a forward market 4002 with respect to a variety of products and services and may be processed by manufacturers, distributors, retailers and others to help plan for the demand, such as for assistance (optionally in an analytics system 3419 with pricing, inventory management, supply chain management, smart manufacturing, just-in-time manufacturing, product design and many other activities). The offering 4202, whether a product, service, or other item, need not exist at the time a set of parameters 4208 are configured; for example, an individual can indicate a willingness to pay up to $1000 for a 65 inch, 32K quantum dot television display on or before Jan. 1, 2022. In embodiments, a vendor can offer a range of potential configurations and conditions with respect to which consumers can indicate interest, and optionally commit to purchase within defined conditions. In embodiments, consumers may present desired items and configurations. In embodiments, an artificial intelligence system, which may be a rule-based system, such as enabled by an adaptive intelligence system 3304, may process a set of potential configurations having different parameters 4208 for a subset of configurations that are consistent with each other (e.g., all have 4K or greater capability and all are priced below $500), and the subset of configurations may be used to aggregate committed future demand for the offering that satisfies a sufficiently large subset at a profitable price. In embodiments, the adaptive intelligent systems 3304 may use a fuzzy logic system, a self-organizing map, or the like to group potential configurations, such that a human expert may determine a configuration that is near enough to ones that have been identified, such that it can be presented as a new alternative. In embodiments, an artificial intelligence system 3448 may be trained to learn to determine and present new configurations for offerings 4202 based on a training data set created by human experts.

In embodiments, a platform 4200 is provided herein, with systems, methods, processes, services, components and other elements for enabling a blockchain and smart contract platform for forward market rights for accommodations. An accommodation offering 4210 may comprise a combination of products, services, and access rights that may be handled as with other offerings, including aggregation demand for the offering 4210 in a forward market 4002. In embodiments, the forward market capabilities noted above may include access tokens 4008 for accommodations, as well as future accommodations, such as hotel rooms, shared spaces offered by individuals (e.g., Airbnb™ spaces), bed-and-breakfasts, workspaces, conference rooms, convention spaces, fitness accommodations, health and wellness accommodations, dining accommodations, and many others. Accommodations offerings 4210 may be linked to other access tokens 4008, such as in packages; for example, a hotel room in a city within walking distance of a sporting event may be linked by or on the same blockchain or linked blockchains (e.g., by linking ownership or access rights to both on the same ledger), so that when a condition is met (e.g., a fan's team makes it to the Super Bowl), vesting of ownership of the access token to the event also automatically establishes (and optionally automatically initiates, such as via an application programming interface of the platform) the right to the accommodation (such as by booking a hotel room and dining reservations). Thus, the forward market for the event may enable a convenient, secure forward market, enabled by automatic processing on the blockchain for packages of event access tokens, accommodations, and other elements. In embodiments, accommodations may be provided with configured forward market parameters 4208 (including conditional parameters) apart from access tokens 4008 to events, such as where a hotel room or other accommodation is booked in advance upon meeting a certain condition (such as one relating to a price within a given time window). For example, an accommodation offering 4210 at a four-star hotel during a music festival could be pre-configured to be booked if and when the accommodation (e.g., a room with a king bed and a city view) becomes available within a given time window. Thus, demand for accommodations can be aggregated in advance and conveniently fulfilled by automatic recognition (such as by monitoring systems 3306) of conditions that satisfy pre-configured commitments represented on a blockchain (e.g., distributed ledger) and automatic initiation (optionally including by smart contract execution) of settlement or fulfillment of the demand (such as by automated booking of a room or other accommodations).

In embodiments, a platform is provided herein, with systems, methods, processes, services, components and other elements for enabling a blockchain and smart contract platform for forward market rights to transportation. As with accommodations, transportation offerings 4212 may be aggregated and fulfilled, with a wide range of pre-defined contingencies, using the platform 4200. As with accommodations offerings 4210, travel offerings 4212 can be linked to other access tokens 4008 (such as event tickets, accommodations, services and the like), such as where a flight is automatically booked at or below a predefined price threshold if and when the fan's team makes it to the Super Bowl, among many other examples. Travel offerings 4212 can also be offered separately (such as where travel is automatically booked based on a commitment, in a distributed ledger, to buy a ticket if it is offered within a given time window at a given price). As with other goods and services, aggregation on the blockchain 3422, such as a distributed ledger, can be used for demand planning, for determining what resources are deployed to what routes or types of travel, and the like. Transportation offerings 4212 can be configured, with pre-defined contingencies 4204 and parameters 4208, such as with respect to price, mode of transportation (air, bus, rail, private car, ride share or other), level of service (e.g., First Class, business class, or other), mode of payment (e.g., use of loyalty programs, rewards points, or particular currencies, including cryptocurrencies), timing (e.g., defined time period or linked to an event, location (e.g., specified to be where a given type of event takes place (such as this year's Super Bowl) or a specific location), route (e.g., direct or multi-stop, from the destination of the consumer to a specific location or to wherever an event takes place), and many others.

In embodiments, the platform 4200 may include or interact with various applications, services, solutions or the like, such as those described in connection with the platform 3300, such as pricing applications 3421 (such as for setting and monitoring pricing for goods, services, access rights, tokens, fees and other items), analytics applications 3419 (such as for monitoring, reporting, predicting, and otherwise analyzing all aspects of the platform 4000, such as to optimize offerings, timing, pricing, or the like, to recognize and predict patterns, to establish rules and contingencies, to establish models or understanding for use by humans or by machine learning system, and for many other purposes), trading applications 3428 (such as for trading or exchanging contingent access rights, futures or options for goods, services, or other offerings 4202, tokens and other items), security applications 3418, or the like.

Figure 43:
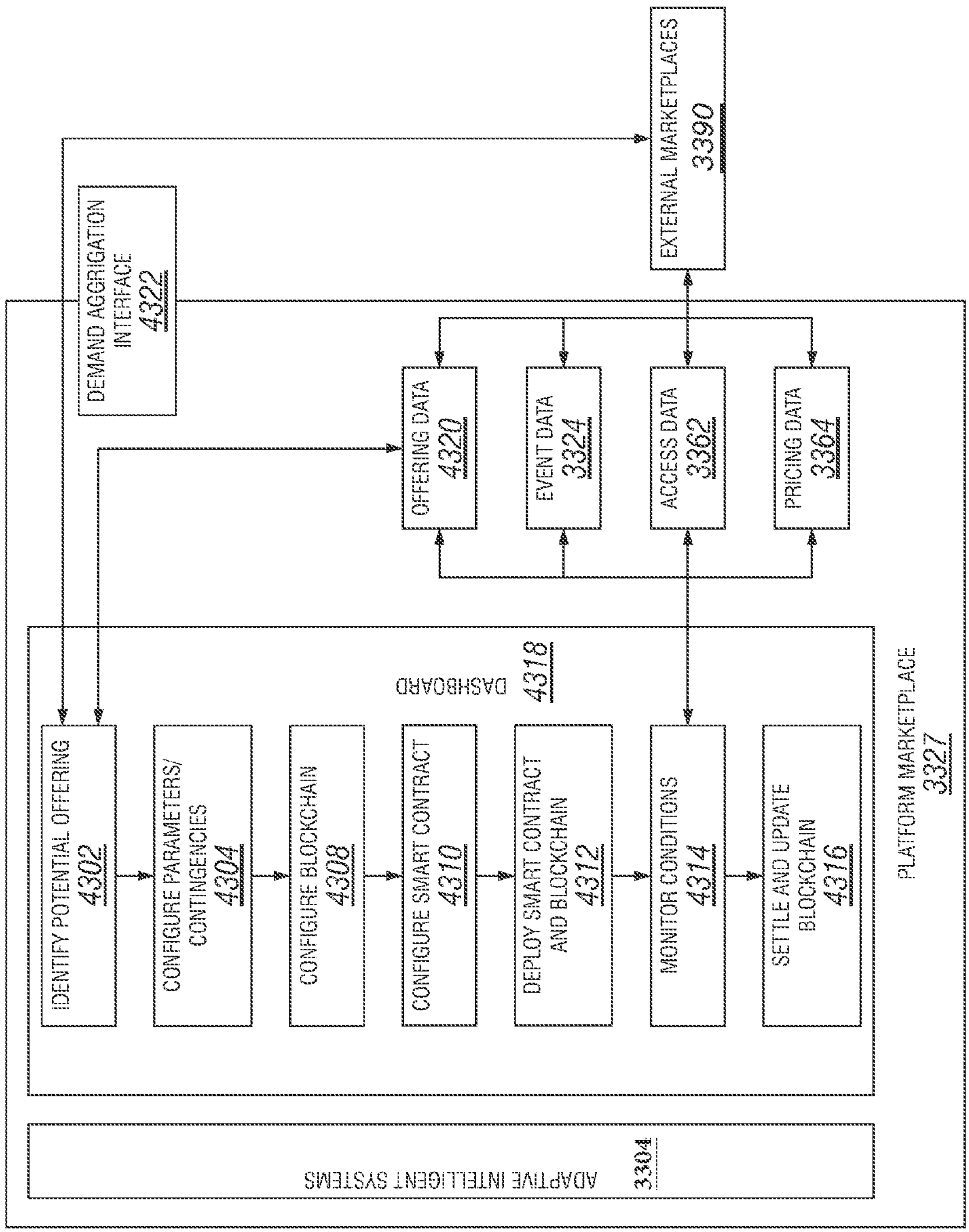
FIG. 43 depicts an algorithm and a dashboard of a blockchain and smart contract platform for forward market demand aggregation.

Referring to FIG. 43, a platform-operated marketplace 3327 for a forward market to future offerings 4202 may be configured, such as in a dashboard 4318 or other user interface for an operator of the platform-operated marketplace 3327, using the various enabling capabilities of the data handling platform 3300 described throughout this disclosure. The operator may use the user interface or dashboard 4318 to undertake a series of steps to perform or undertake an algorithm to create an offering 4210 as described in connection with FIG. 42. In embodiments, one or more of the steps of the algorithm to create a contingent future offering 4210 within the dashboard 4318 may include, at a component 4302, identifying offering data 4320, which may come from a platform-operated marketplace 3327 or an external marketplace 3390, such as via a demand aggregation interface 4322 presented to one or more consumers within one of them, or may be entered via a user interface of or at a site or application that is created for demand aggregation for offerings 4210, such as via solicitation of consumer interest or consumer commitments (such as commitments entered into by smart contracts) based on specification of various possible parameters 4208 and contingencies 4204 for such offerings 4210.

The dashboard 4318 may be configured with interface elements (including application programming elements) that allow an offering to be managed in the platform marketplace 3327, such as by linking to the set of environments where various components of the offering 4202, such as descriptions of goods and services, prices, access rights and the like are specified, offered or maintained, which may include using APIs for backend ticketing systems, e-commerce systems, ordering systems, fulfillment systems, and the like. In the dashboard 4318, a component 4304 may configure one or more parameters 4208 or contingencies 4204 (e.g., via interactions with a user), such as comprising or describing the conditions (of the type described herein) for the offering, such as by defining a set of conditions that trigger the commitment by a consumer to partake of the offering 4202, that trigger the right to an allocation of the offering, or the like. The user interface of the dashboard 4318 may include a set of drop down menus, tables, forms, or the like with default, templated, recommended, or pre-configured conditions, parameters 4208, contingencies 4204 and the like, such as ones that are appropriate for various types of offerings 4202. For example, access rights to a new line of shoes can be preconfigured to set an offering condition as the offering of a shoe by a certain designer of a certain style and color and may be preconfigured to accept a commitment to buy the shoe if the access is provided below a certain price during a certain time period. As another example, demand for an as-yet-unplanned entertainment event can be preconfigured to set conditions such as a venue, a span of dates and a selected entertainer or group. Once the conditions and other parameters of the offering 4202 are configured, a component 4308 may configure a blockchain to maintain, such as via a ledger, the data required to provision, allocate, and exchange ownership of items comprising the offering (and optionally underlying access tokens, virtual goods, digital content items, or the like that are included in or associated with the offering). For example, a virtual good for a video may be stored as a cryptographically secure token on the ledger, and another token may be created and stored on the blockchain for each contingent access right that could result in the ownership of the virtual good or each smart contract to purchase the virtual good if and when it becomes available under defined conditions. The blockchain may be configured to store tokens, identity information, transaction information (such as for exchanges of contingent rights and/or underlying tokens), virtual goods, license keys, digital content, entertainment content, and other data. A component 4310 may configure a smart contract 3431 to embody the conditions that were configured at the component 4304 and to operate on the blockchain that was created at the component 4308 as well as to operate on other data, such as data indicating facts, conditions, events, or the like in the platform-operated marketplace 3327 and/or an external marketplace 3390. The smart contract may be configured at the step 4310 to apply one or more rules, execute one or more conditional operations, or the like upon data that may include offering data 4320, event data 3324, access data 3362, pricing data 3364 or other data about or relevant to a set of offerings 4202. Once configuration of one or more blockchains and one or more smart contracts is complete, at a component 4312 the blockchain and smart contract may be deployed in the platform-operated marketplace 3327, such as for interaction by one or more consumers or other users, who may, such as in a marketplace interface or a demand aggregation interface 4322, such as a website, application, or the like, enter into the smart contract, such as by executing an indication of a commitment to purchase, attend, or otherwise consume the future offering 4202, at which point the platform, such as using the adaptive intelligent systems 3304 or other capabilities, may store relevant data, such as pricing data and identity data for the party or parties entering the smart contract on the blockchain or otherwise on the platform 3300. At a component 4314, once the smart contract is executed, the platform may monitor, such as by the monitoring systems layer 3306, the platform-operated marketplace 3327 and/or one or more external marketplaces 3390 for offering data 4320, event data 3324, access data 3362, pricing data 3364 or other data, such as events, that may satisfy one or more conditions or trigger application of one or more rules of the smart contract. For example, announcements of offerings may be monitored, such as on e-commerce sites, auction sites, or the like, and smart contract conditions may be satisfied by one or more of the offerings 4202.

At a component 4316, upon satisfaction of conditions, smart contracts may be settled, executed, or the like, resulting updates or other operations on the blockchain, such as by transferring ownership of goods, services, underlying access tokens and/or contingent access tokens and transferring required consideration (such as obtained by a payments system). Thus, via the above-referenced steps, an operator of the platform-operated marketplace 3327 may discover, configure, deploy and have executed a set of smart contracts that aggregate demand for, and offer and deliver contingent access to, offerings 4202 that are cryptographically secured and transferred on a blockchain to consumers or others. In embodiments, the adaptive intelligent systems layer 3304 may be used to monitor the steps of the algorithm described above, and one or more artificial intelligence systems may be used to automated, such as by robotic process automation, the entire process or one or more sub-steps or sub-algorithms. This may occur as described above, such as by having an artificial intelligence system learn on a training set of data resulting from observations, such as monitoring software interactions, of human users as they undertake the above-referenced steps. Once trained, the adaptive intelligence layer 3304 may thus enable the platform 3300 to provide a fully automated platform for discovery and delivery of offerings, as well as demand aggregation for such offerings 4202 and automated handling of access to and ownership of such offerings 4202.

Figure 44:
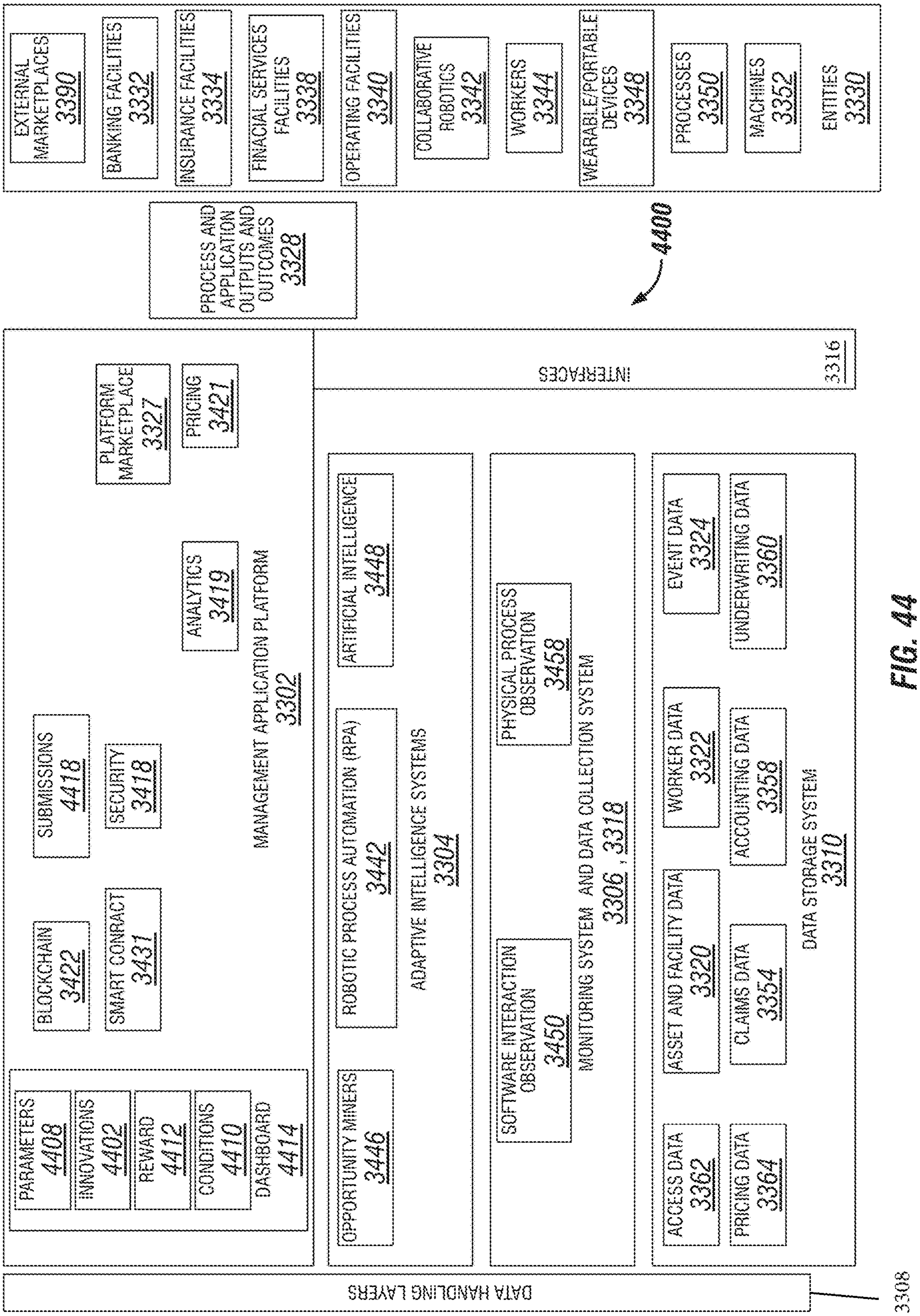
FIG. 44 depicts a blockchain and smart contract platform for crowdsourcing for innovation.

Referring to FIG. 44, in embodiments, a platform is provided herein, with systems, methods, processes, services, components and other elements for enabling a blockchain and smart contract platform 4400 for crowdsourcing for innovation. In such embodiments, a party seeking a set of innovations 4402, such as inventions, works of authorship, innovations, technology solutions to a set of problems, satisfaction of a technical specification, or other advancement may configure, such as on a blockchain 3422 (optionally comprising a distributed ledger), a set of conditions 4410, capable of being expressed in a smart contract 3431, that are required to satisfy the requirement. A reward 4412 may be configured for generating an innovation 4402 of a given set of capabilities or satisfying a given set of parameters 4408 by a given date (e.g., a technical specification for a 5G foldable phone that can be produced for less than $100 per unit before the end of 2019). Satisfaction of the conditions 4410 may be measured by a monitoring system 3306, by one or more experts, or by a trained artificial intelligence system 3448 (such as one trained to evaluate responses based on a training set created by experts). In embodiments, the platform 4400 may include a dashboard 4414 for configuration of the specification, requirements or other conditions 4410, the reward 4412, timing and other parameters 4408 (such as any required qualifications, formats, geographical requirements, certifications, credentials, or the like that may be required of a submission or a submitter), and the platform 4400 may automatically configure a blockchain 3422 to store the parameters 4408 and a smart contract 3431 to operate, such as in coordination with a website, application, or other marketplace environments, to offer the reward 4412, receive and record submissions 4418 (such as on the blockchain 3422), allocate rewards 4412, and the like, with events, transactions, and activities being recorded in blockchain, optionally using a distributed ledger. In embodiments, rewards 4412 may be configured to be allocated across multiple submissions, such as where an innovation requires solution of multiple problems, such that submissions 4418 may be evaluated for satisfaction of some conditions and rewards may be allocated among contributing submissions 4418 when and if a complete solution (comprising aggregation of multiple submissions 4418) is achieved, unlocking the reward, at which point the contributing submissions 4418 recorded on the distributed ledger may be allocated appropriate portions of the reward. Submissions may include software, technical data, know how, algorithms, firmware, hardware, mechanical drawings, prototypes, proof-of-concept devices, systems, and many other forms, which may be identified, described, or otherwise documented on the blockchain 3422 (e.g., distributed ledger), such as by one or more links to one or more resources (which may be secured by cryptographic or other techniques). Submissions may thus be described and evaluated for purposes of allocation of rewards 4412 (such as by one or more independent experts, by artificial intelligence systems (which may be trained by experts) or the like), then locked, such as by encryption, secure storage, or the like, unless and until a reward is distributed via the distributed ledger. Thus, the platform provides a secure system for exchange of information related to innovation that is provided for rewards, such as in crowdsourcing or other innovation programs. An artificial intelligence system 3448 may be trained, such as by a training set of data using interactions of experts with submissions 4418, to automatically evaluate submissions 4418, for either automatic allocation of rewards or to pre-populate evaluation for confirmation by human experts. In embodiments, an artificial intelligence system 3448 may be trained, such as by a training set of data reflecting expert interactions with the dashboard 4414, optionally coupled with outcome information, such as from analytics system 3419, to create rewards 4412, set conditions 4410, specify innovations 4402, and set other parameters 4408, thereby providing a fully automated or semi-automated capability for one or more of those capabilities.

Figure 45:
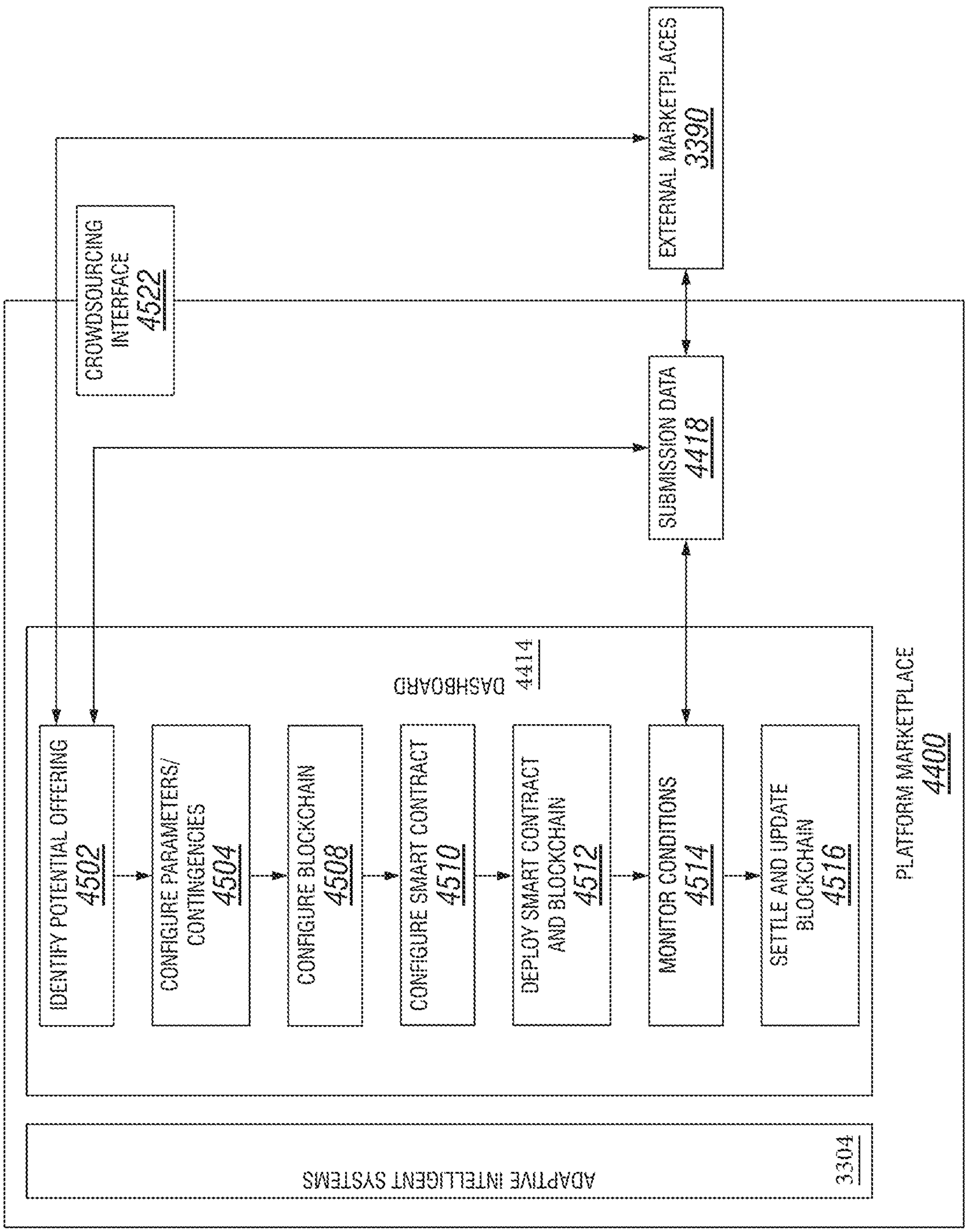
FIG. 45 depicts an algorithm and a dashboard of a blockchain and smart contract platform for crowdsourcing for innovation.

Referring to FIG. 45, a platform-operated marketplace 3327 for crowdsourcing innovation 4400 may be configured, such as in a crowdsourcing dashboard 4414 or other user interface for an operator of the platform-operated marketplace 3327, using the various enabling capabilities of the data handling platform 3300 described throughout this disclosure. The operator may use the user interface or crowdsourcing dashboard 4414 to undertake a series of steps to perform or undertake an algorithm to create crowdsourcing offer as described in connection with FIG. 44. In embodiments, one or more of the components depicted are configured to create a reward 4412 within the dashboard 4414 may include, at a component 4502, identifying potential offers, such as what innovations 4402 are of interest (such as may be indicated by indications of demand in a platform operated marketplace 3327 or an external marketplace 3390, or by indications by stakeholders for an enterprise through various communication channels.

The dashboard 4414 may be configured with a crowdsourcing interface 4512, such as with elements (including application programming elements) that allow a crowdsourcing offering to be managed in the platform marketplace 3327 and/or in one or more external marketplaces 3390. In the dashboard 4414, at a component 4504 the user may configure one or more parameters 4408 or conditions 4410, such as comprising or describing the conditions (of the type described herein) for the crowdsourcing offer, such as by defining a set of conditions 4410 that trigger the reward 4412 and determine allocation of the reward 4412 to a set of submitters. The user interface of the dashboard 4414 may include a set of drop-down menus, tables, forms, or the like with default, templated, recommended, or pre-configured conditions, parameters 4408, conditions 4410 and the like, such as ones that are appropriate for various types of crowdsourcing offers. Once the conditions and other parameters of the offer are configured, at a component 4508 a smart contract 3431 and blockchain 3422 may be configured to maintain, such as via a ledger, the data required to provision, allocate, and exchange data related to the offer. The blockchain may be configured to store tokens, identity information, transaction information (such as for exchanges of information), technical descriptions, virtual goods, license keys, digital content, entertainment content, and other data, content or information that may be relevant to a submission 4418 or a reward 4412. At a component 4510 a smart contract 3431 may be configured to embody the conditions that were configured at the step 4504 and to operate on the blockchain that was created at the component 4508 as well as to operate on other data, such as data indicating facts, conditions, events, or the like in the platform-operated marketplace 3327 and/or an external marketplace 3390, such as ones related to submission data 4418. The smart contract 3431 may be responsive to the component 4510 to apply one or more rules, execute one or more conditional operations, or the like upon data, such as submission data 4418 and data indicating satisfaction of parameters or conditions, as well as identity data, transactional data, timing data, and other data. Once configuration of one or more blockchains and one or more smart contracts is complete, at a component 4512 the blockchain and smart contract may be deployed in the platform-operated marketplace 3327, external marketplace 3390 or other environment, such as for interaction by one or more submitters or other users, who may, such as in a crowdsourcing interface 4512, such as a website, application, or the like, enter into the smart contract, such as by submitting a submission 4418 and requesting the reward 4412, at which point the platform, such as using the adaptive intelligent systems 3304 or other capabilities, may store relevant data, such as submission data 4418, identity data for the party or parties entering the smart contract on the blockchain or otherwise on the platform 3300. At a component 4514, once the smart contract is executed, the platform may monitor, such as by the monitoring systems layer 3306, the platform-operated marketplace 3327 and/or one or more external marketplaces 3390 for submission data 4418, event data 3324, or other data that may satisfy or indicate satisfaction of one or more conditions 4410 or trigger application of one or more rules of the smart contract 3431, such as to trigger a reward 4412.

At a component 4516, upon satisfaction of conditions, smart contracts may be settled, executed, or the like, resulting updates or other operations on the blockchain 3422, such as by transferring consideration (such as via a payments system) and transferring access to submissions 4418. Thus, via the above-referenced steps, an operator of the platform-operated marketplace 3327 may discover, configure, deploy and have executed a set of smart contracts that crowdsource innovations that are cryptographically secured and transferred on a blockchain from innovators to parties seeking innovation. In embodiments, the adaptive intelligent systems layer 3304 may be used to monitor the steps of the algorithm described above, and one or more artificial intelligence systems may be used to automate, such as by robotic process automation, the entire process or one or more sub-steps or sub-algorithms. This may occur as described above, such as by having an artificial intelligence system learn on a training set of data resulting from observations, such as monitoring software interactions of human users as they undertake the above-referenced steps. Once trained, the adaptive intelligence layer 3304 may thus enable the platform 3300 to provide a fully automated platform for crowdsourcing of innovation.

Figure 46:
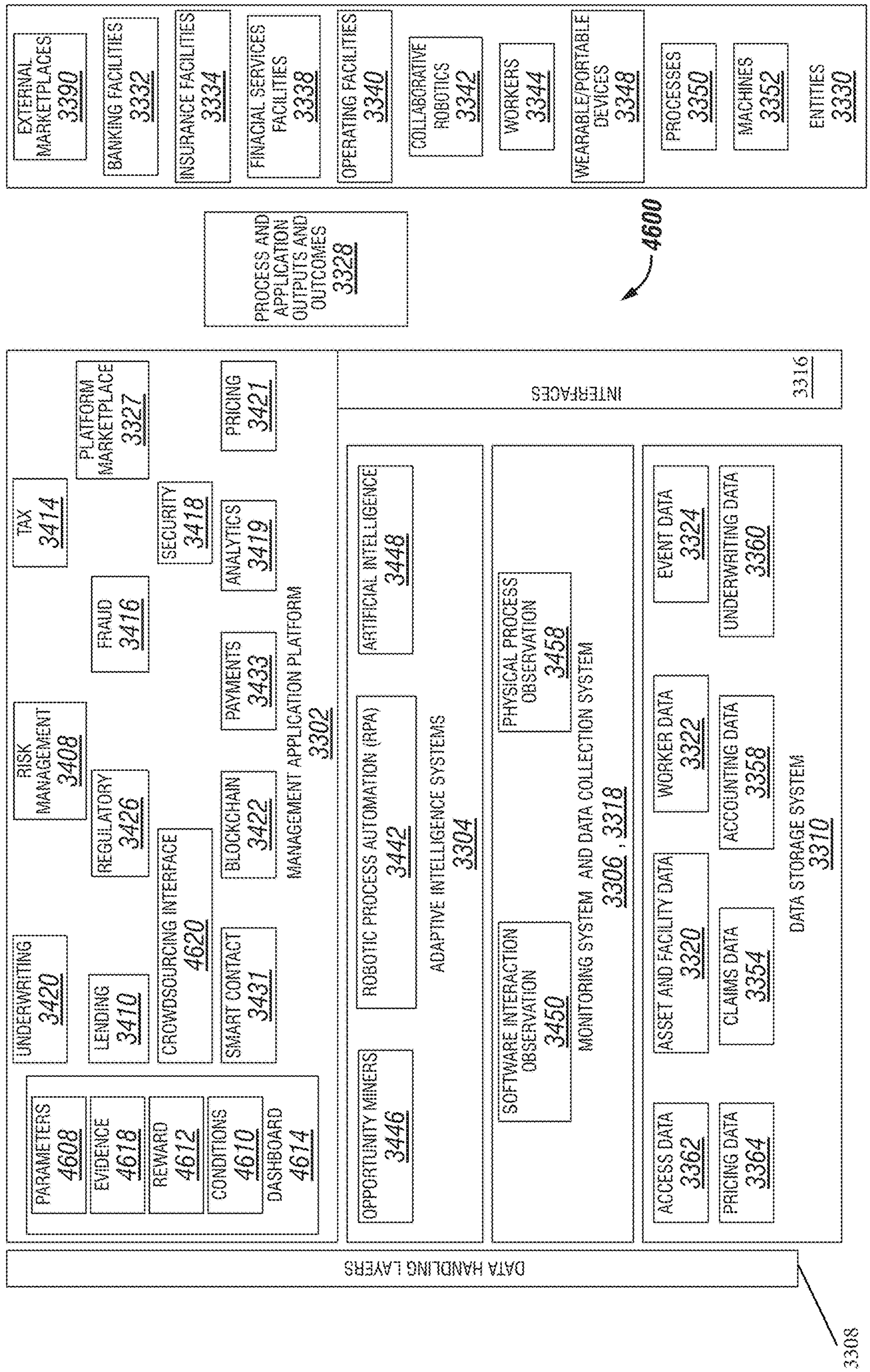
FIG. 46 depicts a blockchain and smart contract platform for crowdsourcing for evidence.

Referring to FIG. 46, in embodiments, a platform is provided herein, with systems, methods, processes, services, components and other elements for enabling a blockchain and smart contract platform 4600 for crowdsourcing for evidence. As with other embodiments described above in connection with sourcing innovation, product demand, or the like, a blockchain 3422, such as optionally embodying a distributed ledger, may be configured with a set of smart contracts 3431 to administer a reward 4612 for the submission of evidence 4618, such as evidence of infringement, evidence of prior art, evidence of publication, evidence of use, evidence of commercial sales, evidence of fraud, evidence of false statements, evidence of trespassing, evidence of negligence, evidence of misrepresentation, evidence of slander or libel, evidence of undertaking illegal activities, evidence of undertaking risky activities, evidence of omissions, evidence of breach of contract, evidence of torts, evidence of criminal conduct, evidence of regulatory violations, evidence of non-compliance with policies or procedures, evidence of the location of an individual (optionally including known or preferred locations), evidence of a social network or other relationship of an individual, evidence of a business connection of an individual or business, evidence of an asset of an individual or business, evidence of defects, evidence of harm, evidence of counterfeiting, evidence of identity (such as DNA, fingerprinting, video, photography or the like), evidence of damage, evidence of confusion (such as in cases of trademark infringement) or other evidence that may be relevant to a civil or criminal legal proceeding, a contract enforcement or negotiation, an arbitration or mediation, a hearing, or other proceeding. In embodiments, a blockchain 3422, such as optionally distributed in a distributed ledger, may be used to configure a request for evidence 4618 (which may be a formal legal request, such as a subpoena, or an alternative form of request, such as in a fact-gathering situation), along with terms and conditions 4610 related to the evidence, such as a reward 4612 for submission of the evidence 4618, a set of terms and conditions 4610 related to the use of the evidence 4618 (such as whether it may only be released under subpoena, whether the submitting party has a right to anonymity, the nature of proceedings in which the evidence can be used, the permitted conditions for use of the evidence 4618, and the like), and various parameters 4608, such as timing parameters, the nature of the evidence required (such as scientifically validated evidence like DNA or fingerprints, video footage, photographs, witness testimony, or the like), and other parameters 4608.

The platform 4600 may include a crowdsourcing interface 4620, which may be included in or provided in coordination with a website, application, dashboard, communications system (such as for sending emails, texts, voice messages, advertisements, broadcast messages, or other messages), by which a message may be presented in the interface 4620 or sent to relevant individuals (whether targeted, such as in the case of a subpoena, or broadcast, such as to individuals in a given location, company, organization, or the like) with an appropriate link to the smart contract 3431 and associated blockchain 3422, such that a reply message submitting evidence 4618, with relevant attachments, links, or other information, can be automatically associated (such as via an API or data integration system) with the blockchain 3422, such that the blockchain 3422, and any optionally associated distributed ledger, maintains a secure, definitive record of evidence 4618 submitted in response to the request. Where a reward 4612 is offered, the blockchain 3422 and/or smart contract 3431 may be used to record time of submission, the nature of the submission, and the party submitting, such that at such time as a submission satisfies the conditions for a reward 4612 (such as, for example, upon apprehension of a subject in a criminal case or invalidation of a patent upon use of submitted prior art, among many other examples), the blockchain 3422 and any distributed ledger stored thereby can be used to identify the submitter and, by execution of the smart contract 3431, convey the reward 4612 (which may take any of the forms of consideration noted throughout this disclosure. In embodiments, the blockchain 3422 and any associated ledger may include identifying information for submissions of evidence 4618 without containing actual evidence 4618, such that information may be maintained secret (such as being encrypted or being stored separately with only identifying information), subject to satisfying or verifying conditions for access (such as a legal subpoena, a warrant, or other identification or verification of a person who has legitimate access rights, such as by an identity or security application 3418). Rewards 4612 may be provided based on outcomes of cases or situations to which evidence 4618 relates, based on a set of rules (which may be automatically applied in some cases, such as using a smart contract 3431 in concert with an automation system, a rule processing system, an artificial intelligence system 3448 or other expert system, which in embodiments may comprise one that is trained on a training data set created with human experts. For example, a machine vision system may be used to evaluate evidence of counterfeiting based on images of items, and parties submitting evidence of counterfeiting may be rewarded, such as via tokens or other consideration, via distribution of rewards 4612 through the smart contract 3431, blockchain 3422 and any distributed ledger. Thus, the platform 4600 may be used for a wide variety of fact-gathering and evidence-gathering purposes, to facilitate compliance, to deter improper behavior, to reduce uncertainty, to reduce asymmetries of information, or the like.

Figure 47:
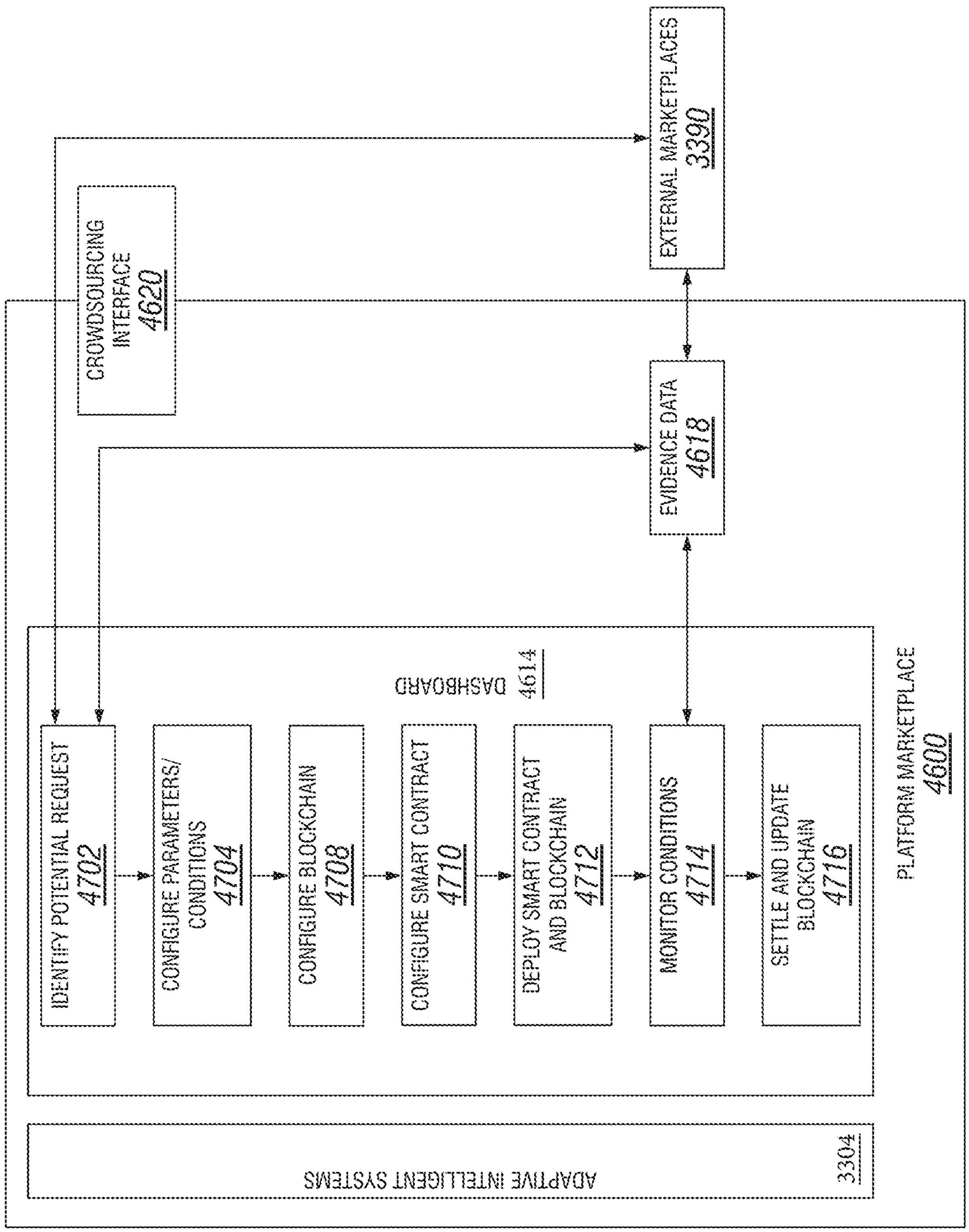
FIG. 47 depicts an algorithm and a dashboard of a blockchain and smart contract platform for crowdsourcing for evidence.

Referring to FIG. 47, a platform-operated marketplace crowdsourcing evidence 4600 may be configured, such as in a crowdsourcing interface 4620 or other user interface for an operator of the platform-operated marketplace 4600, using the various enabling capabilities of the data handling platform 3300 described throughout this disclosure. The operator may use the user interface 4620 or crowdsourcing dashboard 4614 to undertake a series of steps to perform or undertake an algorithm to create a crowdsourcing request for evidence 4618 as described in connection with FIG. 46. In embodiments, one or more interactions with the components to create a reward 4612 within the dashboard 4614 may include, at a component 4702, identifying potential rewards 4612, such as what evidence 4618 is likely to be of value in a given situation (such as may be indicated through various communication channels by stakeholders or representatives of an entity, such as an individual or enterprise, such as attorneys, agents, investigators, parties, auditors, detectives, underwriters, inspectors, and many others).

The dashboard 4614 may be configured with a crowdsourcing interface 4620, such as with elements (including application programming elements, data integration elements, messaging elements, and the like) that allow a crowdsourcing request to be managed in the platform marketplace 4600 and/or in one or more external marketplaces 3390. In the dashboard 4614, at a component 4704 the user may configure one or more parameters 4608 or conditions 4610, such as comprising or describing the conditions (of the type described herein) for the crowdsourcing request, such as by defining a set of conditions 4610 that trigger the reward 4612 and determine allocation of the reward 4612 to a set of submitters of evidence 4618. The user interface of the dashboard 4614, which may include or be associated with the crowdsourcing interface 4620, may include a set of drop down menus, tables, forms, or the like with default, templated, recommended, or pre-configured conditions, parameters 4608, conditions 4610 and the like, such as ones that are appropriate for various types of crowdsourcing requests. Once the conditions and other parameters of the request are configured, at a component 4708 a smart contract 3431 and blockchain 3422 may be configured to maintain, such as via a ledger, the data required to provision, allocate, and exchange data related to the request and to submissions of evidence 4618. The smart contract 3431 and blockchain 3422 may be configured to identity information, transaction information (such as for exchanges of information), technical information, other evidence data 4618 of the type described in connection with FIG. 46, including any data, testimony, photo or video content or other information that may be relevant to a submission of evidence 4618 or the conditions 4610 for a reward 4612. At a component 4710 a smart contract 3431 may be configured to embody the conditions 4610 that were configured at the component 4704 and to operate on the blockchain 3422 that was created at the component 4708, as well as to operate on other data, such as data indicating facts, conditions, events, or the like in the platform-operated marketplace 4600 and/or an external marketplace 3390 or other information site or resource, such as ones related to submission data 4618, such as sites indicating outcomes of legal cases or portions of cases, sites reporting on investigations, and the like. The smart contract 3431 may be responsive to apply one or more rules configured at component 4710, to execute one or more conditional operations, or the like upon data, such as evidence data 4618 and data indicating satisfaction of parameters 4608 or conditions 4610, as well as identity data, transactional data, timing data, and other data. Once configuration of one or more blockchains 3422 and one or more smart contracts 3431 is complete, at a component 4712 the blockchain 3422 and smart contract 3431 may be deployed in the platform-operated marketplace 4600, external marketplace 3390 or other site or environment, such as for interaction by one or more submitters or other users, who may, such as in a crowdsourcing interface 4620, such as a website, application, or the like, enter into the smart contract 3431, such as by submitting a submission of evidence 4618 and requesting the reward 4612, at which point the platform 4600, such as using the adaptive intelligent systems 3304 or other capabilities, may store relevant data, such as submission data 4618, identity data for the party or parties entering the smart contract 3431 on the blockchain 3422 or otherwise on the platform 4600. At a component 4714, once the smart contract 3431 is executed, the platform 4600 may monitor, such as by the monitoring systems layer 3306, the platform-operated marketplace 4600 and/or one or more external marketplaces 3390 or other sites for submission data 4618, event data 3324, or other data that may satisfy or indicate satisfaction of one or more conditions 4610 or trigger application of one or more rules of the smart contract 3431, such as to trigger a reward 4612.

At a component 4716, upon satisfaction of conditions 4610, smart contracts 3431 may be settled, executed, or the like, resulting updates or other operations on the blockchain 3422, such as by transferring consideration (such as via a payments system) and transferring access to evidence 4618. Thus, via the above-referenced steps, an operator of the platform-operated marketplace 4600 may discover, configure, deploy and have executed a set of smart contracts 3431 that crowdsource evidence and that are cryptographically secured and transferred on a blockchain 3422 from evidence gatherers to parties seeking evidence. In embodiments, the adaptive intelligent systems layer 3304 may be used to monitor the steps of the algorithm described above, and one or more artificial intelligence systems may be used to automate, such as by robotic process automation 3442, the entire process or one or more sub-steps or sub-algorithms. This may occur as described above, such as by having an artificial intelligence system 3448 learn on a training set of data resulting from observations, such as monitoring software interactions of human users as they undertake the above-referenced steps. Once trained, the adaptive intelligence layer 3304 may thus enable the platform 3300 to provide a fully automated platform for crowdsourcing of evidence.

In embodiments, evidence may relate to fact-gathering or data-gathering for a variety of applications and solutions that may be supported by a marketplace platform 3300, including the evidence crowdsourcing platform 4600, such as for underwriting 3420 (e.g., of insurance policies, loans, warranties, guarantees, and other items), including actuarial processes; risk management solutions 3408 (such as managing a wide variety of risks noted throughout this disclosure); tax solutions (such as relating to evidence supporting deductions and tax credits, among others); lending solutions 3410 (such as evidence of the ownership and or value of collateral, evidence of the veracity of representations, and the like); regulatory solutions 3426 (such as with respect to compliance with a wide range of regulations that may govern entities 3330 and processes, behaviors or activities of or by entities 3330); and fraud prevention solutions 3416 (such as to detect fraud, misrepresentation, improper behavior, libel, slander, and the like).

Evidence gathering may include evidence gathering with respect to entities 3330 and their identities, assertions, claims, actions or behaviors, among many other factors and may be accomplished by crowdsourcing in the crowdsourcing platform 4600 or by data collection systems 3318 and monitoring systems 3306, optionally with automation via process automation 3442 and adaptive intelligence, such as using an artificial intelligence system 3448.

In embodiments, the evidence gathering platform, whether a crowdsourcing platform 4600 or a more general data collection platform 3300 that may or may not encompass crowdsourcing, is provided herein, with systems, methods, processes, services, components and other elements for enabling a blockchain and smart contract platform for aggregating identity and behavior information for insurance underwriting 3420. In embodiments, a blockchain, with an optional distributed ledger may be used to record a set of events, transactions, activities, identities, facts, and other information associated with an underwriting process 3420, such as identities of applicants for insurance, identities of parties that may be willing to offer insurance, information regarding risks that may be insured (of any type, such as property, life, travel, infringement, health, home, commercial liability, product liability, auto, fire, flood, casualty, retirement, unemployment and many others traditionally insured by insurance policies, in addition to a host of other types of risks that are not traditionally insured), information regarding coverage, exclusions, and the like, information regarding terms and conditions, such as pricing, deductible amounts, interest rates (such as for whole life insurance) and other information. The blockchain 3422 and an associated smart contract 3431 may, in coordination with or via a website, application, communications system, message system, marketplace, or the like, be used to offer insurance and to record information submitted by applicants, so that an insurance application has a secure, canonical record of submitted information, with access control capabilities that permit only authorized parties, roles and services to access submitted information (such as governed by policies, regulations, and terms and conditions of access). The blockchain 3422 may be used in underwriting 3420, such as by recording information (including evidence as noted in connection with evidence gathering above) that is relevant to pricing, underwriting, coverage, and the like, such as collected by underwriters, submitted by applicants, collected by artificial intelligence systems 3448, or submitted by others (such as in the case of crowdsourcing platform 4600). In embodiments, the blockchain 3422, smart contract 3431 and any distributed ledger may be used to facilitate offering and underwriting of microinsurance, such as for defined risks related to defined activities for defined time periods that are narrower than for typical insurance policies). For example, insurance related to adverse weather events may be obtained for the day of a wedding. The blockchain 3422 may facilitate allocation of risk and coordination of underwriting activities for a group of parties, such as where a group of parties agree to take some fraction of the risk, as recorded in the ledger. For example, the ledger may allow a party to take any fraction of the risk, thereby accumulating partial insurance unless and until a risk is fully covered as the rest of accumulation and aggregation of multiple parties agreeing, as recorded on the ledger, to insure an activity, a risk, or the like. The ledger may be used to allocate payments upon occurrence of the covered risk event. In embodiments, an artificial intelligence system 3448 may be used to collect and analyze underwriting data, such as one that is trained by human expert underwriters. In embodiments, an automated system 3442, such one using artificial intelligence 3448, such as one trained to recognized and validate events, can be used to determine that an event has happened (e.g., a roof has collapsed, a car has been damage, or the like), such as from videos, images, sensors, IoT devices, witness submissions (such as over social networks), or the like, such that an operation on the distributed ledger may be initiated to pay out the insured amount, including initiating appropriate debits and credits that reflect transfer of funds from the underwriting/insuring parties to the insured. Thus, a blockchain-based ledger may simplify and automate much of the insurance process by reliably validating identities, maintaining confidentiality of information as needed, automatically accumulating evidence needed for pricing and underwriting, automatically processing information indicating occurrence of insured events, and automatically settling and fulfilling contracts upon occurrence of validated events.

Lending Platform

Figure 48:
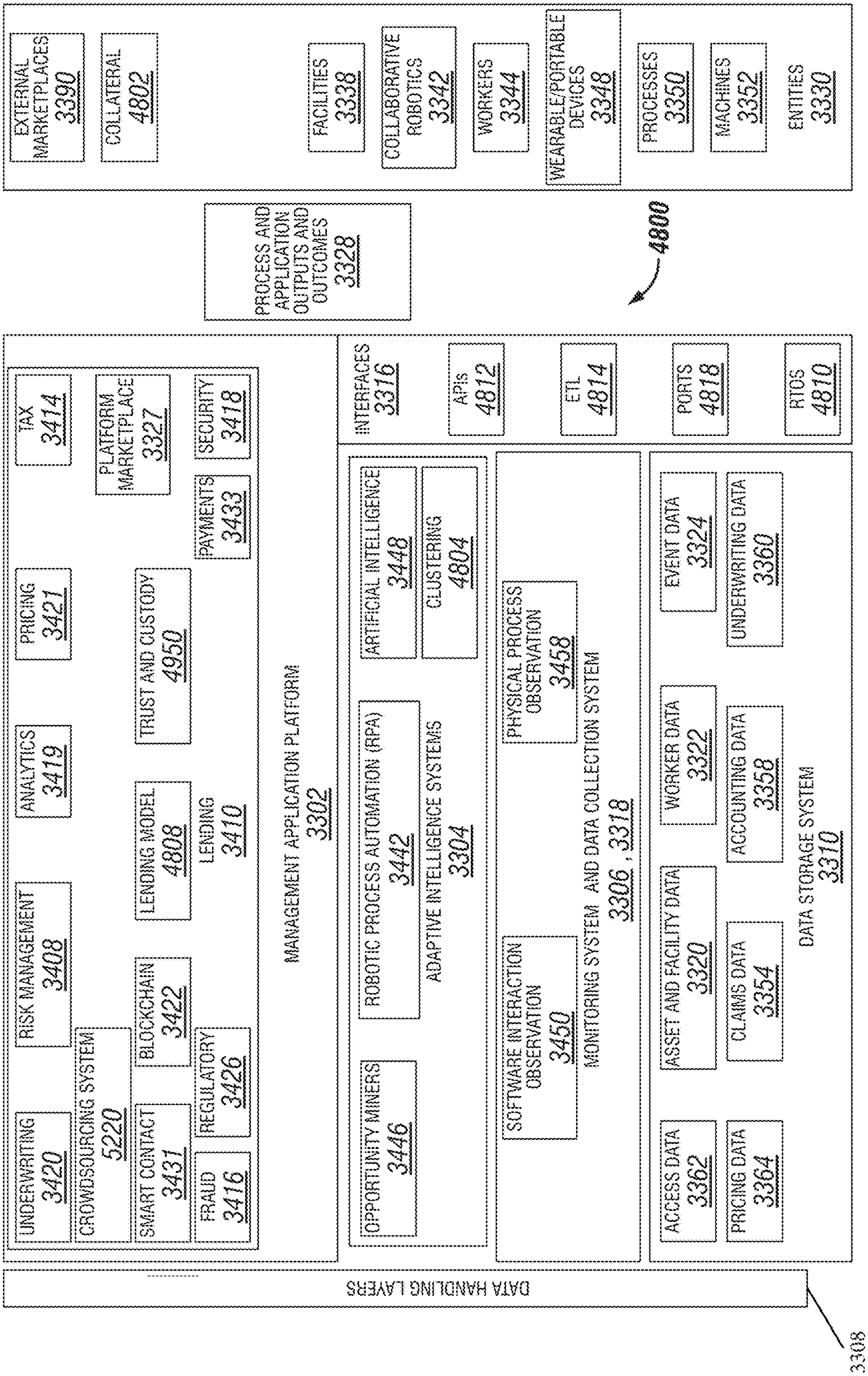
FIG. 48 depicts components and interactions of an embodiment of a lending platform having a set of data-integrated microservices including data collection and monitoring services for handling lending entities and transactions.

Referring to FIG. 48, an embodiment of a financial, transactional and marketplace enablement system 3300 is illustrated wherein a lending enablement system 4800 is enabled and wherein a platform-oriented marketplace 3327 may comprise a lending platform 3410. The lending enablement system 4800 may include a set of systems, applications, processes, modules, services, layers, devices, components, machines, products, sub-systems, interfaces, connections, and other elements (collectively referred in the alternative, except where context indicates otherwise, as the "platform," the "lending platform," the "system," and the like) working in coordination (such as by data integration and organization in a services oriented architecture) to enable intelligent management of a set of entities 3330 that may occur, operate, transact or the like within, or own, operate, support or enable, one or more applications, services, solutions, programs or the like of the lending platform 3410 or external marketplaces 3390 that involve lending transactions or lending-related entities, or that may otherwise be part of, integrated with, linked to, or operated on by the platform 3300 and system 4800. References to a set of services herein should be understood, except where context indicates otherwise, these and other various systems, applications, processes, modules, services, layers, devices, components, machines, products, sub-systems, interfaces, connections, and other types of elements. A set may include multiple members or a single member. As with other embodiments of the system 3300, the system 4800 may have various data handling layers, with components, modules, systems, services, components, functions and other elements described in connection with other embodiments described throughout this disclosure and the documents incorporated herein by reference. This may include various adaptive intelligent systems 3304, monitoring systems 3306, data collection systems 3318, and data storage systems 3310, as well as a set of interfaces 3316 of, to, and/or among each of those systems and/or the various other elements of the platform 3300 and system 4800. In embodiments, the interfaces 3316 may include application programming interfaces 4812; data integration technologies for extracting, transforming, cleansing, normalizing, deduplicating, loading and the like as data is moved among various services using various protocols and formats (collectively referred to as ETL systems 4814); and various ports, portals, connectors, gateways, wired connections, sockets, virtual private networks, containers, secure channels and other connections configured among elements on a one-to-one, one-to-many, or many-to-one basis, such as in unicast, broadcast and multi-cast transmission (collectively referred to as ports 4818). Interfaces 3316 may include, be enabled by, integrate with, or interface with a real time operating system (RTOS) 4810, such as the FreeRTOS™ operating system, that has a deterministic execution pattern in which a user may define an execution pattern, such as based on assignment of a priority to each thread of execution. An instance of the RTOS 4810 may be embedded, such as on a microcontroller of an Internet of Things device, such as one used to monitor various entities 3330. The RTOS 4810 may provide real-time scheduling (such as scheduling of data transmissions to monitoring systems 3306 and data collection systems 3318, scheduling of inter-task communication among various service elements, and other timing and synchronization elements). In embodiments, the interfaces 3316 may use or include a set of libraries that enable secure connection between small, low-power edge devices, such as Internet of Things devices used to monitor entities 3330, and various cloud-deployed services of the platform 3300 and system 4800, as well as a set of edge devices and the systems that enable them, such as ones running local data processing and computing systems such as AWS IoT Greengrass™ and/or AWS Lambda™ functions, such as to allow local calculation, configuration of data communication, execution of machine learning models (such as for prediction or classification), synchronization of devices or device data, and communication among devices and services. This may include use of local device resources such as serial ports, GPUs, sensors and cameras. In embodiments, data may be encrypted for secure end-to-end communication.

In the context of a lending enablement system 4800 and set of lending solutions 3410, entities 3330 may include any of the wide variety of assets, systems, devices, machines, facilities, individuals or other entities mentioned throughout this disclosure or in the documents incorporated herein by reference, such as, without limitation: machines 3352 and their components (e.g., machines that are the subject of a loan or collateral for a loan, such as various vehicles and equipment, as well as machines used to conduct lending transactions, such as automated teller machines, point of sale machines, vending machines, kiosks, smart-card-enabled machines, and many others, including ones used to enable microloans, payday loans and others); financial and transactional processes 3350 (such as lending processes, inspection processes, collateral tracking processes, valuation processes, credit checking processes, creditworthiness processes, syndication processes, interest rate-setting processes, software processes (including applications, programs, services, and others), production processes, collection processes, banking processes (e.g., lending processes, underwriting processes, investing processes, and many others), financial service processes, diagnostic processes, security processes, safety processes, assessment processes, payment processes, valuation processes, issuance processes, factoring processes, consolidation processes, syndication processes, collection processes, foreclosure processes, title transfer processes, title verification processes, collateral monitoring processes, and many others); wearable and portable devices 3348 (such as mobile phones, tablets, dedicated portable devices for financial applications, data collectors (including mobile data collectors), sensor-based devices, watches, glasses, hearables, head-worn devices, clothing-integrated devices, arm bands, bracelets, neck-worn devices, AR/VR devices, headphones, and many others); workers 3344 (such as banking workers, loan officers, financial service personnel, managers, inspectors, brokers (e.g., mortgage brokers), attorneys, underwriters, regulators, assessors, appraisers, process supervisors, security personnel, safety personnel and many others); robotic systems 3342 (e.g., physical robots, collaborative robots (e.g., "cobots"), software bots and others); and facilities 3338 (such as banking facilities, inventory warehousing facilities, factories, homes, buildings, storage facilities (such as for loan-related collateral, property that is the subject of a loan, inventory (such as related to loans on inventory), personal property, components, packaging materials, goods, products, machinery, equipment, and other items), banking facilities (such as for commercial banking, investing, consumer banking, lending and many other banking activities) and others. In embodiments, entities 3330 may include external marketplaces 3390, such as financial, commodities, e-commerce, advertising, and other marketplaces 3390 (including current and futures markets), such as ones within which transactions occur in various goods and services, such that monitoring of the marketplaces 3390 and entities 3330 within them may provide lending-relevant information, such as with respect to the price or value of items, the liquidity of items, the characteristics of items, the rate of depreciation of items, or the like. For example, for various entities that may comprise collateral 4802 or assets for asset-backed lending, a monitoring system 3306 may monitor not only the collateral 4802 or assets, such as by cameras, sensors, or other monitoring systems 3306, but may also collect data, such as via data collection systems 3318 of various types, with respect to the value, price, or other condition of the collateral 4802 or assets, such as by determining market conditions for collateral 4802 or assets that are in similar condition, of similar age, having similar specifications, having similar location, or the like. In embodiments, an adaptive intelligent system 3304 may include a clustering system 4804, such as one that groups or clusters entities 3330, including collateral 4802, parties, assets, or the like by similarity of attributes, such as a k-means clustering system, self-organizing map system, or other system as described herein and in the documents incorporated herein by reference. The clustering system may organize collections of collateral, collections of assets, collections of parties, and collections of loans, for example, such that they may be monitored and analyzed based on common attributes, such as to enable performance of a subset of transactions to be used to predict performance of others, which in turn may be used for underwriting 3420, pricing 3421, fraud detection 3416, or other applications, including any of the services, solutions, or applications described in connection with FIG. 48 and FIG. 49 or elsewhere throughout this disclosure or the documents incorporated herein by reference. In embodiments, condition information about collateral 4802 or assets is continuously monitored by a monitoring system 3306, such as a set of sensors on the collateral 4802 or assets, a set of sensors or cameras in the environment of the collateral 4802 or assets, or the like, and market information is collected in real time by a data collection system 3318, such that the condition and market information may be time-aligned and used as a basis for real time estimation of the value of the collateral or assets and forward prediction of the future value of the collateral or assets. Present and predicted value for the collateral 4802 or assets may be based on a model, which may be accessed and used, such as in a smart contract 3431, to enable automated, or machine-assisted lending on the collateral or assets, such as the underwriting or offering of a microloan on the collateral 4802 or assets. Aggregation of data for a set of collateral 4802 or set of assets, such as a collection or fleet of collateral 4802 or fleet of assets owned by an entity 3330 may allow real time portfolio valuation and larger scale lending, including via smart contracts 3431 that automatically adjust interest rates and other terms and conditions based on the individual or aggregated value of collateral 4802 or assets based on real time condition monitoring and real-time market data collection and integration. Transactions, party information, transfers of title, changes in terms and conditions, and other information may be stored in a blockchain 3422, including loan transactions and information (such as condition information for collateral 4802 or assets and marketplace data) about the collateral 4802 or assets. The smart contract 3431 may be configured to require a party to confirm condition information and/or market value information, such as by representations and warranties that are supported or verified by the monitoring systems 3306 (which may flag fraud in a fraud detection system 3416). A lending model 4808 may be used to value collateral 4802 or assets, to determine eligibility for lending based on the condition and/or value of collateral 4802 or assets, to set pricing (e.g., interest rates), to adjust terms and conditions, and the like. The lending model 4808 may be created by a set of experts, such as using analytics 3419 on past lending transactions. The lending model 4808 may be populated by data from monitoring systems 3306 and data collection systems 3318, may pull data from storage systems 3310, and the like. The lending model 4808 may be used to configure parameters of a smart contract 3431, such that smart contract terms and conditions automatically adjust based on adjustments in the lending model 4808. The lending model 4808 may be configured to be improved by artificial intelligence 3448, such as by training it on a set of outcomes, such as outcomes from lending transactions (e.g., payment outcomes, default outcomes, performance outcomes, and the like), outcomes on collateral 4802 or assets (such as prices or value patterns of collateral or assets over time), outcomes on entities (such as defaults, foreclosures, performance results, on time payments, late payments, bankruptcies, and the like), and others. Training may be used to adjust and improve model parameters and performance, including for classification of collateral or assets (such as automatic classification of type and/or condition, such as using vision-based classification from camera-based monitoring systems 3306), prediction of value of collateral 4802 or assets, prediction of defaults, prediction of performance, and the like. In embodiments, configuration or handling of smart contracts 3431 for lending on collateral 4802 or assets may be learned and automated in a robotic process automation (RPA) system 3442, such as by training the RPA system 3442 to create smart contracts 3431, configure parameters of smart contracts 3431, confirm title to collateral 4802 or assets, set terms and conditions of smart contracts 3431, initiate security interests on collateral 4802 for smart contracts, monitor status or performance of smart contracts 3431, terminate or initiate termination for default of smart contracts 3431, close smart contracts 3431, foreclose on collateral 4802 or assets, transfer title, or the like, such as by using monitoring systems 3306 to monitor expert entities 3330, such as human managers, as they undertake a training set of similar tasks and actions in the creation, configuration, title confirmation, initiation of security interests, monitoring, termination, closing, foreclosing, and the like for a training set of smart contracts 3431. Once an RPA system 3442 is trained, it may efficiently create the ability to provide lending at scale across a wide range of entities and assets that may serve as collateral 4802, that may provide guarantees or security, or the like, thereby making loans more readily available for a wider range of situations, entities 3330, and collateral 4802. The RPA system 3442 may itself be improved by artificial intelligence 3448, such as by continuously adjusting model parameters, weights, configurations, or the like based on outcomes, such as loan performance outcomes, collateral valuation outcomes, default outcomes, closing rate outcomes, interest rate outcomes, yield outcomes, return-on-investment outcomes, or others. Smart contracts 3431 may include or be used for direct lending, syndicated lending, and secondary lending contracts, individual loans or aggregated tranches of loans, and the like.

In embodiments, the lending solution 3410 of the management application platform layer 3302 may, in various optional embodiments, include, integrate with, or interact with (such as within other embodiments of the platform 3300) a set of applications 3312, such as ones by which a lender, a borrower, a guarantor, an operator or owner of a transactional or financial entity, or other user, may manage, monitor, control, analyze, or otherwise interact with one or more elements related to a loan, such as an entity 3330 that is a party to a loan, the subject of a loan, the collateral for a loan, or otherwise relevant to the loan. This may include any of the elements noted above in connection with FIG. 33. The set of applications 3312 may include a lending application 3410 (such as, without limitation, for personal lending, commercial lending, collateralized lending, microlending, peer-to-peer lending, insurance-related lending, asset-backed lending, secured debt lending, corporate debt lending, student loans, subsidized loans, mortgage lending, municipal lending, sovereign debt, automotive lending, pay day loans, loans against receivables, factoring transactions, loans against guaranteed or assured payments (such as tax refunds, annuities, and the like), and many others). The lending solution 3410 may include, integrate with, or link with one or more of any of a wide range of other types of applications that may be relevant to lending, such as an investment application 3402 (such as, without limitation, for investment in tranches of loans, corporate debt, bonds, syndicated loans, municipal debt, sovereign debt, or other types of debt-related securities); an asset management application 3404 (such as, without limitation, for managing assets that may be the subject of a loan, the collateral for a loan, assets that back a loan, the collateral for a loan guarantee, or evidence of creditworthiness, assets related to a bond, investment assets, real property, fixtures, personal property, real estate, equipment, intellectual property, vehicles, and other assets); a risk management application 3408 (such as, without limitation, for managing risk or liability with respect to subject of a loan, a party to a loan, or an activity relevant to the performance of a loan, such as a product, an asset, a person, a home, a vehicle, an item of equipment, a component, an information technology system, a security system, a security event, a cybersecurity system, an item of property, a health condition, mortality, fire, flood, weather, disability, business interruption, injury, damage to property, damage to a business, breach of a contract, and others); a marketing application 3412 (such as, without limitation, an application for marketing a loan or a tranche of loans, a customer relationship management application for lending, a search engine optimization application for attracting relevant parties, a sales management application, an advertising network application, a behavioral tracking application, a marketing analytics application, a location-based product or service targeting application, a collaborative filtering application, a recommendation engine for loan-related product or service, and others); a trading application 3428 (such as, without limitation, an application for trading a loan, a tranche of loans, a portion of a loan, a loan-related interest, or the like, such as a buying application, a selling application, a bidding application, an auction application, a reverse auction application, a bid/ask matching application, or others); a tax application 3414 (such as, without limitation, for managing, calculating, reporting, optimizing, or otherwise handling data, events, workflows, or other factors relating to a tax-related impact of a loan); a fraud prevention application 3416 (such as, without limitation, one or more of an identity verification application, a biometric identity validation application, a transactional pattern-based fraud detection application, a location-based fraud detection application, a user behavior-based fraud detection application, a network address-based fraud detection application, a black list application, a white list application, a content inspection-based fraud detection application, or other fraud detection application; a security application, solution or service 3418 (referred to herein as a security application, such as, without limitation, any of the fraud prevention applications 3416 noted above, as well as a physical security system (such as for an access control system (such as using biometric access controls, fingerprinting, retinal scanning, passwords, and other access controls), a safe, a vault, a cage, a safe room, or the like), a monitoring system (such as using cameras, motion sensors, infrared sensors and other sensors), a cyber security system (such as for virus detection and remediation, intrusion detection and remediation, spam detection and remediation, phishing detection and remediation, social engineering detection and remediation, cyberattack detection and remediation, packet inspection, traffic inspection, DNS attack remediation and detection, and others) or other security application); an underwriting application 3420 (such as, without limitation, for underwriting any loan, guarantee, or other loan-related transaction or obligation, including any application for detecting, characterizing or predicting the likelihood and/or scope of a risk, including underwriting based on any of the data sources, events or entities noted throughout this disclosure or the documents incorporated herein by reference); a blockchain application 3422 (such as, without limitation, a distributed ledger capturing a series of transactions, such as debits or credits, purchases or sales, exchanges of in kind consideration, smart contract events, or the like, a cryptocurrency application, or other blockchain-based application); a real estate application 3424 (such as, without limitation, a real estate brokerage application, a real estate valuation application, a real estate mortgage or lending application, a real estate assessment application, or other); a regulatory application 3426 (such as, without limitation, an application for regulating the terms and conditions of a loan, such as the permitted parties, the permitted collateral, the permitted terms for repayment, the permitted interest rates, the required disclosures, the required underwriting process, conditions for syndication, and many others); a marketplace application, solution or service 3327 (referred to as a marketplace application, such as, without limitation, a loan syndication marketplace, a blockchain-based marketplace, a cryptocurrency marketplace, a token-based marketplace, a marketplace for items used as collateral, or other marketplace); a warranty or guarantee application 3417 (such as, without limitation, an application for a warranty or guarantee with respect to an item that is the subject of a loan, collateral for a loan, or the like, such as a product, a service, an offering, a solution, a physical product, software, a level of service, quality of service, a financial instrument, a debt, an item of collateral, performance of a service, or other item); an analyst application 3419 (such as, without limitation, an analytic application with respect to any of the data types, applications, events, workflows, or entities mentioned throughout this disclosure or the documents incorporated by reference herein, such as a big data application, a user behavior application, a prediction application, a classification application, a dashboard, a pattern recognition application, an econometric application, a financial yield application, a return on investment application, a scenario planning application, a decision support application, and many others); a pricing application 3421 (such as, without limitation, for pricing of interest rates and other terms and conditions for a loan). Thus, the management application platform 3302 may host and enable interaction among a wide range of disparate applications 3312 (such term including the above-referenced and other financial or transactional applications, services, solutions, and the like), such that by virtue of shared microservices, shared data infrastructure, and shared intelligence, any pair or larger combination or permutation of such services may be improved relative to an isolated application of the same type.

In embodiments the data collection systems 3318 and the monitoring systems 3306 may monitor one or more events related to a loan, debt, bond, factoring agreement, or other lending transaction, such as events related to requesting a loan, offering a loan, accepting a loan, providing underwriting information for a loan, providing a credit report, deferring a required payment, setting an interest rate for a loan, deferring a payment requirement, identifying collateral or assets for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan.

Microservices Lending Platform with Data Collection Services, Blockchain and Smart Contracts In embodiments, provided herein is a platform, consisting of various services, components, modules, programs, systems, devices, algorithms, and other elements, for lending. An example platform or system for lending includes a set of microservices having a set of application programming interfaces that facilitate connection among the microservices and to the microservices by programs that are external to the platform, wherein the microservices include (a) a multimodal set of data collection services that collect information about and monitor entities related to a lending transaction; (b) a set of blockchain services for maintaining a secure historical ledger of events related to a loan, the blockchain services having access control features that govern access by a set of parties involved in a loan; (c) a set of application programming interfaces, data integration services, data processing workflows and user interfaces for handling loan-related events and loan-related activities; and (d) a set of smart contract services for specifying terms and conditions of smart contracts that govern at least one of loan terms and conditions, loan-related events and loan-related activities.

Certain further aspects of an example system are described following, any one or more of which may be present in certain embodiments. An example system includes where the entities relevant to lending include a set of entities among lenders, borrowers, guarantors, equipment, goods, systems, fixtures, buildings, storage facilities, and items of collateral.

An example system includes where collateral items are monitored and the collateral items are selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where the multi-modal set of data collection services include services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example system includes where the events related to a loan are selected from requesting a loan, offering a loan, accepting a loan, providing underwriting information for a loan, providing a credit report, deferring a required payment, setting an interest rate for a loan, deferring a payment requirement, identifying collateral for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan.

An example system includes where the set of terms and conditions for the loan that are specified and managed by the set of smart contract services is selected from among a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

An example system includes where a set of parties to the loan is selected from among a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, a valuation professional, a government official, and an accountant.

An example system includes where loan-related activities include activities selected from the set of finding parties interested in participating in a loan transaction, an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, and closing a loan transaction.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the set of smart contract services configures at least one smart contract to automatically undertake a loan-related action based on based on information collected by the multi-modal set of data collection services.

An example system includes where the loan-related action is selected from among offering a loan, accepting a loan, underwriting a loan, setting an interest rate for a loan, deferring a payment requirement, modifying an interest rate for a loan, validating title for collateral, recording a change in title, assessing the value of collateral, initiating inspection of collateral, calling a loan, closing a loan, setting terms and conditions for a loan, providing notices required to be provided to a borrower, foreclosing on property subject to a loan, and modifying terms and conditions for a loan.

An example system includes where the platform or system may further include an automated agent that processes events relevant to at least one of the value, the condition and the ownership of items of collateral and undertakes an action related to a loan to which the collateral is subject.

Figure 49:
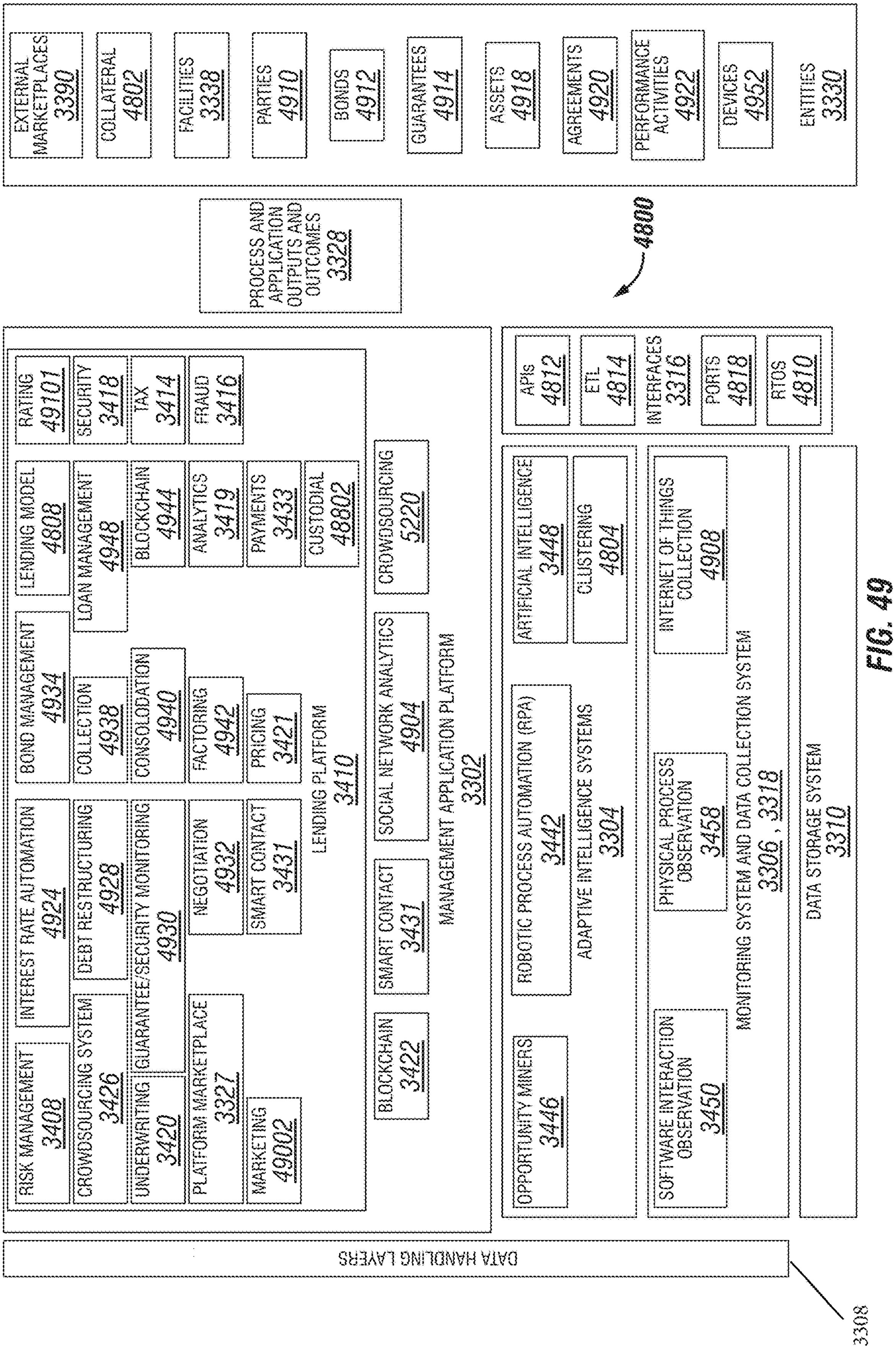
FIG. 49 depicts components and interactions of an embodiment of a lending platform in which a set of lending solutions are supported by a data-integrated set of data collection and monitoring services, adaptive intelligent systems, and data storage systems.

Referring to FIG. 49, additional applications, solutions, programs, systems, services and the like that may be present in a lending solution 3410 are depicted, which may be interchangeably included in the platform 3302 with other elements noted in connection, with FIG. 48 and elsewhere throughout this disclosure and the documents incorporated herein by reference. Also depicted are additional entities 3330, which should be understood to be interchangeable with the other entities 3330 described in connection with various embodiments described herein. In addition to elements already noted above, the lending solution 3410 may include a set of applications, solutions, programs, systems, services and the like that include one or more of a social network analytics solution 4904 that may find and analyze information about various entities 3330 as depicted in one or more social networks (such as, without limitation, information about parties, behavior of parties, conditions of assets, events relating to parties or assets, conditions of facilities, location of collateral 4802 or assets, and the like), such as by allowing a user to configure queries that may be initiated and managed across a set of social network sites using data collection systems 3318 and monitoring systems 3306; a loan management solution 4948 (such as for managing or responding to one or more events related to a loan (such events including, among others, requests for a loan, offering a loan, accepting a loan, providing underwriting information for a loan, providing a credit report, deferring a required payment, setting an interest rate for a loan, deferring a payment requirement, identifying collateral for a loan, validating title for collateral or security for a loan, recording a change in title of property, assessing the value of collateral or security for a loan, inspecting property that is involved in a loan, a change in condition of an entity relevant to a loan, a change in value of an entity that is relevant to a loan, a change in job status of a borrower, a change in financial rating of a lender, a change in financial value of an item offered as a security, providing insurance for a loan, providing evidence of insurance for property related to a loan, providing evidence of eligibility for a loan, identifying security for a loan, underwriting a loan, making a payment on a loan, defaulting on a loan, calling a loan, closing a loan, setting terms and conditions for a loan, foreclosing on property subject to a loan, and modifying terms and conditions for a loan) for setting terms and conditions for a loan (such as a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default), or managing loan-related activities (such as, without limitation, finding parties interested in participating in a loan transaction, handling an application for a loan, underwriting a loan, forming a legal contract for a loan, monitoring performance of a loan, making payments on a loan, restructuring or amending a loan, settling a loan, monitoring collateral for a loan, forming a syndicate for a loan, foreclosing on a loan, collecting on a loan, consolidating a set of loans, analyzing performance of a loan, handling a default of a loan, transferring title of assets or collateral, and closing a loan transaction)); a rating solution 6801 (such as for rating an entity 3330 (such as a party 4910, collateral 4802, asset 4918 or the like), such as involving rating of creditworthiness, financial health, physical condition, status, value, presence or absence of defects, quality, or other attribute); a regulatory and/or compliance solution 3426 (such as for enabling specification, application and/or monitoring of one or more policies, rules, regulations, procedures, protocols, processes, or the like, such as ones that relate to terms and conditions of loan transactions, steps required in forming lending transactions, steps required in performing lending transactions, steps required with respect to security or collateral, steps required for underwriting, steps required for setting prices, interest rates, or the like, steps required to provide required legal disclosures and notices (e.g., presenting annualized percentage rates) and others); a custodial solution or set of custodial services 6502 (such as for taking custody of a set of assets 4918, collateral 4802, or the like (including cryptocurrencies, currency, securities, stocks, bonds, agreements evidencing ownership interests, and many other items), such as on behalf of a party 4910, client, or other entity 3330 that needs assistance in maintaining security of the items, or in order to provide security, backing, or a guarantee for an obligation, such as one involved in a lending transaction); a marketing solution 6702 (such as for enabling a lender to market availability of a loan to a set of prospective borrowers, to target a set of borrowers who are appropriate for a type of transaction, to configure marketing or promotional messages (including placement and timing of the message), to configure advertisement and promotional channels for lending transactions, to configure promotional or loyalty program parameters, and many others); a brokering solution 4944 (such as for brokering a set of loan transactions among a set of parties, such as a mortgage loan), which may allow a user to configure a set of preferences, profiles, parameters, or the like to find a set of prospective counterparties to a lending transaction; a bond management solution 4934 such as for managing, reporting on, syndicating, consolidating, or otherwise handling a set of bonds (such as municipal bonds, corporate bonds, performance bonds, and others); a guarantee monitoring solution 4930, such as for monitoring, classifying, predicting, or otherwise handling the reliability, quality, status, health condition, financial condition, physical condition or other information about a guarantee, a guarantor, a set of collateral supporting a guarantee, a set of assets backing a guarantee, or the like; a negotiation solution 4932, such as for assisting, monitoring, reporting on, facilitating and/or automating negotiation of a set of terms and conditions for a lending transaction (such as, without limitation, a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclosure condition, a default condition, and a consequence of default), which may include a set of user interfaces for configuration of parameters, profiles, preferences, or the like for negotiation, such as ones that use or are informed by the lending model 4808 and ones that use, are informed by, or that are automated by or with the assistance of a set of artificial intelligence services and systems 3448, by robotic process automation 3442, or other adaptive intelligent systems 3304; a collection solution 4938 for collecting on a loan, which may optionally use, be informed by, or be automated by or with the assistance of a set of artificial intelligence services and systems 3448, by robotic process automation 3442, or other adaptive intelligent systems 3304, such as based on monitoring the status or condition of various entities 3330 with the monitoring systems 3306 and data collection systems 3318 in order to trigger collection, such as when one or more covenants has not been met, when collateral is in poor condition, when financial health of party is below a threshold, or the like; a consolidation solution 4940 for consolidating a set of loans, such as using a lending model 4808 that is configured for modeling a consolidated set of loans and such as using or being automated by one or more adaptive intelligent systems 3304; a factoring solution 4942, such as for monitoring, managing, automating or otherwise handling a set of factoring transactions, such as using a lending model 4808 that is configured for modeling factoring transactions and such as using or being automated by one or more adaptive intelligent systems 3304; a debt restructuring solution 4928, such as for restructuring a set of loans or debt, such as using a lending model 4808 that is configured for modeling alternative scenarios for restructuring a set of loans or debt and such as using or being automated by one or more adaptive intelligent systems 3304; and/or an interest rate setting solution 4924, such as for setting or configuring a set of rules or a model for a set of interest rates for a set of lending transactions or for automating interest rate setting based on information collected by data collection systems 3318 or monitoring systems 3306 (such as information about conditions, status, health, location, geolocation, storage condition, or other relevant information about any of the entities 3330), which may set interest rates or facilitate setting of interest rates for a set of loans, such as using a lending model 4808 that is configured for modeling interest rate scenarios for a set of loans and such as using or being automated by one or more of the adaptive intelligent systems 3304. As with the solutions referenced in connection with FIG. 48, the various solutions may share the adaptive intelligent systems 3304, the monitoring systems 3306, the data collection systems 3318 and the storage systems 3310, such as by being integrated into the platform 4800 in a microservices architecture having various appropriate data integration services, APIs, and interfaces.

As with the entities 3330 described in connection with FIG. 49, entities 3330 may further include a range of entities that are involved with loans, debt transactions, bonds, factoring agreements, and other lending transactions, such as: collateral 4802 and assets 4918 that are used to secure, guarantee, or back a payment obligation (such as vehicles, ships, planes, buildings, homes, real estate, undeveloped land, farms, crops, facilities 3338 (such as municipal facilities, factories, warehouses, storage facilities, treatment facilities, plants, and others), systems, a set of inventory, commodities, securities, currencies, tokens of value, tickets, cryptocurrencies, consumables, edibles, beverages, precious metals, jewelry, gemstones, intellectual property, intellectual property rights, contractual rights, legal rights, antiques, fixtures, equipment, furniture, tools, machinery and personal property); a set of parties 4910 (such as one or more of a primary lender, a secondary lender, a lending syndicate, a corporate lender, a government lender, a bank lender, a secured lender, a bond issuer, a bond purchaser, an unsecured lender, a guarantor, a provider of security, a borrower, a debtor, an underwriter, an inspector, an assessor, an auditor, an agent, an attorney, a valuation professional, a government official, and/or an accountant); a set of agreements 4920 (such as loans, bonds 4912, lending agreements, corporate debt agreements, subsidized loan agreements, factoring agreements, consolidation agreements, syndication agreements, guarantee agreements, underwriting agreements, and others, which may include a set of terms and conditions that may be searched, collected, monitored, modified or otherwise handled by the platform 4800, such as interest rates, payment schedules, payment amounts, principal amounts, representations and warranties, indemnities, covenants, and other terms and conditions); a set of guarantees 4914 (such as provided by personal guarantors, corporate guarantors, government guarantors, municipal guarantors and others to secure or back a payment obligation or other obligation of a lending agreement 4920); a set of performance activities 4922 (such as making payments of principal and/or interest, maintaining required insurance, maintaining title, satisfying covenants, maintaining condition of collateral 4802 or assets 4918, conducting business as required by an agreement; and many others); and devices 4952 (such as Internet of Things devices that may be disposed on or in goods, equipment or other items, such as ones that are collateral 4802 or assets 4918 used to back a payment obligation or to satisfy a covenant or other requirement, or that may be disposed on or in packaging for goods, as well as ones disposed in facilities 3338 or other environments where entities 3330 may be located). In embodiments, an agreement 4920 may be for a bond, a factoring agreement, a syndication agreement, a consolidation agreement, a settlement agreement, or a loan, such as one or more of an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

As noted elsewhere herein and in documents incorporated by reference, artificial intelligence (such as any of the techniques or systems described throughout this disclosure) in connection with various transactional and marketplace entities 3330 and related processes and applications may be used to facilitate, among other things: (a) the optimization, automation and/or control of various functions, workflows, applications, features, resource utilization and other factors, (b) recognition or diagnosis of various states, entities, patterns, events, contexts, behaviors, or other elements; and/or (c) the forecasting of various states, events, contexts or other factors. As artificial intelligence improves, a large array of domain-specific and/or general artificial intelligence systems have become available and are likely to continue to proliferate. As developers seek solutions to domain-specific problems, such as ones relevant to entities 3330 and applications of the platform 100 described throughout this disclosure they face challenges in selecting artificial intelligence models (such as what set of neural networks, machine learning systems, expert systems, or the like to select) and in discovering and selecting what inputs may enable effective and efficient use of artificial intelligence for a given problem. As noted above, opportunity miners 3446 may assist with the discovery of opportunities for increased automation and intelligence; however, once opportunities are discovered, selection and configuration of an artificial intelligence solution still presents a significant challenge, one that is likely to continue to grow as artificial intelligence solutions proliferate.

One set of solutions to these challenges is an artificial intelligence store 157 that is configured to enable collection, organization, recommendation and presentation of relevant sets of artificial intelligence systems based on one or more attributes of a domain and/or a domain-related problem. In embodiments, an artificial intelligence store 157 may include a set of interfaces to artificial intelligence systems, such as enabling the download of relevant artificial intelligence applications, establishment of links or other connections to artificial intelligence systems (such as links to cloud-deployed artificial intelligence systems via APIs, ports, connectors, or other interfaces) and the like. The artificial intelligence store 157 may include descriptive content with respect to each of a variety of artificial intelligence systems, such as metadata or other descriptive material indicating suitability of a system for solving particular types of problems (e.g., forecasting, NLP, image recognition, pattern recognition, motion detection, route optimization, or many others) and/or for operating on domain-specific inputs, data or other entities. In embodiments, the artificial intelligence store 157 may be organized by category, such as domain, input types, processing types, output types, computational requirements and capabilities, cost, energy usage, and other factors. In embodiments, an interface to the application store 157 may take input from a developer and/or from the platform (such as from an opportunity miner 3446) that indicates one or more attributes of a problem that may be addressed through artificial intelligence and may provide a set of recommendations, such as via an artificial intelligence attribute search engine, for a subset of artificial intelligence solutions that may represent favorable candidates based on the developer's domain-specific problem.

In embodiments, a criteria for determining the recommendation may include level of anticipated human oversight. This may include, among others, understanding the level and types of decisions delegated to human workers (such as a decision to purchase a security, taking a market decision, taking a license on Intellectual property, financial limits on actions and ordering (e.g. is the RPA able to order or commit to transactions below a certain amount, above which a human is involved), the level and type of anticipated human supervision of robotic process automation operations, anticipated extent of human supervision and/or governance of model training and training data set selection. A further consideration may be the level and type of anticipated human involvement in the curation of model versions (such as identifying historical break points where input data should be discarded); and others.

In embodiments, criteria for determining the recommendation may include security considerations such as adversarial training and complex environments such as network attacks, viruses, and the like. Additional security considerations may include the security and management of historic training datasets, including audit trails. Security considerations may include the model traceability and accuracy, how will the model or controlling parameters be updated, who will have authority to update the model, how will the updates be documented, how will results be correlated with model updates, how will version control be implemented and documented and the like. Another security consideration will be documentation of the results of the AI for audit trails including financial results and performance results.

In embodiments, criteria for determining the recommendation may include the availability of different AI types, models, algorithms, or systems (including heuristic/model-based AI, neural networks, and others). Availability may be limited by the computational environment that the user intends to use such as a given cloud platform, an on-premises IT system, or in a network (edge or other networks), and the like and whether a given type, model, or algorithm will run in the client's environment. In embodiments, computational factors and configurations may be criteria. For example, the available processor types for running the AI solution in the client's environment may be a factor including: chipsets, modules, device, cloud components, number, and architecture of processor types (e.g. multi-core processor availability, GPU availability, CPU availability, FPGA availability, custom ASIC availability, and the like), and the like. Additionally, computational factors, which may be expressed as minimum capability criteria, may include available processing capacity, both for solution training (for example utilizing a cloud computing resource) and solution operation deployment environment/capacity (e.g. IoT, in-vehicle, edge, mesh network, on-premises IT solution, stand along, or other deployment environments). Additional criteria may include software and interface criteria such as software environment such as operating systems (Linux, Mac, PC, and the like), languages and protocols used for APIs for access to input data sources for solution training as well as access to runtime data and data integration and output.

In embodiments, criteria may include various network factors such as available network type, available network bandwidth (input and output) for both AI solution and AI operation, network uptime, network redundance, variability of delivery times (sequencing of data may vary), as well as any of the other networks and network criteria described herein.

In embodiments, criteria may include performance or quality of service factors, either in absolute terms or relative to other AI and/or non-AI solutions (e.g. conventional models or rule-based solutions. Criteria may include speed/latency, time to train/configure and an AI solution, time for the AI solution to provide result in an operations situation, accuracy, reliability (e.g. ability to resolve to a result), consistency, absence of bias, outcome-based measures of quality such as return on investment (ROI), yield (e.g. output from an AI-governed operation), profitability, revenue and other economic measures, performance on safety measures, performance on security measures, energy consumption (e.g. overall consumption, timing-based consumption (e.g. ability to shift processing from peak to off-peak hours), ability to access renewable or low-carbon energy for model training and/or operation, management of cost of new model training initiatives (power costs, latency and validation of new models), and the like.

In embodiments, criteria may include the ability of the client to access a given type or model due to license requirements and limitations, client policies (described elsewhere herein), regulations (including in the client's jurisdiction, the jurisdiction of the data source (e.g. European data privacy laws and Safe Harbor), a jurisdiction governing a particular model, algorithm, or the like (e.g. export controls on technology), permissions (e.g. training data or operational data), and the like. Additionally, the recommendation may be influenced by the type of problem to be solved and whether there are specialized algorithms or methods that are optimized for the type of problem (e.g. quantum annealing based traveling salesperson solver or even classic heuristic methods that provide for reasonable baseline results).

In embodiments, criteria may include conformance or adherence to governance principles and policies. There may be policies regarding what input data sources may be used to train the AI solution. There may be policies regarding what input sources may be used during operation. For example, input data sources may be reviewed for potential bias, appropriate representation (either demographically or of the problem space), scope, and the like. There may be criteria regarding accreditation or approval of the solution by a regulatory body, certification organization, internal IT review, and the like. There may be policies and procedures that must be in place or implemented with respect to security (e.g. physical security of the system, cybersecurity, and the like), safety requirements (e.g. the safety of the user, the safety of output product, and the like), and the like.

In embodiments, the criteria for recommending an AI solution may include criteria regarding data availability such as the availability of data sources of adequate size, granularity, quality, reliability, location, time zones, accuracy, or the like for effective model training. Additional criteria regarding data availability may include the cost of data for: inputs for the model training, input for model operation. Additional criteria may include the availability of data for operation of the AI solution, and the like. Criteria for AI selection may further include upstream data processing requirements, master data management considerations such as dimensional cleanup and data validation, and the like.

In embodiments, criteria for solution selection may include applicability of the model or solution to the given task or workflow of the "problem" Criteria may include benchmark performance of a given model relative to other models performing a known task type (e.g. a convolutional neural network for 2D object classification, a gated recurrent neural network for tasks that tend to produce exploding errors, or the like). In embodiments, selection of a solution may be based on the solution having a configuration that is similar or analogous to how a biological brain solves a similar task (e.g. where a sequence of neural network models are arranged to mimic a sequence or flow which may include serial elements, parallel elements, feedback loops, conditional logic junctions, graph-driven elements and other flow characteristics), such as a flow of modular or quasi-modular processes, such as ones involved in the brain of a human or other species, such as for in visual or auditory processing, language recognition, speech, motion tracking, image recognition, facial recognition, motion coordination, tactile recognition, spatial orientation, and the like. Criteria may include application of class AI heuristic methods to function as guard rails or operations in less impactful areas.

In embodiments, criteria may include model deployment considerations such as requirements for model updates (e.g. frequency and requirement for retirement of models), management of historic models and maintaining historical decision engine, potential for distributed decision making capabilities, model curation rules (e.g. how long a model or input data are considered valid for training), and the like.

Search results or recommendations may, in embodiments, be based at least in part on collaborative filtering, such as by asking developers to indicate or select elements of favorable models, as well as by clustering, such as by using similarity matrices, k-means clustering, or other clustering techniques that associate similar developers, similar domain-specific problems, and/or similar artificial intelligence solutions. The artificial intelligence store 157 may include e-commerce features, such as ratings, reviews, links to relevant content, and mechanisms for provisioning, licensing, delivery and payment (including allocation of payments to affiliates and or contributors), including ones that operate using smart contract and/or blockchain features to automate purchasing, licensing, payment tracking, settlement of transactions, or other features.

In embodiments, once a solution has been selected or recommended, the solution must be configured for the specific client and problem to be solved. Without limitation, configuration may include any of the factors mentioned in connection with the selection of a solution model above. Configuration of a set of neural network types (e.g., modules) in a flow (with options for serial elements, parallel elements, feedback loops, conditional logic junctions, graph-driven flows and the like) that recognizes the relative strengths and weaknesses of each type of AI solution (based on any of the selection factors noted above) for the specific task involved in the flow is critical. In an illustrative and non-limiting example of a flow, a) identify something by visual classification (such as with a CNN), b) predict its future state (such as with a gated RNN), c) optimize the future state (using a feed forward neural network). Configuration options include selection of neural network type(s) (including hybrids of different neural networks and/or other model types in various flows as noted above); selection of input model type; setting of initial model weights; setting model size (e.g., number of layers in a deep neural network); selection of computational deployment environment; selection of input data sources for training; selection of input data sources for operation; selection of feedback function/outcome measures; selection of data integration language(s) for inputs and outputs; configuration of APIs for model training; configuration of APIs for model inputs; configuration of APIs for outputs; configuration of access controls (role-based, user-based, policy-based and others); configuration of security parameters; configuration of network protocols; configuration of storage parameters (type, location, duration); configuration of economic factors (e.g., pricing for access; cost-allocation; and others); and others. Additional configuration options may include configuration of data flows (e.g. flows from multiple security exchanges into centralized decision engines), configuration of high availability, fault tolerance environments (e.g. trading systems are required to fail down to operation state that meets services levels requirements), price based data acquisition strategies (e.g. detailed financial data may require additional spending), combination with heuristic methods, coordination of massively parallel decision making environments (e.g. distributed vision systems), and the like. Additional configurations may include making decision models if there is an area that requires further consideration (e.g. pushing a decision to the edge to monitor for a specific event).

In embodiments, another set of solutions, which may be deployed alone or in connection with other elements of the platform, including the artificial intelligence store, may include a set of functional imaging capabilities, which may comprise monitoring systems 3306 and data collection systems 3318 and, in some cases, physical process observation systems 3458 and/or software interaction observation systems 3450, such as for monitoring various transactional and marketplace entities 3330. Functional imaging systems may, in embodiments, provide considerable insight into the types of artificial intelligence that are likely to be most effective in solving particular types of problems most effectively. As noted elsewhere in this disclosure and in the documents incorporated by reference herein, computational and networking systems, as they grow in scale, complexity and interconnections, manifest problems of information overload, noise, network congestion, energy waste, and many others. As the Internet of Things grows to hundreds of billions of devices, and virtually countless potential interconnections, optimization becomes exceedingly difficult. One source for insight is the human brain, which faces similar challenges and has evolved, over millennia, reasonable solutions to a wide range of very difficult optimization problems. The human brain operates with a massive neural network organized into interconnected modular systems, each of which has a degree of adaptation to solve particular problems, from regulation of biological systems and maintenance of homeostasis to detection of a wide range of static and dynamic patterns, to recognition of threats and opportunities, among many others.

Setting up a robotic process automation (RPA) system includes selection of the best AI solution and configuration. There may be goals to train the RPA system, typically on human interactions with software and or hardware (e.g., tools) and to use the system in operation, both of which be enhanced by understanding what is going on in the human brain as it solves a problem. In a single neural network solution (using one network to solve a problem in a single step, like single-step translation), the process would likely involve setting initial weights for inputs, selection of input data sources, selection of the type of network (e.g., convolutional or not, gated or not, deep or not, among others), the number of layers, and what inputs are provided to it (and outputs if there are complex outputs). The idea would be to pick inputs and weights that are the ones the human brain tends to use to solve the same problem. For hybrids of multiple AI modules/systems and/or AI combined with more conventional software systems (like control systems, analytic models, rule-based systems, conditional logic systems, and others), the value would likely be the above, plus configuring with awareness of time sequences of processing, such as reflecting patterns of brain activity as visual, auditory, tactile and other sensory information is processed to recognize situation, context, motion, objects, etc. and then other regions (that behave differently) to do things like solve a logic puzzle, calculate, follow an algorithm, proliferate possibilities, and many others. For these, a series of "lego blocks", each consisting of a different neural network or other AI type, can be sequenced, set in parallel, linked by conditional logic, etc. to achieve a solution that automate the process.

In embodiments, identification of a type of reasoning and/or a type of processing may be informed by undertaking brain imaging, such as functional MRI or other magnetic imaging, electroencephalogram (EEG), or other imaging, such as by identifying broad brain activity (e.g., wave bands of activity, such as delta, theta, alpha and gamma waves), by identifying a set of brain regions that are activated and/or inactive during the set interactions of the user that are being used for training of the intelligent agent (such as neocortex regions, such as Fp1 (involved in judgment and decision making), F7 (involved in imagination and mimicry), F3 (involved in analytic deduction), T3 (involved in speech), C3 (involved in storage of facts), T5 (involved in mediation and empathy), P3 (involved in tactical navigation), 01 (involved in visual engineering), Fp2 (involved in process management), F8 (involved in belief systems), F4 (involved in expert classification), T4 (involved in listening and intuition), C4 (involved in artistic creativity), T6 (involved in prediction), P4 (involved in strategic gaming), O2 (involved in abstraction), and/or combinations of the foregoing) or by other neuroscientific, psychological, or similar techniques that provide insight into how humans upon which the intelligent agent is trained are solving particular types of problems that are involved in workflows for which intelligent agents are deployed. In embodiments, an intelligent agent may be configured with a neural network type, or combination of types, that is selected to replicate or simulate a processing activity that is similar to the activity of the brain regions of a human expert that is performing a set of activities for which the intelligent agent is to be trained. As one example among many possible, a trader may be shown to use visual processing region O1 and strategic gaming region P4 of the neocortex when making successful trades, and a neural network may be configured with a convolutional neural network to provide effective replication of visual pattern recognition and a gated recurrent neural network to replicate strategic gaming. In embodiments, a library of neural network resources representing combinations of neural network types that mimic or simulate neocortex activities may be configured to allow selection and implementation of modules that replicate the combinations used by human experts to undertake various activities that are subjects of development of intelligent agents, such as involving robotic process automation. In embodiments, various neural network types from the library may be configured in series and/or in parallel configurations to represent processing flows, which may be arranged to mimic or replicate flows of processing in the brain, such as based on spatiotemporal imaging of the brain when involved in the activity that is the subject of automation. In embodiments, an intelligent software agent for agent development may be trained, such as using any of the training techniques described herein, to select a set of neural network resource types, to arrange the neural network resource types according to a processing flow, to configure input data sources for the set of neural network resources, and/or to automatically deploy the set of neural network types on available computational resources to initiate training of the configured set of neural network resources to perform a desired intelligent agent/automation workflows. In embodiments, the intelligent software agent used for agent development operates on an input data set of spatiotemporal imaging data of a human brain, such as an expert who is performing the workflows that is the subject of development of a further, and uses the spatiotemporal imaging data to automatically select and configure the selection and arrangement of the set of neural network types to initiate learning. Thus, a system for developing an intelligent agent may be configured for (optionally automatic) selection of neural network types and/or arrangements based on spatiotemporal neocortical activity patterns of human users involved in workflows for which the agent is trained. Once developed, the resulting intelligent agent/process automation system may be trained as described throughout this disclosure.

In embodiments, a system for developing an intelligent agent (including the aforementioned agent for development of intelligent agents) may use information from brain imaging of human users to infer (optionally automatically) what data sources should be selected as inputs for an intelligent agent. For example, for processes where neocortex region O1 is highly active (involving visual processing), visual inputs (such as available information from cameras, or visual representations of information like price patterns, among many others) may be selected as favorable data sources. Similarly, for processes involving region C3 (involving storage and retrieval of facts), data sources providing reliable factual information (such as blockchain-based distributed ledgers) may be selected. Thus, a system for developing an intelligent agent may be configured for (optionally automatic) selection of input data types and sources based on spatiotemporal neocortical activity patterns of human users involved in workflows for which the agent is trained.

Functional imaging, such as functional magnetic resonance imaging (fMRI), electroencephalogram (EEG), computed tomography (CT) and other brain imaging systems have improved to the point that patterns of brain activity can be recognized in real time and temporally associated with other information, such behaviors, stimulus information, environmental condition data, gestures, eye movements, and other information, such that via functional imaging, either alone or in combination with other information collected by monitoring systems 3306, the platform may determine and classify what brain modules, operations, systems, and/or functions are employed during the undertaking of a set of tasks or activities, such as ones involving software interaction observation systems 3345, physical process observations 3340, or a combination thereof. This classification may assist in selection and/or configuration of a set of artificial intelligence solutions, such as from an artificial intelligence store, that includes a similar set of capabilities and/or functions to the set of modules and functions of the human brain when undertaking an activity, such as for the initial configuration of a robotic process automation (RPA) system 3442 that automates a task performed by an expert human.

In embodiments, a system may receive and/or monitor a set of inputs relating to a user, including image/video feeds, audio feeds, motion sensors, heartbeat monitor, other relevant biosensors, and the like. In embodiments, the system may also receive input relating to actions taken by the monitored user, such as input to a computing device or actions taken with respect to a physical environment in which the user is working. In embodiments, all the collected data is time stamped, so that, for example, a video feed may capture a series of images of a user while the user is performing a task and may concurrently capture the eye movements of the user (e.g. eye gaze tracking) to determine what the user is focusing on (e.g., what is the user looking at on a screen). During this time the system may also track the user's heart rate or other biological sensor measurements to determine whether the user is engaged in a task that requires intense concentration or less focused concentration. The system may also track the actions taken and may further determine the amount of time taken between actions. An RPA solution can then distribute processing, such as to a heavier, more computationally intensive activity to an AI solution on a cloud platform (like a deep neural network with many layers) and placing less computationally intensive tasks, such as ones where a human makes very quick decisions on minimal input data, on an edge or IoT device platform using a much more compact model, such as a TinyML™ model.

In embodiments, the system may determine the relative amount of time taken between actions, such that long periods of inaction may indicate that the user is involved in work that requires lots of thought, while short periods of inaction may indicate that the user is engaged in work that requires less thought and more action. The system may also monitor an audio feed and/or state of the computing device that a user is working on when the period of inaction occurs, which may be indicative of a user being distracted rather than focusing. Assuming that the user is actively working and not exhibiting distraction, then the system can generate a feature vector relating to the work being performed by the user that indicates the time-stamped data entries, which can be then fed into a machine-learned model. In embodiments, the machine-learned model may determine a brain region (or multiple brain regions) from the set of brain regions that were likely engaged during the work period. In embodiments, the machine-learned model may be trained using a training data set that includes labeled training vectors, where the label of each training vector indicates the brain region (or regions) that were being engaged by a subject when the training vector was generated. For example, each training vector may be labeled with one or more of: Fp1 (involved in judgment and decision making), F7 (involved in imagination and mimicry), F3 (involved in analytic deduction), T3 (involved in speech), C3 (involved in storage of facts), T5 (involved in mediation and empathy), P3 (involved in tactical navigation), O1 (involved in visual engineering), Fp2 (involved in process management), F8 (involved in belief systems), F4 (involved in expert classification), T4 (involved in listening and intuition), C4 (involved in artistic creativity), T6 (involved in prediction), P4 (involved in strategic gaming), O2 (involved in abstraction)). In some embodiments, the training vector may indicate additional data, such as the type of task being performed, whether the subject was successful in completing the task, or other suitable information.

In embodiments, these machine-learned models may be trained on different types of work tasks, such as negotiating, drafting, data entry, responding to emails, analyzing data, reviewing documents, or the like. Furthermore, in some embodiments, such machine-learned models may be trained by one party but leveraged by other parties. In these embodiments, the machine-learned models (and/or the training data vectors) may be bought and sold via a marketplace. Such machine-learned models may be used in a broader RPA system, such that the output of the models may be used as a specific signal in an RPA learning process.

In general, using data from organizations for predicting positioning of organization in market and adjusting processes within organization accordingly. In example embodiments, robotic imaging may be used to capture data of users (e.g., employees or workers) within the organization as they complete various tasks and processes while also correlating this information with completion of these tasks/processes. Obtaining various analytics regarding success of completion of tasks (e.g., efficiency). Then, using data obtained from tracking/monitoring users to determine what factors indicate some users as being more successful than other users in completion of tasks (e.g., based on physical movements of users in doing tasks correctly, brain regions activated, physical strength of users, etc.). This may be based on scanning/monitoring of users as they complete tasks. In some example embodiments, using system to segregate data relating to users with successful task completions versus data relating to users with less successful completions. The system may analyze biological data of workers to determine what makes one worker more successful than other workers. In some example embodiments, this analysis may also be combined with data from machines to determine whether workers are using machines accurately/efficiently. This biological data from workers may also be used to determine whether more workers may be needed to improve efficiency. Using historical data and results from process competitions to look at what improvements should be made whether by training, selecting workers who are better are some tasks vs. others, etc. The resulting analytics on outcomes, and contributions to outcomes, may be used, for example, as a feedback function for weighting the value of particular capabilities for design of an AI solution that is intended to perform the same or similar tasks. In some example embodiments, various data and analysis as described above may be used with respect to determining whether improvements made based on the analysis also improves the market positioning of the organization.

An operator skilled in a task may develop strong memory connections to muscle functions—muscle memory—which translates into easily accomplished actions that, without this connection, would be difficult or at least require repeated attempts, slower operation, and the like. A system that can distinguish between actions accomplished using muscle memory and others may better identify which actions are worth following/repeating/learning.

Understanding the mechanisms of muscle memory—e.g., understanding the pathways from cognition (visual, auditory, etc.) inputs to develop muscle memory may be a basis for understanding how to automate human actions. This may involve repetition type actions, association of one type of action with another type of action based on similarities, such as body positioning, expected result (dropping the hammer in the holster, etc.).

Additional value might be in understanding how two individuals can develop a form of muscle memory that allows them to "get into a rhythm", such as when exchanging physical items. What cues are they exchanging, visually recognizable actions (placement of hand/orientation) and how are those interpreted.

In embodiments, an imaging system may analyze brain images of multiple members of a team for a set of tasks or workflows that involve different types of expertise. Team performance can be tracked, and AI solutions may be configured to replicate the types of neural processing that are undertaken by different team members, such as motion tracking and coordination by one team member and executive decision making by another.

In embodiments, an imaging system may analyze brain images of multiple members of a mock trial or negotiation practice sessions for a set of verbal exchanges regarding an argument, point-count-point, and the like for negotiations, and the like. In addition to brain images, audio capture and bio-indicators of response to exchanges could also be harvested to increase the range of multi-dimensional data useful for learning how to automate human actions associated with successful negotiation and the like.

Given the level of abstraction humans use to trigger actions, e.g., recognizing an alarm tone or recognizing an action from a fellow worker, we can get less abstract in machine-machine communication, e.g., the input that triggered the alarm tone can trigger a direct machine-machine communication or, if the fellow worker is now a machine, they can indicate their positioning in their routine indicating they're ready to hand-off their work. This is similar to how less intelligent robots have been automated, even with simple macros where the "intelligence" is wrung out of the process to make it more robust, and there are strategies and methods for this that could be applied to these biologic-type inputs which are a level of abstraction beyond what is needed. This down-shift in complexity can, itself, be trained into the system as they recognize what myriad of "soft" triggers (e.g. image recognition) can be turned into "hard" triggers.)

Using systems like Fp1 (involved in judgment and decision making), P3 (involved in tactical navigation), O1 (involved in visual engineering), Fp2 (involved in process management), F8 (involved in belief systems), and T4 (involved in listening and intuition), the training vectors may indicate, in some embodiments, a system of mixed audio and visual concepts. The system may use an expert system to monitor a set of inputs and reconfigure those inputs to monitor an asset including image feeds at various electromagnetic frequencies (such as visual light, thermal, UV, and the like), and audio feeds from those frequencies to determine use, sounds of use, and possible sounds of concerns. When examples include fixed assets (those that cannot move), ambient measurement of the environment may be measured along with signatures of use or non-use of the product such as lack of motion, thermal imprints, or lack thereof. The changing environment in the room, the contact with asset by user or other fixtures, can cause reconfiguration of the sensors looking to appreciate the space. When fixed in a room, such systems may determine that ambient conditions could be detrimental to the asset such as strong outside lighting (too rich of UV content) relative to more appropriate lighting. Also included is sensing the motion of use. In more moveable assets, detection and parsing of benign motion rather than motion that may have a higher propensity to age or damage an asset can be recorded and characterized as an aggregated feed.

Risk Management—Combination of F3 (analytic deduction) and Fp1 (judgment and decision making)—Analytics and decision making in the human brain are informed by experience and knowledge, which may be partial, limited, negative, positive, factual, emotional, etc. AI can possibly recognize a situation (sensors, image recognition, proximity, text and conversation analysis, etc.), and apply better risk management in decision making using stored fact-based outcomes for similar situations. This could be applied to enable consumers to make better purchasing and financial decisions. In other applications, it could be applied to emergency response, policing actions, etc.

In embodiments, an AI solution may be configured as a companion risk manager for a main operational AI solution, such as sharing common inputs and resources, but focused on identifying risks, externalities, and other factors that are not required for the core process automation, but may improve governance, safety, emergency response, and other aspects.

In embodiments, an AI solution may be configured as a companion risk manager for a main operational AI solution, such as sharing common inputs and resources, but focused on identifying risks, externalities, and other factors that are not required for the core process automation, but may improve governance, safety, emergency response, and other aspects.

Thus, the platform may include a system that takes input from a functional imaging system to configure, optionally automatically based on matching of attributes between one or more biological systems, such as brain systems, and one or more artificial intelligence systems, a set of artificial intelligence capabilities for a robotic process automation system. Selection and configuration may further comprise selection of inputs to robotic process automation and/or artificial intelligence that are configured at least in part based on functional imaging of the brain while workers undertake tasks, such as selection of visual inputs (such as images from cameras) where vision systems of the brain are highly activated, selection of acoustic inputs where auditory systems of the brain are highly activated, selection of chemical inputs (such as chemical sensors) where olfactory systems of the brain are highly activated, or the like. Thus, a biologically aware robotic process automation system may be improved by having initial configuration, or iterative improvement, be guided, either automatically or under developer control, by imaging-derived information collected as workers perform expert tasks that may benefit from automation.

Functional imaging may provide insight into which tasks involve serial processing versus parallel processing, providing insight into the type of AI solution that may be best suited to a similar tasks (e.g. is it best to receive language and visual data/inputs at once (in parallel) or sequentially). Is there an order in which a user takes in data that might suggest an optimal ordering for performance?Analysis of functional images may enable identification of which computations tasks are most quickly processed through visual inputs versus textual (language processing) and may enable improved matching of task to best input/stimulus.

Functional imaging may enable determining efficiencies resulting from the pairing or multiple combinations of stimuli (e.g., is a task/command most efficiently communicated by providing multiple, diverse inputs at once, and/or is it best to omit certain stimuli from inputs/commands.

Functional imaging may enable ranking tasks or events to perform/solve based on the probabilistic improvement in the performance of a subsequent task (where task could be a computation or an actual action performed by a device based on a data/stimulus input).

Functional imaging may enable measuring negative impacts on performance/computation based on "noise," where noise may be unneeded data, irrelevant data, or overwhelming data sizes—similar to determining "negative stimuli" (in the human context this could be ambient noise in distinguishing a human voice within a cascade of auditory inputs, or ambient lighting in image recognition, or movement in counting objects in a region and so forth.

As one example among many possible, a marketplace host may be shown to use prediction region T6 and judgment and decision making region Fp1 when configuring a new marketplace, such as to predict favorable marketplace configuration parameters (such as to optimize marketplace efficiency profitability, and/or fairness) and to generate decisions related to marketplace parameters, and a neural network may be configured with a neural network to provide effective replication of prediction and a neural network to replicate decision making. The marketplace configuration parameters may include, but are not limited to, assets, asset types, description of assets, method for verification of ownership, method for delivery of traded goods, estimated size of marketplace, methods for advertising the marketplace, methods for controlling the marketplace, regulatory constraints, data sources, insider trading detection techniques, liquidity requirements, access requirements (such as whether to implement dealer-to-dealer trading, dealer-to-customer trading, or customer-to-customer trading), anonymity (such as determining whether counterparty identities are disclosed), continuity of order handling (e.g., continuous or periodic order handling), interaction (e.g., bilateral or multilateral), price discovery, pricing drivers (e.g., order-driven pricing or quote-driven pricing), price formation (e.g., centralized price formation or fragmented price formation), custodial requirements, types of orders allowed (such as limit orders, stop orders, market orders, and off-market orders), supported market types (such as dealer markets, auction markets, absolute auction markets, minimum bid auction markets, reverse auction markets, sealed bid auction markets, Dutch auction markets, multi-step auction markets (e.g., two-step, three-step, n-step, etc.), forward markets, futures markets, secondary markets, derivatives markets, contingent markets, markets for aggregates (e.g., mutual funds), and the like), trading rules (e.g., tick size, trading halts, open/close hours, escrow requirements, liquidity requirements, geographic rules, jurisdictional rules, rules on publicity, insider trading prohibitions, conflict of interest rules, timing rules (e.g., involving spot-market trading, futures trading and the like) and many others), asset listing requirements (e.g., financial reporting requirements, auditing requirements, minimum capital requirements), deposit minimums, trading minimums, verification rules, commission rules, fee rules, marketplace lifetime rules (e.g., short-term marketplace with timing constraints vs. long-term marketplace), and transparency (e.g., the amount and extent of information disseminated).

An RPA system may use AI systems related to biological brain functions F3 (involved in analytic deduction) and O1 (involved in visual engineering) in conjunction with one another to perform tasks related to visual calculus. The tasks related to visual calculus may include, for example, processing image sensor data via the O1 visual engineering system to determine what the RPA system "sees," and how to interpret, classify, identify, etc. what is "seen." Then, the F3 analytic deduction system may perform 1) deductions to determine what has led to the current state of what is "seen," and 2) prediction to determine a future state of what is "seen" based on the current state of visual data. The RPA system may use the T6 prediction function to assist in performing such predictions. The deductions may be useful in determining a cause of an issue, inefficiency, or problem in a system being analyzed. The predictions may be useful in determining solutions to problems and/or potential efficiency improvements. The AI system using F3, O1, and/or T6 may then also be used to choose a machine learned model suitable for performing the problem solving and/or efficiency improvement. For example, in a manufacturing environment, the RPA system and AI system may intake data from a plurality of visual IoT sensors, the visual data being from one or more sites on the manufacturing floor. The O1 visual engineering system may determine and/or classify what the visual data is seeing, such as one or more machines, products, assembly lines, etc. The F3 analytic deduction system may determine whether one or more of the machines, products, assembly lines, etc. are indicative of issues or inefficiencies. The T6 system may then make predictions and forward the predictions to a suitable machine learned model for determining solutions to problems and/or improvements to efficiencies.

Figure 50:
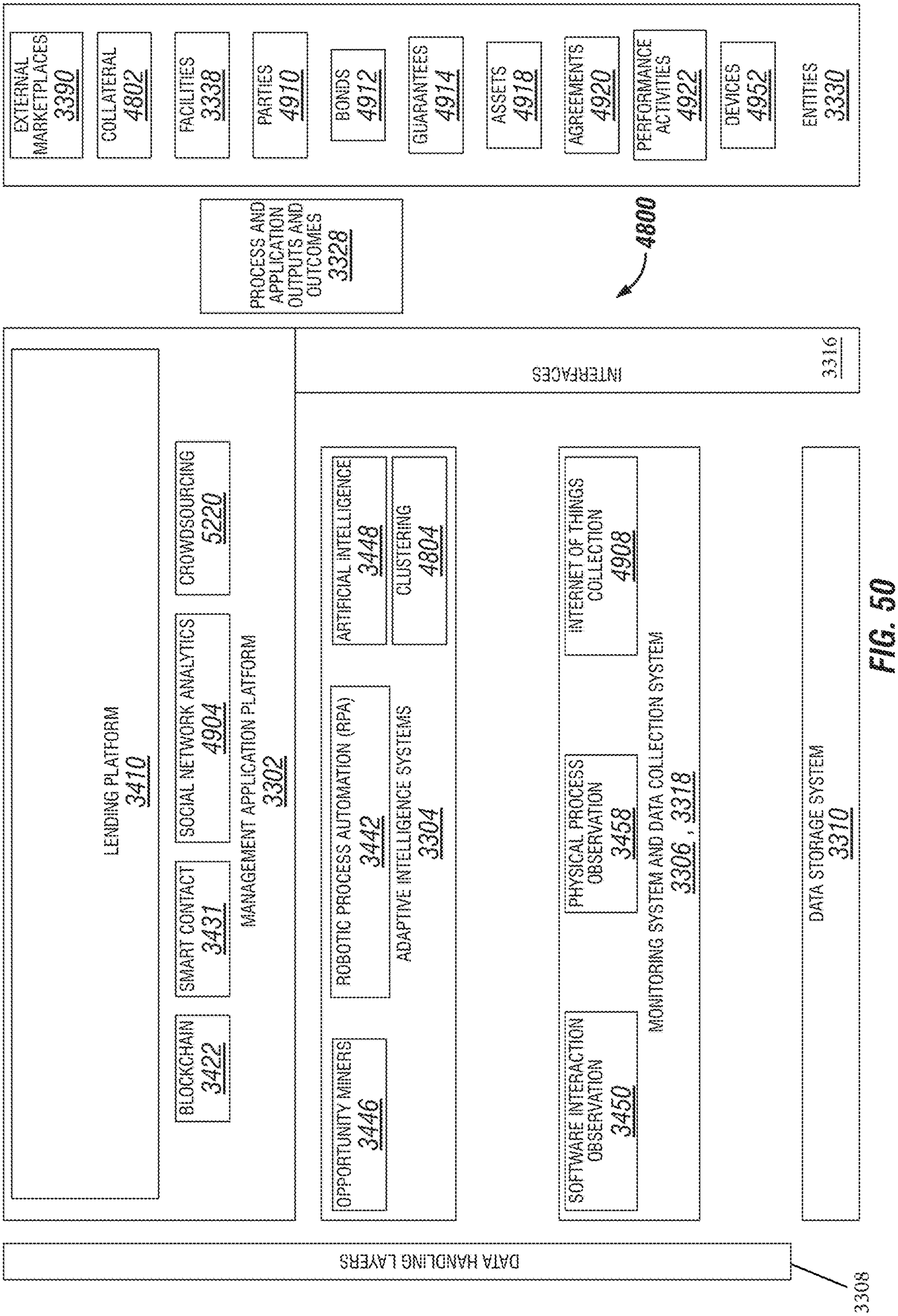
FIG. 50 depicts components and interactions of an embodiment of a lending platform having a set of data integrated blockchain services, smart contract services, social network analytic services, crowdsourcing services and Internet of Things data collection and monitoring services for collecting, monitoring and processing information about entities involved in or related to a lending transaction.

Referring to FIG. 50, in embodiments, devices 4952 may be connected devices that connect (such as through any of the wide range of interfaces 3316) to a set of Internet of Things (IoT) data collection services 4908, which may be part of or integrated with the data collection systems 3318 and monitoring systems 3306 of the platform 4800. The interfaces 3316 may include network interfaces, APIs, SDKs, ports, brokers, connectors, gateways, cellular network facilities, data integration interfaces, data migration systems, cloud computing interfaces (including ones that include computational capabilities, such as AWS IoT Greengrass™, Amazon™ Lambda™ and similar systems), and others. For example, the IoT data collection services 4908 may be configured to take data from a set of edge data collection devices in the Internet of Things, such as low-power sensor devices (e.g., for sensing movement of entities, for sensing, temperatures, pressures or other attributes about entities 3330 or their environments, or the like), cameras that capture still or video images of entities 3330, more fully enabled edge devices (such as Raspberry Pi™ or other computing devices, Unix™ devices, and devices running embedded systems, such as including microcontrollers, FPGAs, ASICs and the like), and many others. The IoT data collection services 4908 may, in embodiments, collect data about collateral 4802 or assets 4918, such as, for example, regarding the location, condition (health, physical, or otherwise), quality, security, possession, or the like. For example, an item of personal property, such as a gemstone, vehicle, item of artwork, or the like, may be monitored by a motion sensor and/or a camera having a known location (or having a location confirmed by GPS or other location system), to ensure that it remains in a safe, designated location. The camera can provide evidence that the item remains in undamaged condition and in the possession of a party 4910, such as to indicate that it remains appropriate and adequate collateral 4802 for a loan. In embodiments, this may include items of collateral for microloans, such as clothing, collectibles, and other items.

In embodiments the lending platform 4800 has a set of data-integrated microservices including data collection services 3318, monitoring services 3306, blockchain services 3422, and smart contract services 3431 for handling lending entities and transactions. The smart contract services 3431 may take data from the data collection services 3318 and monitoring services 3306 (such as from IoT devices) and automatically execute a set of rules or conditions that embody the smart contract based on the collected data. For example, upon recognition that collateral 4802 for a loan has been damaged (such as evidenced by a camera or sensor), the smart contract services 3431 may automatically initiate a demand for payment of a loan, automatically initiate a foreclosure process, automatically initiate an action to claim substitute or backup collateral, automatically initiate an inspection process, automatically change a payment or interest rate term that is based on the collateral (such as setting an interest rate at a level for an unsecured loan, rather than a secured loan), or the like. Smart contract events may be recorded on a blockchain by the blockchain services 3422, such as in a distributed ledger. Automated monitoring of collateral 4802 and assets 4918 and handling of loans via smart contract services 3431 may facilitate lending to a much wider range of parties 4910 and undertaking of loans based on a much wider range of collateral 4802 and assets 4918 than for conventional loans, as lenders may have greater certainty as to the condition of collateral. Monitoring systems 3306 and data collection systems 3318 may also monitor and collect data from external marketplaces 3390 or for marketplaces operated with the platform 4800 to maintain awareness of the value of collateral 4802 and assets 4918, such as to ensure that items remain of adequate value and liquidity to assure repayment of a loan. For example, public e-commerce auction sites like eBay™ can be monitored to confirm that personal property items are of a type and condition likely to be disposed of easily by a lender in a liquid public market, so that the lender is sure to receive payment if the borrower defaults. This may allow loans to be made and administered on a wide range of personal property that is normally difficult to use as collateral. In embodiments, an automated foreclosure process may be initiated by a smart contract, which may, upon occurrence of a condition of default that permits foreclosure (such as uncured failure to make payments) include a process for automatically initiating placement of an item of collateral on a public auction site (such as eBay™ or an auction site appropriate for a particular type of property), automatically securing collateral (such as by locking a connected device, such as a smart lock, smart container, or the like that contains or secures collateral), automatically configuring a set of instructions to a carrier, freight forwarder, or the like for shipping collateral, automatically configuring a set of instructions for a drone, a robot, or the like for transporting collateral, or the like. In embodiments, a system is provided for facilitating foreclosure on collateral. An example system for facilitating foreclosure on collateral may include a set of data collection and monitoring services for monitoring at least one condition of a lending agreement; and a set of smart contract services establishing terms and conditions of the lending agreement that include terms and conditions for foreclosure on at least one item that provides collateral securing a repayment obligation of the lending agreement, wherein upon detection of a default based on data collected by the data collection and monitoring services, the set of smart contract services automatically initiates a foreclosure process on the collateral. Certain further aspects of an example system are described following, any one or more of which may be present in certain embodiments. An example system includes where the set of smart contract services initiates a signal to at least one of a smart lock and a smart container to lock the collateral. An example system includes where the set of smart contract services configures and initiates a listing of the collateral on a public auction site. An example system includes where the set of smart contract services configures and delivers a set of transport instructions for the collateral. An example system includes where the set of smart contract services configures a set of instructions for a drone to transport the collateral. An example system includes where the set of smart contract services configures a set of instructions for a robot to transport the collateral. An example system includes where the set of smart contract services initiates a process for automatically substituting a set of substitute collateral. An example system includes where the set of smart contract services initiates a message to a borrower initiating a negotiation regarding the foreclosure. An example system includes where the negotiation is managed by a robotic process automation system that is trained on a training set of foreclosure negotiations. An example system includes where the negotiation relates to modification of at least one of the interest rate, the payment terms, and the collateral for the lending transaction.

Figure 51:
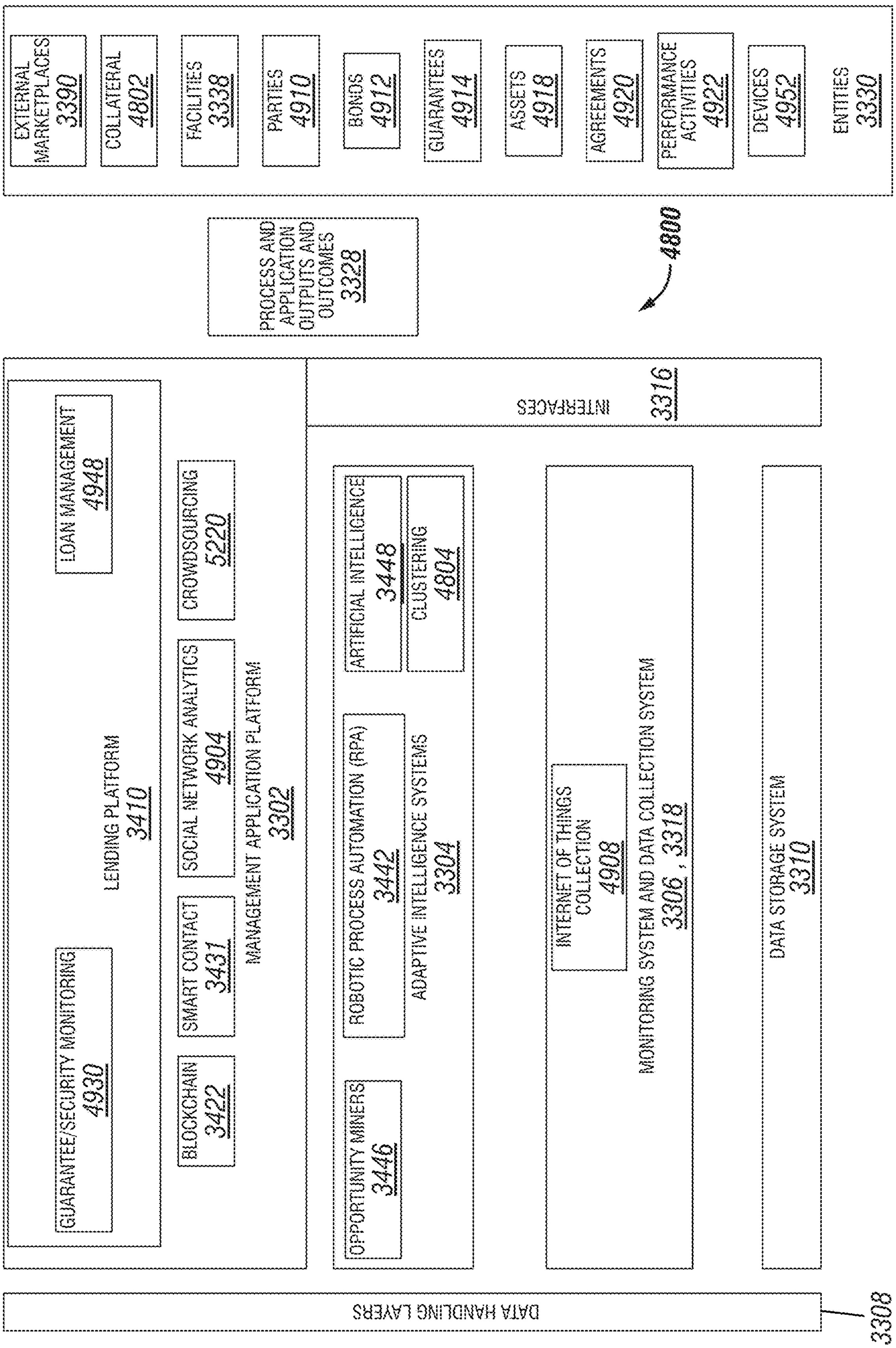
FIG. 51 depicts components and interactions of a lending platform having an Internet of Things and sensor platform for monitoring at least one of a set of assets, a set of collateral, and a guarantee for a loan, a bond, or a debt transaction.

Referring to FIG. 51, in embodiments the lending platform 4800 is provided having an Internet of Things data collection platform 4908 (with various IoT and edge devices as described throughout this disclosure) for monitoring at least one of a set of assets 4918 and a set of collateral 4802 for a loan, a bond, or a debt transaction. The platform 4800 may include a guarantee and/or security monitoring solution 4930 for monitoring assets 4918 and/or collateral 4802 based on the data collected by the IoT data collection platform 4908, such as where the guarantee and/or security monitoring solution 4930 uses various adaptive intelligent systems 3304, such as ones that may use model (which may be adjusted, reinforced, trained, or the like, such as using artificial intelligence 3448) that determine the condition or value of items based on images, sensor data, location data, or other data of the type collected by the IoT data collection platform 4908. Monitoring may include monitoring of location of collateral 4802 or assets 4918, behavior of parties 4910, financial condition of parties 4910, or the like. The guarantee and/or security monitoring solution 4930 may include a set of interfaces by which a user may configure parameters for monitoring, such as rules or thresholds regarding conditions, behaviors, attributes, financial values, locations, or the like, in order to obtain alerts regarding collateral 4802 or assets 4918. For example, a user may set a rule that collateral must remain in a given jurisdiction, a threshold value of the collateral as a percentage of a loan balance, a minimum status condition (e.g., freedom from damage or defects), or the like. Configured parameters may be used to provide alerts to personnel responsible for monitoring loan compliance and/or used or embodied into one or more smart contract contracts that may take input from the interface of the guarantee and/or security monitoring solution 4930 to configure conditions for foreclosure, conditions for changing interest rates, conditions for accelerating payments, or the like. The platform 4800 may have a loan management solution 4948 that allows a loan manager to access information from the IoT data collection system 4908 and/or the guarantee and/or security monitoring solution 4930, such that a user may manage various actions with respect to a loan (of the many types describe herein, such as setting interest rates, foreclosing, sending notices, and the like) based on the condition of collateral 4802 or assets

4918, based on events involving entities 3330, based on behaviors, based on loan-related actions (such as payments) and other factors. The loan management solution 4948 may include a set of interfaces, workflows, models (including adaptive intelligent systems 3304) that are configured for a particular type of loan (of the many types described herein) and that allow a user to configure parameters, set rules, set thresholds, design workflows, configure smart contract services, configure blockchain services, and the like in order to facilitate automated or assisted management of a loan, such as enabling automated handing of loan actions by a smart contract in response to collected data from the IoT data collection system 4908 or enabling generation of a set of recommended actions for a human user based on that data.

In embodiments, a lending platform is provided having a smart contract and distributed ledger platform for managing at least one of ownership of a set of collateral and a set of events related to a set of collateral. A set of smart contract services 3431 may, for example, transfer ownership of the collateral 4802 or other assets 4918 upon recognition of an event of failure to make payment or other default, occurrence of a foreclosure condition (such as failure to satisfy with a covenant or failure to comply with an obligation), or the like, where the ownership transfer and related events are recorded by the set of blockchain services 3422 in a distributed ledger, such as one that provides a secure record of title to the assets 4918 or collateral 4802. As an example, a covenant of a loan embodied in a smart contract may require that collateral 4802 have a value that exceeds a minimum fraction (or multiple) of the remaining balance of a loan. Based on data collected about the value of collateral (such as by monitoring one or more external marketplaces 3390 or marketplaces of the platform 4800), a smart contract may calculate whether the covenant is satisfied and record the outcome on a blockchain. If the covenant is not satisfied, such as if market factors indicate that the type of collateral has diminished, while the loan balance remains high, the smart contract may initiate a foreclosure, including recording an ownership transfer on a distributed ledger via the blockchain services 3422. A smart contract may also process events related to an entity 3330 such as a party 4910. For example, a covenant of a loan may require the party to maintain a level of debt below a threshold or ratio, to maintain a level of income, to maintain a level of profit, or the like. The monitoring systems 3306 or data collection systems 3318 may provide data used by the smart contract services 3431 to determine covenant compliance and to enable automated action, including recording events like foreclosure and ownership transfers on a distributed ledger. In another example, a covenant may relate to a behavior of a party 4910 or a legal status of a party 4910, such as requiring the party to refrain from taking a particular action with respect to an item of property. For example, a covenant may require a party to comply with zoning regulations that prohibit certain usage of real property. IoT data collection systems 4908 may be used to monitor the party 4910, the property, or other items to confirm compliance with the covenant or to trigger alerts or automated actions in cases of non-compliance.

Figure 52:
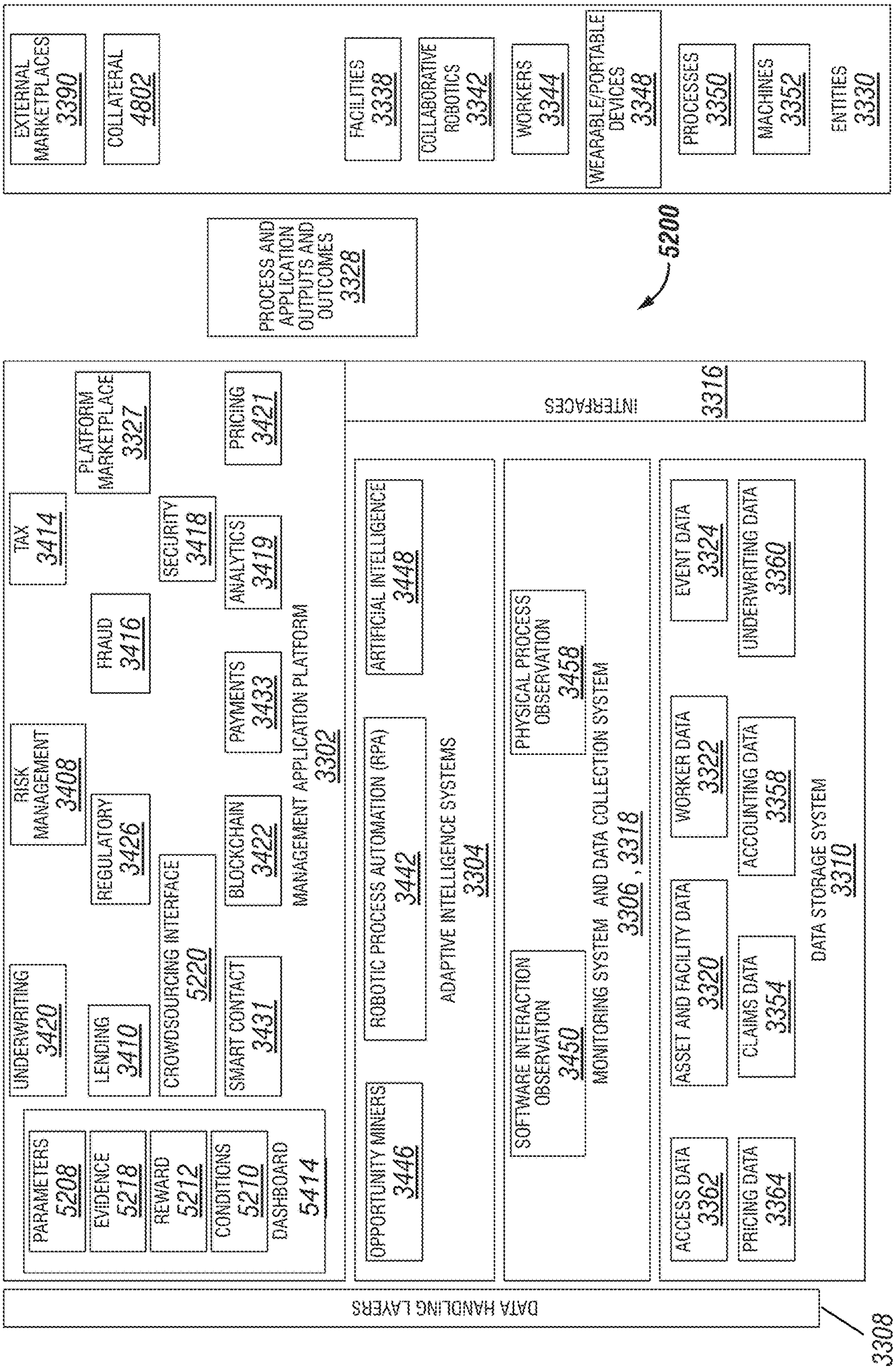
FIG. 52 depicts components and interactions of a lending platform having a crowdsourcing system for collecting information related to entities involved in a lending transaction.

Referring to FIG. 52, in embodiments a lending platform is provided having a crowdsourcing system for obtaining information about at least one of a state of a set of collateral for a loan and a state of an entity relevant to a guarantee for a loan. Thus, in embodiments, a platform is provided herein, with systems, methods, processes, services, components and other elements for enabling a blockchain and smart contract platform 5200 for crowdsourcing information relevant to lending. As with other embodiments described above in connection with sourcing innovation, product demand, or the like, a blockchain 3422, such as optionally embodying a distributed ledger, may be configured with a set of smart contracts 3431 to administer a reward 5212 for the submission of loan information 5218, such as evidence of ownership of property, evidence of title, information about ownership of collateral, information about condition of collateral, information about the location of collateral, information about a party's identity, information about a party's creditworthiness, information about a party's activities or behavior, information about a party's business practices, information about the status of performance of a contract, information about accounts receivable, information about accounts payable, information about the value of collateral, and many other types of information. In embodiments, a blockchain 3422, such as optionally distributed in a distributed ledger, may be used to configure a request for information 5218 along with terms and conditions 5210 related to the information, such as a reward 5212 for submission of the information 5218, a set of terms and conditions 5210 related to the use of the information 5218), and various parameters 5208, such as timing parameters, the nature of the information required (such as independently validated information like title records, video footage, photographs, witnessed statements, or the like), and other parameters 5208.

The platform 5200 may include a crowdsourcing interface 5220, which may be included in or provided in coordination with a website, application, dashboard, communications system (such as for sending emails, texts, voice messages, advertisements, broadcast messages, or other messages), by which a message may be presented in the interface 5220 or sent to relevant individuals (whether targeted, such as in the case of a request to a particular individual, or broadcast, such as to individuals in a given location, company, organization, or the like) with an appropriate link to the smart contract 3431 and associated blockchain 3422, such that a reply message submitting information 5218, with relevant attachments, links, or other information, can be automatically associated (such as via an API or data integration system) with the blockchain 3422, such that the blockchain 3422, and any optionally associated distributed ledger, maintains a secure, definitive record of information 5218 submitted in response to the request. Where a reward 5212 is offered, the blockchain 3422 and/or smart contract 3431 may be used to record time of submission, the nature of the submission, and the party submitting, such that at such time as a submission satisfies the conditions for a reward 5212 (such as, for example, upon completion of a loan transaction in which the information 5218 was useful), the blockchain 3422 and any distributed ledger stored thereby can be used to identify the submitter and, by execution of the smart contract 3431, convey the reward 5212 (which may take any of the forms of consideration noted throughout this disclosure. In embodiments, the blockchain 3422 and any associated ledger may include identifying information for submissions of information 5218 without containing actual information 5218, such that information may be maintained secret (such as being encrypted or being stored separately with only identifying information), subject to satisfying or verifying conditions for access (such as identification or verification of a person who has legitimate access rights, such as by an identity or security application 3418). Rewards 5212 may be provided based on outcomes of cases or situations to which information 5218 relates, based on a set of rules (which may be automatically applied in some cases, such as using a smart contract 3431 in concert with an automation system, a rule processing system, an artificial intelligence system 3448 or other expert system, which in embodiments may comprise one that is trained on a training data set created with human experts. For example, a machine vision system may be used to evaluate evidence of the existence and/or condition of collateral based on images of items, and parties submitting information about collateral may be rewarded, such as via tokens or other consideration, via distribution of rewards 5212 through the smart contract 3431, blockchain 3422 and any distributed ledger. Thus, the platform 5200 may be used for a wide variety of fact-gathering and information-gathering purposes, to facilitate validation of collateral, to validate representations about behavior, to validate occurrence of conditions of compliance, to validate occurrence of conditions of default, to deter improper behavior or misrepresentations, to reduce uncertainty, to reduce asymmetries of information, or the like.

In embodiments, information may relate to fact-gathering or data-gathering for a variety of applications and solutions that may be supported by a marketplace platform 3300, including the crowdsourcing platform 5200, such as for underwriting 3420 (e.g., of various types of loans, guarantees, and other items), risk management solutions 3408 (such as managing a wide variety of risks noted throughout this disclosure, such as risks associated with individual loans, packages of loans, tranches of loans and the like); lending solutions 3410 (such as evidence of the ownership and or value of collateral, evidence of the veracity of representations, evidence of performance or compliance with loan covenants, and the like); regulatory solutions 3426 (such as with respect to compliance with a wide range of regulations that may govern entities 3330 and processes, behaviors or activities of or by entities 3330); and fraud prevention solutions 3416 (such as to detect fraud, misrepresentation, improper behavior, libel, slander, and the like). For example, a capital loan for a building may include a covenant regarding the use of the property, such as permitting certain uses and prohibiting others, permitting a given occupancy, or the like, and the crowdsourcing platform 5200 may solicit and provide consideration for compliance information about the building (e.g., requesting confirmation from the crowd that a building is in fact being used for its intended use as permitted by zone regulations). Crowdsourced information may be combined with information from monitoring systems 3306. In embodiments, an adaptive intelligent system 3304 may, for example, continuously monitor a property, an item of collateral 4802 or other entity 3330 and, upon recognition (such as by an AI system, such as a neural network classifier) of a suspicious event (e.g., one that may indicate violation of a loan covenant), the adaptive intelligent system 3304 may provide a signal to the crowdsourcing system 5220 indicating that a crowdsourcing process should be initiated to verify the presence or absence of the violation. In embodiments, this may include classifying the covenant-related condition that using a machine classifier, providing the classification along with identifying data about an entity, and automatically configuring, such as based on a model or set of rules, a crowdsource request that identifies what information is requested about what entity 3330 and what reward 5212 is provided. In embodiment, rewards 5212 may be configured by experts, rewards 5212 may be based on a set of rules (such as ones that operate on parameters of the loan, the terms and conditions of a covenant n a smart contract 3431 (such as loan value, remaining term, and the like), the value of collateral 4802, or the like), and/or reward 5212 may be set by robotic process automation 3442, such as where an RPA system 3442 is trained on a training set of expert activities in setting rewards in various contexts that collectively show what rewards are appropriate in given situations. Robotic process automation 3442 of reward configuration may be continuously improved by artificial intelligence 3448, such as based on a continuous feedback of outcomes of crowdsourcing, such as outcomes of success (e.g., verification of covenant defaults, yield outcomes, and the like).

Information gathering may include information gathering with respect to entities 3330 and their identities, assertions, claims, actions or behaviors, among many other factors and may be accomplished by crowdsourcing in the platform 5200 or by data collection systems 3318 and monitoring systems 3306, optionally with automation via process automation 3442 and adaptive intelligence, such as using an artificial intelligence system 3448.

Figure 53:
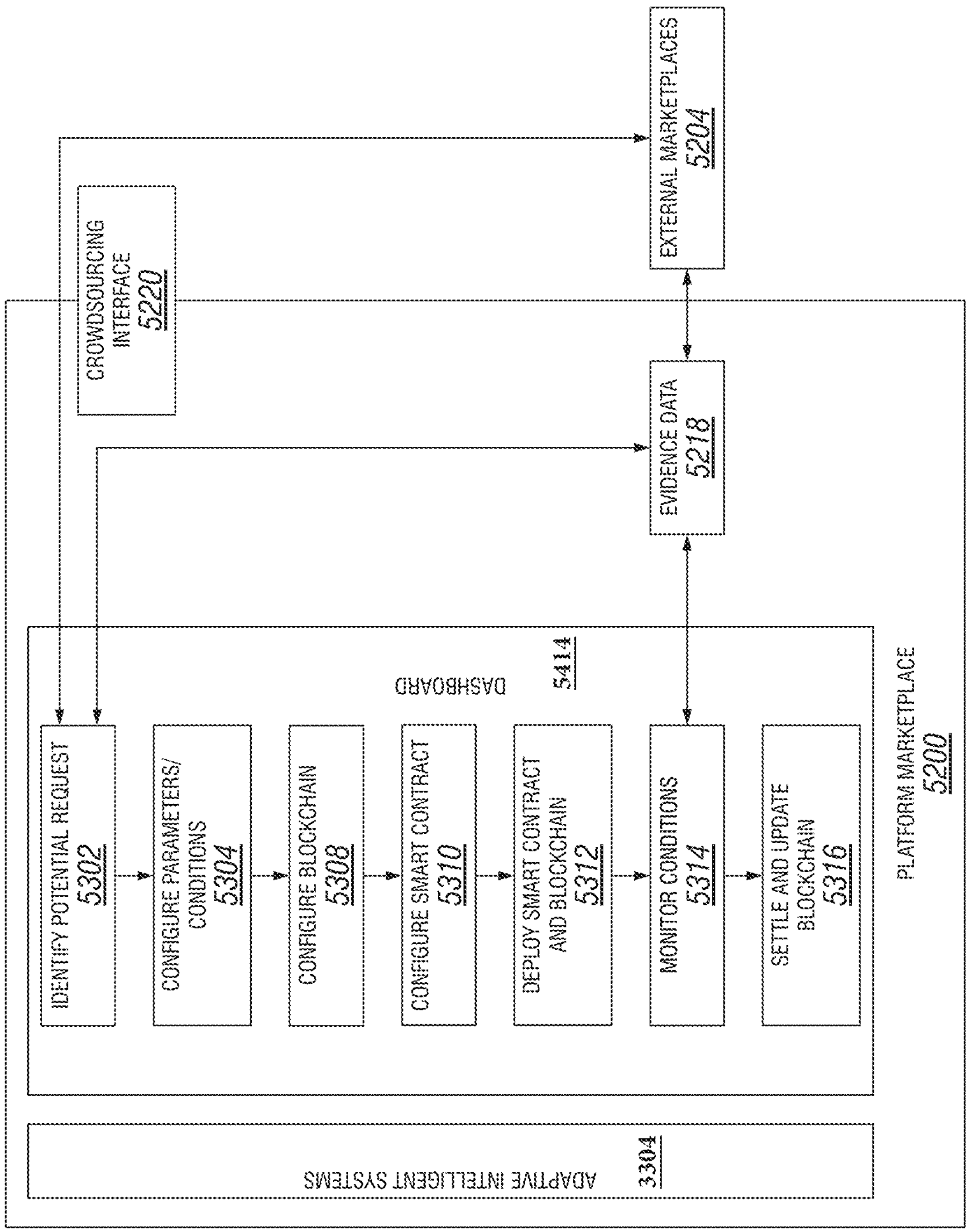
FIG. 53 depicts an embodiment of a crowdsourcing workflow enabled by a lending platform.

Referring to FIG. 53, a platform-operated marketplace crowdsourcing evidence 5200 may be configured, such as in a crowdsourcing interface 5220 or other user interface for an operator of the platform-operated marketplace 5200, using the various enabling capabilities of the data handling platform 3300 described throughout this disclosure. The operator may use the user interface or crowdsourcing dashboard 5414 to undertake a series of steps to perform or undertake an algorithm to create a crowdsourcing request for information 5218 as described in connection with FIG. 52. In embodiments, one or more of the steps of the algorithm to create a reward 5212 within the dashboard 5414 may include, at a component 5302, identifying potential rewards 5312, such as what information 5218 is likely to be of value in a given situation (such as may be indicated through various communication channels by stakeholders or representatives of an entity, such as an individual or enterprise, such as attorneys, agents, investigators, parties, auditors, detectives, underwriters, inspectors, and many others).

The dashboard 5414 may be configured with a crowdsourcing interface 5220, such as with elements (including application programming elements, data integration elements, messaging elements, and the like) that allow a crowdsourcing request to be managed in the platform marketplace 5200 and/or in one or more external marketplaces 5204. In the dashboard 5414, at a component 5304 the user may configure one or more parameters 5208 or conditions 5210, such as comprising or describing the conditions (of the type described herein) for the crowdsourcing request, such as by defining a set of conditions 5210 that trigger the reward 5212 and determine allocation of the reward 5212 to a set of submitters of information 5218. The user interface of the dashboard 5414, which may include or be associated with the crowdsourcing interface 5220, may include a set of drop down menus, tables, forms, or the like with default, templated, recommended, or pre-configured conditions, parameters 5208, conditions 5210 and the like, such as ones that are appropriate for various types of crowdsourcing requests. Once the conditions and other parameters of the request are configured, at a component 5308 a smart contract 3431 and blockchain 3422 may be configured to maintain, such as via a ledger, the data required to provision, allocate, and exchange data related to the request and to submissions of information 5218. The smart contract 3431 and blockchain 3422 may be configured to identity information, transaction information (such as for exchanges of information), technical information, other evidence data 5218 of the type described in connection with FIG. 52, including any data, testimony, photo or video content or other information that may be relevant to a submission of information 5218 or the conditions 5210 for a reward 5212. At a component 5310 a smart contract 3431 may be configured to embody the conditions 5210 that were configured at the component 5304 and to operate on the blockchain 3422 that was created at the component 5308, as well as to operate on other data, such as data indicating facts, conditions, events, or the like in the platform-operated marketplace 5200 and/or an external marketplace 5204 or other information site or resource, such as ones related to submission data 5218, such as sites indicating outcomes of legal cases or portions of cases, sites reporting on investigations, and the like. The smart contract 3431 may be responsive to the configuration from component 5310 to apply one or more rules, execute one or more conditional operations, or the like upon data, such as evidence data 5218 and data indicating satisfaction of parameters 5208 or conditions 5210, as well as identity data, transactional data, timing data, and other data. Once configuration of one or more blockchains 3422 and one or more smart contracts 3431 is complete, at a component 5312 the blockchain 3422 and smart contract 3431 may be deployed in the platform-operated marketplace 5200, external marketplace 5204 or other site or environment, such as for interaction by one or more submitters or other users, who may, such as in a crowdsourcing interface 5220, such as a website, application, or the like, enter into the smart contract 3431, such as by submitting a submission of information 5218 and requesting the reward 5212, at which point the platform 5200, such as using the adaptive intelligent systems 3304 or other capabilities, may store relevant data, such as submission data 5218, identity data for the party or parties entering the smart contract 3431 on the blockchain 3422 or otherwise on the platform 5200. At a component 5314, once the smart contract 3431 is executed, the platform 5200 may monitor, such as by the monitoring systems layer 3306, the platform-operated marketplace 5200 and/or one or more external marketplaces 5204 or other sites for submission data 5218, event data 3324, or other data that may satisfy or indicate satisfaction of one or more conditions 5210 or trigger application of one or more rules of the smart contract 3431, such as to trigger a reward 5212.

At a component 5316, upon satisfaction of conditions 5210, smart contracts 3431 may be settled, executed, or the like, resulting updates or other operations on the blockchain 3422, such as by transferring consideration (such as via a payments system) and transferring access to information 5218. Thus, via the above-referenced steps, an operator of the platform-operated marketplace 5200 may discover, configure, deploy and have executed a set of smart contracts 3431 that crowdsource information relevant to a loan (such as information about value or condition of collateral 4802, compliance with covenants, fraud or misrepresentation, and the like) and that are cryptographically secured and transferred on a blockchain 3422 from information gatherers to parties seeking information. In embodiments, the adaptive intelligent systems layer 3304 may be used to monitor the steps of the algorithm described above, and one or more artificial intelligence systems may be used to automate, such as by robotic process automation 3442, the entire process or one or more sub-steps or sub-algorithms. This may occur as described above, such as by having an artificial intelligence system 3448 learn on a training set of data resulting from observations, such as monitoring software interactions of human users as they undertake the above-referenced steps. Once trained, the adaptive intelligence layer 3304 may thus enable the platform 3300 to provide a fully automated platform for crowdsourcing of loan information.

Figure 54:
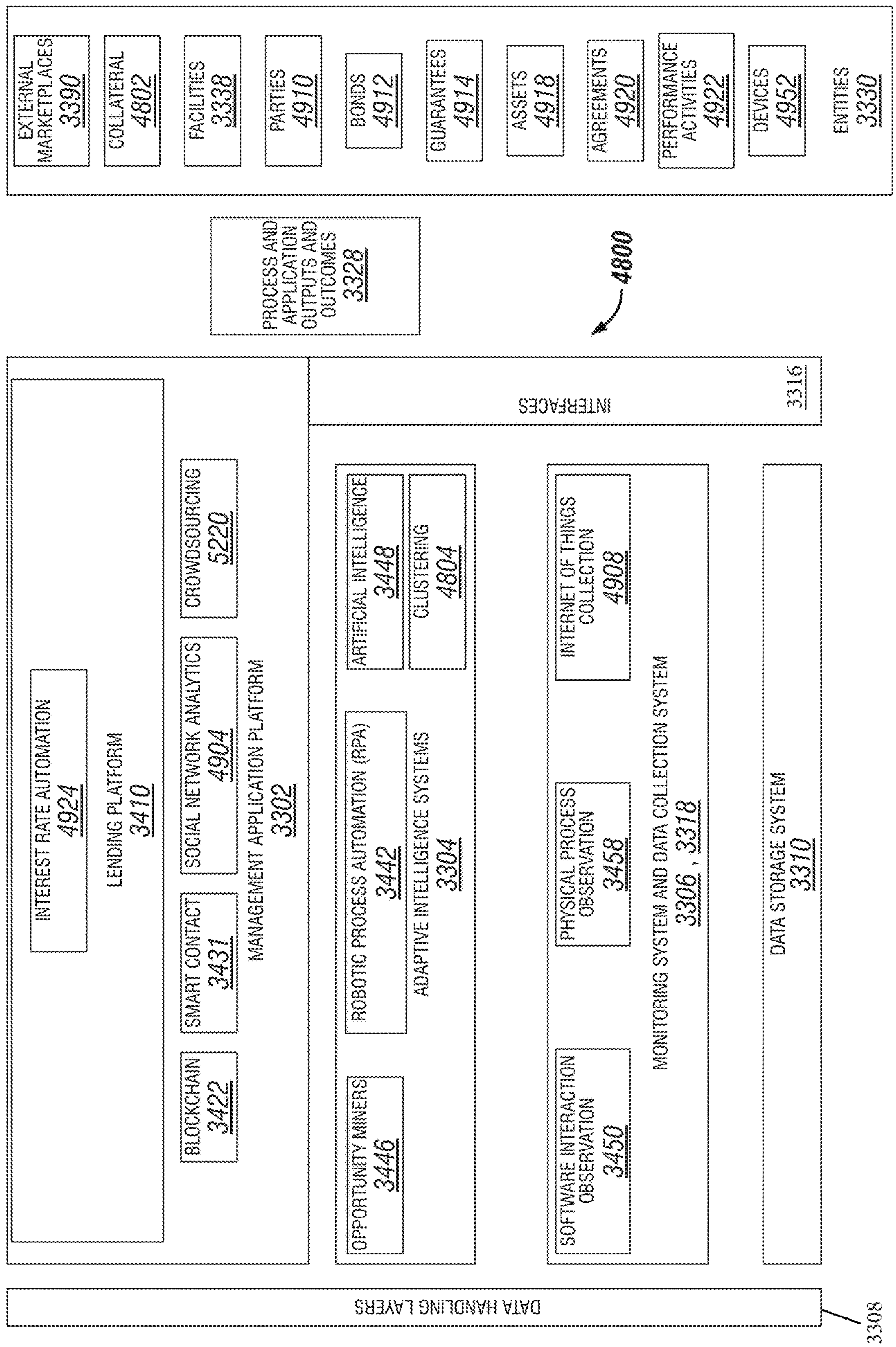
FIG. 54 depicts components and interactions of an embodiment of a lending platform having a smart contract system that automatically adjusts an interest rate for a loan based on information collected via at least one of an Internet of Things system, a crowdsourcing system, a set of social network analytic services and a set of data collection and monitoring services.

Referring to FIG. 54, in embodiments a lending platform is provided having a smart contract system 3431 that automatically adjusts an interest rate for a loan based on information collected via at least one of an Internet of Things system, a crowdsourcing system, a set of social network analytic services and a set of data collection and monitoring services. The platform 4800 may include an interest rate automation solution 4924 that may include a set of interfaces, workflows, and models (which may include, use or be enabled by various adaptive intelligent systems 3304) and other components that are configured to enable automation of the setting of interest rates based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the interest rate automation solution 4924 may set (such as in a user interface) rules, thresholds, model parameters, and the like that determine, or recommend, an interest rate for a loan based on the above, such as based on interest rates available to the lender from secondary lenders, risk factors of the borrower (including predicted risk based on one or more predictive models using artificial intelligence 3448), or the system may automatically recommend or set such rules, thresholds, parameters and the like (optionally by learning to do so based on a training set of outcomes over time). Interest rates may be determined based on marketing factors (such as competing interest rates offered by other lenders). Interest rates may be calculated for new loans, for modifications of existing loans, for refinancing, for foreclosure situations (e.g., changing from secured loan rates to unsecured loan rates), and the like.

Figure 55:
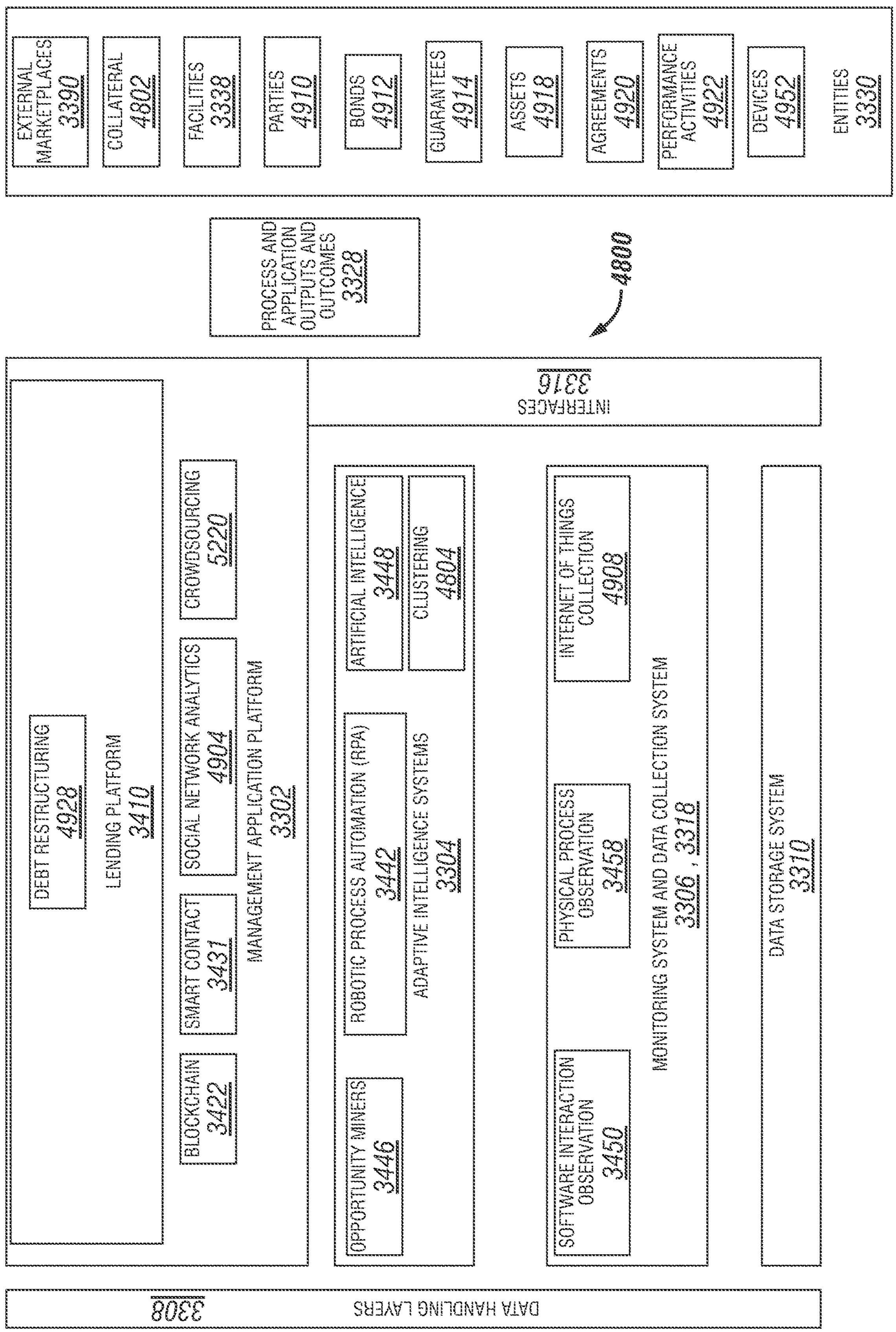
FIG. 55 depicts components and interactions of an embodiment of a lending platform having a smart contract that automatically restructures debt based on a monitored condition.

Smart Contract that Automatically Restructures Debt Based on a Monitored Condition Referring to FIG. 55, in embodiments a lending platform is provided having a smart contract that automatically restructures debt based on a monitored condition. The platform 4800 may include a debt restructuring solution 4928 that may include a set of interfaces, workflows, and models (which may include, use or be enabled by various adaptive intelligent systems 3304) and other components that are configured to enable automation of the restructuring of debt based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the debt restructuring solution 4928 may create, configure (such as using one or more templates or libraries), modify, set or otherwise handle (such as in a user interface of the debt restructuring solution 4928) various rules, thresholds, procedures, workflows, model parameters, and the like that determine, or recommend, a debt restructuring action for a loan based on one or more events, conditions, states, actions, or the like, where restructuring may be based on various factors, such as prevailing market interest rates, interest rates available to the lender from secondary lenders, risk factors of the borrower (including predicted risk based on one or more predictive models using artificial intelligence 3448), status of other debt (such as new debt of a borrower, elimination of debt of a borrower, or the like), condition of collateral 4802 or assets 4918 used to secure or back a loan, state of a business or business operation (e.g., receivables, payables, or the like), and many others. Restructuring may include changes in interest rate, changes in priority of secured parties, changes in collateral 4802 or assets 4918 used to back or secure debt, changes in parties, changes in guarantors, changes in payment schedule, changes in principal balance (e.g., including forgiveness or acceleration of payments), and others. In embodiments, the debt restructuring solution 4928 may automatically recommend or set such rules, thresholds, actions, parameters and the like (optionally by learning to do so based on a training set of outcomes over time), resulting in a recommended restructuring plan, which may specify a series of actions required to accomplish a recommended restructuring, which may be automated and may involve conditional execution of steps based on monitored conditions and/or smart contract terms, which may be created, configured, and/or accounted for by the debt restructuring plan.

Restructuring plans may be determined and executed based at least one part on market factors (such as competing interest rates offered by other lenders, values of collateral, and the like) as well as regulatory and/or compliance factors. Restructuring plans may be generated and/or executed for modifications of existing loans, for refinancing, for foreclosure situations (e.g., changing from secured loan rates to unsecured loan rates), for bankruptcy or insolvency situations, for situations involving market changes (e.g., changes in prevailing interest rates) and others. In embodiments, adaptive intelligent systems 3304, including artificial intelligence 3448 may be trained on a training set of restructuring activities by experts and/or on outcomes of restructuring actions to generate a set of predictions, classifications, control instructions, plans, models, or the like for automated creation, management and/or execution of one or more aspects of a restructuring plan. In embodiments, provided herein is a smart contract system for modifying a loan, the system having a set of computational services. An example platform or system includes (a) a set of data collection and monitoring services for monitoring a set of entities involved in a loan; and (b) a set of smart contract services for managing a smart lending contract, wherein the set of smart contract services processes information from the set of data collection and monitoring services and automatically restructures debt based on a monitored condition. Certain further aspects of an example system are described following, any one or more of which may be present in certain embodiments.

Figure 56:
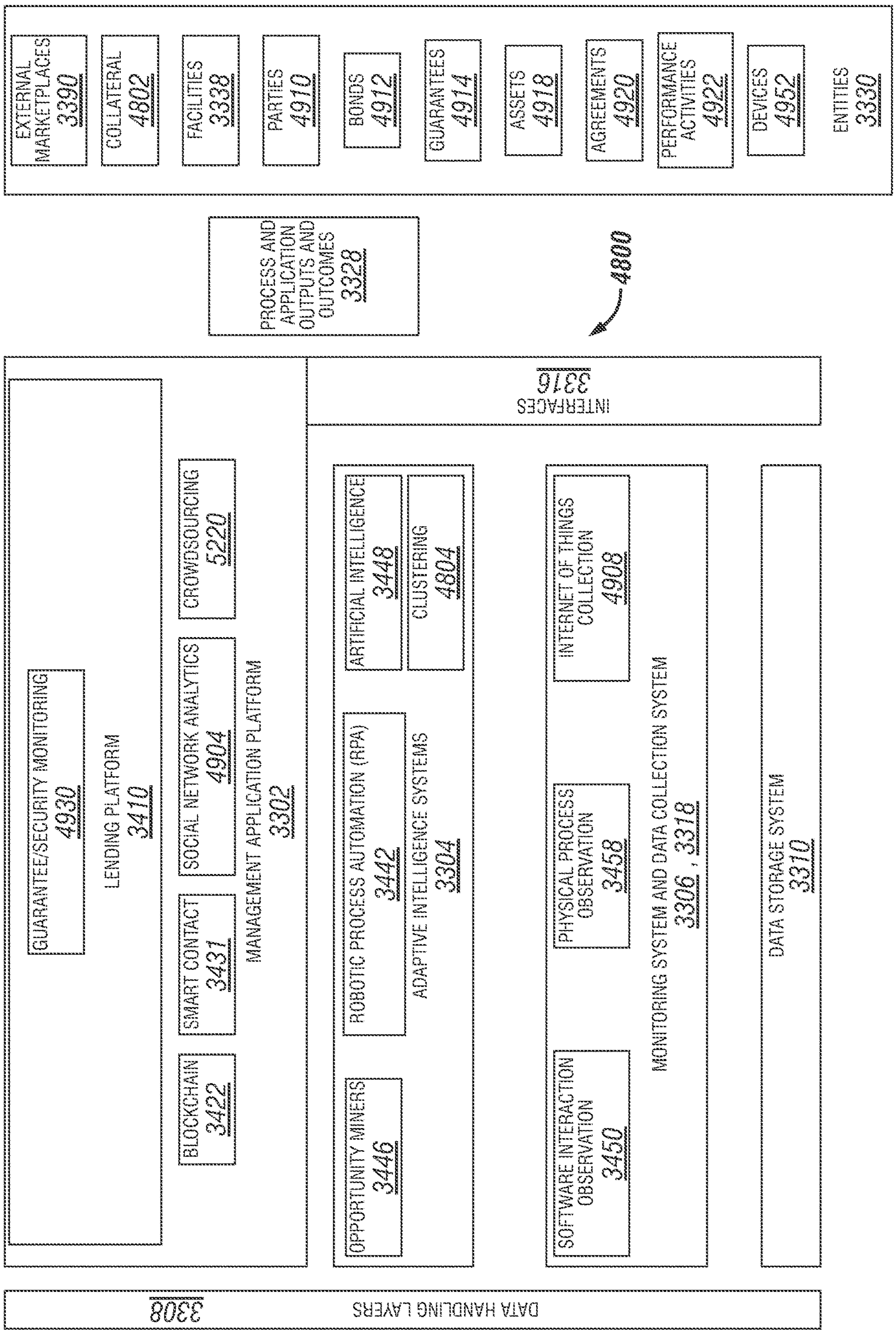
FIG. 56 depicts components and interactions of a lending platform having a set of data collection and monitoring systems for validating the reliability of a guarantee for a loan, including an Internet of Things system and a social network analytics system.

Referring to FIG. 56, in embodiments a lending platform 4800 is provided having a social network monitoring system 4904 for validating the reliability of a guarantee for a loan. The platform 4800 may include a guarantee and/or security monitoring solution 4930 that may include a set of interfaces, workflows, and models (which may include, use or be enabled by various adaptive intelligent systems 3304) and other components that are configured to enable monitoring of a guarantee and/or security for a lending transaction based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the guarantee and/or security monitoring solution 4930 may set (such as in a user interface) rules, thresholds, model parameters, and the like that determine, or recommend, a monitoring plan for lending transaction such as based on risk factors of the borrower, risk factors of the lender, market risk factors, and/or risk factors of collateral 4802 or assets 4918 (including predicted risk based on one or more predictive models using artificial intelligence 3448), or the platform 4800 may automatically recommend or set such rules, thresholds, parameters and the like (optionally by learning to do so based on a training set of outcomes over time). The guarantee and/or security monitoring solution 4930 may configure a set of social network analytics services 4904 and/or other monitoring systems 3306 and/or data collection systems 3318 to search, parse, extract, and process data from one or more social networks, website, or the like, such as ones that may contain information about collateral 4802 or assets 4918 (e.g., photos that show a vehicle, boat, or other personal property of a party 4910, photos of a home or other real property, photos or text that describes activities of a party 4910 (including ones that indicate financial risk, physical risk, health risk, or other risk that may be relevant to the quality of the guarantor and/or the guarantee for a payment obligation and/or the ability of the borrower to repay a loan when due). For example a photo showing a borrower driving a regular passenger vehicle in off-road conditions may be flagged as indicating that the vehicle cannot be fully relied upon as collateral for an automobile loan that has a high remaining balance.

Social Network Monitoring System for Validating Quality of a Personal Guarantee for a Loan Thus, in embodiments, provided herein is a social network monitoring system for validating conditions of a guarantee for a loan. An example platform or system includes (a) a set of social network data collection and monitoring services by which data is collected by a set of algorithms that are configured to monitor social network information about entities involved in a loan; and (b) an interface to the set of social networking services that enables configuration of parameters of the social network data collection and monitoring services to obtain information related to the condition of guarantee. Certain further aspects of an example system are described following, any one or more of which may be present in certain embodiments.

An example system includes where the set of social network data collection and monitoring services obtains information about the financial condition of an entity that is the guarantor for the loan.

An example system includes where the financial condition is determined at least in part based on information contained in a social network about the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the platform or system may further include an interface of the social network data collection and monitoring services An example system includes where the data collection and monitoring service is configured to obtain information about condition of a set of collateral for the loan, wherein the set of collateral items is selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where condition of collateral includes condition attributes selected from the group consisting of the quality of the collateral, the condition of the collateral, the status of title to the collateral, the status of possession of the collateral, the status of a lien on the collateral, a new or used status of item, a type of item, a category of item, a specification of an item, a product feature set of an item, a model of item, a brand of item, a manufacturer of item, a status of item, a context of item, a state of item, a value of item, a storage location of item, a geolocation of item, an age of item, a maintenance history of item, a usage history of item, an accident history of an item, a fault history of an item, an ownership of an item, an ownership history of an item, a price of a type of item, a value of a type of item, an assessment of an item, and a valuation of an item.

An example system includes where the interface is a graphical user interface configured to enable a workflow by which a human user enters parameters to establish the social network data collection and monitoring request.

An example system includes where the platform or system may further include a set of smart contract services that administer a smart lending contract, wherein the smart contract services process information from the set of social network data collection and monitoring services and automatically undertake an action related to the loan.

An example system includes where the action is at least one of a foreclosure action, a lien administration action, an interest-rate setting action, a default initiation action, a substitution of collateral, and a calling of the loan.

An example system includes where the platform or system may further include a robotic process automation system that is trained, based on a training set of interactions of human users with the interface to the set of social network data collection and monitoring services, to configure a data collection and monitoring action based on a set of attributes of a loan.

An example system includes where the attributes of the loan are obtained from a set of smart contract services that manage the loan.

An example system includes where the robotic process automation system is configured to be iteratively trained and improved based on a set of outcomes from a set of social network data collection and monitoring requests.

An example system includes where training includes training the robotic process automation system to determine a set of domains to which the social network data collection and monitoring services will applied.

An example system includes where training includes training the robotic process automation system to configure the content of a social network data collection and monitoring search.

IoT Data Collection and Monitoring System for Validating Quality of a Personal Guarantee for a Loan Referring still to FIG. 56, in embodiments a lending platform is provided having an Internet of Things data collection and monitoring system for validating reliability of a guarantee for a loan. The guarantee and/or security monitoring solution 4930 may include the capability to use data from, and configure collection activities by, a set of Internet of Things services 4908 (which may include various IoT devices, edge devices, edge computation and processing capabilities, and the like as described in connection with various embodiments), such as ones that monitor various entities 3330 and their environments involved in lending transactions.

In embodiments, provided herein is a monitoring system for validating conditions of a guarantee for a loan. For example, a set of algorithms may be configured to initiate data collection by IoT devices, to manage data collection, and the like such as based on the conditions referenced above, including conditions that relate to risk factors of the borrower or lender, market risk factors, physical risk factors, or the like. For example, an IoT system may be configured to capture video or images of a home during periods of bad weather, such as to determine whether the home is at risk of a flood, wind damage, or the like, in order to confirm whether the home can be predicted to serve as adequate collateral for a home loan, a line of credit, or other lending transaction.

An example platform or system includes (a) a set of Internet of Things data collection and monitoring services by which data is collected by a set of algorithms that are configured to monitor Internet of Things information collected from and about entities involved in a loan; and (b) an interface to the set of Internet of Things data collection and monitoring services that enables configuration of parameters of the social network data collection and monitoring services to obtain information related to the condition of guarantee. Certain further aspects of an example system are described following, any one or more of which may be present in certain embodiments.

An example system includes where the set of Internet of Things data collection and monitoring services obtains information about the financial condition of an entity that is the guarantor for the loan.

An example system includes where the financial condition is determined at least in part based on information collected by an Internet of Things device about the entity selected from among a publicly stated valuation of the entity, a set of property owned by the entity as indicated by public records, a valuation of a set of property owned by the entity, a bankruptcy condition of an entity, a foreclosure status of an entity, a contractual default status of an entity, a regulatory violation status of an entity, a criminal status of an entity, an export controls status of an entity, an embargo status of an entity, a tariff status of an entity, a tax status of an entity, a credit report of an entity, a credit rating of an entity, a website rating of an entity, a set of customer reviews for a product of an entity, a social network rating of an entity, a set of credentials of an entity, a set of referrals of an entity, a set of testimonials for an entity, a set of behavior of an entity, a location of an entity, and a geolocation of an entity.

An example system includes where the loan is of at least one type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the platform or system may further include an interface of the set of Internet of Things data collection and monitoring services. An example system includes where the set of data collection and monitoring services is configured to obtain information about condition of a set of collateral for the loan, wherein the set of collateral items is selected from among a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system includes where condition of collateral includes condition attributes selected from the group consisting of the quality of the collateral, the condition of the collateral, the status of title to the collateral, the status of possession of the collateral, the status of a lien on the collateral, a new or used status of item, a type of item, a category of item, a specification of an item, a product feature set of an item, a model of item, a brand of item, a manufacturer of item, a status of item, a context of item, a state of item, a value of item, a storage location of item, a geolocation of item, an age of item, a maintenance history of item, a usage history of item, an accident history of an item, a fault history of an item, an ownership of an item, an ownership history of an item, a price of a type of item, a value of a type of item, an assessment of an item, and a valuation of an item.

An example system includes where the interface is a graphical user interface configured to enable a workflow by which a human user enters parameters to establish an Internet of Things data collection and monitoring services monitoring action.

An example system includes where the platform or system may further include a set of smart contract services that administer a smart lending contract, wherein the set of smart contract services process information from the set of Internet of Things data collection and monitoring services and automatically undertakes an action related to the loan.

An example system includes where the action is at least one of a foreclosure action, a lien administration action, an interest-rate setting action, a default initiation action, a substitution of collateral, and a calling of the loan.

An example system includes where the platform or system may further include a robotic process automation system that is trained, based on a training set of interactions of human users with the interface to the set of Internet of Things data collection and monitoring services, to configure a data collection and monitoring action based on a set of attributes of a loan.

An example system includes where the attributes of the loan are obtained from a set of smart contract services that manage the loan.

An example system includes where the robotic process automation system is configured to be iteratively trained and improved based on a set of outcomes from a set of Internet of Things data collection and monitoring services activities.

An example system includes where training includes training the robotic process automation system to determine a set of domains to which the Internet of Things data collection and monitoring services will applied.

An example system includes where training includes training the robotic process automation system to configure the content of Internet of Things data collection and monitoring services activities.

Figure 57:
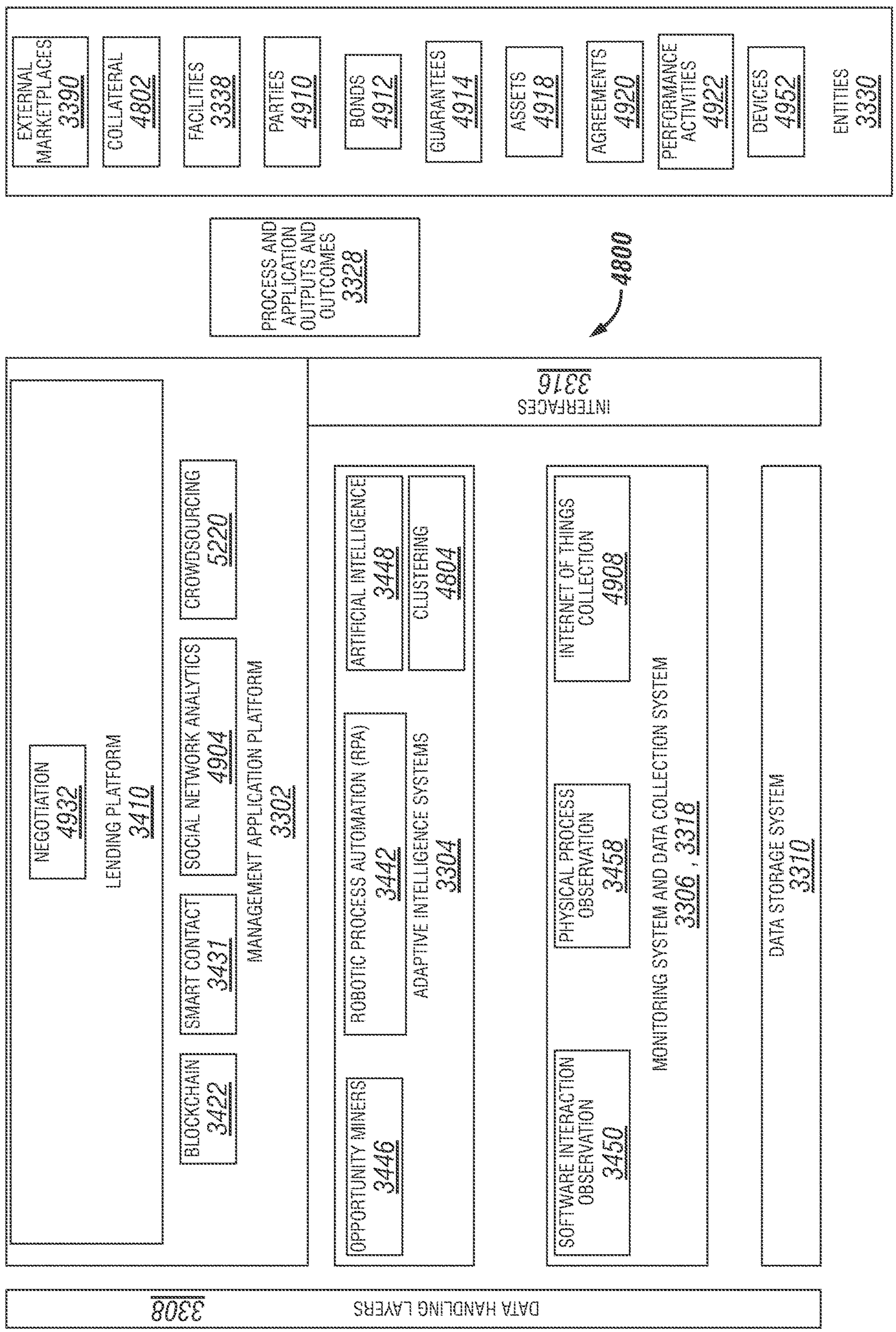
FIG. 57 depicts components and interactions of a lending platform having a robotic process automation system for negotiation of a set of terms and conditions for a loan.

An RPA Bank Loan Negotiator Trained on a Training Set of Expert Lender Interactions with Borrowers Referring to FIG. 57, in embodiments a lending platform is provided having a robotic process automation system 3442 for negotiation of a set of terms and conditions for a loan. The RPA system 3442 may provide automation for one or more aspects of a negotiation solution 4932 that enables automated negotiation and/or provides a recommendation or plan for a negotiation relevant to a lending transaction. The negotiation solution 4932 and/or RPA system 3442 for negotiation may include a set of interfaces, workflows, and models (which may include, use or be enabled by various adaptive intelligent systems 3304) and other components that are configured to enable automation of one or more aspects of a negotiation of one or more terms and conditions of a lending transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the negotiation solution 4932 may create, configure (such as using one or more templates or libraries), modify, set or otherwise handle (such as in a user interface of the negotiation solution 4932 and/or RPA system 3442) various rules, thresholds, conditional procedures, workflows, model parameters, and the like that determine, or recommend, a negotiation action or plan for a lending transaction negotiation based on one or more events, conditions, states, actions, or the like, where the negotiation plan may be based on various factors, such as prevailing market interest rates, interest rates available to the lender from secondary lenders, risk factors of the borrower, the lender, one or more guarantors, market risk factors and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating negotiation styles), and many others. Negotiation may include negotiation of lending transaction terms and conditions, debt restructuring, foreclosure activities, setting interest rates, changes in interest rate, changes in priority of secured parties, changes in collateral 4802 or assets 4918 used to back or secure debt, changes in parties, changes in guarantors, changes in payment schedule, changes in principal balance (e.g., including forgiveness or acceleration of payments), and many other transactions or terms and conditions. In embodiments, the negotiation solution 4932 may automatically recommend or set rules, thresholds, actions, parameters and the like (optionally by learning to do so based on a training set of outcomes over time), resulting in a recommended negotiation plan, which may specify a series of actions required to accomplish a recommended or desired outcome of negotiation (such as within a range of acceptable outcomes), which may be automated and may involve conditional execution of steps based on monitored conditions and/or smart contract terms, which may be created, configured, and/or accounted for by the negotiation plan. Negotiation plans may be determined and executed based at least one part on market factors (such as competing interest rates offered by other lenders, values of collateral, and the like) as well as regulatory and/or compliance factors. Negotiation plans may be generated and/or executed for creation of new loans, for creation of guarantees and security, for secondary loans, for modifications of existing loans, for refinancing, for foreclosure situations (e.g., changing from secured loan rates to unsecured loan rates), for bankruptcy or insolvency situations, for situations involving market changes (e.g., changes in prevailing interest rates) and others. In embodiments, adaptive intelligent systems 3304, including artificial intelligence 3448 may be trained on a training set of negotiation activities by experts and/or on outcomes of negotiation actions to generate a set of predictions, classifications, control instructions, plans, models, or the like for automated creation, management and/or execution of one or more aspects of a negotiation plan.

In embodiments, provided herein is a robotic process automation system for negotiating a loan. An example platform or system includes (a) a set of data collection and monitoring services for collecting a training set of interactions among entities for a set of loan transactions; (b) an artificial intelligence system that is trained on the training set of interactions to classify a set of loan negotiation actions; and (c) a robotic process automation system that is trained on a set of loan transaction interactions and a set of loan transaction outcomes to negotiate the terms and conditions of a loan on behalf of a party to a loan. Certain further aspects of an example system are described following, any one or more of which may be present in certain embodiments.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example system includes where the entities are a set of parties to a loan transaction.

An example system includes where the set of parties is selected from among a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of lending processes.

An example system includes where upon completion of negotiation a smart contract for a loan is automatically configured by a set of smart contract services based on the outcome of the negotiation.

An example system includes where at least one of an outcome and a negotiating event of the negotiation is recorded in a distributed ledger associated with the loan.

An example system includes where the loan is of a type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An RPA Bank Loan Refinancing Negotiator Trained on a Training Set of Expert Lender Re-financing Interactions with Borrowers In embodiments, provided herein is a robotic process automation system for negotiating refinancing of a loan. An example platform or system includes (a) a set of data collection and monitoring services for collecting a training set of interactions between entities for a set of loan refinancing activities; an artificial intelligence system that is trained on the training set of interactions to classify a set of loan refinancing actions; and (c) a robotic process automation system that is trained on a set of loan refinancing interactions and a set of loan refinancing outcomes to undertake a loan refinancing activity on behalf of a party to a loan. Certain further aspects of an example system are described following, any one or more of which may be present in certain embodiments.

An example system includes where the loan refinancing activity includes initiating an offer to refinance, initiating a request to refinance, configuring a refinancing interest rate, configuring a refinancing payment schedule, configuring a refinancing balance, configuring collateral for a refinancing, managing use of proceeds of a refinancing, removing or placing a lien associated with a refinancing, verifying title for a refinancing, managing an inspection process, populating an application, negotiating terms and conditions for a refinancing and closing a refinancing.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example system includes where the entities are a set of parties to a loan transaction.

An example system includes where the set of parties is selected from among a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of lending processes.

An example system includes where upon completion of a refinancing process a smart contract for a refinance loan is automatically configured by a set of smart contract services based on the outcome of the refinancing activity.

An example system includes where at least one of an outcome and an event of the refinancing is recorded in a distributed ledger associated with the refinancing loan.

An example system includes where the loan is of a type selected from among an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

Figure 58:
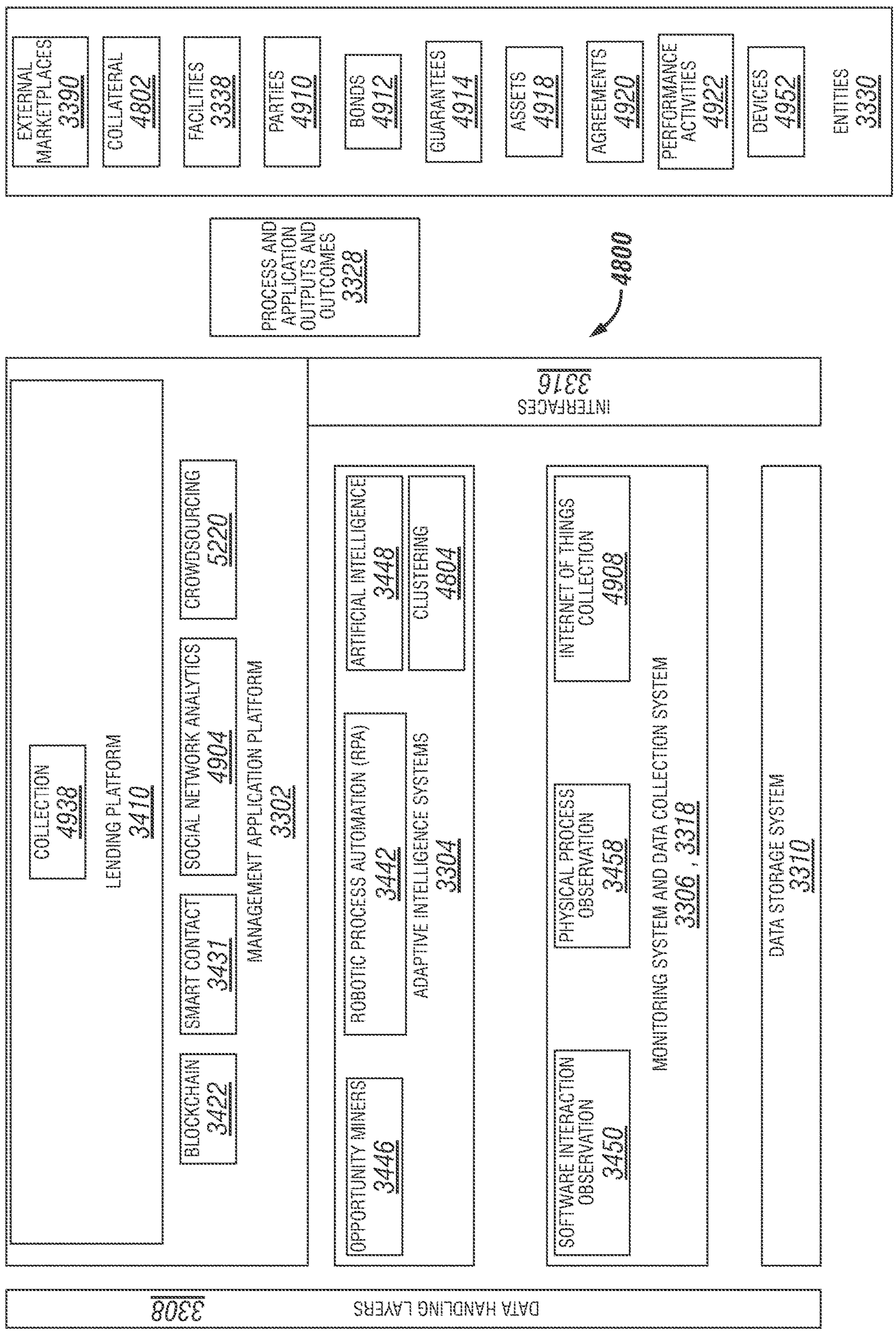
FIG. 58 depicts components and interactions of a lending platform having a robotic process automation system for loan collection.

An RPA Bank Loan Collector Trained on a Training Set of Expert Collection Interactions with Borrowers Referring to FIG. 58, in embodiments a lending platform is provided having a robotic process automation system for loan collection. The RPA system 3442 may provide automation for one or more aspects of a collection solution 4938 that enables automated collection and/or provides a recommendation or plan for a collection activity relevant to a lending transaction. The collection solution 4938 and/or RPA system 3442 for collection may include a set of interfaces, workflows, and models (which may include, use or be enabled by various adaptive intelligent systems 3304) and other components that are configured to enable automation of one or more aspects of a collection action of one or more terms and conditions of a collection process for a lending transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the collection solution 4938 may create, configure (such as using one or more templates or libraries), modify, set or otherwise handle (such as in a user interface of the collection solution 4938 and/or RPA system 3442) various rules, thresholds, conditional procedures, workflows, model parameters, and the like that determine, or recommend, a collection action or plan for a lending transaction or loan monitoring solution based on one or more events, conditions, states, actions, or the like, where the collection plan may be based on various factors, such as the status of payments, the status of the borrower, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating how borrowers respond to communication styles, communication cadence, and the like), and many others. Collection may include collection with respect to loans, communications to encourage payments, and the like. In embodiments, the collection solution 4938 may automatically recommend or set rules, thresholds, actions, parameters and the like (optionally by learning to do so based on a training set of outcomes over time), resulting in a recommended collection plan, which may specify a series of actions required to accomplish a recommended or desired outcome of collection (such as within a range of acceptable outcomes), which may be automated and may involve conditional execution of steps based on monitored conditions and/or smart contract terms, which may be created, configured, and/or accounted for by the collection plan. Collection plans may be determined and executed based at least one part on market factors (such as competing interest rates offered by other lenders, values of collateral, and the like) as well as regulatory and/or compliance factors. Collection plans may be generated and/or executed for creation of new loans, for secondary loans, for modifications of existing loans, for refinancing, for foreclosure situations (e.g., changing from secured loan rates to unsecured loan rates), for bankruptcy or insolvency situations, for situations involving market changes (e.g., changes in prevailing interest rates) and others. In embodiments, adaptive intelligent systems 3304, including artificial intelligence 3448 may be trained on a training set of collection activities by experts and/or on outcomes of collection actions to generate a set of predictions, classifications, control instructions, plans, models, or the like for automated creation, management and/or execution of one or more aspects of a collection plan.

In embodiments, provided herein is a robotic process automation system for handling collection of a loan. An example platform or system includes (a) a set of data collection and monitoring services for collecting a training set of interactions among entities for a set of loan transactions that involve collection of a set of payments for a set of loans; (b) an artificial intelligence system that is trained on the training set of interactions to classify a set of loan collection actions; and (c) a robotic process automation system that is trained on a set of loan transaction interactions and a set of loan collection outcomes to undertake a loan collection action on behalf of a party to a loan. Certain further aspects of an example system are described following, any one or more of which may be present in certain embodiments.

An example system includes where the loan collection action undertaken by the robotic process automation system is selected from among initiation of a collection process, referral of a loan to an agent for collection, configuration of a collection communication, scheduling of a collection communication, configuration of content for a collection communication, configuration of an offer to settle a loan, termination of a collection action, deferral of a collection action, configuration of an offer for an alternative payment schedule, initiation of a litigation, initiation of a foreclosure, initiation of a bankruptcy process, a repossession process, and placement of a lien on collateral.

Figure 59:
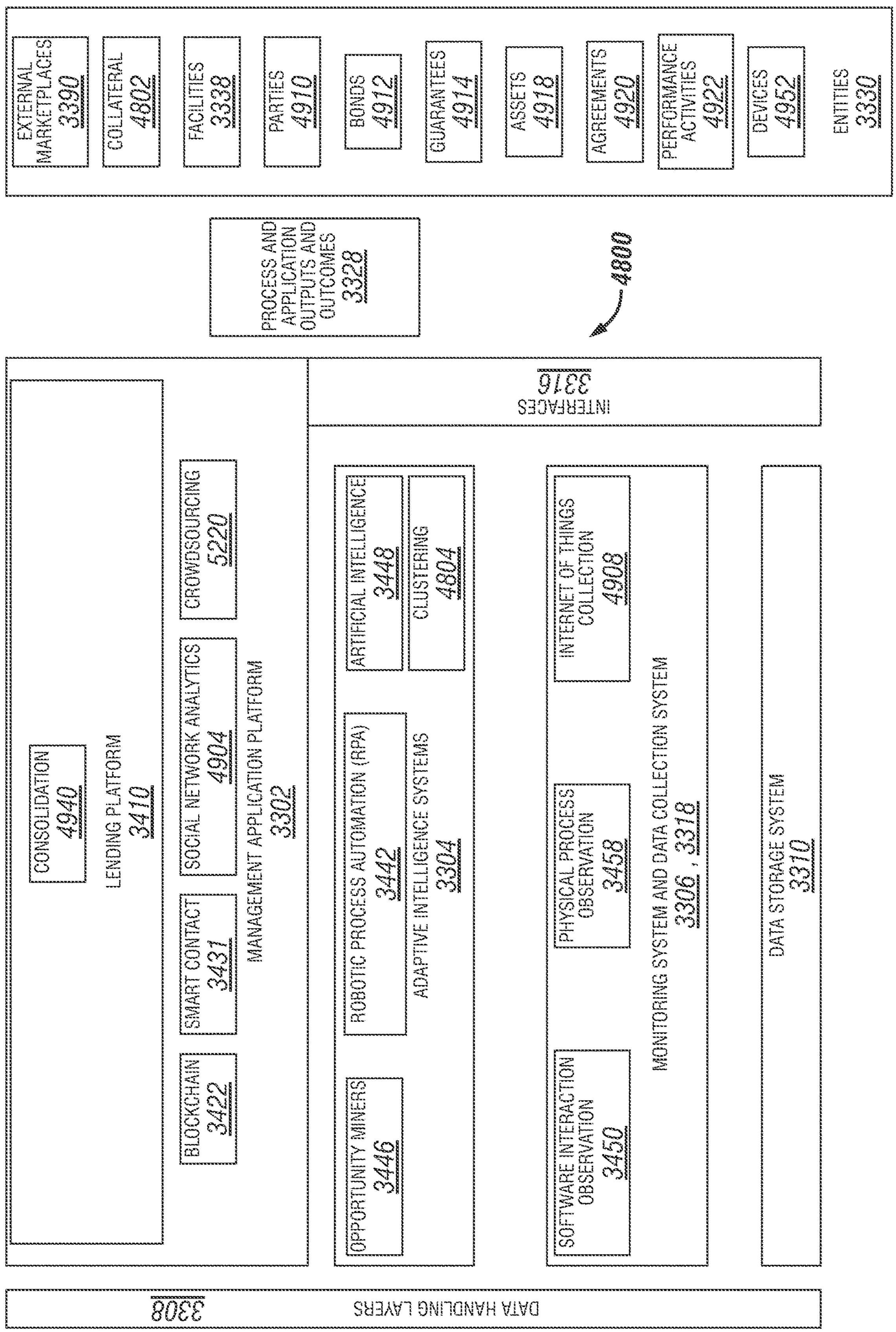
FIG. 59 depicts components and interactions of a lending platform having a robotic process automation system for consolidating a set of loans.

An RPA Bank Loan Consolidator Trained on a Training Set of Expert Consolidation Interactions with Other Lenders Referring to FIG. 59, in embodiments a lending platform is provided having a robotic process automation system for consolidating a set of loans. The RPA system 3442 may provide automation for one or more aspects of a consolidation solution 4940 that enables automated consolidation and/or provides a recommendation or plan for a consolidation activity relevant to a lending transaction. The consolidation solution 4940 and/or RPA system 3442 for consolidation may include a set of interfaces, workflows, and models (which may include, use or be enabled by various adaptive intelligent systems 3304) and other components that are configured to enable automation of one or more aspects of a consolidation action or a consolidation process for a lending transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others). For example, a user of the consolidation solution 4940 may create, configure (such as using one or more templates or libraries), modify, set or otherwise handle (such as in a user interface of the consolidation solution 4940 and/or RPA system 3442) various rules, thresholds, conditional procedures, workflows, model parameters, and the like that determine, or recommend, a consolidation action or plan for a lending transaction or a set of loans based on one or more events, conditions, states, actions, or the like, where the consolidation plan may be based on various factors, such as the status of payments, interest rates of the set of loans, prevailing interest rates in a platform marketplace or external marketplace, the status of the borrowers of a set of loans, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Consolidation may include consolidation with respect to terms and conditions of sets of loans, selection of appropriate loans, configuration of payment terms for consolidated loans, configuration of payoff plans for pre-existing loans, communications to encourage consolidation, and the like. In embodiments, the consolidation solution 4940 may automatically recommend or set rules, thresholds, actions, parameters and the like (optionally by learning to do so based on a training set of outcomes over time), resulting in a recommended consolidation plan, which may specify a series of actions required to accomplish a recommended or desired outcome of consolidation (such as within a range of acceptable outcomes), which may be automated and may involve conditional execution of steps based on monitored conditions and/or smart contract terms, which may be created, configured, and/or accounted for by the consolidation plan. Consolidation plans may be determined and executed based at least one part on market factors (such as competing interest rates offered by other lenders, values of collateral, and the like) as well as regulatory and/or compliance factors. Consolidation plans may be generated and/or executed for creation of new consolidated loans, for secondary loans related to consolidated loans, for modifications of existing loans related to consolidation, for refinancing terms of a consolidated loan, for foreclosure situations (e.g., changing from secured loan rates to unsecured loan rates), for bankruptcy or insolvency situations, for situations involving market changes (e.g., changes in prevailing interest rates) and others. In embodiments, adaptive intelligent systems 3304, including artificial intelligence 3448 may be trained on a training set of consolidation activities by experts and/or on outcomes of consolidation actions to generate a set of predictions, classifications, control instructions, plans, models, or the like for automated creation, management and/or execution of one or more aspects of a consolidation plan.

In embodiments, provided herein is a robotic process automation system for consolidating a set of loans. An example platform or system includes (a) a set of data collection and monitoring services for collecting information about a set of loans and for collecting a training set of interactions between entities for a set of loan consolidation transactions: (b) an artificial intelligence system that is trained on the training set of interactions to classify a set of loans as candidates for consolidation; and (c) a robotic process automation system that is trained on a set of loan consolidation interactions to manage consolidation of at least a subset of the set of loans on behalf of a party to the consolidation.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

Figure 60:
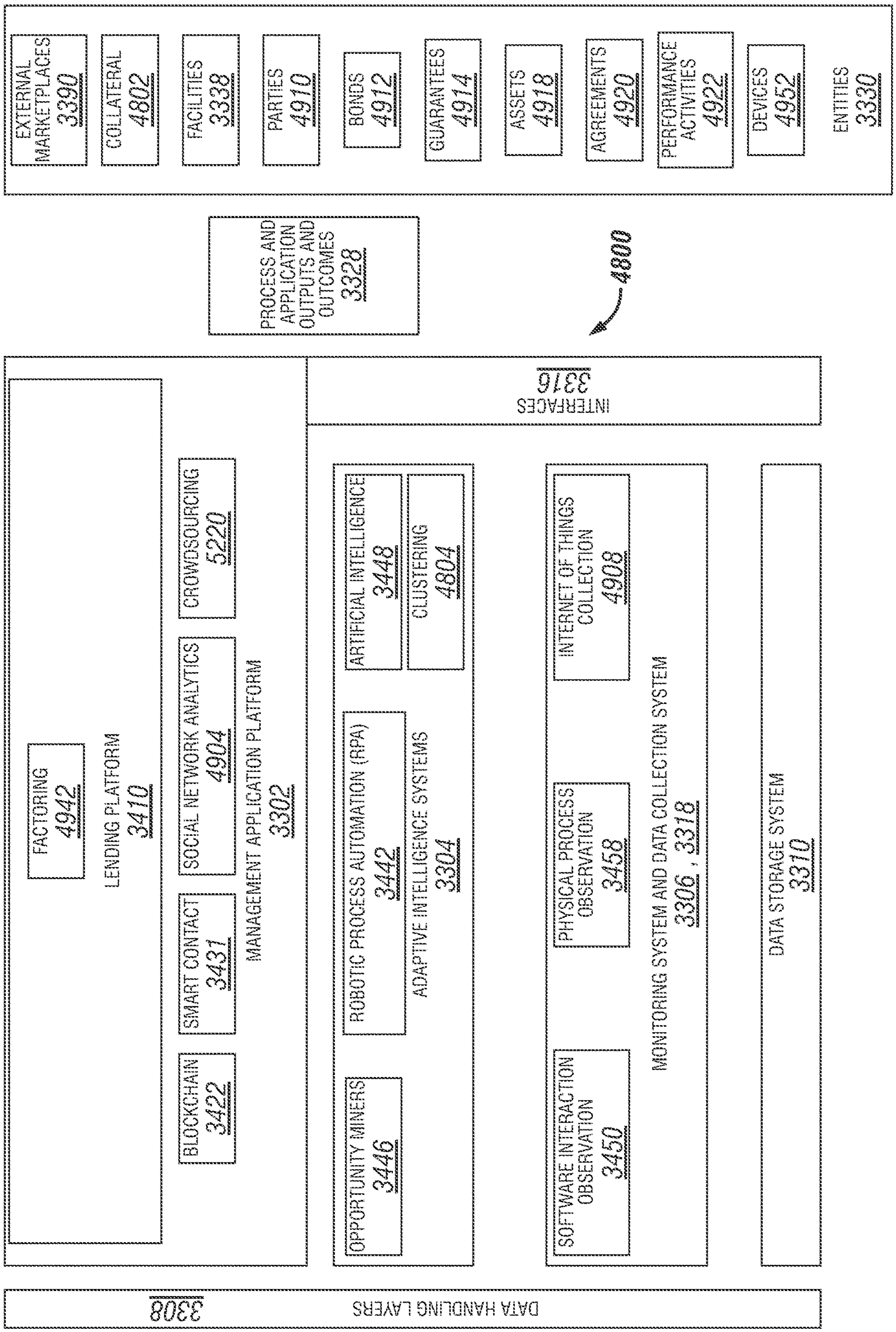
FIG. 60 depicts components and interactions of a lending platform having a robotic process automation system for managing a factoring loan.

An RPA Factoring Loan Negotiator Trained on a Training Set of Expert Factoring Interactions with Borrowers Referring to FIG. 60, in embodiments a lending platform is provided having a robotic process automation system for managing a factoring transaction. The RPA system 3442 may provide automation for one or more aspects of a factoring solution 4942 that enables automated factoring and/or provides a recommendation or plan for a factoring activity relevant to a lending transaction, such as one involving factoring of receivables. The factoring solution 4942 and/or RPA system 3442 for factoring may include a set of interfaces, workflows, and models (which may include, use or be enabled by various adaptive intelligent systems 3304) and other components that are configured to enable automation of one or more aspects of a factoring action of one or more terms and conditions of a factoring transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, accounts receivable, and inventory, among others). For example, a user of the factoring solution 4942 may create, configure (such as using one or more templates or libraries), modify, set or otherwise handle (such as in a user interface of the factoring solution 4942 and/or RPA system 3442) various rules, thresholds, conditional procedures, workflows, model parameters, and the like that determine, or recommend, a factoring action or plan for a factoring transaction or monitoring solution based on one or more events, conditions, states, actions, or the like, where the factoring plan may be based on various factors, such as the status of receivables, the status of work-in-progress, the status of inventory, the status of delivery and/or shipment, the status of payments, the status of the borrower, the status of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 used to secure or back a loan, state of a business or business operation (e.g., receivables, payables, or the like), conditions of parties 4910 (such as net worth, wealth, debt, location, and other conditions), behaviors of parties (such as behaviors indicating preferences, behaviors indicating negotiation styles, and the like), and many others. Factoring may include factoring with respect to loans, communications to encourage payments, and the like. In embodiments, the factoring solution 4942 may automatically recommend or set rules, thresholds, actions, parameters and the like (optionally by learning to do so based on a training set of outcomes over time), resulting in a recommended factoring plan, which may specify a series of actions required to accomplish a recommended or desired outcome of factoring (such as within a range of acceptable outcomes), which may be automated and may involve conditional execution of steps based on monitored conditions and/or smart contract terms, which may be created, configured, and/or accounted for by the factoring plan. Factoring plans may be determined and executed based at least one part on market factors (such as competing interest rates or other terms and conditions offered by other lenders, values of collateral, values of accounts receivable, interest rates, and the like) as well as regulatory and/or compliance factors. Factoring plans may be generated and/or executed for creation of new factoring arrangements, for modifications of existing factoring arrangements, and others. In embodiments, adaptive intelligent systems 3304, including artificial intelligence 3448 may be trained on a training set of factoring activities by experts and/or on outcomes of factoring actions to generate a set of predictions, classifications, control instructions, plans, models, or the like for automated creation, management and/or execution of one or more aspects of a factoring plan.

In embodiments, provided herein is a robotic process automation system for consolidating a set of loans. An example platform or system includes (a) a set of data collection and monitoring services for collecting information about entities involved in a set of factoring loans and for collecting a training set of interactions between entities for a set of factoring loan transactions; (b) an artificial intelligence system that is trained on the training set of interactions to classify the entities involved in the set of factoring loans; and (c) a robotic process automation system that is trained on the set of factoring loan interactions to manage a factoring loan. Certain further aspects of an example system are described following, any one or more of which may be present in certain embodiments.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

Figure 61:
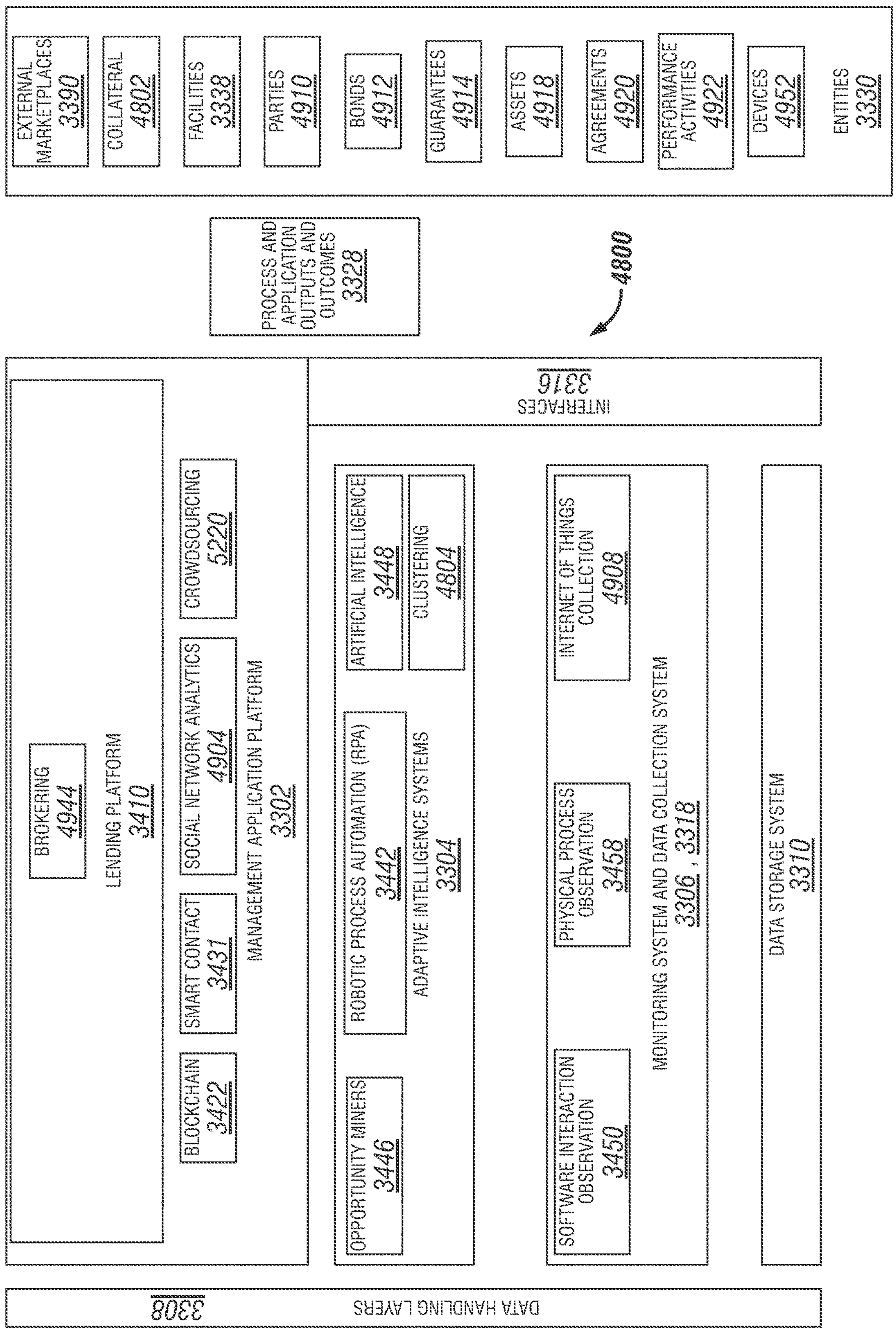
FIG. 61 depicts components and interactions of a lending platform having a robotic process automation system for brokering a mortgage loan.

An RPA Mortgage Loan Broker Trained on a Training Set of Expert Broker Interactions with Borrowers Referring to FIG. 61, in embodiments a lending platform is provided having a robotic process automation system for brokering a loan. The loan may be, for example, a mortgage loan.

The RPA system 3442 may provide automation for one or more aspects of a brokering solution 4944 that enables automated brokering and/or provides a recommendation or plan for a brokering activity relevant to a lending transaction, such as for brokering a set of mortgage loans, home loans, lines of credit, automobile loans, construction loans, or other loans of any of the types described herein. The brokering solution 4944 and/or RPA system 3442 for brokering may include a set of interfaces, workflows, and models (which may include, use or be enabled by various adaptive intelligent systems 3304) and other components that are configured to enable automation of one or more aspects of a brokering action or a brokering process for a lending transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like). For example, a user of the brokering solution 4944 may create, configure (such as using one or more templates or libraries), modify, set or otherwise handle (such as in a user interface of the brokering solution 4944 and/or RPA system 3442) various rules, thresholds, conditional procedures, workflows, model parameters, and the like that determine, or recommend, a brokering action or plan for brokering a set of loans of a given type or types based on one or more events, conditions, states, actions, or the like, where the brokering plan may be based on various factors, such as the interest rates of the set of loans available from various primary and secondary lenders, permitted attributes of borrowers (e.g., based on income, wealth, location, or the like) prevailing interest rates in a platform marketplace or external marketplace, the status of the borrowers of a set of loans, the status or other attributes of collateral 4802 or assets 4918, risk factors of the borrower, the lender, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Brokering may include brokering with respect to terms and conditions of sets of loans, selection of appropriate loans, configuration of payment terms for consolidated loans, configuration of payoff plans for pre-existing loans, communications to encourage borrowing, and the like. In embodiments, the brokering solution 4944 may automatically recommend or set rules, thresholds, actions, parameters and the like (optionally by learning to do so based on a training set of outcomes over time), resulting in a recommended brokering plan, which may specify a series of actions required to accomplish a recommended or desired outcome of brokering (such as within a range of acceptable outcomes), which may be automated and may involve conditional execution of steps based on monitored conditions and/or smart contract terms, which may be created, configured, and/or accounted for by the brokering plan. Brokering plans may be determined and executed based at least one part on market factors (such as competing interest rates offered by other lenders, property values, attributes of borrowers, values of collateral, and the like) as well as regulatory and/or compliance factors. Brokering plans may be generated and/or executed for creation of new loans, for secondary loans, for modifications of existing loans, for refinancing terms, for situations involving market changes (e.g., changes in prevailing interest rates or property values) and others. In embodiments, adaptive intelligent systems 3304, including artificial intelligence 3448 may be trained on a training set of brokering activities by experts and/or on outcomes of brokering actions to generate a set of predictions, classifications, control instructions, plans, models, or the like for automated creation, management and/or execution of one or more aspects of a brokering plan.

In embodiments, provided herein is a robotic process automation system for automating brokering of a mortgage. An example platform or system includes (a) a set of data collection and monitoring services for collecting information about entities involved in a set of mortgage loan activities and for collecting a training set of interactions between entities for a set of mortgage loan transactions; (b) an artificial intelligence system that is trained on the training set of interactions to classify the entities involved in the set of mortgage loans; and (c) a robotic process automation system that is trained on at least one of the set of mortgage loan activities and the set of mortgage loan interactions to broker a mortgage loan. Certain further aspects of an example system are described following, any one or more of which may be present in certain embodiments.

An example system includes where at least one of the set of mortgage loan activities and the set of mortgage loan interactions includes activities among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien and closing of mortgage agreement.

An example system includes where the set of data collection and monitoring services includes services selected from among a set of Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example system includes where the artificial intelligence system uses a model that processes attributes of entities involved in the set of mortgage loans, wherein the attributes are selected from properties that are subject to mortgages, assets used for collateral, identity of a party, interest rate, payment balance, payment terms, payment schedule, type of mortgage, type of property, financial condition of party, payment status, condition of property, and value of property.

An example system includes where managing a mortgage loan includes managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, and closing a mortgage agreement. An example system includes where the entities are a set of parties to a loan transaction. An example system includes where the set of parties is selected from among a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system includes where the robotic process automation is trained on a set of interactions of parties with a set of user interfaces involved in a set of mortgage-related activities. An example system includes where upon completion of negotiation a smart contract for a mortgage loan is automatically configured by a set of smart contract services based on the outcome of the negotiation. An example system includes where at least one of an outcome and a negotiating event of the negotiation is recorded in a distributed ledger associated with the loan. An example system includes where the artificial intelligence system includes at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

Figure 62:
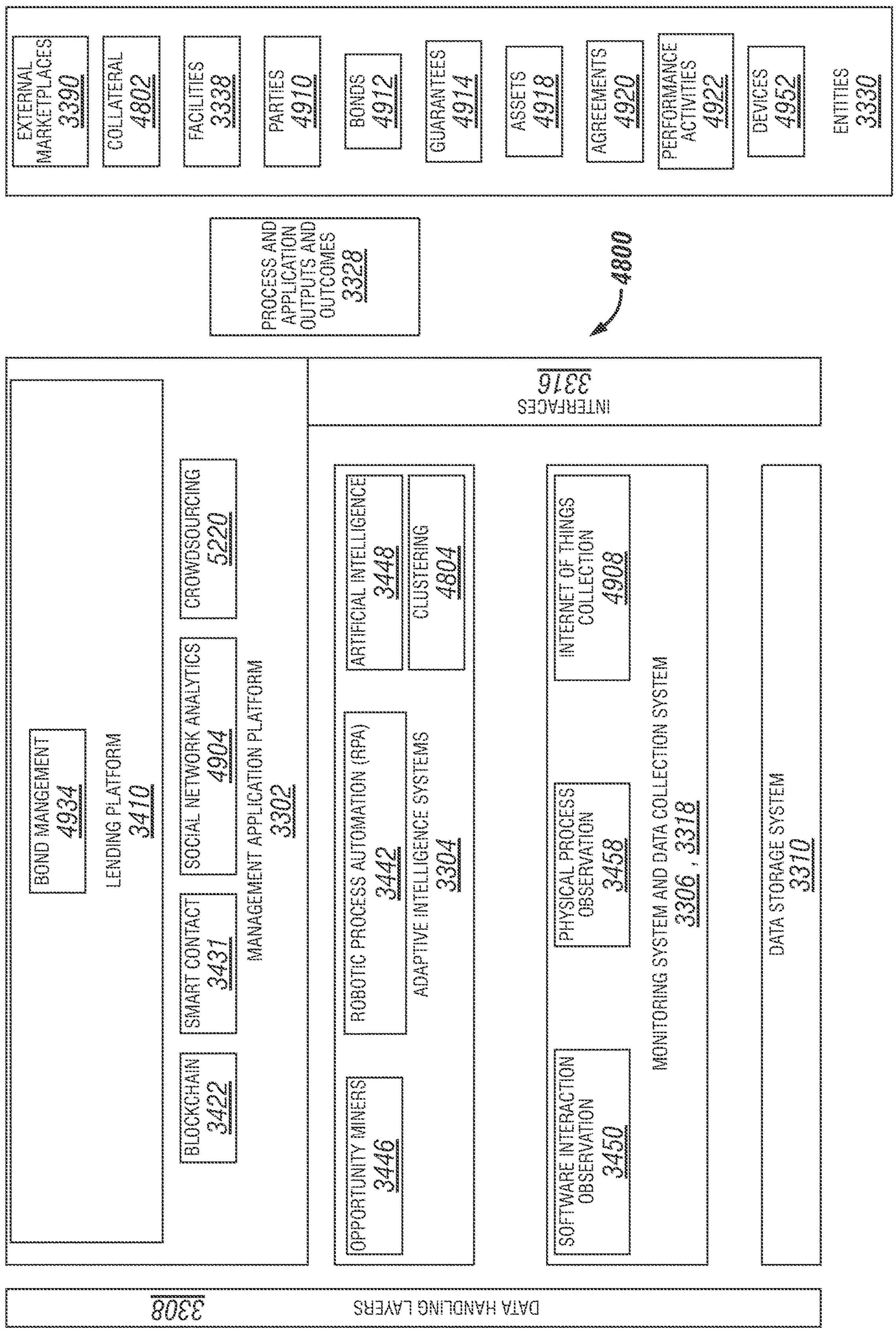
FIG. 62 depicts components and interactions of a lending platform having a crowdsourcing and automated classification system for validating condition of an issuer for a bond, a social network monitoring system with artificial intelligence for classifying a condition about a bond, and an Internet of Things data collection and monitoring system with artificial intelligence for classifying a condition about a bond.

Crowdsourcing and Automated Classification System for Validating Condition of an Issuer for a Bond Referring to FIG. 62, in embodiments a lending platform is provided having a crowdsourcing and automated classification system for validating condition of an issuer for a bond. The RPA system 3442 may provide automation for one or more aspects of a bond management solution 4934 that enables automated bond management and/or provides a recommendation or plan for a bond management activity relevant to a bond transaction, such as for municipal bonds, corporate bonds, government bonds, or other bonds that may be backed by assets, collateral, or commitments of a bond issuer. The bond management solution 4934 and/or RPA system 3442 for bond management may include a set of interfaces, workflows, and models (which may include, use or be enabled by various adaptive intelligent systems 3304) and other components that are configured to enable automation of one or more aspects of a bond management action or a management process for a bond transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like). For example, a user of the bond management solution 4934 may create, configure (such as using one or more templates or libraries), modify, set or otherwise handle (such as in a user interface of the bond management solution 4934 and/or RPA system 3442) various rules, thresholds, conditional procedures, workflows, model parameters, and the like that determine, or recommend, a bond management action or plan for management a set of bonds of a given type or types based on one or more events, conditions, states, actions, or the like, where the bond management plan may be based on various factors, such as the interest rates available from various primary and secondary lenders or issuers, permitted attributes of issuers and buyers (e.g., based on income, wealth, location, or the like) prevailing interest rates in a platform marketplace or external marketplace, the status of the issuers of a set of bonds, the status or other attributes of collateral 4802 or assets 4918, risk factors of the issuer, one or more guarantors, market risk factors and the like (including predicted risk based on one or more predictive models using artificial intelligence 3448), status of debt, condition of collateral 4802 or assets 4918 available to secure or back a set of bonds, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences), and many others. Bond management may include management with respect to terms and conditions of sets of bonds, selection of appropriate bonds, communications to encourage transactions, and the like. In embodiments, the bond management solution 4934 may automatically recommend or set rules, thresholds, actions, parameters and the like (optionally by learning to do so based on a training set of outcomes over time), resulting in a recommended bond management plan, which may specify a series of actions required to accomplish a recommended or desired outcome of bond management (such as within a range of acceptable outcomes), which may be automated and may involve conditional execution of steps based on monitored conditions and/or smart contract terms, which may be created, configured, and/or accounted for by the bond management plan. Bond management plans may be determined and executed based at least one part on market factors (such as competing interest rates offered by other issuers, property values, attributes of issuers, values of collateral or assets, and the like) as well as regulatory and/or compliance factors. Bond management plans may be generated and/or executed for creation of new bonds, for secondary loans or transactions to back bonds, for modifications of existing bonds, for situations involving market changes (e.g., changes in prevailing interest rates or property values) and others. In embodiments, adaptive intelligent systems 3304, including artificial intelligence 3448 may be trained on a training set of bond management activities by experts and/or on outcomes of bond management actions to generate a set of predictions, classifications, control instructions, plans, models, or the like for automated creation, management and/or execution of one or more aspects of a bond management plan.

Figure 63:
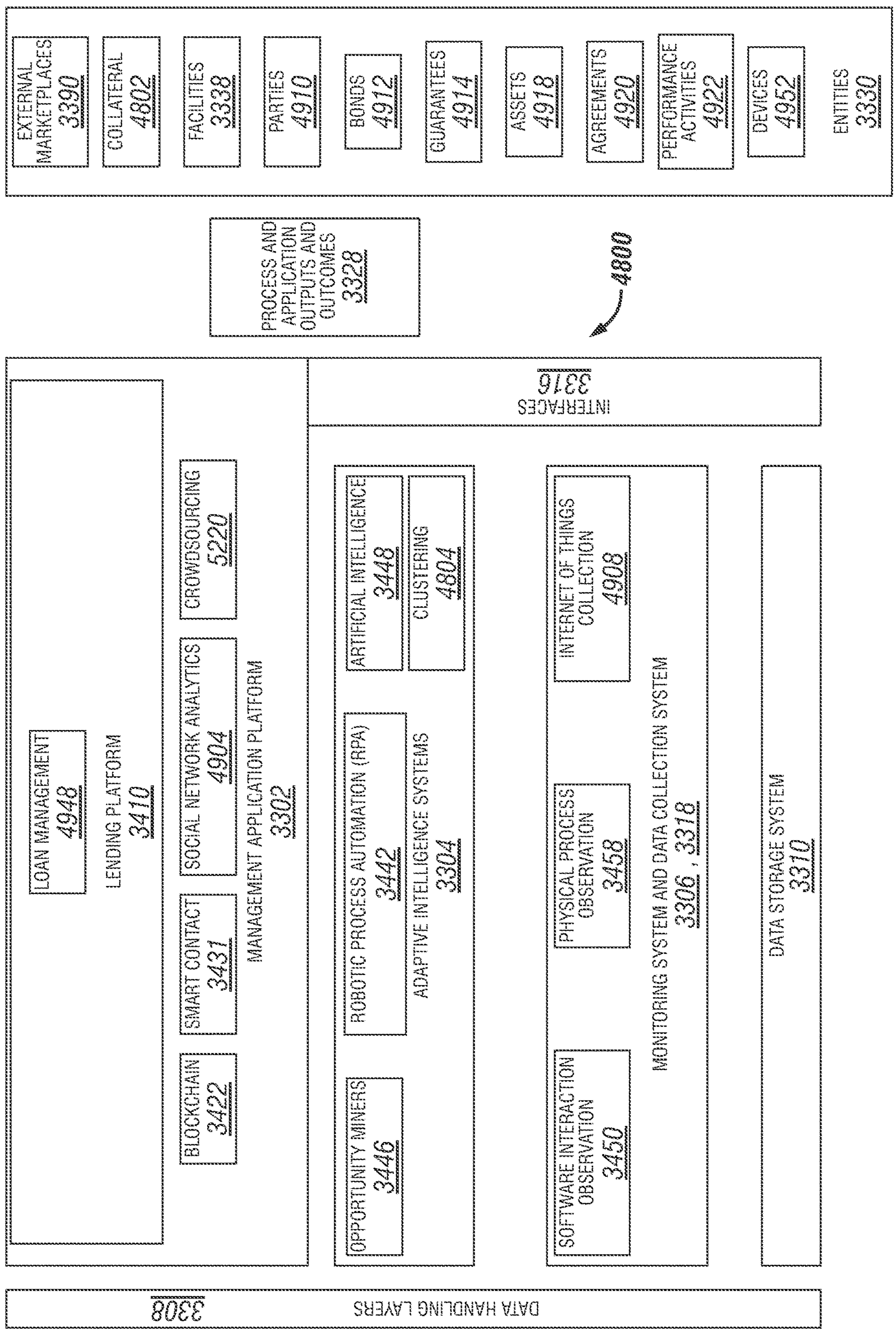
FIG. 63 depicts components and interactions of a lending platform having a system that manages the terms and conditions of a loan based on a parameter monitored by the IoT, by a parameter determined by a social network analytic system, or a parameter determined by a crowdsourcing system.

Systems that Varies the Interest Rate or Other Terms on a Subsidized Loan Based on a Parameter Monitored by the IoT Referring to FIG. 63, in embodiments a lending platform is provided having a system that varies the terms and conditions of loan based on a parameter monitored by the IoT. The loan may be a subsidized loan. The RPA system 3442 may provide automation for one or more aspects of a loan management solution 4948 that enables automated loan management and/or provides a recommendation or plan for a loan management activity relevant to a loan transaction, such as for personal loans, corporate loans, subsidized loans, student loans, or other loans, including ones that may be backed by assets, collateral, or commitments of a borrower. The loan management solution 4948 and/or RPA system 3442 for loan management may include a set of interfaces, workflows, and models (which may include, use or be enabled by various adaptive intelligent systems 3304) and other components that are configured to enable automation of one or more aspects of a loan management action or a management process for a loan transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like). For example, a user of the loan management solution 4948 may create, configure (such as using one or more templates or libraries), modify, set or otherwise handle (such as in a user interface of the loan management solution 4948 and/or RPA system 3442) various rules, thresholds, conditional procedures, workflows, model parameters, and the like that determine, or recommend, a loan management action or plan for management a set of loans of a given type or types based on one or more events, conditions, states, actions, or the like, where the loan management plan may be based on various factors, such as the interest rates available from various primary and secondary lenders or issuers, permitted attributes of borrowers (e.g., based on income, wealth, location, or the like) prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Loan management may include management with respect to terms and conditions of sets of loans, selection of appropriate loans, communications to encourage transactions, and the like. In embodiments, the loan management solution 4948 may automatically recommend or set rules, thresholds, actions, parameters and the like (optionally by learning to do so based on a training set of outcomes over time), resulting in a recommended loan management plan, which may specify a series of actions required to accomplish a recommended or desired outcome of loan management (such as within a range of acceptable outcomes), which may be automated and may involve conditional execution of steps based on monitored conditions and/or smart contract terms, which may be created, configured, and/or accounted for by the loan management plan. Loan management plans may be determined and executed based at least one part on market factors (such as competing interest rates offered by other issuers, property values, attributes of issuers, values of collateral or assets, and the like) as well as regulatory and/or compliance factors. Loan management plans may be generated and/or executed for creation of new loans, for secondary loans or transactions to back loans, for collection, for consolidation, for foreclosure, for situations of bankruptcy of insolvency, for modifications of existing loans, for situations involving market changes (e.g., changes in prevailing interest rates or property values) and others. In embodiments, adaptive intelligent systems 3304, including artificial intelligence 3448 may be trained on a training set of loan management activities by experts and/or on outcomes of loan management actions to generate a set of predictions, classifications, control instructions, plans, models, or the like for automated creation, management and/or execution of one or more aspects of a loan management plan.

Automated Blockchain Custody Service

Figure 64:
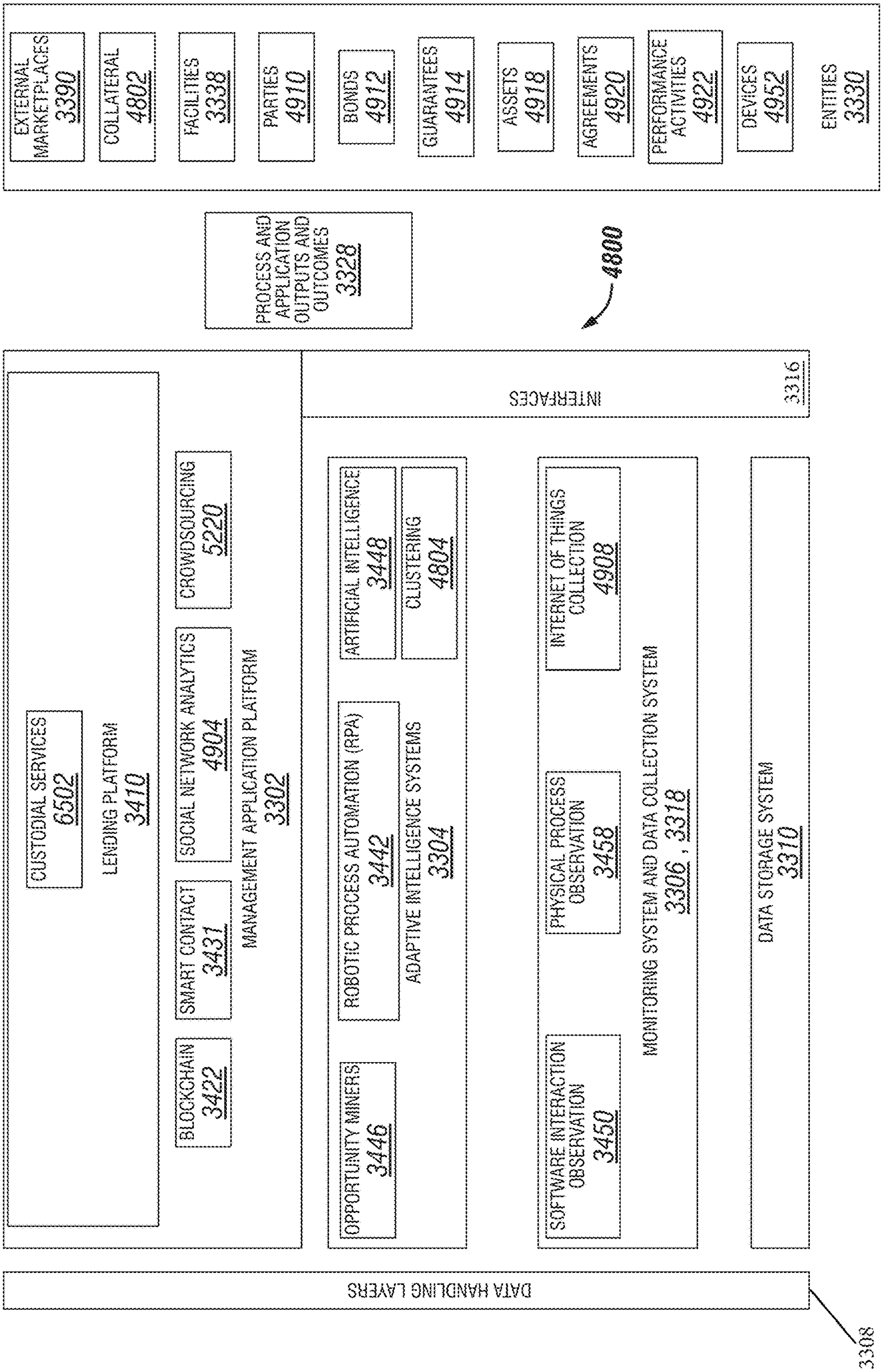
FIG. 64 depicts components and interactions of a lending platform having an automated blockchain custody service for managing a set of custodial assets.

Referring to FIG. 64, in embodiments a lending platform is provided having an automated blockchain custody service and solution for managing a set of custodial assets. The RPA system 3442 may provide automation for one or more aspects of a custodial solution 6502 that enables automated custodial management and/or provides a recommendation or plan for a custodial activity relevant to a set of assets, such as ones involved in or backing a lending transaction or ones for which clients seek custodial for security or administrative purposes, such as for assets of any of the types described herein, including cryptocurrencies and other currencies, stock certificates and other evidence of ownership, securities, and many others. The custodial solution 6502 and/or RPA system 3442 for handling custodial activity may include a set of interfaces, workflows, and models (which may include, use or be enabled by various adaptive intelligent systems 3304) and other components that are configured to enable automation of one or more aspects of a custodial action or a management process for trust or custody of a set of assets 4918, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, and the like). For example, a user of the custodial solution 6502 may create, configure (such as using one or more templates or libraries), modify, set or otherwise handle (such as in a user interface of the custodial solution 6502 and/or RPA system 3442) various rules, thresholds, conditional procedures, workflows, model parameters, and the like that determine, or recommend, a custodial action or plan for management a set of assets of a given type or types based on one or more events, conditions, states, actions, status or the like, where the custodial plan may be based on various factors, such as the storage options available, the basis for retrieval of assets, the basis for transfer of ownership of assets, and the like, condition of assets 4918 for which custodial services will be required, behaviors of parties (such as behaviors indicating preferences), and many others. Custodial services may include management with respect to terms and conditions of sets of assets, selection of appropriate terms and conditions for trust and custody, selection of parameters for transfer of ownership, selection and provision of storage, selection and provision of secure infrastructure for data storage, and others. In embodiments, the custodial solution 48802 may automatically recommend or set rules, thresholds, actions, parameters and the like (optionally by learning to do so based on a training set of outcomes over time), resulting in a recommended custodial plan, which may specify a series of actions required to accomplish a recommended or desired outcome of custodial services (such as within a range of acceptable outcomes), which may be automated and may involve conditional execution of steps based on monitored conditions and/or smart contract terms, which may be created, configured, and/or accounted for by the custodial plan. Custodial plans may be determined and executed based at least one part on market factors (such as competing terms and conditions offered by other custodians, property values, attributes of clients, values of collateral or assets, costs of physical storage, costs of data storage, and the like) as well as regulatory and/or compliance factors. In embodiments, adaptive intelligent systems 3304, including artificial intelligence 3448 may be trained on a training set of custodial activities by experts and/or on outcomes of custodial actions to generate a set of predictions, classifications, control instructions, plans, models, or the like for automated creation, management and/or execution of one or more aspects of a custodial plan. In embodiments, actions with respect to custody of a set of assets may be stored in a blockchain 3422, such as in a distributed ledger.

In embodiments, provided herein is a system for handling trust and custody for a set of assets. An example platform or system for handling trust and custody for a set of assets may include (a) a set of asset identification services for identifying a set of assets for which a financial institution is responsible for taking custody; and (b) a set of identity management services by which the financial institution verifies identities and credentials of a set of entities entitled to take action with respect to the assets and a set of blockchain services. Wherein at least one of the set of assets and identifying information for the set of assets is stored in a blockchain and wherein events related to the set of assets are recorded in a distributed ledger. Certain further aspects of an example system are described following, any one or more of which may be present in certain embodiments.

An example system includes where the credentials include owner credentials, agent credentials, beneficiary credentials, trustee credentials, and custodian credentials.

In embodiments the events related to the set of assets include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status.

In embodiments the platform or system further includes a set of data collection and monitoring services for monitoring at least one of the set of assets, a set of entities, and a set of events related to the assets.

In embodiments the set of entities includes at least one of an owner, a beneficiary, an agent, a trustee and a custodian.

In embodiments the platform or system further includes a set of smart contract services for managing the custody of the set of assets, wherein at least one event related to the set of assets is managed automatically by the smart contract based on a set of terms and conditions embodied in the smart contract and based on information collected by the set of data collection and monitoring services.

In embodiments the events related to the set of assets include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status.

Figure 65:
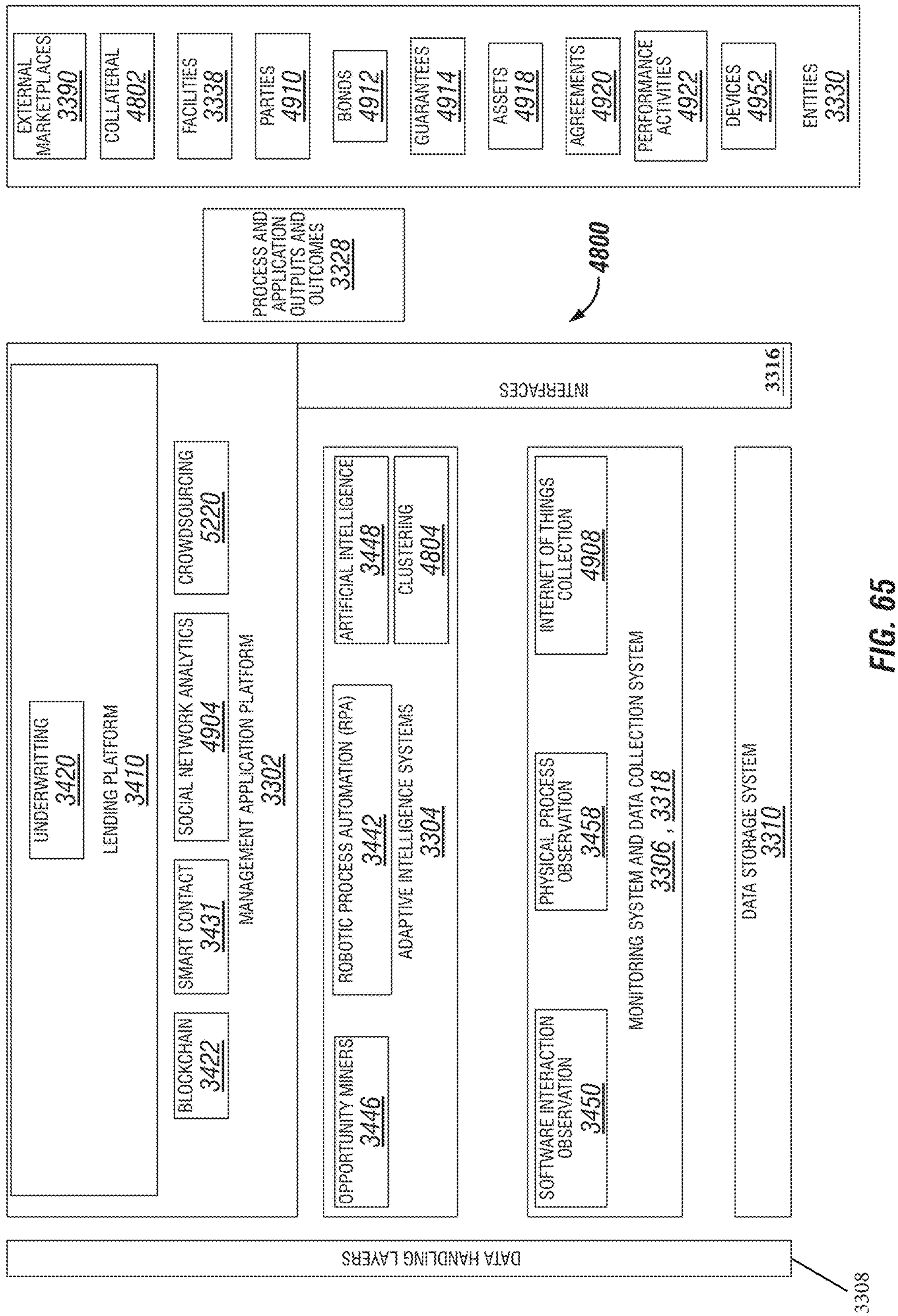
FIG. 65 depicts components and interactions of a lending platform having an underwriting system for a loan with a set of data-integrated microservices including data collection and monitoring services, blockchain services, artificial intelligence services, and smart contract services for underwriting lending entities and transactions.

Referring to FIG. 65, in embodiments a lending platform is provided having an underwriting system for a loan with a set of data-integrated microservices including data collection and monitoring services, blockchain services, artificial intelligence services, and smart contract services for underwriting lending entities and transactions. The RPA system 3442 may provide automation for one or more aspects of an underwriting solution 3420 that enables automated underwriting and/or provides a recommendation or plan for an underwriting activity relevant to a loan transaction, such as for personal loans, corporate loans, subsidized loans, student loans, or other loans, including ones that may be backed by assets, collateral, or commitments of a borrower. The underwriting solution 3420 and/or RPA system 3442 for underwriting may include a set of interfaces, workflows, and models (which may include, use or be enabled by various adaptive intelligent systems 3304) and other components that are configured to enable automation of one or more aspects of a underwriting action or a management process for a loan transaction, such as based on a set of conditions, which may include smart contract 3431 terms and conditions, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like)). For example, a user of the underwriting solution 3420 may create, configure (such as using one or more templates or libraries), modify, set or otherwise handle (such as in a user interface of the underwriting solution 3420 and/or RPA system 3442) various rules, thresholds, conditional procedures, workflows, model parameters, and the like that determine, or recommend, a underwriting action or plan for management a set of loans of a given type or types based on one or more events, conditions, states, actions, or the like, where the underwriting plan may be based on various factors, such as the interest rates available from various primary and secondary lenders or issuers, permitted attributes of borrowers (e.g., based on income, wealth, location, or the like), prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Underwriting may include management with respect to terms and conditions of sets of loans, selection of appropriate loans, communications relevant to underwriting processes, and the like. In embodiments, the underwriting solution 3420 may automatically recommend or set rules, thresholds, actions, parameters and the like (optionally by learning to do so based on a training set of outcomes over time), resulting in a recommended underwriting plan, which may specify a series of actions required to accomplish a recommended or desired outcome of underwriting (such as within a range of acceptable outcomes), which may be automated and may involve conditional execution of steps based on monitored conditions and/or smart contract terms, which may be created, configured, and/or accounted for by the underwriting plan. Underwriting plans may be determined and executed based at least one part on market factors (such as competing interest rates offered by other issuers, property values, borrower behavior, demographic trends, payment trends, attributes of issuers, values of collateral or assets, and the like) as well as regulatory and/or compliance factors. Underwriting plans may be generated and/or executed for new loans, for secondary loans or transactions to back loans, for collection, for consolidation, for foreclosure, for situations of bankruptcy of insolvency, for modifications of existing loans, for situations involving market changes (e.g., changes in prevailing interest rates or property values), for foreclosure activities, and others. In embodiments, adaptive intelligent systems 3304, including artificial intelligence 3448 may be trained on a training set of underwriting activities by experts and/or on outcomes of underwriting actions to generate a set of predictions, classifications, control instructions, plans, models, or the like for automated creation, management and/or execution of one or more aspects of an underwriting plan. In embodiments, events and outcomes of underwriting may be recorded in a blockchain 3422, such as in a distributed ledger, for secure access and retrieval by authorized users. Adaptive intelligent systems 3304 may, such as using various artificial intelligence 3448 or expert systems disclosed herein and in the documented incorporated by reference herein, may improve or automated one or more aspects of underwriting, such as by training a model, a neural net, a deep learning system, or the like based on a training set of expert interactions and/or a training set of outcomes from underwriting activities.

Figure 66:
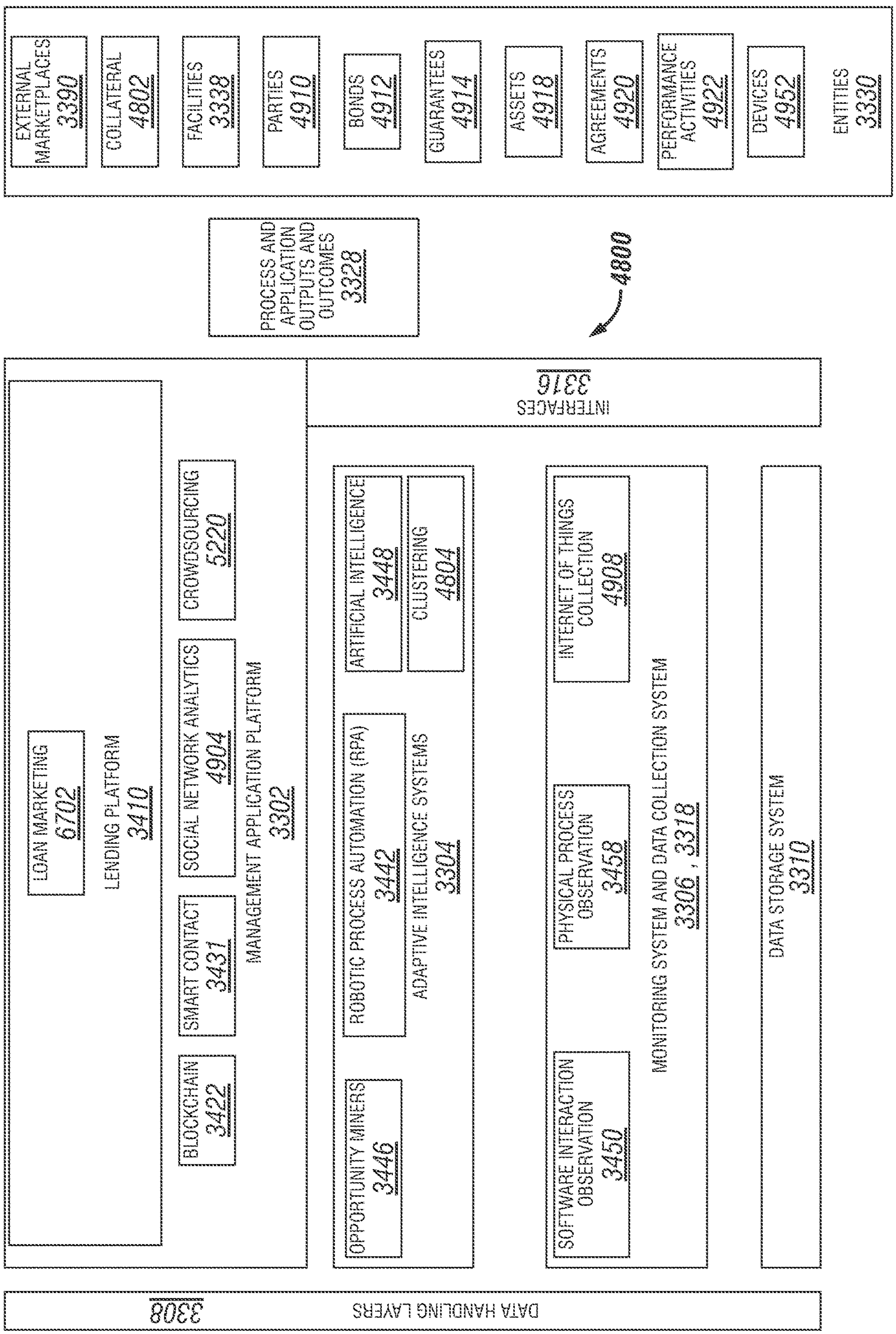
FIG. 66 depicts components and interactions of a lending platform having a loan marketing system with a set of data-integrated microservices including data collection and monitoring services, blockchain services, artificial intelligence services and smart contract services for marketing a loan to a set of prospective parties.

Referring to FIG. 66, in embodiments a lending platform is provided having a loan marketing system with a set of data-integrated microservices including data collection and monitoring services, blockchain services, artificial intelligence services and smart contract services for marketing a loan to a set of prospective parties. The system 4800 may enable one or more aspects of a loan marketing solution 6702 that enables automated loan marketing and/or provides a recommendation or plan for a loan marketing activity relevant to a loan transaction, such as for personal loans, corporate loans, subsidized loans, student loans, or other loans, including ones that may be backed by assets, collateral, or commitments of a borrower. The loan marketing solution 6702 (which in embodiments may include or use an RPA system 3442 configured for loan marketing) may include a set of interfaces, workflows, and models (which may include, use or be enabled by various adaptive intelligent systems 3304) and other components that are configured to enable automation of one or more aspects of a loan marketing action or a management process for a loan transaction, such as based on a set of conditions, which may include smart contract 3431 terms and conditions (which may be configured, e.g., for a marketed set of loans), available capital for lending, regulatory factors, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like)), and others. For example, a user of the loan marketing solution 6702 may create, configure (such as using one or more templates or libraries), modify, set or otherwise handle (such as in a user interface of the loan marketing solution 6702 and/or RPA system 3442) various rules, thresholds, conditional procedures, workflows, model parameters, and the like that determine, or recommend, a loan marketing action or plan for management a set of loans of a given type or types based on one or more events, conditions, states, actions, or the like, where the loan marketing plan may be based on various factors, such as the interest rates available from various primary and secondary lenders or issuers, returns on the capital that is made available for loans, permitted or desired attributes of borrowers (e.g., based on income, wealth, location, or the like), prevailing interest rates in a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Loan marketing may include management with respect to terms and conditions of sets of loans, selection of appropriate loans, communications relevant to loan marketing processes, and the like. In embodiments, the loan marketing solution 6702 may automatically recommend or set rules, thresholds, actions, parameters and the like (optionally by learning to do so based on a training set of outcomes over time), resulting in a recommended loan marketing plan, which may specify a series of actions required to accomplish a recommended or desired outcome of loan marketing (such as within a range of acceptable outcomes), which may be automated and may involve conditional execution of steps based on monitored conditions and/or smart contract terms, which may be created, configured, and/or accounted for by the loan marketing plan. Loan marketing plans may be determined and executed based at least one part on market factors (such as competing interest rates offered by other issuers, property values, borrower behavior, demographic trends, payment trends, attributes of issuers, values of collateral or assets, and the like) as well as regulatory and/or compliance factors. Loan marketing plans may be generated and/or executed for new loans, for secondary loans or transactions to back loans, for collection, for consolidation, for foreclosure situations (e.g., as an alternative to foreclosure), for situations of bankruptcy of insolvency, for modifications of existing loans, for situations involving market changes (e.g., changes in prevailing interest rates, available capital, or property values), and others. In embodiments, adaptive intelligent systems 3304, including artificial intelligence 3448 may be trained on a training set of loan marketing activities by experts and/or on outcomes of loan marketing actions to generate a set of predictions, classifications, control instructions, plans, models, or the like for automated creation, management and/or execution of one or more aspects of a loan marketing plan. In embodiments, events and outcomes of loan marketing may be recorded in a blockchain 3422, such as in a distributed ledger, for secure access and retrieval by authorized users. Adaptive intelligent systems 3304 may, such as using various artificial intelligence 3448 or expert systems disclosed herein and in the documented incorporated by reference herein, may improve or automated one or more aspects of entity rating, such as by training a model, a neural net, a deep learning system, or the like based on a training set of expert interactions and/or a training set of outcomes from loan marketing activities.

Figure 67:
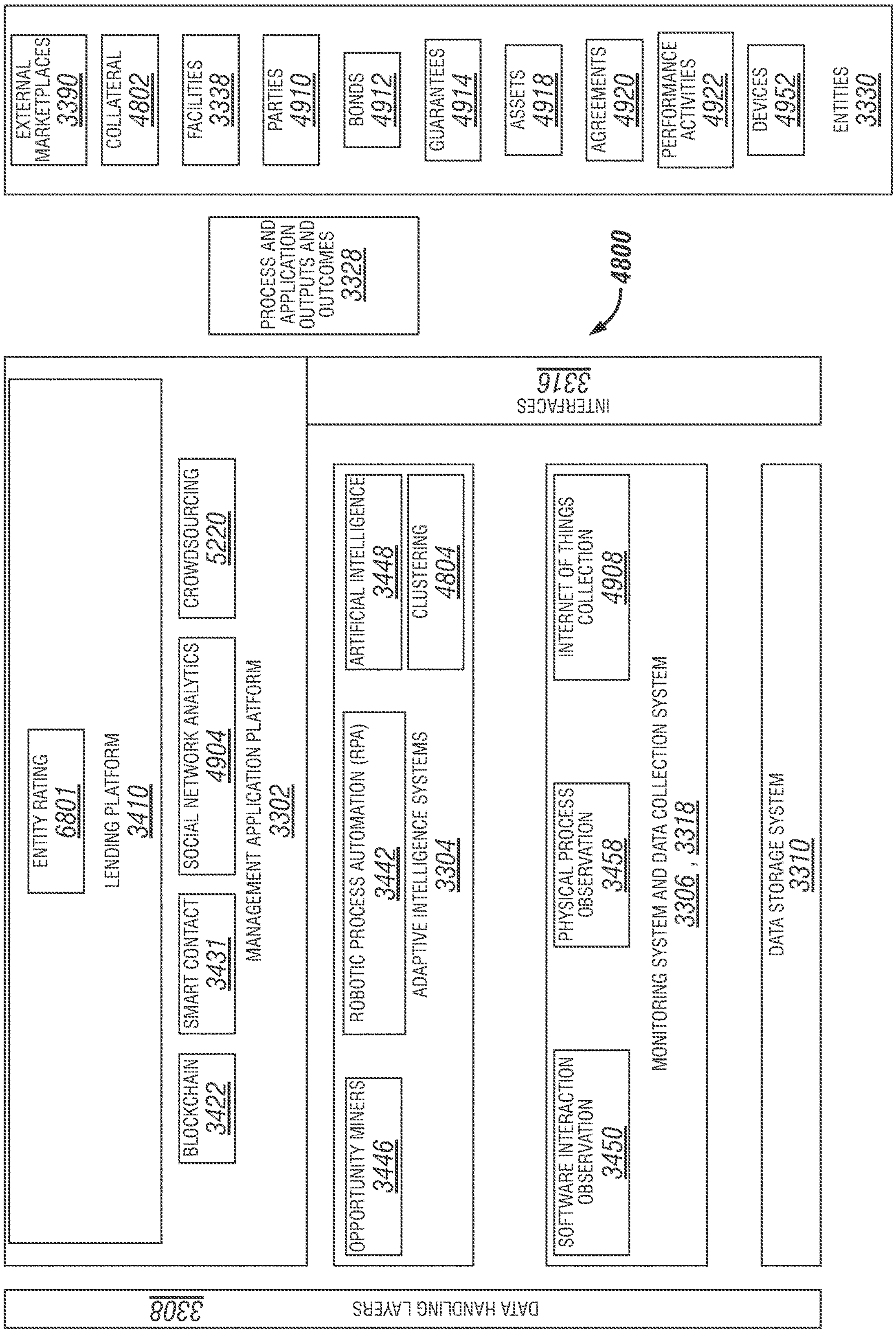
FIG. 67 depicts components and interactions of a lending platform having a rating system with a set of data-integrated microservices including data collection and monitoring services, blockchain services, artificial intelligence services, and smart contract services for rating a set of loan-related entities.

Referring to FIG. 67, in embodiments a lending platform is provided having a rating system with a set of data-integrated microservices including data collection and monitoring services, blockchain services, artificial intelligence services, and smart contract services for rating a set of loan-related entities. The system 4800 may enable one or more aspects of an entity rating solution 6801 that enables automated entity rating and/or provides a recommendation or plan for an entity rating activity relevant to a loan transaction, such as for personal loans, corporate loans, subsidized loans, student loans, or other loans, including ones that may be backed by assets, collateral, or commitments of a borrower. The entity rating solution 6801 (which in embodiments may include or use an RPA system 3442 configured for entity rating) may include a set of interfaces, workflows, and models (which may include, use or be enabled by various adaptive intelligent systems 3304) and other components that are configured to enable automation of one or more aspects of an entity rating action or a rating process for a loan transaction, such as based on a set of conditions, attributes, events, or the like, which may include attributes of entities 3330 (such as value, quality, location, net worth, price, physical condition, health condition, security, safety, ownership and the like), smart contract 3431 terms and conditions (which may be configured or populated, e.g., based on ratings for a rated set of loans), regulatory factors, marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like)), and others. For example, a user of the entity rating solution 6801 may create, configure (such as using one or more templates or libraries), modify, set or otherwise handle (such as in a user interface of the entity rating solution 6801 and/or RPA system 3442) various rules, thresholds, conditional procedures, workflows, model parameters, and the like that determine, or recommend, an entity rating action or plan for rating a set of loans of a given type or types based on one or more events, attributes, parameters, characteristics, conditions, states, actions, or the like, where the entity rating plan may be based on various factors (e.g., based on income, wealth, location, or the like or parties 4910, relative to others, or based on condition of collateral 4802 or assets 4918, or the like), prevailing conditions of a platform marketplace or external marketplace, the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Entity rating may include management with respect to terms and conditions of sets of loans, selection of appropriate loans, communications relevant to entity rating processes, and the like. In embodiments, the entity rating solution 6801 may automatically recommend or set rules, thresholds, actions, parameters and the like (optionally by learning to do so based on a training set of outcomes over time), resulting in a recommended entity rating plan, which may specify a series of actions required to accomplish a recommended or desired outcome of entity rating (such as within a range of acceptable outcomes), which may be automated and may involve conditional execution of steps based on monitored conditions and/or smart contract terms, which may be created, configured, and/or accounted for by the entity rating plan. Entity rating plans may be determined and executed based at least one part on market factors (such as competing interest rates offered by other issuers, property values, borrower behavior, demographic trends, payment trends, attributes of issuers, values of collateral or assets, and the like) as well as regulatory and/or compliance factors. Entity rating plans may be generated and/or executed for new loans, for secondary loans or transactions to back loans, for collection, for consolidation, for foreclosure situations (e.g., as an alternative to foreclosure), for situations of bankruptcy of insolvency, for modifications of existing loans, for situations involving market changes (e.g., changes in prevailing interest rates, available capital, or property values), and others. In embodiments, adaptive intelligent systems 3304, including artificial intelligence 3448 may be trained on a training set of entity rating activities by experts and/or on outcomes of entity rating actions to generate a set of predictions, classifications, control instructions, plans, models, or the like for automated creation, management and/or execution of one or more aspects of an entity rating plan. In embodiments, events and outcomes of entity rating may be recorded in a blockchain 3422, such as in a distributed ledger, for secure access and retrieval by authorized users. Adaptive intelligent systems 3304 may, such as using various artificial intelligence 3448 or expert systems disclosed herein and in the documented incorporated by reference herein, may improve or automated one or more aspects of entity rating, such as by training a model, a neural net, a deep learning system, or the like based on a training set of expert interactions and/or a training set of outcomes from entity rating activities.

Figure 68:
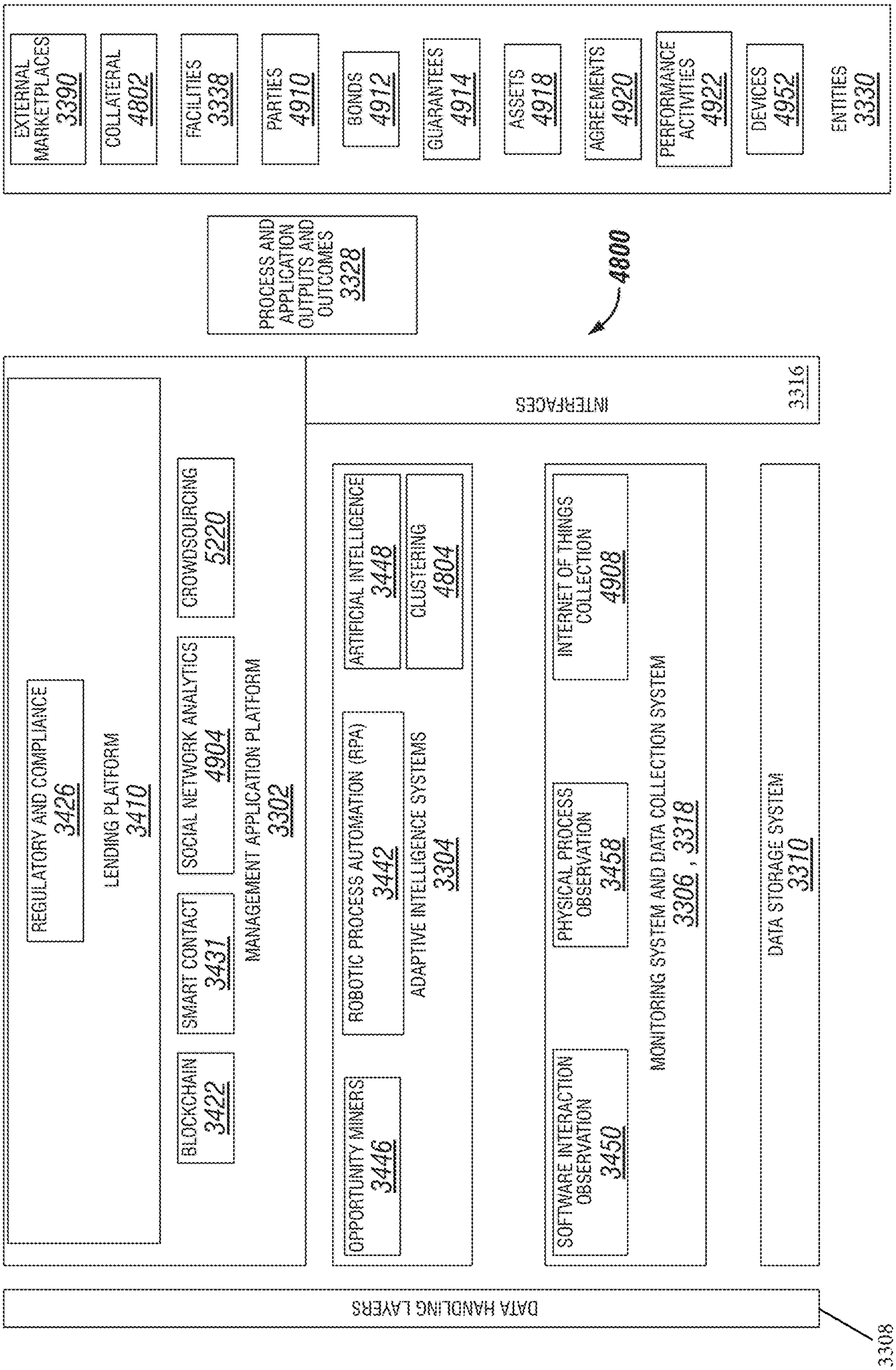
FIG. 68 depicts components and interactions of a lending platform having a regulatory and/or compliance system with a set of data-integrated microservices including data collection and monitoring services, blockchain services, artificial intelligence services, and smart contract services for automatically facilitating compliance with at least one of a law, a regulation and a policy that applies to a lending transaction.

Referring to FIG. 68, in embodiments a lending platform is provided having a regulatory and/or compliance system 3426 with a set of data-integrated microservices including data collection and monitoring services, blockchain services, artificial intelligence services, and smart contract services for automatically facilitating compliance with at least one of a law, a regulation and a policy that applies to a lending transaction. The system 4800 may enable one or more aspects of a regulatory and compliance solution 3426 that enables automated regulatory and compliance and/or provides a recommendation or plan for a regulatory and compliance activity relevant to a loan transaction, such as for personal loans, corporate loans, subsidized loans, student loans, or other loans, including ones that may be backed by assets, collateral, or commitments of a borrower. The regulatory and compliance solution 3426 (which in embodiments may include or use an RPA system 3442 configured for automating regulatory and compliance activities based on a training set of interactions by experts in regulatory and/or compliance activities) may include a set of interfaces, workflows, and models (which may include, use or be enabled by various adaptive intelligent systems 3304) and other components that are configured to enable automation of one or more aspects of a regulatory and compliance action or a regulatory and/or compliance process for a loan transaction, such as based on a set of policies, regulations, laws, requirements, specifications, conditions, attributes, events, or the like, which may include attributes of or applicable to entities 3330 involved in a lending transaction and/or the terms and conditions of loans (including smart contract 3431 terms and conditions (which may be configured or populated, e.g., based on terms and conditions that are permitted for a given set of loans)), as well as various marketplace conditions (of platform marketplaces and/or external marketplaces 3390, conditions monitored by monitoring systems 3306 and data collection systems 3318, and the like (such as of entities 3330, including without limitation parties 4910, collateral 4802 and assets 4918, among others, as well as of interest rates, available lenders, available terms and the like)), and others. For example, a user of the regulatory and compliance solution 3426 may create, configure (such as using one or more templates or libraries), modify, set or otherwise handle (such as in a user interface of the regulatory and/or compliance solution 3426 and/or RPA system 3442) various rules, thresholds, conditional procedures, workflows, model parameters, and the like that determine, or recommend, a regulatory and compliance action or plan for governing a set of loans of a given type or types based on one or more events, attributes, parameters, characteristics, conditions, states, actions, or the like, where the regulatory and compliance plan may be based on various factors (e.g., based on permitted interest rates, required notices (e.g., regarding annualized percentage rate reporting), permitted borrowers (e.g., students for federally subsidized student loans), permitted lenders, permitted issuers, income (e.g., for low-income loans), wealth (e.g., for loans that are permitted by policy to be provided only to adequately capitalized parties), location (e.g., for geographically governed lending programs, such as for municipal development), conditions of a platform marketplace or external marketplace (such as where loans are required to have interest rates that do not exceed a threshold that is calculated based on prevailing interest rates), the status of the parties of a set of loans, the status or other attributes of collateral 4802 or assets 4918, risk factors of the borrower, one or more guarantors, market risk factors and the like (including predicted risk based on one or more predictive models using artificial intelligence 3448), status of debt, condition of collateral 4802 or assets 4918 available to secure or back a set of loans, the state of a business or business operation (e.g., receivables, payables, or the like), conditions of parties 4910 (such as net worth, wealth, debt, location, and other conditions), behaviors of parties (such as behaviors indicating preferences, behaviors indicating debt preferences, payment preferences, or communication preferences), and many others. Regulatory and compliance may include governance with respect to terms and conditions of sets of loans, selection of appropriate loans, notices required to be provided, underwriting policies, communications relevant to regulatory and compliance processes, and the like. In embodiments, the regulatory and compliance solution 3426 may automatically recommend or set rules, thresholds, actions, parameters and the like (optionally by learning to do so based on a training set of outcomes over time), resulting in a recommended regulatory and compliance plan, which may specify a series of actions required to accomplish a recommended or desired outcome of regulatory and compliance (such as within a range of acceptable outcomes), which may be automated and may involve conditional execution of steps based on monitored conditions and/or smart contract terms, which may be created, configured, and/or accounted for by the regulatory and compliance plan. Regulatory and compliance plans may be determined and executed based at least one part on market factors (such as competing interest rates offered by other issuers, property values, borrower behavior, demographic trends, payment trends, attributes of issuers, values of collateral or assets, and the like) as well as regulatory and/or compliance factors. Regulatory and compliance plans may be generated and/or executed for new loans, for secondary loans or transactions to back loans, for collection, for consolidation, for foreclosure situations (e.g., as an alternative to foreclosure), for situations of bankruptcy of insolvency, for modifications of existing loans, for situations involving market changes (e.g., changes in prevailing interest rates, available capital, or property values), and others. In embodiments, adaptive intelligent systems 3304, including artificial intelligence 3448 may be trained on a training set of regulatory and compliance activities by experts and/or on outcomes of regulatory and compliance actions to generate a set of predictions, classifications, control instructions, plans, models, or the like for automated creation, management and/or execution of one or more aspects of a regulatory and compliance plan. In embodiments, events and outcomes of regulatory and compliance may be recorded in a blockchain 3422, such as in a distributed ledger, for secure access and retrieval by authorized users. Adaptive intelligent systems 3304 may, such as using various artificial intelligence 3448 or expert systems disclosed herein and in the documented incorporated by reference herein, may improve or automate one or more aspects of regulatory and compliance, such as by training a model, a neural net, a deep learning system, or the like based on a training set of expert interactions and/or a training set of outcomes from regulatory and compliance activities.

An example lending platform is provided herein having a set of data-integrated microservices including data collection and monitoring services, blockchain services, and smart contract services for handling lending entities and transactions. An example system includes an Internet of Things and sensor platform for monitoring at least one of a set of assets and a set of collateral for a loan, a bond, or a debt transaction. An example system includes a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for negotiation of a set of terms and conditions for a loan. An example system includes a robotic process automation system for loan collection. An example system includes a robotic process automation system for consolidating a set of loans. An example system includes a robotic process automation system for managing a factoring loan. An example system includes a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by the IoT. An example system includes a system that varies the terms and conditions of a subsidized loan based on a parameter monitored in a social network. An example system includes a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having an Internet of Things and sensor platform for monitoring at least one of a set of assets and a set of collateral for a loan, a bond, or a debt transaction. An example system includes a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for one or more of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond.

An example system includes a system that varies the terms and conditions of a subsidized loan based on a parameter monitored by at least one of the IoT, a social network, or crowdsourcing.

An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a smart contract and distributed ledger platform for managing at least one of ownership of a set of collateral and a set of events related to a set of collateral. An example system includes a smart contract system that automatically adjusts an interest rate for a loan based on information collected via at least one of an Internet of Things system, a crowdsourcing system, a set of social network analytic services and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan.

An example system includes an Internet of Things data collection and monitoring system for validating reliability of a guarantee for a loan. An example system includes a robotic process automation system for negotiation of a set of terms and conditions for a loan. An example system includes a robotic process automation system for loan collection. An example system includes a robotic process automation system for at least one of consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a smart contract system that automatically adjusts an interest rate for a loan based on information collected via at least one of an Internet of Things system, a crowdsourcing system, a set of social network analytic services and a set of data collection and monitoring services. An example system includes a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for negotiation of a set of terms and conditions for a loan. An example system includes a robotic process automation system for at least one of a loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a crowdsourcing system for obtaining information about at least one of a state of a set of collateral for a loan and a state of an entity relevant to a guarantee for a loan. An example system includes a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a smart contract that automatically adjusts an interest rate for a loan based on at least one of a regulatory factor and a market factor for a specific jurisdiction. An example system includes a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond.

An example system includes an Internet of Things data collection and monitoring system, with artificial intelligence for classifying a condition about a bond.

An example system includes a system that varies the terms and conditions of a subsidized loan based on a parameter monitored by at least one of the IoT, a social network, or crowdsourcing.

An example system includes an automated blockchain custody service for managing a set of custodial assets.

An example system includes an underwriting system for a loan with a set of data-integrated microservices including data collection and monitoring services, blockchain services, artificial intelligence services, and smart contract services for underwriting lending entities and transactions.

An example system includes a loan marketing system with a set of data-integrated microservices including data collection and monitoring services, blockchain services, artificial intelligence services and smart contract services for marketing a loan to a set of prospective parties.

An example system includes a rating system with a set of data-integrated microservices including data collection and monitoring services, blockchain services, artificial intelligence services, and smart contract services for rating a set of loan-related entities.

An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a smart contract that automatically restructures debt based on a monitored condition. An example system includes a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a social network monitoring system for validating the reliability of a guarantee for a loan. An example system includes an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having an Internet of Things data collection and monitoring system for validating reliability of a guarantee for a loan. An example system includes a robotic process automation system for at least one of negotiation of a set of terms and conditions for a loan, loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a robotic process automation system for negotiation of a set of terms and conditions for a loan. An example system includes a robotic process automation system for at least one of loan collection, consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a loan and having a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a robotic process automation system for loan collection. An example system includes a robotic process automation system for at least one of consolidating a set of loans, managing a factoring loan, or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a robotic process automation system for consolidating a set of loans. An example system includes a robotic process automation system for at least one of managing a factoring loan or brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a robotic process automation system for managing a factoring loan. An example system includes a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a robotic process automation system for brokering a mortgage loan. An example system includes a crowdsourcing and automated classification system for validating condition of an issuer for a bond. An example system includes a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network. An example system includes a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a crowdsourcing and automated classification system for validating condition of an issuer for a bond. An example system includes a social network monitoring system with artificial intelligence for classifying a condition about a bond. An example system includes an Internet of Things data collection and monitoring system, with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a social network monitoring system with artificial intelligence for classifying a condition about a bond. An example system includes an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having an Internet of Things data collection and monitoring system with artificial intelligence for classifying a condition about a bond. An example system includes a system that varies the terms and conditions of a subsidized loan based on a parameter monitored by at least one of the IoT, a social network, or crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a system that varies the terms and conditions of a subsidized loan based on a parameter monitored by the IoT. An example system includes a system that varies the terms and conditions of a subsidized loan based on a parameter monitored at least one of in a social network or by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a system that varies the terms and conditions of a subsidized loan based on a parameter monitored in a social network. An example system includes a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a system that varies the terms and conditions of a subsidized loan based on a parameter monitored by crowdsourcing. An example system includes an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having an automated blockchain custody service for managing a set of custodial assets. An example system includes an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having an underwriting system for a loan with a set of data-integrated microservices including data collection and monitoring services, blockchain services, artificial intelligence services, and smart contract services for underwriting lending entities and transactions. An example system includes a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes having a compliance system with a set of data-integrated microservices including data collection and monitoring services, blockchain services, artificial intelligence services, and smart contract services for automatically facilitating compliance with at least one of a law, a regulation and a policy related to a lending transaction.

An example lending platform is provided herein having a loan marketing system with a set of data-integrated microservices including data collection and monitoring services, blockchain services, artificial intelligence services and smart contract services for marketing a loan to a set of prospective parties. An example system includes a rating system with a set of data-integrated microservices including data collection and monitoring services, blockchain services, artificial intelligence services, and smart contract services for rating a set of loan-related entities. An example system includes a compliance system with a set of data-integrated microservices including data collection and monitoring services, blockchain services, artificial intelligence services, and smart contract services for automatically facilitating compliance with at least one of a law, a regulation and a policy related to a lending transaction. In embodiments a lending platform is provided herein having a rating system with a set of data-integrated microservices including data collection and monitoring services, blockchain services, artificial intelligence services, and smart contract services for rating a set of loan-related entities and having a compliance system with a set of data-integrated microservices including data collection and monitoring services, blockchain services, artificial intelligence services, and smart contract services for automatically facilitating compliance with at least one of a law, a regulation and a policy related to a lending transaction.

In embodiments, a database service may be provided herein that embodies, enables, or is associated with a blockchain, ledger, such as a distributed ledger, or the like, such as in connection with any of the embodiments described herein or in the document incorporated by reference that refer to them. In embodiments, the database service may comprise a transparent, immutable, and cryptographically verifiable ledger database service, such as the Amazon™ QLDB™ database service. The database service may be included within one or connected with or more of the layers or microservices of a system 3300, such as the adaptive intelligent services layer 3304 or the data storage layer 3310. The service may be used, for example, in connection with a centralized ledger that records all changes or transactions and maintains an immutable record of these changes, such as by tracing an entity through various environments or processes, tracking the history of debits and credits in a series of transactions, or validating facts relevant to an underwriting process, a claim, or a legal or regulatory proceeding. A ledger may be owned by a single trusted entity or set of trusted entities and may be shared with any other entities, such as ones that working together in a coordinated process, such as a transaction, a production process, a joint service, or many others. As compared to a relational database, the database service may provide immutable, cryptographically verifiable ledger entries, without the need for custom audit tables or trails. As compared to a blockchain framework, such a database service may include capabilities to perform queries, create tables, index data, and the like. The database service may optionally omit requirements for many blockchain frameworks that slow performance, such as requirement of consensus before committing transactions, or the database service may employ optional consensus features. In embodiments, the database service may comprise transparent, immutable, and cryptographically verifiable ledger that users can use to build applications that act as a system of record, where multiple parties are transacting within a centralized, trusted entity or set of entities. The database service may complement or substitute for the building audit functionality into a relational database or for using conventional distributed ledger capabilities in a blockchain framework. The database service may use an immutable transactional log or journal, which may track each application data change and maintain a comprehensive and verifiable history of changes. In embodiments, transactions may be configured to comply with requirements of atomicity, consistency, isolation, and durability (ACID) to be logged in the log or journal, which is configured to prevent deletions or modifications. Changes may be cryptographically chained, such that they are auditable and verifiable, such as in a history that users can query or analyze, such as using conventional query types, such as SQL queries. In embodiments, the database service may be provided in a serverless form, such that there is no need to provision specific server capacity or to configure read/write limits. To initiate the database service, the user can create a ledger, define tables, and the like, and the database service will automatically scale to support application demands. In contrast to blockchain-based ledgers, a database service may omit requirements for a distributed consensus, so it can execute more transactions in the same time.

In embodiments of the present disclosure that refer to a blockchain or distributed ledger, a managed blockchain service may be used, such as the Amazon™ Managed Blockchain™, which may comprise a facility for convenient creation and management of a scaled blockchain network. The managed blockchain service may be provided as part of a layered data services architecture as described in this disclosure. In situations where users want immutable and verifiable capability provided by a blockchain or ledger, they may also seek the ability to allow multiple parties to transact, execute contracts (such as in smart contract embodiments described herein), share data, and the like without a trusted central authority. As setting up conventional blockchain frameworks requires significant time and technical expertise, where each participant in a permissioned network has to provision hardware, install software, create, and manage certificates for access control, and configure network settings. As a given blockchain application grows, there is also activity required to scale the network, monitor resources across blockchain nodes, add or remove hardware and manage network availability. In embodiments, a managed blockchain service may provide for management of each of these requirements and enabling capabilities. This may include supporting open source blockchain frameworks and enabling selection, setup and deployment of a selected framework in a dashboard, console, or other user interface, wherein users may choose their preferred framework, add network members, and configure member nodes that will process transaction requests. The managed blockchain service may then automatically create a blockchain network, such as one that can span multiple accounts with multiple nodes per member, and configure software, security, and network settings. The managed blockchain service may secure and manage network certificates, such as with a key management service, which may allow customer management of the keys. In embodiments, the managed blockchain service may include one or more APIs, such as a voting API, such as one that allows network members to vote, such as to vote to add or remove members. As application usage grows for a given application (such as any of the noted applications described in connection with the platform 3300), users can add more capacity to the blockchain network, such as with a simple API call. In embodiments, the managed blockchain service may be provided with a range of combinations of compute and memory capacity, such as to give users the ability to choose the right mix of resources for a given blockchain-based application.

Figure 69:
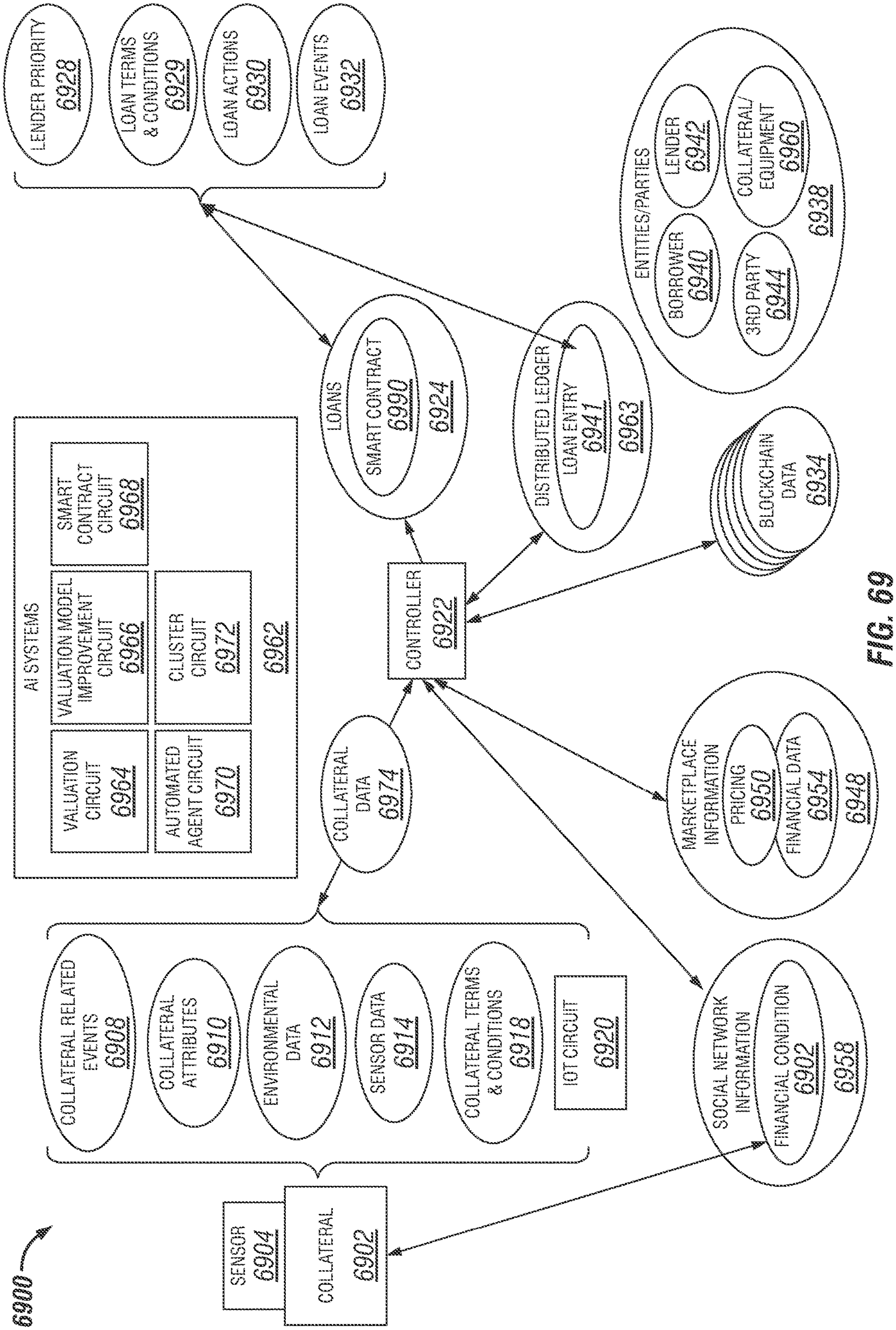
FIG. 69, depicts a system for automated loan management.

Referring to FIG. 69, a system for automated loan management is depicted. A variety of entities/parties 6938 may have a connection to a loan 6924 including a borrower 6940, a lender 6942, 3rd parties 6944 such as a neutral 3rd party (e.g. such as an assessor, or an interested 3rd party (e.g., a regulator, company employees, and the like). A loan 6924 may be subject to a smart lending contract 6990 including information such as loan terms and conditions 6929, loan actions 6930, loan events 6932, lender priorities 6928. And the like. The smart lending contract 6990 may be recording in loan entry 6941 in a distributed ledger 6963. The smart lending contract 6990 may be stored as blockchain data 6934.

In an illustrative example, controller 6922 may receive collateral data 6974 such as collateral related events 6908, collateral attributes 6910, environmental data 6912 about an environment in which the collateral 6902 is situated, sensor data 6914 where the senor 6904 may be affixed to an item of collateral, to a case containing an item of collateral or in proximity to an item of collateral. In embodiments, collateral data may be acquired by an Internet of Things Circuit 6920, a camera system, a networked monitoring system, an internet monitoring system, a mobile device system, a wearable device system, a user interface system, and an interactive crowdsourcing system.

The controller 6922 may also monitor and/or receive data from a social network information 6958 from which a financial condition 6992 may be inferred such as a rating of a party, a tax status of a party, a credit report of the party, a credit rating of a party, a website rating of a party, a set of customer reviews for a product of a party, a social network rating of a party, a set of credentials of a party, a set of referrals of a party, a set of testimonials for a party, a set of behavior of a party, and the like. The controller 6922 may also receive marketplace information 6948 such as pricing 6950, financial data 6954 such as a publicly stated valuation of the party, a set of property owned by the party as indicated by public records, a valuation of a set of property owned by the party, a bankruptcy condition of the party, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, and the like.

In embodiments, artificial intelligence systems 6962 may be part of a controller 6922 or on remote systems. The AI systems 6962 may include a valuation circuit 6964 structured to determine a value for an item of collateral based on collateral data 6974 and a valuation model and a value model improvement circuit 6966 to improve the valuation model on the basis of a first set of received collateral data 6974 and the outcome of loans for which collateral associated with that first set of received collateral data acted as security. The AI systems 6962 may include an automated agent circuit 6970 that takes action based on collateral events, loan-events and the like. Actions may include loan-related actions such as offering the loan, accepting the loan, underwriting the loan, setting an interest rate for the loan, deferring a payment requirement, modifying an interest rate for the loan, validating title for collateral, recording a change in title, assessing a value of collateral, initiating inspection of collateral, calling the loan, closing the loan, setting terms and conditions for the loan, providing notices required to be provided to a borrower, foreclosing on property subject to the loan, modifying terms and conditions for the loan, and the like. Actions may include collateral-related actions such as validating title for the one of the assigned set of items of collateral, recording a change in title for the one of the assigned set of items of collateral, assessing the value of the one of the assigned set of items of collateral, initiating inspection of the one of the assigned set of items of collateral, initiating maintenance of the one of the assigned set of items of collateral, initiating security for the one of the assigned set of items of collateral, modifying terms and conditions for the one of the assigned set of items of collateral, and the like. The AI systems 6962 may include a cluster circuit 6972 to create groups of items of collateral based on a common attribute. The cluster circuit 6972 may also determine a group of off-set items of collateral where the off-set items of collateral share a common attribute with one or more items of collateral. Data may be gathered on the off-set items of collateral and use it as representative of the items of collateral. A smart contract circuit 6968 may create a smart lending contract 6990 as described elsewhere herein.

Figure 70:
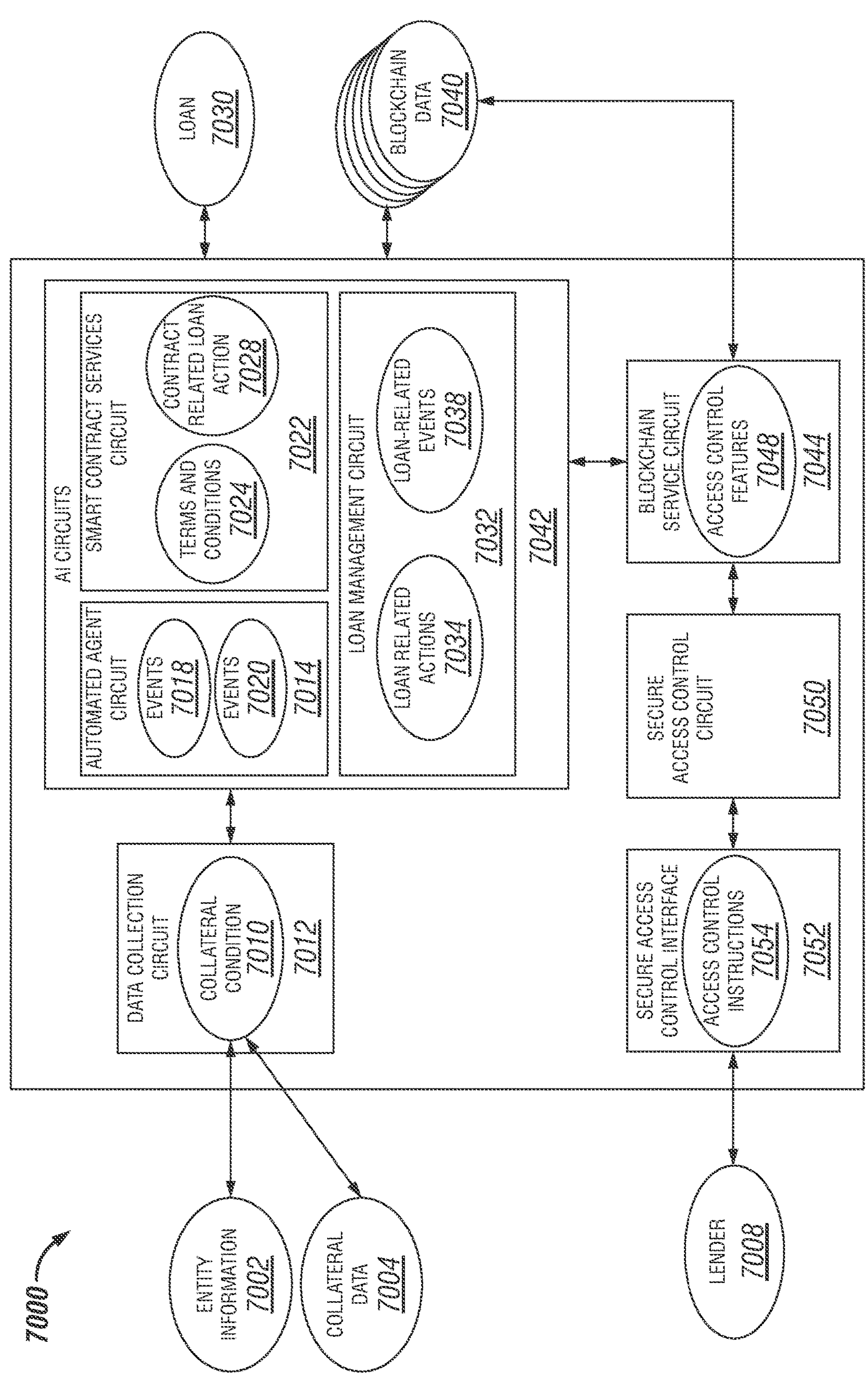
FIG. 70 depicts a system.

Referring to FIG. 70, a controller may include a blockchain service circuit 7044 structured to interpret a plurality of access control features 7048 such as corresponding to parties associated with a loan 7030 and associated with blockchain data 7040. The system may include a data collection circuit 7012 structured to interpret entity information 7002, collateral data 7004, and the like, such as corresponding to entities related to a lending transaction corresponding to the loan, collateral conditions, and the like. The system may include a smart contract circuit 7022 structured to specify loan terms and conditions 7024, contracts 7028, and the like, relating to the loan. The system may include a loan management circuit 7032 structured to interpret loan related actions 7034 and/or events 7038 in response to the entity information, the plurality of access control features, and the loan terms and conditions, where the loan related events are associated with the loan; implement loan related activities in response to the entity information, the plurality of access control features, and the loan terms and conditions, wherein the loan related activities are associated with the loan; and where each of the blockchain service circuit, the data collection circuit, the smart contract circuit, and the loan management circuit further comprise a corresponding application programming interface (API) component structured to facilitate communication among the circuits of the system. For example, a lender 7008 may interface with the controller through secure access control interface 7052 (e.g., through access control instructions 7054) structured to interface to the controller through a secure access control circuit 7050. The data collection circuit 7012 may be structured to receive collateral data 7004 and entity information 7002 such as information about parties to the loan such as a lender, a borrower, or a third party, an item of collateral, a machine or property associated with a party to the loan, a product of a party to the loan, and the like. Collateral data 7004 may include a type of the item of collateral, a category of the item of collateral, a value of the item of collateral, a price of a type of the item of collateral, a value of a type of the item of collateral, a specification of the item of collateral, a product feature set of the item of collateral, a model of the item of collateral, a brand of the item of collateral, a manufacturer of the item of collateral, an age of the item of collateral, a liquidity of the item of collateral, a shelf-life of the item of collateral, a useful life of the item of collateral, a condition of the item of collateral, a valuation of the item of collateral, a status of the item of collateral, a context of the item of collateral, a state of the item of collateral, a storage location of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a maintenance history of the item of collateral, a usage history of the item of collateral, an accident history of the item of collateral, a fault history of the item of collateral, a history of ownership of the item of collateral, an assessment of the item of collateral, a geolocation of the item of collateral, a jurisdictional location of the item of collateral, and the like. The data collection circuit 7012 may determine a collateral condition based on the received data. The received data 7002, 7004 and the collateral condition 7010 may be provided to AI circuits 7042 which may include an automated agent circuit 7014 (e.g., processing events 7018, 7020), a smart contract services circuit 7022 and a loan management circuit 7032.

Figure 71:
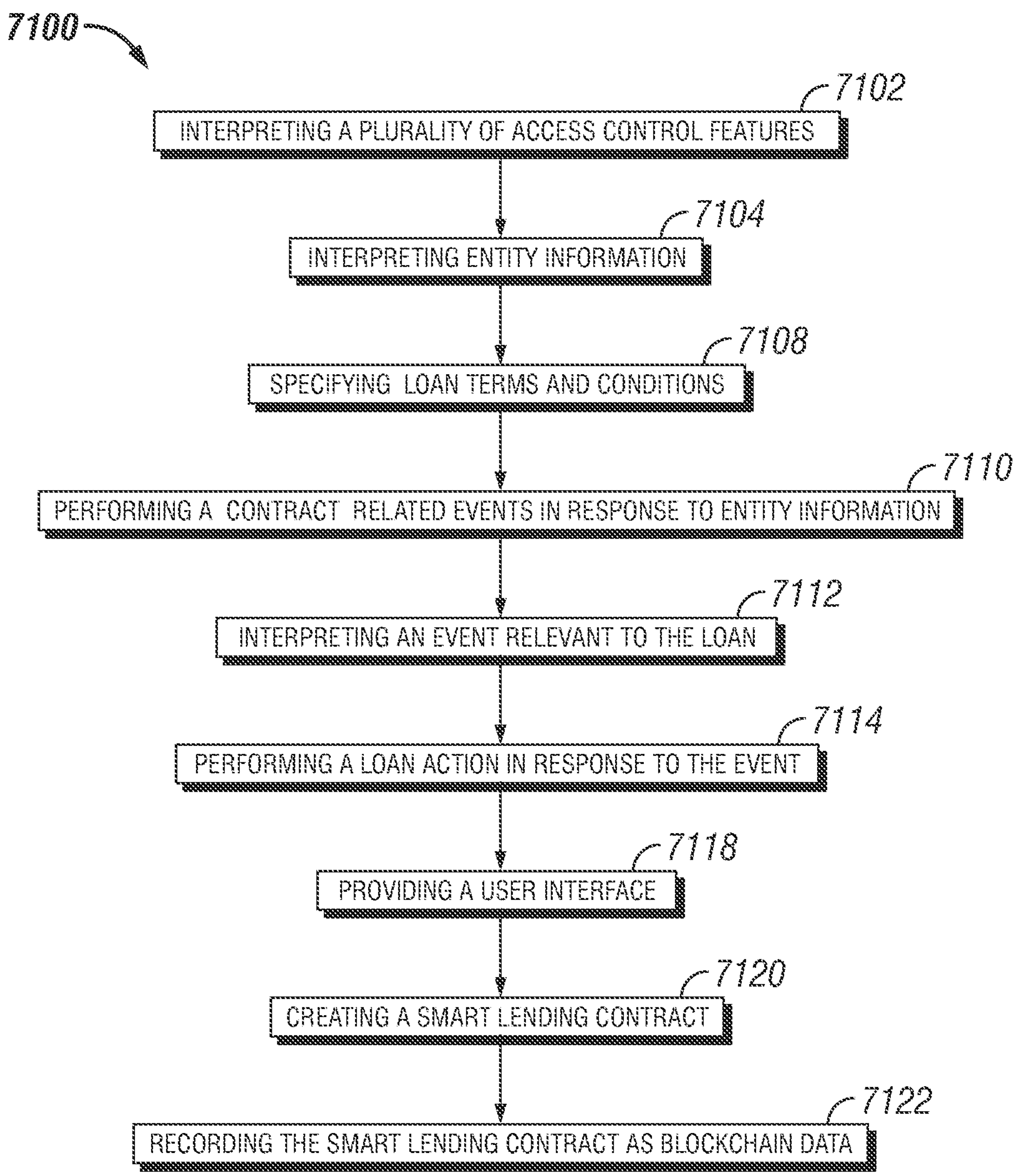
FIG. 71 depicts a method for handling a loan.

Referring to FIG. 71, an illustrative and non-limiting example method for handling a loan 7100 is depicted. The example method may include interpreting a plurality of access control features (step 7102); interpreting entity information (step 7104); specifying loan terms and conditions (step 7108); performing a contract related events in response to entity information (step 7110); interpreting an event relevant to the loan (step 7112); performing a loan action in response to the event (step 7114); providing a user interface (step 7118); creating a smart lending contract (step 7120); and recording the smart lending contract as blockchain data (step 7122).

Figure 72:
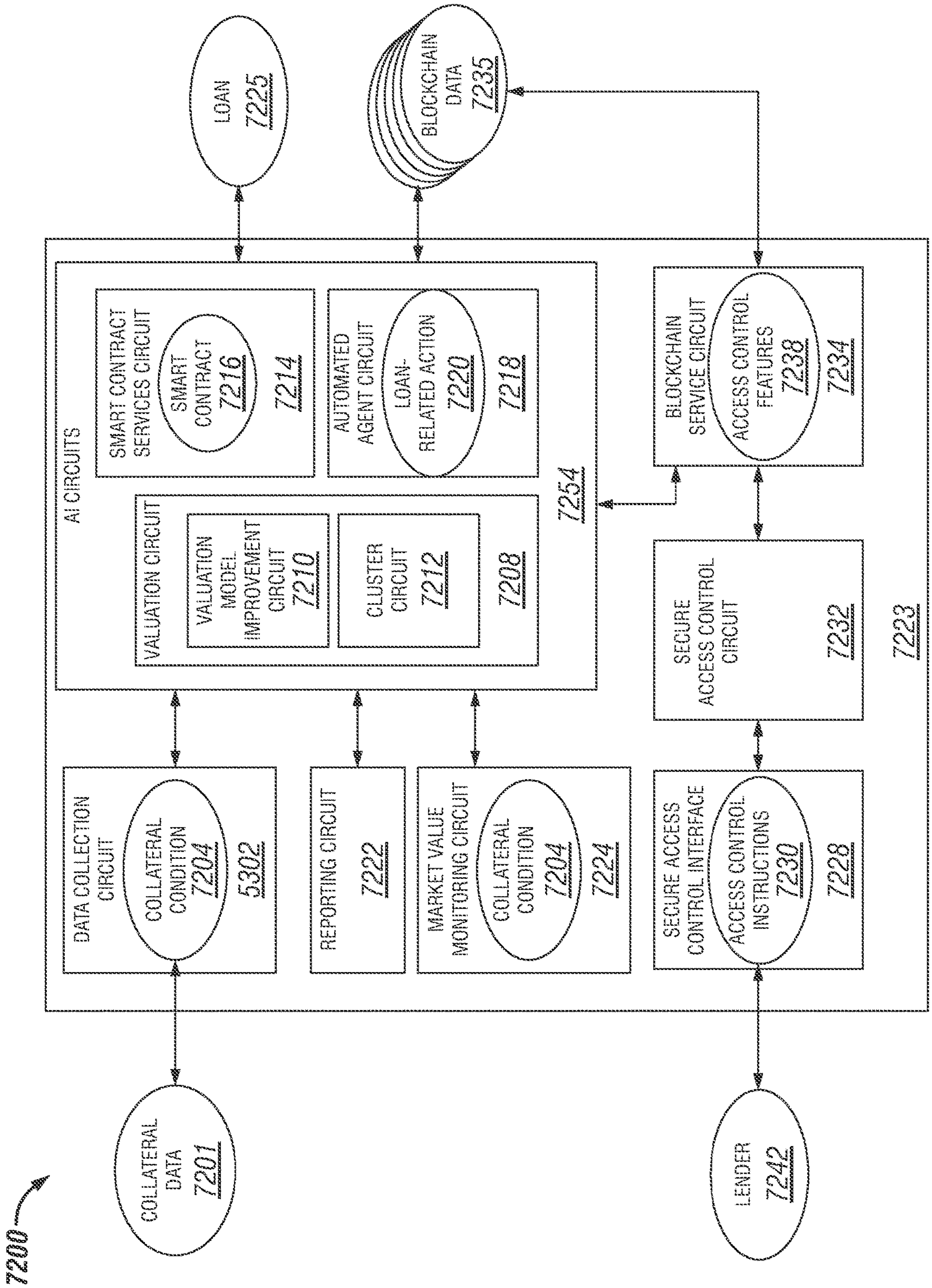
FIG. 72 depicts a system for adaptive intelligence and robotic process automation capabilities of a transactional, financial and marketplace enablement.

Referring to FIG. 72, depicts a system 7200 for adaptive intelligence and robotic process automation capabilities of a transactional, financial and marketplace enablement. The system 7200 may include a controller 7223 which may include a data collection circuit 7202 which receives collateral data 7201 and determines collateral condition 7204. The controller 7223 may further include a plurality of AI circuits 7254. The plurality of AI circuits 7254 may include a valuation circuit 7208 which may include a valuation model improvement circuit 7210 and a cluster circuit 7212. The plurality of AI circuits 7254 may include a smart contract services circuit 7214 including smart lending contracts 7216 for loans 7225. The plurality of AI circuits 7254 may include an automated agent circuit 7218 which takes loan-related actions 7220. The controller 7223 may further include a reporting circuit 7222 and a market value monitoring circuit 7224 which also determines collateral condition 7204. The controller 7223 may further include a secure access user interface 7228 which receives access control instructions 7230 from lenders 7242. The access control instructions 7230 are provided to a secure access control circuit 7232 which provides instructions to blockchain service circuit 7234 which interprets access control features 7238 and provides access to a lender 7242 or other party. The blockchain service circuit 7234 all stores the collateral data and a unique collateral ID as blockchain data 7235.

Figure 73:
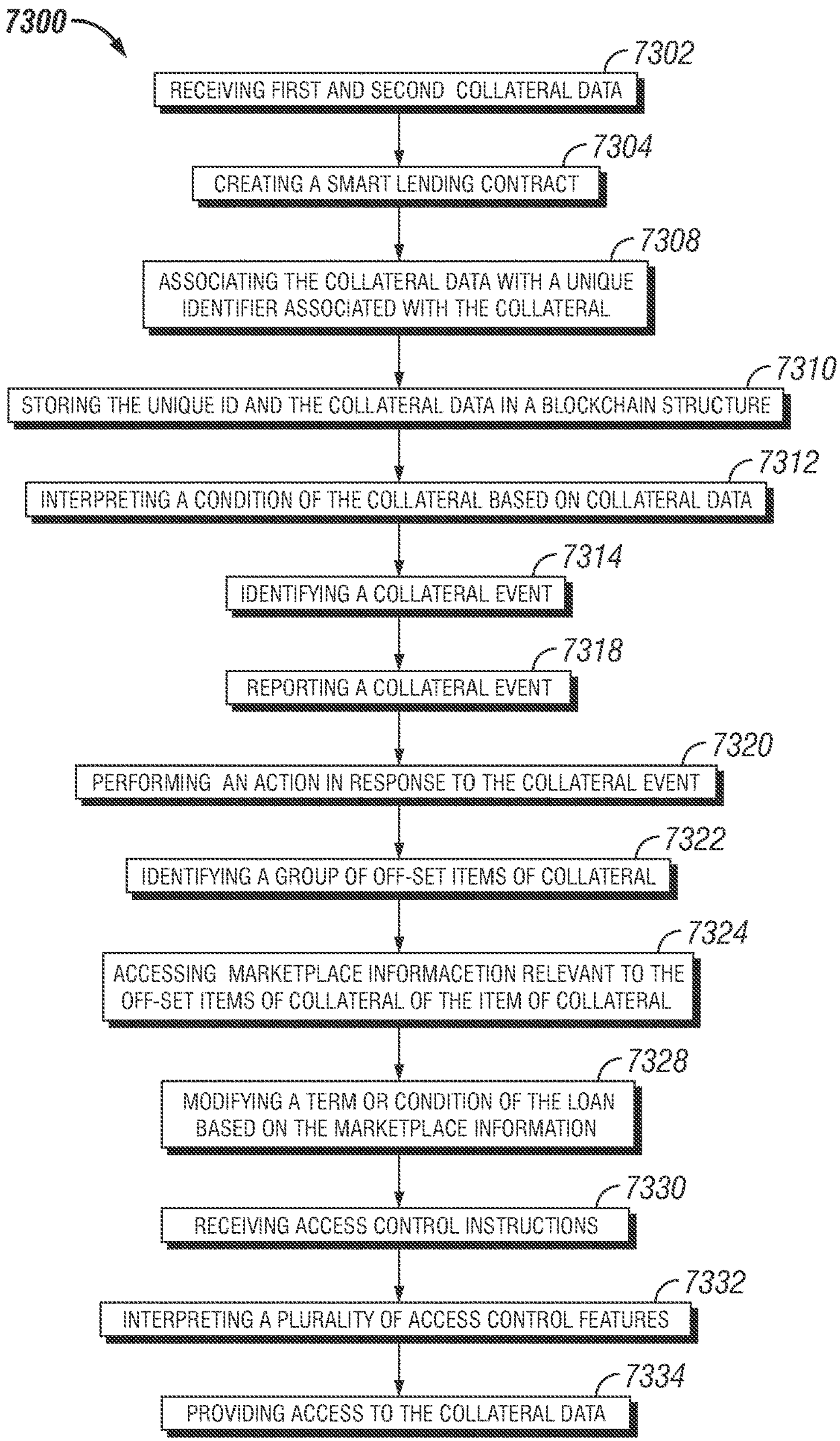
FIG. 73 depicts a method for automated smart contract creation and collateral assignment.

Referring to FIG. 73, a method 7300 for automated smart contract creation and collateral assignment is depicted. The method 7300 may include receiving first and second collateral data regarding an item of collateral 7302, creating a smart lending contract 7304, associating the collateral data with a unique identifier for the item of collateral 7308, and storing the unique identifier and the collateral in a blockchain structure 7310. The method may further include interpreting a condition of the collateral based on the collateral data 7312, identifying a collateral event 7314, reporting a collateral event 7318, and performing an action in response to the collateral 7320. The method 7300 may further include identifying a group of off-set items of collateral 7322, accessing marketplace information relevant to the off-set items of collateral or the item of collateral 7324, and modifying a term or condition of the loan based on the marketplace information 7328. The method 7300 may further include receiving access control instructions 7330, interpreting a plurality of access control features 7332, and providing access to the collateral date 7334.

Figure 74:
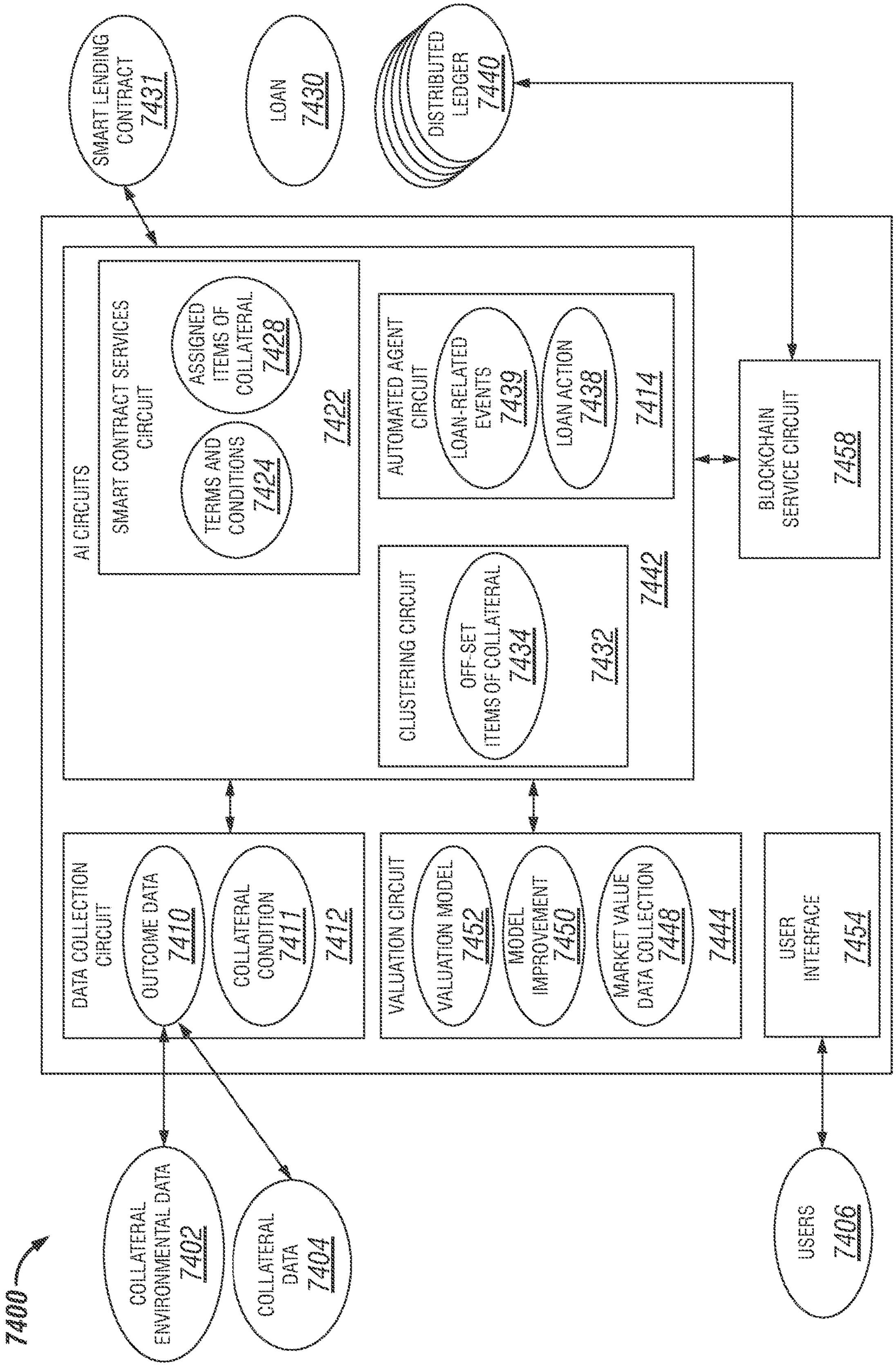
FIG. 74 depicts a system for handling a loan.

Referring to FIG. 74, an illustrative and non-limiting example system for handling a loan 7400 is depicted. The example system may include a controller 7401. The controller 7401 may include a data collection circuit 7412, a valuation circuit 7444, a user interface 7454 (e.g., for interface with a user 7406), a blockchain service circuit 7458, and several artificial intelligence circuits 7442 including a smart contract services circuit 7422, a loan management circuit 7492, a clustering circuit 7432, an automated agent circuit 7414 (e.g., for processing loan related events 7439 and loan actions 7438).

The blockchain service circuit 7458 may be structured to interface with a distributed ledger 7440. The data collection circuit 7412 may be structured to receive data related to a plurality of items of collateral 7404 or data related to environments of the plurality of items of collateral 7402. The valuation circuit 7444 may be structured to determine a value for each of the plurality of items of collateral based on a valuation model 7452 and the received data. The smart contract services circuit 7422 may be structured to interpret a smart lending contract 7431 for a loan, and to modify the smart lending contract 7431 by assigning, based on the determined value for each of the plurality of items of collateral, at least a portion of the plurality of items of collateral 7428 as security for the loan such that the determined value of the of the plurality of items of collateral is sufficient to provide security for the loan. The blockchain service circuit 7458 may be further structured to record the assigned at least a portion of items of collateral 7428 to an entry in the distributed ledger 7440, wherein the entry is used to record events relevant to the loan. Each of the blockchain service circuit, the data collection circuit, the valuation circuit and the smart contract circuit may further include a corresponding application programming interface (API) component structured to facilitate communication among the circuits of the system.

Modifying the smart lending contract 7431 may further include specifying terms and conditions 7424 that govern an item selected from the list consisting of: a loan term, a loan condition, a loan-related event, and a loan-related activity. The terms and conditions 7424 may each include at least one member selected from the group consisting of: a principal amount of the loan, a balance of the loan, a fixed interest rate, a variable interest rate description, a payment amount, a payment schedule, a balloon payment schedule, a collateral specification, a collateral substitution description, a description of at least one of the parties, a guarantee description, a guarantor description, a security description, a personal guarantee, a lien, a foreclosure condition, a default condition, a consequence of default, a covenant related to any one of the foregoing, and a duration of any one of the foregoing.

The loan 7430 may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The item of collateral may include at least one item selected from the items consisting of: a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, and an item of personal property.

The data collection circuit 7412 may be further structured to receive outcome data 7410 related to the loan 7430 and a corresponding item of collateral, and wherein the valuation circuit 7444 comprises an artificial intelligent circuit structured to iteratively improve 7450 the valuation model 7452 based on the outcome data 7410.

The valuation circuit 7444 may further include a market value data collection circuit 7448 structured to monitor and report marketplace information relevant to the value of at least one of the plurality of items of collateral. The market value data collection circuit 7448 may be further structured to monitor pricing or financial data for items that are similar to the item of collateral in at least one public marketplace.

The clustering circuit 7432 may be structured to identify a set of offset items 7434 for use in valuing the item of collateral based on similarity to an attribute of the collateral.

The attribute of the collateral may be selected from among a list of attributes consisting of: a category of the collateral, an age of the collateral, a condition of the collateral, a history of the collateral, a storage condition of the collateral, and a geolocation of the collateral.

The data collection circuit 7412 may be further structured to interpret a condition 7411 of the item of collateral.

The data collection circuit may further include at least one system selected from the systems consisting of: an Internet of Things system, a camera system, a networked monitoring system, an internet monitoring system, a mobile device system, a wearable device system, a user interface system, and an interactive crowdsourcing system.

The loan includes at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

A loan management circuit 7492 may be structured to interpret an event relevant to the loan 7439, and to perform an action 7438 related to the loan in response to the event relevant to the loan.

The event relevant to the loan may include an event relevant to at least one of: a value of the loan, a condition of collateral of the loan, or an ownership of collateral of the loan.

The action related to the loan may include at least one of: modifying the terms and conditions for the loan, providing a notice to one of the parties, providing a required notice to a borrower of the loan, and foreclosing on a property subject to the loan.

The corresponding API components of the circuits may further include user interfaces structured to interact with a plurality of users of the system.

The plurality of users may each include: one of the plurality of parties, one of the plurality of entities, or a representative of any one of the foregoing. At least one of the plurality of users may include: a prospective party, a prospective entity, or a representative of any one of the foregoing.

Figure 75:
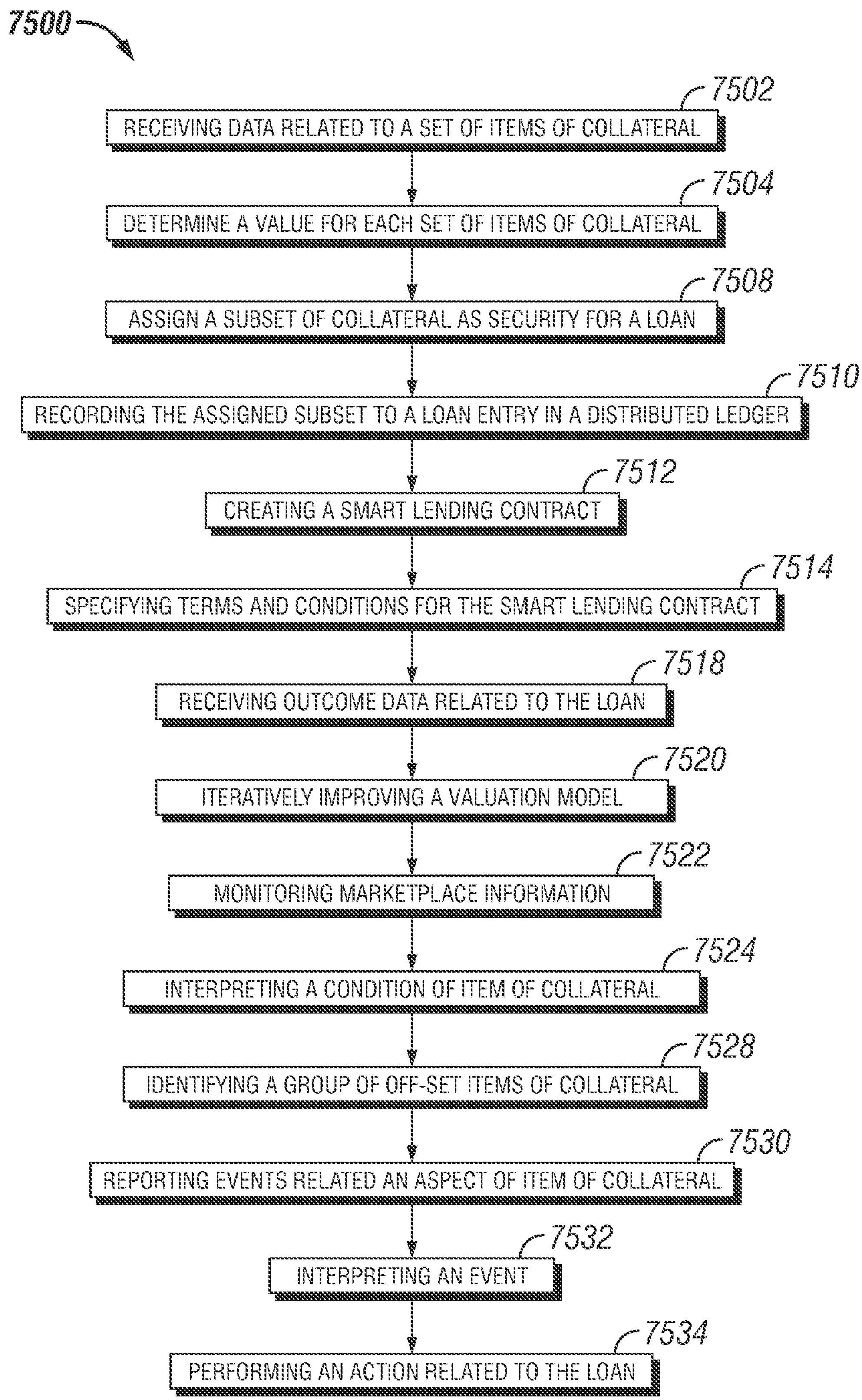
FIG. 75 depicts a method for handling a loan.

Referring to FIG. 75, an illustrative and non-limiting example method for handling a loan 7500 is depicted. The example method may include receiving data related to a plurality of items of collateral (step 7502); setting a value for each of the plurality of items of collateral (step 7504); assigning at least a portion of the plurality of items of collateral as security for a loan (step 7508); and recording the assigned at least a portion of the plurality of items of collateral to an entry in a distributed ledger, wherein the entry is used to record events relevant to the loan (step 7510). A smart lending contract may be modified for the loan (step 7512).

Terms and conditions may be specified for the loan (step 7514). The terms and conditions are each selected from the list consisting of: a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, and a consequence of default.

Outcome data related to the loan may be received (step 7518). A valuation model may be iteratively improved based on the outcome data and corresponding collateral (step 7520). Marketplace information relevant to the value of at least one of the plurality of items of collateral may be monitored (step 7522).

A set of items similar to one of the plurality of items of collateral may be identified based on similarity to an attribute of the one of the plurality of items of collateral (step 7524).

A condition of the one of the plurality of items of collateral may be interpreted (step 7528).

Events related to a value of the one of the plurality of items of collateral, a condition of the one of the plurality of items of collateral, or an ownership of the one of the items of collateral may be reported (step 7530).

An event relevant to: a value of one of the plurality of items of collateral, a condition of one of the plurality of items of collateral, or an ownership of one of the plurality of items of collateral may be interpreted (step 7532); and an action related to the secured loan in response to the event relevant to the one of the plurality of items of collateral for said secured loan may be performed (step 7534).

The loan-related action may be selected from among the actions consisting of: offering a loan, accepting a loan, underwriting a loan, setting an interest rate for a loan, deferring a payment requirement, modifying an interest rate for a loan, validating title for collateral, recording a change in title, assessing the value of collateral, initiating inspection of collateral, calling a loan, closing a loan, setting terms and conditions for a loan, providing notices required to be provided to a borrower, foreclosing on property subject to a loan, and modifying terms and conditions for a loan.

Figure 76:
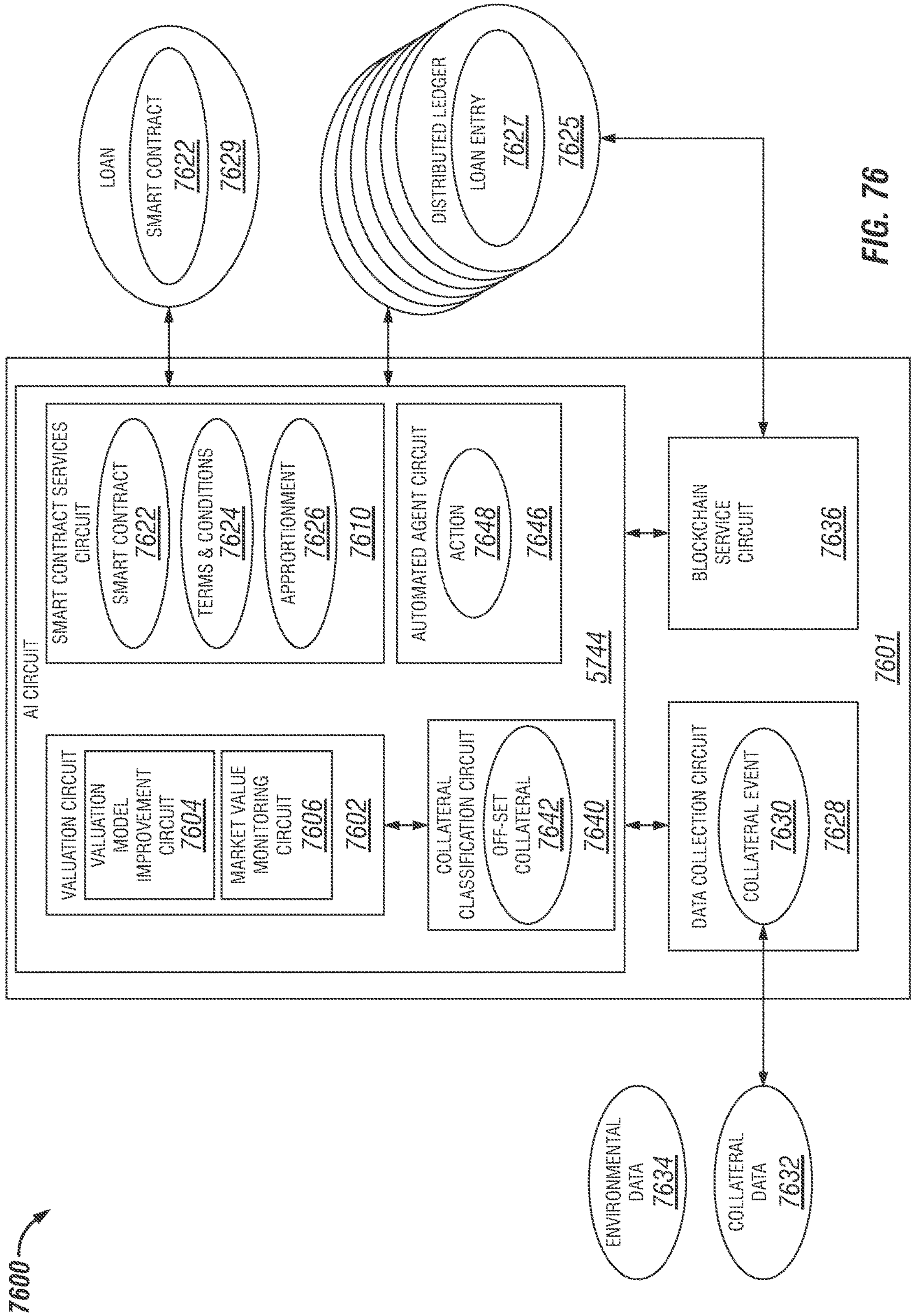
FIG. 76 depicts a system for adaptive intelligence and robotic process automation.

Referring to FIG. 76, an illustrative and non-limiting example system for adaptive intelligence and robotic process automation capabilities 7600 is depicted. The example system may include a controller 7601. The controller may include a data collection circuit 7628 which may collect data such as collateral data 7632, environmental data 7634 related to the collateral, and the like from a variety of sources and systems such as: an Internet of Things system, a camera system, a networked monitoring system, an internet monitoring system, a mobile device system, a wearable device system, a user interface system, and an interactive crowdsourcing system. Based on the received data 7632, 7634 the data collection circuit 7628 may identify a collateral event 7630.

The controller 7601 may also include a variety of AI circuits 7644, including a valuation circuit 7602 which may, based in part on the received data 7632, 7634, determine a value for an item of collateral. The valuation circuit 7602 may include a market value monitoring circuit 7606 structured to determine market data regarding an item of collateral or an off-set item of collateral, where the market data may contribute to the valuation for the item of collateral. The AI circuits may also include a smart contract services circuit 7610 to facilitate services related to a loan 7629 such as creating a smart contract 7622, identifying terms and conditions 7624 for the smart contract 7622, identifying lender priorities and tracking apportionment of value 7626 among lenders. The smart contract services circuit 7610 may provide data to a block chain service circuit 7636 which is able to create and modify a loan entry 7627 on a distributed ledger 7625 where the loan entry 7627 may include terms and conditions, data regarding items of collateral used to secure the loan, lender priority and apportionment of value and the like. The AI circuits 7644 may also include a collateral classification circuit 7640 which creates groups of off-set items of collateral 7604 which share at least one attribute with one of the items of collateral, where the common attribute may be a category of the items, an age of the items, a condition of the items, a history of the items, an ownership of the items, a caretaker of the items, a security of the items, a condition of an owner of the items, a lien on the items, a storage condition of the items, a geolocation of the items, a jurisdictional location of the items, and the like. The use of off-set items of collateral 7642 may facilitate the market value monitoring circuit 7606 in obtaining relevant market data and in the overall determination of value for an item of collateral.

The data collection circuit 7628 may utilize the received data and a determination of value for an item of collateral to identify a collateral event 7630. Based on the collateral event 7630, an automated agent circuit 7646, may take an action 7648. The action 7648 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like. The action 7648 may be a collateral-related action such as validating title for the one of a set of items of collateral, recording a change in title for one of a set of items of collateral, assessing the value of the one of a set of items of collateral, initiating inspection of one of a set of items of collateral, initiating maintenance of one of a set of items of collateral, initiating security for one of a set of items of collateral, modifying terms and conditions for one of a set of items of collateral, and the like.

Figure 77:
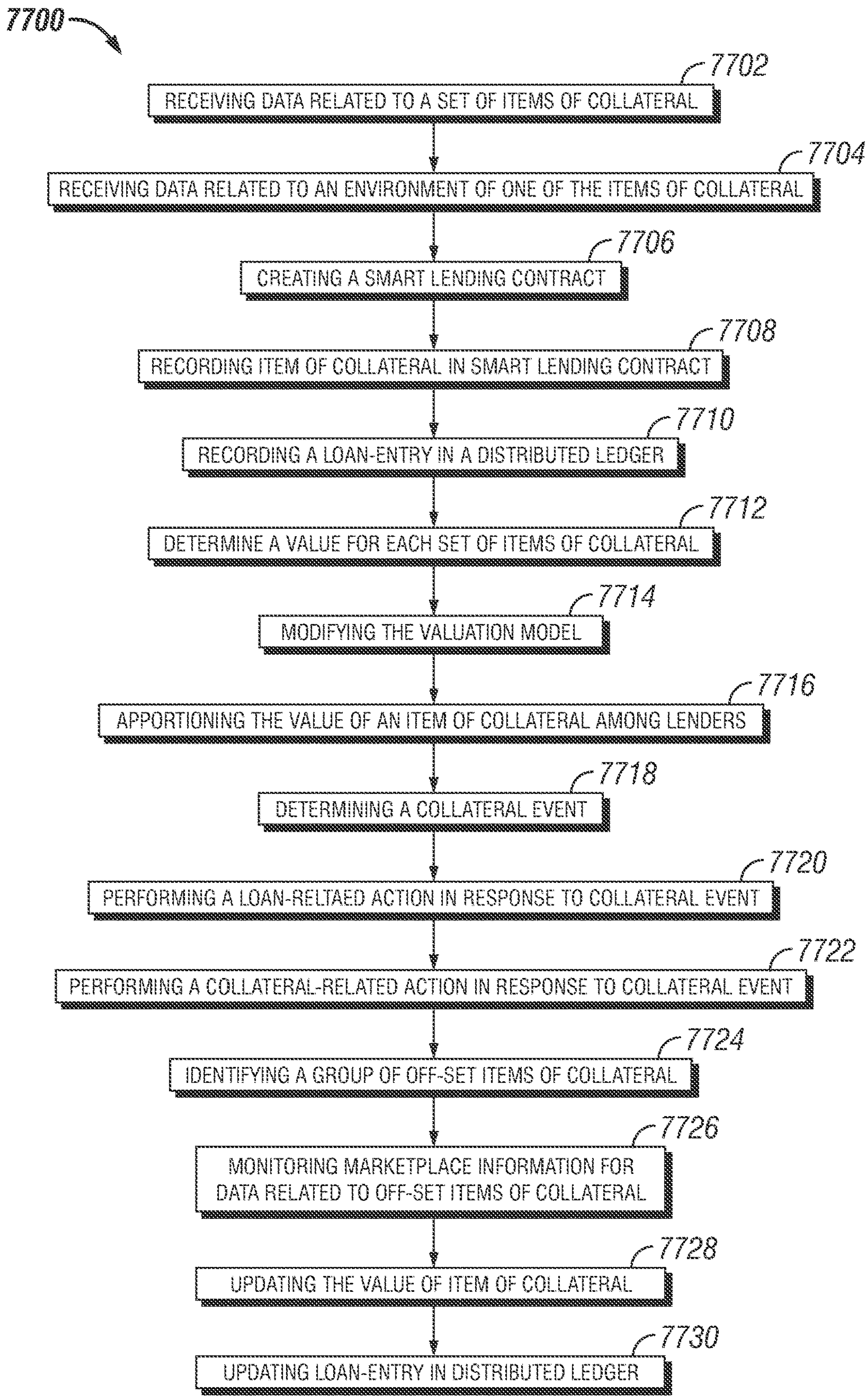
FIG. 77 depicts a method for loan creation and management.

Referring to FIG. 77, an illustrative and non-limiting example method 7700 for loan creation and management is depicted. The example method 7700 may include receiving data related to a set of items of collateral (step 7702) that provide security for a loan and receiving data related to an environment of one of a set of items of collateral (step 7704). A smart lending contract for the loan may be created (step 7706) and the set of items of collateral may be recorded in the smart lending contract (step 7708). A loan-entry may be recoded in a distributed ledger (step 7710) where the loan entry includes the smart lending contract or a reference to the smart contract.

The value for each of the set of items of collateral may be determined (7712) and the value of the items of collateral may be apportioned among lenders (step 7716) based on the priority of the different lenders. The valuation model may be modified (step 7714) based on a learning set including a set of valuation determinations of a set of items of collateral and the outcomes of loans having those items of collateral as security and the valuation of those items of collateral.

A collateral event may be determined (step 7718) based on received data or a valuation of one of the items of collateral. A loan-related action may be performed in response to the determined collateral event (step 7720) where the loan-related action includes offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, or the like.

A collateral-related action may be performed in response to the determined collateral event (step 7722), where the collateral-related action includes validating title for the one of the set of items of collateral, recording a change in title for the one of the set of items of collateral, assessing the value of the one of the set of items of collateral, initiating inspection of the one of the set of items of collateral, initiating maintenance of the one of the set of items of collateral, initiating security for the one of the set of items of collateral, modifying terms and conditions for the one of the set of items of collateral, or the like.

One or more group of off-set items of collateral may be identified (step 7724) where each item in a group of off-set items of collateral shares a common attribute with at least one of the items of collateral. Marketplace information may then be monitored for data related to off-set items of collateral (step 7726). The monitored marketplace information regarding one or more off-set items of collateral may be used to update a value of an item of collateral (step 7728). The loan-entry in the distributed ledger may be updated (7730) with the updated value of the item of collateral.

Figure 78:
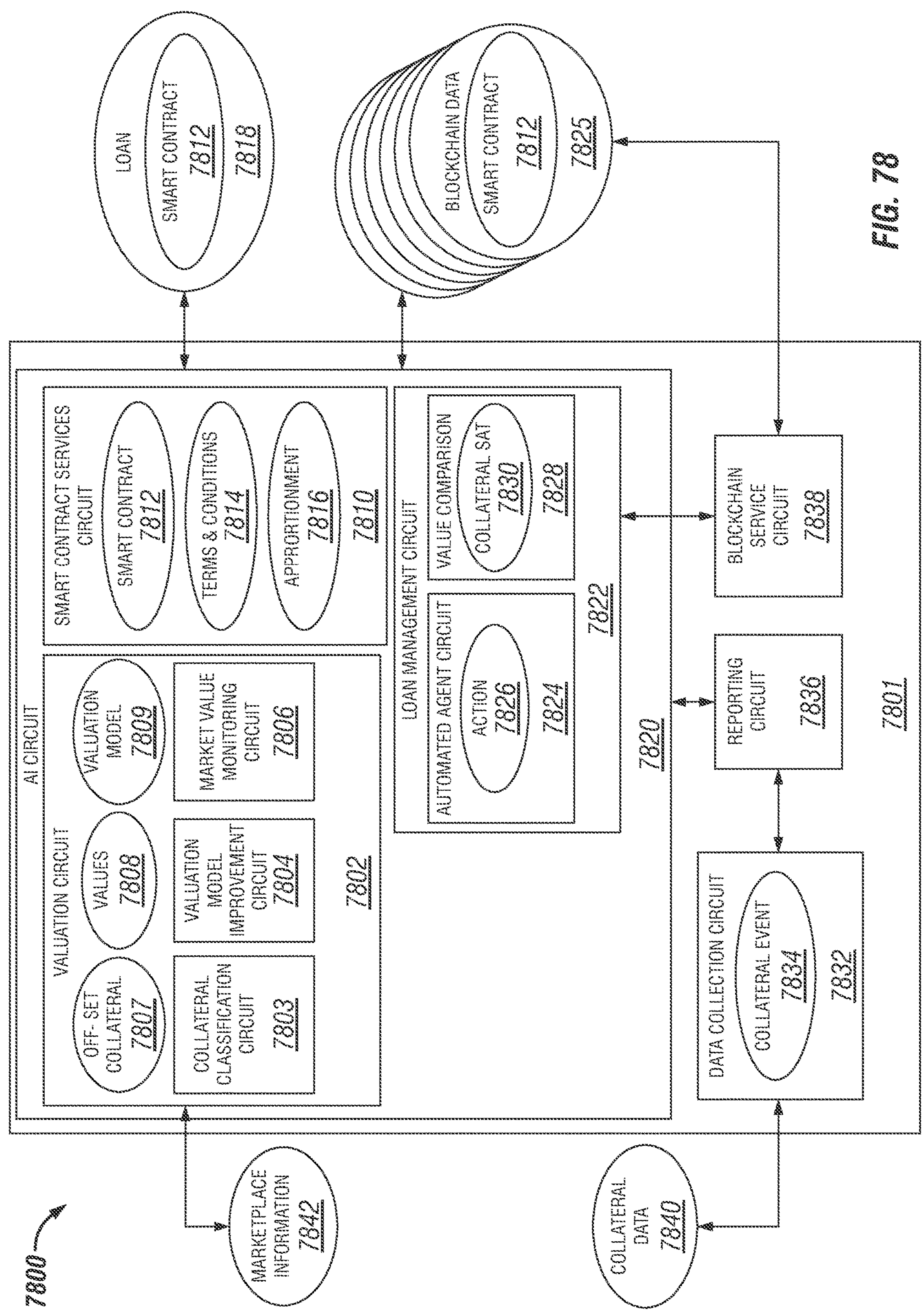
FIG. 78 depicts a system for adaptive intelligence and robotic process automation capabilities of a transactional, financial and marketplace enablement.

Referring to FIG. 78, an example system 7800 for adaptive intelligence and robotic process automation capabilities of a transactional, financial and marketplace enablement is depicted. The system 7800 may include a controller 7801 which may include a plurality of AI circuits 7820. The plurality of AI circuits 7820 may include a smart contract services circuit 7810 to create and modify a smart lending contract 7812 for a loan 7818. Smart lending contracts 7812 may include the terms and conditions 7814 for the loan 7818, a covenant specifying a required value of collateral, information regarding a loan 7818, items of collateral, information on lenders, including lender priorities including apportionment 7816 of the value of items of collateral among the lenders.

The plurality of AI circuits 7820 may include a valuation circuit 7802 structured to determine one or more values 7808 for items of collateral based on a valuation model 7809 and collateral data 7840. The valuation circuit 7802 may include a collateral classification circuit 7803 to identify items of off-set collateral 7807 based on common attributes with items of collateral used to secure a loan 7818. A market value monitoring circuit 7806 may receive marketplace information 7842 regarding items of collateral and off-set items of collateral 7807. The marketplace information 7842 may be used by the valuation model 7809 in determining values 7808 for items of collateral. The valuation circuit 7802 may further include a valuation model improvement circuit 7804 to improve the valuation model 7809 used to determine values 7808. The valuation model improvement circuit 7804 may utilize a training set including previously determined values 7808 for items of collateral and data regarding the outcome of loans for which those items of collateral acted as security.

The plurality of AI circuits 7820 may include a loan management circuit 7822 which may include a value comparison circuit 7828 to compare a value 7808 of an item of collateral with a required value of the item of collateral as specified in a covenant of the loan, determining a collateral satisfaction value 7830. The smart contract services circuit 7810 may determine, in response to the collateral satisfaction value 7830, a term or a condition 7814 for a loan 7818, where the term of conditions 7814 is related to a loan component such as a loan party, a loan collateral, a loan-related event, and a loan-related activity for the smart lending contract 7812, and the like. The term of condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The term of condition may be a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, a consequence of default, and the like. The smart contract services circuit 7810 may modify the smart lending contract 7812 to include new terms or conditions 7814, such as those determined in response to the collateral satisfaction value 7830.

The loan management circuit 7822 may also include an automated agent circuit 7824 to take an action 7826 based on the collateral satisfaction value 7830. The action 7826 may be a collateral-related action such as validating title for the item of collateral, recording a change in title for the item of collateral, assessing the value of the item of collateral, initiating inspection of the item of collateral, initiating maintenance of the item of collateral, initiating security for the item of collateral, modifying terms and conditions for the item of collateral, and the like. The action 7826 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like.

The controller 7801 may also include a data collection circuit 7832 to receive collateral data 7840 and determine a collateral event 7834. The collateral event 7834 and collateral data 7840 may then be reported by a reporting circuit 7836. A blockchain service circuit 7838 may create and update blockchain data 7825 where a copy of the smart lending contract 7812 is stored.

Figure 79:
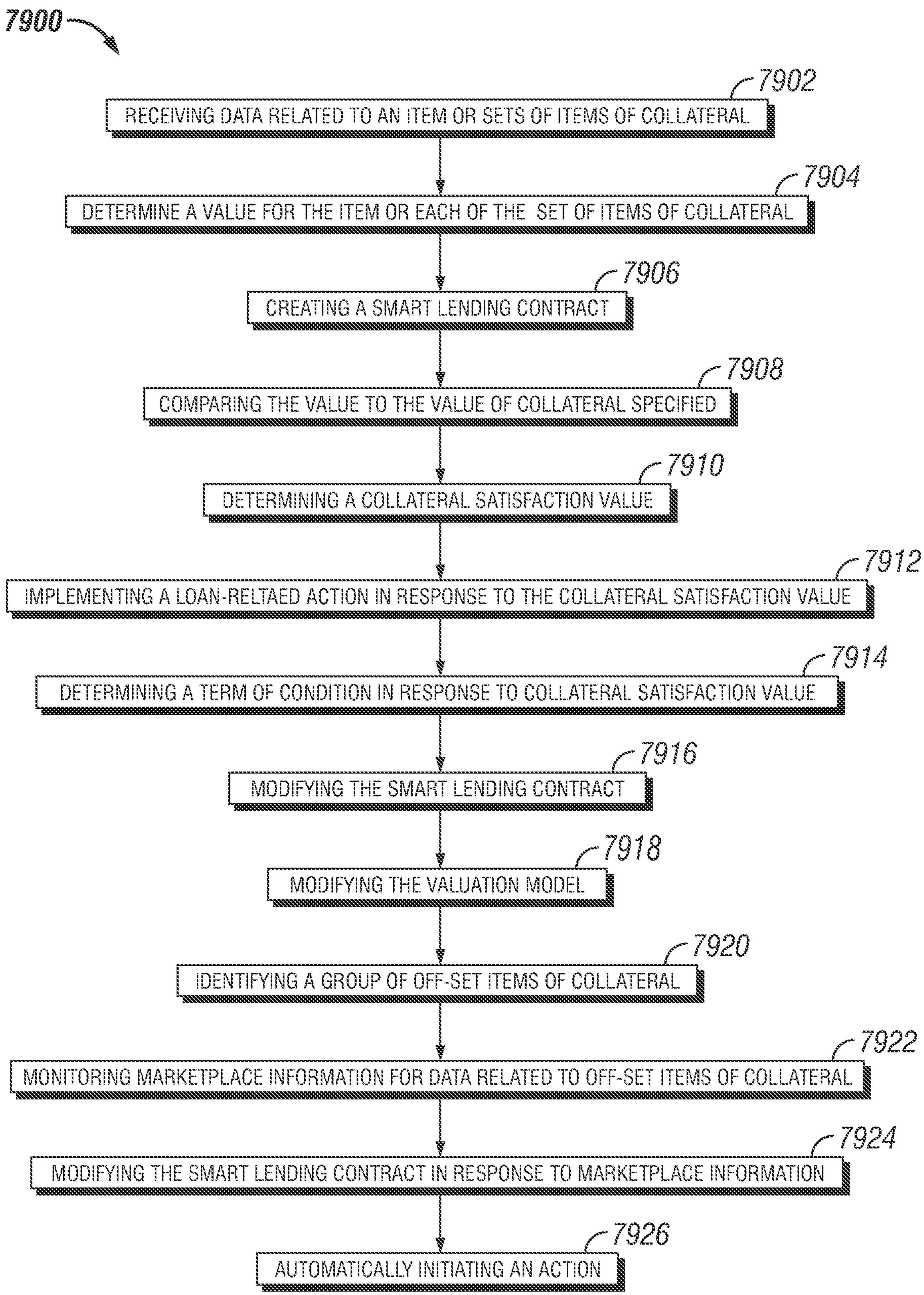
FIG. 79 depicts a method for robotic process automation of transactional, financial and marketplace activities.

Referring to FIG. 79, an illustrative and non-limiting method for robotic process automation of transactional, financial and marketplace activities is depicted. An example method may include receiving data related to an item or set of items of collateral (step 7902) where the item(s) of collateral are acting as security for a loan. A value for the item of collateral is determined (step 7904) based on received data and a valuation model. A smart lending contract is created (step 7906) which specifies information about the loan including a covenant specifying a required value of collateral needed to secure the loan.

The value of the item(s) of collateral may be compared to the value of collateral specified in the covenant (step 7908) and a collateral satisfaction value determined (step 7910), where the collateral satisfaction value may be positive if the value of the collateral exceeds the required value of collateral or negative if the value of collateral is less than the required value of collateral. A loan-related action may be implemented in response to the collateral satisfaction value (step 7912). A term or condition may be determined in response to the collateral satisfaction value (step 7914) and the smart lending contract modified (step 7916).

The valuation model may be modified (step 7918) based on a first set of valuation determinations for a first set of items of collateral and a corresponding set of loan outcomes having the first set of items of collateral as security, using a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system of at least two of any of the foregoing, and the like.

A group of off-set items of collateral may be identified (step 7920) based on common attributes with the collateral such as a category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, and a jurisdictional location of the item of collateral. Marketplace information such as may be monitored for data related to the off-set collateral (step 7922) such as pricing or financial data and the smart lending contract modified in response to the marketplace information (step 7924). An action may be automatically initiated (step 7926) based on the marketplace information. The action may include modifying a term of the loan, issuing a notice of default, initiating a foreclosure action modifying a conditions of the loan, providing a notice to a party of the loan, providing a required notice to a borrower of the loan, foreclosing on a property subject to the loan, validating title for the item of collateral, recording a change in title for the item of collateral, assessing the value of the item of collateral, initiating inspection of the item of collateral, initiating maintenance of the item of collateral, initiating security for the item of collateral, and modifying terms and conditions for the item of collateral, and the like.

Figure 80:
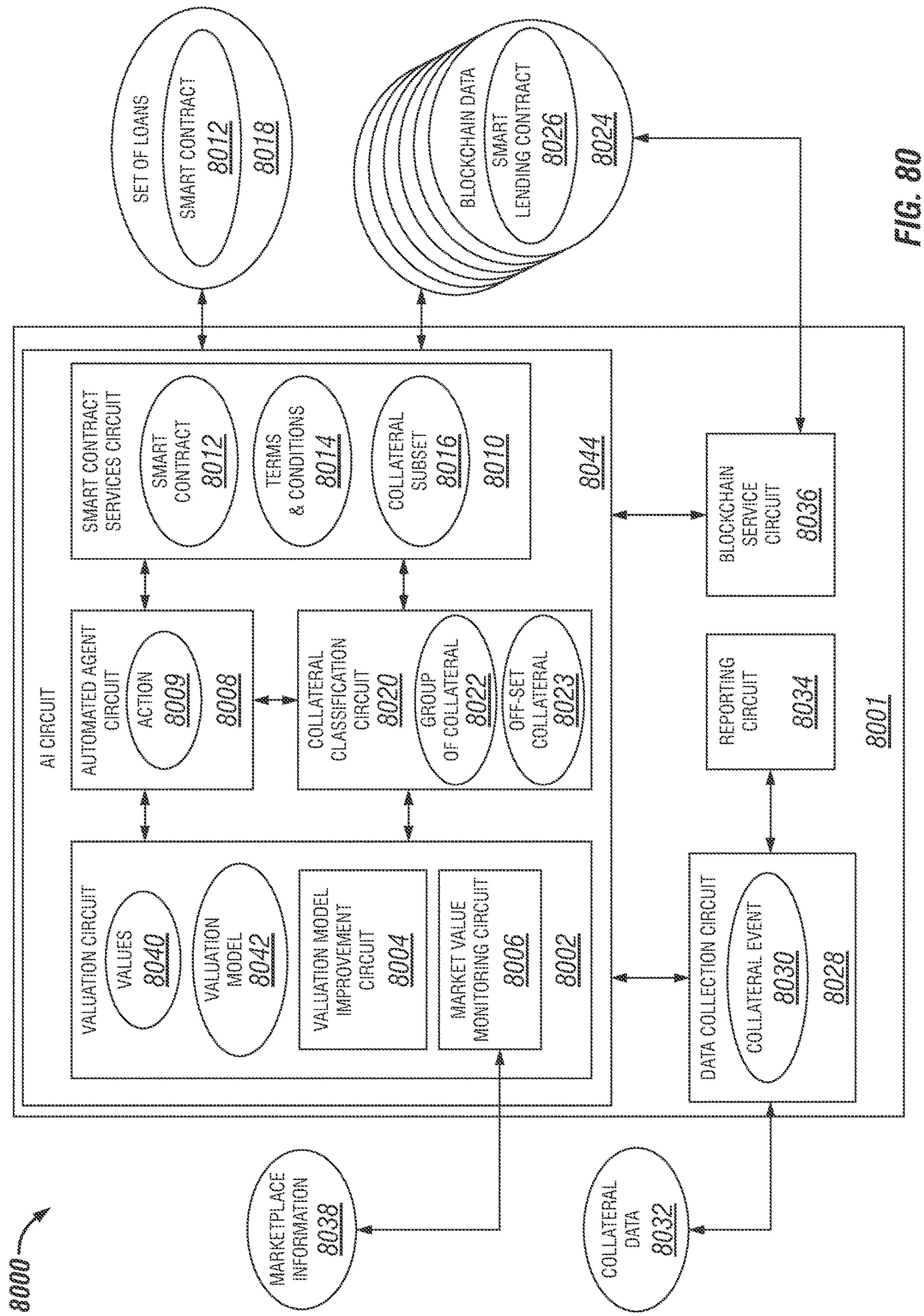
FIG. 80 depicts a system for adaptive intelligence and robotic process automation.

Referring to FIG. 80, an illustrative and non-limiting example system for adaptive intelligence and robotic process automation capabilities 8000 is depicted. The example system may include a controller 8001 including a data collection circuit 8028 structured to receive collateral data 8032 regarding a plurality of items of collateral used to secure a set of loans 8018. The data collection circuit 8028 may include an Internet of Things system, a camera system, a networked monitoring system, an internet monitoring system, a mobile device system, a wearable device system, a user interface system, an interactive crowdsourcing system, and the like. The items of collateral may include a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The set of loans may include an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The set of loans 8018 may be distributed among a plurality of borrowers as means of diversifying the risk of the loans.

The controller 8001 may also include a plurality of AI circuits 8044, including a collateral classification circuit 8020, to identify, from among the items of collateral, a group of collateral 8022 which related by sharing a common attribute, wherein the common attribute is among the received collateral data 8032, such as a type of the item of collateral, a category of the item of collateral, a value of the item of collateral, a price of a type of the item of collateral, a value of a type of the item of collateral, a specification of the item of collateral, a product feature set of the item of collateral, a model of the item of collateral, a brand of the item of collateral, a manufacturer of the item of collateral, an age of the item of collateral, a liquidity of the item of collateral, a shelf-life of the item of collateral, a useful life of the item of collateral, a condition of the item of collateral, a valuation of the item of collateral, a status of the item of collateral, a context of the item of collateral, a state of the item of collateral, a storage location of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a maintenance history of the item of collateral, a usage history of the item of collateral, an accident history of the item of collateral, a fault history of the item of collateral, a history of ownership of the item of collateral, an assessment of the item of collateral, a geolocation of the item of collateral, a jurisdictional location of the item of collateral, and the like. The collateral classification circuit 8020 may also identify off-set collateral 8023 where items of off-set collateral 8023 and the items of collateral share a common attribute.

The reporting circuit 8034 may also report a collateral event 8030 based on the collateral data 8032. An automated agent circuit 8008 may automatically perform an action 8009 based on the collateral event 8030. The action 8009 may be a collateral-related action such as validating title for one of the plurality of items of collateral, recording a change in title for one of the plurality of items of collateral, assessing the value of one of the plurality of items of collateral, initiating inspection of one of the plurality of items of collateral, initiating maintenance of the one of the plurality of items of collateral, initiating security for one of the plurality of items of collateral, modifying terms and conditions for one of the plurality of items of collateral, and the like. The action 8009 may be a loan-related action such as offering the loan, accepting the loan, underwriting the loan, setting an interest rate for a loan, deferring a payment requirement, modifying the interest rate for the loan, calling the loan, closing the loan, setting terms and conditions for the loan, providing notices required to be provided to a borrower, foreclosing on property subject to the loan, modifying terms and conditions for the loan, and the like.

The controller 8001 may also include a smart contract services circuit 8010 to create a smart lending contract 8012 for an individual loan or a set of loans 8018 where the smart lending contract 8012 identifies a subset of collateral 8016, selected from the group of related items of collateral 8022 sharing a common attribute, to act as security for the set of loans 8018. The smart contract services circuit 8010 may also redefine the subset of collateral 8016 based on an updated value for an item of collateral, thus rebalancing the items of collateral used for a set of loans based on the values of the collateral items. The identification of the subset of collateral 8016 may be identified in real-time when the common attribute changes in real time (e.g. a status of an item of collateral or whether collateral is in transit during a defined time period). Further, the smart contract services circuit 8010 may determine a term or condition 8014 for the loan based on a value of one of the items of collateral, where the term or the condition 8014 is related to a loan component such as a loan party, a loan collateral, a loan-related event, and a loan-related activity. The term or condition 8014 may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like.

The controller may also include a valuation circuit 8002 to determine a value 8040 for each item of collateral in the subset of items collateral based on the received data and a valuation model 8042. A valuation model improvement circuit 8004 may modify the valuation model 8042 based on a first set of valuation determinations for a first set of items of collateral and a corresponding set of loan outcomes having the first set of items of collateral as security. The valuation model improvement circuit 8004 may include a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, or the like. The valuation circuit 8002 may also include a market value data collection circuit 8006 to monitor and report marketplace information 8038 such as pricing or financial data relevant to off-set collateral 8023 or a group of collateral 8022.

Figure 81:
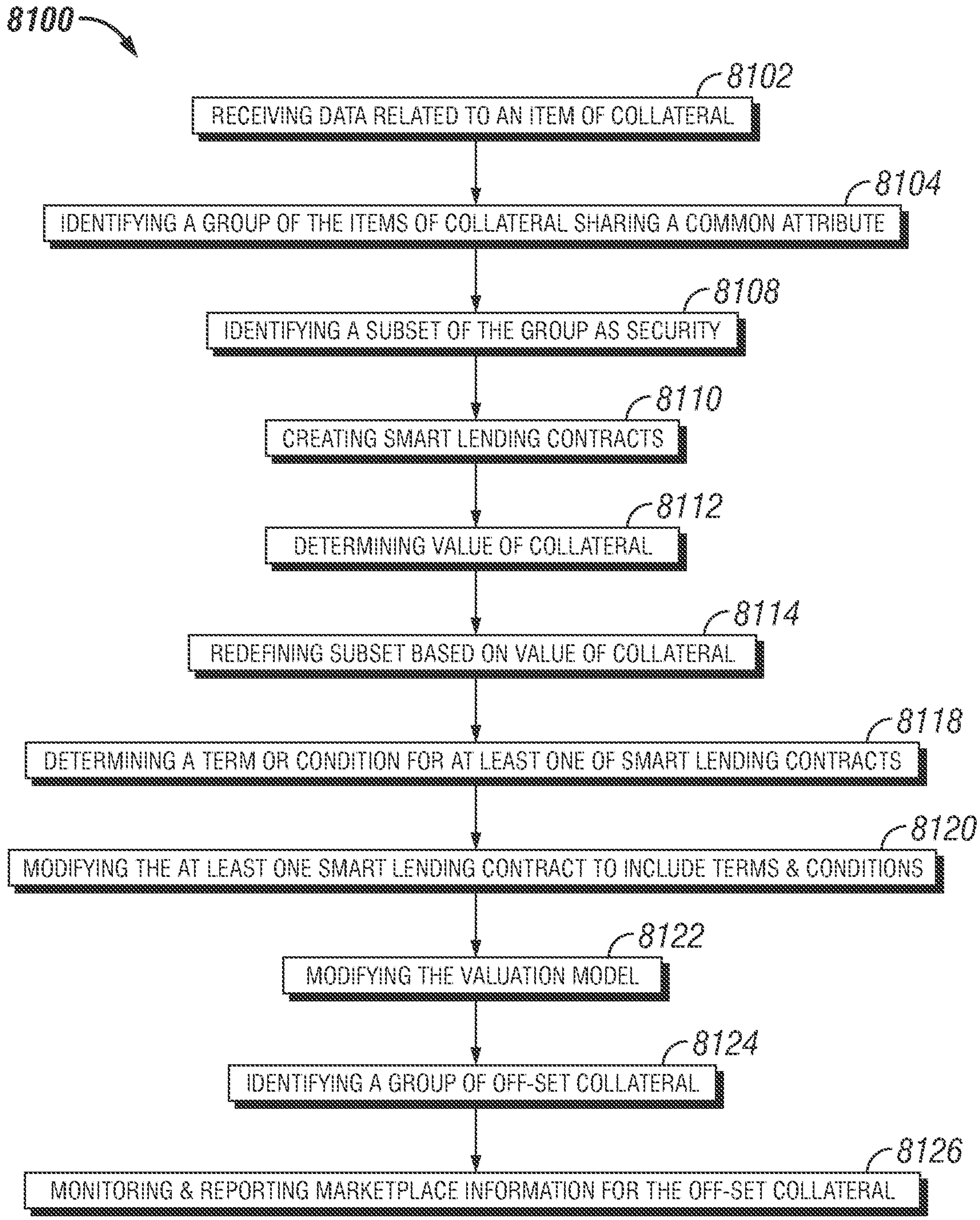
FIG. 81 depicts a method for automated transactional, financial and marketplace activities.

Referring to FIG. 81, a method 8100 for automated transactional, financial and marketplace activities. A method may include receiving data related to an item of collateral (step 8102), identifying a group of items of collateral (step 8104) where the items in the group share a common attribute or feature, identifying a subset of the group as security for a set of loans (8108) and creating a smart lending contract (step 8110) for the set of loans where the smart lending contract identifies the subset of group acting as security. The common attribute shared by the group of items of collateral may be in the received data.

The value of each item of collateral may be determined (8112) using the received data and a valuation model. The subset of collateral used as security may then be redefined based on the value of the different items of collateral (8114). A term of condition for at least one of the smart lending contracts may be determined (8118) based on the value for at least one of the items of collateral in the subset of the group and the smart lending contract modified to include the determined term or condition (8120). Further, in some embodiments, the valuation model may be modified (8122) based on a first set of valuation determinations for a first set of items of collateral and a corresponding set of loan outcomes having the first set of items of collateral as security.

A group of off-set items of collateral may be identified (step 8124) where each member of the group of off-set items of collateral and the group of the plurality of items share a common attribute. An information marketplace may be monitored and marketplace information reported (step 8126) for the group of off-set items of collateral.

Figure 82:
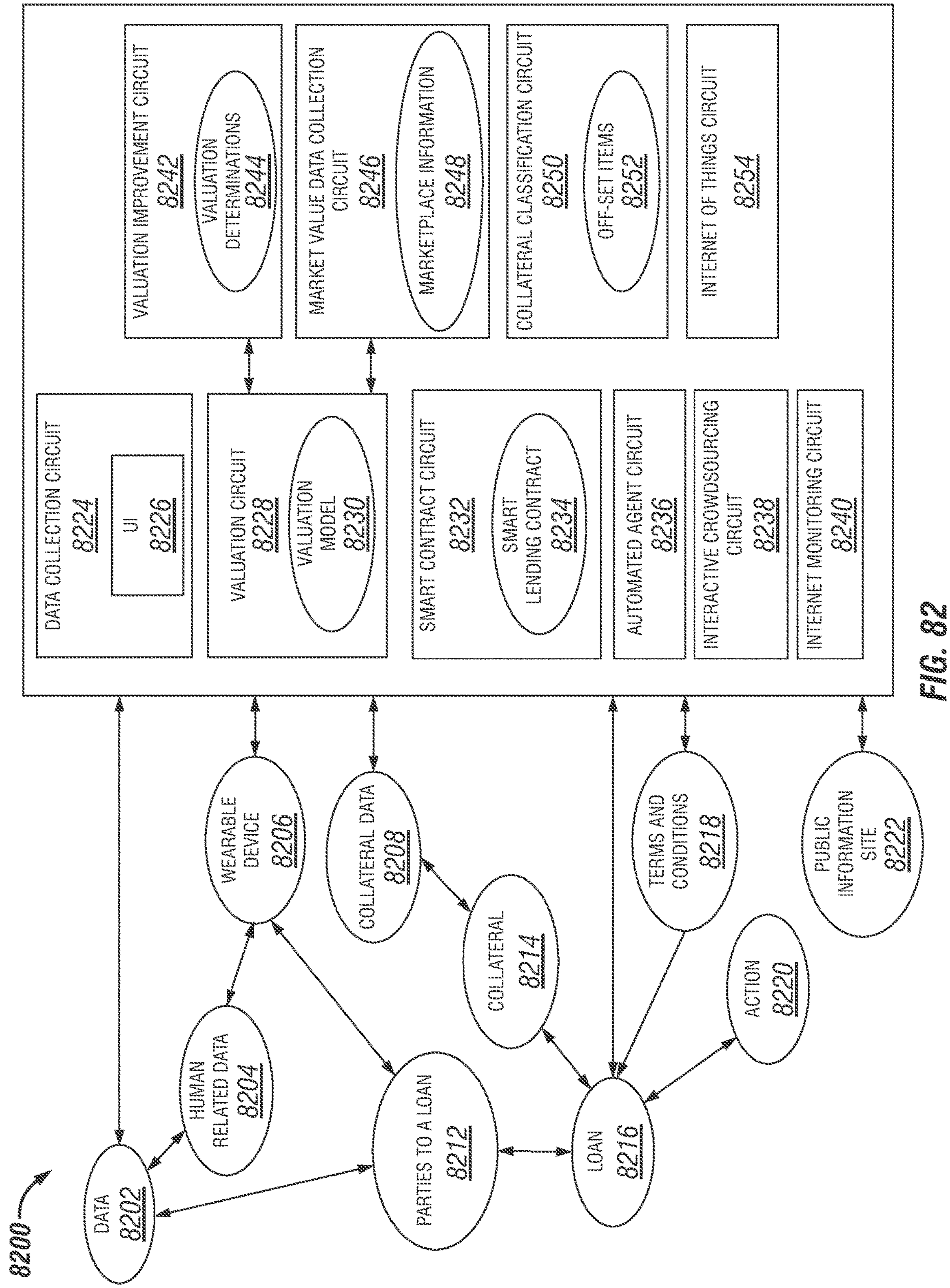
FIG. 82 depicts a system for adaptive intelligence and robotic process.

FIG. 82 depicts a system 8200 including a data collection circuit 8224 structured to receive data 8202 related to a set of parties to a loan 8212. The data collection circuit may be structured to receive collateral-related data 8208 related to a set of items of collateral 8214 acting as security for the loan and determine a condition of the set of items of collateral, where the change in the interest rate may be based on a condition of the set of items of collateral. The item of collateral may be a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The received data may include an attribute of the set of parties to the loan, where the change in the interest rate may be based in part on the attribute. The data collection circuit may include a system such as an Internet of Things circuit, an image capture device, a networked monitoring circuit, an internet monitoring circuit, a mobile device, a wearable device, a user interface circuit, an interactive crowdsourcing circuit, and the like. For instance, the data collection circuit may include an Internet of Things circuit 8254 structured to monitor attributes of the set of parties to the loan. The data collection circuit may include a wearable device 8206 associated with at least one of the set of parties, where the wearable device is structured to acquire human-related data 8204, and where the received data includes at least a portion of the human-related data. The data collection circuit may include a user interface circuit 8226 structured to receive data from the parties of the loan and provide the data from at least one of the parties of the loan as a portion of the received data. The data collection circuit may include an interactive crowdsourcing circuit 8238 structured to solicit data regarding at least one of the set of parties of the loan, receive solicited data, and provide at least a subset of the solicited data as a portion of the received data. The data collection circuit may include an internet monitoring circuit 8240 structured to retrieve data related to the parties of the loan from at least one publicly available information site 8222. The system may include a smart contract circuit 8232 structured to create a smart lending contract 8234 for the loan 8216. The loan may be a type selected from among loan types such as an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The smart contract circuit may be structured to determine a term or a condition 8218 for the smart lending contract based on the attribute and modify the smart lending contract to include the term or the condition. The term or condition may be related to a loan component, such as a loan party, a loan collateral, a loan-related event, a loan-related activity, and the like. The term or condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The system may include an automated agent circuit 8236 structured to automatically perform a loan-related action 8220 in response to the received data, where the loan-related action is a change in an interest rate for the loan, and where the smart contract circuit may be further structured to update the smart lending contract with the changed interest rate. The system may include a valuation circuit 8228 structured to determine, such as based on the received data and a valuation model 8230, a value for the at least one of the set of items of collateral. The smart contract circuit may be structured to determine a term or a condition for the smart lending contract based on the value for the at least one of the set of items of collateral and modify the smart lending contract to include the term or the condition. The term or the condition may be related to a loan component, such as a loan party, a loan collateral, a loan-related event, a loan-related activity, and the like. The term or the condition may be a principal amount of the loan, a balance of the loan, a fixed interest rate, a variable interest rate description, a payment amount, a payment schedule, a balloon payment schedule, a collateral specification, a collateral substitution description, a description of a party, a guarantee description, a guarantor description, a security description, a personal guarantee, a lien, a foreclosure condition, a default condition, a consequence of default, a covenant related to any one of the foregoing, a duration of any one of the foregoing, and the like. The valuation circuit may include a valuation model improvement circuit 8242, where the valuation model improvement circuit may modify the valuation model, such as based on a first set of valuation determinations 8244 for a first set of items of collateral and a corresponding set of loan outcomes having the first set of items of collateral as security. The valuation model improvement circuit may include a one system such as a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, and the like. The change in the interest rate may be further based on the value for the at least one of the set of items of collateral. The valuation circuit may include a market value data collection circuit 8246 structured to monitor and report marketplace information 8248 for offset items of collateral relevant to the value of the item of collateral. The market value data collection circuit may be structured to monitor one of pricing or financial data for the offset items of collateral in at least one public marketplace and report the monitored one of pricing or financial data. The system may include a collateral classification circuit 8250 structured to identify a group of off-set items of collateral 8252, where each member of the group of off-set items of collateral and at least one of the set of items of collateral share a common attribute. The common attribute may be a category of the item, an age of the item, a condition of the item, a history of the item, an ownership of the item, a caretaker of the item, a security of the item, a condition of an owner of the item, a lien on the item, a storage condition of the item, a geolocation of the item, a jurisdictional location of the item, and the like.

Figure 83:
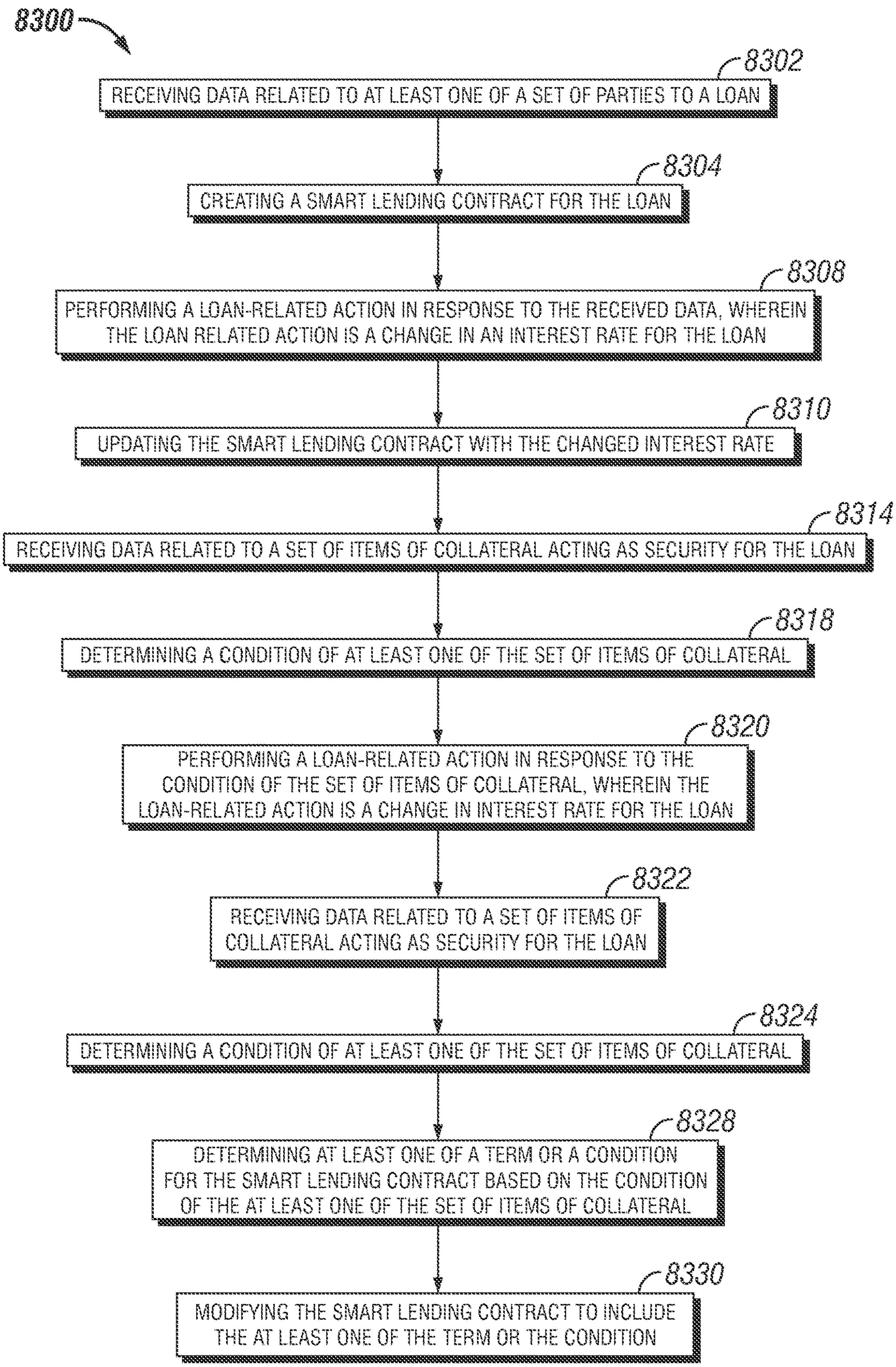
FIG. 83 depicts a method for performing loan related actions.

FIG. 83 depicts a method 8300 including receiving data related to at least one of a set of parties to a loan 8302, creating a smart lending contract for the loan 8304, performing a loan-related action in response to the received data, wherein the loan-related action is a change in an interest rate for the loan 8308, and updating the smart lending contract with the changed interest rate 8310. The method may further include receiving data related to a set of items of collateral acting as security for the loan 8314, determining a condition the set of items of collateral 8318, and performing a loan-related action in response to the condition of the set of items of collateral, where the loan-related action may be a change in interest rate for the loan 8320. The method may further include receiving data related to a set of items of collateral acting as security for the loan 8322, determining a condition of at least one of the set of items of collateral 8324, determining a term or a condition for the smart lending contract based on the condition of the at least one of the set of items of collateral 8328, and modifying the smart lending contract to include the term or the condition 8330. The method may include identifying a group of off-set items of collateral wherein each member of the group of off-set items of collateral and at least one of the set of items of collateral share a common attribute, and monitoring the group of offset items of collateral in a public marketplace, and further may report the monitored data. The method may include changing, such as based on the monitored group of off-set items of collateral, the interest rate of the loan secured by at least one of the set of items of collateral.

Figure 84:
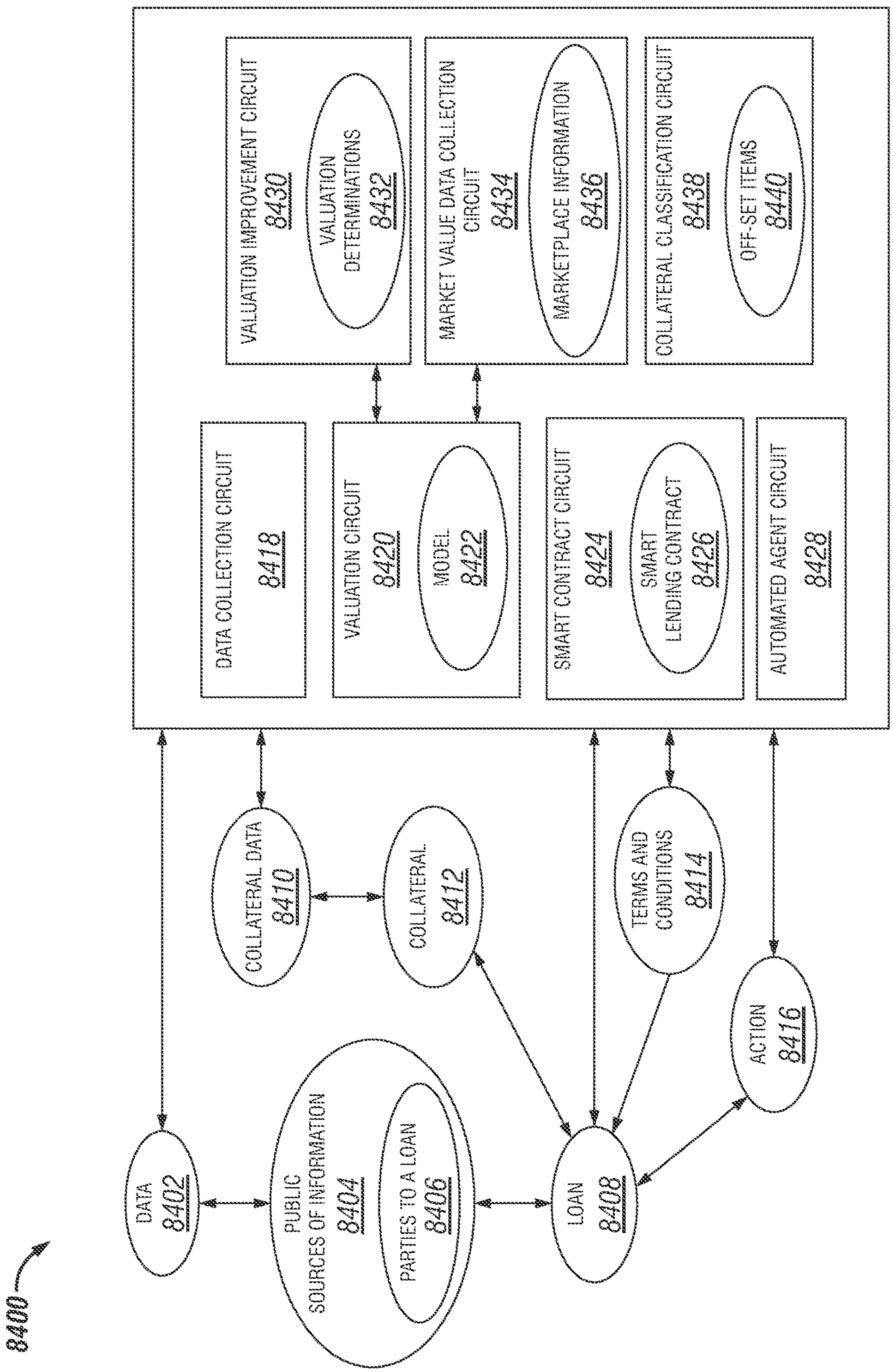
FIG. 84 depicts a system for adaptive intelligence and robotic process.

FIG. 84 depicts a system 8400 including a data collection circuit 8418 structured to acquire data 8402, from public sources of information 8404 (e.g., a website, a news article, a social network, crowdsourced information, and the like), related to at least one party of a set of parties 8406 to a loan 8408 (e.g., primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like). The data collection circuit may be further structured to receive collateral-related data 8410 related to a set of items of collateral 8412 acting as security for the loan and to determine a condition of at least one of the set of items of collateral, wherein the change in the interest rate is further based on the condition of the at least one of the set of items of collateral. The acquired data may include a financial condition of the at least one party of the set of parties to the loan. The financial condition may be determined based on at least one attribute of the at least one party of the set of parties to the loan, the attribute selected from among the list of attributes consisting of: a publicly stated valuation of the party, a set of property owned by the party as indicated by public records, a valuation of a set of property owned by the party, a bankruptcy condition of the party, a foreclosure status of the party, a contractual default status of the party, a regulatory violation status of the party, a criminal status of the party, an export controls status of the party, an embargo status of the party, a tariff status of the party, a tax status of the party, a credit report of the party, a credit rating of the party, a website rating of the party, a set of customer reviews for a product of the party, a social network rating of the party, a set of credentials of the party, a set of referrals of the party, a set of testimonials for the party, a set of behavior of the party, a location of the party, a geolocation of the party, a judicial location of the party, and the like. The system may include a smart contract circuit 8424 structured to create a smart lending contract 8426 for the loan 8408. The smart contract circuit may be structured to specify terms and conditions in the smart lending contract, wherein one of a term or a condition in the smart lending contract governs one of loan-related events or loan-related activities. The system may include an automated agent circuit 8428 structured to automatically perform a loan-related action 8416 in response to the acquired data, wherein the loan-related action is a change in an interest rate for the loan, and wherein the smart contract circuit is further structured to update the smart lending contract with the changed interest rate. The automated agent circuit may be structured to identify an event relevant to the loan (e.g., a value of the loan, a condition of collateral of the loan, or an ownership of collateral of the loan), based, at least in part, on the received data. The automated agent circuit may be structured to perform, in response to the event relevant to the loan, an action selected from the list of actions, such as offering the loan, accepting the loan, underwriting the loan, setting an interest rate for the loan, deferring a payment requirement, modifying an interest rate for the loan, validating title for at least one of the set of items of collateral, assessing the value of at least one of the set of items of collateral, initiating inspection of at least one of the set of items of collateral, setting or modifying terms and conditions 8414 for the loan (e.g., a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, and a consequence of default), providing a notice to one of the parties, providing a required notice to a borrower of the loan, foreclosing on a property subject to the loan, and the like. The loan may include a loan type, such as an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like. The acquired data may be related to the set of items of collateral such as a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, an item of personal property, and the like. The system may include a valuation circuit 8420 structured to determine, based on the acquired data and a valuation model 8422, a value for at least one of the set of items of collateral. The valuation circuit may include a valuation model improvement circuit 8430, where the valuation model improvement circuit modifies the valuation model based on a first set of valuation determinations 8432 for a first set of items of collateral and a corresponding set of loan outcomes having the first set of items of collateral as security. The valuation model improvement circuit may include a machine learning system, a model-based system, a rule-based system, a deep learning system, a neural network, a convolutional neural network, a feed forward neural network, a feedback neural network, a self-organizing map, a fuzzy logic system, a random walk system, a random forest system, a probabilistic system, a Bayesian system, a simulation system, a hybrid system including at least two of the foregoing, and the like. The smart contract circuit may be further structured to determine a term or a condition for the smart lending contract based on the value for the at least one of the set of items of collateral and modify the smart lending contract to include the term or the condition, modify a term or condition of the loan based on the marketplace information for offset items of collateral relevant to the value of the item of collateral, and the like. The system may include a collateral classification circuit 8438 structured to identify a group of off-set items of collateral, wherein each member of the group of off-set items 8440 of collateral and at least one of the set of items of collateral share a common attribute (e.g., a category of the item, an age of the item, a condition of the item, a history of the item, an ownership of the item, a caretaker of the item, a security of the item, a condition of an owner of the item, a lien on the item, a storage condition of the item, a geolocation of the item, a jurisdictional location of the item, and the like). The valuation circuit may further include a market value data collection circuit 8434 structured to monitor and report marketplace information 8436 for offset items of collateral relevant to the value of the item of collateral, monitor pricing or financial data for the offset items of collateral in a public marketplace, and the like, and report the monitored pricing or financial data.

Figure 85:
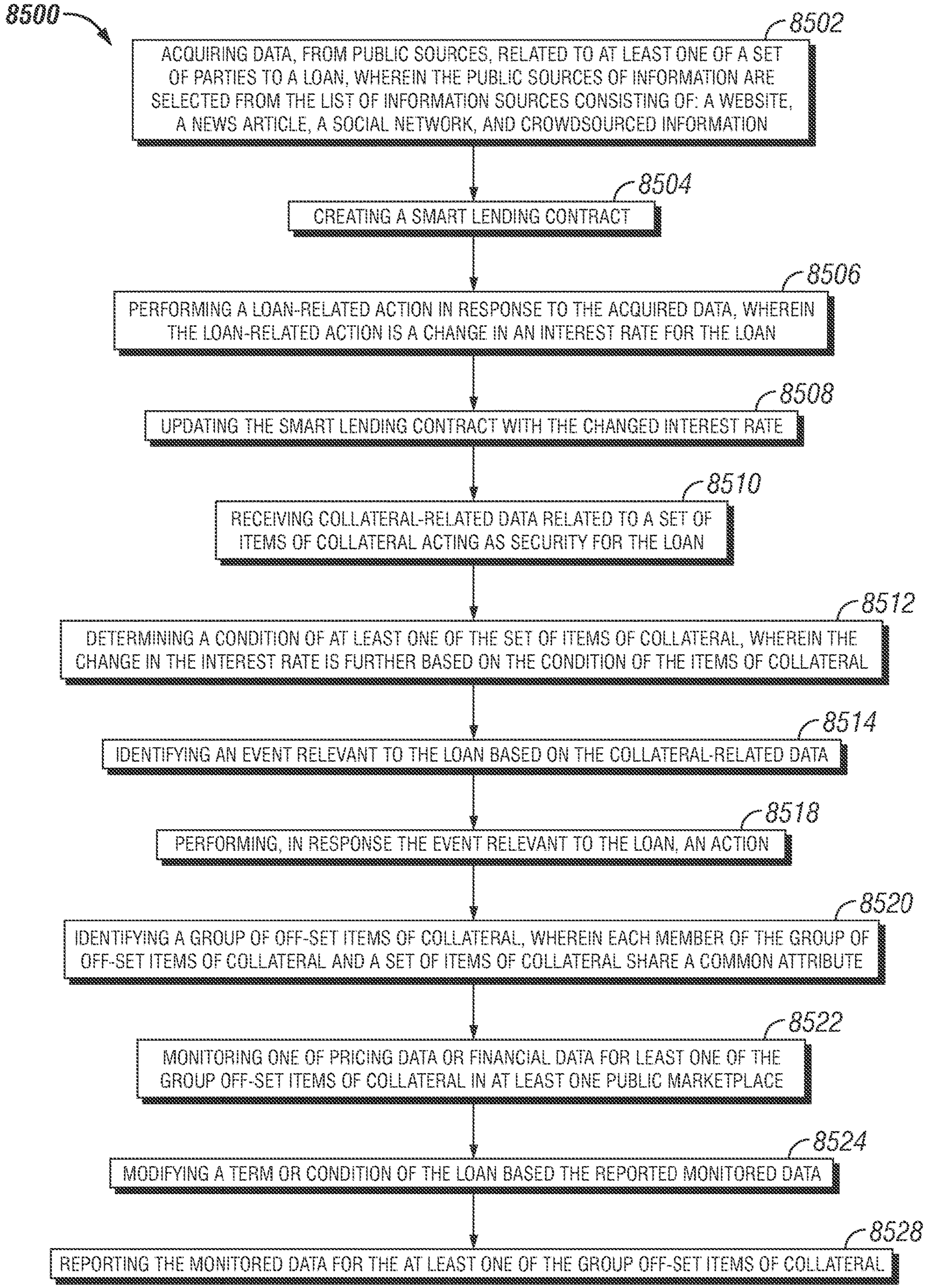
FIG. 85 depicts a method for performing loan related actions.

FIG. 85 depicts a method 8500 including acquiring data, from public sources, related to at least one of a set of parties to a loan, where the public sources of information may be selected from the list of information sources consisting of a website, a news article, a social network, and crowdsourced information 8502. The method may include creating a smart lending contract 8504. The method may include performing a loan-related action in response to the acquired data, wherein the loan-related action is a change in an interest rate for the loan 8506. The method may include updating the smart lending contract with the changed interest rate 8508. The method may include receiving collateral-related data related to a set of items of collateral acting as security for the loan 8510, and determining a condition of at least one of the set of items of collateral, wherein the change in the interest rate is further based on the condition of the at least one of the set of items of collateral 8512. The method may include identifying an event relevant to the loan based, at least in part, on the collateral-related data 8514, and performing, in response the event relevant to the loan, an action 8518, such as offering the loan, accepting the loan, underwriting the loan, setting an interest rate for the loan, deferring a payment requirement, modifying an interest rate for the loan, validating title for at least one of the set of items of collateral, assessing a value of at least one of the set of items of collateral, initiating inspection of at least one of the set of items of collateral, setting or modifying terms and conditions for the loan, providing a notice to one of the parties, providing a required notice to a borrower of the loan, foreclosing on a property subject to the loan, and the like. The method may include determining, based on at least one of the collateral-related data or the acquired data, and a valuation model, a value for at least one of the set of items of collateral. The method may include determining at least one of a term or a condition for the smart lending contract based on the value for the at least one of the set of items of collateral. The method may include modifying the smart lending contract to include the at least one of the term or the condition. The method may include modifying the valuation model based on a first set of valuation determinations for a first set of items of collateral and a corresponding set of loan outcomes having the first set of items of collateral as security. The method may include identifying a group of off-set items of collateral, wherein each member of the group of off-set items of collateral and at least one of the set of items of collateral share a common attribute 8520, monitoring one of pricing data or financial data for least one of the group off-set items of collateral in at least one public marketplace 8522, reporting the monitored data for the at least one of the group off-set items of collateral 8524, and modifying a term or condition of the loan based the reported monitored data 8528.

Figure 86:
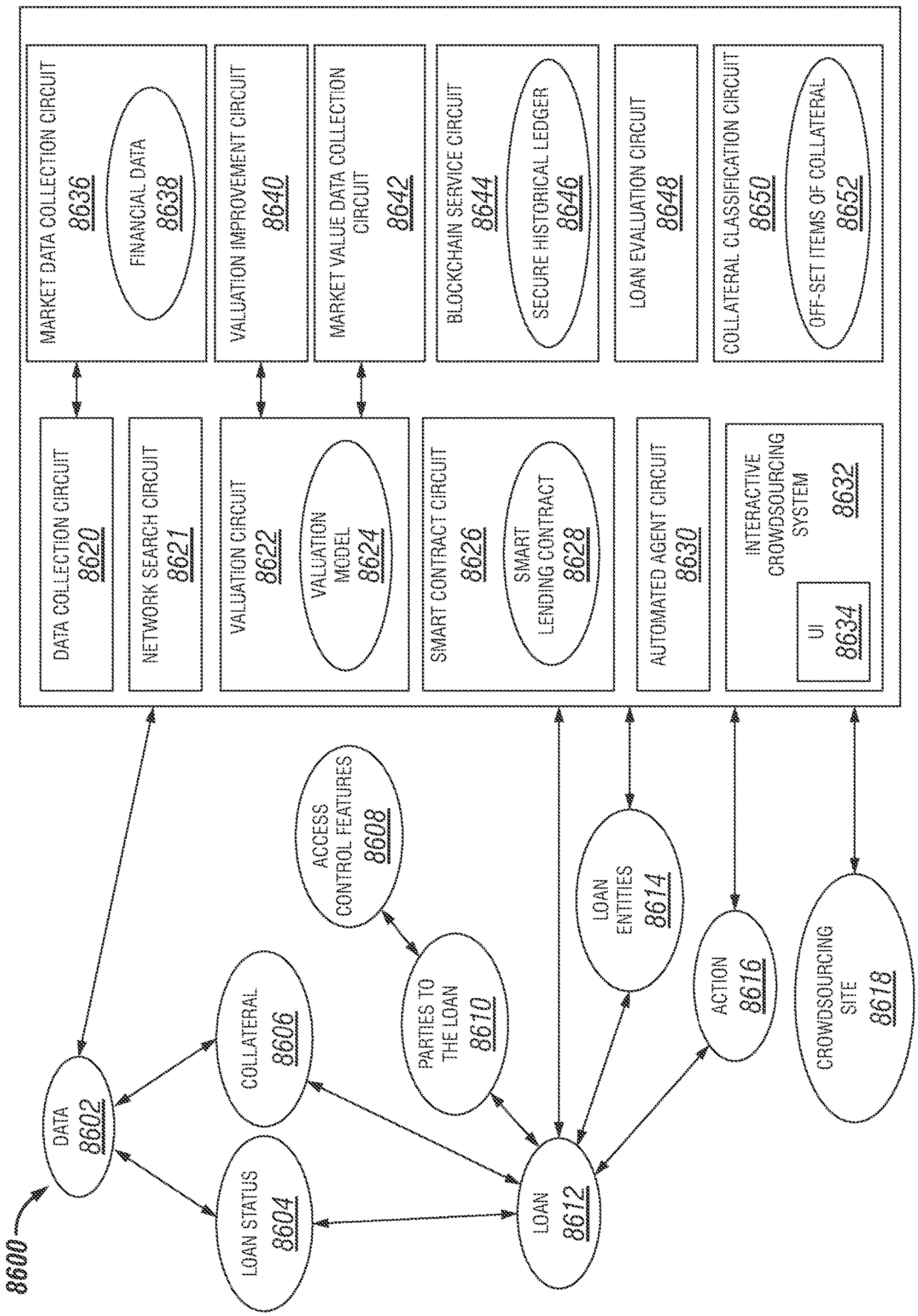
FIG. 86 depicts a system for adaptive intelligence and robotic process.

FIG. 86 depicts a system 8600 including a data collection circuit 8620 structured to receive data 8602 relating to a status 8604 of a loan 8612 and data relating to a set of items of collateral 8606 acting as security for the loan. The data collection circuit may monitor one or more of the loan entities with a system such as an Internet of Things system, a camera system, a networked monitoring system, an internet monitoring system, a mobile device system, a wearable device system, a user interface system, and an interactive crowdsourcing system 8632. For instance, an interactive crowdsourcing system may include a user interface 8634, the user interface configured to solicit information related to one or more of the loan entities from a crowdsourcing site 8618, and where the user interface is structured to allow one or more of the loan entities to input information one or more of the loan entities. In another instance, a networked monitoring system may include a network search circuit 8621 structured to search publicly available information sites for information related one or more of the loan entities. The system may include a blockchain service circuit 8644 structured to maintain a secure historical ledger 8646 of events related to the loan, such as to interpret a plurality of access control features 8608 corresponding to a plurality of parties 8610 associated with the loan. The system may include a loan evaluation circuit 8648 structured to determine a loan status based on the received data. The data collection circuit may receive data related to one or more loan entities 8614, where the loan evaluation circuit may determine compliance with a covenant based on the data related to the one or more of the loan entities. The loan evaluation circuit may be structured to determine a state of performance for a condition of the loan based on the received data and a status of the one or more of the loan entities, and wherein the determination of the loan status is determined based in part on the status of the at least one or more of the loan entities and the state of performance of the condition for the loan. For instance, the condition of the loan may relate to at least one of a payment performance and a satisfaction on a covenant. The data collection circuit may include a market data collection circuit 8636 structured to receive financial data 8638 regarding at least one of the plurality of parties associated with the loan. The loan evaluation circuit may be structured to determine a financial condition of the least one of the plurality of parties associated with the loan based on the received financial data, where the at least one of the plurality of parties may be a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like. The received financial data may relate to an attribute of the entity for one of the plurality of parties, such as a publicly stated valuation of the party, a set of property owned by the party as indicated by public records, a valuation of a set of property owned by the party, a bankruptcy condition of the party, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, a website rating of the entity, a set of customer reviews for a product of the entity, a social network rating of the entity, a set of credentials of the entity, a set of referrals of the entity, a set of testimonials for the entity, a set of behavior of the entity, a location of the entity, a geolocation of the entity, and the like. The system may include a smart contract circuit 8626 structured to create a smart lending contract 8628 for the loan. The smart contract circuit may be structured to determine a term or a condition for the smart lending contract based on the value for the at least one of the set of items of collateral and modify the smart lending contract to include the term or the condition, where the terms and conditions may be a principal amount of debt, a balance of debt, a fixed interest rate, a variable interest rate, a payment amount, a payment schedule, a balloon payment schedule, a party, a guarantee, a guarantor, a security, a personal guarantee, a lien, a duration, a covenant, a foreclose condition, a default condition, a consequence of default, and the like. The system may include an automated agent circuit 8630 structured to perform a loan-action 8616 based on the loan status, where the blockchain service circuit may be structured to update the historical ledger of events with the loan action. The system may include a valuation circuit 8622 structured to determine, based on the received data and a valuation model 8624, a value for at least one of the set of items of collateral. The valuation circuit may include a valuation model improvement circuit 8640, where the valuation model improvement circuit modifies the valuation model based on a first set of valuation determinations for a first set of items of collateral and a corresponding set of loan outcomes having the first set of items of collateral as security. The valuation model improvement circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system. The valuation circuit may include a market value data collection circuit 8642 structured to monitor and report marketplace information for offset items of collateral relevant to the value of the item of collateral. The market value data collection circuit may be further structured to monitor pricing or financial data for the offset items of collateral in a public marketplace, such as to report the monitored pricing or financial data. The smart contract circuit may be further structured to modify a term or condition of the loan based on the marketplace information for offset items of collateral relevant to the value of the item of collateral. The system may include a collateral classification circuit 8650 structured to identify a group of off-set items of collateral 8652, where each member of the group of off-set items of collateral and at least one of the set of items of collateral may share a common attribute. The common attribute may be a category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, a jurisdictional location of the item of collateral, and the like.

Figure 87:
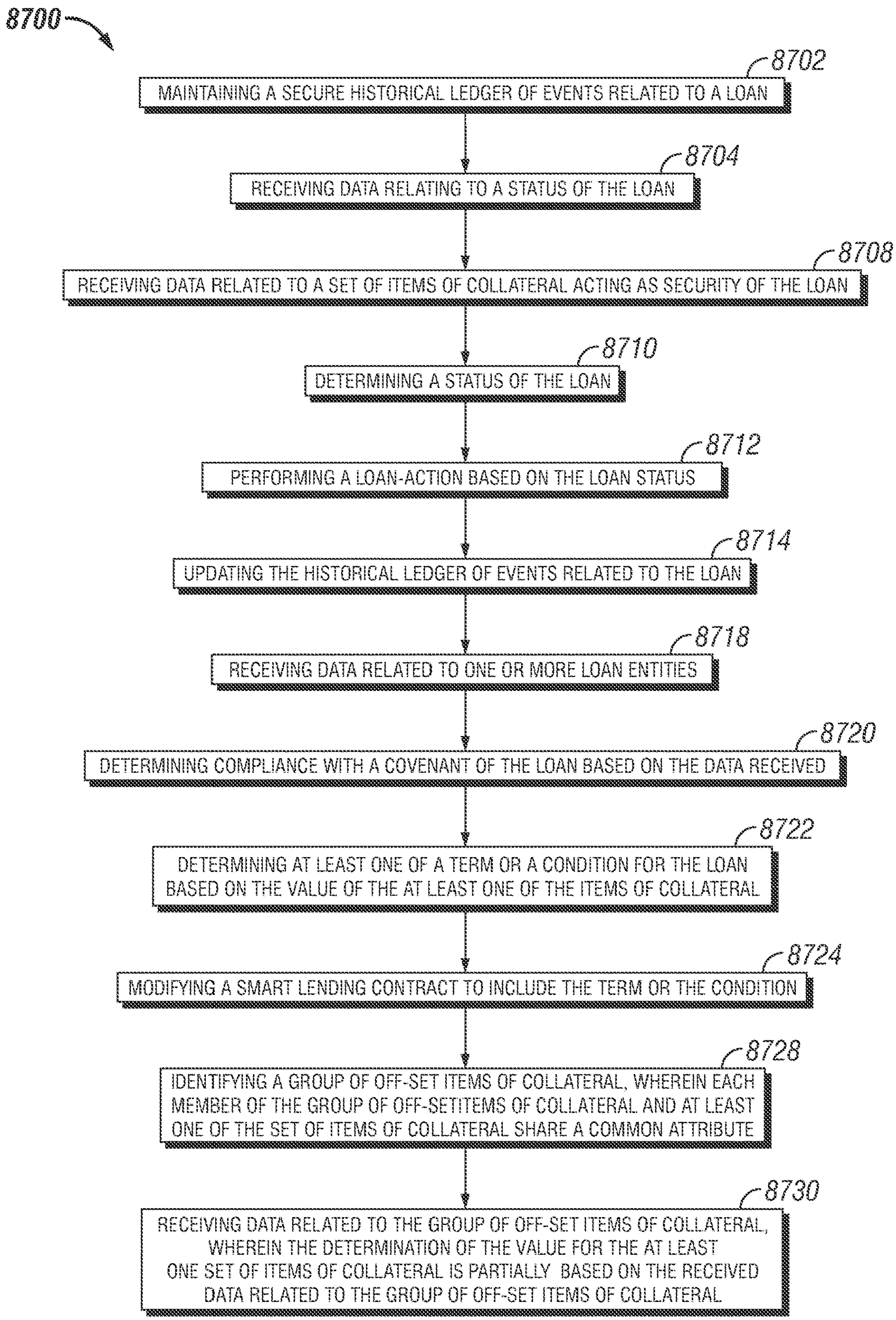
FIG. 87 depicts a method for performing loan related actions.

FIG. 87 depicts a method 8700 including maintaining a secure historical ledger of events related to a loan 8702, receiving data relating to a status of the loan 8704, receiving data related to a set of items of collateral acting as security of the loan 8708, determining a status of the loan 8710, performing a loan-action based on the loan status 8712 and updating the historical ledger of events related to the loan 8714. The method may further include receiving data related to one or more loan entities 8718 and determining compliance with a covenant of the loan based on the data received 8720. The method may further include determining a state of performance for a condition of the loan, where the determination of the loan status is based on part on the state of performance of the condition of the loan. The method may further include receiving financial data related to at least one party to the loan. The method may further include determining a financial condition of the at least one party to the loan based on the financial data. The method may further include determining a value for at least one set of items of collateral based on the received data and a valuation model. The method may further include determining at least one of a term or a condition for the loan based on the value of the at least one of the items of collateral 8722 and modifying a smart lending contract to include the at least one of the term or the condition 8724. The method may include 270 identifying a group of off-set items of collateral, where each member of the group of off-set items of collateral and at least one of the set of items of collateral share a common attribute 8728, receiving data related to the group of off-set items of collateral, wherein the determination of the value for the at least one set of items of collateral is partially based on the received data related to the group of off-set items of collateral 8730.

Figure 88:
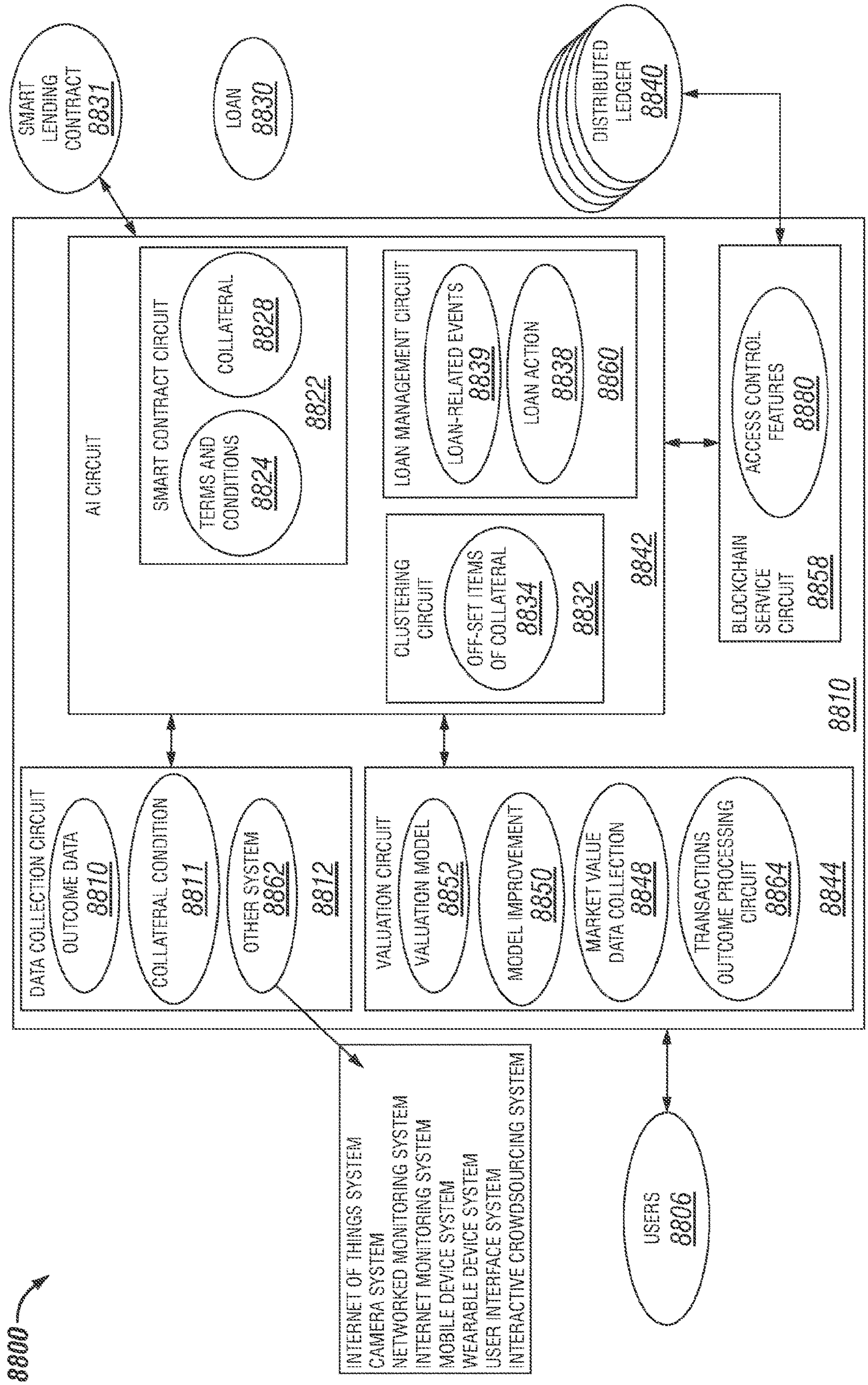
FIG. 88 depicts a smart contract system for managing collateral for a loan.

Referring to FIG. 88, an illustrative and non-limiting example smart contract system for managing collateral for a loan 8800 is depicted. The example system may include a controller 8801. The controller 8801 may include a data collection circuit 8812 structured to monitor a status of a loan 8830 and of a collateral 8828 for the loan, and several artificial intelligence circuits including a smart contract circuit 8822 structured to process information from the data collection circuit 8812 and automatically initiate at least one of a substitution, a removal, or an addition of one or items from the collateral for the loan based on the information and a smart lending contract 8831 in response to at least one of the status of the loan or the status of the collateral for the loan; and a blockchain service circuit 8858 structured to interpret a plurality of access control features 8880 corresponding to at least one party associated with the loan and record the at least one substitution, removal, or addition in a distributed ledger 8840 for the loan. The data collection circuit may further include at least one other system 8862 selected from the systems consisting of: an Internet of Things system, a camera system, a networked monitoring system, an internet monitoring system, a mobile device system, a wearable device system, a user interface system, and an interactive crowdsourcing system.

A status of the loan 8830 may be determined based on the status of at least one of an entity (e.g. user 8806) related to the loan and a state of a performance of a condition for the loan. State of the performance of the condition may relate to at least one of a payment performance or a satisfaction of a covenant for the loan. The status of the loan may be determined based on a status of at least one entity related to the loan and a state of performance of a condition for the loan; and the performance of the condition may relate to at least one of a payment performance or a satisfaction of a covenant for the loan. The data collection circuit 8812 may be further structured to determine compliance with the covenant by monitoring the at least one entity. When the at least one entity is a party to the loan, the data collection circuit 8812 may monitor a financial condition of at least one entity that is a party to the loan. The condition for the loan may include a financial condition for the loan, and wherein the state of performance of the financial condition may be determined based on an attribute selected from the attributes consisting of: a publicly stated valuation of the at least one entity, a property owned by the at least one entity as indicated by public records, a valuation of a property owned by the at least one entity, a bankruptcy condition of the at least one entity, a foreclosure status of the at least one entity, a contractual default status of the at least one entity, a regulatory violation status of the at least one entity, a criminal status of the at least one entity, an export controls status of the at least one entity, an embargo status of the at least one entity, a tariff status of the at least one entity, a tax status of the at least one entity, a credit report of the at least one entity, a credit rating of the at least one entity, a website rating of the at least one entity, a plurality of customer reviews for a product of the at least one entity, a social network rating of the at least one entity, a plurality of credentials of the at least one entity, a plurality of referrals of the at least one entity, a plurality of testimonials for the at least one entity, a behavior of the at least one entity, a location of the at least one entity, a geolocation of the at least one entity, and a relevant jurisdiction for the at least one entity.

The party to the loan may be selected from the parties consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

The data monitoring circuit 8812 may be further structured to monitor the status of the collateral of the loan based on at least one attribute of the collateral selected from the attributes consisting of: a category of the collateral, an age of the collateral, a condition of the collateral, a history of the collateral, a storage condition of the collateral, and a geolocation of the collateral.

The controller 88101 may include a valuation circuit 8844 which may be structured to use a valuation model 8852 to determine a value for the collateral based on the status of the collateral for the loan. The smart contract circuit 8822 may initiate the at least one substitution, removal or addition of one or more items from the collateral for the loan to maintain a value of collateral within a predetermined range.

The valuation circuit 8844 may further include a transactions outcome processing circuit 8864 structured to interpret outcome data 8810 relating to a transaction in collateral and iteratively improve 8850 the valuation model in response to the outcome data.

The valuation circuit 8844 may further include a market value data collection circuit 8848 structured to monitor and report on marketplace information relevant to a value of collateral. The market value data collection circuit 8848 may monitor pricing data or financial data for an offset collateral item 8834 in at least one public marketplace.

The market value data collection circuit 8848 is further structured to construct a set of offset collateral items 8834 used to value an item of collateral may be constructed using a clustering circuit 8832 of the controller 88101 based on an attribute of the collateral. The attributes may be selected from among a category of the collateral, an age of the collateral, a condition of the collateral, a history of the collateral, a storage condition of the collateral, and a geolocation of the collateral.

Terms and conditions 8824 for the loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The smart contract circuit may further include or be in communication with a loan management circuit 8860 structured to specify terms and conditions of the smart lending contract 8831 that governs at least one of loan terms and conditions, a loan-related event 8839 or a loan-related activity or action 8838.

Figure 89:
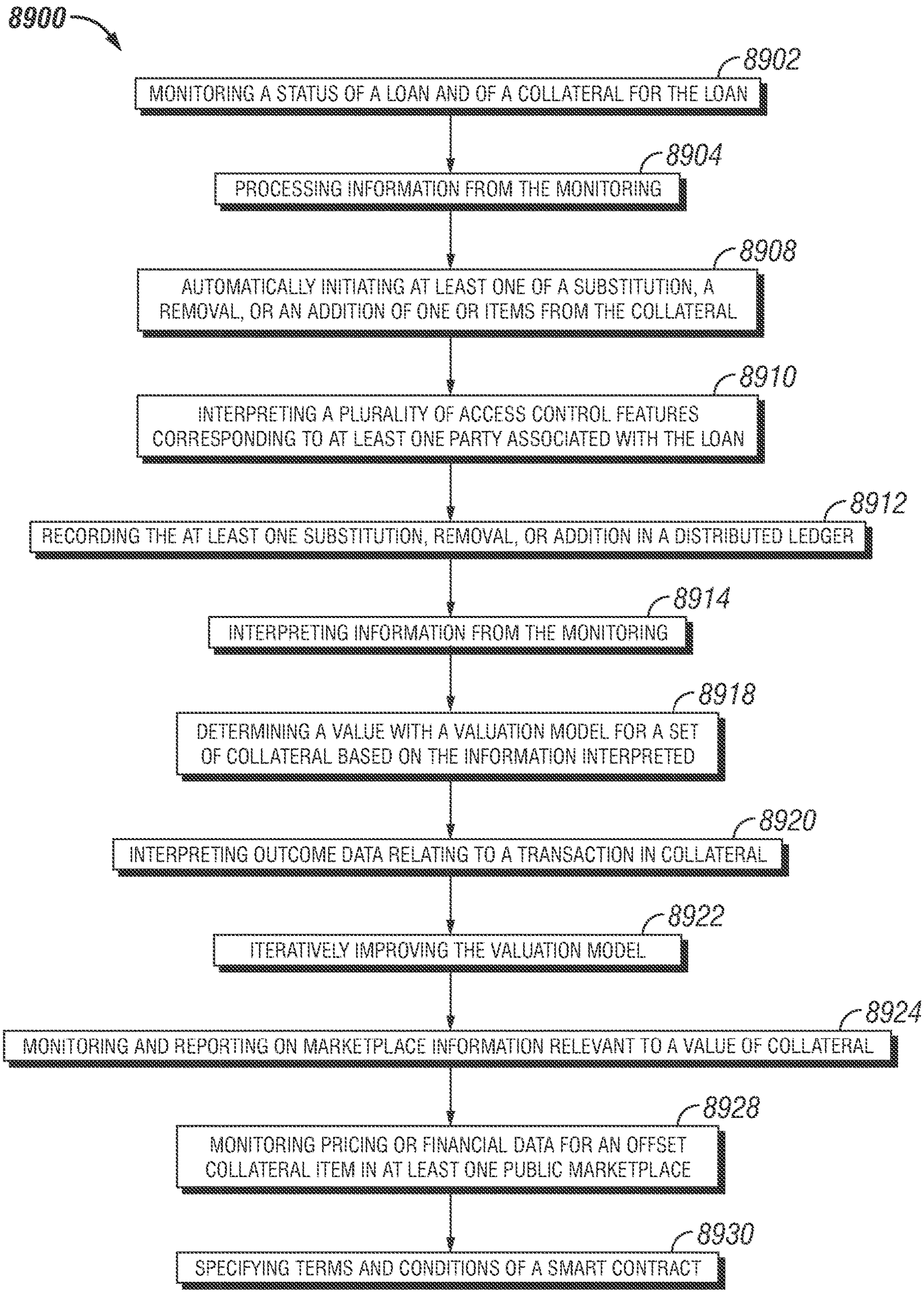
FIG. 89 depicts a smart contract method for managing collateral for a loan.

Referring to FIG. 89, an example smart contract method for managing collateral for a loan is depicted. The example method may include monitoring a status of a loan and of a collateral for the loan (step 8902); automatically initiating at least one of a substitution, a removal, or an addition of one or more items from the collateral for the loan based on the information (step 8908); and interpreting a plurality of access control features corresponding to at least one party associated with the loan (step 8910) and recording the at least one substitution, removal, or addition in a distributed ledger for the loan (step 8912). A status of the loan may be determined based on the status of at least one of an entity related to the loan and a state of a performance of a condition for the loan.

The method may further include interpreting information from the monitoring (step 8914) and determining a value with a valuation model for a set of collateral based on at least one of the status of the loan or the collateral for the loan (step 8918). The at least one substitution, removal, or addition may be to maintain a value of collateral within a predetermined range. The method may further include interpreting outcome data relating to a transaction of one of the collateral or an offset collateral (step 8920) and iteratively improving the valuation model in response to the outcome data (step 8922). The method may further include monitoring and reporting on marketplace information relevant to a value of collateral (step 8924).

The method may further include monitoring pricing data or financial data for an offset collateral item in at least one public marketplace (step 8928).

The method may further include specifying terms and conditions of a smart contract that governs at least one of terms and conditions for the loan, a loan-related event or a loan-related activity (step 8930).

Figure 90:
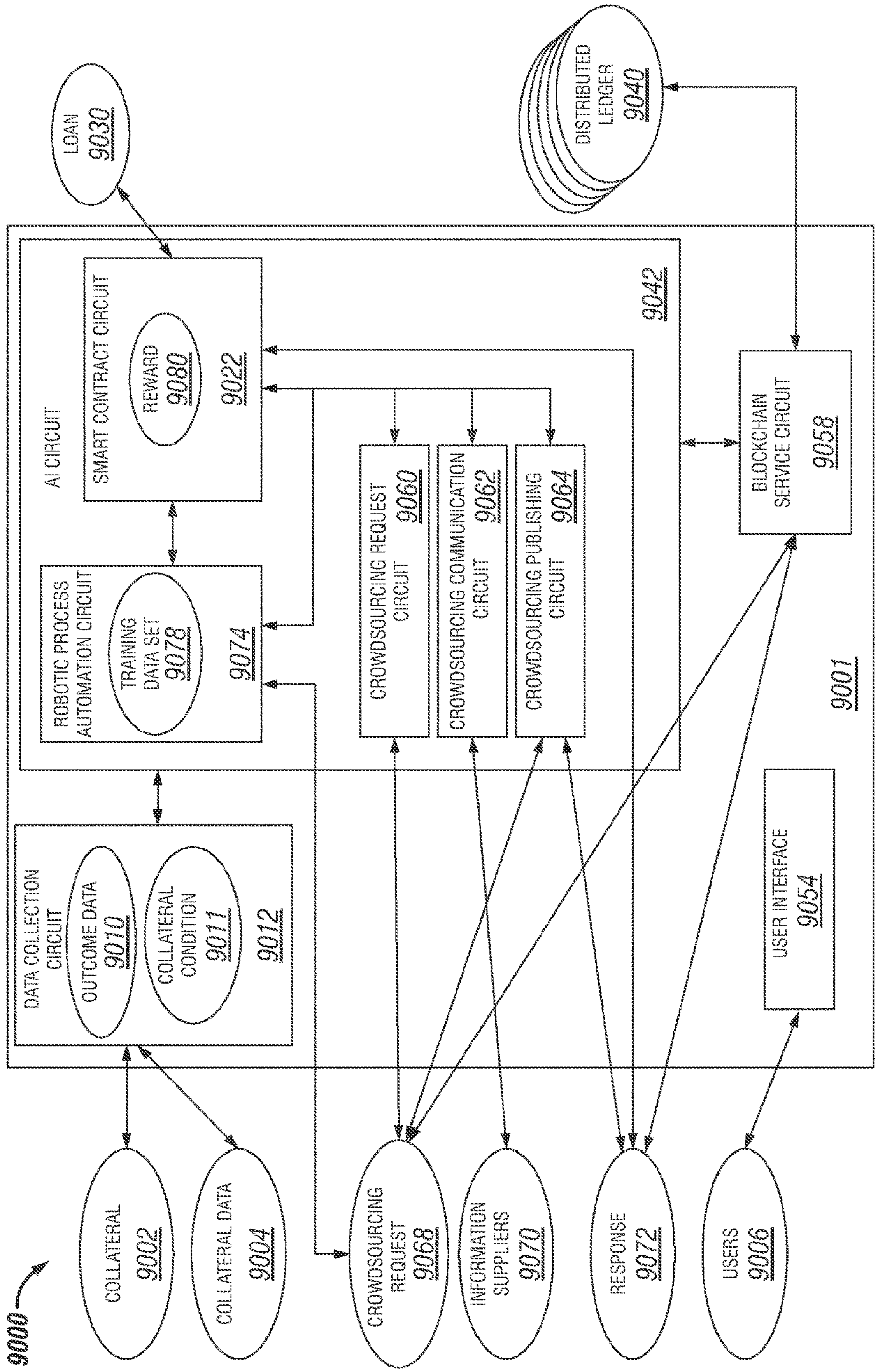
FIG. 90 depicts a system for validating conditions of collateral or a guarantor for a loan.

Referring to FIG. 90, an illustrative and non-limiting example crowdsourcing system for validating conditions of collateral or a guarantor for a loan 9000 is depicted. The example system may include a controller 9001. The controller 9001 may include a data collection circuit 9012, a user interface 9054, and several artificial intelligence circuits including a smart contract circuit 9022, robotic process automation circuit 9074, a crowdsourcing request circuit 9060, a crowdsourcing communications circuit 9062, a crowdsourcing publishing circuit 9064, and a blockchain service circuit 9058.

The crowdsourcing request circuit 9060 may be structured to configure at least one parameter of a crowdsourcing request 9068 related to obtaining information 9004 on a condition 9011 of a collateral 9002 for a loan 9030 or a condition of a guarantor for the loan 9030. It may also enable a workflow by which a human user enters the at least one parameter to establish the crowdsourcing request. The at least one parameter may include a type of requested information, the reward, and a condition for receiving the reward. The reward may be selected from selected from the rewards consisting of: a financial reward, a token, a ticket, a contractual right, a cryptocurrency, a plurality of reward points, a currency, a discount on a product or service, and an access right.

The crowdsourcing publishing circuit 9064 may be configured to publish the crowdsourcing request 9068 to a group of information suppliers.

The crowdsourcing communications circuit 9062 may be structured to collect and process at least one response 9072 from the group of information suppliers 9070, and to provide a reward 9080 to at least one of the group of information suppliers in response to a successful information supply event 9098.

The crowdsourcing communications circuit 9062 further includes a smart contract circuit 9022 structured to manage the reward 9080 by determining the successful information supply event 9098 in response to the at least one parameter configured for the crowdsourcing request 9068, and to automatically allocate the reward 9080 to the at least one of the group of information suppliers 9070 in response to the successful information supply event 9098. It may also be structured to process the at least one response 9072 and, in response, automatically undertake an action related to the loan. The action may be at least one of a foreclosure action, a lien administration action, an interest-rate setting action, a default initiation action, a substitution of collateral, or a calling of the loan.

The loan 9030 may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The crowdsourcing request circuit 9060 may be further structured to configure at least one further parameter of the crowdsourcing request 9068 to obtain information on a condition of a collateral for the loan 9011.

The collateral 9002 may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The condition 9011 of collateral may be determined based on an attribute selected from the attributes consisting of: a quality of the collateral, a condition of the collateral, a status of a title to the collateral, a status of a possession of the collateral, and a status of a lien on the collateral. When the collateral is an item, the condition may be determined based on an attribute selected from the attributes consisting of: a new or used status of the item, a type of the item, a category of the item, a specification of the item, a product feature set of the item, a model of the item, a brand of the item, a manufacturer of the item, a status of the item, a context of the item, a state of the item, a value of the item, a storage location of the item, a geolocation of the item, an age of the item, a maintenance history of the item, a usage history of the item, an accident history of the item, a fault history of the item, an ownership of the item, an ownership history of the item, a price of a type of the item, a value of a type of the item, an assessment of the item, and a valuation of the item.

The blockchain service circuit 9058 may be structured to record identifying information and the at least one parameter of the crowdsourcing request, the at least one response to the crowdsourcing request, and a reward description in a distributed ledger 9040.

The robotic process automation circuit 9074 may be structured to, based on training on a training data set 9078 comprising human user interactions with at least one of the crowdsourcing request circuit or the crowdsourcing communications circuit, to configure the crowdsourcing request based on at least one attribute of the loan. The at least one attribute of the loan may be obtained from a smart contract circuit 9022 that manages the loan. The training data set 9078 may further include outcomes from a plurality of crowdsourcing requests.

The robotic process automation circuit 9074 may be further structured to determine a reward 9080.

The robotic process automation circuit 9074 may be further structured to determine at least one domain to which the crowdsourcing publishing circuit 9064 publishes the crowdsourcing request 9068.

Figure 91:
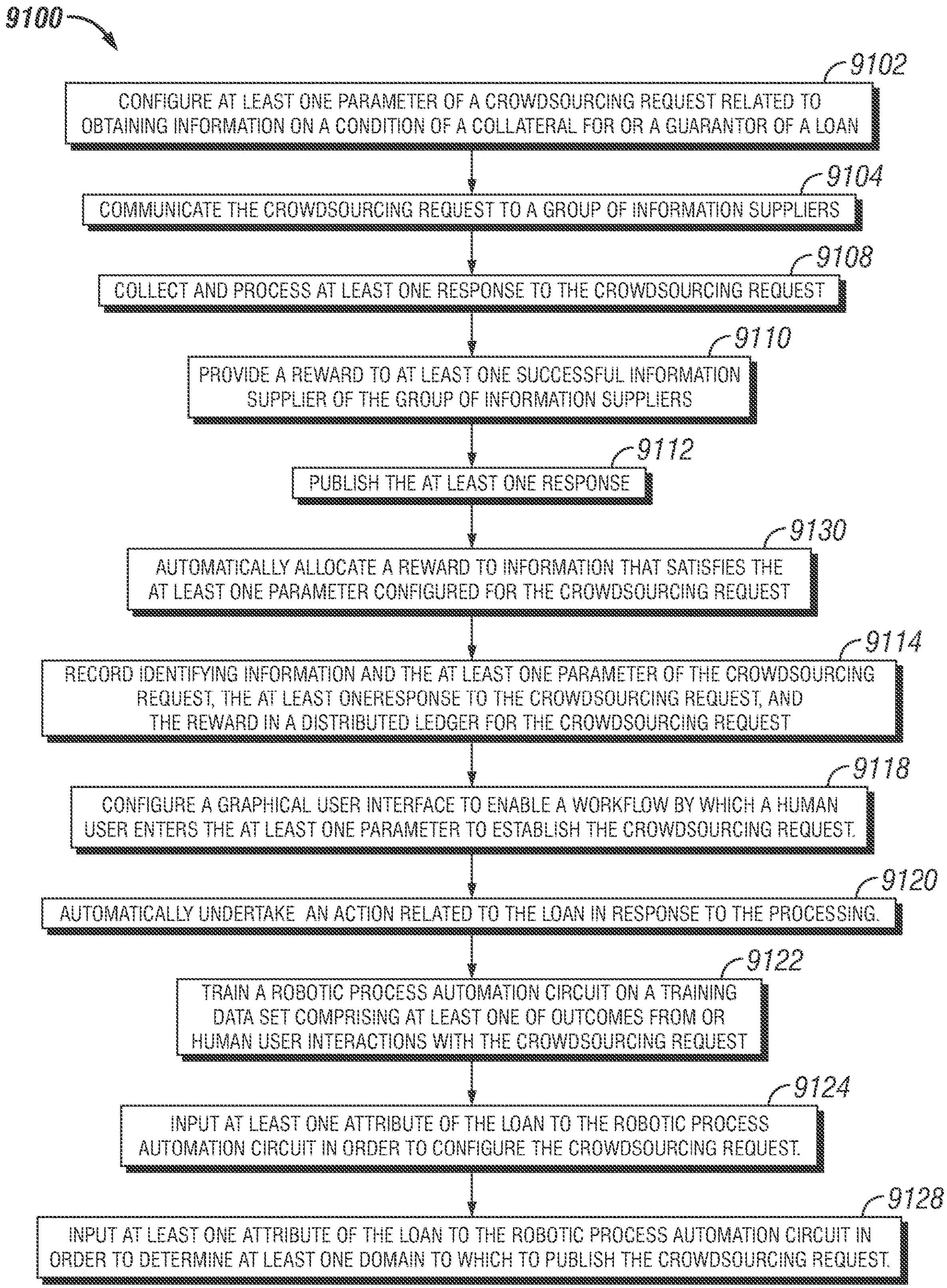
FIG. 91 depicts a crowdsourcing method for validating conditions of collateral or a guarantor for a loan.

Referring to FIG. 91, provided herein is a crowdsourcing method for validating conditions of collateral or a guarantor for a loan. At least one parameter of a crowdsourcing request may be configured to obtain information on a condition of a collateral for a loan or a condition of a guarantor for the loan (step 9102). The crowdsourcing request may be published to a group of information suppliers (step 9104). At least one response to the crowdsourcing request may be collected and processed (step 9108). A reward may be provided to at least one successful information supplier of the group of information suppliers in response to a successful information supply event (step 9110). A reward description may be published to at least a portion of the group of information suppliers in response to the successful information supply event (step 9112). The reward may be automatically allocated to at least one of the group of information suppliers in response to the successful information supply event (step 9130). The method may further include recording identifying information and the at least one parameter of the crowdsourcing request, the at least one response to the crowdsourcing request, and a reward description in a distributed ledger for the crowdsourcing request (step 9114). A graphical user interface may be configured to enable a workflow by which a human user enters the at least one parameter to establish the crowdsourcing request (step 9118). An action related to the loan may be automatically undertaken in response to the successful information supply event (step 9120). A robotic process automation circuit may be trained on a training data set comprising a plurality of outcomes corresponding to a plurality of the crowdsourcing requests, and operating the robotic process automation circuit to iteratively improve the crowdsourcing request (step 9122). At least one attribute of the loan may be provided to the robotic process automation circuit in order to configure the crowdsourcing request (step 9124). Configuring the crowdsourcing request may include determining a reward. At least one attribute of the loan may be provided to the robotic process automation circuit in order to determine at least one domain to which to publish the crowdsourcing request (step 9128).

Figure 92:
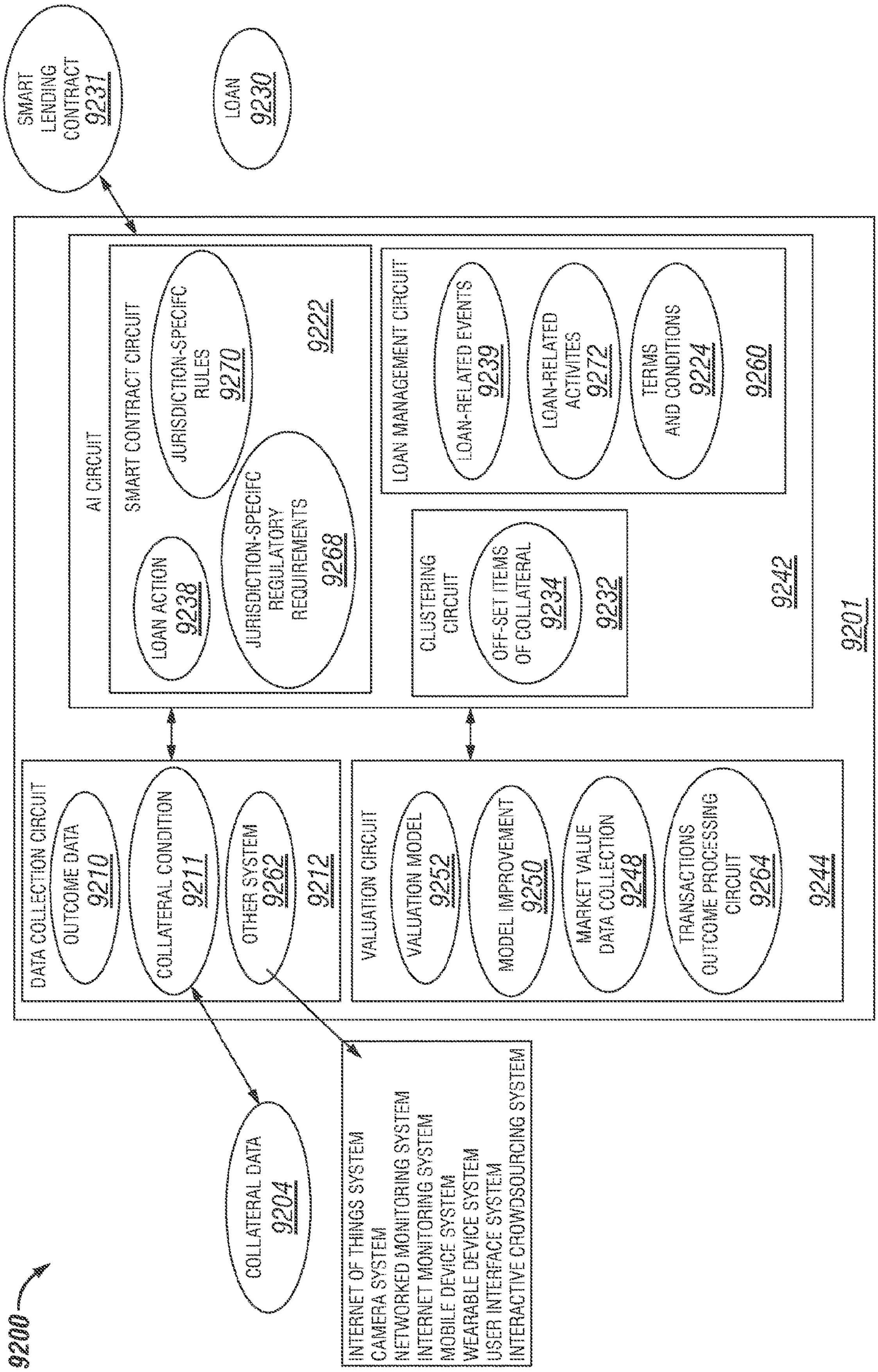
FIG. 92 depicts a smart contract system for modifying a loan.

Referring to FIG. 92, an illustrative and non-limiting example smart contract system for modifying a loan 9200 is depicted. The example system may include a controller 9201. The controller 9201 may include a data collection circuit 9212, a valuation circuit 9244, and several artificial intelligence circuits 9242 including a smart contract circuit 9222, a clustering circuit 9232, a jurisdiction definition circuit 9298, and a loan management circuit 9260. The data collection circuit 9212 may be structured to determine location information corresponding to each one of a plurality of entities involved in a loan. The jurisdiction definition circuit 9298 may be structured to determine a jurisdiction for at least one of the plurality of entities in response to the location information. The smart contract circuit 9222 may be structured to automatically undertake a loan-related action 9238 for the loan based at least in part on the jurisdiction for at least one of the plurality of entities.

The smart contract circuit 9222 may be further structured to automatically undertake the loan-related action in response to a first one of the plurality of entities being in a first jurisdiction, and a second one of the plurality of entities being in a second jurisdiction.

The smart contract circuit 9222 may be further structured to automatically undertake the loan-related action in response to one of the plurality of entities moving from a first jurisdiction to a second jurisdiction.

The loan-related action 9238 may include at least one loan-related action selected from the loan-related actions consisting of: offering the loan, accepting the loan, underwriting the loan, setting an interest rate for the loan, deferring a payment requirement, modifying an interest rate for the loan, validating title for collateral, recording a change in title, assessing a value of collateral, initiating inspection of collateral, calling the loan, closing the loan, setting terms and conditions for the loan, providing notices required to be provided to a borrower, foreclosing on property subject to the loan, and modifying terms and conditions for the loan.

The smart contract circuit 9222 may be further structured to process a plurality of jurisdiction-specific regulatory requirements 9268, such as requirements related to notice, and to provide an appropriate notice to a borrower based on a jurisdiction corresponding to at least one entity selected from the entities consisting of a lender, a borrower, funds provided via the loan, a repayment of the loan, or a collateral for the loan.

The smart contract circuit 9222 may be further structured to process a plurality of jurisdiction-specific regulatory requirements 9268, such as requirement related to foreclosure, and to provide an appropriate foreclosure notice to a borrower based on a jurisdiction of at least one of a lender, a borrower, funds provided via the loan, a repayment of the loan, and a collateral for the loan.

The smart contract circuit 9222 may be further structured to process a plurality of jurisdiction-specific rules 9270 for setting terms and conditions 9224 of the loan and to configure a smart contract 9231 based on a jurisdiction corresponding to at least one entity selected from the entities consisting of: a borrower, funds provided via the loan, a repayment of the loan, and a collateral for the loan.

The smart contract circuit 9222 may be further structured to determine an interest rate for the loan to cause the loan to comply with a maximum interest rate limitation applicable in a jurisdiction corresponding to a selected one of the plurality of entities.

The data collection circuit 9212 may be further structured to monitor a condition of a collateral for the loan, and wherein the smart contract circuit is further structured to determine the interest rate for the loan in response to the condition of the collateral for the loan.

The data collection circuit 9212 may be further structured to monitor an attribute of at least one of the plurality of entities that are party to the loan, and wherein the smart contract circuit is further structured to determine the interest rate for the loan in response to the attribute.

The smart contract circuit 9222 may further include a loan management circuit 9260 for specifying terms and conditions of smart contracts that govern at least one of loan terms and conditions 9224, loan-related events 9239 or loan-related activities 9272.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring management, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

Terms and conditions for the loan may each include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The data collection circuit 9212 may further include at least one other system 9262 selected from the systems consisting of: an Internet of Things system, a camera system, a networked monitoring system, an internet monitoring system, a mobile device system, a wearable device system, a user interface system, and an interactive crowdsourcing system.

The valuation circuit 9244 may be structured to use a valuation model 9252 to determine a value for a collateral for the loan based on the jurisdiction corresponding to at least one of the plurality of entities. The valuation model 9252 may be a jurisdiction-specific valuation model, and wherein the jurisdiction corresponding to at least one of the plurality of entities comprises a jurisdiction corresponding to at least one entity selected from the entities consisting of: a lender, a borrower, funds provided pursuant to the loan, a delivery location of funds provided pursuant to the loan, a payment of the loan, and a collateral for the loan.

At least one of the terms and conditions for the loan may be based on the value of the collateral for the loan.

The collateral may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The valuation circuit 9244 may further include a transactions outcome processing circuit 9264 structured to interpret outcome data relating to a transaction in collateral and iteratively improve 9250 the valuation model in response to the outcome data.

The valuation circuit 9244 may further include a market value data collection circuit 9248 structured to monitor and report on marketplace information relevant to a value of collateral. The market value data collection circuit may monitor pricing or financial data for an offset collateral item in at least one public marketplace. A set of offset collateral items 9234 for valuing an item of collateral may be constructed using the clustering circuit 9232 based on an attribute of the collateral. The attribute may be selected from among a category of the collateral, an age of the collateral, a condition of the collateral, a history of the collateral, a storage condition of the collateral, and a geolocation of the collateral.

Figure 93:
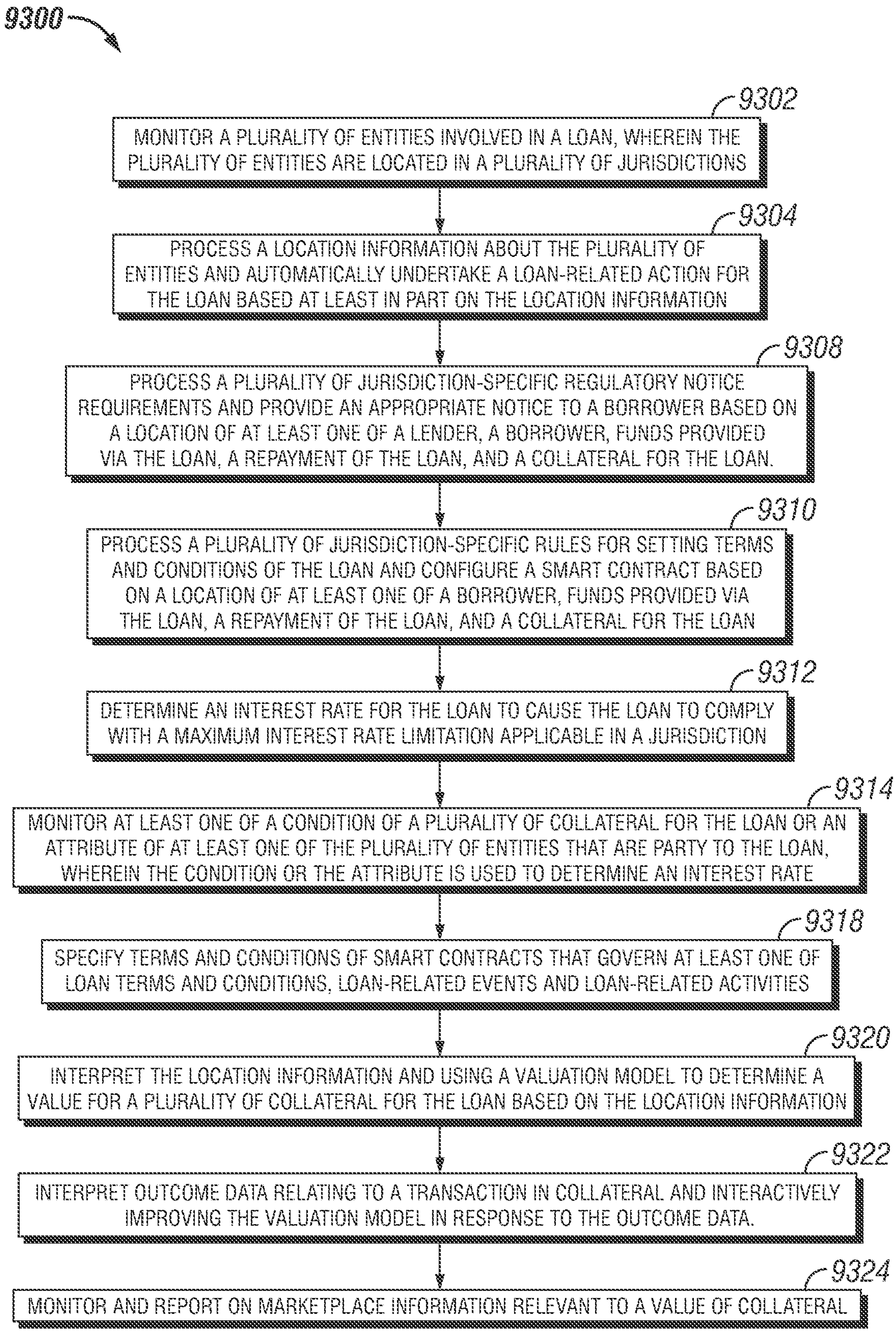
FIG. 93 depicts a smart contract method for modifying a loan.

Referring to FIG. 93, provided herein is a smart contract method 9300 for modifying a loan. An example method may include monitoring location information corresponding to each one of a plurality of entities involved in a loan (step 9302); processing a location information about the entities and automatically undertaking a loan-related action for the loan based at least in part on the location information (step 9304). The example method includes processing a number of jurisdiction-specific regulatory notice requirements and providing an appropriate notice to a borrower based on a location of the lender, a borrower, funds provided via the loan, a repayment of the loan, and/or a collateral for the loan (step 9308). The example method includes processing a number of jurisdiction-specific rules for setting terms and conditions of the loan, and configuring a smart contract based on a location of the lender, a borrower, funds provided via the loan, a repayment of the loan, and/or a collateral for the loan (step 9310). The example method further includes determining an interest rate of the loan to cause the loan to comply with a maximum interest rate limitation applicable in a jurisdiction (step 9312). The example method includes monitoring at least one of a condition of a number of collateral items for the loan or an attribute of one of the entities that are a party to the loan, where the condition or the attribute is used to determine an interest rate (step 9314). The example method includes specifying terms and conditions of smart contract(s) that govern at least one of the terms and conditions, loan-related events, or loan-related activities (step 9318). The example method includes interpreting the location information and using a valuation model to determine a value for a number of collateral items for the loan based on the location information (step 9320). The example method includes interpreting outcome data relating to a transaction in collateral, and iteratively improving the valuation model in response to the outcome data (step 9322). The example method includes monitoring and reporting on marketplace information relevant to a value of collateral (step 9324).

A plurality of jurisdiction-specific requirements based on a jurisdiction of a relevant one of the plurality of entities may be processed, and performing at least one operation may be selected from the operations consisting of: providing an appropriate notice to a borrower in response to the plurality of jurisdiction-specific requirements comprising regulatory notice requirements; setting specific rules for setting terms and conditions of the loan in response to the plurality of jurisdiction-specific requirements comprising jurisdiction-specific rules for terms and conditions of the loan; determining an interest rate for the loan to cause the loan to comply with a maximum interest rate limitation in response to the plurality of jurisdiction-specific requirements comprising a maximum interest rate limitation; and wherein the relevant one of the plurality of entities comprises at least one entity selected from the entities consisting of: a lender, a borrower, funds provided pursuant to the loan, a repayment of the loan, and a collateral for the loan (step 9308).

At least one of a condition of a plurality of collateral for the loan or an attribute of at least one of the plurality of entities that are party to the loan may be monitored, wherein the condition or the attribute is used to determine an interest rate (step 9314).

A valuation model may be operated to determine a value for a collateral for the loan based on the jurisdiction for at least one of the plurality of entities (step 9320).

Outcome data relating to a transaction in collateral may be interpreted and the valuation model may be iteratively improved in response to the outcome data (step 9322).

Figure 94:
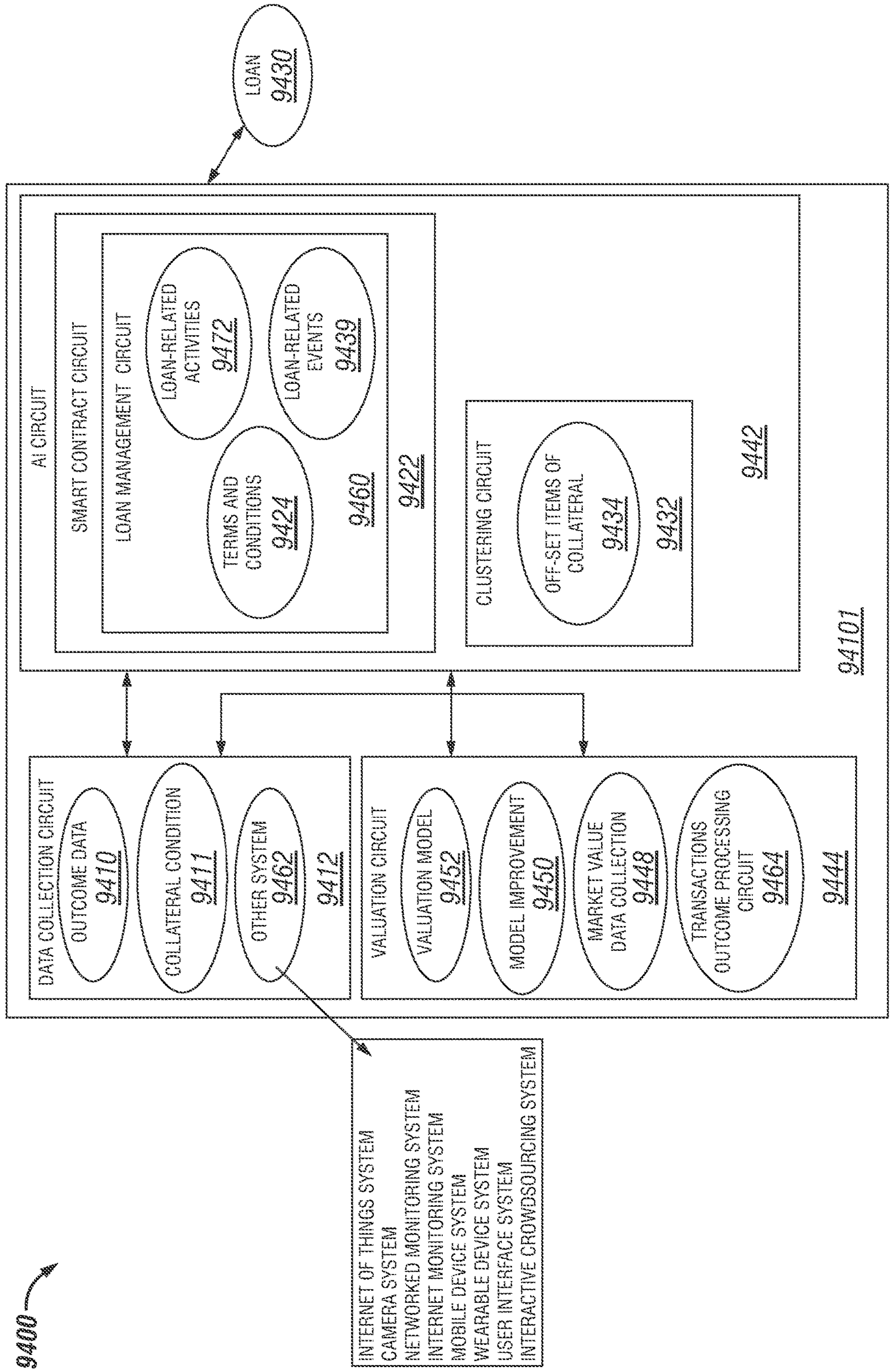
FIG. 94 depicts a smart contract system for modifying a loan.

Referring now to FIG. 94, an illustrative and non-limiting example smart contract system for modifying a loan 9400 is depicted. The example system may include a controller 9401. The controller 94101 may include a data collection circuit 9412, a valuation circuit 9444, and several artificial intelligence circuits 9442 including a smart contract circuit 9422, a clustering circuit 9432, and a loan management circuit 9460.

The data collection circuit 9412 may be structured to monitor and collect information about at least one entity 9498 involved in a loan 9430. The smart contract circuit 9422 may be structured to automatically restructure a debt related to the loan based on the monitored and collected information about the at least one entity involved in the loan. The monitored and collected information may include a condition of a collateral 9411 for the loan, or according to at least one rule that is based on a covenant of the loan and wherein the restructuring occurs upon an event that is determined with respect to the at least one entity that relates to the covenant, or restructuring may be based on an attribute 9494 of the at least one entity that is monitored by the data collection circuit. The event may be a failure of collateral for the loan to exceed a required fractional value of a remaining balance of the loan, or a default of a buyer with respect to the covenant.

The smart contract circuit 9422 may be further structured to determine the occurrence of an event based on a covenant of the loan and the monitored and collected information about the at least one entity involved in the loan, and to automatically restructure the debt in response to the occurrence of the event.

The smart contract circuit 9422 may further include a loan management circuit 9460 which may be structured to specify terms and conditions of a smart contract that governs at least one of loan terms and conditions 9424, a loan-related event 9439 or a loan-related activity 9472.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

Terms and conditions for the loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

The data collection circuit 9412 may further include at least one other system 9462 selected from the systems consisting of: an Internet of Things system, a camera system, a networked monitoring system, an internet monitoring system, a mobile device system, a wearable device system, a user interface system, and an interactive crowdsourcing system.

The valuation circuit 9444 may be structured to use a valuation model 9452 to determine a value for a collateral based on the monitored and collected information about the at least one entity involved in the loan. The smart contract circuit may be further structured to automatically restructure the debt based on the value for the collateral.

The collateral may be at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

The valuation circuit 9444 may further include a transactions outcome processing circuit 9464 structured to interpret outcome data 9410 relating to a transaction in collateral and iteratively improve 9450 the valuation model in response to the outcome data.

The valuation circuit 9444 may further include a market value data collection circuit 9448 structured to monitor and report on marketplace information relevant to a value of collateral. The market value data collection circuit 9448 monitors pricing or financial data for an offset collateral item 9434 in at least one public marketplace. A set of offset collateral items 9434 for valuing an item of collateral may be constructed using a clustering circuit 9432 based on an attribute of the collateral. The attribute may be selected from among a category of the collateral, an age of the collateral, a condition of the collateral, a history of the collateral, a storage condition of the collateral, and a geolocation of the collateral.

Figure 95:
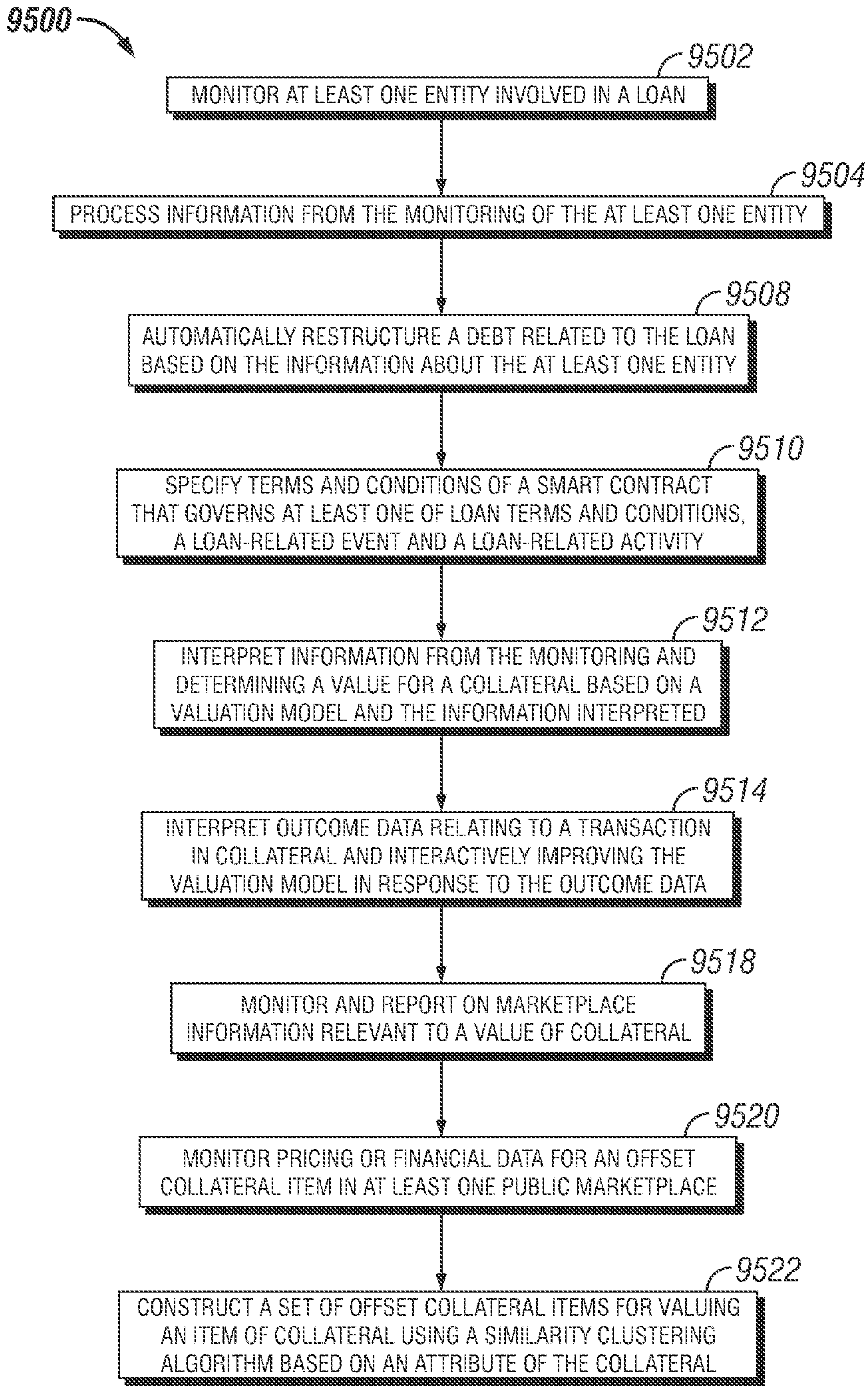
FIG. 95 depicts a smart contract method for modifying a loan.

Referring now to FIG. 95, an illustrative and non-limiting example smart contract method for modifying a loan 9500 is depicted. The method includes monitoring and collecting information about at least one entity involved in a loan (step 9502); processing information from the monitoring of the at least one entity (step 9504); and automatically restructuring a debt related to the loan based on the monitored and collected information about the at least one entity (step 9508). Determining the occurrence of an event may be based on a covenant of the loan and the monitored and collected information about the at least one entity involved in the loan, and automatically restructuring the debt in response to the occurrence of the event (step 9509).

Terms and conditions of a smart contract that governs at least one of loan terms and conditions, a loan-related event and a loan-related activity may be specified (step 9510).

Operating a valuation model to determine a value for a collateral based on the monitored and collected information about the at least one entity involved in the loan (step 9512).

Outcome data relating to a transaction in collateral may be interpreted and the valuation model may be iteratively improved in response to the outcome data (step 9514).

The method may further include monitoring and reporting on marketplace information relevant to a value of collateral (step 9518).

Pricing or financial data for an offset collateral item may be monitored in at least one public marketplace (step 9520).

A set of offset collateral items for valuing an item of collateral may be constructed using a similarity clustering algorithm based on an attribute of the collateral (step 9522).

Figure 96:
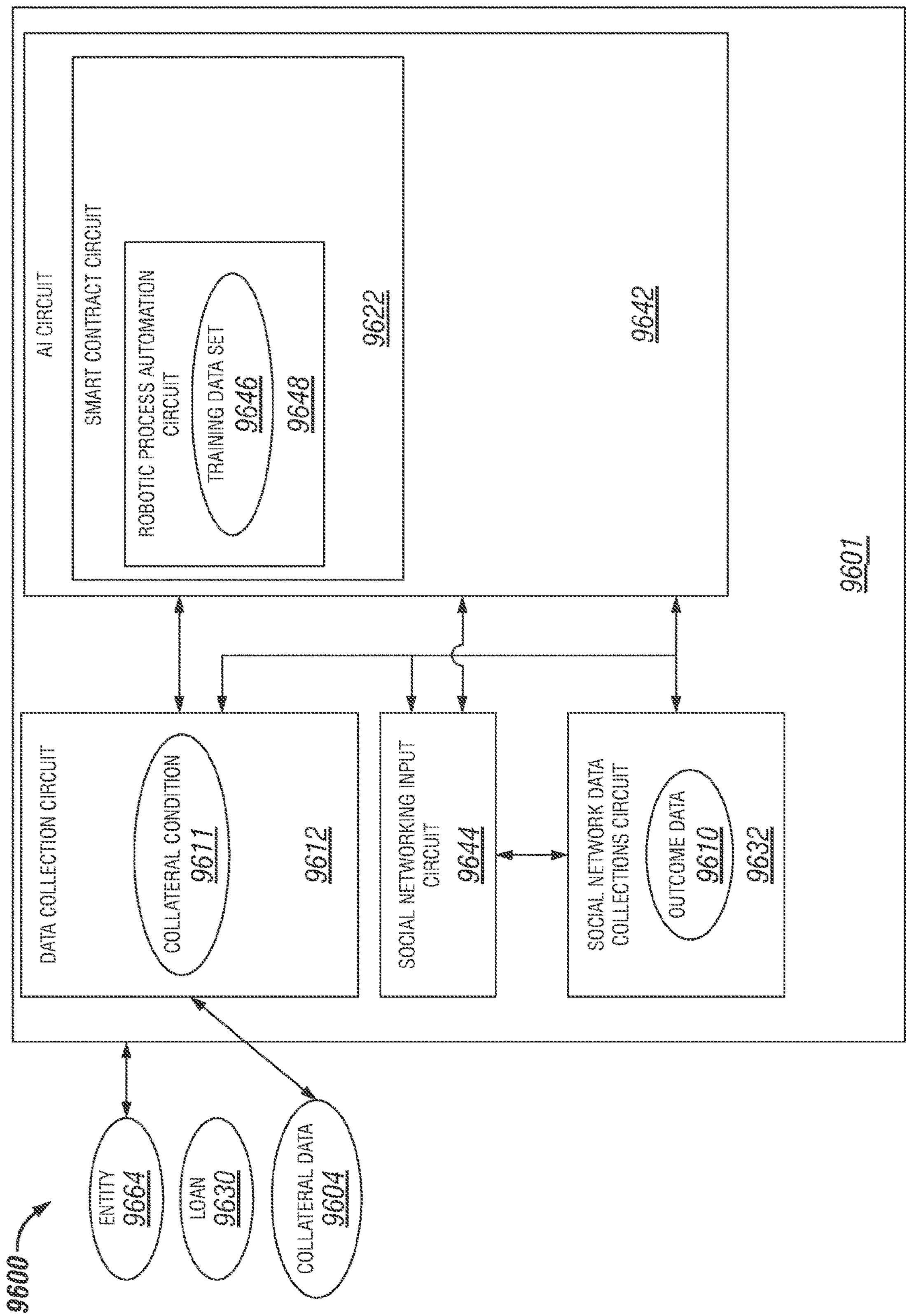
FIG. 96 depicts a smart contract system for modifying a loan.

Referring now to FIG. 96, an illustrative and non-limiting example smart contract system for modifying a loan 9600 is depicted. The example system may include a controller 9601. The controller 9601 may include a data collection circuit 9612, a social networking input circuit 9644, a social network data collection circuit 9632, and several artificial intelligence circuits 9642 including a smart contract circuit 9622, a guarantee validation circuit 9698, and a robotic process automation circuit 9648.

The social network data collection circuit 9632 may be structured to collect data using a plurality of algorithms that are configured to monitor social network information about an entity 9664 involved in a loan 9630 in response to the loan guarantee parameter. The social networking input circuit 9644 may be structured to interpret a loan guarantee parameter. The guarantee validation circuit 9698 may be structured to validate a guarantee for the loan in response to the monitored social network information.

The loan guarantee parameter may include a financial condition of the entity, wherein the entity is a guarantor for the loan.

The guarantee validation circuit 9698 may be further structured to determine the financial condition may be determined based on at least one attribute selected from the attributes consisting of: a publicly stated valuation of the entity, a property owned by the entity as indicated by public records, a valuation of a property owned by the entity, a bankruptcy condition of the entity, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, a website rating of the entity, a plurality of customer reviews for a product of the entity, a social network rating of the entity, a plurality of credentials of the entity, a plurality of referrals of the entity, a plurality of testimonials for the entity, a plurality of behaviors of the entity, a location of the entity, a jurisdiction of the entity, and a geolocation of the entity.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The data collection circuit 9612 may be structured to obtain information about a condition 9611 of a collateral for the loan, wherein the collateral comprises at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property and wherein the guarantee validation circuit is further structured to validate the guarantee of the loan in response to the condition of the collateral for the loan.

The condition 9611 of collateral may include a condition attribute selected from the group consisting of a quality of the collateral, a status of title to the collateral, a status of possession of the collateral, a status of a lien on the collateral, a new or used status, a type, a category, a specification, a product feature set, a model, a brand, a manufacturer, a status, a context, a state, a value, a storage location, a geolocation, an age, a maintenance history, a usage history, an accident history, a fault history, an ownership, an ownership history, a price, an assessment, and a valuation. Conditions may be stored as collateral data 9604.

The social networking input circuit 9644 may be further structured to enable a workflow by which a human user enters the loan guarantee parameter to establish a social network data collection and monitoring request.

The smart contract circuit 9622 may be structured to automatically undertake an action related to the loan in response to the validation of the loan. The action may be related to the loan is in response to the loan guarantee not being validated, and wherein the action comprises at least one action selected from the actions consisting of: a foreclosure action, a lien administration action, an interest-rate adjustment action, a default initiation action, a substitution of collateral, a calling of the loan, and providing an alert to a second entity involved in the loan.

The robotic process automation circuit 9648 may be structured to, based on iteratively training on a training data set 9646 comprising human user interactions with the social network data collection circuit, configure the loan guarantee parameter based on at least one attribute of the loan. The at least one attribute of the loan 9630 may be obtained from a smart contract circuit that manages the loan.

The training data set 9646 may further include outcomes from a plurality of social network data collection and monitoring requests performed by the social network data collection circuit.

The robotic process automation circuit 9648 may be further structured to determine at least one domain to which the social network data collection circuit will apply.

Training may include training the robotic process automation circuit 9648 to configure the plurality of algorithms.

Figure 97:
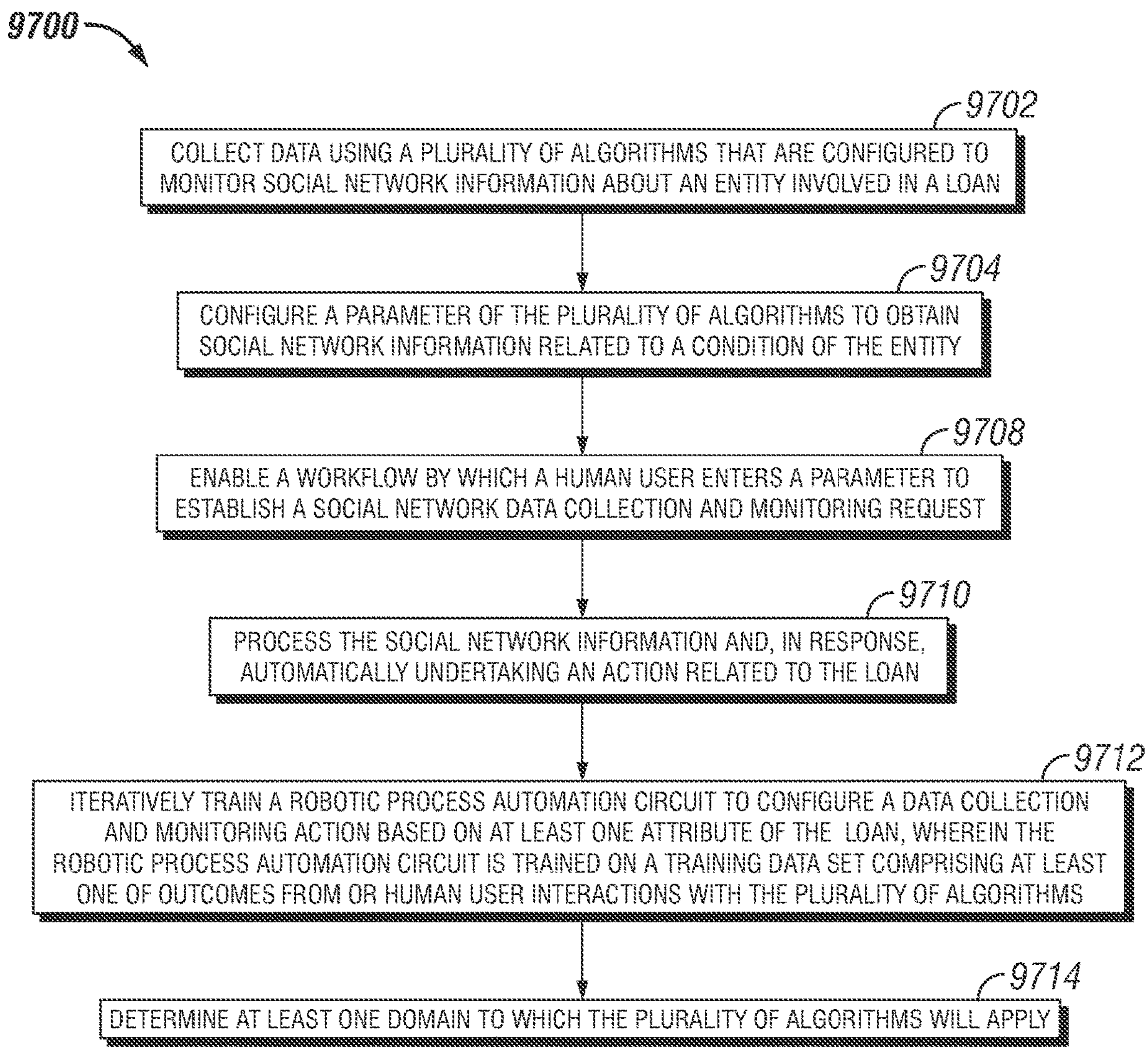
FIG. 97 depicts a smart contract method for modifying a loan.

Referring now to FIG. 97, an illustrative and non-limiting example smart contract method for modifying a loan 9700 is depicted. A loan guarantee parameter may be interpreted (step 9701). Data may be collected using a plurality of algorithms that are configured to monitor social network information about an entity involved in a loan in response to the loan guarantee parameter (step 9702). A guarantee for the loan may be validated in response to the monitored social network information (step 9704). A workflow may be enabled by which a human user enters the loan guarantee parameter to establish a social network data collection and monitoring request (step 9708). In response to the validation of the loan, an action related to the loan may be undertaken automatically (step 9710). A robotic process automation circuit may be iteratively trained to configure a data collection and monitoring action based on at least one attribute of the loan, wherein the robotic process automation circuit is trained on a training data set comprising at least one of outcomes from or human user interactions with the plurality of algorithms (step 9712). At least one domain to which the plurality of algorithms will apply may be determined (step 9714).

Figure 98:
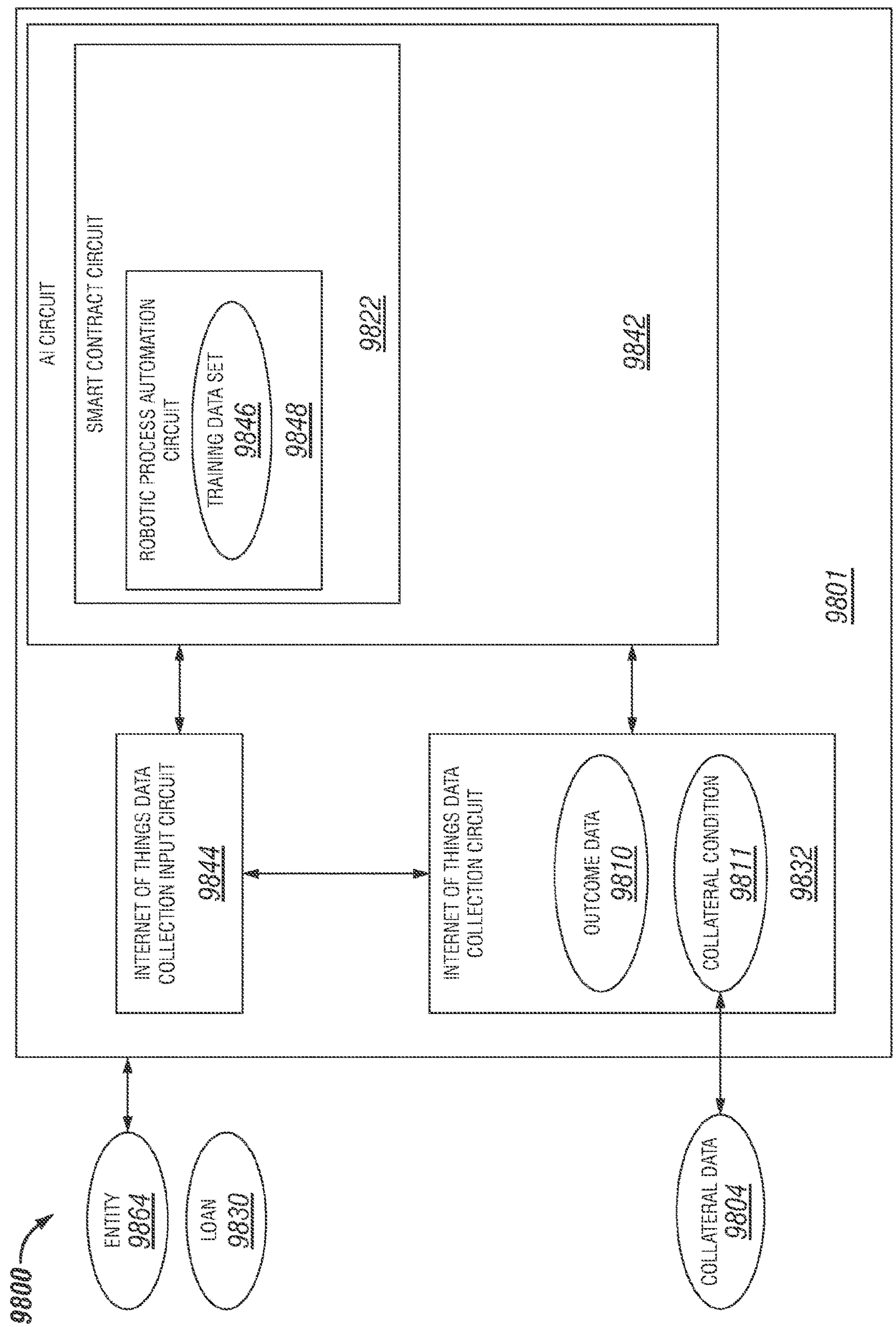
FIG. 98 depicts a monitoring system for validating conditions of a guarantee for a loan.

Referring to FIG. 98, an illustrative and non-limiting example monitoring system for validating conditions of a guarantee for a loan 9800 is depicted. The example system may include a controller 9801. The controller 9801 may include an Internet of Things data collection input circuit 9844, Internet of Things data collection circuit 9832, and several artificial intelligence circuits 9842 including a smart contract circuit 9822, a guarantee validation circuit 9898, and a robotic process automation circuit 9848.

The Internet of Things data collection input circuit 9844 may be structured to interpret a loan guarantee parameter 9892. The Internet of Things data collection circuit 9832 may be structured to collect data using at least one algorithm that is configured to monitor Internet of Things information collected from and about an entity 9864 involved in a loan 9830 in response to the loan guarantee parameter. The guarantee validation circuit 9898 structured to validate a guarantee for the loan in response to the monitored IoT information.

The loan guarantee parameter 9892 may include a financial condition of the entity, wherein the entity is a guarantor for the loan. Monitored IoT information includes at least one of a publicly stated valuation of the entity, a property owned by the entity as indicated by public records, a valuation of a property owned by the entity, a bankruptcy condition of the entity, a foreclosure status of the entity, a contractual default status of the entity, a regulatory violation status of the entity, a criminal status of an entity, an export controls status of the entity, an embargo status of the entity, a tariff status of the entity, a tax status of the entity, a credit report of the entity, a credit rating of the entity, a website rating of the entity, a plurality of customer reviews for a product of the entity, a social network rating of the entity, a plurality of credentials of the entity, a plurality of referrals of the entity, a plurality of testimonials for the entity, a plurality of behaviors of the entity, a location of the entity, a jurisdiction of the entity, and a geolocation of the entity.

The loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The Internet of Things data collection circuit 9832 may be further structured to obtain information about a condition of a collateral for the loan, wherein the collateral comprises at least one item selected from the items consisting of a vehicle, a ship, a plane, a building, a home, a real estate property, an undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property, and wherein the guarantee validation circuit 9898 is further structured to validate the guarantee of the loan in response to the condition of the collateral for the loan.

The condition 9811 of collateral may include a condition attribute selected from the group consisting of a quality of the collateral, a status of title to the collateral, a status of possession of the collateral, a status of a lien on the collateral, a new or used status, a type, a category, a specification, a product feature set, a model, a brand, a manufacturer, a status, a context, a state, a value, a storage location, a geolocation, an age, a maintenance history, a usage history, an accident history, a fault history, an ownership, an ownership history, a price, an assessment, and a valuation.

The Internet of Things data collection input circuit 9844 may be further structured to enable a workflow by which a human user enters the loan guarantee parameter 9892 to establish an Internet of Things data collection request.

The smart contract circuit 9822 may be structured to automatically undertake an action related to the loan in response to the validation of the loan. The action related to the loan may be in response to the loan guarantee not being validated, and wherein the action comprises at least one action selected from the actions consisting of: a foreclosure action, a lien administration action, an interest-rate adjustment action, a default initiation action, a substitution of collateral, a calling of the loan, and providing an alert to second entity involved in the loan.

The robotic process automation circuit 9848 may be structured to, based on iteratively training on a training data set comprising human user interactions with the Internet of Things data collection circuit, configure the loan guarantee parameter based on at least one attribute of the loan. The at least one attribute of the loan is obtained from a smart contract circuit that manage the loan. The training data set 9846 may further include outcomes from a plurality of Internet of Things data collection and monitoring requests performed by the Internet of Things data collection circuit.

The robotic process automation circuit 9848 may be further structured to determine at least one domain to which the Internet of Things data collection circuit will apply.

Training may include training the robotic process automation circuit 9848 to configure the at least one algorithm.

Figure 99:
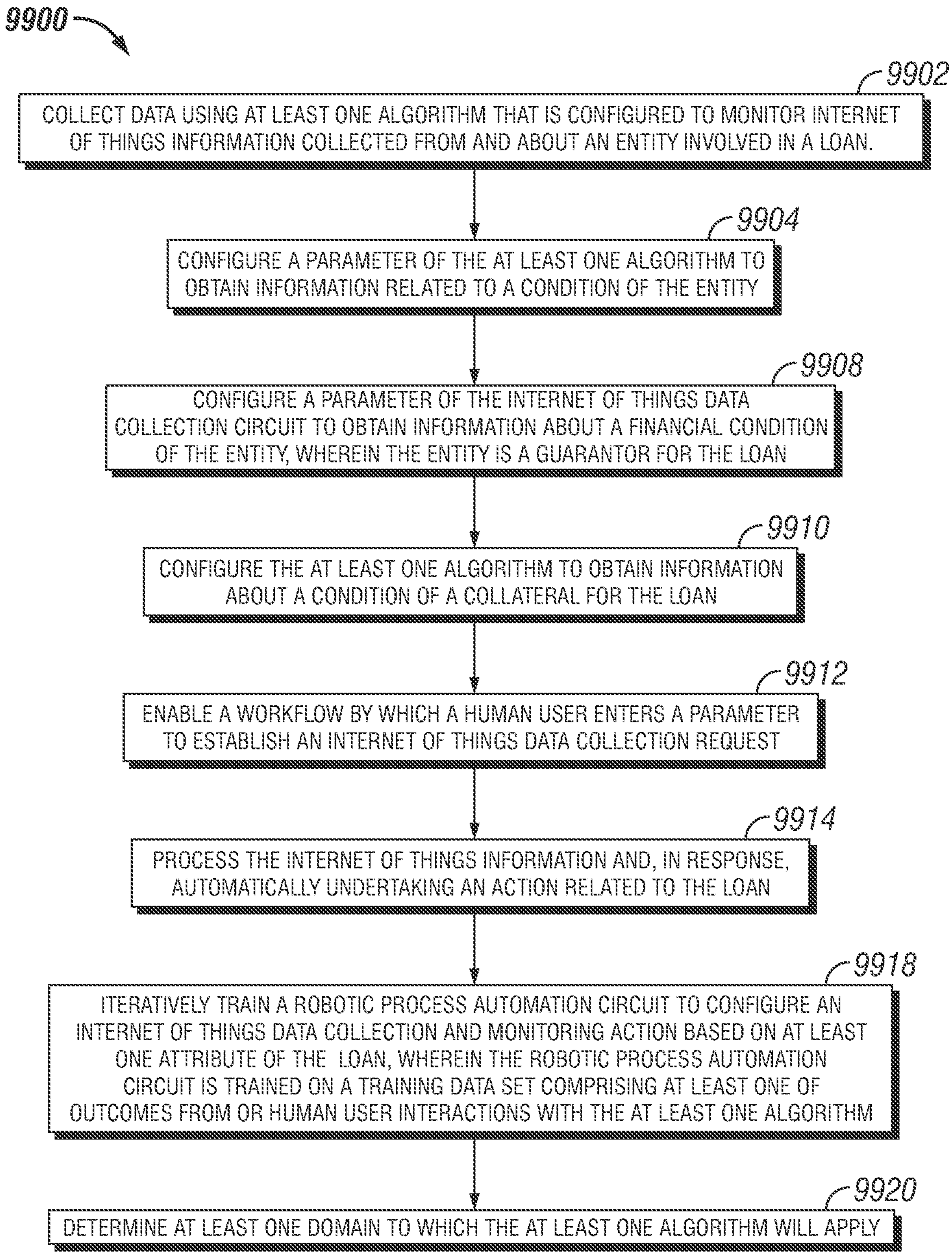
FIG. 99 depicts a monitoring method for validating conditions of a guarantee for a loan.

Referring to FIG. 99, an illustrative and non-limiting example monitoring method for validating conditions of a guarantee for a loan 9900 is depicted. The example method may include interpreting a loan guarantee parameter (step 9902); collecting data using a plurality of algorithms that are configured to monitor Internet of Things (IoT) information collected from and about an entity involved in a loan in response to the loan guarantee parameter (step 9904); and validating a guarantee for the loan in response to the monitored IoT information (step 9905).

The loan guarantee parameter may be configured to obtain information about a financial condition of the entity, wherein the entity is a guarantor for the loan (step 9908). The at least one algorithm may be configured to obtain information about a condition of a collateral for the loan (step 9910), wherein the collateral comprises at least one item selected from the items consisting of a vehicle, a ship, a plane, a building, a home, a real estate property, an undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property; and validating the guarantee for the loan further in response to the condition of the collateral for the loan.

A workflow by which a human user enters the loan guarantee parameter to establish an Internet of Things data collection request may be enabled (step 9912).

An action related to the loan may be undertaken automatically in response to the validation (step 9914).

The action related to the loan may be in response to the loan guarantee not being validated, and wherein the action comprises a foreclosure action.

The action related to the loan may be in response to the loan guarantee not being validated, and wherein the action comprises a lien administration action.

The action related to the loan may be in response to the loan guarantee not being validated, and wherein the action comprises an interest-rate adjustment action.

The action related to the loan may be in response to the loan guarantee not being validated, and wherein the action comprises a default initiation action.

The action related to the loan may be in response to the loan guarantee not being validated, and wherein the action comprises a substitution of collateral.

The action related to the loan may be in response to the loan guarantee not being validated, and wherein the action comprises a calling of the loan.

The action related to the loan may be in response to the loan guarantee not being validated, and wherein the action comprises providing an alert to a second entity involved in the loan.

A robotic process automation circuit may be iteratively trained to configure an Internet of Things data collection and monitoring action based on at least one attribute of the loan, wherein the robotic process automation circuit is trained on a training data set comprising at least one of outcomes from or human user interactions with the plurality of algorithms (step 9918).

At least one domain to which the at least one algorithm will apply may be determined (step 9920). Training may include training the robotic process automation circuit to configure the plurality of algorithms.

The training data set may further include outcomes from a set of IoT data collection and monitoring requests.

Figure 100:
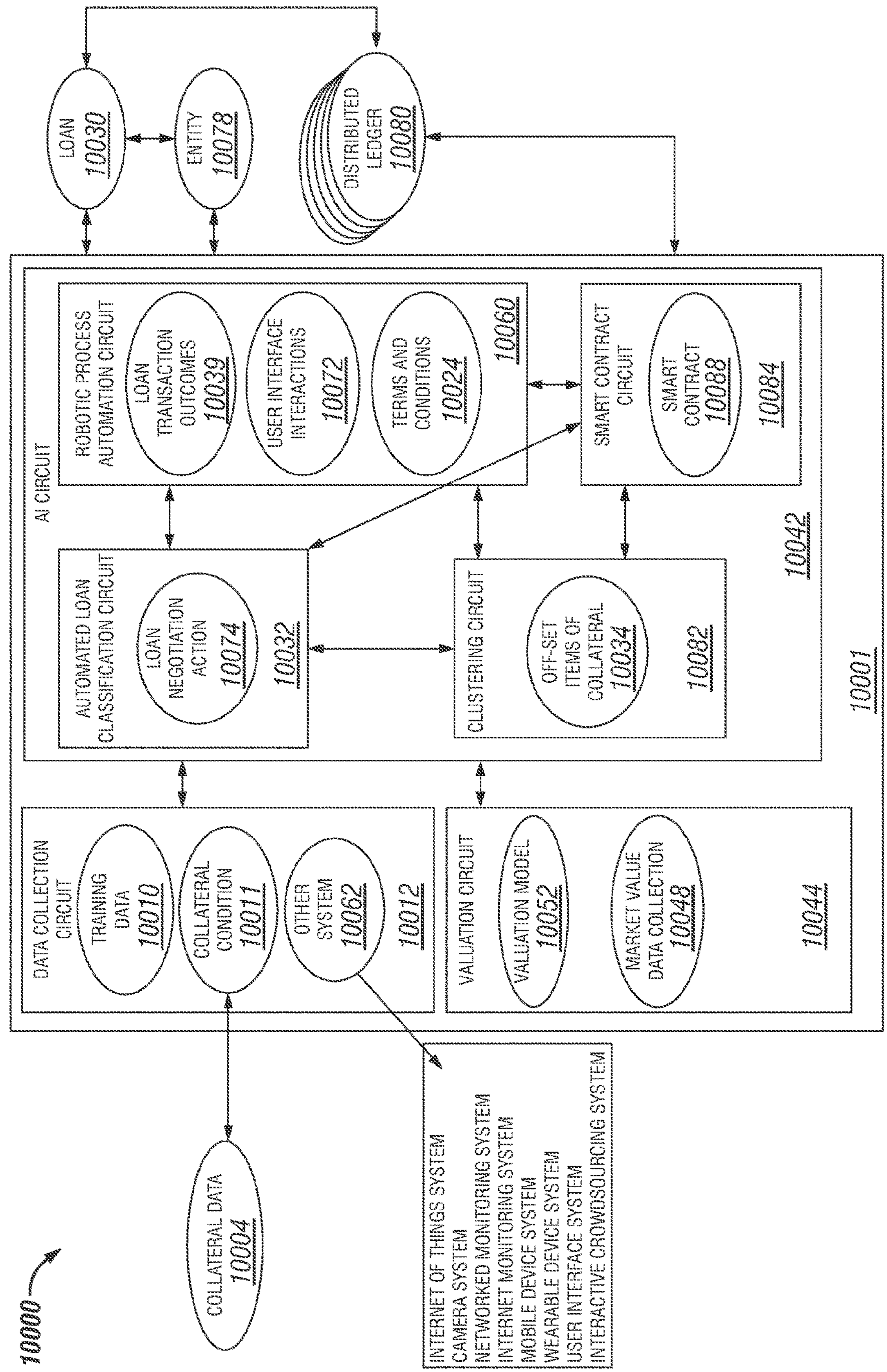
FIG. 100 depicts a robotic process automation system for negotiating a loan.

Referring now to FIG. 100, an illustrative and non-limiting example robotic process automation system for negotiating a loan 10000 is depicted. The example system may include a controller 10001. The controller 10001 may include a data collection circuit 10012, a valuation circuit 10044, and several artificial intelligence circuits 10042 including an automated loan classification circuit 10032, a robotic process automation circuit 10060, a smart contract circuit 10084, and a clustering circuit 10082.

The data collection circuit 10012 may be structured to collect a training set of interactions 10010 from at least one entity 10078 related to at least one loan transaction. An automated loan classification circuit 10032 may be trained on the training set of interactions 10010 to classify a at least one loan negotiation action. The robotic process automation circuit 10060 may be trained on a training set of a plurality of loan negotiation actions 10074 classified by the automated loan classification circuit 10032 and a plurality of loan transaction outcomes 10039 to negotiate a terms and conditions 10024 of a new loan 10030 on behalf of a party to the new loan.

The data collection circuit may further include at least one other system 10062 selected from the systems consisting of: an Internet of Things system, a camera system, a networked monitoring system, an internet monitoring system, a mobile device system, a wearable device system, a user interface system, and an interactive crowdsourcing system. The at least one entity may be a party to the at least one loan transaction and may be selected from the entities consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

The automated loan classification circuit 10032 may include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The robotic process automation circuit 10060 may be further trained on a plurality of interactions of parties with a plurality of user interfaces involved in a plurality of lending processes.

The smart contract circuit 10084 may be structured to automatically configure a smart contract 10088 for the new loan 10030 based on an outcome of the negotiation.

A distributed ledger 10080 may be associated with the new loan 10030, wherein the distributed ledger 10080 is structured to record at least one of an outcome and a negotiating event of the negotiation.

The new loan may include at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

The valuation circuit 10044 may be structured to use a valuation model 10052 to determine a value for a collateral for the new loan. The collateral may include at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item ofjewelry, a gemstone, an item of intellectual property, an intellectual property right, a contractual right, an antique, a fixture, an item of furniture, an item of equipment, a tool, an item of machinery, and an item of personal property.

The valuation circuit may further include a market value data collection circuit 10048 structured to monitor and report on marketplace information relevant to a value of the collateral. The market value data collection circuit 10048 may monitor pricing or financial data for an offset collateral item 10034 in at least one public marketplace. A set of offset collateral items 10034 for valuing the collateral may be constructed using a clustering circuit 10082 based on an attribute of the collateral. The attribute may be selected from among a category of the collateral, an age of the collateral, a condition of the collateral, a history of the collateral, a storage condition of the collateral, and a geolocation of the collateral. The terms and conditions 10024 for the new loan may include at least one member selected from the group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, and a consequence of default.

Figure 101:
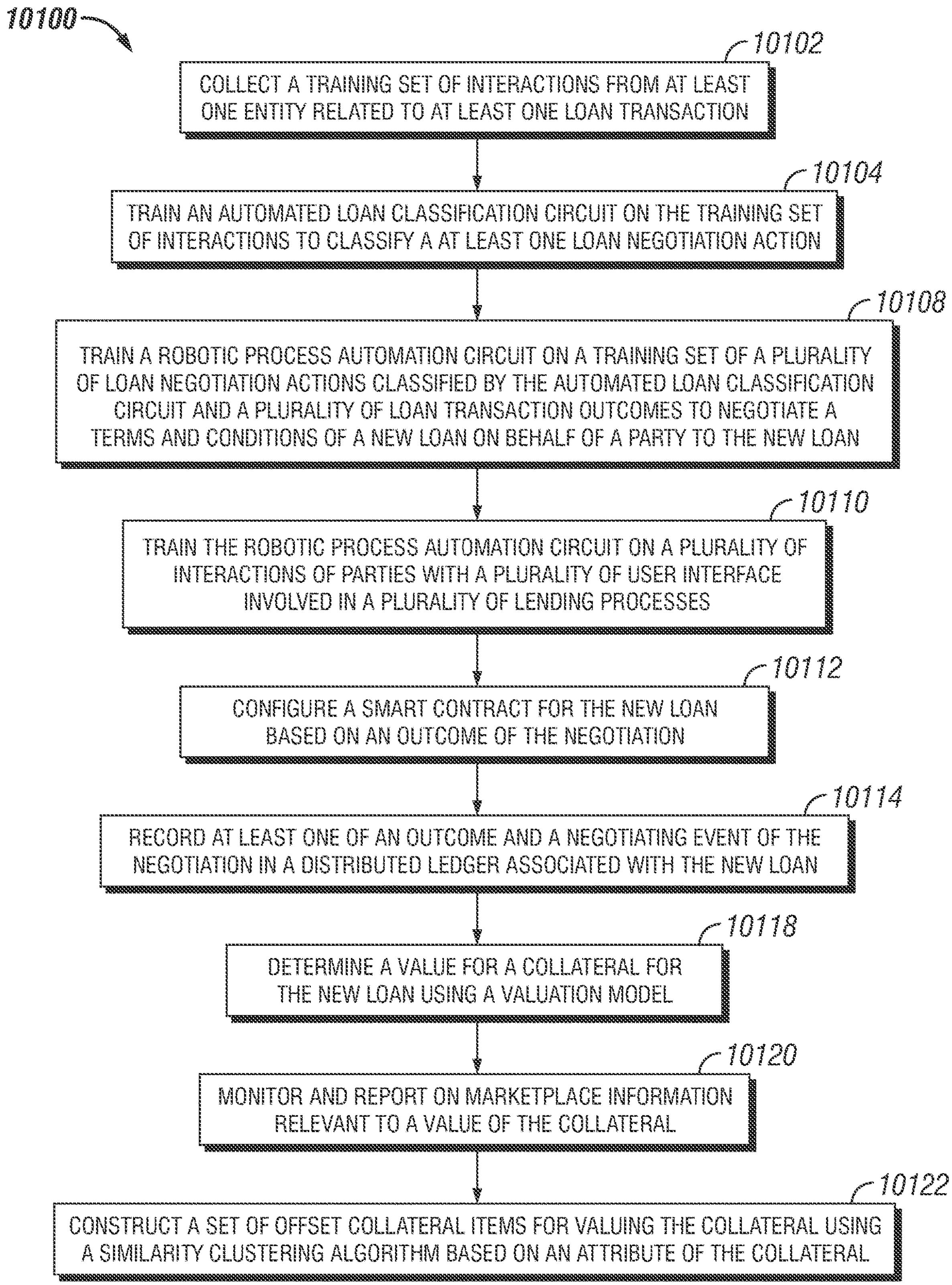
FIG. 101 depicts a robotic process automation method for negotiating a loan.

Referring now to FIG. 101, an illustrative and non-limiting example robotic process automation method for negotiating a loan 10000 is depicted. The example method may include collecting a training set of interactions from at least one entity related to at least one loan transaction (step 10102); training an automated loan classification circuit on the training set of interactions to classify a at least one loan negotiation action (step 10104); and training a robotic process automation circuit on a training set of a plurality of loan negotiation actions classified by the automated loan classification circuit and a plurality of loan transaction outcomes to negotiate a terms and conditions of a new loan on behalf of a party to the new loan (step 10108).

The robotic process automation circuit may be trained on a plurality of interactions of parties with a plurality of user interfaces involved in a plurality of lending processes (step 10110).

A smart contract for the new loan may be configured based on an outcome of the negotiation (step 10112).

At least one of an outcome and a negotiating event of the negotiation may be recorded in a distributed ledger associated with the new loan (step 10114).

A value for a collateral for the new loan may be determined using a valuation model (step 10118).

An example method may further include monitoring and reporting on marketplace information relevant to a value of the collateral (step 10120).

A set of offset collateral items for valuing the collateral may be constructed using a similarity clustering algorithm based on an attribute of the collateral (step 10122).

Figure 102:
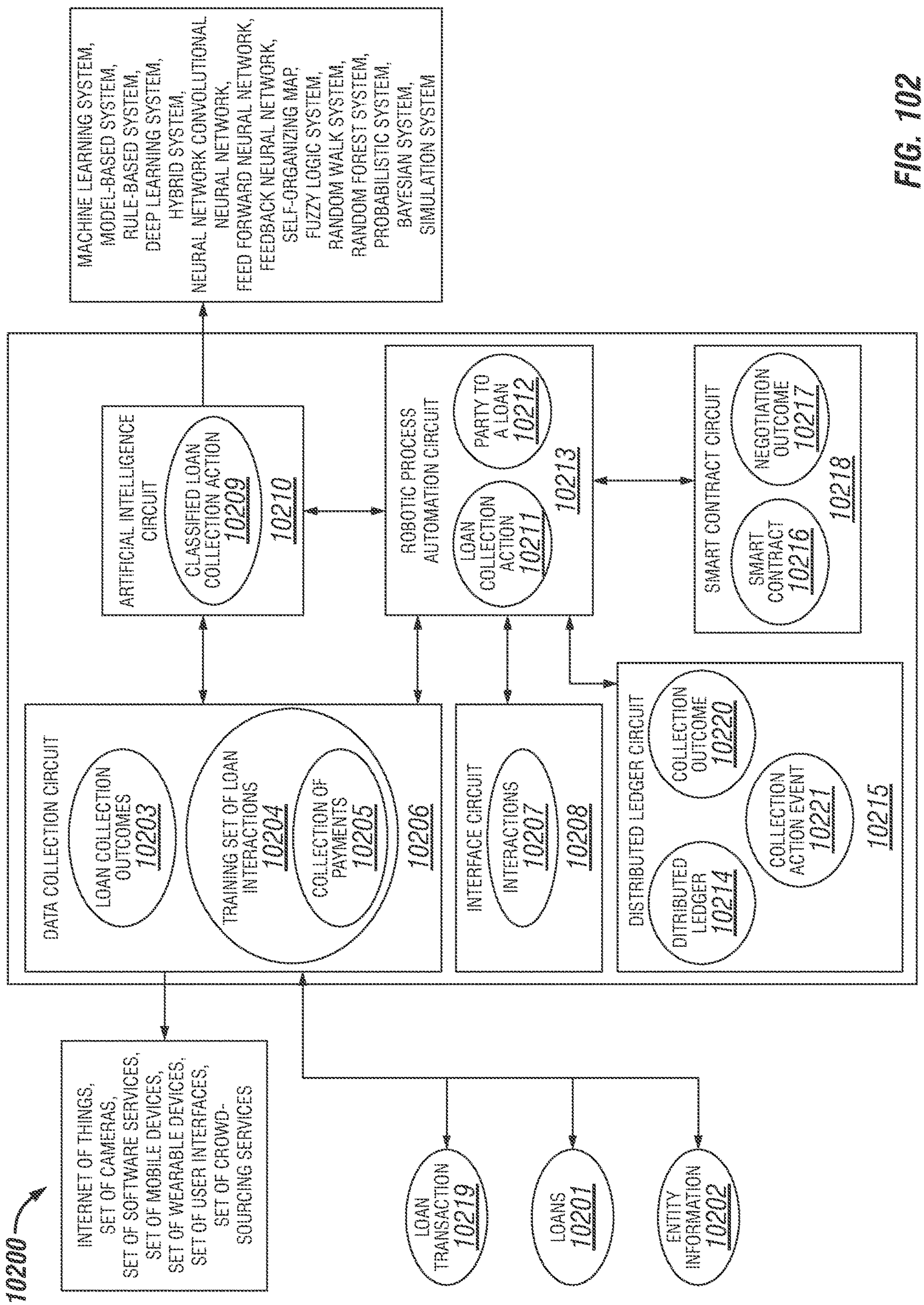
FIG. 102 depicts a system for adaptive intelligence and robotic process automation.

Referring to FIG. 102, an illustrative and non-limiting example system for adaptive intelligence and robotic process automation capabilities 10200 is depicted. The example system may include a data collection circuit 10206 which may collect data such loan collection outcomes 10203, training set of loan interactions 10204 which may include collection of payments 10205 and the like. The data may be collected from loan transactions 10219, loan data 10201, and entity information 10202 and the like. The data may be collected from a variety of sources and systems such as: an Internet of Things system, a camera system, a networked monitoring system, an internet monitoring system, a mobile device system, a wearable device system, a user interface system, and an interactive crowdsourcing system. The loan collection outcomes 10203 may include at least outcome such a response to a collection contact event, a payment of a loan, a default of a borrower on a loan, bankruptcy of a borrower of a loan, an outcome of a collection litigation, a financial yield of a set of collection actions, a return on investment on collection, a measure of reputation of a party involved in collection, and the like.

The system may also include an artificial intelligence circuit 10210 that may be structured to classify a set of loan collection actions 10209 based at least in part on the training set of loan interactions 10204. The artificial intelligence circuit 10210 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10213 structured to perform at least one loan collection action 10211 on behalf of a party to a loan 10212 based at least in part on the training set of loan interactions 10204 and the set of loan collection outcomes 10203. The loan collection action 10211 undertaken by the robotic process automation circuit 10213 may be at least one of a referral of a loan to an agent for collection, configuration of a collection communication, scheduling of a collection communication, configuration of content for a collection communication, configuration of an offer to settle a loan, termination of a collection action, deferral of a collection action, configuration of an offer for an alternative payment schedule, initiation of a litigation, initiation of a foreclosure, initiation of a bankruptcy process, a repossession process, placement of a lien on collateral, and the like. The party to a loan 10212 may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like. Loans 10201 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10208 structured to receive interactions 10207 from one or more of the entities 10202. In some embodiments the robotic process automation circuit 10213 may be trained on the interactions 10207. The system may further include a smart contract circuit 10218 structured to determine completion of a negotiation of the loan collection action 10211 and modify a contract 10216 based on an outcome of the negation 10217.

The system may further include a distributed ledger circuit 10215 structured to determine at least one of a collection outcome 10220 or an event 10221 associated with the loan collection action 10211. The distributed ledger circuit 10215 may be structured to record, in a distributed ledger 10214 associated with the loan, the event 10221 and/or the collection outcome 10220.

Figure 103:
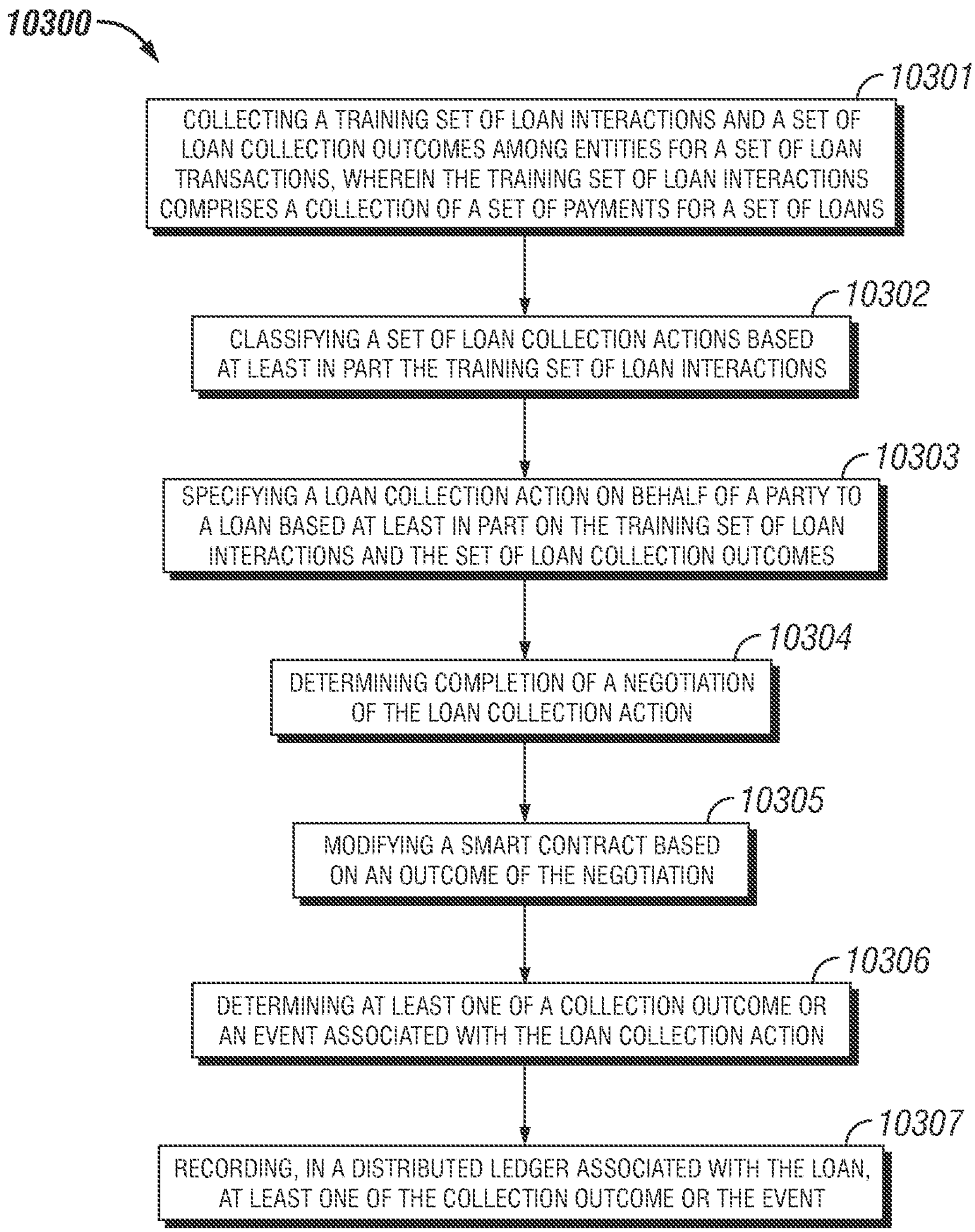
FIG. 103 depicts a loan collection method.

Referring to FIG. 103, an illustrative and non-limiting example method 10300 is depicted. The example method 10300 may include step 10301 for collecting a training set of loan interactions and a set of loan collection outcomes among entities for a set of loan transactions, wherein the training set of loan interactions comprises a collection of a set of payments for a set of loans. A set of loan collection actions based at least in part the training set of loan interactions may be classified (step 10302). The method may further include the step 10303 of specifying a loan collection action on behalf of a party to a loan based at least in part on the training set of loan interactions and the set of loan collection outcomes.

The method 10300 may further include the step 10304 of determining completion of a negotiation of the loan collection action. Based on the outcome of the negotiations a smart contract may be modified in step 10305. The method may also include the step 10306 of determining at least one of a collection outcome or an event associated with the loan collection action. The at least one of the collection outcome or the event may be recorded in a distributed ledger associate with the loan in step 10307.

Figure 104:
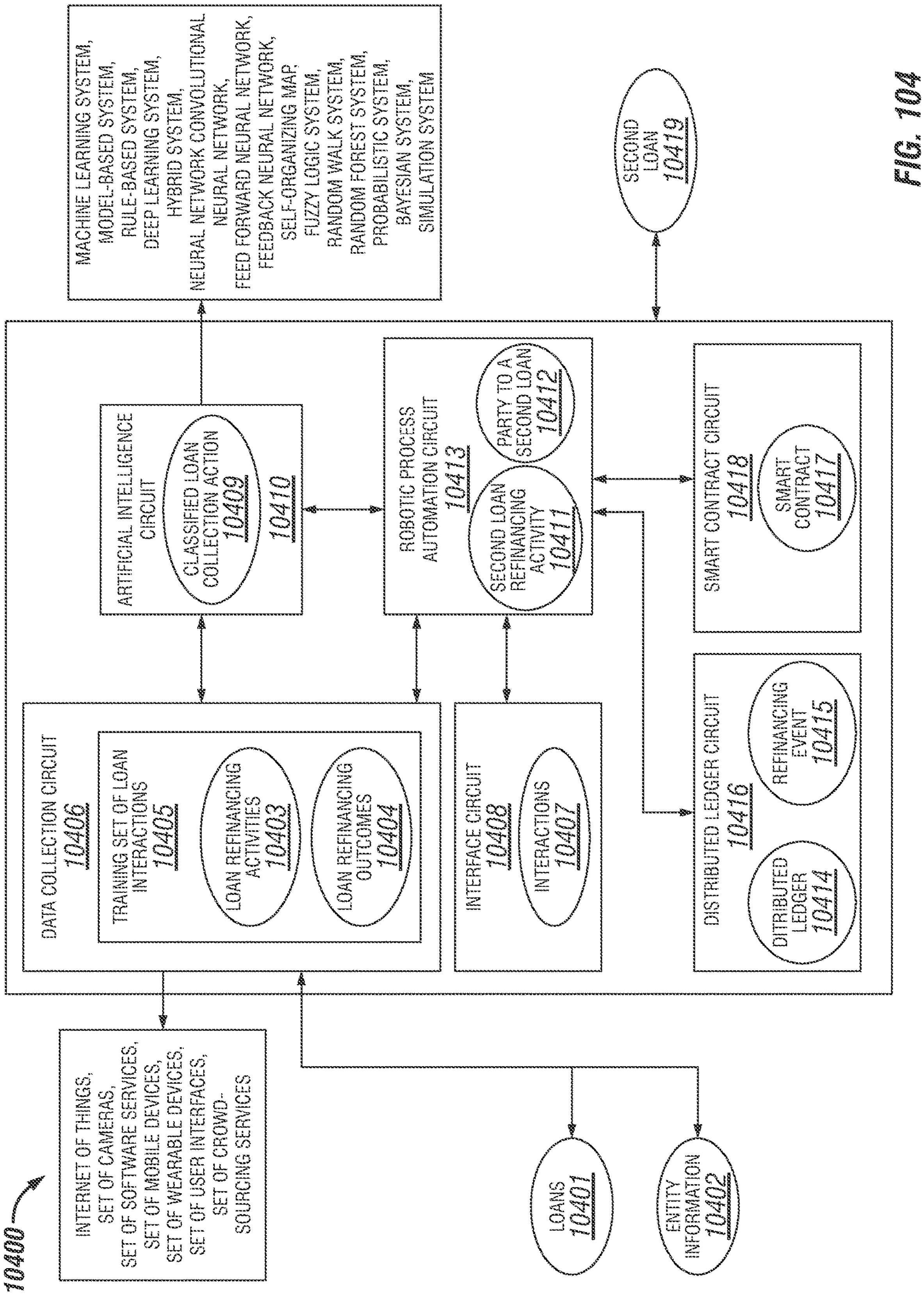
FIG. 104 depicts a system for adaptive intelligence and robotic process automation.

Referring to FIG. 104, an illustrative and non-limiting example system for adaptive intelligence and robotic process automation capabilities 10400 is depicted. The example system may include a data collection circuit 10406 structured to collect a training set of loan interactions between entities 10402, wherein the training set of loan interactions may include a set of loan refinancing activities 10403 and a set of loan refinancing outcomes 10404. The system may include an artificial intelligence circuit 10410 structured to classify the set of loan refinancing activities, wherein the artificial intelligence circuit is trained on the training set of loan interactions. The system may include a robotic process automation circuit 10413 structured to perform a second loan refinancing activity 10411 on behalf of a party to a second loan 10412, wherein the robotic process automation circuit is trained on the set of loan refinancing activities and the set of loan refinancing outcomes. The example system may include a data collection circuit 10406 which may collect data such as a training set of loan interactions between entities 10402. Data related to the set of loan interactions between entities 10402 may include data related to loan refinancing activities 10403 and loan refinancing outcomes 10404. The data may be collected from loan data 10401, information about entities 10402, and the like. The data may be collected from a variety of sources and systems such as: an Internet of Things system, a camera system, a networked monitoring system, an internet monitoring system, a mobile device system, a wearable device system, a user interface system, and an interactive crowdsourcing system. The loan refinancing activity 10403 may include at least one activity such as initiating an offer to refinance, initiating a request to refinance, configuring a refinancing interest rate, configuring a refinancing payment schedule, configuring a refinancing balance, configuring collateral for a refinancing, managing use of proceeds of a refinancing, removing or placing a lien associated with a refinancing, verifying title for a refinancing, managing an inspection process, populating an application, negotiating terms and conditions for a refinancing, closing a refinancing, and the like.

The system may also include an artificial intelligence circuit 10410 that may be structured to classify the set of loan refinancing activities 10403 based at least in part on the training set of loan interactions 10405. The artificial intelligence circuit 10410 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10413 structured to perform a second loan refinancing activity 10411 on behalf of a party to a second loan 10412 based at least in part on the set of loan refinancing activities 10403 and the set of loan refinancing outcomes 10404. The party to a second loan 10412 may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like.

The second loan 10419 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10408 structured to receive interactions 10407 from one or more of the entities 10402. In some embodiments the robotic process automation circuit 10413 may be trained on the interactions 10407. The system may further include a smart contract circuit 10418 structured to determine completion of the second loan refinancing activity 10411 and modify a smart refinance contract 10417 based on an outcome of the second loan refinancing activity 10411.

The system may further include a distributed ledger circuit 10416 structured to determine an event 10415 associated with the second loan refinancing activity 10411. The distributed ledger circuit 10416 may be structured to record, in a distributed ledger 10414 associated with the second loan 10419, the event 10415 associated with the second loan refinancing activity 10411.

Figure 105:
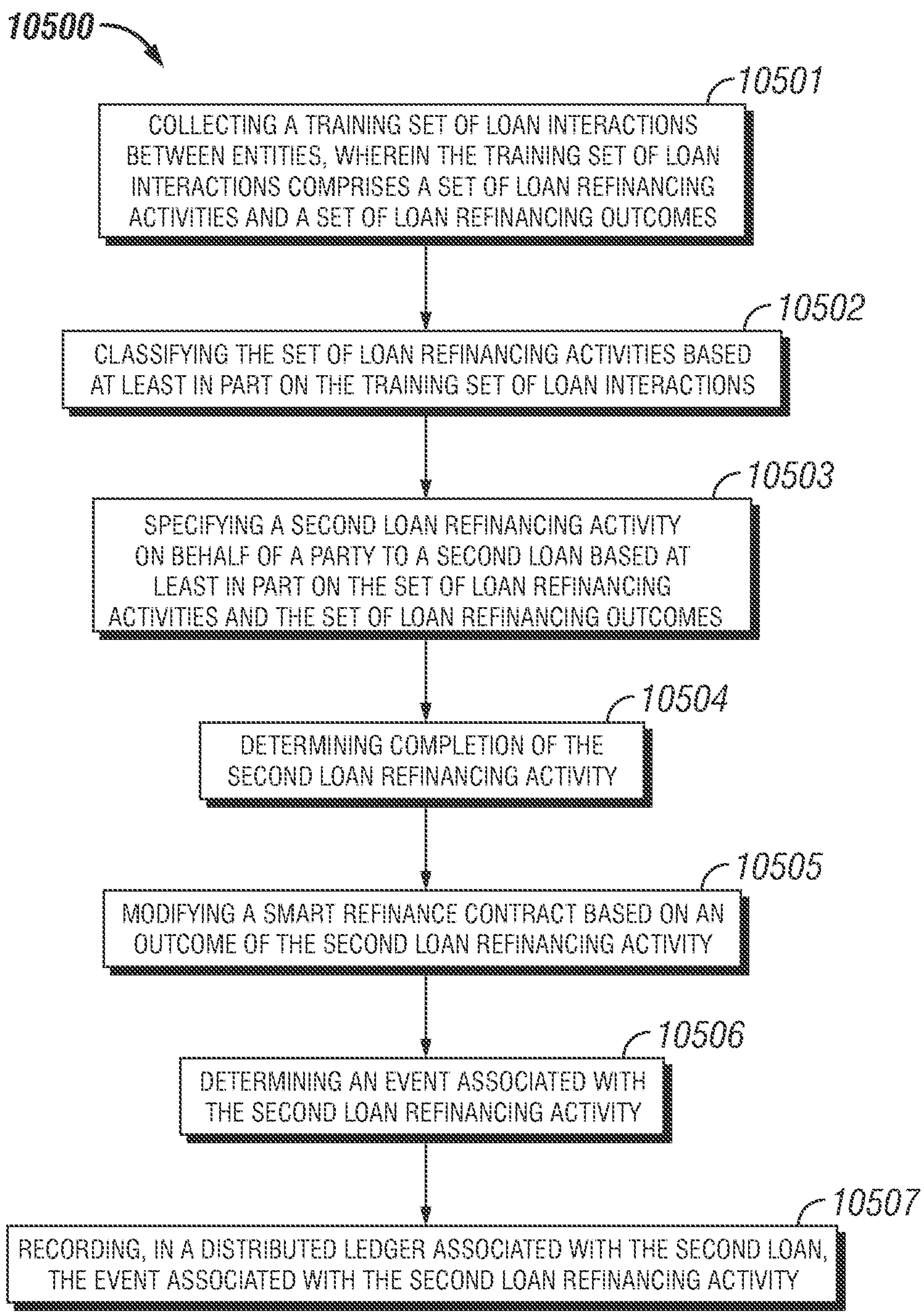
FIG. 105 depicts a loan refinancing method.

Referring to FIG. 105, an illustrative and non-limiting example method 10500 is depicted. The example method 10500 may include step 10501 for collecting a training set of loan interactions between entities, wherein the training set of loan interactions comprises a set of loan refinancing activities and a set of loan refinancing outcomes. A set of loan refinancing activities based at least in part the training set of loan interactions may be classified (step 10502). The method may further include the step 10503 of specifying a second loan refinancing activity on behalf of a party to a second loan based at least in part on the set of loan refinancing activities and the set of loan refinancing outcomes.

The method 10500 may further include the step 10504 of determining completion of the second loan refinancing activity. Based on the outcome of the second loan refinancing activity a smart refinance contract may be modified in step 10505. The method may also include the step 10506 of determining an event associated with the second loan refinancing activity. The event associated with the second loan refinancing activity may be recorded in a distributed ledger associate with the second loan in step 10507.

Figure 106:
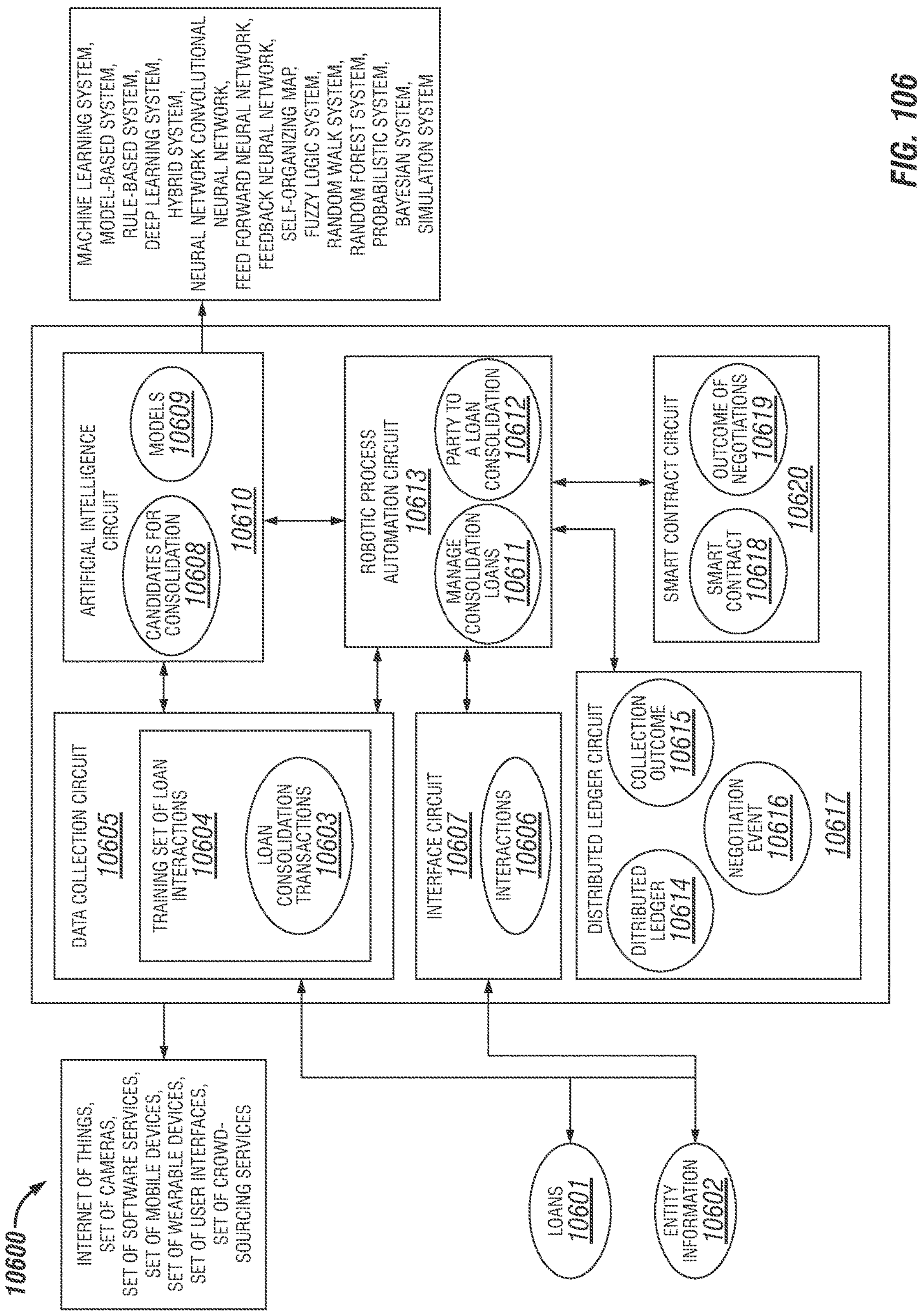
FIG. 106 depicts a system for adaptive intelligence and robotic process automation.

Referring to FIG. 106, an illustrative and non-limiting example system for adaptive intelligence and robotic process automation capabilities 10600 is depicted. The example system may include a data collection circuit 10605 which may collect data such as a training set of loan interactions 10604 between entities which may include a set of loan consolidation transactions 10603 and the like. The data may be collected from loan data 10601, information re. entities 10602, and the like. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 10610 that may be structured to classify a set of loans as candidates for consolidation 10608 based at least in part on the training set of loan interactions 10604. The artificial intelligence circuit 10610 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10613 structured to manage a consolidation of at least a subset of the set of loans 10611 on behalf of a party to the loan consolidation 10612 based at least in part on the training set of loan consolidation transactions 10603. Managing the consolidation may include identification of loans from a set of candidate loans, preparation of a consolidation offer, preparation of a consolidation plan, preparation of content communicating a consolidation offer, scheduling a consolidation offer, communicating a consolidation offer, negotiating a modification of a consolidation offer, preparing a consolidation agreement, executing a consolidation agreement, modifying collateral for a set of loans, handling an application workflow for consolidation, managing an inspection, managing an assessment, setting an interest rate, deferring a payment requirement, setting a payment schedule, or closing a consolidation agreement.

The artificial intelligence circuit may further include a model 10609 that may be used to classify loans are candidates for consolidation 10608. The model 10609 may process attributes of entities, the attributes may include identity of a party, interest rate, payment balance, payment terms, payment schedule, type of loan, type of collateral, financial condition of party, payment status, condition of collateral, value of collateral, and the like.

The party to a loan consolidation 10612 may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like.

Loans 10601 may include at least one auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan and the like.

The system may further include an interface circuit 10607 structured to receive interactions 10606 from one or more of the entities 10602. In some embodiments the robotic process automation circuit 10613 may be trained on the interactions 10606. The system may further include a smart contract circuit 10620 structured to determine a completion of a negotiations of the consolidation and modify a contract 10618 based on an outcome of the negotiation 10619.

The system may further include a distributed ledger circuit 10617 structured to determine at least one of an outcome 10615 or a negotiation event 10616 associated with the consolidation. The distributed ledger circuit 10617 may be structured to record, in a distributed ledger 10614 associated with the loan, the event 10616 and/or the outcome 10615.

Figure 107:
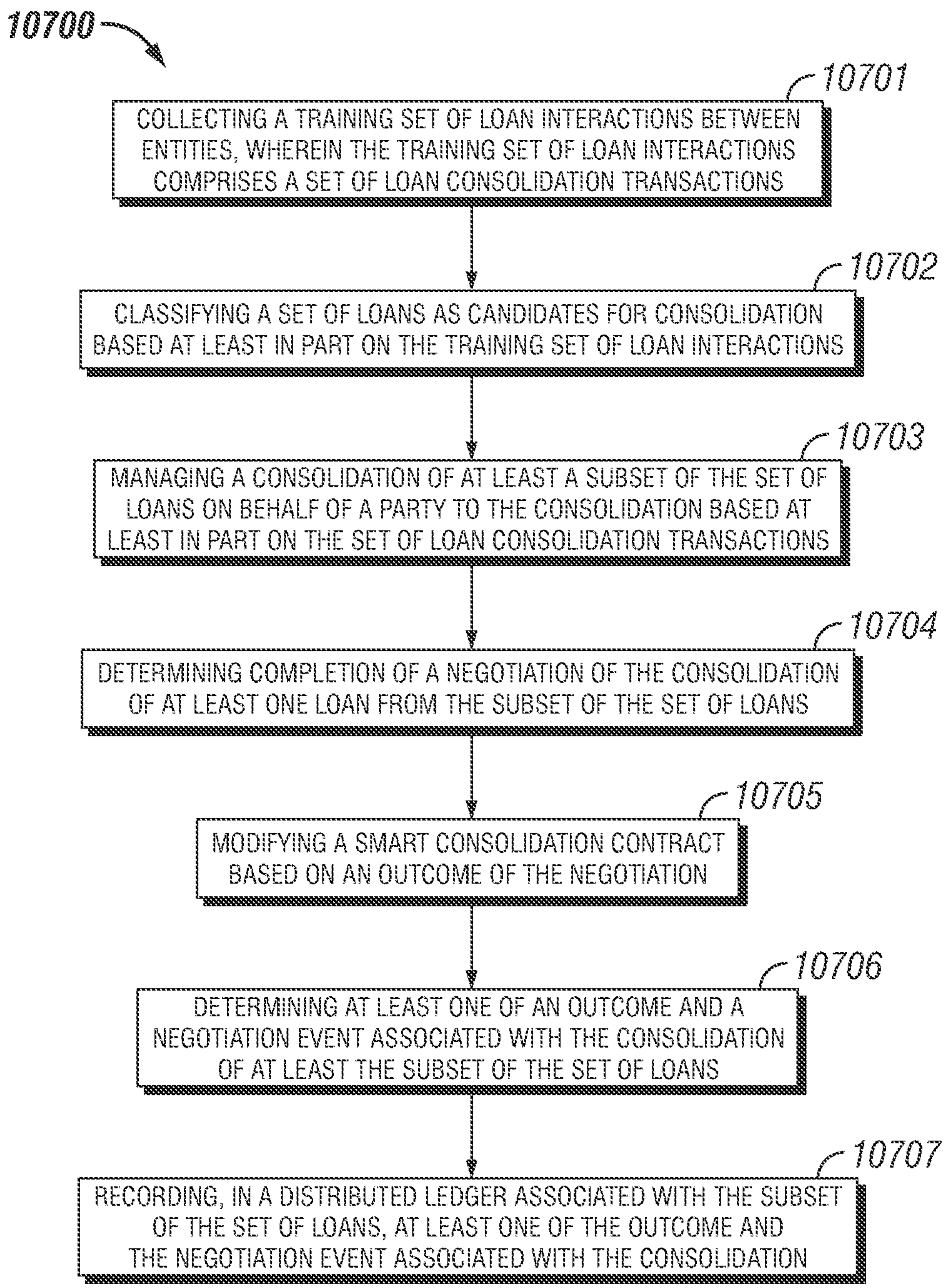
FIG. 107 depicts a for loan consolidation method.

Referring to FIG. 107, an illustrative and non-limiting example method 10700 is depicted. The example method 10700 may include step 10701 collecting a training set of loan interactions between entities, wherein the training set of loan interactions comprises a set of loan consolidation transactions. A set of loans as candidates for consolidation based at least in part on the training set of loan interactions may be classified (step 10702). The method may further include the step 10703 of managing a consolidation of at least a subset of the set of loans on behalf of a party to the consolidation based at least in part on the set of loan consolidation transactions.

The method 10700 may further include the step 10704 of determining completion of a negotiation of the consolidation of at least one loan from the subset of the set of loans. Based on the outcome of the negotiations a smart contract may be modified in step 10705. The method may also include the step 10706 of determining at least one of an outcome and a negotiation event associated with the consolidation of at least the subset of the set of loans. The at least one of the outcome and the negotiation event may be recorded in a distributed ledger associate with the consolidation in step 10707.

Figure 108:
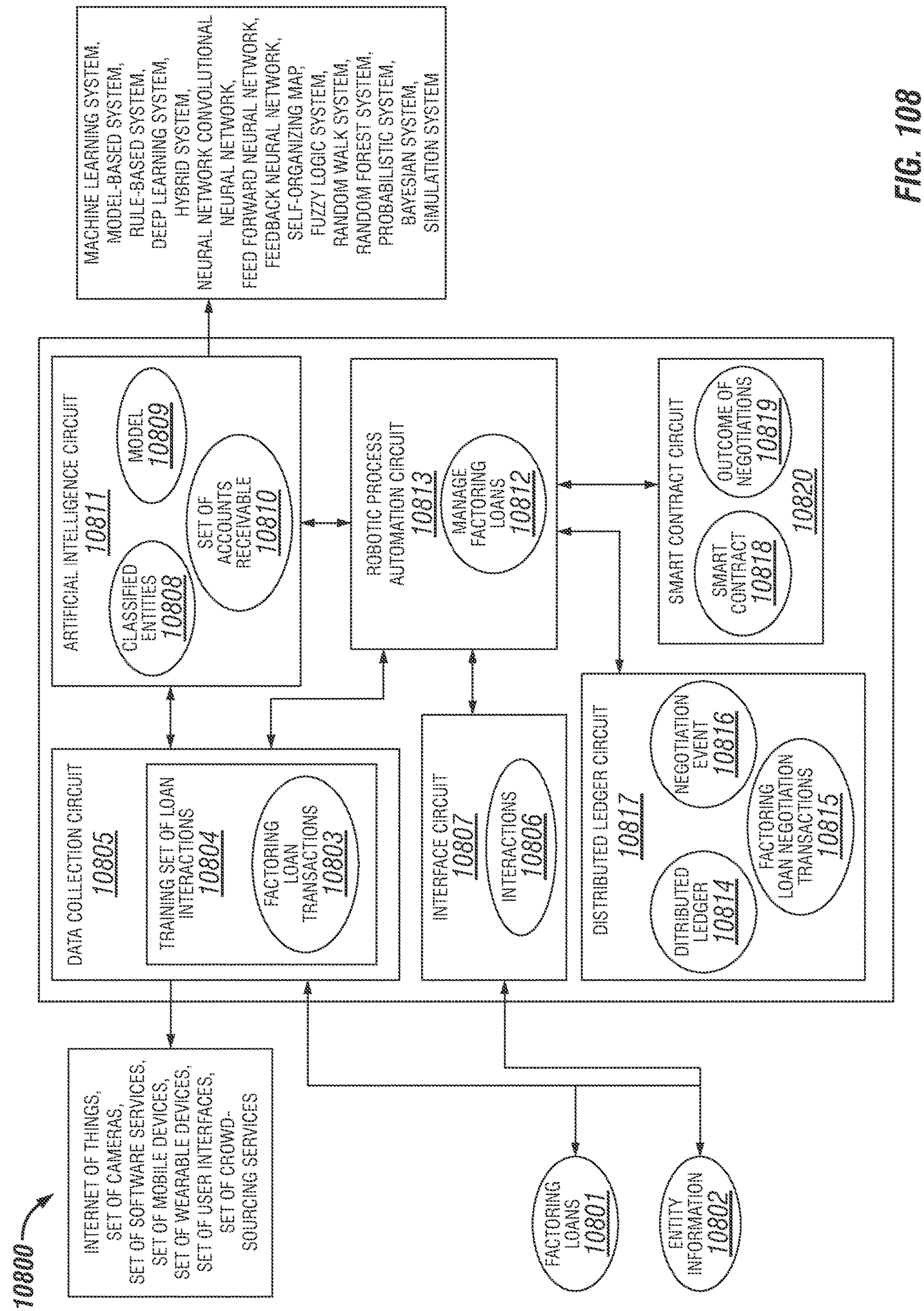
FIG. 108 depicts a system for adaptive intelligence and robotic process automation.

Referring to FIG. 108, an illustrative and non-limiting example system for adaptive intelligence and robotic process automation capabilities 10800 is depicted. The example system may include a data collection circuit 10805 which may collect data information about entities 10802 involved in a set of factoring loans 10801 and a training set of interactions 10804 between entities for a set of factoring loan transactions 10803. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 10811 that may be structured to classify entities 10808 involved in the set of factoring loans based at least in part on the training set of interactions 10804. The artificial intelligence circuit 10811 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 10813 structured to manage a factoring loan 10812 based at least in part on the factoring loan transactions 10803. Managing the factoring loan may include managing at least one of a set of assets for factoring, identification of loans for factoring from a set of candidate loans, preparation of a factoring offer, preparation of a factoring plan, preparation of content communicating a factoring offer, scheduling a factoring offer, communicating a factoring offer, negotiating a modification of a factoring offer, preparing a factoring agreement, executing a factoring agreement, modifying collateral for a set of factoring loans, handing transfer of a set of accounts receivable, handling an application workflow for factoring, managing an inspection, managing an assessment of a set of assets to be factored, setting an interest rate, deferring a payment requirement, setting a payment schedule, or dosing a factoring agreement.

The artificial intelligence circuit 10811 may further include a model 10809 that may be used to process attributes of entities involved in the set of factoring loans, the attributes may include assets used for factoring, identity of a party, interest rate, payment balance, payment terms, payment schedule, type of loan, type of collateral, financial condition of party, payment status, condition of collateral, or value of collateral. The assets used for factoring may include a set of accounts receivable 10810. At least one entity of the entities 10802 may be a party to at least one factoring loan transactions 10803. The party may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like.

The system may further include an interface circuit 10807 structured to receive interactions 10806 from one or more of the entities 10802. In some embodiments the robotic process automation circuit 10813 may be trained on the interactions 10806.

The system may further include a smart contract circuit 10820 structured to determine a completion of a negotiations of the factoring loan and modify a contract 10818 based on an outcome of the negotiation 10819.

The system may further include a distributed ledger circuit 10817 structured to determine at least one of an outcome 10815 or a negotiation event 10816 associated with the negotiation of the factoring loan. The distributed ledger circuit 10817 may be structured to record, in a distributed ledger 10814 associated with the factoring loan, the event 10816 and/or the outcome 10815.

Figure 109:
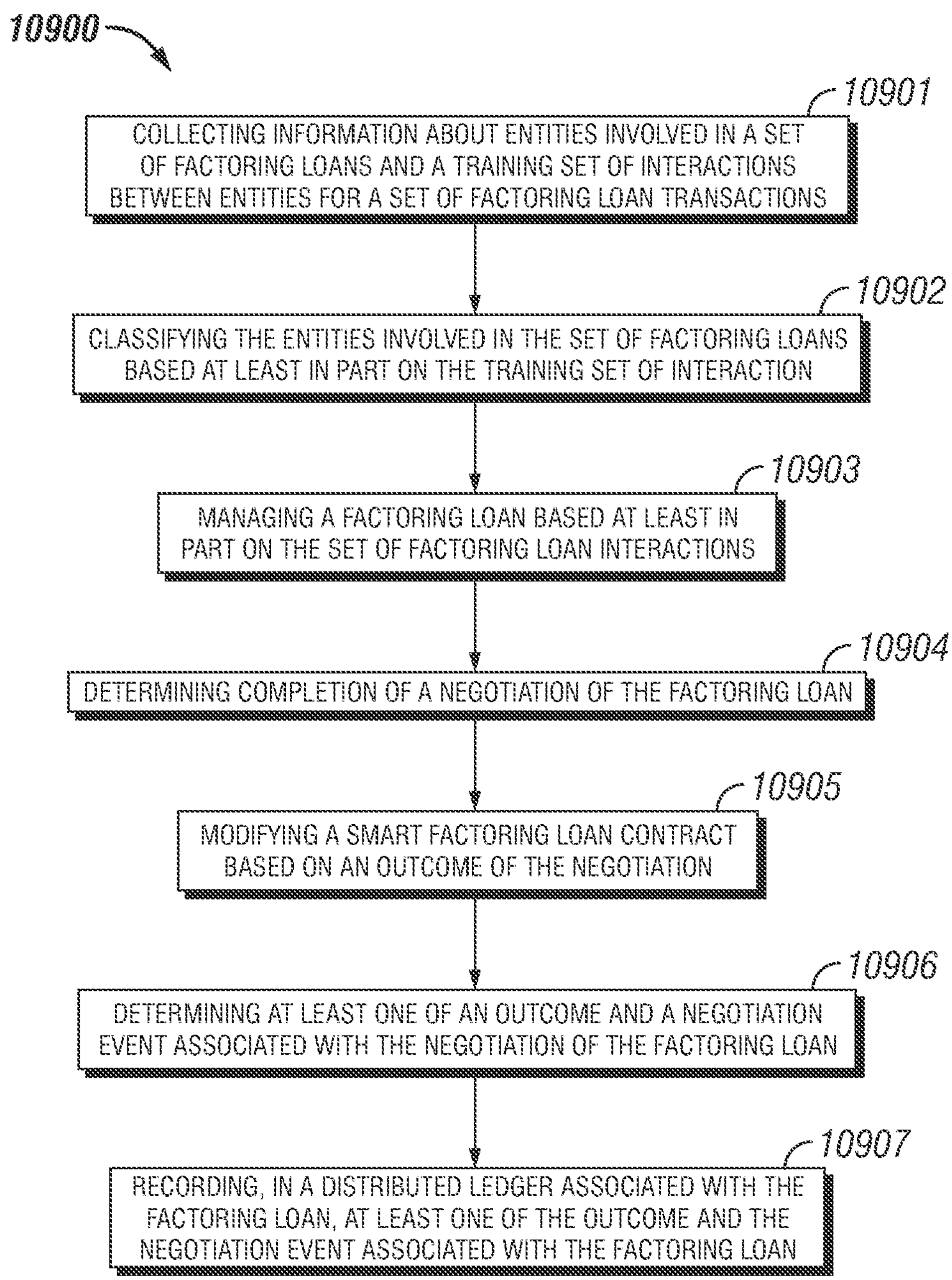
FIG. 109 depicts a loan factoring method.

Referring to FIG. 109, an illustrative and non-limiting example method 10900 is depicted. The example method 10900 may include step 10901 collecting information about entities involved in a set of factoring loans and a training set of interactions between entities for a set of factoring loan transactions. Entities involved in the set of factoring loans may be classified based at least in part on the training set of loan interactions (step 10902). The method may further include the step 10903 of managing a factoring loan based at least in part on the set of factoring loan interactions.

The method 10900 may further include the step 10904 of determining completion of a negotiation of the factoring loan. Based on the outcome of the negotiations a smart contract may be modified in step 10905. The method may also include the step 10906 of determining at least one of an outcome and a negotiation event associated with the negotiation of the factoring loan. The at least one of the outcome and the negotiation event may be recorded in a distributed ledger associate with the factoring loan in step 10907.

Figure 110:
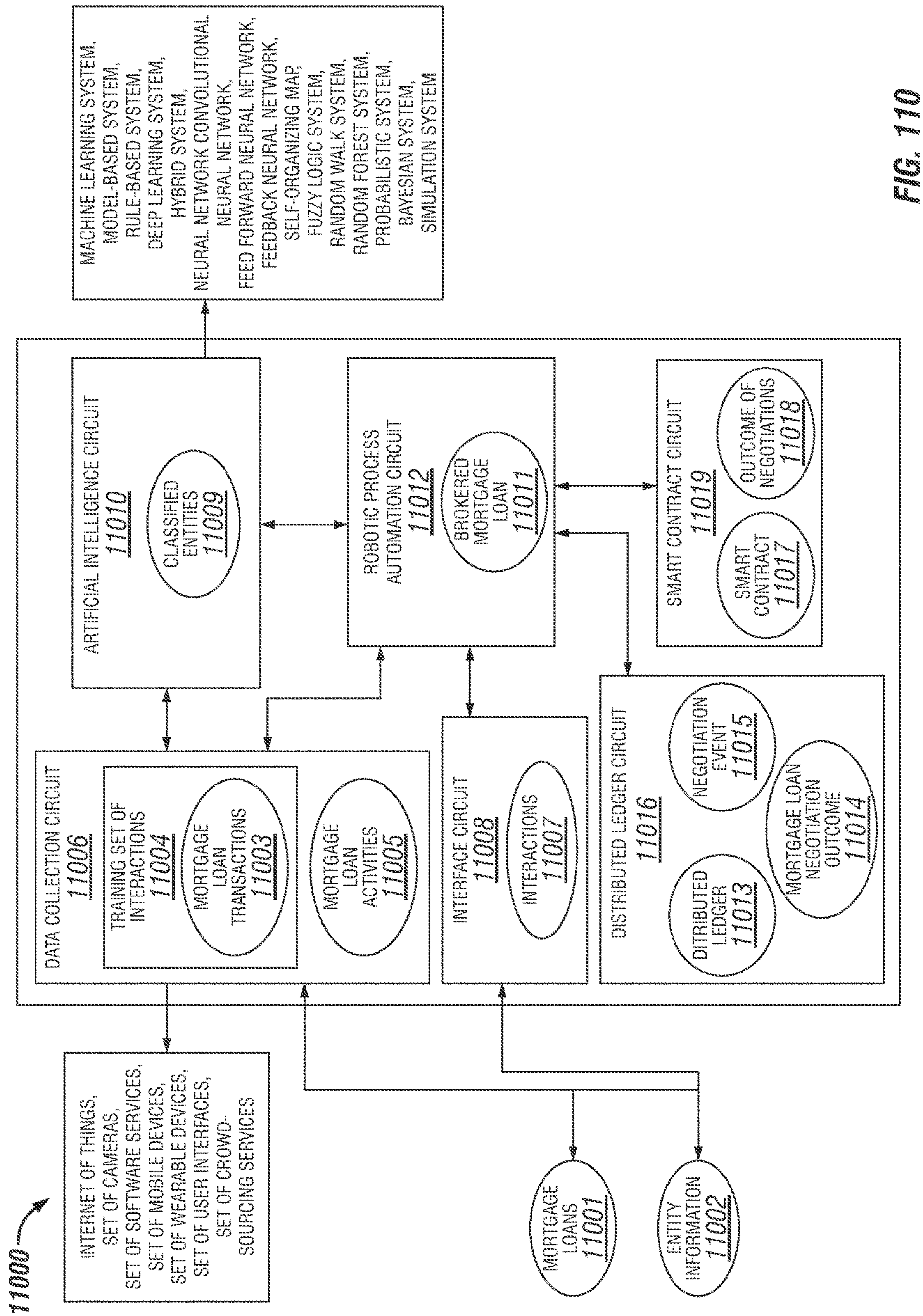
FIG. 110 depicts a system for adaptive intelligence and robotic process automation.

Referring to FIG. 110, an illustrative and non-limiting example system for adaptive intelligence and robotic process automation capabilities 11000 is depicted. The example system may include a data collection circuit 11006 which may collect data information about entities 11002 involved in a set of mortgage loan activities 11005 and a training set of interactions 11004 between entities for a set of mortgage loan transactions 11003. The data may be collected from a variety of sources and systems such as: an Internet of Things system, a camera system, a networked monitoring system, an internet monitoring system, a mobile device system, a wearable device system, a user interface system, and a crowdsourcing system.

The system may also include an artificial intelligence circuit 11010 that may be structured to classify entities 11009 involved in the set of mortgage loan activities based at least in part on the training set of interactions 11004. The artificial intelligence circuit 11010 may include at least one system such as a machine learning system, a model-based system, a rule-based system, a deep learning system, a hybrid system, a neural network, a convolutional neural network, a feed forward neural network, a feedback neural network a self-organizing map, a fuzzy logic system, a random walk system, a random forest system, a probabilistic system, a Bayesian system, a simulation system, and the like.

The system may also include a robotic process automation circuit 11012 structured to broker a mortgage loan 11011 based at least in part on at least one of the set of mortgage loan activities 11005 and the training set of interactions 11004. The set of mortgage loan activities 11005 and/or the set of mortgage loan transactions 11003 may include activities selected from a group consisting of: among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien, or closing of mortgage agreement.

The artificial intelligence circuit 11010 may further include a model that may be used to process attributes of entities involved in the set of mortgage loan activities, the attributes may properties that are subject to mortgages, assets used for collateral, identity of a party, interest rate, payment balance, payment terms, payment schedule, type of mortgage, type of property, financial condition of party, payment status, condition of property, or value of property. In embodiments, brokering the mortgage loan comprises at least one activity such as managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, closing a mortgage agreement, and the like In embodiments at least one entity of the entities 11002 may be a party to at least one mortgage loan transactions of the set of mortgage loan transactions 11003. The party may include least one such as a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, an accountant, and the like.

The system may further include an interface circuit 11008 structured to receive interactions 11007 from one or more of the entities 11002. In some embodiments the robotic process automation circuit 11012 may be trained on the interactions 11007.

The system may further include a smart contract circuit 11019 structured to determine a completion of a negotiations of the mortgage loan and modify a smart contract 11017 based on an outcome of the negotiation 11018.

The system may further include a distributed ledger circuit 11016 structured to determine at least one of an outcome 11014 or a negotiation event 11015 associated with the negotiation of the mortgage loan. The distributed ledger circuit 11016 may be structured to record, in a distributed ledger 11013 associated with the mortgage loan, the event 11015 and/or the outcome 11014.

Figure 111:
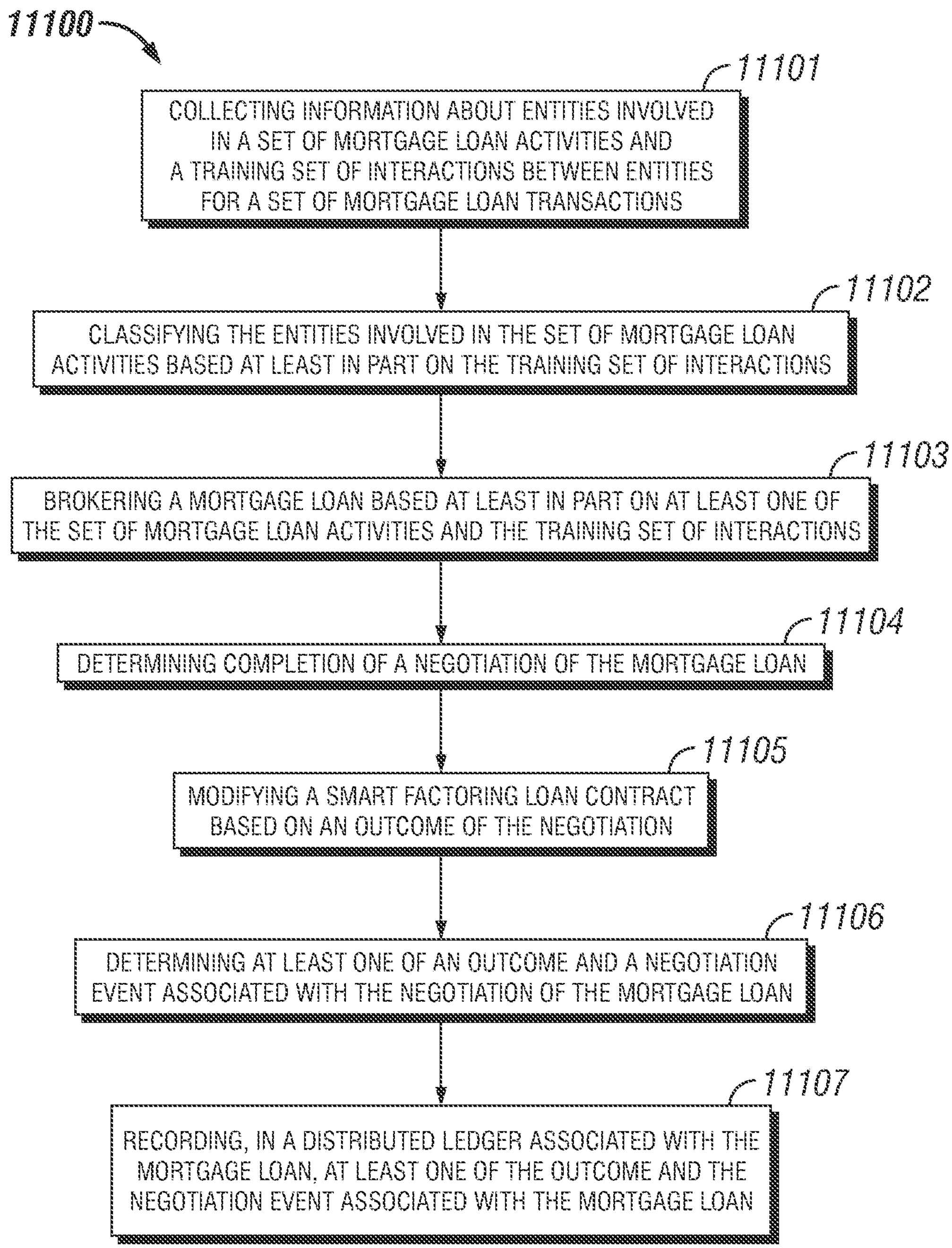
FIG. 111 depicts a mortgage brokering method.

Referring to FIG. 111, an illustrative and non-limiting example method 11100 is depicted. The example method 11100 may include step 11101 collecting information about entities involved in a set of mortgage loan activities and a training set of interactions between entities for a set of mortgage loan transactions. Entities involved in the set of factoring loans may be classified based at least in part on the training set of loan interactions (step 11102). The method may further include the step 11103 of brokering a mortgage loan based at least in part on at least one of the set of mortgage loan activities and the training set of interactions.

The method 11100 may further include the step 11104 of determining completion of a negotiation of the mortgage loan. Based on the outcome of the negotiations a smart contract may be modified in step 11105. The method may also include the step 11106 of determining at least one of an outcome and a negotiation event associated with the negotiation of the mortgage loan. The at least one of the outcome and the negotiation event may be recorded in a distributed ledger associate with the mortgage loan in step 11107.

Figure 112:
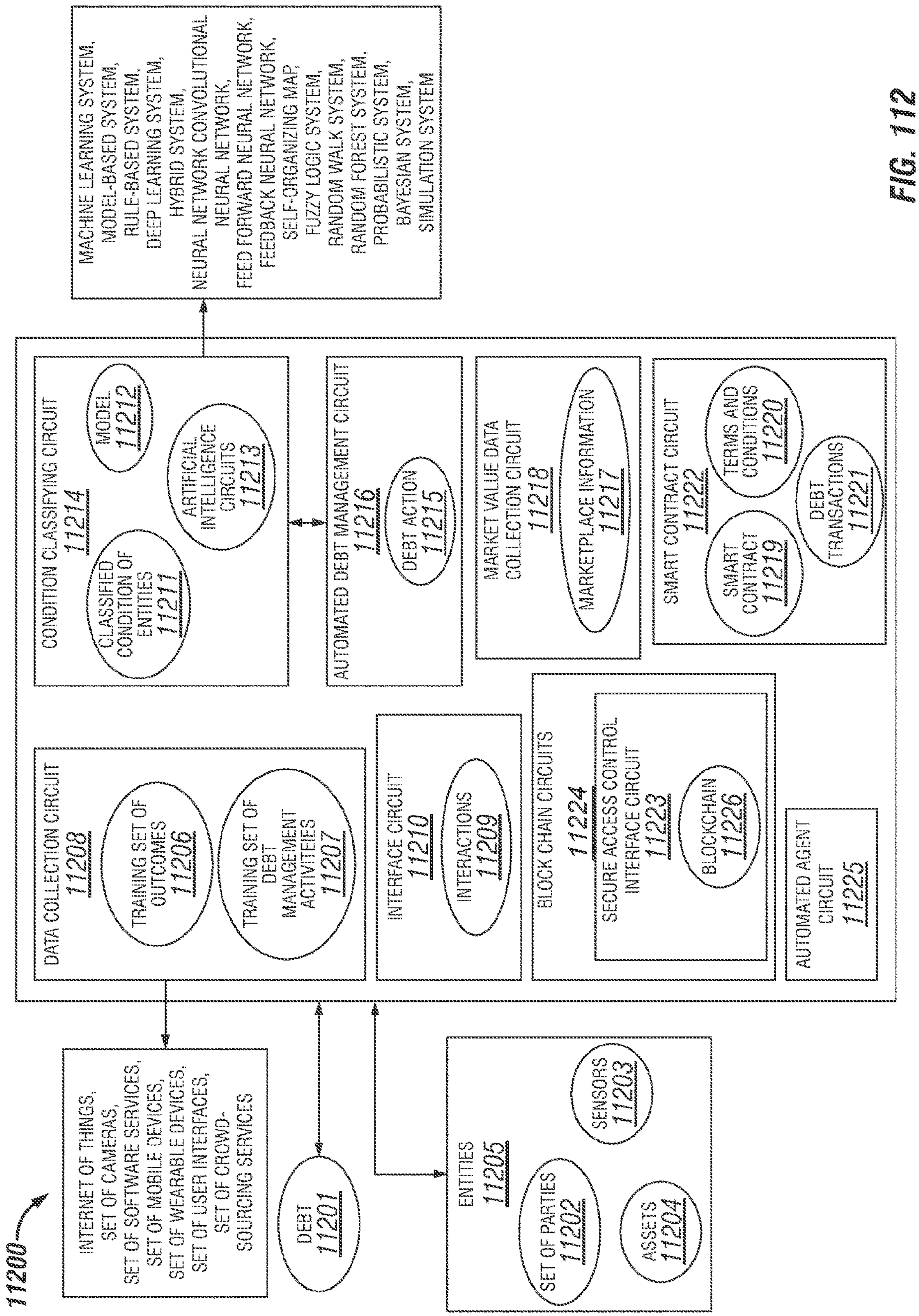
FIG. 112 depicts a system for adaptive intelligence and robotic process automation.

Referring to FIG. 112, an illustrative and non-limiting example system for adaptive intelligence and robotic process automation capabilities 11200 is depicted. The example system may include a data collection circuit 11208 which may collect data about entities 11205 involved in a set of debt transactions 11201, training data set of outcomes 11206 related to the entities, and a training set of debt management activities 11207. The data may be collected from a variety of sources and systems such as: Internet of Things devices, a set of environmental condition sensors, a set of crowdsourcing services, a set of social network analytic services, or a set of algorithms for querying network domains, and the like.

The system may also include a condition classifying circuit 11214 that may be structured to classify a condition 11211 of at least one entity of the entities 11205. The condition classifying circuit 11214 may include a model 11212 and a set of artificial intelligence circuits 11213. The model 11212 may be trained using the training data set of outcomes 11206 related to the entities. The artificial intelligence circuits 11213 may include at least one system such as machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

The system may also include an automated debt management circuit 11216 structured to manage an action related to a debt 11215. The automated debt management circuit 11216 may be trained on the training set of debt management activities 11207.

In embodiments, at least one debt transaction of the set of debt transactions 11201 may be include an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, a subsidized loan, and the like.

In embodiments, the entities 11205 involved in the set of debt transactions may include at least one of set of parties 11202 and a set of assets 11204. The assets 11204 may include a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property. The system may further include a set of sensors 11203 positioned on at least one asset 11204 from the set of assets, on a container for least one asset from the set of assets, and on a package for at least one asset from the set of assets, wherein the set of sensors configured to associate sensor information sensed by the set of sensors with a unique identifier for the at least one asset from the set of assets. The sensors 11203 may include image, temperature, pressure, humidity, velocity, acceleration, rotational, torque, weight, chemical, magnetic field, electrical field, or position sensors.

In embodiments, the system may further include a set of block chain circuits 11224 structured to receive information from the data collection circuit 11208 and the set of sensors 11203 and storing the information in a blockchain 11226. The access to the blockchain 11226 may be provided via a secure access control interface circuit 11223.

An automated agent circuit 11225 may be structured to process events relevant to at least one of a value, a condition, and an ownership of at least one asset of the set of assets and further structured to undertake a set of actions related to a debt transaction to which the asset is related.

The system may further include an interface circuit 11210 structured to receive interactions 11209 from at least one of the entities 11205. In embodiments the automated debt management circuit 11216 may be trained on the interactions 11209. In some embodiments the system may further include a market value data collection circuit 11218 structured to monitor and report marketplace information 11217 relevant to a value of a of at least one asset of a set of assets 11204. The market value data collection circuit 11218 may be further structured to monitor at least one pricing and financial data for items that are similar to at least one asset in the set of assets in at least one public marketplace. A set of similar items for valuing at least one asset from the set of assets may be constructed using a similarity clustering algorithm based on attributes of the assets. In embodiments, at least one attribute of the attributes of the assets may include a category of assets, asset age, asset condition, asset history, asset storage, geolocation of assets, and the like.

In embodiments, the system may further include a smart contract circuit 11222 structured to manage a smart contract 11219 for a debt transaction 11221. The smart contract circuit 11222 may be further structured to establish a set of terms and conditions 11220 for the debt transaction 11221. At least one of the terms and conditions may include a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, a consequence of default, and the like.

In embodiments at least one action related to a debt 11215 may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, or consolidating debt. At least one debt management activity from the training set of debt management activities 11207 may include offering a debt transaction, underwriting a debt transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

Figure 113:
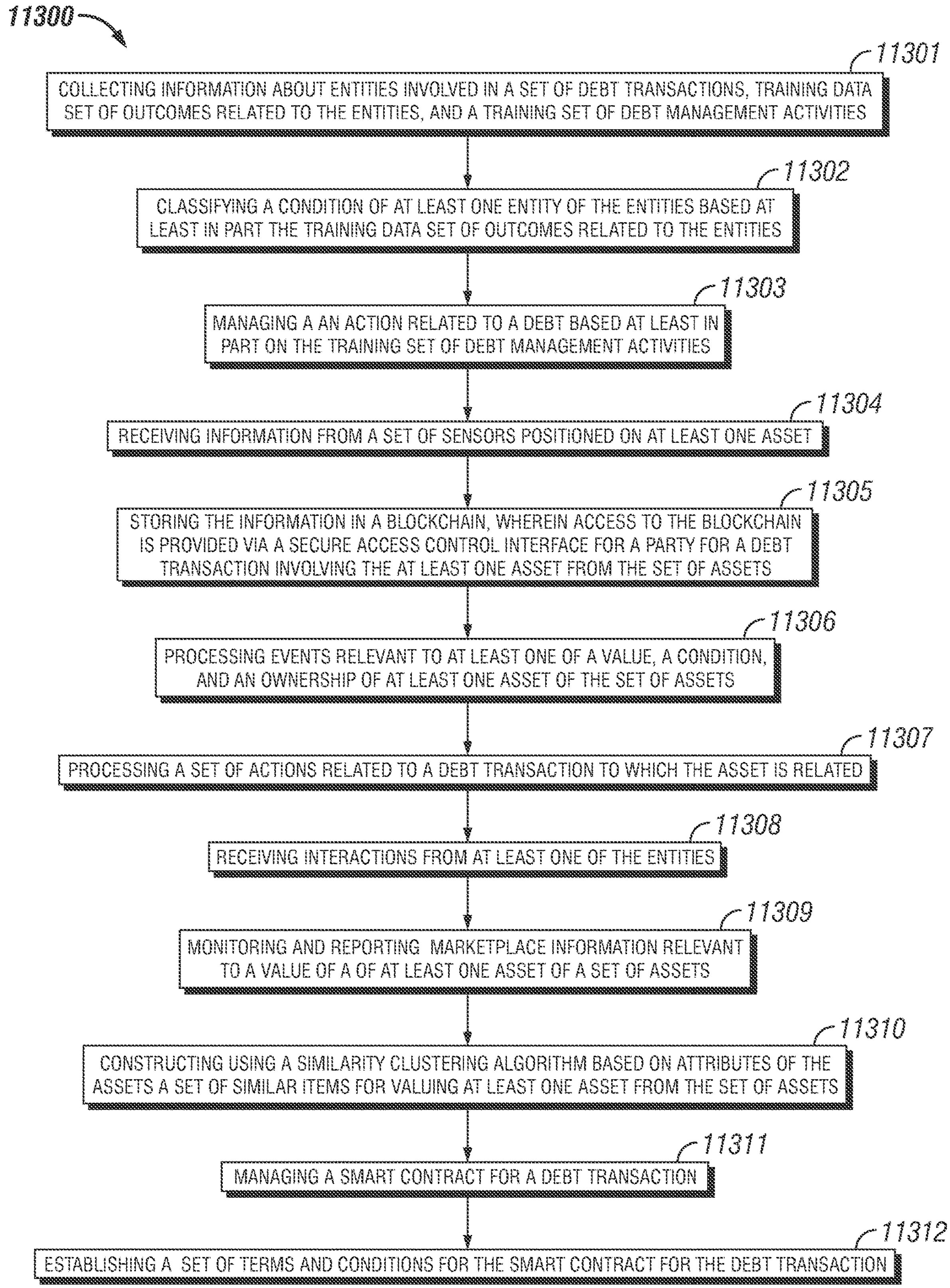
FIG. 113 depicts a method for debt management.

Referring to FIG. 113, an illustrative and non-limiting example method 11300 is depicted. The example method 11300 may include step 11301 collecting information about entities involved in a set of debt transactions, training data set of outcomes related to the entities, and a training set of debt management activities. The example method may further include classifying a condition of at least one entity of the entities based at least in part the training data set of outcomes related to the entities (step 11302). The example method may further include managing an action related to a debt based at least in part on the training set of debt management activities (step 11303). The example method may further include receiving information from a set of sensors positioned on at least one asset (step 11304). The example method may further include storing the information in a blockchain, wherein access to the blockchain is provided via a secure access control interface for a party for a debt transaction involving the at least one asset from the set of assets (step 11305). In step 11306 the method may include processing events relevant to at least one of a value, a condition, or an ownership of at least one asset of the set of assets. In step 11307 the method may include processing a set of actions related to a debt transaction to which the asset is related. In embodiments the method may further include receiving interactions from at least one of the entities (step 11308), monitoring and reporting marketplace information relevant to a value of a of at least one asset of a set of assets (step 11309), constructing using a similarity clustering algorithm based on attributes of the assets a set of similar items for valuing at least one asset from the set of assets (step 11310), managing a smart contract for a debt transaction (step 11311) and establishing a set of terms and conditions for the smart contract for the debt transaction (step 11312).

Figure 114:
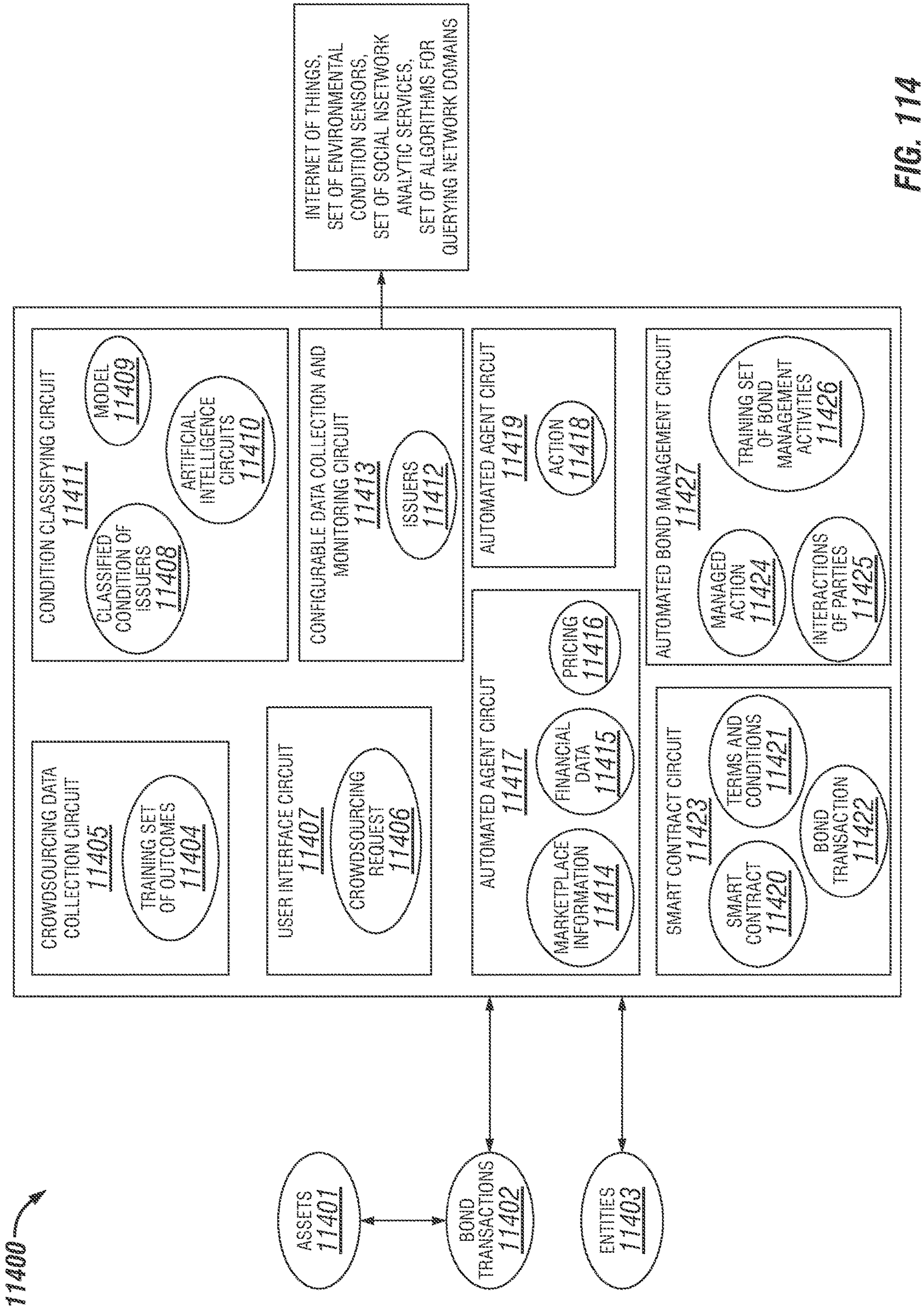
FIG. 114 depicts a system for adaptive intelligence and robotic process automation.

Referring to FIG. 114, an illustrative and non-limiting example system for adaptive intelligence and robotic process automation capabilities 11400 is depicted.

The example system may include a crowdsourcing data collection circuit 11405 structured to collect information about entities 11403 involved in a set of bond transactions 11402 and a training data set of outcomes related to the entities 11403. The system may further include a condition classifying circuit 11411 structured to classify a condition of a set of issuers 11408 using the information from the crowdsourcing data collection circuit 11405 and a model 11409. The model 11409 may be trained using the training data set of outcomes 11404 related to the set of issuers. The example system may further include an automated agent circuit 11419 structured to perform an action related to a debt transaction in response to the classified condition of at least one issuer of the set of issuers. In embodiments, at least one entity 11403 may include a set of issuers, a set of bonds, a set of parties, or a set of assets. At least one issuer may include a municipality, a corporation, a contractor, a government entity, a non-governmental entity, or a non-profit entity. At least one bond may include a municipal bond, a government bond, a treasury bond, an asset-backed bond, or a corporate bond.

In embodiments, the condition classified 11408 by the condition classifying circuit 11411 may include a default condition, a foreclosure condition, a condition indicating violation of a covenant, a financial risk condition, a behavioral risk condition, a policy risk condition, a financial health condition, a physical defect condition, a physical health condition, an entity risk condition, an entity health condition, or the like. The crowdsourcing data collection circuit 11405 may be structured to enable a user interface 11407 by which a user may configure a crowdsourcing request 11406 for information relevant to the condition about the set of issuers.

The system may further include a configurable data collection and monitoring circuit 11413 structured to monitor at least one issuer from the set of issuers 11412. The configurable data collection and monitoring circuit 11413 may include a system such as: Internet of Things devices, a set of environmental condition sensors, a set of social network analytic services, or a set of algorithms for querying network domains. The configurable data collection and monitoring circuit 11413 mat be structured to monitor an at least one environment such as: a municipal environment, a corporate environment, a securities trading environment, a real property environment, a commercial facility, a warehousing facility, a transportation environment, a manufacturing environment, a storage environment, a home, or a vehicle.

In embodiments a set of bonds associated with the set of bond transactions 11402 may be backed by a set of assets 11401. At least one asset 11401 may include a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, or the like.

In embodiments, the system may further include an automated agent circuit 11419 structured to processes events relevant to at least one of a value, a condition, or an ownership of at least one asset of the at least one issuer of the set of issuers, and to perform the action related to the debt transaction in response to at least one of the processed events.

The action 11418 may include offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, consolidating debt, and the like. The condition classifying circuit 11411 may include a system such as: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

In embodiments the system may further include an automated bond management circuit 11427 configured to manage an action related to the bond 11424 related to the at least one issuer of the set of issuers. The automated bond management circuit 11427 may be trained on a training set of bond management activities 11426. The automated bond management circuit 11427 may be further trained on a set of interactions of parties 11425 with a set of user interfaces involved in a set of bond transaction activities. At least one bond transaction may include a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, consolidating debt, or the like.

In embodiments the system may further include a market value data collection circuit 11417 structured to monitor and reports on marketplace information 11414 relevant to a value of at least one of the issuer or a set of assets. Reporting may include reporting on: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property. The market value data collection circuit 11417 may be structured to monitor pricing 11416 or financial data 11415 for items that are similar to the assets in at least one public marketplace. The market value data collection circuit 11417 may be further structured to construct a set of similar items for valuing the assets using a similarity clustering algorithm based on attributes of the assets. At least one attribute from the attributes may be selected from: a category of the assets, asset age, asset condition, asset history, asset storage, or geolocation of assets.

In embodiments, the system may further include a smart contract circuit 11423 structured for managing a smart contract 11420 for a bond transaction 11422 in response to the classified condition of the at least one issuer of the set of issuers. The smart contract circuit 11423 may be structured to determine terms and conditions 11421 for the bond. At least one term and condition 11421 may include a principal amount of debt, a balance of debt, a fixed interest rate, a variable interest rate, a payment amount, a payment schedule, a balloon payment schedule, a specification of assets that back the bond, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 115:
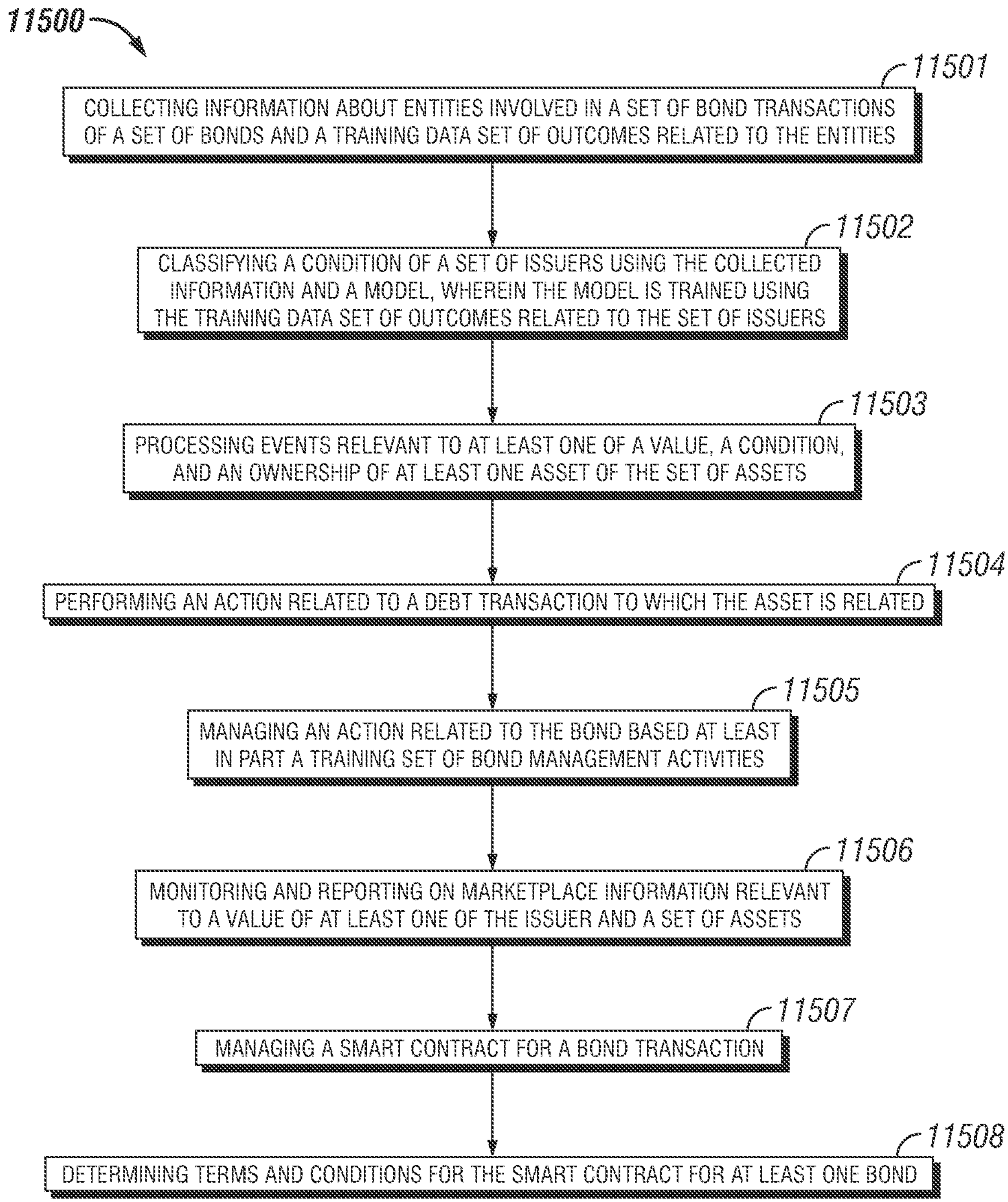
FIG. 115 depicts a method for bond management.

Referring to FIG. 115, an illustrative and non-limiting example method 11500 is depicted. The example method 11500 may include step 11501 of collecting information about entities involved in a set of bond transactions of a set of bonds and a training data set of outcomes related to the entities. The method may further include the step 11502 of classifying a condition of a set of issuers using the collected information and a model, wherein the model is trained using the training data set of outcomes related to the set of issuers. The method may further include processing events relevant to at least one of a value, a condition, or an ownership of at least one asset of the set of assets (step 11503). The method may further include the steps 11504 of performing an action related to a debt transaction to which the asset is related, 11505 managing an action related to the bond based at least in part a training set of bond management activities, 11506 monitoring and reporting on marketplace information relevant to a value of at least one of the issuer and a set of assets, 11507 managing a smart contract for a bond transaction, and 11508 determining terms and conditions for the smart contract for at least one bond.

Figure 116:
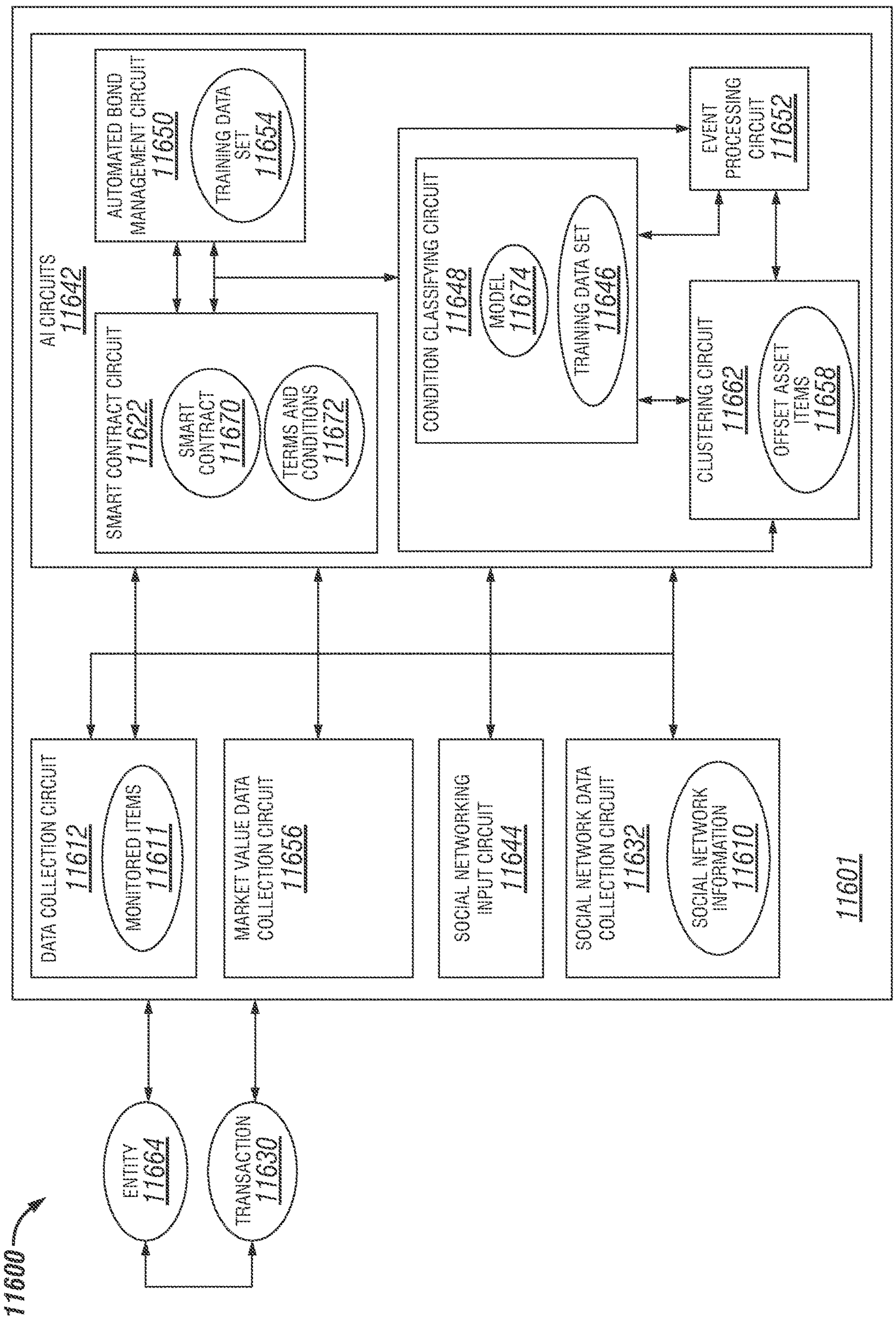
FIG. 116 depicts a system for monitoring a condition of an issuer for a bond.

Referring now to FIG. 116, an illustrative and non-limiting example system for monitoring a condition of an issuer for a bond 11600 is depicted. The example system may include a controller 11601. The controller 11601 may include a data collection circuit 11612, a market value data collection circuit 11656, a social networking input circuit 11644, a social network data collection circuit 11632, and several artificial intelligence circuits 11642 including a smart contract circuit 11622, an automated bond management circuit 11650, a condition classifying circuit 11648, a clustering circuit 11662, and an event processing circuit 11652.

The social network data collection circuit 11632 may be structured to collect information about at least one entity 11664 involved in at least one transaction 11630 comprising at least one bond; and a condition classifying circuit 11648 may be structured to classify a condition of the at least one entity in accordance with a model 11674 and based on information from the social network data collection circuit, wherein the model is trained using a training data set 11654 of a plurality of outcomes related to the at least one entity. The at least one entity may be selected from the entities consisting of: a bond issuer, a bond, a party, and an asset. The bond issuer may be selected from the bond issuers consisting of: a municipality, a corporation, a contractor, a government entity, a non-governmental entity, and a non-profit entity. The bond may be selected from the entities consisting of: a municipal bond, a government bond, a treasury bond, an asset-backed bond, and a corporate bond.

The condition classified by the condition classifying circuit 11648 may be at least one of a default condition, a foreclosure condition, a condition indicating violation of a covenant, a financial risk condition, a behavioral risk condition, a policy risk condition, a financial health condition, a physical defect condition, a physical health condition, an entity risk condition or an entity health condition.

The social network data collection circuit 11632 may further include a social networking input circuit 11644 which may be structured to receive input from a user used to configure a query for information about the at least one entity.

The data collection circuit 11612 may be structured to monitor at least one of an Internet of Things device, an environmental condition sensor, a crowdsourcing request circuit, a crowdsourcing communication circuit, a crowdsourcing publishing circuit, and an algorithm for querying network domains.

The data collection circuit 11612 may be further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

The at least one bond is backed by at least one asset. The at least one asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The event processing circuit 11652 may be structured to process an event relevant to at least one of a value, a condition and an ownership of the at least one asset and undertake an action related to the at least one transaction. The action may be selected from the actions consisting of: a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The condition classifying circuit 11648 may further include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The automated bond management circuit 11650 may be structured to manage an action related to the at least one bond, wherein the automated bond management circuit is trained on a training data set of a plurality of bond management activities.

The automated bond management circuit 11650 may be trained on a plurality of interactions of parties with a plurality of user interfaces involved in a plurality of bond transaction activities. The plurality of bond transaction activities may be selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The market value data collection circuit 11656 may be structured to monitor and report on marketplace information relevant to a value of at least one of a bond issuer, the at least one bond, and an asset. The asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The market value data collection circuit 11656 may be further structured to monitor pricing or financial data for an offset asset item in at least one public marketplace.

A set of offset asset items 11658 for valuing the asset may be constructed using a clustering circuit 11662 based on an attribute of the asset. The attribute may be selected from the attributes consisting of: a category, an asset age, an asset condition, an asset history, an asset storage, and a geolocation.

The smart contract circuit 11622 may be structured to manage a smart contract for the at least one transaction. The smart contract circuit may be further structured to determine a terms and conditions for the at least one bond.

The terms and conditions may be selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default.

Figure 117:
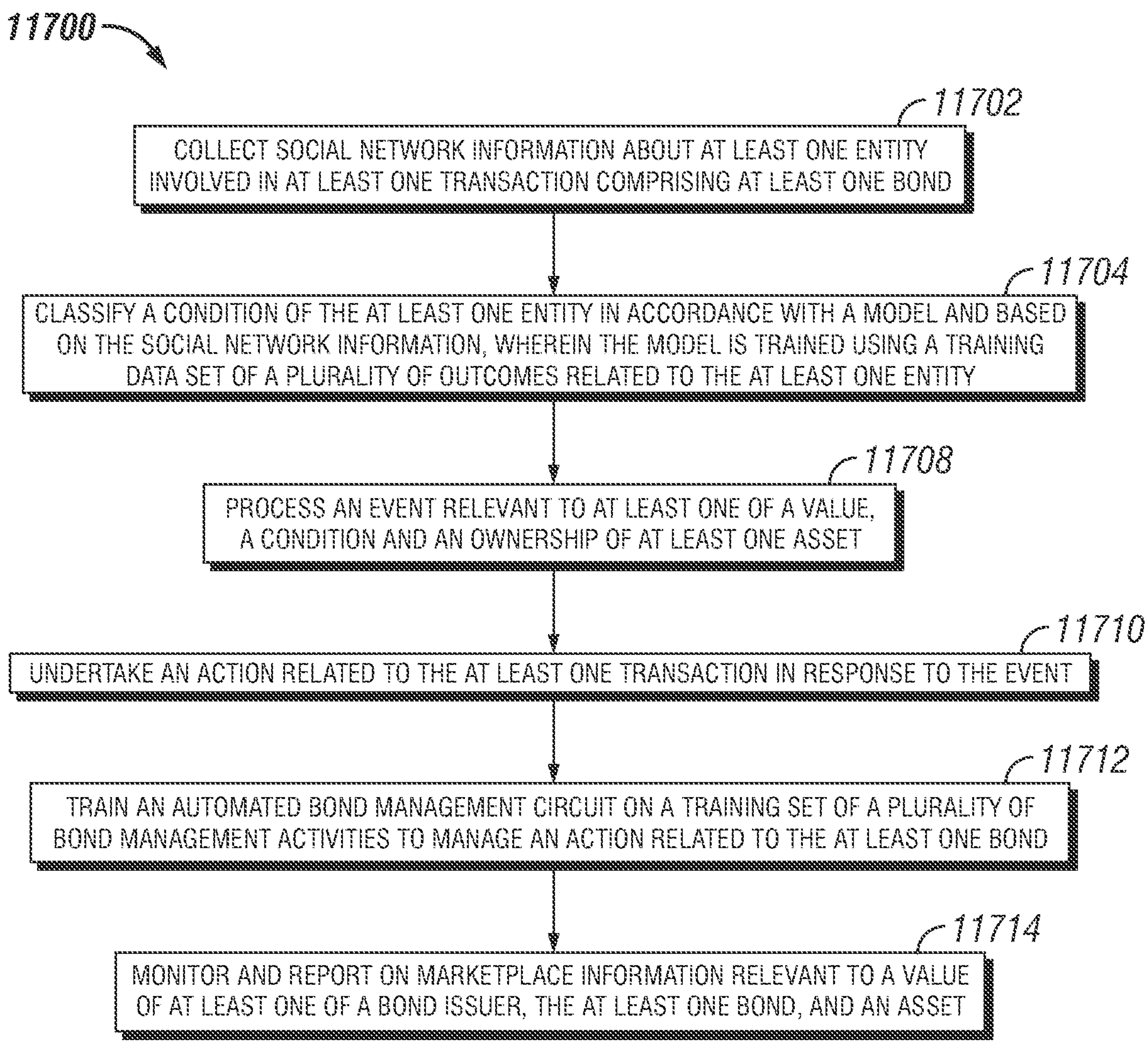
FIG. 117 depicts a method for monitoring a condition of an issuer for a bond

Referring now to FIG. 117, an illustrative and non-limiting example method for monitoring a condition of an issuer for a bond 11700 is depicted. An example method may include collecting social network information about at least one entity involved in at least one transaction comprising at least one bond 11702; and classifying a condition of the at least one entity in accordance with a model and based on the social network information, wherein the model is trained using a training data set of a plurality of outcomes related to the at least one entity 11704.

An event relevant to at least one of a value, a condition and an ownership of at least one asset may be processed 11708. An action related to the at least one transaction may be undertaken in response to the event 11710. An automated bond management circuit may be trained on a training set of a plurality of bond management activities to manage an action related to the at least one bond 11712. An example method may further include monitoring and reporting on marketplace information relevant to a value of at least one of a bond issuer, the at least one bond, and an asset 11714.

Figure 118:
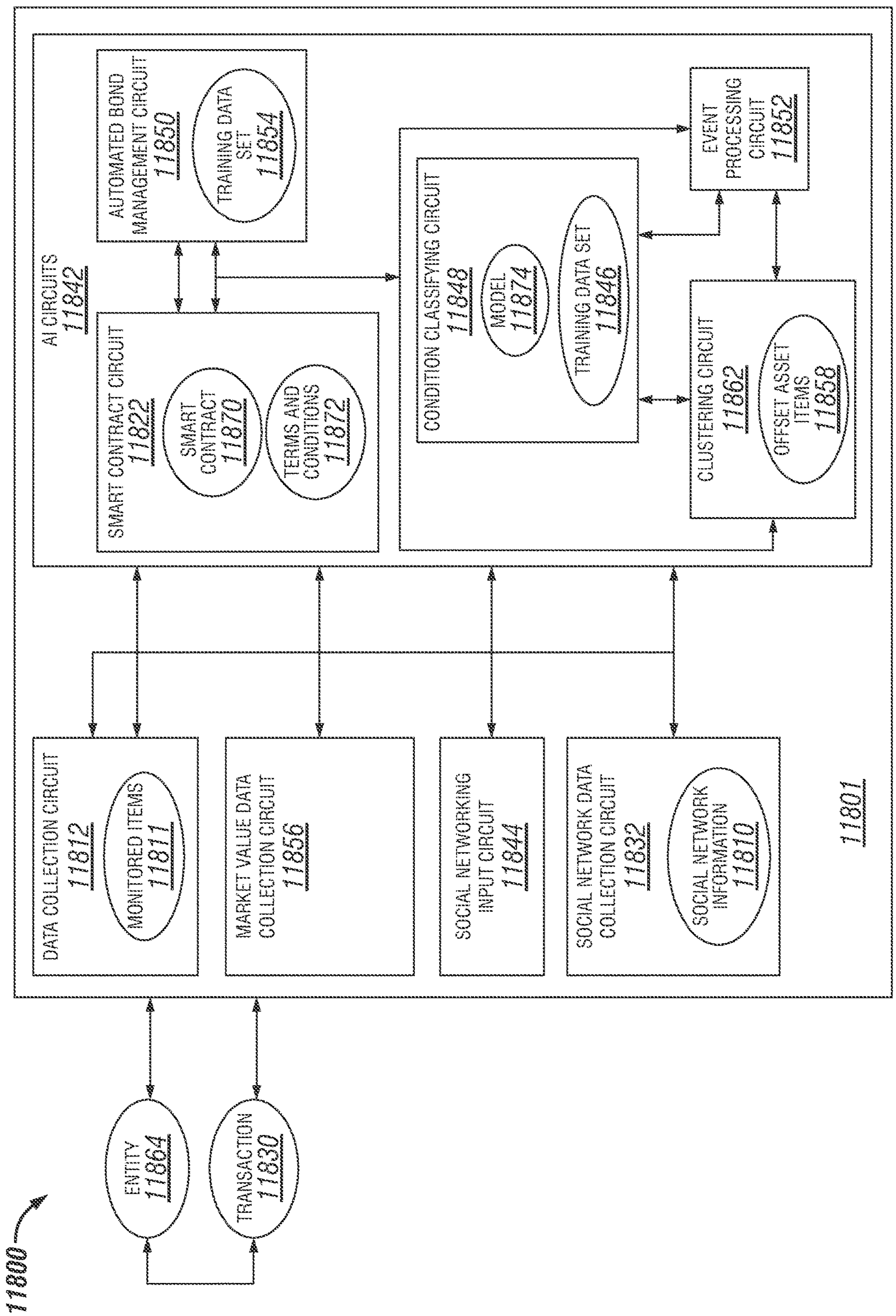
FIG. 118 depicts a system for monitoring a condition of an issuer for a bond.

Referring now to FIG. 118, an illustrative and non-limiting example system for monitoring a condition of an issuer for a bond 11800 is depicted. The example system may include a controller 11801. The controller 11801 may include a data collection circuit 11812, a market value data collection circuit 11856, an Internet of Things input circuit 11844, an Internet of Things data collection circuit 11832, and several artificial intelligence circuits 11842 including a smart contract circuit 11822, an automated bond management circuit 11850, a condition classifying circuit 11846, a clustering circuit 11862, and an event processing circuit 11852.

The Internet of Things data collection circuit 11832 may be structured to collect information about at least one entity 11864 involved in at least one transaction 11830 comprising at least one bond; and a condition classifying circuit 11846 may be structured to classify a condition of the at least one entity in accordance with a model 11874 and based on information from the Internet of Things data collection circuit, wherein the model is trained using a training data set 11854 of a plurality of outcomes related to the at least one entity. The at least one entity may be selected from the entities consisting of: a bond issuer, a bond, a party, and an asset. The bond issuer may be selected from the bond issuers consisting of: a municipality, a corporation, a contractor, a government entity, a non-governmental entity, and a non-profit entity. The bond may be selected from the entities consisting of: a municipal bond, a government bond, a treasury bond, an asset-backed bond, and a corporate bond.

The condition classified by the condition classifying circuit 11848 may be at least one of a default condition, a foreclosure condition, a condition indicating violation of a covenant, a financial risk condition, a behavioral risk condition, a policy risk condition, a financial health condition, a physical defect condition, a physical health condition, an entity risk condition or an entity health condition.

The Internet of Things data collection circuit 11832 may further include an Internet of Things input circuit 11844 which may be structured to receive input from a user used to configure a query for information about the at least one entity.

The data collection circuit 11812 may be structured to monitor at least one of an Internet of Things device, an environmental condition sensor, a crowdsourcing request circuit, a crowdsourcing communication circuit, a crowdsourcing publishing circuit, and an algorithm for querying network domains.

The data collection circuit 11812 may be further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

The at least one bond is backed by at least one asset. The at least one asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The event processing circuit 11852 may be structured to process an event relevant to at least one of a value, a condition and an ownership of the at least one asset and undertake an action related to the at least one transaction. The action may be selected from the actions consisting of: a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The condition classifying circuit 11848 may further include a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

The automated bond management circuit 11850 may be structured to manage an action related to the at least one bond, wherein the automated bond management circuit is trained on a training data set of a plurality of bond management activities.

The automated bond management circuit 11850 may be trained on a plurality of interactions of parties with a plurality of user interfaces involved in a plurality of bond transaction activities. The plurality of bond transaction activities may be selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

The market value data collection circuit 11856 may be structured to monitor and report on marketplace information relevant to a value of at least one of a bond issuer, the at least one bond, and an asset. The asset may be selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

The market value data collection circuit 11856 may be further structured to monitor pricing or financial data for an offset asset item in at least one public marketplace.

A set of offset asset items 11858 for valuing the asset may be constructed using a clustering circuit 11862 based on an attribute of the asset. The attribute may be selected from the attributes consisting of: a category, an asset age, an asset condition, an asset history, an asset storage, and a geolocation.

The smart contract circuit 11822 may be structured to manage a smart contract for the at least one transaction. The smart contract circuit may be further structured to determine a terms and conditions for the at least one bond.

The terms and conditions may be selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default.

Figure 119:
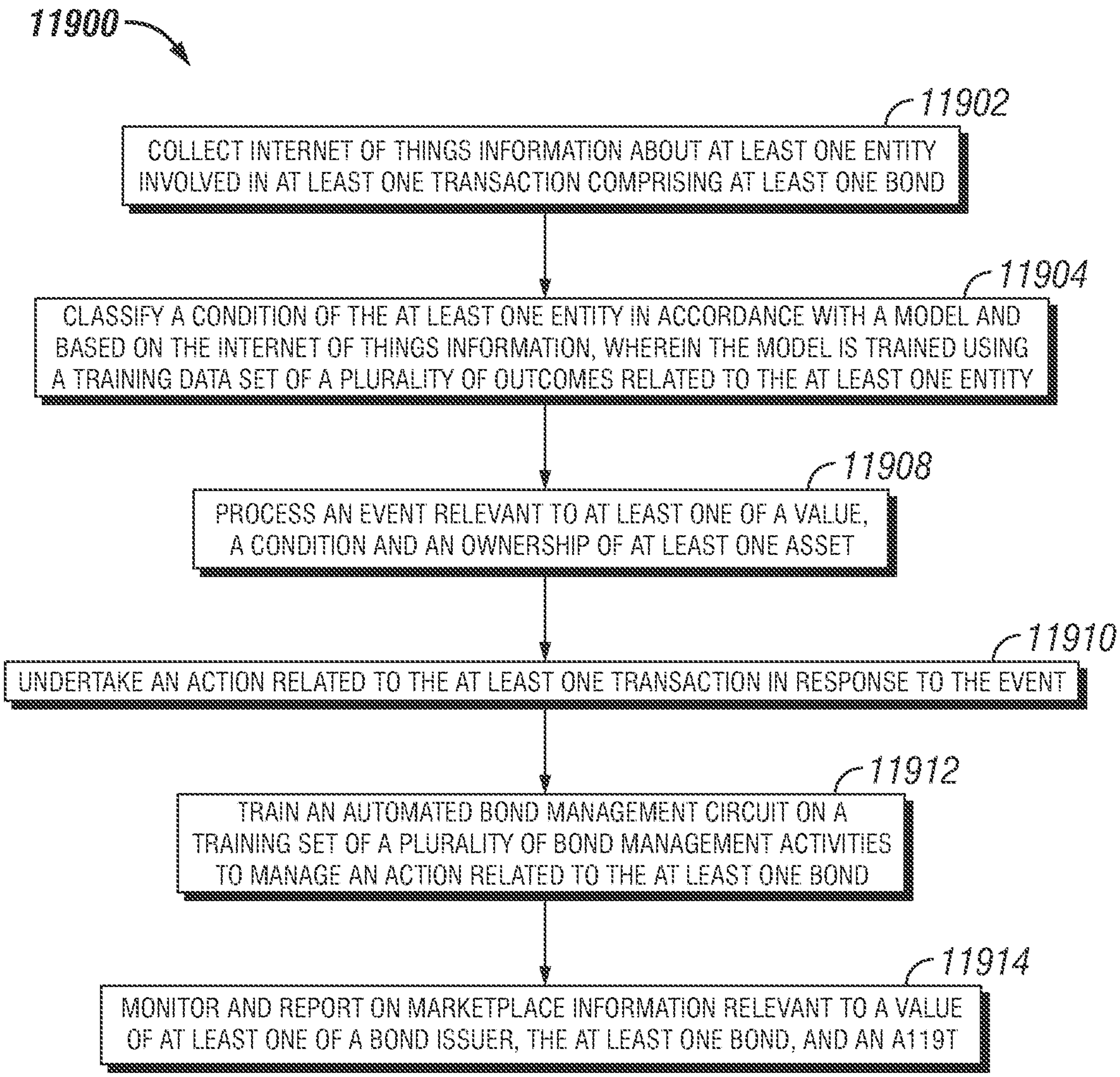
FIG. 119 depicts a method for monitoring a condition of an issuer for a bond.

Referring now to FIG. 119, an illustrative and non-limiting example method for monitoring a condition of an issuer for a bond 11900 is depicted. An example method may include collecting Internet of Things information about at least one entity involved in at least one transaction comprising at least one bond 11902; and classifying a condition of the at least one entity in accordance with a model and based on the Internet of Things information, wherein the model is trained using a training data set of a plurality of outcomes related to the at least one entity 11904.

An event relevant to at least one of a value, a condition and an ownership of at least one asset may be processed 11908. An action related to the at least one transaction may be undertaken in response to the event 11910. An automated bond management circuit may be trained on a training set of a plurality of bond management activities to manage an action related to the at least one bond 11912. An example method may further include monitoring and reporting on marketplace information relevant to a value of at least one of a bond issuer, the at least one bond, and an asset 11914.

Figure 120:
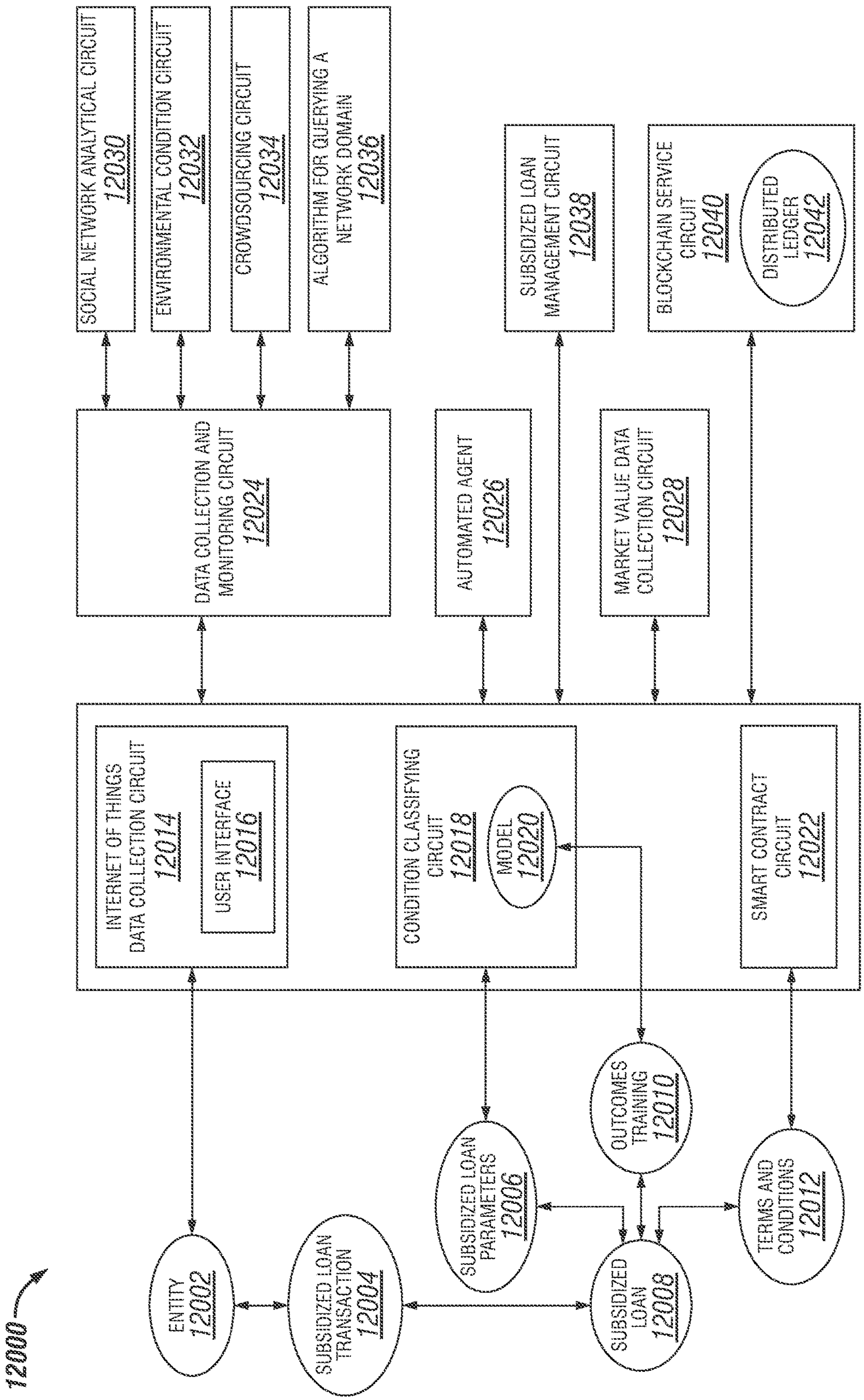
FIG. 120 depicts a system for automatic subsidized loan management.

FIG. 120 depicts a system 12000 including an Internet of Things data collection circuit 12014 structured to collect information about an entity 12002 (e.g., where an entity may be a subsidized loan, a party, a subsidy, a guarantor, a subsidizing party, a collateral, and the like, where a party may be least one of a municipality, a corporation, a contractor, a government entity, a non-governmental entity, and a non-profit entity) involved in a subsidized loan transaction 12004. In embodiments, the Internet of Things data collection circuit may include a user interface 12016 structured to enable a user to configure a query for information about the at least one entity. The system may include a condition classifying circuit 12018 that may include a model 12020 structured to classify a parameter 12006 of a subsidized loan 12008 (e.g., municipal subsidized loan, a government subsidized loan, a student loan, an asset-backed subsidized loan, or a corporate subsidized loan) involved in a subsidized loan transaction, such as based on the information from the Internet of Things data collection circuit. In embodiments, the condition classifying circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. The subsidized loan may be backed by an asset, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. The condition classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The model may be trained using a training data set of a plurality of outcomes 12010 related to the subsidized loan. For instance, the subsidized loan may be a student loan and the condition classifying circuit may classify a progress of a student toward a degree, a participation of a student in a non-profit activity, a participation of a student in a public interest activity, and the like. The system may include a smart contract circuit 12022 structured to automatically modify terms and conditions 12012 of the subsidized loan, such as based on the classified parameter from the condition classifying circuit. The system may include a configurable data collection and circuit 12024 structured to monitor the entity, such as further including a social network analytic circuit 12030, an environmental condition circuit 12032, a crowdsourcing circuit 12034, and an algorithm for querying a network domain 12036, where the configurable data collection and circuit may monitor an environment selected from an environment, such as a municipal environment, an educational environment, a corporate environment, a securities trading environment, a real property environment, a commercial facility, a warehousing facility, a transportation environment, a manufacturing environment, a storage environment, a home, a vehicle, and the like. The system may include an automated agent 12026 structured to process an event relevant to a value, a condition and an ownership of the asset and undertake an action related to the subsidized loan transaction to which the asset is related, wherein the action may be a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, consolidating a subsidized loan, and the like. The system may include an automated subsidized loan management circuit 12038 structured to manage an action related to the at least one subsidized loan, wherein the automated subsidized loan management circuit is trained on a training set of subsidized loan management activities. For instance, the automated subsidized loan management circuit may be trained on a plurality of interactions of parties with a plurality of user interfaces involved in a plurality of subsidized loan transaction activities, where the plurality of subsidized loan transaction activities may be selected from the activities consisting of offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan. The system may include a blockchain service circuit 12040 structured to record the modified set of terms and conditions for a subsidized loan, such as in a distributed ledger 12042. The system may include a market value data collection circuit 12028 structured to monitor and report on marketplace information relevant to a value of an issuer, a subsidized loan, an asset, and the like, where reporting may be on an asset selected from the assets consisting of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection circuit may be further structured to monitor pricing or financial data for an offset asset item in a public marketplace. A set of offset asset items for valuing the asset may be constructed using a clustering circuit based on an attribute of the asset, where the attribute may be a category, an asset age, an asset condition, an asset history, an asset storage, a geolocation, and the like. The smart contract circuit may be structured to manage a smart contract for a subsidized loan transaction, where the smart contract circuit may set terms and conditions for the subsidized loan, where the terms and conditions for the subsidized loan that are specified and managed by the smart contract circuit may include a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 121:
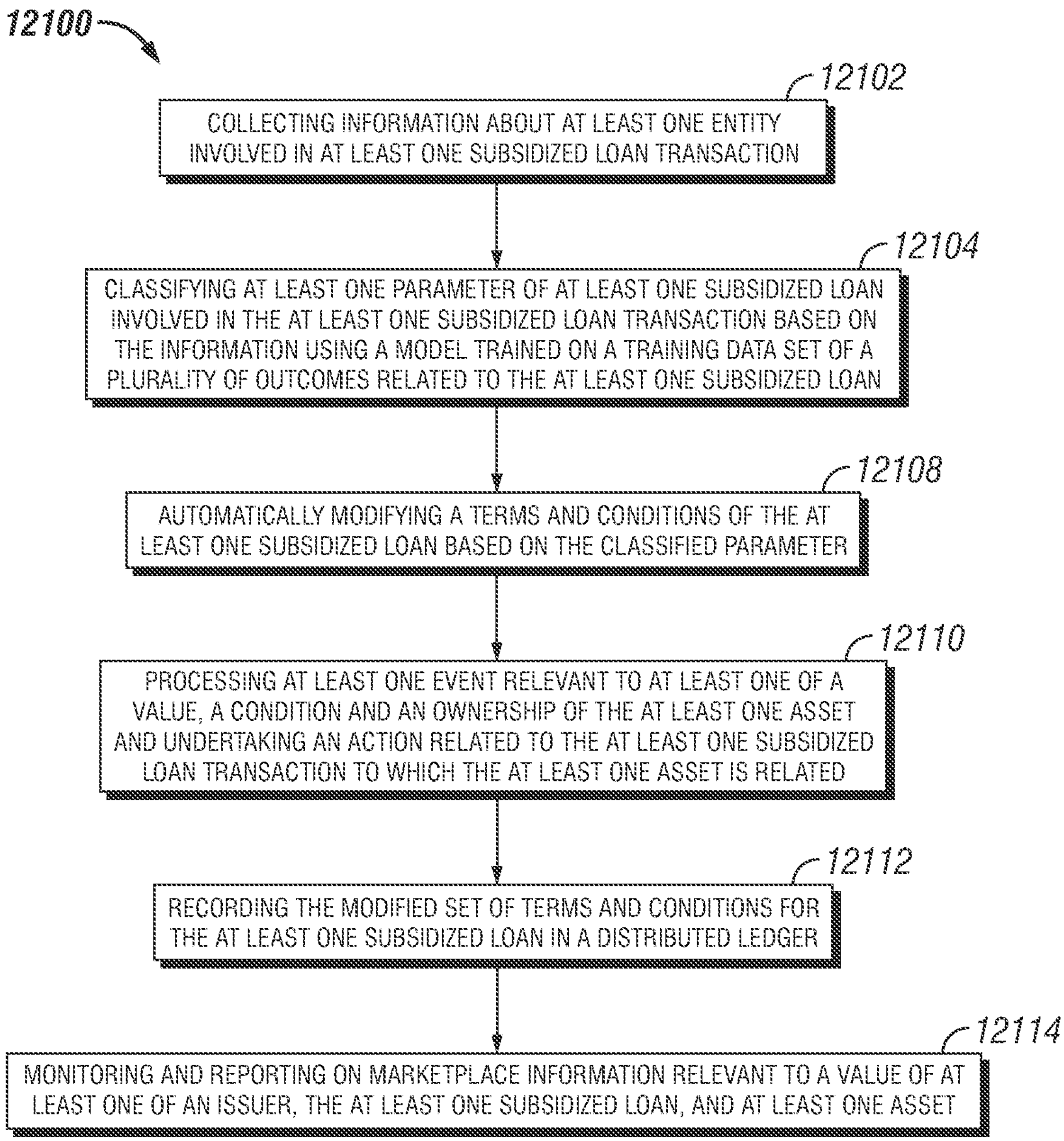
FIG. 121 depicts a method for automatically modifying subsidized loan terms and conditions.

FIG. 121 depicts a method 12100 including collecting information about an entity involved in a subsidized loan transaction 12102. The method may include classifying a parameter of a subsidized loan involved in the subsidized loan transaction based on the information using a model trained on a training data set of a plurality of outcomes related to the at least one subsidized loan 12104. The method may include automatically modifying terms and conditions of the subsidized loan based on the classified parameter 12108. The method may include processing an event relevant to a value, a condition and an ownership of an asset and undertaking an action related to the subsidized loan transaction to which the asset is related 12110. The method may include recording the modified set of terms and conditions for the subsidized loan in a distributed ledger 12112. The method may include monitoring and reporting on marketplace information relevant to a value of an issuer, the subsidized loan, the asset, and the like.

Figure 122:
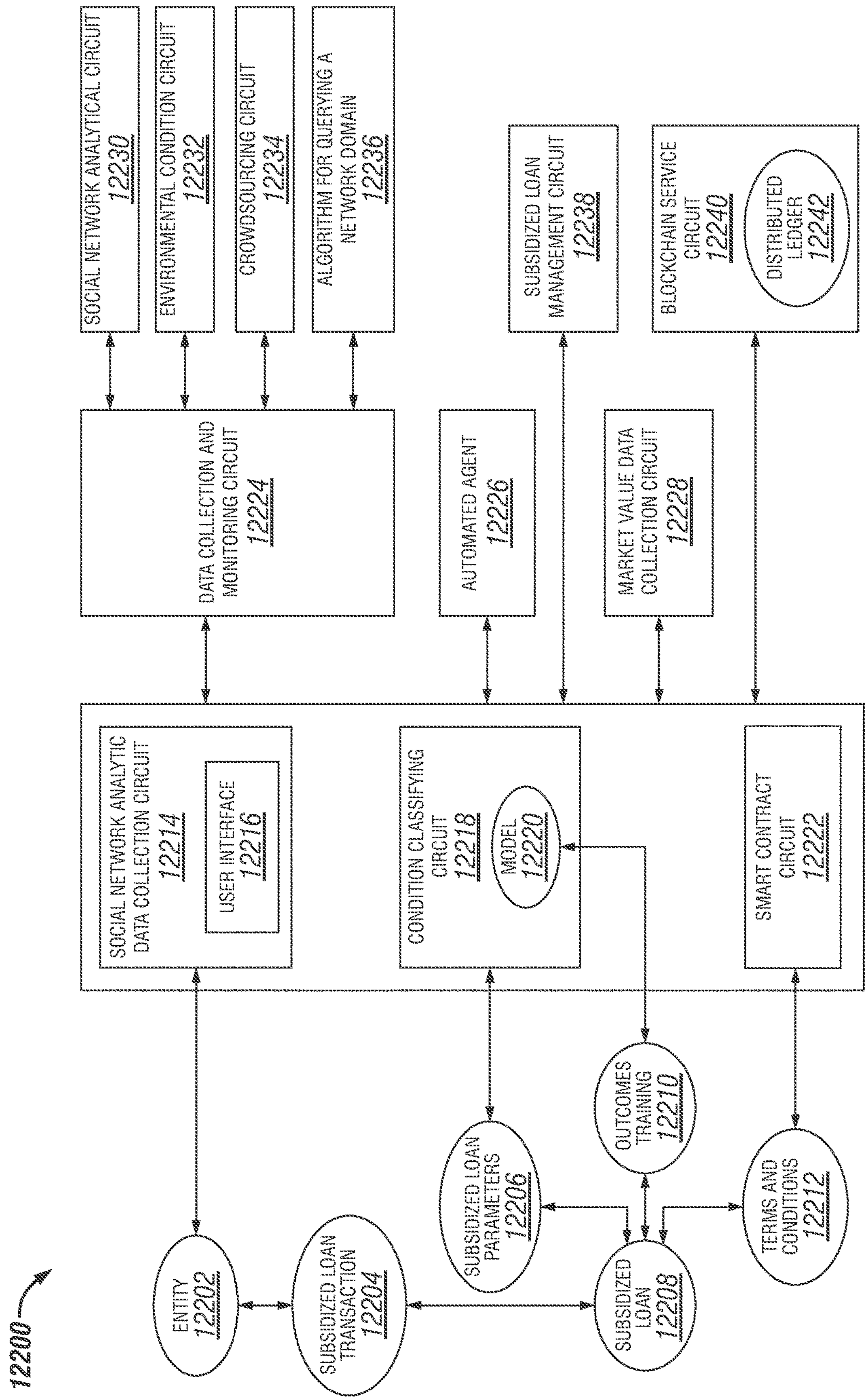
FIG. 122 depicts a system to automatically modify terms and conditions of a loan.

FIG. 122 depicts a system 12200 including a social network analytic data collection circuit 12214 structured to collect social network information about an entity 12202 (e.g., where an entity may be a subsidized loan, a party, a subsidy, a guarantor, a subsidizing party, a collateral, and the like, where a party may be least one of a municipality, a corporation, a contractor, a government entity, a non-governmental entity, and a non-profit entity) involved in a subsidized loan transaction 12204. In embodiments, the social network analytic data collection circuit may include a user interface 12216 structured to enable a user to configure a query for information about the at least one entity, wherein, in response to the query, the social network analytic data collection circuit may initiate at least one algorithm that searches and retrieves data from at least one social network based on the query. The system may include a condition classifying circuit 12218 that may include a model 12220 structured to classify a parameter 12206 of a subsidized loan 12208 (e.g., municipal subsidized loan, a government subsidized loan, a student loan, an asset-backed subsidized loan, or a corporate subsidized loan) involved in a subsidized loan transaction, such as based on the social network information from the social network analytic data collection circuit. In embodiments, the condition classifying circuit may include a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. The subsidized loan may be backed by an asset, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. The parameter classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The model may be trained using a training data set of a plurality of outcomes 12210 related to the subsidized loan. For instance, the subsidized loan may be a student loan and the condition classifying circuit may classify a progress of a student toward a degree, a participation of a student in a non-profit activity, a participation of a student in a public interest activity, and the like. The system may include a smart contract circuit 12222 structured to automatically modify terms and conditions 12212 of the subsidized loan, such as based on the classified parameter. The system may include a configurable data collection and circuit 12224 structured to monitor the entity, such as further including a social network analytic circuit 12230, an environmental condition circuit 12232, a crowdsourcing circuit 12234, and an algorithm for querying a network domain 12236, where the configurable data collection and circuit may monitor an environment selected from an environment, such as a municipal environment, an educational environment, a corporate environment, a securities trading environment, a real property environment, a commercial facility, a warehousing facility, a transportation environment, a manufacturing environment, a storage environment, a home, a vehicle, and the like. The system may include an automated agent 12226 structured to process an event relevant to a value, a condition and an ownership of the asset and undertake an action related to the subsidized loan transaction to which the asset is related, wherein the action may be a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, consolidating a subsidized loan, and the like. The system may include an automated subsidized loan management circuit 12238 structured to manage an action related to the at least one subsidized loan, wherein the automated subsidized loan management circuit is trained on a training set of subsidized loan management activities. For instance, the automated subsidized loan management circuit may be trained on a plurality of interactions of parties with a plurality of user interfaces involved in a plurality of subsidized loan transaction activities, where the plurality of subsidized loan transaction activities may be selected from the activities consisting of offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan. The system may include a blockchain service circuit 12240 structured to record the modified set of terms and conditions for a subsidized loan, such as in a distributed ledger 12242. The system may include a market value data collection circuit 12228 structured to monitor and report on marketplace information relevant to a value of an issuer, a subsidized loan, an asset, and the like, where reporting may be on an asset selected from the assets consisting of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection circuit may be further structured to monitor pricing or financial data for an offset asset item in a public marketplace. A set of offset asset items for valuing the asset may be constructed using a clustering circuit based on an attribute of the asset, where the attribute may be a category, an asset age, an asset condition, an asset history, an asset storage, a geolocation, and the like. The smart contract circuit may be structured to manage a smart contract for a subsidized loan transaction, where the smart contract circuit may set terms and conditions for the subsidized loan, where the terms and conditions for the subsidized loan that are specified and managed by the smart contract circuit may include a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, a consequence of default, and the like.

Figure 123:
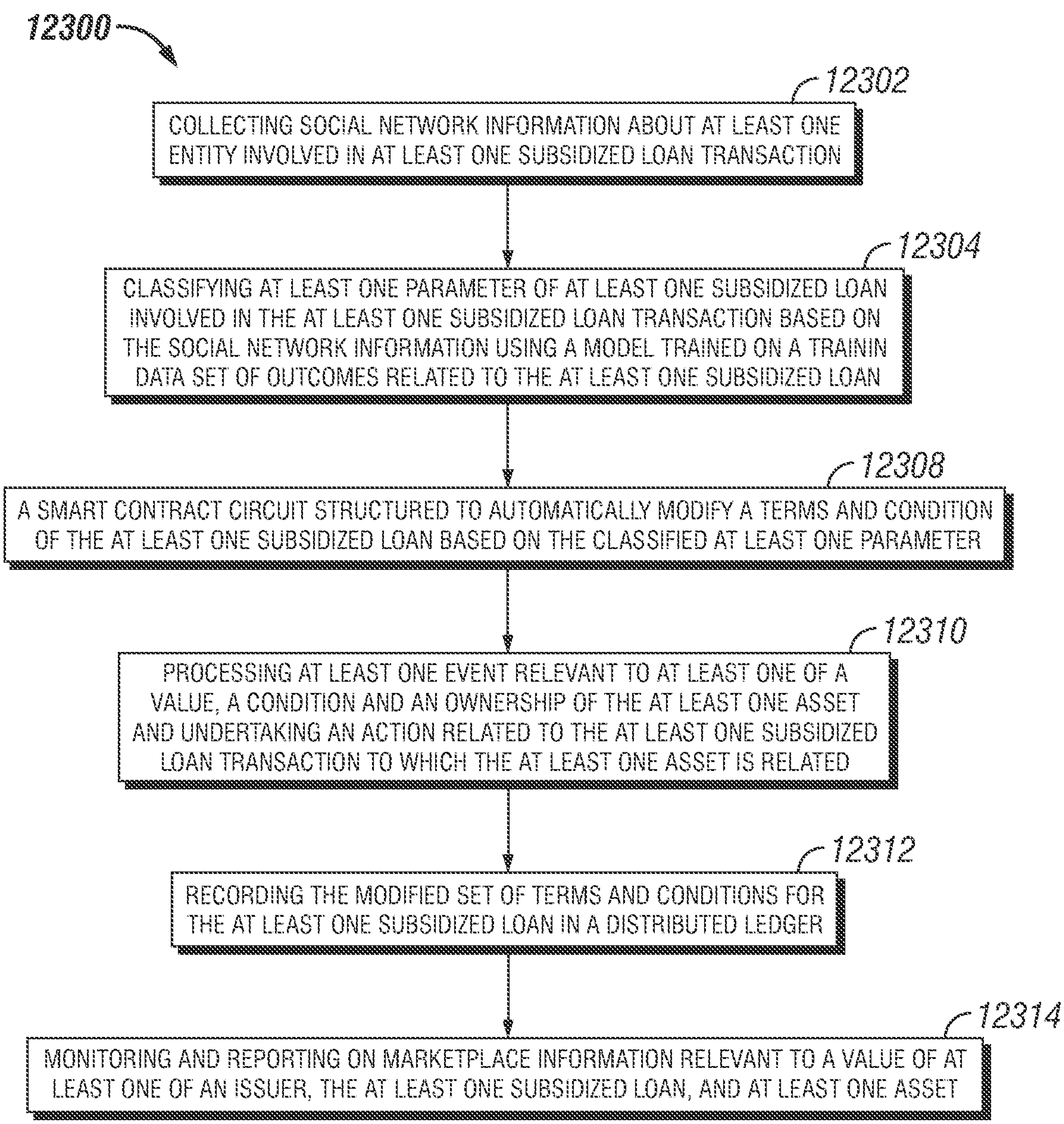
FIG. 123 depicts a method for collecting social network information about an entity involved in a subsidized loan transaction.

FIG. 123 depicts a method 12300 including collecting social network information about an entity involved in a subsidized loan transaction 12302. The method may include classifying a parameter of a subsidized loan involved in the subsidized loan transaction based on the social network information using a model trained on a training data set of a plurality of outcomes related to the at least one subsidized loan 12304. The method may include automatically modifying terms and conditions of the subsidized loan based on the classified parameter 12308. The method may include processing an event relevant to a value, a condition and an ownership of an asset and undertaking an action related to the subsidized loan transaction to which the asset is related 12310. The method may include recording the modified set of terms and conditions for the subsidized loan in a distributed ledger 12312. The method may include monitoring and reporting on marketplace information relevant to a value of an issuer, the subsidized loan, the asset, and the like.

Figure 124:
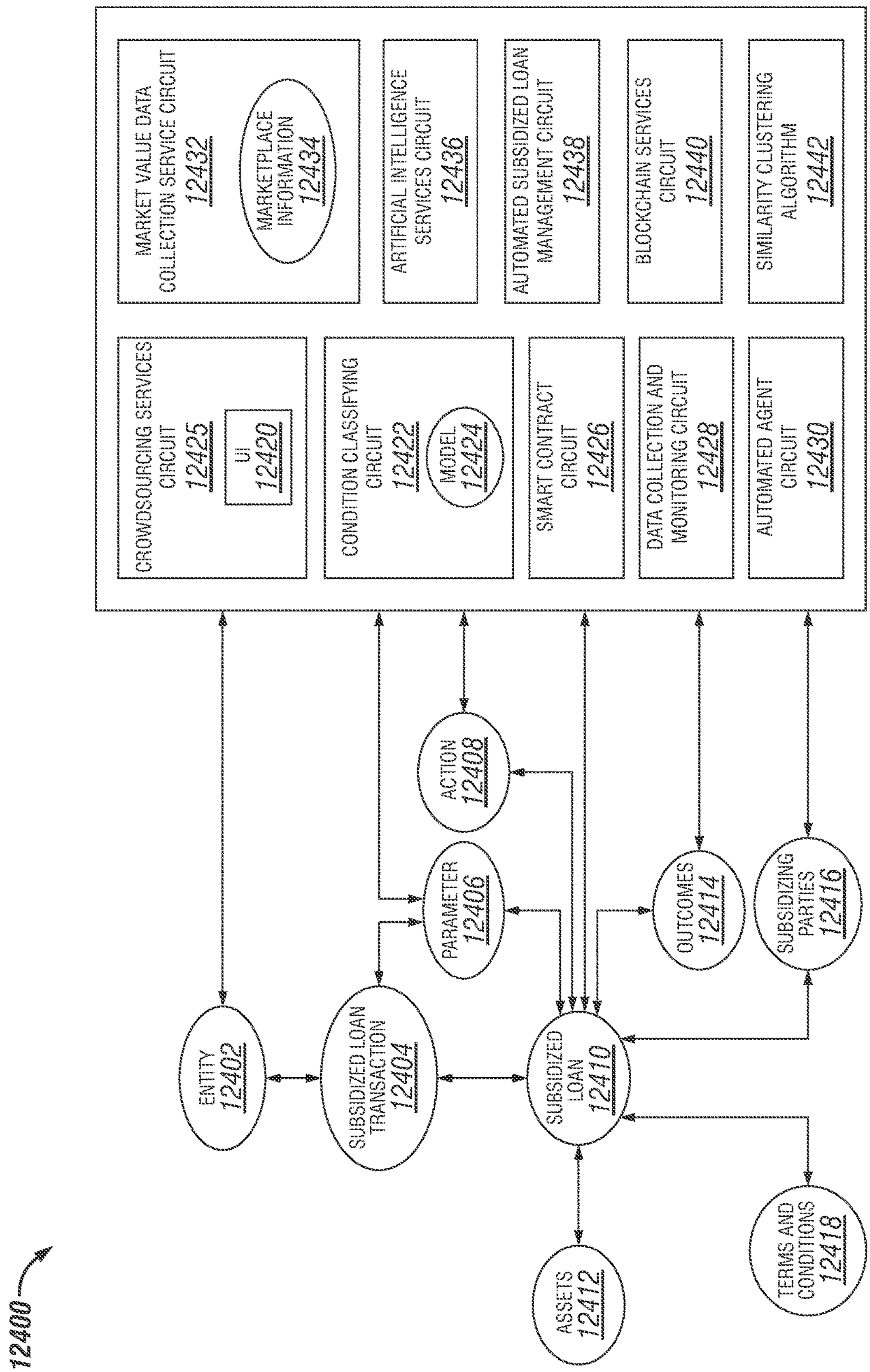
FIG. 124 depicts a system for automating handling of a subsidized loan using crowdsourcing.

FIG. 124 depicts a system 12400 for automating handling of a subsidized loan including a crowdsourcing services circuit 12425 structured to collect information related to a set of entities 12402 involved in a set of subsidized loan transactions 12404. The set of entities may include entities such as a set of subsidized loans, a set of parties 12416, a set of subsidies, a set of guarantors, a set of subsidizing parties, a set of collateral, and the like. A set of subsidizing parties may include a municipality, a corporation, a contractor, a government entity, a non-governmental entity, and a non-profit entity, and the like. The loan may be a student loan and the condition classifying circuit classifies at least one of the progress of a student toward a degree, the participation of a student in a non-profit activity, the participation of the student in a public interest activity, and the like. The crowdsourcing services circuit may be further structured with a user interface 12420 by which a user may configure a query for information about the set of entities and the crowdsourcing services circuit automatically configures a crowdsourcing request based on the query. The set of subsidized loans may be backed by a set of assets 12412, such as a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, an item of personal property, and the like. An example system may include a condition classifying circuit 12422 including a model 12424 and an artificial intelligence services circuit 12436 structured to classify a set of parameters 12406 of the set of subsidized loans 12410 involved in the transactions based on information from crowdsourcing services circuit, where the model may be trained using a training data set of outcomes 12414 related to subsidized loans. The set of subsidized loans may include at least one of a municipal subsidized loan, a government subsidized loan, a student loan, an asset-backed subsidized loan, and a corporate subsidized loan. The condition classified by the condition classifying circuit may be a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition, an entity health condition, and the like. The artificial intelligence services circuit may a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, a simulation system, and the like. An example system may include a smart contract circuit 12426 for automatically modifying the terms and conditions 12418 of a subsidized loan based on the classified set of parameters from the condition classifying circuit. The smart contract services circuit may be utilized for managing a smart contract for the subsidized loan transaction, set terms and conditions for the subsidized loan, and the like. In embodiments, the set of terms and conditions for the debt transaction that are specified and managed by the smart contract services circuit may be selected from among a principal amount of debt, a balance of debt, a fixed interest rate, a variable interest rate, a payment amount, a payment schedule, a balloon payment schedule, a specification of assets that back the subsidized loan, a specification of substitutability of assets, a party, an issuer, a purchaser, a guarantee, a guarantor, a security, a personal guarantee, a lien, a duration, a covenant, a foreclose condition, a default condition, and a consequence of default. An example system may include a configurable data collection and monitoring services circuit 12428 for monitoring the entities such as a set of Internet of Things services, a set of environmental condition sensors, a set of social network analytic services, a set of algorithms for querying network domains, and the like. The configurable data collection and monitoring services circuit may be further structured to monitor an environment such as a municipal environment, an educational environment, a corporate environment, a securities trading environment, a real property environment, a commercial facility, a warehousing facility, a transportation environment, a manufacturing environment, a storage environment, a home, a vehicle, and the like. An example system may include an automated agent circuit 12430 structured to process events relevant to at least one of the value, the condition, and the ownership of the assets and undertakes an action related to a subsidized loan transaction to which the asset is related, such as where the action may be a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating subsidized loans, consolidating subsidized loans, and the like. An example system may include an automated subsidized loan management circuit 12438 structured to manage an action related to the subsidized loan, where the automated subsidized loan management circuit may be trained on a training set of subsidized loan management activities. The automated subsidized loan management circuit may be trained on a set of interactions of parties with a set of user interfaces involved in a set of subsidized loan transaction activities, such as offering a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction providing notices required to be provided, foreclosing on a set of assets, modifying terms and conditions, setting a rating for an entity, syndicating subsidized loans, consolidating subsidized loans, and the like. An example system may include a blockchain services circuit 12440 structured to record the modified set of terms and conditions for the set of subsidized loans in a distributed ledger. An example system may include a market value data collection service circuit 12432 structured to monitor and report on marketplace information 12434 relevant to the value of at least one of a party, a set of subsidized loans, and a set of assets, where reporting may be on a set of assets such as one of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property. The market value data collection service circuit may be further structured to monitor pricing or financial data for items that are similar to the assets in at least one public marketplace. In embodiments, a set of similar items for valuing the assets may be constructed using a similarity clustering algorithm 12442 based on the attributes of the assets, such as from among a category of the assets, asset age, asset condition, asset history, asset storage, geolocation of assets, and the like.

Figure 125:
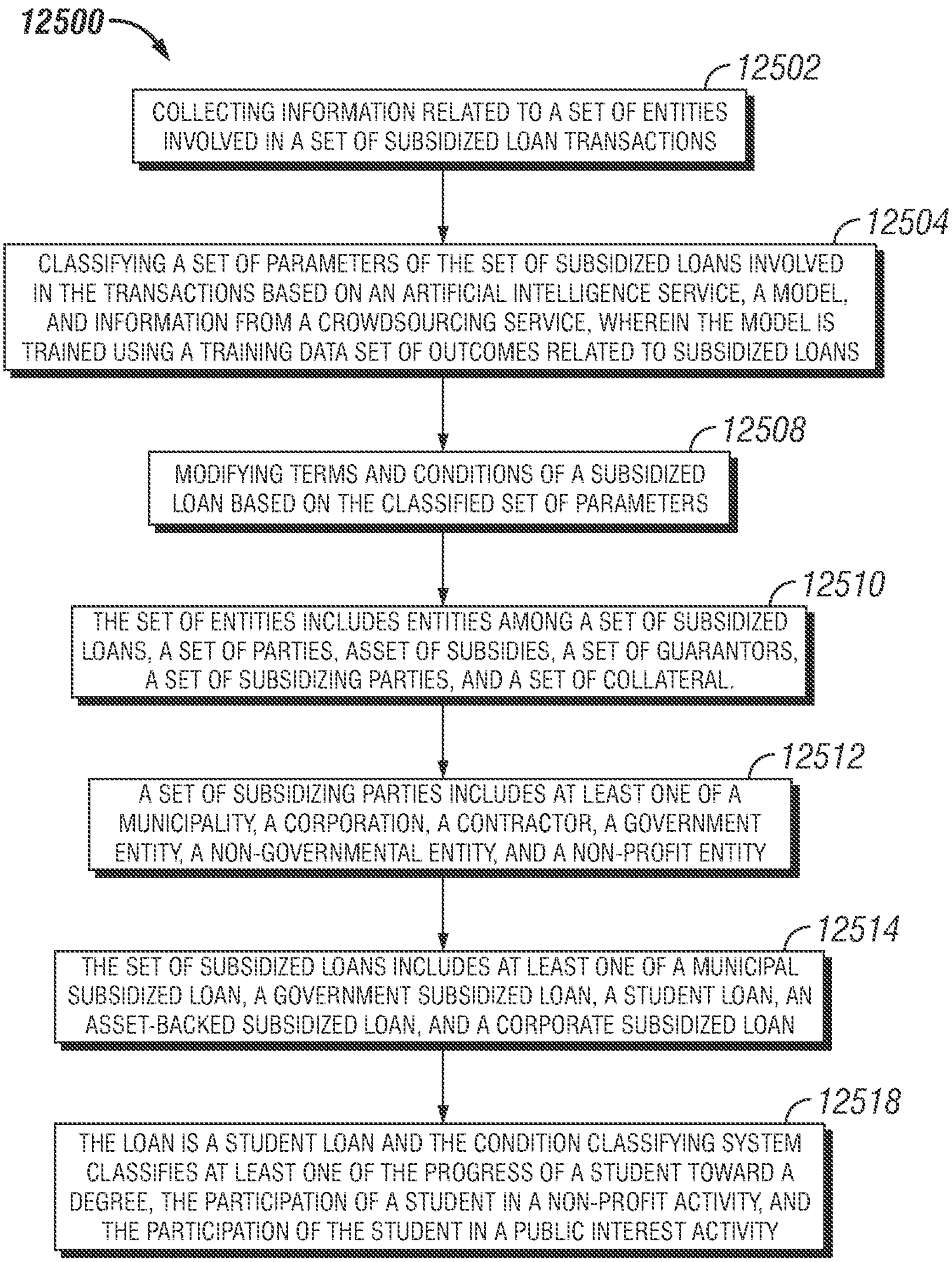
FIG. 125 depicts a method for automating handling of a subsidized loan.

FIG. 125 depicts a method 12500 for automating handling of a subsidized loan including collecting information related to a set of entities involved in a set of subsidized loan transactions 12502, classifying a set of parameters of the set of subsidized loans involved in the transactions based on an artificial intelligence service, a model, and information from a crowdsourcing service, where the model is trained using a training data set of outcomes related to subsidized loans 12504; and modifying terms and conditions of a subsidized loan based on the classified set of parameters 12508. The set of entities may include entities among a set of subsidized loans, a set of parties, a set of subsidies, a set of guarantors, a set of subsidizing parties, and a set of collateral 12510. A set of subsidizing parties may include a municipality, a corporation, a contractor, a government entity, a non-governmental entity, and a non-profit entity 12512. The set of subsidized loans may include a municipal subsidized loan, a government subsidized loan, a student loan, an asset-backed subsidized loan, and a corporate subsidized loan 12514. The loan may be a student loan where the condition classifying system classifies at least one of the progress of a student toward a degree, the participation of a student in a non-profit activity, and the participation of the student in a public interest activity 12518.

Figure 126:
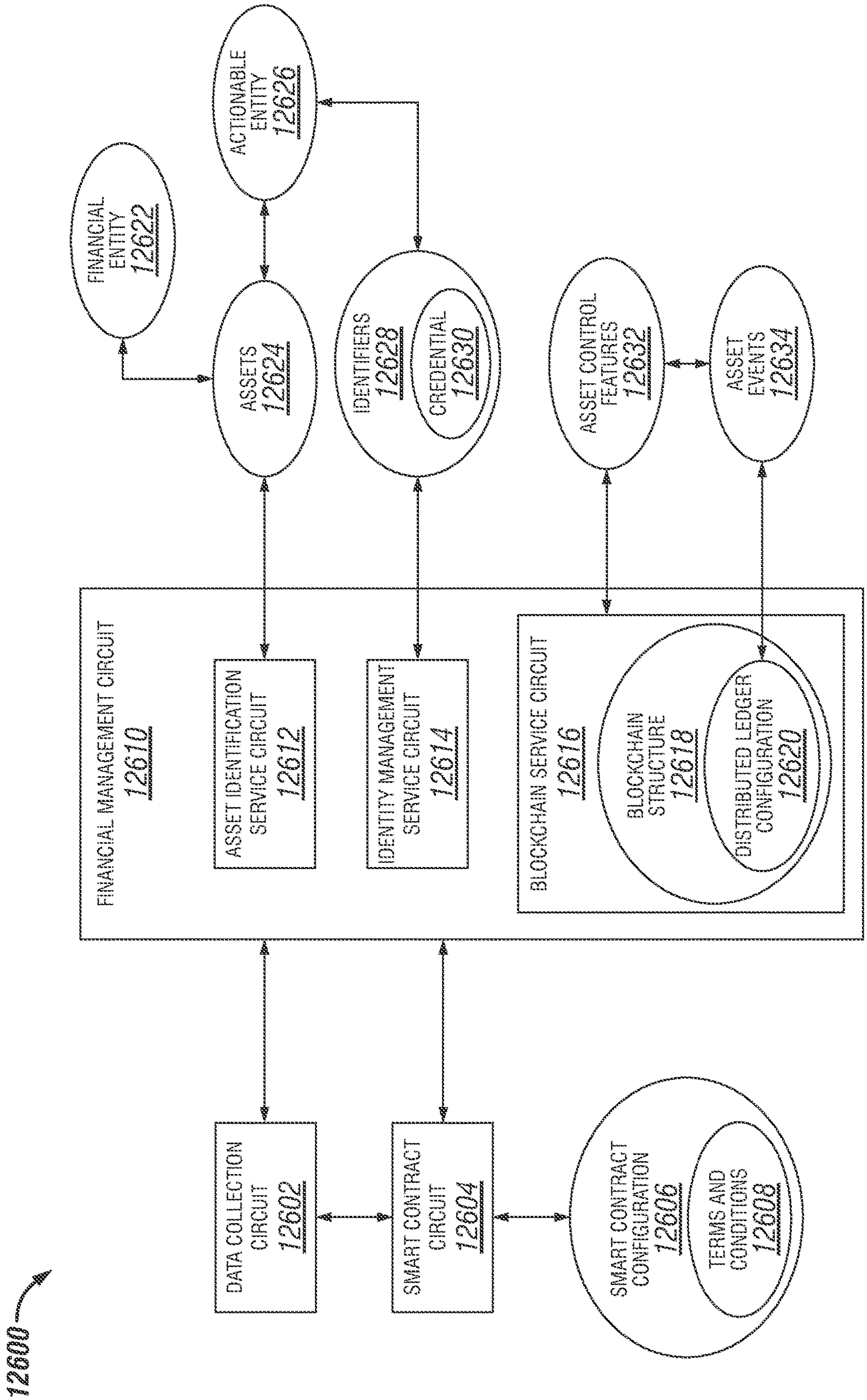
FIG. 126 depicts a system for asset access control.

FIG. 126 depicts a system including an asset identification service circuit 12612 structured to interpret assets 12624 corresponding to a financial entity 12622 configured to take custody of the assets (e.g., identifying assets for which a bank may take custody), where an identity management service circuit 12614 may be structured to authenticate identifiers 12628 (e.g., including a credential 12630) corresponding to actionable entities 12626 (e.g., an owner, a beneficiary, an agent, a trustee, a custodian, and the like) entitled to take action with respect to the assets. For example, a group of financial entities may have permissions with respect to actions to be taken with respect to an asset. A blockchain service circuit 12616 may be structured to store a plurality of asset control features 12632 in a blockchain structure 12618, where the blockchain structure may include a distributed ledger configuration 12620. For instance, transactional events may be stored in a distributed ledger in the blockchain structure where the financial entity and actionable entities may have distributed access through the blockchain structure to share and distribute the asset events. A financial management circuit 12610 may be structured to communicate the interpreted assets and authenticated identifiers to the blockchain service circuit for storage in the blockchain structure as asset control features, wherein the asset control features are recorded in the distributed ledger configuration as asset events 12634 (e.g., a transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, a designation of an ownership status, and the like). A data collection circuit 12602 may be structured to monitor the interpretation of the plurality of assets, authentication of the plurality of identifiers, and the recording of asset events, where t data collection circuit may be communicatively coupled with an Internet of Things system, a camera system, a networked monitoring system, an internet monitoring system, a mobile device system, a wearable device system, a user interface system, and an interactive crowdsourcing system. A smart contract circuit 12604 may be structured to manage the custody of the assets, where an asset event related to the plurality of assets may be managed by the smart contract circuit based on terms and conditions 12608 embodied in a smart contract configuration 12606 and based on data collected by the data collection service circuit. In embodiments, the asset identification service circuit, identity management service circuit, blockchain service circuit, and the financial management circuit may include a corresponding application programming interface (API) component structured to facilitate communication among the circuits of the system, such as where the corresponding API components of the circuits further include user interfaces structured to interact with users of the system.

Figure 127:
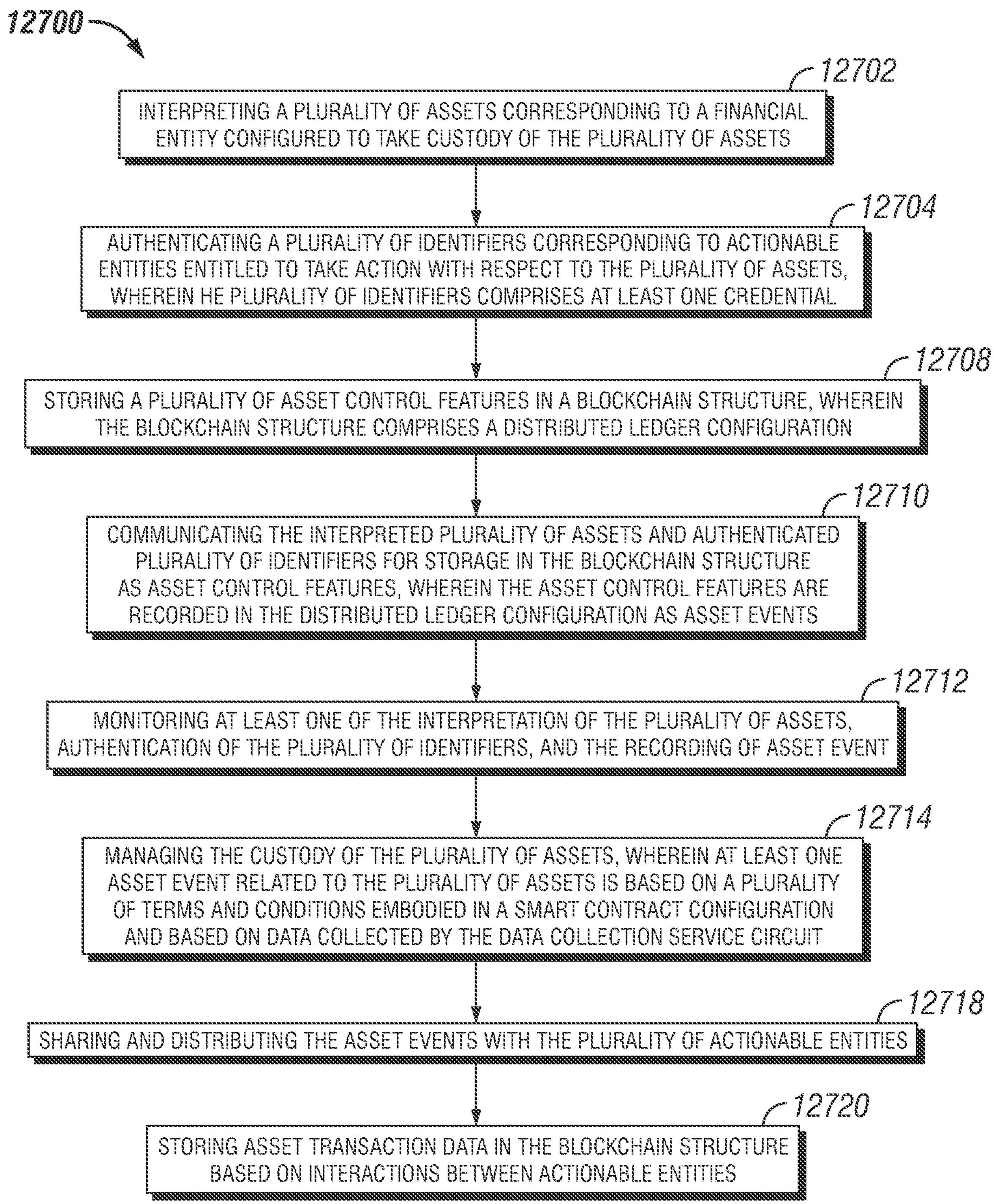
FIG. 127 depicts a method for asset access control.

FIG. 127 depicts a method including interpreting assets corresponding to a financial entity configured to take custody of the plurality of assets 12702, such as where the interpreting of the assets may include identifying the plurality of assets for which a financial entity is responsible for taking custody. The method may include authenticating identifiers (e.g., including a credential) corresponding to actionable entities (e.g., owner, a beneficiary, an agent, a trustee, and a custodian) entitled to take action with respect to the plurality of assets 12704, such as where authenticating the identifiers includes verifying the identifiers corresponding to actionable entities are entitled to take action with respect to the assets. The method may include storing a plurality of asset control features in a blockchain structure (e.g., including a distributed ledger configuration) 12708 (e.g., the blockchain structure may be provided in conjunction with a block-chain marketplace, utilize an automated blockchain-based transaction application, the blockchain structure may be a distributed blockchain structure across a plurality of asset nodes, and the like). The method may include communicating the interpreted assets and authenticated identifiers for storage in the blockchain structure as asset control features, where the asset control features may be recorded in the distributed ledger configuration as asset events 12710. The method may include monitoring the interpretation of the assets, authentication of the identifiers, and the recording of asset events 12712, such as where asset events may include transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status. In embodiments, monitoring may be executed by an Internet of Things system, a camera system, a networked monitoring system, an internet monitoring system, a mobile device system, a wearable device system, a user interface system, an interactive crowdsourcing system, and the like. The method may include managing the custody of the assets, where an asset event related to the plurality of assets may be based on terms and conditions embodied in a smart contract configuration and based on data collected by a data collection service circuit 12714. The method may include sharing and distributing the asset events with the plurality of actionable entities 12718. The method may include storing asset transaction data in the blockchain structure based on interactions between actionable entities 12720. An asset may include a virtual asset tag where interpreting the assets comprises identifying the virtual asset tag (e.g., storing of the asset control features may include storing virtual asset tag data, such as where the virtual asset tag data is location data, tracking data, and the like. For instance, an identifier corresponding to the financial entity or actionable entities may be stored as virtual asset tag data.

Figure 128:
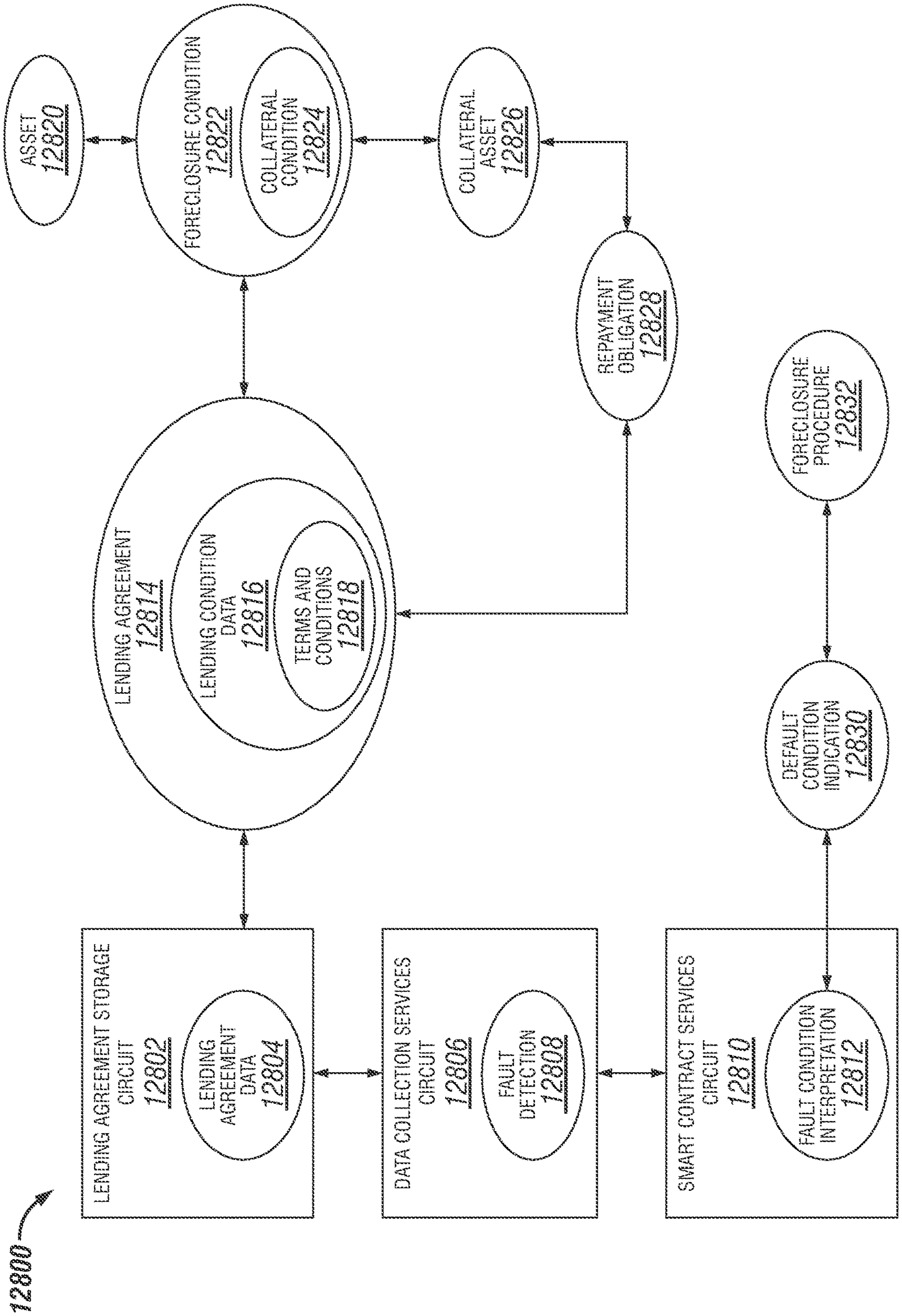
FIG. 128 depicts a system automated handling of loan foreclosure.

FIG. 128 depicts a system 12800 including a lending agreement storage circuit 12802 structured to store a lending agreement data 12804 including a lending agreement 12814, wherein the lending agreement may include a lending condition data 12816. In embodiments, the lending condition data may include a terms and condition data 12818 of the at least one lending agreement related to a foreclosure condition 12822 on an asset 12820 that provides a collateral condition 12824 related to a collateral asset 12826, such as for securing a repayment obligation 12828 of the lending agreement. The system may include a data collection services circuit 12806 structured to monitor the lending condition data and to detect a default condition 12808 based on a change to the lending condition data. Further, the data collection services circuit may include an Internet of Things system, a camera system, a networked monitoring system, an internet monitoring system, a mobile device system, a wearable device system, a user interface system, and an interactive crowdsourcing system. The system may include a smart contract services circuit 12810 structured to, when the default condition is detected by the data collection services circuit, interpret the default condition 12812 and communicate a default condition indication 12830, such as to initiate a foreclosure procedure 12832 based on the collateral condition. For instance, the foreclosure procedure may configure and initiate a listing of the collateral asset on a public auction site, configure and deliver a set of transport instructions for the collateral asset, configure a set of instructions for a drone to transport the collateral asset, configure a set of instructions for a robotic device to transport the collateral asset, initiate a process for automatically substituting a set of substitute collateral, initiate a collateral tracking procedure, initiates a collateral valuation process, initiates a message to a borrower initiating a negotiation regarding the foreclosure, and the like. The default condition indication may be communicated to a smart lock and a smart container to lock the collateral asset. The negotiation may be managed by a robotic process automation system trained on a training set of foreclosure negotiations, and may relate to modification of interest rate, payment terms, collateral for the lending agreement, and the like. In embodiments, each of the lending agreement storage circuit, data collection services circuit, and smart contract services circuit may further include a corresponding application programming interface (API) component structured to facilitate communication among the circuits of the system, where the corresponding API components of the circuits may include user interfaces structured to interact with a plurality of users of the system.

Figure 129:
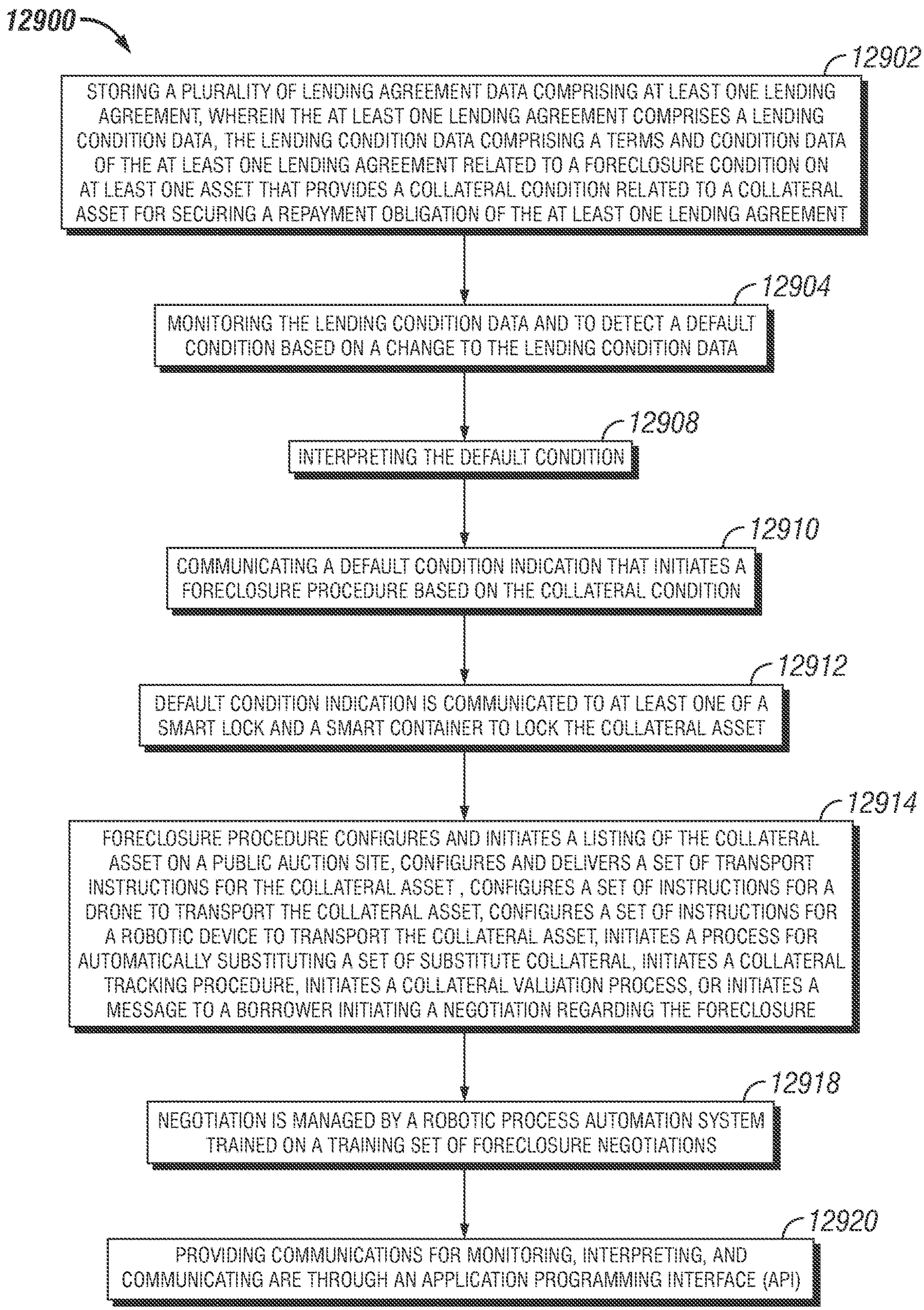
FIG. 129 depicts a method for facilitating foreclosure on collateral.

FIG. 129 depicts a method 12900 for facilitating foreclosure on collateral, the method including storing a lending agreement data including a lending agreement, where the lending agreement may include a lending condition data, such as where the lending condition data includes a terms and condition data of the lending agreement related to a foreclosure condition on an asset that provides a collateral condition related to a collateral asset for securing a repayment obligation of the at least one lending agreement 12902. The method may include monitoring the lending condition data and to detect a default condition based on a change to the lending condition data 12904. The method may include interpreting the default condition 12908 and communicating a default condition indication that initiates a foreclosure procedure based on the collateral condition 12910. For instance, the foreclosure procedure may configure and initiate a listing of the collateral asset on a public auction site, configure and deliver a set of transport instructions for the collateral asset, configure a set of instructions for a drone to transport the collateral asset, configure a set of instructions for a robotic device to transport the collateral asset, initiate a process for automatically substituting a set of substitute collateral, initiate a collateral tracking procedure, initiates a collateral valuation process, initiates a message to a borrower initiating a negotiation regarding the foreclosure, and the like 12914. The default condition indication may be communicated to a smart lock and a smart container to lock the collateral asset 12912. The negotiation may be managed by a robotic process automation system trained on a training set of foreclosure negotiations 12918, and may relate to modification of interest rate, payment terms, collateral for the lending agreement, and the like. In embodiments, communications may be provided by a corresponding application programming interface (API) 12920, where the corresponding API may include user interfaces structured to interact with a plurality of users.

ARTIFICIAL INTELLIGENCE EMBODIMENTS

Referring to FIGS. 4-31, in embodiments of the present disclosure, including ones involving artificial intelligence 3448, adaptive intelligent systems 3304, robotic process automation 3442, expert systems, self-organization, machine learning, training of models, and the like, may benefit from the use of a neural net, such as a neural net trained for pattern recognition, for prediction, for optimization based on a set of desired outcomes, for classification or recognition of one or more parameters, features characteristics, or phenomena, for support of autonomous control, and other purposes. References to artificial intelligence, expert systems, models, adaptive intelligence, and/or neural networks throughout this disclosure should be understood to optionally encompass use of a wide range of different types of neural networks, machine learning systems, artificial intelligence systems, and the like as particular embodiments permit, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic—neural network systems), Autoencoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neocognitron neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GCU) neural networks, auto encoder neural networks, variational auto encoder neural networks, de-noising auto encoder neural networks, sparse auto-encoder neural networks, Markov chain neural networks, restricted Boltzmann machine neural networks, deep belief neural networks, deep convolutional neural networks, de-convolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptrons, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values, such as sensor data, event data, parameter data, and other types of data (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more transactional environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like a data source related to at least one resource or parameter related to a transactional environment, such as any of the data sources mentioned throughout this disclosure, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, methods and systems described herein that involve an expert system or self-organization capability may use a capsule neural network, such as for prediction, classification, or control functions with respect to a transactional environment, such as relating to one or more of the machines and automated systems described throughout this disclosure.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions. In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer, such as a sigmoidal hidden layer transform, in a multi-layer perceptron. An RBF network may have two layers, such as where an input is mapped onto each RBF in a hidden layer. In embodiments, an output layer may comprise a linear combination of hidden layer values representing, for example, a mean predicted output. The output layer value may provide an output that is the same as or similar to that of a regression model in statistics. In classification problems, the output layer may be a sigmoid function of a linear combination of hidden layer values, representing a posterior probability. Performance in both cases is often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface is quadratic and therefore has a single minimum. In regression problems, this can be found in one matrix operation. In classification problems, the fixed non-linearity introduced by the sigmoid output function may be handled using an iteratively re-weighted least squares function or the like.

RBF networks may use kernel methods such as support vector machines (SVM) and Gaussian processes (where the RBF is the kernel function). A non-linear kernel function may be used to project the input data into a space where the learning problem can be solved using a linear model.

In embodiments, an RBF neural network may include an input layer, a hidden layer and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that is centered on a point with as many dimensions as a number of predictor variables. The spread (e.g., radius) of the RBF function may be different for each dimension. The centers and spreads may be determined by training. When presented with a vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output is produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and others hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system can explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with a transactional environment, including any machine or component that relates to the transactional environment. In embodiments, the self-organizing neural network may be used to identify structures in data, such as unlabeled data, such as in data sensed from a range of data sources about or sensors in or about in a transactional environment, where sources of the data are unknown (such as where events may be coming from any of a range of unknown sources). The self-organizing neural network may organize structures or patterns in the data, such that they can be recognized, analyzed, and labeled, such as identifying market behavior structures as corresponding to other events and signals.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the automation systems, machines and devices described throughout this disclosure, such as an automated agent interacting with a marketplace for purposes of collecting data, testing spot market transactions, execution transactions, and the like, where dynamic system behavior involves complex interactions that a user may desire to understand, predict, control and/or optimize. For example, the recurrent neural network may be used to anticipate the state of a market, such as one involving a dynamic process or action, such as a change in state of a resource that is traded in or that enables a marketplace of transactional environment. In embodiments, the recurrent neural network may use internal memory to process a sequence of inputs, such as from other nodes and/or from sensors and other data inputs from or about the transactional environment, of the various types described herein. In embodiments, the recurrent neural network may also be used for pattern recognition, such as for recognizing a machine, component, agent, or other item based on a behavioral signature, a profile, a set of feature vectors (such as in an audio file or image), or the like. In a non-limiting example, a recurrent neural network may recognize a shift in an operational mode of a marketplace or machine by learning to classify the shift from a training data set consisting of a stream of data from one or more data sources of sensors applied to or about one or more resources.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as whole is intended to perform. For example, a modular neural network may comprise a recurrent neural network for pattern recognition, such as to recognize what type of machine or system is being sensed by one or more sensors that are provided as input channels to the modular network and an RBF neural network for optimizing the behavior of the machine or system once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or workflow based on the recognized pattern (such as providing an output governing autonomous control qf a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, or the like). Modular neural networks may also include situations where an expert system uses one neural network for determining a state or context (such as a state of a machine, a process, a work flow, a marketplace, a storage system, a network, a data collector, or the like) and a different neural network for self-organizing a process involving the state or context (e.g., a data storage process, a network coding process, a network selection process, a data marketplace process, a power generation process, a manufacturing process, a refining process, a digging process, a boring process, or other process described herein).

In embodiments, methods and systems described herein that involve an expert system or self-organization capability may use a physical neural network where one or more hardware elements is used to perform or simulate neural behavior. In embodiments, one or more hardware neurons may be configured to stream voltage values, current values, or the like that represent sensor data, such as to calculate information from analog sensor inputs representing energy consumption, energy production, or the like, such as by one or more machines providing energy or consuming energy for one or more transactions. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the machine that is producing or consuming energy, or to optimize another parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, thermal images, heat maps, or the like), and the like. A physical neural network may be embodied in a data collector, including one that may be reconfigured by switching or routing inputs in varying configurations, such as to provide different neural net configurations within the data collector for handling different types of inputs (with the switching and configuration optionally under control of an expert system, which may include a software-based neural net located on the data collector or remotely). A physical, or at least partially physical, neural network may include physical hardware nodes located in a storage system, such as for storing data within a machine, a data storage system, a distributed ledger, a mobile device, a server, a cloud resource, or in a transactional environment, such as for accelerating input/output functions to one or more storage elements that supply data to or take data from the neural net. A physical, or at least partially physical, neural network may include physical hardware nodes located in a network, such as for transmitting data within, to or from an industrial environment, such as for accelerating input/output functions to one or more network nodes in the net, accelerating relay functions, or the like. In embodiments, of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They are versatile and can be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feed forward neural network may be trained by an optimization technical, such as a genetic algorithm, such as to explore a large and complex space of options to find an optimum, or near-optimum, global solution. For example, one or more genetic algorithms may be used to train a multilayered feed forward neural network to classify complex phenomena, such as to recognize complex operational modes of machines, such as modes involving complex interactions among machines (including interference effects, resonance effects, and the like), modes involving non-linear phenomena, modes involving critical faults, such as where multiple, simultaneous faults occur, making root cause analysis difficult, and others. In embodiments, a multilayered feed forward neural network may be used to classify results from monitoring of a marketplace, such as monitoring systems, such as automated agents, that operate within the marketplace, as well as monitoring resources that enable the marketplace, such as computing, networking, energy, data storage, energy storage, and other resources.

In embodiments, methods and systems described herein that involve an expert system or self-organization capability may use a feed-forward, back-propagation multi-layer perceptron (MLP) neural network, such as for handling one or more remote sensing applications, such as for taking inputs from sensors distributed throughout various transactional environments. In embodiments, the MLP neural network may be used for classification of transactional environments and resource environments, such as lending markets, spot markets, forward markets, energy markets, renewable energy credit (REC) markets, networking markets, advertising markets, spectrum markets, ticketing markets, rewards markets, compute markets, and others mentioned throughout this disclosure, as well as physical resources and environments that produce them, such as energy resources (including renewable energy environments, mining environments, exploration environments, drilling environments, and the like, including classification of geological structures (including underground features and above ground features), classification of materials (including fluids, minerals, metals, and the like), and other problems. This may include fuzzy classification.

In embodiments, methods and systems described herein that involve an expert system or self-organization capability may use a structure-adaptive neural network, where the structure of a neural network is adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feed forward neural network to a recurrent neural network, such as by switching data paths between some subset of nodes from unidirectional to bi-directional data paths. The structure adaptation may occur under control of an expert system, such as to trigger adaptation upon occurrence of a trigger, rule or event, such as recognizing occurrence of a threshold (such as an absence of a convergence to a solution within a given amount of time) or recognizing a phenomenon as requiring different or additional structure (such as recognizing that a system is varying dynamically or in a non-linear fashion). In one non-limiting example, an expert system may switch from a simple neural network structure like a feed forward neural network to a more complex neural network structure like a recurrent neural network, a convolutional neural network, or the like upon receiving an indication that a continuously variable transmission is being used to drive a generator, turbine, or the like in a system being analyzed.

In embodiments, methods and systems described herein that involve an expert system or self-organization capability may use an autoencoder, autoassociator or Diabolo neural network, which may be similar to a multilayer perceptron (MLP) neural network, such as where there may be an input layer, an output layer and one or more hidden layers connecting them. However, the output layer in the auto-encoder may have the same number of units as the input layer, where the purpose of the MLP neural network is to reconstruct its own inputs (rather than just emitting a target value).

Therefore, the auto encoders may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of analog sensor data from a machine over one or more networks or of digital data from one or more data sources. In embodiments, an auto-encoding neural network may be used to self-learn an efficient storage approach for storage of streams of data.

In embodiments, methods and systems described herein that involve an expert system or self-organization capability may use a probabilistic neural network (PNN), which in embodiments may comprise a multi-layer (e.g., four-layer) feed forward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input is estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of an engine based on collection of data inputs from sensors and instruments for the engine.

In embodiments, methods and systems described herein that involve an expert system or self-organization capability may use a time delay neural network (TDNN), which may comprise a feed forward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, such as a stream of velocity data, a stream of acceleration data, a stream of temperature data, a stream of pressure data, and the like, where time delays are used to align the data streams in time, such as to help understand patterns that involve understanding of the various streams (e.g., changes in price patterns in spot or forward markets).

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses can be calculated mathematically, such as by a convolution operation, such as using multilayer perceptrons that use minimal preprocessing. A convolutional neural network may be used for recognition within images and video streams, such as for recognizing a type of machine in a large environment using a camera system disposed on a mobile data collector, such as on a drone or mobile robot. In embodiments, a convolutional neural network may be used to provide a recommendation based on data inputs, including sensor inputs and other contextual information, such as recommending a route for a mobile data collector. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) of parameters. A convolutional neural net may use one or more convolutional nets.

In embodiments, methods and systems described herein that involve an expert system or self-organization capability may use a regulatory feedback network, such as for recognizing emergent phenomena (such as new types of behavior not previously understood in a transactional environment).

In embodiments, methods and systems described herein that involve an expert system or self-organization capability may use a learning vector quantization neural net (LVQ). Prototypical representatives of the classes may parameterize, together with an appropriate distance measure, in a distance-based classification scheme.

In embodiments, methods and systems described herein that involve an expert system or self-organization capability may use an echo state network (ESN), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of events associated with a market, such as pattern of price changes in response to stimuli.

In embodiments, methods and systems described herein that involve an expert system or self-organization capability may use a Bi-directional, recurrent neural network (BRNN), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as ones provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in a transactional environment.

In embodiments, methods and systems described herein that involve an expert system or self-organization capability may use a stochastic neural network, which may introduce random variations into the network. Such random variations can be viewed as a form of statistical sampling, such as Monte Carlo sampling.

In embodiments, methods and systems described herein that involve an expert system or self-organization capability may use a genetic scale recurrent neural network. In such embodiments, a RNN (often a LSTM) is used where a series is decomposed into a number of scales where every scale informs the primary length between two consecutive points. A first order scale consists of a normal RL'JN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines (CoM), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network (ASNN), such as involving an extension of committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that can coincide with a training set. If new data become available, the network instantly improves its predictive ability and provides data approximation (self-learns) without retraining. Another important feature of ASNN is the possibility to interpret neural network results by analysis of correlations between data cases in the space of models.

In embodiments, methods and systems described herein that involve an expert system or self-organization capability may use an instantaneously trained neural network (ITNN), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs can process information in the time domain (e.g., signals that vary over time, such as signals involving dynamic behavior of markets or transactional environments). They are often implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of shifting market variables, such as prices, available quantities, available counterparties, and the like.

In embodiments, cascade correlation may be used as an architecture and supervised learning algorithm, supplementing adjustment of the weights in a network of fixed topology. Cascade-correlation may begin with a minimal network, then automatically trains and add new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy inference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network (CPPN), such as a variation of an associative neural network (ANN) that differs the set of activation functions and how they are applied. While typical ANNs often contain only sigmoid functions (and sometimes Gaussian functions), CPPNs can include both types of functions and many others. Furthermore, CPPNs may be applied across the entire space of possible inputs, so that they can represent a complete image. Since they are compositions of functions, CPPNs in effect encode images at infinite resolution and can be sampled for a particular display at whatever resolution is optimal.

This type of network can add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory (HTM) neural network, such as involving the structural and algorithmic properties of the neocortex. HTM may use a biomimetic model based on memory-prediction theory. HTM may be used to discover and infer the high-level causes of observed input patterns and sequences.

In embodiments, methods and systems described herein that involve an expert system or self-organization capability may use a holographic associative memory (HAM) neural network, which may comprise an analog, correlation-based, associative, stimulus-response system. Information may be mapped onto the phase orientation of complex numbers. The memory is effective for associative memory tasks, generalization and pattern recognition with changeable attention.

In embodiments, various embodiments involving network coding may be used to code transmission data among network nodes in neural net, such as where nodes are located in one or more data collectors or machines in a transactional environment.

In embodiments, provided herein is a system for adaptive intelligence and robotic process automation capabilities of a transactional, financial and marketplace enablement. An example platform or system may include a blockchain service circuit structured to interpret a plurality of access control features corresponding to a plurality of parties associated with a loan; a data collection circuit structured to interpret entity information corresponding to a plurality of entities related to a lending transaction corresponding to the loan; a smart contract circuit structured to specify loan terms and conditions relating to the loan; and a loan management circuit structured to: interpret loan related events in response to the entity information, the plurality of access control features, and the loan terms and conditions, wherein the loan related events are associated with the loan; implement loan related activities in response to the entity information, the plurality of access control features, and the loan terms and conditions, wherein the loan related activities are associated with the loan; and wherein each of the blockchain service circuit, the data collection circuit, the smart contract circuit, and the loan management circuit further comprise a corresponding application programming interface (API) component structured to facilitate communication among the circuits of the system.

Certain further aspects of an example system are described following, any one or more of which may be present in certain embodiments. An example system may include wherein the plurality of entities each comprise at least one entity selected from the entities consisting of: a lender, a borrower, a guarantor, equipment related to the loan, goods related to the loan, a system related to the loan, a fixture related to the loan, a building, a storage facility, and an item of collateral.

An example system may include at least one of the plurality of entities comprises an item of collateral, and wherein the data collection circuit is further structured to interpret a condition of the item of collateral, wherein the item of collateral comprises at least one item selected from the items consisting of: a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, and an item of personal property.

An example system may include wherein the data collection circuit further comprises at least one system selected from the systems consisting of: an Internet of Things system, a camera system, a networked monitoring system, an internet monitoring system, a mobile device system, a wearable device system, a user interface system, and an interactive crowdsourcing system.

An example system may include wherein the loan related events each comprise at least one event selected from the events consisting of: a loan request, a loan offer, a loan acceptance, a provision of underwriting information for a loan, a provision of a credit report, a deferral of a payment, a requested deferral of a payment, an identification of collateral, a validation of title for collateral, a validation of title for a security, an inspection of property, a change in condition for at least one of the plurality of entities, a change in value of an entity, a change in value for collateral, a change in value for a security, a change in a job status of at least one of the parties, a change in a financial rating of a lender, a provision of insurance for the loan, a provision of evidence of insurance for a property, a provision of eligibility for a loan, an identification of security for the loan, an execution of underwriting the loan, a payment of the loan, a default of the loan, a calling of the loan, a closing of the loan, a change in the specified loan terms and conditions, an initial specification of the loan terms and conditions, and a foreclosure of a property subject to the loan.

An example system may include wherein the loan terms and conditions each comprise at least one member selected from the group consisting of: a principal amount of the loan, a balance of the loan, a fixed interest rate, a variable interest rate description, a payment amount, a payment schedule, a balloon payment schedule, a collateral specification, a collateral substitution description, a description of at least one of the parties, a guarantee description, a guarantor description, a security description, a personal guarantee, a lien, a foreclosure condition, a default condition, a consequence of default, a covenant related to any one of the foregoing, and a duration of any one of the foregoing.

An example system may include wherein at least one of the parties comprises at least one party selected from the parties consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, a government agency, and an accountant.

An example system may include wherein loan related activities each comprise at least one activity selected from the activities consisting of: finding at least one of the parties interested in participating in a loan transaction, an application for the loan, underwriting the loan, forming a legal contract for the loan, monitoring performance of the loan, making payments on the loan, restructuring or amending the loan, settling the loan, monitoring collateral for the loan, forming a syndicate for the loan, foreclosing on the loan, and closing a loan transaction and wherein the loan comprises at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system may include wherein the smart contract circuit is further structured to perform a contract related loan action in response to the entity information.

An example system may include wherein the contract related loan action comprises at least one action selected from the actions consisting of: offering the loan, accepting the loan, underwriting the loan, setting an interest rate for the loan, deferring a payment requirement for the loan, modifying an interest rate for the loan, validating title for collateral of the loan, recording a change in title, assessing the value of collateral, initiating inspection of collateral, calling the loan, closing the loan, modifying the terms and conditions for the loan, providing a notice to one of the parties, providing a required notice to a borrower of the loan, and foreclosing on a property subject to the loan.

An example system may further include an automated agent circuit structured to interpret an event relevant to the loan, and to perform an action related to the loan in response to the event relevant to the loan, wherein the event relevant to the loan comprises an event relevant to at least one of: the value of the loan, a condition of collateral of the loan, or an ownership of collateral of the loan and wherein the action related to the loan comprises at least one of: modifying the terms and conditions for the loan, providing a notice to one of the parties, providing a required notice to a borrower of the loan, and foreclosing on a property subject to the loan.

An example system may include wherein the corresponding API components of the circuits further comprise user interfaces structured to interact with a plurality of users of the system.

An example system may include wherein the plurality of users each comprise one of the plurality of parties or one of the plurality of entities and wherein at least one of the plurality of users comprises one of a prospective party or a prospective entity.

An example system may include wherein each of the user interfaces is configured to be responsive to the plurality of access control features.

In embodiments, provided herein is a method for providing access control for loan terms and conditions on a distributed ledger. An example method may include interpreting a plurality of access control features corresponding to a plurality of parties associated with a loan from a distributed ledger; interpreting entity information corresponding to a plurality of entities related to a lending transaction corresponding to the loan; specifying loan terms and conditions relating to the loan; interpreting loan related events in response to the entity information, the plurality of access control features, and the loan terms and conditions, wherein the loan related events are associated with the loan.

Certain further aspects of an example system are described following, any one or more of which may be present in certain embodiments. An example method can include wherein at least one of the plurality of entities comprises an item of collateral, the method further comprising interpreting a condition of the item of collateral.

An example method can further include performing a contract related loan action in response to the entity information.

An example method can include wherein performing the contract related loan action comprises at least one action selected from the actions consisting of: offering the loan, accepting the loan, underwriting the loan, setting an interest rate for the loan, deferring a payment requirement for the loan, modifying an interest rate for the loan, validating title for collateral of the loan, recording a change in title, assessing the value of collateral, initiating inspection of collateral, calling the loan, closing the loan, modifying the terms and conditions for the loan, providing a notice to one of the parties, providing a required notice to a borrower of the loan, and foreclosing on a property subject to the loan.

An example method can further include interpreting an event relevant to the loan, and performing an action related to the loan in response to the event relevant to the loan, wherein the event relevant to the loan comprises an event relevant to at least one of: the value of the loan, a condition of collateral of the loan, or an ownership of collateral of the loan and wherein performing the action related to the loan comprises at least one of: modifying the terms and conditions for the loan, providing a notice to one of the parties, providing a required notice to a borrower of the loan, and foreclosing on a property subject to the loan.

An example method can further include providing a user interface to a user, wherein the user comprises at least one of: one of the plurality of parties, one of the plurality of entities, a prospective party, or a prospective entity, wherein the providing the user interface is further responsive to the plurality of access control features.

An example method can further include creating a smart lending contract for the loan and recording the smart lending contract as blockchain data.

In embodiments, provided herein is a system for adaptive intelligence and robotic process automation capabilities of a transactional, financial and marketplace enablement. An example platform or system may include a blockchain service circuit structured to interpret a plurality of access control features corresponding to a plurality of parties associated with a secured loan, and a data collection circuit structured to receive first collateral data from at least one sensor associated with an item of collateral used to secure the loan, receive second collateral data regarding an environment of the item of collateral from an Internet of Things circuit, and associate the collateral data with a unique identifier associated with the item of collateral, wherein the blockchain service circuit is further structured to store the unique identifier and associated collateral data as blockchain data. The example platform or system may further include a smart contract circuit structured to create a smart lending contract, and a secure access control circuit structured to receive access control instructions from a lender of the secured loan via an access control interface, wherein the secure access control circuit is further structured to provide instructions to the blockchain service circuit regarding access to the blockchain data associated with the item of collateral, wherein each of the blockchain service circuit, the data collection circuit, the secure access control circuit, and the Internet of Things circuit further comprise a corresponding application programming interface (API) component structured to facilitate communication among the circuits of the system.

Certain further aspects of an example system are described following, any one or more of which may be present in certain embodiments. An example system may include wherein the sensor associated with the item of collateral is positioned on in a location selected from the list consisting of on the item of collateral, on a container for the item of collateral, and on a package of the item of collateral.

An example system may include wherein the data collection circuit is further structured to interpret a condition of the item of collateral in response to a subset of the received collateral data.

An example system may include wherein the item of collateral is selected from among the list of items consisting of: a vehicle, a ship, a plane, a building, a home, a real estate property, an undeveloped land property, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, a tool, an item of machinery, and an item of personal property.

An example system may include wherein the secured loan is at least one of an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system may include wherein the environment of the item of collateral is selected from, the list of environments consisting of a real property environment, a commercial facility, a warehousing facility, a transportation environment, a manufacturing environment, a storage environment, a home, and a vehicle.

An example system may include wherein the at least one sensor is selected from the group consisting of an image capture device, a thermometer, a pressure gauge, a humidity sensor, a velocity sensor, an acceleration sensor, a rotational sensor, a torque sensor, a scale, chemical, magnetic field, electrical field, and position sensors.

An example system may further include a reporting circuit structured to report a collateral event related to an aspect of the collateral selected from the list of aspects consisting of: a value of the item of collateral, a condition of the item of collateral, and an ownership of the item of collateral.

An example system may further include an automated agent circuit structured to interpret the collateral event and to perform a loan-related action in response to the collateral event.

An example system may include wherein the loan-related action is selected from among the actions consisting of: offering a loan, accepting a loan, underwriting a loan, setting an interest rate for a loan, deferring a payment requirement, modifying an interest rate for a loan, validating title for collateral, recording a change in title, assessing the value of collateral, initiating inspection of collateral, calling a loan, closing a loan, setting terms and conditions for a loan, providing notices required to be provided to a borrower, foreclosing on property subject to a loan, and modifying terms and conditions for a loan.

An example system may further include a collateral classification circuit structured to identify a group of off-set items of collateral, wherein each member of the group of off-set items of collateral and the item of collateral share a common attribute.

An example system may include wherein the common attribute is selected from a list of attributes consisting of: a category of the item of collateral, an age of the item of collateral, a condition of the item of collateral, a history of the item of collateral, an ownership of the item of collateral, a caretaker of the item of collateral, a security of the item of collateral, a condition of an owner of the item of collateral, a lien on the item of collateral, a storage condition of the item of collateral, a geolocation of the item of collateral, and a jurisdictional location of the item of collateral.

An example system may further include a market value data collection circuit structured to monitor and report on marketplace information relevant to a value of the item of collateral or at least one of the group of off-set items of collateral.

An example system may include wherein the market value data collection circuit is further structured to monitor a price or financial data the item of collateral or at least one of the group of off-set items of collateral in at least one public marketplace.

An example system may include wherein the market value data collection circuit is further structured to report the monitored one of the price or the financial data.

An example system may include wherein the smart contract circuit is further structured to modify a term or condition of the loan based on the marketplace information for off-set items of collateral relevant to the value of the item of collateral.

An example system may further include a smart contract services circuit structured to manage a smart contract for the secured loan.

An example system may include wherein the smart contract services circuit is further structured to set terms and conditions related to the item of collateral securing the loan.

An example system may include wherein the terms and conditions are selected from a list consisting of: a specification of the item of collateral, a specification of substitutability of the item of collateral, a specification of condition of the item of collateral, a specification related to liens on the item of collateral, a specification related to the security of the item of collateral, and a specification related to the environment of the item of collateral.

In embodiments, provided herein is a smart contract method for managing collateral for a loan. An example method may include monitoring a status of a loan and of a collateral for the loan; processing information from the monitoring and automatically initiating at least one of a substitution, a removal, or an addition of one or more items from the collateral for the loan based on the at least one of the status of the loan or the collateral for the loan; and interpreting a plurality of access control features corresponding to at least one party associated with the loan and recording the at least one substitution, removal, or addition in a distributed ledger for the loan.

Certain further aspects of an example method are described following, any one or more of which may be present in certain embodiments.

An example method may include wherein the status of the loan is determined based on a status of at least one of an entity related to the loan or a state of a performance of a condition for the loan.

An example method may include determining a value with a valuation model for a set of collateral based on at least one of the status of the loan or the collateral for the loan.

An example method may include wherein the at least one substitution, removal, or addition is initiated to maintain a value of the collateral within a predetermined range.

An example method may include interpreting outcome data relating to a transaction of one of the collateral or an offset collateral and iteratively improving the valuation model in response to the outcome data.

An example method may include monitoring and reporting on marketplace information relevant to a value of the collateral.

An example method may include monitoring at least one of pricing data or financial data for an offset collateral item in at least one public marketplace.

An example method may include specifying terms and conditions of a smart contract that governs at least one of terms and conditions for the loan, a loan-related event, or a loan-related activity.

An example apparatus may include a data collection circuit structured to monitor at least one of a status of a loan or a status of a collateral for the loan; a smart contract circuit structured interpret a smart contract for the loan, and to adjust at least one term or condition of the smart contract for the loan in response to the at least one of the status of the loan or the status of the collateral for the loan; and a blockchain service circuit structured to interpret a plurality of access control features corresponding to a plurality of parties associated with the loan and record the adjusted at least one term or condition of the smart contract for the loan in a distributed ledger for the loan. The data collection circuit may monitor the status of the collateral for the loan, the apparatus further including a valuation circuit structured use a valuation model to determine a value for the collateral based on the status of the collateral for the loan, and wherein the smart contract circuit is further structured to adjust at least one term or condition of the smart contract for the loan in response to the value for the collateral.

In embodiments, provided herein is a crowdsourcing system for validating conditions of collateral for a loan. An example platform, system, or apparatus may include a crowdsourcing request circuit structured to configure at least one parameter of a crowdsourcing request related to obtaining information on a condition of a collateral for a loan; a crowdsourcing publishing circuit configured to publish the crowdsourcing request to a group of information suppliers; and a crowdsourcing communications circuit structured to collect and process at least one response from the group of information suppliers, and to provide a reward to at least one of the group of information suppliers in response to a successful information supply event. A successful information supply event may be the receipt of information identified to relate to a collateral that is the subject of the crowdsourcing request and wherein the information relates to a condition of the collateral. Information regarding identifying features of the collateral, such as a serial number or a model number, may not be a successful information supply event.

Certain further aspects of an example system are described following, any one or more of which may be present in certain embodiments. An example system may include wherein the crowdsourcing publishing circuit is further configured to publish a reward description to at least a portion of the group of information suppliers in response to the successful information supply event. The reward description may include a kind or type of reward, a value of the reward, an amount of the reward, information regarding valid dates of use of the reward or information for using the reward, and the like.

An example system may include wherein the crowdsourcing communications circuit further includes or is in communication with a smart contract circuit structured to manage the reward by determining the successful information supply event in response to the at least one parameter configured for the crowdsourcing request, and to automatically allocate the reward to the at least one of the group of information suppliers in response to the successful information supply event.

An example system may include wherein the loan comprises at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system may include wherein the collateral comprises at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system may include wherein the condition of collateral is determined based on an attribute selected from the attributes consisting of: a quality of the collateral, a condition of the collateral, a status of a title to the collateral, a status of a possession of the collateral, and a status of a lien on the collateral.

An example system may include wherein the condition of the collateral, wherein the collateral is an item, is determined based on an attribute selected from the attributes consisting of: a new or used status of the item, a type of the item, a category of the item, a specification of the item, a product feature set of the item, a model of the item, a brand of the item, a manufacturer of the item, a status of the item, a context of the item, a state of the item, a value of the item, a storage location of the item, a geolocation of the item, an age of the item, a maintenance history of the item, a usage history of the item, an accident history of the item, a fault history of the item, an ownership of the item, an ownership history of the item, a price of a type of the item, a value of a type of the item, an assessment of the item, and a valuation of the item.

An example system may further include a blockchain service circuit structured to record identifying information and the at least one parameter of the crowdsourcing request, the at least one response to the crowdsourcing request, and a reward description in a distributed ledger for the crowdsourcing request.

An example system may include wherein the crowdsourcing request circuit is further structured to enable a workflow by which a human user enters the at least one parameter to establish the crowdsourcing request.

An example system may include wherein the at least one parameter comprises a type of requested information, a reward description, and a condition for receiving the reward.

An example system may include wherein the reward is selected from selected from the rewards consisting of: a financial reward, a token, a ticket, a contractual right, a cryptocurrency amount, a plurality of reward points, a currency amount, a discount on a product or service, and an access right.

An example system may further include a smart contract circuit structured to process the at least one response and, in response, automatically undertake an action related to the loan.

An example system may include wherein the action is at least one of a foreclosure action, a lien administration action, an interest-rate setting action, a default initiation action, a substitution of collateral, or a calling of the loan.

An example system may further include a robotic process automation circuit structured to, based on training on a training data set comprising human user interactions with at least one of the crowdsourcing request circuit or the crowdsourcing communications circuit, configure the crowdsourcing request based on at least one attribute of the loan.

An example system may include wherein the at least one attribute of the loan is obtained from a smart contract circuit that manages the loan.

An example system may include wherein the training data set further comprises outcomes from a plurality of crowdsourcing requests.

An example system may include wherein the robotic process automation circuit is further structured to determine the reward.

An example system may include wherein the robotic process automation circuit is further structured to determine at least one domain to which the crowdsourcing publishing circuit publishes the crowdsourcing request.

In embodiments, provided herein is a crowdsourcing method for validating conditions of collateral for a loan. An example method may include configuring at least one parameter of a crowdsourcing request related to obtaining information on a condition of a collateral for a loan; publishing the crowdsourcing request to a group of information suppliers; collecting and processing at least one response to the crowdsourcing request; and providing a reward in response to a successful information supply event.

Certain further aspects of an example method are described following, any one or more of which may be present in certain embodiments.

An example method may further include publishing a reward description to at least a portion of the group of information suppliers in response to the successful information supply event.

An example method may further include wherein the reward is automatically allocated to at least one of the group of information suppliers in response to the successful information supply event.

An example method may further include recording identifying information and the at least one parameter of the crowdsourcing request, the at least one response to the crowdsourcing request, and a reward description, in a distributed ledger for the crowdsourcing request.

An example method may further include configuring a graphical user interface to enable a workflow by which a human user enters the at least one parameter to establish the crowdsourcing request.

An example method may further include automatically undertaking an action related to the loan in response to the successful information supply event.

An example method may further include training a robotic process automation circuit on a training data set comprising a plurality of outcomes corresponding to a plurality of the crowdsourcing requests, and operating the robotic process automation circuit to iteratively improve the crowdsourcing request.

An example method may further include providing at least one attribute of the loan to the robotic process automation circuit to configure the crowdsourcing request.

An example method may further include configuring the crowdsourcing request comprises determining the reward.

An example method may further include inputting at least one attribute of the loan to the robotic process automation circuit to determine at least one domain to which to publish the crowdsourcing request.

An example apparatus may include a crowdsourcing request circuit structured to provide an interface to enable configuration of at least one parameter of a crowdsourcing request related to obtaining information on a condition of a collateral for a loan; a crowdsourcing publishing circuit configured to publish the crowdsourcing request to a group of information suppliers in response to the crowdsourcing request; and a crowdsourcing communications circuit structured to provide an interface to collect at least one response to the crowdsourcing request from members of the group of information suppliers, and to provide a reward to at least one of the group of information suppliers in response to a successful information supply event.

The apparatus may further include a smart contract circuit structured to manage the reward by determining the successful information supply event in response to the at least one parameter configured for the crowdsourcing request, and to automatically allocate the reward to the at least one of the group of information suppliers in response to the successful information supply event.

In embodiments, provided herein is a crowdsourcing system for validating conditions of a guarantor for a loan. An example platform, system, or apparatus may include a crowdsourcing request circuit structured to configure at least one parameter of a crowdsourcing request related to obtaining information on a condition of a guarantor for a loan; a crowdsourcing publishing circuit configured to publish the crowdsourcing request to a group of information suppliers; and a crowdsourcing communications circuit structured to collect and process at least one response from the group of information suppliers, and to provide a reward to at least one of the group of information suppliers in response to a successful information supply event.

Certain further aspects of an example system are described following, any one or more of which may be present in certain embodiments. An example system may include wherein the condition is a financial condition of an entity that is the guarantor for the loan. An example system may include wherein the financial condition is determined at least in part based on information about the entity selected from the information consisting of: a publicly stated valuation of the entity, a property owned by the entity as indicated by a public record, a valuation of a property owned by the entity, a bankruptcy condition of the entity, a foreclosure status of the entity, a contractual default status of the entity, a regulatory violation status of the entity, a criminal status of the entity, an export controls status of the entity, an embargo status of the entity, a tariff status of the entity, a tax status of the entity, a credit report of the entity, a credit rating of the entity, a website rating of the entity, a plurality of customer reviews for a product of the entity, a social network rating of the entity, a plurality of credentials of the entity, a plurality of referrals of the entity, a plurality of testimonials for the entity, a plurality of behaviors of the entity, a location of the entity, a geolocation of the entity, and a jurisdiction of the entity.

The crowdsourcing communications circuit may further include a smart contract circuit structured to manage the reward by determining the successful information supply event in response to the at least one parameter configured for the crowdsourcing request, and to automatically allocate the reward to the at least one of the group of information suppliers in response to the successful information supply event.

An example system may include wherein the loan comprises at least one loan type selected from the loan types consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, and a subsidized loan.

An example system may include wherein the crowdsourcing request circuit is further structured to configure at least one further parameter of the crowdsourcing request to obtain information on a condition of a collateral for the loan.

An example system may include wherein the collateral comprises at least one item selected from the items consisting of: a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, an item of intellectual property, an intellectual property right, a contractual right, an antique, a fixture, an item of furniture, an item of equipment, a tool, an item of machinery, and an item of personal property.

An example system may include wherein the condition of the collateral, wherein the collateral is an item, and wherein the condition of the collateral is determined based on an attribute selected from the attributes consisting of: a new or used status of the item, a type of the item, a category of the item, a specification of the item, a product feature set of the item, a model of the item, a brand of the item, a manufacturer of the item, a status of the item, a context of the item, a state of the item, a value of the item, a storage location of the item, a geolocation of the item, an age of the item, a maintenance history of the item, a usage history of the item, an accident history of the item, a fault history of the item, an ownership of the item, an ownership history of the item, a price of a type of the item, a value of a type of the item, an assessment of the item, and a valuation of the item.

An example system may further include a blockchain service circuit structured to record identifying information and the at least one parameter of the crowdsourcing request, the at least one response to the crowdsourcing request, and a reward description in a distributed ledger for the crowdsourcing request.

An example system may include wherein the crowdsourcing request circuit is further structured to enable a workflow by which a human user enters the at least one parameter to establish the crowdsourcing request.

An example system may include wherein the at least one parameter comprises a type of requested information, a reward description, and a condition for receiving the reward.

An example system may include wherein the reward is selected from selected from the rewards consisting of: a financial reward, a token, a ticket, a contractual right, a cryptocurrency amount, a plurality of reward points, a currency amount, a discount on a product or service, and an access right.

An example system may further include a smart contract circuit structured to process the at least one response and, in response, automatically undertake an action related to the loan.

An example system may include a smart contract circuit structured to process the at least one response and, in response, automatically undertake an action related to the loan, wherein the action is at least one of a foreclosure action, a lien administration action, an interest-rate setting action, a default initiation action, a substitution of collateral, and a calling of the loan.

An example system may further include a robotic process automation circuit structured to, based on training on a training data set comprising human user interactions with at least one of the crowdsourcing request circuit or the crowdsourcing communications circuit, to configure a crowdsourcing request based on at least one attribute of a loan.

An example system may include wherein the at least one attribute of the loan is obtained from a smart contract circuit that manages the loan An example system may include wherein the training data set further comprises outcomes from a plurality of crowdsourcing requests.

An example system may include wherein the robotic process automation circuit is further structured to determine a reward.

An example system may include wherein the robotic process automation circuit is further structured to determine at least one domain to which the crowdsourcing publishing circuit publishes the crowdsourcing request.

In embodiments, provided herein is a crowdsourcing method for validating conditions of collateral for a loan. An example method may include configuring at least one parameter of a crowdsourcing request related to obtaining information on a condition of a guarantor for a loan; publishing the crowdsourcing request to a group of information suppliers; collecting and processing at least one response to the crowdsourcing request; and providing a reward to at least one supplier of the group of information suppliers in response to a successful information supply event.

Certain further aspects of an example method are described following, any one or more of which may be present in certain embodiments. An example method may further include publishing a reward description to at least a portion of the group of information suppliers in response to the successful information supply event.

An example method may further include wherein the reward is automatically allocated to at least one of the group of information suppliers in response to the successful information supply event.

An example method may further include recording identifying information and the at least one parameter of the crowdsourcing request, the at least one response to the crowdsourcing request, and a reward description, in a distributed ledger for the crowdsourcing request.

An example method may further include configuring a graphical user interface to enable a workflow by which a human user enters the at least one parameter to establish the crowdsourcing request.

An example method may further include automatically undertaking an action related to the loan in response to the successful information supply event.

An example method may further include training a robotic process automation circuit on a training data set comprising a plurality of outcomes corresponding to a plurality of the crowdsourcing requests, and operating the robotic process automation circuit to iteratively improve the crowdsourcing request.

An example method may further include providing at least one attribute of the loan to the robotic process automation circuit in order to configure the crowdsourcing request.

An example method may further include configuring the crowdsourcing request comprises determining the reward.

An example method may further include inputting at least one attribute of the loan to the robotic process automation circuit to determine at least one domain to which to publish the crowdsourcing request.

In embodiments, provided herein is a method for adaptive intelligence and robotic process automation capabilities of a transactional, financial and marketplace enablement. An example method may include collecting information about entities involved in a set of factoring loans and a training set of interactions between entities for a set of factoring loan transactions; classifying the entities involved in the set of factoring loans based at least in part on the training set of interactions; and managing a factoring loan based at least in part on the set of factoring loan interactions.

Certain further aspects of an example system are described following, any one or more of which may be present in certain embodiments. An example method may further include that at least one managing the factoring loan includes managing selected from a group consisting of: managing at least one of a set of assets for factoring, identification of loans for factoring from a set of candidate loans, preparation of a factoring offer, preparation of a factoring plan, preparation of content communicating a factoring offer, scheduling a factoring offer, communicating a factoring offer, negotiating a modification of a factoring offer, preparing a factoring agreement, executing a factoring agreement, modifying collateral for a set of factoring loans, handing transfer of a set of accounts receivable, handling an application workflow for factoring, managing an inspection, managing an assessment of a set of assets to be factored, setting an interest rate, deferring a payment requirement, setting a payment schedule, or dosing a factoring agreement.

An example method may further include that at least one entity of the entities is a party to at least one factoring loan transactions of the set of factoring loan transactions.

An example method may include that the party is at least one party selected from a group consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, or an accountant.

An example method may further include determining completion of a negotiation of the factoring loan; and modifying a smart factoring loan contract based on an outcome of the negotiation.

An example method may further include determining at least one of an outcome and a negotiation event associated with the negotiation of the factoring loan; and recording, in a distributed ledger associated with the factoring loan, at least one of the outcome and the negotiation event associated with the factoring loan.

In embodiments, provided herein is a system for adaptive intelligence and robotic process automation capabilities of a transactional, financial and marketplace enablement.

An example apparatus or system may include a data collection circuit structured to collect information about entities involved in a set of mortgage loan activities and a training set of interactions between entities for a set of mortgage loan transactions. The apparatus or system may further include an artificial intelligence circuit structured to classify the entities involved in the set of mortgage loan activities, wherein the artificial intelligence circuit is trained on the training set of interactions; and a robotic process automation circuit is structured broker a mortgage loan, wherein the robotic process automation circuit is trained on at least one of the set of mortgage loan activities and the training set of interactions.

Certain further aspects of an example system or apparatus are described following, any one or more of which may be present in certain embodiments. An example apparatus or system may include wherein at least one of the set of mortgage loan activities and the set of mortgage loan transactions includes activities selected from a group consisting of: among marketing activity, identification of a set of prospective borrowers, identification of property, identification of collateral, qualification of borrower, title search, title verification, property assessment, property inspection, property valuation, income verification, borrower demographic analysis, identification of capital providers, determination of available interest rates, determination of available payment terms and conditions, analysis of existing mortgage, comparative analysis of existing and new mortgage terms, completion of application workflow, population of fields of application, preparation of mortgage agreement, completion of schedule to mortgage agreement, negotiation of mortgage terms and conditions with capital provider, negotiation of mortgage terms and conditions with borrower, transfer of title, placement of lien, or closing of mortgage agreement.

An example apparatus or system may include wherein the data collection circuit comprises at least one system selected from systems consisting of: Internet of Things systems that monitor the entities, a set of cameras that monitor the entities, a set of software services that pull information related to the entities from publicly available information sites, a set of mobile devices that report on information related to the entities, a set of wearable devices worn by human entities, a set of user interfaces by which entities provide information about the entities and a set of crowdsourcing services configured to solicit and report information related to the entities.

An example apparatus or system may include wherein the artificial intelligence circuit is further structured to use a model that processes attributes of entities involved in the set of mortgage loan activities; and wherein at least one attribute selected from a group consisting of: properties that are subject to mortgages, assets used for collateral, identity of a party, interest rate, payment balance, payment terms, payment schedule, type of mortgage, type of property, financial condition of party, payment status, condition of property, or value of property.

An example apparatus or system may include wherein brokering the mortgage loan comprises at least one activity selected from a group consisting of: managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, or closing a mortgage agreement.

An example apparatus or system may include wherein at least one entity of the entities is a party to at least one mortgage loan transactions of the set of mortgage loan transactions.

An example apparatus or system may include wherein the party is at least one party selected from parties consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, and an accountant.

An example apparatus or system may include wherein the artificial intelligence circuit comprises at least one system selected from systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

An example apparatus or system may further include an interface circuit structured to receive interactions from at least one of the entities and wherein the robotic process automation circuit is further trained on the interactions.

An example apparatus or system may further include a smart contract circuit structured to determine completion of a negotiation of the mortgage loan; and modify a smart factoring loan contract based on an outcome of the negotiation.

An example apparatus or system may further include a distributed ledger circuit structured to determine at least one of an outcome and a negotiation event associated with the negotiation of the mortgage loan; and record, in a distributed ledger associated with the mortgage loan, at least one of the outcome and the negotiation event associated with the mortgage loan.

In embodiments, provided herein is a method for adaptive intelligence and robotic process automation capabilities of a transactional, financial and marketplace enablement. An example method may include collecting information about entities involved in a set of mortgage loan activities and a training set of interactions between entities for a set of mortgage loan transactions; classifying the entities involved in the set of mortgage loan activities based at least in part on the training set of interactions; and brokering a mortgage loan based at least in part on at least one of the set of mortgage loan activities and the training set of interactions.

Certain further aspects of an example system are described following, any one or more of which may be present in certain embodiments. An example method may further include classifying the entities involved in the set of mortgage loan activities is based on a model that processes attributes of entities involved in the set of mortgage loan activities; and wherein at least one attribute selected from a group consisting of: properties that are subject to mortgages, assets used for collateral, identity of a party, interest rate, payment balance, payment terms, payment schedule, type of mortgage, type of property, financial condition of party, payment status, condition of property, or value of property.

An example method may further include that at least one brokering the mortgage loan includes an activity selected from a group consisting of: managing at least one of a property that is subject to a mortgage, identification of candidate mortgages from a set of borrower situations, preparation of a mortgage offer, preparation of content communicating a mortgage offer, scheduling a mortgage offer, communicating a mortgage offer, negotiating a modification of a mortgage offer, preparing a mortgage agreement, executing a mortgage agreement, modifying collateral for a set of mortgage loans, handing transfer of a lien, handling an application workflow, managing an inspection, managing an assessment of a set of assets to be subject to a mortgage, setting an interest rate, deferring a payment requirement, setting a payment schedule, or closing a mortgage agreement.

An example method may include that the at least one entity of the entities is a party to at least one mortgage loan transactions of the set of mortgage loan transactions.

An example method may include that the party is at least one party selected from a group consisting of: a primary lender, a secondary lender, a lending syndicate, a corporate lender, a government lender, a bank lender, a secured lender, bond issuer, a bond purchaser, an unsecured lender, a guarantor, a provider of security, a borrower, a debtor, an underwriter, an inspector, an assessor, an auditor, a valuation professional, a government official, or an accountant An example method may further include determining completion of a negotiation of the mortgage loan; and modifying a smart factoring loan contract based on an outcome of the negotiation.

An example method may further include determining at least one of an outcome and a negotiation event associated with the negotiation of the mortgage loan; and recording, in a distributed ledger associated with the mortgage loan, at least one of the outcome and the negotiation event associated with the mortgage loan.

In embodiments, provided herein is a system for adaptive intelligence and robotic process automation capabilities of a transactional, financial and marketplace enablement.

An example system may include a data collection circuit structured to collect information about entities involved in a set of debt transactions, training data set of outcomes related to the entities, and a training set of debt management activities. The system may further include a condition classifying circuit structured to classify a condition of at least one entity of the entities, wherein the condition classifying circuit comprises a model and a set of artificial intelligence circuits, and wherein the model is trained using the training data set of outcomes related to the entities; and an automated debt management circuit structured to manage an action related to a debt, wherein the automated debt management circuit is trained on the training set of debt management activities.

Certain further aspects of an example system are described following, any one or more of which may be present in certain embodiments. An example system may include wherein the data collection circuit comprises at least one system selected from a group consisting of: Internet of Things devices, a set of environmental condition sensors, a set of crowdsourcing services, a set of social network analytic services, or a set of algorithms for querying network domains.

An example system may include wherein at least one debt transaction of the set of debt transactions is selected from a group consisting of: an auto loan, an inventory loan, a capital equipment loan, a bond for performance, a capital improvement loan, a building loan, a loan backed by an account receivable, an invoice finance arrangement, a factoring arrangement, a pay day loan, a refund anticipation loan, a student loan, a syndicated loan, a title loan, a home loan, a venture debt loan, a loan of intellectual property, a loan of a contractual claim, a working capital loan, a small business loan, a farm loan, a municipal bond, or a subsidized loan.

An example system may include wherein the entities involved in the set of debt transactions include at least one of set of parties and a set of assets.

An example system may include wherein at least one asset from the set of assets includes an asset selected from a group consisting of: municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property.

An example system may further include a set of sensors positioned on at least one asset from the set of assets, on a container for least one asset from the set of assets, and on a package for at least one asset from the set of assets, wherein the set of sensors configured to associate sensor information sensed by the set of sensors with a unique identifier for the at least one asset from the set of assets; and a set of block chain circuits structured to receive information from the data collection circuit and the set of sensors and storing the information in a blockchain, wherein access to the blockchain is provided via a secure access control interface circuit for a party for a debt transaction involving the at least one asset from the set of assets.

An example system may include wherein at least one sensor from the set of sensors is selected from a group consisting of: image, temperature, pressure, humidity, velocity, acceleration, rotational, torque, weight, chemical, magnetic field, electrical field, or position sensors.

An example system may include an automated agent circuit structured to process events relevant to at least one of a value, a condition, and an ownership of at least one asset of the set of assets and further structured to undertake a set of actions related to a debt transaction to which the asset is related.

An example system may further include wherein at least one action of the set of actions is selected from a group consisting of: offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

An example system may further include wherein at least one artificial intelligence circuit from the set of artificial intelligence circuits includes at least one system selected from a group consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

An example system may further include an interface circuit structured to receive interactions from at least one of the entities and wherein the automated debt management circuit is further trained on the interactions.

An example system may further include wherein at least one debt management activity from the training set of debt management activities includes activities selected from a group consisting of: offering a debt transaction, underwriting a debt transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

An example system may further include a market value data collection circuit structured to monitor and report marketplace information relevant to a value of a of at least one asset of a set of assets.

An example system may further include wherein at least one asset from the set of assets is selected from group consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property.

An example system may further include wherein the market value data collection circuit is further structured to monitor at least one pricing and financial data for items that are similar to at least one asset in the set of assets in at least one public marketplace.

An example system may further include wherein a set of similar items for valuing at least one asset from the set of assets is constructed using a similarity clustering algorithm based on attributes of the assets.

An example system may further include wherein at least one attribute of the attributes of the assets is selected from a group consisting of: a category of assets, asset age, asset condition, asset history, asset storage, or geolocation of assets.

An example system may further include a smart contract circuit structured to manage a smart contract for a debt transaction.

An example system may further include wherein the smart contract circuit is further structured to establish a set of terms and conditions for the debt transaction.

An example system may further include wherein at least one of the terms and conditions of the set of terms and conditions for the debt transaction is selected from a group consisting of: a principal amount of debt, a balance of debt, a fixed interest rate, a variable interest rate, a payment amount, a payment schedule, a balloon payment schedule, a specification of collateral, a specification of substitutability of collateral, a party, a guarantee, a guarantor, a security, a personal guarantee, a lien, a duration, a covenant, a foreclose condition, a default condition, or a consequence of default.

In embodiments, provided herein is a method for adaptive intelligence and robotic process automation capabilities of a transactional, financial and marketplace enablement. An example method may include collecting information about entities involved in a set of debt transactions, training data set of outcomes related to the entities, and a training set of debt management activities; classifying a condition of at least one entity of the entities based at least in part the training data set of outcomes related to the entities; and managing an action related to a debt based at least in part on the training set of debt management activities.

Certain further aspects of an example system are described following, any one or more of which may be present in certain embodiments. An example method may further include that the entities involved in the set of debt transactions include a set of parties and a set of assets.

An example method may further include receiving information from a set of sensors positioned on at least one asset, wherein the set of sensors configured to associate sensor information sensed by the set of sensors with a unique identifier for the at least one asset from the set of assets, and wherein the set of sensors is positioned on at least one asset from the set of assets, on a container for least one asset from the set of assets, and on a package for at least one asset from the set of assets; and storing the information in a blockchain, wherein access to the blockchain is provided via a secure access control interface for a party for a debt transaction involving the at least one asset from the set of assets.

An example method may include processing events relevant to at least one of a value, a condition, and an ownership of at least one asset of the set of assets; and processing a set of actions related to a debt transaction to which the asset is related.

An example method may include receiving interactions from at least one of the entities.

An example method may further include monitoring and reporting marketplace information relevant to a value of a of at least one asset of a set of assets.

An example method may further include that monitoring further comprises monitoring at least one pricing and financial data for items that are similar to at least one asset in the set of assets in at least one public marketplace.

An example method may further include constructing using a similarity clustering algorithm based on attributes of the assets a set of similar items for valuing at least one asset from the set of assets.

An example method may further include managing a smart contract for a debt transaction.

An example method may further include establishing a set of terms and conditions for the smart contract for the debt transaction.

In embodiments, provided herein is a system for adaptive intelligence and robotic process automation capabilities of a transactional, financial and marketplace enablement.

An example system may include a crowdsourcing data collection circuit structured to collect information about entities involved in a set of bond transactions and a training data set of outcomes related to the entities. The system may further include a condition classifying circuit structured to classify a condition of a set of issuers using the information from the crowdsourcing data collection circuit and a model, wherein the model is trained using the training data set of outcomes related to the set of issuers.

Certain further aspects of an example system are described following, any one or more of which may be present in certain embodiments. An example system may include wherein at least one entity from the entities is selected from a group consisting of: a set of entities includes entities among a set of issuers, a set of bonds, a set of parties, or a set of assets.

An example system may include wherein at least one issuer from the set of issuers is selected from a group consisting of: a municipality, a corporation, a contractor, a government entity, a non-governmental entity, or a non-profit entity.

An example system may include wherein at least one bond from the set of bonds is selected from a group consisting of: a municipal bond, a government bond, a treasury bond, an asset-backed bond, or a corporate bond.

An example system may include wherein the condition classified by the condition classifying circuit is selected from a group consisting of: a default condition, a foreclosure condition, a condition indicating violation of a covenant, a financial risk condition, a behavioral risk condition, a policy risk condition, a financial health condition, a physical defect condition, a physical health condition, an entity risk condition, or an entity health condition.

An example system may include wherein the crowdsourcing data collection circuit is structured to enable a user interface by which a user may configure a crowdsourcing request for information relevant to the condition about the set of issuers.

An example system may further include a configurable data collection and monitoring circuit structured to monitor at least one issuer from the set of issuers, wherein the configurable data collection and monitoring circuit includes a system selected from a group consisting of: Internet of Things devices, a set of environmental condition sensors, a set of social network analytic services, or a set of algorithms for querying network domains.

An example system may include wherein the configurable data collection and monitoring circuit is structured to monitor an at least one environment selected from the group consisting of: a municipal environment, a corporate environment, a securities trading environment, a real property environment, a commercial facility, a warehousing facility, a transportation environment, a manufacturing environment, a storage environment, a home, or a vehicle.

An example system may include wherein a set of bonds associated with the set of bond transactions is backed by a set of assets.

An example system may include wherein at least one asset from the set of assets includes assets selected from the group consisting of: municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property.

An example system may include an automated agent circuit structured to processes events relevant to at least one of a value, a condition, and an ownership of at least one asset of the set of assets, and wherein the automated agent circuit is further structured to perform an action related to a debt transaction to which the asset is related.

An example system may include wherein the action is selected from a group consisting of: offering a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

An example system may include wherein the condition classifying circuit includes a system selected from a group consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, or a simulation system.

An example system may further include an automated bond management circuit configured to manage an action related to the bond, wherein the automated bond management circuit is trained on a training set of bond management activities.

An example system may include wherein the automated bond management circuit is trained on a set of interactions of parties with a set of user interfaces involved in a set of bond transaction activities.

An example system may include wherein at least one bond transaction from the set of bond transaction includes activities selected from a group consisting of: a debt transaction, underwriting a debt transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating debt, or consolidating debt.

An example system may further include a market value data collection circuit structured to monitor and reports on marketplace information relevant to a value of at least one of the issuer and a set of assets.

An example system may include wherein reporting is on a at least one asset from the set of assets selected from a group consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property.

An example system may include wherein the market value data collection circuit is structured to monitor pricing or financial data for items that are similar to the assets in at least one public marketplace.

An example system may include wherein a set of similar items for valuing the assets is constructed using a similarity clustering algorithm based on attributes of the assets.

An example system may include wherein at least one attribute from the attributes is selected from a group consisting of: a category of the assets, asset age, asset condition, asset history, asset storage, or geolocation of assets.

An example system may further include a smart contract circuit structured for managing a smart contract for a bond transaction.

An example system may include wherein the smart contract circuit is structured to determine terms and conditions for the bond.

An example system may include wherein at least one term and condition from the set of terms and conditions for the debt transaction that is specified and managed by the set of smart contract circuits is selected from a group consisting of: a principal amount of debt, a balance of debt, a fixed interest rate, a variable interest rate, a payment amount, a payment schedule, a balloon payment schedule, a specification of assets that back the bond, a specification of substitutability of assets, a party, an issuer, a purchaser, a guarantee, a guarantor, a security, a personal guarantee, a lien, a duration, a covenant, a foreclose condition, a default condition, or a consequence of default.

In embodiments, provided herein is a method for adaptive intelligence and robotic process automation capabilities of a transactional, financial and marketplace enablement. An example method may include collecting information about entities involved in a set of bond transactions of a set of bonds and a training data set of outcomes related to the entities; classifying a condition of a set of issuers using the collected information and a model, wherein the model is trained using the training data set of outcomes related to the set of issuers.

Certain further aspects of an example system are described following, any one or more of which may be present in certain embodiments. An example method may further include processing events relevant to at least one of a value, a condition, and an ownership of at least one asset of the set of assets; and performing an action related to a debt transaction to which the asset is related.

An example method may further include managing an action related to the bond based at least in part a training set of bond management activities.

An example method may further include monitoring and reporting on marketplace information relevant to a value of at least one of the issuer and a set of assets.

An example method may further include managing a smart contract for a bond transaction.

An example method may further include determining terms and conditions for the smart contract for at least one bond.

In embodiments, provided herein is a system for monitoring a condition of an issuer for a bond. An example platform, system, or apparatus may include a social network data collection circuit structured to collect information about at least one entity involved in at least one transaction comprising at least one bond; a condition classifying circuit structured to classify a condition of the at least one entity in accordance with a model and based on information from the social network data collection circuit, wherein the model is trained using a training data set of a plurality of outcomes related to the at least one entity; and an automated bond management circuit structured to manage an action related to the at least one bond in response to the classified condition of the at least one entity.

Certain further aspects of an example system are described following, any one or more of which may be present in certain embodiments. An example system may include wherein the at least one entity is selected from the entities consisting of: a bond issuer, a bond, a party, and an asset.

An example system may include wherein the at least one entity comprises a bond issuer selected from the bond issuers consisting of: a municipality, a corporation, a contractor, a government entity, a non-governmental entity, and a non-profit entity.

An example system may include wherein the bond is selected from the entities consisting of: a municipal bond, a government bond, a treasury bond, an asset-backed bond, and a corporate bond.

An example system may include wherein the condition classified by the condition classifying circuit comprises at least one condition selected from the conditions consisting of: a default condition, a foreclosure condition, a condition indicating violation of a covenant, a financial risk condition, a behavioral risk condition, a policy risk condition, a financial health condition, a physical defect condition, a physical health condition, an entity risk condition or an entity health condition.

An example system may include wherein the social network data collection circuit further comprises a social networking input circuit structured to receive input from a user used to configure a query for information about the at least one entity in response to the received input.

An example system may further include a data collection circuit structured to monitor at least one of an Internet of Things device, an environmental condition sensor, a crowdsourcing request circuit, a crowdsourcing communication circuit, a crowdsourcing publishing circuit, and an algorithm for querying network domains.

An example system may further include wherein the condition classifying circuit is further structured to classify the condition in response to the information from the data collection circuit.

An example system may include wherein the data collection circuit is further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

An example system may further include wherein the condition classifying circuit is further structured to classify the condition in response to the monitored environment.

An example system may include wherein the at least one bond is backed by at least one asset.

An example system may include wherein the at least one asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may further include an event processing circuit structured to process an event relevant to at least one of a value, a condition and an ownership of the at least one asset and to undertake an action related to the at least one transaction in response to the event.

An example system may include wherein the action is selected from the actions consisting of: a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

An example system may include wherein the condition classifying circuit comprises a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system may further include an automated bond management circuit structured to manage an action related to the at least one bond, wherein the automated bond management circuit is trained on a training data set of a plurality of bond management activities.

An example system may include wherein the automated bond management circuit is trained on a plurality of interactions of parties with a plurality of user interfaces involved in a plurality of bond transaction activities.

An example system may include wherein the plurality of bond transaction activities is selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

An example system may further include a market value data collection circuit structured to monitor and report on marketplace information relevant to a value of at least one of a bond issuer, the at least one bond, and an asset related to the at least one bond.

An example system may include wherein the asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein the market value data collection circuit is further structured to monitor pricing or financial data for an offset asset item in at least one public marketplace.

An example system may further include wherein comprising a clustering circuit structured to construct a set of offset asset items for valuing the asset is constructed using a clustering circuit based on an attribute of the asset.

An example system may include wherein the attribute is selected from the attributes consisting of: a category, an asset age, an asset condition, an asset history, an asset storage, and a geolocation.

An example system may further include a smart contract circuit structured to manage a smart contract for the at least one transaction.

An example system may include wherein the smart contract circuit is further structured to determine a terms and conditions for the at least one bond.

An example system may include wherein the terms and conditions are selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default. In embodiments, provided herein is a method for monitoring a condition of an issuer for a bond. An example method may include collecting social network information about at least one entity involved in at least one transaction comprising at least one bond; and classifying a condition of the at least one entity in accordance with a model and based on the social network information, wherein the model is trained using a training data set of a plurality of outcomes related to the at least one entity, and managing an action related to the at least one bond in response to the classified condition of the at least one entity.

Certain further aspects of an example method are described following, any one or more of which may be present in certain embodiments. An example method may further include processing an event relevant to at least one of a value, a condition and an ownership of at least one asset related to the at least one bond and undertaking an action related to the at least one transaction in response to the event. An example method may further include training an automated bond management circuit on a training set of a plurality of bond management activities to manage an action related to the at least one bond, and wherein managing the action comprises operating the automated bond management circuit. An example method may further include monitoring and reporting on marketplace information relevant to a value of at least one of a bond issuer, the at least one bond, and an asset.

In embodiments, provided herein is a system for monitoring a condition of an issuer for a bond. An example platform, system, or apparatus may include an Internet of Things data collection circuit structured to collect information about at least one entity involved in at least one transaction comprising at least one bond; and a condition classifying circuit structured to classify a condition of the at least one entity in accordance with a model and based on information from the Internet of Things data collection circuit, wherein the model is trained using a training data set of a plurality of outcomes related to the at least one entity, and an event processing circuit structured undertake an action related to the at least one transaction in response to the classified condition of the at least one entity.

Certain further aspects of an example system are described following, any one or more of which may be present in certain embodiments. An example system may include wherein the at least one entity is selected from the entities consisting of: a bond issuer, a bond, a party, and an asset.

An example system may include wherein the bond issuer is selected from the bond issuers consisting of: a municipality, a corporation, a contractor, a government entity, a non-governmental entity, and a non-profit entity.

An example system may include wherein the bond is selected from the entities consisting of: a municipal bond, a government bond, a treasury bond, an asset-backed bond, and a corporate bond.

An example system may include wherein the condition classified by the condition classifying circuit at least one of a default condition, a foreclosure condition, a condition indicating violation of a covenant, a financial risk condition, a behavioral risk condition, a policy risk condition, a financial health condition, a physical defect condition, a physical health condition, an entity risk condition or an entity health condition.

An example system may include wherein the Internet of Things data collection circuit further comprises an Internet of Things input circuit structured to receive input from a user used to configure a query for information about the at least one entity.

An example system may further include a data collection circuit structured to monitor at least one of an Internet of Things device, an environmental condition sensor, a crowdsourcing request circuit, a crowdsourcing communication circuit, a crowdsourcing publishing circuit, and an algorithm for querying network domains.

An example system may further include wherein the condition classifying circuit is further structured to classify the condition in response to the information from the data collection circuit.

An example system may include wherein the data collection circuit is further structured to monitor an environment selected from the group consisting of: a municipal environment, a corporate environment, a securities trading environment, a real property environment, a commercial facility, a warehousing facility, a transportation environment, a manufacturing environment, a storage environment, a home, and a vehicle.

An example system may include wherein the condition classifying circuit is further structured to classify the condition in response to the monitored environment.

An example system may include wherein the at least one bond is backed by at least one asset.

An example system may include wherein the at least one asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may further include an event processing circuit structured to process an event relevant to at least one of a value, a condition and an ownership of the at least one asset and undertake an action related to the at least one transaction further in response to the event.

An example system may include wherein the action is selected from the actions consisting of: a bond transaction, underwriting a bond transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

An example system may include wherein the condition classifying circuit comprises a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system may further include an automated bond management circuit structured to manage an action related to the at least one bond, wherein the automated bond management circuit is trained on a training data set of a plurality of bond management activities.

An example system may include wherein the automated bond management circuit is trained on a plurality of interactions of parties with a plurality of user interfaces involved in a plurality of bond transaction activities.

An example system may include wherein the plurality of bond transaction activities is selected from the bond transaction activities consisting of: offering a bond transaction, underwriting a bond transaction, setting an interest rate, deferring a payment requirement, modifying an interest rate, validating title, managing inspection, recording a change in title, assessing a value of an asset, calling a loan, closing a transaction, setting terms and conditions for a transaction, providing notices required to be provided, foreclosing on a set of assets, modifying terms and conditions, setting a rating for an entity, syndicating bonds, and consolidating bonds.

An example system may further include a market value data collection circuit structured to monitor and report on marketplace information relevant to a value of at least one of a bond issuer, the at least one bond, and an asset related to the at least one bond.

An example system may include wherein the asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein the market value data collection circuit is further structured to monitor pricing or financial data for an offset asset item in at least one public marketplace.

An example system may further include a clustering circuit structured to construct wherein a set of offset asset items for valuing the asset is constructed using a clustering circuit based on an attribute of the asset.

An example system may include wherein the attribute is selected from the attributes consisting of: a category, an asset age, an asset condition, an asset history, an asset storage, and a geolocation.

An example system may further include a smart contract circuit structured to manage a smart contract for the at least one transaction.

An example system may include wherein the smart contract circuit is further structured to determine a terms and conditions for the at least one bond.

An example system may include wherein the terms and conditions are selected from the group consisting of: a principal amount of debt, a balance of debt, a fixed interest rate, a variable interest rate, a payment amount, a payment schedule, a balloon payment schedule, a specification of assets that back the at least one bond, a specification of substitutability of assets, a party, an issuer, a purchaser, a guarantee, a guarantor, a security, a personal guarantee, a lien, a duration, a covenant, a foreclose condition, a default condition, and a consequence of default.

In embodiments, provided herein is a method for monitoring a condition of an issuer for a bond. An example method may include collecting Internet of Things information about at least one entity involved in at least one transaction comprising at least one bond; and classifying a condition of the at least one entity in accordance with a model and based on the Internet of Things information, wherein the model is trained using a training data set of a plurality of outcomes related to the at least one entity and undertaking an action related to the at least one transaction in response to the classified condition of the at least one entity.

Certain further aspects of an example method are described following, any one or more of which may be present in certain embodiments. An example method may further include processing an event relevant to at least one of a value, a condition and an ownership of at least one asset and undertaking an action related to the at least one transaction in response to the event. An example method may further include training an automated bond management circuit on a training set of a plurality of bond management activities to manage an action related to the at least one bond. An example method may further include monitoring and reporting on marketplace information relevant to a value of at least one of a bond issuer, the at least one bond, and an asset.

In embodiments, an example platform or system may include an Internet of Things data collection circuit structured to collect information about at least one entity involved in at least one subsidized loan transaction; a condition classifying circuit comprising a model structured to classify at least one parameter of at least one subsidized loan involved in the at least one subsidized loan transaction based on the information from the Internet of Things data collection circuit, wherein the model is trained using a training data set of a plurality of outcomes related to the at least one subsidized loan; and a smart contract circuit structured to automatically modify a terms and conditions of the at least one subsidized loan based on the classified parameter from the condition classifying circuit.

Certain further aspects of an example system are described following, any one or more of which may be present in certain embodiments. An example system may include wherein the at least one entity is selected from the entities consisting of: the at least one subsidized loan, a distinct at least one subsidized loan involved in the at least one subsidized loan transaction, a party, a subsidy, a guarantor, a subsidizing party, and a collateral.

An example system may include wherein the at least one entity comprises a party is selected from the parties consisting of: at least one of a municipality, a corporation, a contractor, a government entity, a non-governmental entity, and a non-profit entity.

An example system may include wherein the at least one subsidized loan comprises at least one of a municipal subsidized loan, a government subsidized loan, a student loan, an asset-backed subsidized loan, or a corporate subsidized loan.

An example system may include wherein the condition classified by the condition classifying circuit is selected from the conditions consisting of: a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition and an entity health condition.

An example system may include wherein the at least one subsidized loan is a student loan and the condition classifying circuit classifies at least one of a progress of a student toward a degree, a participation of a student in a non-profit activity, and a participation of a student in a public interest activity.

An example system may include wherein further comprising a user interface of the Internet of Things data collection circuit structured to enable a user to configure a query for information about the at least one entity.

An example system may include wherein further comprising at least one configurable data collection and circuit structured to monitor the at least one entity selected from the group consisting of: a social network analytic circuit, an environmental condition circuit, a crowdsourcing circuit, and an algorithm for querying a network domain.

An example system may include wherein the at least one configurable data collection and circuit monitors an environment selected from the environments consisting of: a municipal environment, an educational environment, a corporate environment, a securities trading environment, a real property environment, a commercial facility, a warehousing facility, a transportation environment, a manufacturing environment, a storage environment, a home, and a vehicle.

An example system may include wherein the at least one subsidized loan is backed by at least one asset.

An example system may include wherein the at least one asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein further comprising an automated agent structured to process at least one event relevant to at least one of a value, a condition and an ownership of the at least one asset and undertake an action related to the at least one subsidized loan transaction to which the at least one asset is related.

An example system may include wherein the action is selected from the actions consisting of: a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan.

An example system may include wherein the condition classifying circuit comprises a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system may include wherein further comprising an automated subsidized loan management circuit structured to manage an action related to the at least one subsidized loan, wherein the automated subsidized loan management circuit is trained on a training set of subsidized loan management activities.

An example system may include wherein the automated subsidized loan management circuit is trained on a plurality of interactions of parties with a plurality of user interfaces involved in a plurality of subsidized loan transaction activities.

An example system may include wherein the plurality of subsidized loan transaction activities are selected from the activities consisting of: offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan.

An example system may include wherein further comprising a blockchain service circuit structured to record the modified set of terms and conditions for the at least one subsidized loan in a distributed ledger.

An example system may include wherein further comprising a market value data collection circuit structured to monitor and report on marketplace information relevant to a value of at least one of an issuer, at least one subsidized loan, and at least one asset.

An example system may include wherein reporting is on at least one asset selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein the market value data collection circuit is further structured to monitor pricing or financial data for an offset asset item in at least one public marketplace.

An example system may include a clustering circuit structured to construct a set of offset asset items for valuing the at least one asset is constructed using a clustering circuit based on an attribute of the at least one asset.

An example system may include wherein the attribute is selected from the attributes consisting of a category, an asset age, an asset condition, an asset history, an asset storage, and a geolocation.

An example system may include wherein further comprising a smart contract circuit structured to manage a smart contract for the at least one subsidized loan transaction.

An example system may include wherein the smart contract is further structured to modify the smart contract in response to the classified parameter of the at least one subsidized loan.

An example system may include wherein the terms and conditions for the at least one subsidized loan that are automatically modified by the smart contract circuit are selected from the group consisting of: a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, and a consequence of default.

In embodiments, an example method may include collecting information about at least one entity involved in at least one subsidized loan transaction; classifying at least one parameter of at least one subsidized loan involved in the at least one subsidized loan transaction based on the information using a model trained on a training data set of a plurality of outcomes related to the at least one subsidized loan; and automatically modifying a terms and conditions of the at least one subsidized loan based on the classified parameter.

Certain further aspects of an example method are described following, any one or more of which may be present in certain embodiments. An example method may include wherein further comprising processing at least one event relevant to at least one of a value, a condition or an ownership of the at least one asset related to the at least one subsidized loan and undertaking an action related to the at least one subsidized loan transaction to which the at least one asset is related.

An example method may include wherein further comprising recording the modified set of terms and conditions for the at least one subsidized loan in a distributed ledger.

An example method may include wherein further comprising monitoring and reporting on marketplace information relevant to a value of at least one of an issuer, the at least one subsidized loan, or at least one asset related to the at least one subsidized loan.

In embodiments, an example platform or system may include a social network analytic data collection circuit structured to collect social network information about at least one entity involved in at least one subsidized loan transaction; a condition classifying circuit comprising a model structured to classify at least one parameter of at least one subsidized loan involved in the at least one subsidized loan transaction based on the social network information from the social network analytic data collection circuit, wherein the model is trained using a training data set of outcomes related to the at least one subsidized loan; and a smart contract circuit structured to automatically modify a terms and conditions of the at least one subsidized loan based on the classified at least one parameter.

Certain further aspects of an example system are described following, any one or more of which may be present in certain embodiments. An example system may include wherein the at least one entity is selected from the entities consisting of the at least one subsidized loan, a distinct at least one subsidized loan involved in the at least one subsidized loan transaction, a party, a subsidy, a guarantor, a subsidizing party, and a collateral.

An example system may include wherein a party subsidizing the at least one subsidized loan is selected from the parties consisting of: a municipality, a corporation, a contractor, a government entity, a non-governmental entity, and a non-profit entity.

An example system may include wherein the at least one subsidized loan comprises at least one of a municipal subsidized loan, a government subsidized loan, a student loan, an asset-backed subsidized loan, or a corporate subsidized loan.

An example system may include wherein the at least one parameter classified by the condition classifying circuit is selected from the conditions consisting of: a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition and an entity health condition.

An example system may include wherein the at least one subsidized loan is a student loan and the condition classifying circuit classifies at least one of a progress of a student toward a degree, a participation of a student in a non-profit activity, or a participation of a student in a public interest activity.

An example system may include wherein further comprising a user interface of the social network analytic data collection circuit structured to enable a user to configure a query for information about the at least one entity, wherein, in response to the query, wherein the social network analytic data collection circuit initiates at least one algorithm that searches and retrieves data from at least one social network in response to the query.

An example system may include wherein further comprising at least one configurable data collection and circuit structured to monitor the at least one entity, and selected from the group consisting of: a social network analytic circuit, an environmental condition circuit, a crowdsourcing circuit, and an algorithm for querying a network domain.

An example system may include wherein the at least one configurable data collection and circuit monitors an environment selected from the environments consisting of: a municipal environment, an educational environment, a corporate environment, a securities trading environment, a real property environment, a commercial facility, a warehousing facility, a transportation environment, a manufacturing environment, a storage environment, a home, and a vehicle.

An example system may include wherein the at least one subsidized loan is backed by at least one asset.

An example system may include wherein the at least one asset is selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein further comprising an automated agent structured to process at least one event relevant to at least one of a value, a condition or an ownership of the at least one asset and undertake an action related to the at least one subsidized loan transaction to which the at least one asset is related.

An example system may include wherein the action is selected from the actions consisting of: a subsidized loan transaction, underwriting a subsidized loan transaction, setting an interest rate, deferring a payment requirement, modifying an interest rate, validating a title, managing an inspection, recording a change in a title, assessing the value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan.

An example system may include wherein the condition classifying circuit comprises a system selected from the systems consisting of: a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system may include wherein further comprising an automated subsidized loan management circuit structured to manage an action related to the at least one subsidized loan, and wherein the automated subsidized loan management circuit is trained on a training set of subsidized loan management activities.

An example system may include wherein the automated subsidized loan management circuit is trained on a plurality of interactions of parties with a plurality of user interfaces involved in a plurality of subsidized loan transaction activities.

An example system may include wherein the plurality of subsidized loan transaction activities are selected from the activities consisting of: offering a subsidized loan transaction, underwriting a subsidized loan transaction, setting an interest rate, deferring a payment requirement, modifying an interest rate, validating a title, managing an inspection, recording a change in a title, assessing a value of an asset, calling a loan, closing a transaction, setting terms and conditions for a transaction, providing notices required to be provided, foreclosing on a set of assets, modifying terms and conditions, setting a rating for an entity, syndicating a subsidized loan, and consolidating a subsidized loan.

An example system may include wherein further comprising a blockchain service circuit structured to record the modified set of terms and conditions for the at least one subsidized loan in a distributed ledger.

An example system may include wherein further comprising a market value data collection circuit structured to monitor and report on marketplace information relevant to a value of at least one of an issuer, at least one subsidized loan, or at least one asset.

An example system may include wherein reporting is on at least one asset selected from the assets consisting of: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include wherein the market value data collection circuit is further structured to monitor pricing or financial data for an offset asset item in at least one public marketplace.

An example system may further include a clustering circuit structured to construct a set of offset asset items for valuing the at least one asset is constructed using a clustering circuit based on an attribute of the at least one asset.

An example system may include wherein the attribute is selected from the attributes consisting of: a category, an asset age, an asset condition, an asset history, an asset storage, and a geolocation.

An example system may include wherein further comprising a smart contract circuit structured to manage a smart contract for the at least one subsidized loan transaction.

An example system may include wherein the smart contract circuit sets a terms and conditions for the at least one subsidized loan.

An example system may include wherein the terms and conditions for the at least one subsidized loan that are specified and managed by the smart contract circuit are selected from the group consisting of: a principal amount of debt, a balance of debt, a fixed interest rate, a variable interest rate, a payment amount, a payment schedule, a balloon payment schedule, a specification of assets that back the at least one subsidized loan, a specification of substitutability of assets, a party, an issuer, a purchaser, a guarantee, a guarantor, a security, a personal guarantee, a lien, a duration, a covenant, a foreclose condition, a default condition, and a consequence of default.

In embodiments, an example method may include collecting social network information about at least one entity involved in at least one subsidized loan transaction; classifying at least one parameter of at least one subsidized loan involved in the at least one subsidized loan transaction based on the social network information using a model trained on a training data set of outcomes related to the at least one subsidized loan; automatically modifying a terms and conditions of the at least one subsidized loan based on the classified at least one parameter.

Certain further aspects of an example method are described following, any one or more of which may be present in certain embodiments. An example method may include wherein further comprising processing at least one event relevant to at least one of a value, a condition and an ownership of the at least one asset and undertaking an action related to the at least one subsidized loan transaction to which the at least one asset is related.

An example method may include wherein further comprising recording the modified set of terms and conditions for the at least one subsidized loan in a distributed ledger.

An example method may include wherein further comprising monitoring and reporting on marketplace information relevant to a value of at least one of an issuer, the at least one subsidized loan, or at least one asset.

In embodiments, provided herein is a system for automating handling of a subsidized loan. An example platform or system may include a crowdsourcing services circuit structured to collect information related to a set of entities involved in a set of subsidized loan transactions; a condition classifying circuit comprising a model and an artificial intelligence services circuit structured to classify a set of parameters of the set of subsidized loans involved in the transactions based on information from the crowdsourcing services circuit, wherein the model is trained using a training data set of outcomes related to subsidized loans; and a smart contract circuit for automatically modifying the terms and conditions of a subsidized loan based on the classified set of parameters from the condition classifying circuit.

Certain further aspects of an example system are described following, any one or more of which may be present in certain embodiments. An example system may include wherein the set of entities includes entities among a set of subsidized loans, a set of parties, a set of subsidies, a set of guarantors, a set of subsidizing parties, and a set of collateral.

An example system may include wherein each entity of the set of entities includes entities selected from the list consisting of: a subsidized loan from a set of subsidized loans corresponding to the set of subsidized loan transactions, a party related to at least one of the set of subsidized loan transactions, a subsidy corresponding to a subsidized loan from a set of subsidized loans corresponding to the set of subsidized loan transactions, a guarantor related to at least one of the set of subsidized loan transactions, a subsidy corresponding to a subsidized loan from a set of subsidized loans corresponding to the set of subsidized loan transactions, a subsidized party related to at least one of the set of subsidized loan transactions, a subsidizing party related to at least one of the set of subsidized loan transactions, a subsidy corresponding to a subsidized loan from a set of subsidized loans corresponding to the set of subsidized loan transactions, and an item of collateral related to at least one of the set of subsidized loan transactions, a subsidy corresponding to a subsidized loan from a set of subsidized loans corresponding to the set of subsidized loan transactions.

An example system may at least one entity of the set of entities includes a subsidizing party related to at least one of the set of subsidized loan transactions, wherein the subsidizing party includes at least one of a municipality, a corporation, a contractor, a government entity, a non-governmental entity, or a non-profit entity.

An example system may include wherein each loan of a set of subsidized loans corresponding to the set of loan transactions includes at least one of a municipal subsidized loan, a government subsidized loan, a student loan, an asset-backed subsidized loan, or a corporate subsidized loan.

An example system may include wherein the condition classified by the condition classifying circuit is among a default condition, a foreclosure condition, a condition indicating violation of a covenant, a financial risk condition, a behavioral risk condition, a contractual performance condition, a policy risk condition, a financial health condition, a physical defect condition, a physical health condition, an entity risk condition and an entity health condition.

An example system may include wherein the subsidized loan is a student loan and the condition classifying circuit classifies at least one of the progress of a student toward a degree, the participation of a student in a non-profit activity, and a participation of the student in a public interest activity.

An example system may include wherein the crowdsourcing services circuit is further structured with a user interface by which a user may configure a query for information about the set of entities and the crowdsourcing services circuit automatically configures a crowdsourcing request based on the query.

An example system may include further comprising a configurable data collection and monitoring services circuit for monitoring the entities wherein the configurable data collection and monitoring services circuit includes at least one of a set of: Internet of Things services, a set of environmental condition sensors, a set of social network analytic services, and a set of algorithms for querying network domains.

An example system may include wherein the configurable data collection and monitoring services circuit is further structured to monitor an environment selected from among a municipal environment, an educational environment, a corporate environment, a securities trading environment, a real property environment, a commercial facility, a warehousing facility, a transportation environment, a manufacturing environment, a storage environment, a home, and a vehicle.

An example system may include wherein the set of subsidized loans is backed by a set of assets.

An example system may include wherein the set of assets, each selected from among: a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, and an item of personal property.

An example system may include further comprising an automated agent circuit structured to process events relevant to at least one of a value, a condition or an ownership of at least one asset of the set of assets and undertakes an action related to a subsidized loan transaction to which the at least one asset is related.

An example system may include wherein the action is selected from among offering a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction, providing notices required to be provided, foreclosing on a set of assets, modifying terms and conditions, setting a rating for an entity, syndicating subsidized loans, or consolidating subsidized loans.

An example system may include wherein the artificial intelligence services circuit comprises at least one of a machine learning system, a model-based system, a rule-based system, a deep learning system, a hybrid system, a neural network, a convolutional neural network, a feed forward neural network, a feedback neural network, a self-organizing map, a fuzzy logic system, a random walk system, a random forest system, a probabilistic system, a Bayesian system, and a simulation system.

An example system may include further comprising an automated subsidized loan management circuit structured to manage an action related to the subsidized loan, wherein the automated subsidized loan management circuit is trained on a training set of subsidized loan management activities.

An example system may include wherein the automated subsidized loan management circuit is further trained on a set of interactions of parties with a set of user interfaces, wherein the parties are involved in a set of subsidized loan transaction activities.

An example system may include wherein the set of subsidized loan transaction activities includes activities each selected from among offering a subsidized loan transaction, underwriting a subsidized loan transaction, setting an interest rate, deferring a payment requirement, modifying an interest rate, validating title, managing inspection, recording a change in title, assessing the value of an asset, calling a loan, closing a transaction, setting terms and conditions for a transaction providing notices required to be provided, foreclosing on a set of assets, modifying terms and conditions, setting a rating for an entity, syndicating subsidized loans, or consolidating subsidized loans.

An example system may include further comprising a blockchain services circuit structured to record the modified set of terms and conditions for a set of subsidized loans corresponding to the set of subsidized loan transactions in a distributed ledger.

An example system may include further comprising a market value data collection service circuit structured to monitor and report on marketplace information relevant to the value of at least one of a party related to the subsidized loan, a set of subsidized loans corresponding to the set of subsidized loan transactions, and a set of assets.

An example system may include wherein reporting is on a set of assets that includes at least one of a municipal asset, a vehicle, a ship, a plane, a building, a home, real estate property, undeveloped land, a farm, a crop, a municipal facility, a warehouse, a set of inventory, a commodity, a security, a currency, a token of value, a ticket, a cryptocurrency, a consumable item, an edible item, a beverage, a precious metal, an item of jewelry, a gemstone, intellectual property, an intellectual property right, a contractual right, an antique, a fixture, an item of furniture, an item of equipment, a tool, an item of machinery, or an item of personal property.

An example system may include wherein the market value data collection service circuit is further structured to monitor pricing or financial data for items that are similar to the assets of the set of assets in at least one public marketplace.

An example system may include wherein a set of similar items for valuing the assets of the set of assets is constructed using a similarity clustering algorithm based on the attributes of the assets.

An example system may include wherein the attributes are selected from among a category of the assets, asset age, asset condition, asset history, asset storage, or geolocation of assets.

An example system may include further comprising a smart contract services circuit for managing a smart contract for the subsidized loan.

An example system may include wherein the smart contract services circuit is further structured to set terms and conditions for the subsidized loan.

An example system may include wherein the terms and conditions for the debt transaction that are specified and managed by the smart contract services circuit is selected from among a principal amount of debt, a balance of debt, a fixed interest rate, a variable interest rate, a payment amount, a payment schedule, a balloon payment schedule, a specification of assets that back the subsidized loan, a specification of substitutability of assets, a party, an issuer, a purchaser, a guarantee, a guarantor, a security, a personal guarantee, a lien, a duration, a covenant, a foreclose condition, a default condition, or a consequence of default.

In embodiments, provided herein is a method for facilitating automating handling of a subsidized loan. An example method may include collecting information related to a set of entities involved in a set of subsidized loan transactions; classifying a set of parameters of the set of subsidized loans involved in the subsidized loan transactions based on an artificial intelligence service, a model, and information from a crowdsourcing service, wherein the model is trained using a training data set of outcomes related to subsidized loans; and modifying terms and conditions of a subsidized loan based on the classified set of parameters.

Certain further aspects of an example method are described following, any one or more of which may be present in certain embodiments. An example method may include wherein the set of entities includes entities selected from among a set of subsidized loans, a set of parties, a set of subsidies, a set of guarantors, a set of subsidizing parties, or a set of collateral.

An example method may include wherein the set of entities comprise a set of subsidizing parties, and wherein each party of the set of subsidizing parties includes at least one of a municipality, a corporation, a contractor, a government entity, a non-governmental entity, or a non-profit entity.

An example method may include wherein the set of subsidized loans includes at least one of a municipal subsidized loan, a government subsidized loan, a student loan, an asset-backed subsidized loan, and a corporate subsidized loan.

An example method may include wherein the subsidized loan is a student loan wherein the classifying is based on at least one of the progress of a student toward a degree, the participation of a student in a non-profit activity, and the participation of the student in a public interest activity.

In embodiments, an example platform or system may include an asset identification service circuit structured to interpret a plurality of assets corresponding to a financial entity configured to take custody of the plurality of assets; an identity management service circuit structured to authenticate a plurality of identifiers corresponding to actionable entities entitled to take action with respect to the plurality of assets, wherein the plurality of identifiers comprises at least one credential; a blockchain service circuit structured to store a plurality of asset control features in a blockchain structure, wherein the blockchain structure comprises a distributed ledger configuration; and a financial management circuit structured to communicate the interpreted plurality of assets and authenticated plurality of identifiers to the blockchain service circuit for storage in the blockchain structure as asset control features, and wherein the blockchain service circuit is further structured to record the asset control features in the distributed ledger configuration as asset events Certain further aspects of an example system are described following, any one or more of which may be present in certain embodiments. An example system may include wherein the at least one credential comprises an owner credential, an agent credential, a beneficiary credential, a trustee credential, or a custodian credential.

An example system may include wherein the asset events include events selected from among: transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, or designation of an ownership status.

An example system may include a data collection circuit structured to monitor at least one of the interpretation of the plurality of assets, the authentication of the plurality of identifiers, and the recording of asset events.

An example system may include wherein the actionable entities each include at least one of an owner, a beneficiary, an agent, a trustee, or a custodian.

An example system may include a smart contract circuit structured to manage the custody of the plurality of assets, and wherein at least one asset event related to the plurality of assets is managed by the smart contract circuit based on a plurality of terms and conditions embodied in a smart contract configuration and based on data collected by the data collection service circuit.

An example system may include wherein the at least one asset event related to the plurality of assets comprises at least one event selected from among a transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, and designation of an ownership status.

An example system may include wherein the data collection circuit further includes at least one system selected from the systems consisting of: an Internet of Things system, a camera system, a networked monitoring system, an internet monitoring system, a mobile device system, a wearable device system, a user interface system, and an interactive crowdsourcing system.

An example system may include wherein each of the asset identification service circuit, identity management service circuit, blockchain service circuit, and the financial management circuit further comprise a corresponding application programming interface (API) component structured to facilitate communication among the circuits of the system. The corresponding API components of the circuits further include user interfaces structured to interact with a plurality of users of the system.

An example system may include the blockchain service circuit further structured to share and distribute the asset events with the plurality of actionable entities.

In embodiments, an example method may include interpreting a plurality of assets corresponding to a financial entity configured to take custody of the plurality of assets; authenticating a plurality of identifiers corresponding to actionable entities entitled to take action with respect to the plurality of assets, wherein the plurality of identifiers comprises at least one credential; storing a plurality of asset control features in a blockchain structure, wherein the blockchain structure comprises a distributed ledger configuration; and communicating the interpreted plurality of assets and authenticated plurality of identifiers for storage in the blockchain structure as asset control features, wherein the asset control features are recorded in the distributed ledger configuration as asset events.

An example method may include wherein the at least one credential comprises an owner credential, an agent credential, a beneficiary credential, a trustee credential, or a custodian credential.

An example method may include wherein the asset events each include at least on event selected from among transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, or designation of an ownership status.

An example method may include monitoring at least one of the interpretation of the plurality of assets, the authentication of the plurality of identifiers, or the recording of asset events.

An example method may include wherein the actionable entities each comprise at least one of an owner, a beneficiary, an agent, a trustee, or a custodian.

An example method may include managing the custody of the plurality of assets, wherein at least one asset event related to the plurality of assets is based on a plurality of terms and conditions embodied in a smart contract configuration and based on data collected by the data about the plurality of assets.

An example method may include wherein each asset event related to the plurality of assets comprises at least one event selected from among a transfer of title, death of an owner, disability of an owner, bankruptcy of an owner, foreclosure, placement of a lien, use of assets as collateral, designation of a beneficiary, undertaking a loan against assets, providing a notice with respect to assets, inspection of assets, assessment of assets, reporting on assets for taxation purposes, allocation of ownership of assets, disposal of assets, sale of assets, purchase of assets, or designation of an ownership status.

An example method may include wherein the monitoring is executed by at least one of an Internet of Things system, a camera system, a networked monitoring system, an internet monitoring system, a mobile device system, a wearable device system, a user interface system, or an interactive crowdsourcing system.

An example method may include comprising sharing and distributing the asset events with the plurality of actionable entities.

An example method may include wherein interpreting the plurality of assets comprises identifying the plurality of assets for which a financial entity is responsible for taking custody.

An example method may include wherein authenticating the plurality of identifiers comprises verifying the plurality of identifiers corresponding to actionable entities are entitled to take action with respect to the plurality of assets.

An example method may include wherein the blockchain structure is provided in conjunction with a block-chain marketplace.

An example method may include wherein the block-chain marketplace utilizes an automated blockchain-based transaction application.

An example method may include comprising storing asset transaction data in the blockchain structure based on interactions between actionable entities.

An example method may include wherein the blockchain structure is a distributed blockchain structure across a plurality of asset nodes.

An example method may include wherein at least one of the plurality of assets is a virtual asset tag and interpreting the plurality of assets comprises identifying the virtual asset tag.

An example method may include wherein the storing of the plurality of asset control features comprising storing virtual asset tag data.

An example method may include wherein the virtual asset tag data is at least one of location data or tracking data.

An example method may include wherein an identifier corresponding to at least one of the financial entity or actionable entities is stored as virtual asset tag data.

In embodiments, provided herein is a system for facilitating foreclosure on collateral. An example platform or system may include a lending agreement storage circuit structured to store a plurality of lending agreement data comprising at least one lending agreement, wherein the at least one lending agreement comprises a lending condition data, the lending condition data comprising a terms and condition data of the at least one lending agreement related to a foreclosure condition on at least one asset that provides a collateral condition related to a collateral asset for securing a repayment obligation of the at least one lending agreement; a data collection services circuit structured to monitor the lending condition data and to detect a default condition based on a change to the lending condition data; and a smart contract services circuit structured to, when the default condition is detected by the data collection services circuit, interpret the default condition and communicate a default condition indication that initiates a foreclosure procedure based on the collateral condition and the default condition.

Certain further aspects of an example system are described following, any one or more of which may be present in certain embodiments. An example system may include wherein the smart contract services circuit is further structured to communicate the detected default condition indication is communicated to at least one of a smart lock and a smart container to lock the collateral asset.

An example system may include wherein the foreclosure procedure configures and initiates a listing of the collateral asset on a public auction site.

An example system may include wherein the foreclosure procedure configures and delivers a set of transport instructions for the collateral asset.

An example system may include wherein the foreclosure procedure configures a set of instructions for a drone to transport the collateral asset.

An example system may include wherein the foreclosure procedure configures a set of instructions for a robotic device to transport the collateral asset.

An example system may include wherein the foreclosure procedure initiates a process for automatically substituting a set of substitute collateral.

An example system may include wherein the foreclosure procedure initiates a collateral tracking procedure.

An example system may include wherein the foreclosure procedure initiates a collateral valuation process.

An example system may include wherein the foreclosure procedure initiates a message to a borrower initiating a negotiation regarding the foreclosure.

An example system may include wherein the negotiation is managed by a robotic process automation system trained on a training set of foreclosure negotiations.

An example system may include wherein the negotiation relates to modification of at least one of interest rate, payment terms, and collateral for the at least one lending agreement.

An example system may include wherein the data collection services circuit further comprises at least one system selected from the systems consisting of: an Internet of Things system, a camera system, a networked monitoring system, an internet monitoring system, a mobile device system, a wearable device system, a user interface system, and an interactive crowdsourcing system.

An example system may include wherein each of the lending agreement storage circuit, data collection services circuit, and smart contract services circuit further comprise a corresponding application programming interface (API) component structured to facilitate communication among the circuits of the system.

An example system may include wherein the corresponding API components of the circuits further comprise user interfaces structured to interact with a plurality of users of the system.

In embodiments, provided herein is a method for facilitating foreclosure on collateral. An example method may include storing a plurality of lending agreement data comprising at least one lending agreement, wherein the at least one lending agreement comprises a lending condition data, the lending condition data comprising a terms and condition data of the at least one lending agreement related to a foreclosure condition on at least one asset that provides a collateral condition related to a collateral asset for securing a repayment obligation of the at least one lending agreement; monitoring the lending condition data and to detect a default condition based on a change to the lending condition data; interpreting the default condition; and communicating a default condition indication that initiates a foreclosure procedure based on the collateral condition.

Certain further aspects of an example method are described following, any one or more of which may be present in certain embodiments. An example method may include wherein the detected default condition indication is communicated to at least one of a smart lock and a smart container to lock the collateral asset.

An example method may include wherein the foreclosure procedure configures and initiates a listing of the collateral asset on a public auction site.

An example method may include wherein the foreclosure procedure configures and delivers a set of transport instructions for the collateral asset.

An example method may include wherein the foreclosure procedure configures a set of instructions for a drone to transport the collateral asset.

An example method may include wherein the foreclosure procedure configures a set of instructions for a robotic device to transport the collateral asset.

An example method may include wherein the foreclosure procedure initiates a process for automatically substituting a set of substitute collateral.

An example method may include wherein the foreclosure procedure initiates a collateral tracking procedure.

An example method may include wherein the foreclosure procedure initiates a collateral valuation process.

An example method may include wherein the foreclosure procedure initiates a message to a borrower initiating a negotiation regarding the foreclosure.

An example method may include wherein the negotiation is managed by a robotic process automation system trained on a training set of foreclosure negotiations.

An example method may include wherein the negotiation relates to modification of at least one of interest rate, payment terms, or collateral for the at least one lending agreement.

An example method may include wherein the monitoring is provided by at least one of an Internet of Things system, a camera system, a networked monitoring system, an internet monitoring system, a mobile device system, a wearable device system, a user interface system, or an interactive crowdsourcing system.

An example method may include wherein providing communications for monitoring, interpreting, and communicating are through an application programming interface (API).

An example method may include wherein providing a user interface incorporating the API to interact with a plurality of users.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger for aggregating intellectual property licensing terms, wherein a smart contract wrapper on the distributed ledger allows an operation on the ledger to commit a party to a contract term. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes executable algorithmic logic, such that operation on the distributed ledger provides provable access to the executable algorithmic logic. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes a 3D printer instruction set, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a coating process, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a semiconductor fabrication process, such that operation on the distributed ledger provides provable access to the fabrication process. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes a firmware program, such that operation on the distributed ledger provides provable access to the firmware program. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for an FPGA, such that operation on the distributed ledger provides provable access to the FPGA. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes serverless code logic, such that an operation on the distributed ledger provides provable access to the serverless code logic. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a crystal fabrication system, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a food preparation process, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a polymer production process, such that operation on the distributed ledger provides access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for chemical synthesis process, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set for a biological production process, such that operation on the distributed ledger provides provable access to the instruction set. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that aggregates views of a trade secret into a chain that proves which and how many parties have viewed the trade secret. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that tokenizes an item of intellectual property and a reporting system that reports an analytic result based on the operations performed on the distributed ledger or the intellectual property. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a distributed ledger that aggregates a set of instructions, where an operation on the distributed ledger adds at least one instruction to a pre-existing set of instructions to provide a modified set of instructions. In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger for aggregating intellectual property licensing terms, wherein a smart contract wrapper on the distributed ledger allows an operation on the ledger to commit a party to a contract term. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes executable algorithmic logic, such that operation on the distributed ledger provides provable access to the executable algorithmic logic. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a 3D printer instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a coating process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a semiconductor fabrication process, such that operation on the distributed ledger provides provable access to the fabrication process. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a firmware program, such that operation on the distributed ledger provides provable access to the firmware program. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for an FPGA, such that operation on the distributed ledger provides provable access to the FPGA. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes serverless code logic, such that an operation on the distributed ledger provides provable access to the serverless code logic. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a crystal fabrication system, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a food preparation process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a polymer production process, such that operation on the distributed ledger provides access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for chemical synthesis process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a biological production process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that aggregates views of a trade secret into a chain that proves which and how many parties have viewed the trade secret. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an item of intellectual property and a reporting system that reports an analytic result based on the operations performed on the distributed ledger or the intellectual property. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger for aggregating intellectual property licensing terms, wherein a smart contract wrapper on the distributed ledger allows an operation on the ledger to commit a party to a contract term. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes executable algorithmic logic, such that operation on the distributed ledger provides provable access to the executable algorithmic logic. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes a 3D printer instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a coating process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a semiconductor fabrication process, such that operation on the distributed ledger provides provable access to the fabrication process. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes a firmware program, such that operation on the distributed ledger provides provable access to the firmware program. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for an FPGA, such that operation on the distributed ledger provides provable access to the FPGA. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes serverless code logic, such that an operation on the distributed ledger provides provable access to the serverless code logic. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a crystal fabrication system, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a food preparation process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a polymer production process, such that operation on the distributed ledger provides access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for chemical synthesis process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set for a biological production process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that aggregates views of a trade secret into a chain that proves which and how many parties have viewed the trade secret. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that tokenizes an item of intellectual property and a reporting system that reports an analytic result based on the operations performed on the distributed ledger or the intellectual property. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger for aggregating intellectual property licensing terms, wherein a smart contract wrapper on the distributed ledger allows an operation on the ledger to commit a party to a contract term. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes executable algorithmic logic, such that operation on the distributed ledger provides provable access to the executable algorithmic logic. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a 3D printer instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a coating process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a semiconductor fabrication process, such that operation on the distributed ledger provides provable access to the fabrication process. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a firmware program, such that operation on the distributed ledger provides provable access to the firmware program. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for an FPGA, such that operation on the distributed ledger provides provable access to the FPGA. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes serverless code logic, such that an operation on the distributed ledger provides provable access to the serverless code logic. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a crystal fabrication system, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a food preparation process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a polymer production process, such that operation on the distributed ledger provides access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for chemical synthesis process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set for a biological production process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that aggregates views of a trade secret into a chain that proves which and how many parties have viewed the trade secret. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that tokenizes an item of intellectual property and a reporting system that reports an analytic result based on the operations performed on the distributed ledger or the intellectual property. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger for aggregating intellectual property licensing terms, wherein a smart contract wrapper on the distributed ledger allows an operation on the ledger to commit a party to a contract term. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes executable algorithmic logic, such that operation on the distributed ledger provides provable access to the executable algorithmic logic. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes a 3D printer instruction set, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a coating process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a semiconductor fabrication process, such that operation on the distributed ledger provides provable access to the fabrication process. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes a firmware program, such that operation on the distributed ledger provides provable access to the firmware program. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for an FPGA, such that operation on the distributed ledger provides provable access to the FPGA. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes serverless code logic, such that an operation on the distributed ledger provides provable access to the serverless code logic. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a crystal fabrication system, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a food preparation process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a polymer production process, such that operation on the distributed ledger provides access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for chemical synthesis process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set for a biological production process, such that operation on the distributed ledger provides provable access to the instruction set. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that aggregates views of a trade secret into a chain that proves which and how many parties have viewed the trade secret. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an item of intellectual property and a reporting system that reports an analytic result based on the operations performed on the distributed ledger or the intellectual property. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger for aggregating intellectual property licensing terms, wherein a smart contract wrapper on the distributed ledger allows an operation on the ledger to commit a party to a contract term and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes executable algorithmic logic, such that operation on the distributed ledger provides provable access to the executable algorithmic logic. In embodiments, provided herein is a transaction-enabling system having a distributed ledger that tokenizes an instruction set, such that operation on the distributed ledger provides provable access to the instruction set and having a distributed ledger that tokenizes a 3D printer instruction set, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for a coating process, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for a semiconductor fabrication process, such that operation on the distributed ledger provides provable access to the fabrication process. In embodiments, provided herein is a transaction-enabling system having a distributed ledger that tokenizes an instruction set, such that operation on the distributed ledger provides provable access to the instruction set and having a distributed ledger that tokenizes a firmware program, such that operation on the distributed ledger provides provable access to the firmware program. In embodiments, provided herein is a transaction-enabling system having a distributed ledger that tokenizes an instruction set, such that operation on the distributed ledger provides provable access to the instruction set and having a distributed ledger that tokenizes an instruction set for an FPGA, such that operation on the distributed ledger provides provable access to the FPGA. In embodiments, provided herein is a transaction-enabling system having a distributed ledger that tokenizes an instruction set, such that operation on the distributed ledger provides provable access to the instruction set and having a distributed ledger that tokenizes serverless code logic, such that an operation on the distributed ledger provides provable access to the serverless code logic. In embodiments, provided herein is a transaction-enabling system having a distributed ledger that tokenizes an instruction set, such that operation on the distributed ledger provides provable access to the instruction set and having a distributed ledger that tokenizes an instruction set for a crystal fabrication system, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for a polymer production process, such that operation on the distributed ledger provides access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes executable algorithmic logic, such that operation on the distributed ledger provides provable access to the executable algorithmic logic. In embodiments, provided herein is a transaction-enabling system having a distributed ledger that tokenizes executable algorithmic logic, such that operation on the distributed ledger provides provable access to the executable algorithmic logic and having a distributed ledger that tokenizes a 3D printer instruction set, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a coating process, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a semiconductor fabrication process, such that operation on the distributed ledger provides provable access to the fabrication process. In embodiments, provided herein is a transaction-enabling system having a distributed ledger that tokenizes executable algorithmic logic, such that operation on the distributed ledger provides provable access to the executable algorithmic logic and having a distributed ledger that tokenizes a firmware program, such that operation on the distributed ledger provides provable access to the firmware program. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for an FPGA, such that operation on the distributed ledger provides provable access to the FPGA. In embodiments, provided herein is a transaction-enabling system having a distributed ledger that tokenizes executable algorithmic logic, such that operation on the distributed ledger provides provable access to the executable algorithmic logic and having a distributed ledger that tokenizes serverless code logic, such that an operation on the distributed ledger provides provable access to the serverless code logic. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a crystal fabrication system, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a food preparation process, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a polymer production process, such that operation on the distributed ledger provides access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for chemical synthesis process, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set for a biological production process, such that operation on the distributed ledger provides provable access to the instruction set. In embodiments, provided herein is a transaction-enabling system having a distributed ledger that tokenizes executable algorithmic logic, such that operation on the distributed ledger provides provable access to the executable algorithmic logic and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes executable algorithmic logic, such that operation on the distributed ledger provides provable access to the executable algorithmic logic and having a distributed ledger that aggregates views of a trade secret into a chain that proves which and how many parties have viewed the trade secret. In embodiments, provided herein is a transaction-enabling system having a distributed ledger that tokenizes executable algorithmic logic, such that operation on the distributed ledger provides provable access to the executable algorithmic logic and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes executable algorithmic logic, such that operation on the distributed ledger provides provable access to the executable algorithmic logic and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes executable algorithmic logic, such that operation on the distributed ledger provides provable access to the executable algorithmic logic and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes executable algorithmic logic, such that operation on the distributed ledger provides provable access to the executable algorithmic logic and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes a 3D printer instruction set, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a coating process, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a semiconductor fabrication process, such that operation on the distributed ledger provides provable access to the fabrication process. In embodiments, provided herein is a transaction-enabling system having a distributed ledger that tokenizes a 3D printer instruction set, such that operation on the distributed ledger provides provable access to the instruction set and having a distributed ledger that tokenizes a firmware program, such that operation on the distributed ledger provides provable access to the firmware program. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for an FPGA, such that operation on the distributed ledger provides provable access to the FPGA. In embodiments, provided herein is a transaction-enabling system having a distributed ledger that tokenizes a 3D printer instruction set, such that operation on the distributed ledger provides provable access to the instruction set and having a distributed ledger that tokenizes serverless code logic, such that an operation on the distributed ledger provides provable access to the serverless code logic. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a crystal fabrication system, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a food preparation process, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a polymer production process, such that operation on the distributed ledger provides access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes a 3D printer instruction set, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes a 3D printer instruction set, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes a 3D printer instruction set, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes a 3D printer instruction set, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes a 3D printer instruction set, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes a 3D printer instruction set, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a coating process, such that operation on the distributed ledger provides provable access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for a semiconductor fabrication process, such that operation on the distributed ledger provides provable access to the fabrication process. In embodiments, provided herein is a transaction-enabling system having a distributed ledger that tokenizes an instruction set for a coating process, such that operation on the distributed ledger provides provable access to the instruction set and having a distributed ledger that tokenizes a firmware program, such that operation on the distributed ledger provides provable access to the firmware program. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for an FPGA, such that operation on the distributed ledger provides provable access to the FPGA. In embodiments, provided herein is a transaction-enabling system having a distributed ledger that tokenizes an instruction set for a coating process, such that operation on the distributed ledger provides provable access to the instruction set and having a distributed ledger that tokenizes serverless code logic, such that an operation on the distributed ledger provides provable access to the serverless code logic. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for a crystal fabrication system, such that operation on the distributed ledger provides provable access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for a polymer production process, such that operation on the distributed ledger provides access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a coating process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a coating process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a coating process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a coating process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a coating process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a coating process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a semiconductor fabrication process, such that operation on the distributed ledger provides provable access to the fabrication process. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes a firmware program, such that operation on the distributed ledger provides provable access to the firmware program. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for an FPGA, such that operation on the distributed ledger provides provable access to the FPGA. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes serverless code logic, such that an operation on the distributed ledger provides provable access to the serverless code logic. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for a crystal fabrication system, such that operation on the distributed ledger provides provable access to the instruction set. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for a polymer production process, such that operation on the distributed ledger provides access to the instruction set. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a semiconductor fabrication process, such that operation on the distributed ledger provides provable access to the fabrication process and having a distributed ledger that aggregates views of a trade secret into a chain that proves which and how many parties have viewed the trade secret. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a semiconductor fabrication process, such that operation on the distributed ledger provides provable access to the fabrication process and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a semiconductor fabrication process, such that operation on the distributed ledger provides provable access to the fabrication process and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a semiconductor fabrication process, such that operation on the distributed ledger provides provable access to the fabrication process and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes a firmware program, such that operation on the distributed ledger provides provable access to the firmware program. In embodiments, provided herein is a transaction-enabling system having a distributed ledger that tokenizes a firmware program, such that operation on the distributed ledger provides provable access to the firmware program and having a distributed ledger that tokenizes an instruction set for an FPGA, such that operation on the distributed ledger provides provable access to the FPGA. In embodiments, provided herein is a transaction-enabling system having a distributed ledger that tokenizes a firmware program, such that operation on the distributed ledger provides provable access to the firmware program and having a distributed ledger that tokenizes serverless code logic, such that an operation on the distributed ledger provides provable access to the serverless code logic. In embodiments, provided herein is a transaction-enabling system having a distributed ledger that tokenizes a firmware program, such that operation on the distributed ledger provides provable access to the firmware program and having a distributed ledger that tokenizes an instruction set for a crystal fabrication system, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a food preparation process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a polymer production process, such that operation on the distributed ledger provides access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for chemical synthesis process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a biological production process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes a firmware program, such that operation on the distributed ledger provides provable access to the firmware program and having a distributed ledger that aggregates views of a trade secret into a chain that proves which and how many parties have viewed the trade secret. In embodiments, provided herein is a transaction-enabling system having a distributed ledger that tokenizes a firmware program, such that operation on the distributed ledger provides provable access to the firmware program and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes a firmware program, such that operation on the distributed ledger provides provable access to the firmware program and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes a firmware program, such that operation on the distributed ledger provides provable access to the firmware program and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes a firmware program, such that operation on the distributed ledger provides provable access to the firmware program and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for an FPGA, such that operation on the distributed ledger provides provable access to the FPGA. In embodiments, provided herein is a transaction-enabling system having a distributed ledger that tokenizes an instruction set for an FPGA, such that operation on the distributed ledger provides provable access to the FPGA and having a distributed ledger that tokenizes serverless code logic, such that an operation on the distributed ledger provides provable access to the serverless code logic. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set for a crystal fabrication system, such that operation on the distributed ledger provides provable access to the instruction set. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set for a polymer production process, such that operation on the distributed ledger provides access to the instruction set. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for an FPGA, such that operation on the distributed ledger provides provable access to the FPGA and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for an FPGA, such that operation on the distributed ledger provides provable access to the FPGA and having a distributed ledger that aggregates views of a trade secret into a chain that proves which and how many parties have viewed the trade secret. In embodiments, provided herein is a transaction-enabling system having a distributed ledger that tokenizes an instruction set for an FPGA, such that operation on the distributed ledger provides provable access to the FPGA and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for an FPGA, such that operation on the distributed ledger provides provable access to the FPGA and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for an FPGA, such that operation on the distributed ledger provides provable access to the FPGA and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for an FPGA, such that operation on the distributed ledger provides provable access to the FPGA and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes serverless code logic, such that an operation on the distributed ledger provides provable access to the serverless code logic. In embodiments, provided herein is a transaction-enabling system having a distributed ledger that tokenizes serverless code logic, such that an operation on the distributed ledger provides provable access to the serverless code logic and having a distributed ledger that tokenizes an instruction set for a crystal fabrication system, such that operation on the distributed ledger provides provable access to the instruction set. In embodiments, provided herein is a transaction-enabling system having a distributed ledger that tokenizes serverless code logic, such that an operation on the distributed ledger provides provable access to the serverless code logic and having a distributed ledger that tokenizes an instruction set for a food preparation process, such that operation on the distributed ledger provides provable access to the instruction set. In embodiments, provided herein is a transaction-enabling system having a distributed ledger that tokenizes serverless code logic, such that an operation on the distributed ledger provides provable access to the serverless code logic and having a distributed ledger that tokenizes an instruction set for a polymer production process, such that operation on the distributed ledger provides access to the instruction set. In embodiments, provided herein is a transaction-enabling system having a distributed ledger that tokenizes serverless code logic, such that an operation on the distributed ledger provides provable access to the serverless code logic and having a distributed ledger that tokenizes an instruction set for chemical synthesis process, such that operation on the distributed ledger provides provable access to the instruction set. In embodiments, provided herein is a transaction-enabling system having a distributed ledger that tokenizes serverless code logic, such that an operation on the distributed ledger provides provable access to the serverless code logic and having a distributed ledger that tokenizes an instruction set for a biological production process, such that operation on the distributed ledger provides provable access to the instruction set. In embodiments, provided herein is a transaction-enabling system having a distributed ledger that tokenizes serverless code logic, such that an operation on the distributed ledger provides provable access to the serverless code logic and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes serverless code logic, such that an operation on the distributed ledger provides provable access to the serverless code logic and having a distributed ledger that aggregates views of a trade secret into a chain that proves which and how many parties have viewed the trade secret. In embodiments, provided herein is a transaction-enabling system having a distributed ledger that tokenizes serverless code logic, such that an operation on the distributed ledger provides provable access to the serverless code logic and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes serverless code logic, such that an operation on the distributed ledger provides provable access to the serverless code logic and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes serverless code logic, such that an operation on the distributed ledger provides provable access to the serverless code logic and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes serverless code logic, such that an operation on the distributed ledger provides provable access to the serverless code logic and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a crystal fabrication system, such that operation on the distributed ledger provides provable access to the instruction set. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an instruction set for a polymer production process, such that operation on the distributed ledger provides access to the instruction set. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a crystal fabrication system, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a crystal fabrication system, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a crystal fabrication system, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a crystal fabrication system, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a crystal fabrication system, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a food preparation process, such that operation on the distributed ledger provides provable access to the instruction set. In embodiments, provided herein is a transaction-enabling system having a distributed ledger that tokenizes an instruction set for a food preparation process, such that operation on the distributed ledger provides provable access to the instruction set and having a distributed ledger that tokenizes an instruction set for a polymer production process, such that operation on the distributed ledger provides access to the instruction set. In embodiments, provided herein is a transaction-enabling system having a distributed ledger that tokenizes an instruction set for a food preparation process, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a food preparation process, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a food preparation process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a food preparation process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a food preparation process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a food preparation process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a food preparation process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a food preparation process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a polymer production process, such that operation on the distributed ledger provides access to the instruction set. In embodiments, provided herein is a transaction-enabling system having a distributed ledger that tokenizes an instruction set for a polymer production process, such that operation on the distributed ledger provides access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a polymer production process, such that operation on the distributed ledger provides access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a polymer production process, such that operation on the distributed ledger provides access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a polymer production process, such that operation on the distributed ledger provides access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a polymer production process, such that operation on the distributed ledger provides access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a polymer production process, such that operation on the distributed ledger provides access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a polymer production process, such that operation on the distributed ledger provides access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a polymer production process, such that operation on the distributed ledger provides access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for chemical synthesis process, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for chemical synthesis process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for chemical synthesis process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for chemical synthesis process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for chemical synthesis process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for chemical synthesis process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for chemical synthesis process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a biological production process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a biological production process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a biological production process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a biological production process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a biological production process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a biological production process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that aggregates views of a trade secret into a chain that proves which and how many parties have viewed the trade secret. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that aggregates views of a trade secret into a chain that proves which and how many parties have viewed the trade secret. In embodiments, provided herein is a transaction-enabling system having a distributed ledger that aggregates views of a trade secret into a chain that proves which and how many parties have viewed the trade secret and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that aggregates views of a trade secret into a chain that proves which and how many parties have viewed the trade secret and having a distributed ledger that tokenizes an item of intellectual property and a reporting system that reports an analytic result based on the operations performed on the distributed ledger or the intellectual property. In embodiments, provided herein is a transaction-enabling system having a distributed ledger that aggregates views of a trade secret into a chain that proves which and how many parties have viewed the trade secret and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that aggregates views of a trade secret into a chain that proves which and how many parties have viewed the trade secret and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an item of intellectual property and a reporting system that reports an analytic result based on the operations performed on the distributed ledger or the intellectual property and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an item of intellectual property and a reporting system that reports an analytic result based on the operations performed on the distributed ledger or the intellectual property and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that aggregates a set of instructions, where an operation on the distributed ledger adds at least one instruction to a pre-existing set of instructions to provide a modified set of instructions and having a smart wrapper for management of a distributed ledger that aggregates sets of instructions, where the smart wrapper manages allocation of instruction sub-sets to the distributed ledger and access to the instruction sub-sets.

In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f). The term "set" as used herein refers to a group having one or more members.

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A knowledge distribution system for controlling rights related to digital knowledge, the system comprising:

a set of processors that execute computer-executable instructions that cause the set of processors to:

receive an instance of digital knowledge from a user, wherein the instance of digital knowledge comprises fabrication requirements associated with a manufactured item and is useable by fabrication equipment to fabricate at least a portion of the manufactured item;

generate one or more tokens that are linked to the instance of digital knowledge on a distributed ledger and are transferrable from a first wallet to a second wallet on the distributed ledger, wherein the distributed ledger comprises a plurality of blocks linked via cryptography and distributed over a plurality of nodes of a distributed ledger network, and wherein the plurality of nodes of the distributed ledger network establish a cryptography-based consensus requirement for verification of cryptographically-linked blocks to be added to the plurality of blocks linked using cryptography and store the generated one or more tokens on the distributed ledger using new cryptographically-linked blocks that are verified based on the cryptography-based consensus requirement and added to the plurality of blocks linked using cryptography; and deploy a smart contract on the distributed ledger, wherein the smart contract comprises the generated one or more tokens and executable logic executed by the plurality of nodes, wherein the executable logic is configured to:

manage ownership of the generated one or more tokens;

detect a request for access corresponding to a selected token of the generated one or more tokens, wherein the selected token links to the instance of digital knowledge and the request indicates a specified fabrication equipment that is requesting access to the instance of digital knowledge; and verify that the specified fabrication equipment meets the fabrication requirements specified by the instance of digital knowledge based on the detected request for access; and transfer the instance of digital knowledge to the specified fabrication equipment based on the request for access and in response to the specified fabrication equipment meeting the fabrication requirements;

wherein the specified fabrication equipment is configured to, upon receiving the instance of digital knowledge, fabricate at least the portion of the manufactured item based on the instance of digital knowledge that is linked to the selected token.

2. The knowledge distribution system of claim 1, wherein the smart contract further comprises a smart contract wrapper configured to add the instance of digital knowledge to an aggregate stack of intellectual property.

3. The knowledge distribution system of claim 1, wherein the smart contract further comprises a smart contract wrapper configured to:

perform an operation on the distributed ledger to add intellectual property to an aggregated stack of intellectual property that includes the instance of digital knowledge;

commit parties in the distributed ledger to an apportionment of royalties for the added intellectual property; and process a commitment of a party to a contract term on the distributed ledger.

4. The knowledge distribution system of claim 1, wherein the computer-executable instructions further cause the set of processors to facilitate creation and management of a plurality of user accounts corresponding to a plurality of users of the knowledge distribution system.

5. The knowledge distribution system of claim 1, wherein the computer-executable instructions further cause the set of processors to present a user interface to a user of the knowledge distribution system, wherein the user interface enables the user to view data related to the instance of digital knowledge.

6. The knowledge distribution system of claim 1, wherein the computer-executable instructions further cause the set of processors to:

establish and maintain a digital marketplace; and visually present data corresponding to an instance of the instance of digital knowledge to a user of the knowledge distribution system.

7. The knowledge distribution system of claim 1, further comprising a knowledge datastore in communication with the distributed ledger, the knowledge datastore configured to store data related to the instance of digital knowledge.

8. The knowledge distribution system of claim 1, further comprising a client datastore in communication with the distributed ledger, wherein the client datastore is configured to store data related to a plurality of users of the knowledge distribution system.

9. The knowledge distribution system of claim 1, further comprising a smart contract datastore in communication with the distributed ledger, wherein the smart contract datastore is configured to store data related to the smart contract.

10. The knowledge distribution system of claim 1, wherein the computer-executable instructions further cause the set of processors to:

analyze the generated one or more tokens, resulting in an analytic result; and report the analytic result.

11. The knowledge distribution system of claim 1, wherein deploying the smart contract comprises using a parameterizable smart contract template to generate the smart contract, wherein the smart contract comprises a parameter based on a type of the instance of digital knowledge.

12. The knowledge distribution system of claim 1, wherein the instance of digital knowledge includes an instruction set.

13. The knowledge distribution system of claim 1, wherein the fabrication equipment comprises a 3D printer, wherein the instance of digital knowledge comprises a CAD file.

14. A computer-implemented method comprising:

receiving data, using a digital wallet system, from a distributed ledger, wherein the distributed ledger comprises a plurality of blocks linked via cryptography distributed over a plurality of nodes of a distributed ledger network;

purchasing, with the digital wallet system, one or more tokens that are linked to an instance of digital knowledge, wherein the instance of digital knowledge is useable by fabrication equipment to fabricate at least a portion of a manufactured item specified by the instance of digital knowledge;

receiving, using the digital wallet system, the one or more tokens on the distributed ledger via a transfer of the instance of digital knowledge that is recorded in cryptographically-linked blocks that are verified and added to the plurality of blocks linked using cryptography;

wherein receiving the one or more tokens comprises communicating with a smart contract executed by the plurality of nodes of the distributed ledger network, wherein the smart contract comprises the one or more tokens and executable logic that when executed by the plurality of nodes performs the steps of:

managing ownership of the one or more tokens; and managing access rights for the instance of digital knowledge;

receiving the instance of digital knowledge from the distributed ledger network; and fabricating, using the fabrication equipment, at least the portion of the manufactured item based on the instance of digital knowledge that is linked to the one or more tokens.

15. The computer-implemented method of claim 14, further comprising:

crowdsourcing information regarding an element of the instance of digital knowledge; and updating the smart contract in response to the crowdsourced information.

16. The computer-implemented method of claim 15, wherein the crowdsourced information comprises information regarding: a knowledge provider, or a knowledge recipient.

17. The computer-implemented method of claim 14, further comprising:

adding intellectual property to an aggregated stack of intellectual property that includes the instance of digital knowledge on the distributed ledger;

committing parties to an apportionment of royalties for the added intellectual property; and processing a commitment of a party to a contract term.

18. The computer-implemented method of claim 14, further comprising:

creating a user account;

receiving a request from a user account to display data related to the instance of digital knowledge;

confirming access to the instance of digital knowledge allowed for the user account; and presenting a user interface configured to display the data related to the instance of digital knowledge.

19. The computer-implemented method of claim 18, further comprising: creating a user account; and issuing a public access key and a private access key to the user account, wherein the access keys correspond to a respective level of access.

20. The computer-implemented method of claim 14, further comprising facilitating a buying or selling of the instance of digital knowledge via the digital wallet system.

21. The computer-implemented method of claim 14, further comprising creating and issuing a currency token associated with the distributed ledger.

22. The computer-implemented method of claim 14, wherein the instance of digital knowledge includes an instruction set.

23. The computer-implemented method of claim 14, wherein the fabrication equipment comprises a 3D printer, wherein the instance of digital knowledge comprises a CAD file.

24. A manufacturing system for using digital knowledge stored on a distributed ledger, the system comprising:

fabrication equipment; and a computing system comprising one or more processors and memory storing instructions that, when executed by the one or more processors, cause the computing system to:

receive data from the distributed ledger, wherein the distributed ledger comprises a plurality of blocks linked via cryptography and distributed over a plurality of nodes of a distributed ledger network;

purchase one or more tokens that are linked to an instance of digital knowledge, wherein the instance of digital knowledge is useable by the fabrication equipment to fabricate at least a portion of a manufactured item and comprises fabrication requirements specified by the instance of digital knowledge;

receive the one or more tokens via a transfer of the instance of digital knowledge recorded on the distributed ledger using cryptographically-linked blocks, wherein the cryptographically-linked blocks are verified based on a cryptography-based consensus requirement;

communicate with a smart contract deployed on the distributed ledger, wherein the smart contract comprises the one or more tokens and executable logic that, when executed by the plurality of nodes, manages access to the instance of digital knowledge by verifying ownership of the one or more tokens;

request access to the instance of digital knowledge that is linked to the one or more tokens; and receive the instance of digital knowledge from the smart contract, wherein the fabrication equipment is configured to receive the instance of digital knowledge and fabricate at least the portion of the manufactured item based on the instance of digital knowledge.

25. The manufacturing system of claim 24, wherein the fabrication equipment comprises a 3D printer, wherein the instance of digital knowledge comprises a CAD file.

* * * * *